US011137904B1

(12) United States Patent
Tyler et al.

(10) Patent No.: US 11,137,904 B1
(45) Date of Patent: Oct. 5, 2021

(54) DEVICES, METHODS, AND GRAPHICAL USER INTERFACES FOR INTERACTING WITH USER INTERFACE OBJECTS CORRESPONDING TO APPLICATIONS

(71) Applicant: Apple Inc., Cupertino, CA (US)

(72) Inventors: William M. Tyler, San Francisco, CA (US); Caelan G. Stack, San Francisco, CA (US); Christopher P. Foss, San Francisco, CA (US); Christian X. Dalonzo, San Francisco, CA (US); Craig M. Federighi, Los Altos Hills, CA (US); Alan C. Dye, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/027,416

(22) Filed: Sep. 21, 2020

Related U.S. Application Data

(60) Provisional application No. 63/041,993, filed on Jun. 21, 2020, provisional application No. 63/023,237, (Continued)

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/0485* (2013.01); *G06F 3/04817* (2013.01)

(58) Field of Classification Search
CPC ............. G06F 3/04883; G06F 3/04817; G06F 3/0482; G06F 3/0485
See application file for complete search history.

(56) References Cited

U.S. PATENT DOCUMENTS 7,770,125 B1 8/2010 Young et al.
8,923,572 B2 12/2014 In et al.
(Continued)

FOREIGN PATENT DOCUMENTS

CN 1041556155 A1 11/2014
CN 109981878 A 7/2019
(Continued)

OTHER PUBLICATIONS

Knight, "Nova Launcher 101 How to Organize Your App Drawer with Tab Groups", published: Feb. 2, 2018, updated: Aug. 8, 2018, gadgethacks.com, https://android.gadgethacks.com/how-to/nova-launcher-101-organize-your-app-drawer-with-tab-groups-0182579/ (Year: 2018).*
(Continued)

*Primary Examiner* — Seth A Silverman
(74) *Attorney, Agent, or Firm* — Morgan, Lewis & Bockius LLP

(57) ABSTRACT

While displaying a first page of a home screen user interface in a first reconfiguration mode, the computer system detects a first input that corresponds to a request to enter a second reconfiguration mode, where the availability of pages in the home screen user interface can be changed in accordance with user inputs in the second reconfiguration mode. The computer system displays respective representations of at least two of the plurality of pages of the home screen user interface in the second reconfiguration mode. While displaying the second reconfiguration mode, the computer system detects a second input. If the second input is directed to a second representation of a second page that is displayed in the second reconfiguration mode, and the second input meets first criteria, the computer system displays the second page of the home screen user interface in the first reconfiguration mode.

33 Claims, 411 Drawing Sheets

Related U.S. Application Data filed on May 11, 2020, provisional application No. 63/008,656, filed on Apr. 10, 2020, provisional application No. 62/987,871, filed on Mar. 11, 2020, provisional application No. 62/987,870, filed on Mar. 10, 2020.

(51) Int. Cl.

*G06F 3/0485* (2013.01)
*G06F 3/0481* (2013.01)

(56) References Cited

U.S. PATENT DOCUMENTS

| | | | |
|---|---|---|---|
| 8,943,440 B2 | 1/2015 | Adderton | |
| 10,097,973 B2 | 10/2018 | Gross et al. | |
| 10,261,672 B1 | 4/2019 | Dolbakian et al. | |
| 2007/0101279 A1 | 5/2007 | Chaudhri et al. | |
| 2007/0157089 A1 | 7/2007 | Os et al. | |
| 2007/0157097 A1 | 7/2007 | Peters | |
| 2008/0068519 A1 | 3/2008 | Adler et al. | |
| 2008/0307350 A1 | 12/2008 | Sabatelli et al. | |
| 2008/0307360 A1 | 12/2008 | Chaudhri et al. | |
| 2009/0007007 A1* | 1/2009 | Voros | G06F 3/0485 715/786 |
| 2009/0100361 A1 | 4/2009 | Abello et al. | |
| 2009/0254860 A1 | 10/2009 | Seo et al. | |
| 2010/0169828 A1 | 7/2010 | Kho et al. | |
| 2010/0295789 A1* | 11/2010 | Shin | G06F 3/04847 345/168 |
| 2011/0087985 A1 | 4/2011 | Buchanan et al. | |
| 2011/0208359 A1 | 8/2011 | Duchene et al. | |
| 2011/0225549 A1 | 9/2011 | Kim | |
| 2011/0252346 A1 | 10/2011 | Chaudhri | |
| 2011/0312387 A1 | 12/2011 | Heo et al. | |
| 2012/0054663 A1 | 3/2012 | Baek et al. | |
| 2012/0079432 A1 | 3/2012 | Lee et al. | |
| 2012/0117499 A1 | 5/2012 | Mori et al. | |
| 2012/0188275 A1 | 7/2012 | Shimazu et al. | |
| 2012/0233031 A1 | 9/2012 | Chang et al. | |
| 2013/0036357 A1 | 2/2013 | Hendrickson | |
| 2013/0050119 A1 | 2/2013 | Nemoto | |
| 2013/0139109 A1 | 5/2013 | Kim et al. | |
| 2013/0332886 A1 | 12/2013 | Cranfill et al. | |
| 2014/0189593 A1 | 7/2014 | Kurita et al. | |
| 2014/0189608 A1 | 7/2014 | Shuttleworth et al. | |
| 2014/0201681 A1 | 7/2014 | Mahaffey et al. | |
| 2014/0215364 A1 | 7/2014 | Kang et al. | |
| 2014/0232739 A1 | 8/2014 | Kim et al. | |
| 2015/0089411 A1 | 3/2015 | Ban et al. | |
| 2015/0106737 A1 | 4/2015 | Montoy-Wilson et al. | |
| 2015/0339009 A1 | 11/2015 | Seo | |
| 2015/0370425 A1 | 12/2015 | Chen et al. | |
| 2016/0004416 A1 | 1/2016 | Kim et al. | |
| 2016/0062609 A1 | 3/2016 | Kim et al. | |
| 2016/0077720 A1 | 3/2016 | Park | |
| 2016/0104486 A1 | 4/2016 | Penilla et al. | |
| 2016/0117079 A1 | 4/2016 | Huang | |
| 2016/0239191 A1 | 8/2016 | Krishnasamy | |
| 2016/0283090 A1 | 9/2016 | Seo | |
| 2016/0364029 A1 | 12/2016 | Miller et al. | |
| 2017/0046024 A1 | 2/2017 | Dascola et al. | |
| 2017/0083197 A1 | 3/2017 | Lee et al. | |
| 2017/0255476 A1 | 9/2017 | Whitney et al. | |
| 2017/0277526 A1 | 9/2017 | Shi | |
| 2017/0371530 A1 | 12/2017 | Vranjes et al. | |
| 2018/0024730 A1 | 1/2018 | Jambou | |
| 2018/0048752 A1 | 2/2018 | Zhou | |
| 2018/0095564 A1 | 4/2018 | Frohwein | |
| 2018/0164963 A1 | 6/2018 | Ku et al. | |
| 2018/0335937 A1 | 11/2018 | Hauenstein et al. | |
| 2018/0335939 A1 | 11/2018 | Karunamuni et al. | |
| 2019/0095068 A1 | 3/2019 | Suzuki et al. | |
| 2019/0179500 A1 | 6/2019 | Kim et al. | |
| 2019/0235687 A1 | 8/2019 | Nam et al. | |
| 2019/0302995 A1 | 10/2019 | Robinson et al. | |
| 2019/0391825 A1 | 12/2019 | Jann et al. | |

FOREIGN PATENT DOCUMENTS

| | | |
|---|---|---|
| EP | 2431870 A2 | 3/2012 |
| EP | 2770417 A2 | 8/2014 |
| EP | 3115877 A1 | 1/2017 |
| EP | 3296838 A1 | 3/2018 |
| EP | 3617861 A1 | 3/2020 |
| KR | 20160037230 A | 4/2016 |
| WO | WO 2015/183504 A1 | 12/2015 |
| WO | WO 2017/027526 A1 | 2/2017 |
| WO | WO 2018/165437 A1 | 9/2018 |

OTHER PUBLICATIONS

Wagoner, "Nova Launcher: Everything you need to know!", published: Nov. 10, 2017, androidcentral.com, https://www.androidcentral.com/nova-launcher (Year: 2017).*

Jansen, "How to use Nova Launcher to become an Android superstar", published: Nov. 25, 2017, digitaltrends.com, https://www.digitaltrends.com/mobile/how-to-use-nova-launcher/ (Year: 2017).*

Sinha, "10 Cool Nova Launcher Tricks You Should Know", published: Oct. 31, 2017, beebom.com, https://beebom.com/cool-nova-launcher-tricks/ (Year: 2017).*

IBertz, "Nova Launcher: My Home Screen Setup Tutorial", published: Jul. 29, 2016, youtube.com, https://www.youtube.com/watch?v=HSxA3BmPtg4 (Year: 2016).*

Axuredocs, "Tutorials/Rotating Carousel Slideshow", https://docs.axure.com/axure-rp/tutorials/rotating-carousel-slideshow, Apr. 27, 2019, 9 pages.

Gonzales, "Disable Proactive Search on Your iPhone or iPad in iOS 9, Gadget Hacks", https://ios.gadgethacks.com/how-to-disable-proactive-search-your-iphone-or-ipad-ios-9-0162396, Sep. 9, 2015, 7 pages.

Google, "JINA App Drawer, App Organizer, Sidebar & Folders", https://www.jinadrawer.com, May 13, 2020, 12 pages.

Jain, "Context Based Adaptation of Application Icons in Mobile Computing Devices", 2013 Third World Congress on Information and Communication Technologies (WICT), IEEE, Dec. 15-18, 2013, 6 pages.

Roe, "The Windows 10 Recycle Bin: All You Need to Know", https://www.digitalcitizen.life/simple-questions-what-recycle-bin, Jun. 1, 2020, 11 pages.

Smith, "I Keep Over 200 Apps on My iPhone—Here's the System I Use to Organize Them AH", https:/www.businessinsider.com/apple-iphone-apps-organization-home-screen-2018-7#ibreak-my-home-screen-into-three-sections-the-dock-shortcuts-and-folders-2, Apr. 9, 2019, 18 pages.

Stateofart, "LG G2 Quick Tips—Adding Widgets to the Home Screen", https://www.youtube.com/watch?v=9xEwmiNoKok, Oct. 2013, 5 pages.

Techno Window, "How to Add a Widget (Weather & Clock) on Home-Screen—Samsung Galaxy A7 (2018)", https://www.youtube.com/watch?v=lz3bE8nFaBM, Jan. 25, 2019, 3 pages.

Techwithbrett, "Android 101: Home Screen Customization (Feat, Galaxy S8+)", https://www.youtube.com/watch?v=Z51pw3Gqv5s, Apr. 25, 2017, 3 pages.

Thomas, "Add a Smart App Drawer to Any Launcher & Get Automatic Sorting Features", https://android.gadgethacks.com/how-to/add-smart-app_drawer-any-launcher-get-automatic-sorting-features-0176049/, Jan. 27, 2017, 6 pages.

Wallen, "Pro-Tip: Remove Unnecessary Pages on Your Android Home Screen, https:/www.techrepublic.com/article/pro-tip-remove-unnecessary Pages on Your Android Home Screen", Jul. 3, 2014, 11 pages.

Weisinger, "Foldery Multicon folder widget", https://play.google.com/store/apps/details?id=com.urysoft.folder&hl=en_US, Apr. 20, 2020, 3 pages.

(56) References Cited

OTHER PUBLICATIONS

YouTube, "Galaxy Note 10.1—How to Remove or Add Widgets and Icons", https://www.youtube.com/watch?v=MSOe-tk-ZmlU, Dec. 31, 2013, 3 pages.
YouTube, "How to Edit Home Screen and Add Widgets (Samsung Galaxy S5)", https://www.youtube.com/watch?v=PRJrAanymL8, October/, 2014, 3 pages.
YouTube, "Removing Home Screen on Galaxy ST by Tapping and Holding a Home Screen", https://www.youtube.com/watch?v=l20vja1FvGI, Mar. 24, 2016, 3 pages.
YouTube, "StateofTech, Samsung Galaxy S9 Tips—How to Customize the App Drawer", https://www.youtube.com/watch?v=_TGwDH2AmDA, Apr. 18, 2018, 3 pages.
YouTube, "Windows 10 Tips and Tricks Using Cascade Stacked and Side by Side View and How to Undo", https:/www.youtube.com/watch?v=ECu9S96Z968, Mar. 2, 2016, 3 pages.
Office Action, dated Jan. 4, 2021, received in U.S. Appl. No. 17/027,353, 29 pages.
Final Office Action, dated Apr. 6, 2021, received in U.S. Appl. No. 17/027,353, 31 pages.
Office Action, dated May 5, 2021, received in Australian Patent Application No. 2020239727, which corresponds with U.S. Appl. No. 17/027,353, 7 pages.
Innovation Patent, dated Apr. 28, 2021, received in Australian Patent Application No. 2021101401, which corresponds with U.S. Appl. No. 17/027,353, 5 pages.
Office Action, dated May 28, 2021, received in Australian Patent Application No. 17/027,353, which corresponds with U.S. Appl. No. 17/027,353, 6 pages.
Office Action, dated Dec. 18, 2020, received in Danish Patent Application No. 2020-70608, which corresponds with U.S. Appl. No. 17/027,353, 10 pages.
Office Action, dated Feb. 2, 2021, received in U.S. Appl. No. 17/027,382, 16 pages.
Notice of Allowance, dated Apr. 28, 2021, received in U.S. Appl. No. 17/027,382, 10 pages.
Office Action, dated Mar. 31, 2021, received in Australian Patent Application No. 17/027,382, which corresponds with U.S. Appl. No. 17/027,382, 6 pages.
Office Action, dated Dec. 23, 2020, received in Danish Patent Application No. 2020-70636, which corresponds with U.S. Appl. No. 17/027,382, 9 pages.
Office Action, dated Jan. 6, 2021, received in U.S. Appl. No. 17/027,400, 45 pages.
Final Office action, dated Apr. 29, 2021, received in U.S. Appl. No. 17/027,400, 46 pages.
Office Action, dated Apr. 23, 2021, received in Australian Patent Application No. 2020239726, which corresponds with U.S. Appl. No. 17/027,400, 8 pages.
Office Action, dated Apr. 29, 2021, received in Australian Patent Application No. 2020239728, which corresponds with U.S. Appl. No. 17/027,416, 7 pages.
Office Action, dated Dec. 22, 2020, received in Danish Patent Application No. 2020-70638, which corresponds with U.S. Appl. No. 17/027,416, 6 pages.
Office Action, dated Dec. 22, 2020, received in U.S. Appl. No. 17/027,429, 23 pages.
Notice of Allowance, dated Apr. 13, 2021, received in U.S. Appl. No. 17/027,429, 9 pages.
Office Action, dated May 6, 2021, received in Australian Patent Application No. 2020239731, which corresponds with U.S. Appl. No. 17/027,429, 6 pages.
Office Action, dated Jan. 6, 2021, received in Danish Patent Application No. 2020-70639, which corresponds with U.S. Appl. No. 17/027,429, 9 pages.
Office Action, dated Jan. 7, 2021, received in U.S. Appl. No. 17/027,441, 15 pages.
Notice of Allowance, dated Apr. 13, 2021, received in U.S. Appl. No. 17/027,441, 5 pages.
Office Action, dated May 28, 2021, received in Australian Patent Application No. 2020239732, which corresponds with U.S. Appl. No. 17/027,441, 6 pages.
Office Action, dated Dec. 23, 2020, received in Danish Patent Application No. 2020-70640, which corresponds to U.S. Appl. No. 17/027,441, 9 pages.
Invitation to Pay Additional Fees, dated Jun. 9, 2021, received in International Patent Application No. PCT/US2021/021776, which corresponds with U.S. Appl. No. 17/027,353, 17 pages.

* cited by examiner

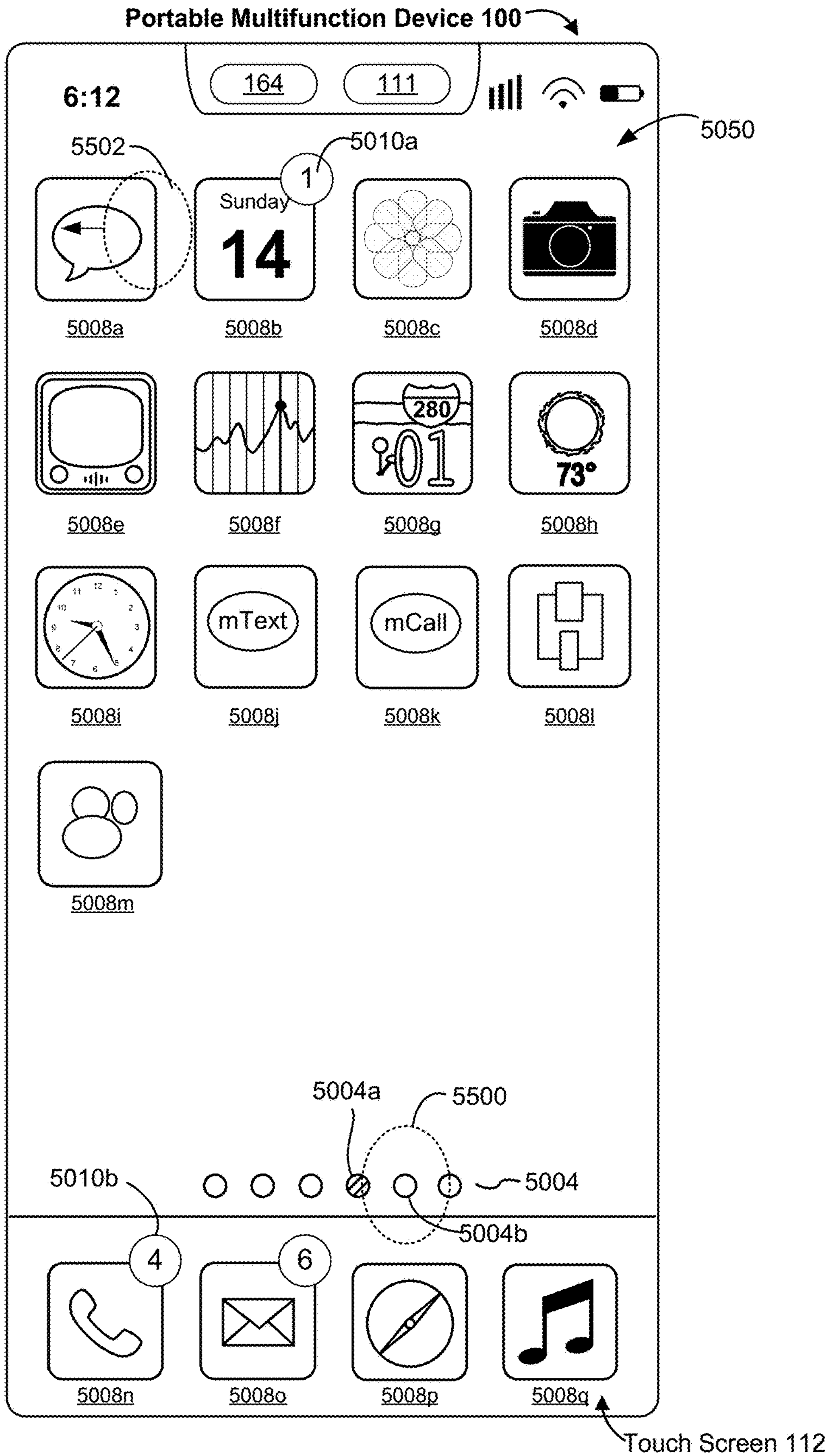
Figure 5A1

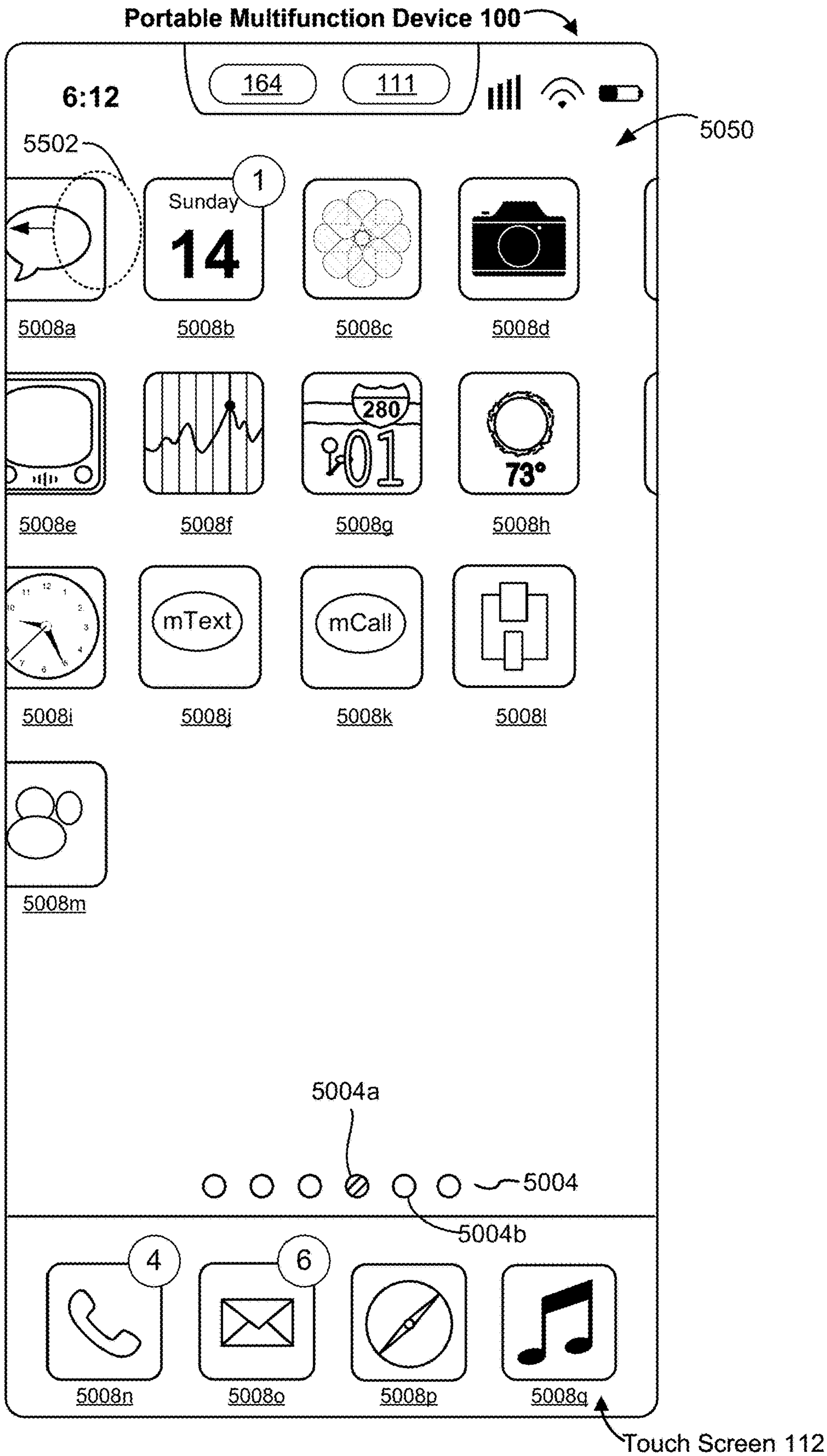
Figure 5A2

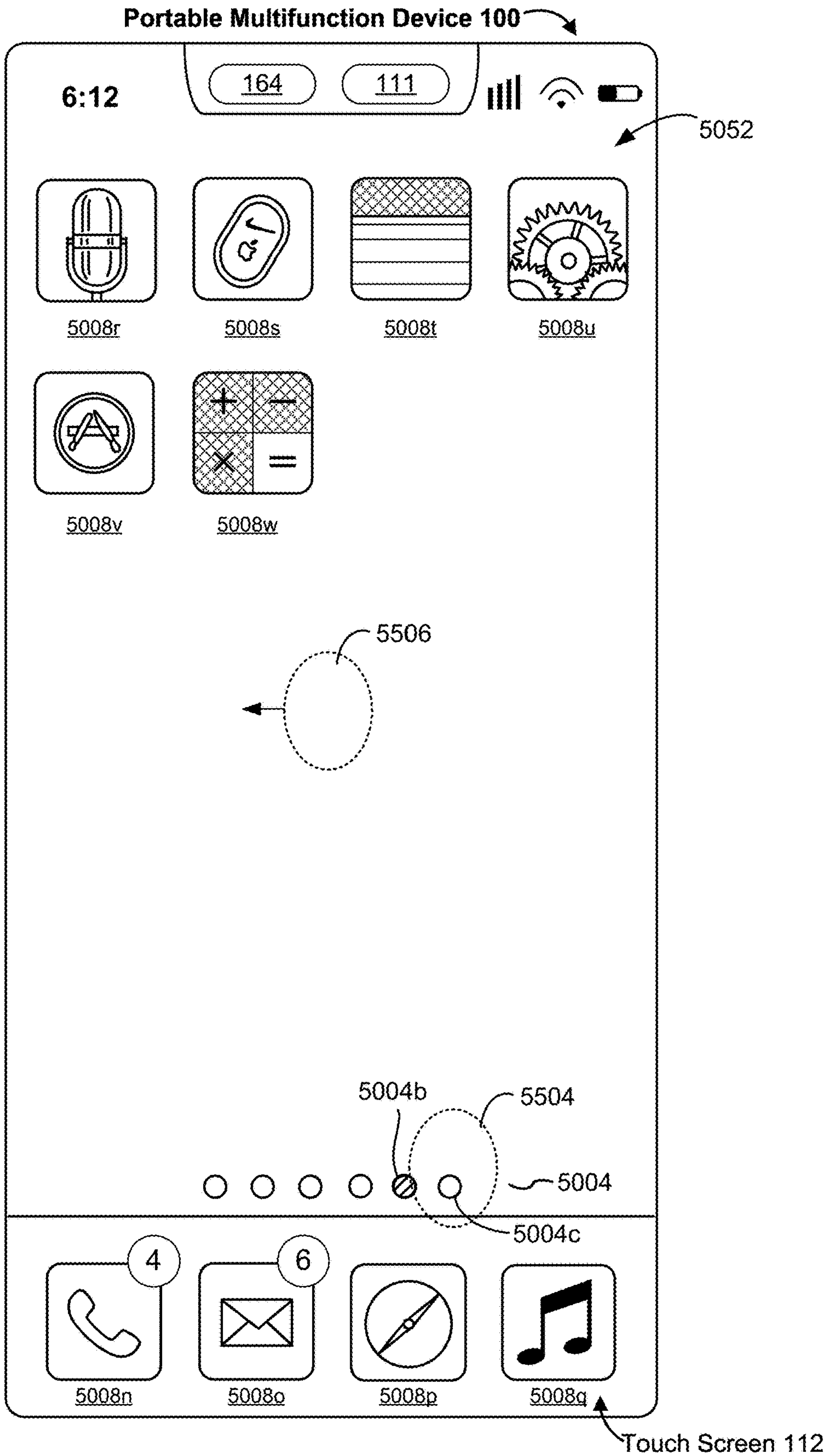
Figure 5A3

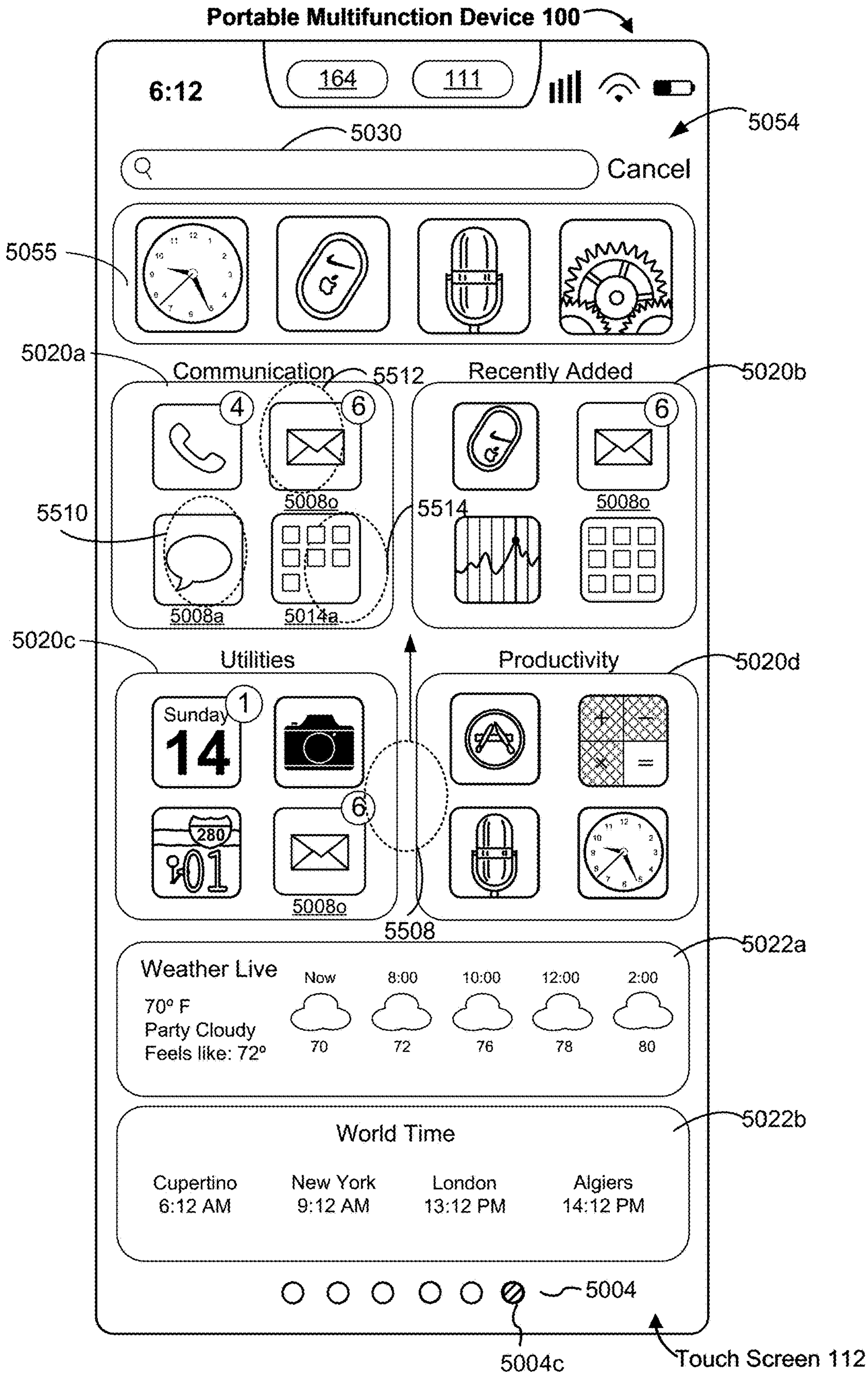
Figure 5A4

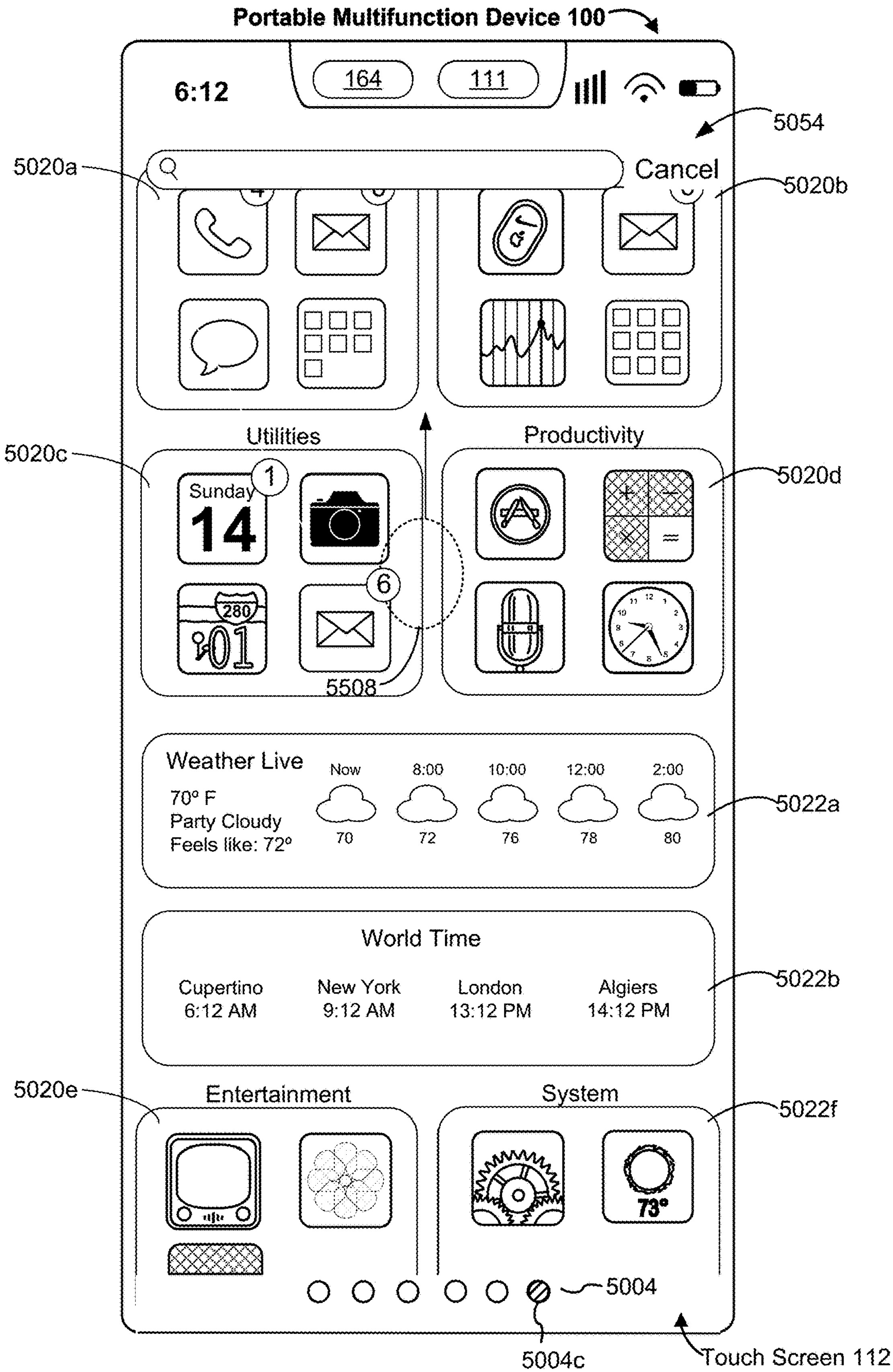
Figure 5A5

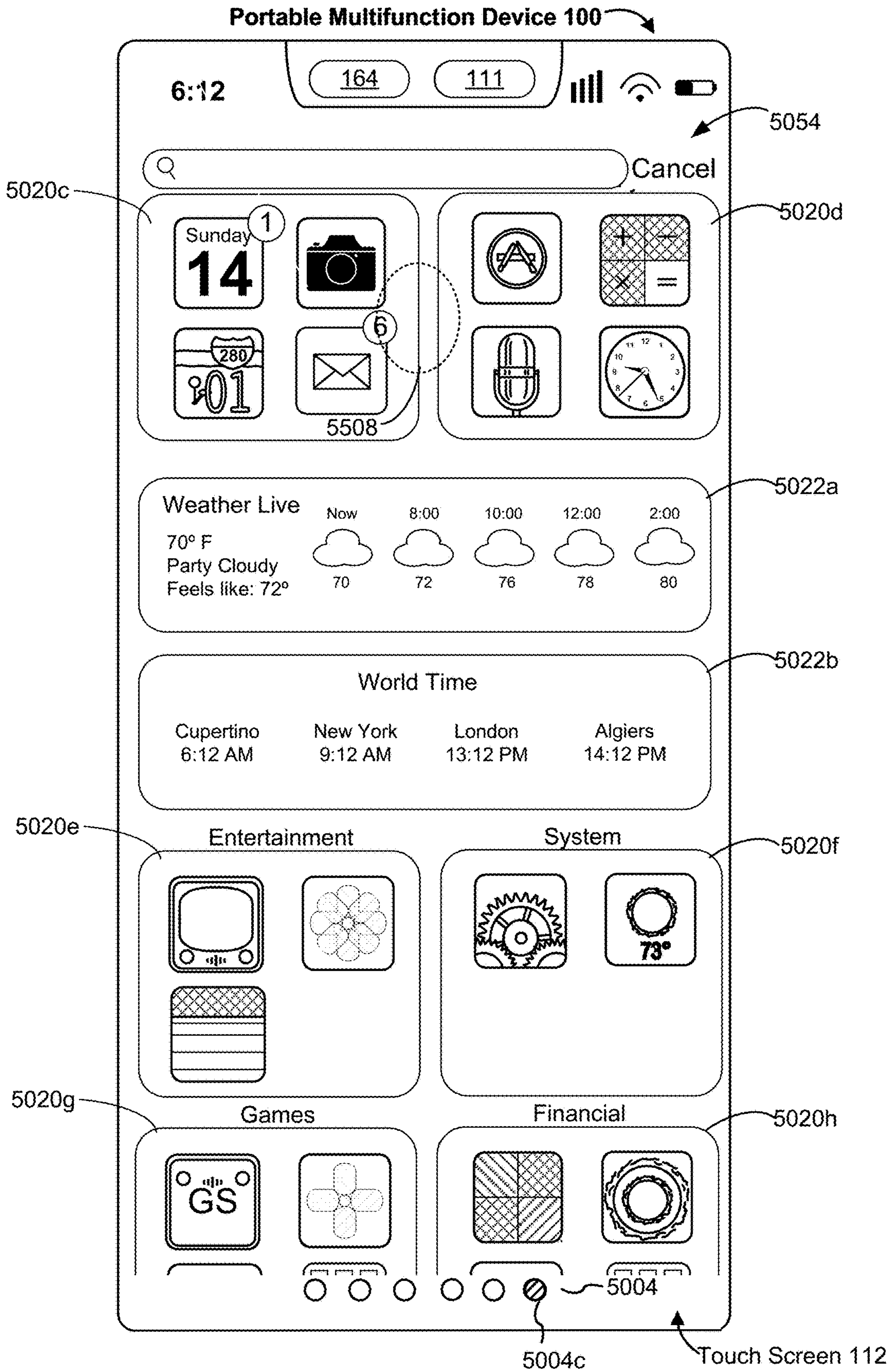
Figure 5A6

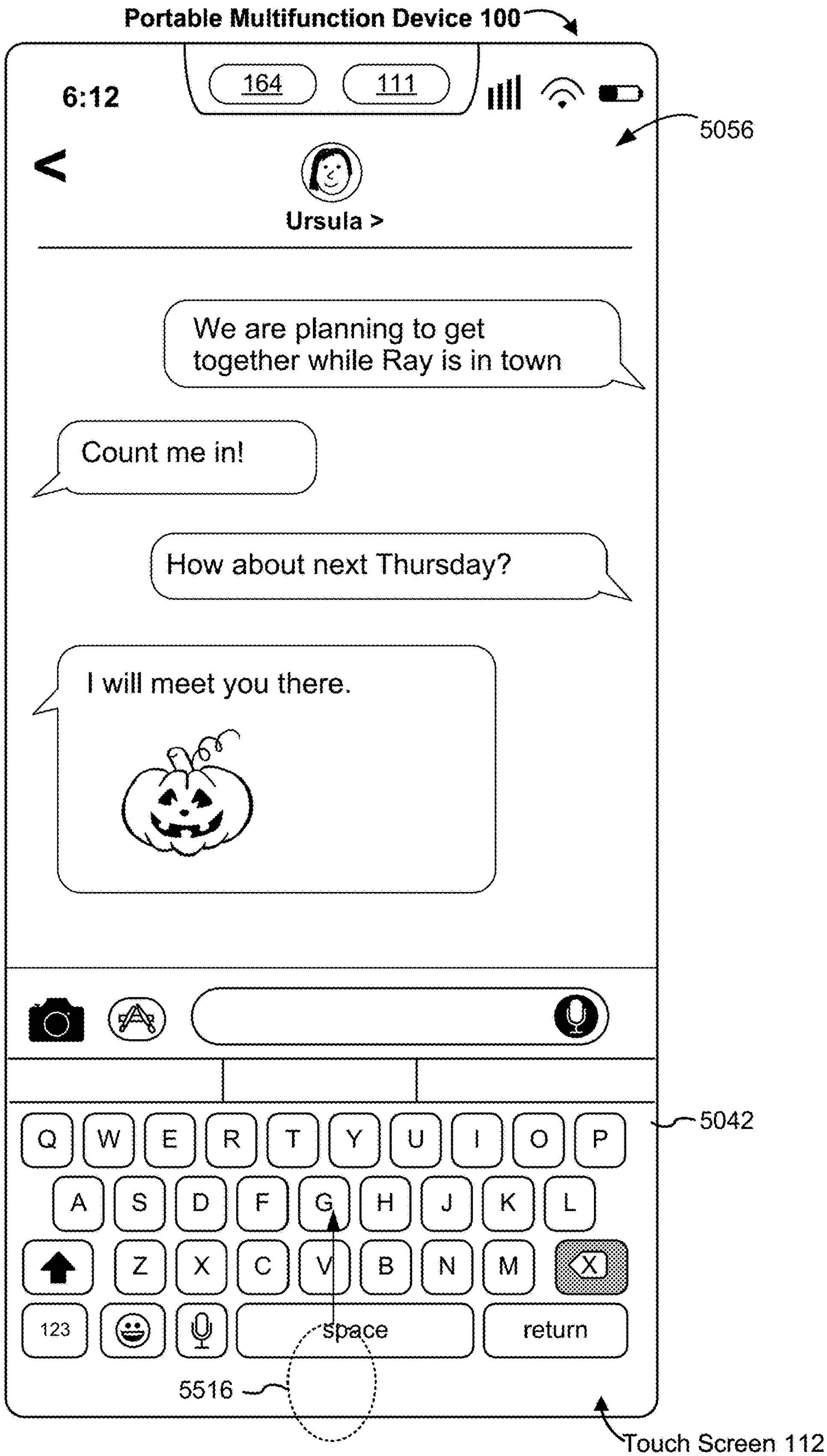
Figure 5A7

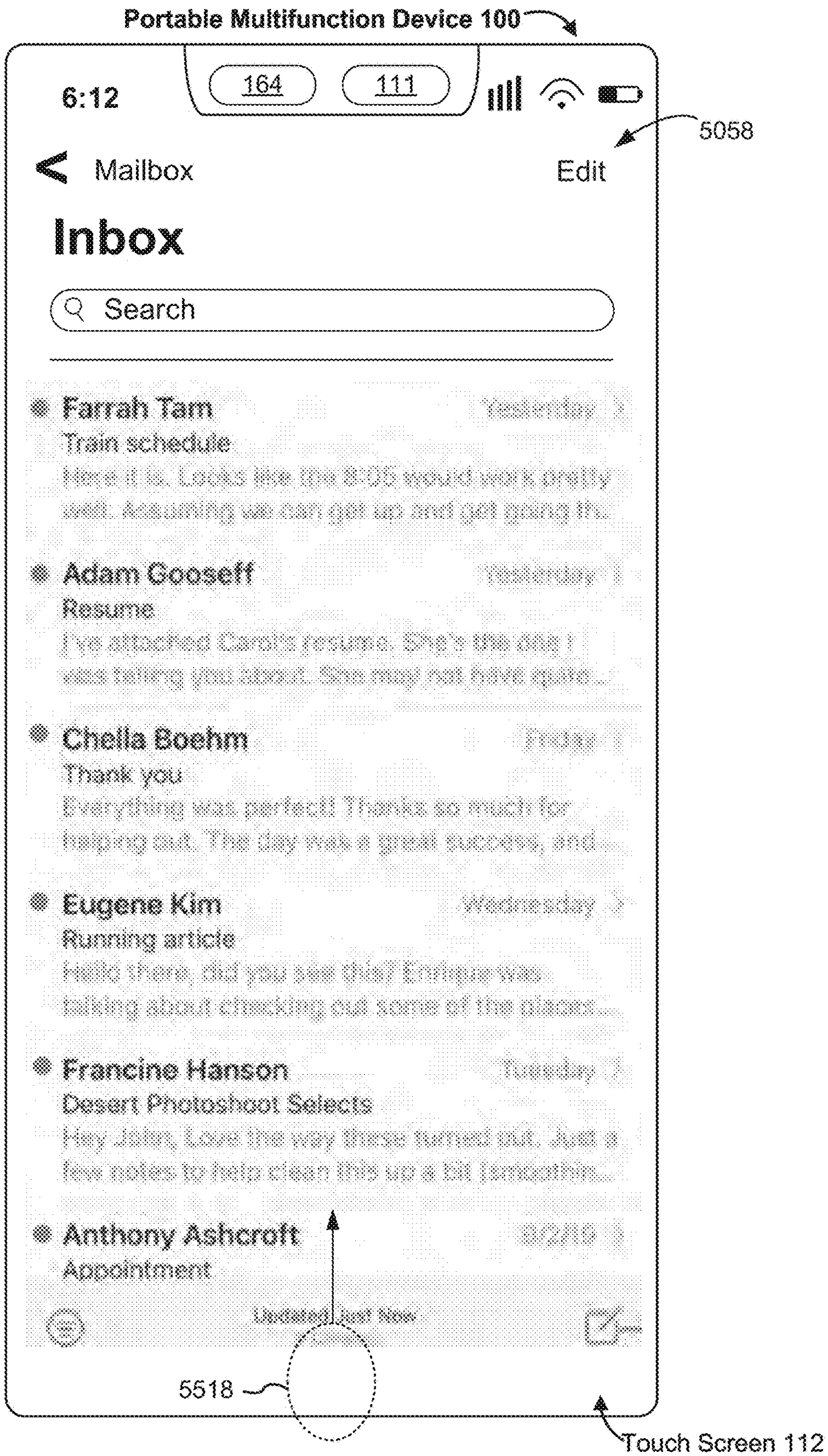
Figure 5A8

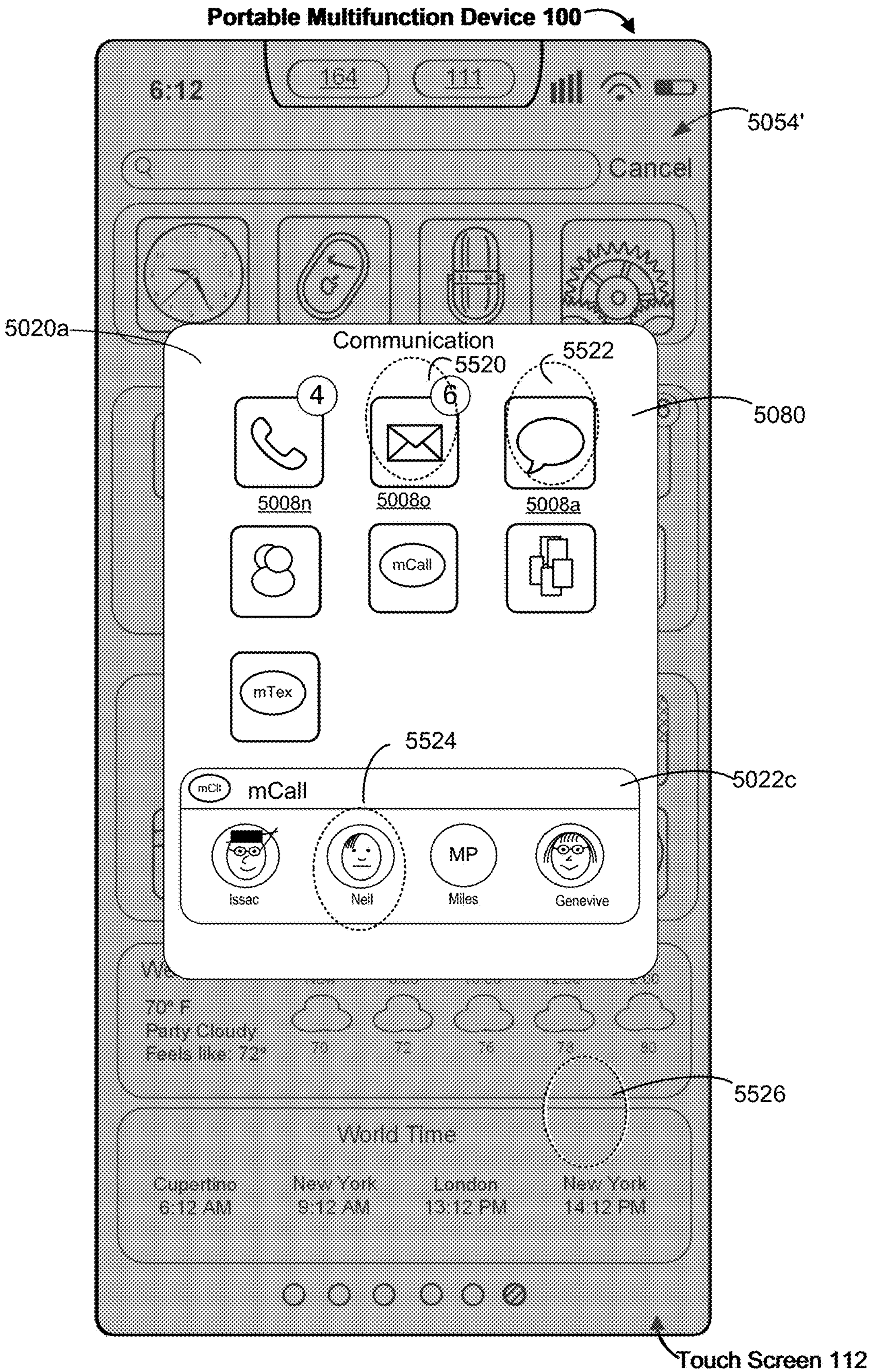
Figure 5A9

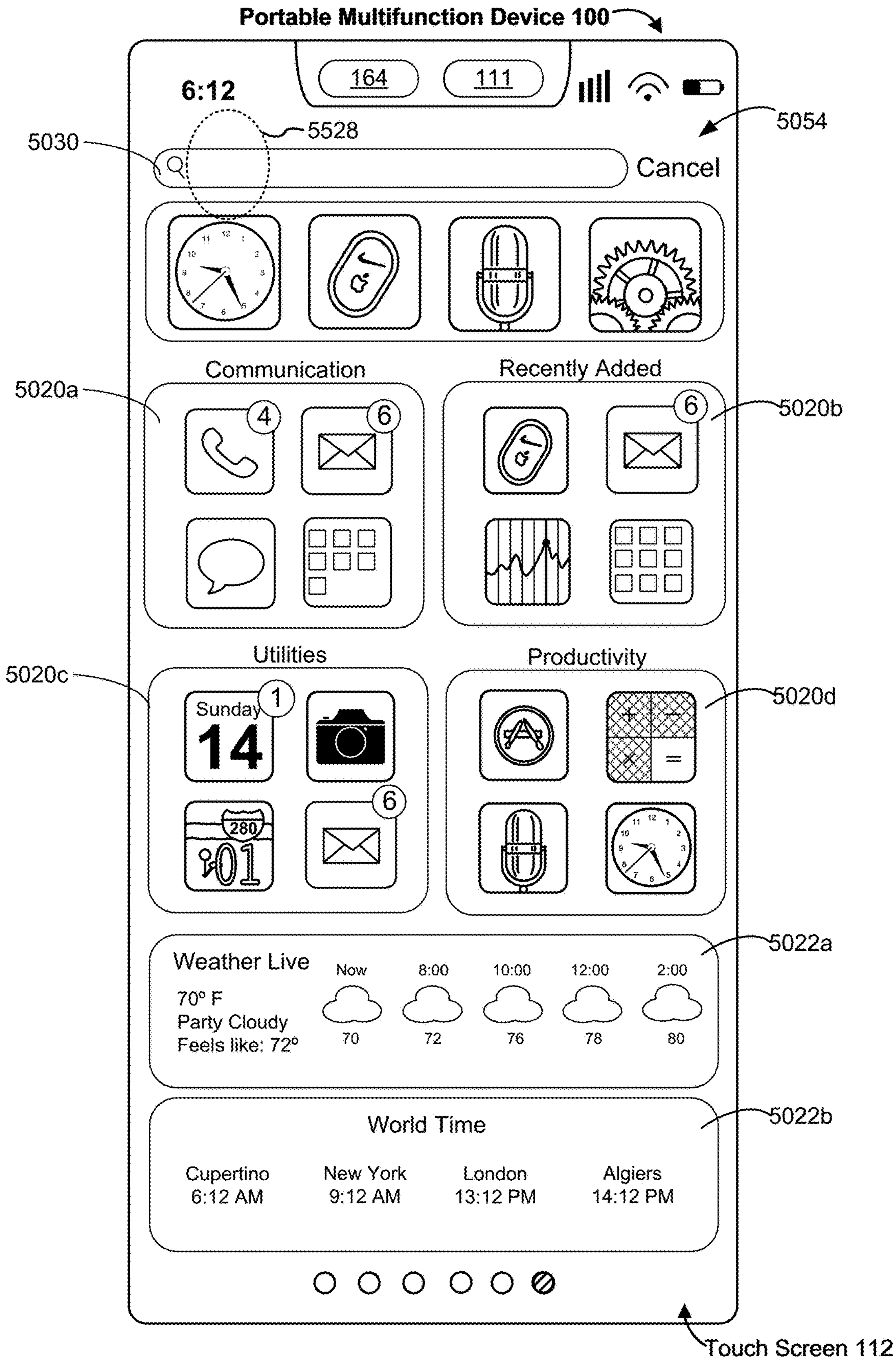
Figure 5A10

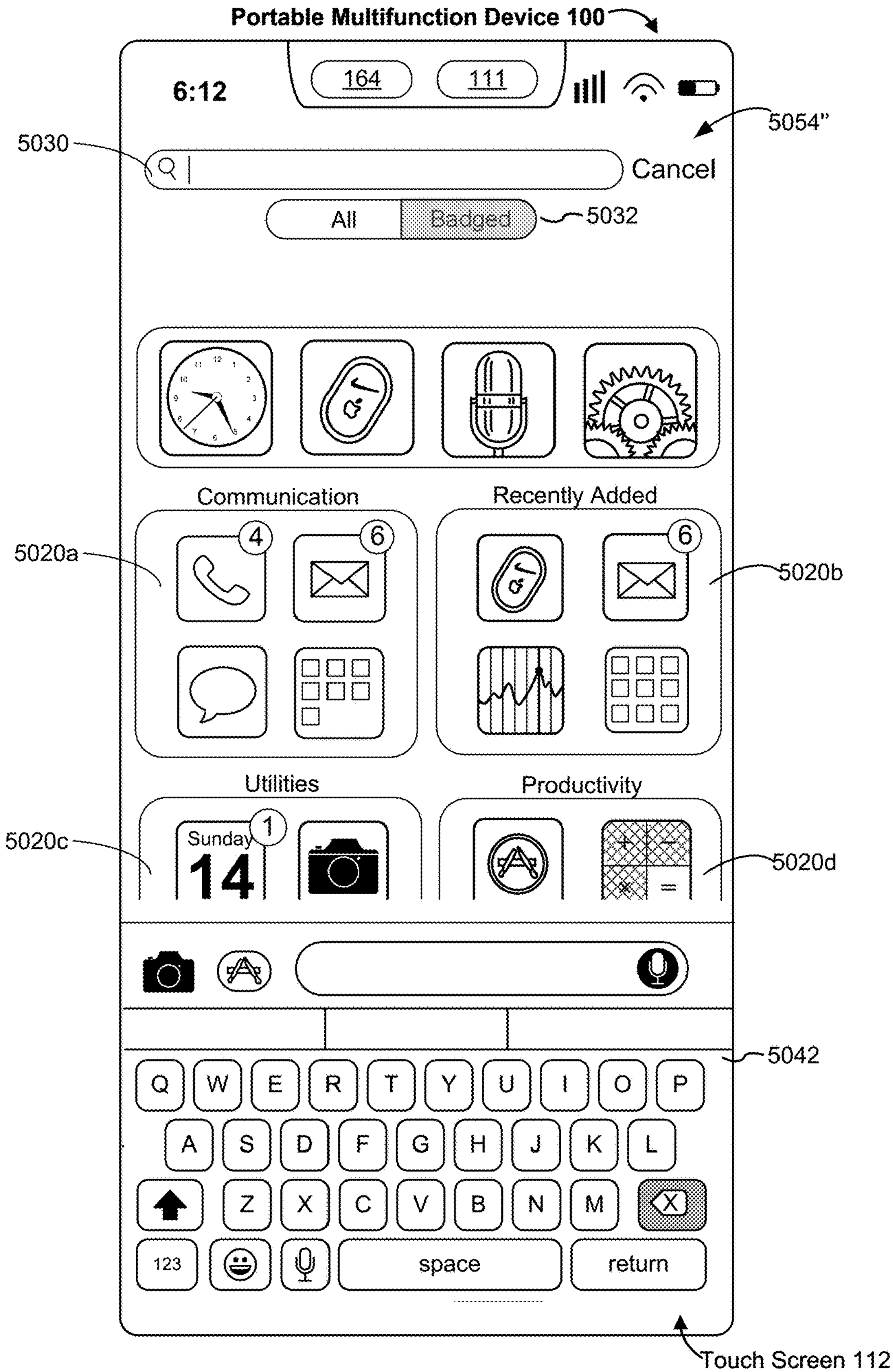
Figure 5A11

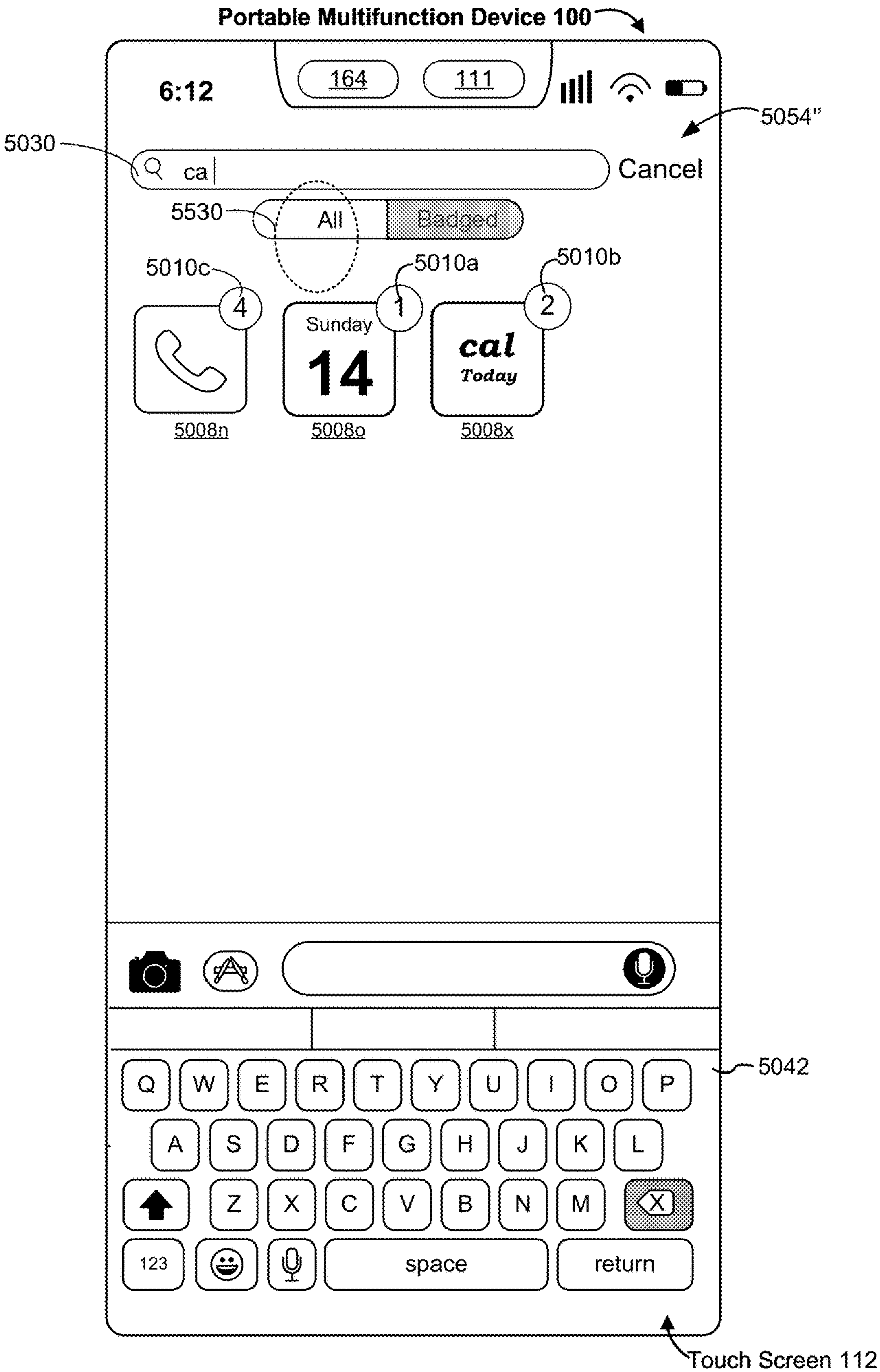
Figure 5A12

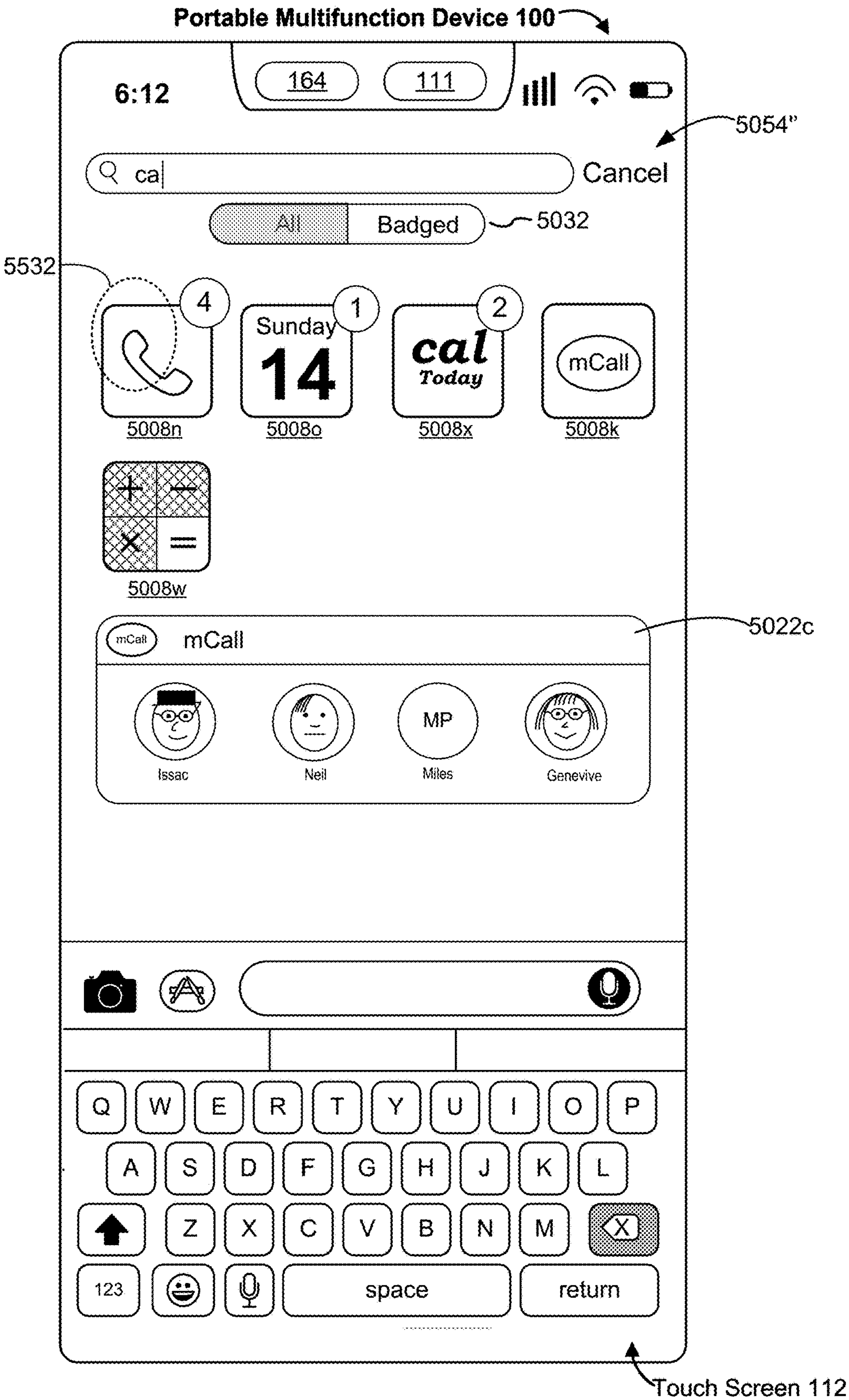
Figure 5A13

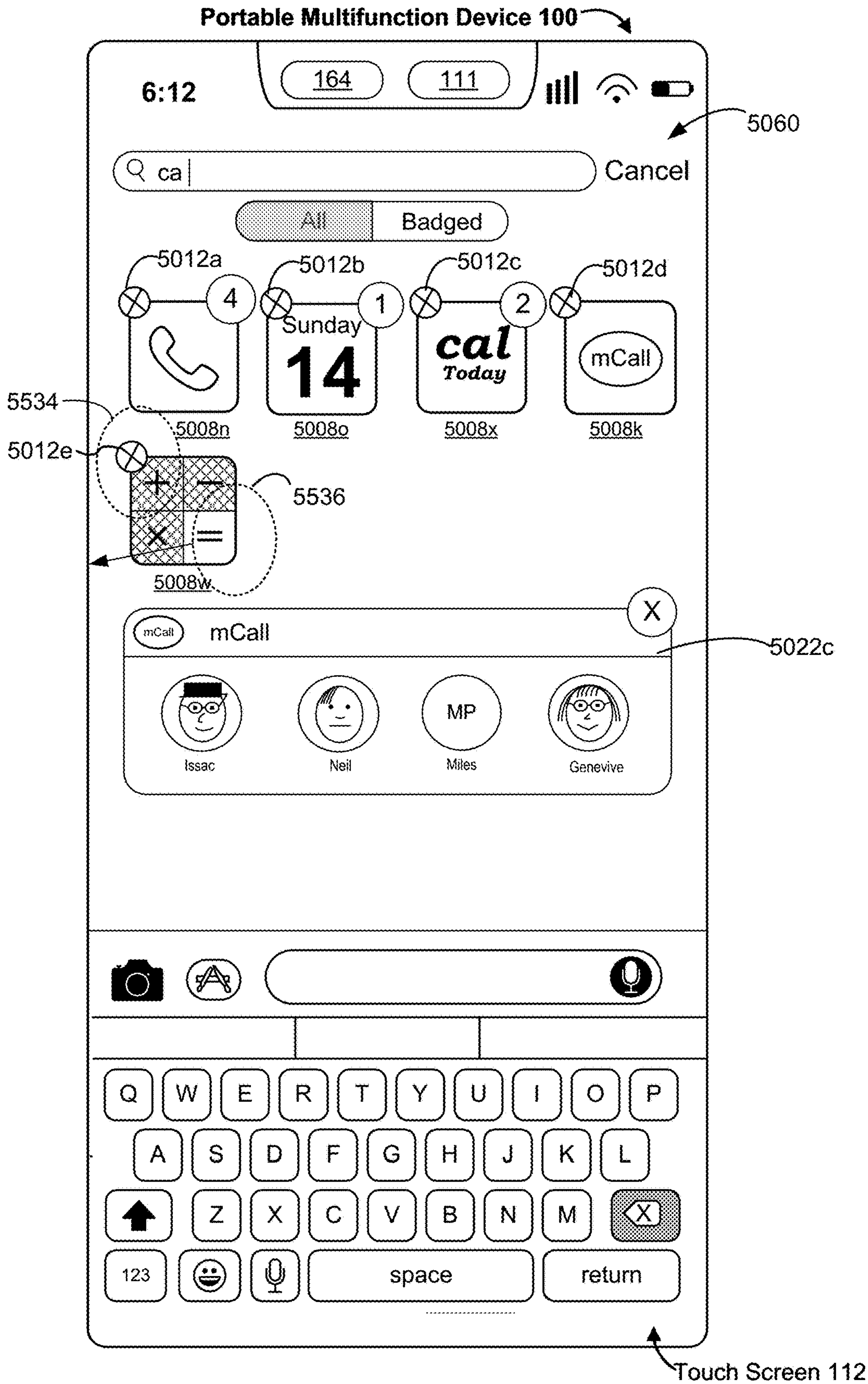
Figure 5A14

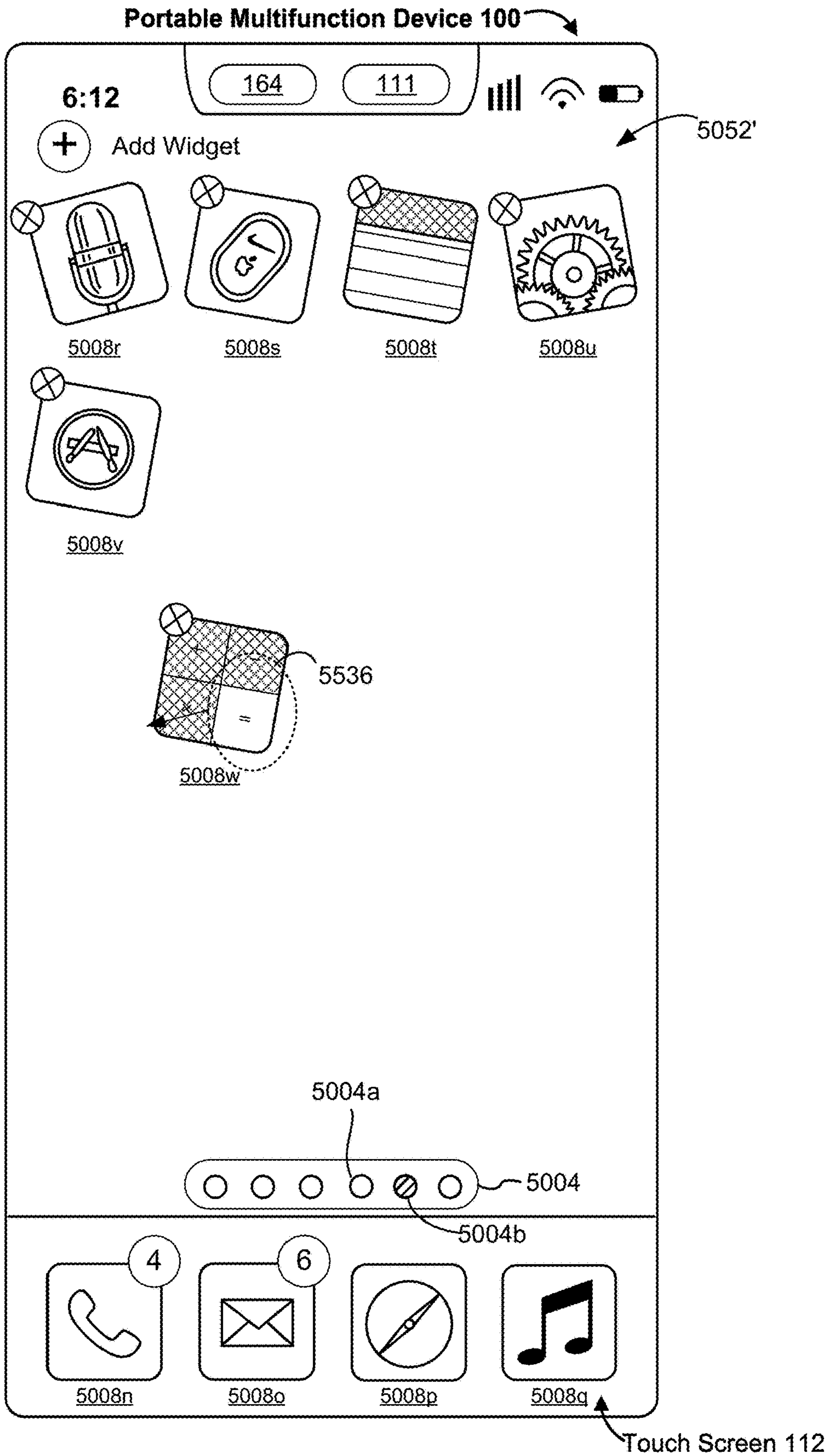
Figure 5A15

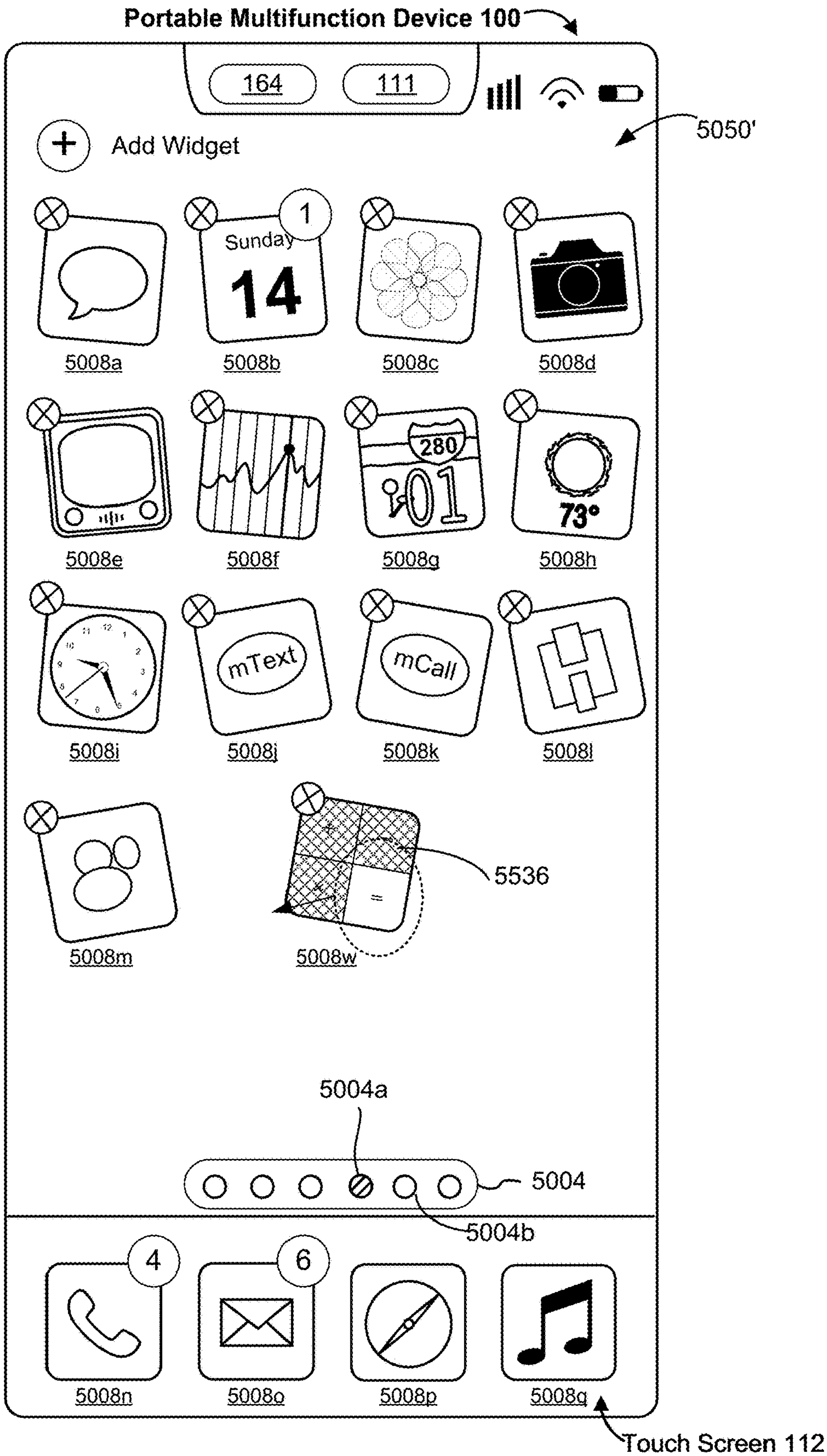
Figure 5A16

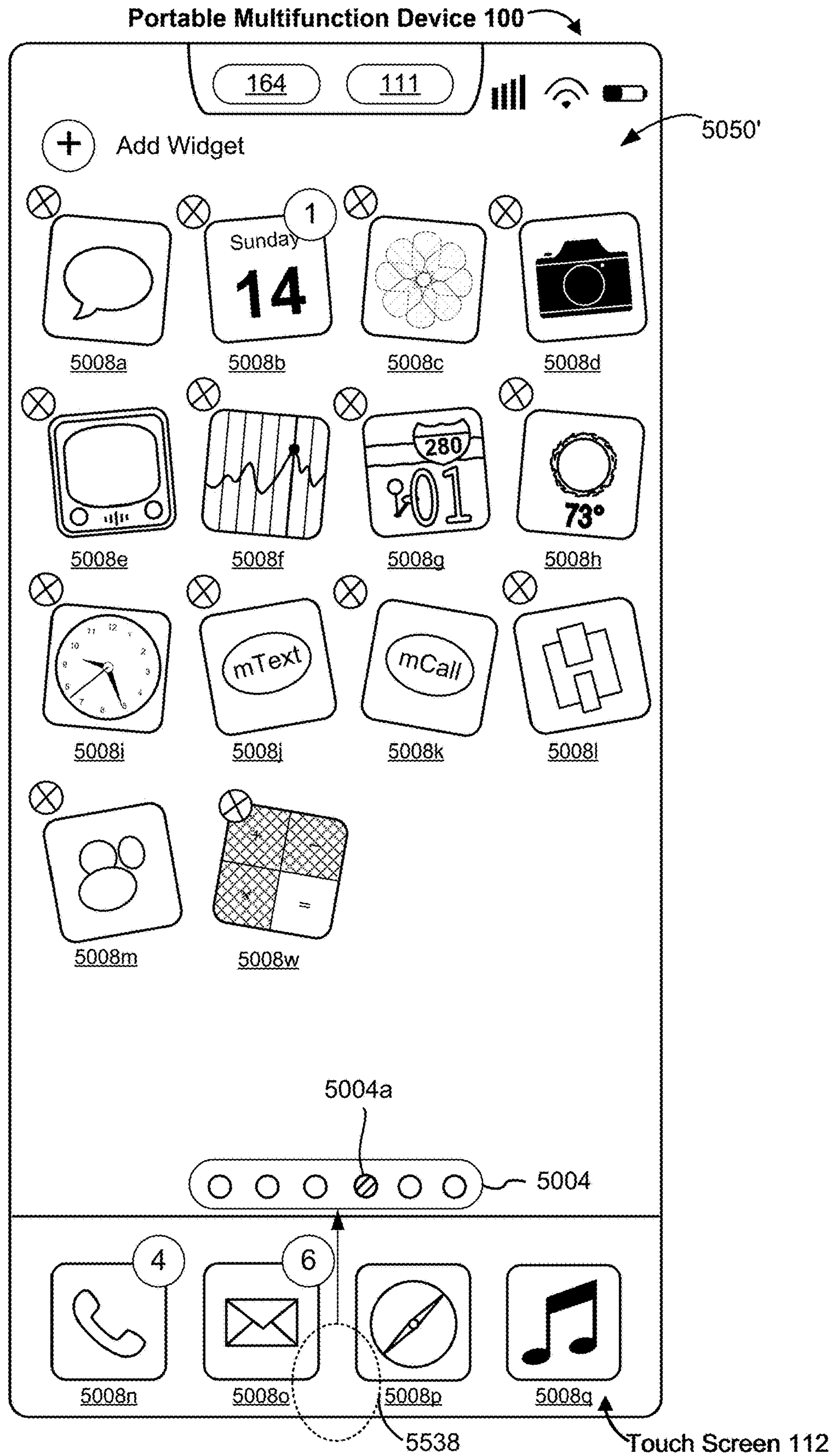
Figure 5A17

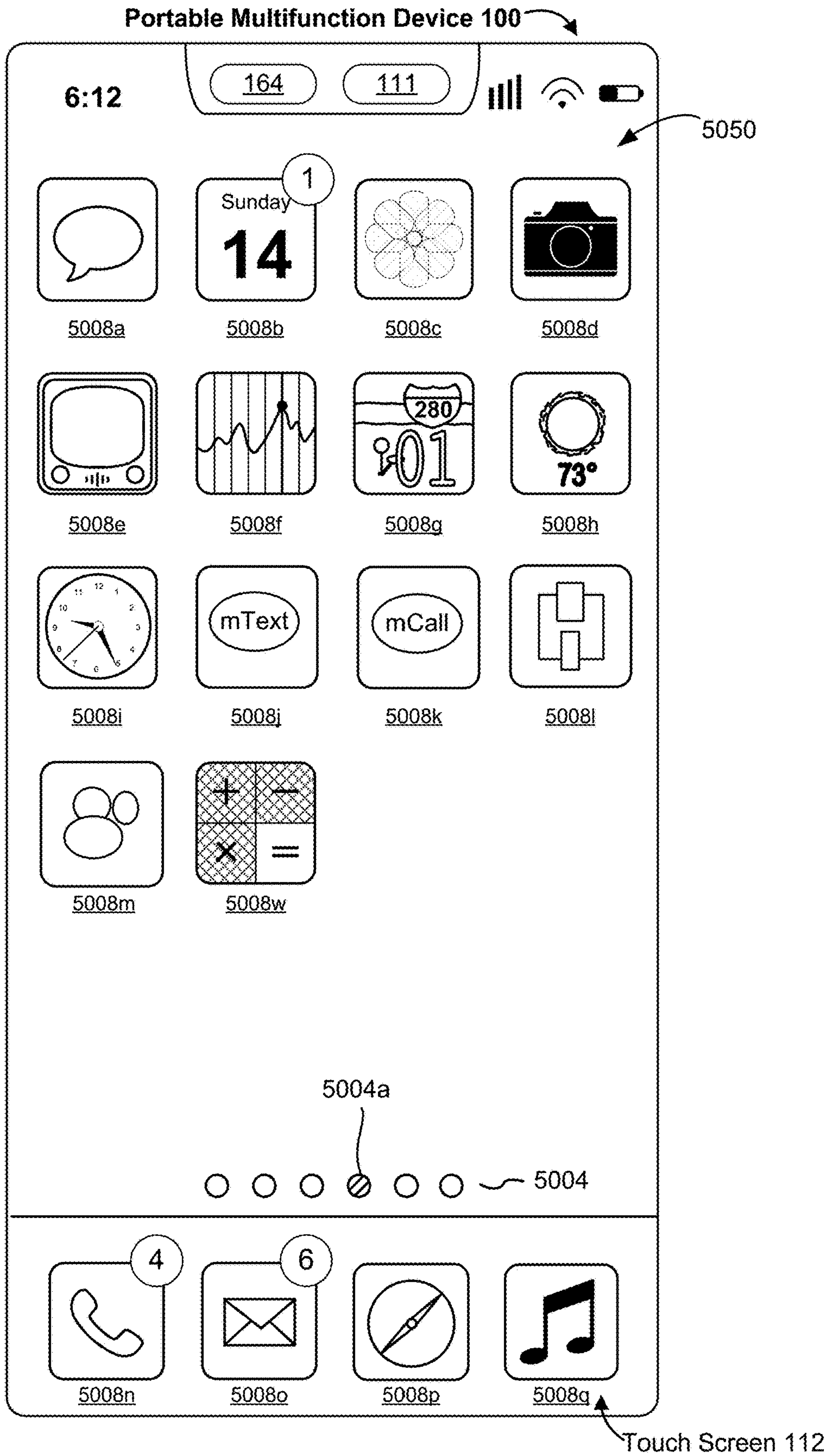
Figure 5A18

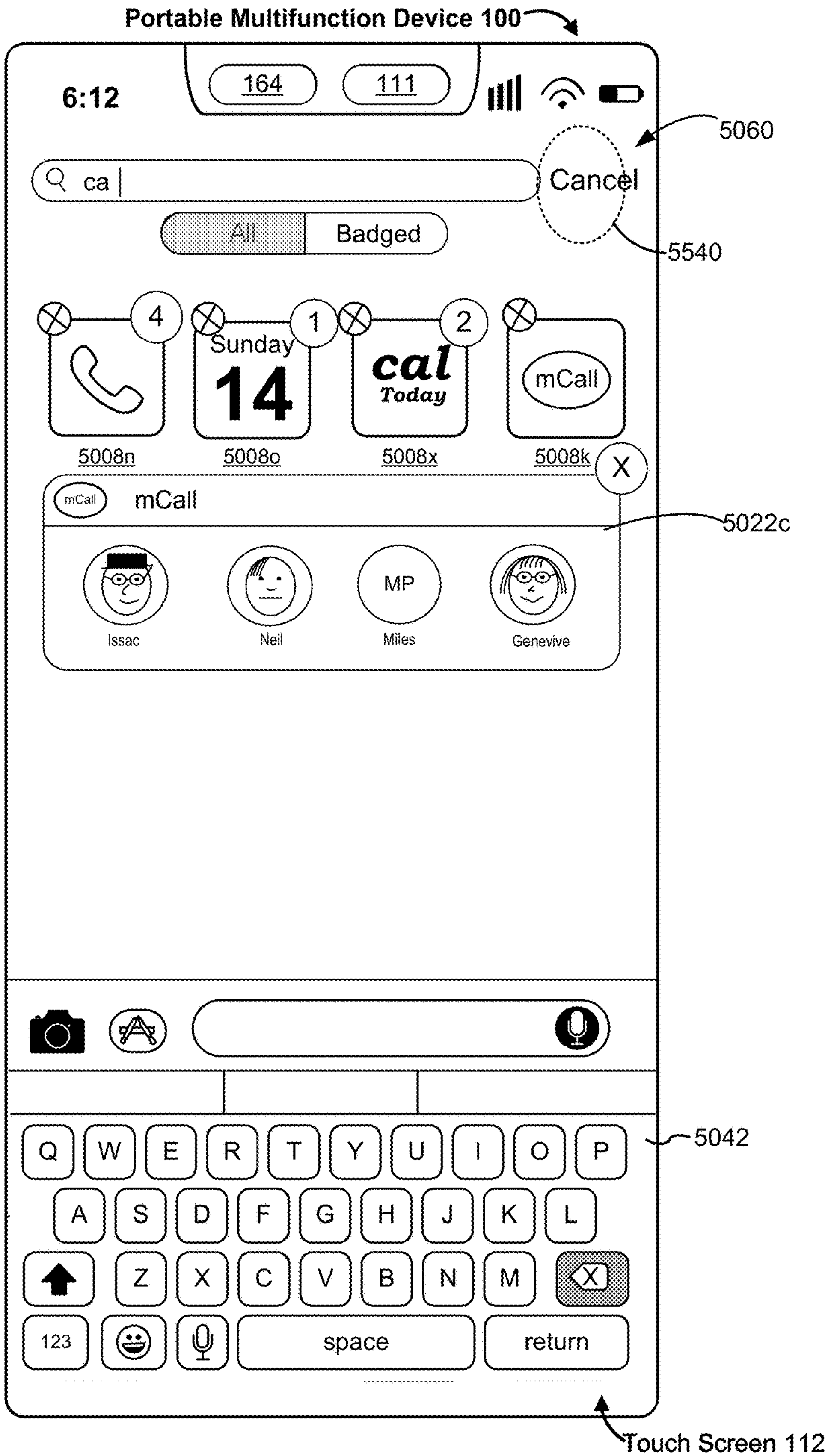
Figure 5A19

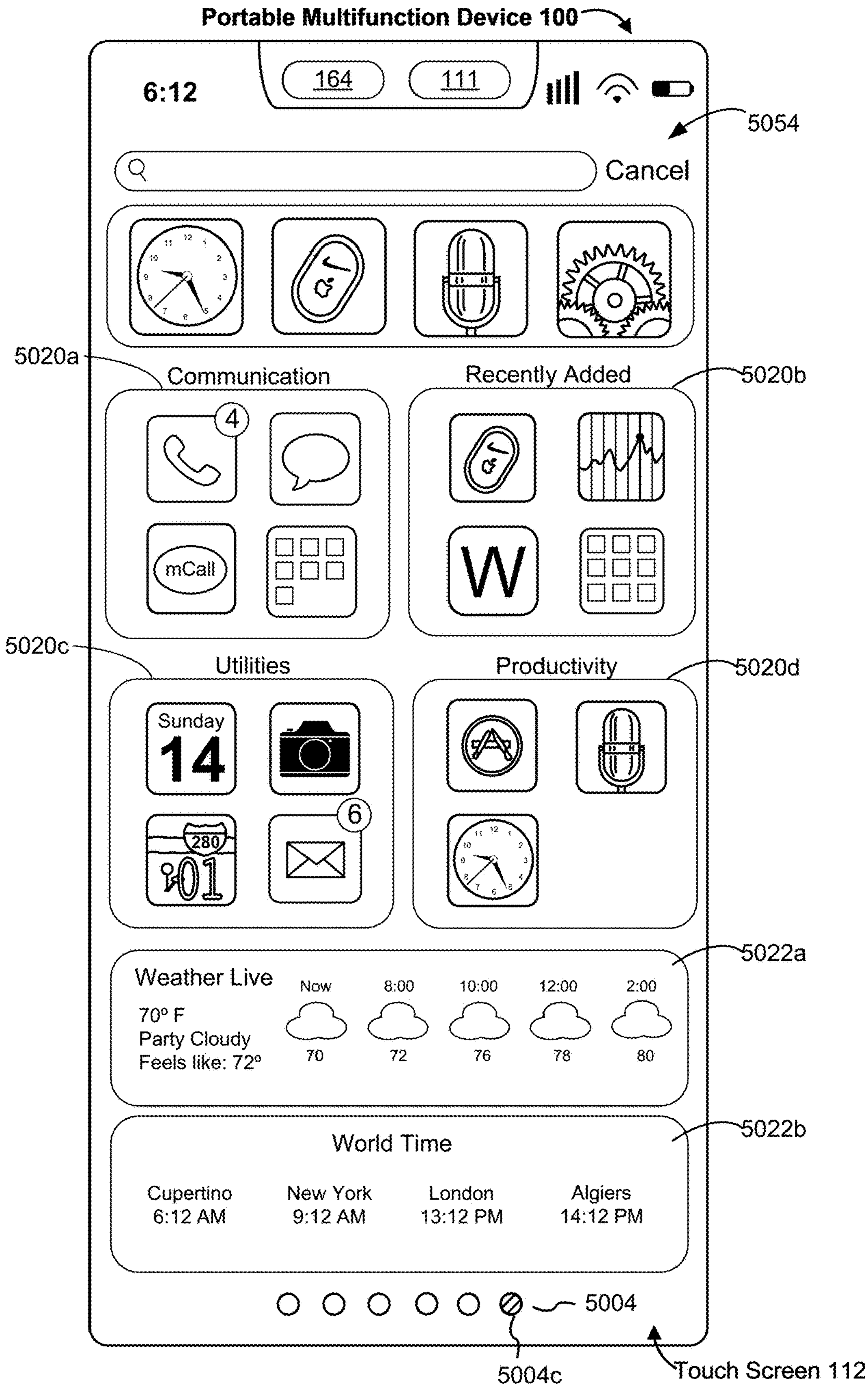
Figure 5A20

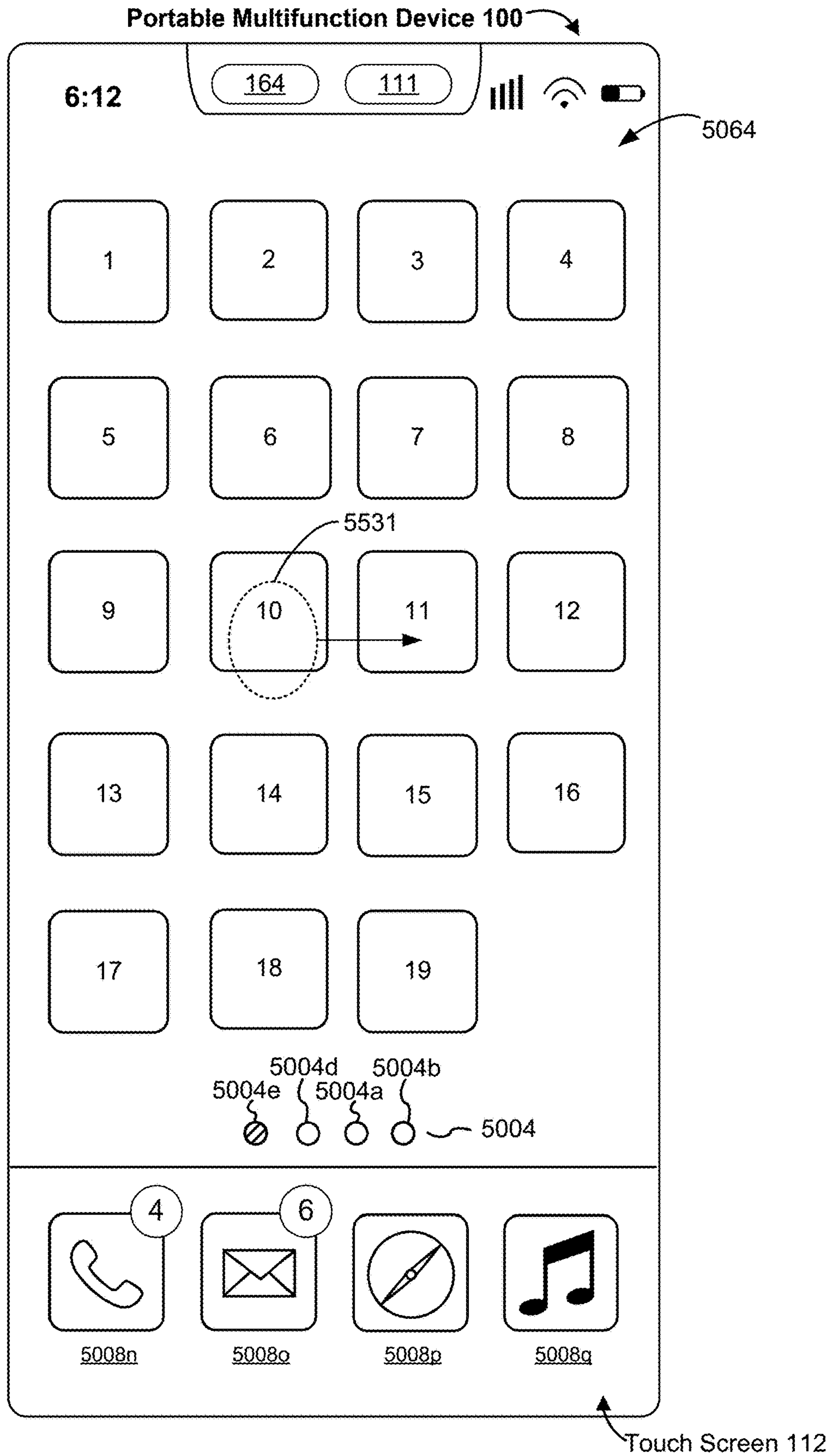
Figure 5A21

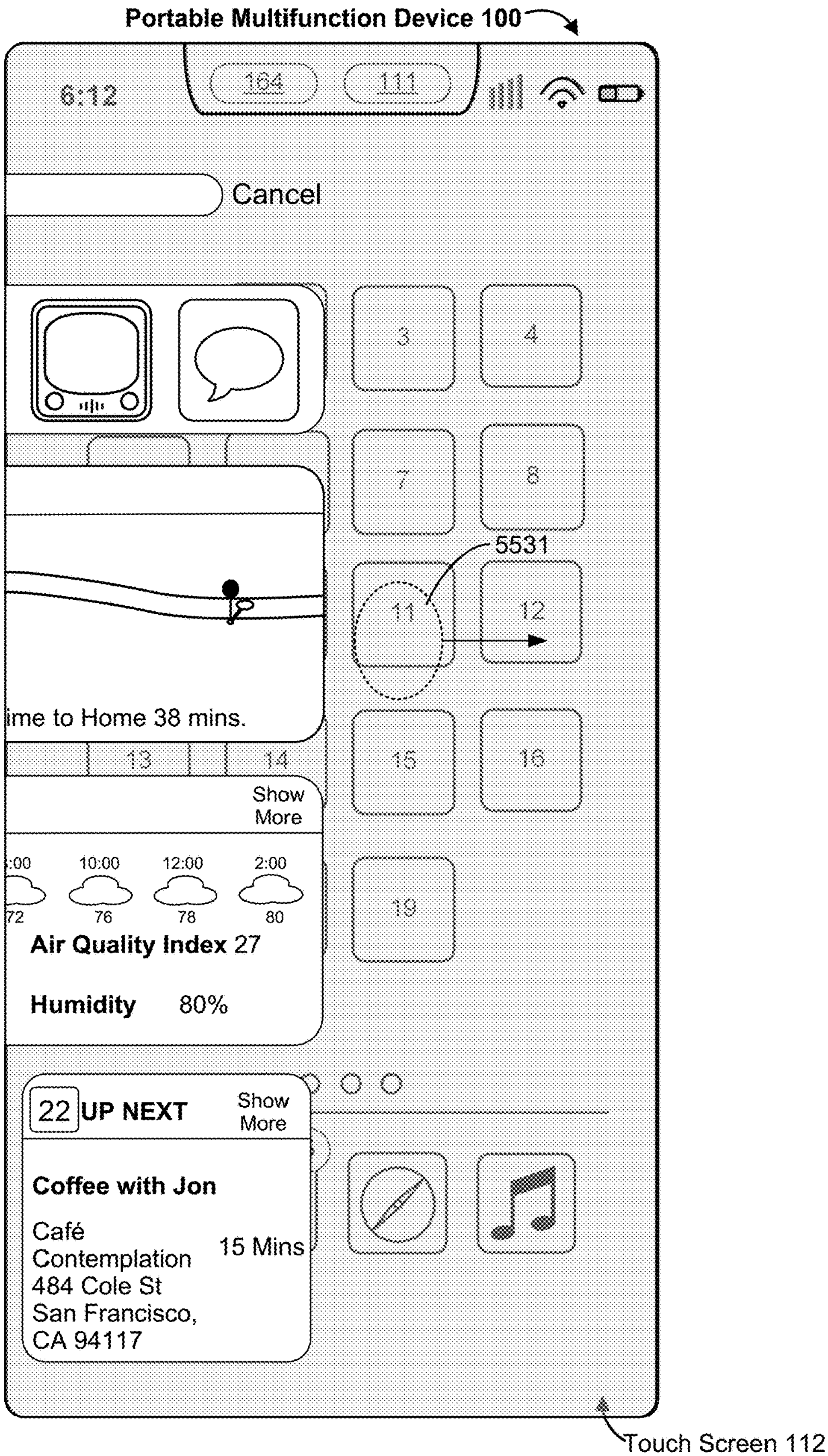
Figure 5A22

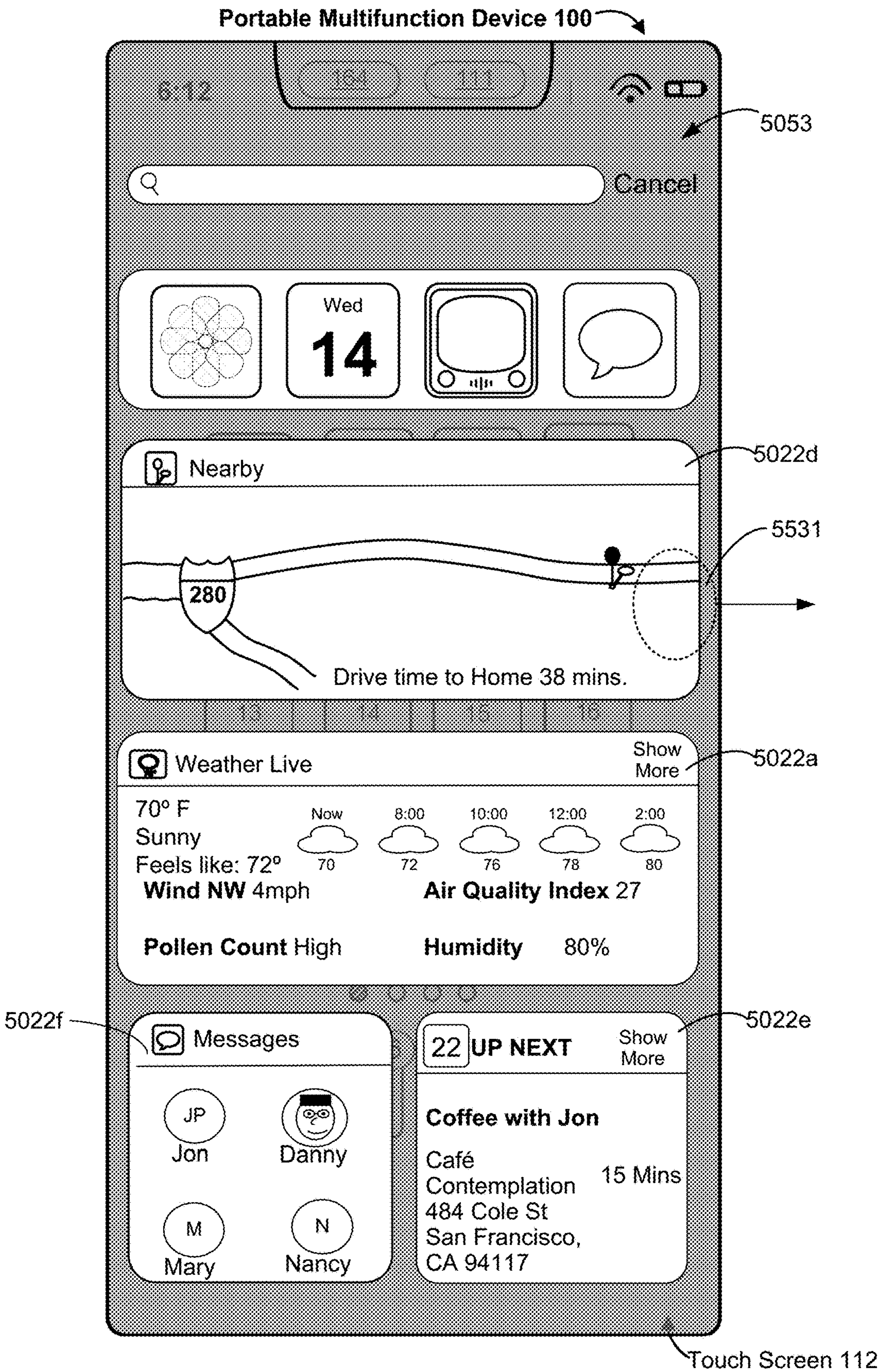
Figure 5A23

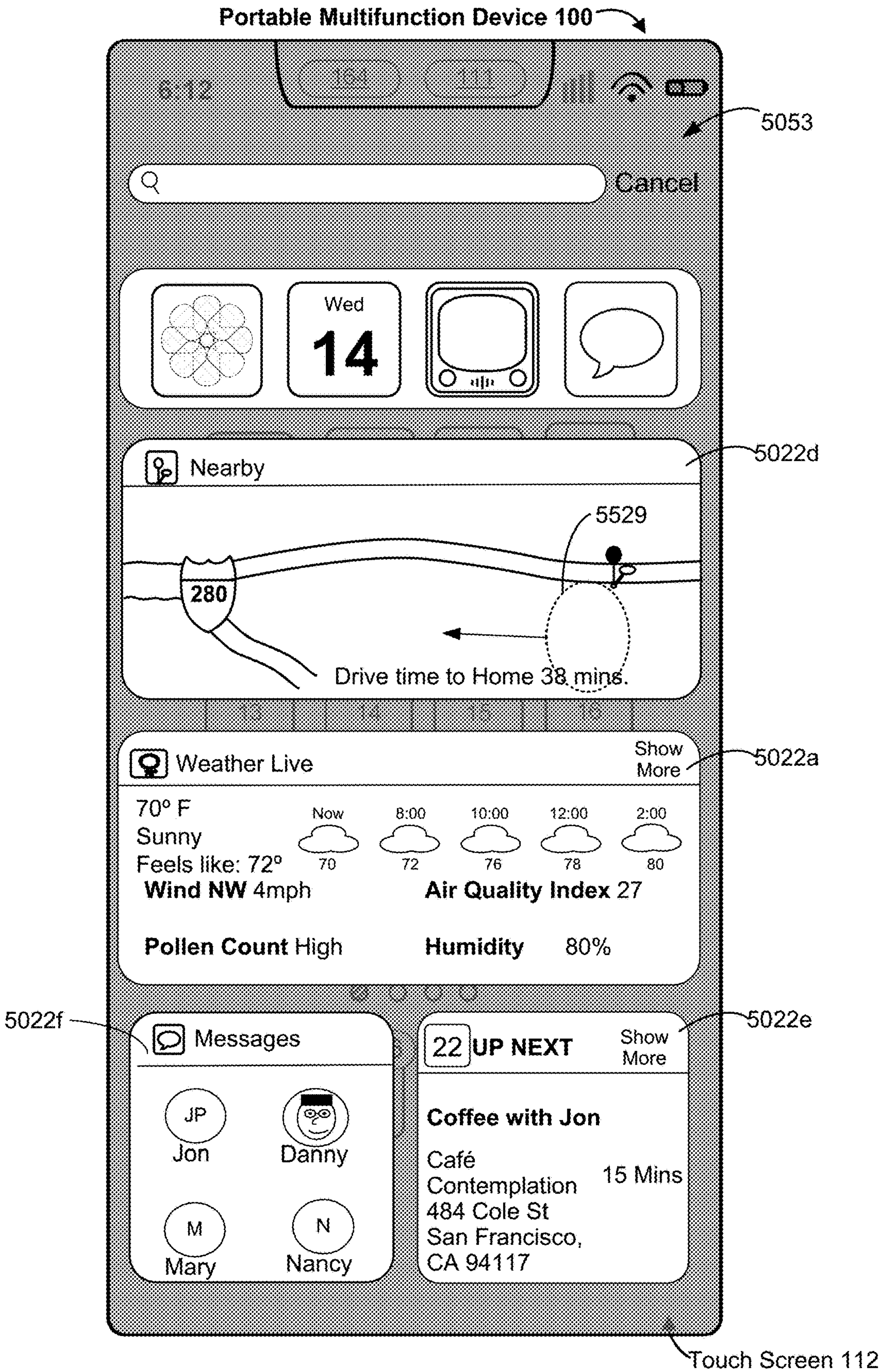
Figure 5A24

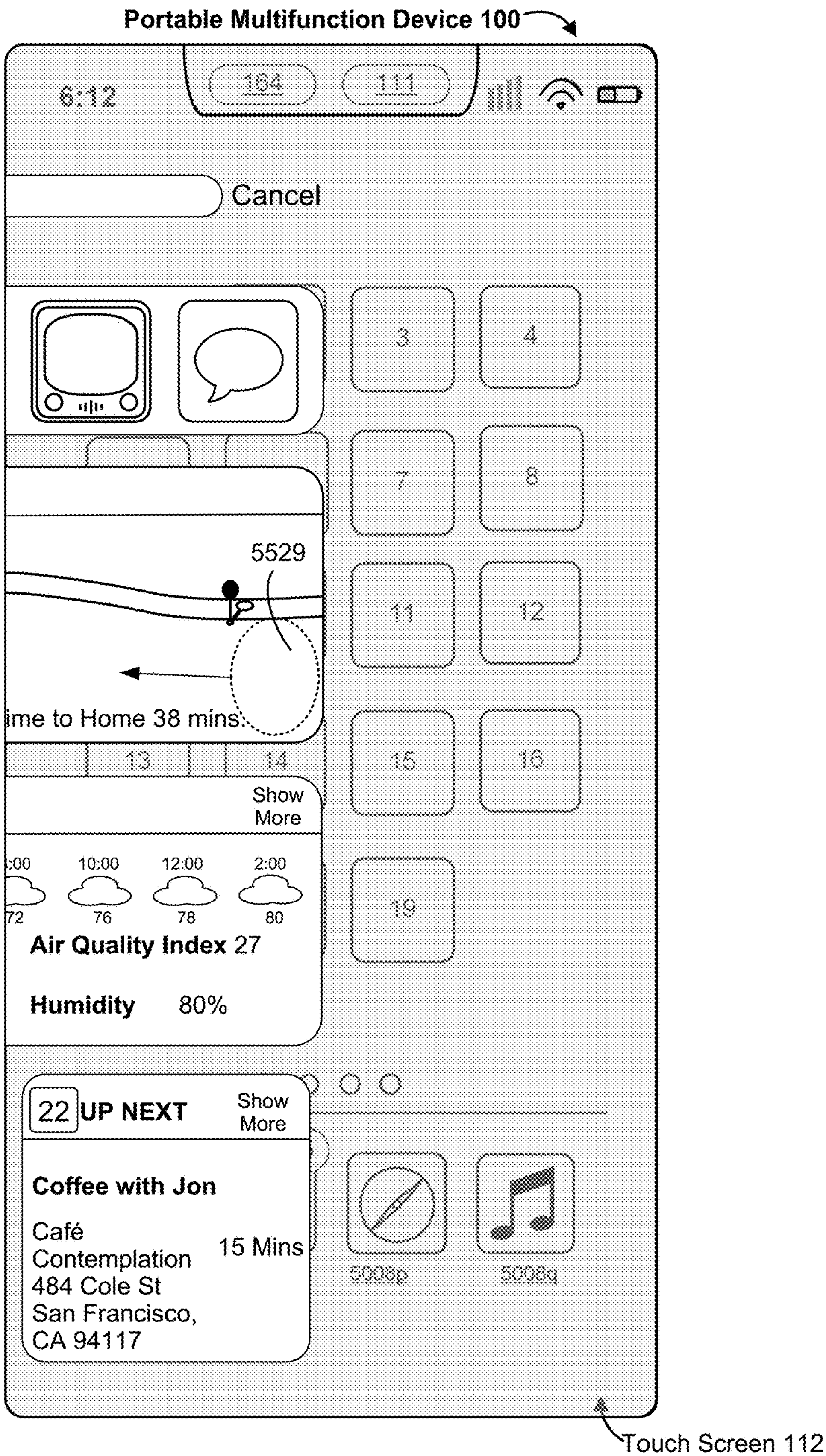
Figure 5A25

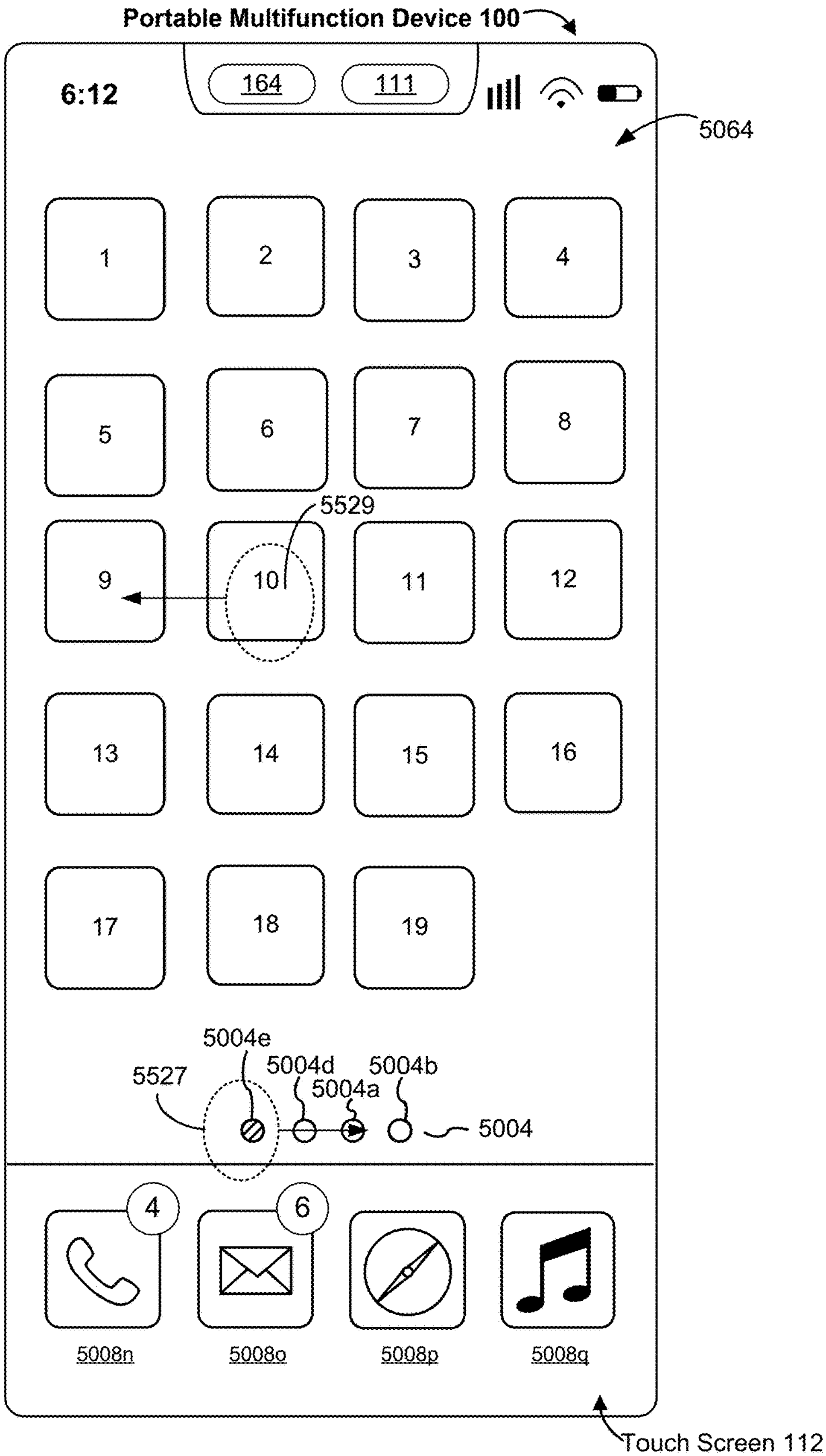
Figure 5A26

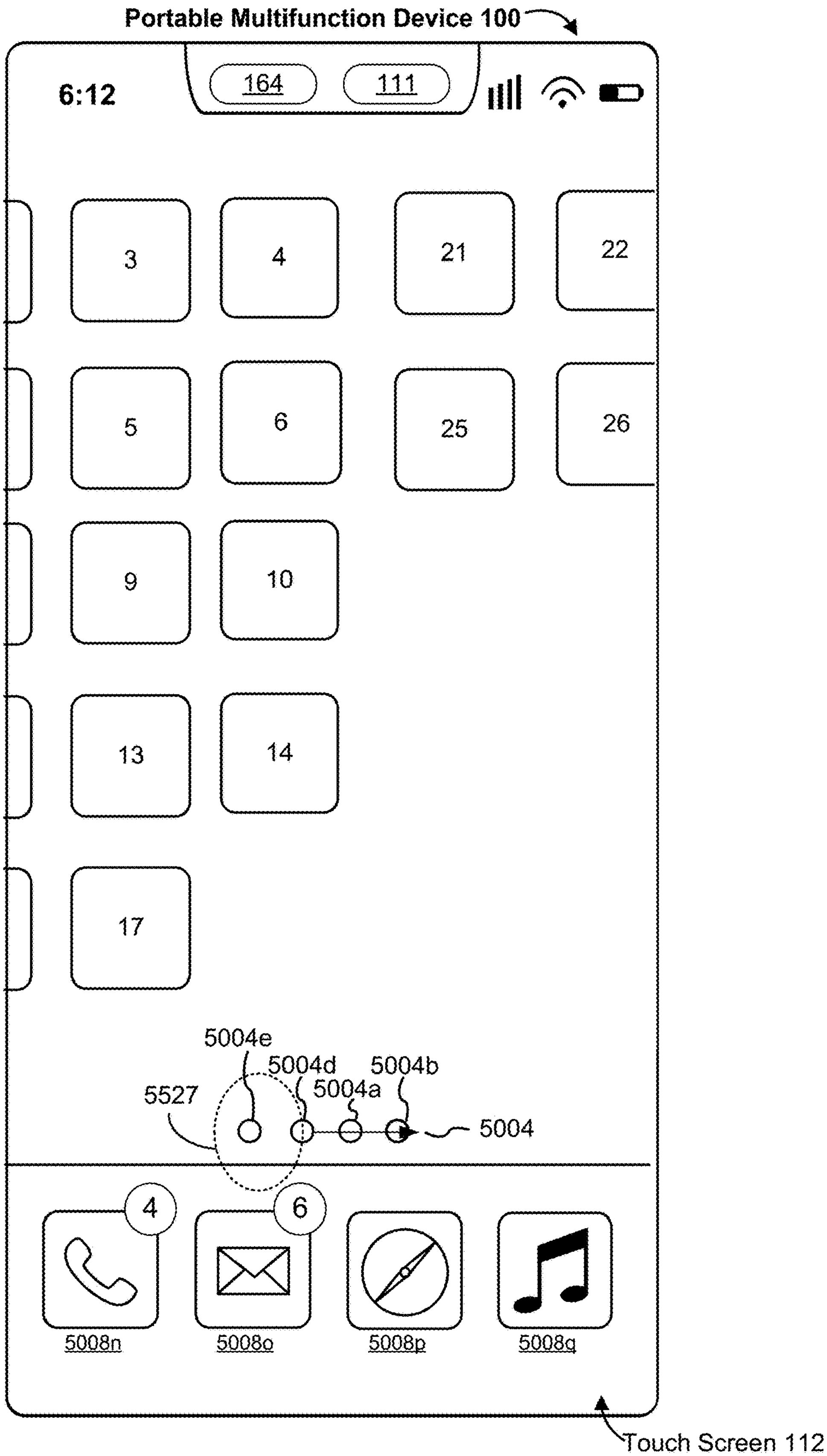
Figure 5A27

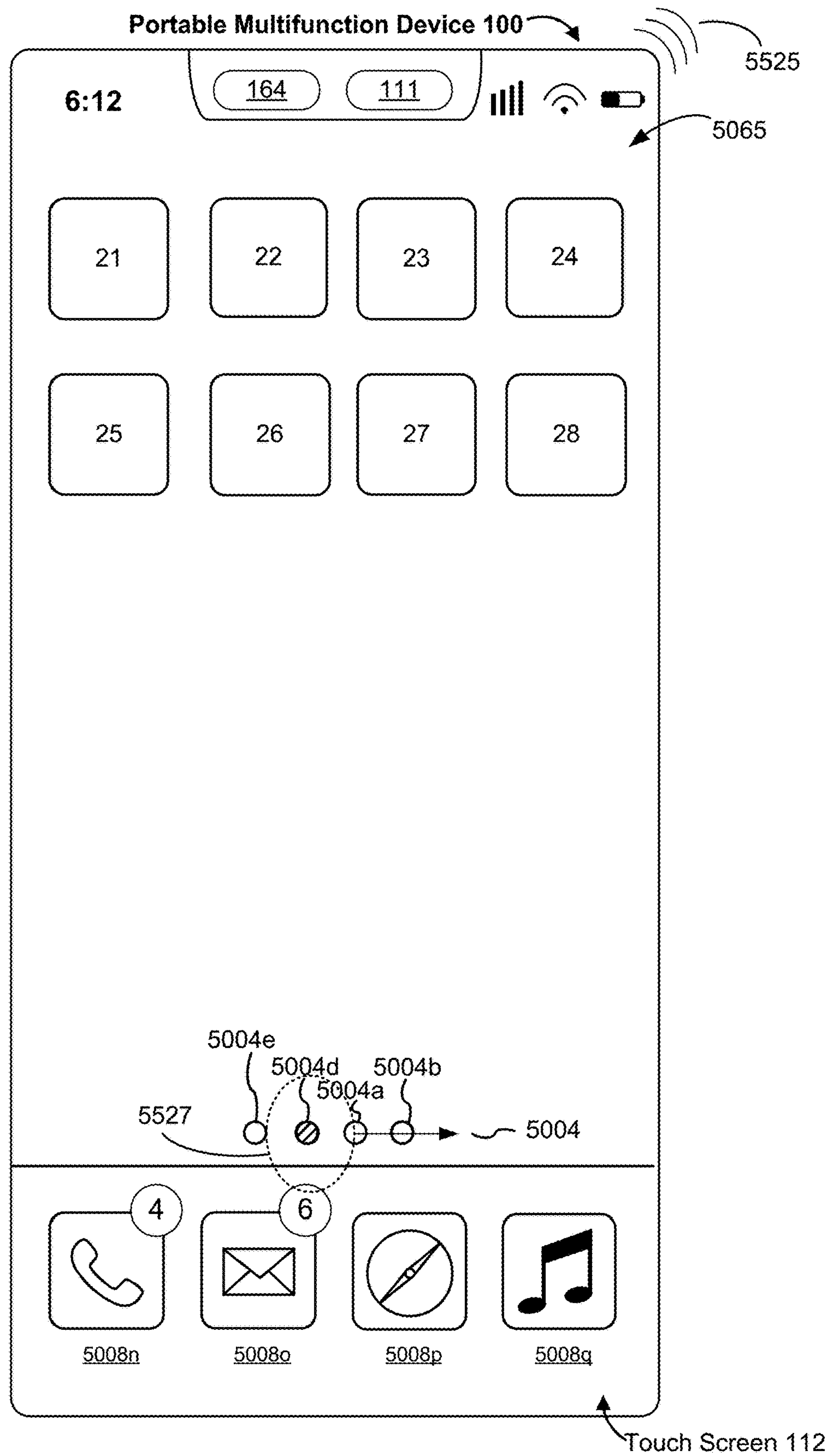
Figure 5A28

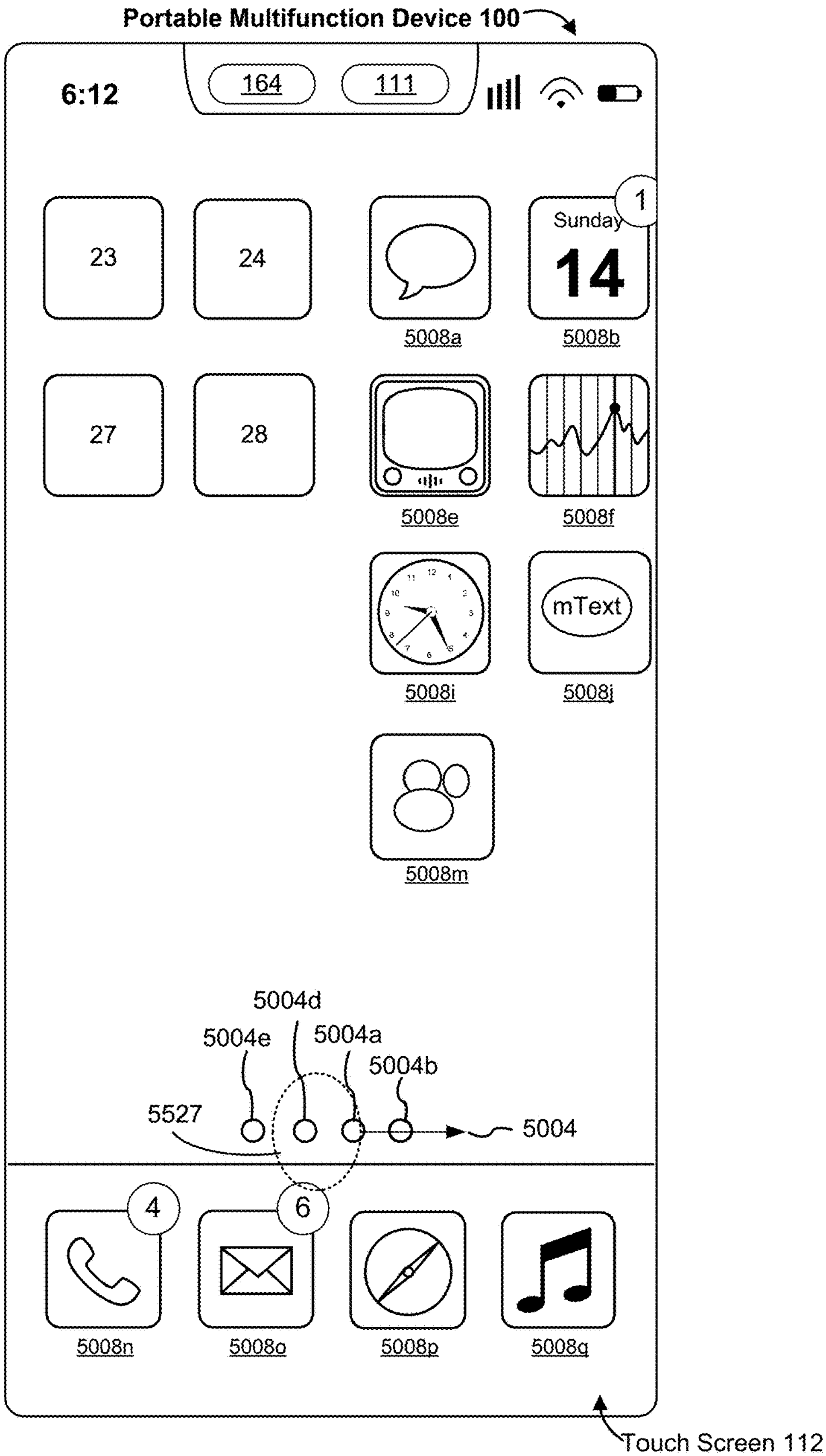
Figure 5A29

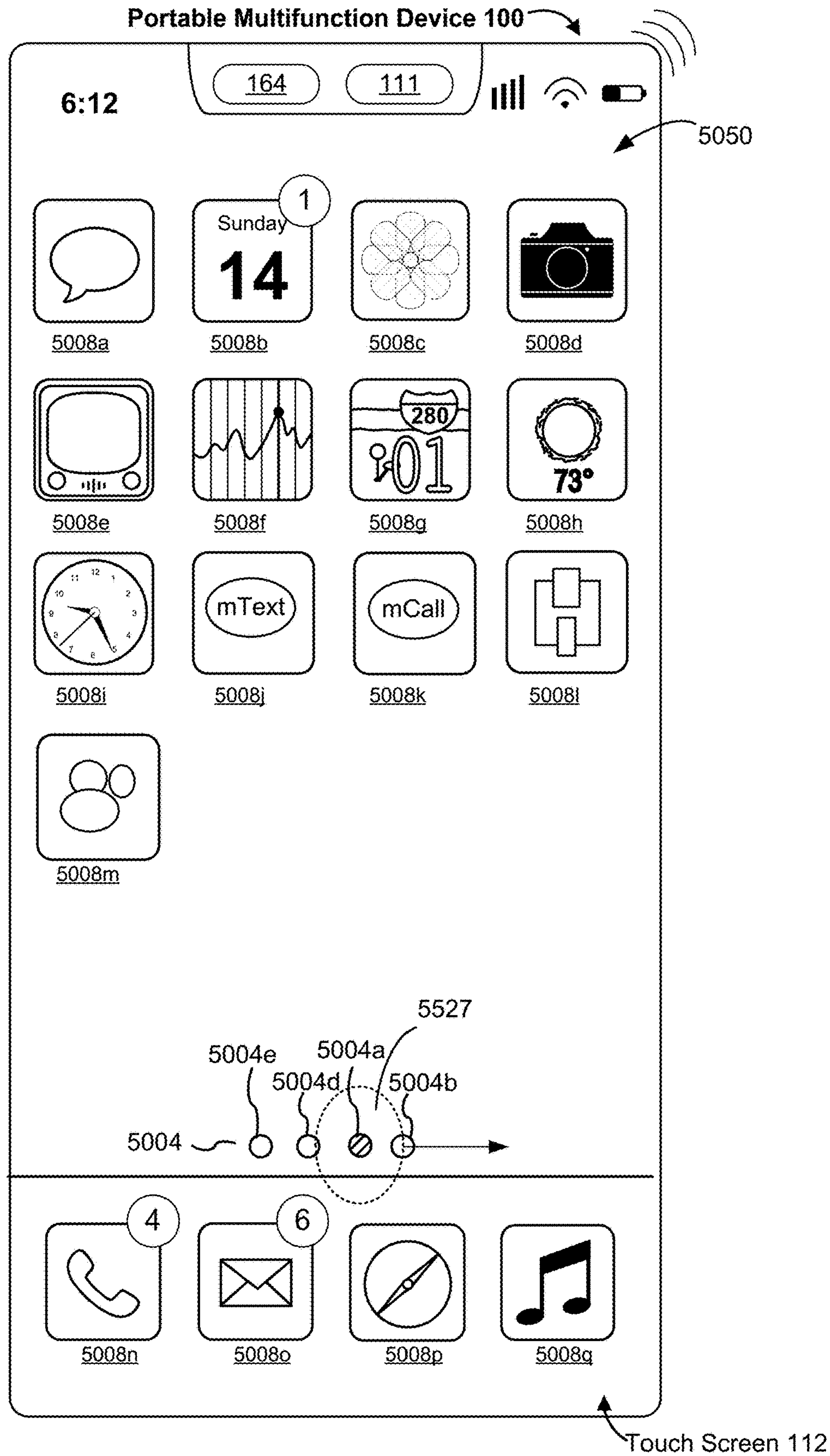
Figure 5A30

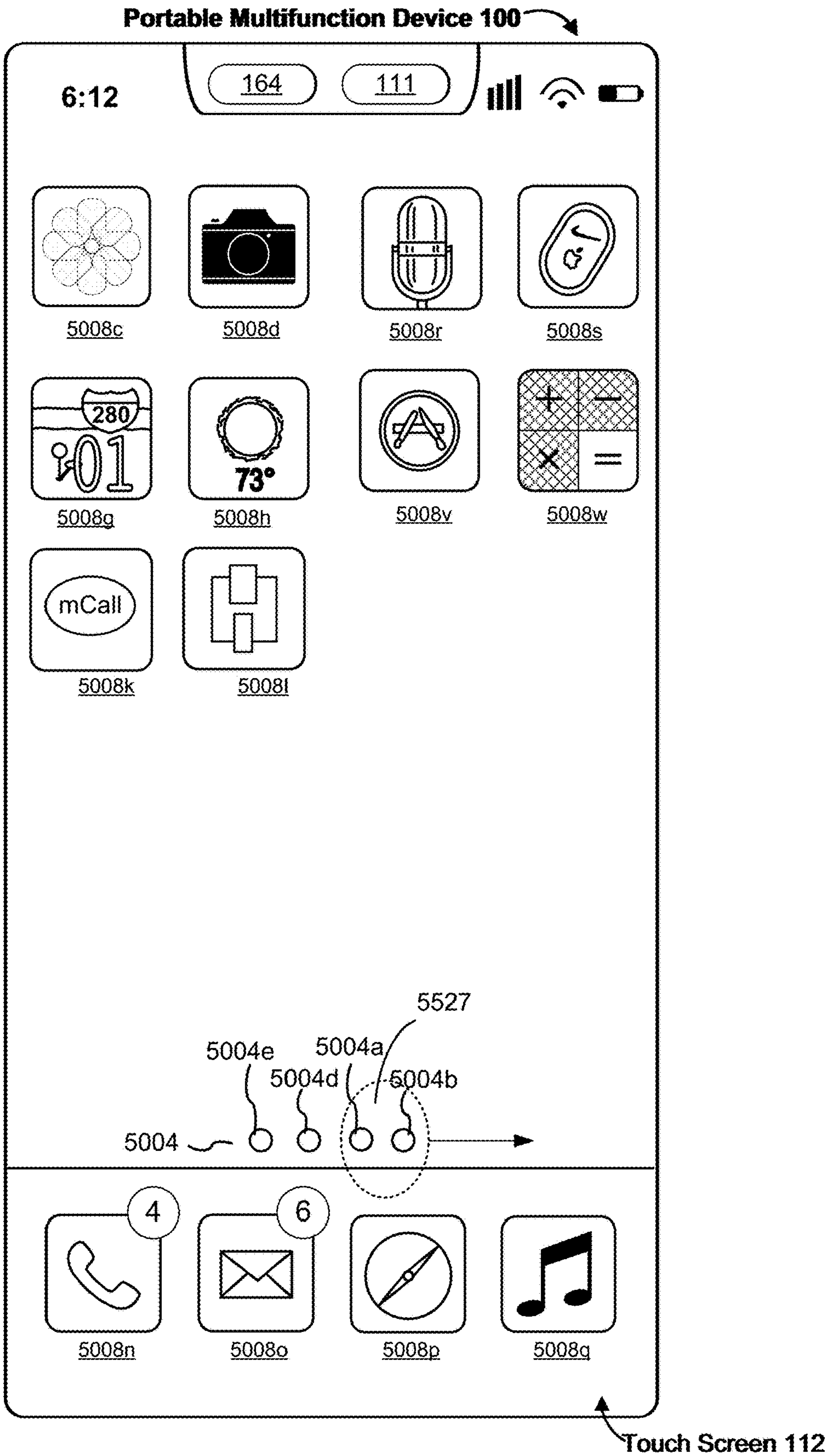
Figure 5A31

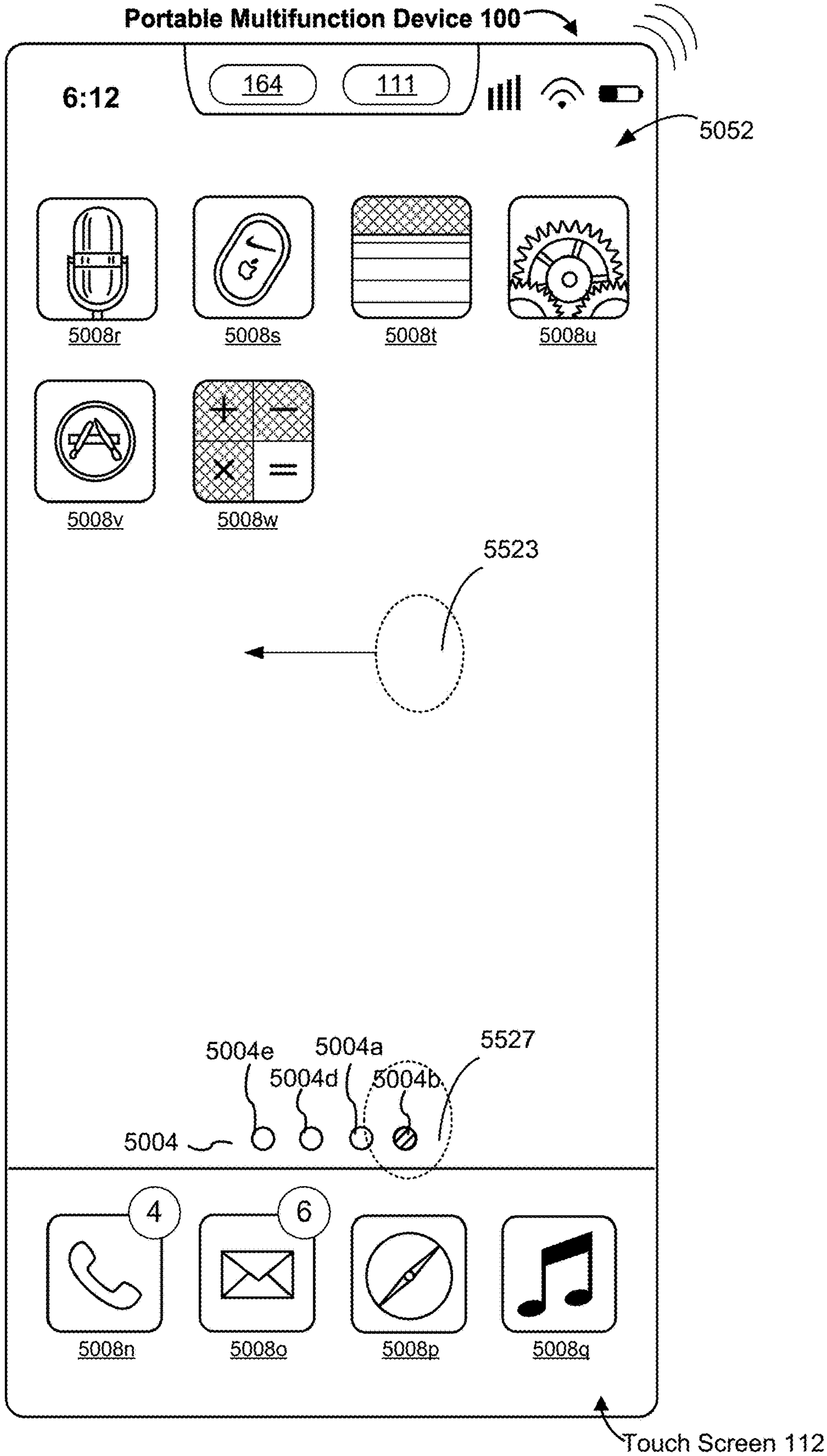
Figure 5A32

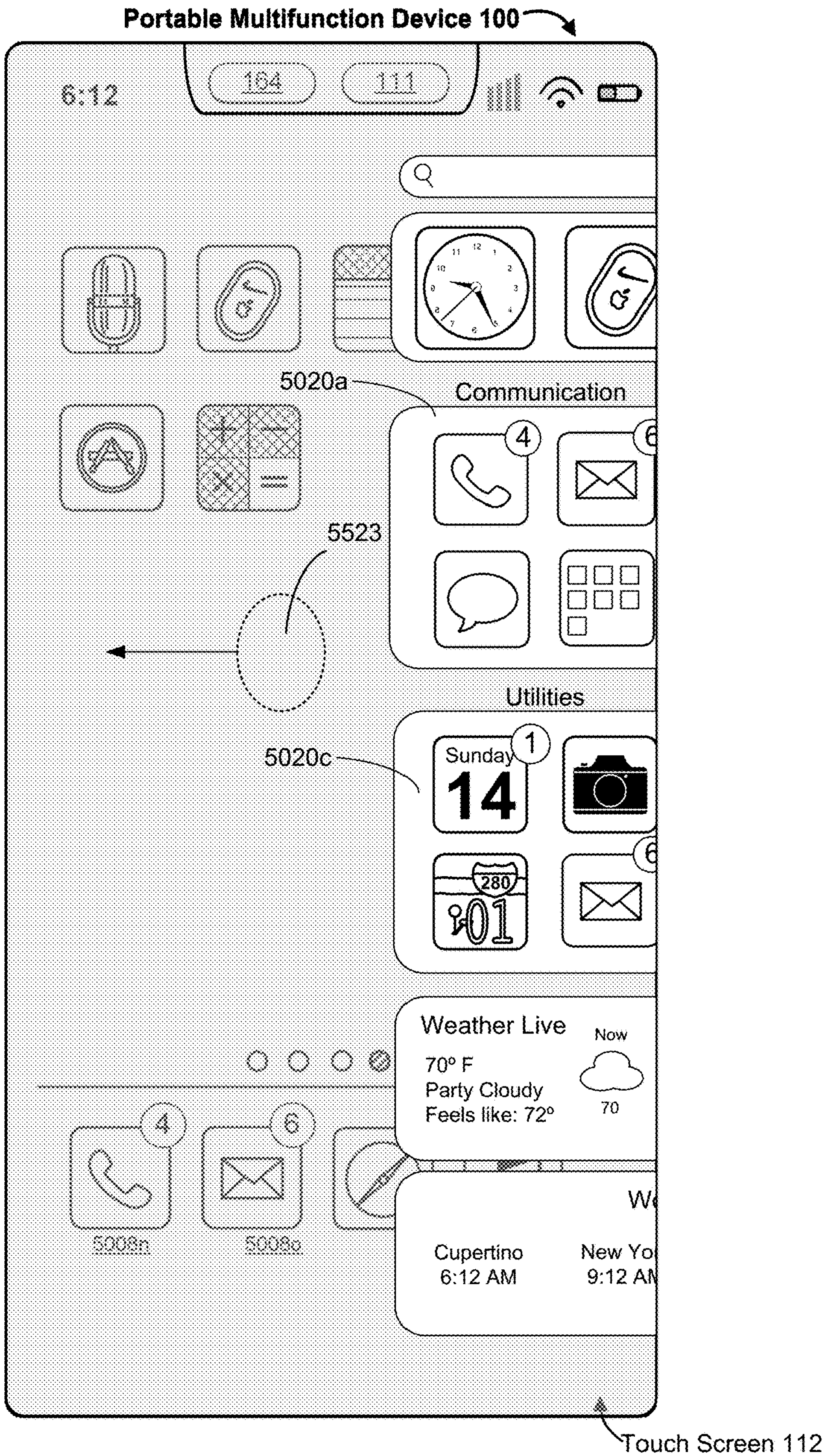
Figure 5A33

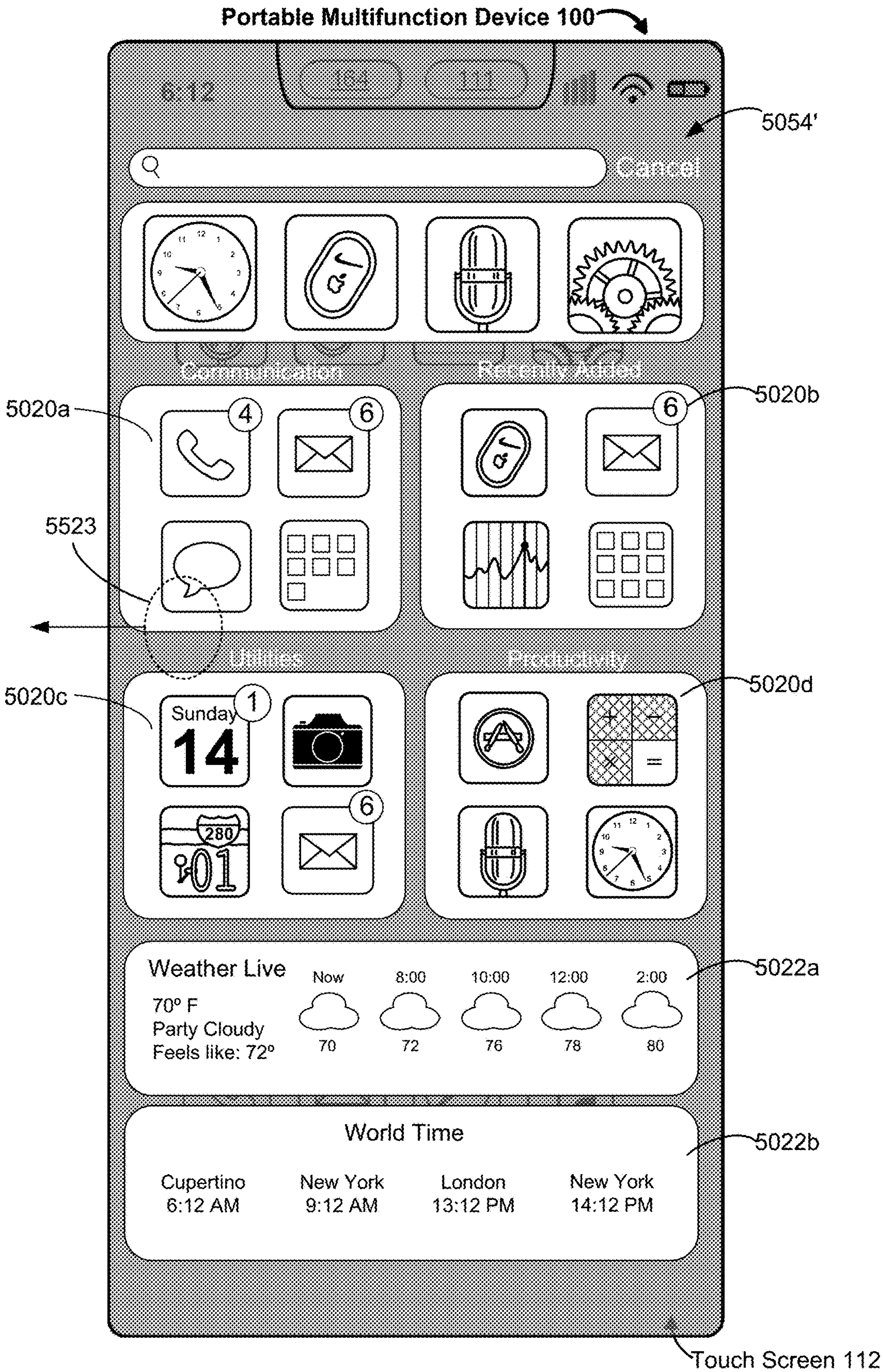
Figure 5A34

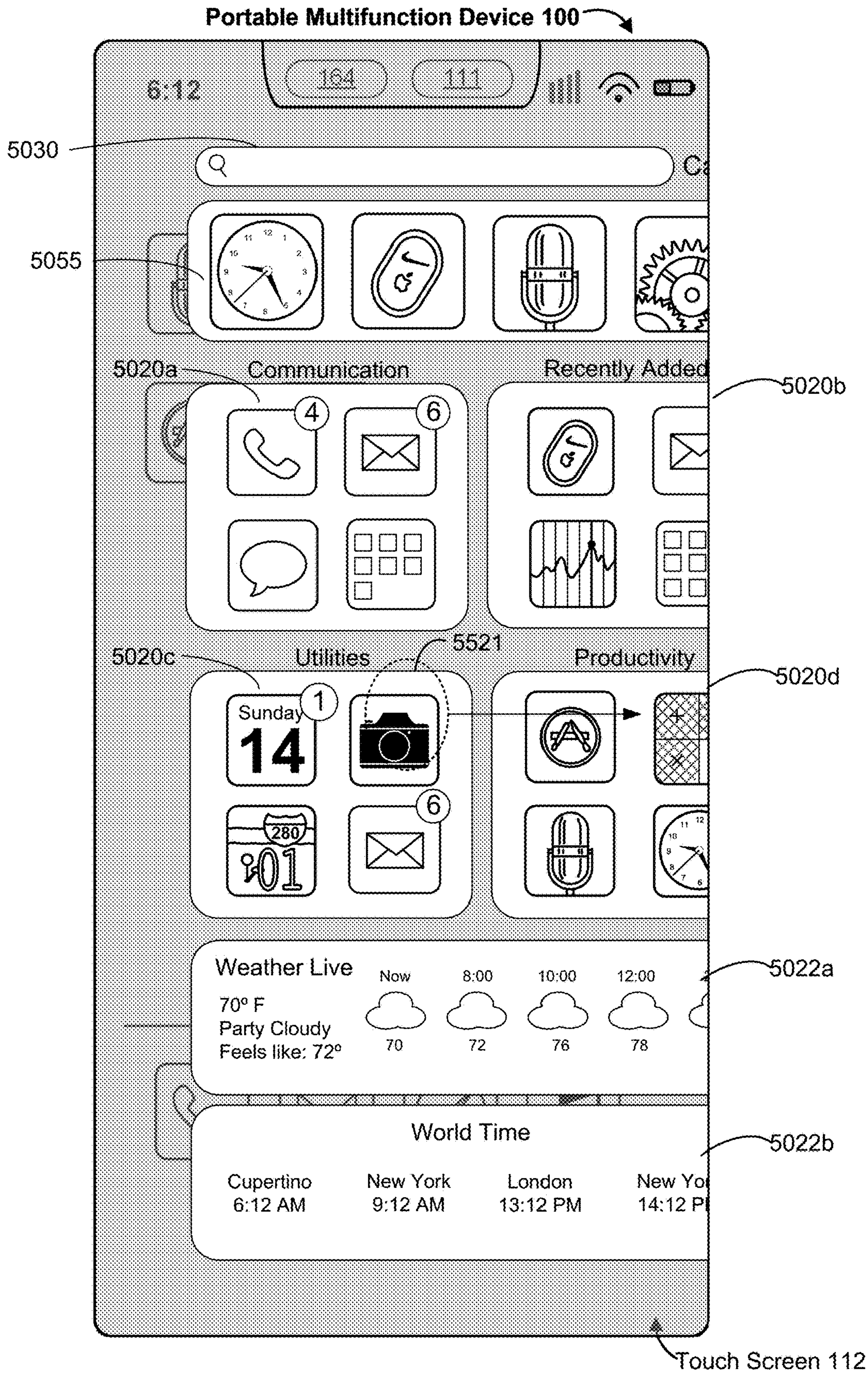
Figure 5A35

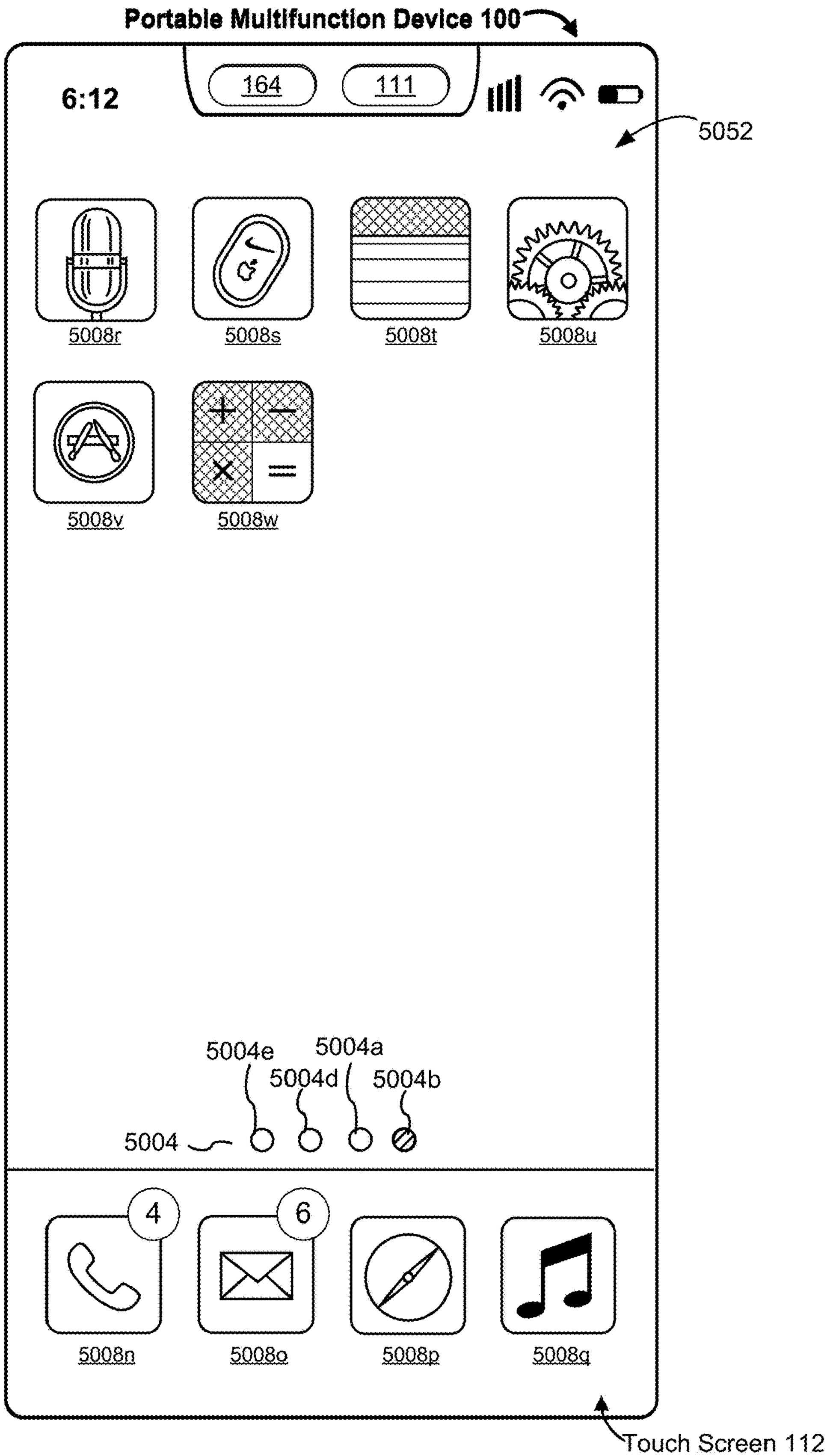
Figure 5A36

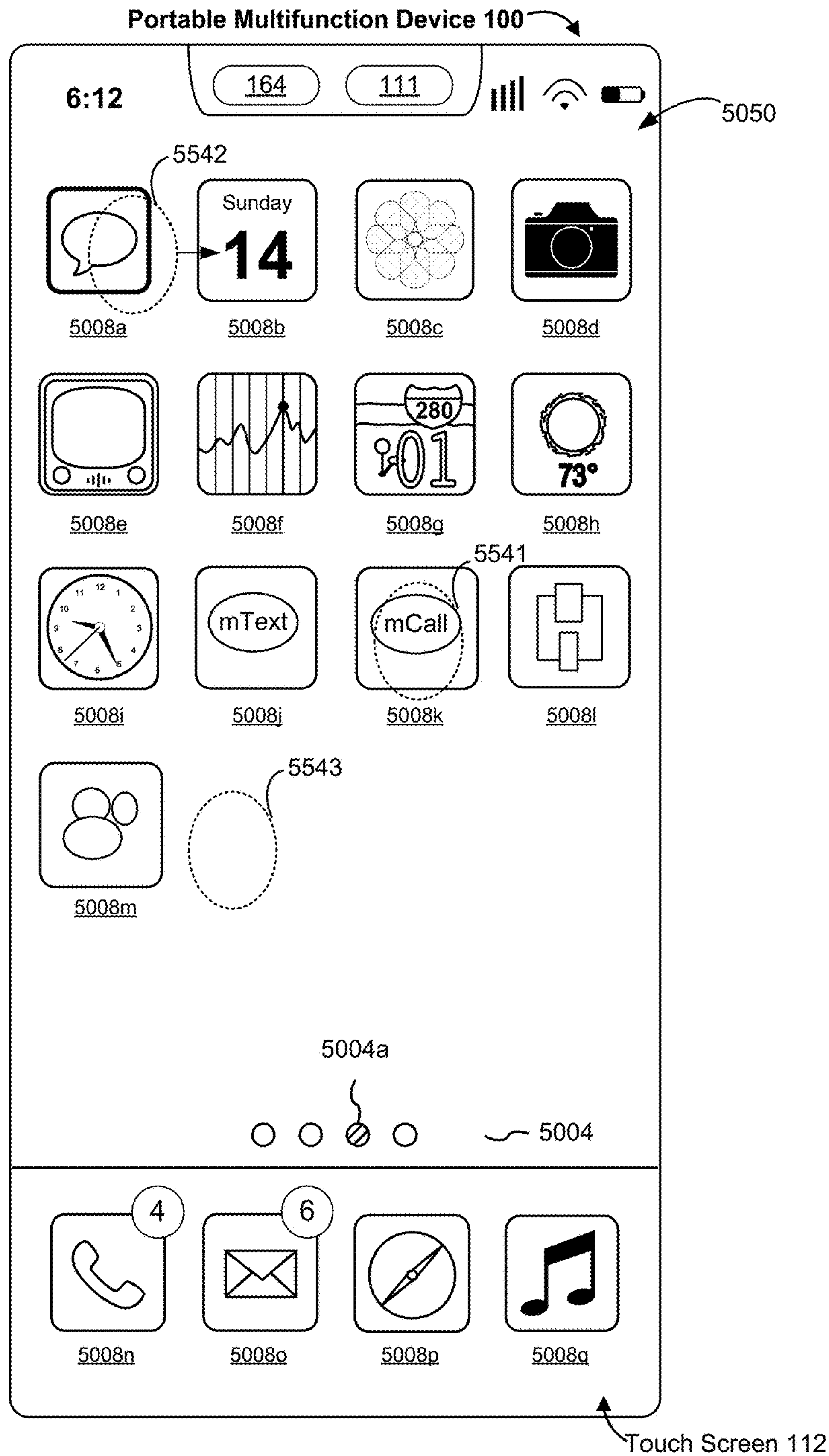
Figure 5B1

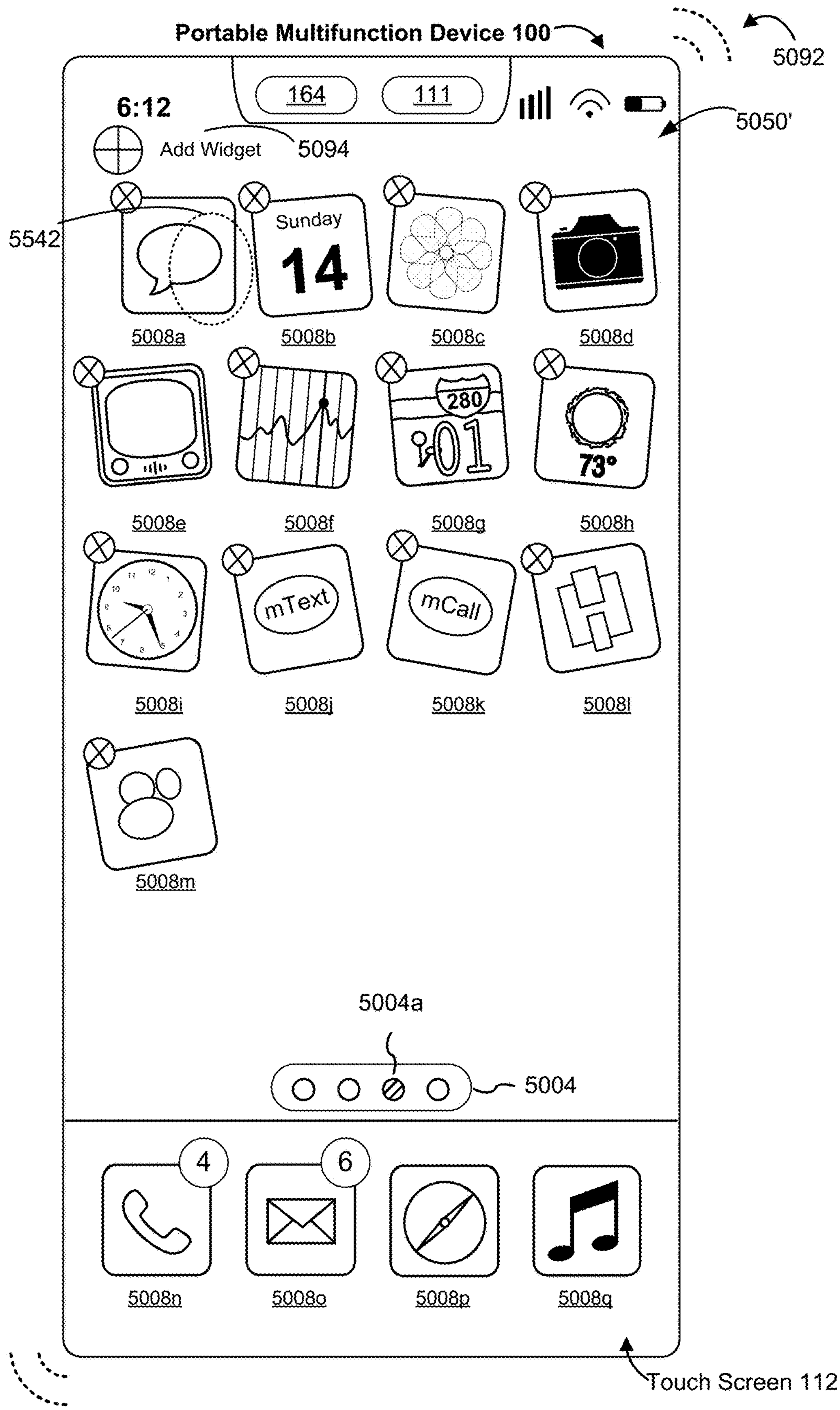
Figure 5B2

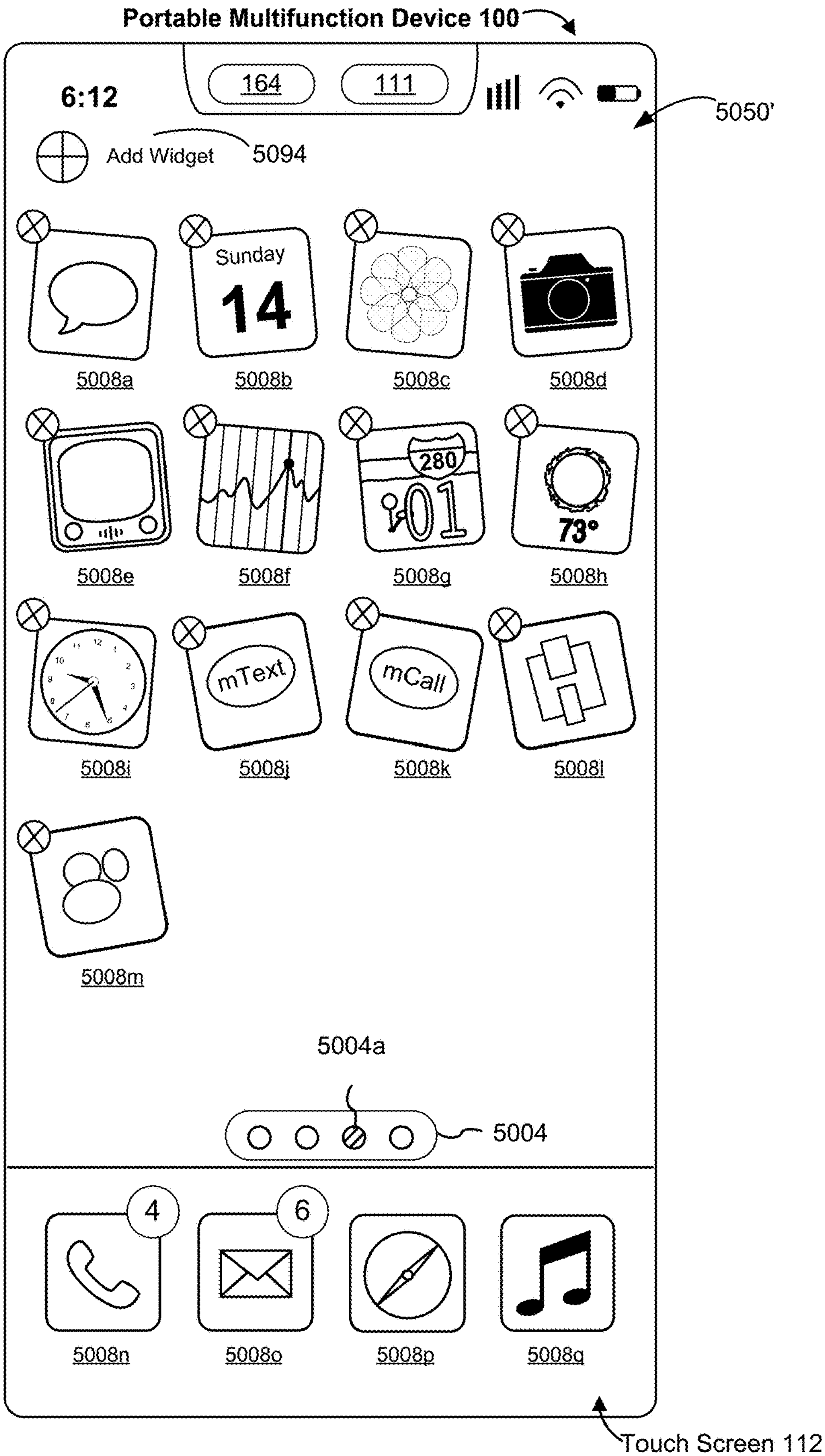
Figure 5B3

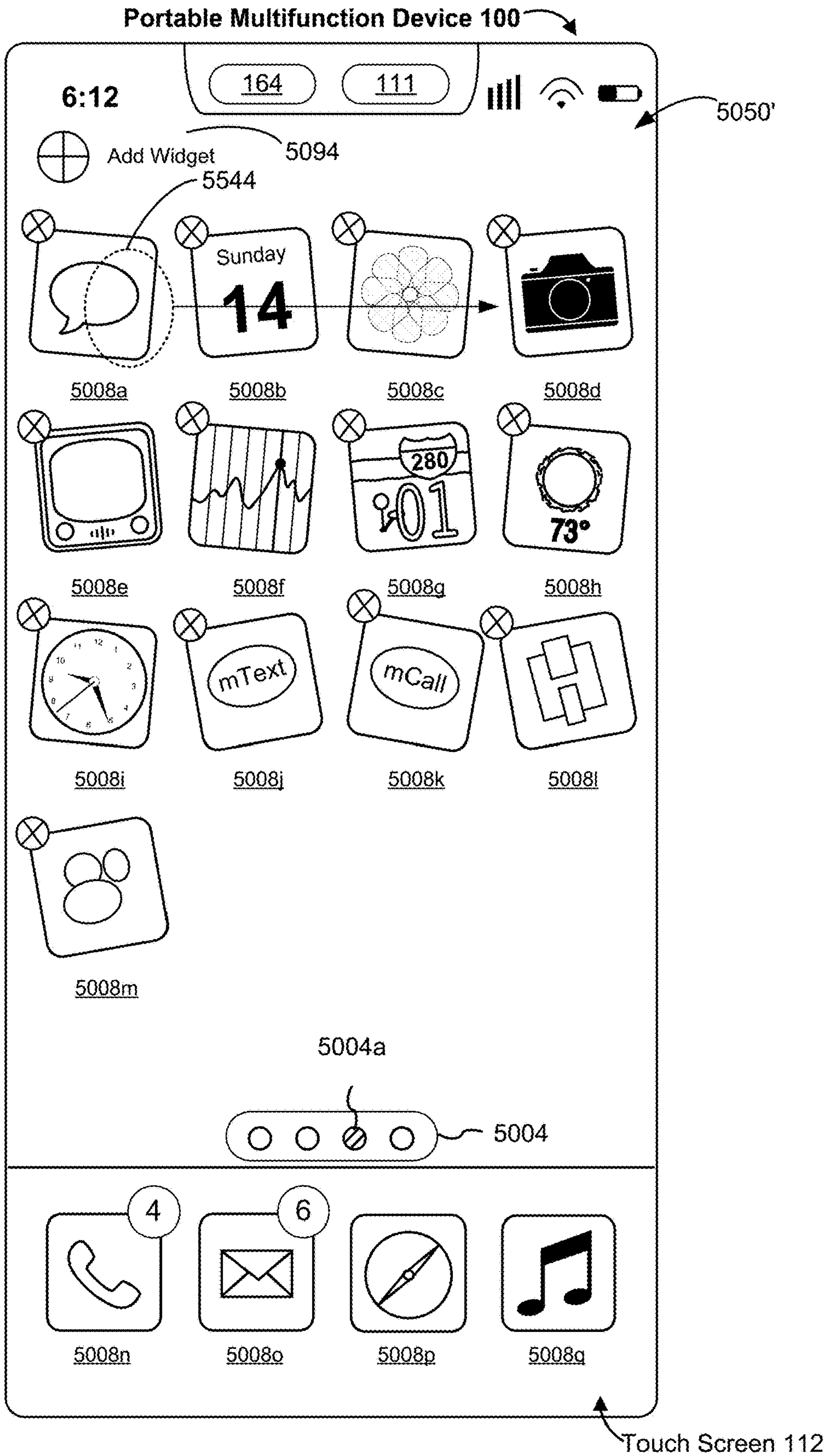
Figure 5B4

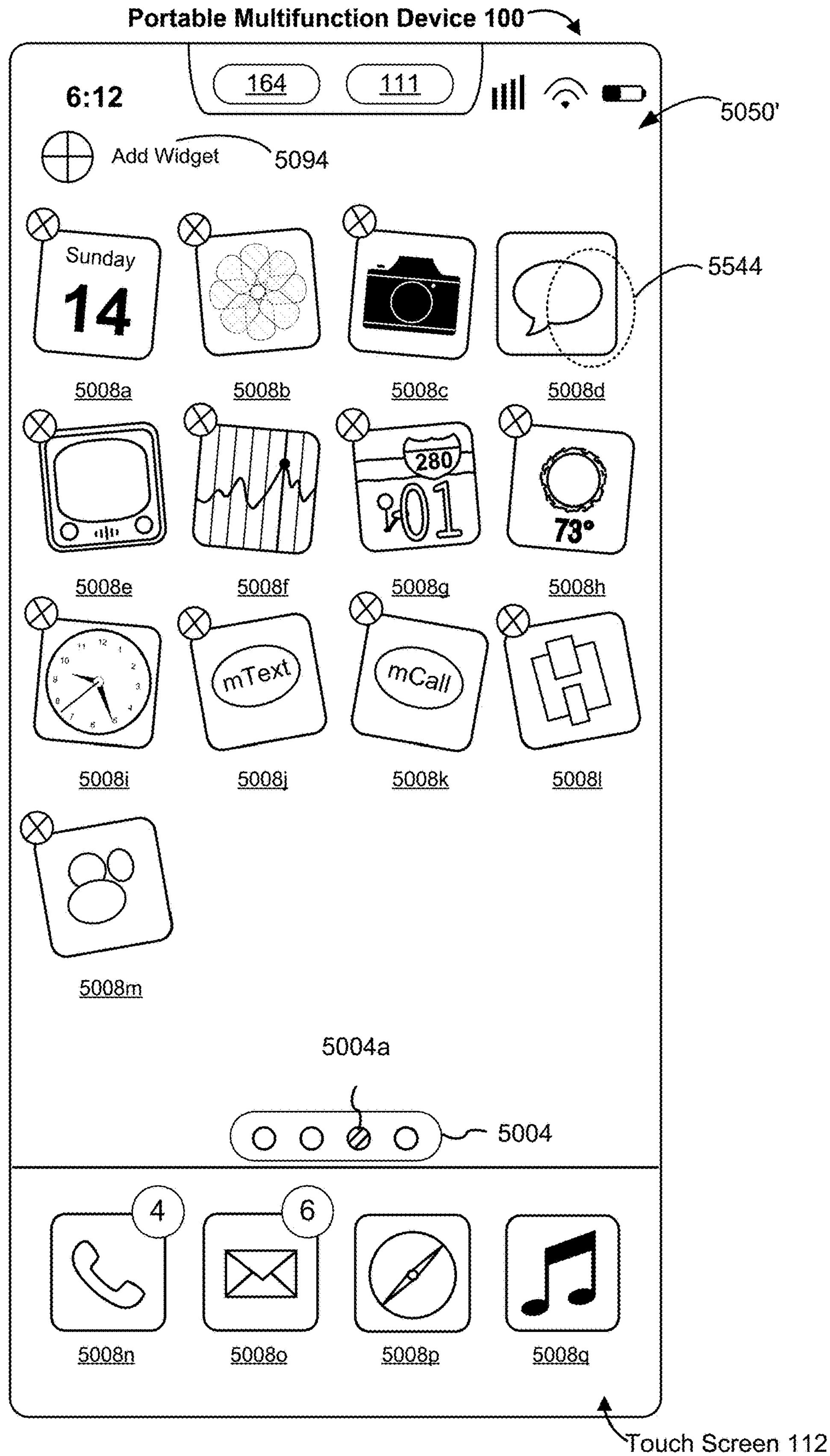
Figure 5B5

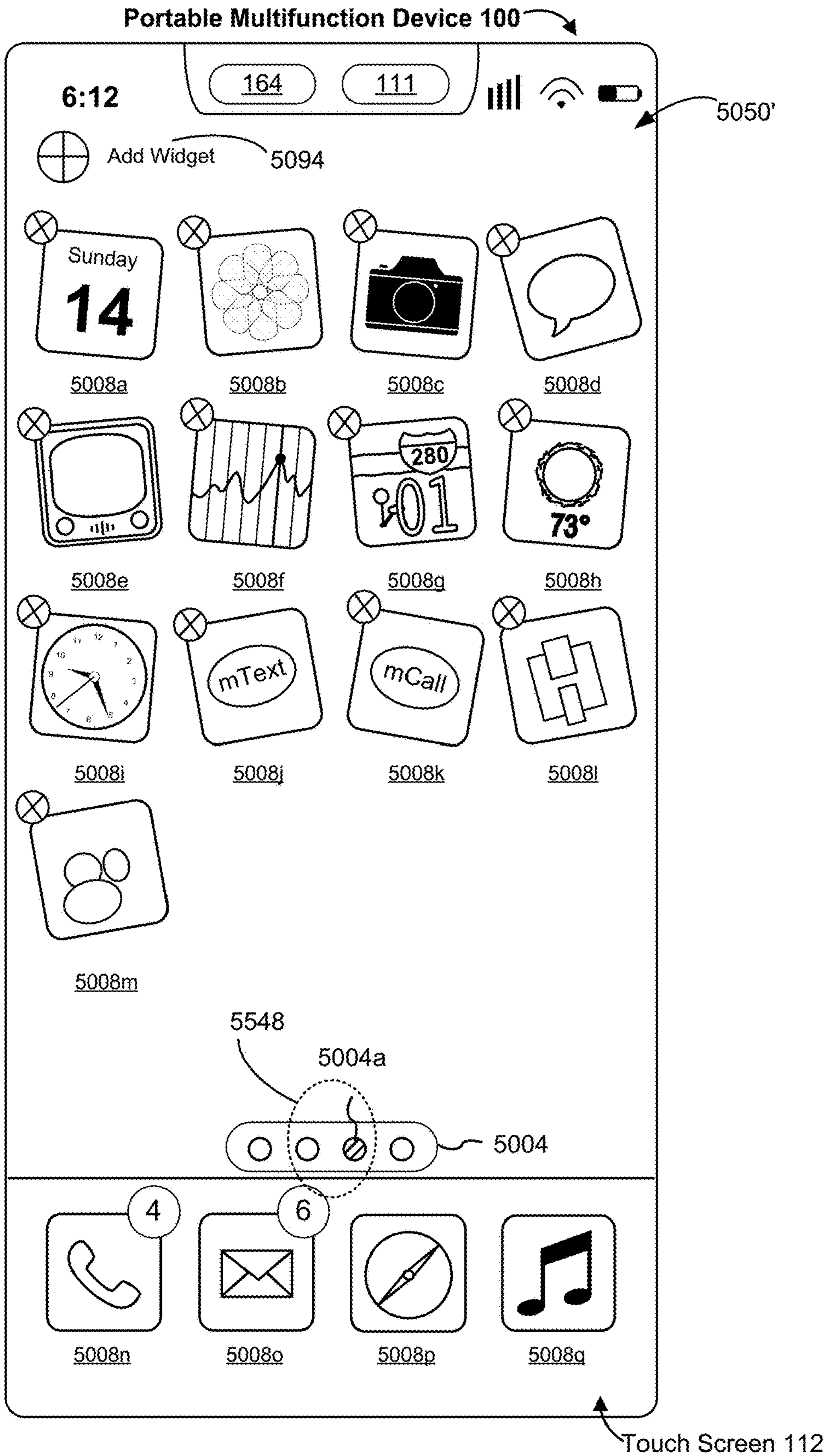
Figure 5B6

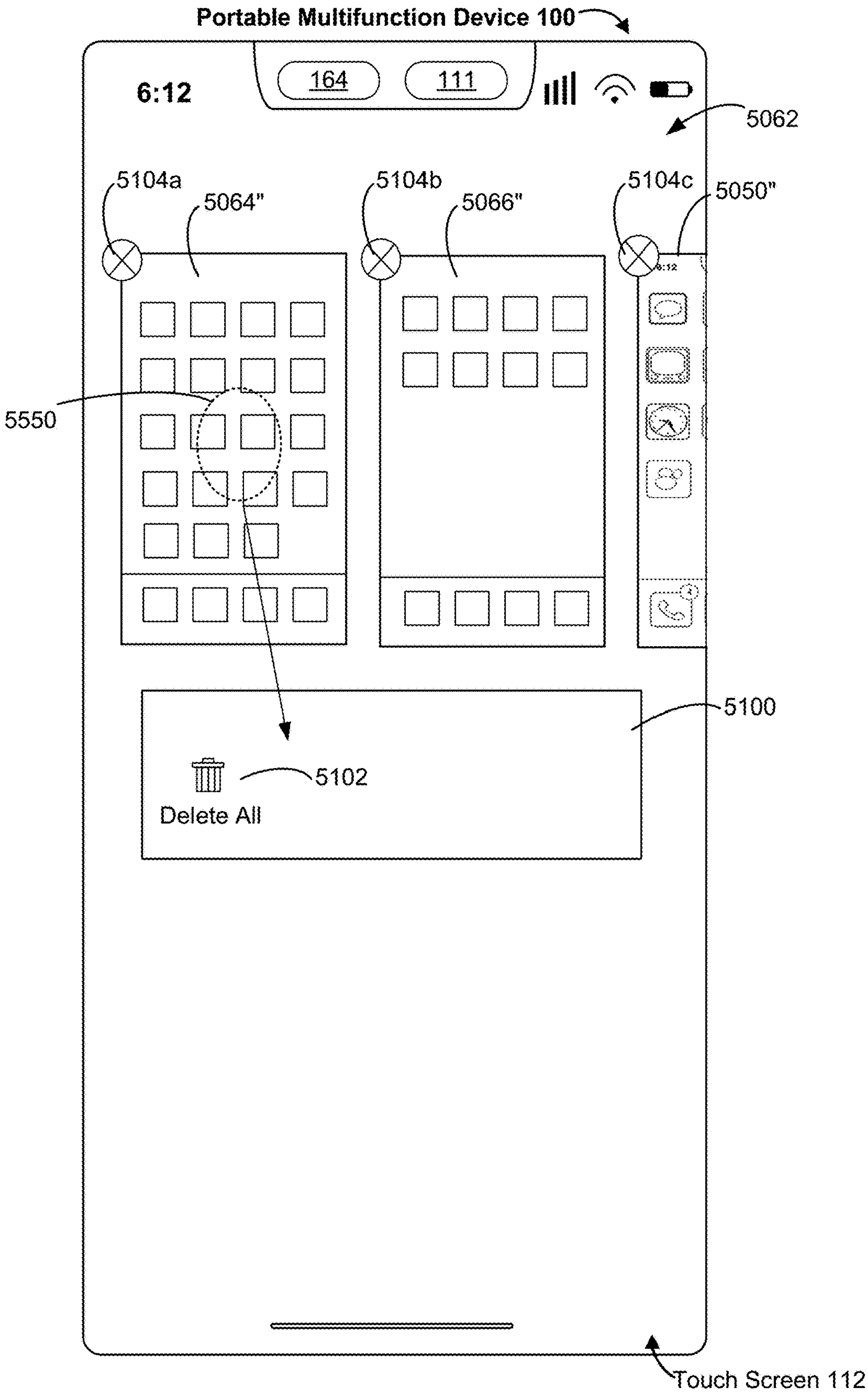
Figure 5B7

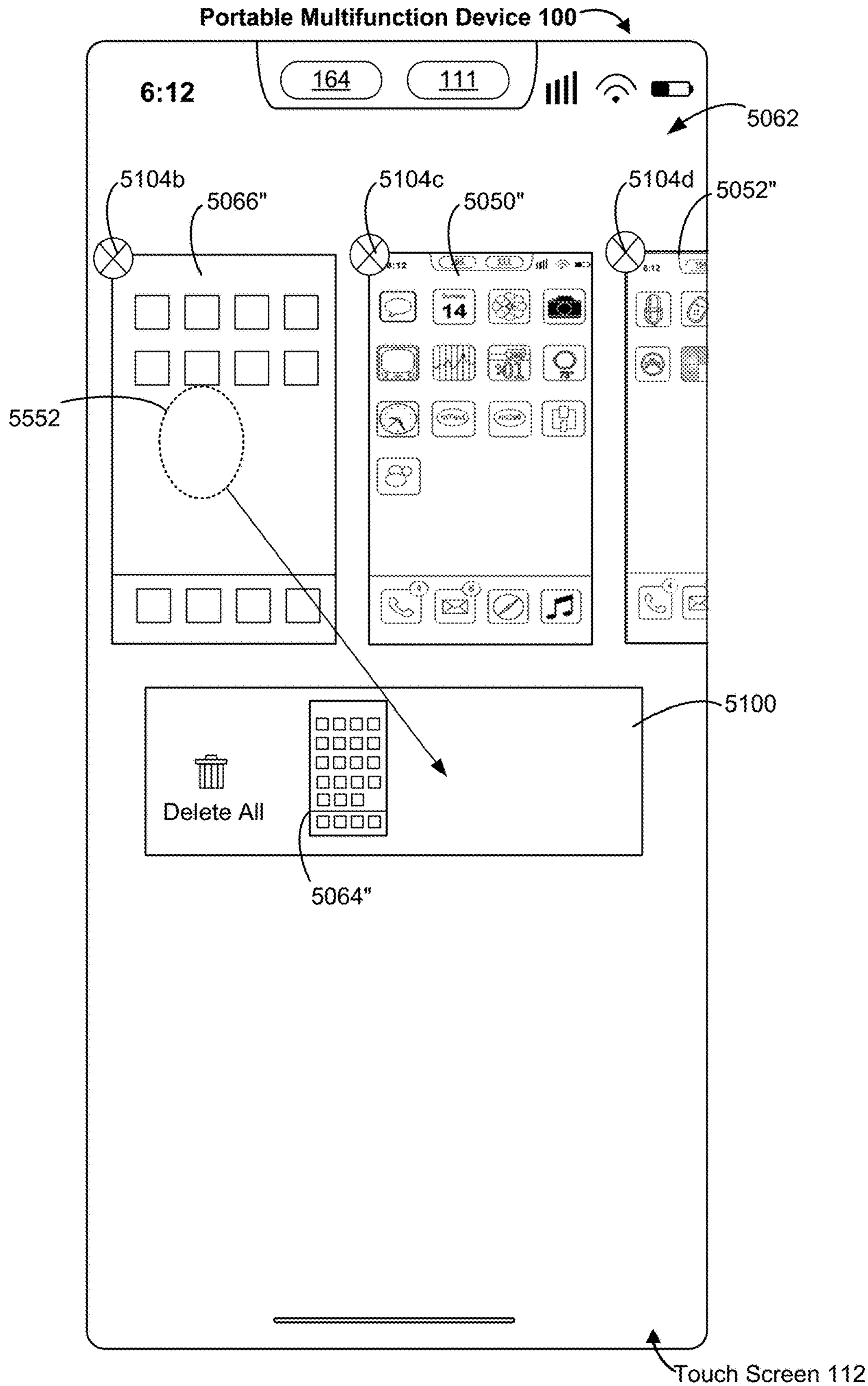
Figure 5B8

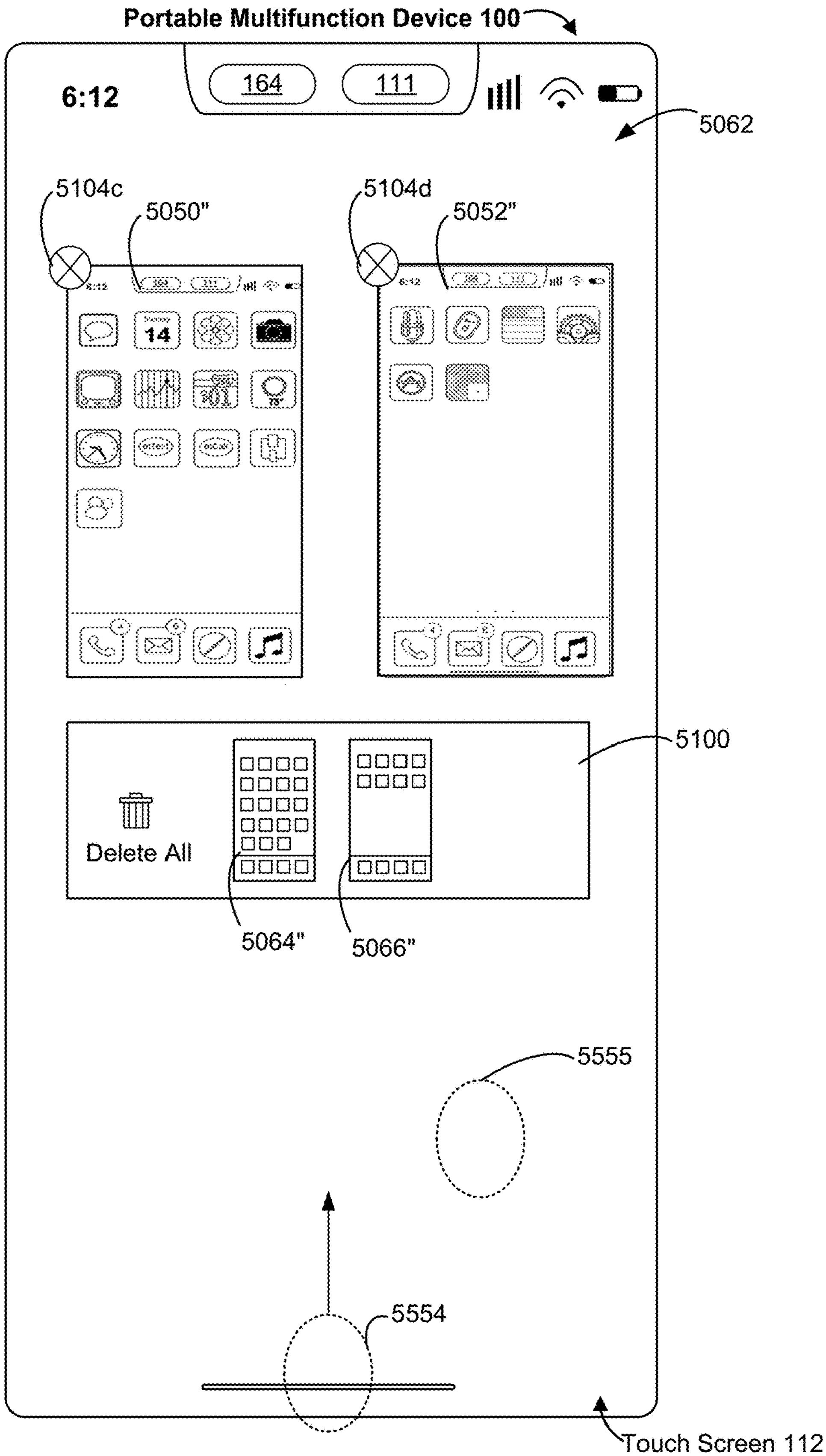
Figure 5B9

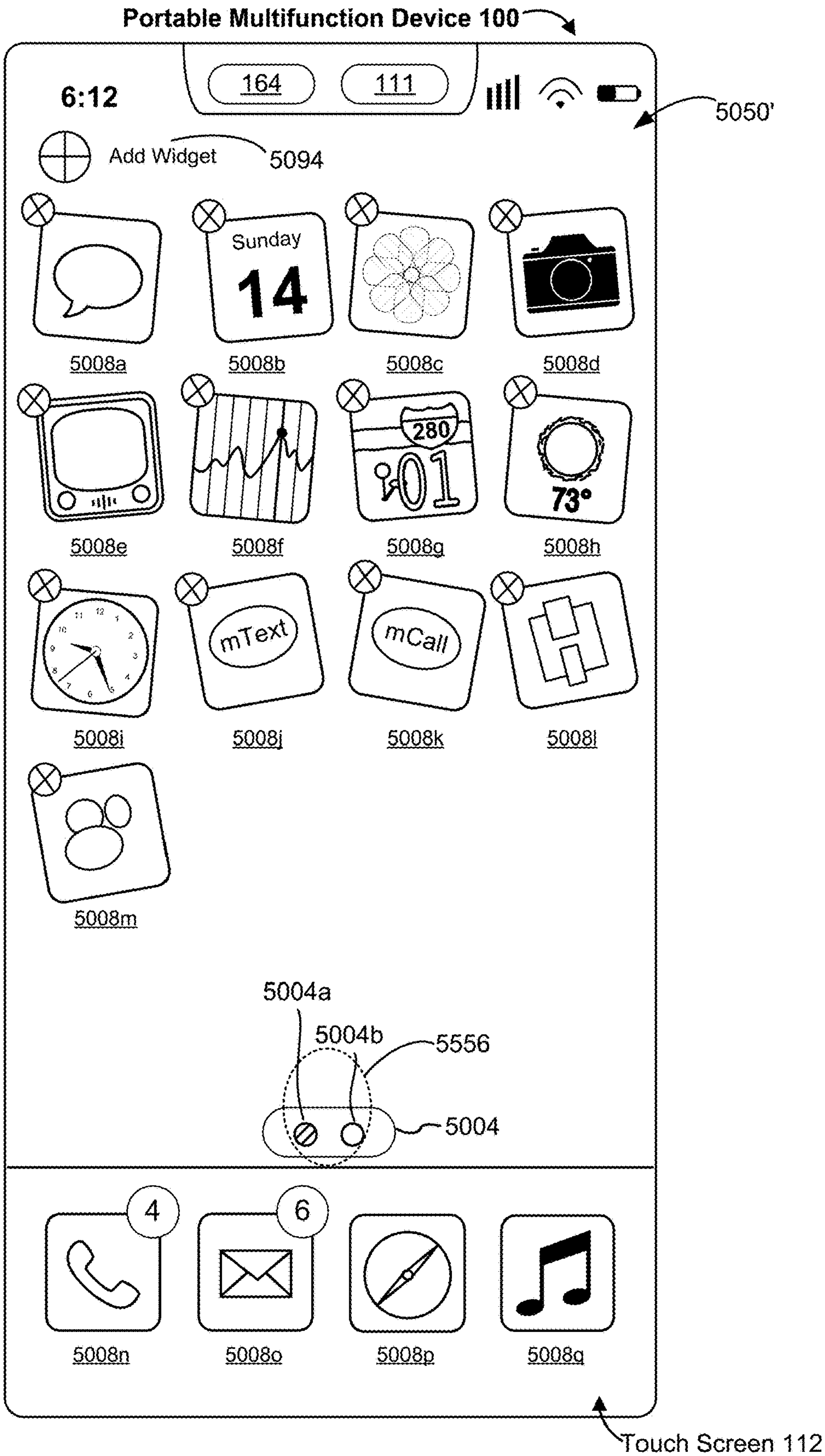
Figure 5B10

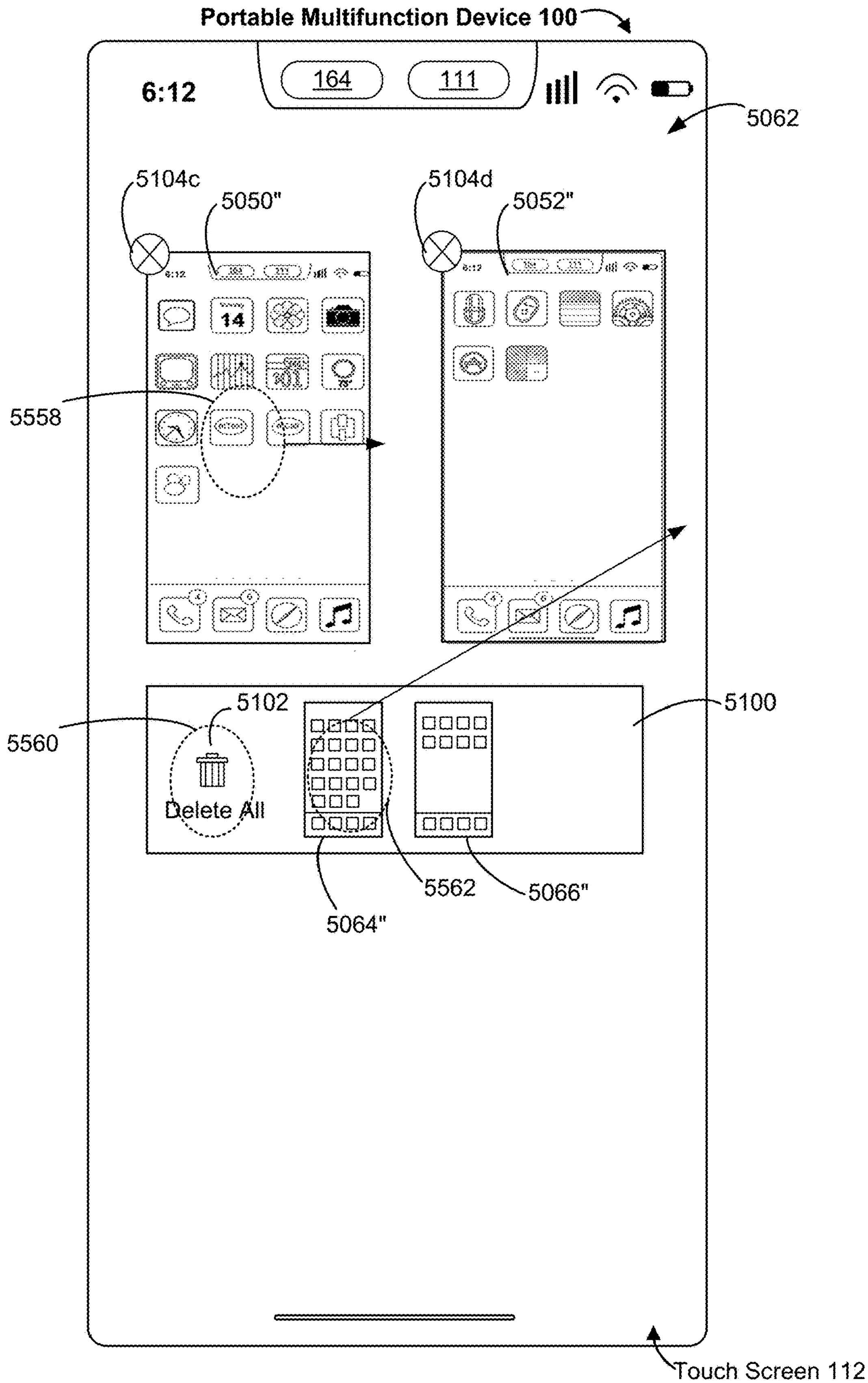
Figure 5B11

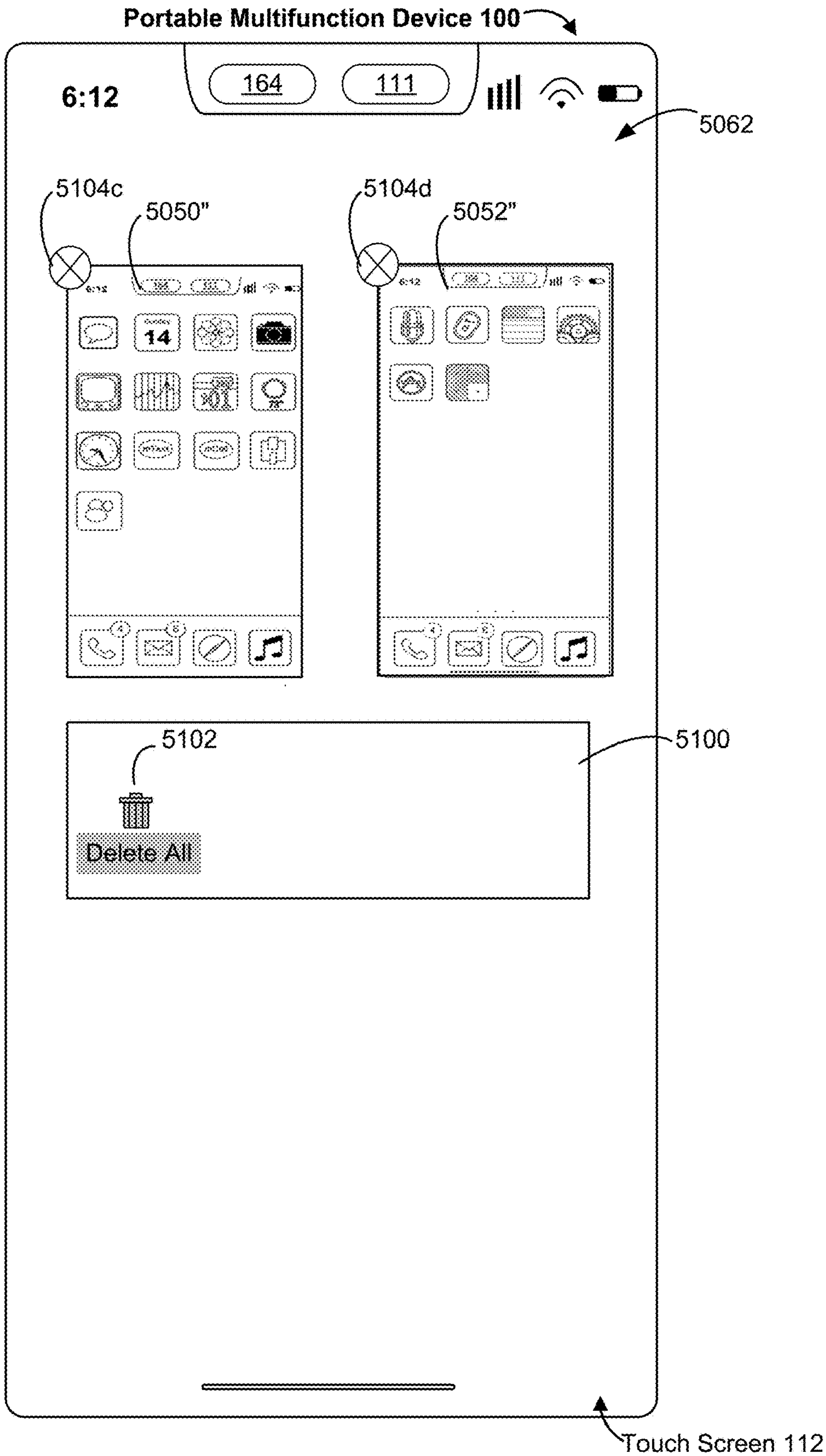
Figure 5B12

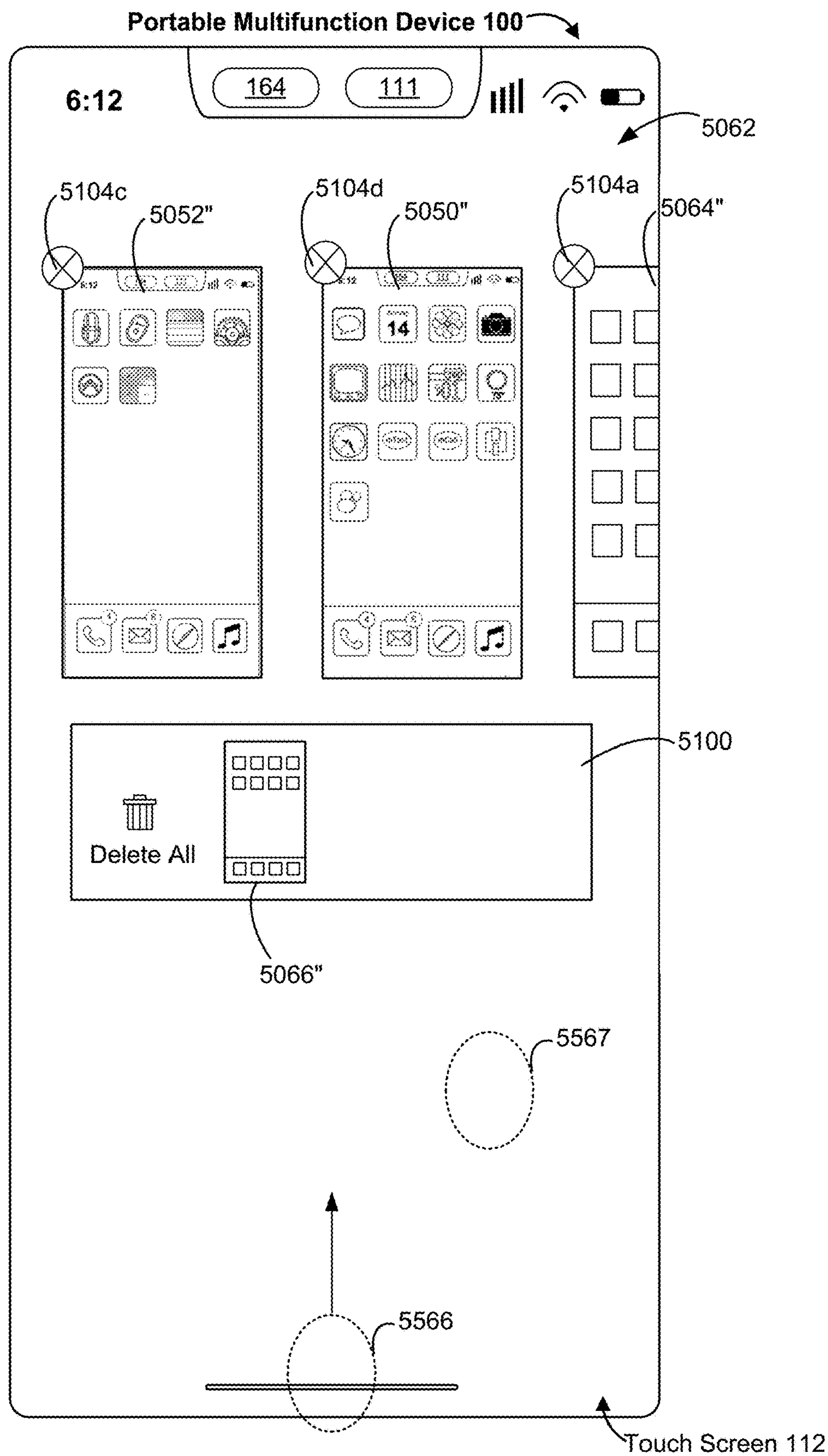
Figure 5B13

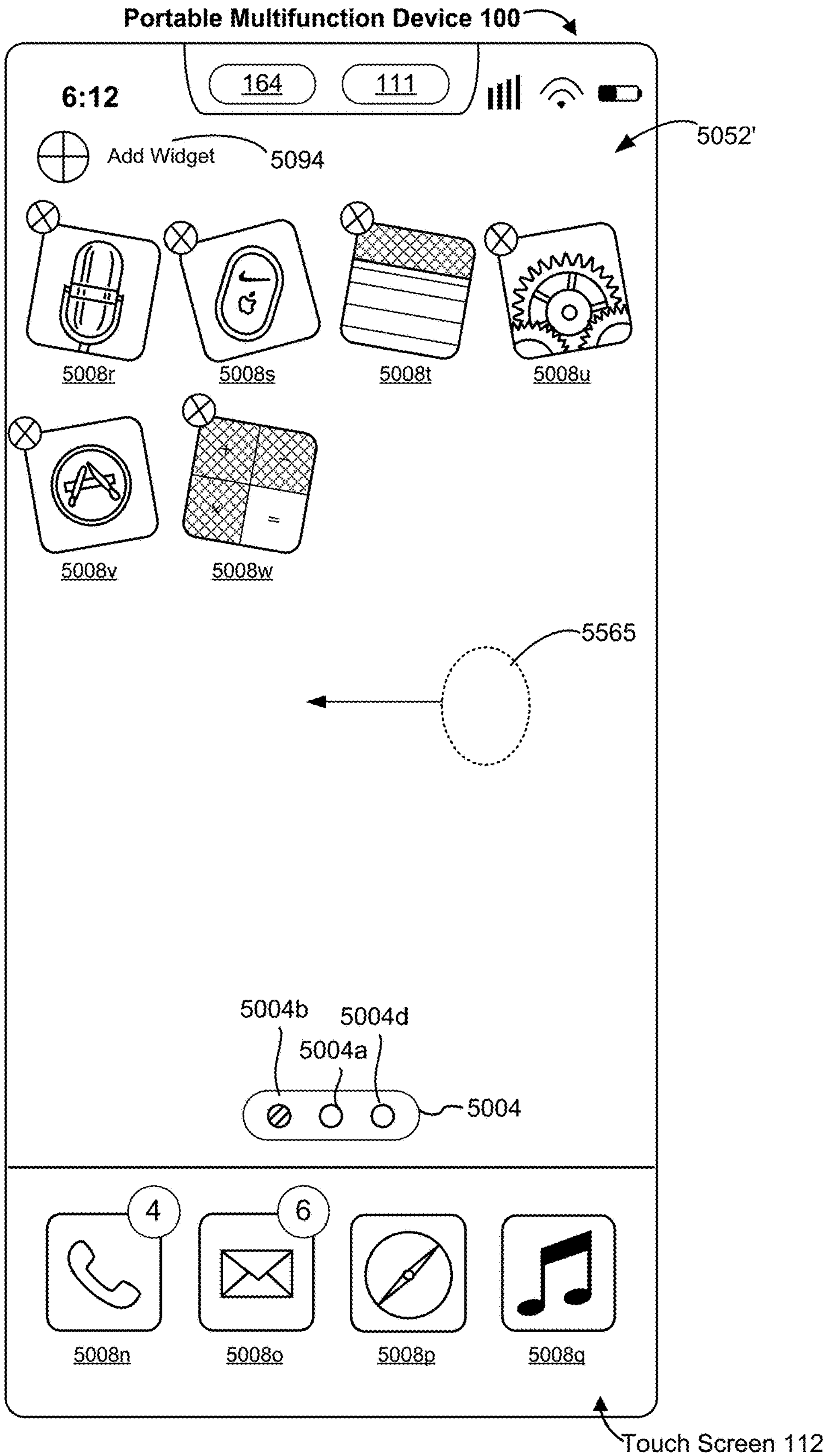
Figure 5B14

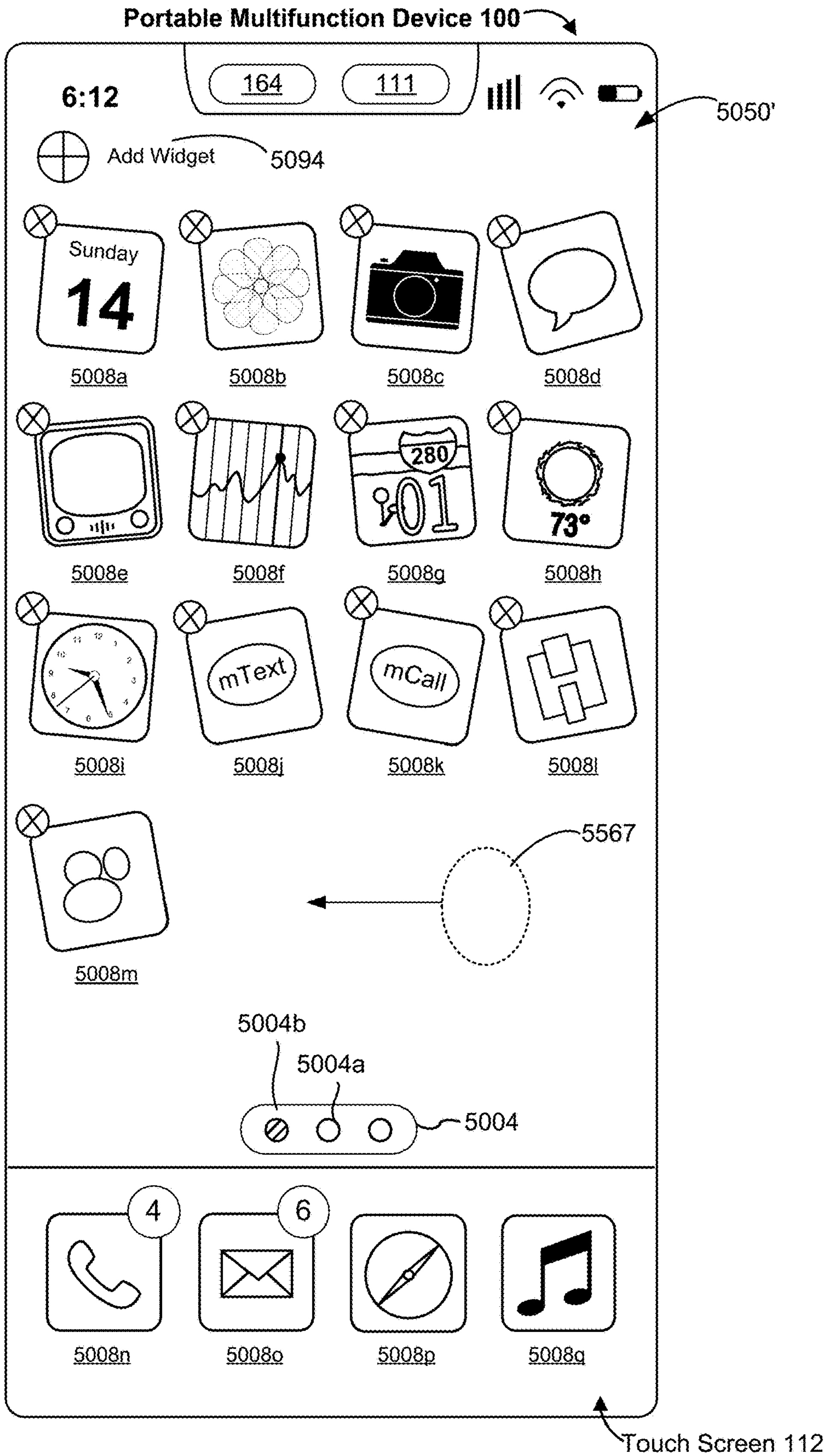
Figure 5B15

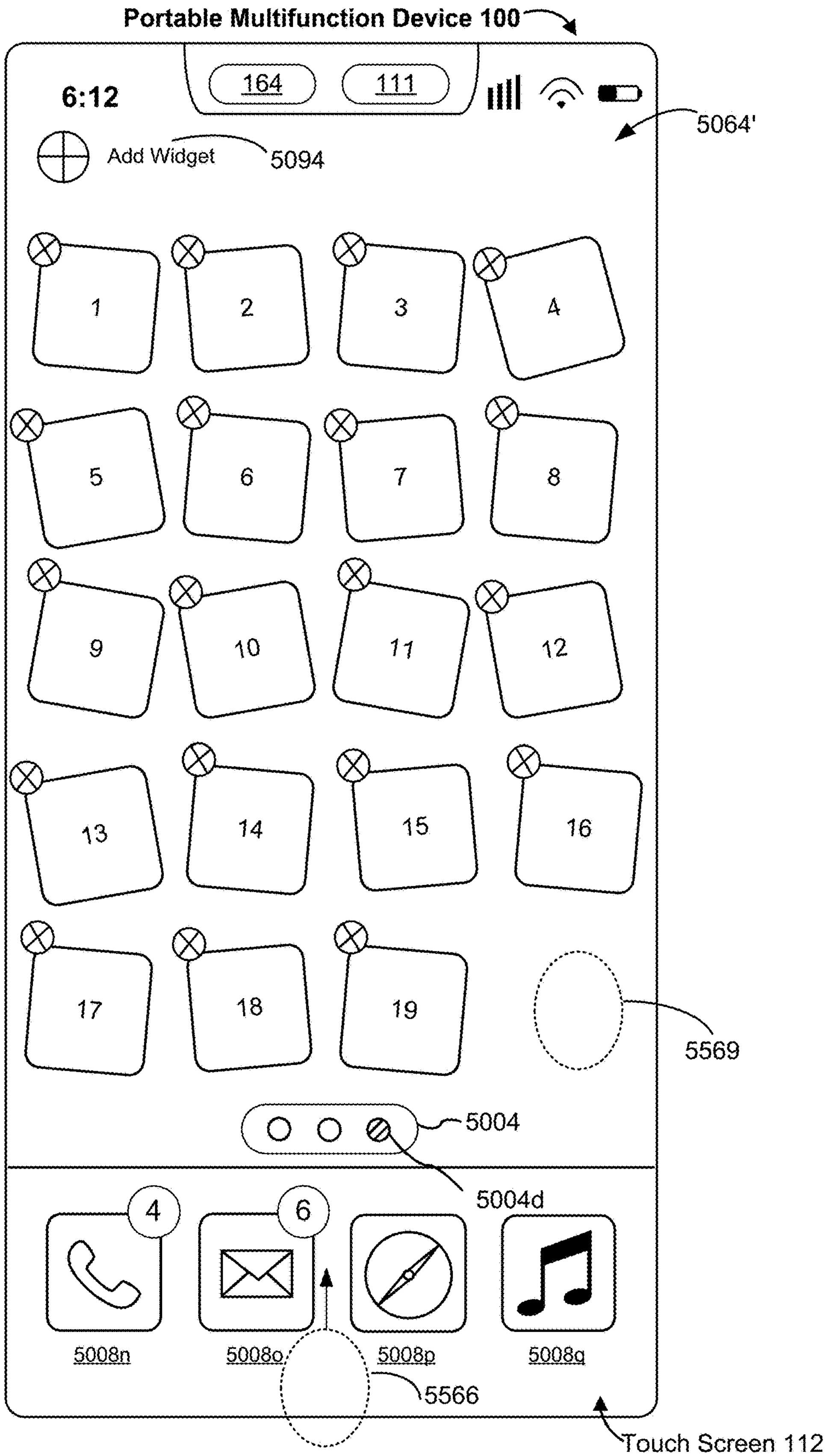
Figure 5B16

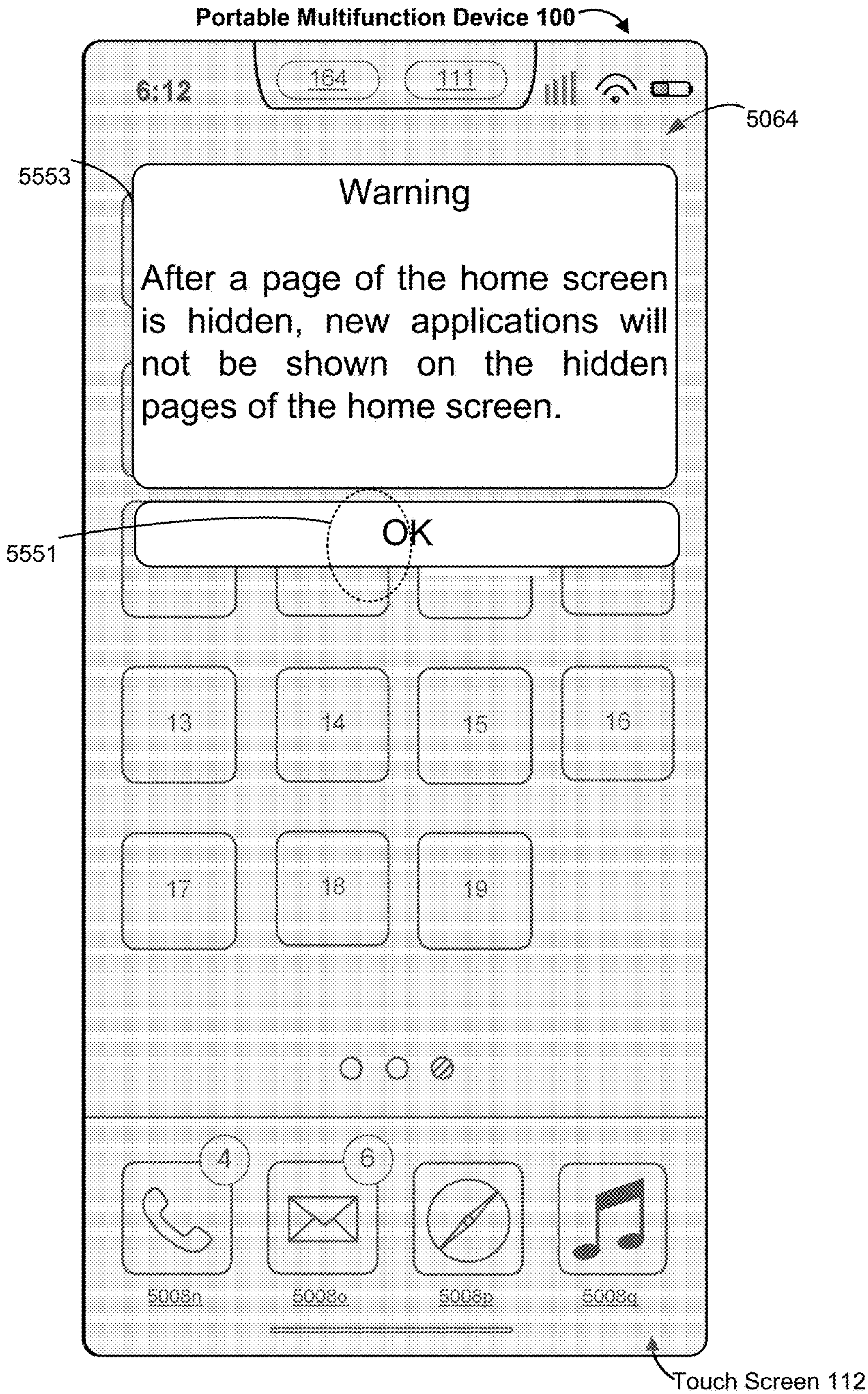
Figure 5B17

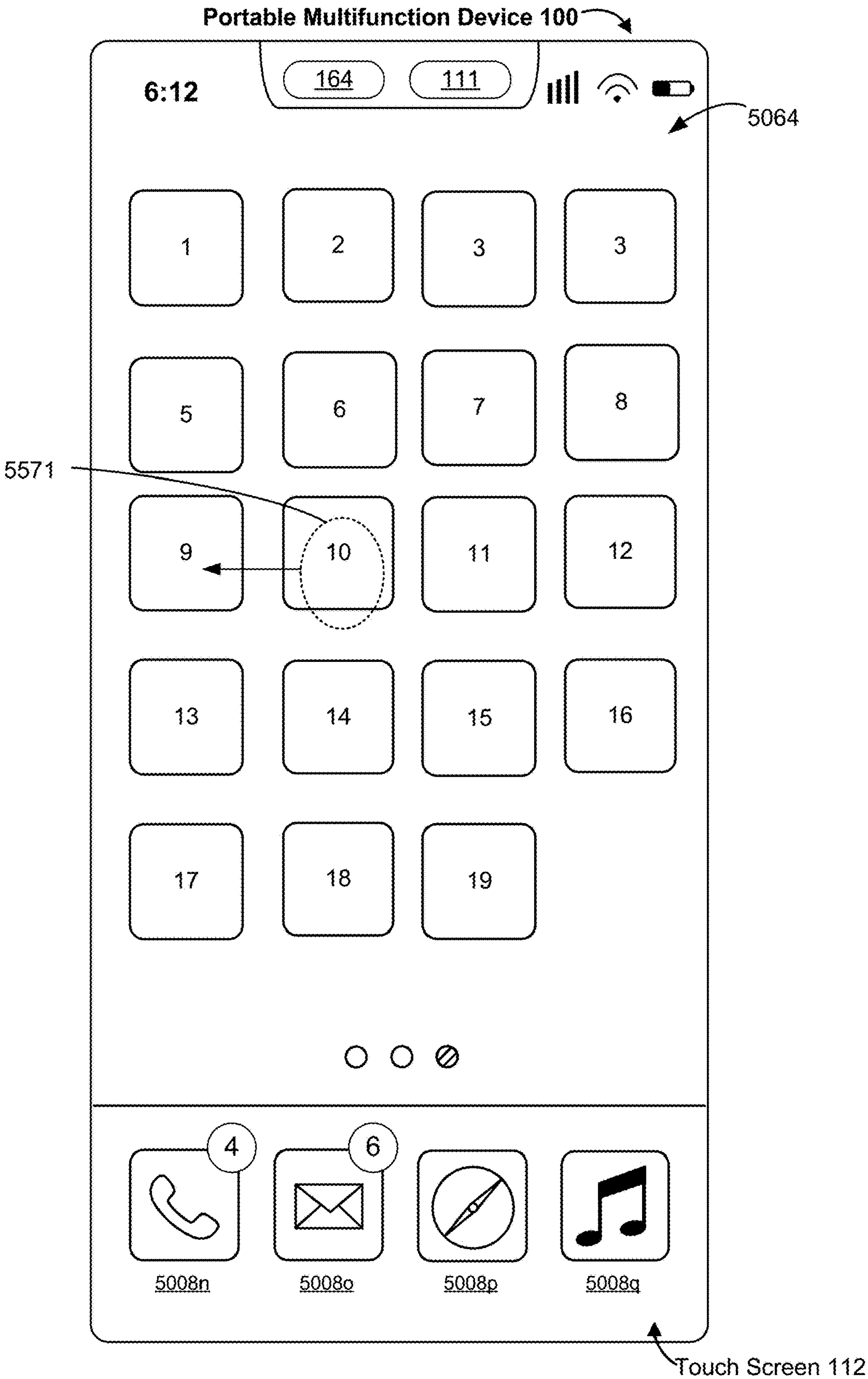
Figure 5B18

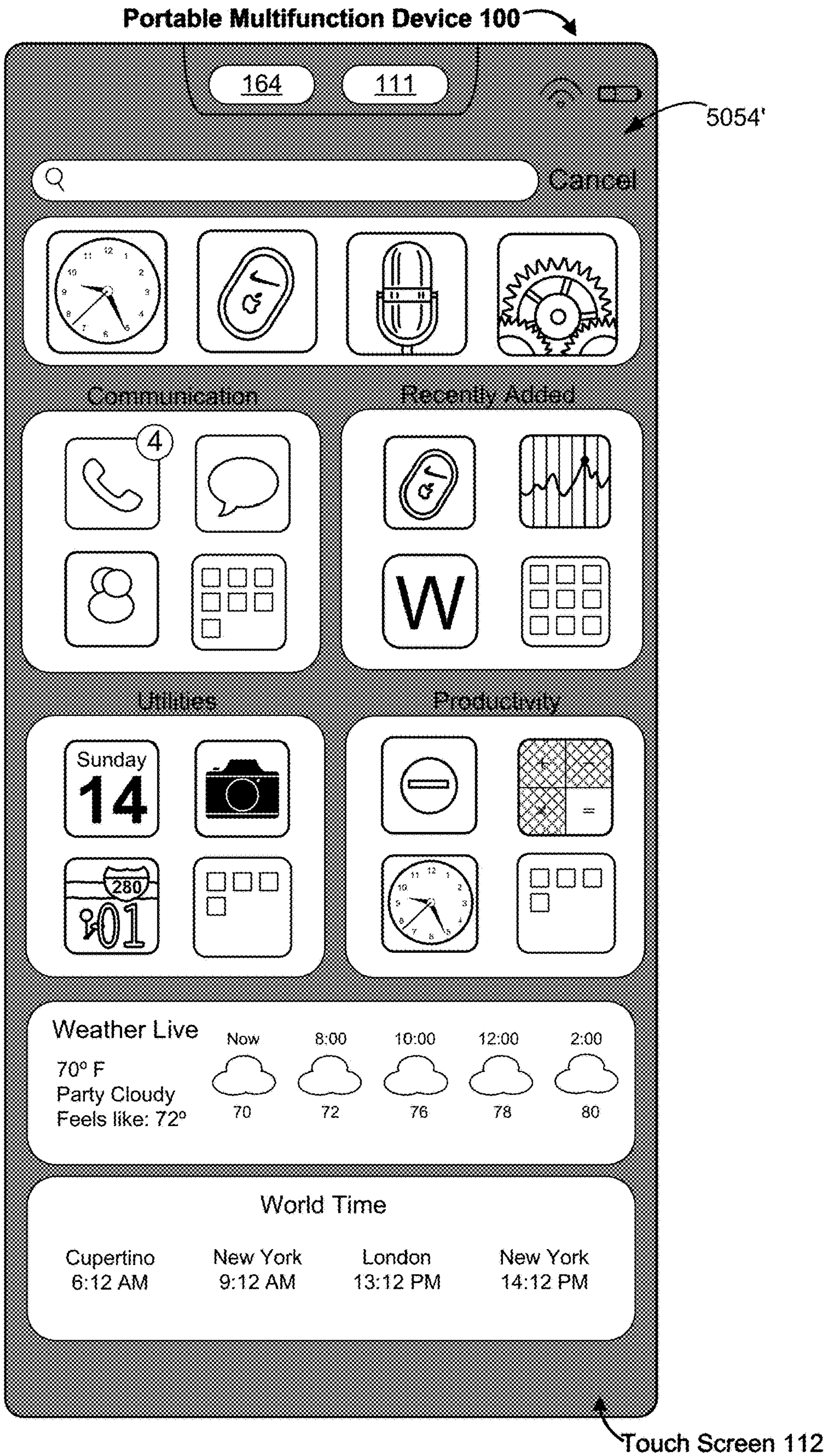
Figure 5B19

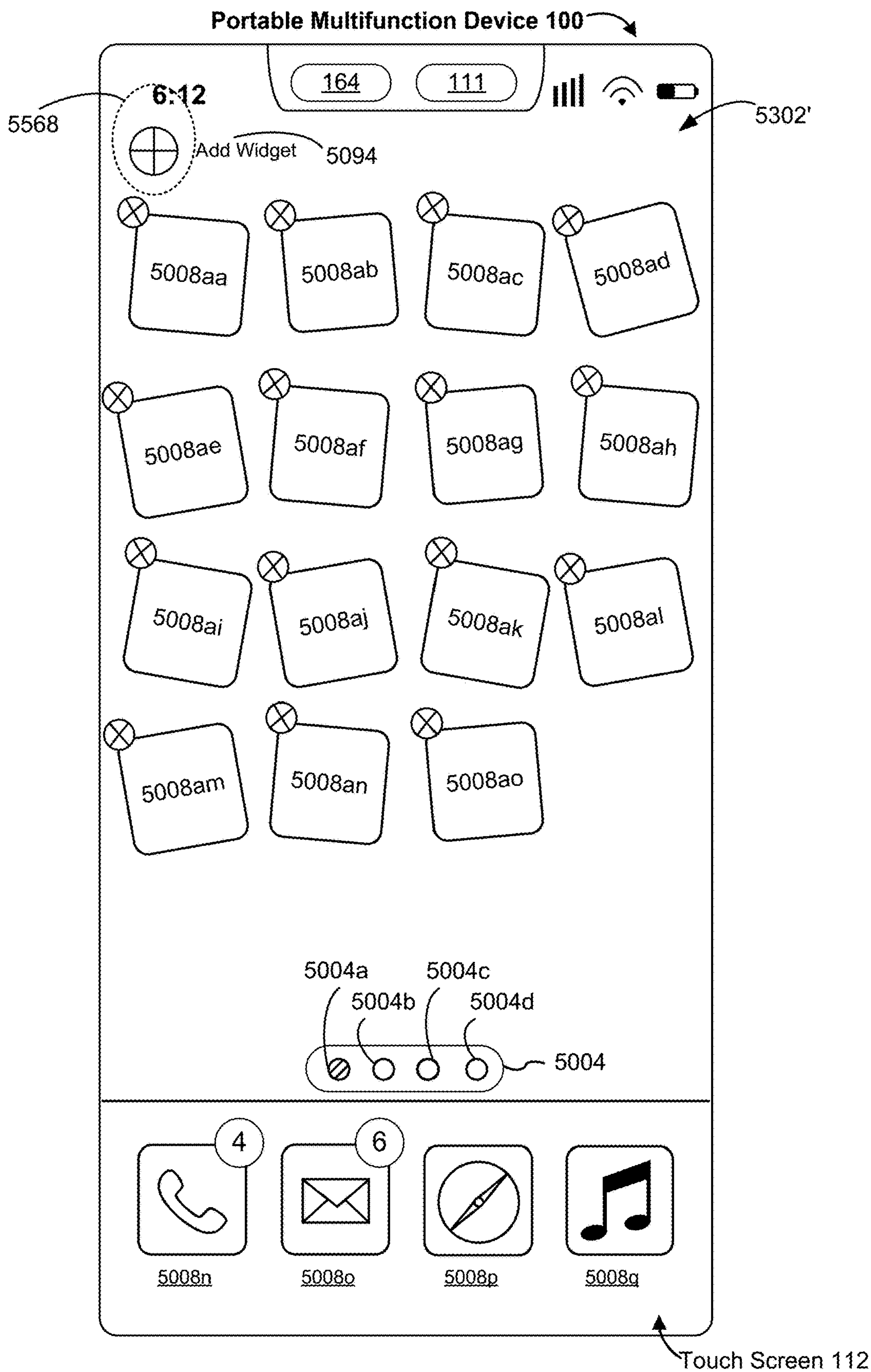
Figure 5C1

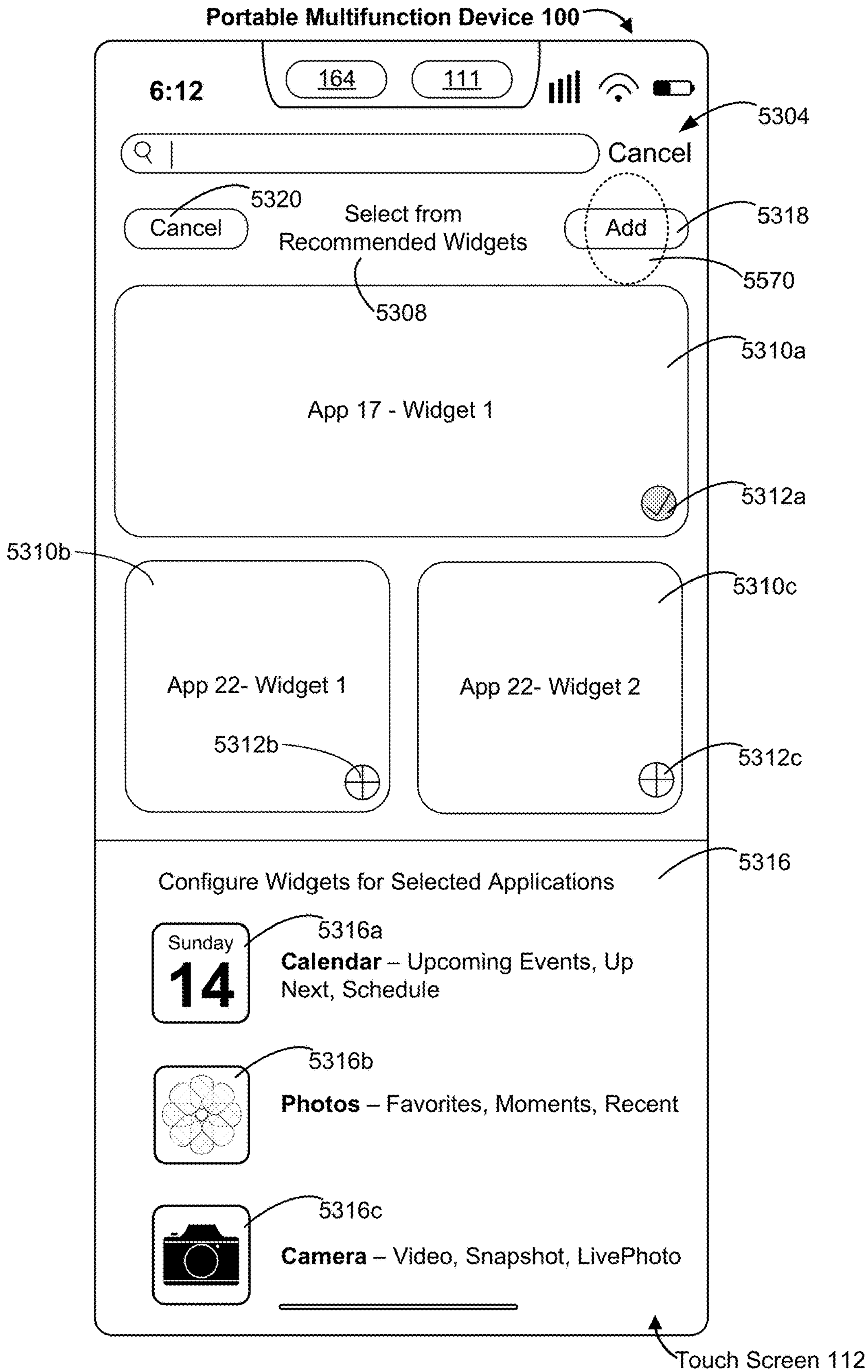
Figure 5C2

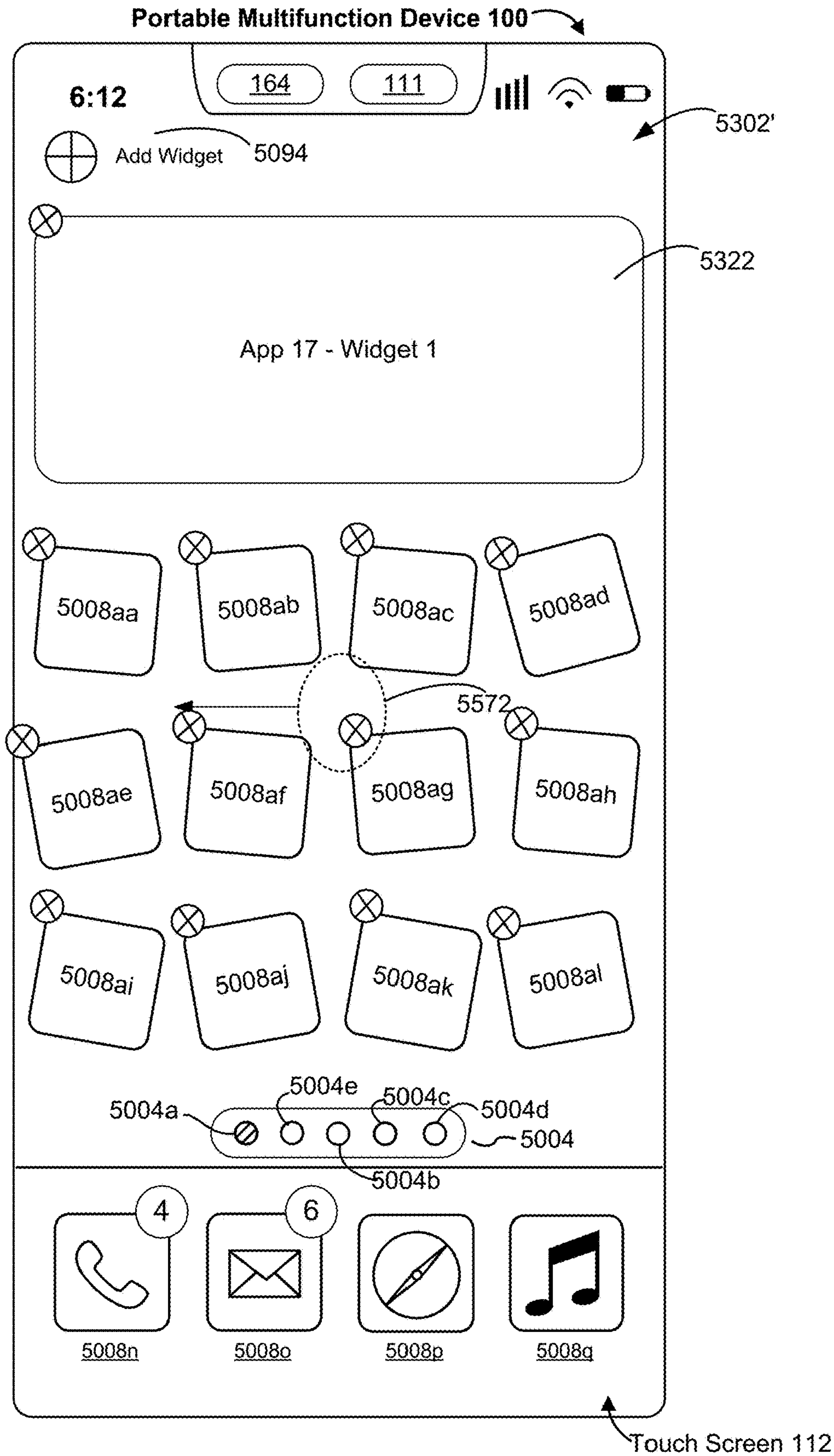
Figure 5C3

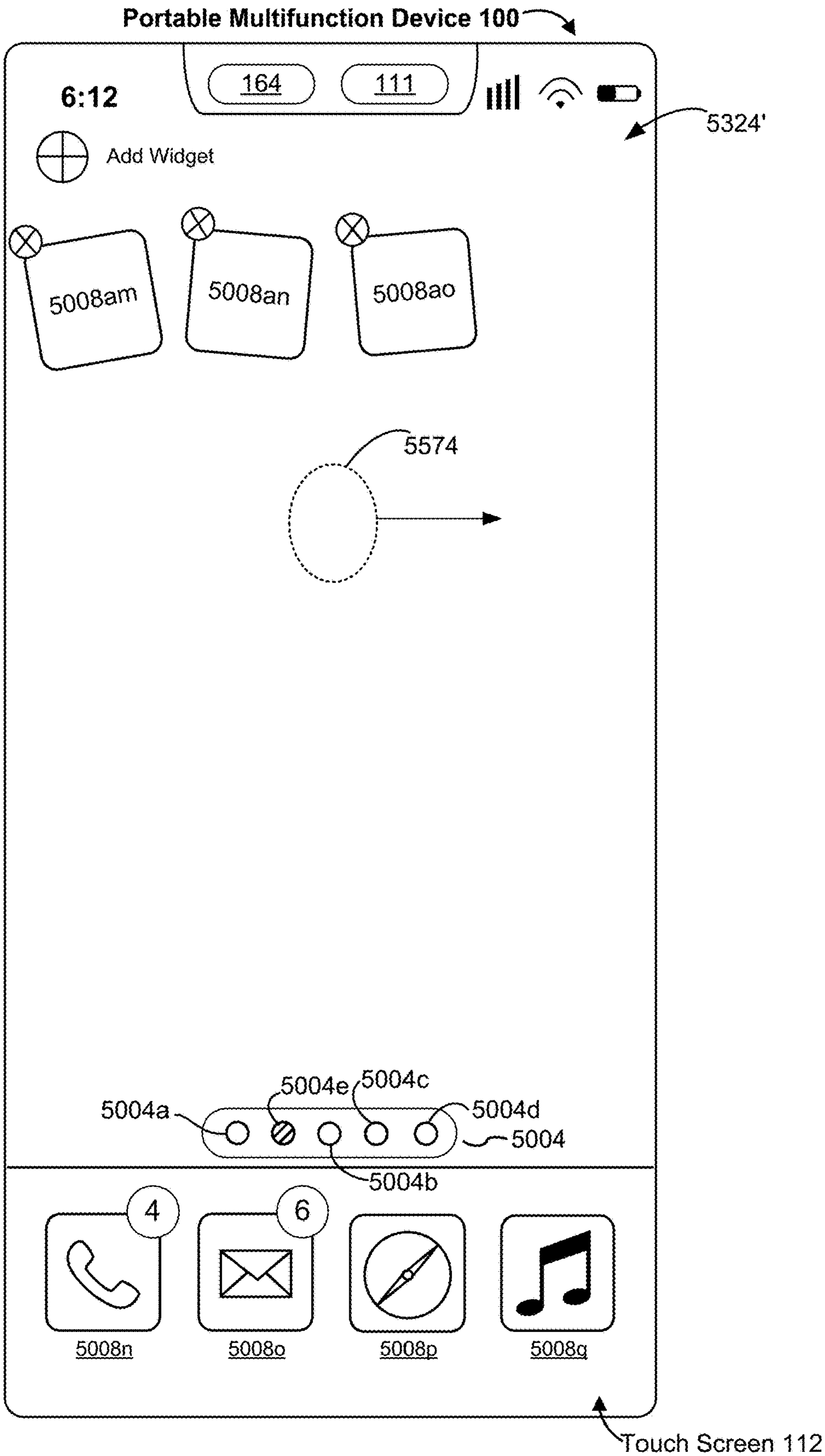
Figure 5C4

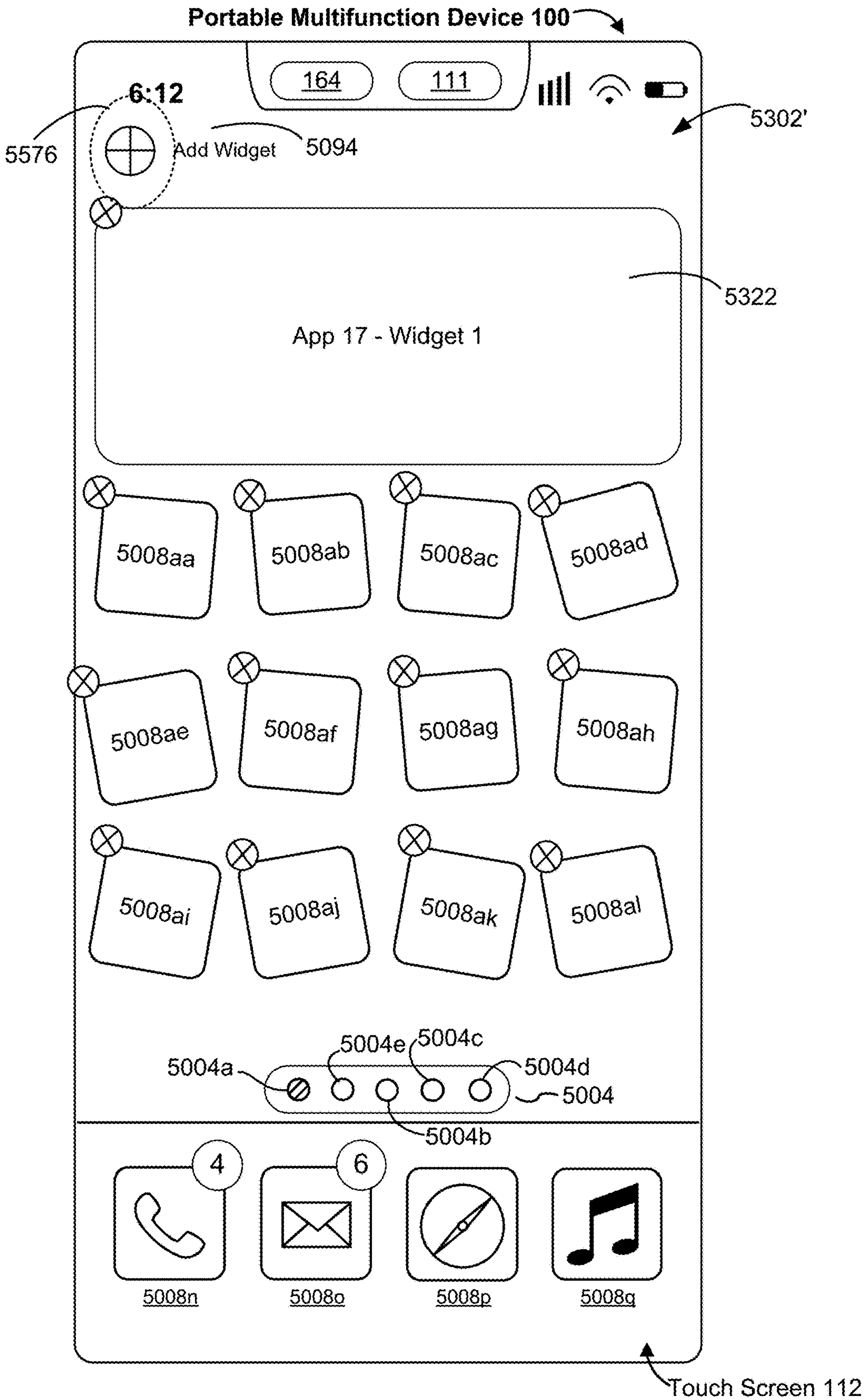
Figure 5C5

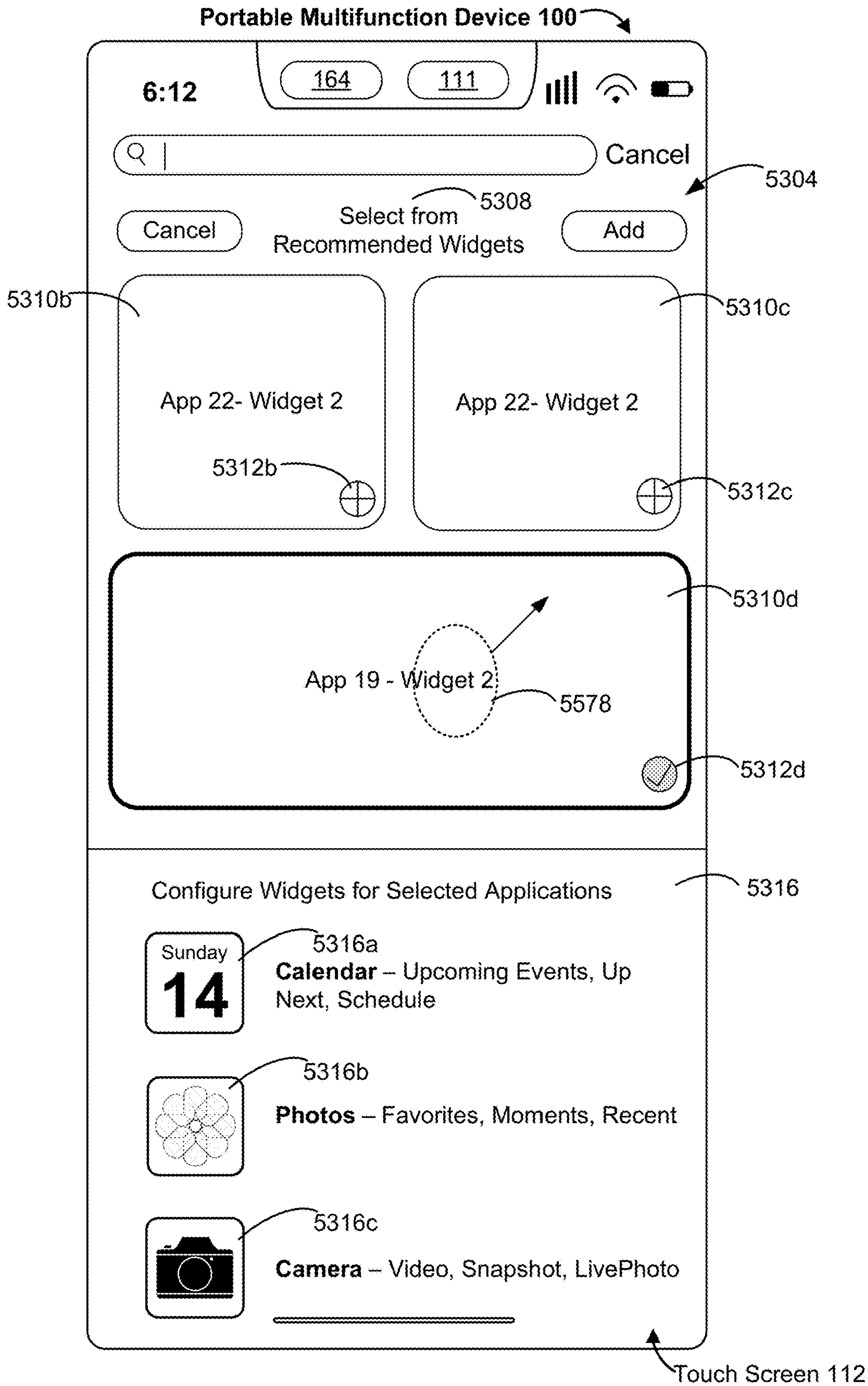
Figure 5C6

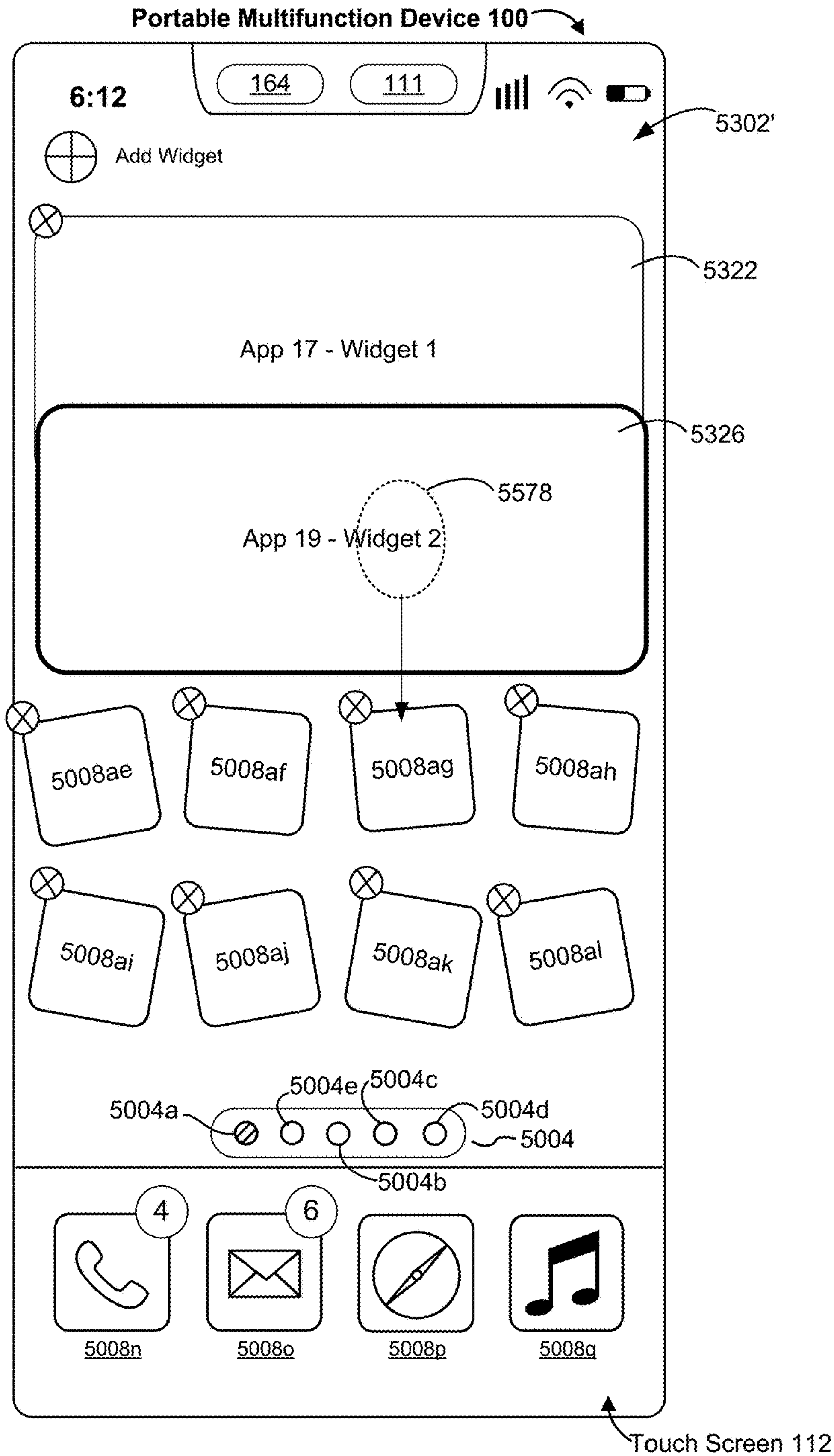
Figure 5C7

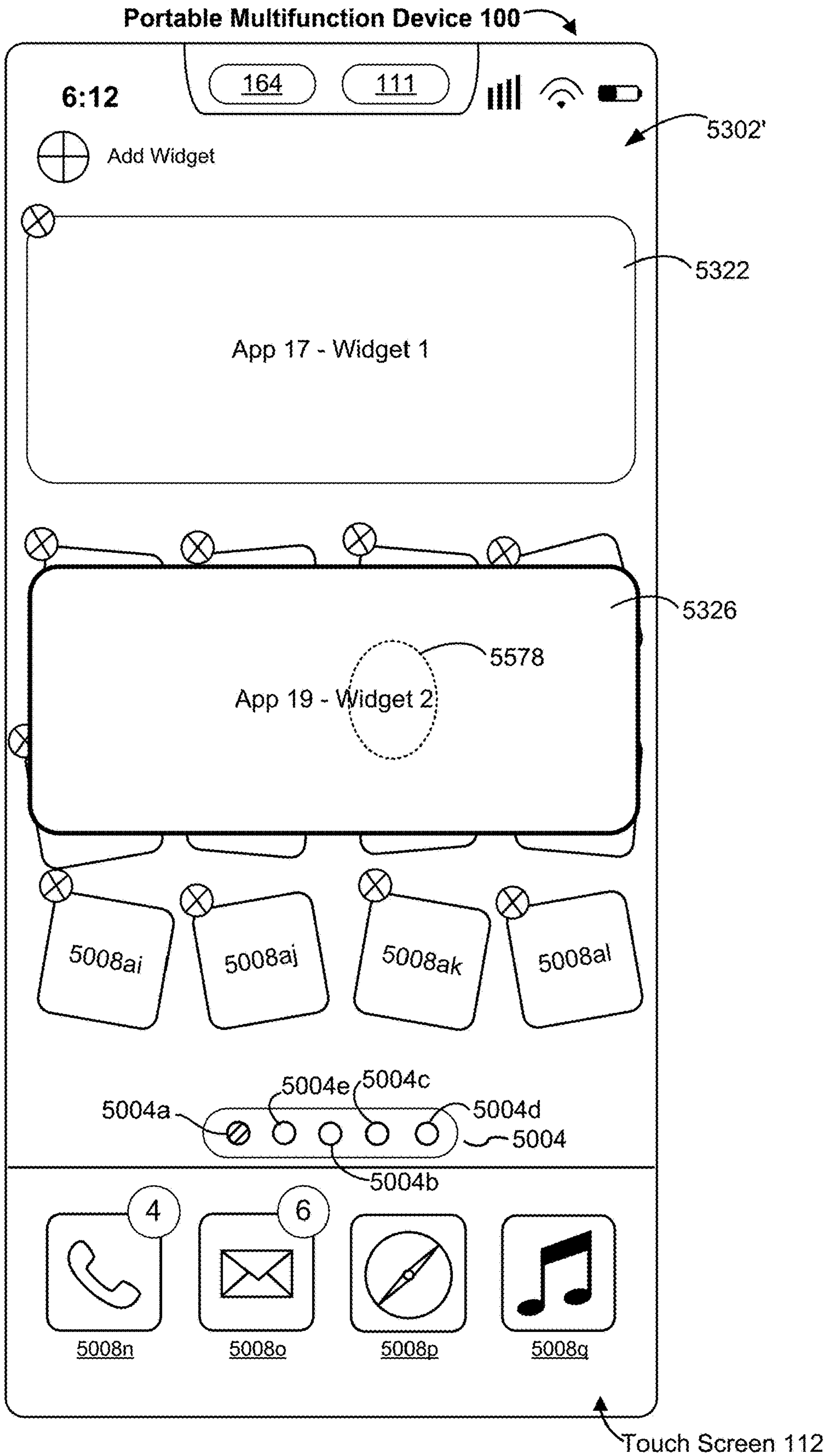
Figure 5C8

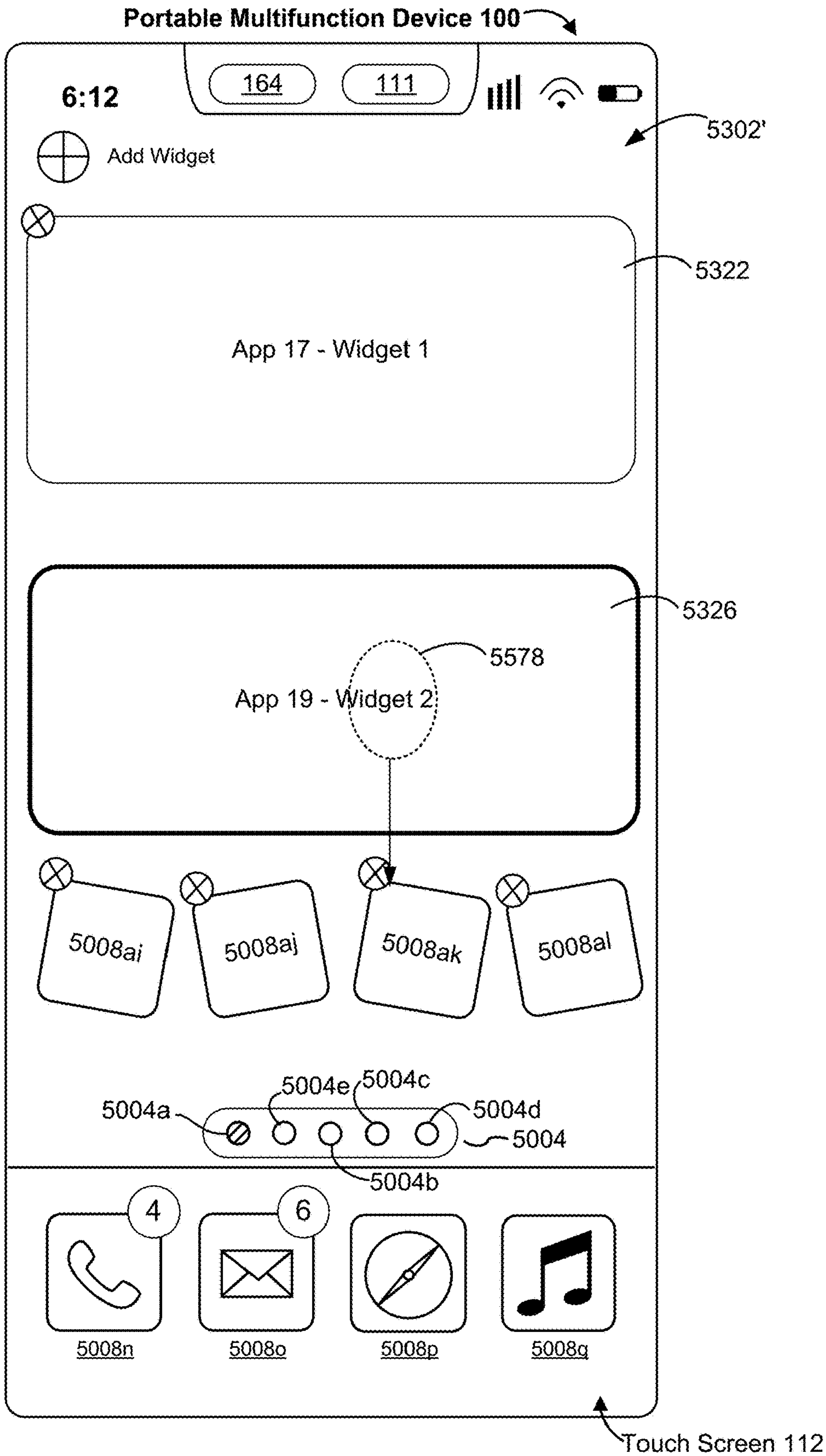
Figure 5C9

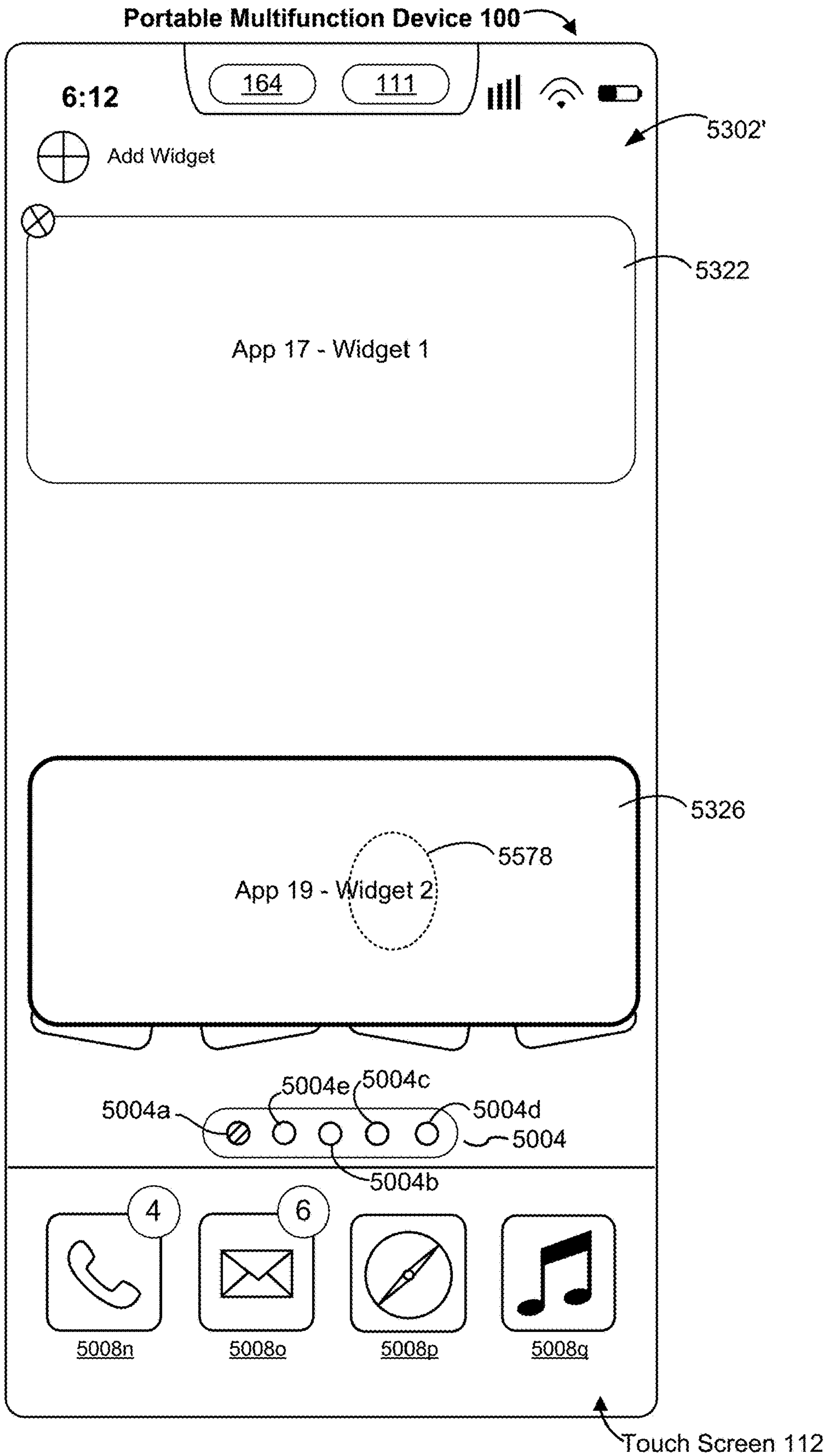
Figure 5C10

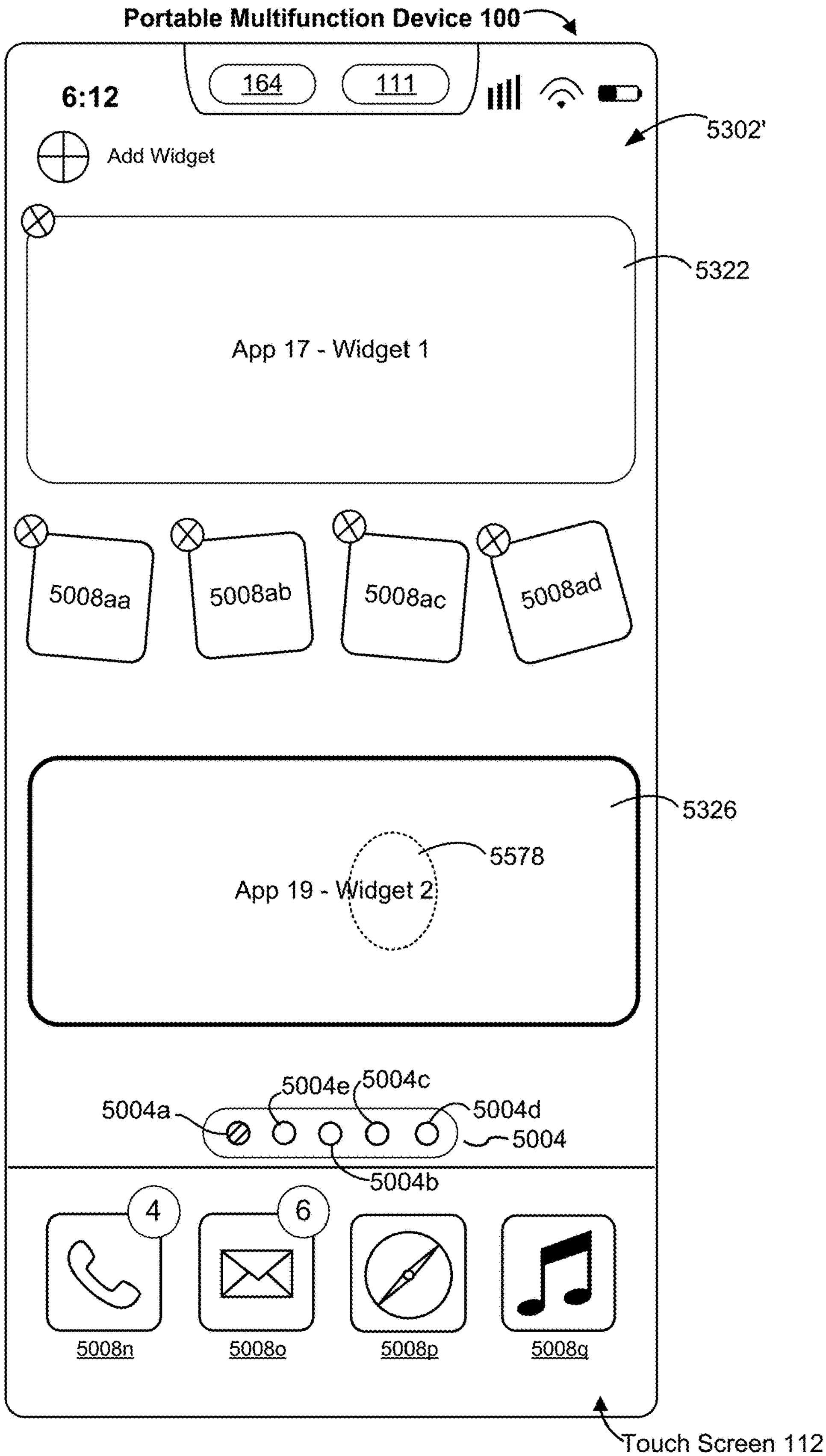
Figure 5C11

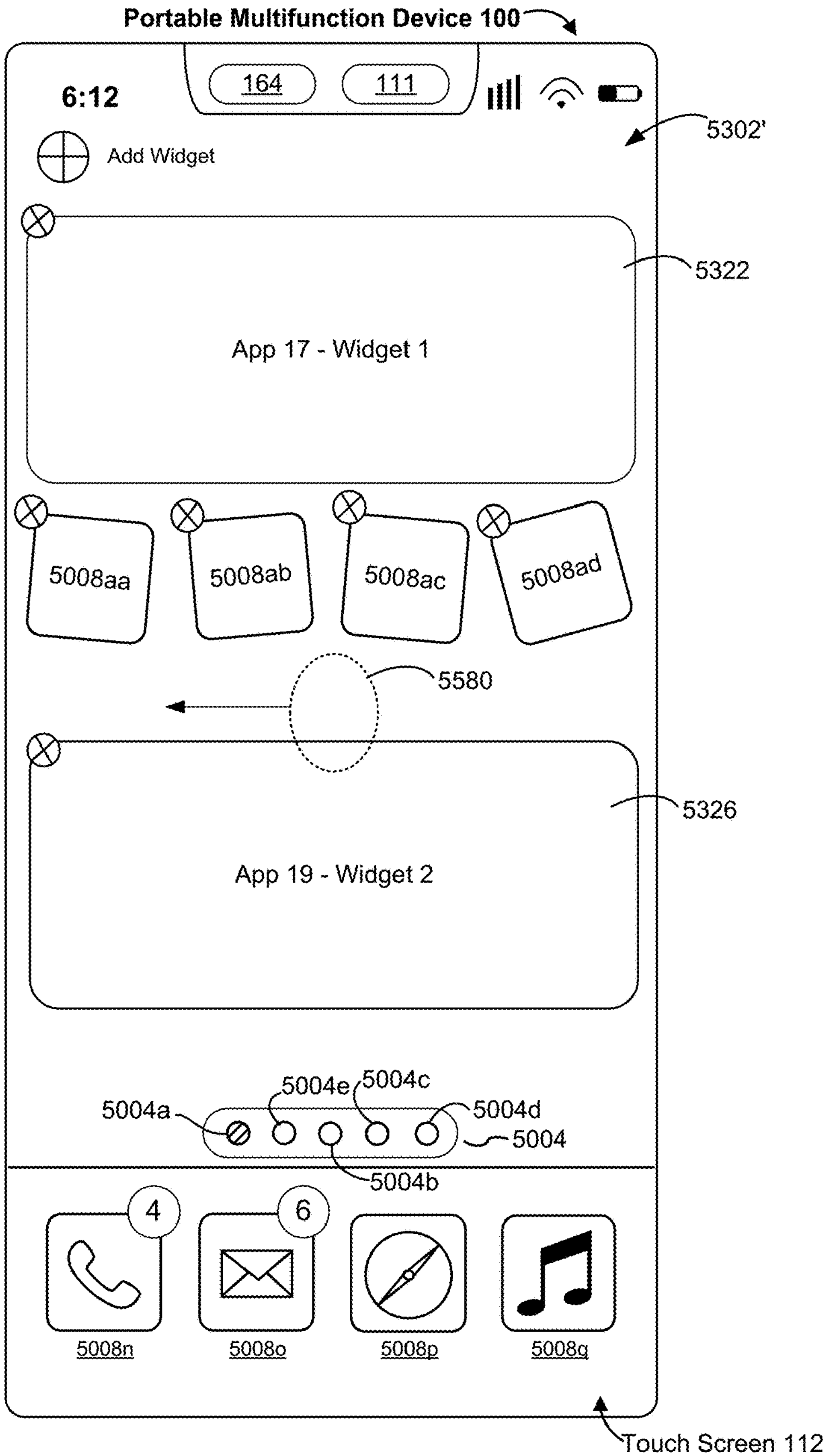
Figure 5C12

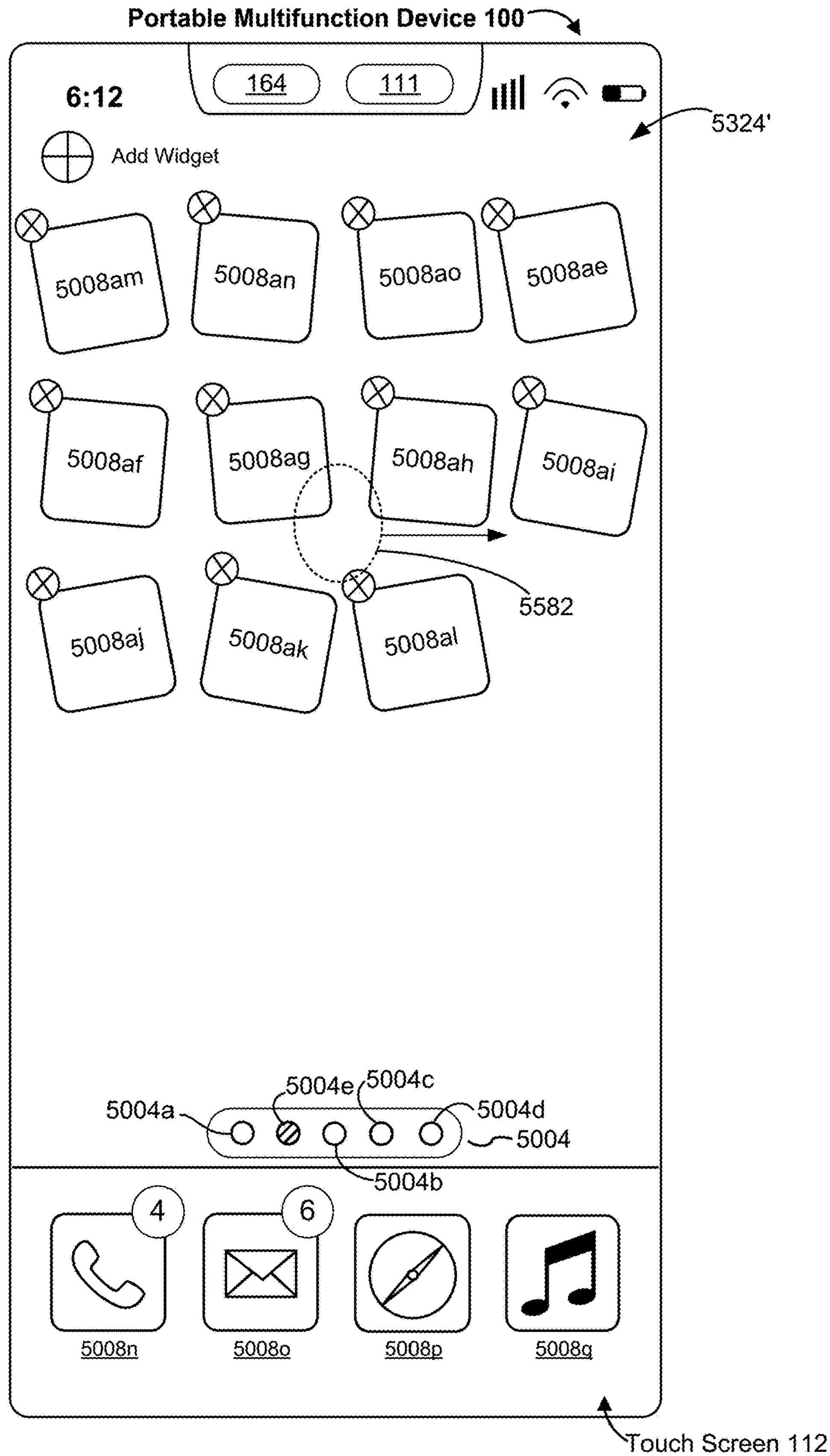
Figure 5C13

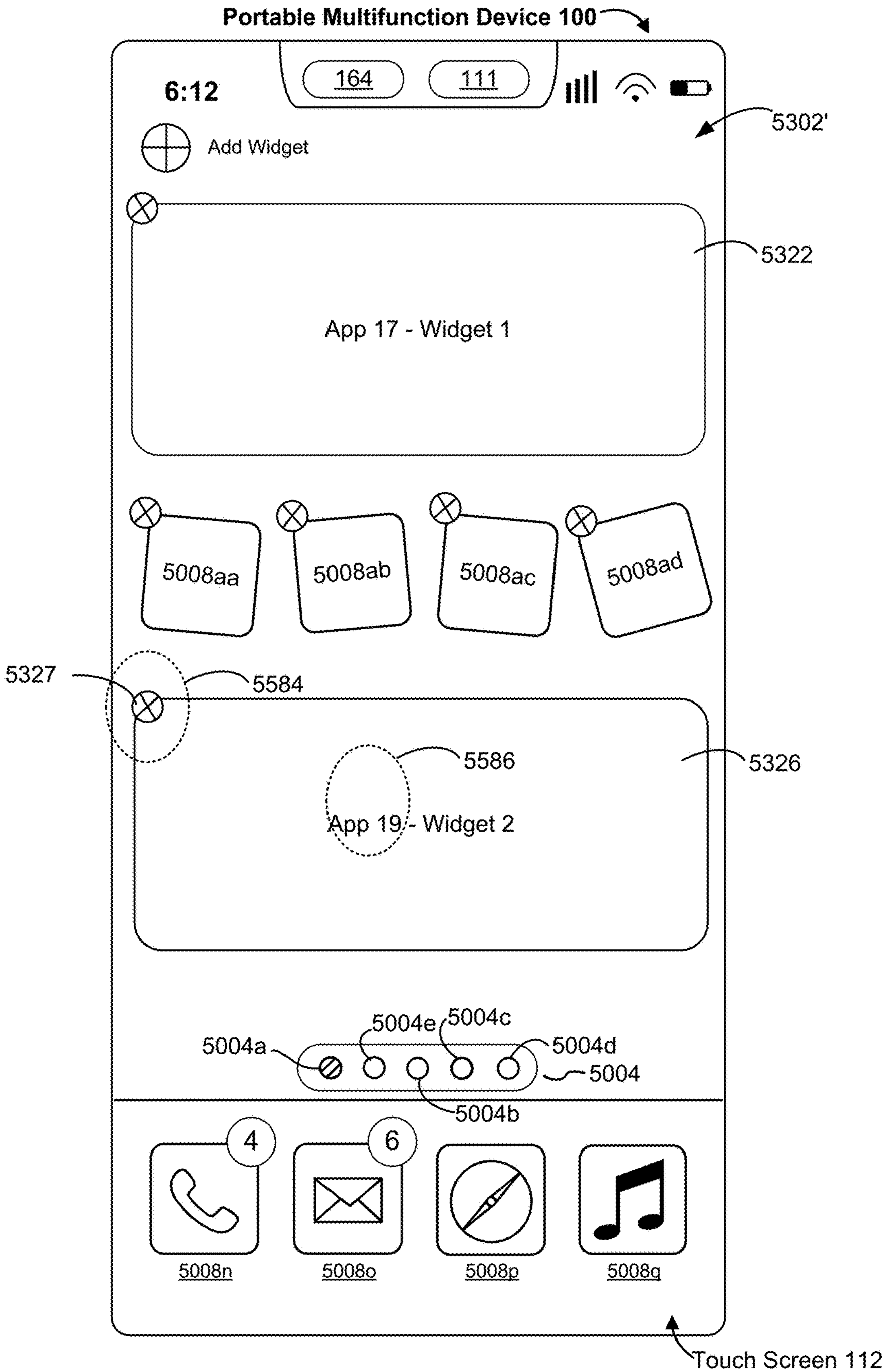
Figure 5C14

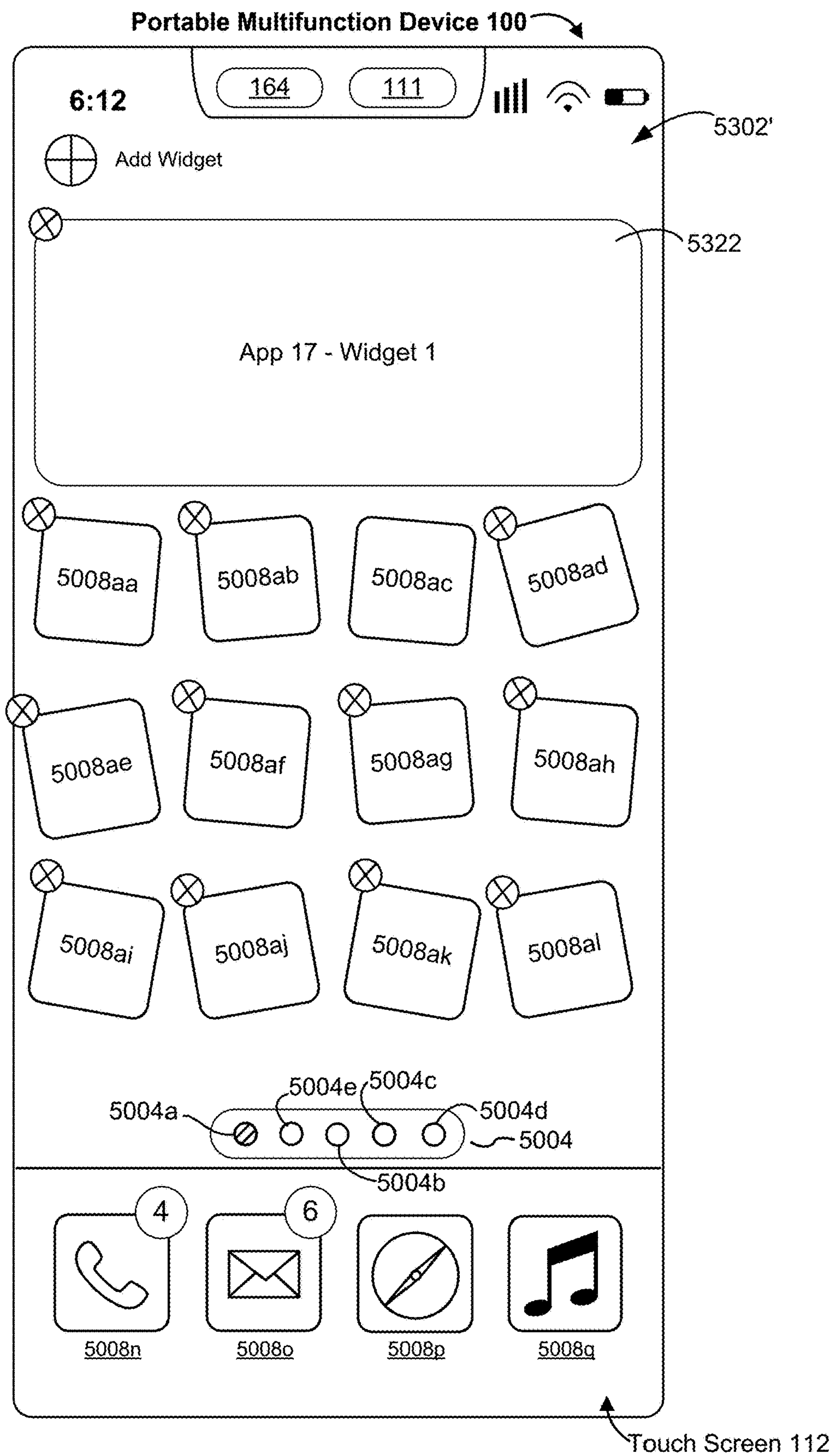
Figure 5C15

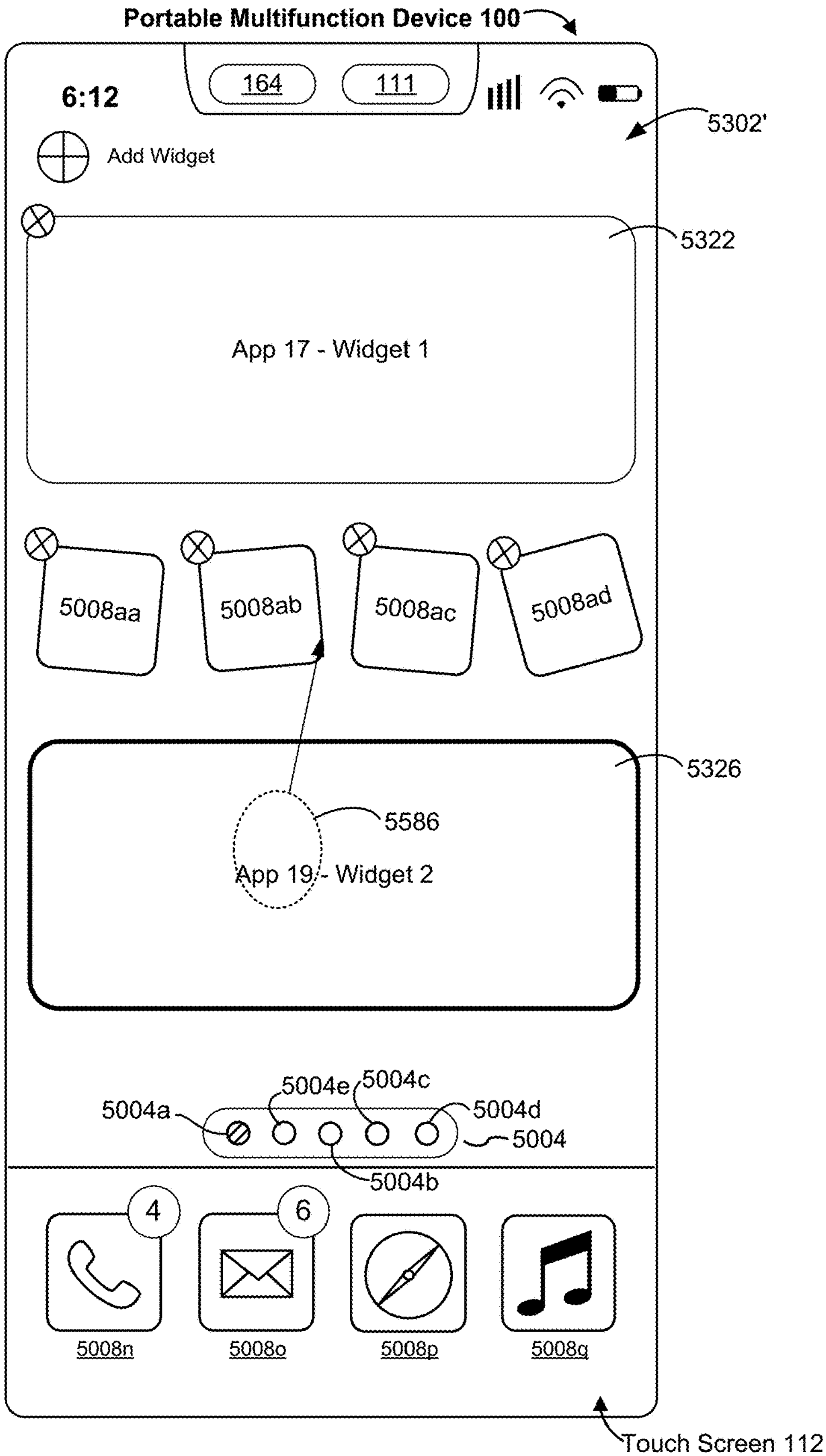
Figure 5C16

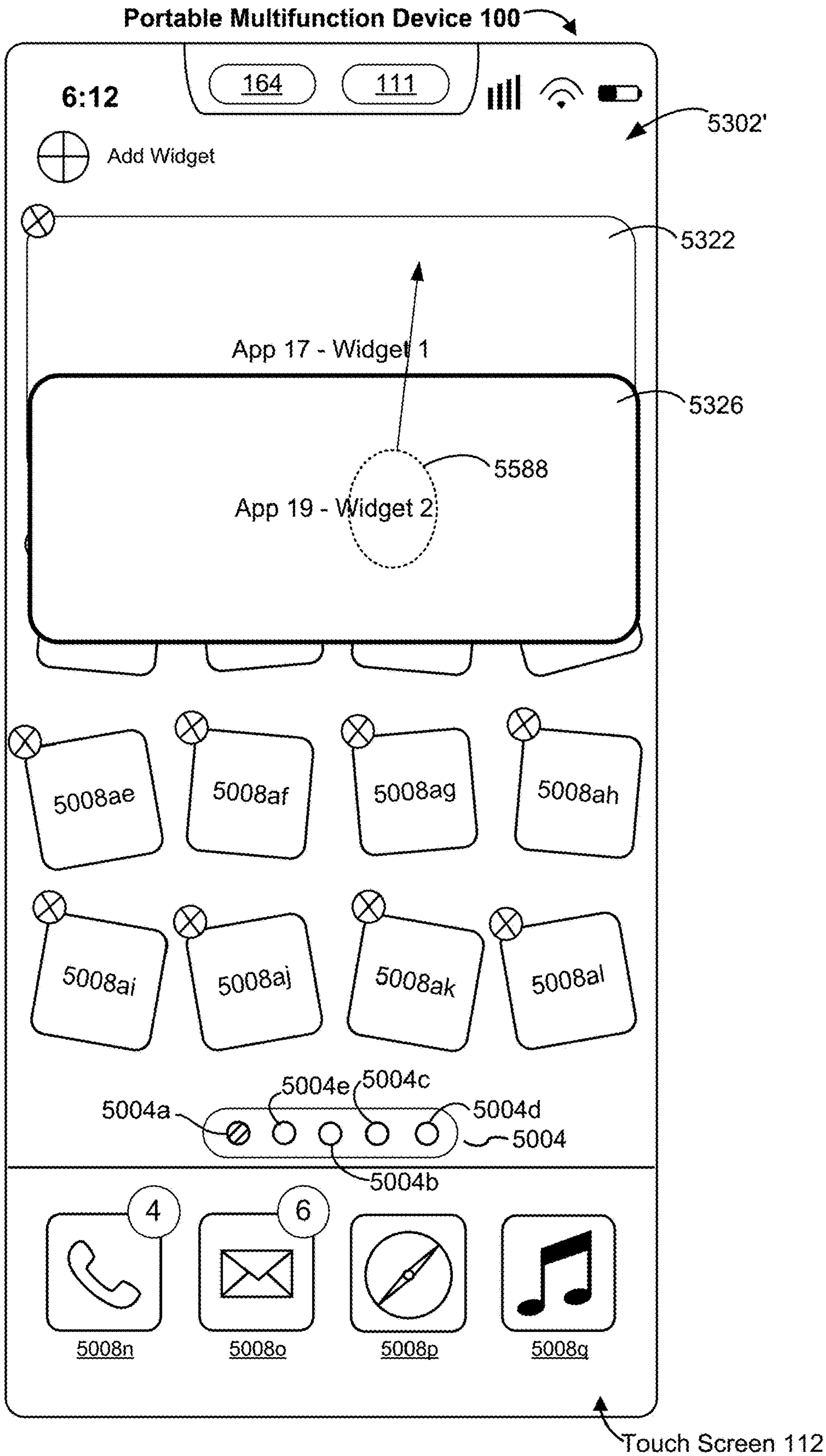
Figure 5C17

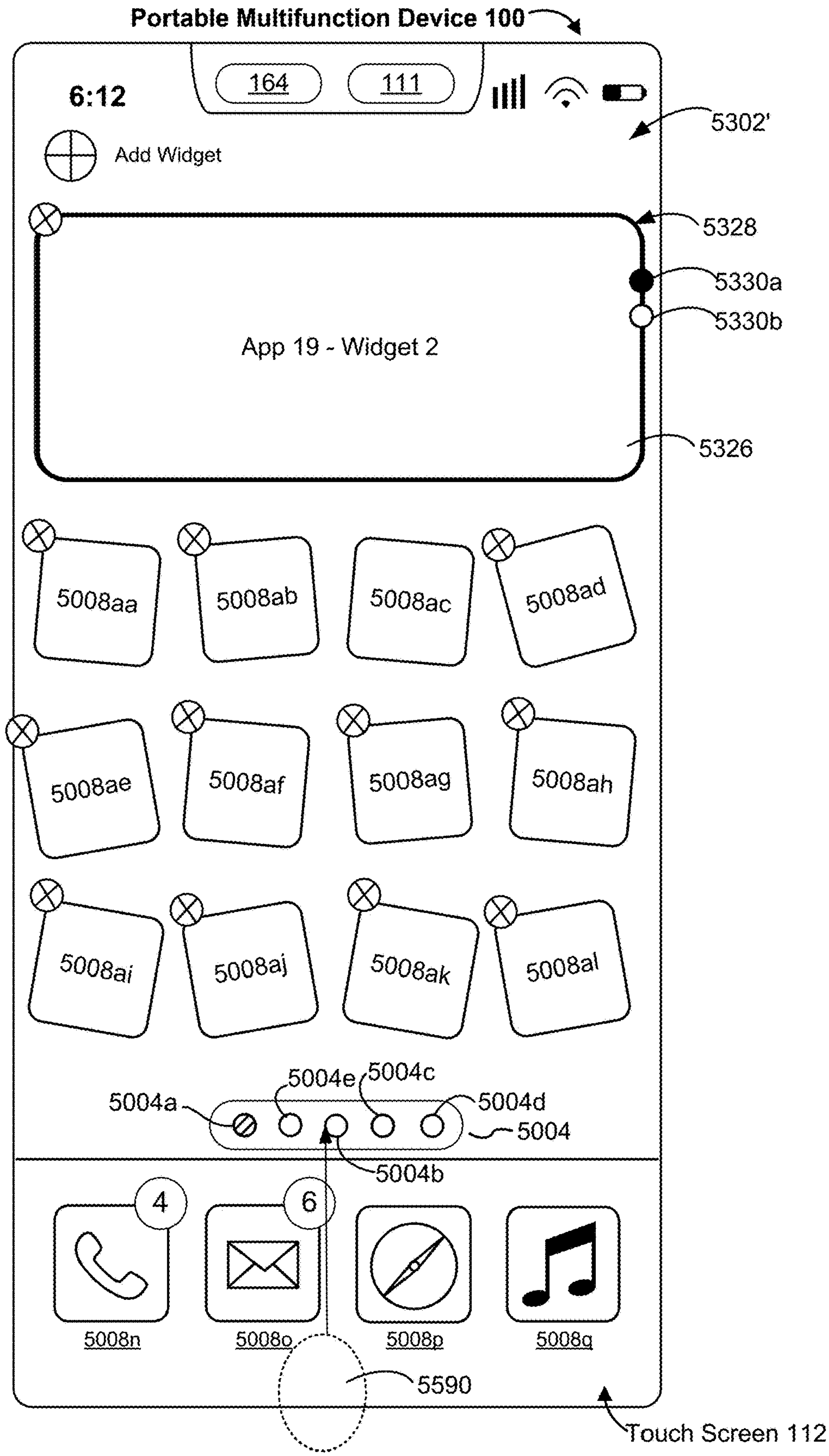
Figure 5C18

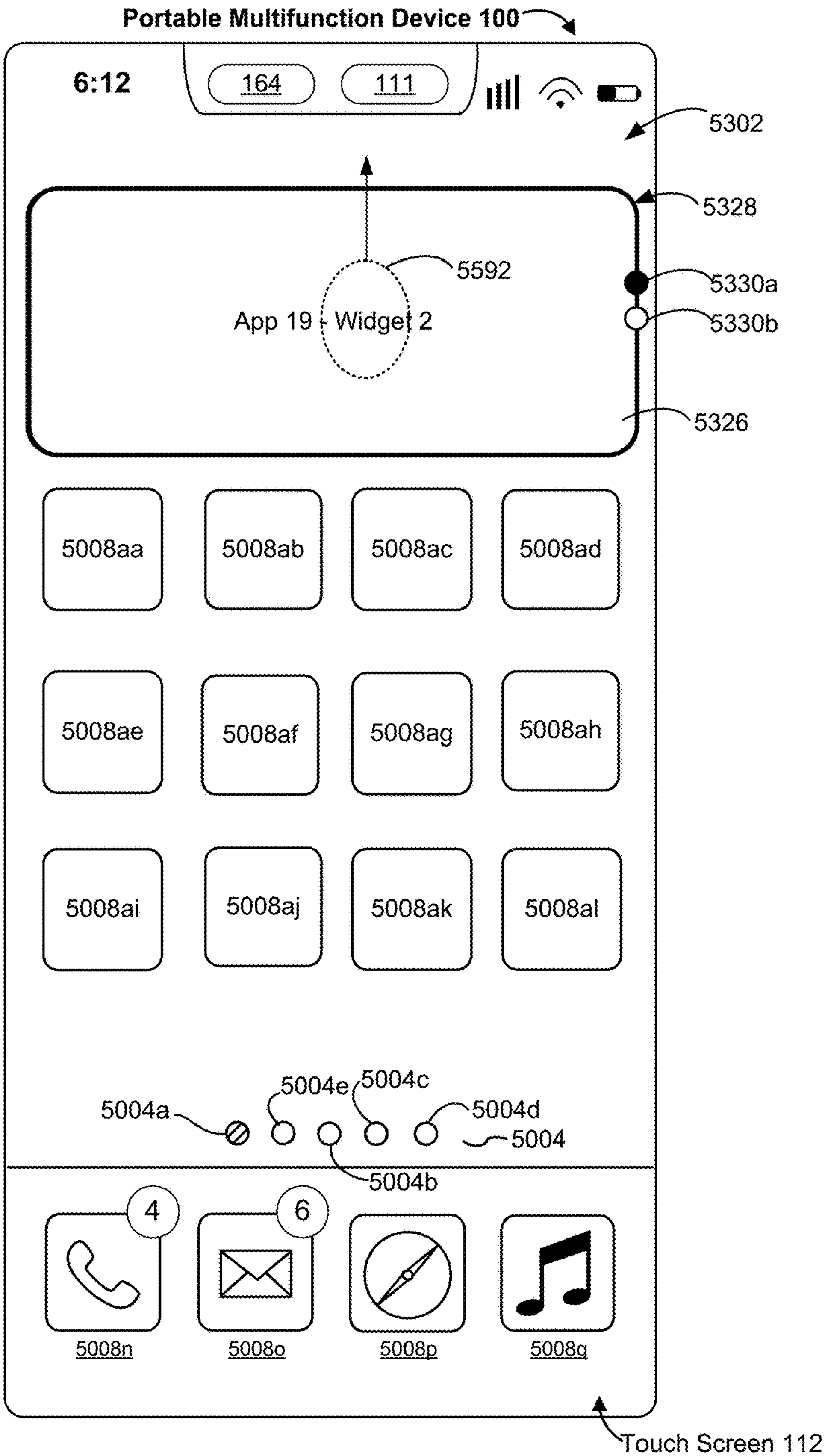
Figure 5C19

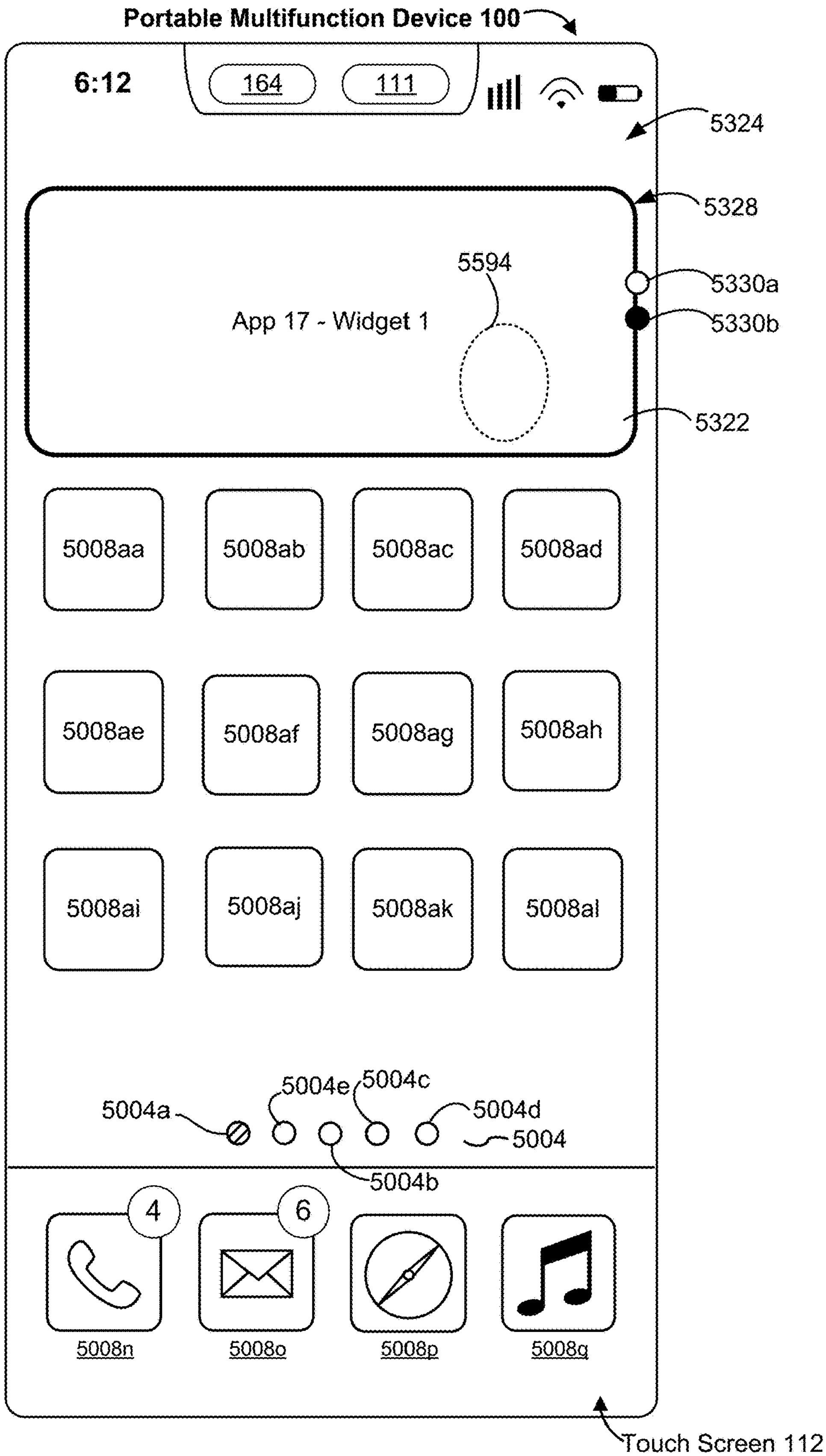
Figure 5C20

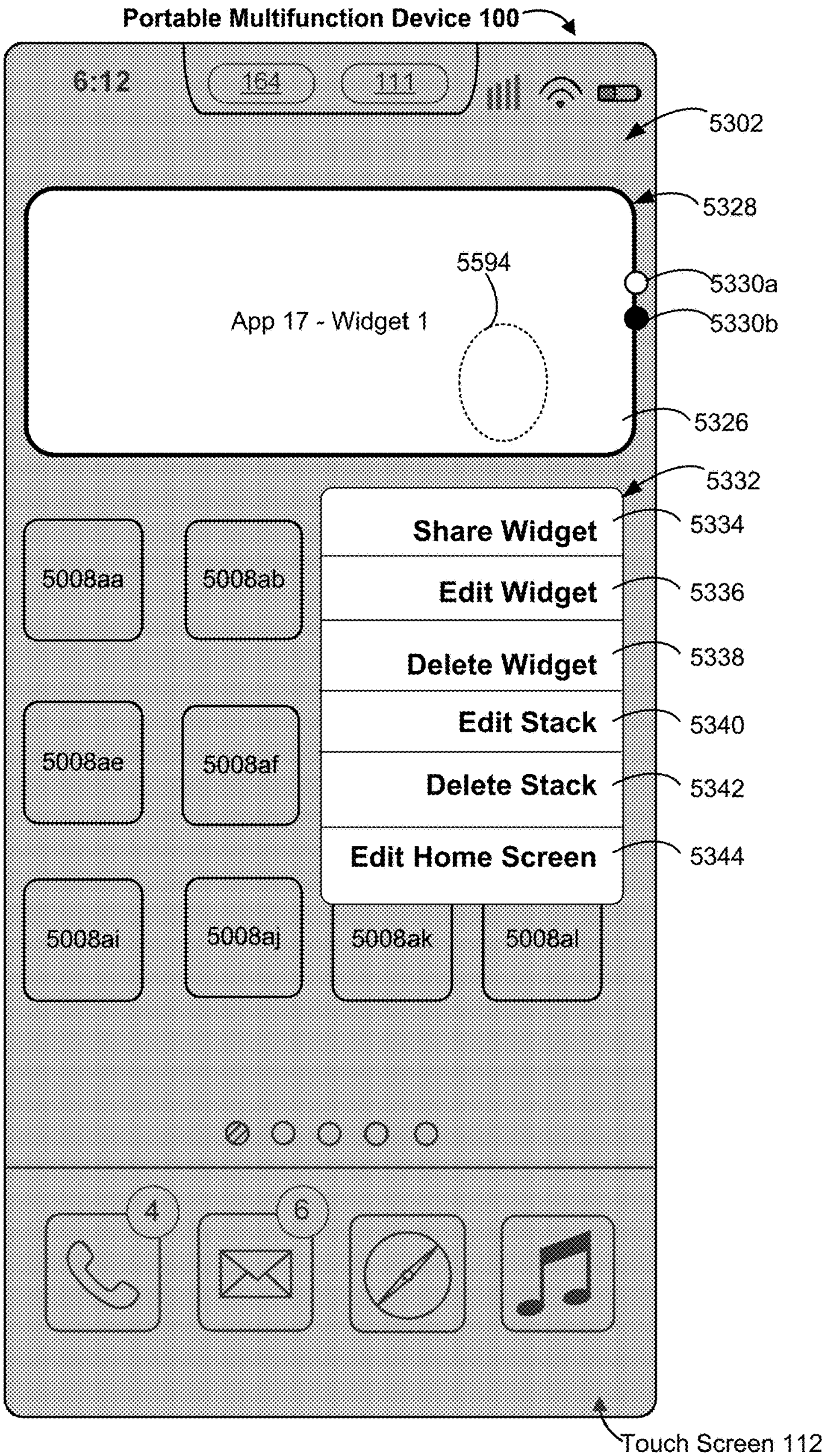
Figure 5C21

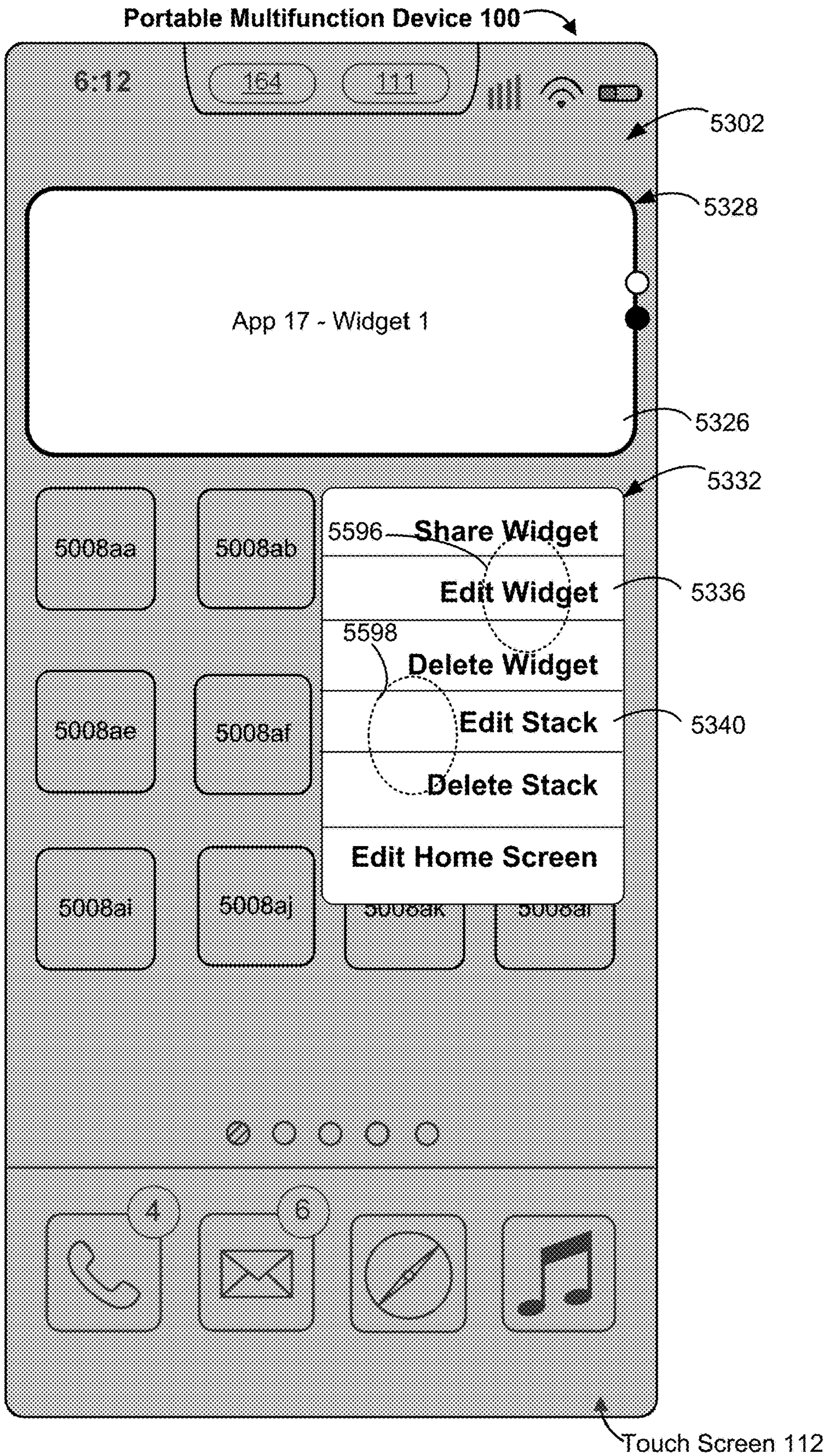
Figure 5C22

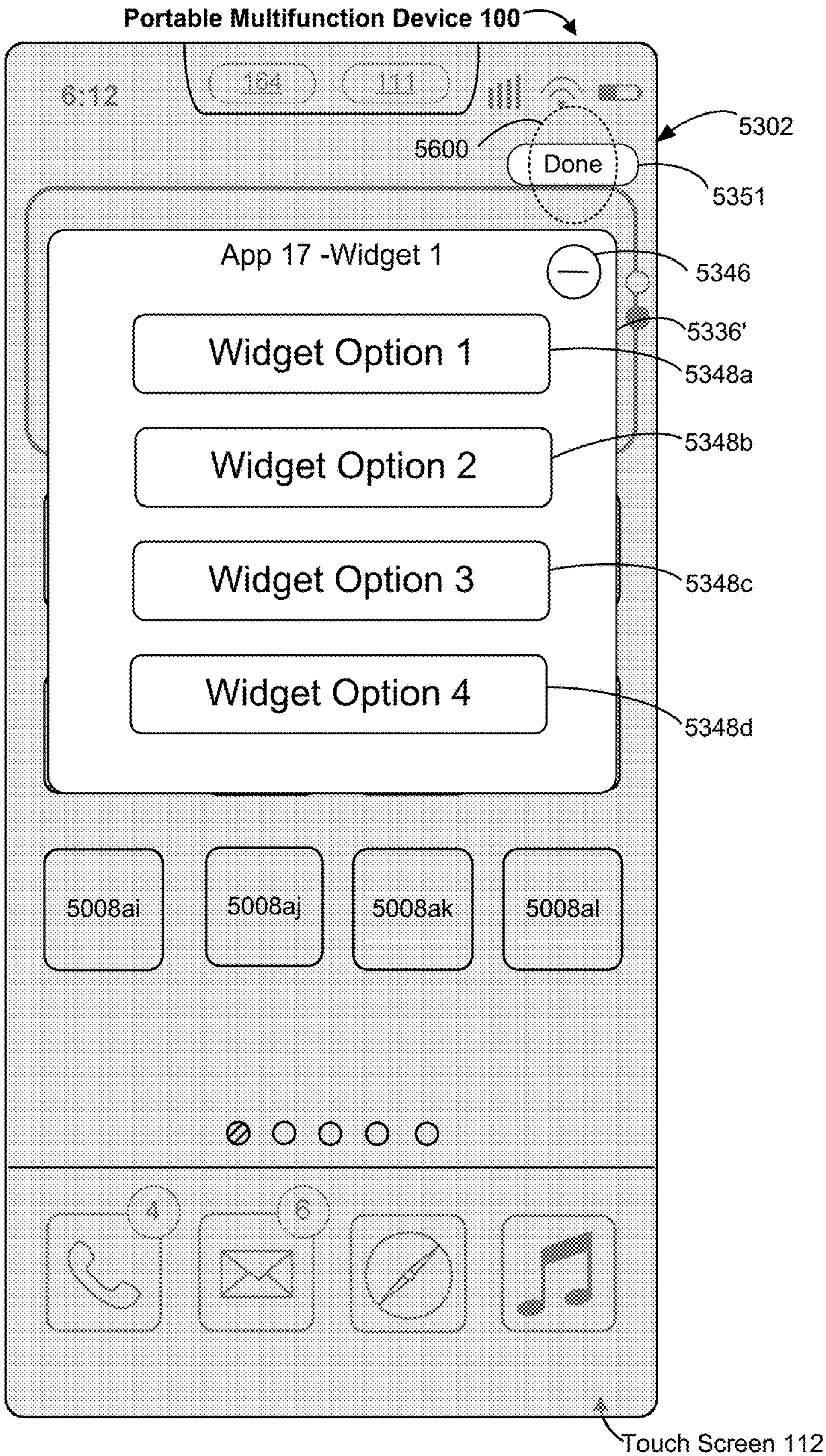
Figure 5C23

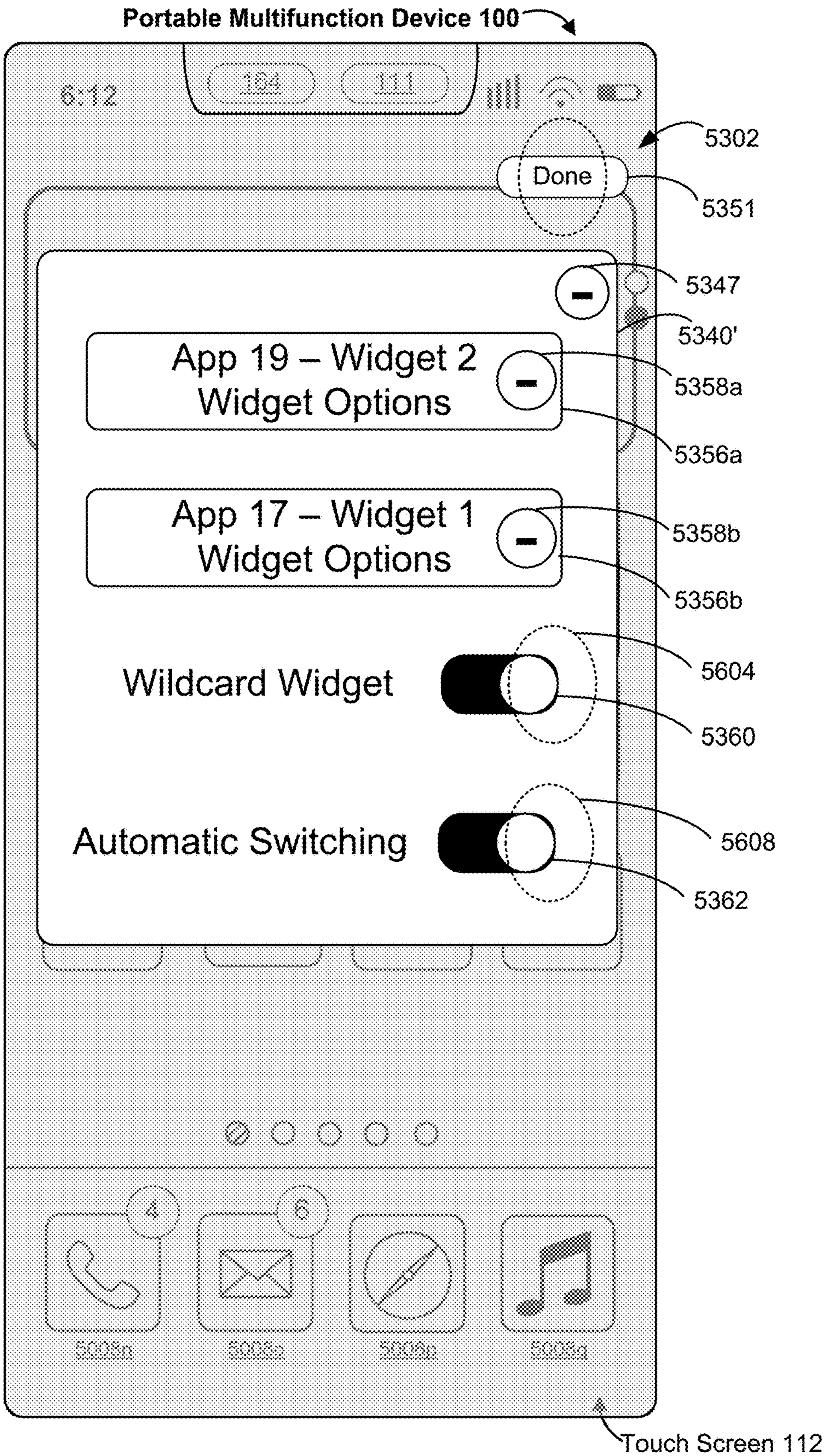
Figure 5C24

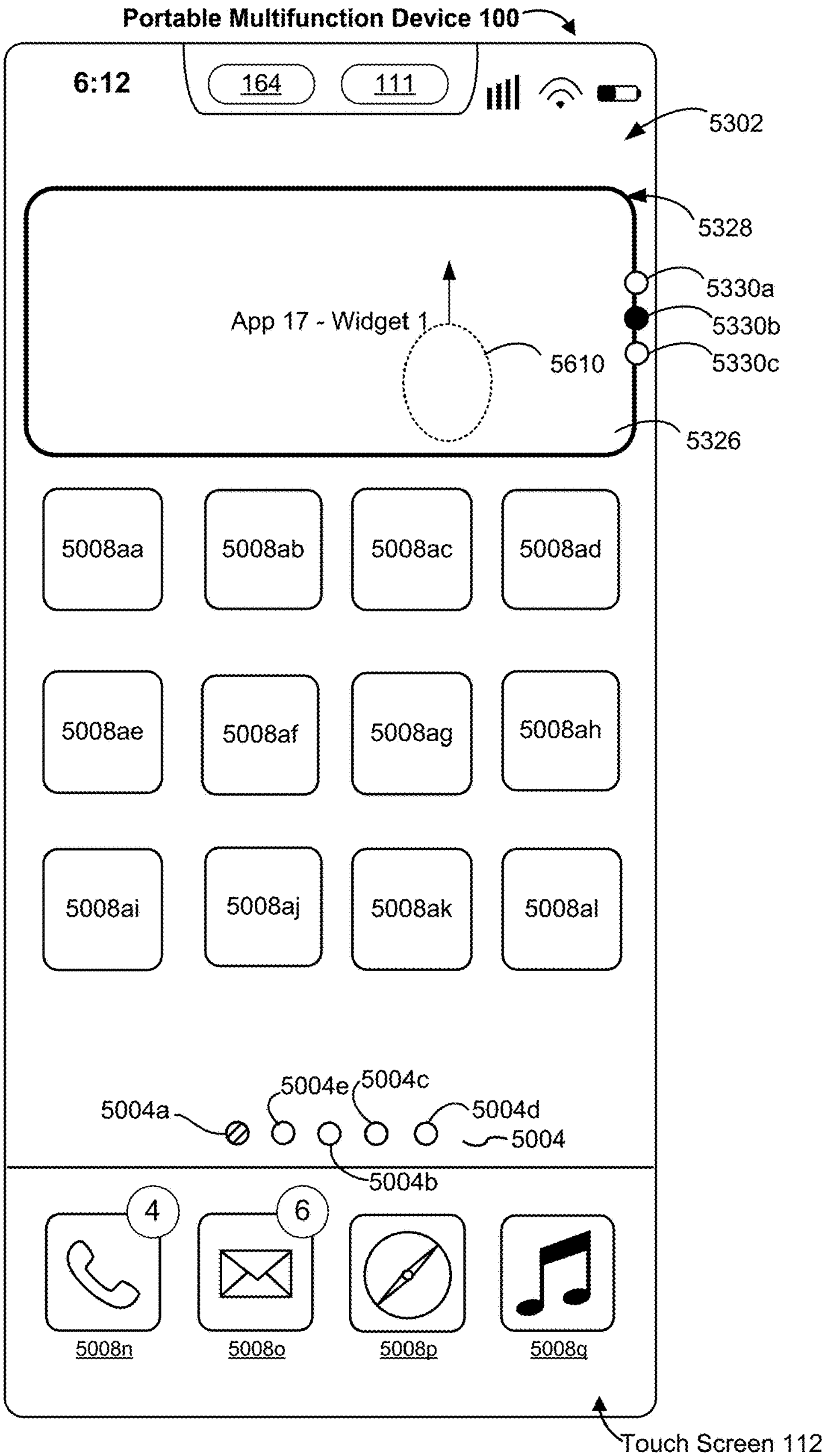
Figure 5C25

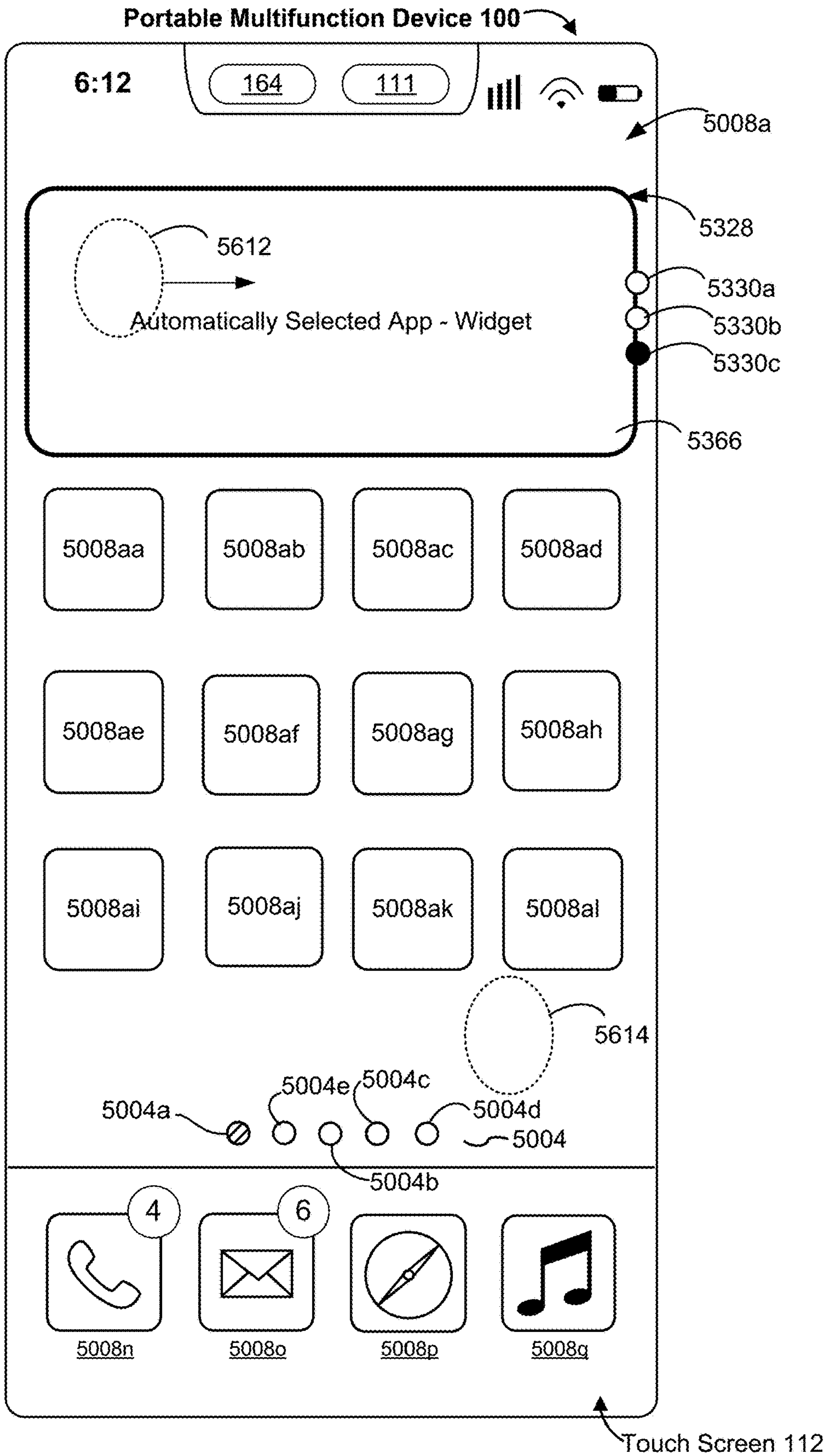
Figure 5C26

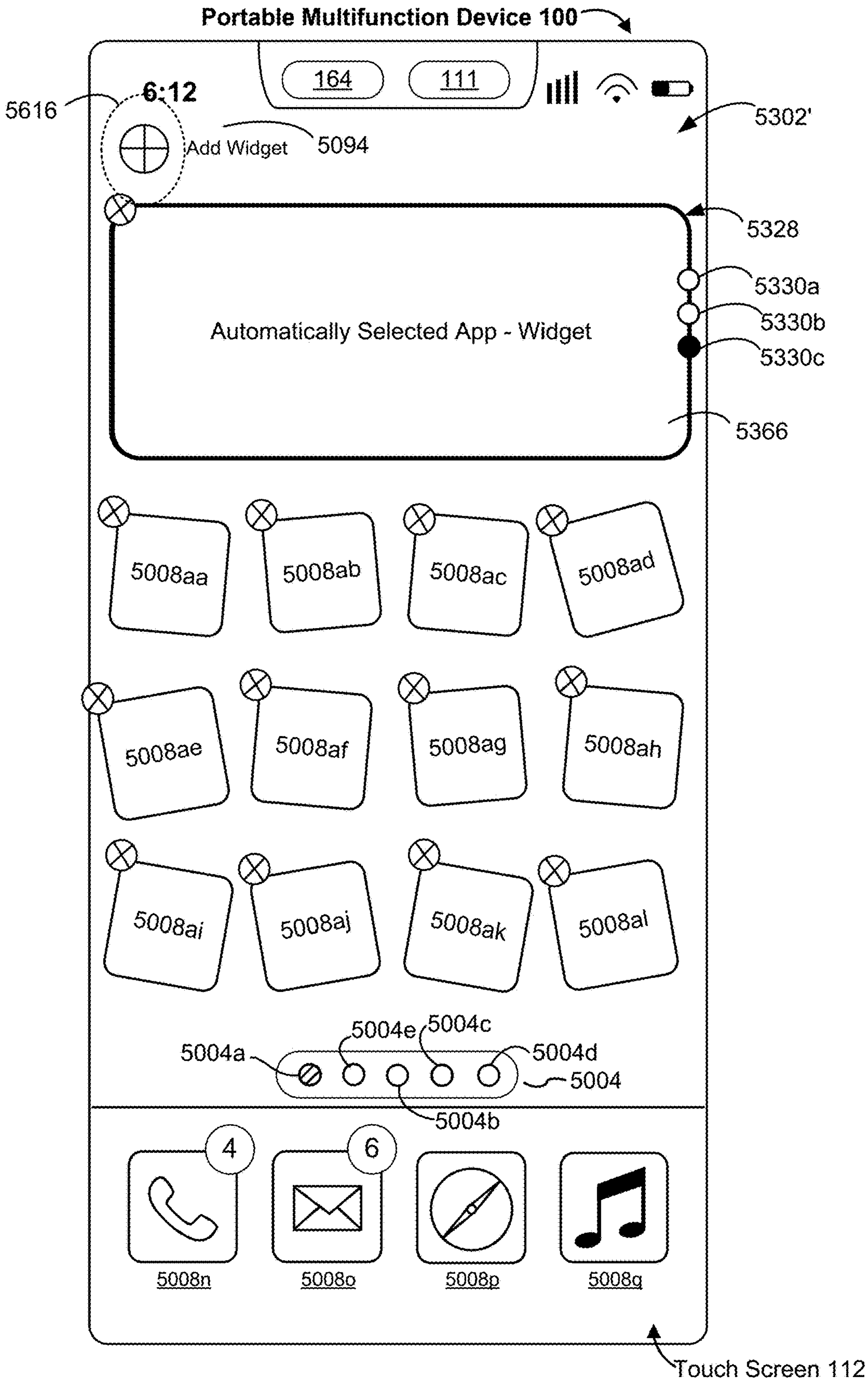
Figure 5C27

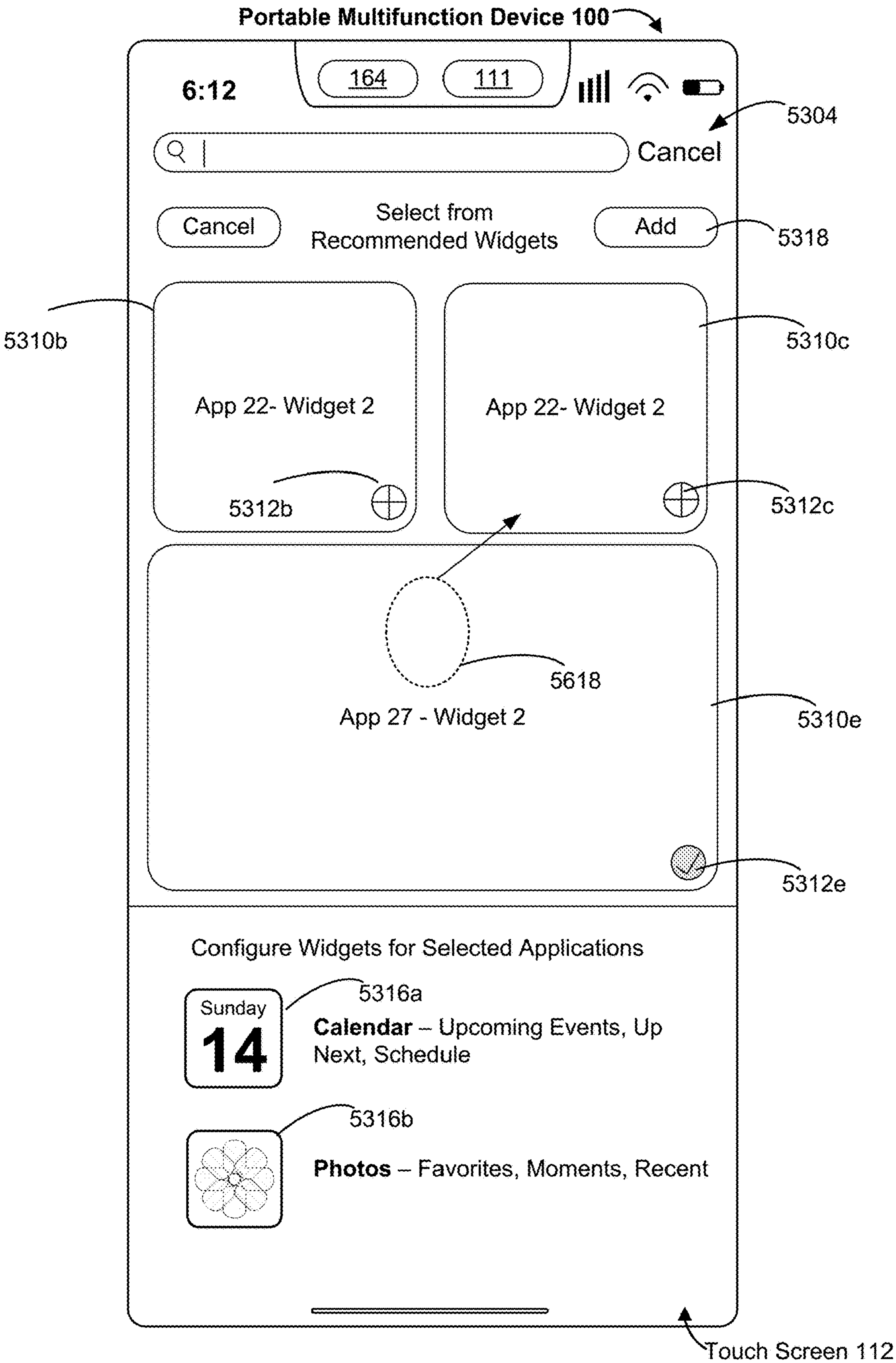
Figure 5C28

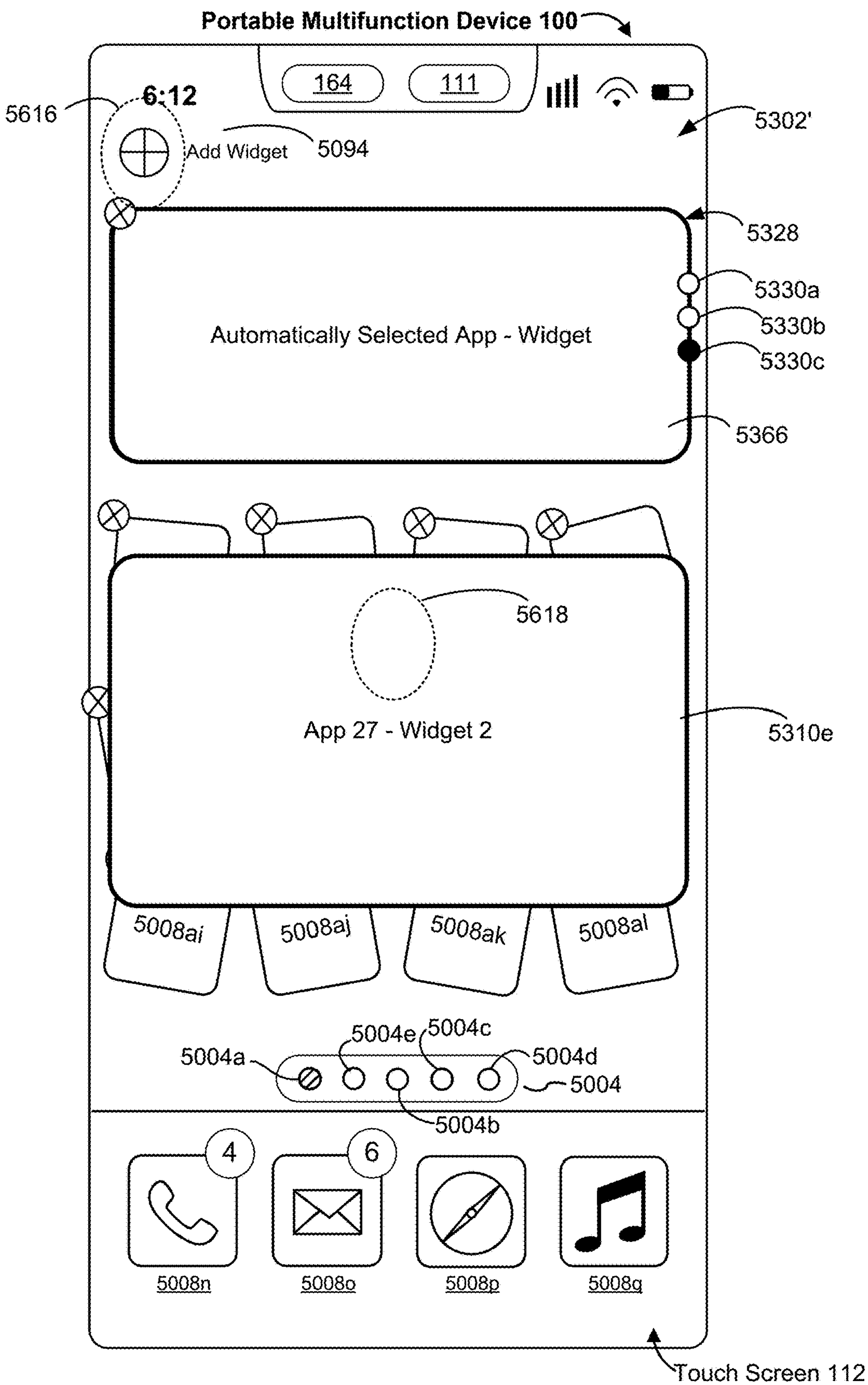
Figure 5C29

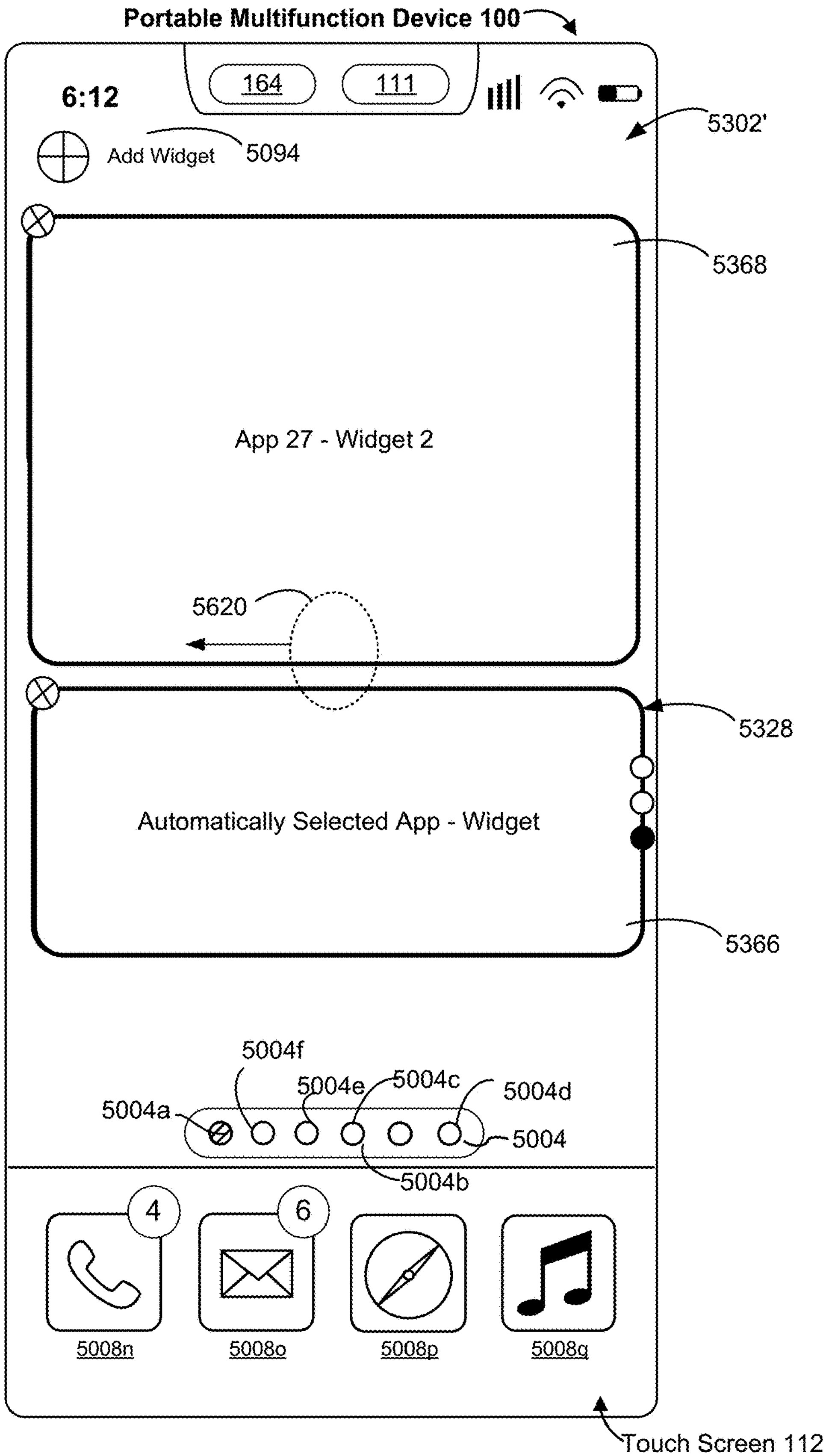
Figure 5C30

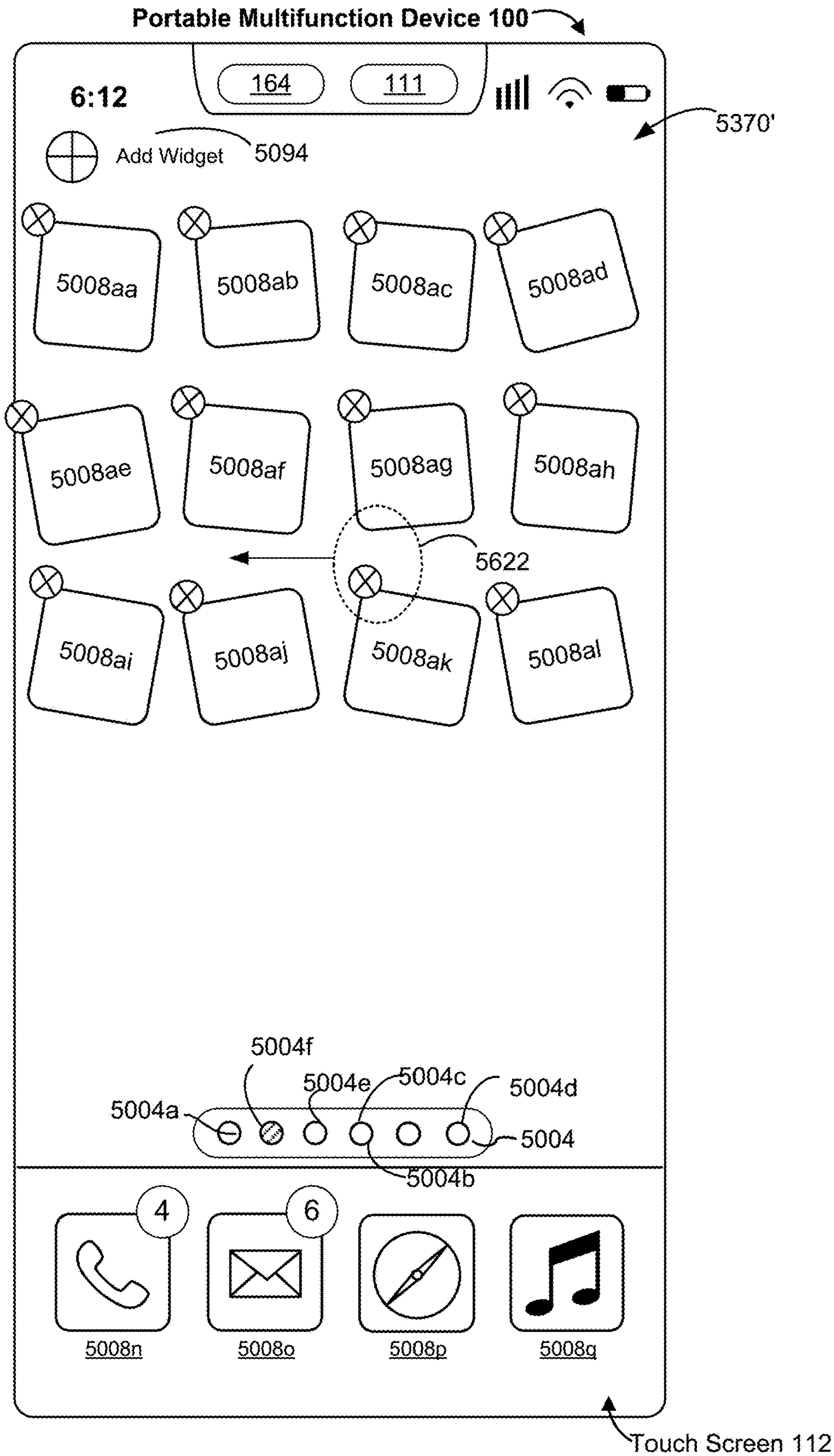
Figure 5C31

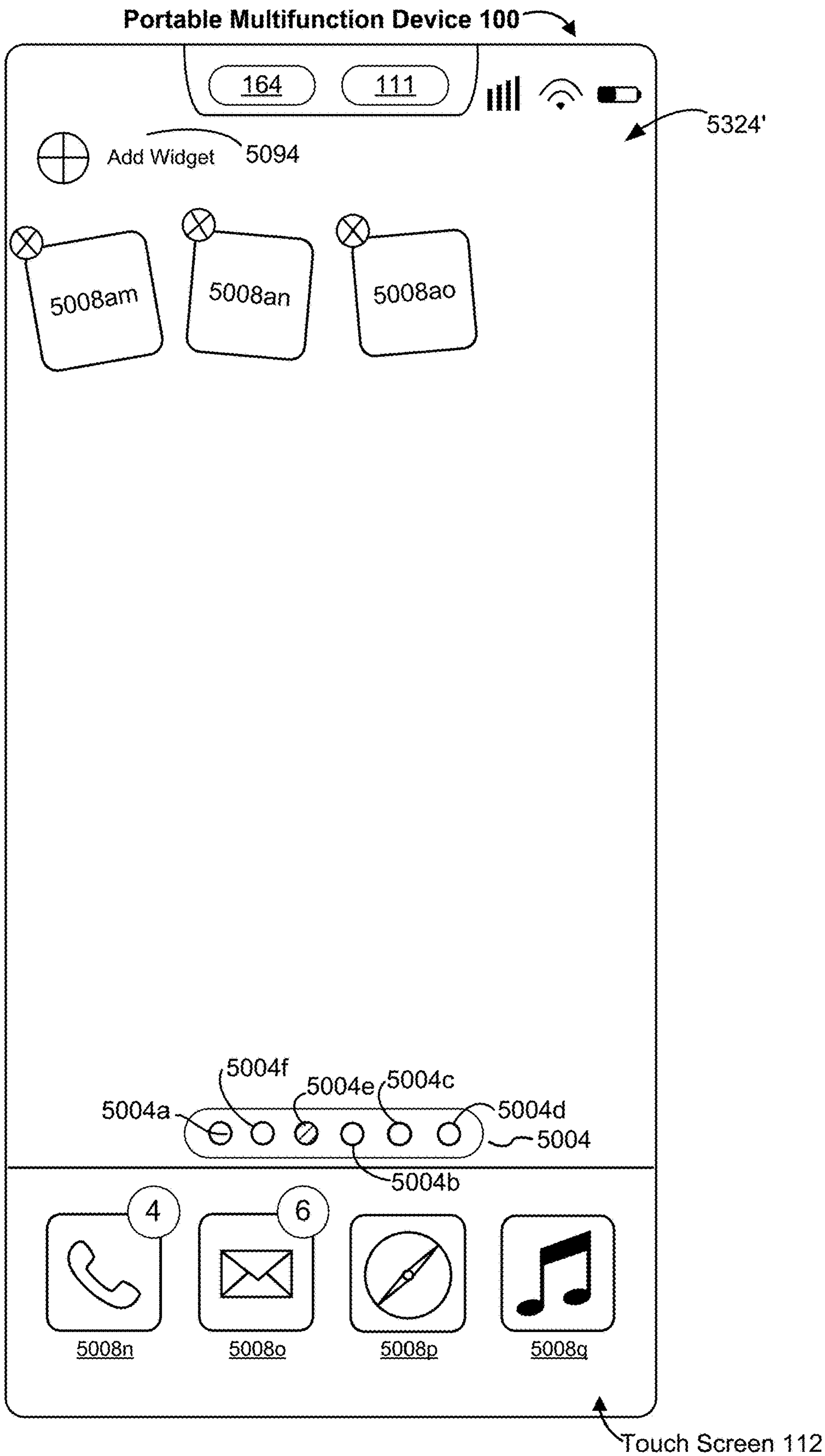
Figure 5C32

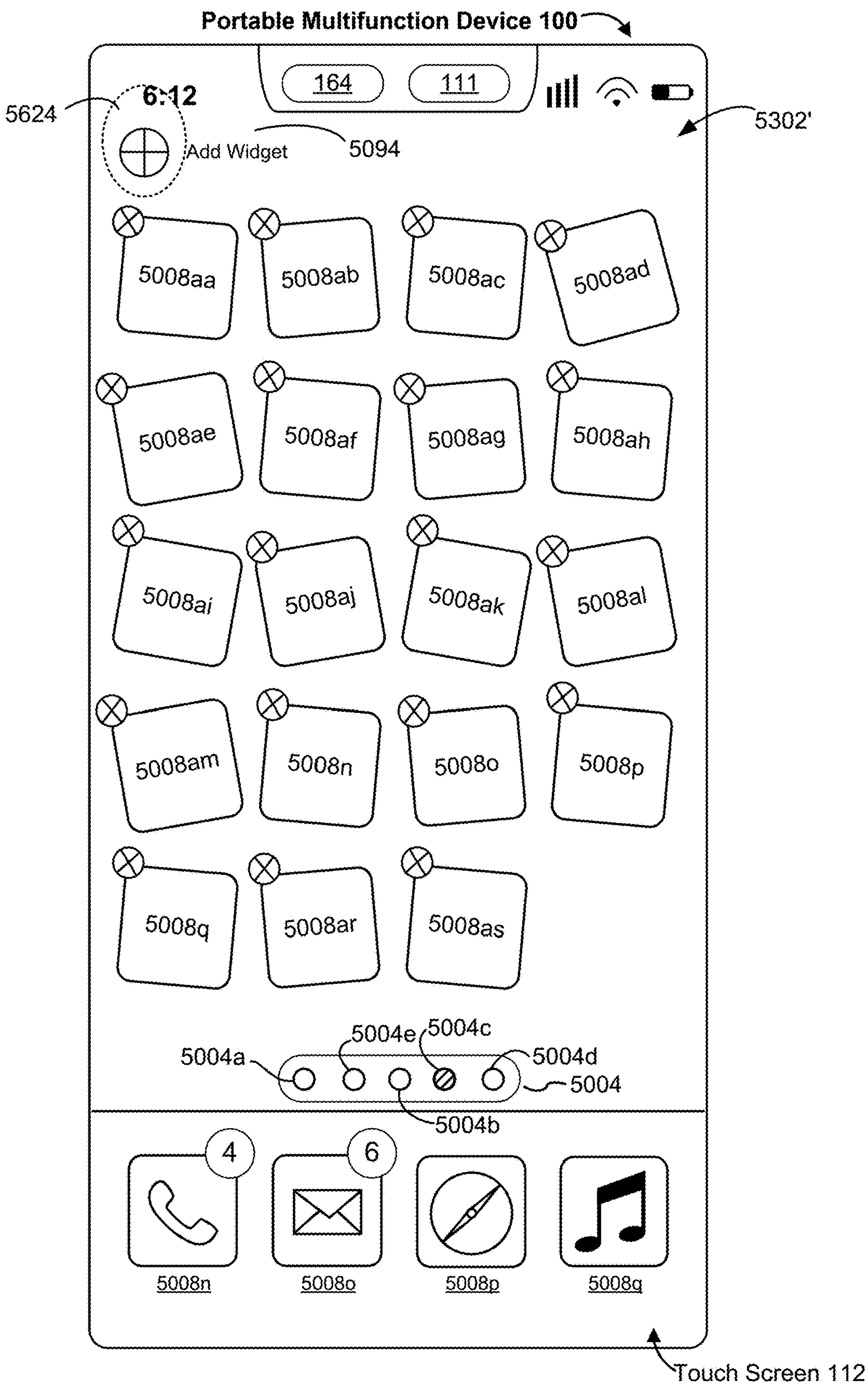
Figure 5C33

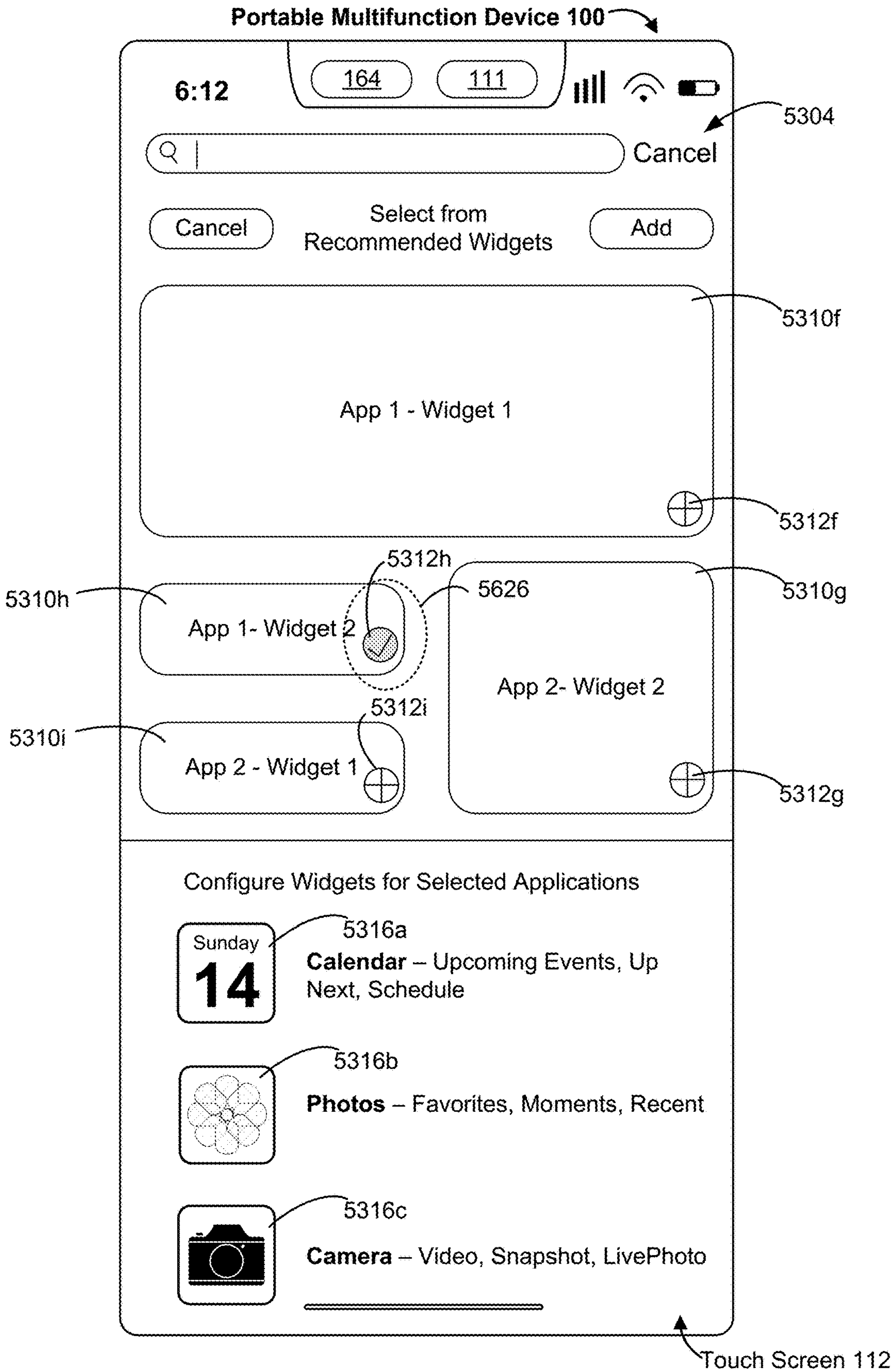
Figure 5C34

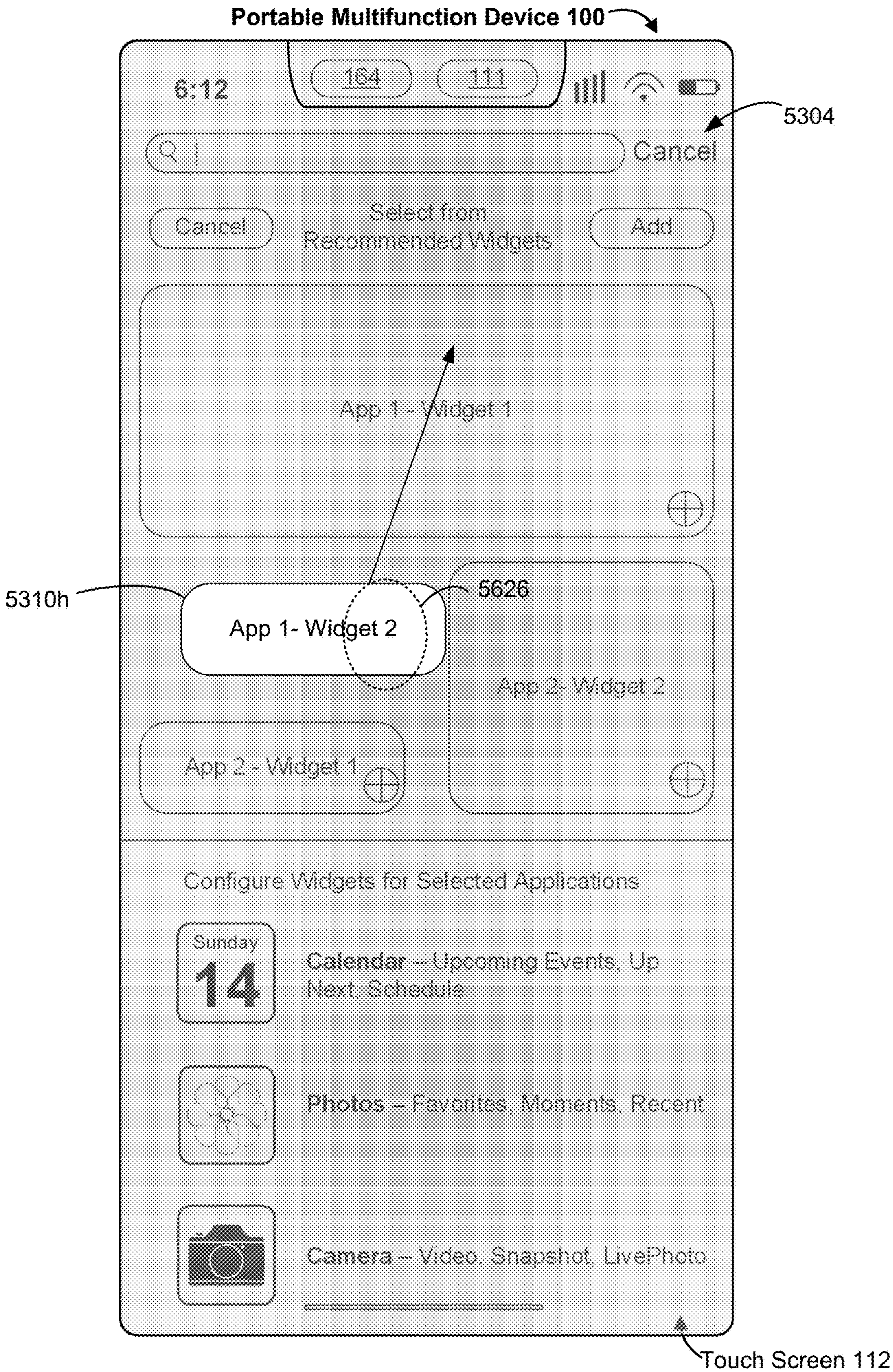
Figure 5C35

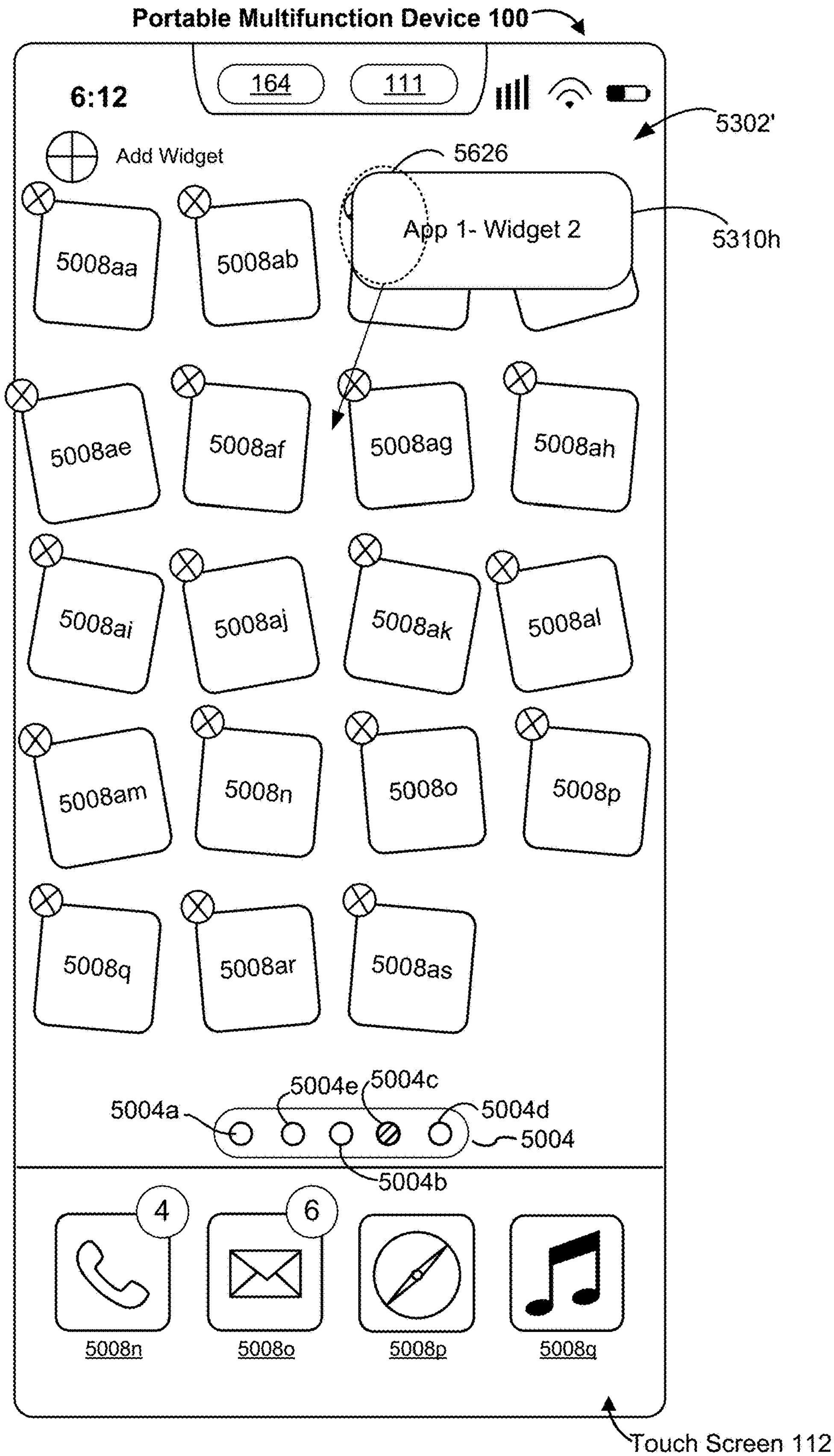
Figure 5C36

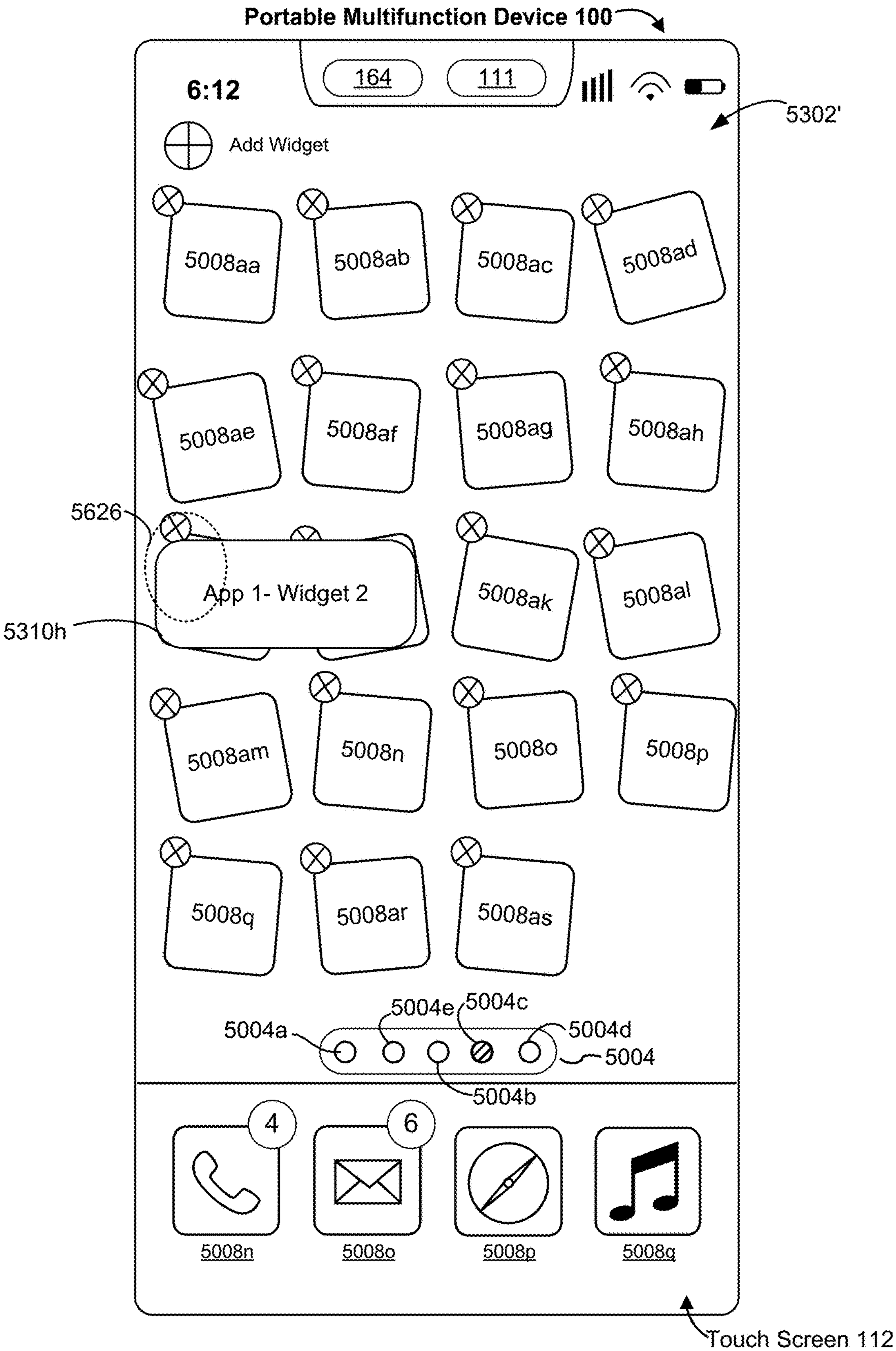
Figure 5C37

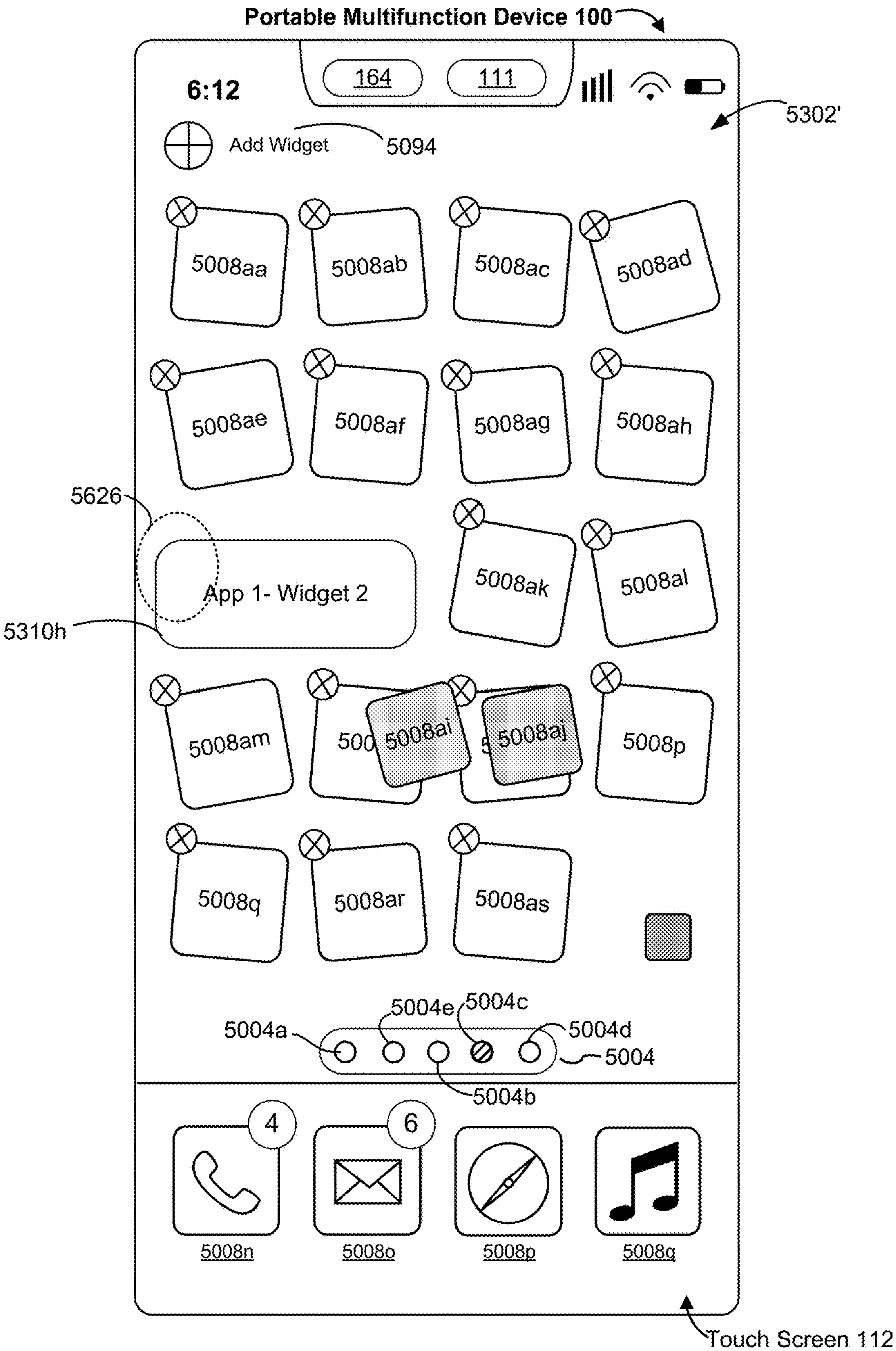
Figure 5C38

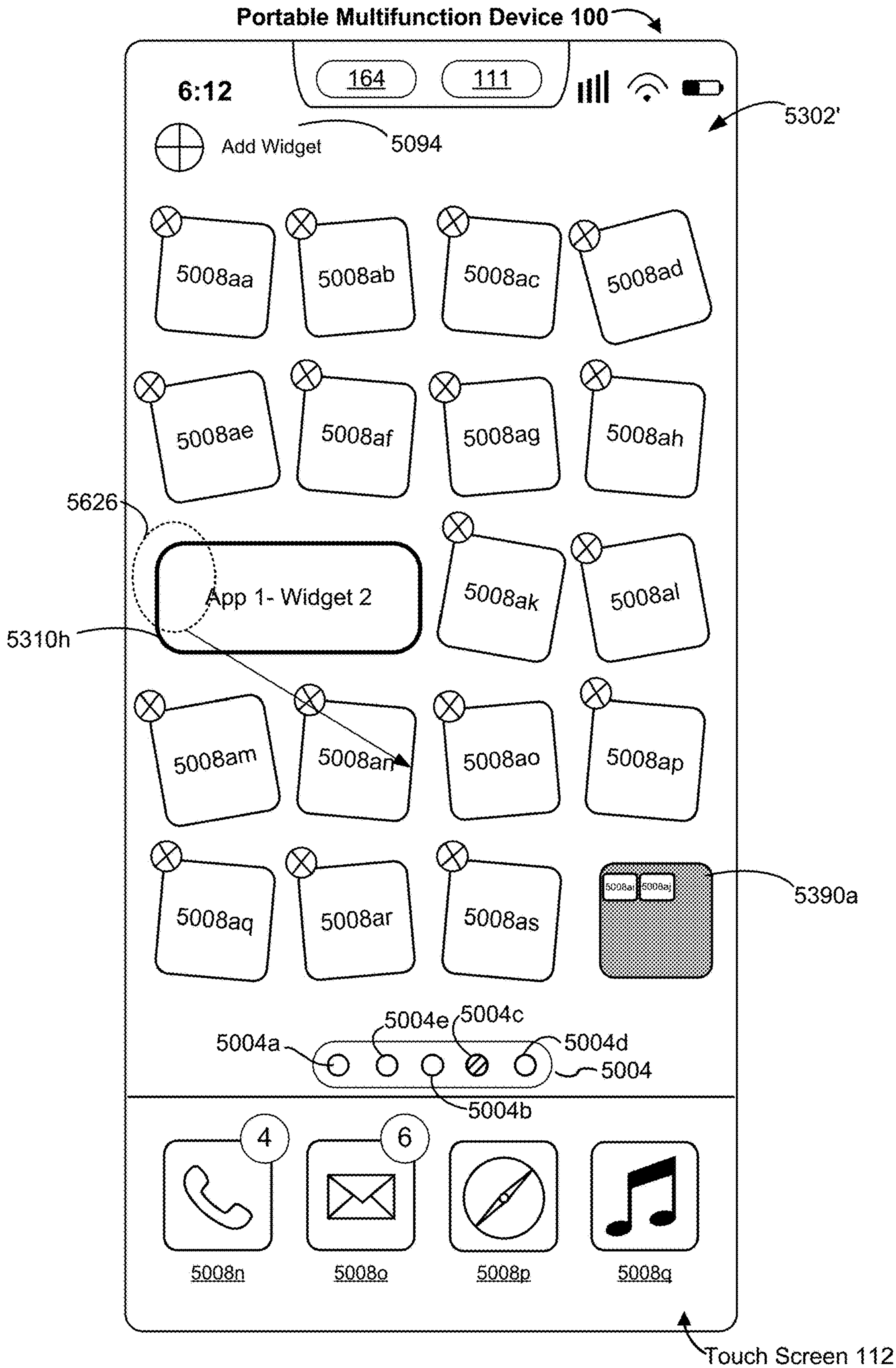
Figure 5C39

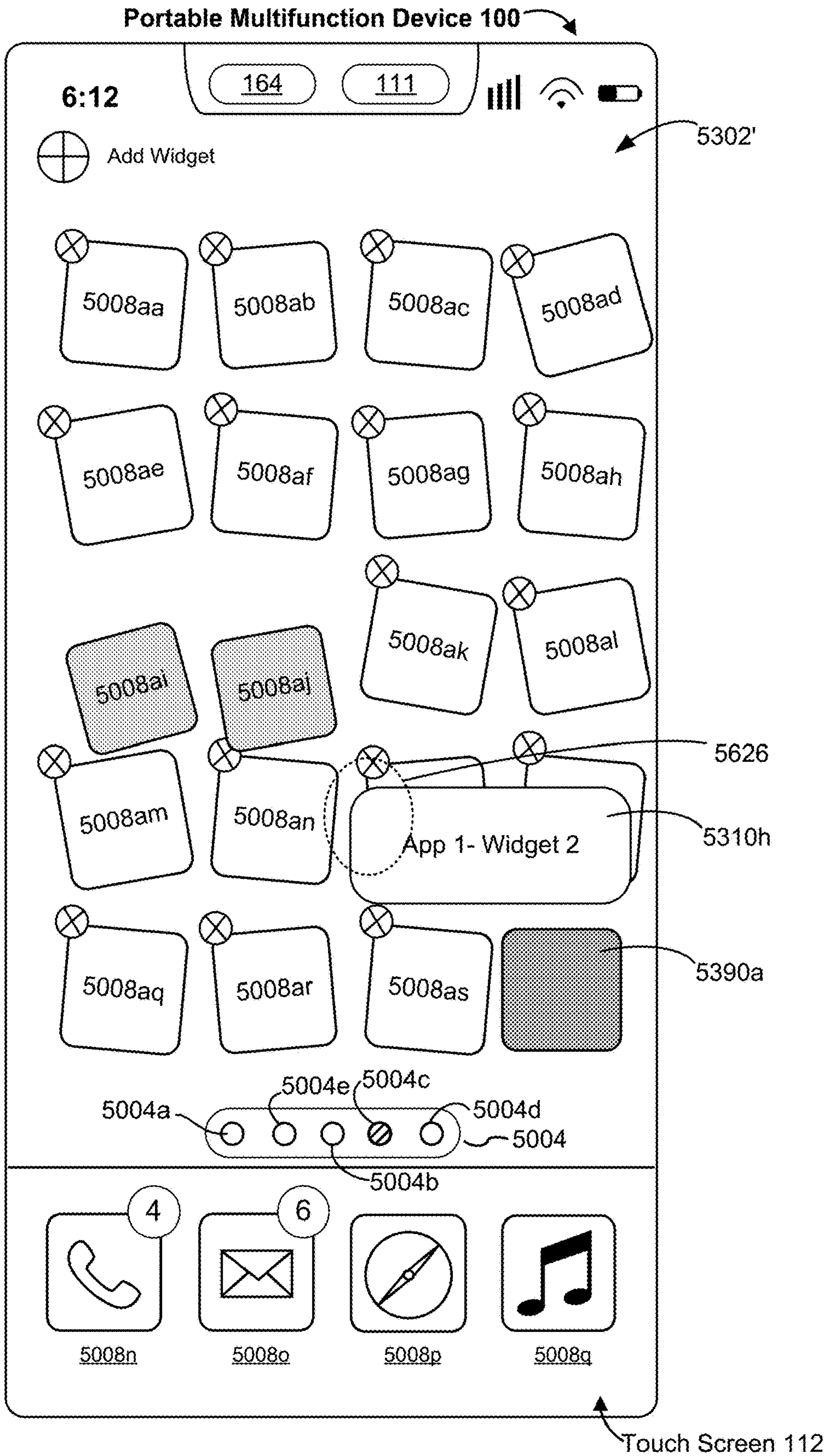
Figure 5C40

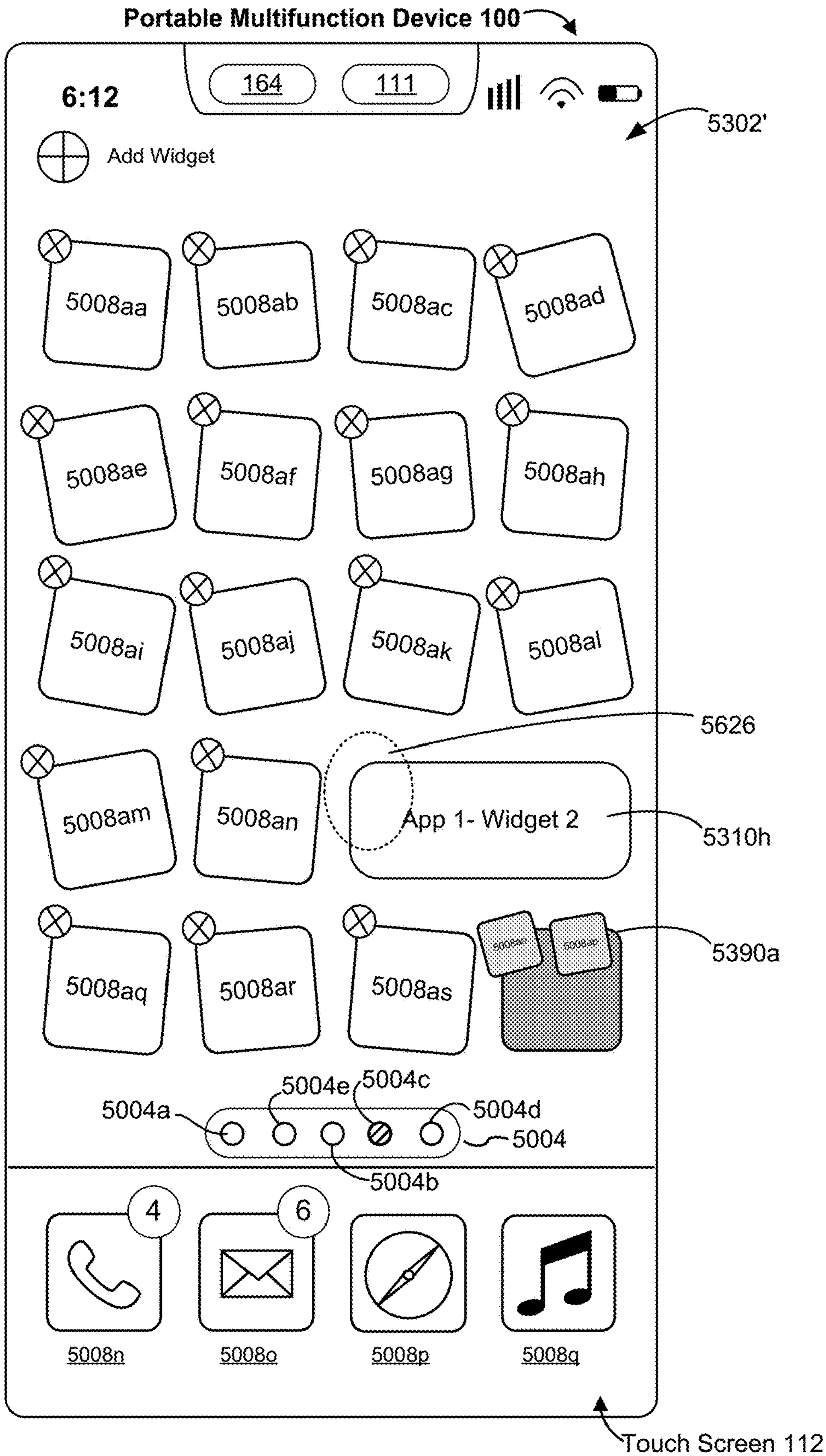
Figure 5C41

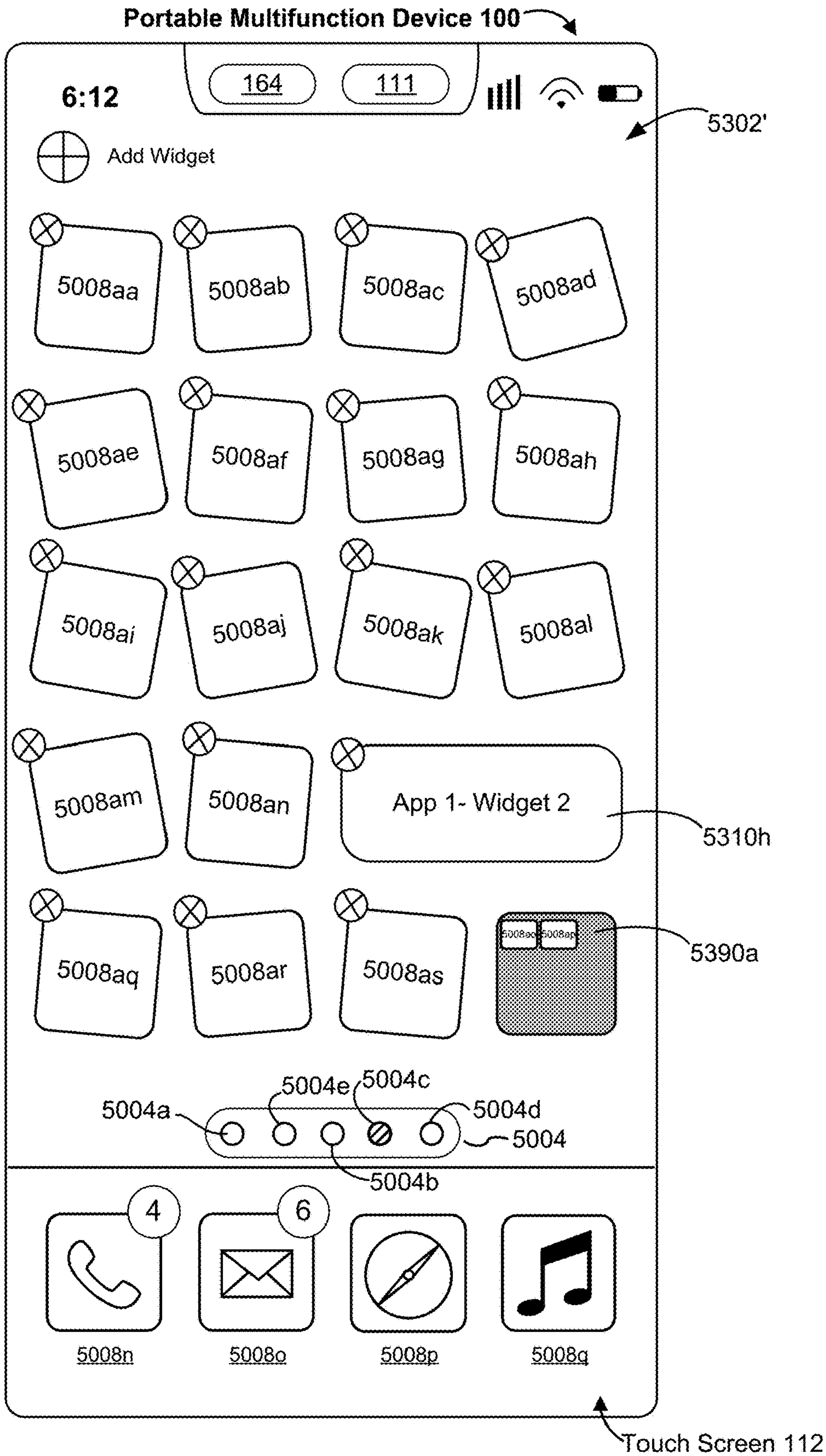
Figure 5C42

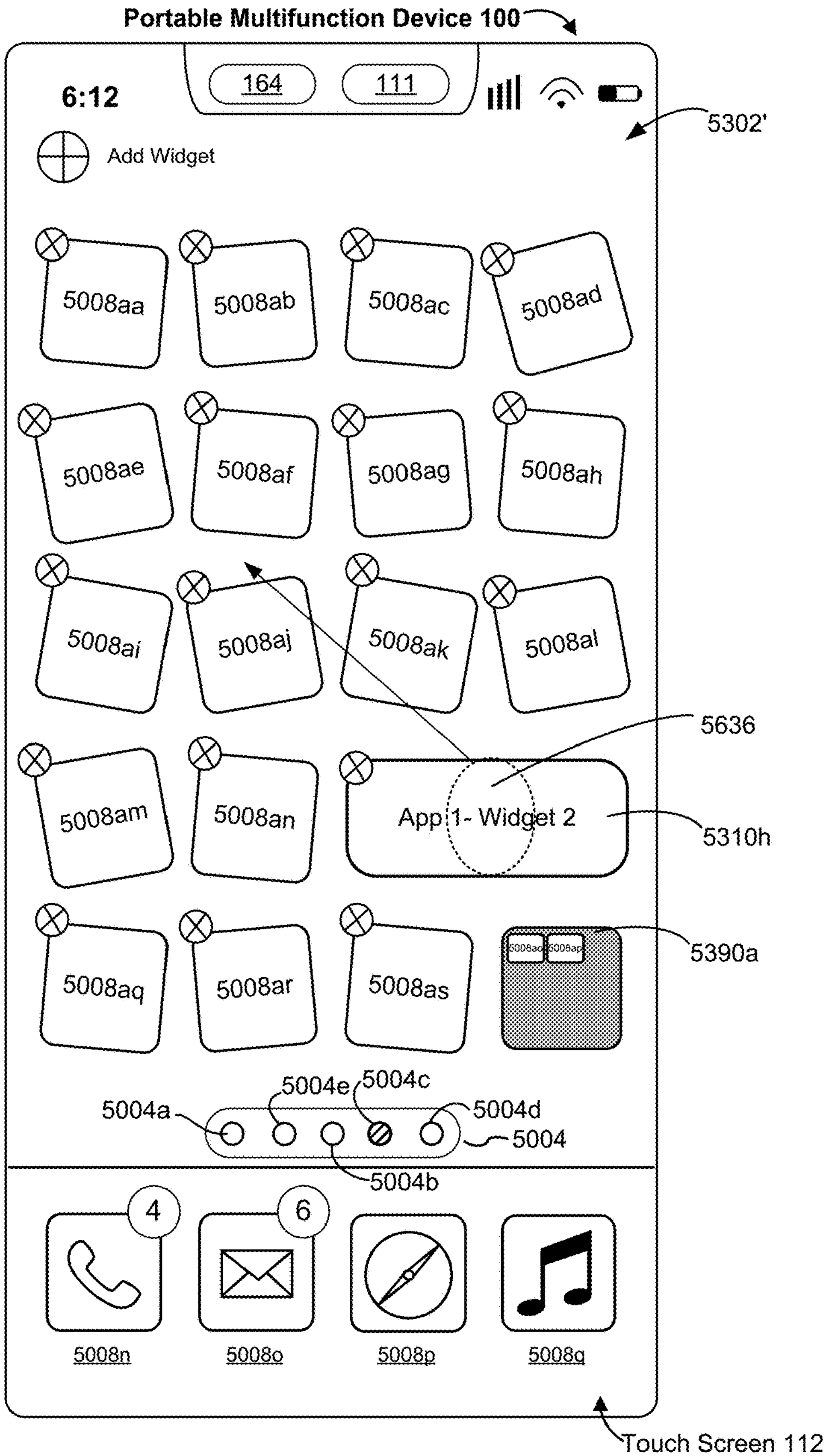
Figure 5C43

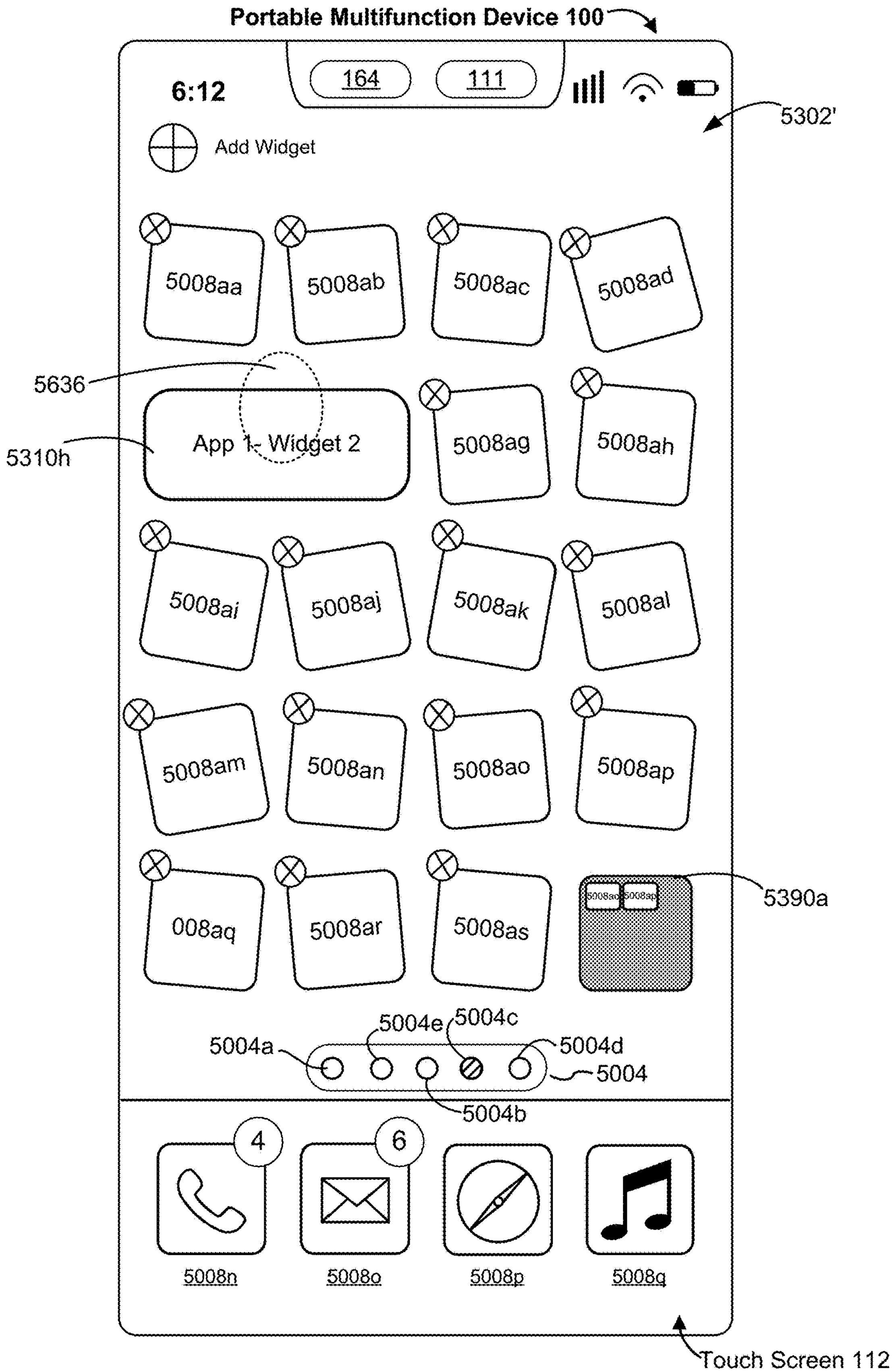
Figure 5C44

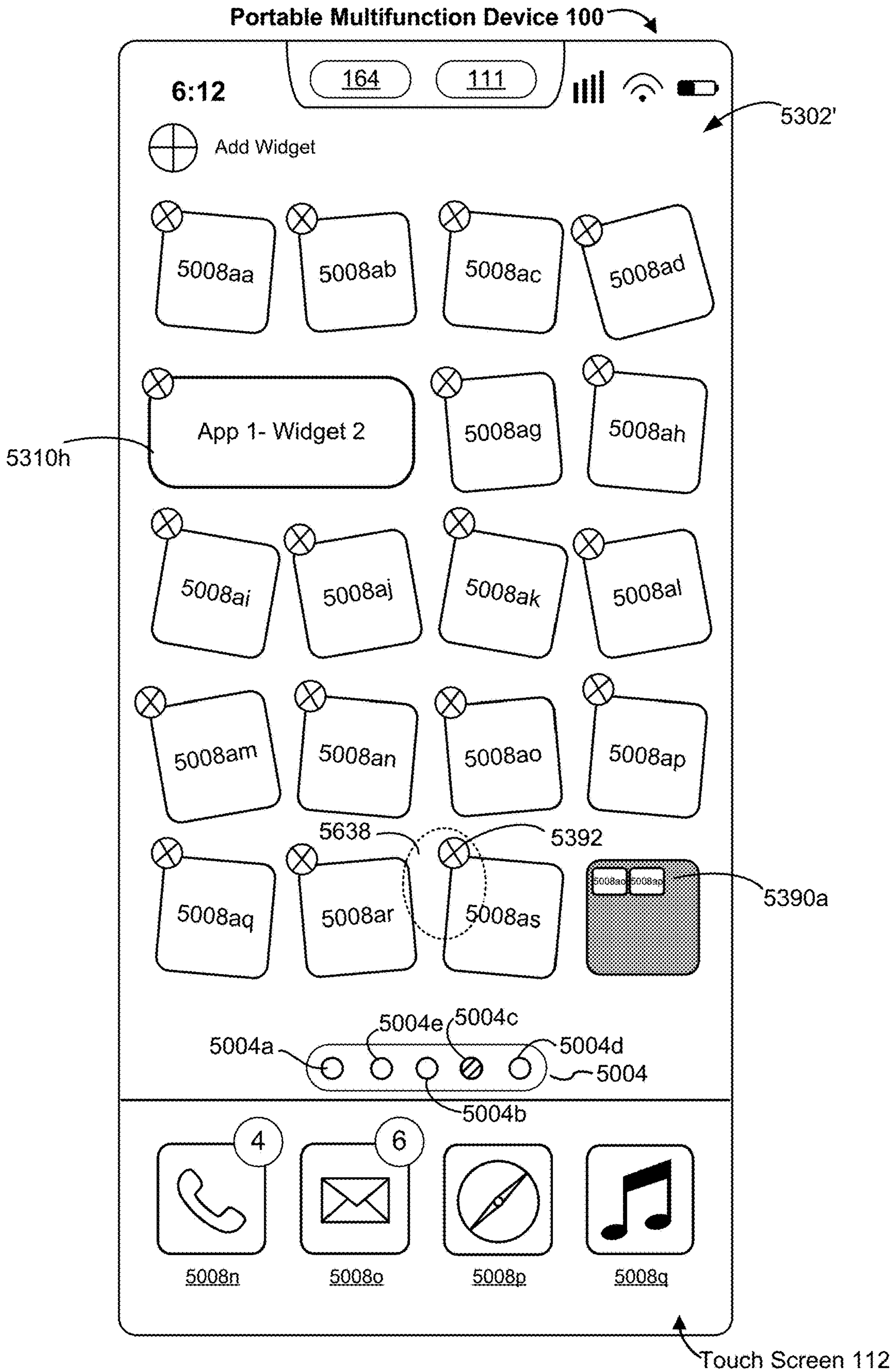
Figure 5C45

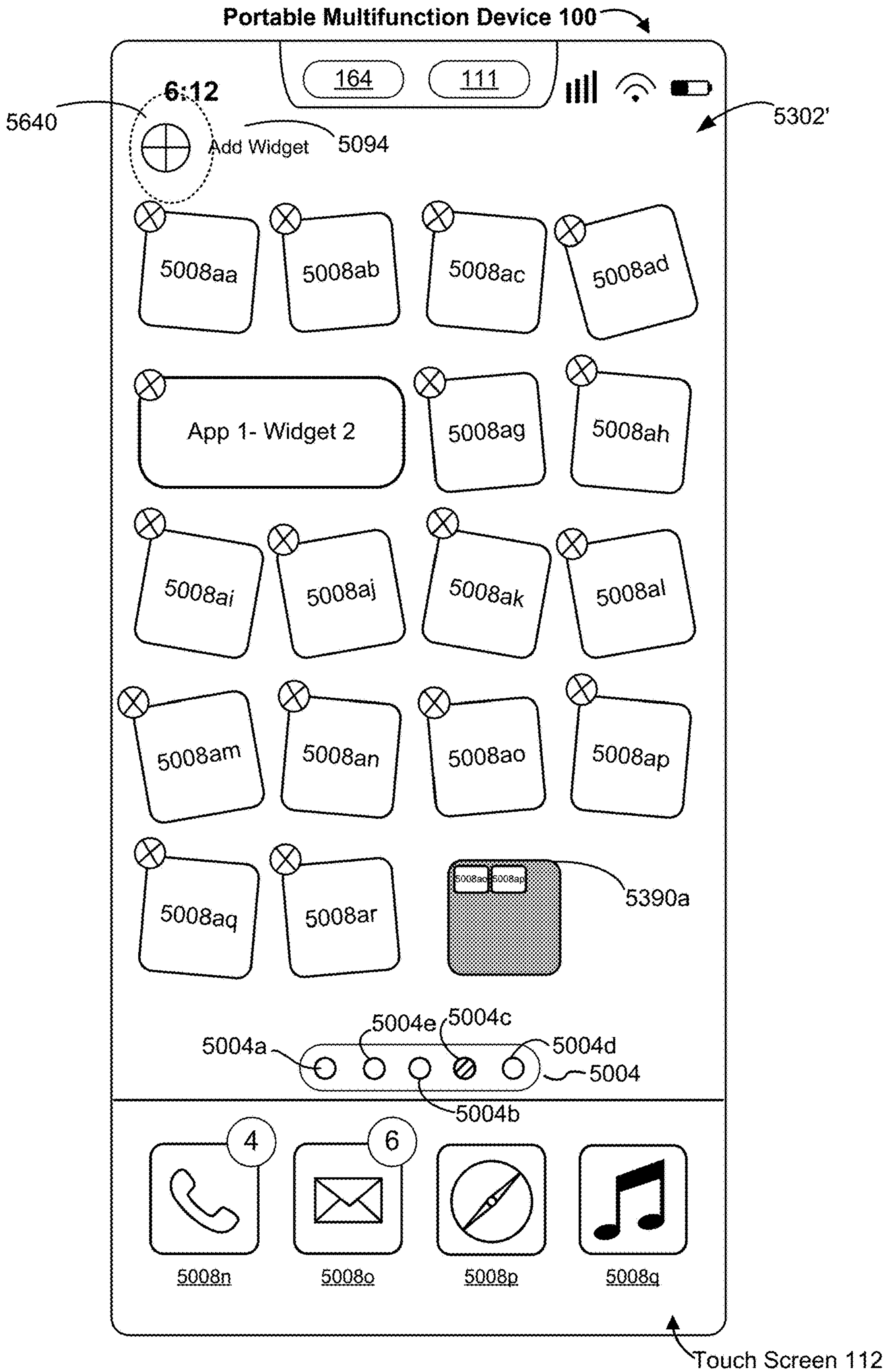
Figure 5C46

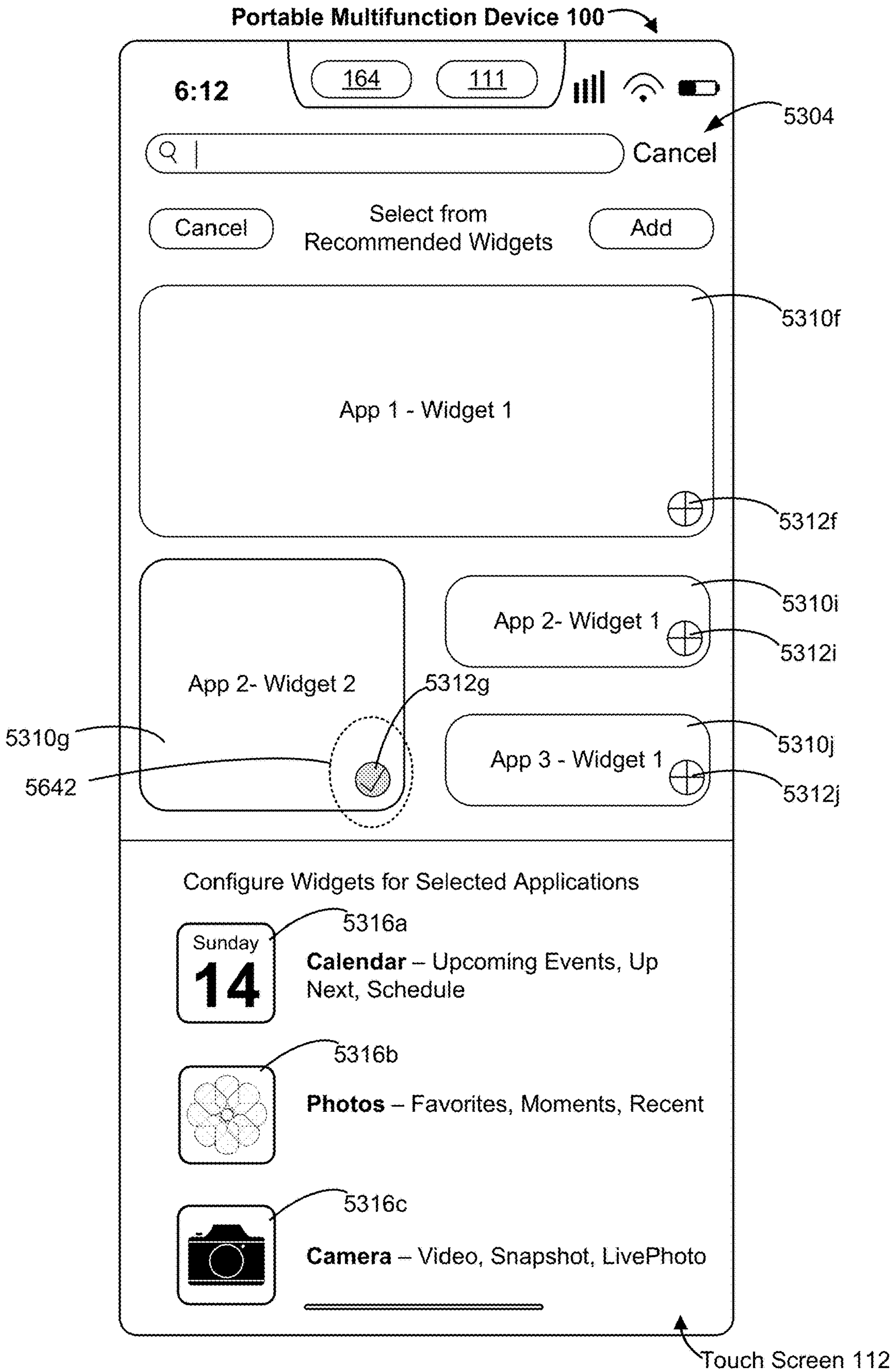
Figure 5C47

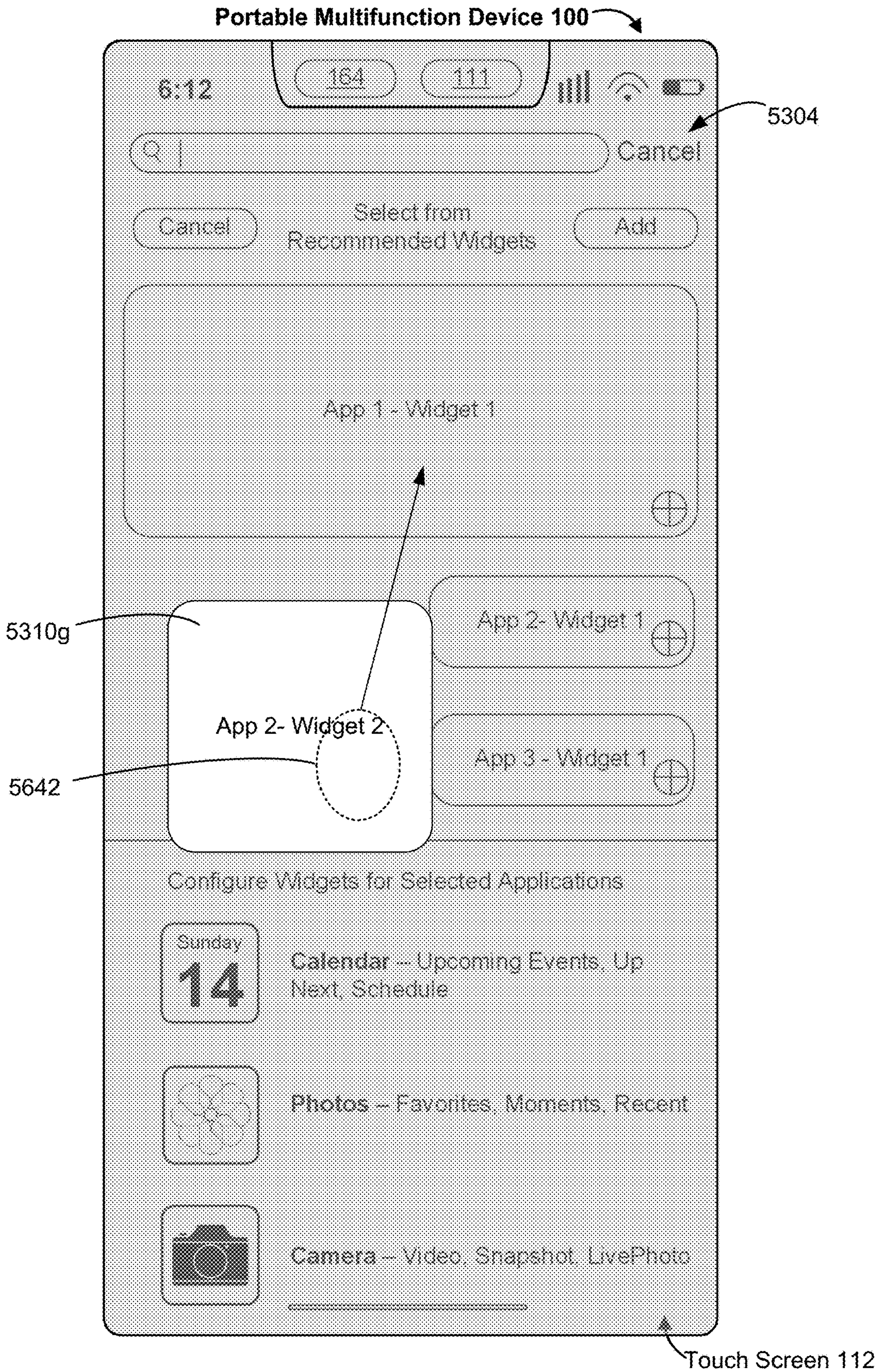
Figure 5C48

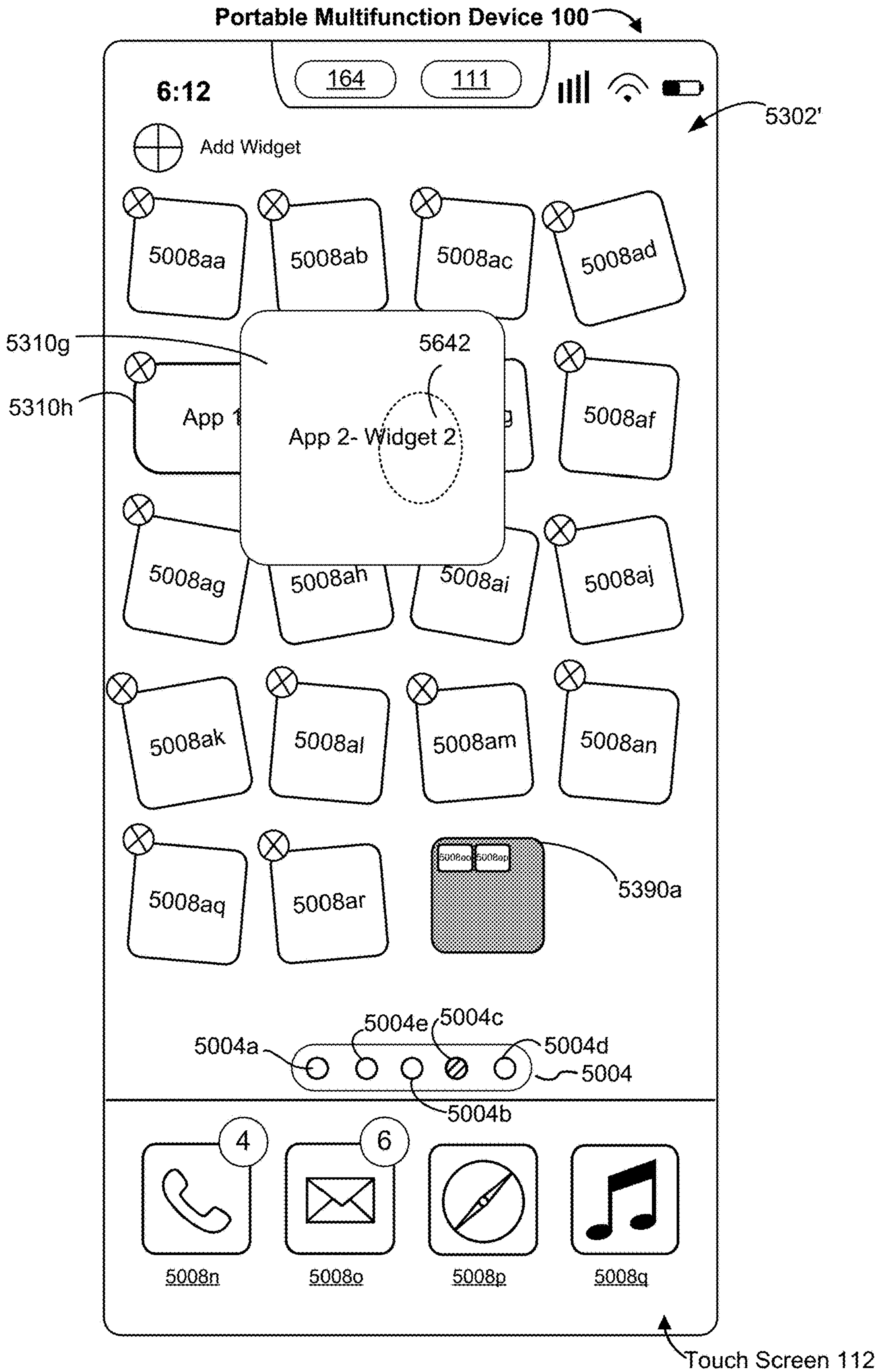
Figure 5C49

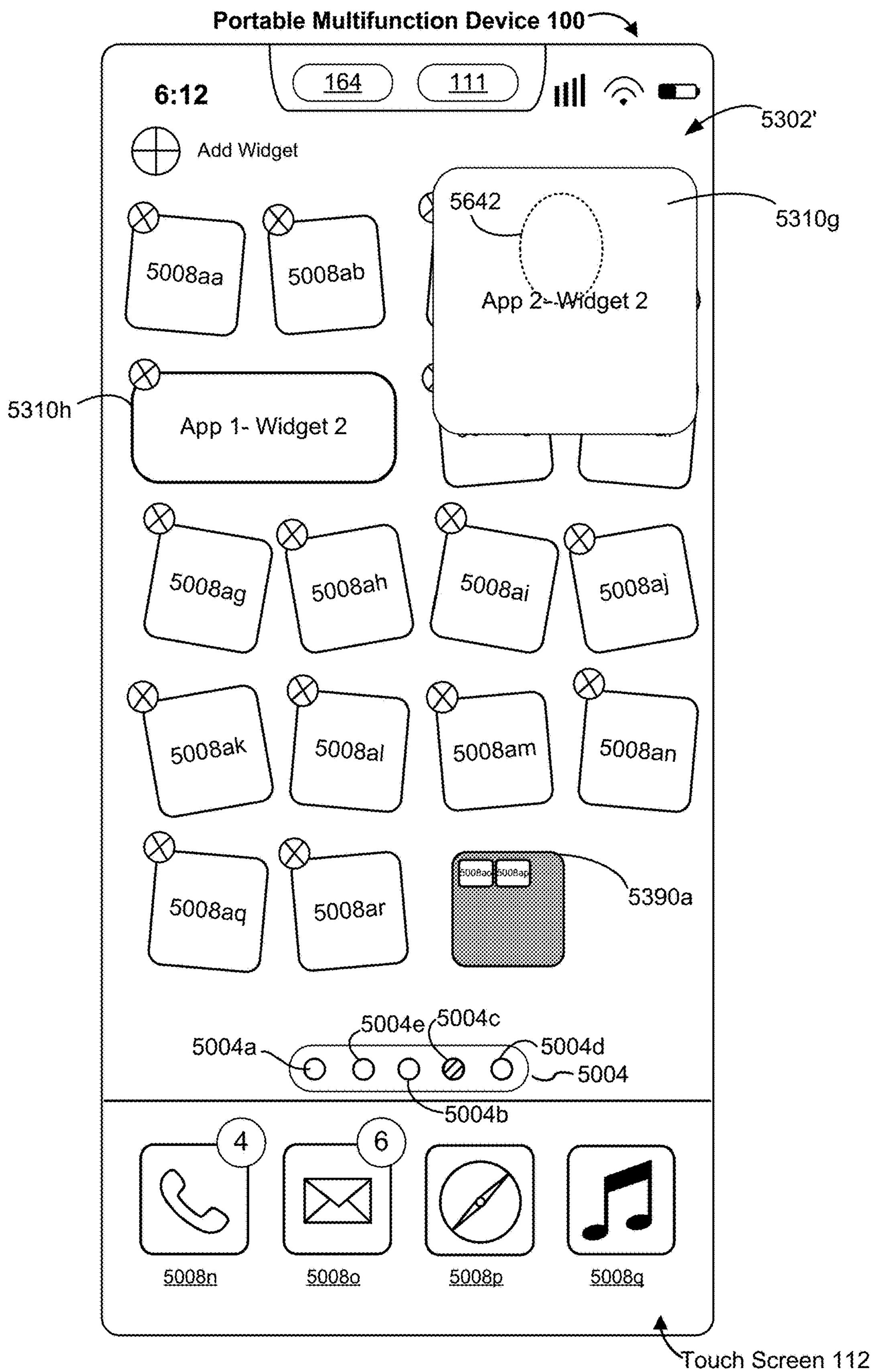
Figure 5C50

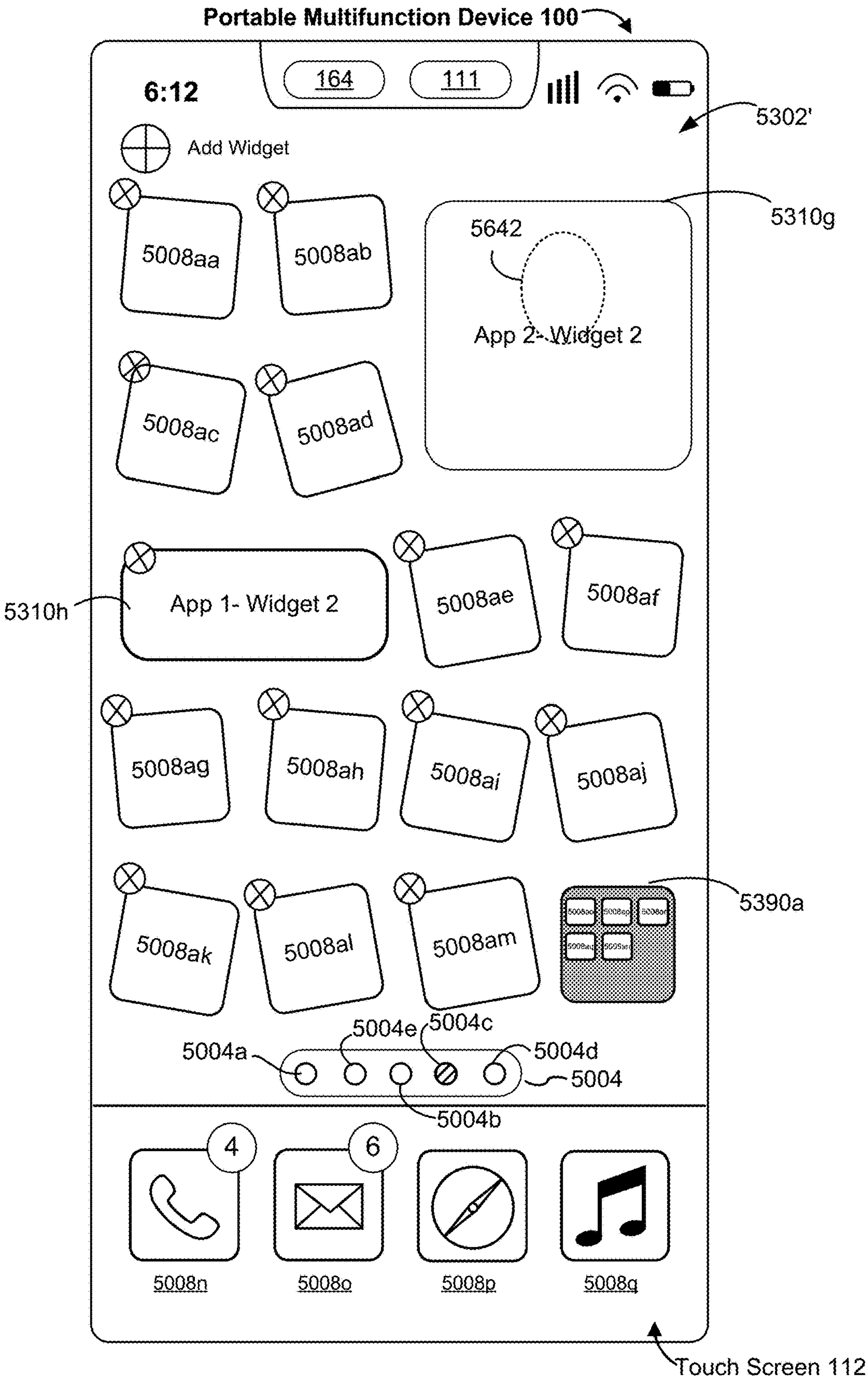
Figure 5C51

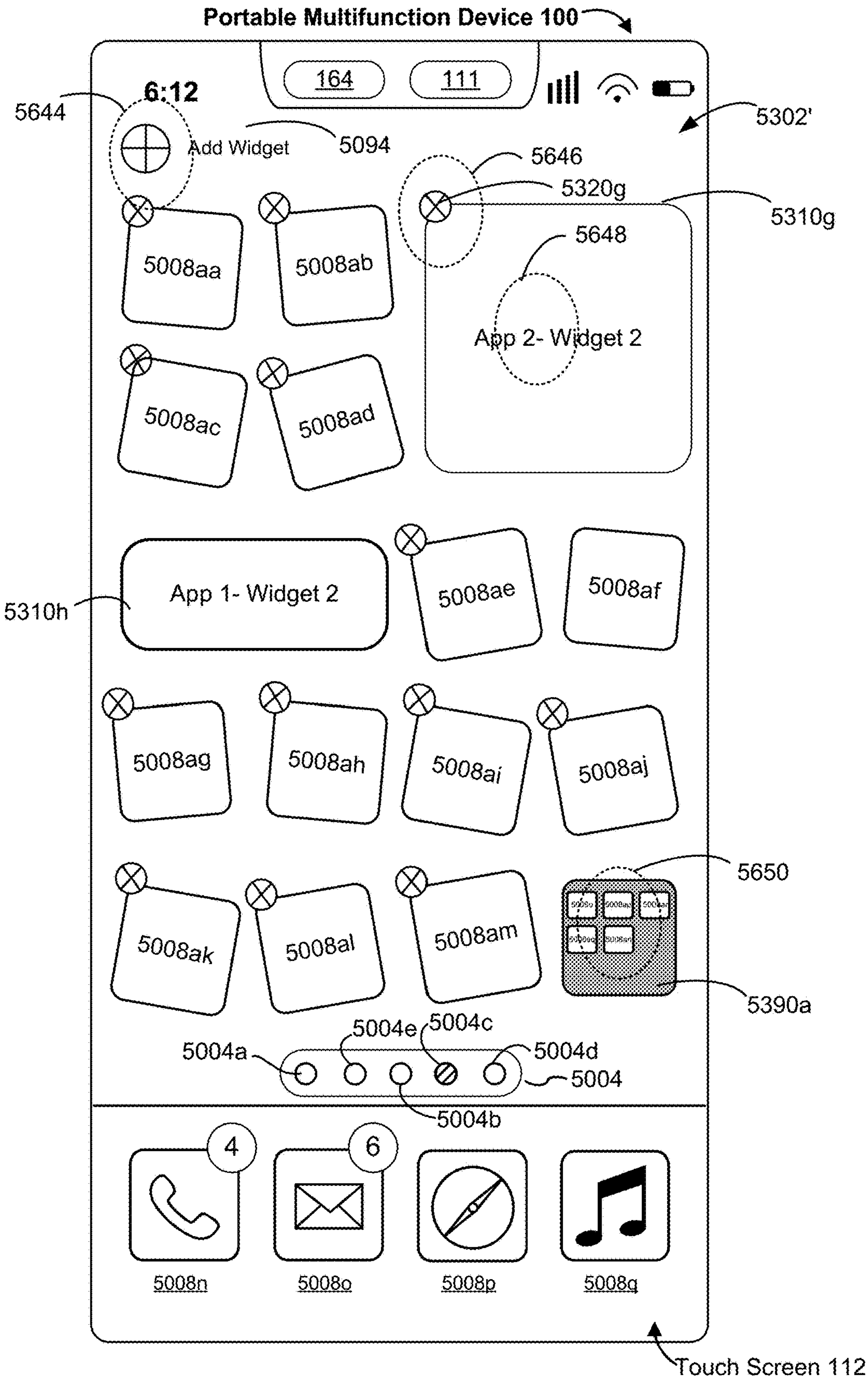
Figure 5C52

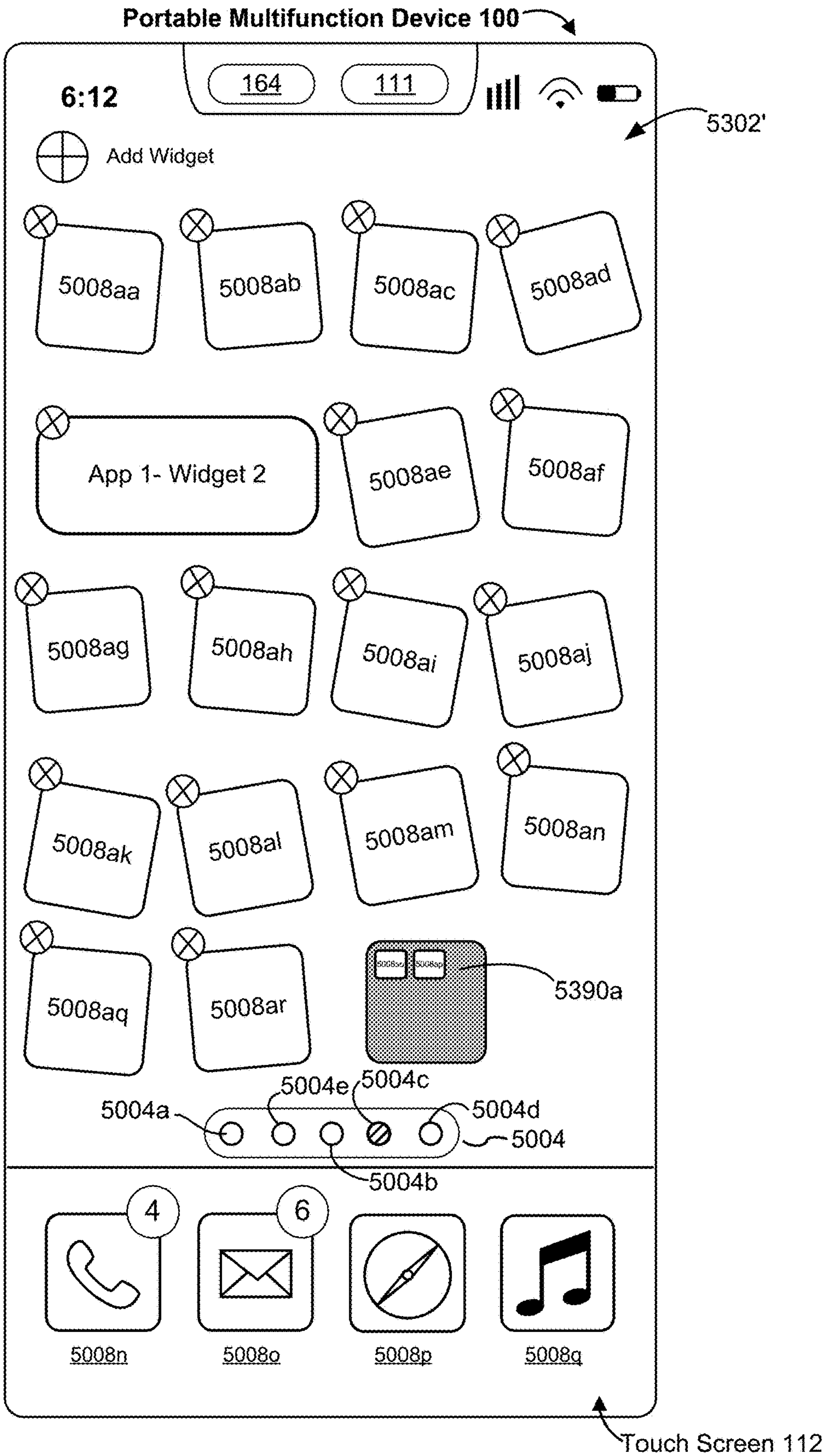
Figure 5C53

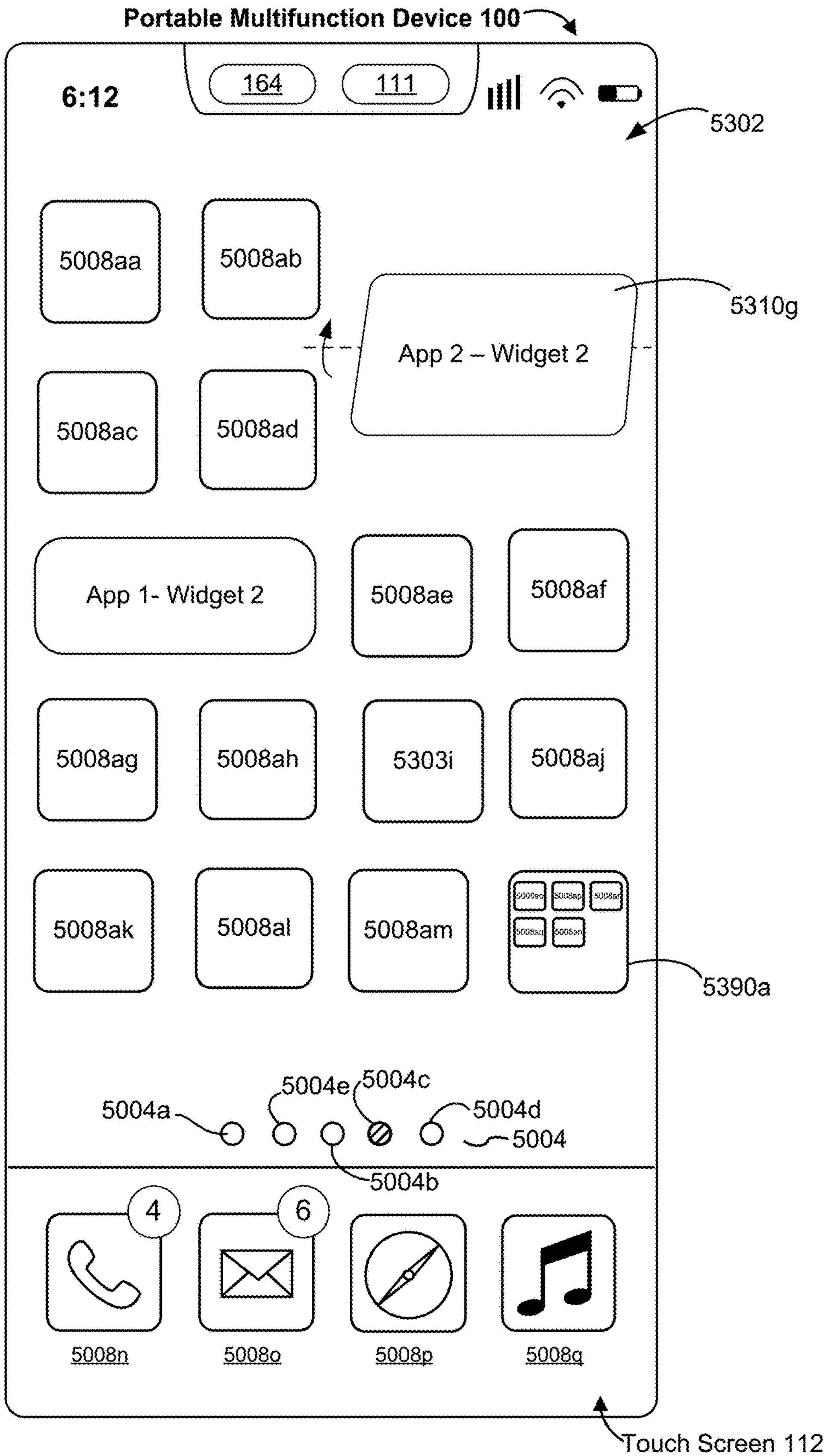
Figure 5C54

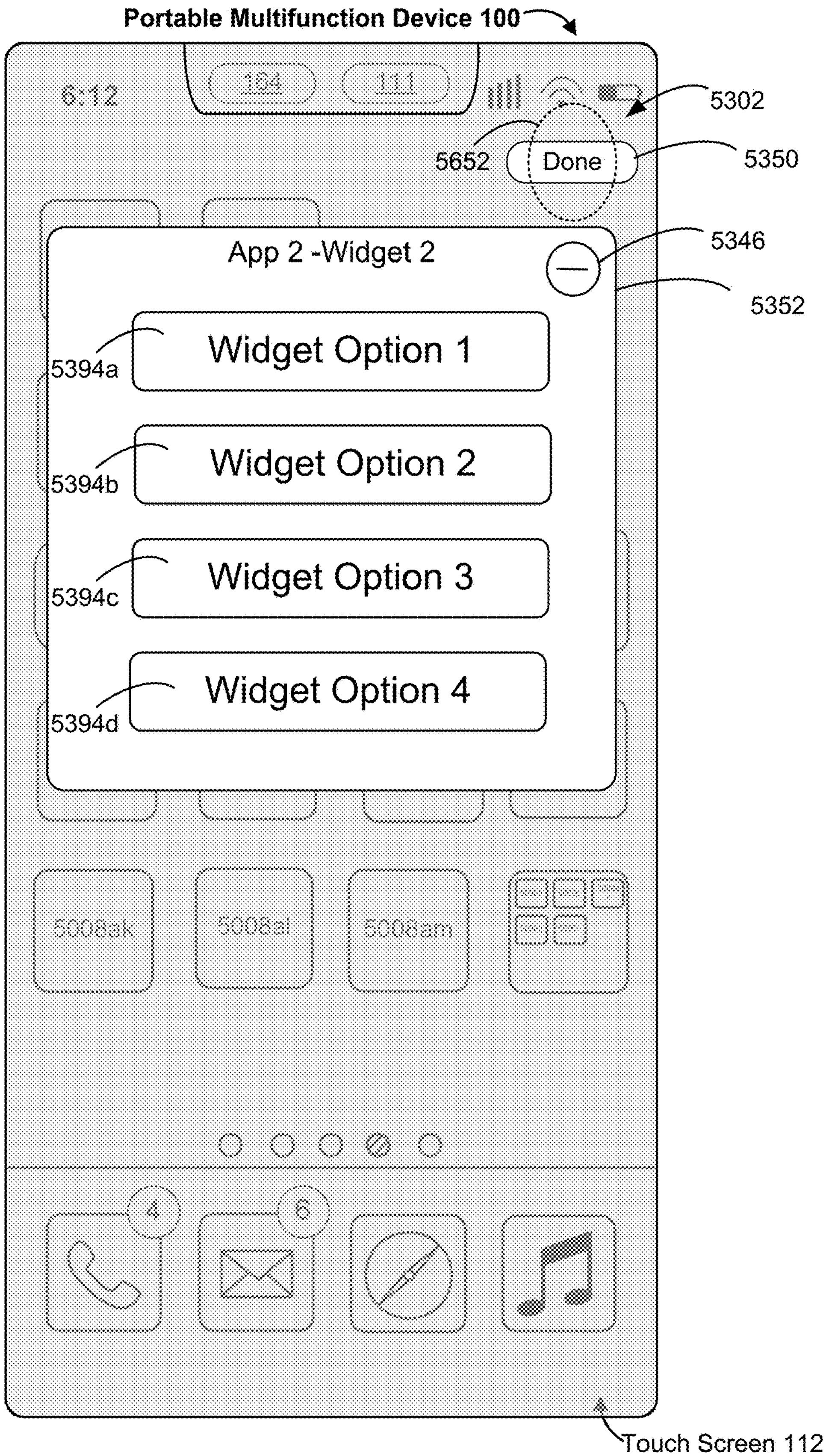
Figure 5C55

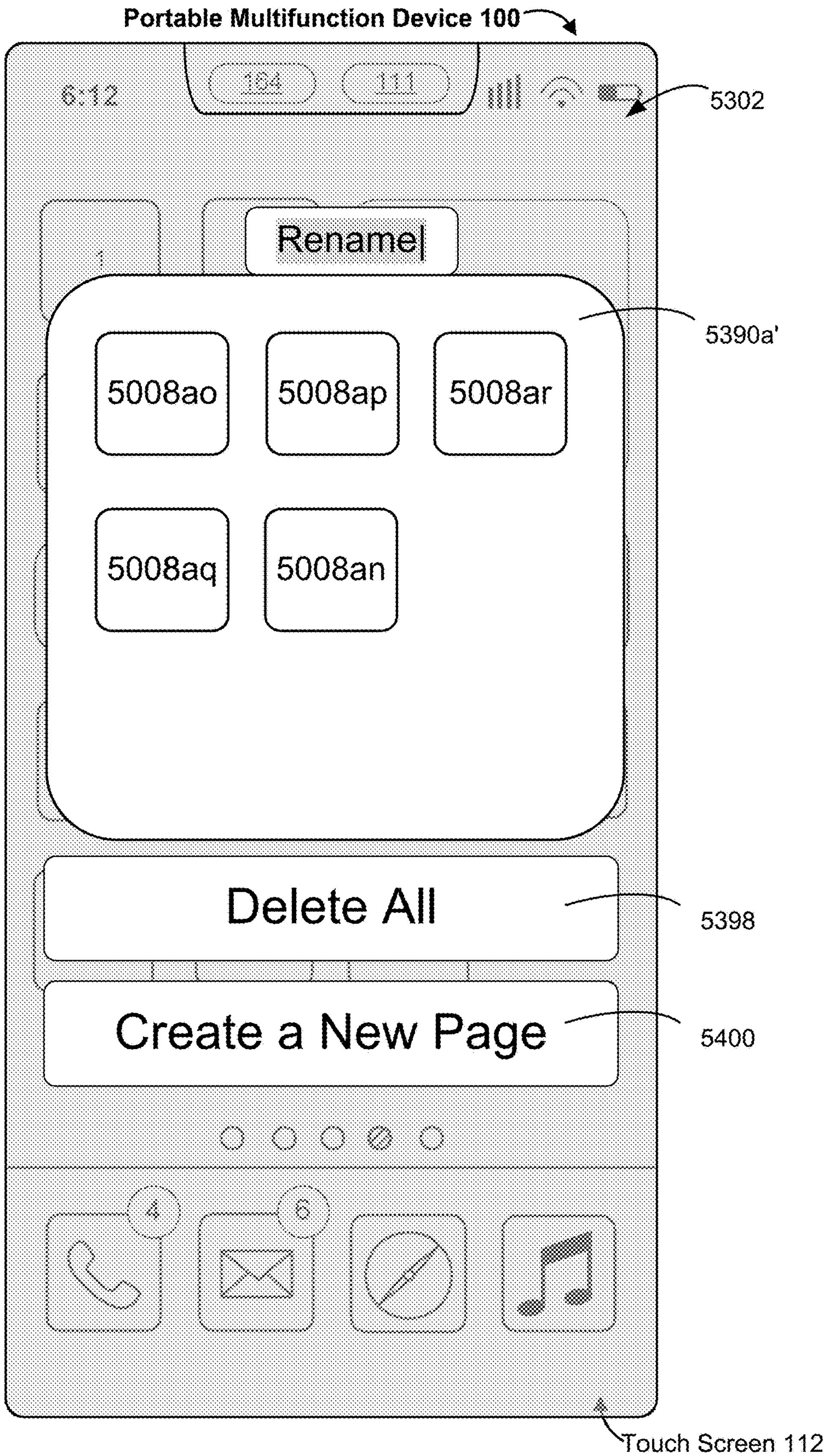
Figure 5C56

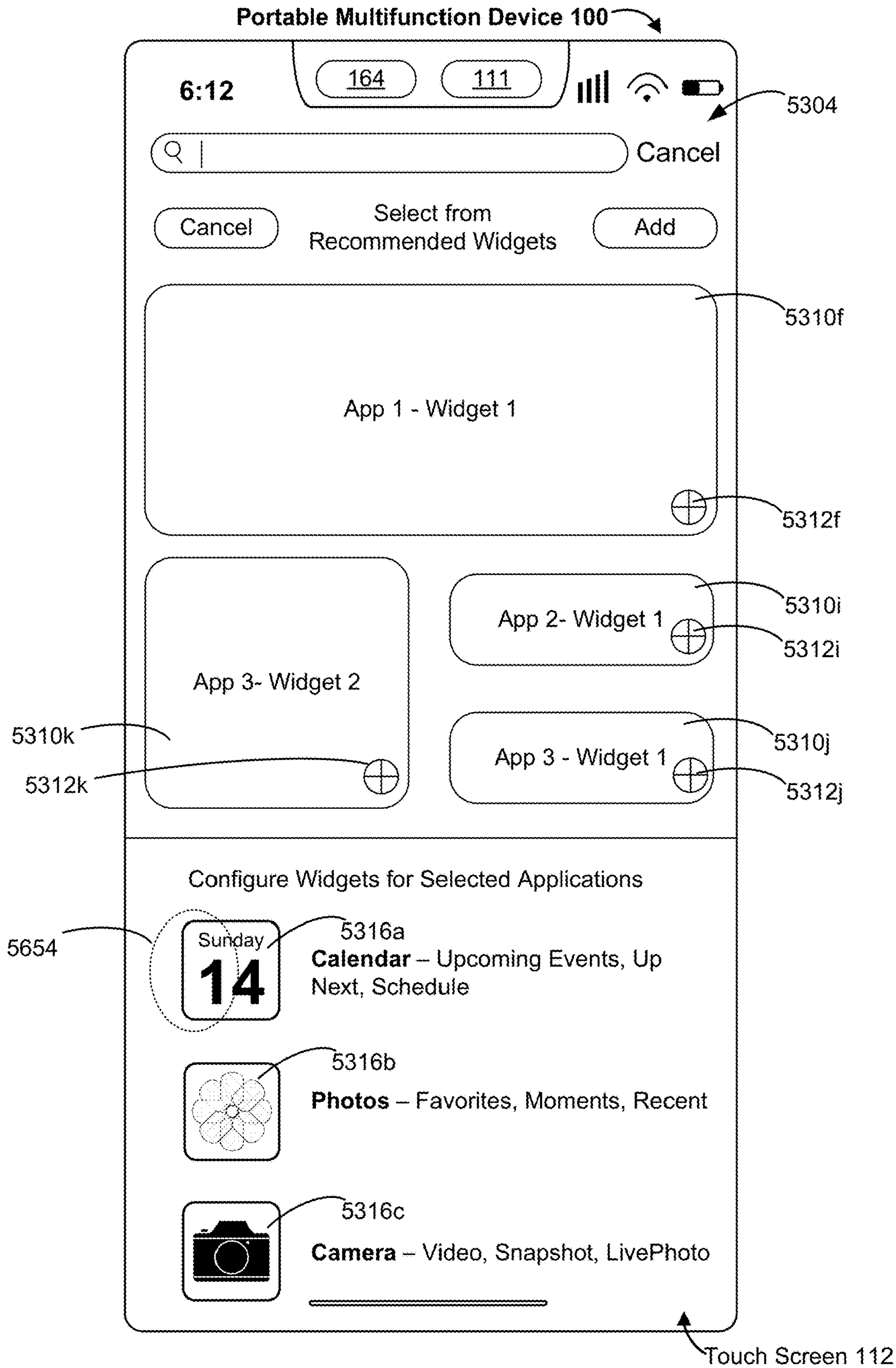
Figure 5C57

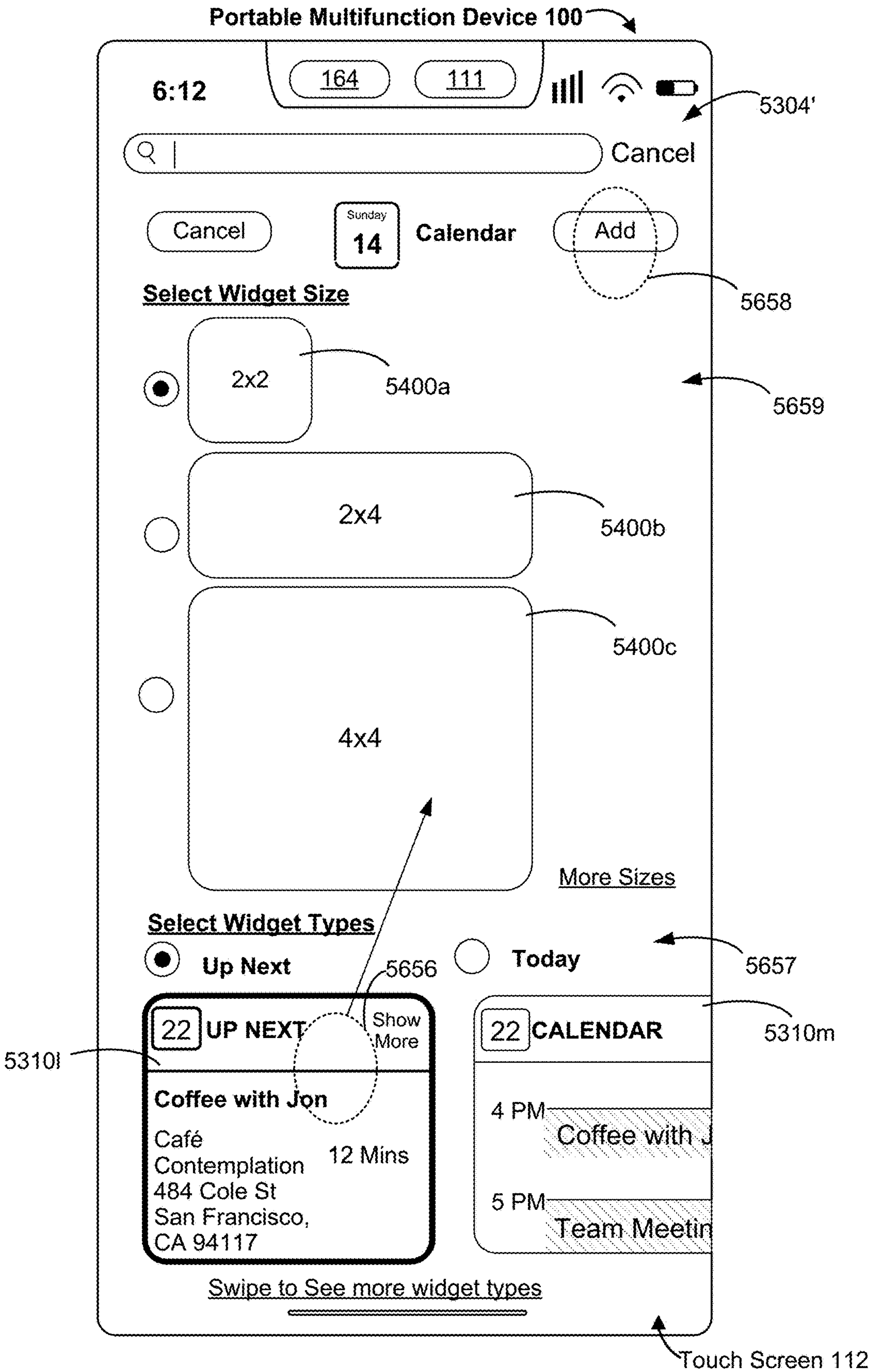
Figure 5C58

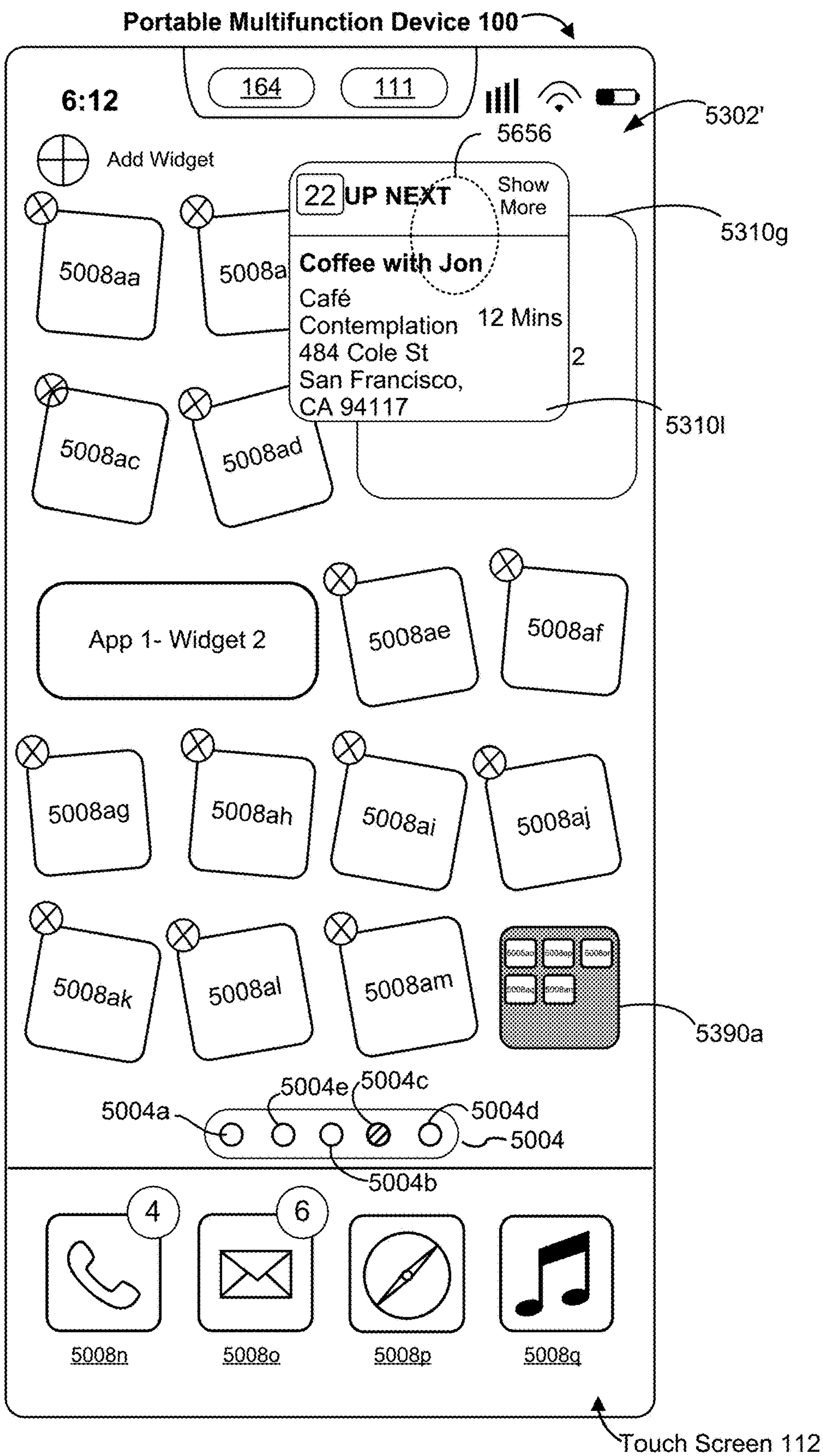
Figure 5C59

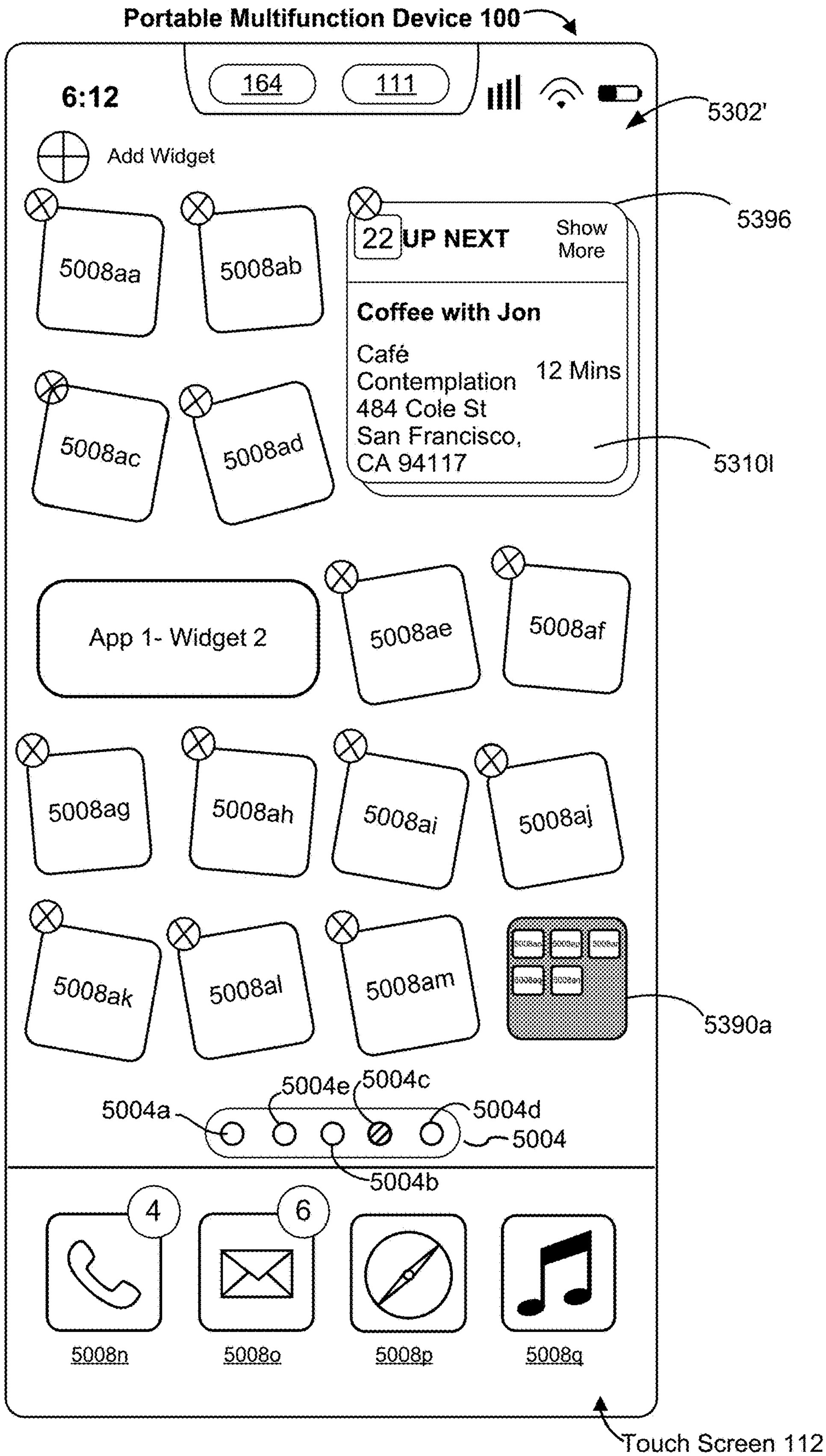
Figure 5C60

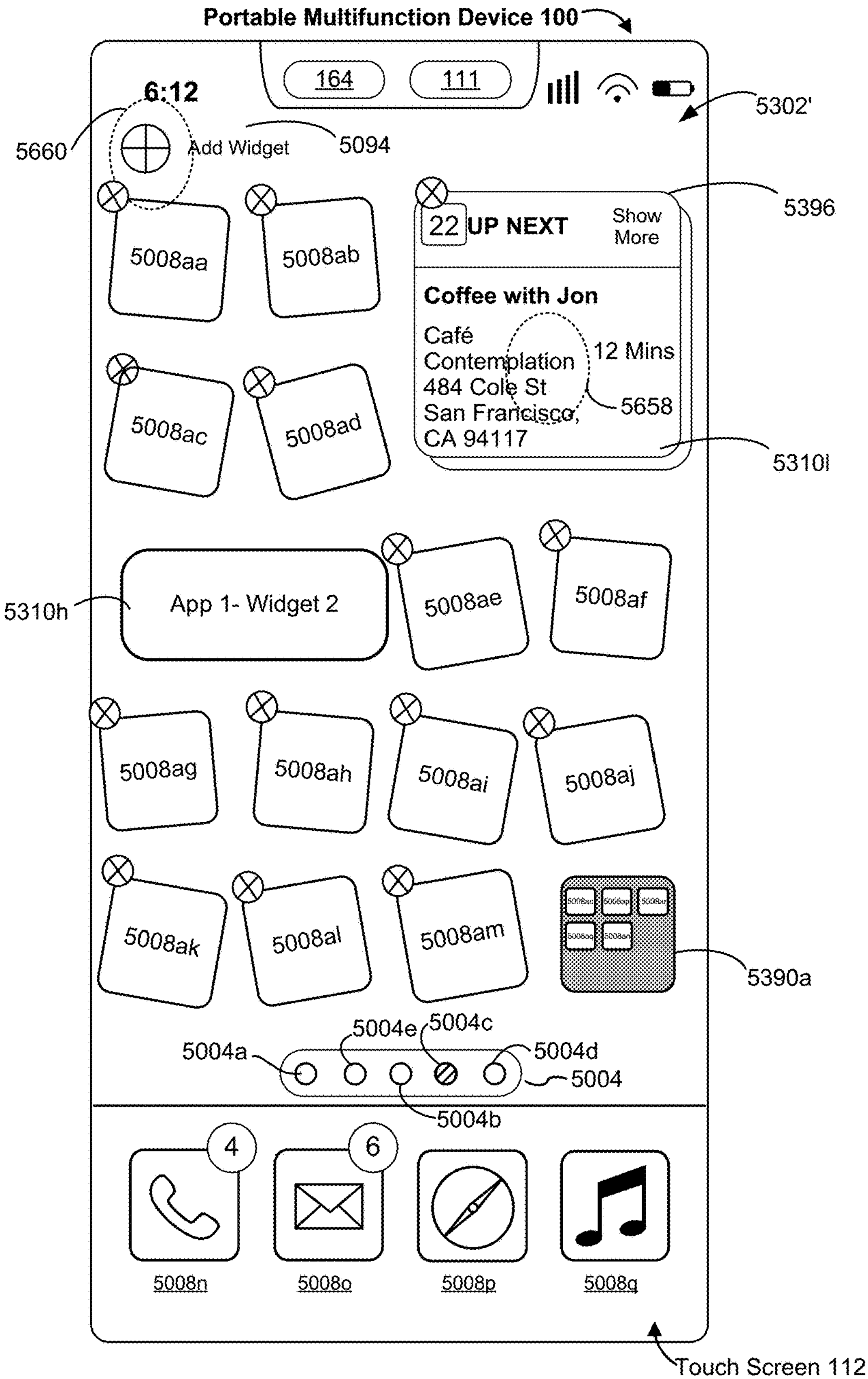
Figure 5C61

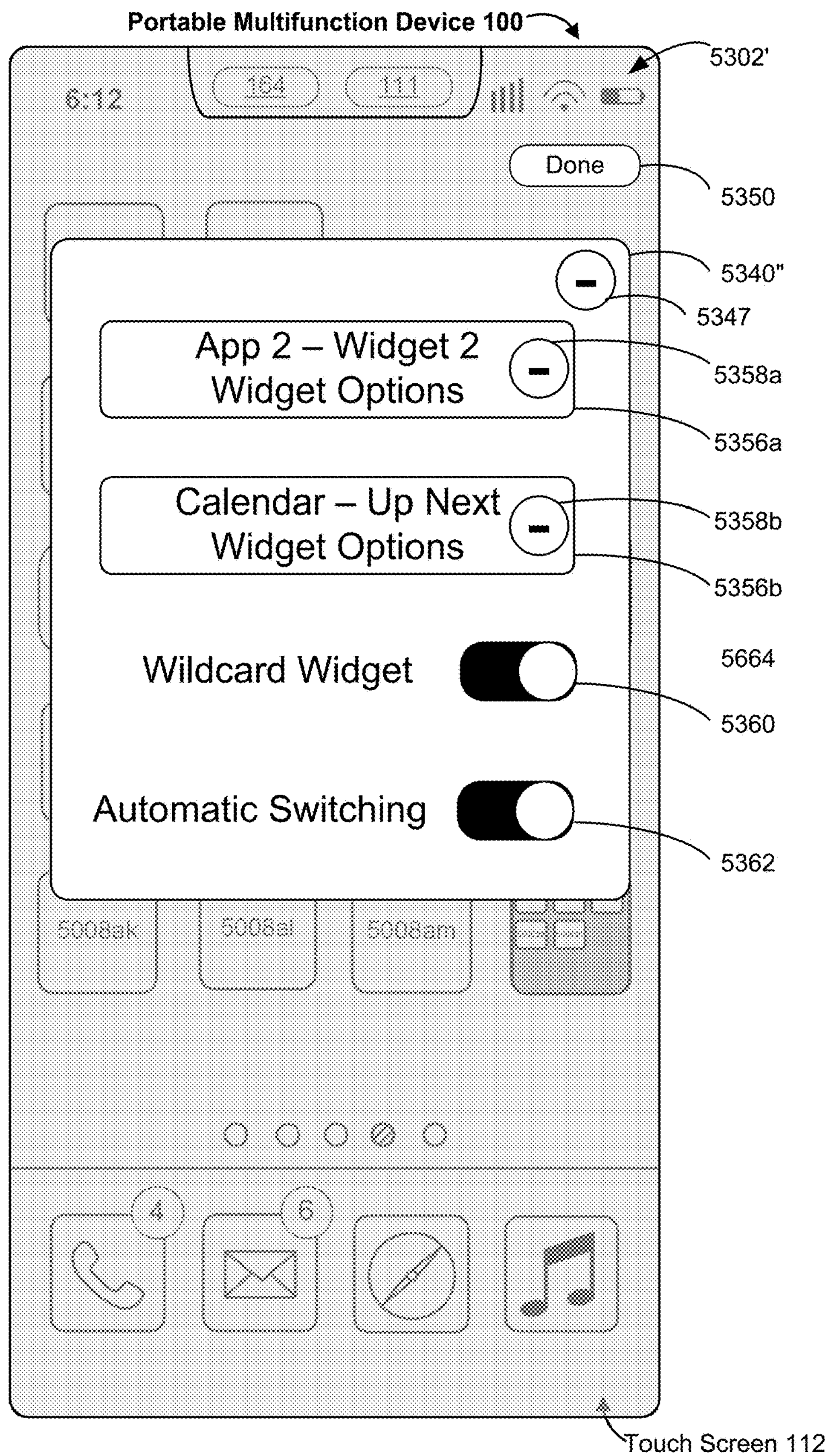
Figure 5C62

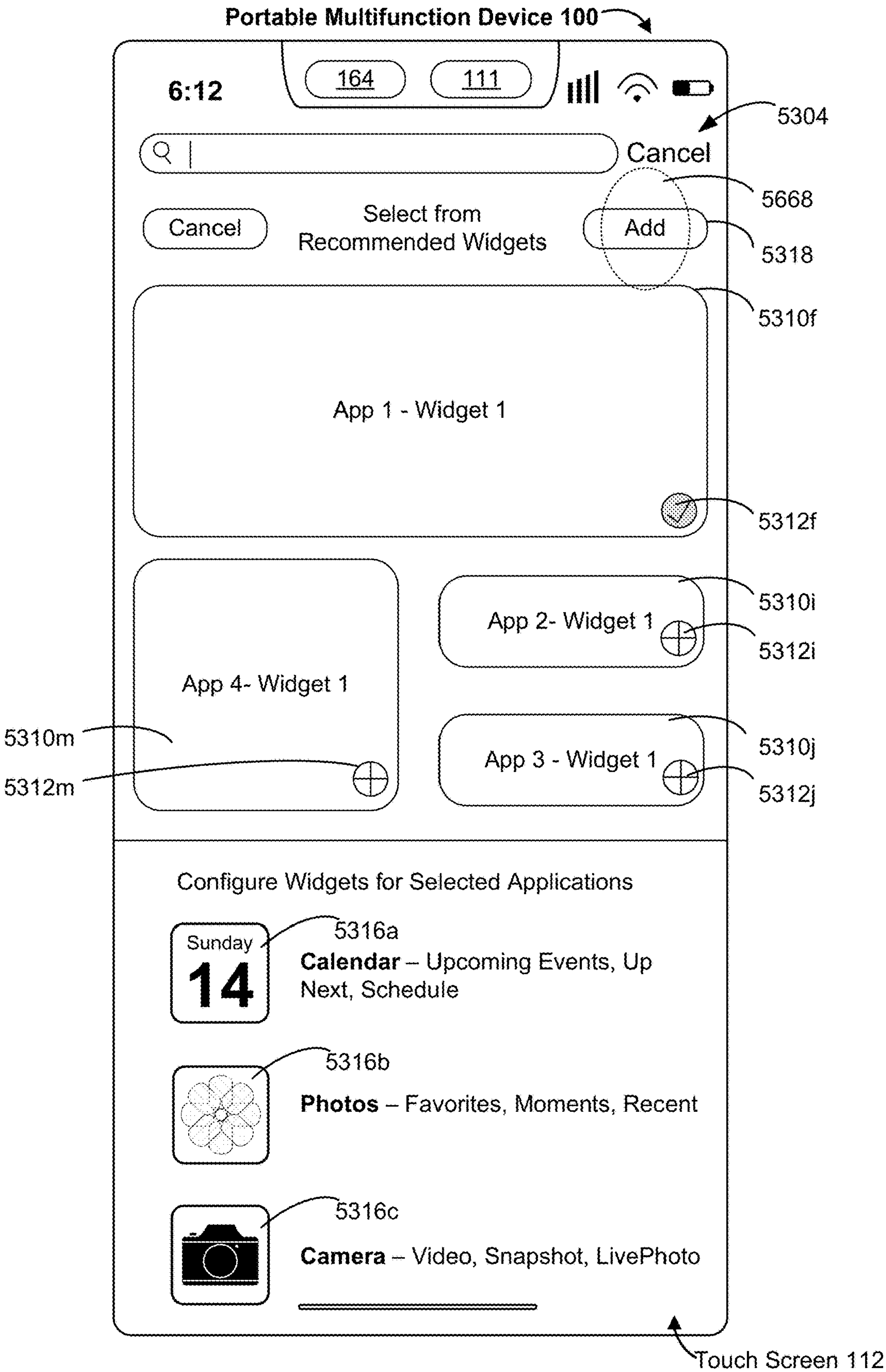
Figure 5C63

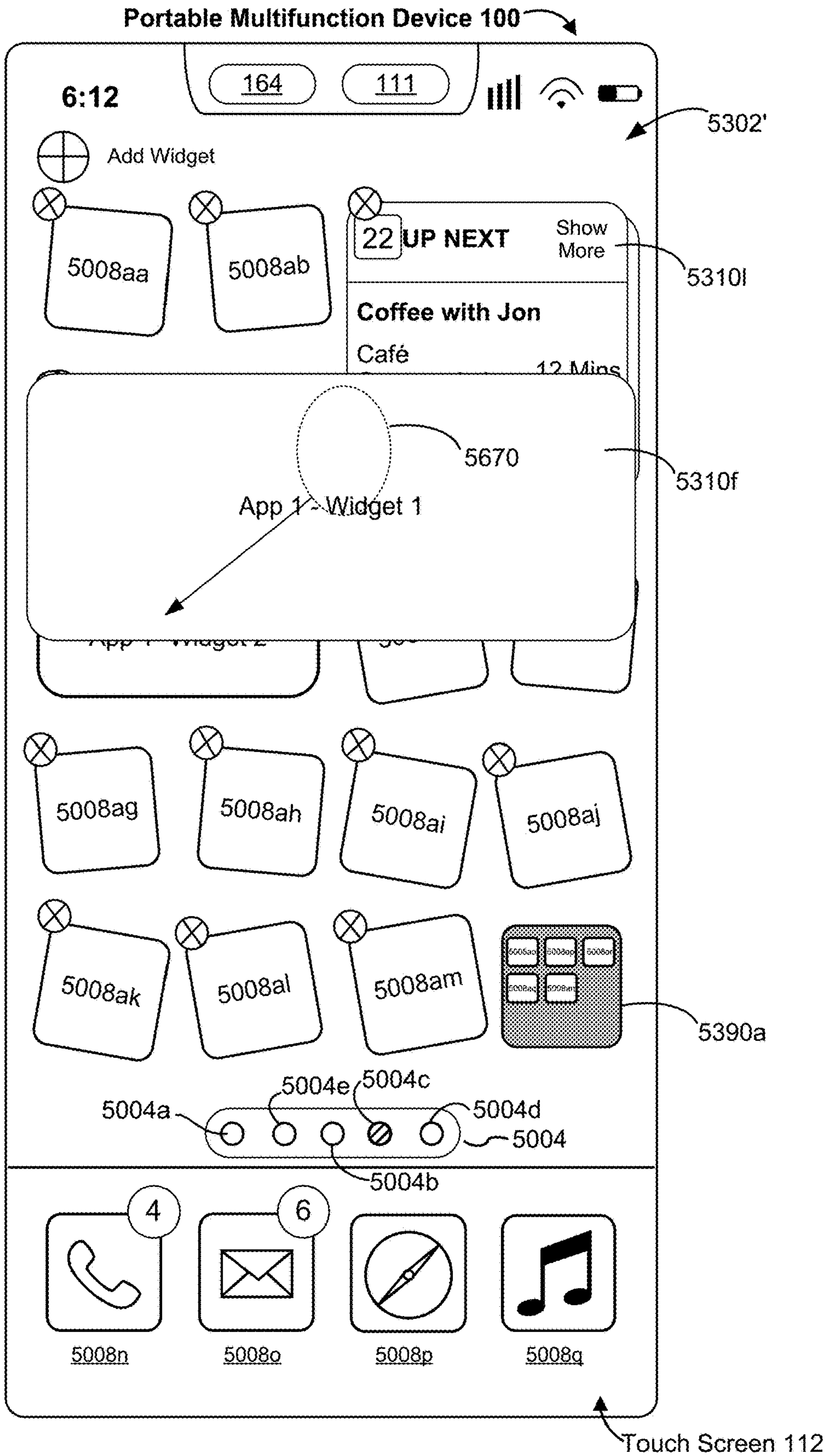
Figure 5C64

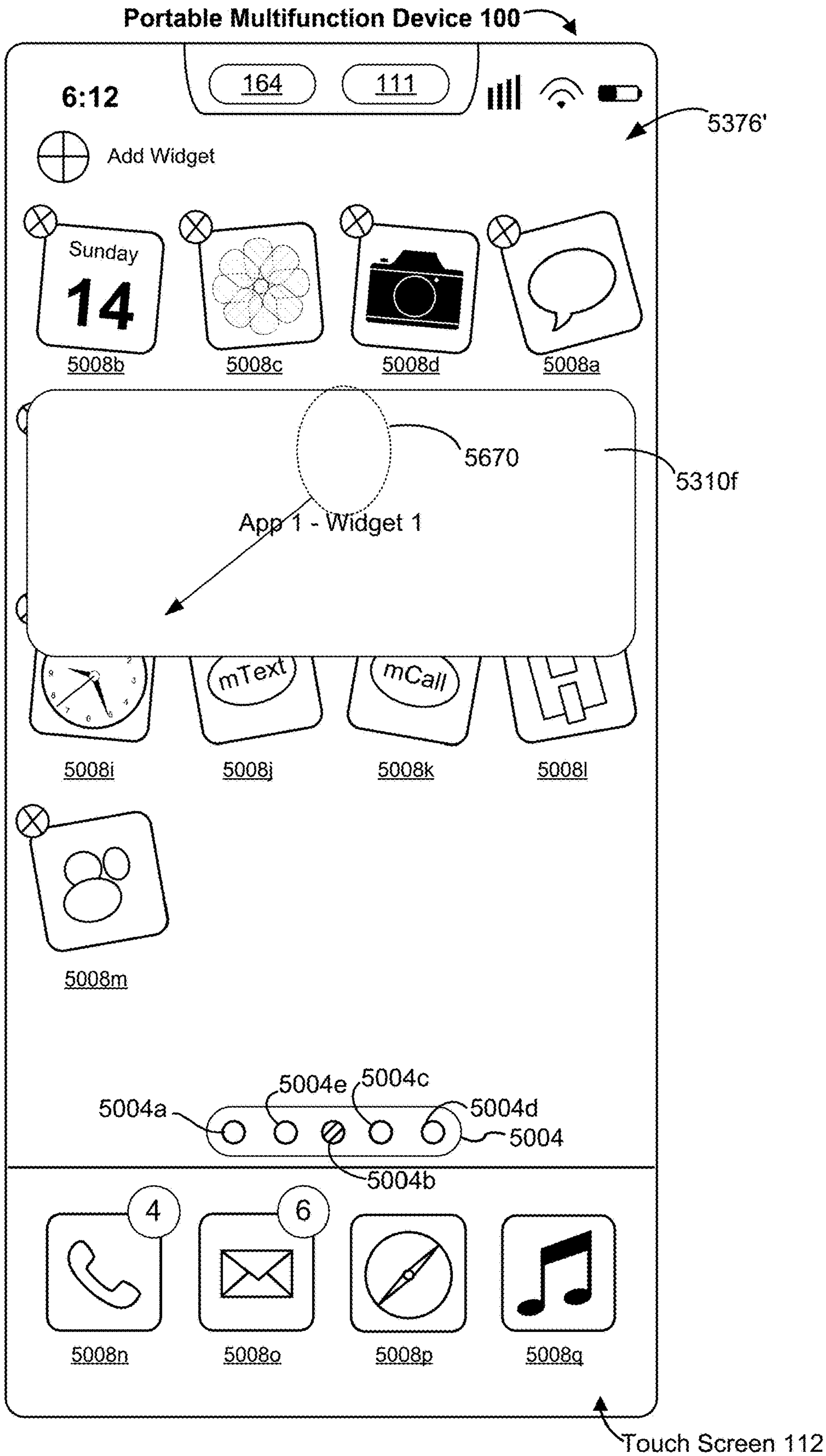
Figure 5C65

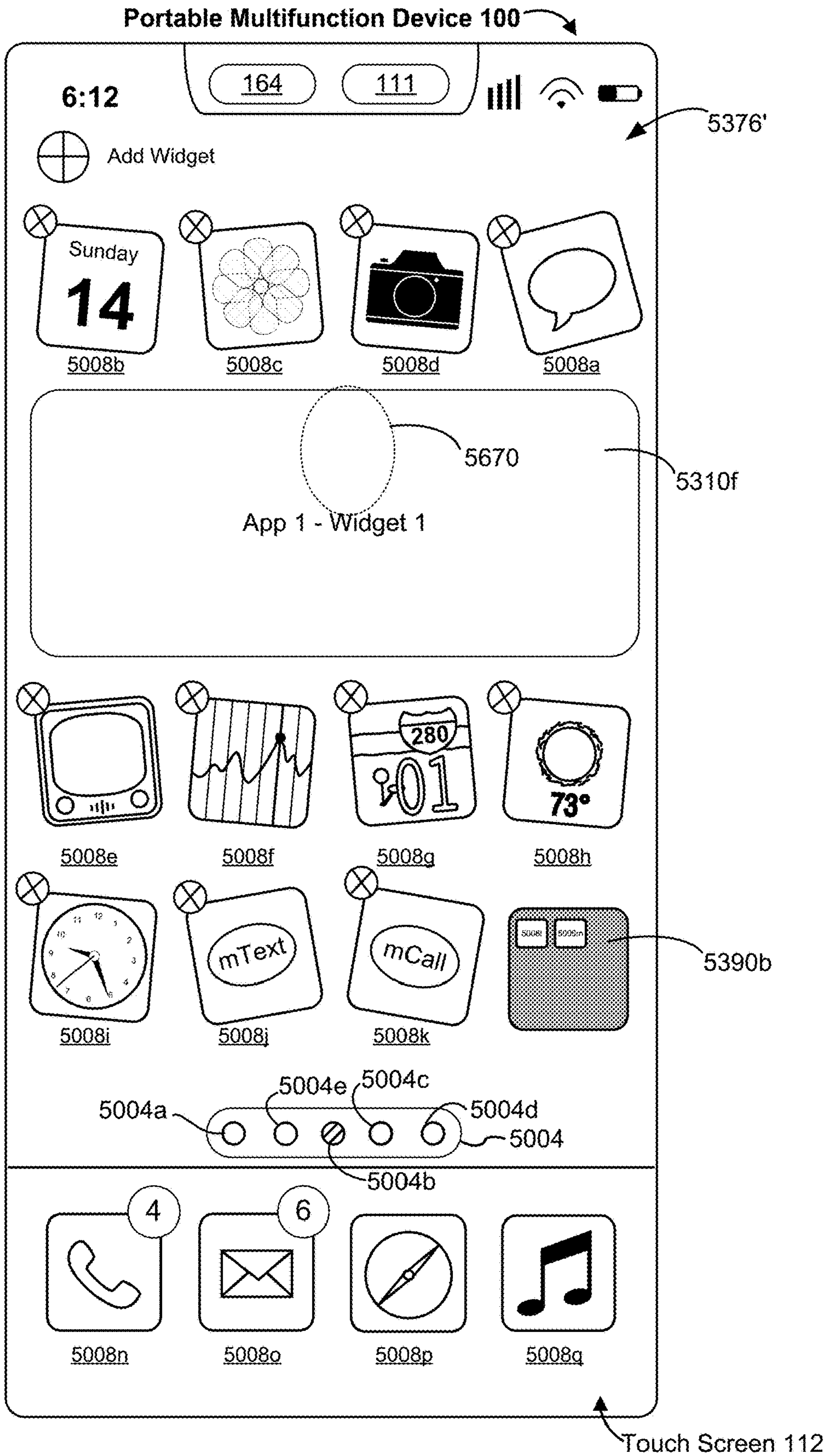
Figure 5C66

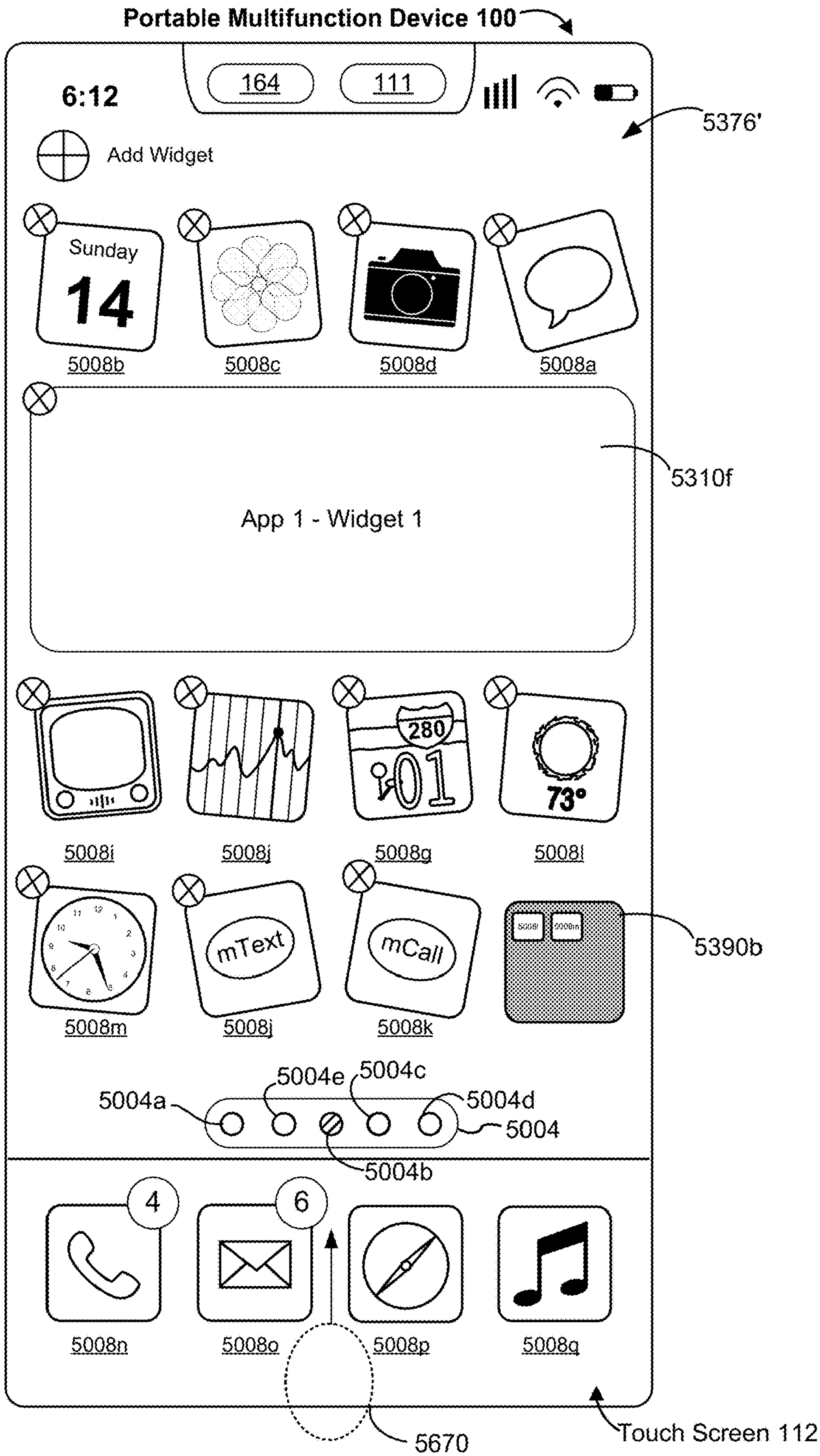
Figure 5C67

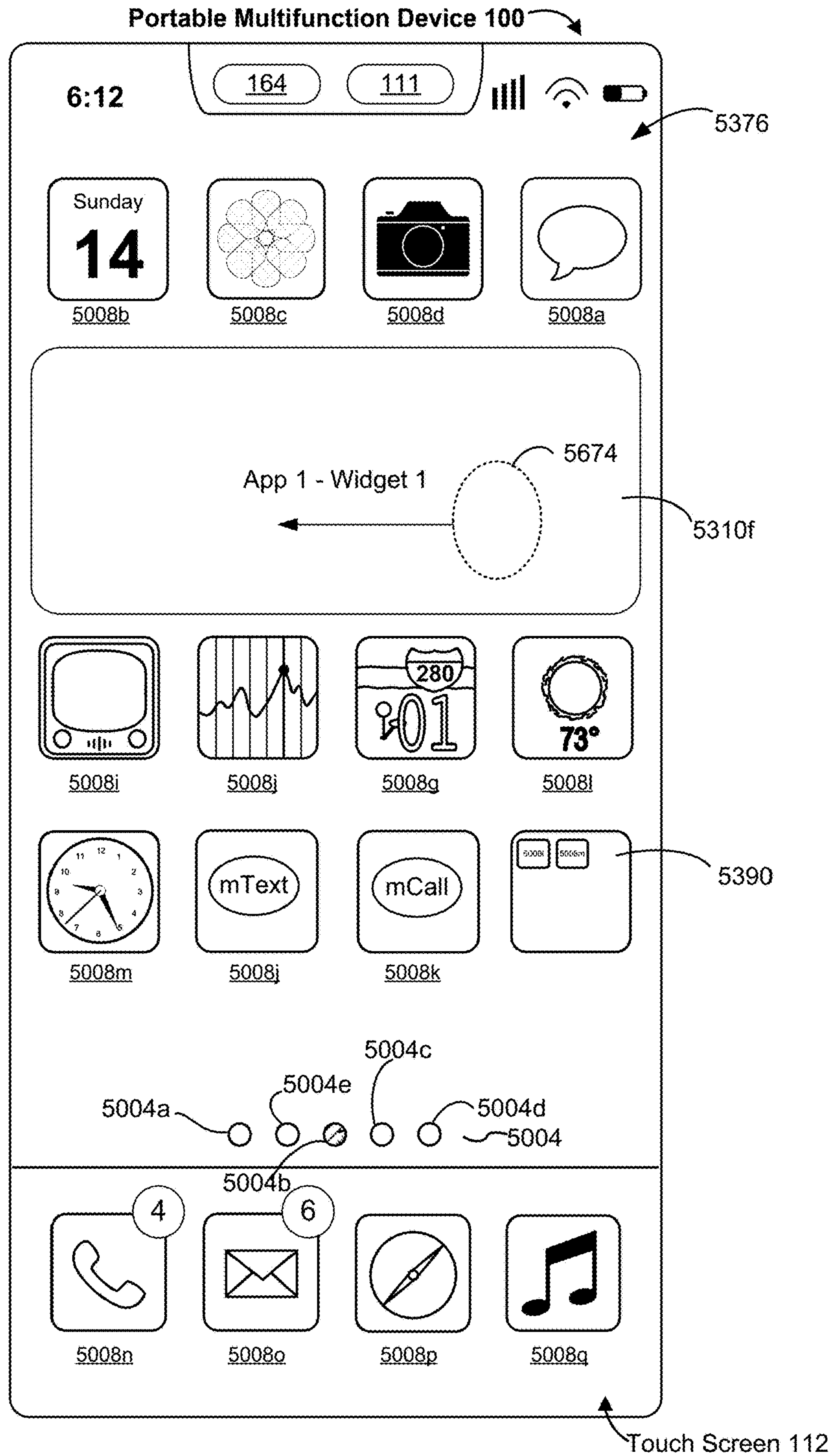
Figure 5C68

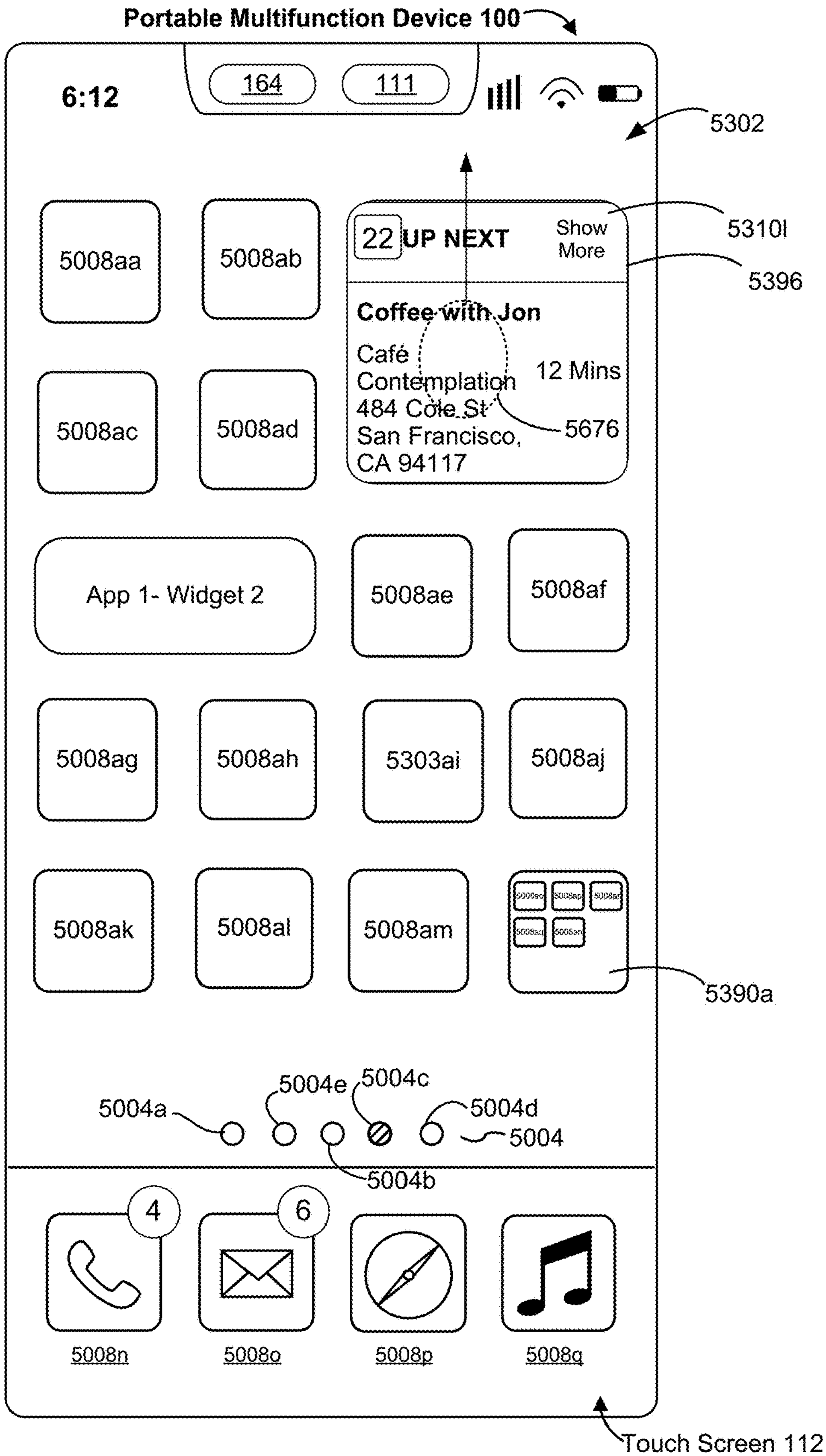
Figure 5C69

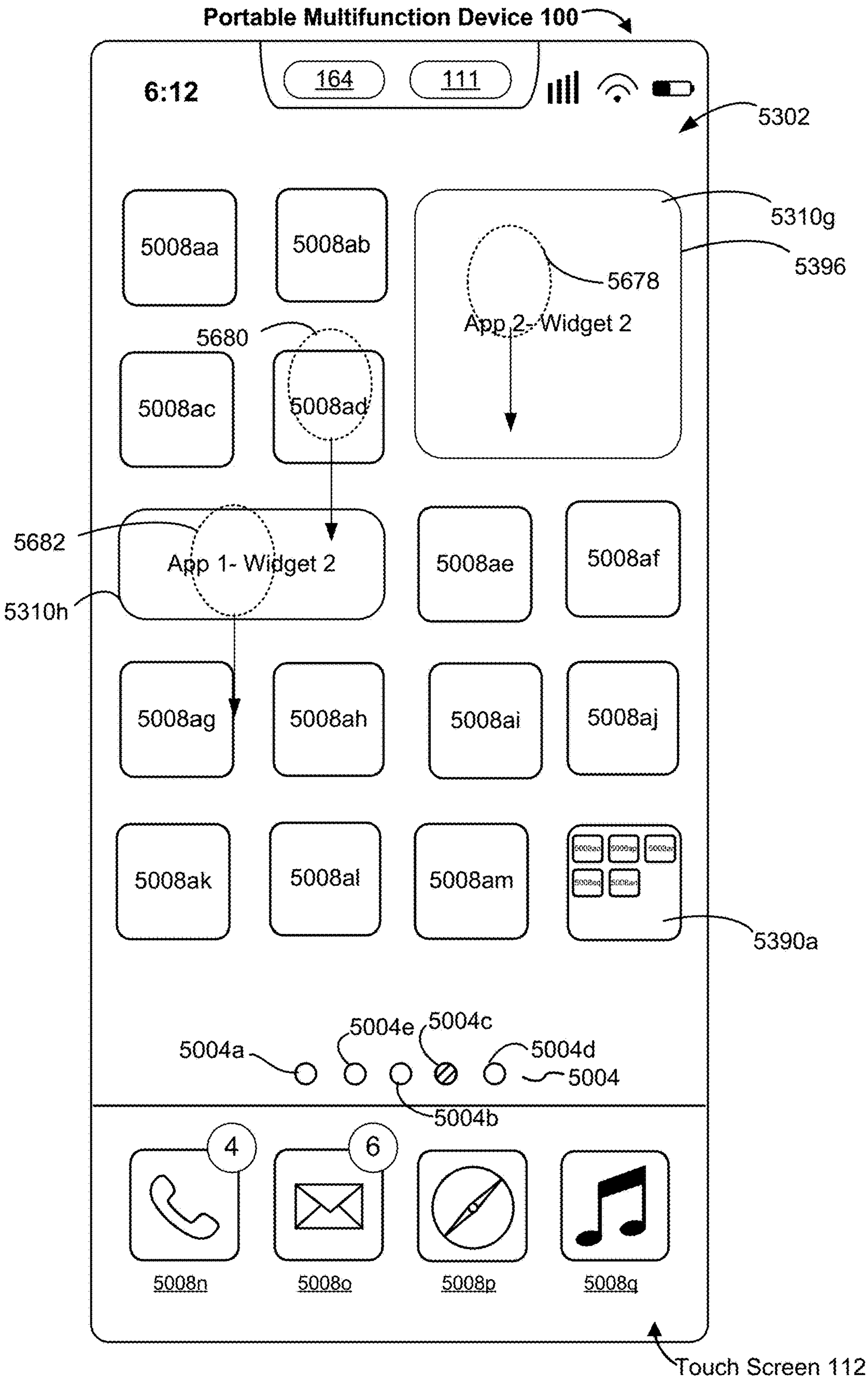
Figure 5C70

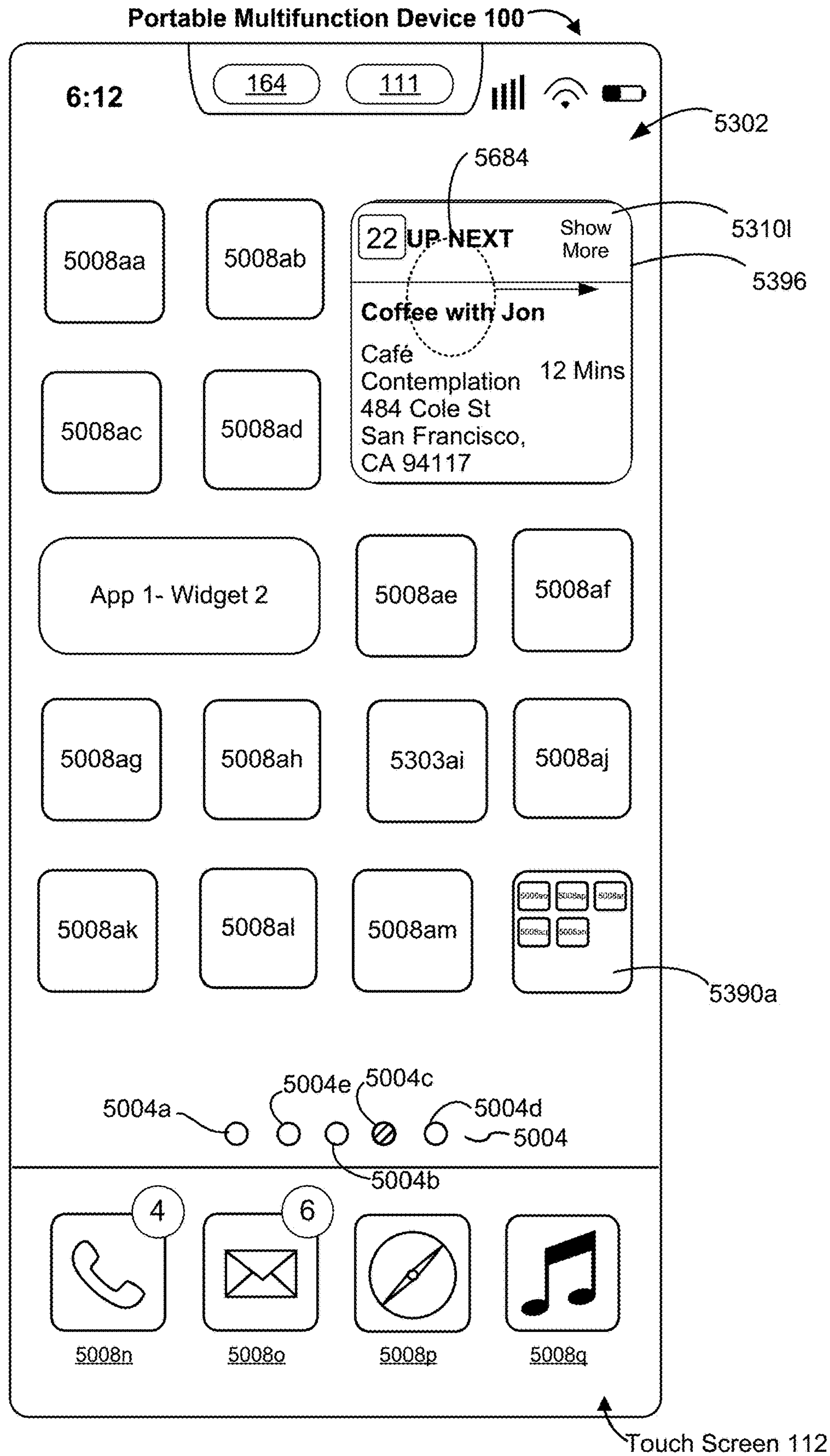
Figure 5C71

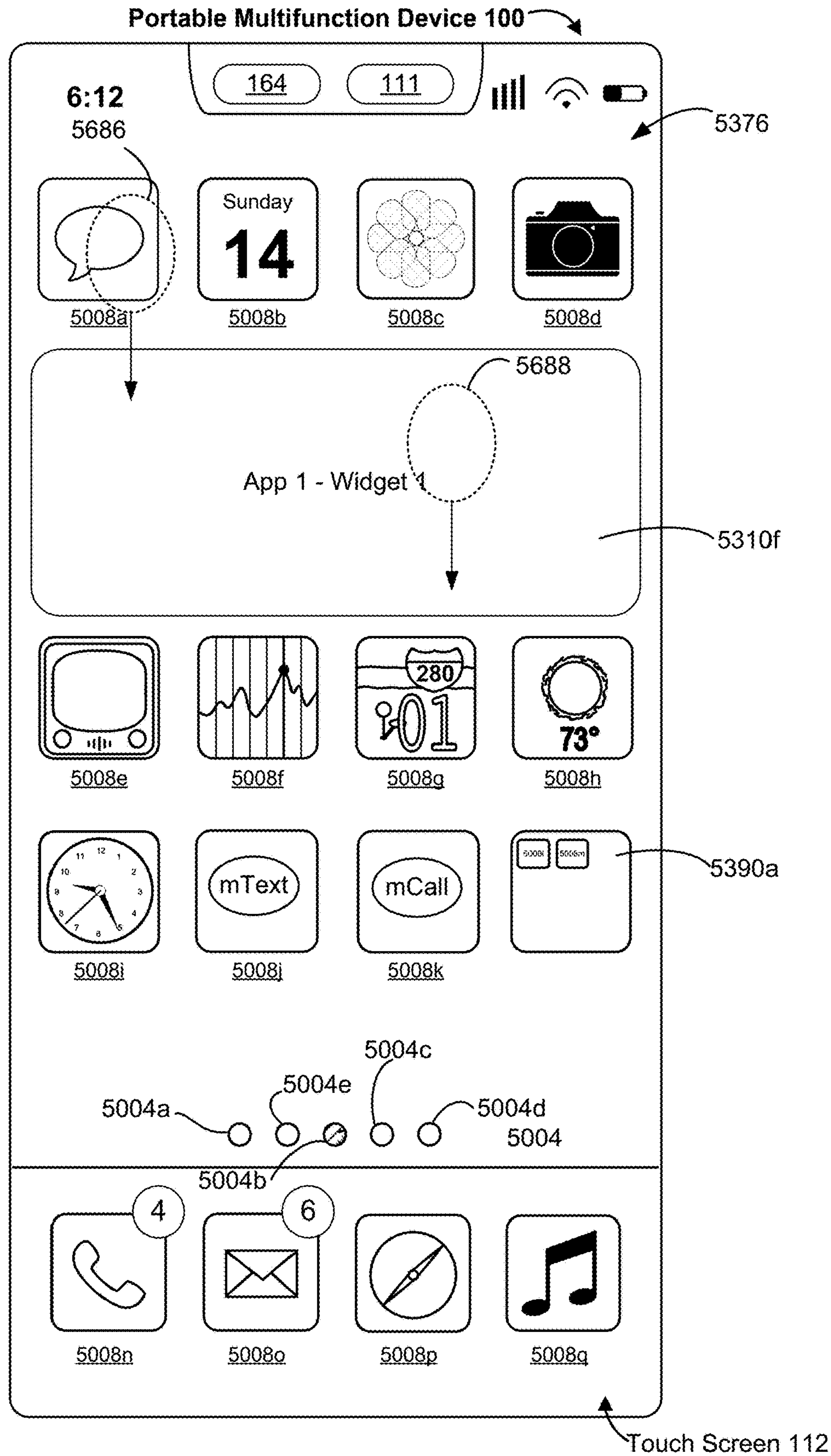
Figure 5C72

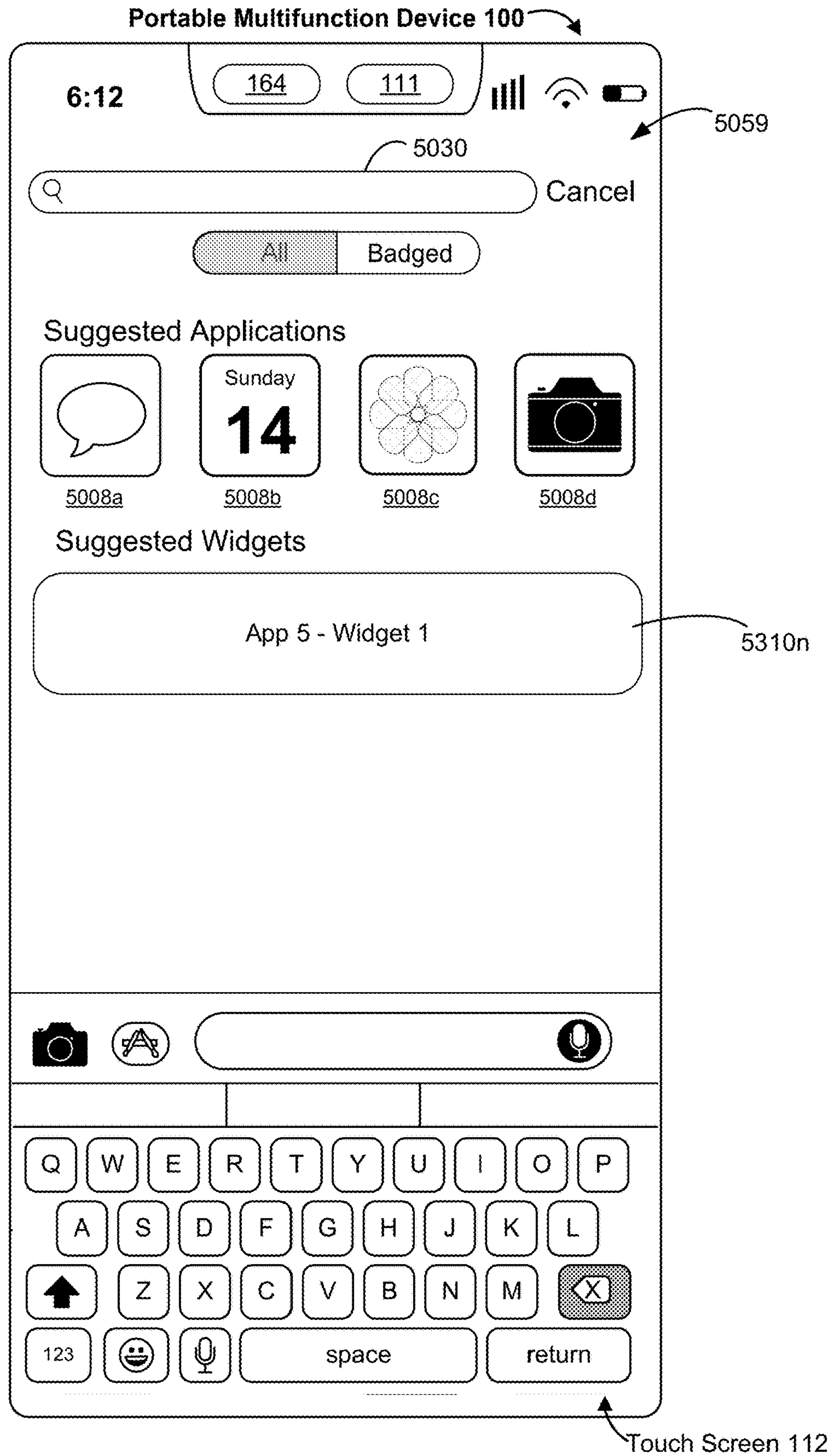
Figure 5C73

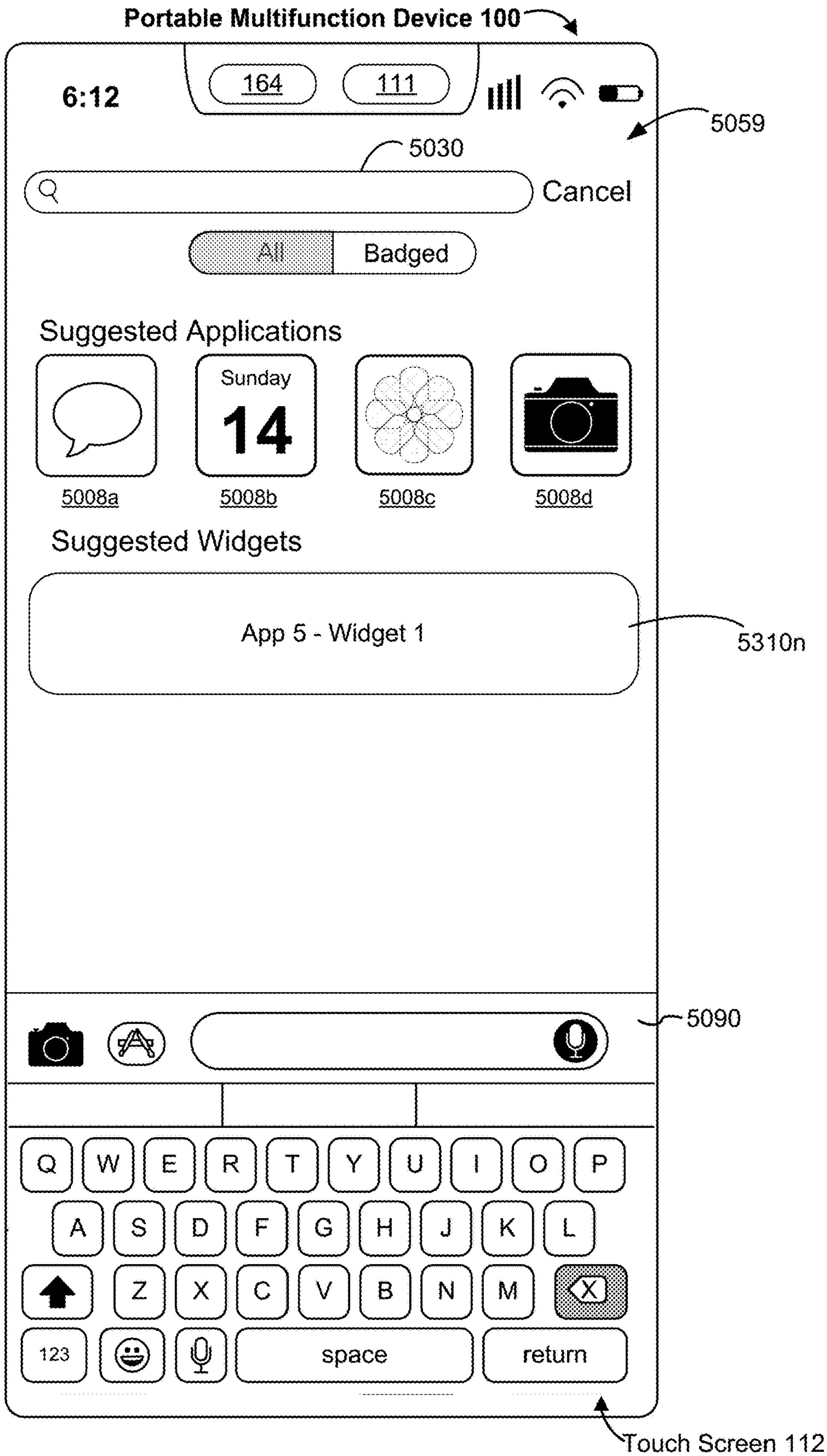
Figure 5C73

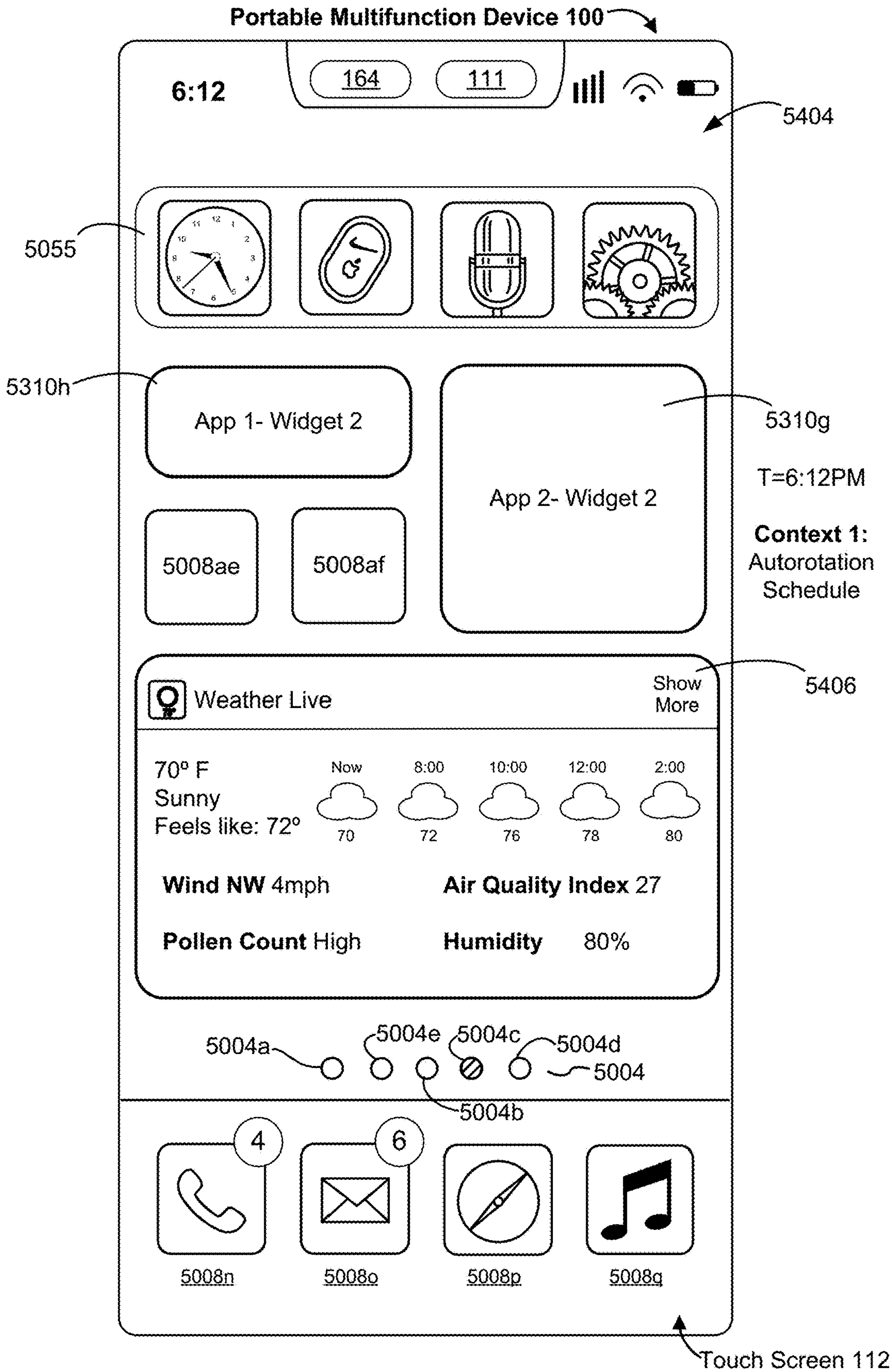
Figure 5D1

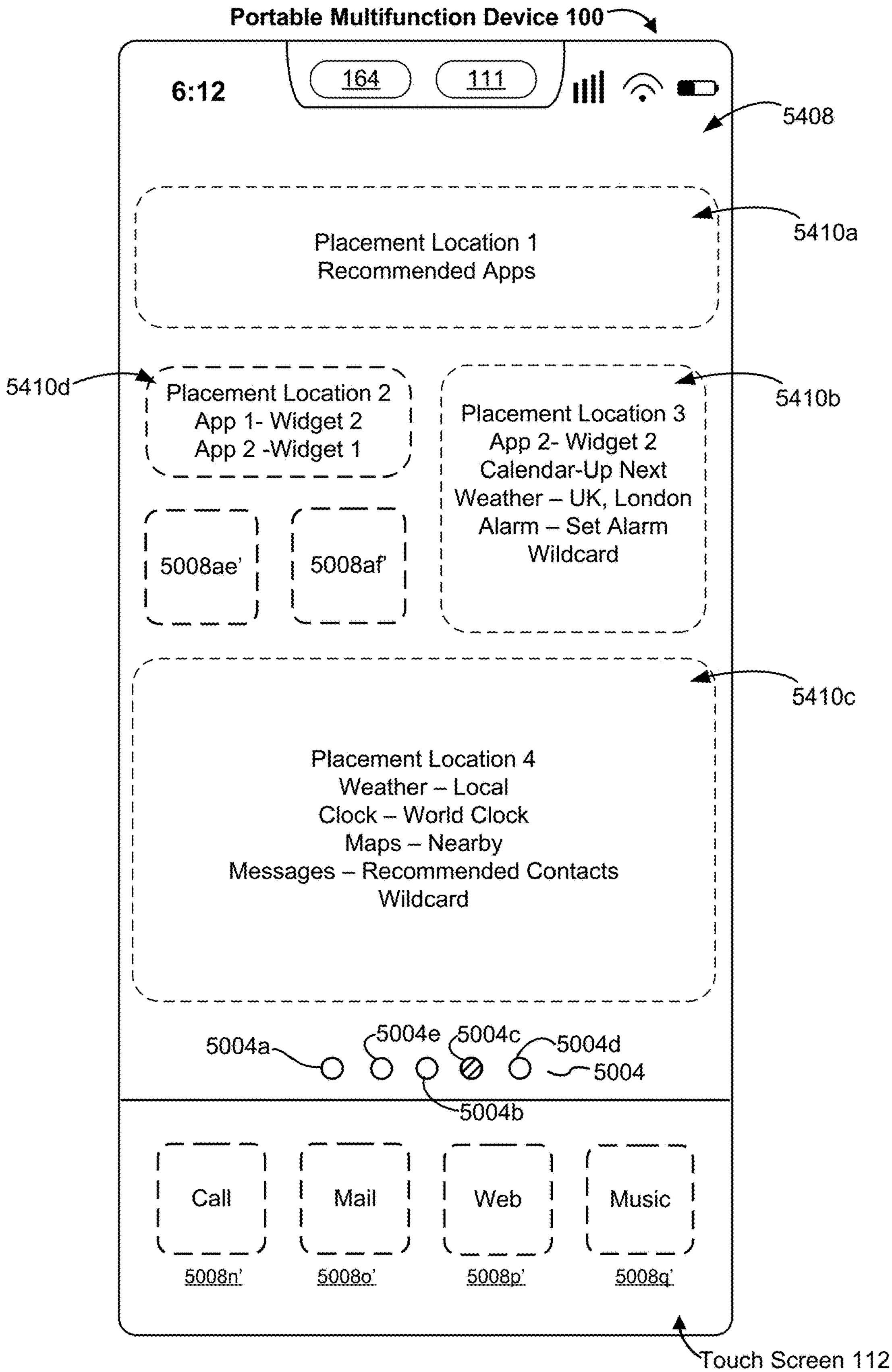
Figure 5D2

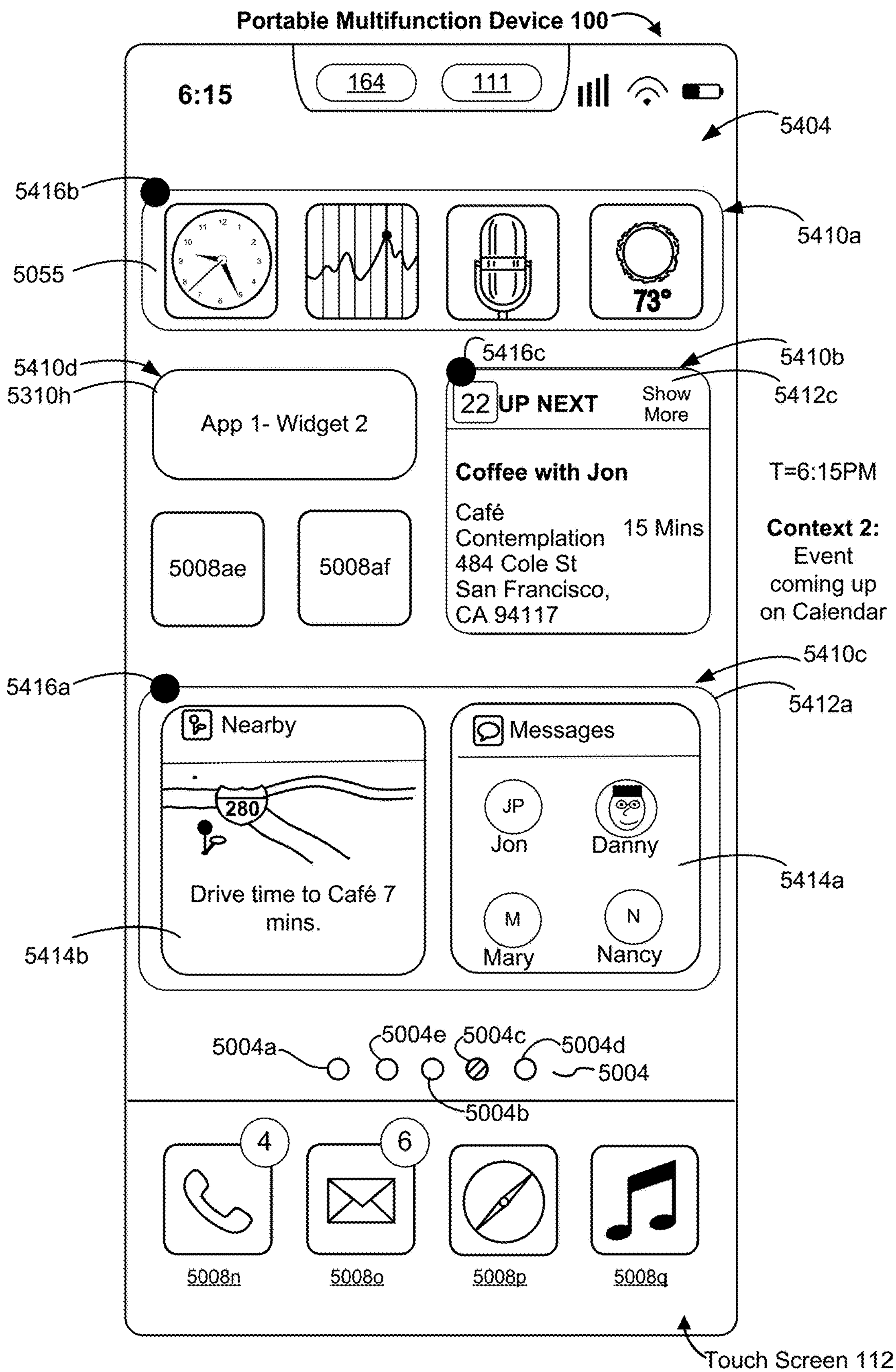
Figure 5D3

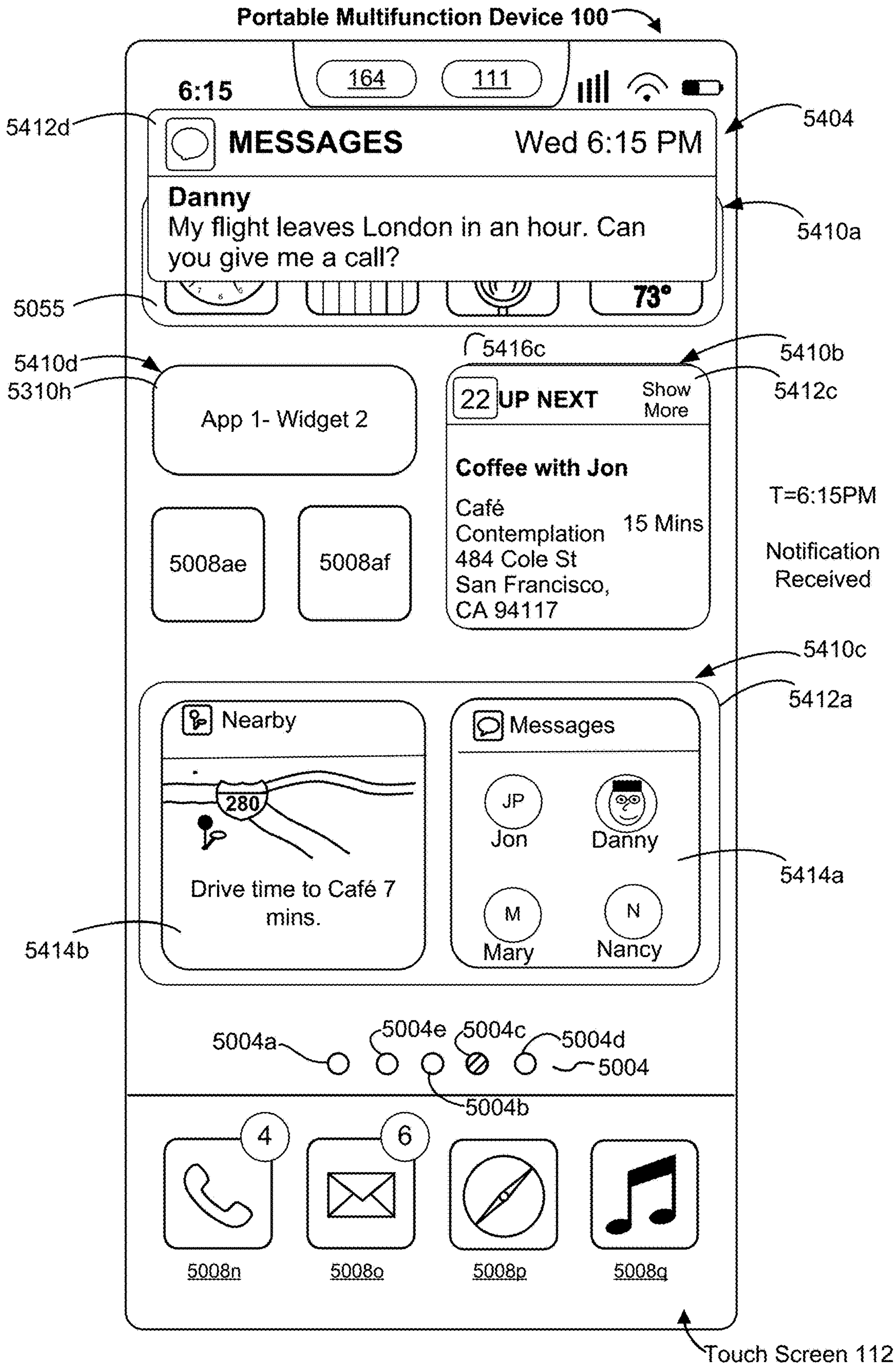
Figure 5D4

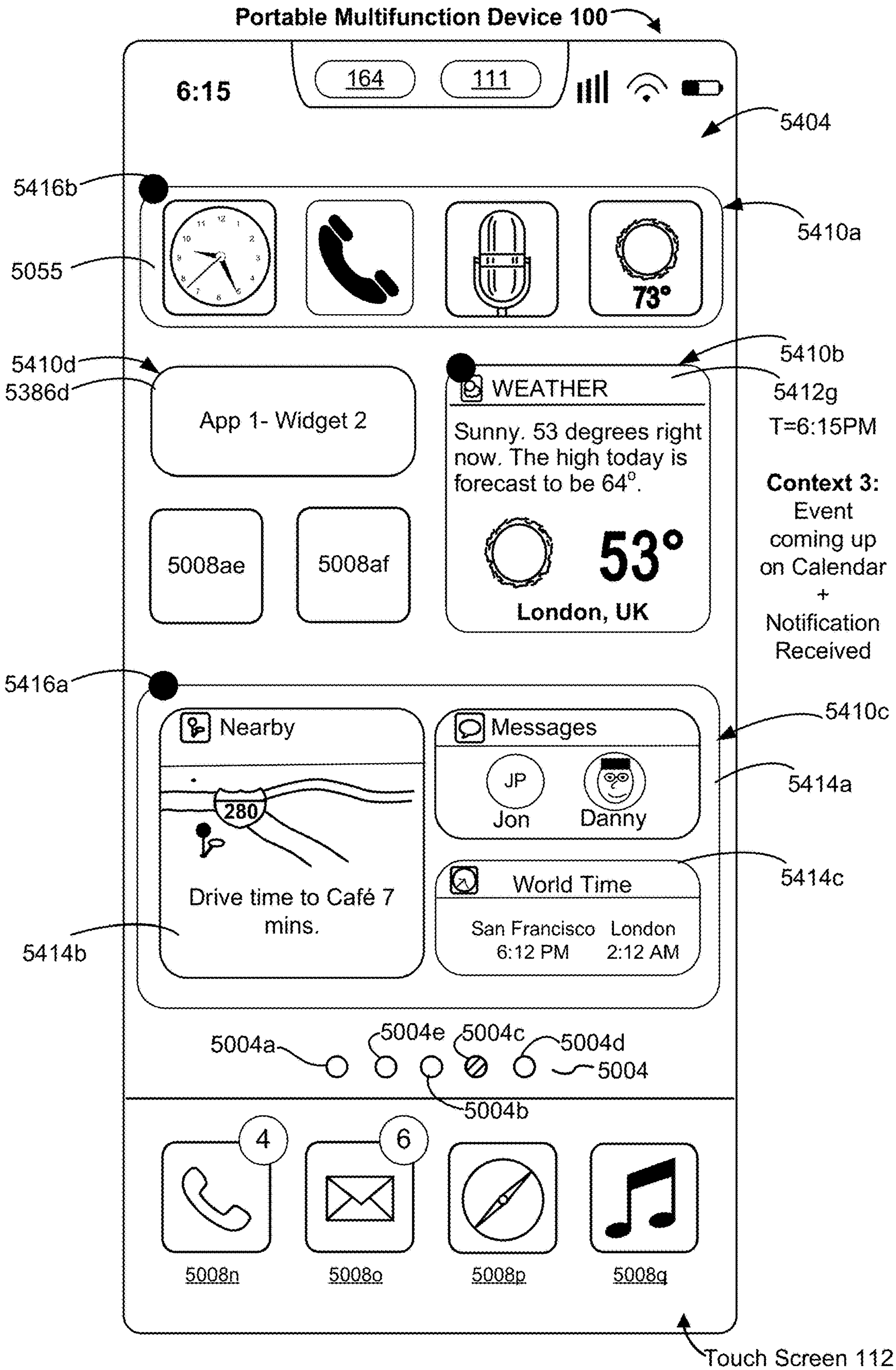
Figure 5D5

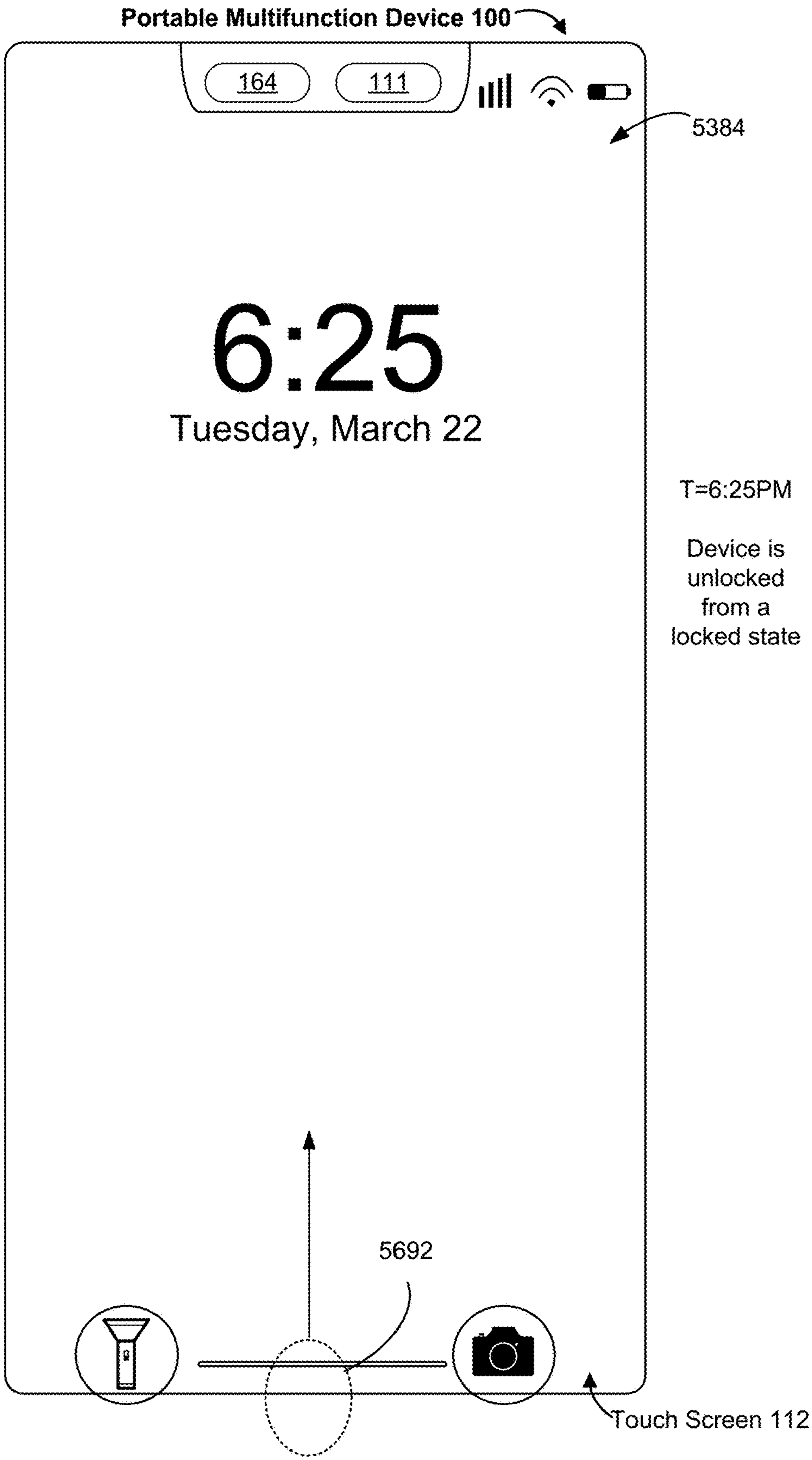
Figure 5D6

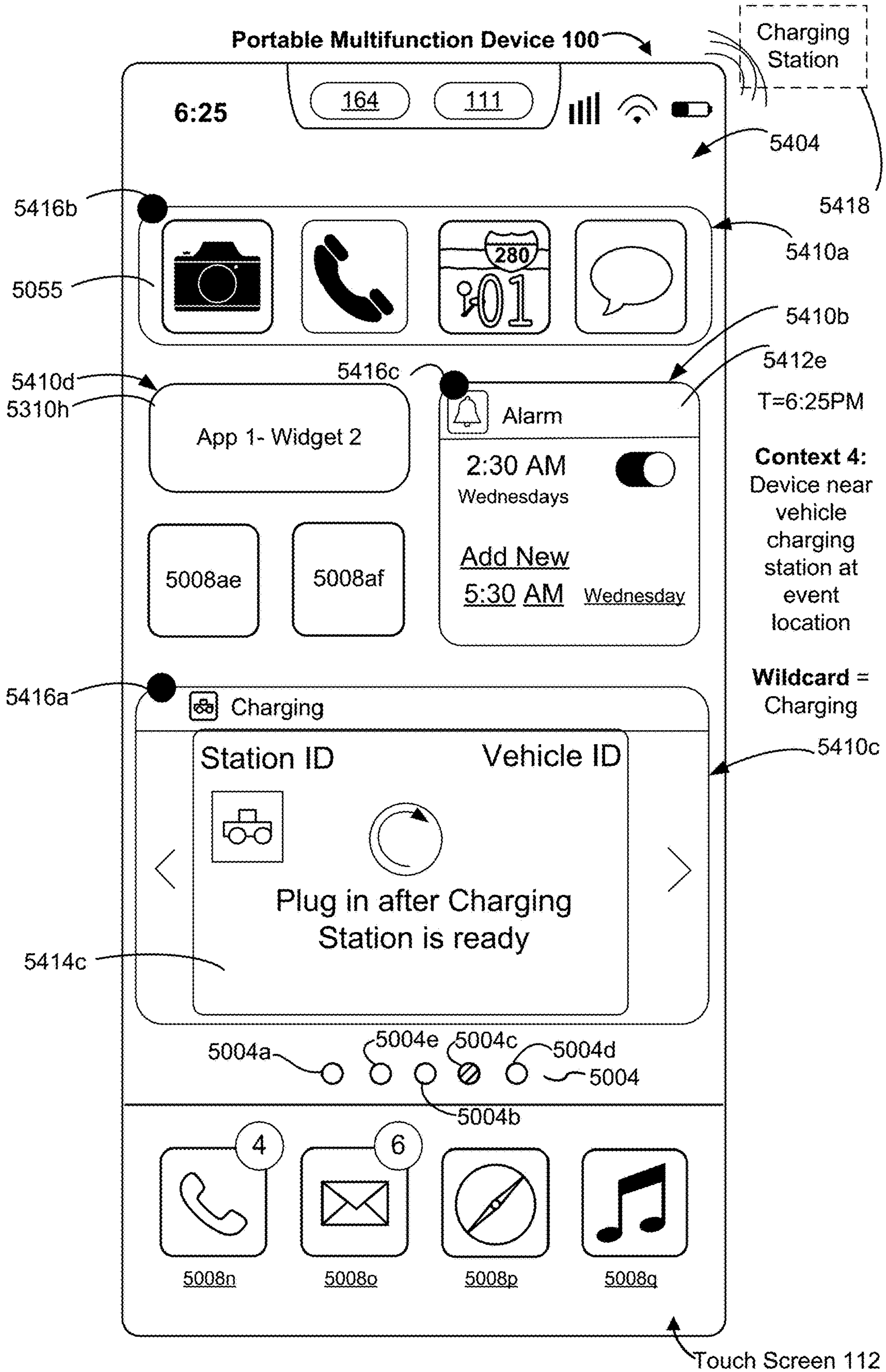
Figure 5D7

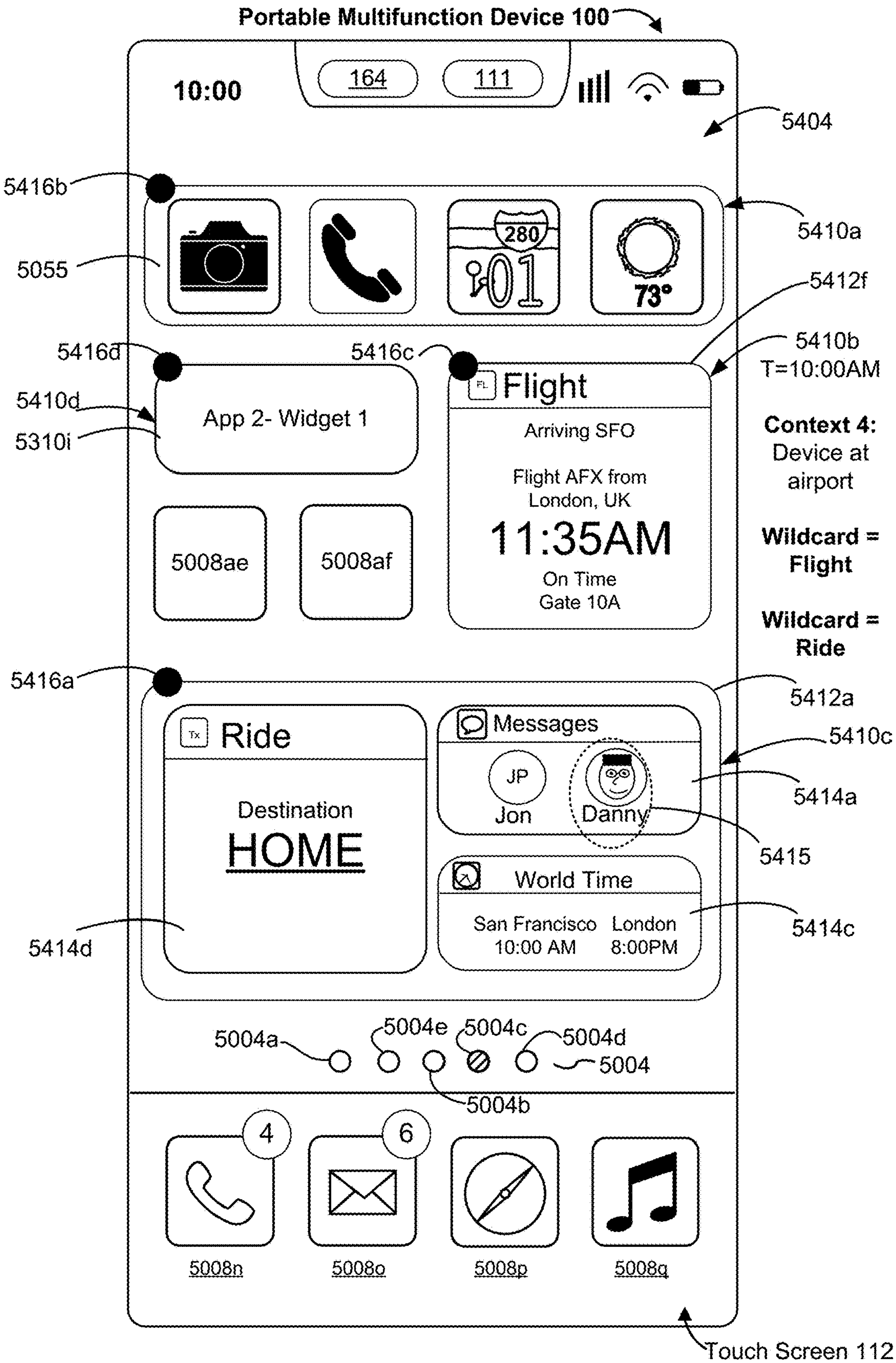
Figure 5D8

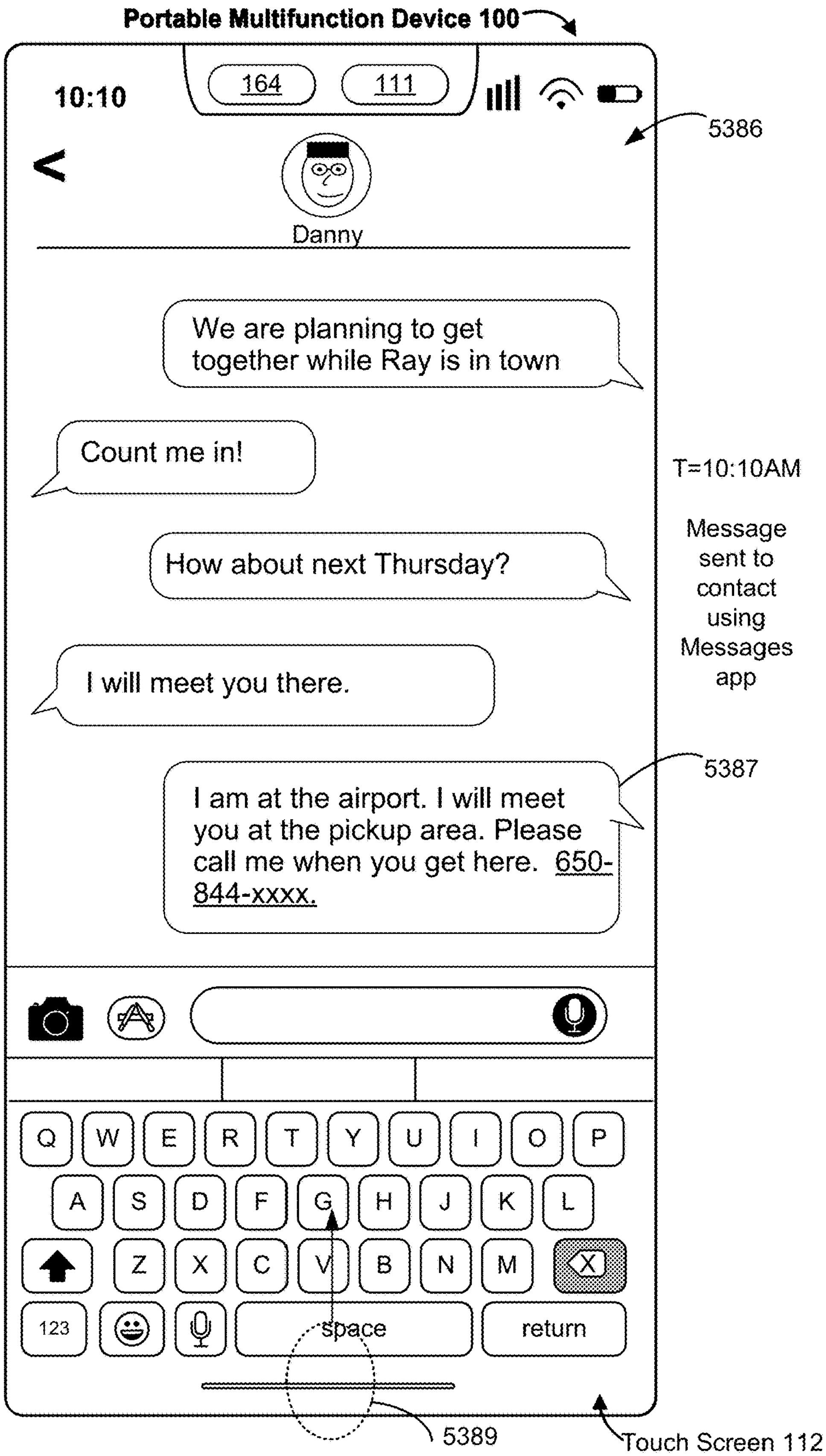
Figure 5D9

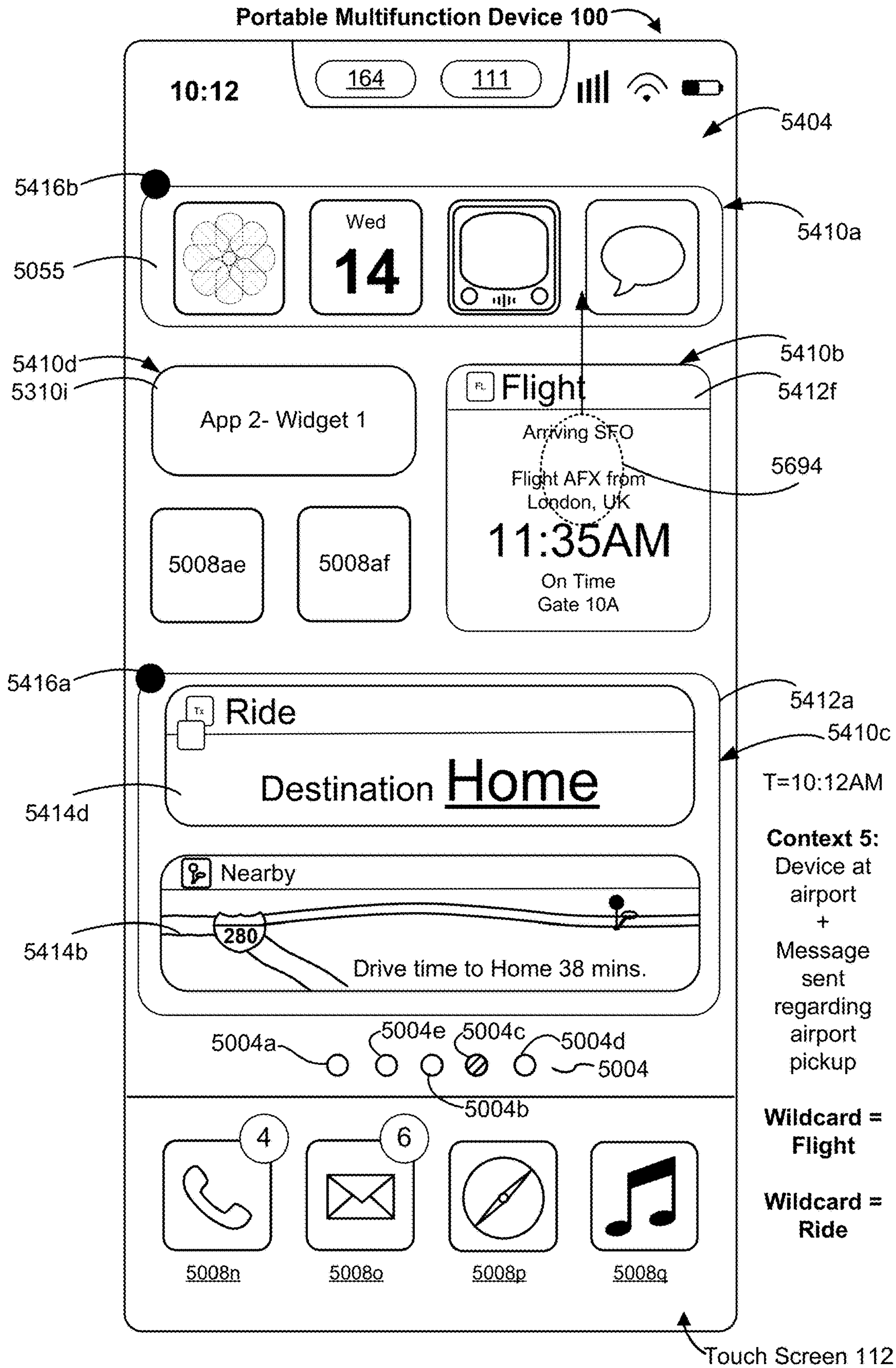
Figure 5D10

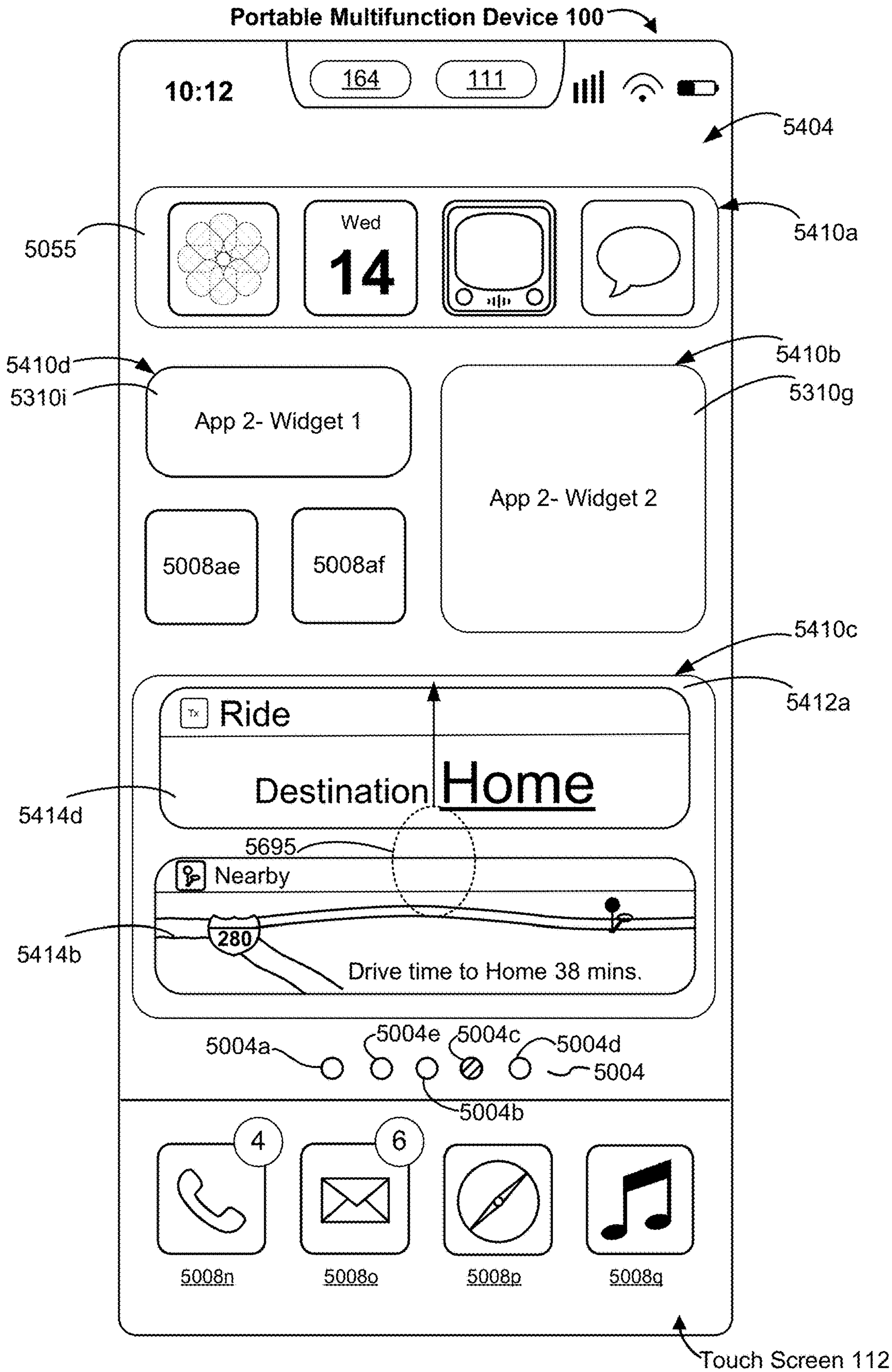
Figure 5D11

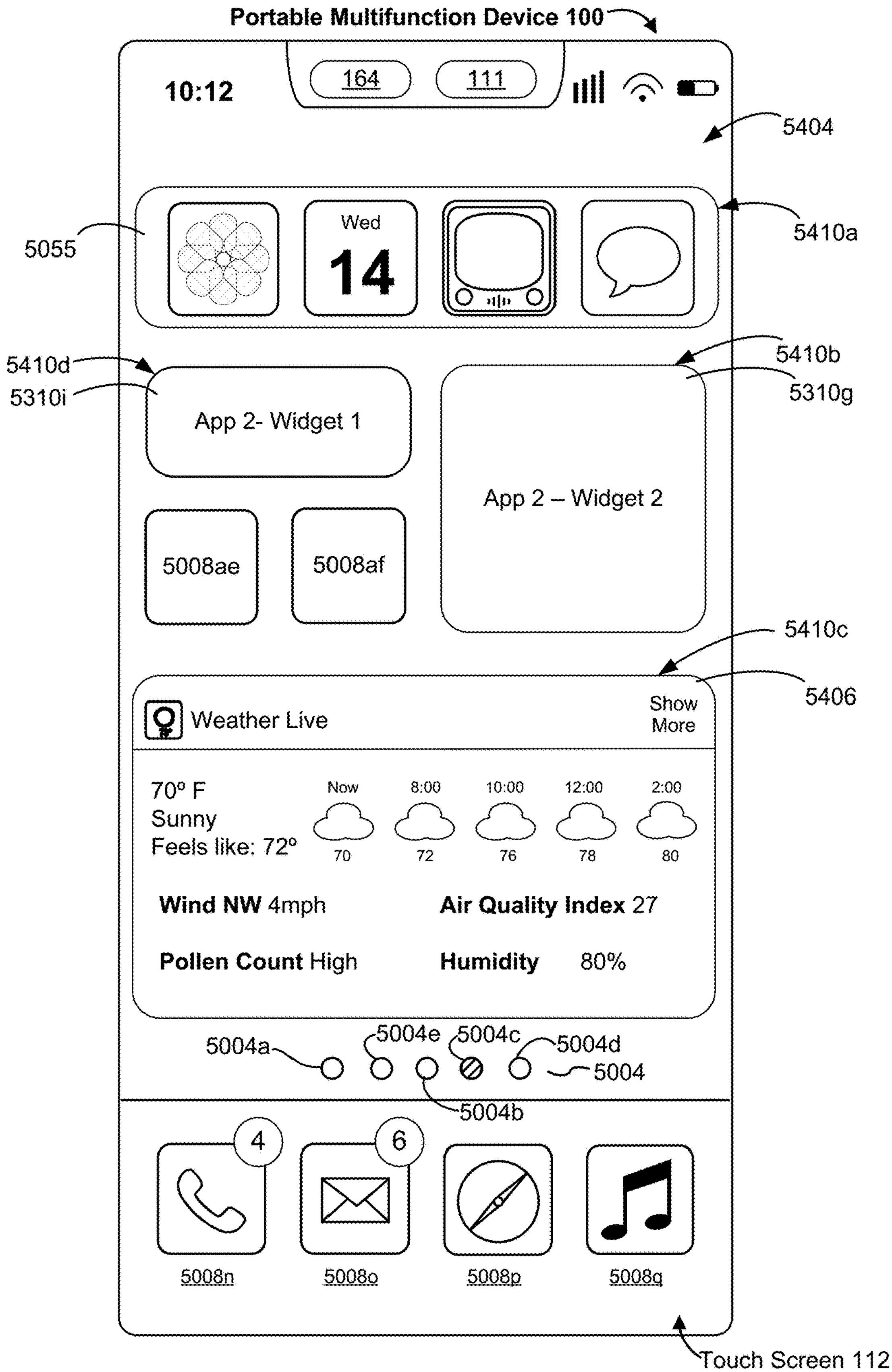
Figure 5D12

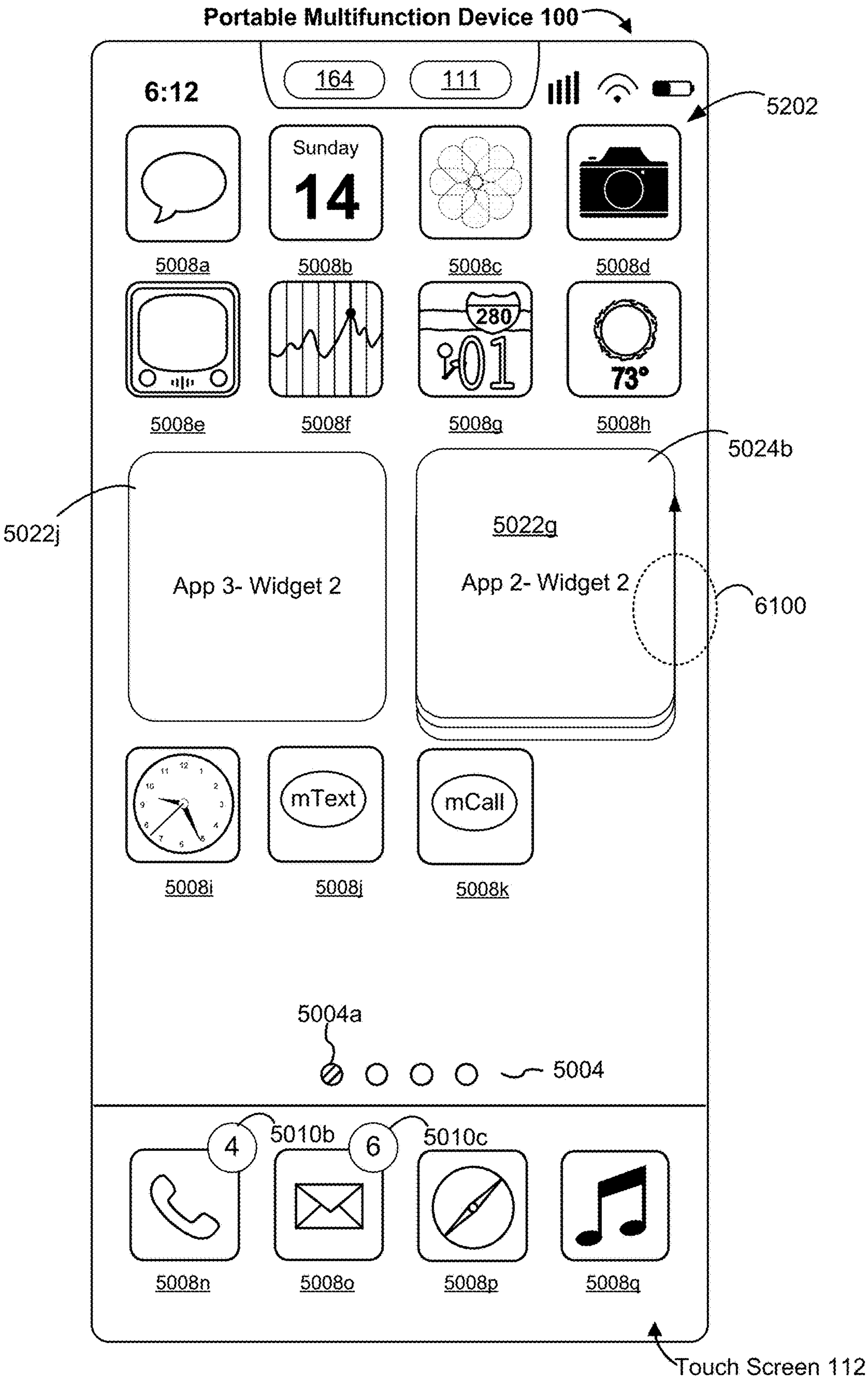
Figure 5E1

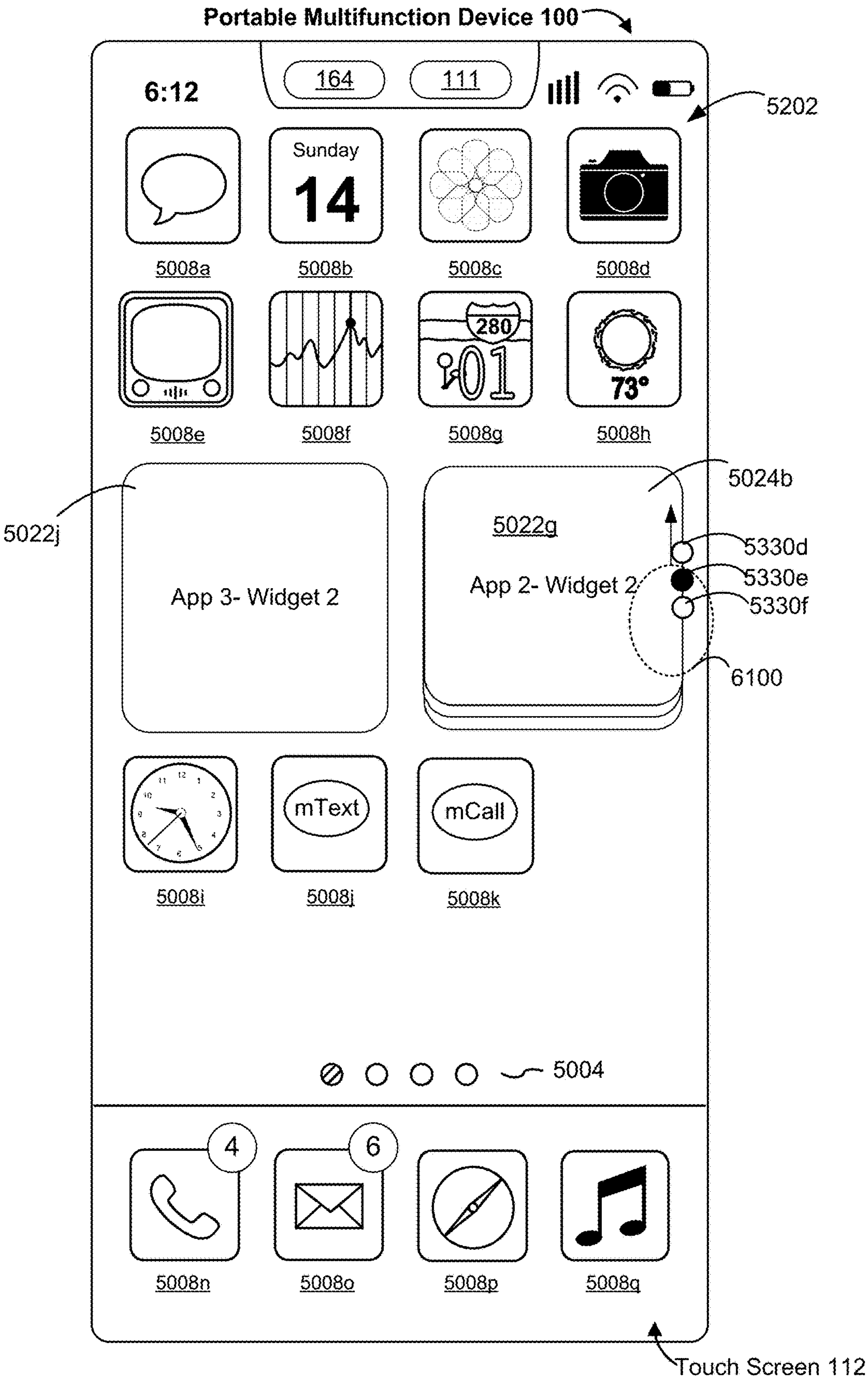
Figure 5E2

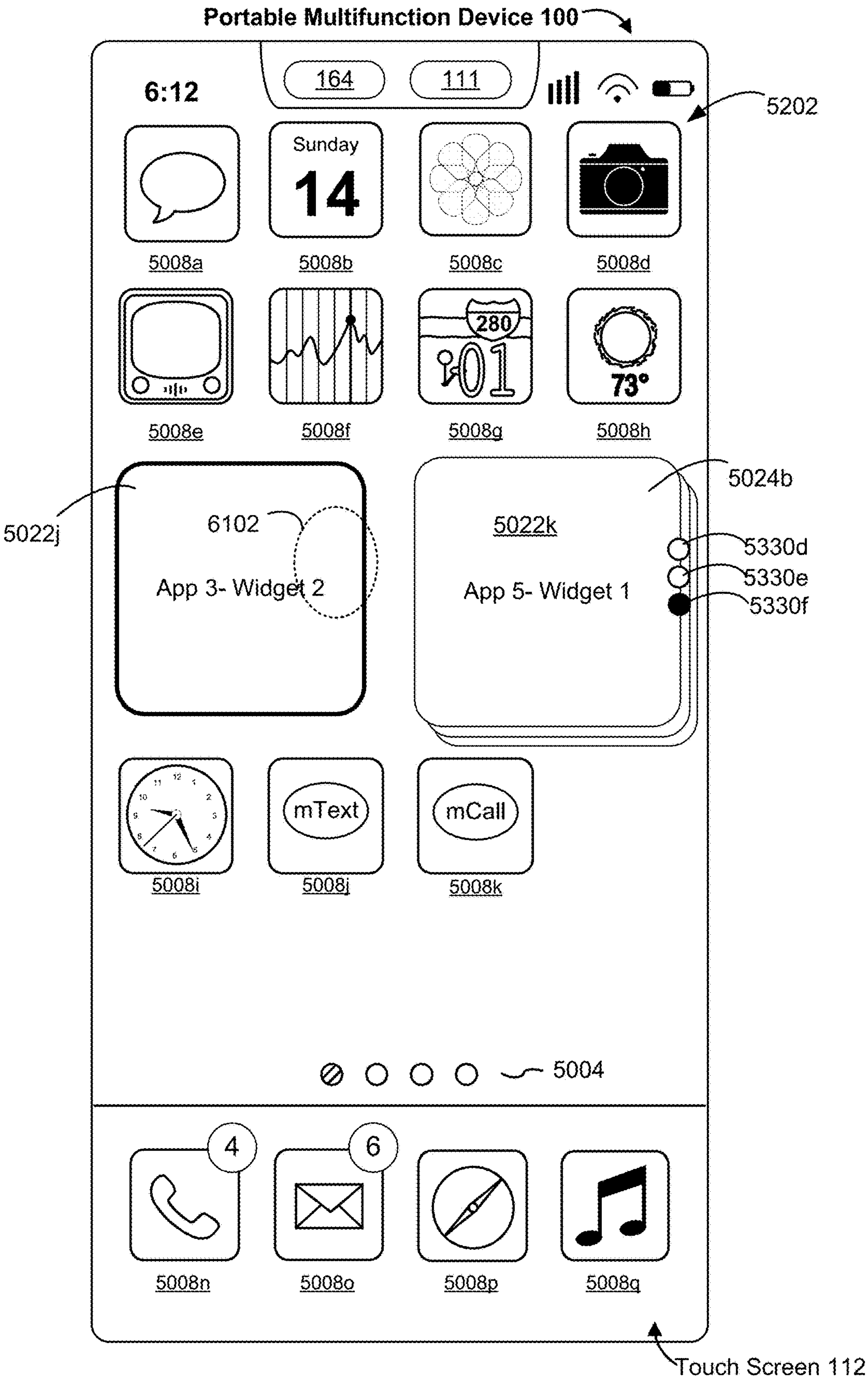
Figure 5E3

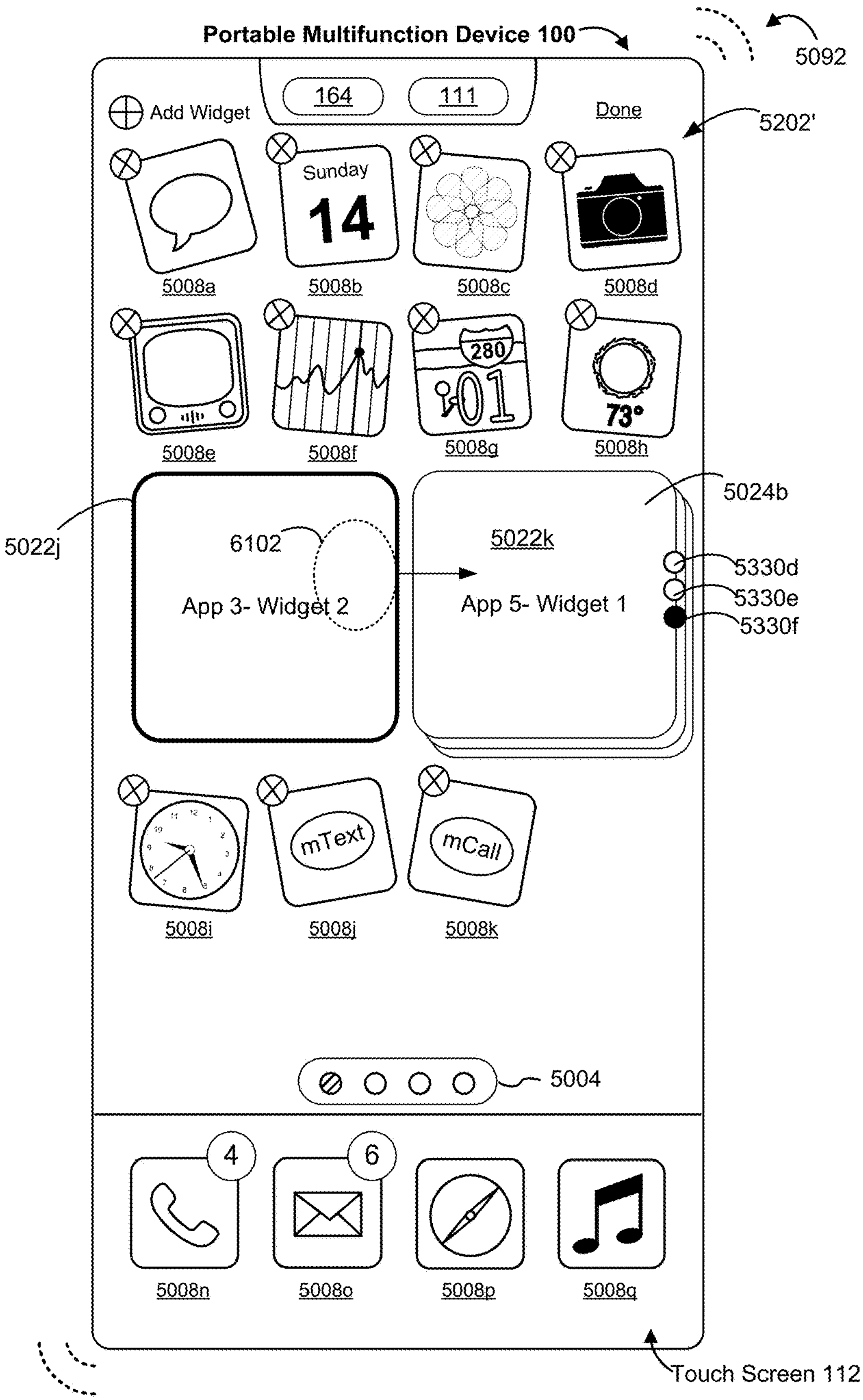
Figure 5E4

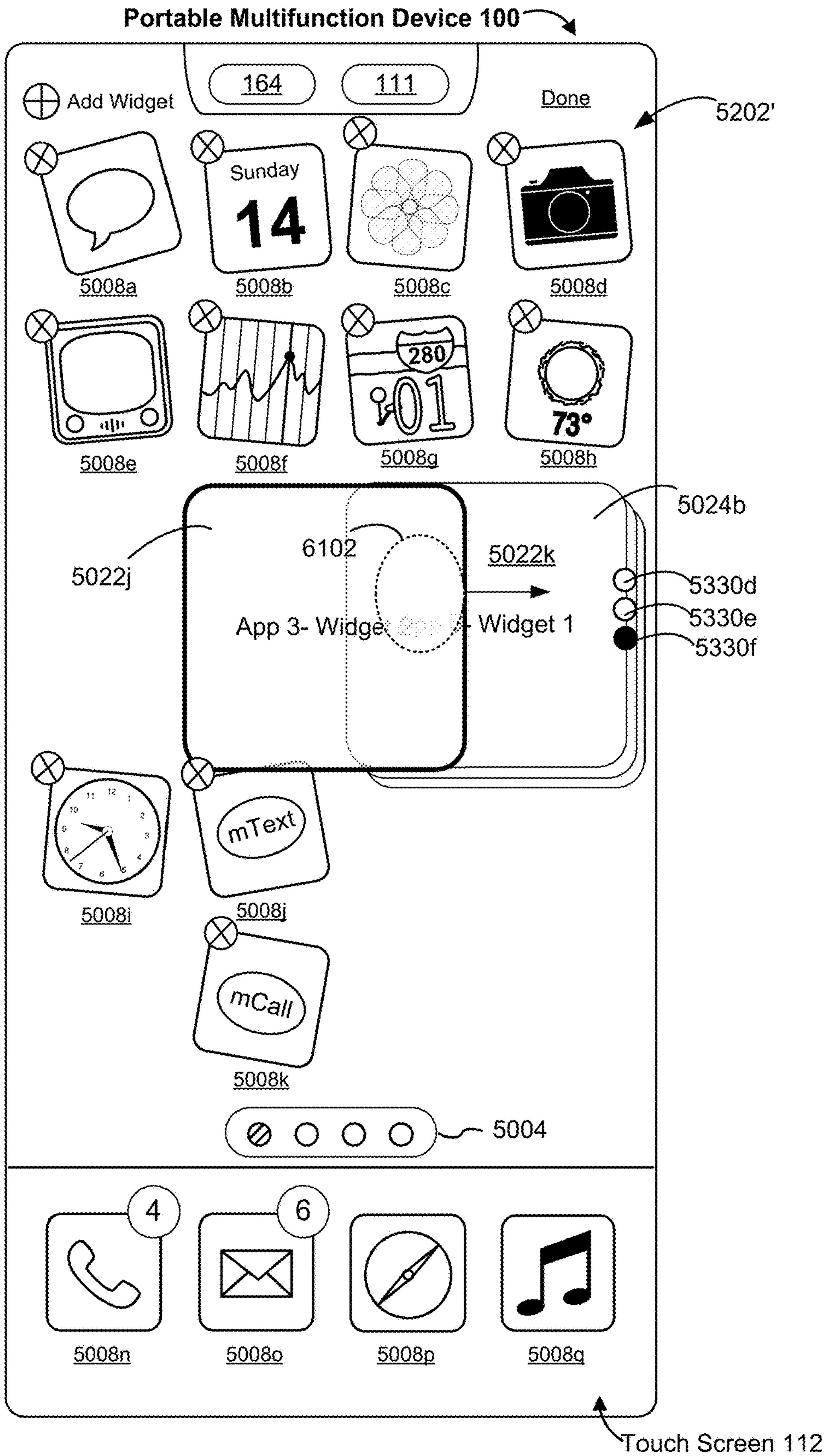
Figure 5E5

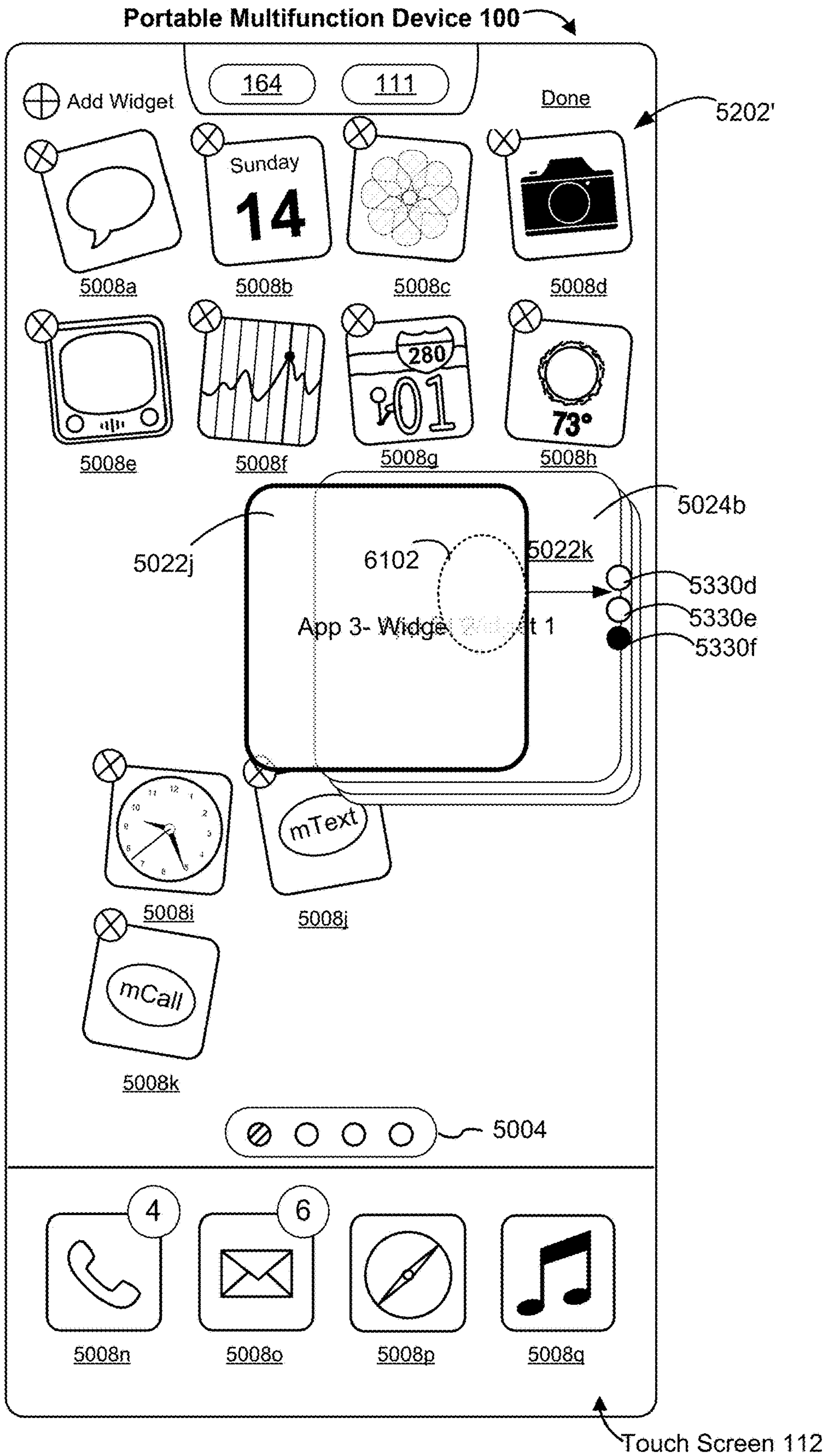
Figure 5E6

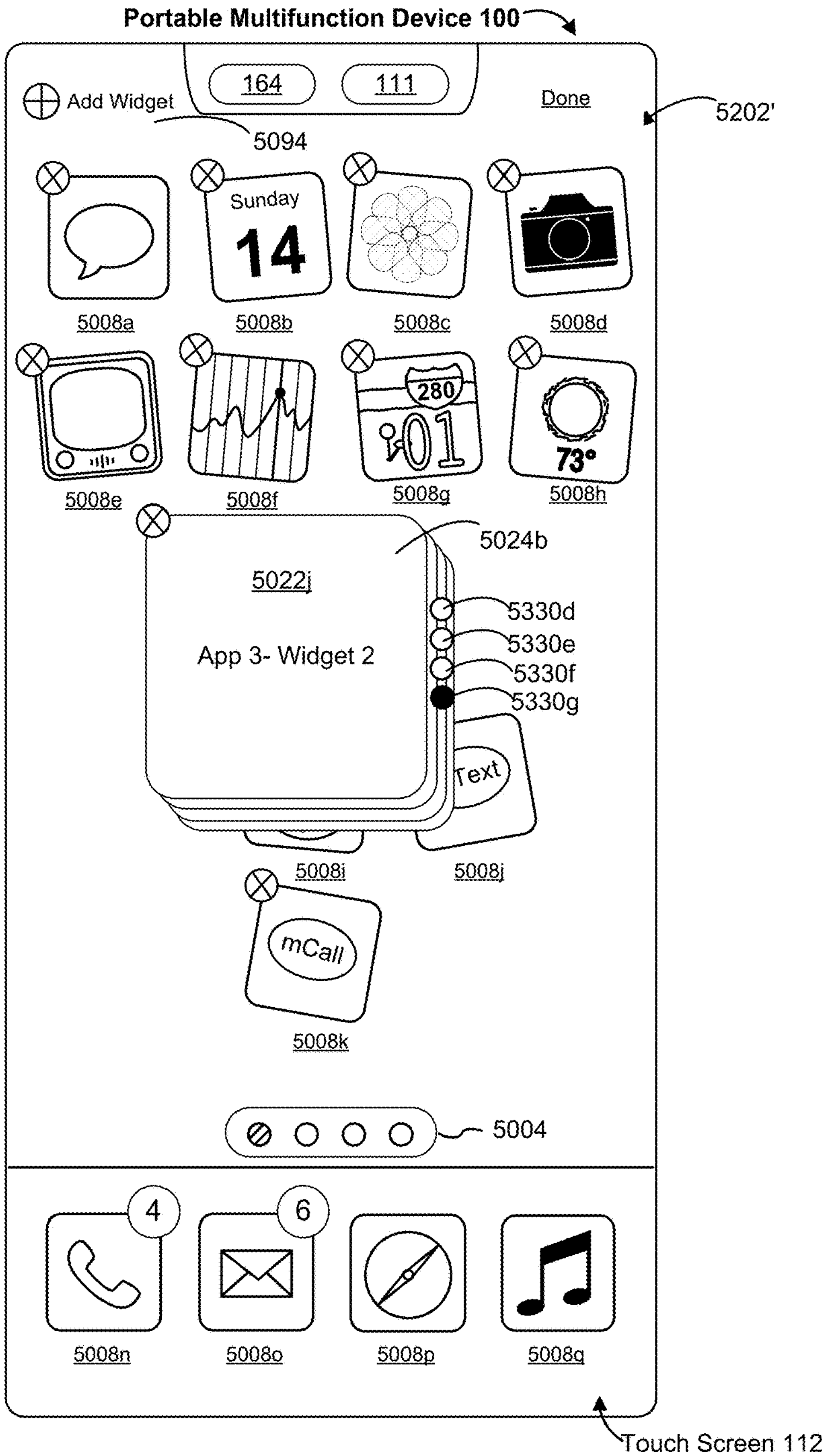
Figure 5E7

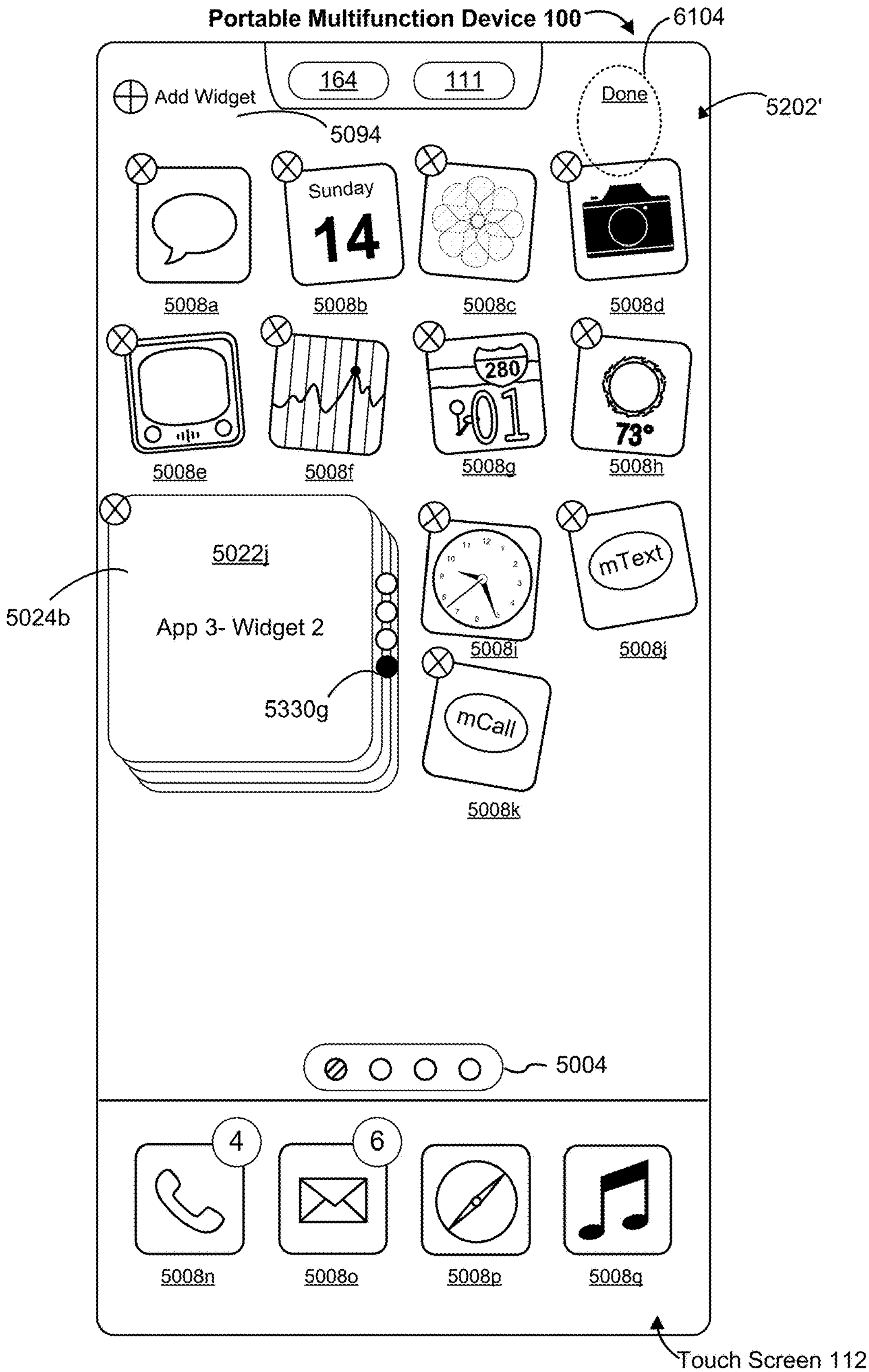
Figure 5E8

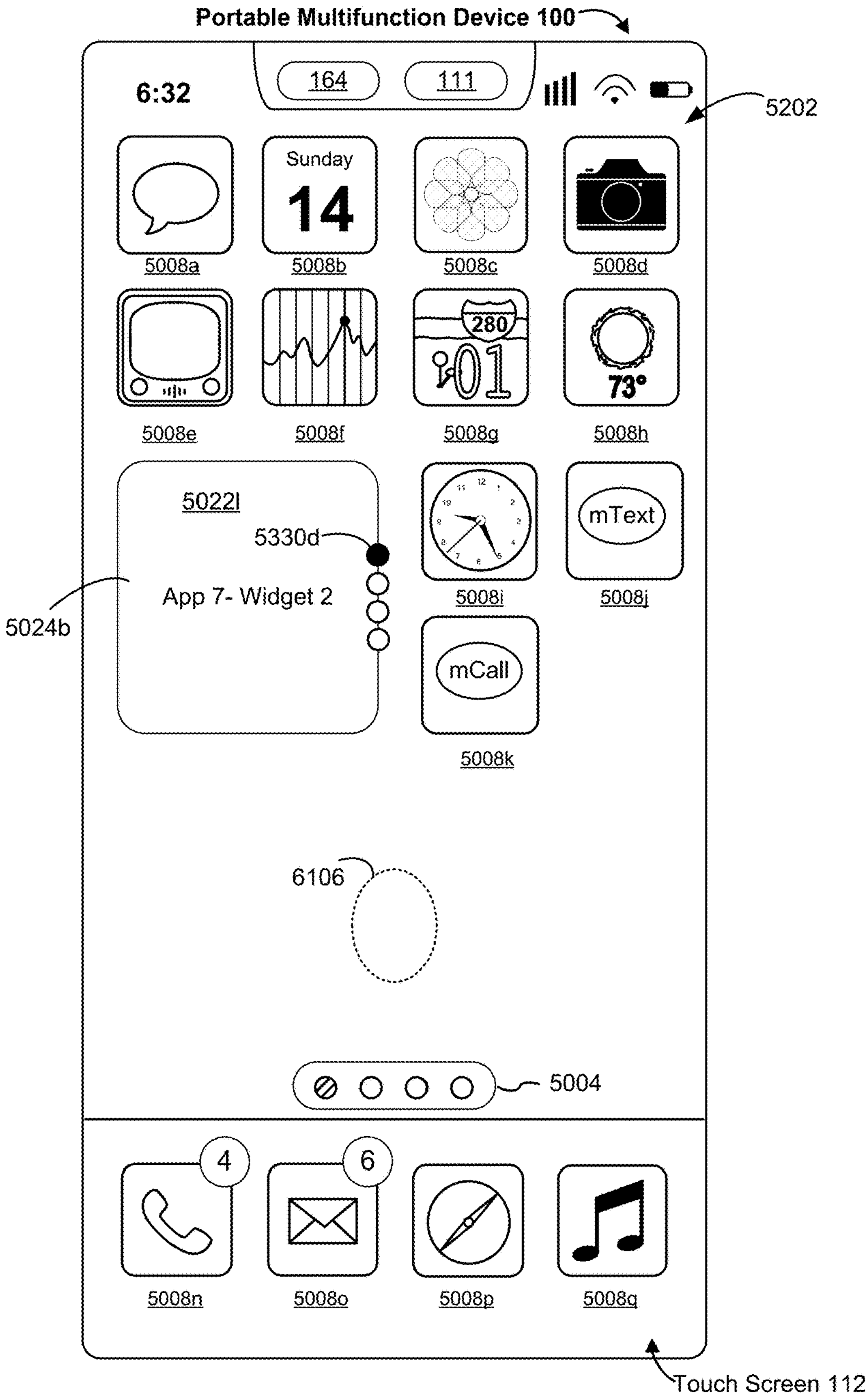
Figure 5E9

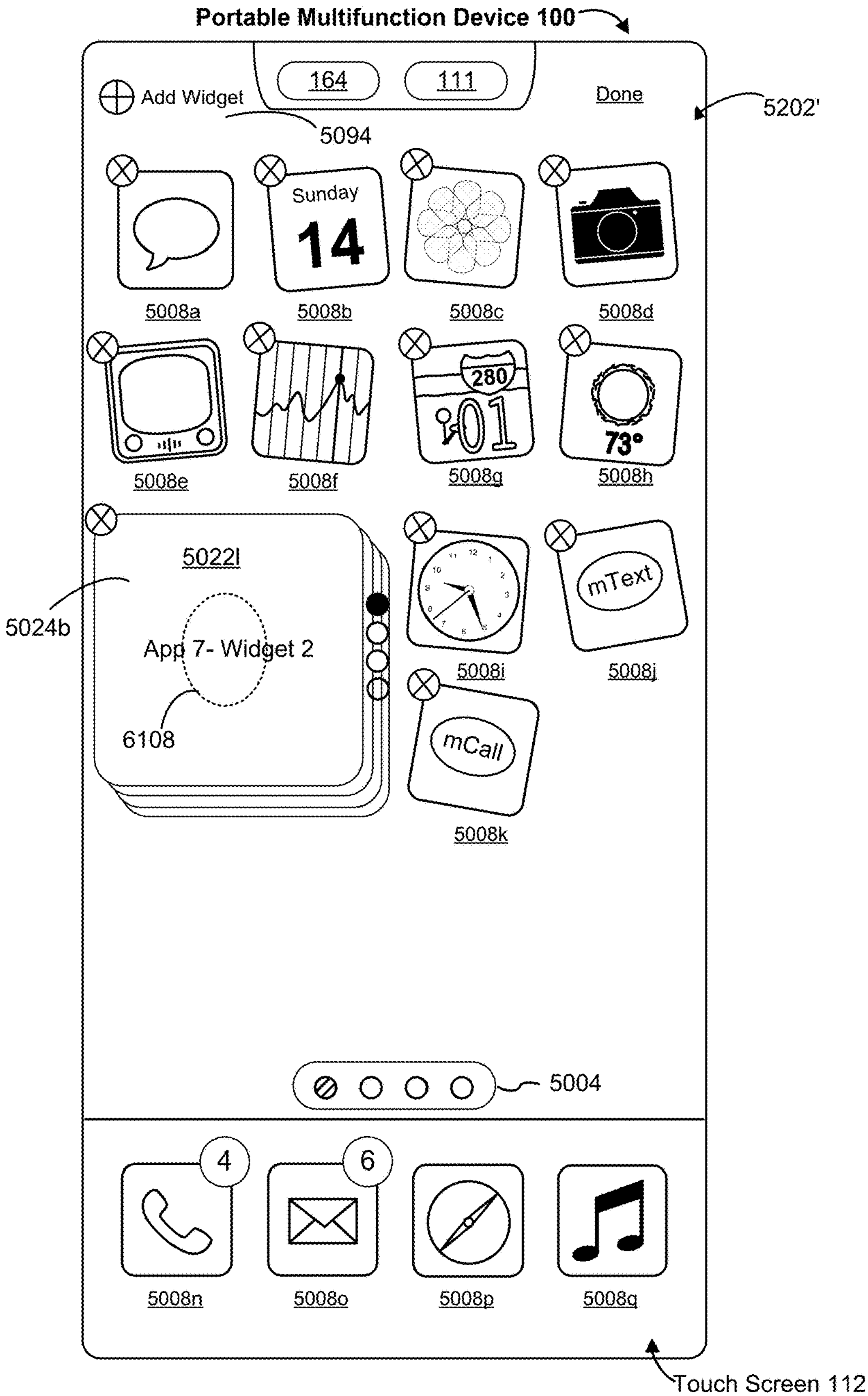
Figure 5E10

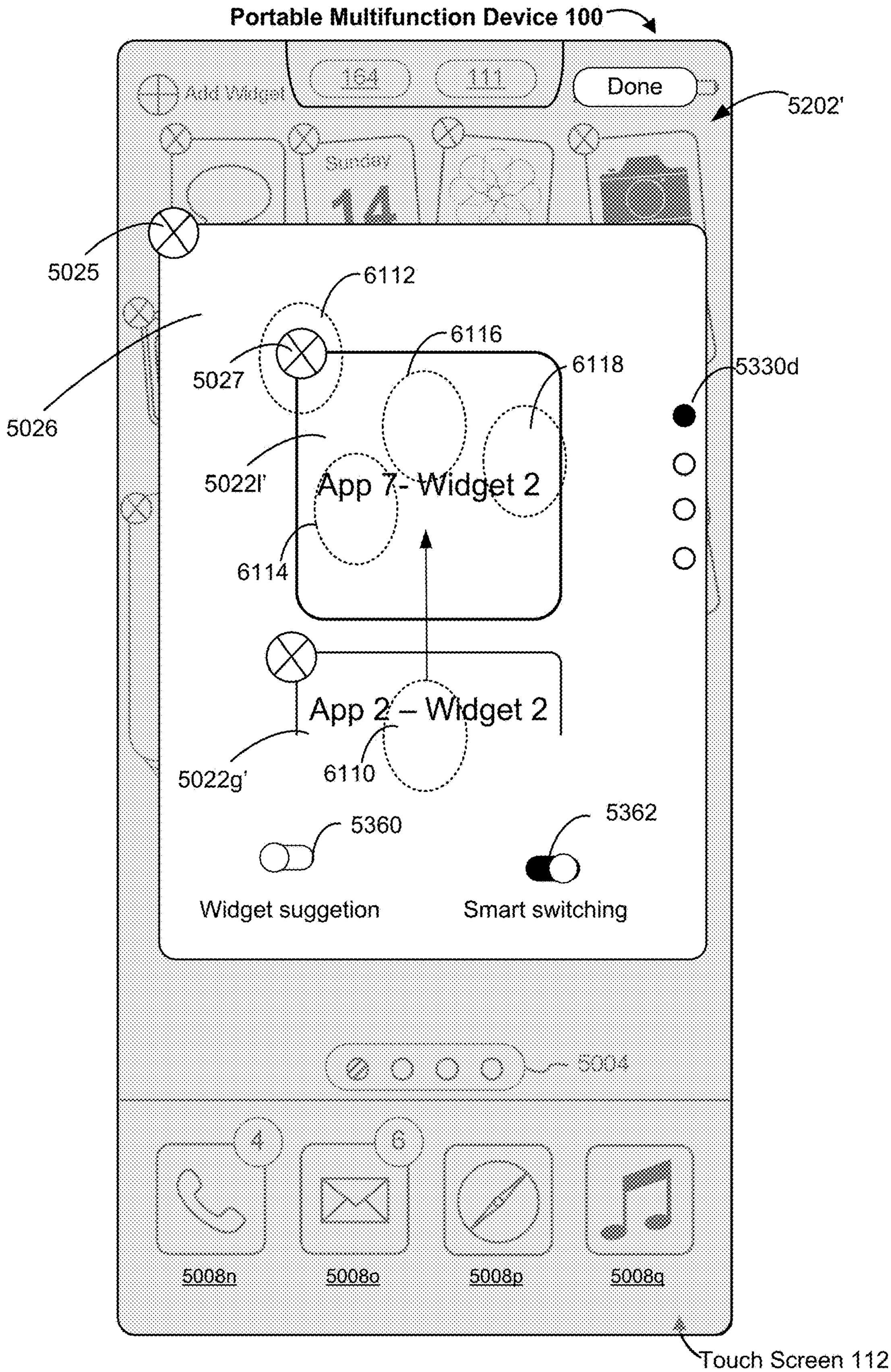
Figure 5E11

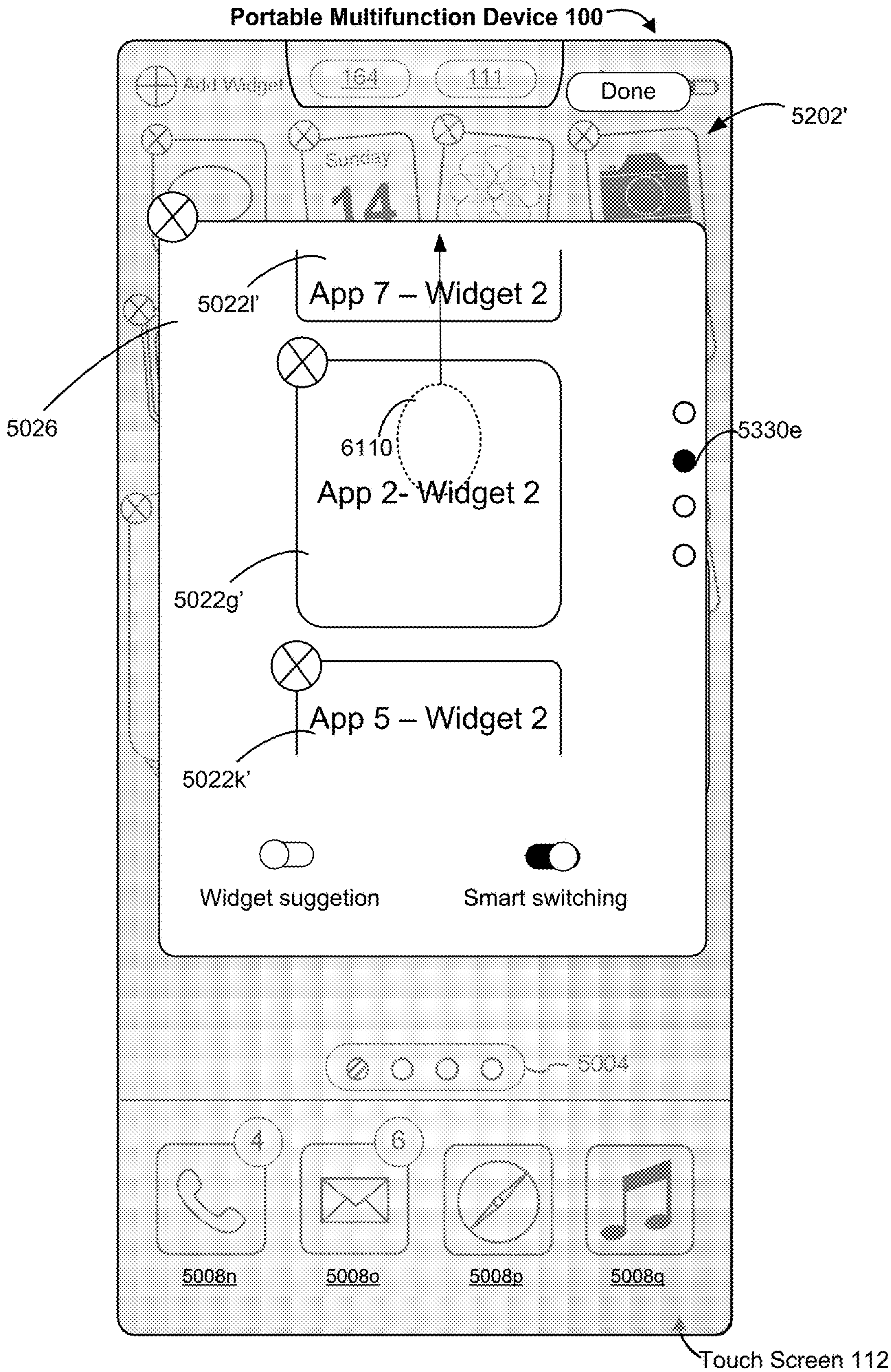
Figure 5E12

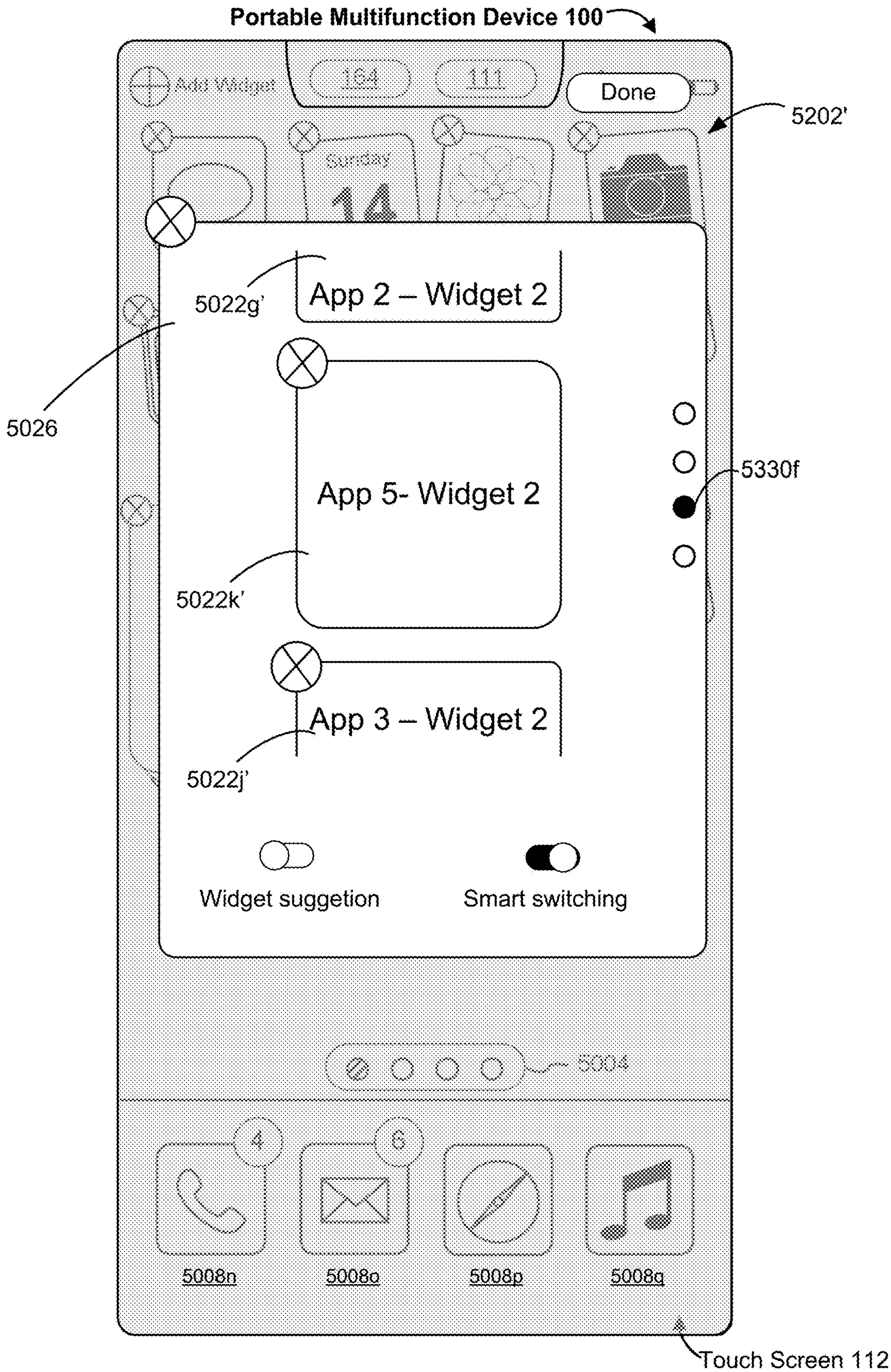
Figure 5E13

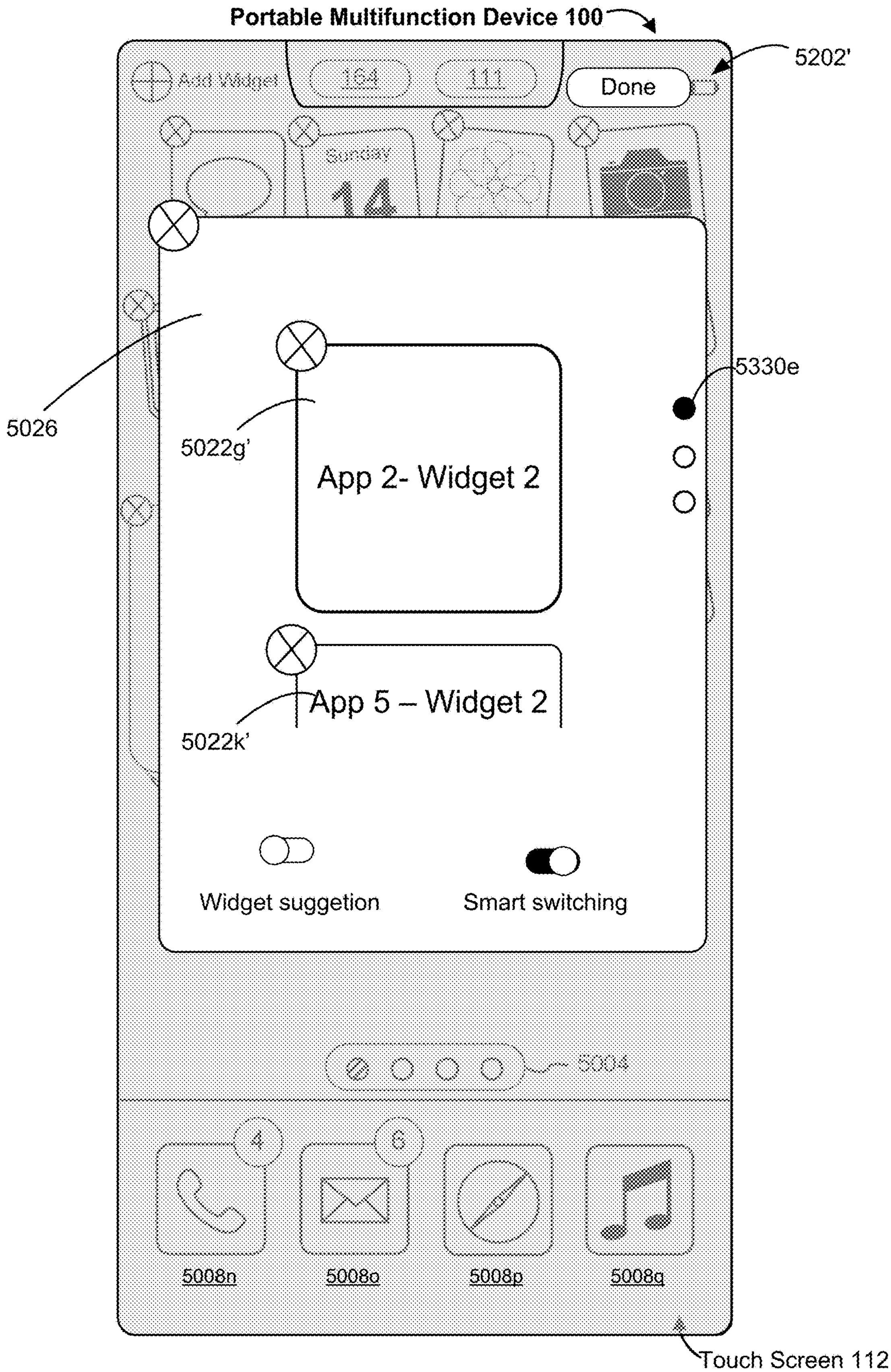
Figure 5E14

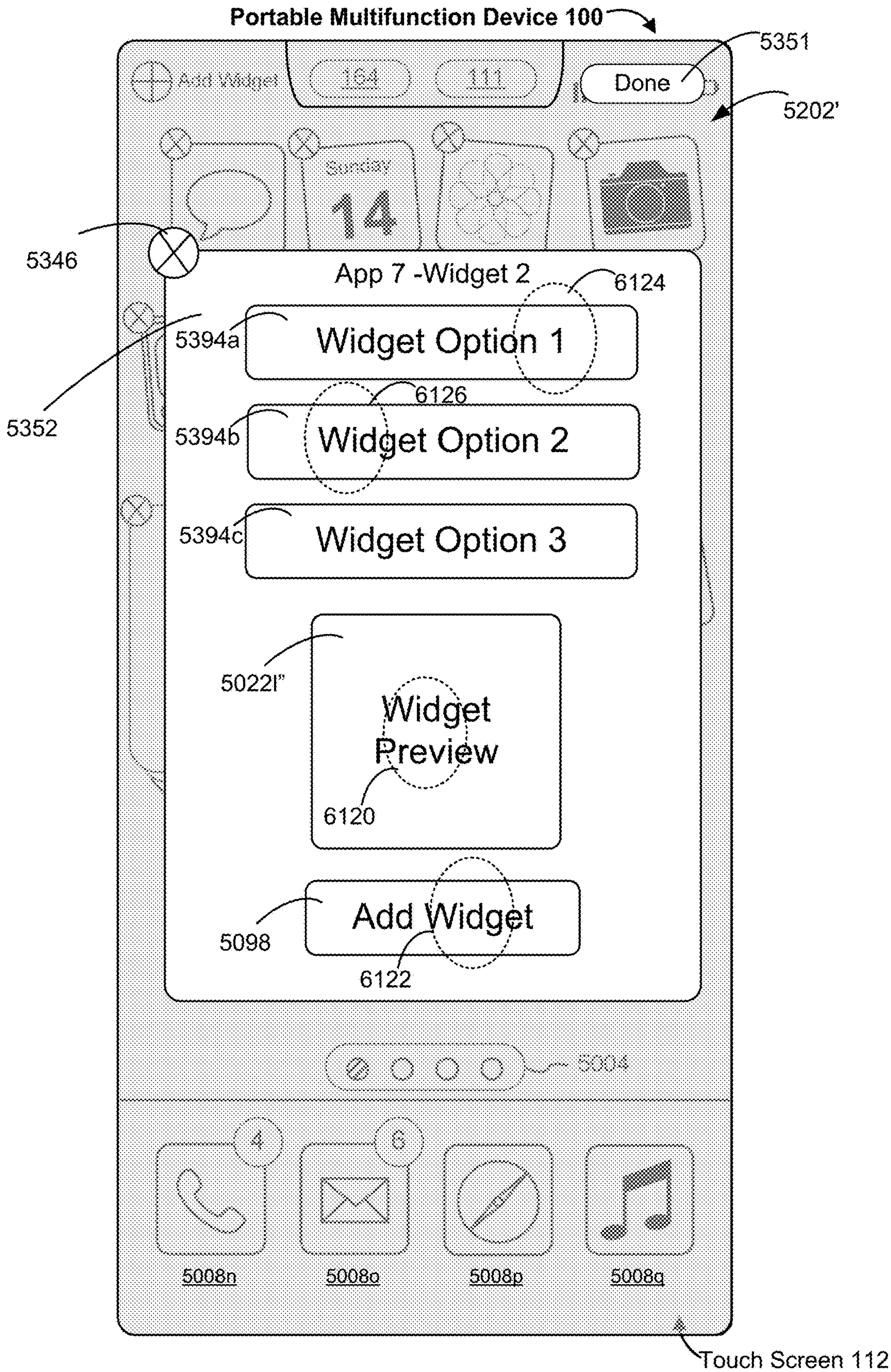
Figure 5E15

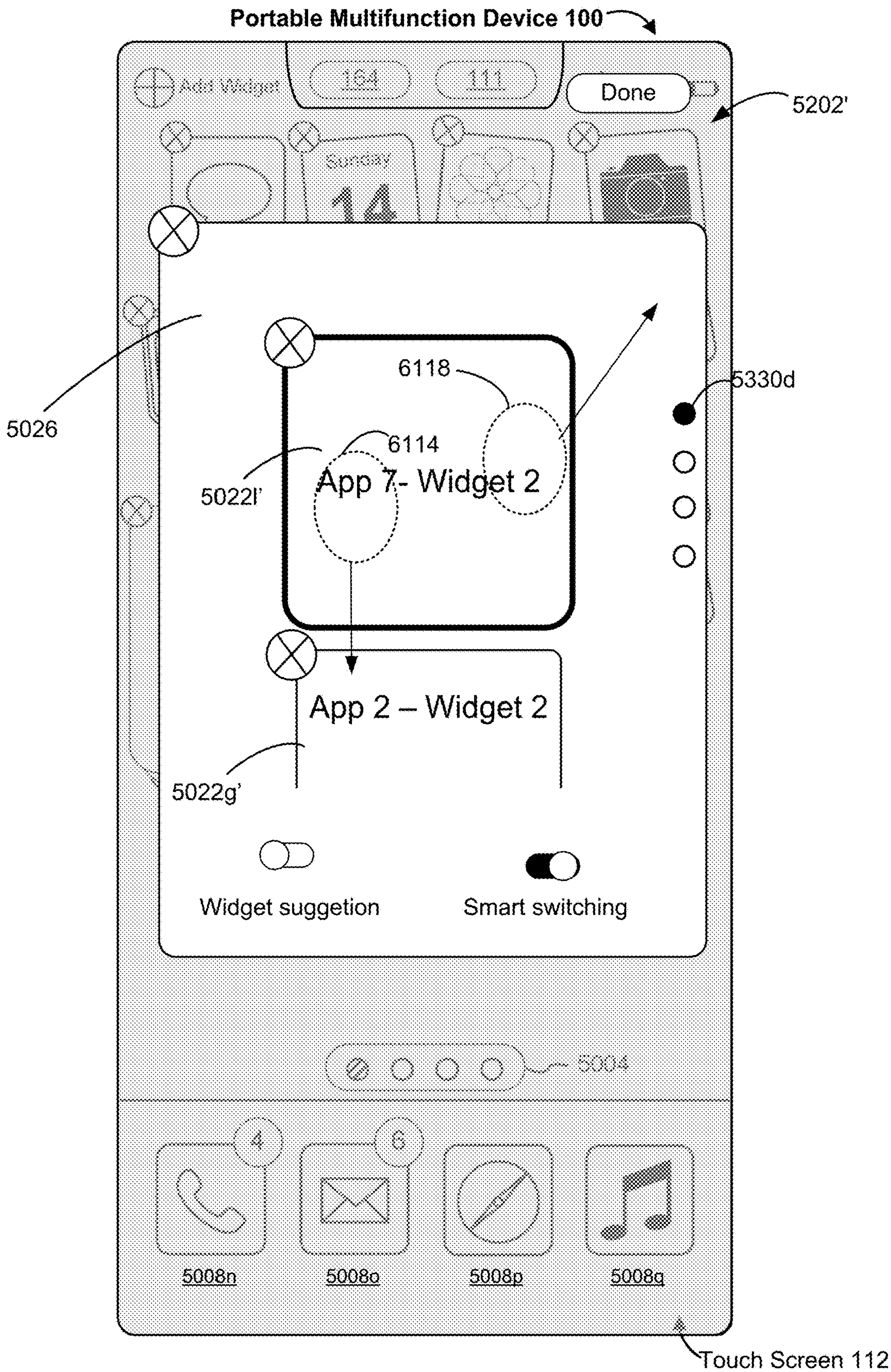
Figure 5E16

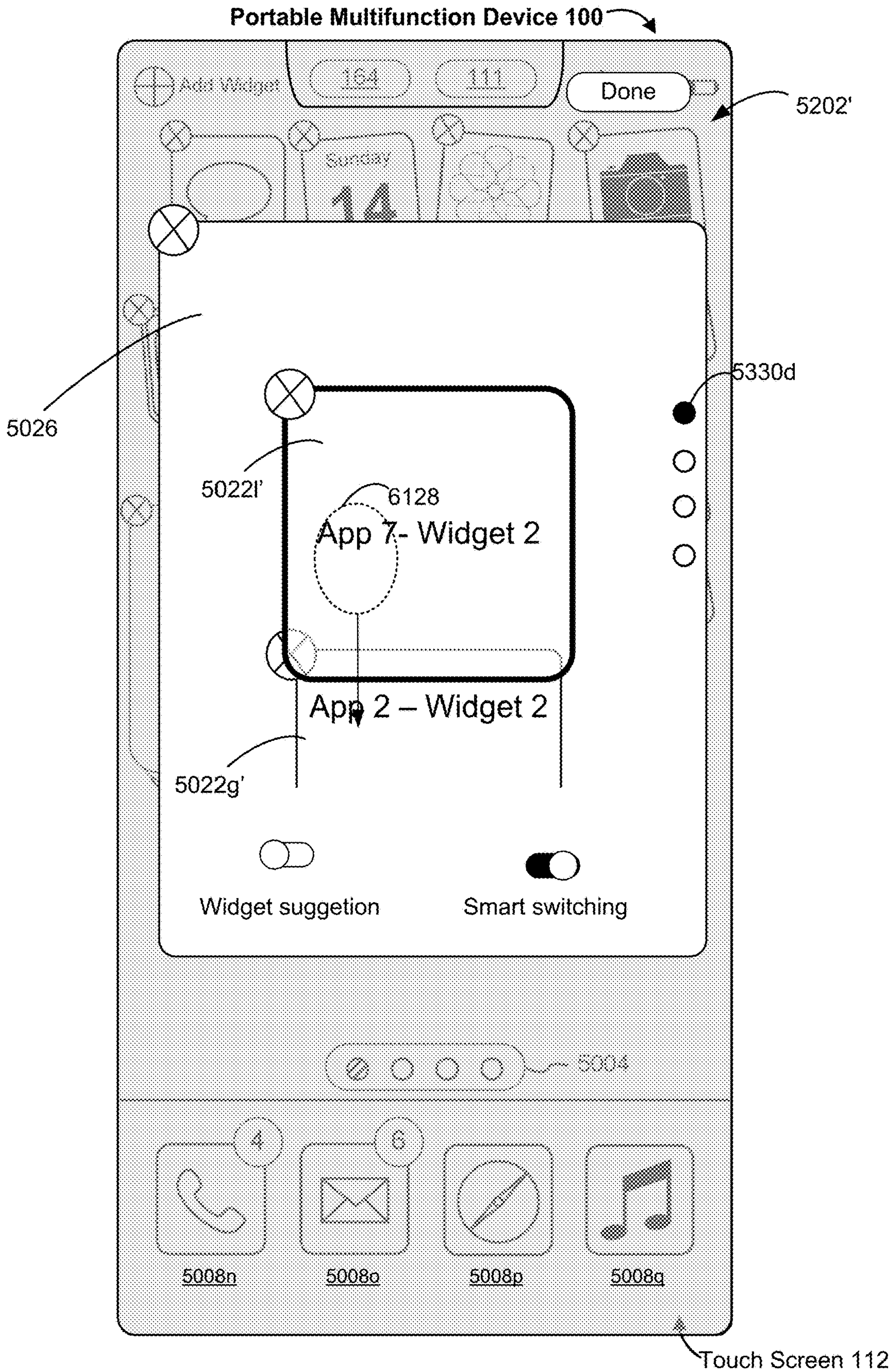
Figure 5E17

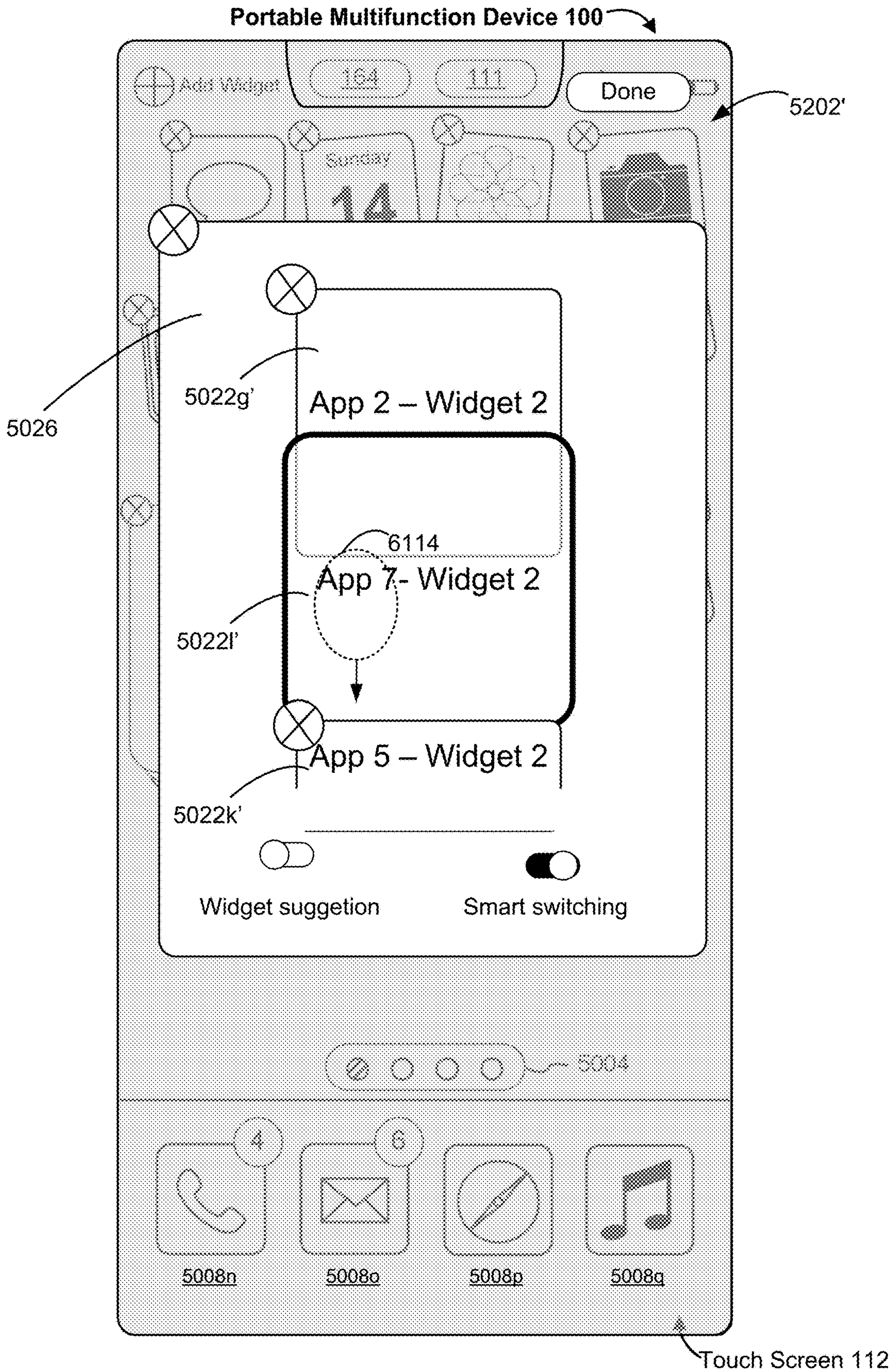
Figure 5E18

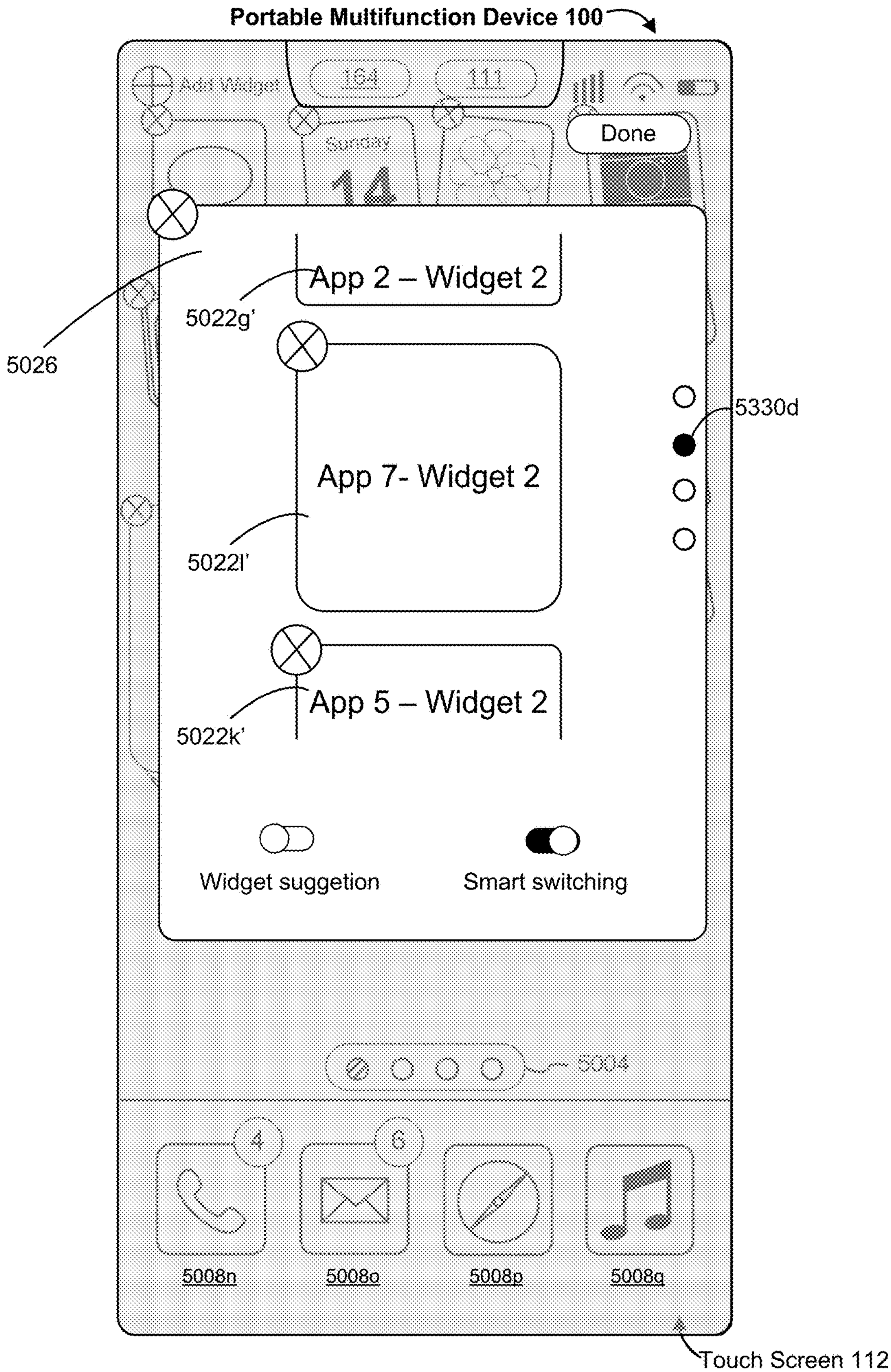
Figure 5E19

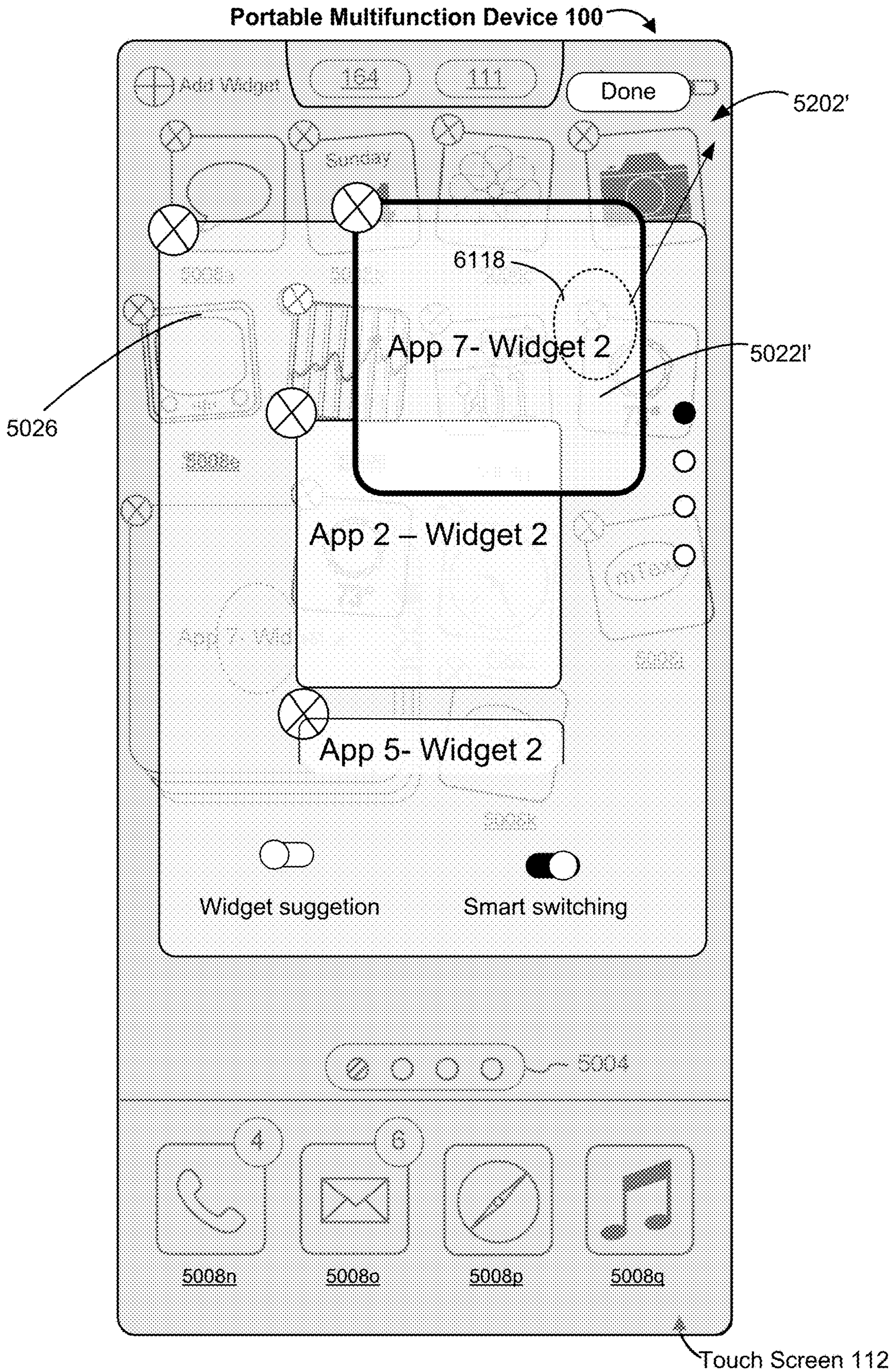
Figure 5E20

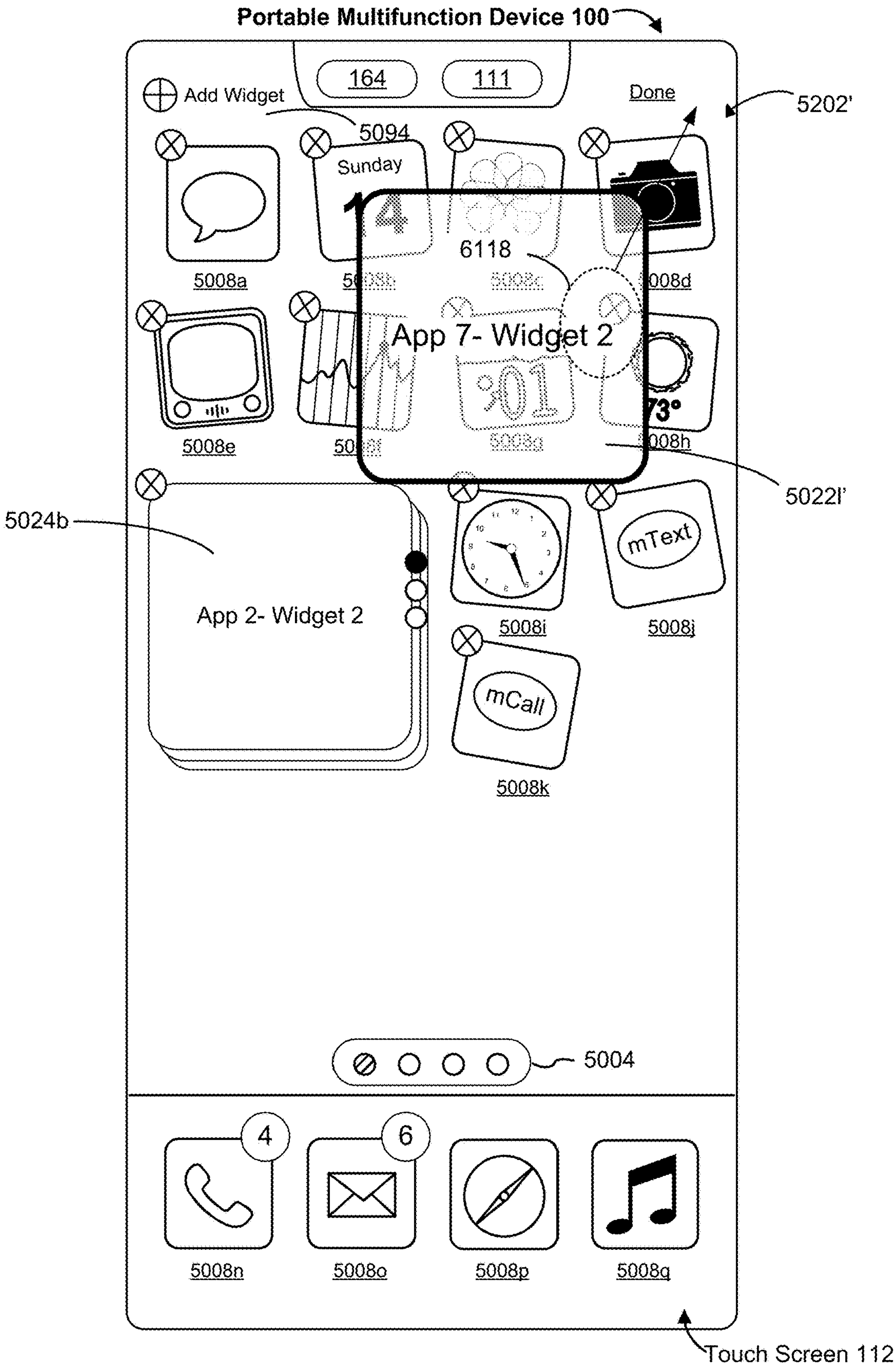
Figure 5E21

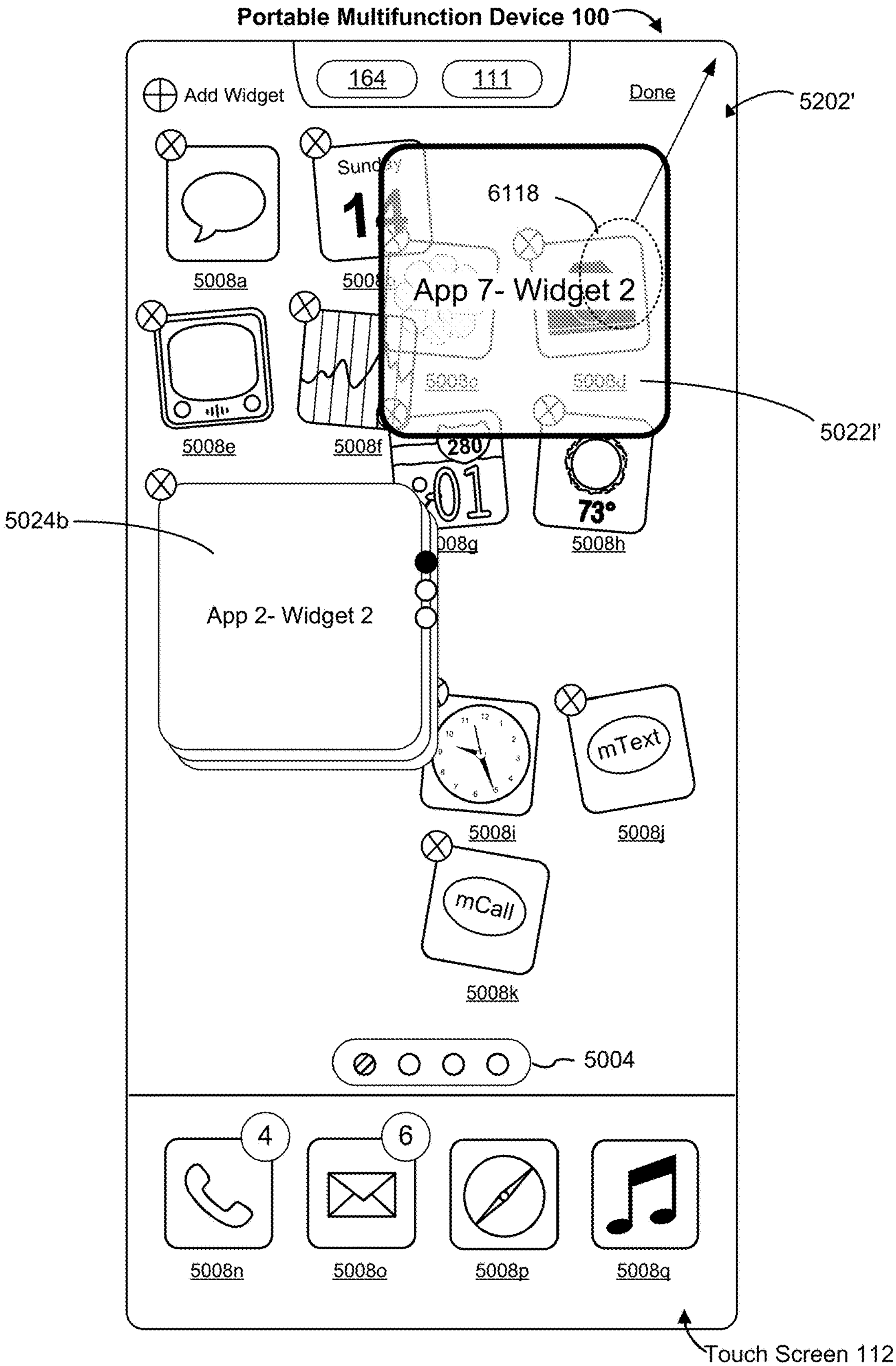
Figure 5E22

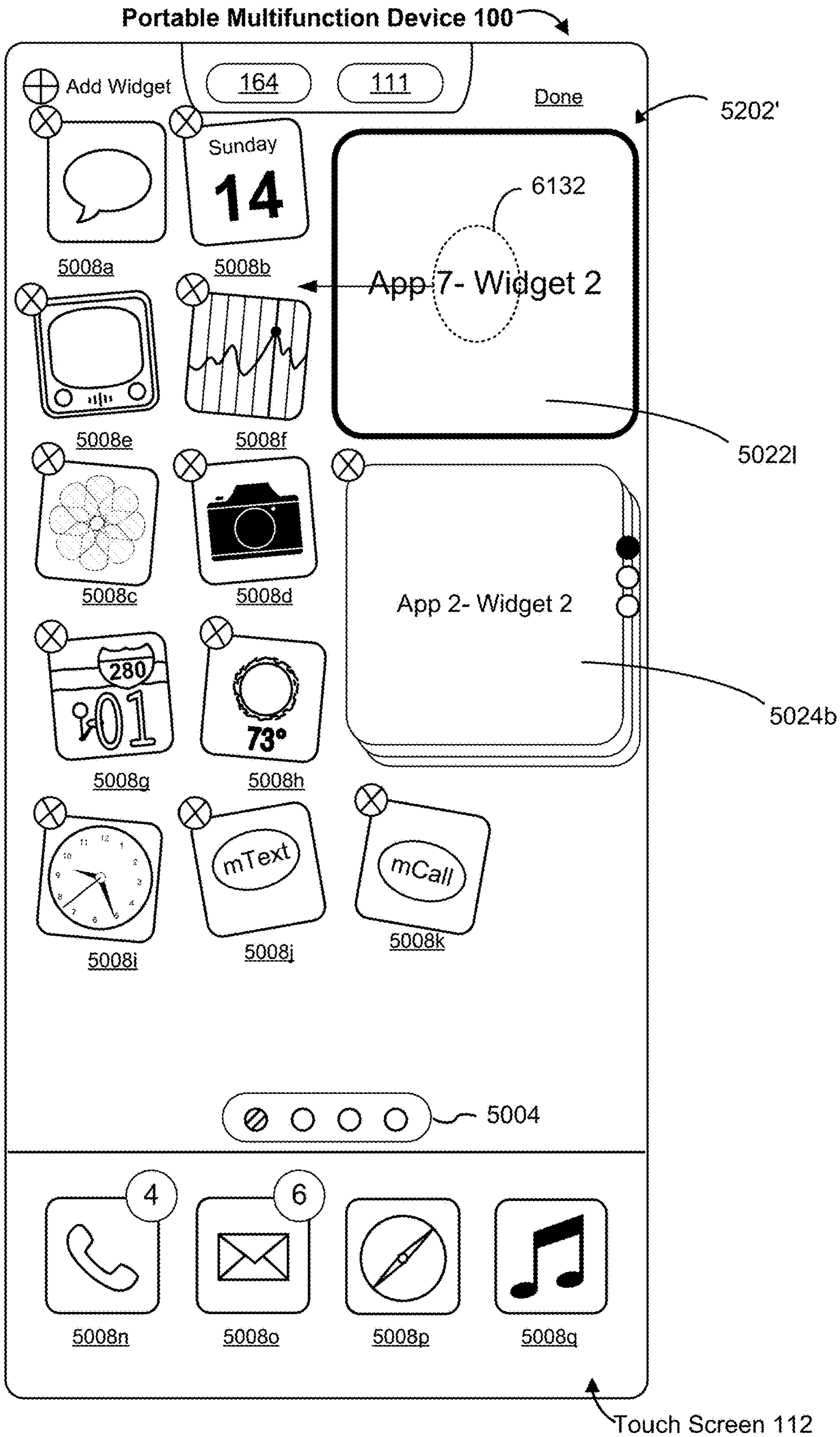
Figure 5E23

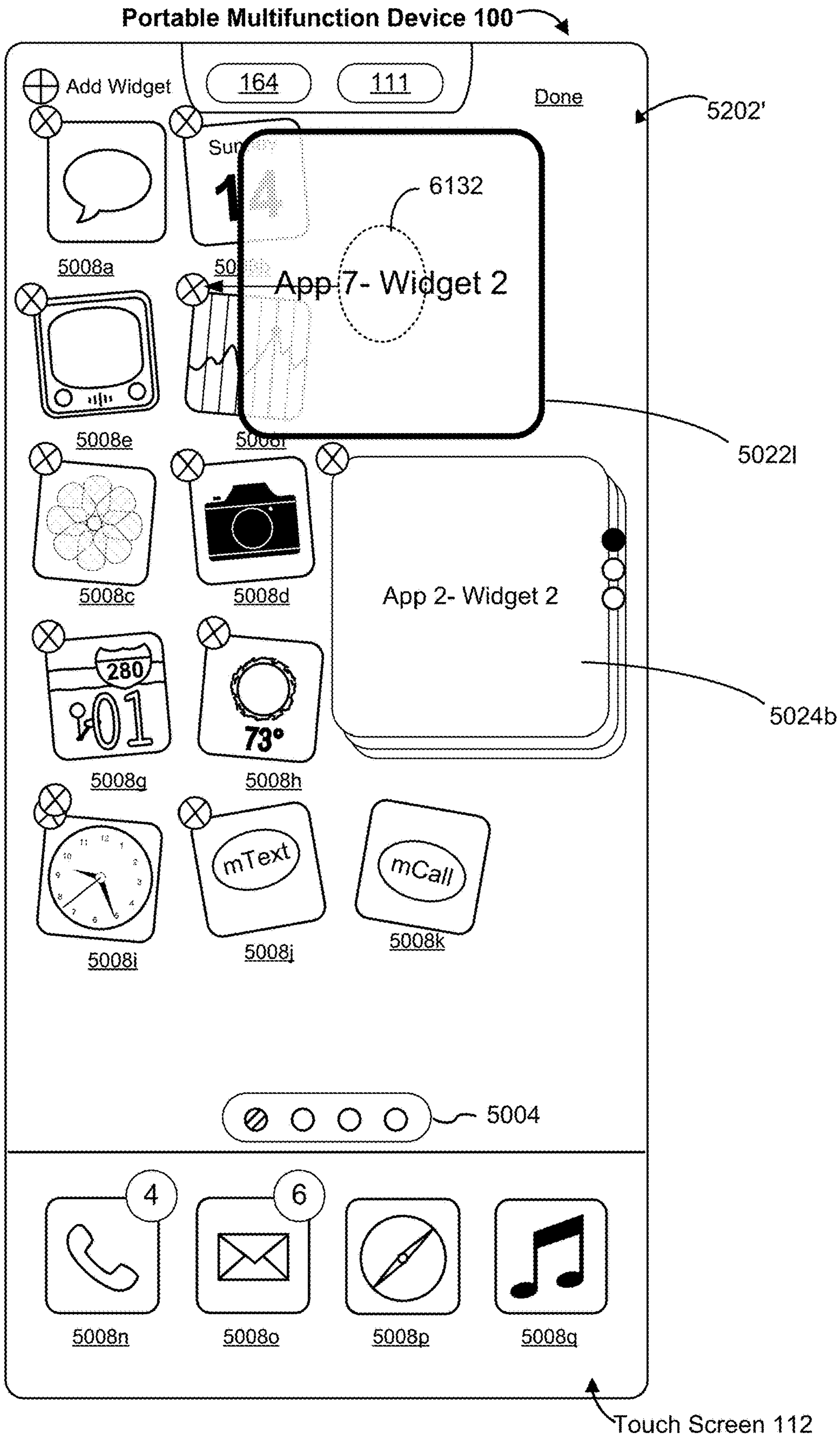
Figure 5E24

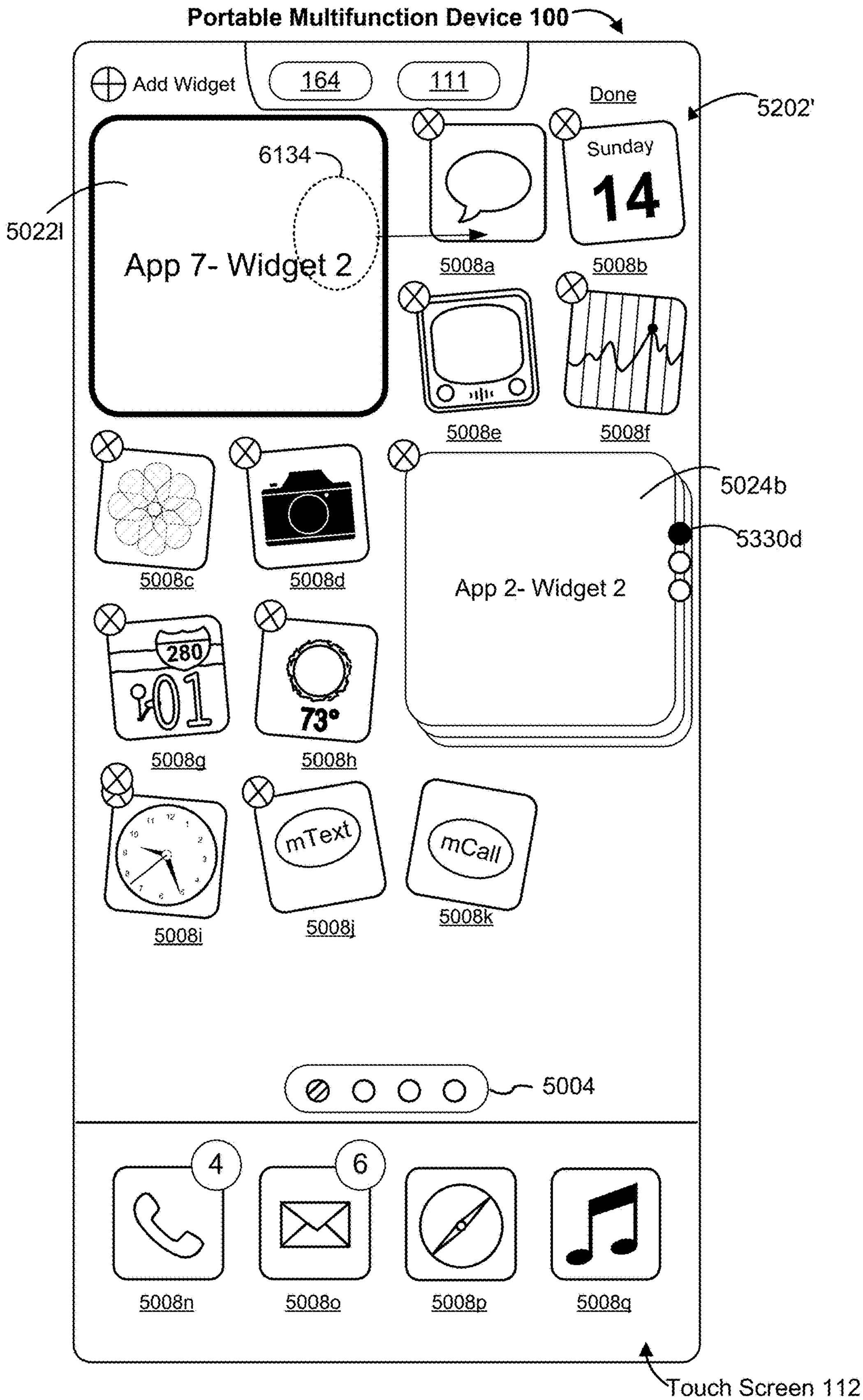
Figure 5E25

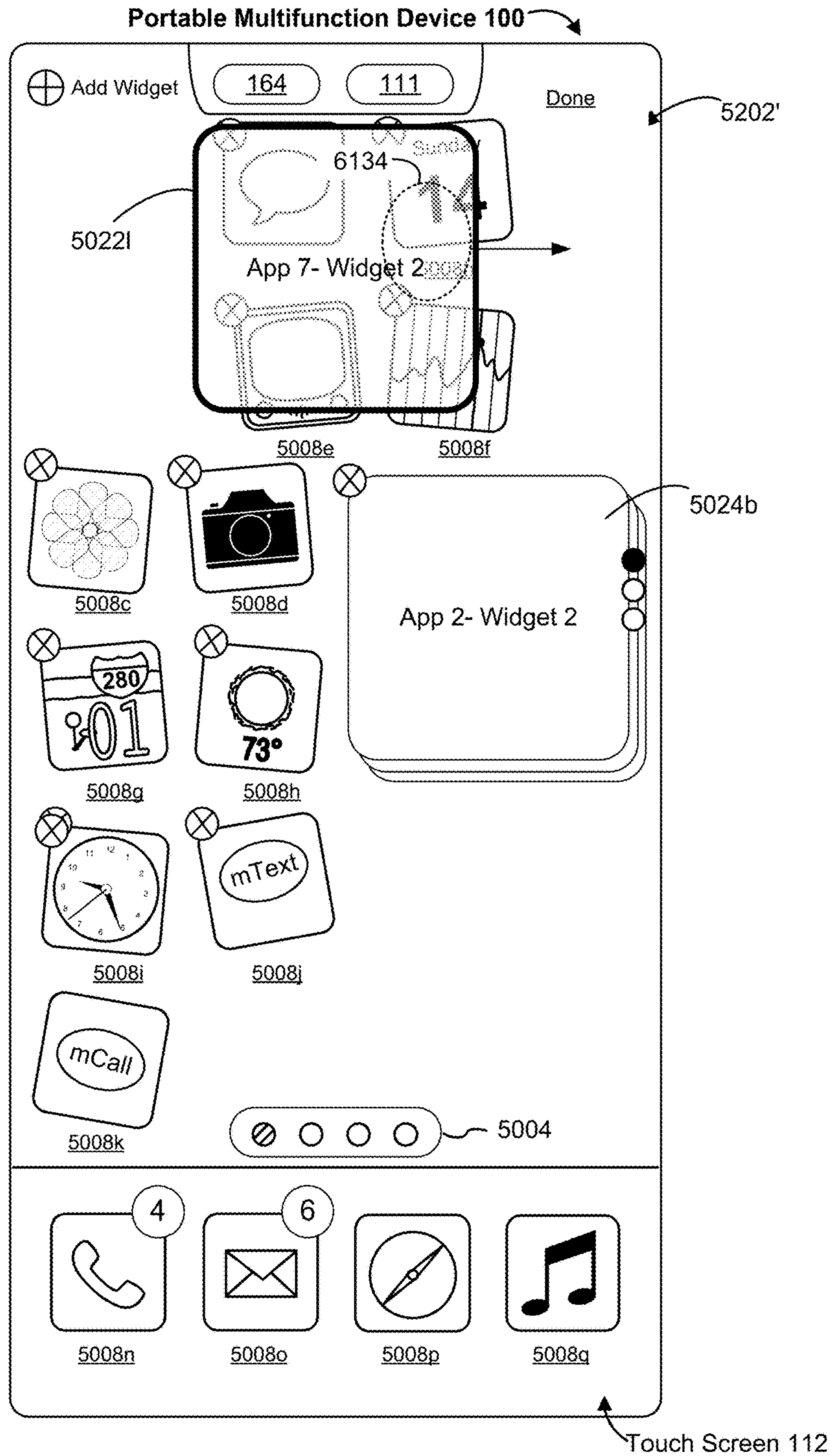
Figure 5E26

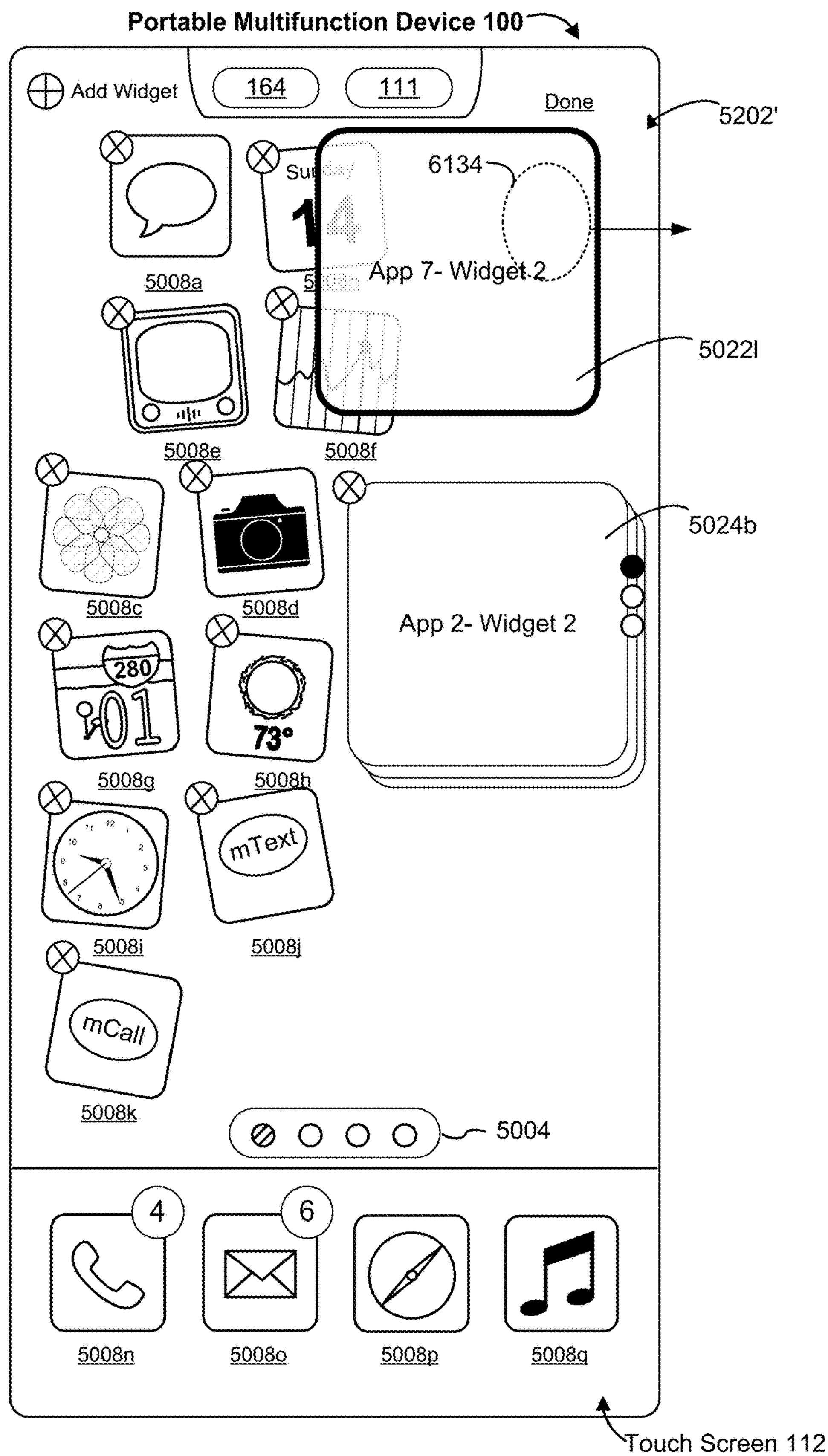
Figure 5E27

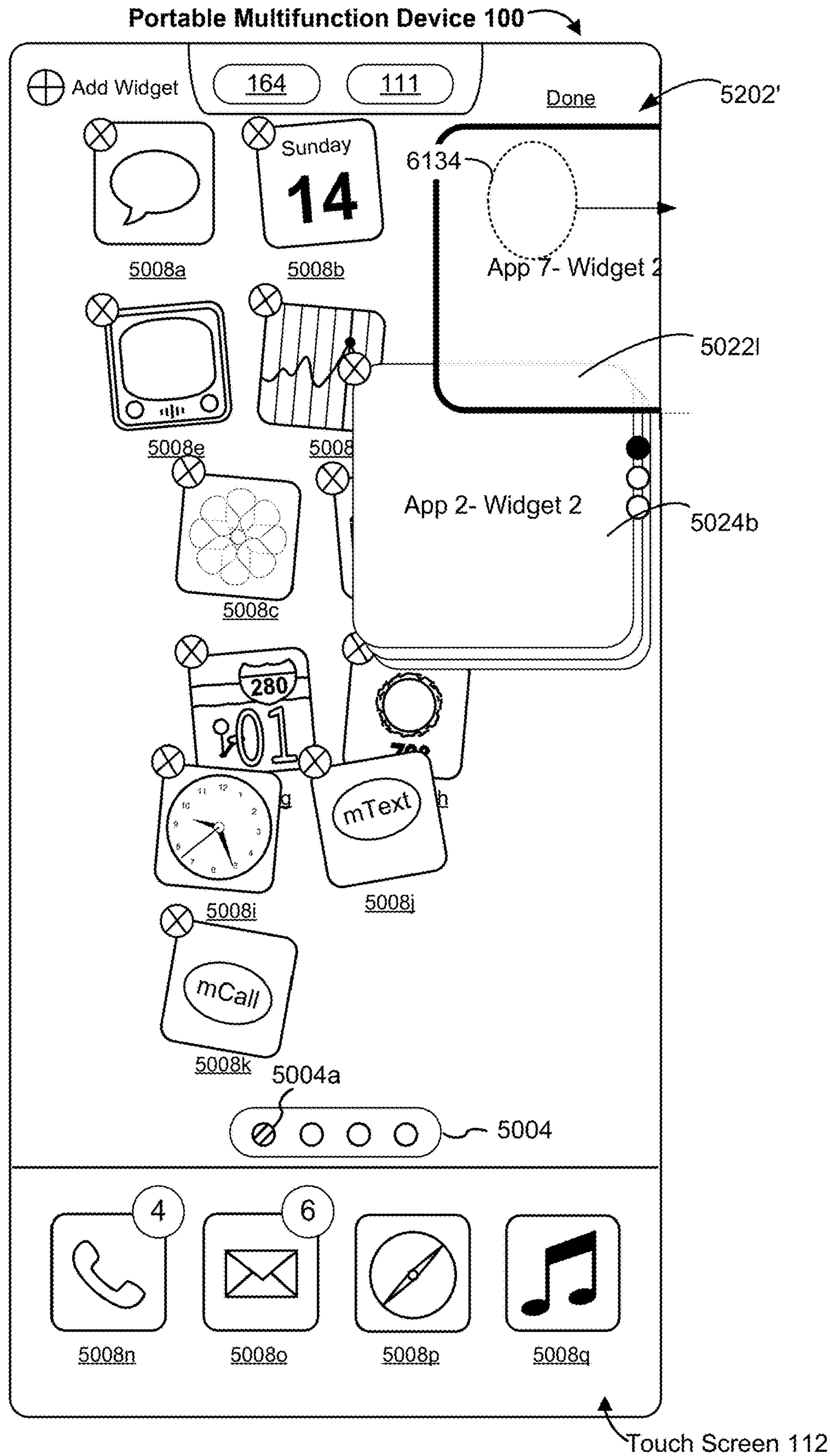
Figure 5E28

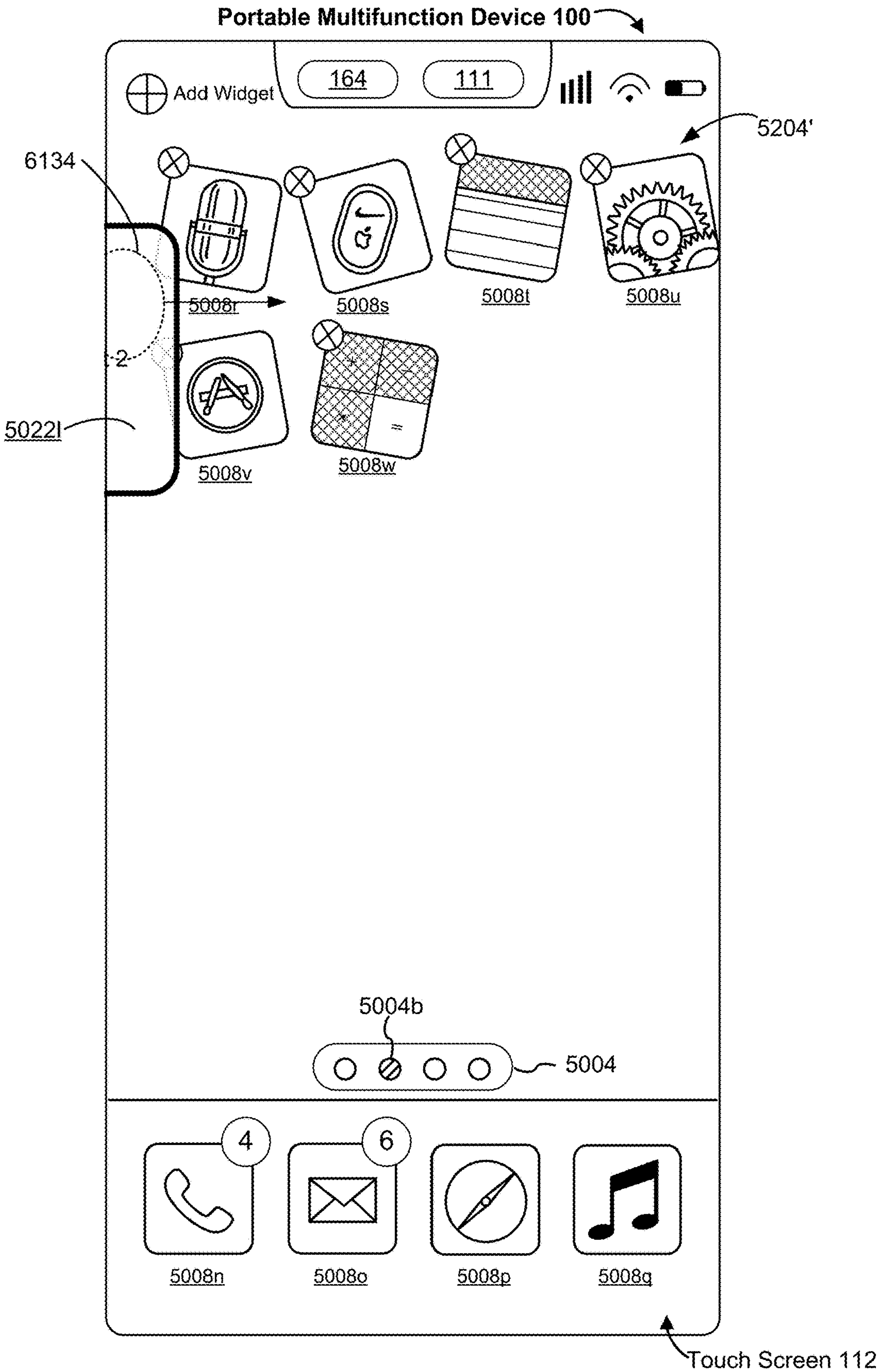
Figure 5E29

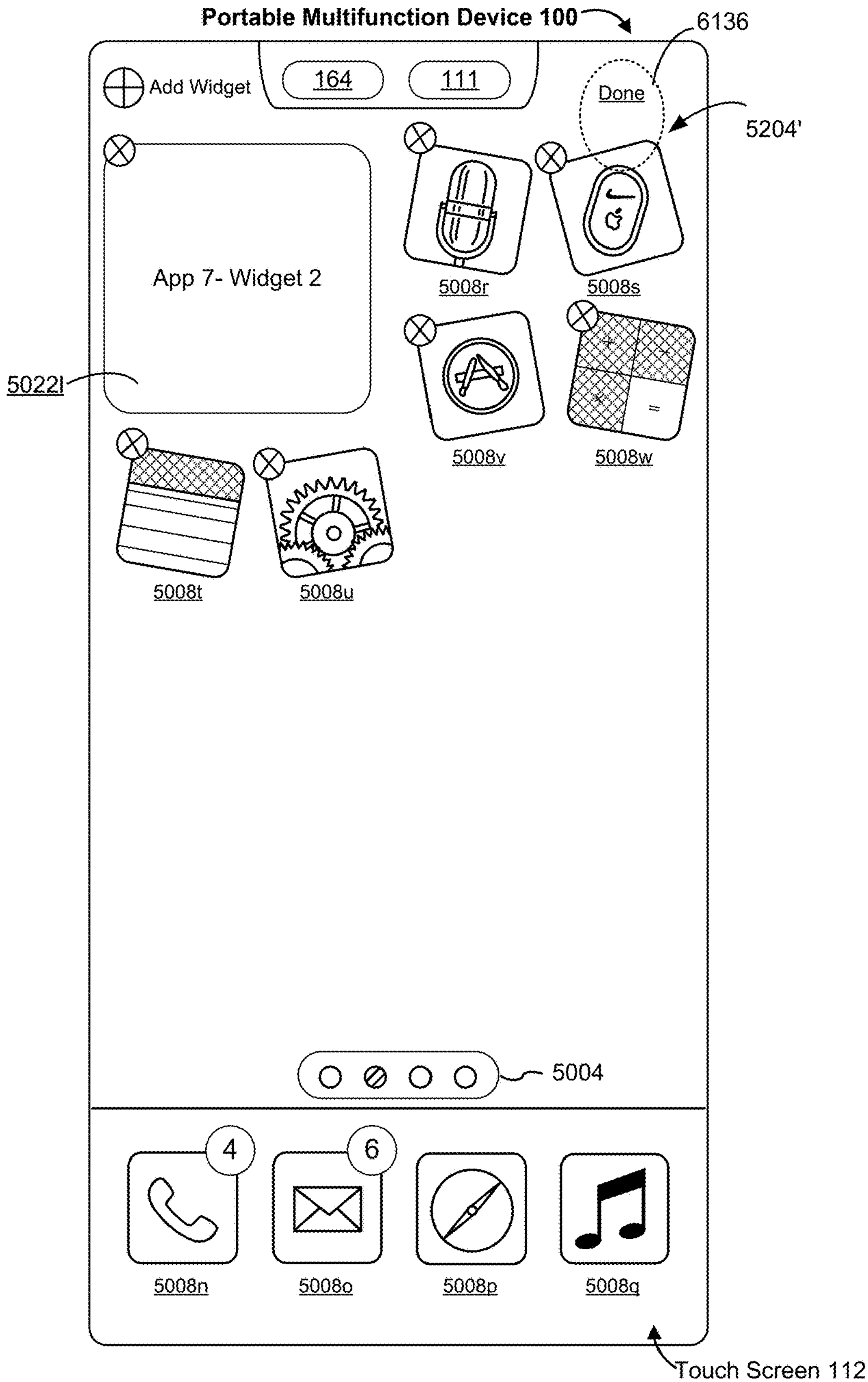
Figure 5E30

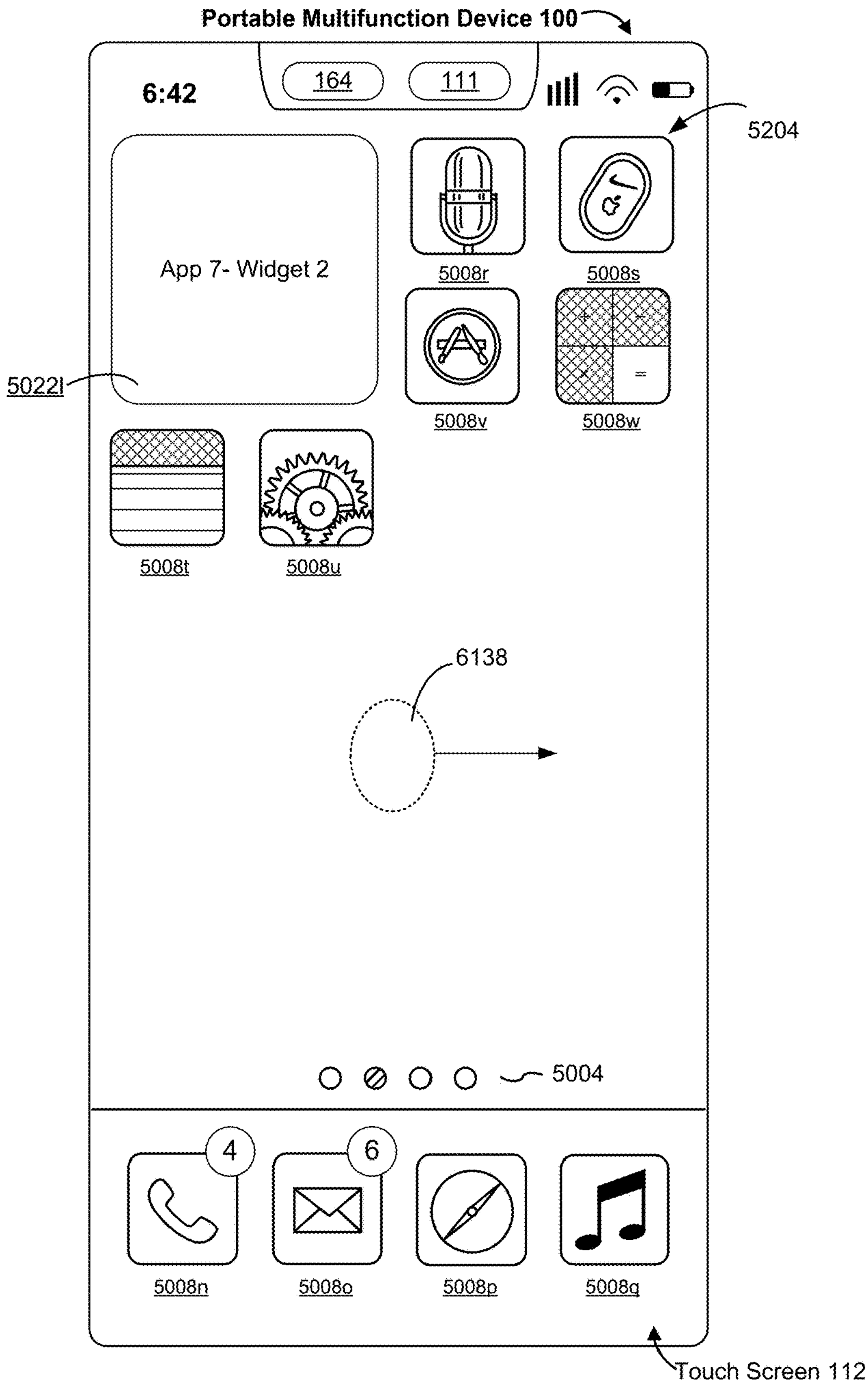
Figure 5E31

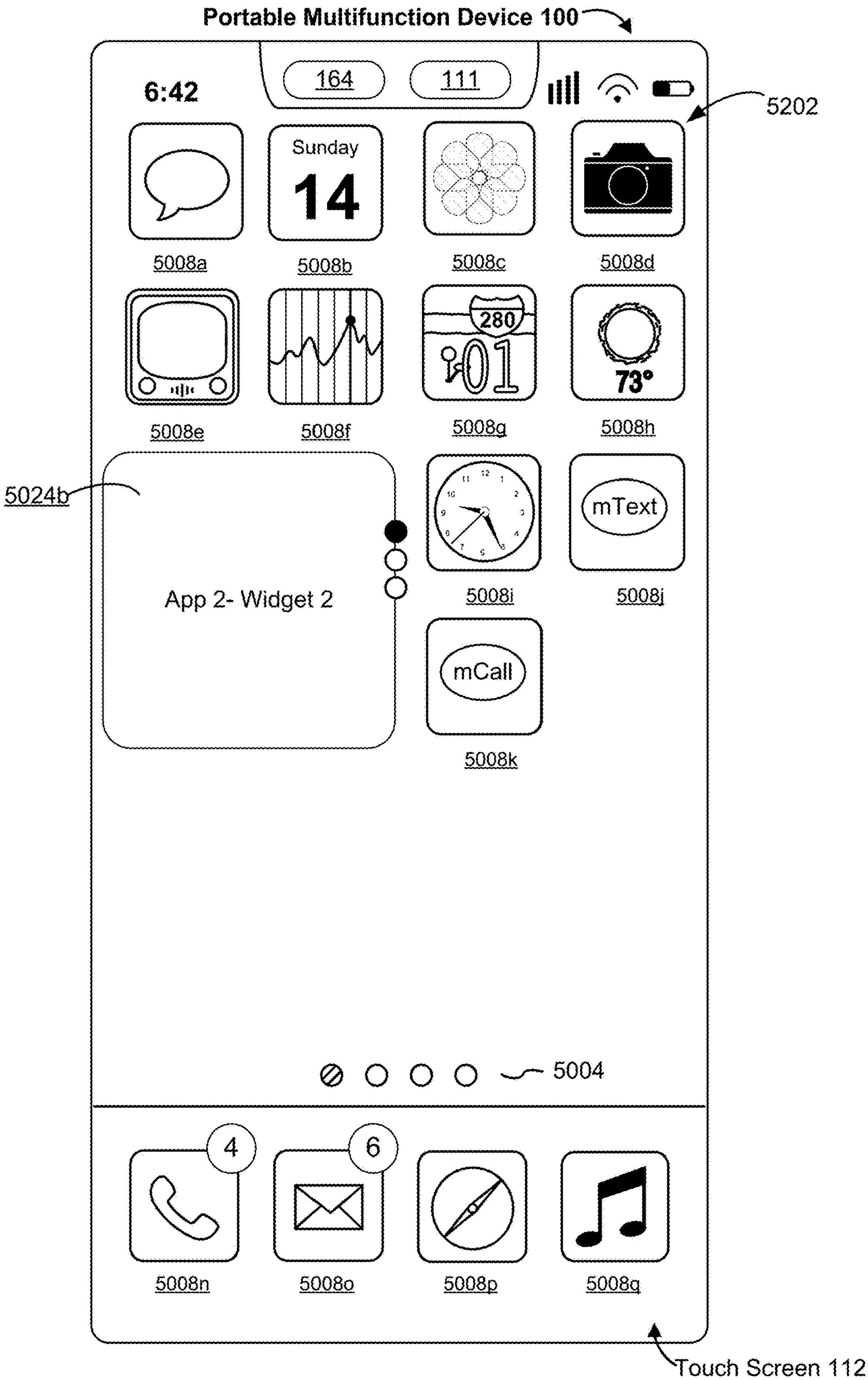
Figure 5E32

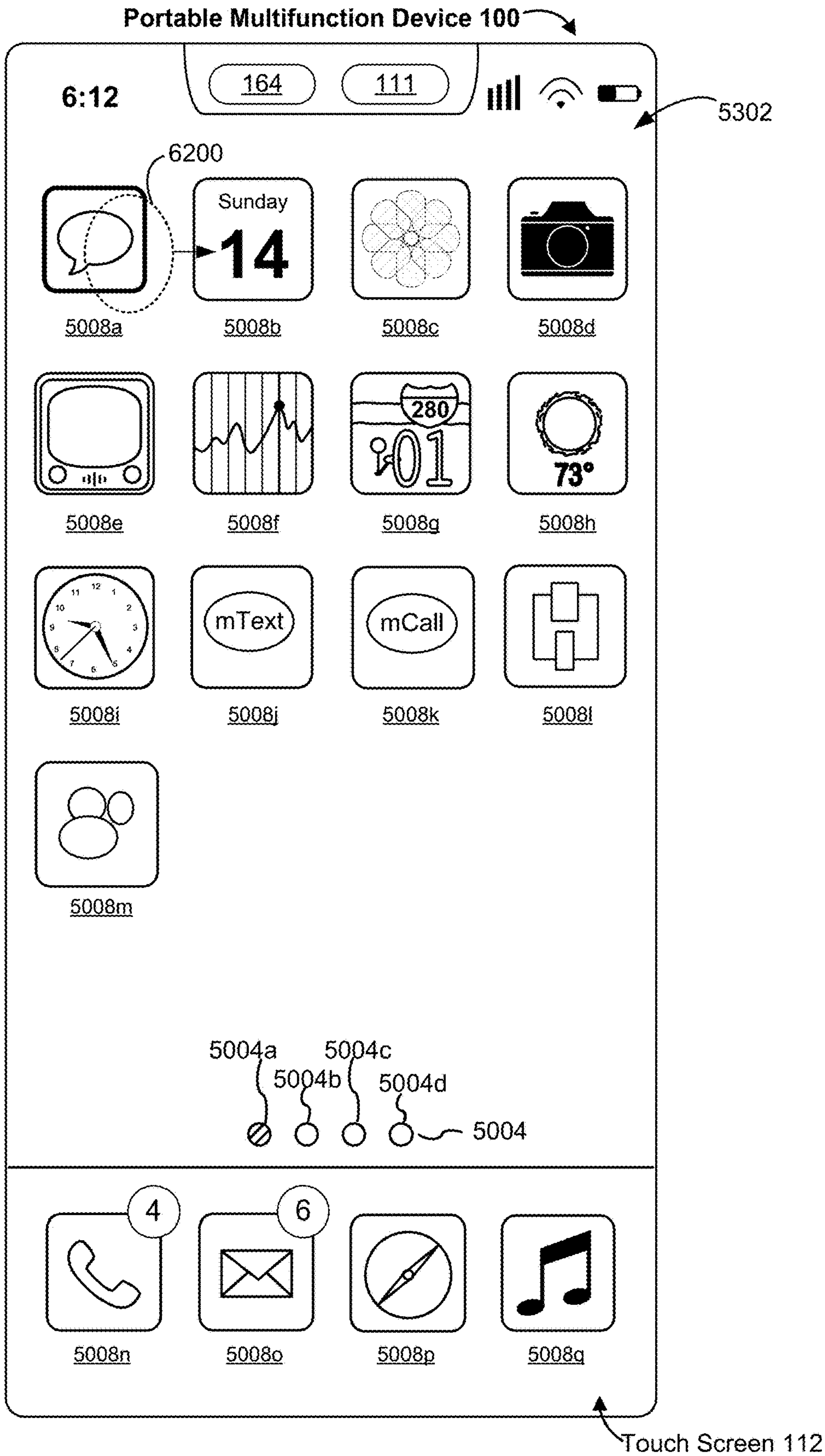
Figure 5F1

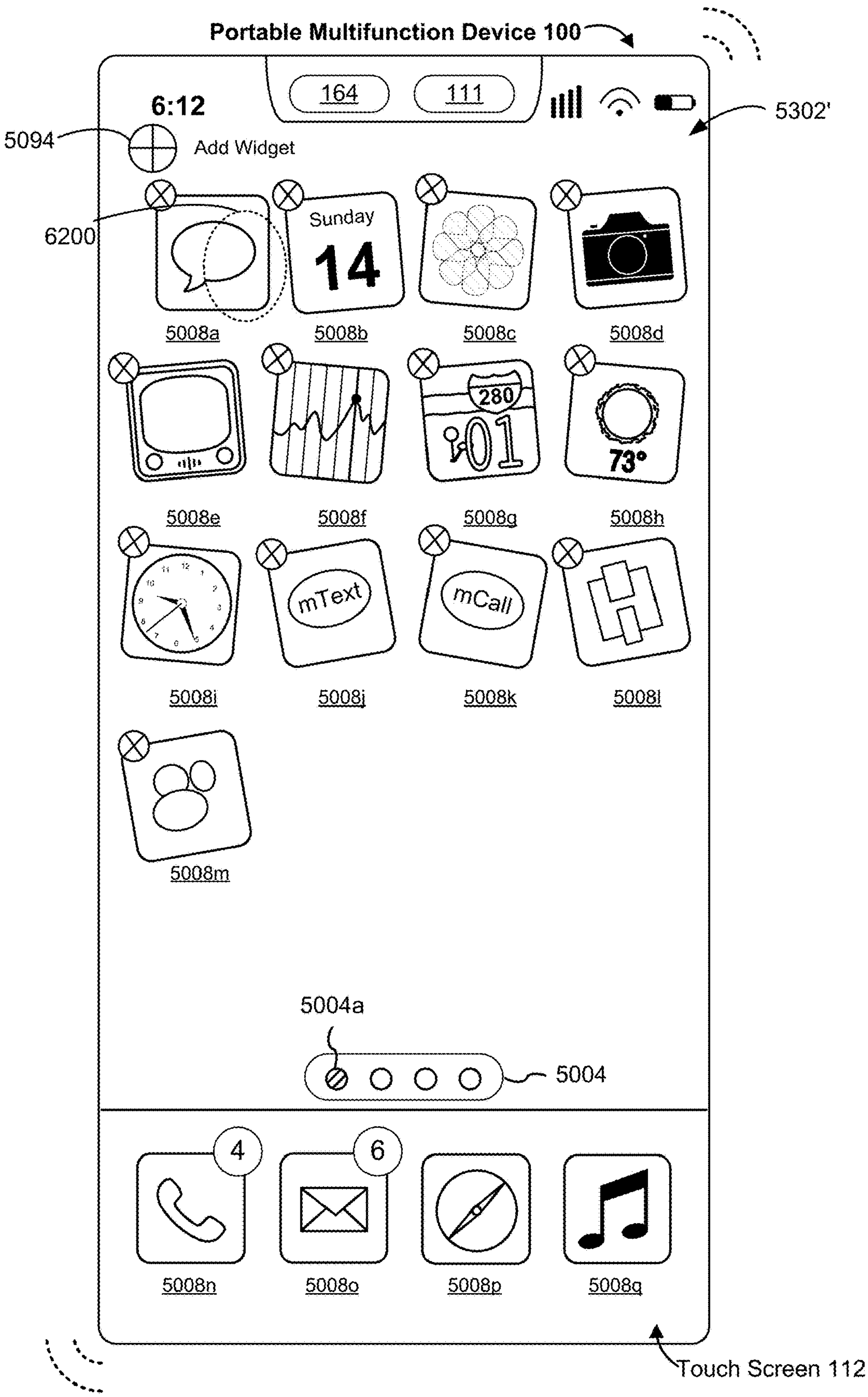
Figure 5F2

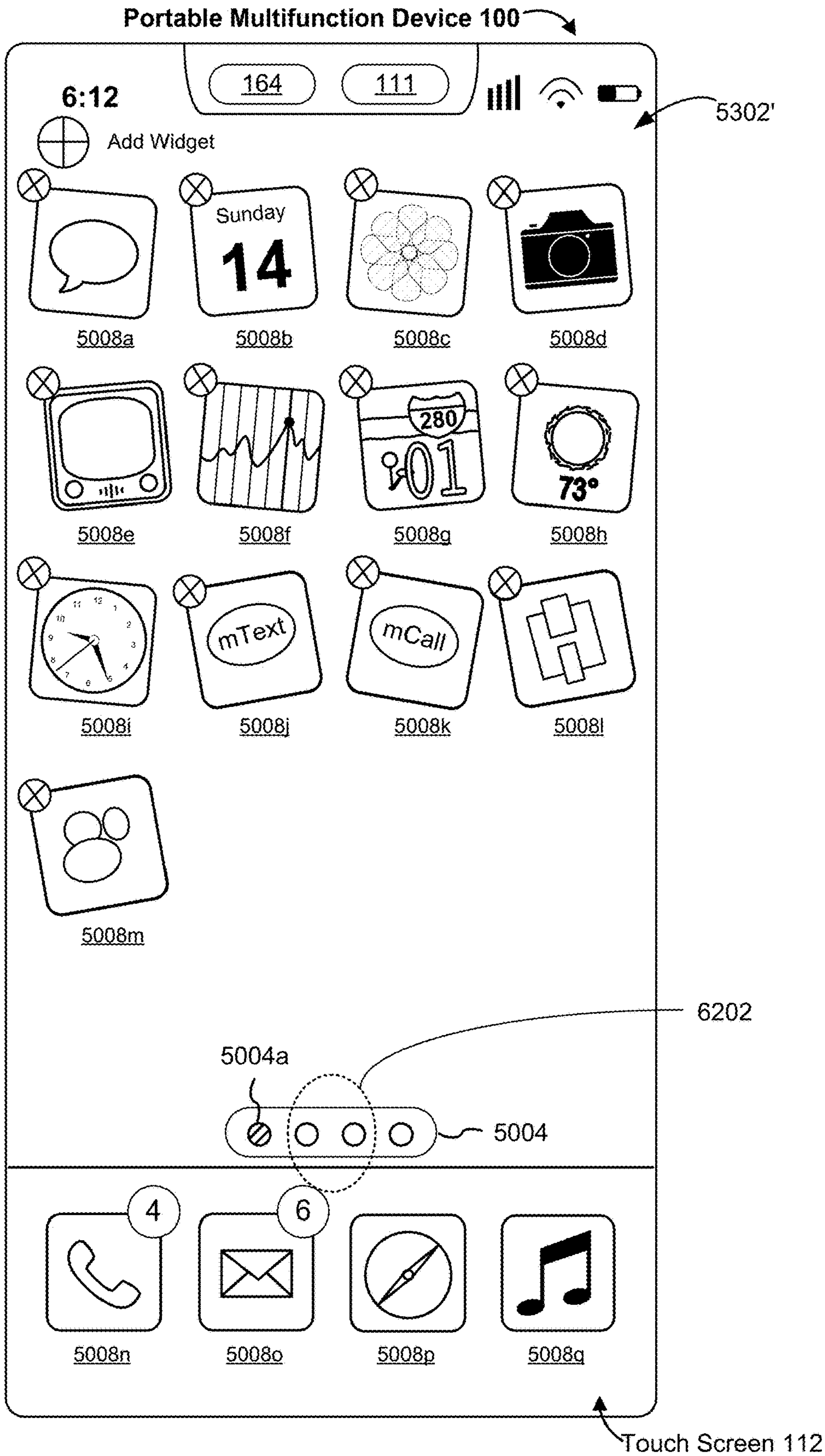
Figure 5F3

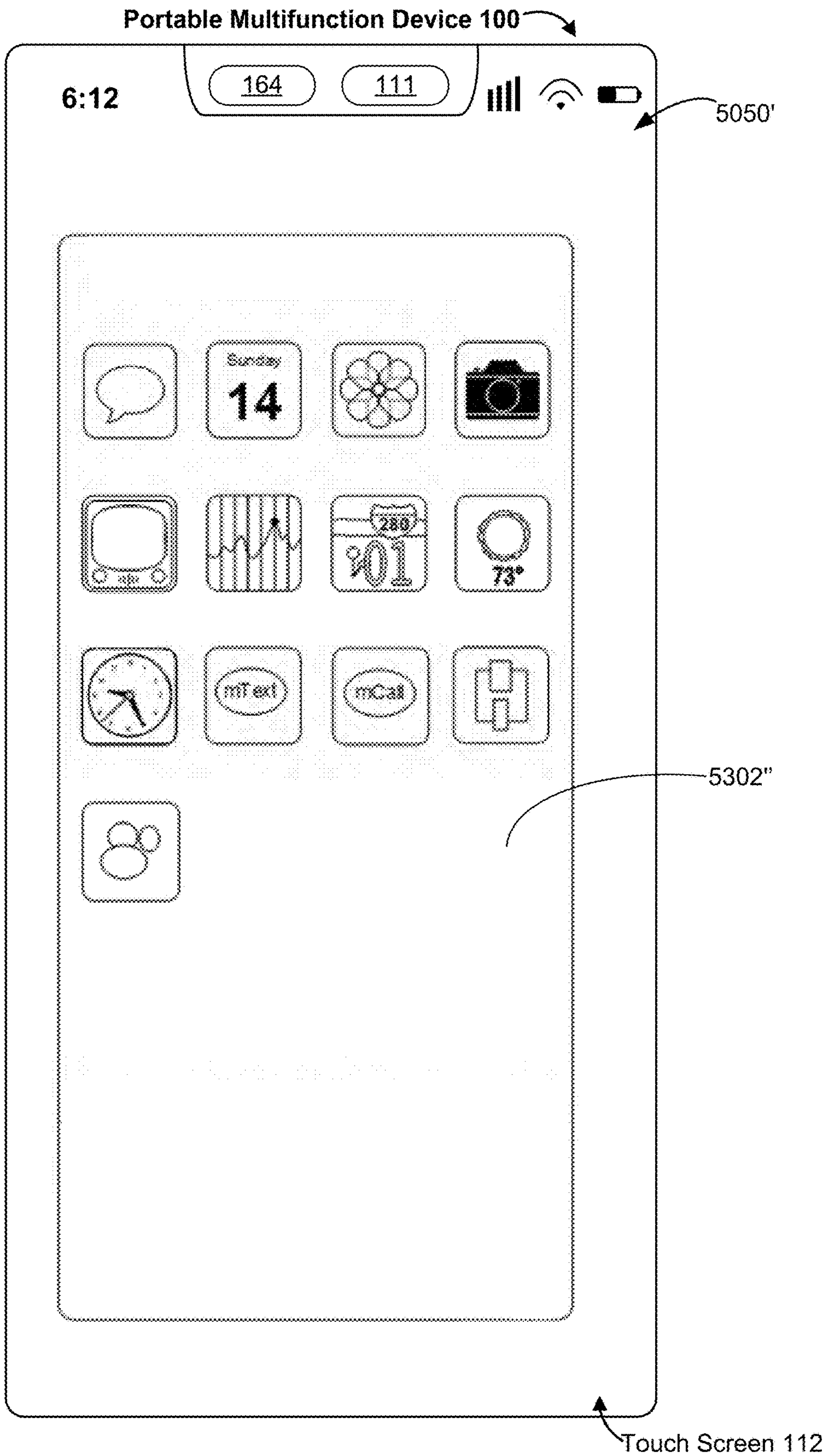
Figure 5F4

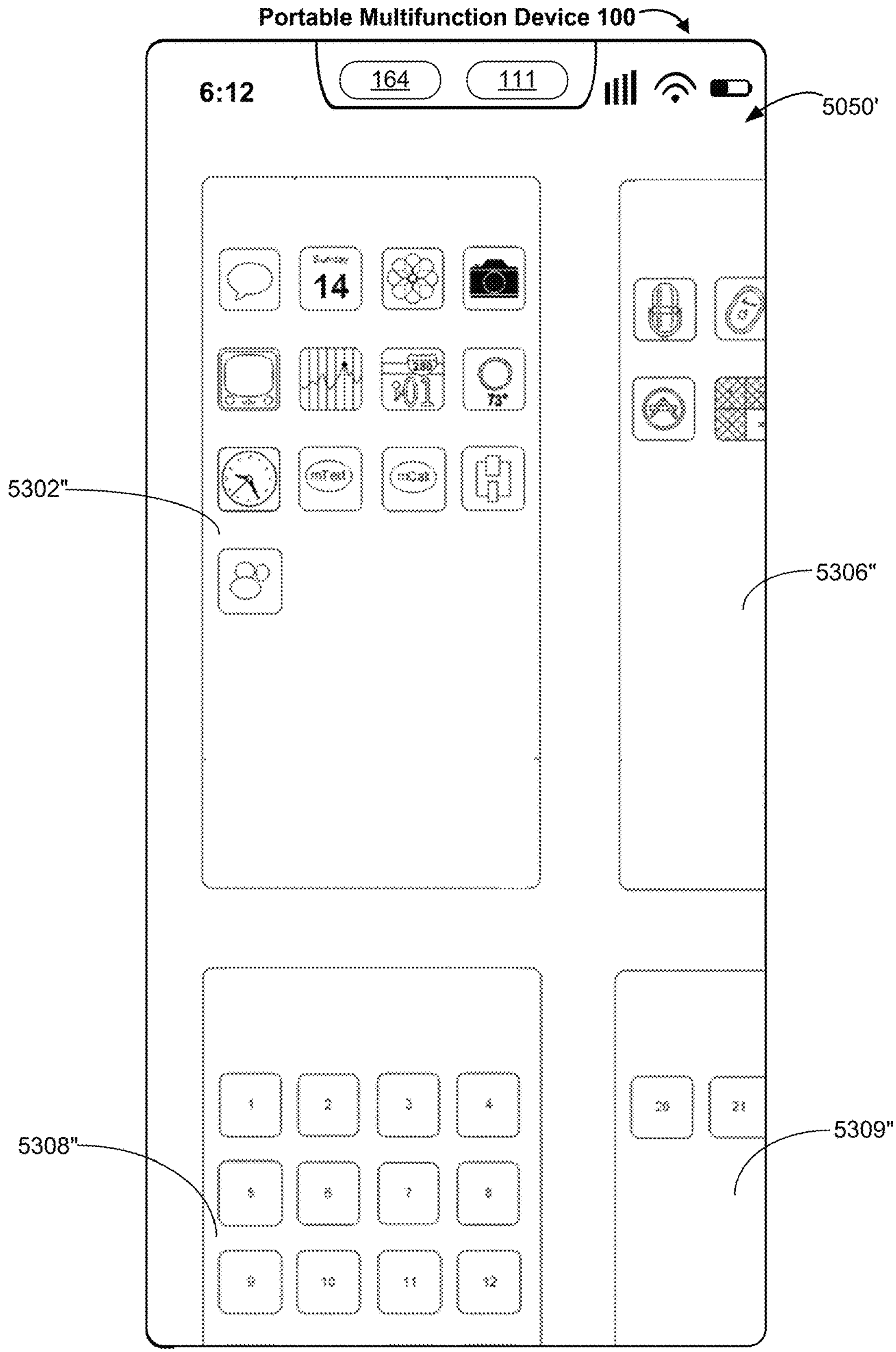
Figure 5F5

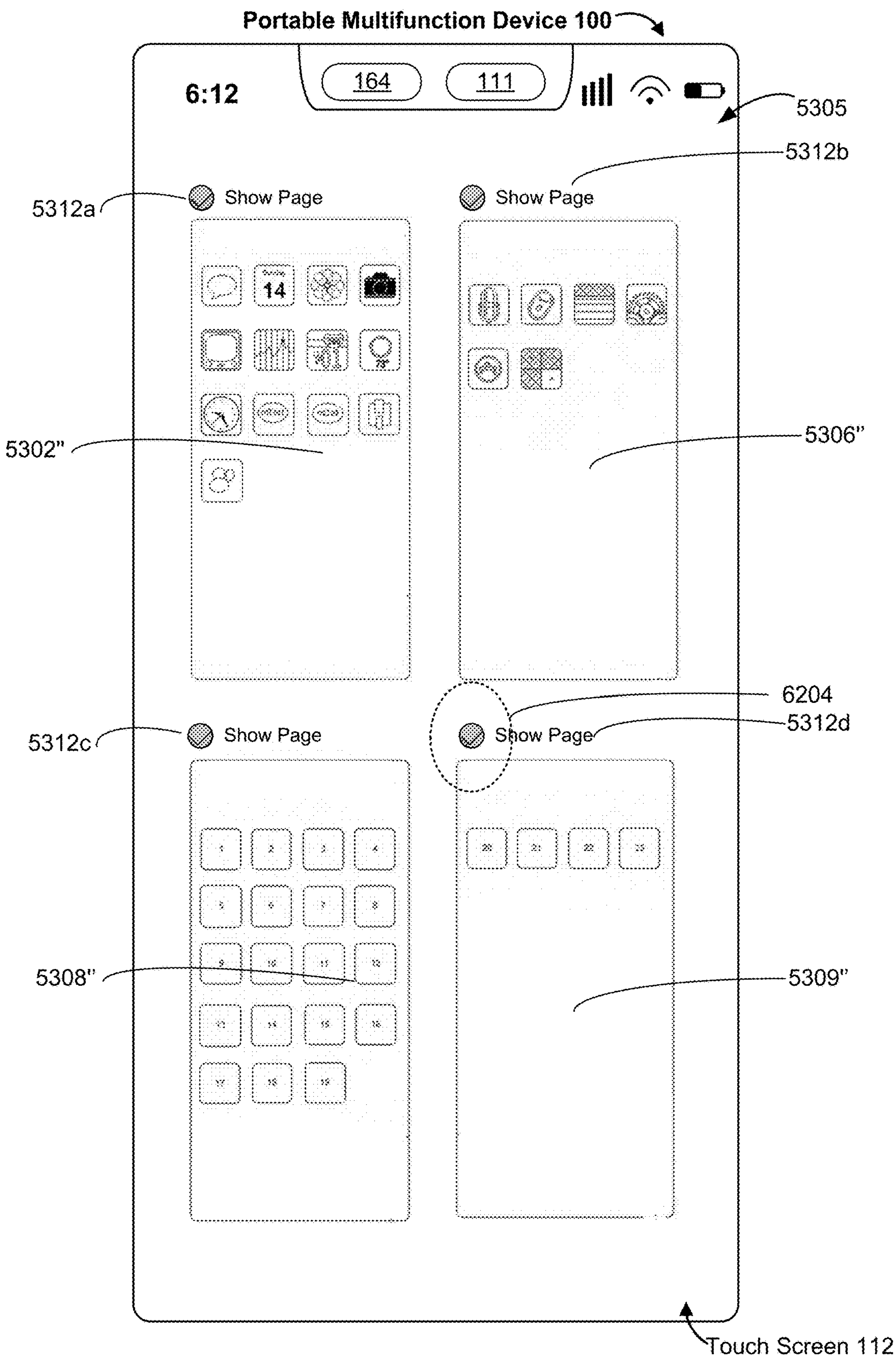
Figure 5F6

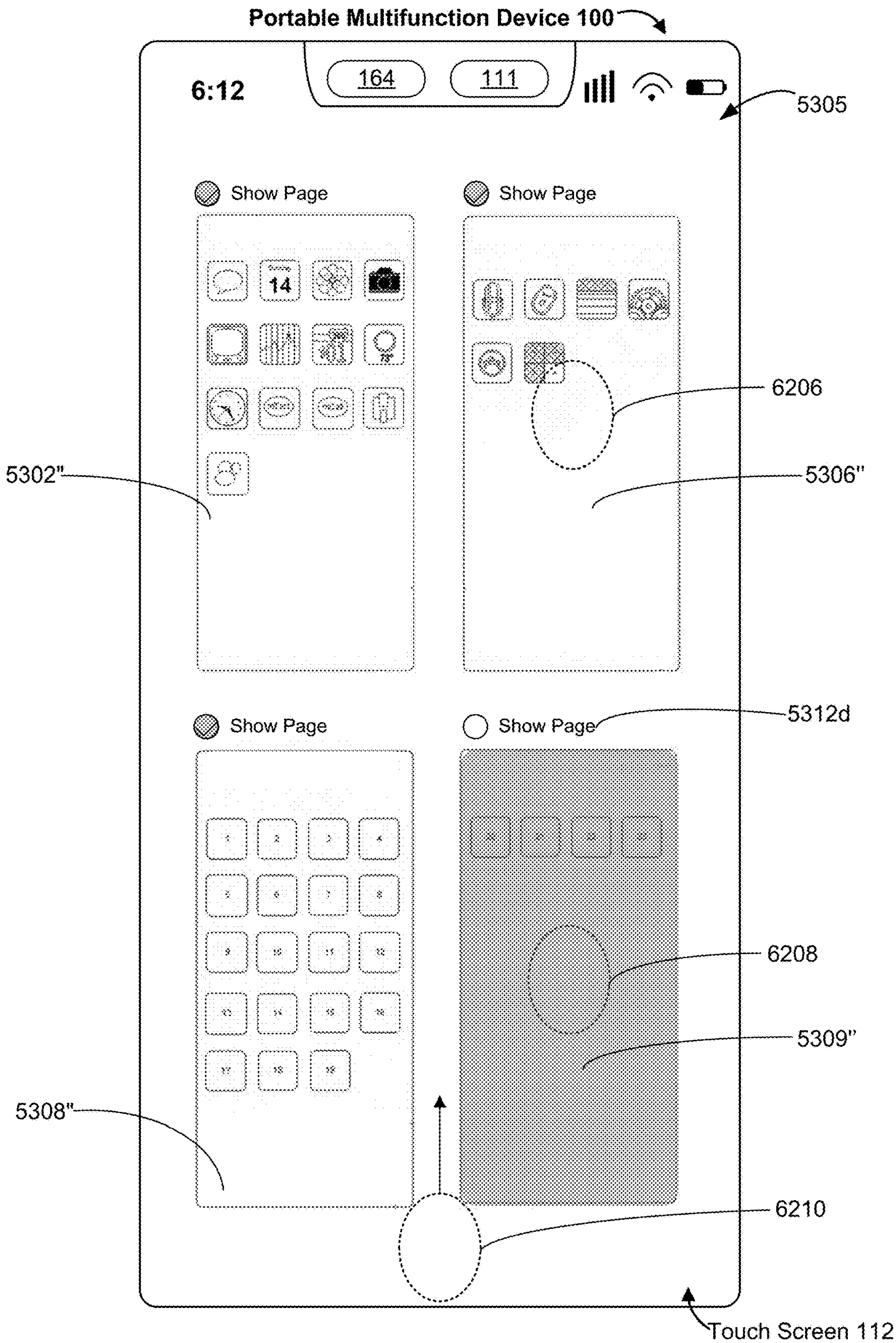
Figure 5F7

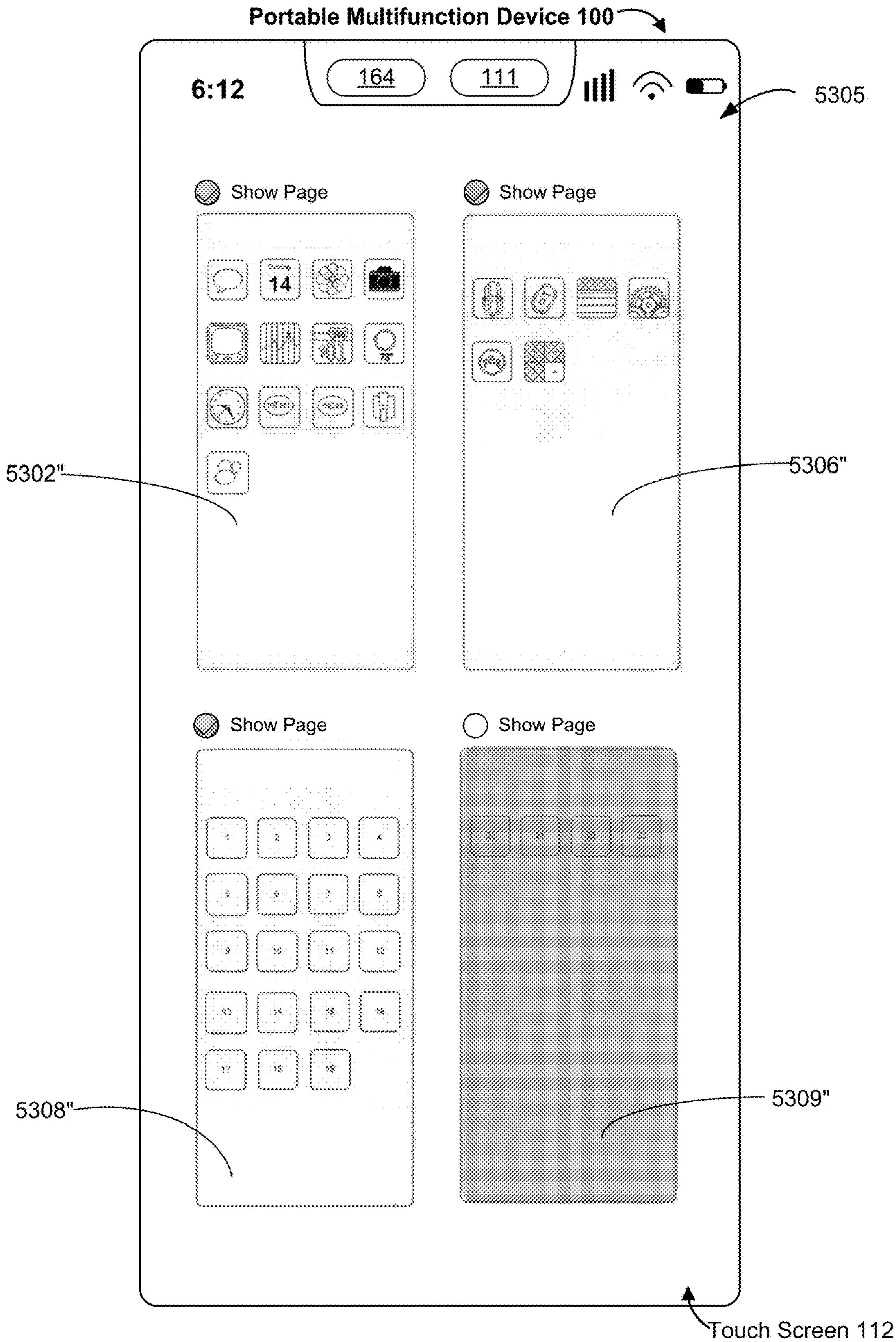
Figure 5F8

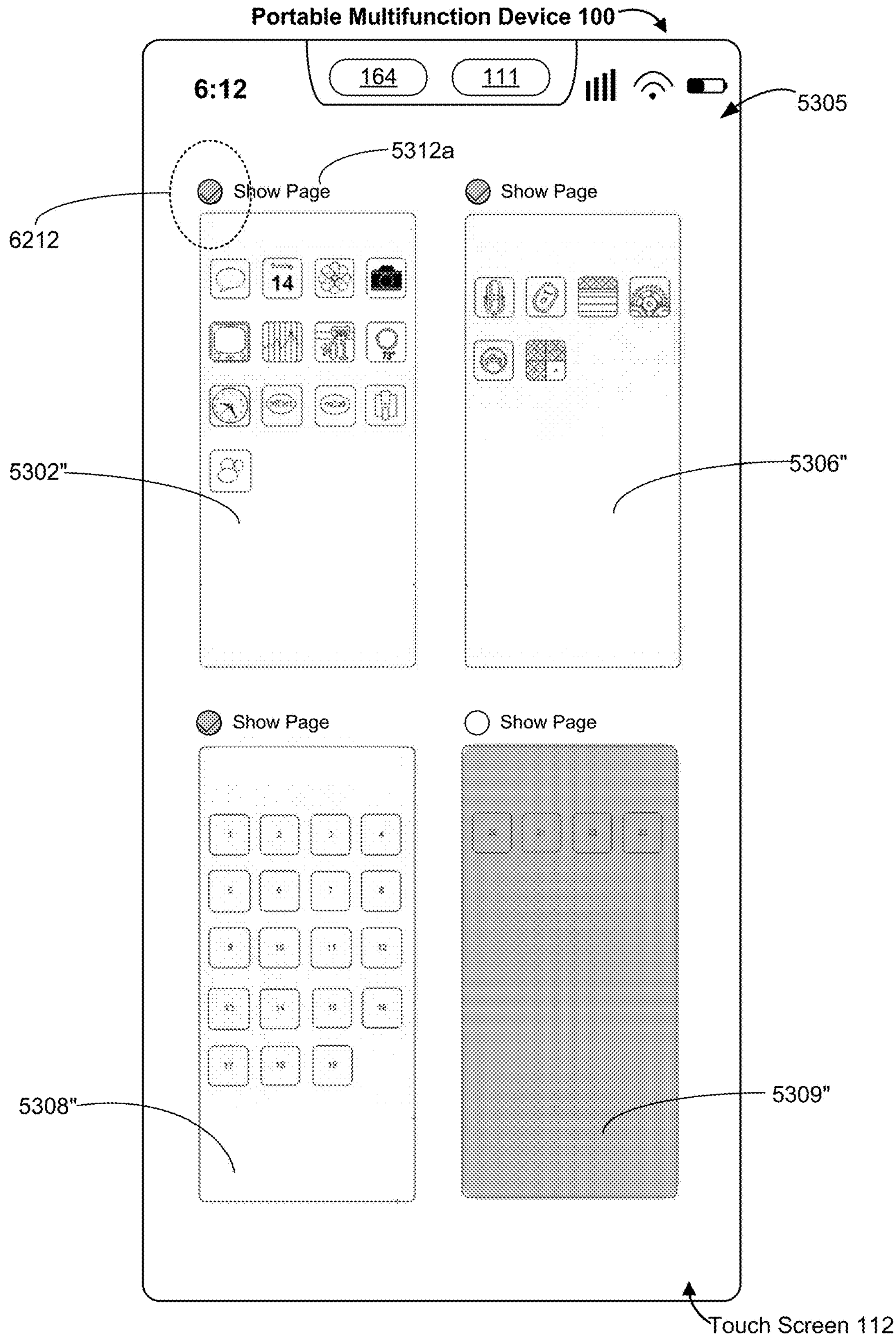
Figure 5F9

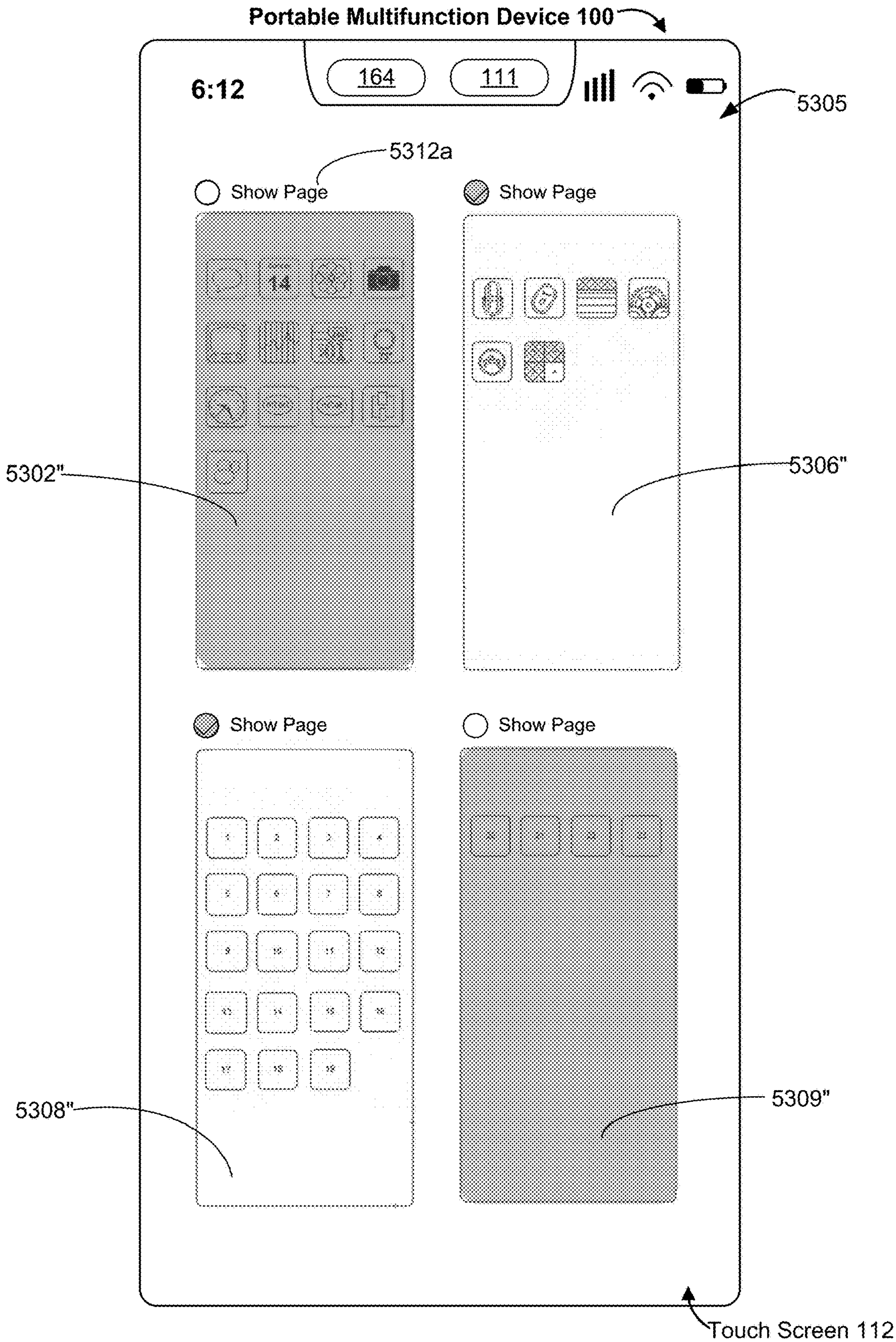
Figure 5F10

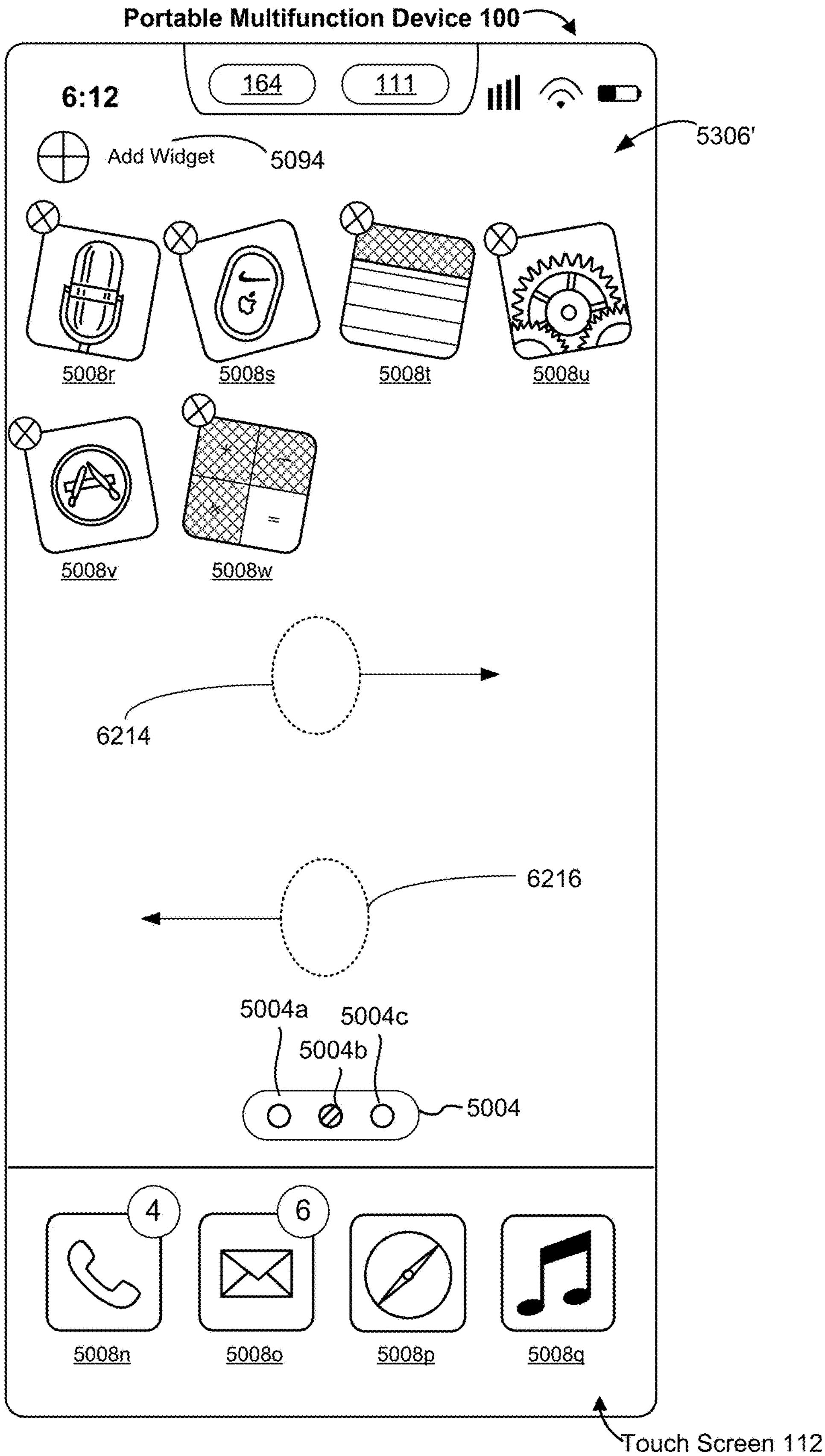
Figure 5F11

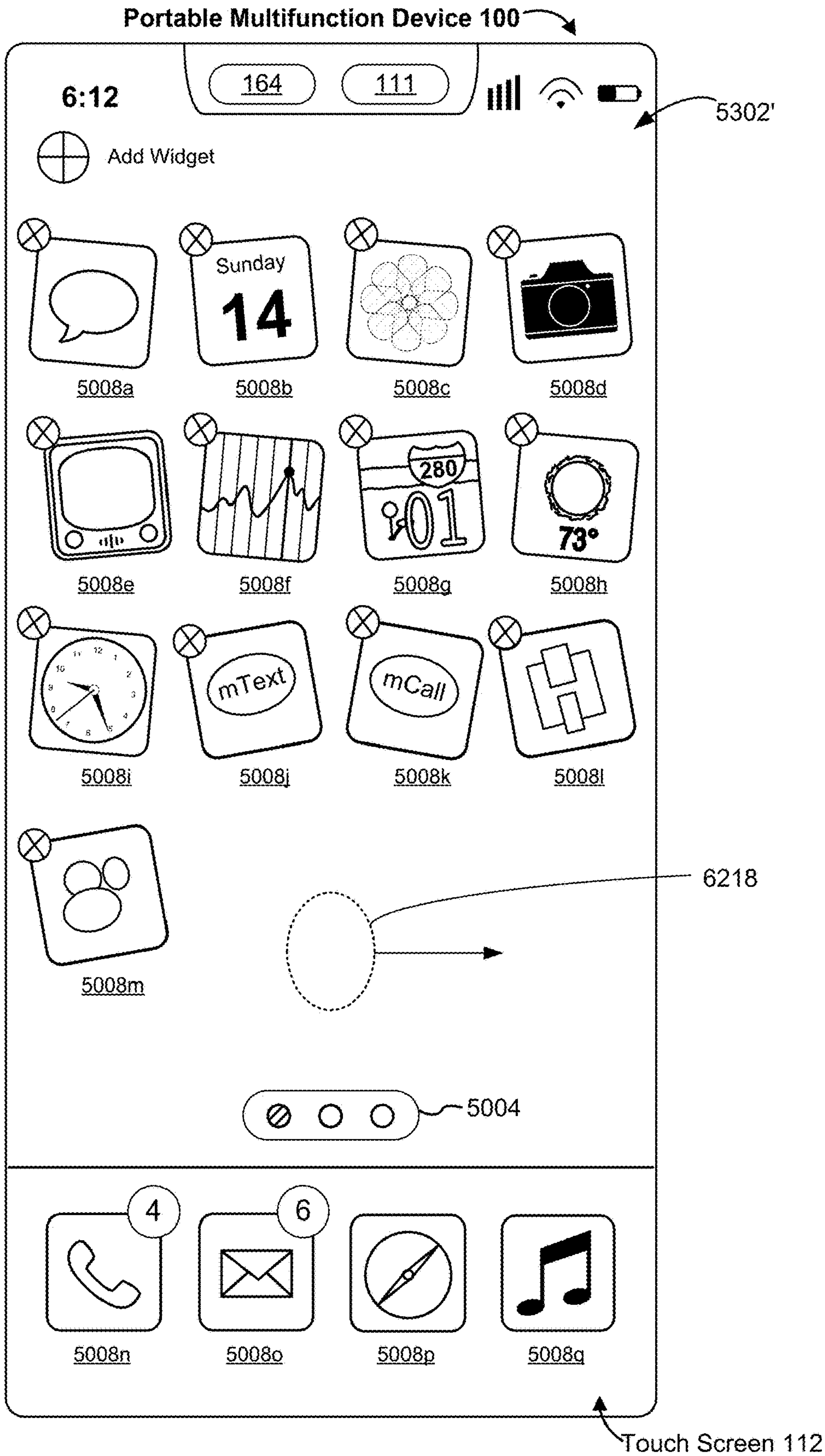
Figure 5F12

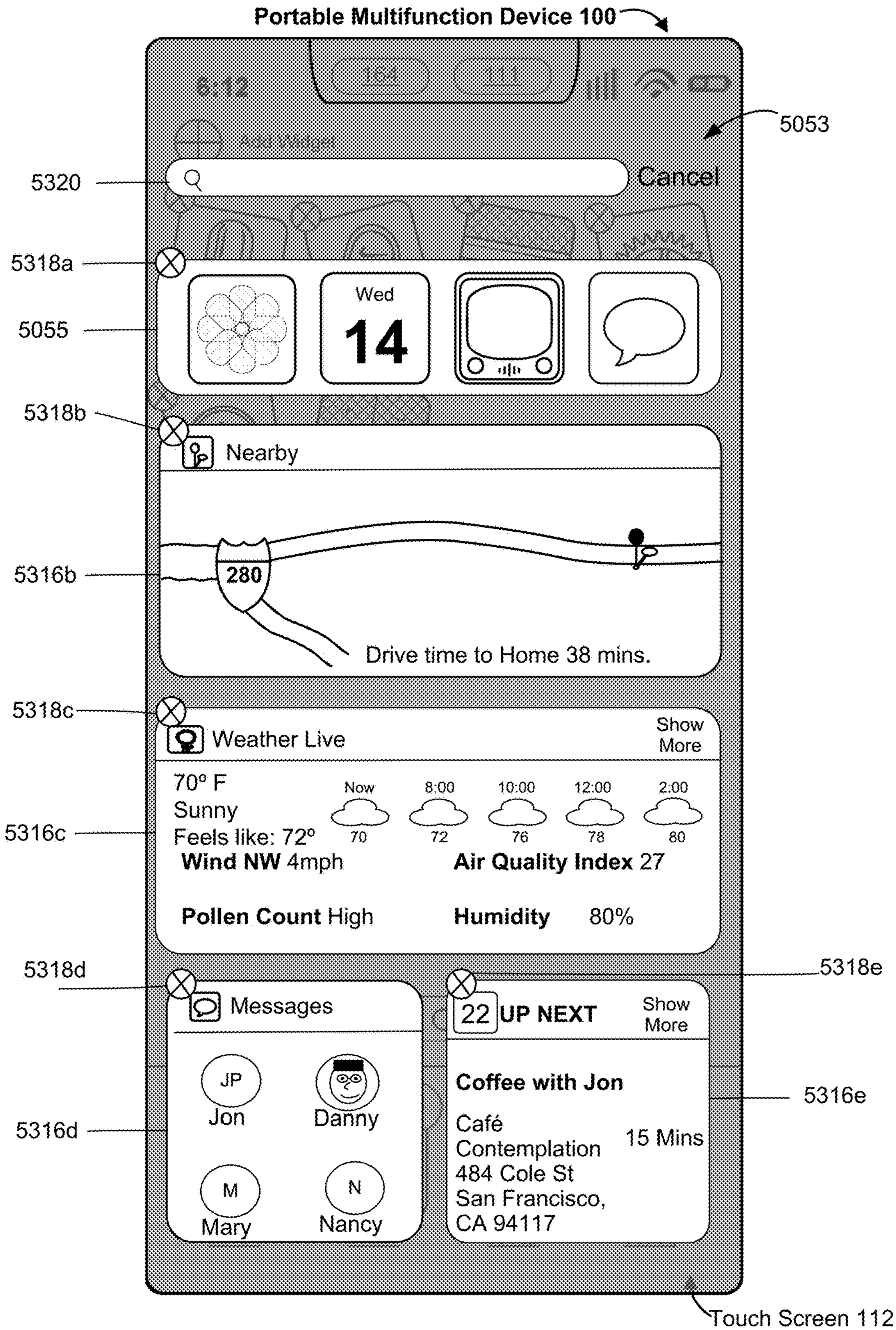
Figure 5F13

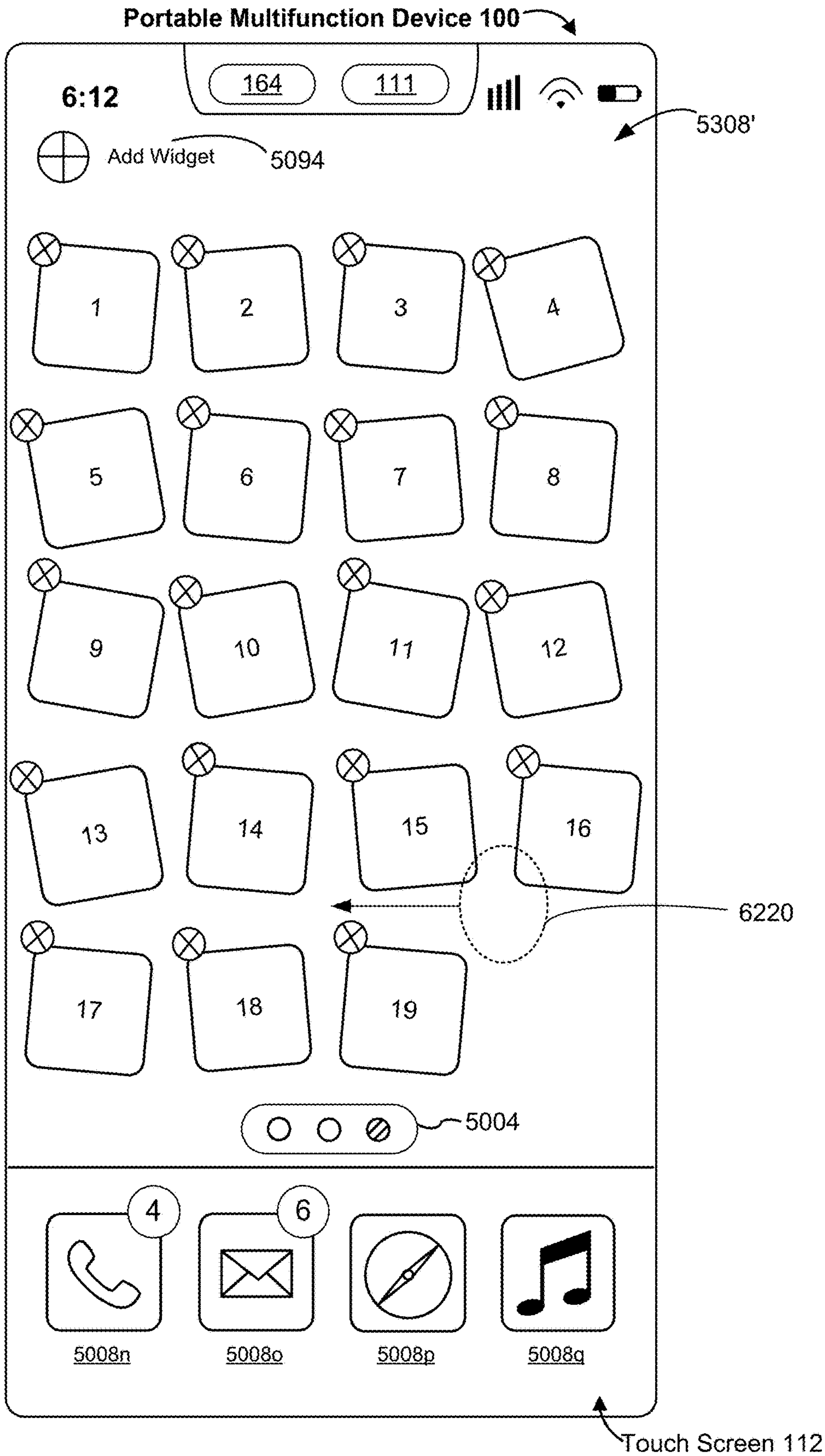
Figure 5F14

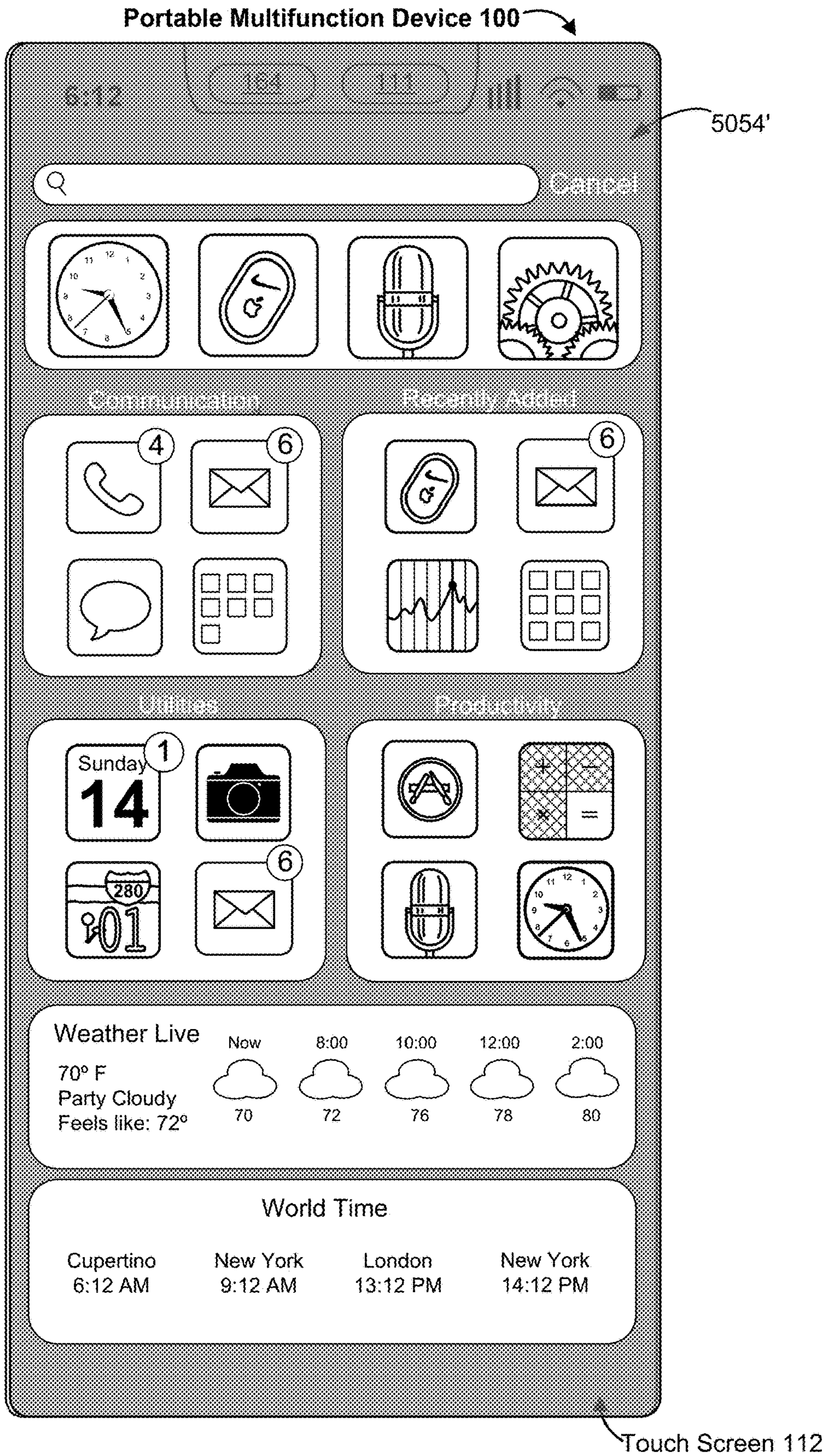
Figure 5F15

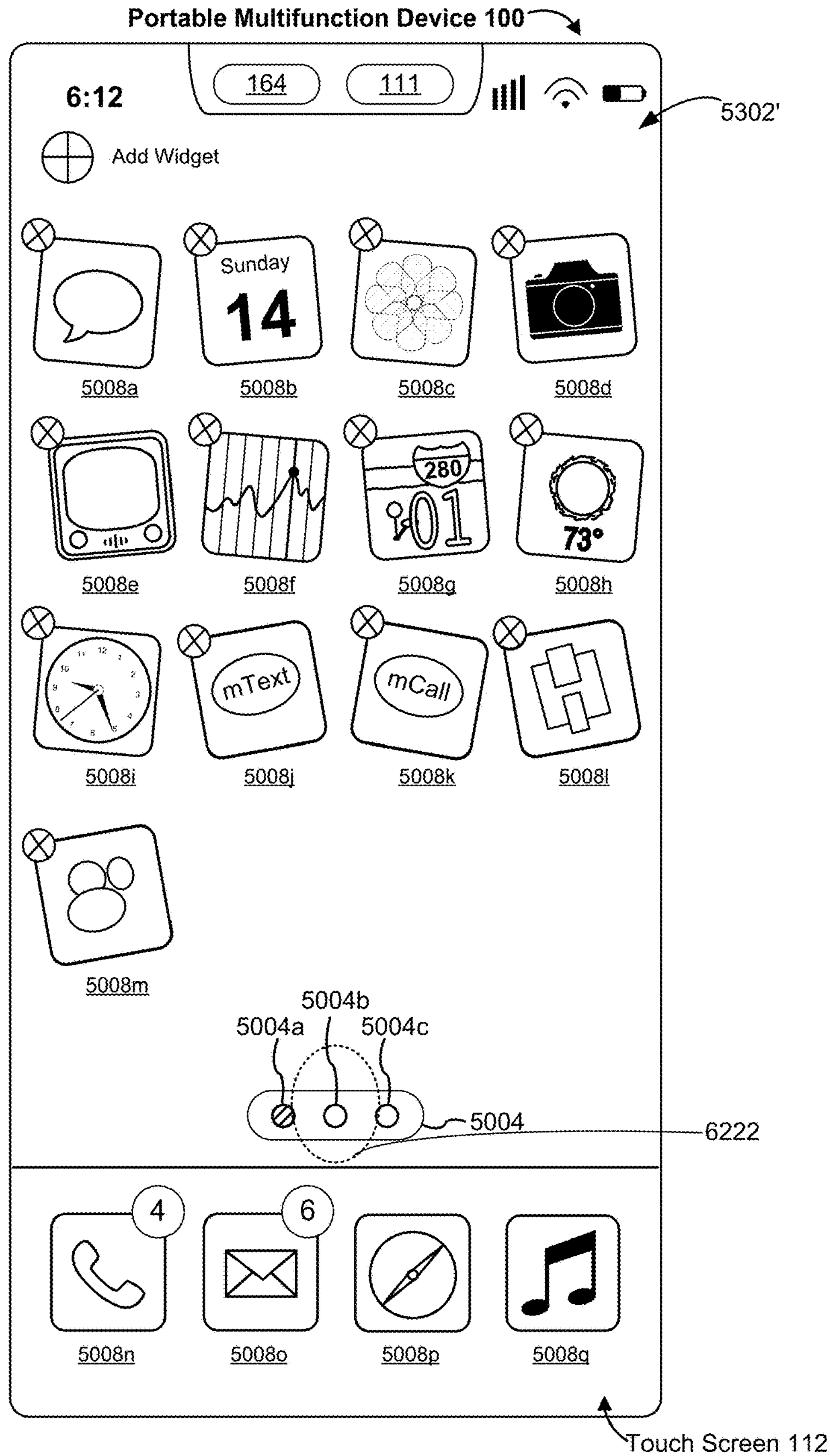
Figure 5F16

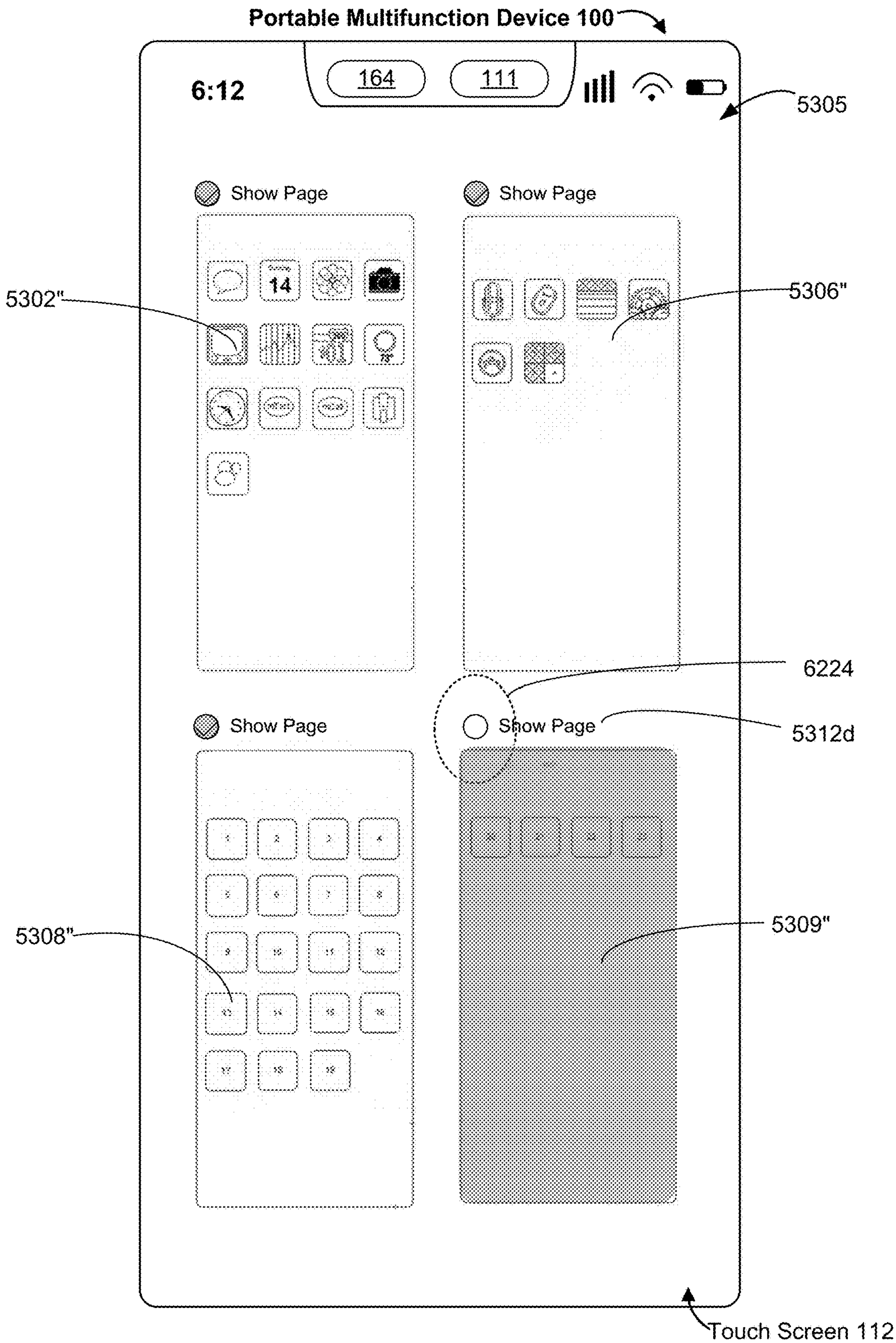
Figure 5F17

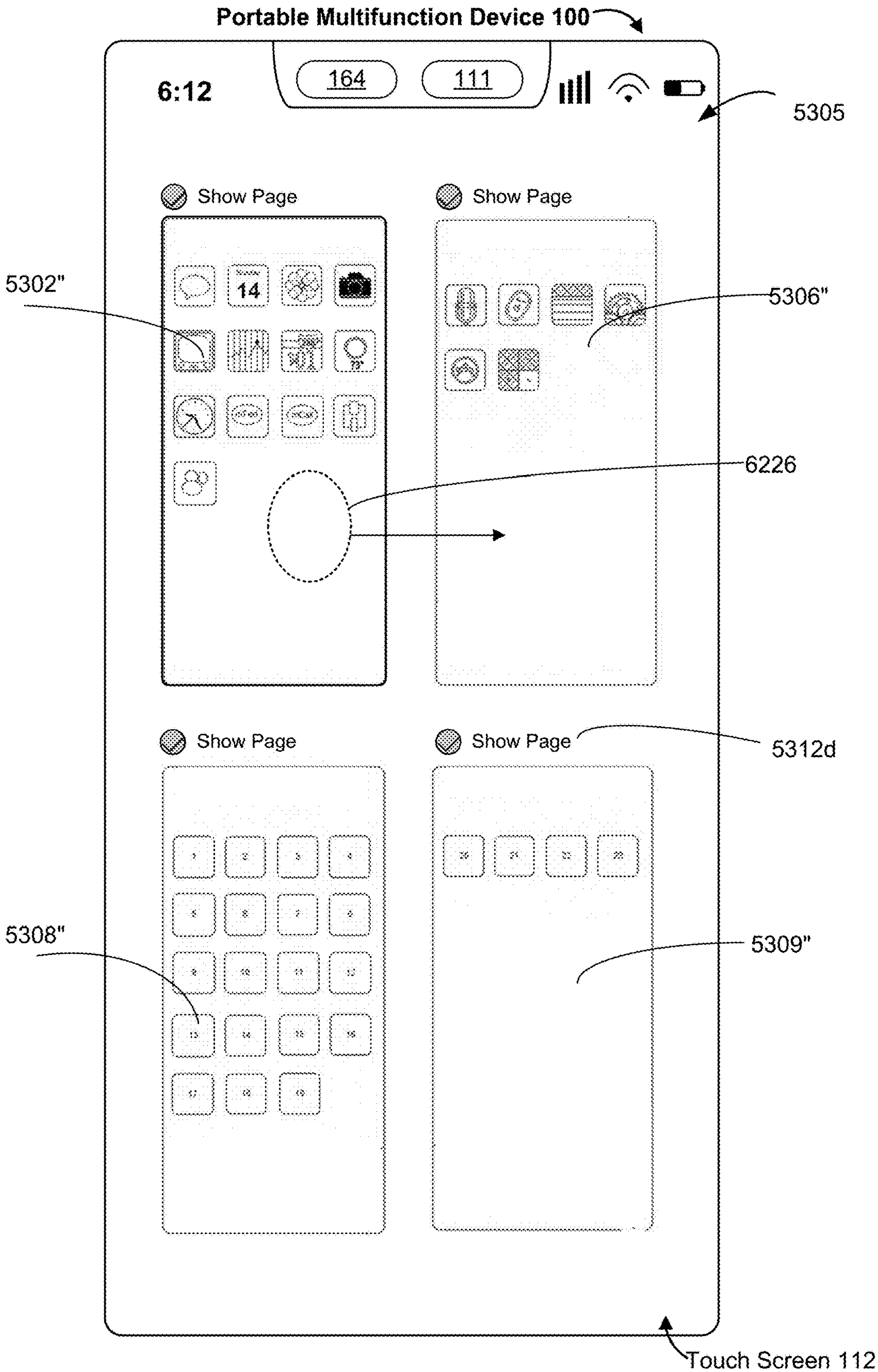
Figure 5F18

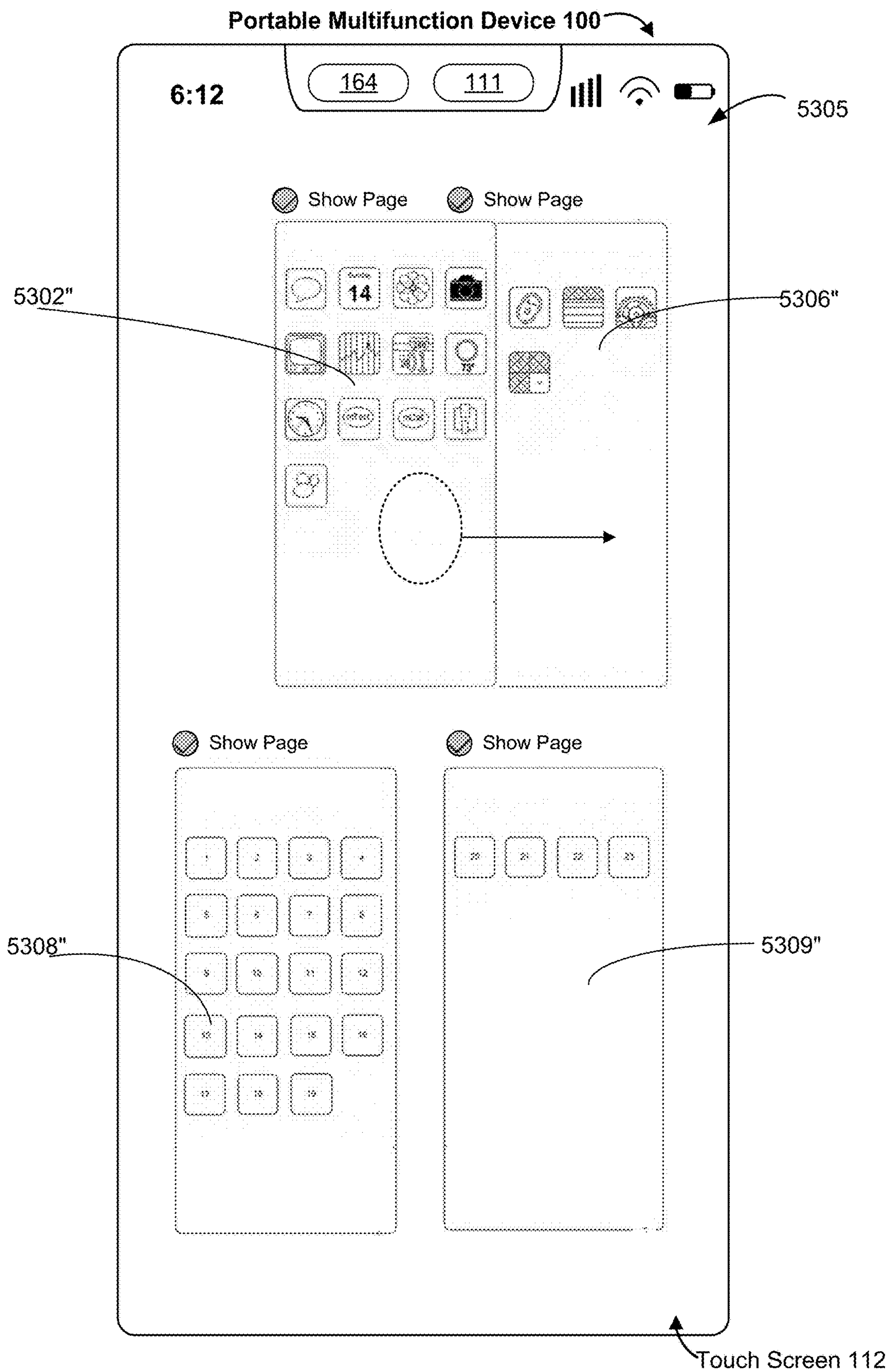
Figure 5F19

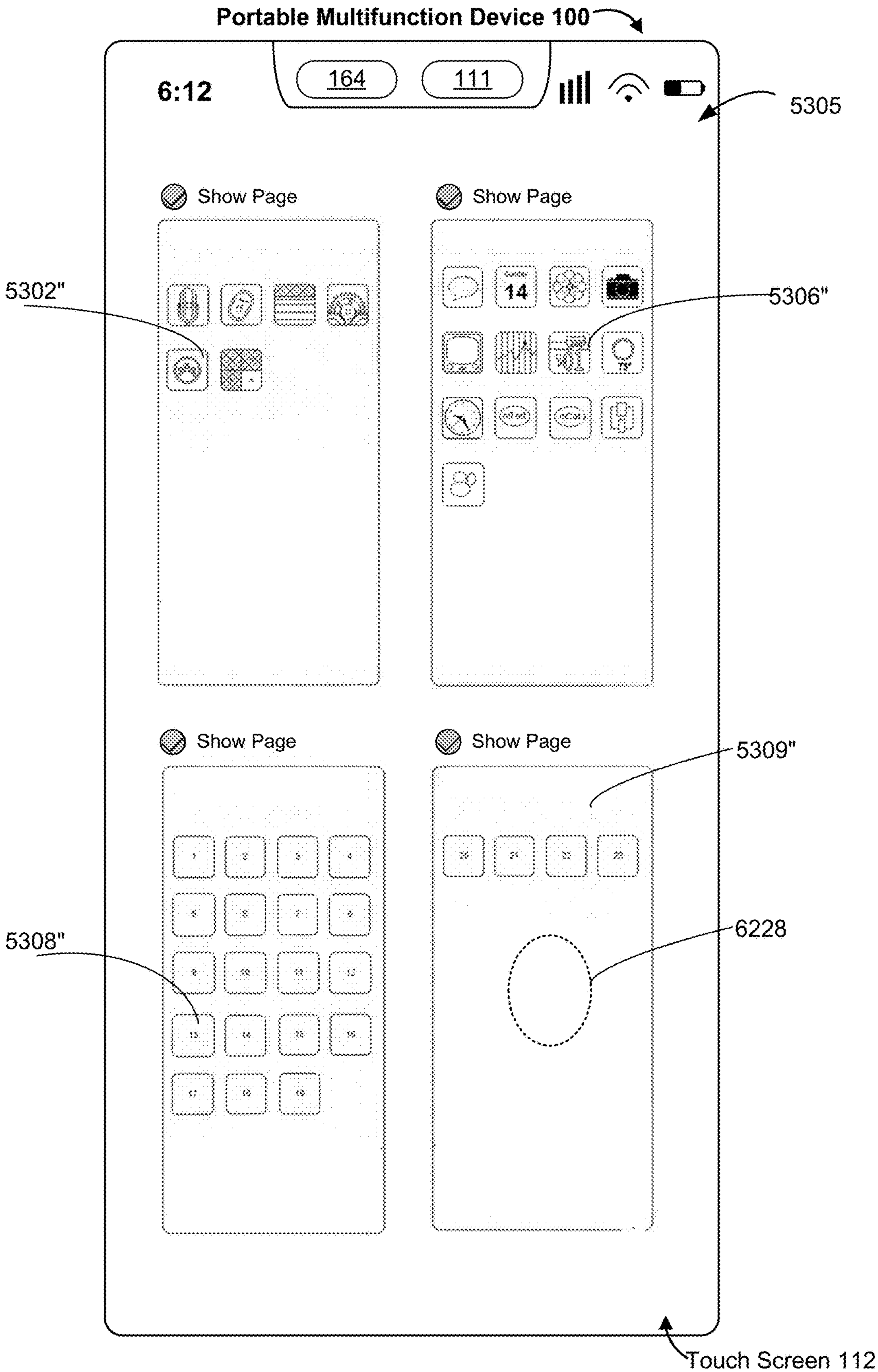
Figure 5F20

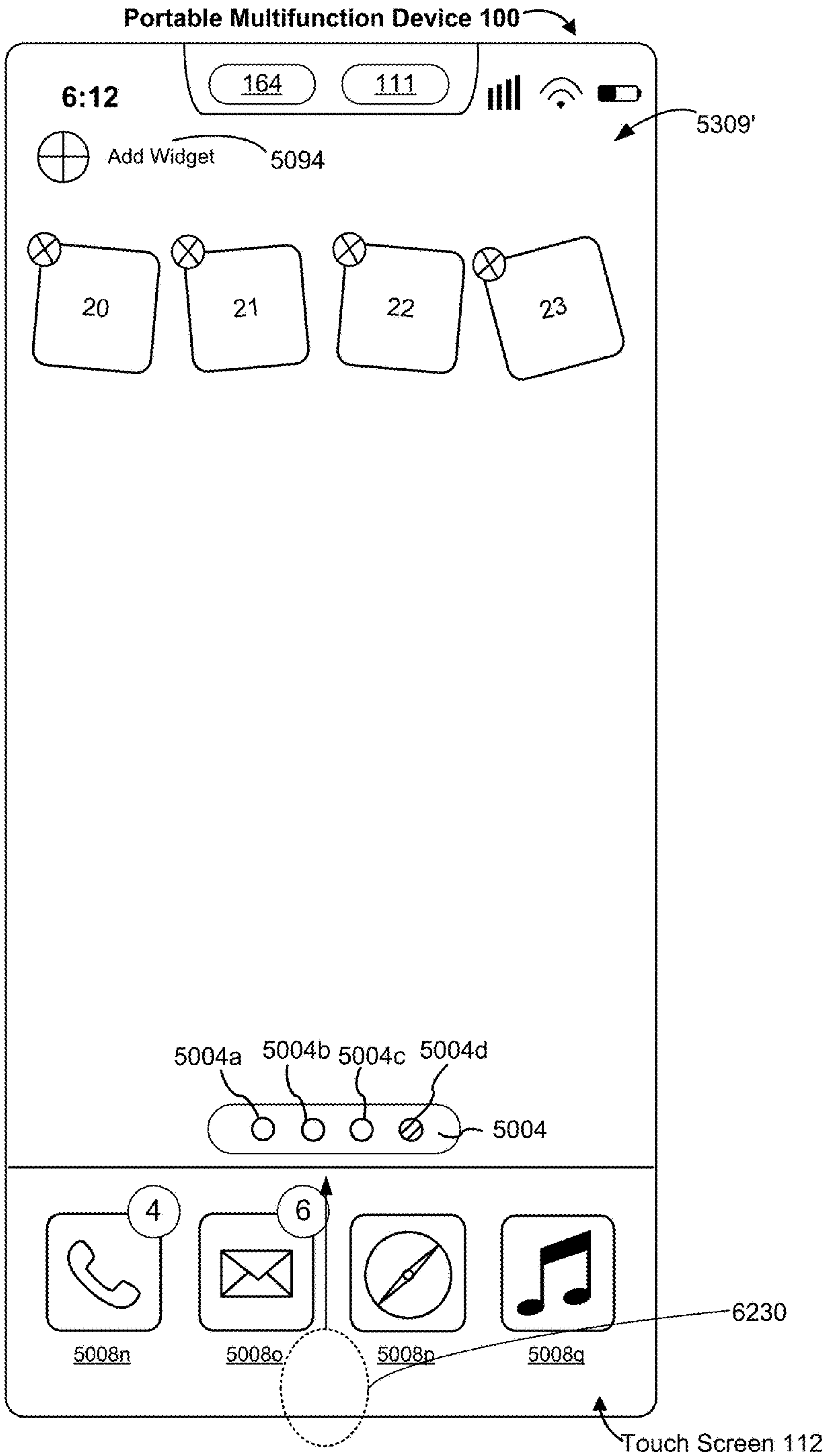
Figure 5F21

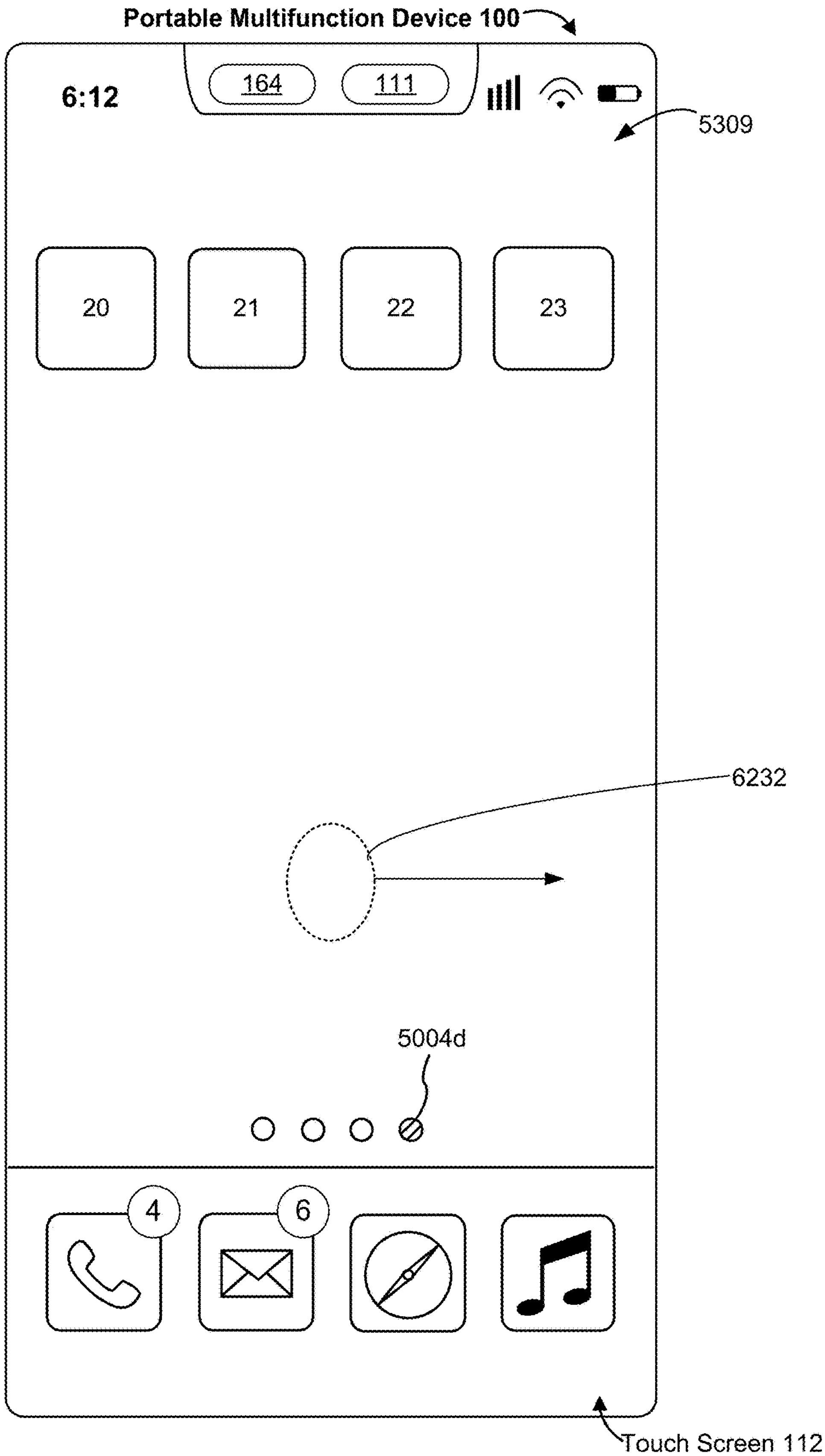
Figure 5F22

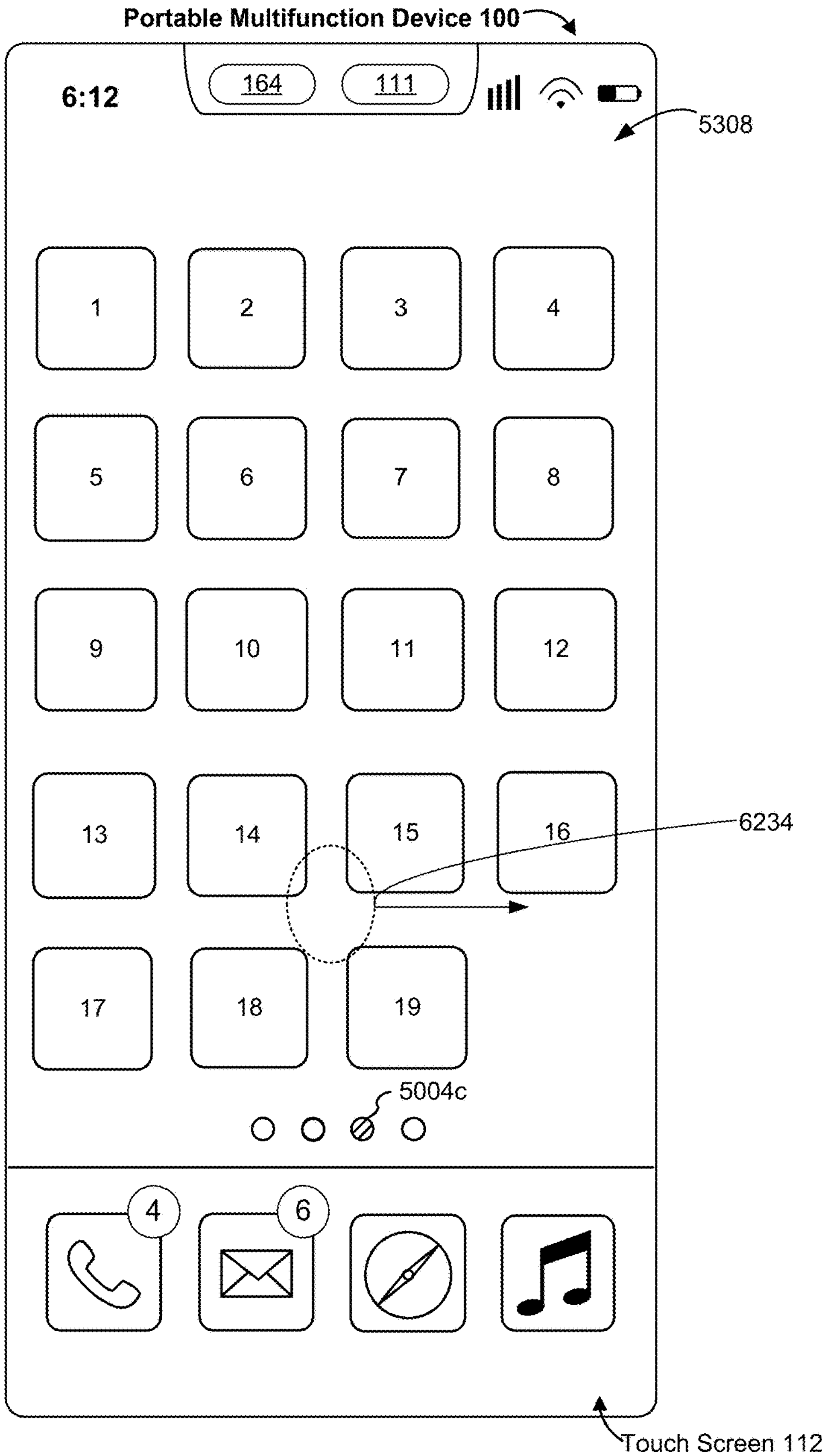
Figure 5F23

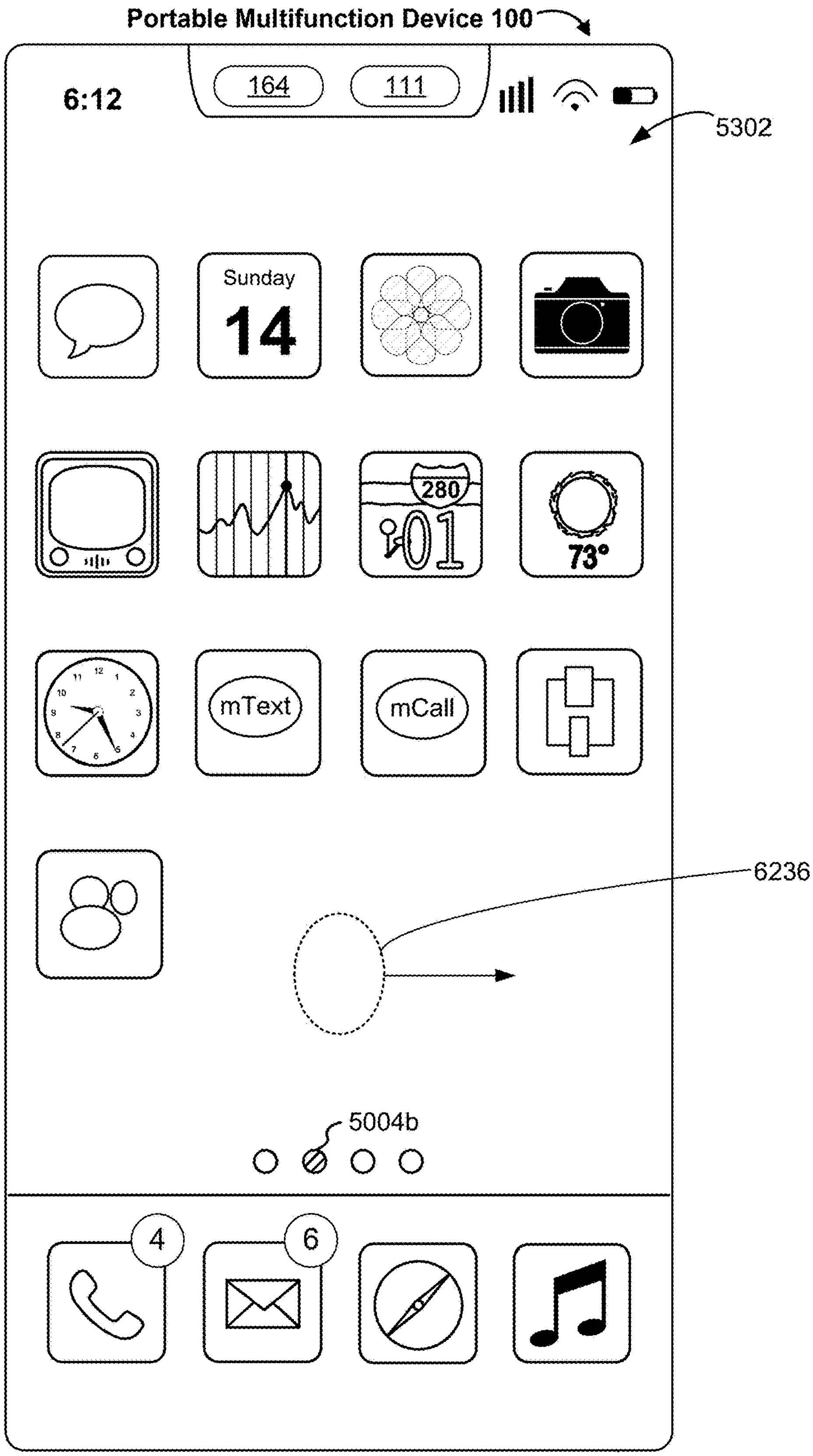
Figure 5F24

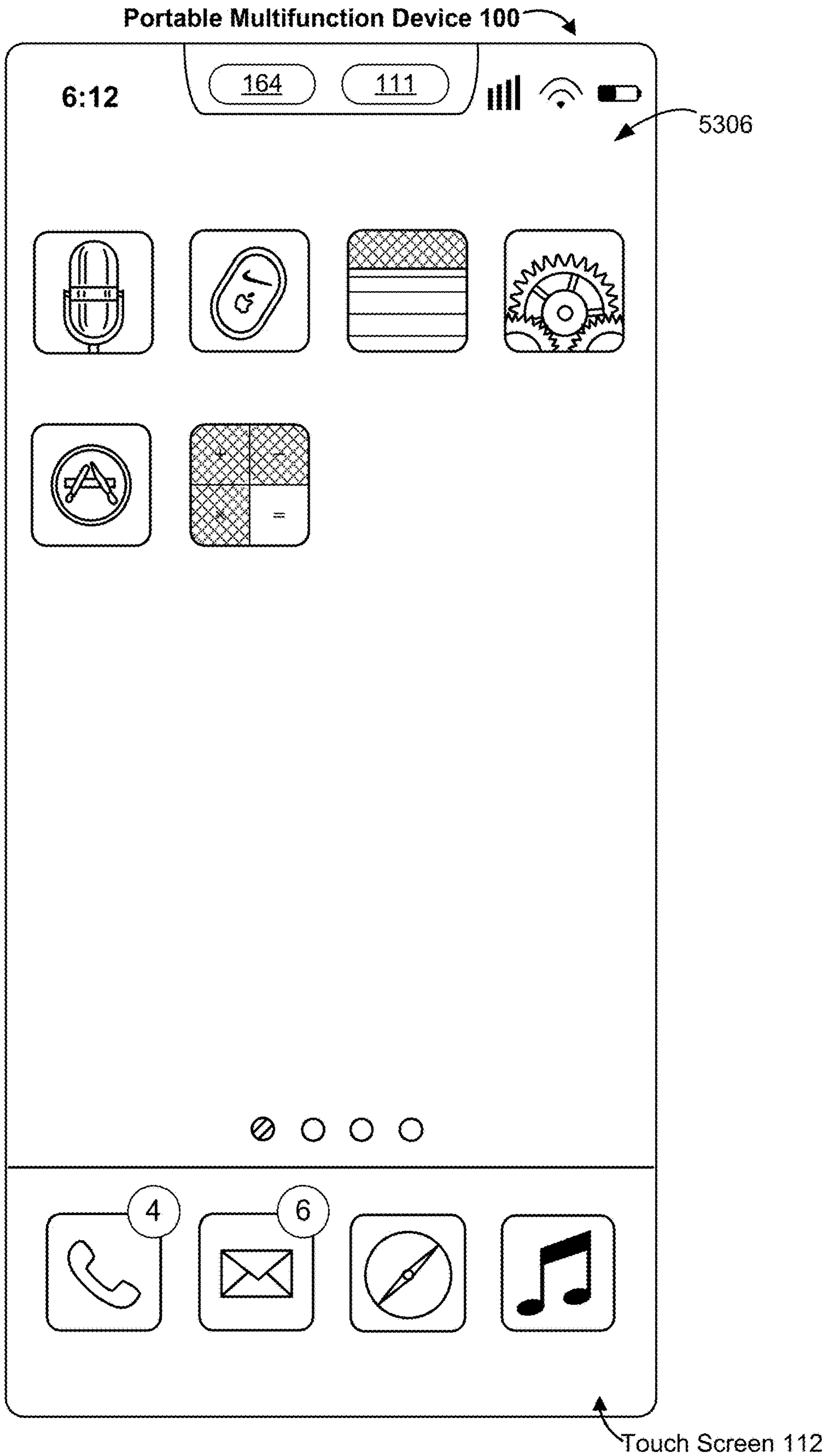
Figure 5F25

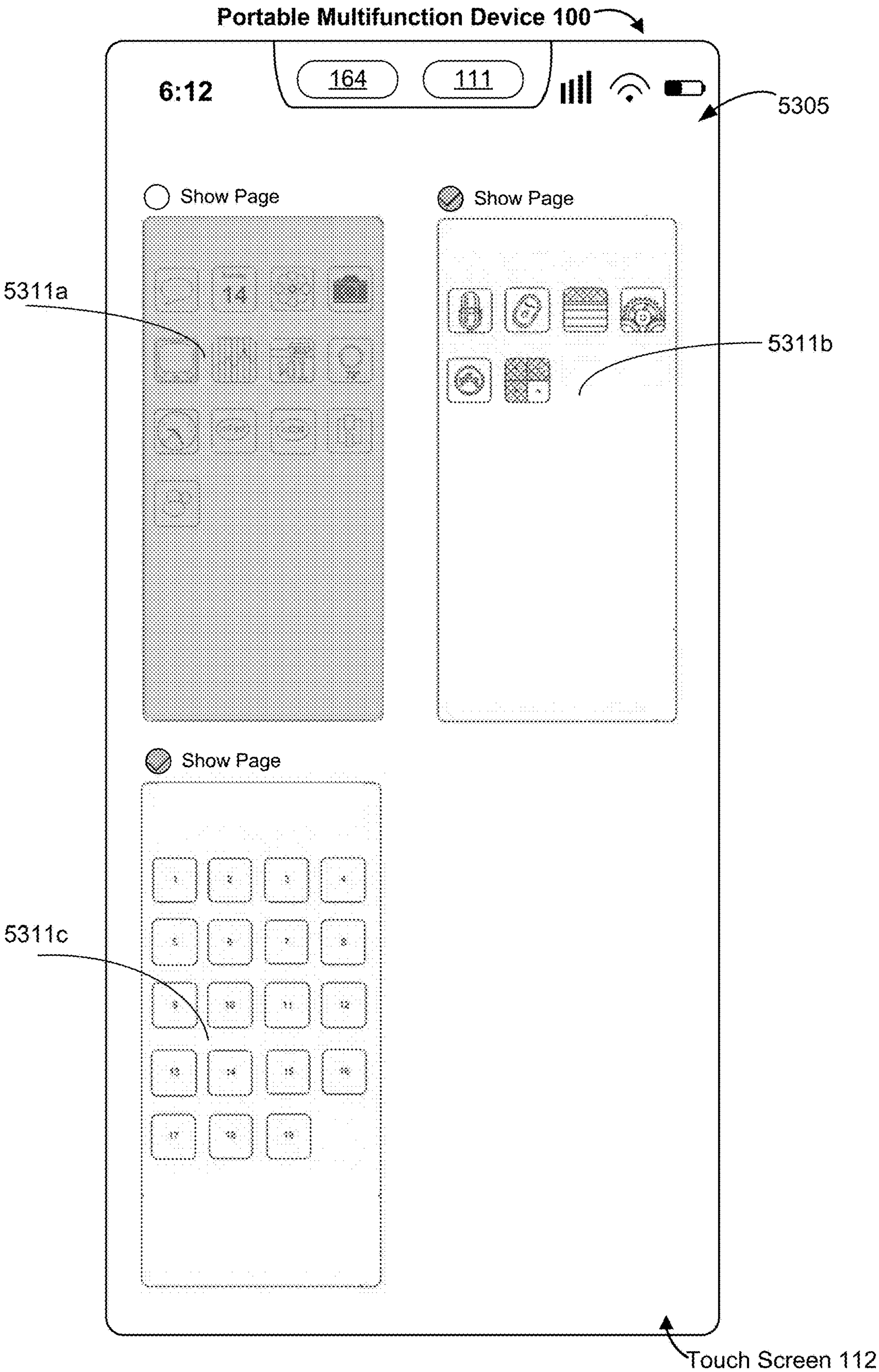
Figure 5F26

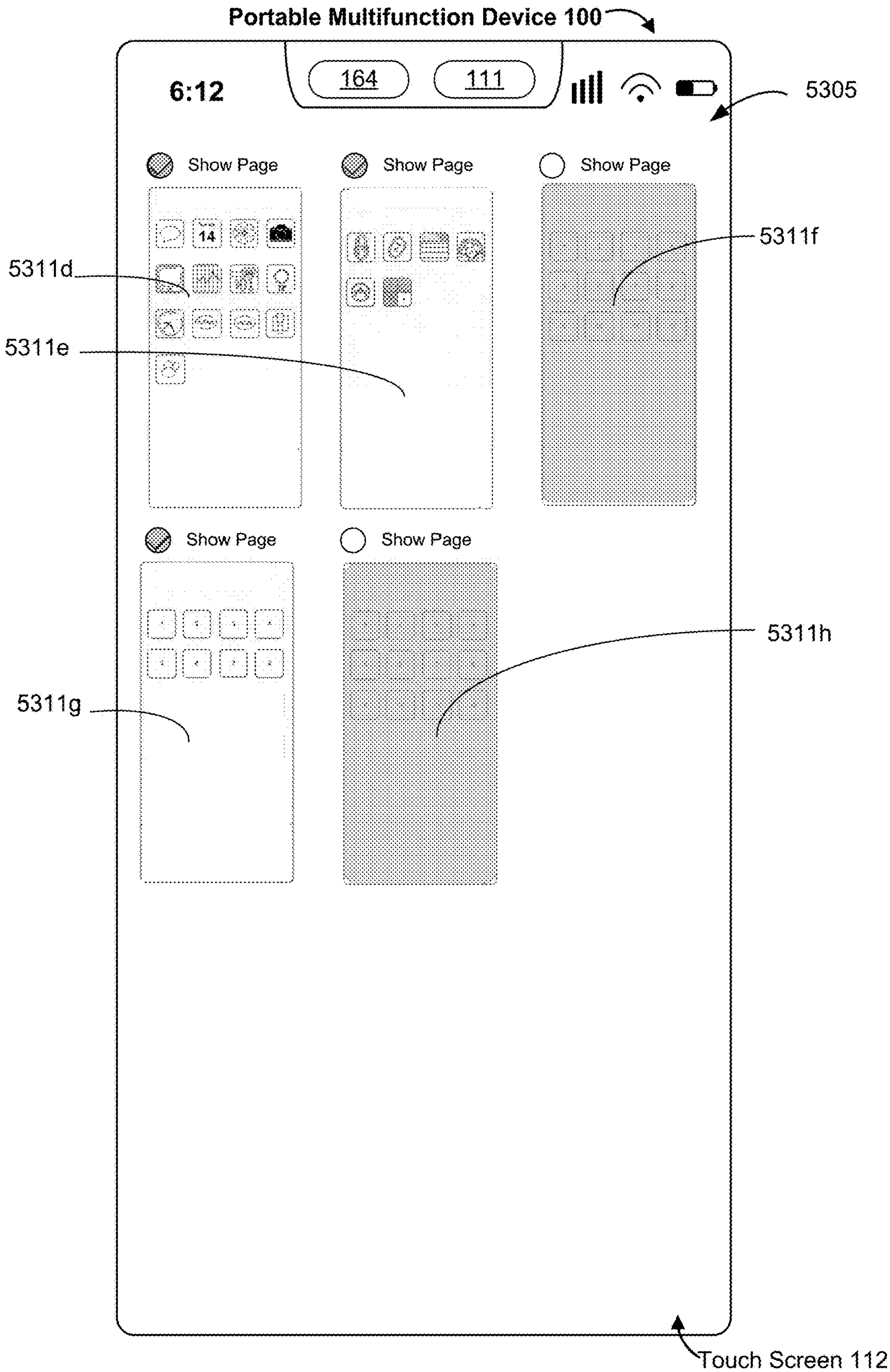
Figure 5F27

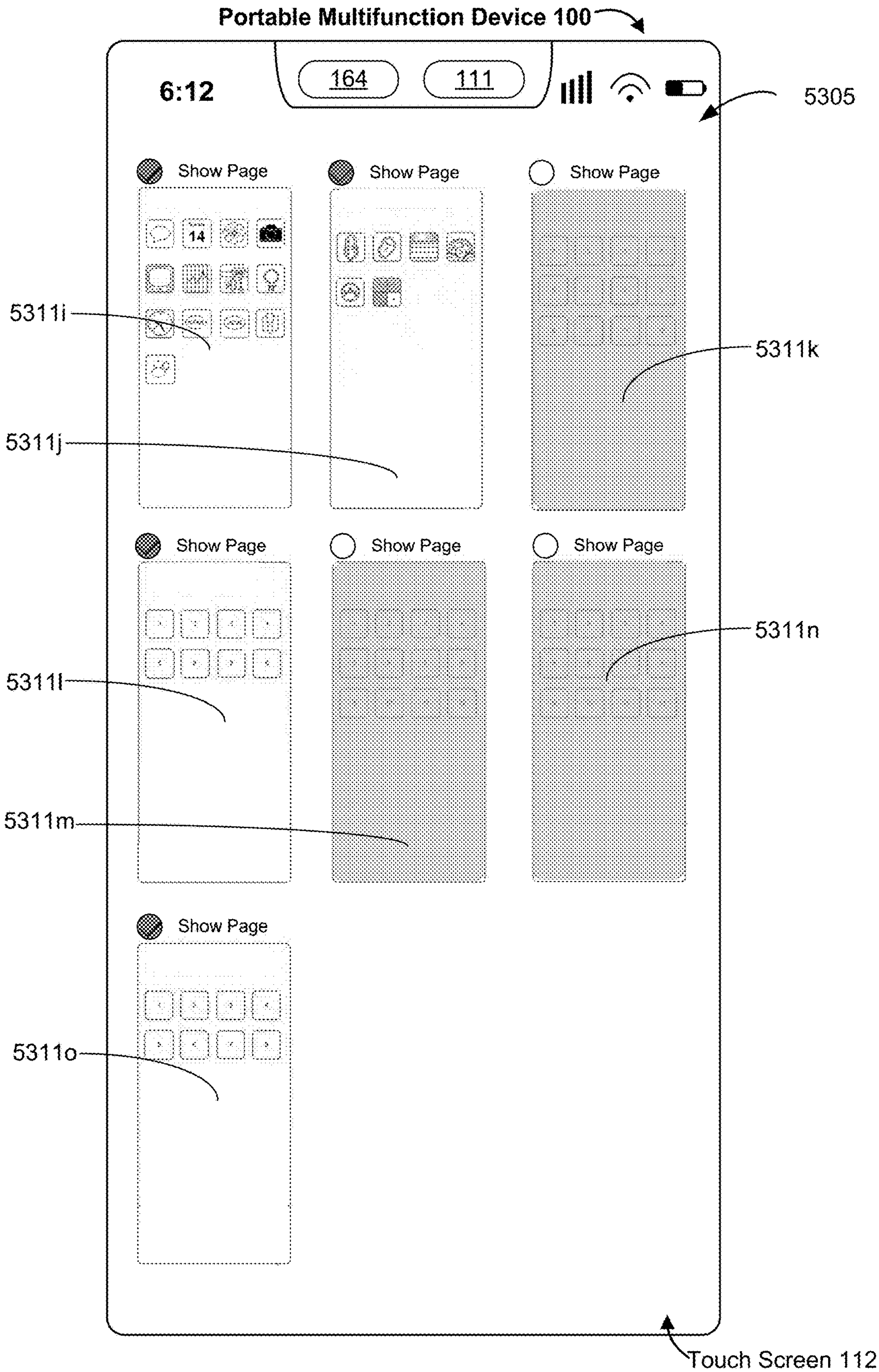
Figure 5F28

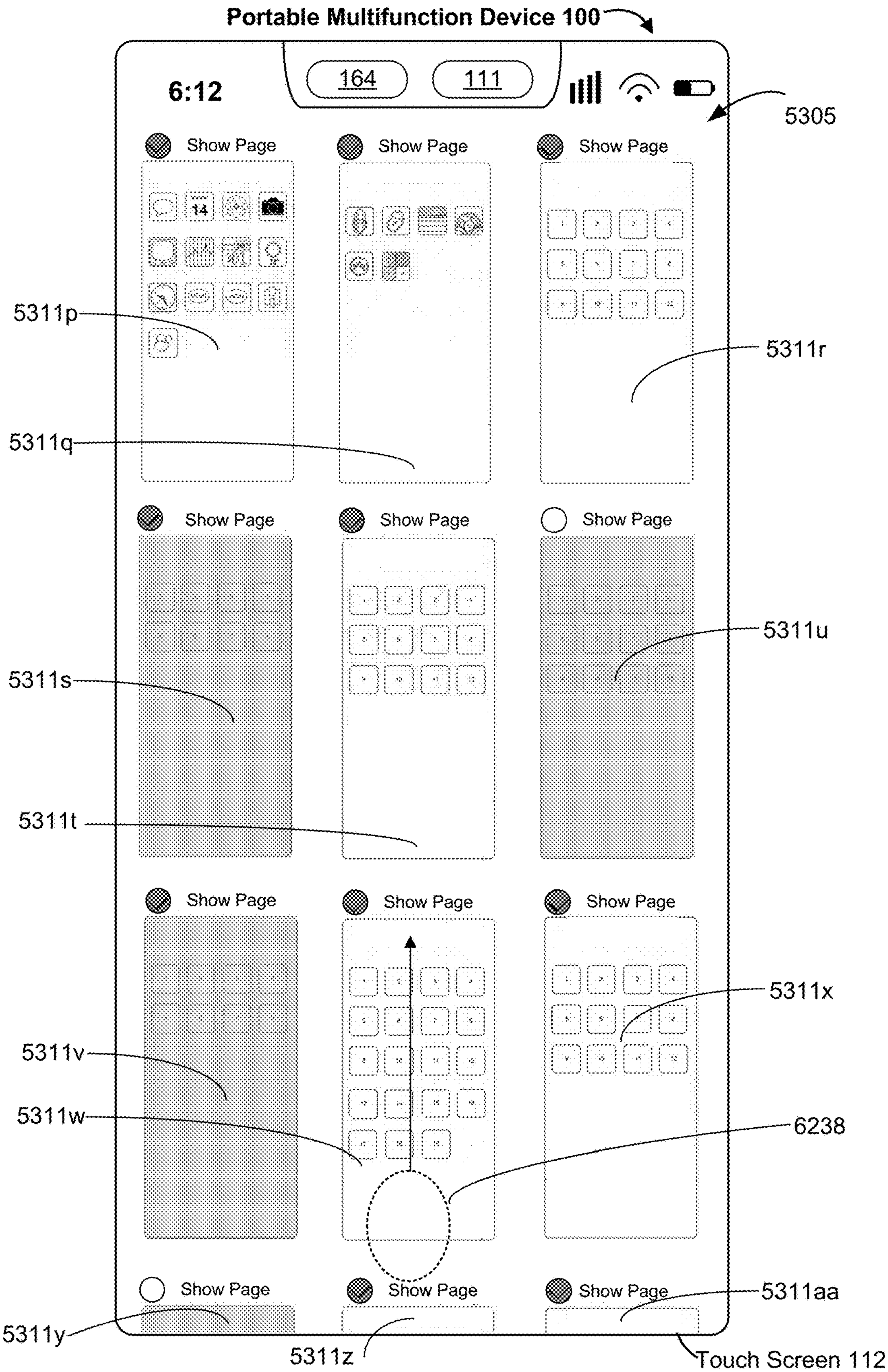
Figure 5F29

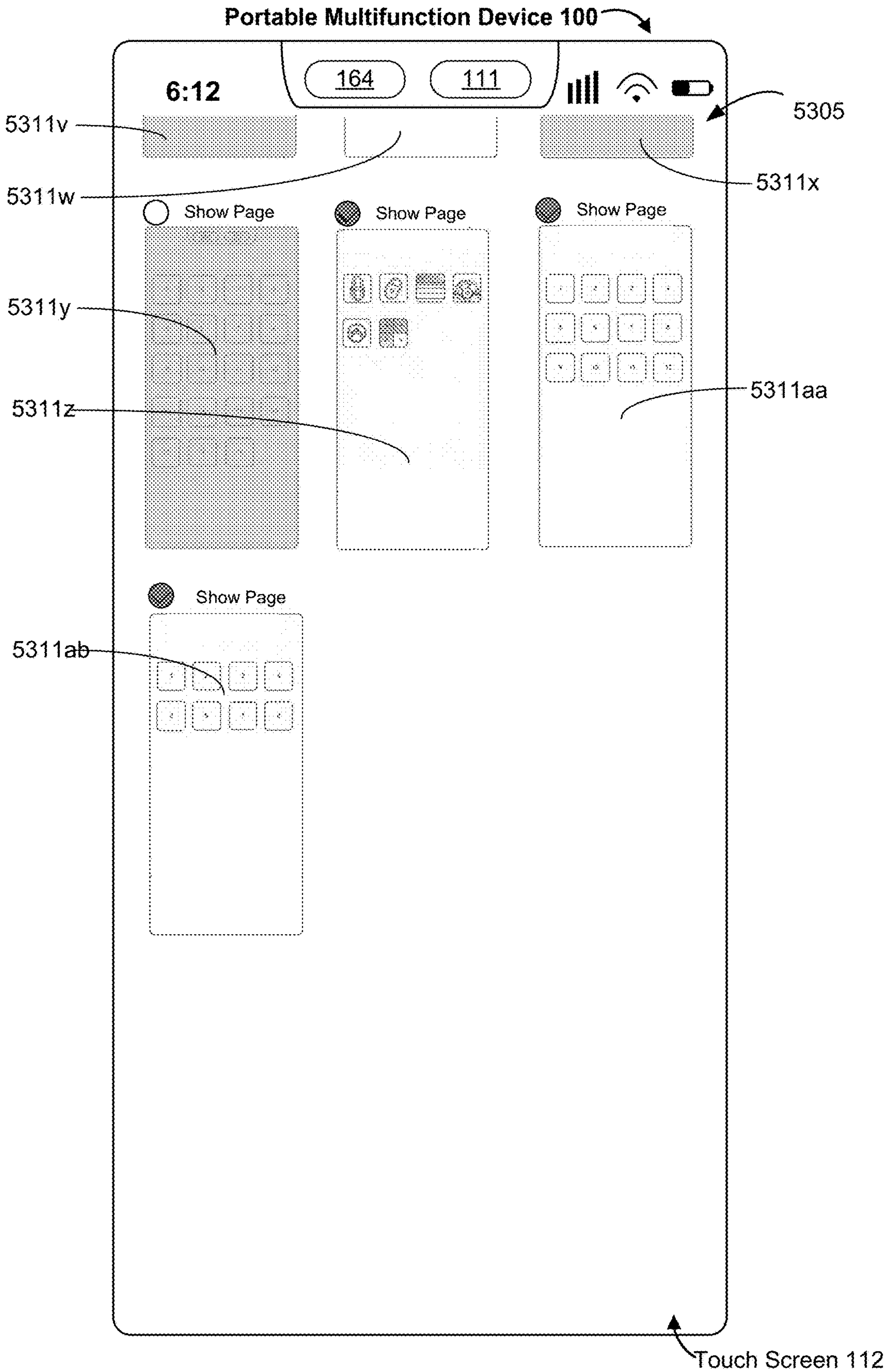
Figure 5F30

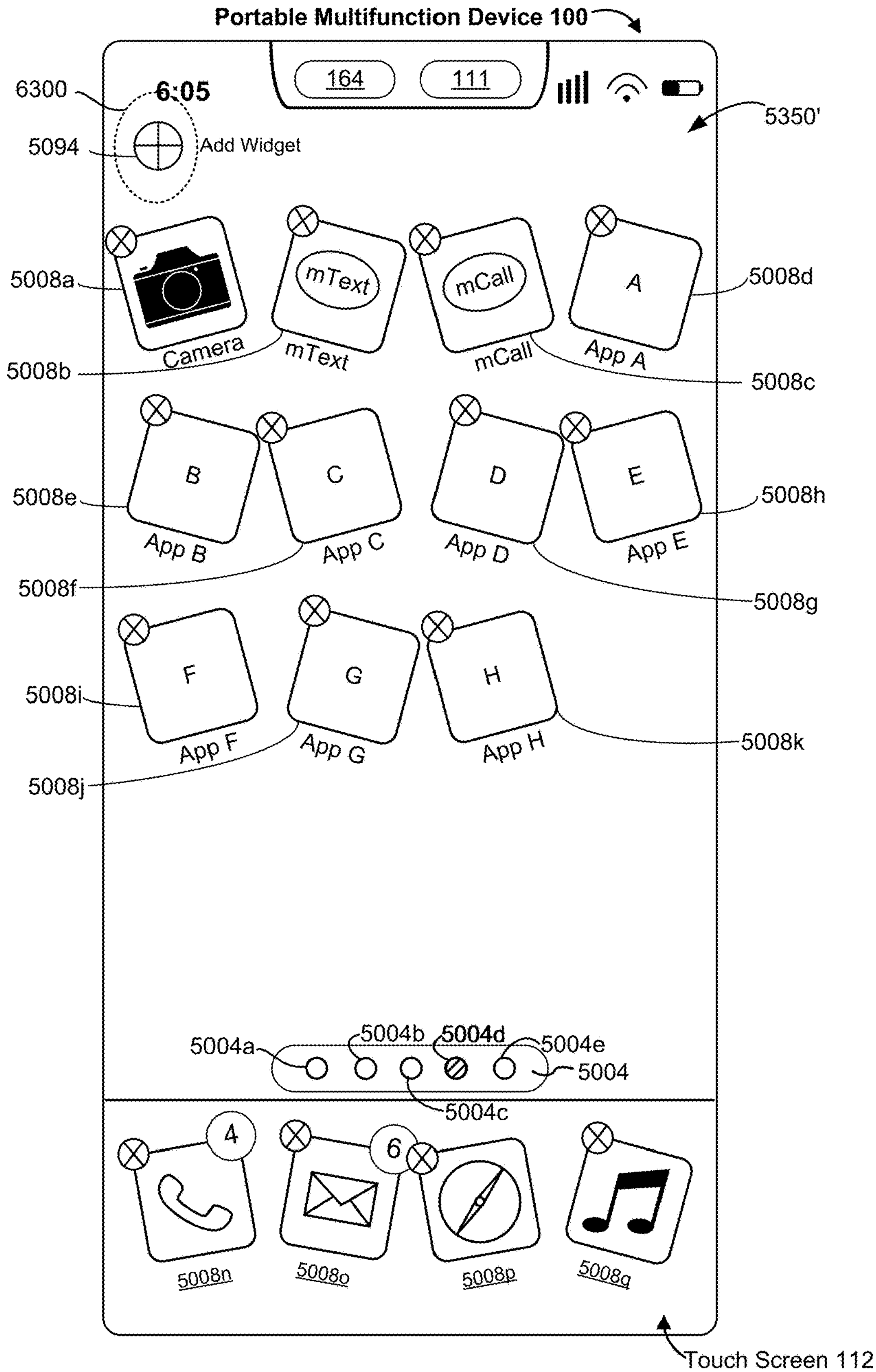
Figure 5G1

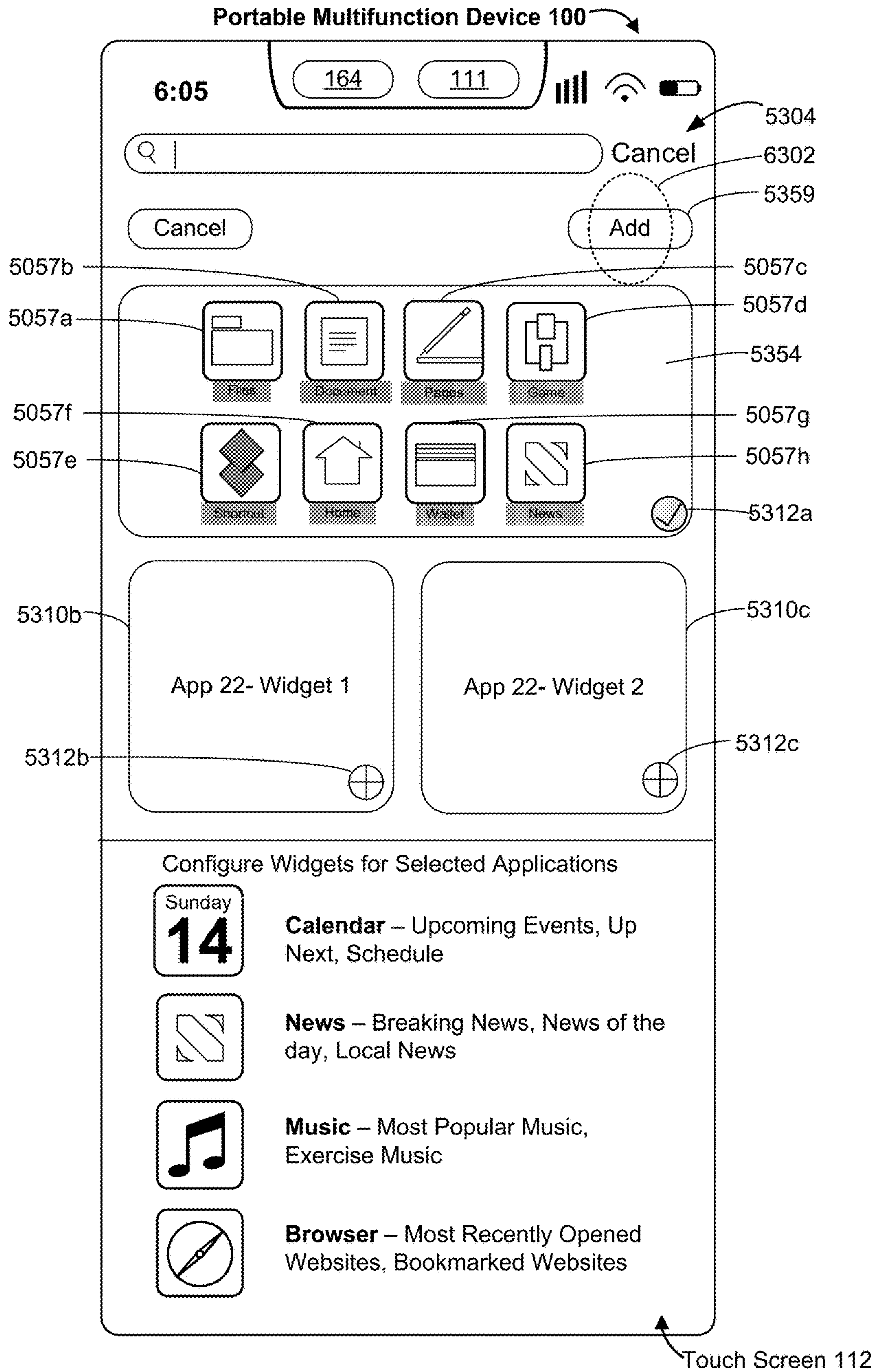
Figure 5G2

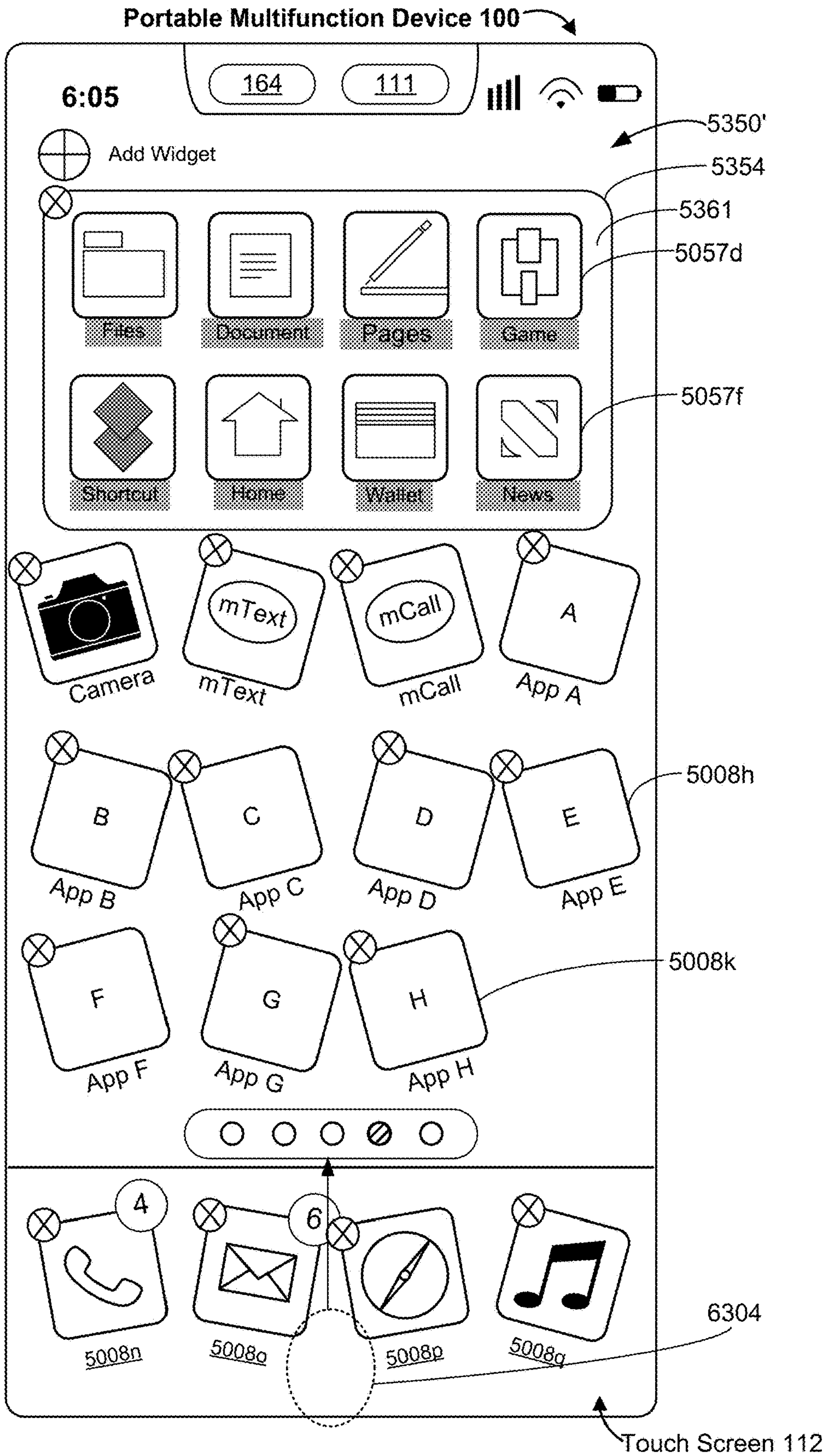
Figure 5G3

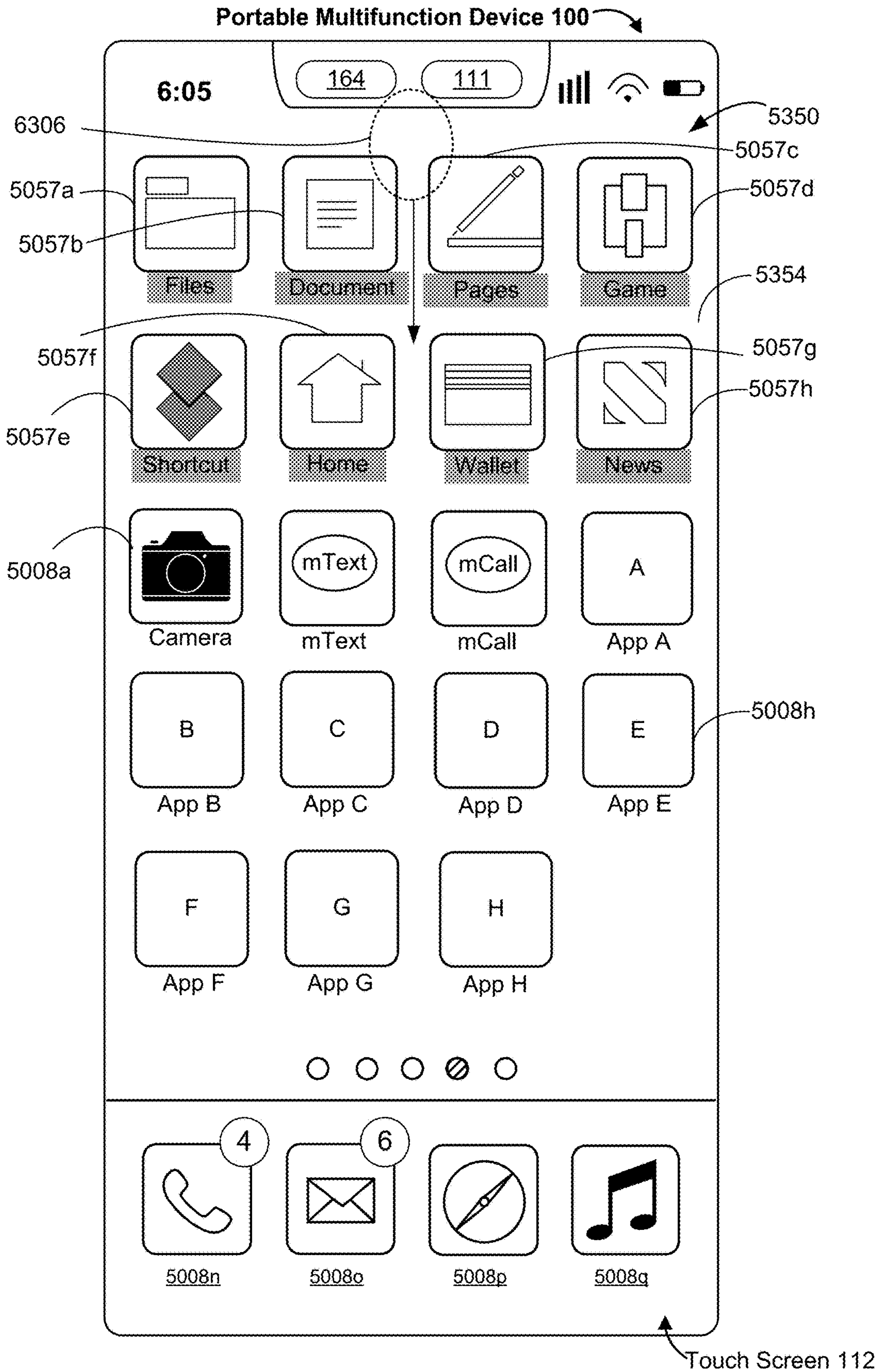
Figure 5G4

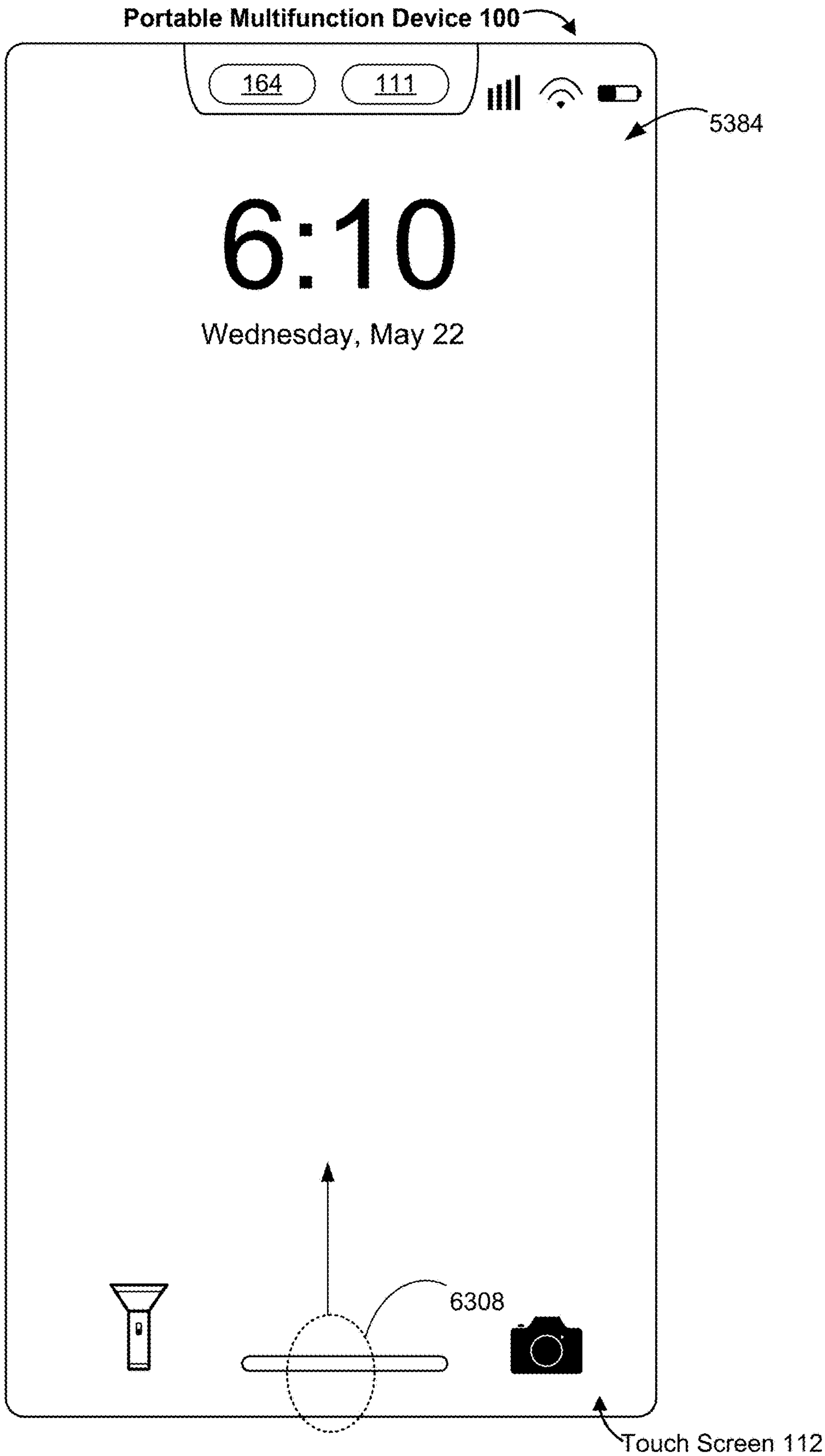
Figure 5G5

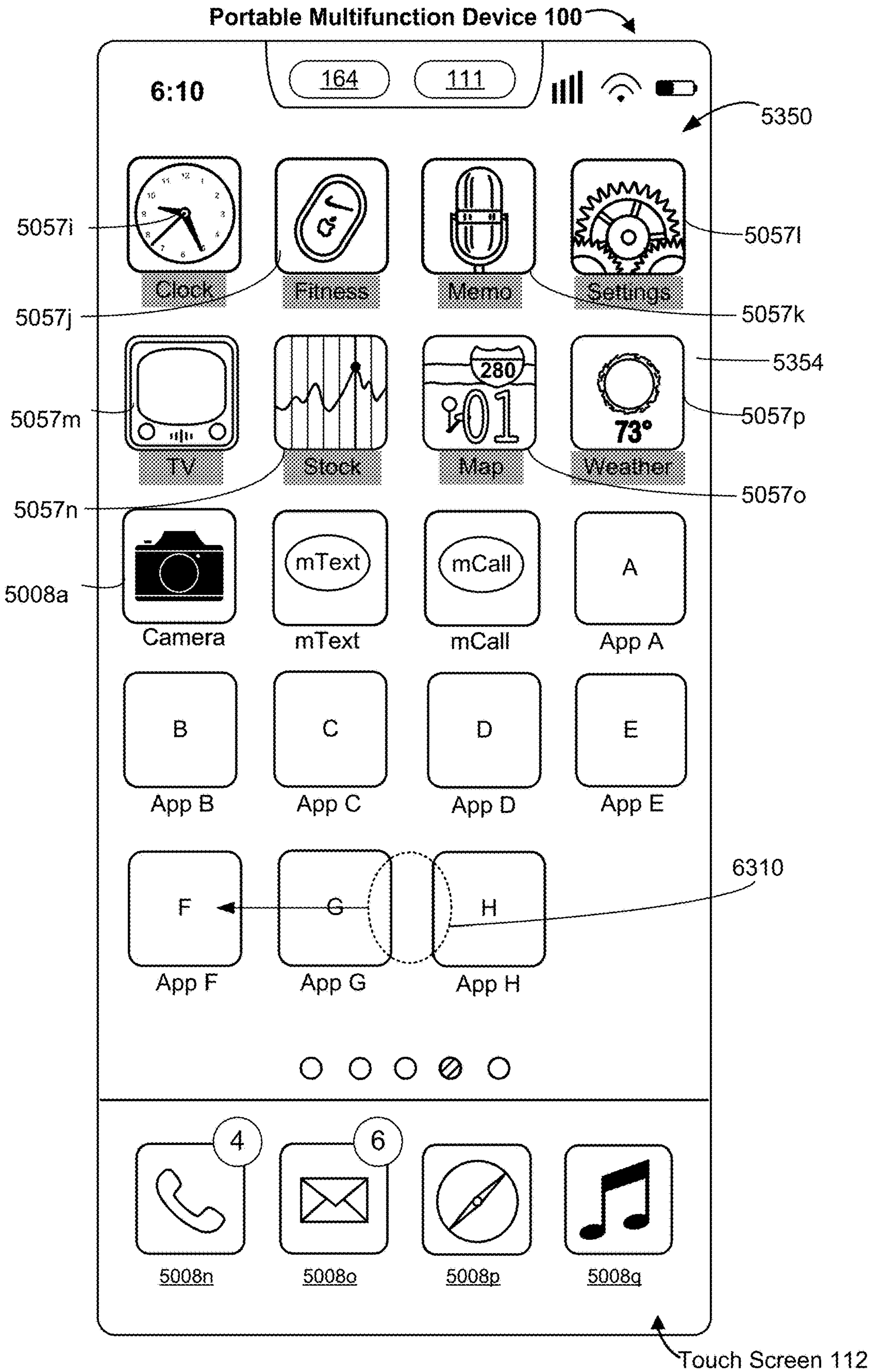
Figure 5G6

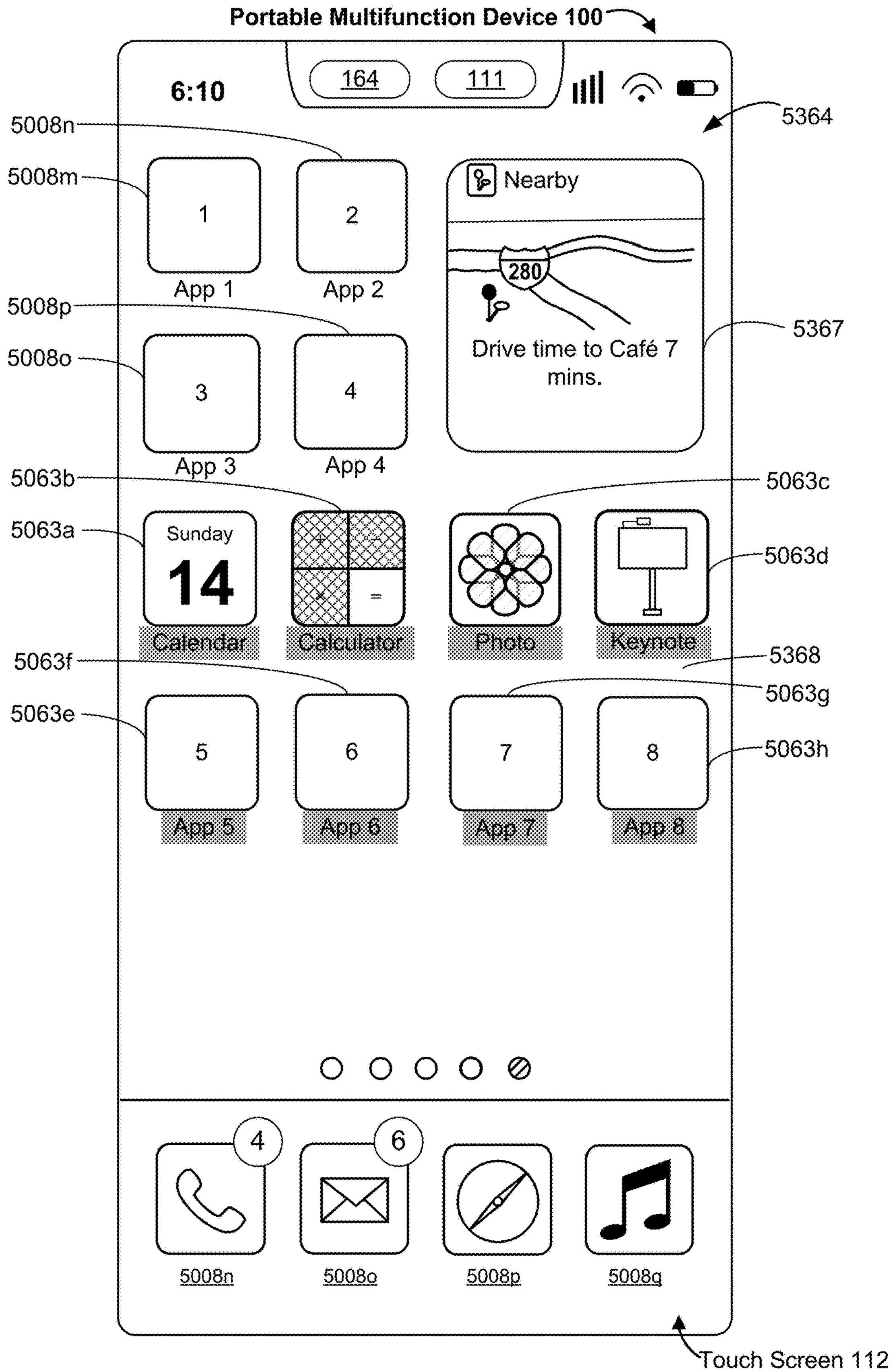
Figure 5G7

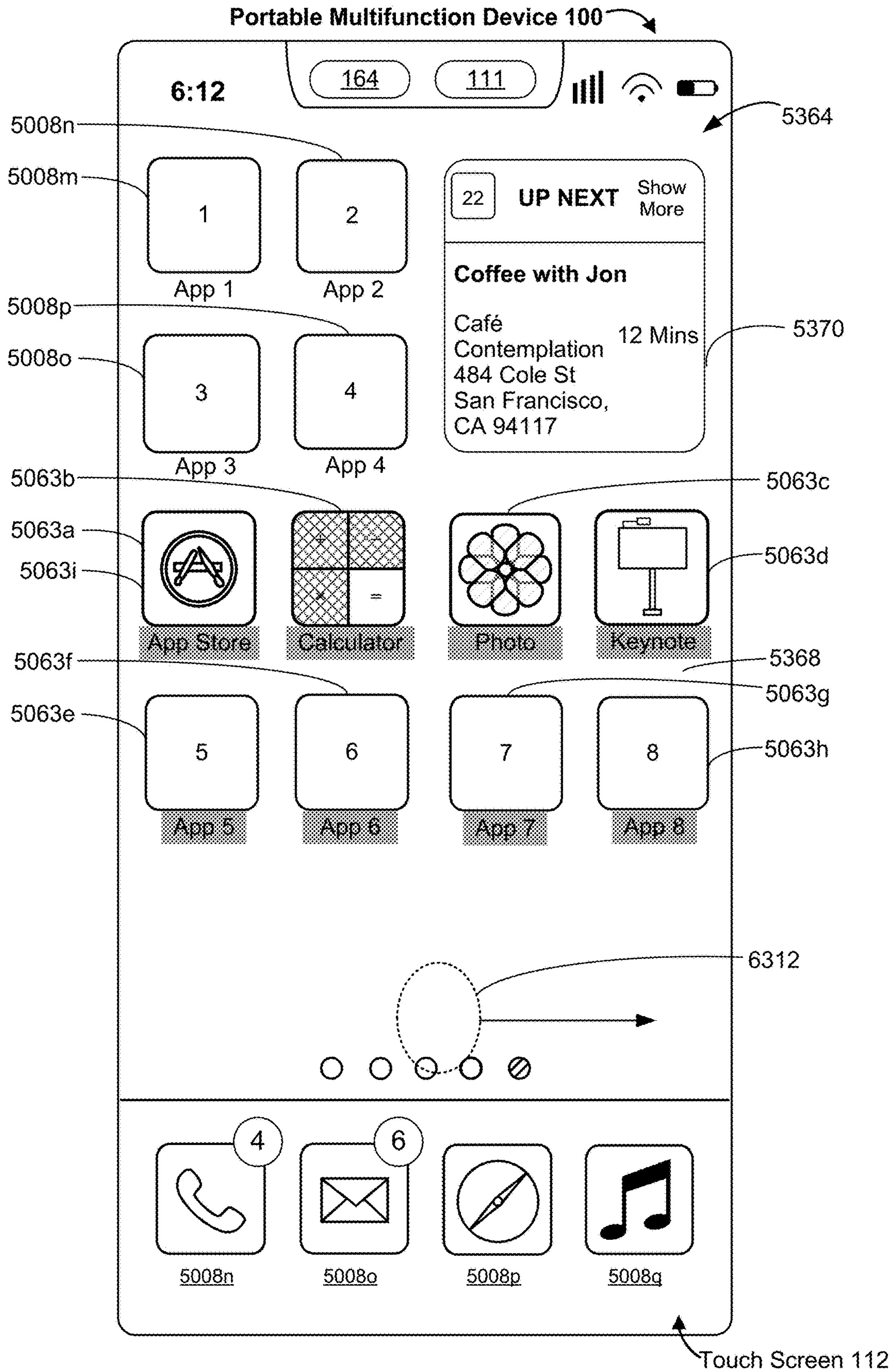
Figure 5G8

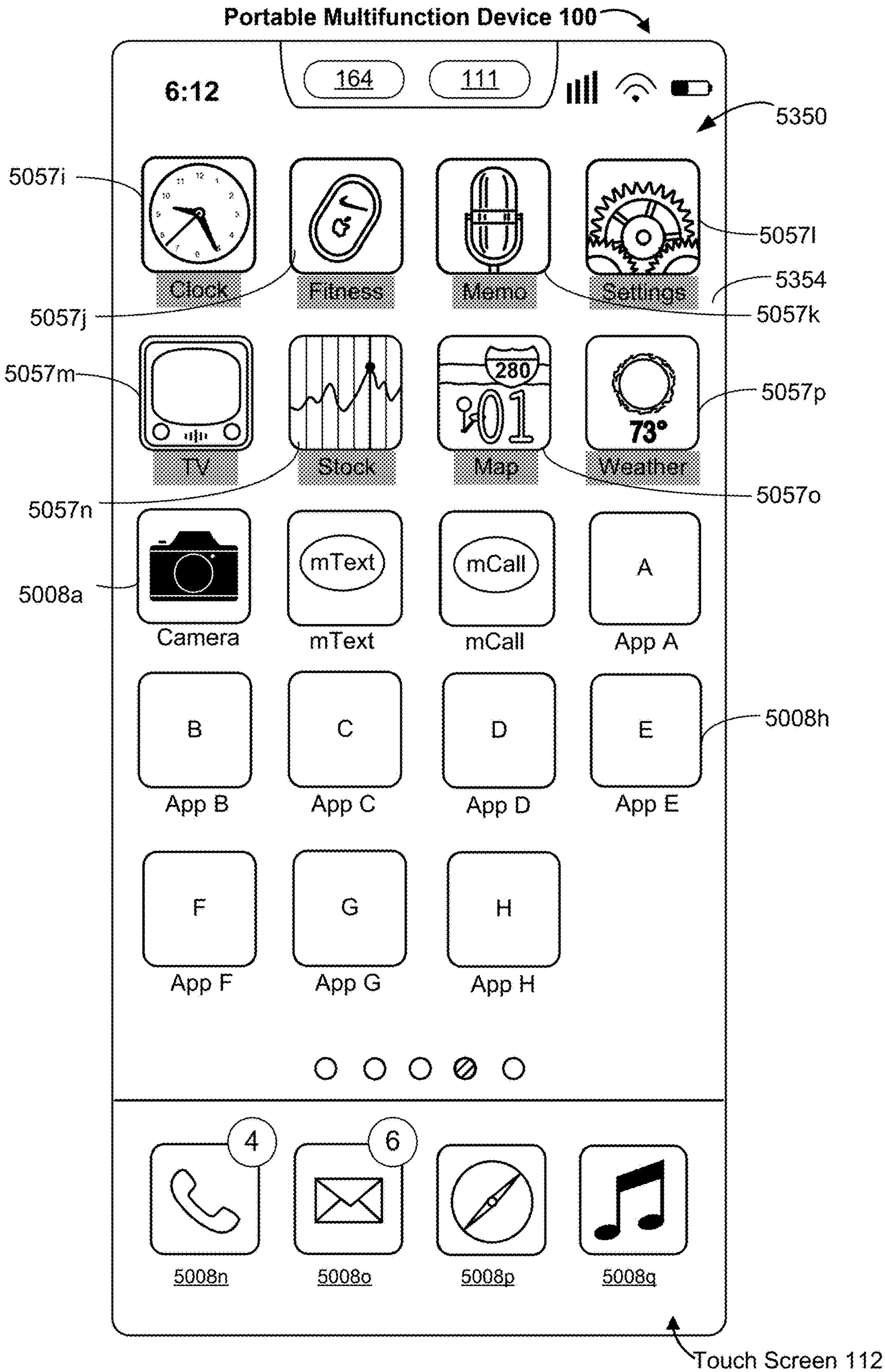
Figure 5G9

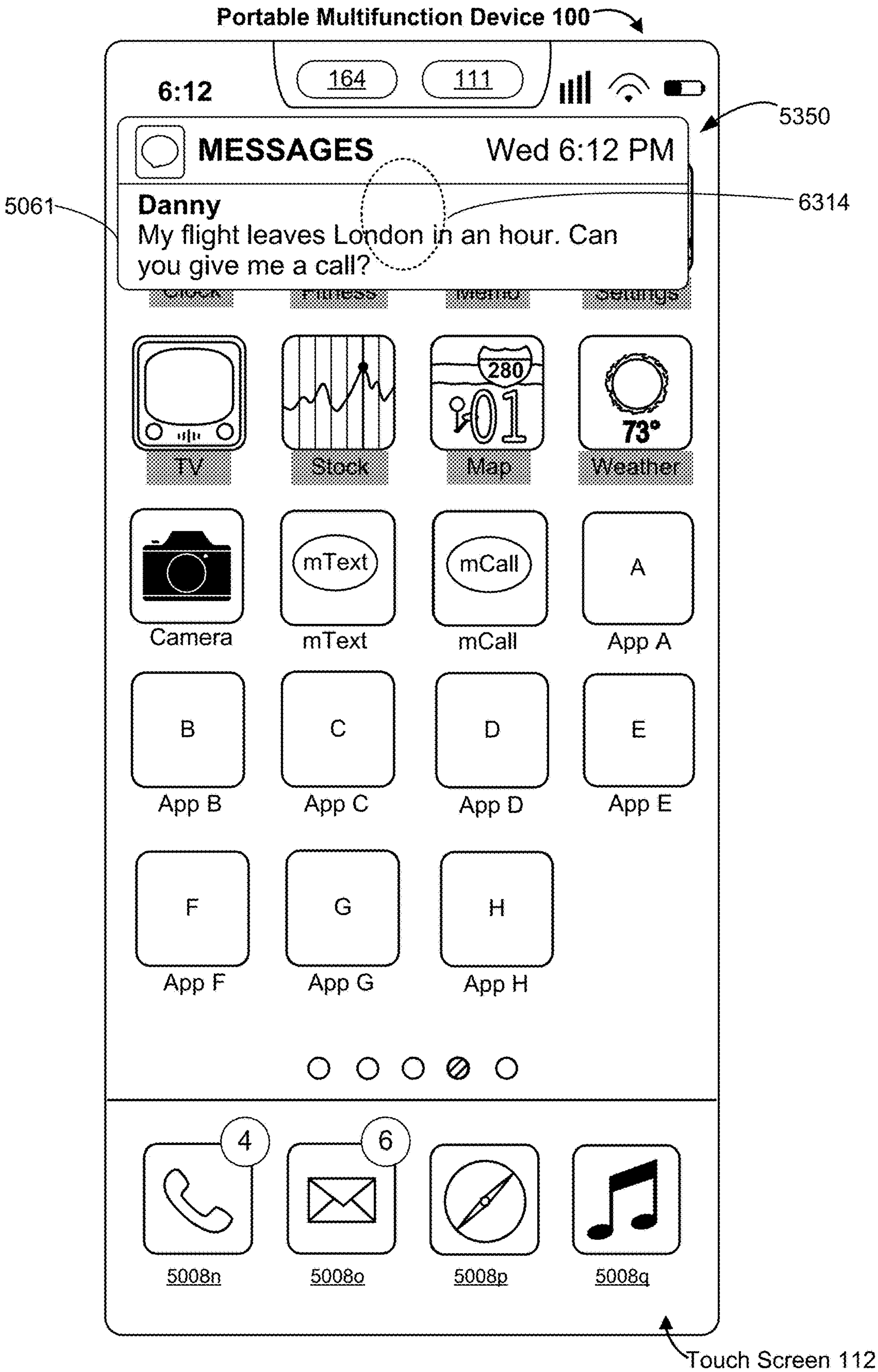
Figure 5G10

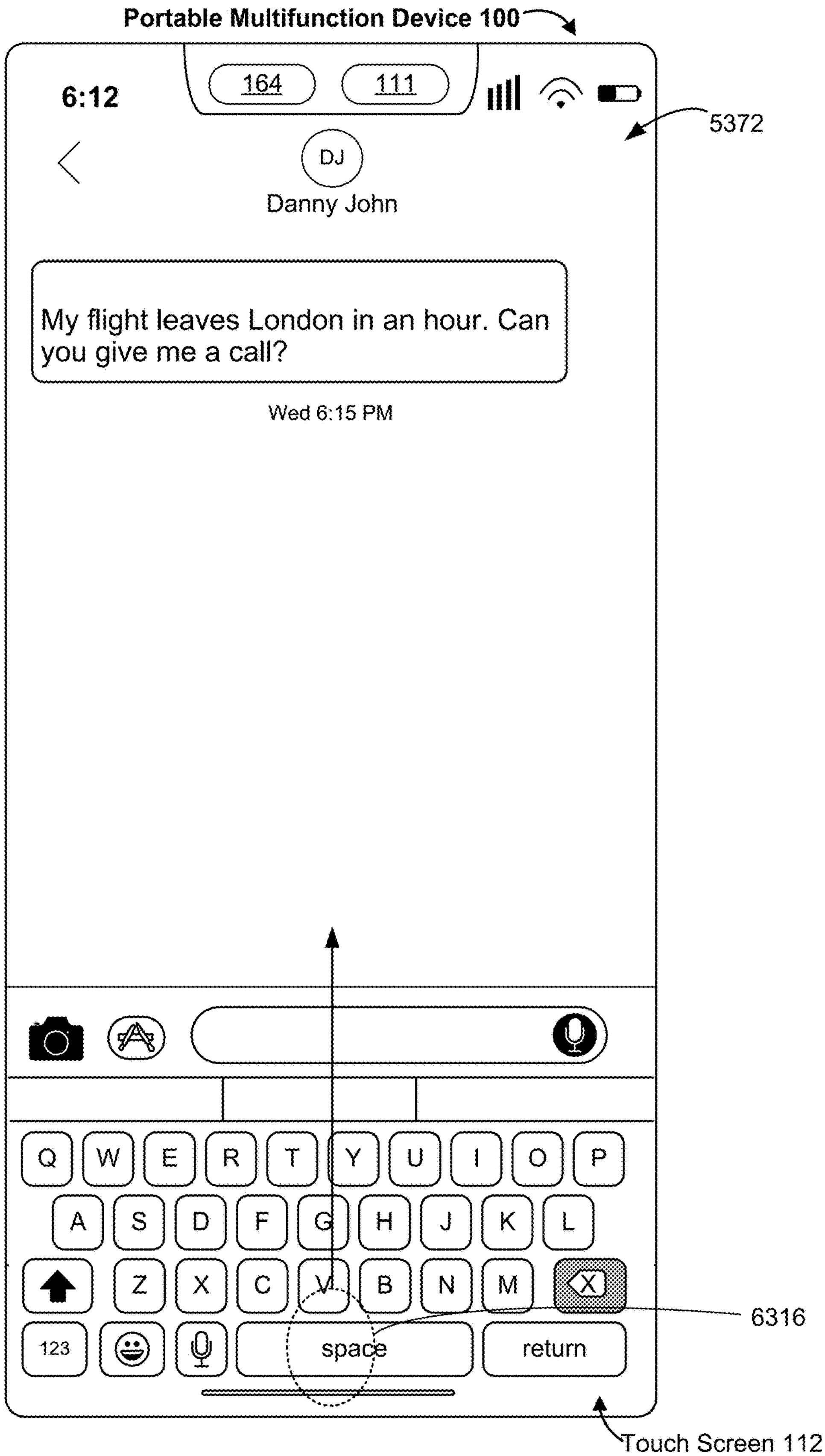
Figure 5G11

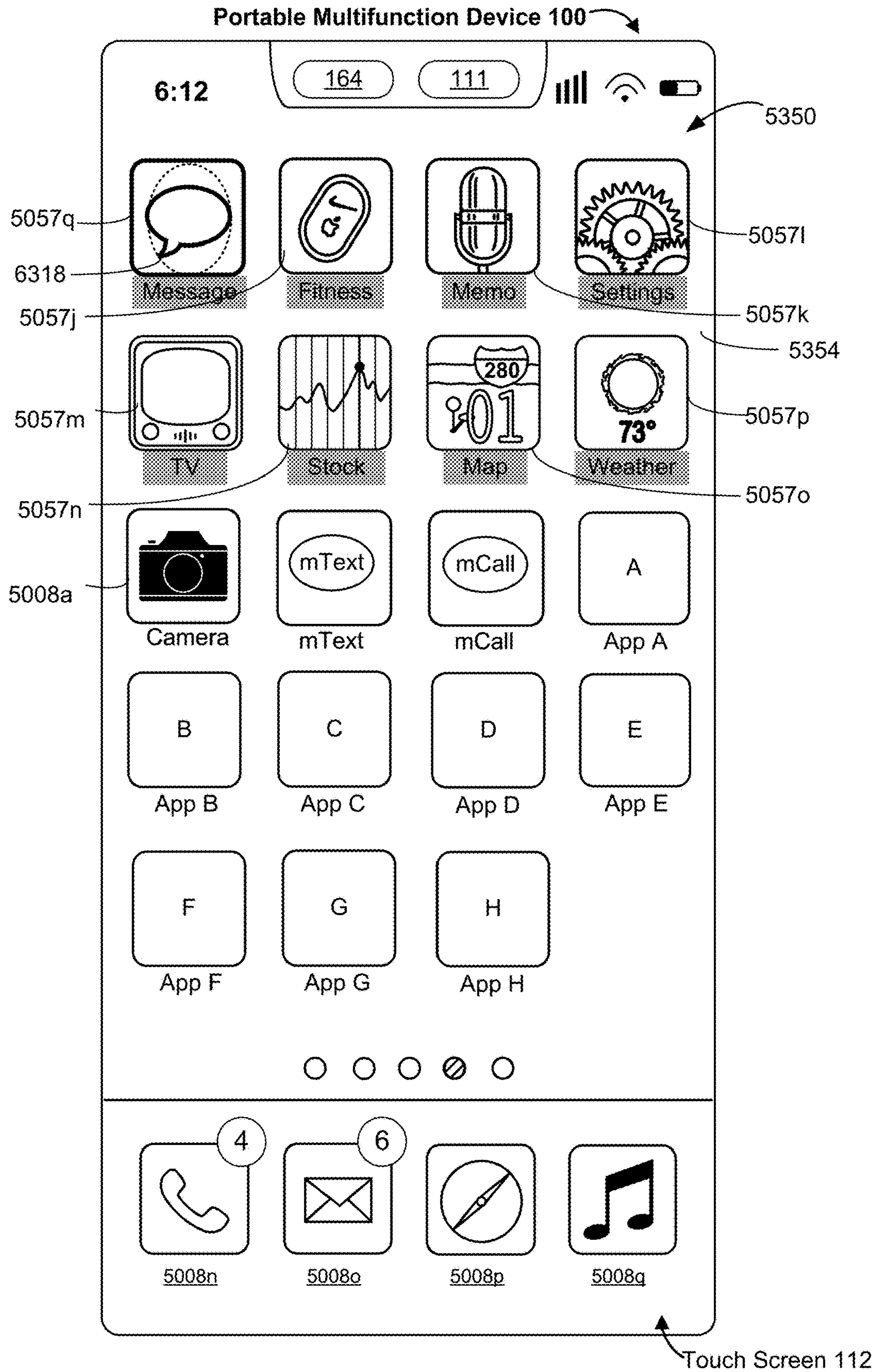
Figure 5G12

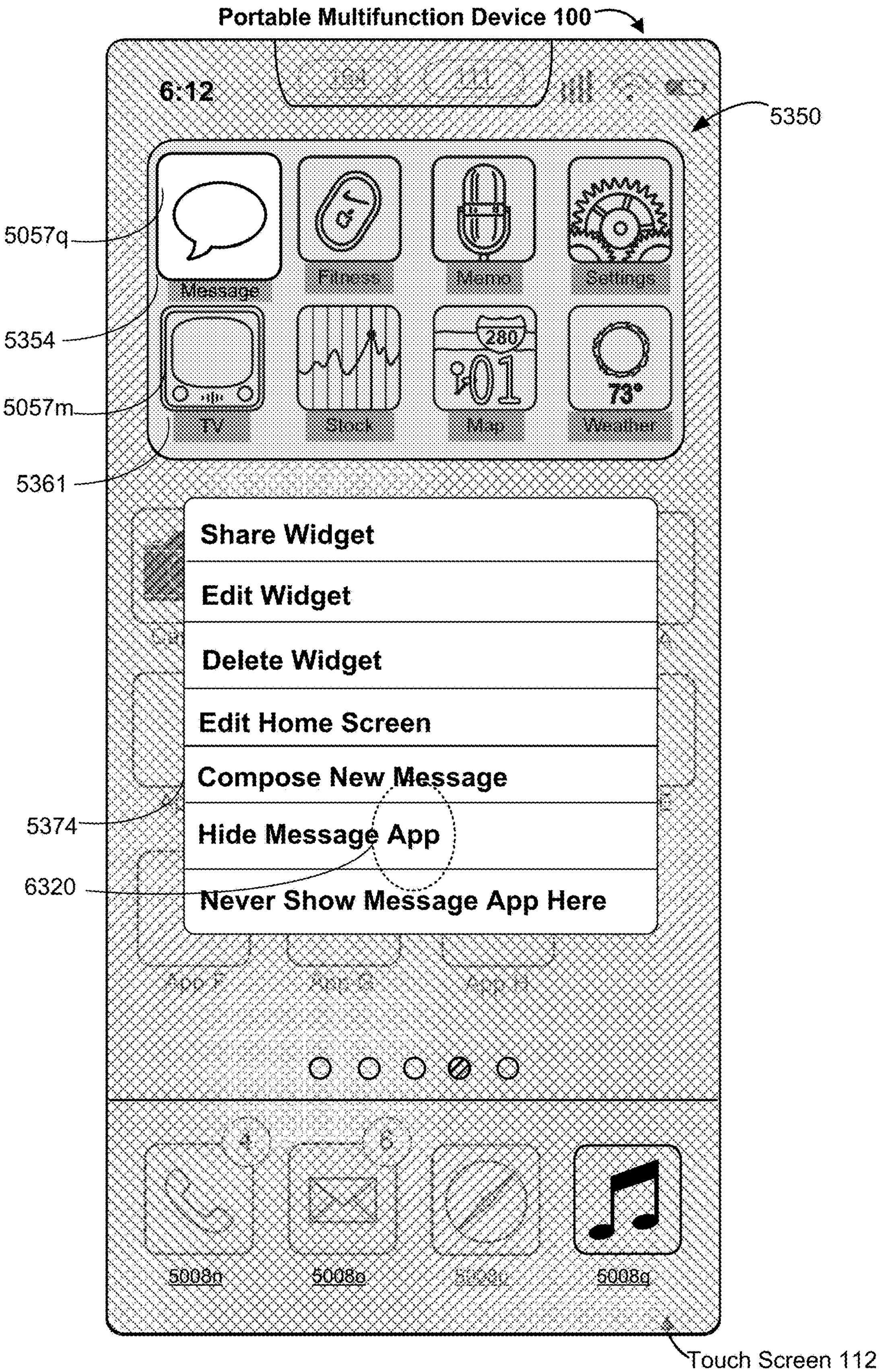
Figure 5G13

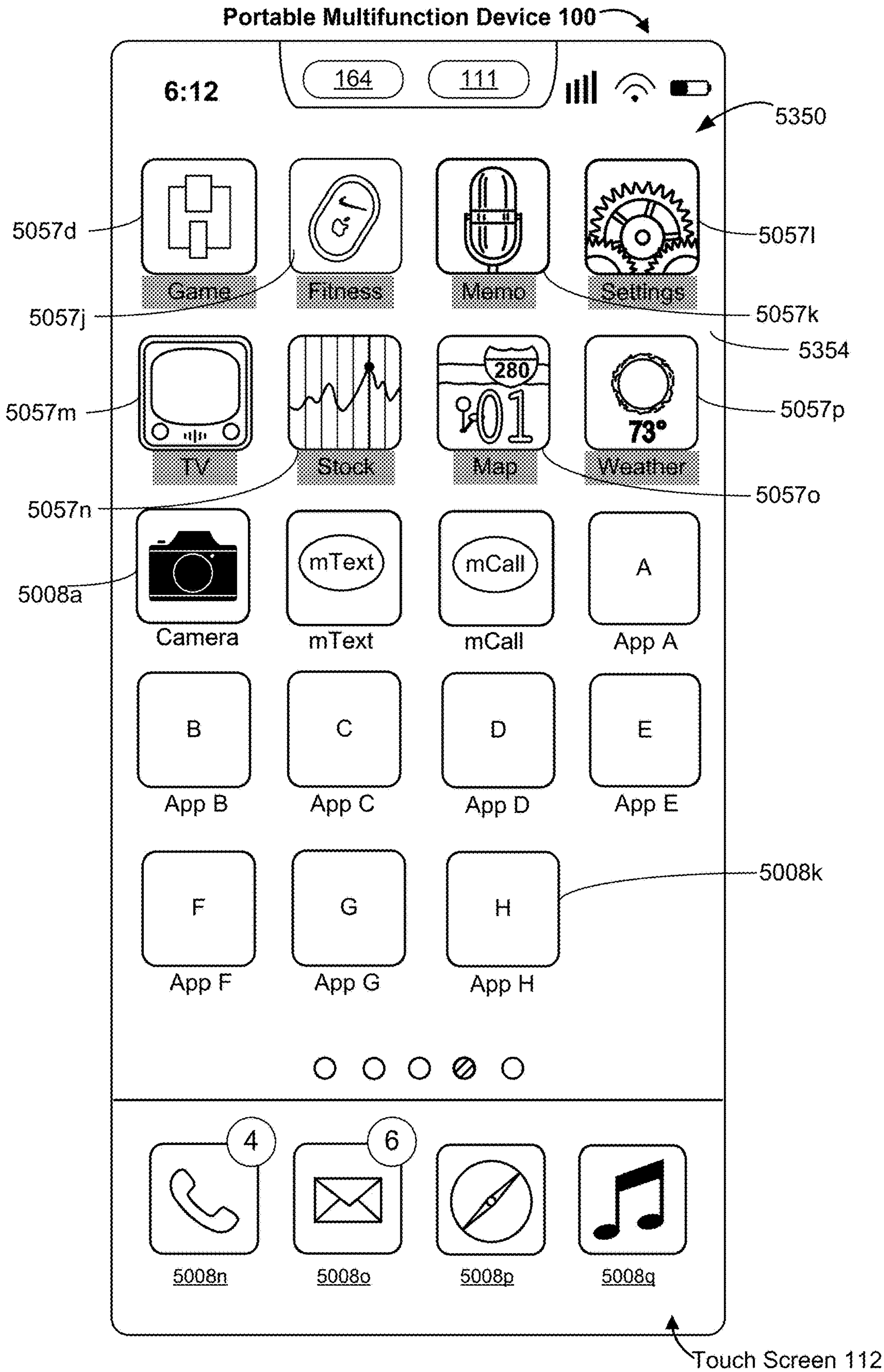
Figure 5G14

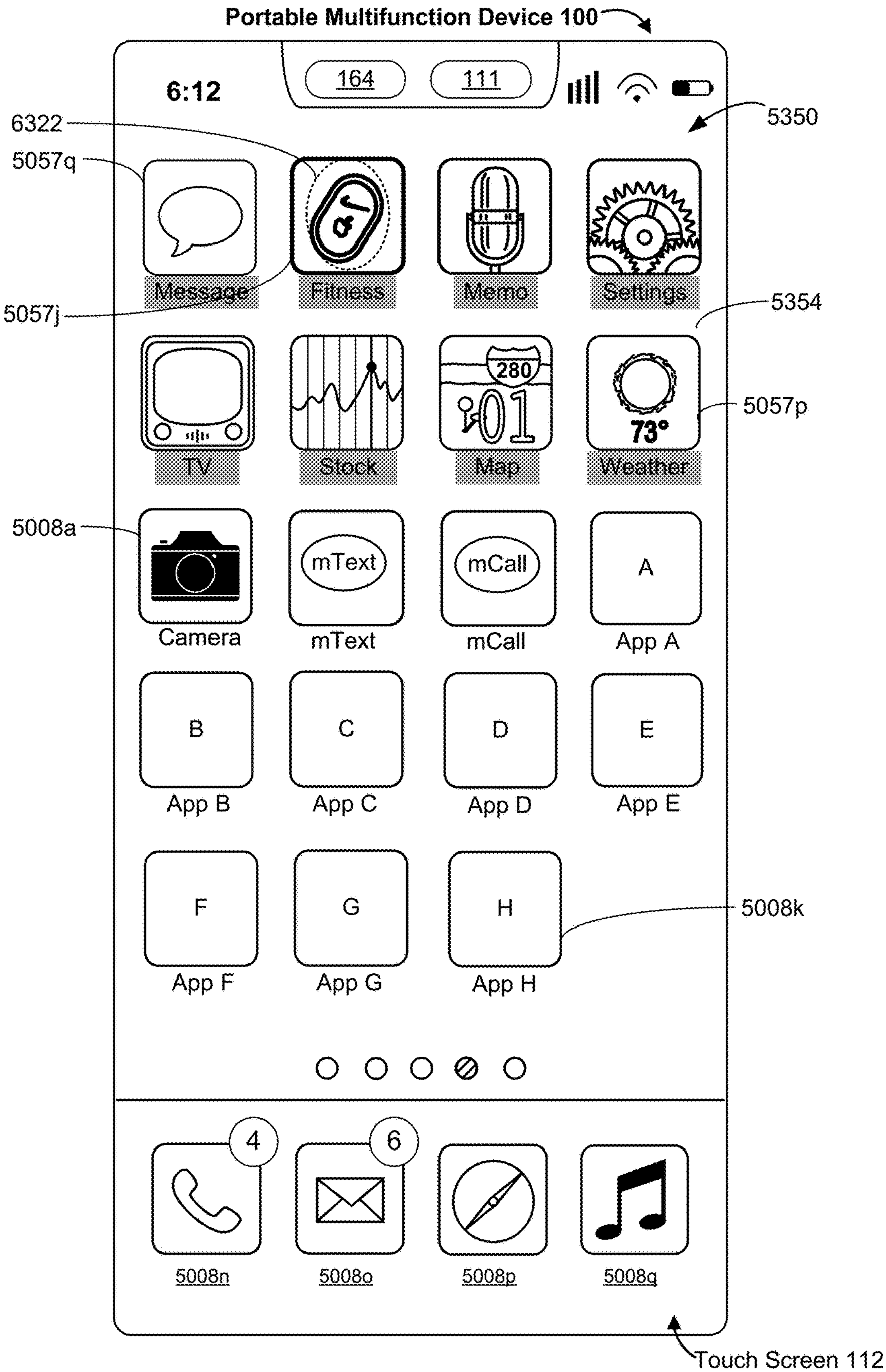
Figure 5G15

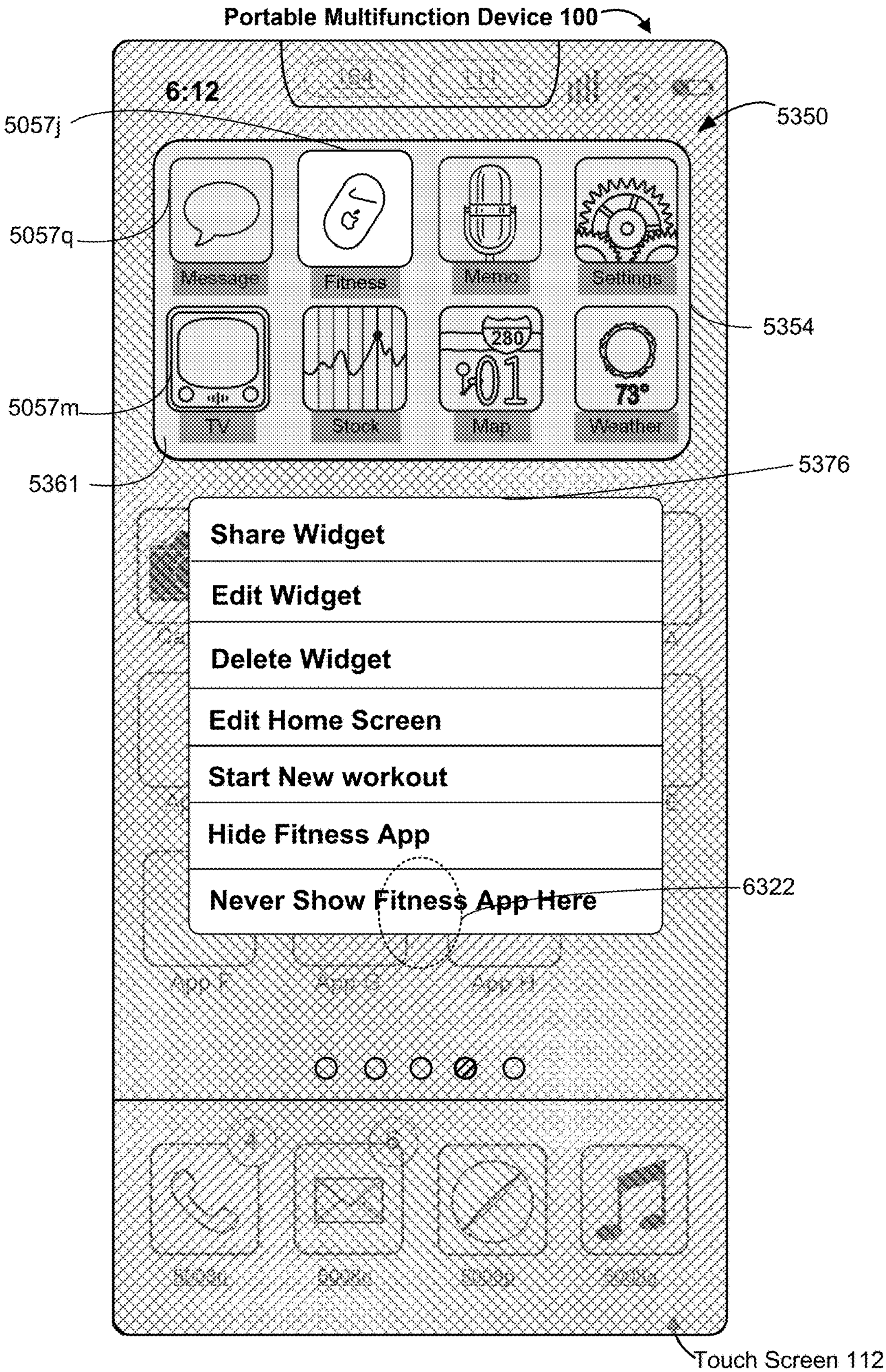
Figure 5G16

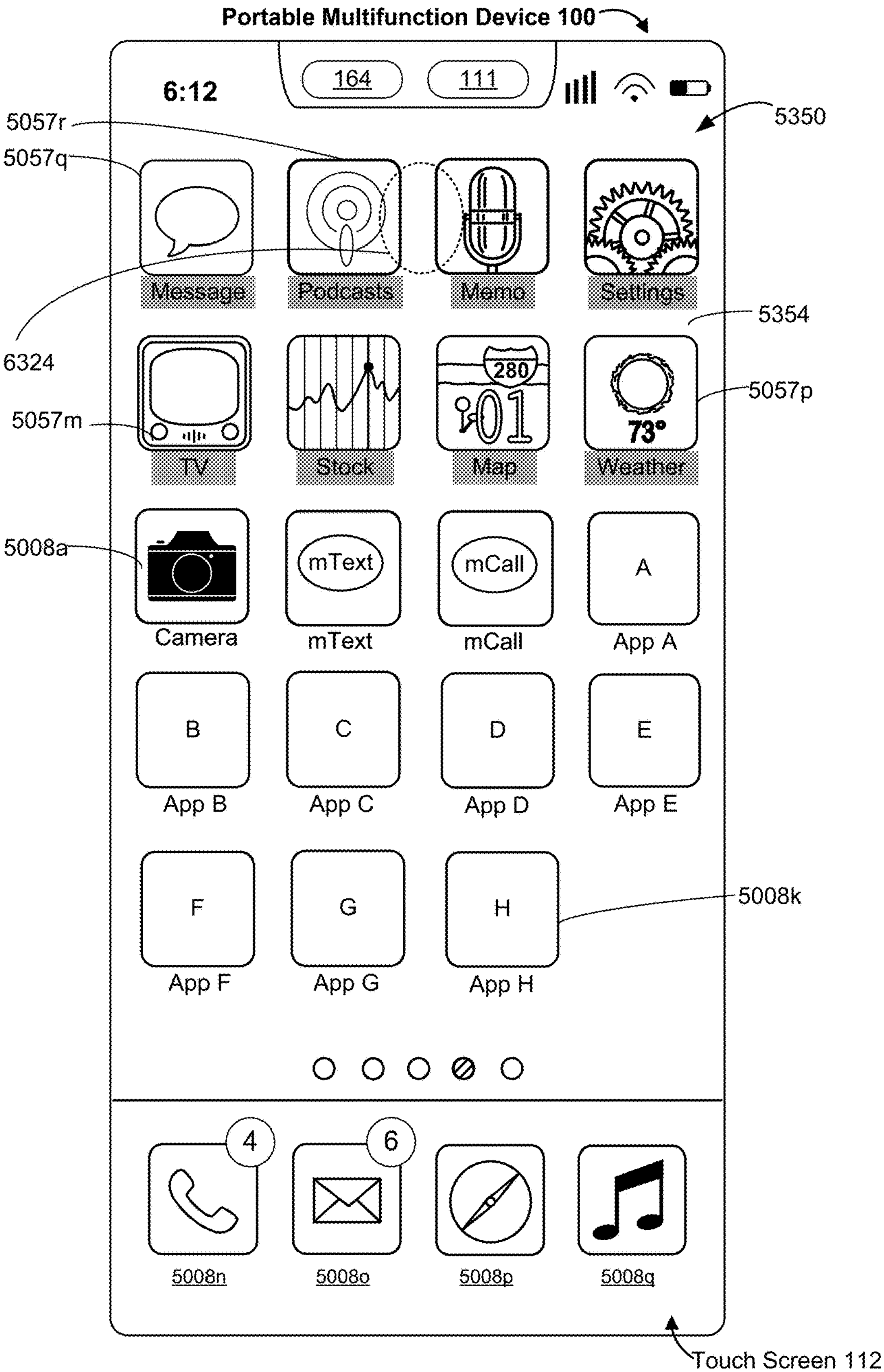
Figure 5G17

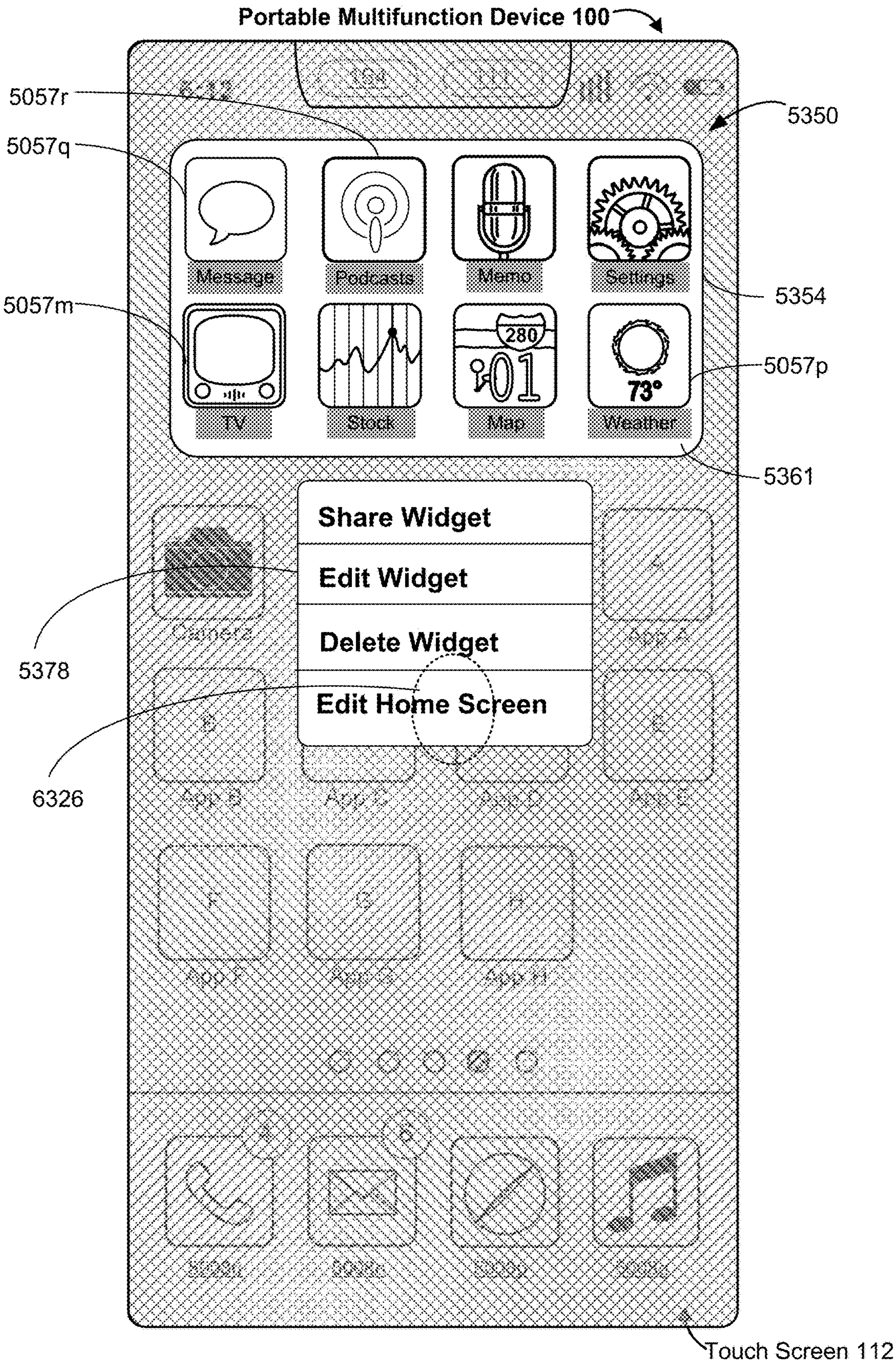
Figure 5G18

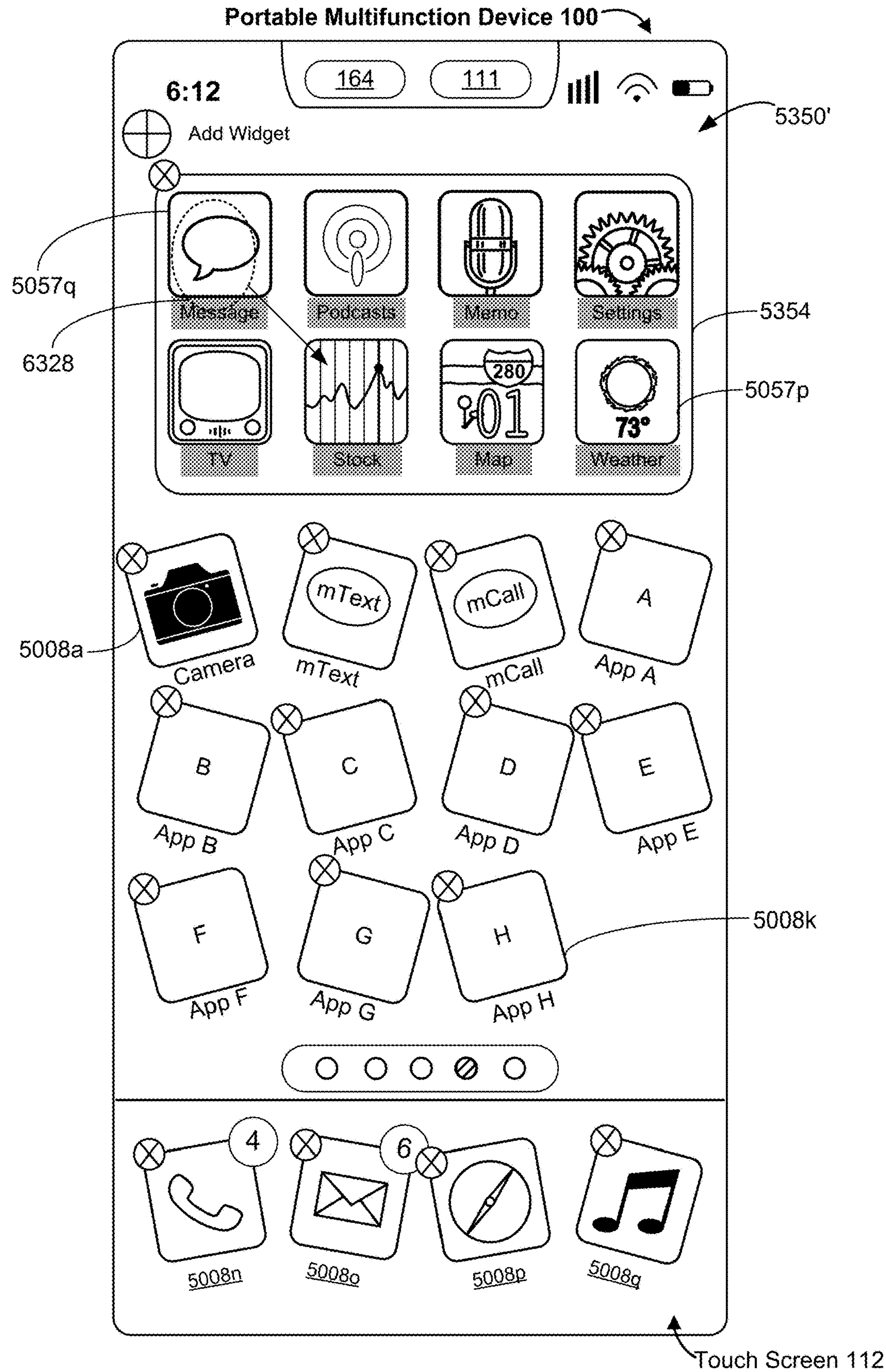
Figure 5G19

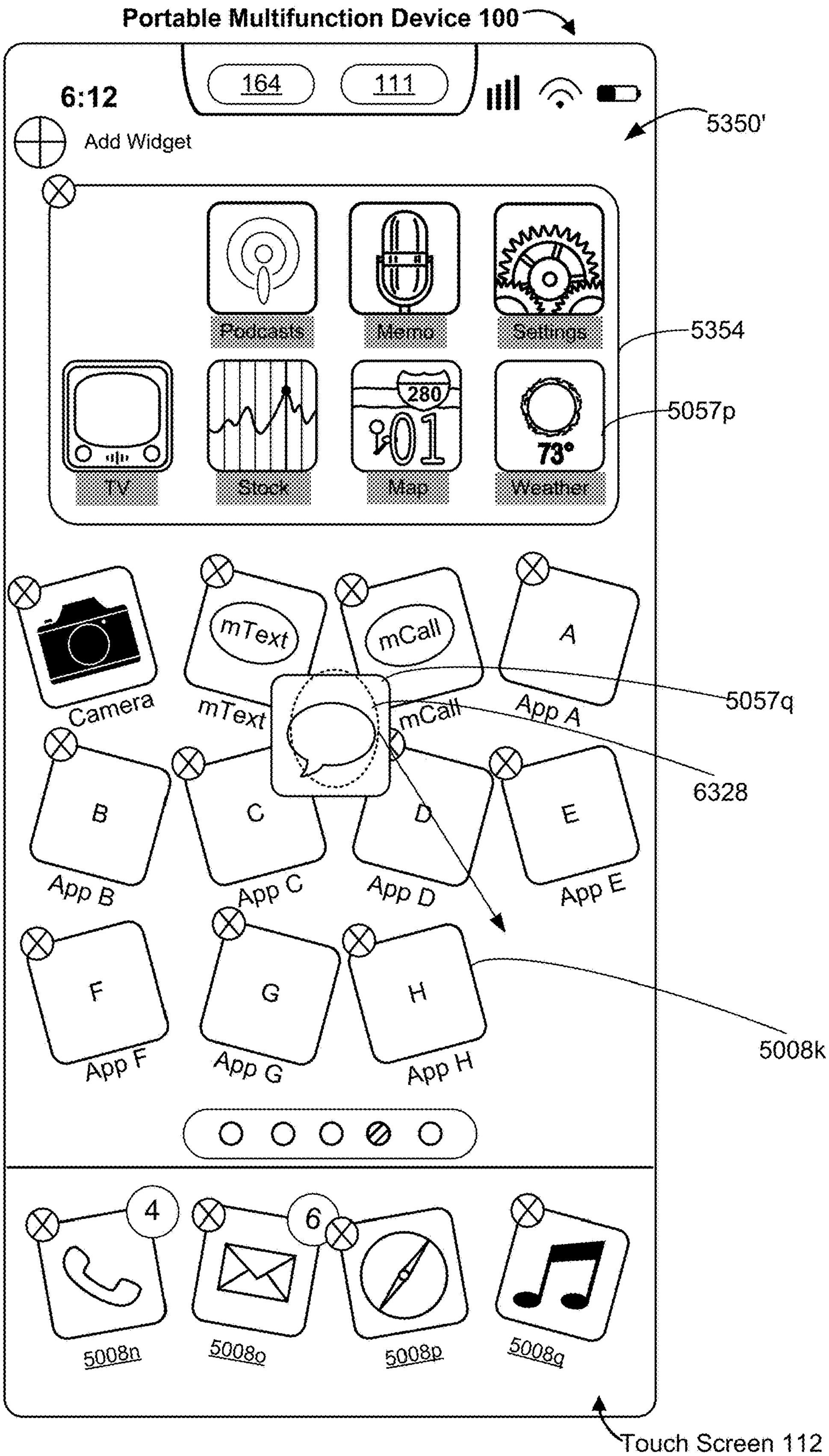
Figure 5G20

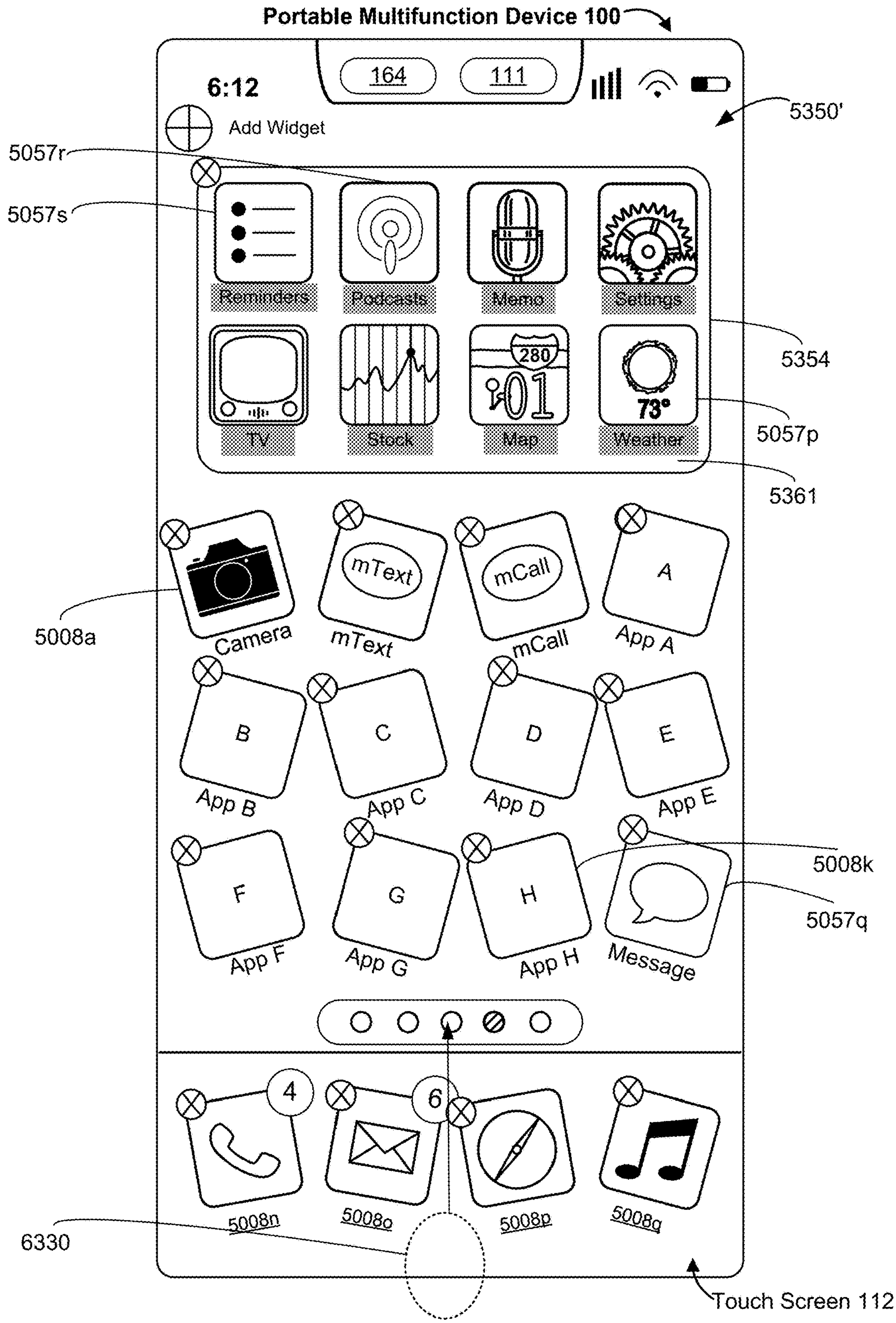
Figure 5G21

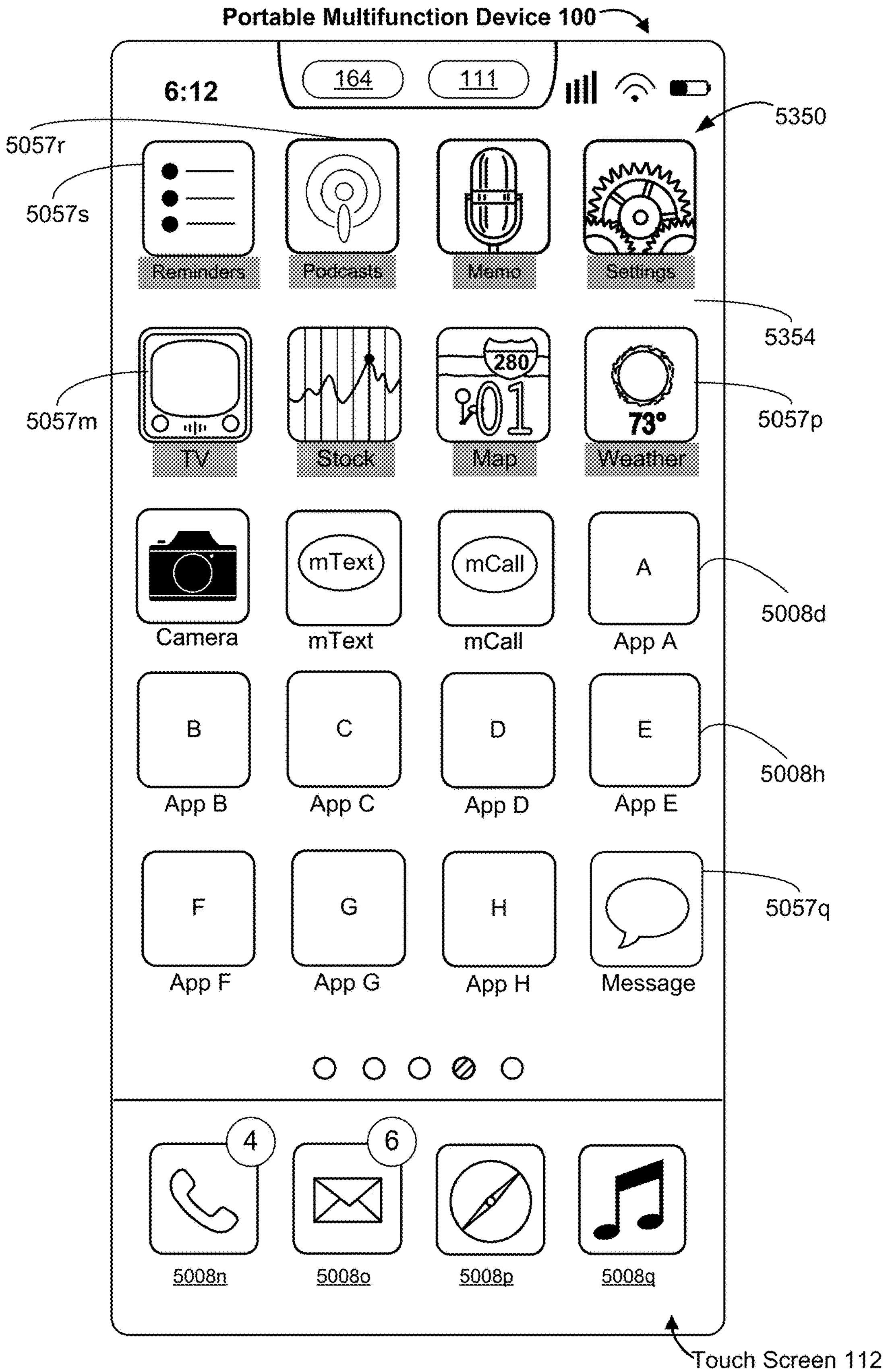
Figure 5G22

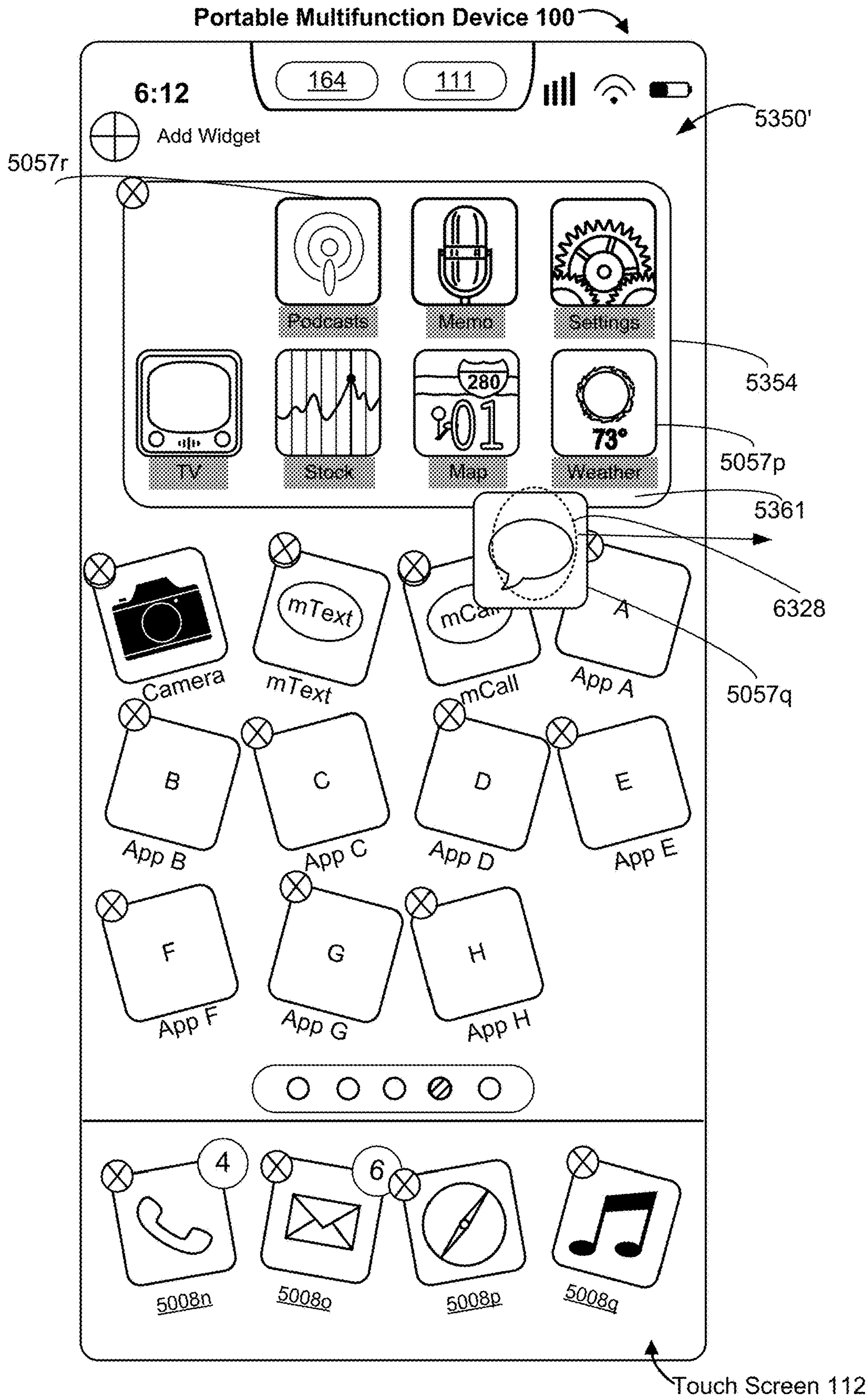
Figure 5G23

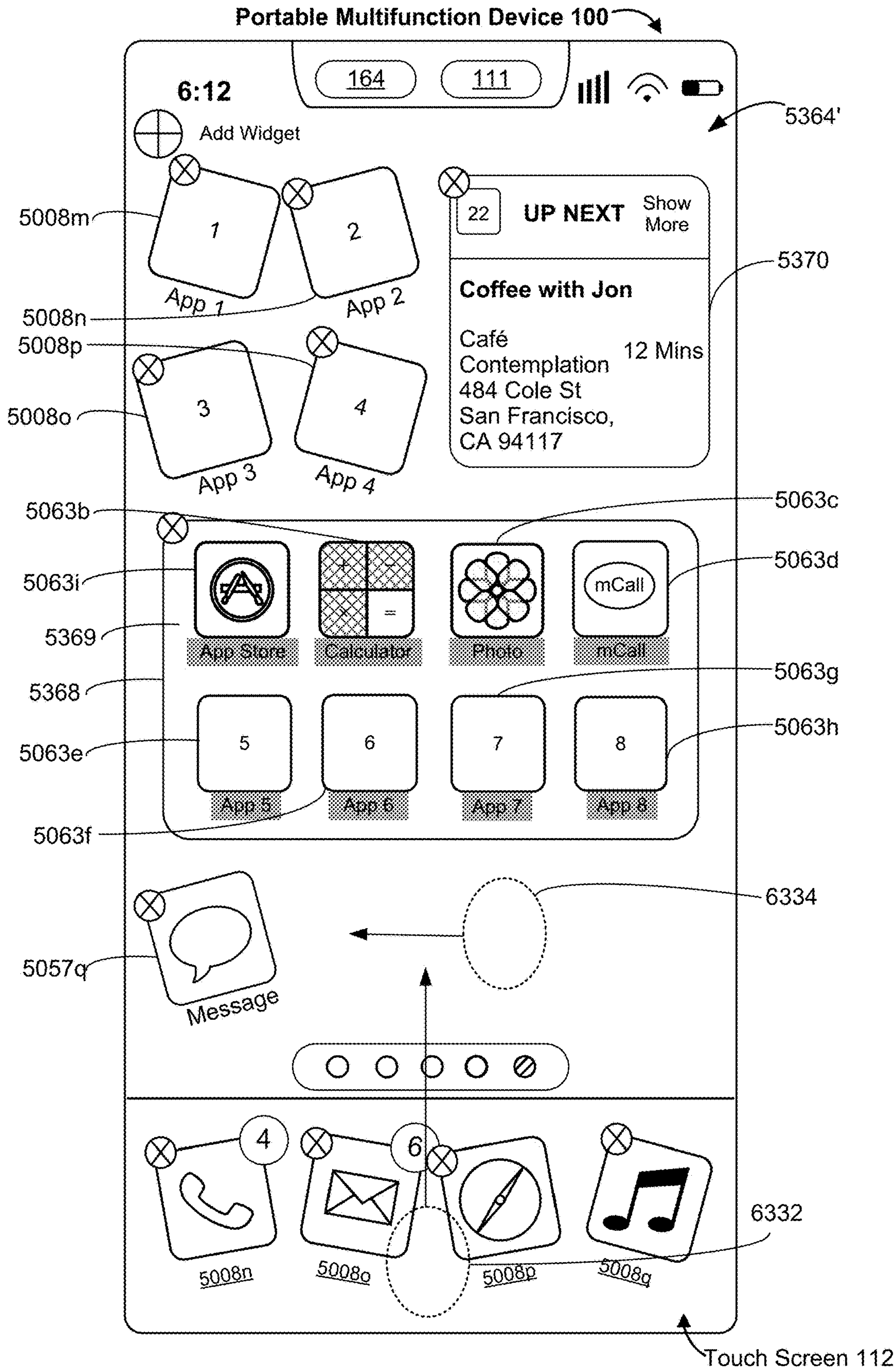
Figure 5G24

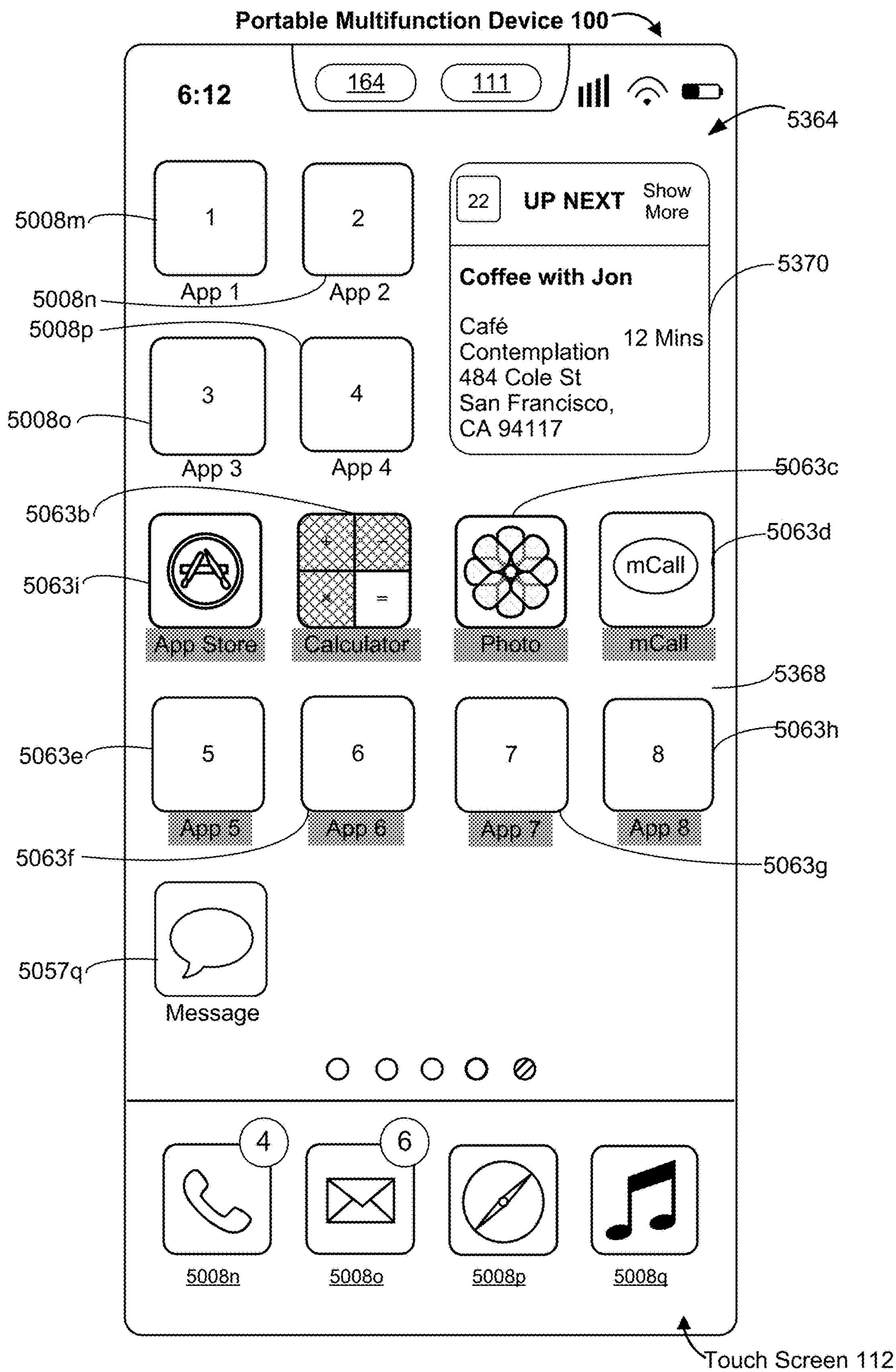
Figure 5G25

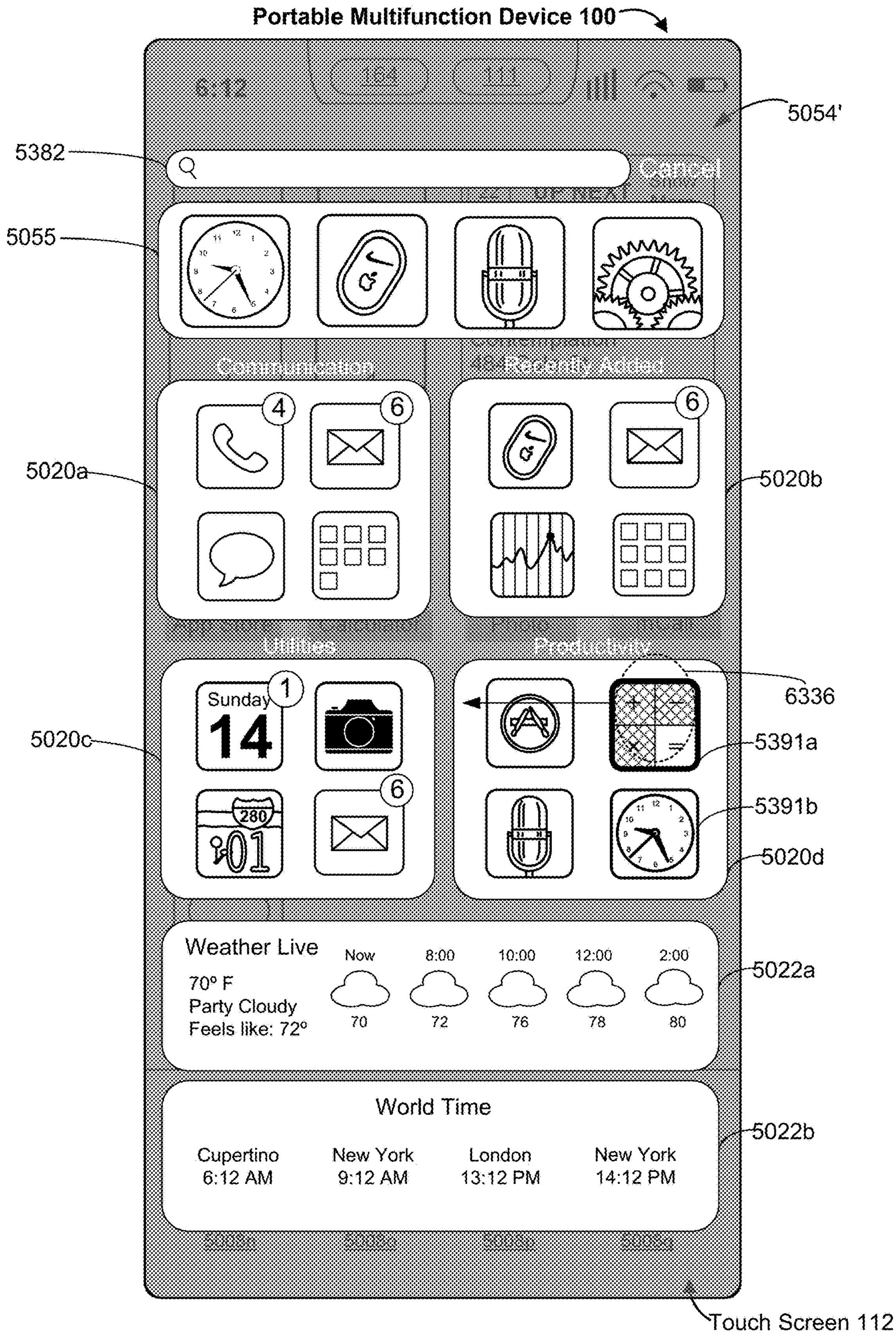
Figure 5G26

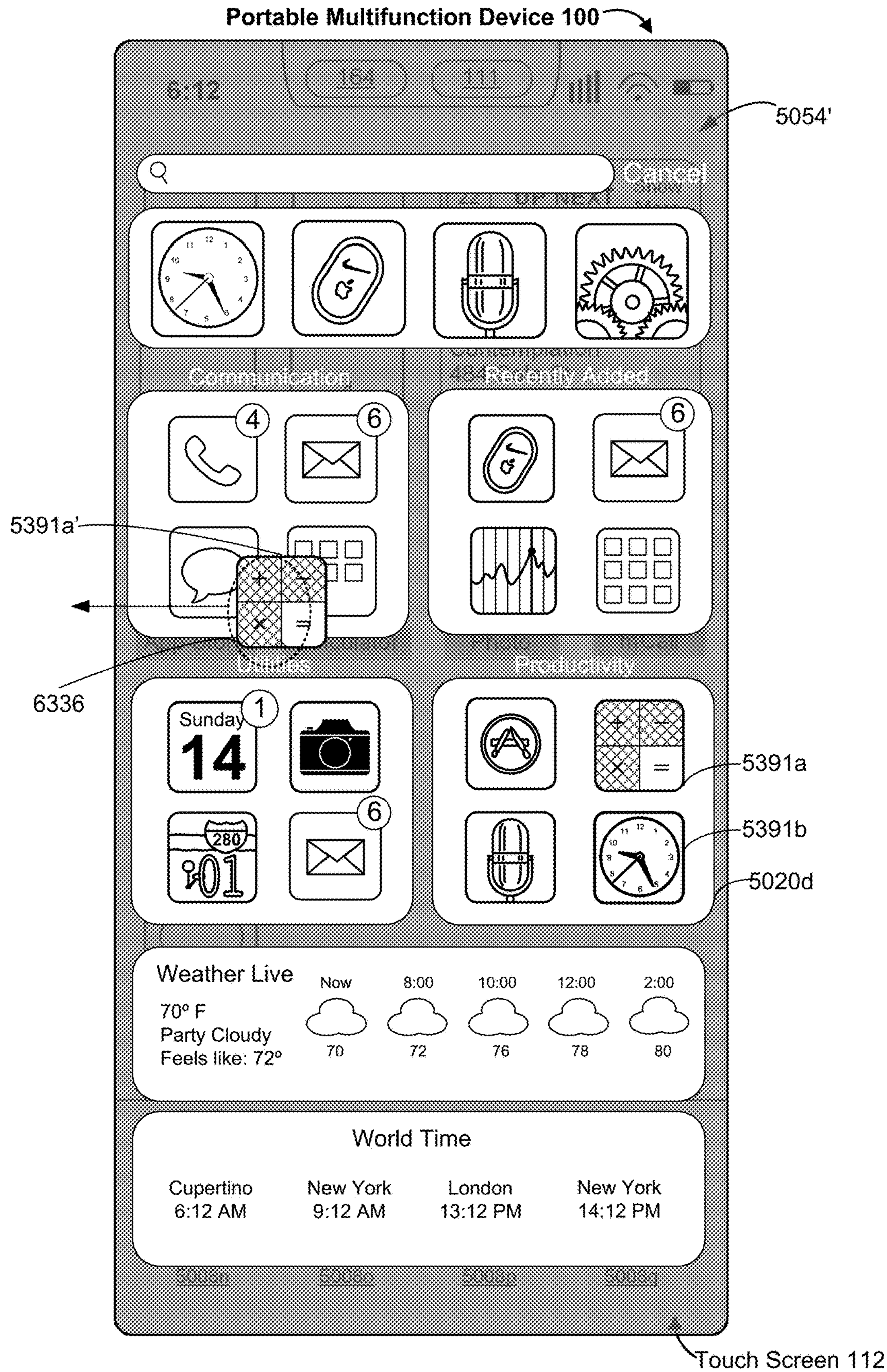
Figure 5G27

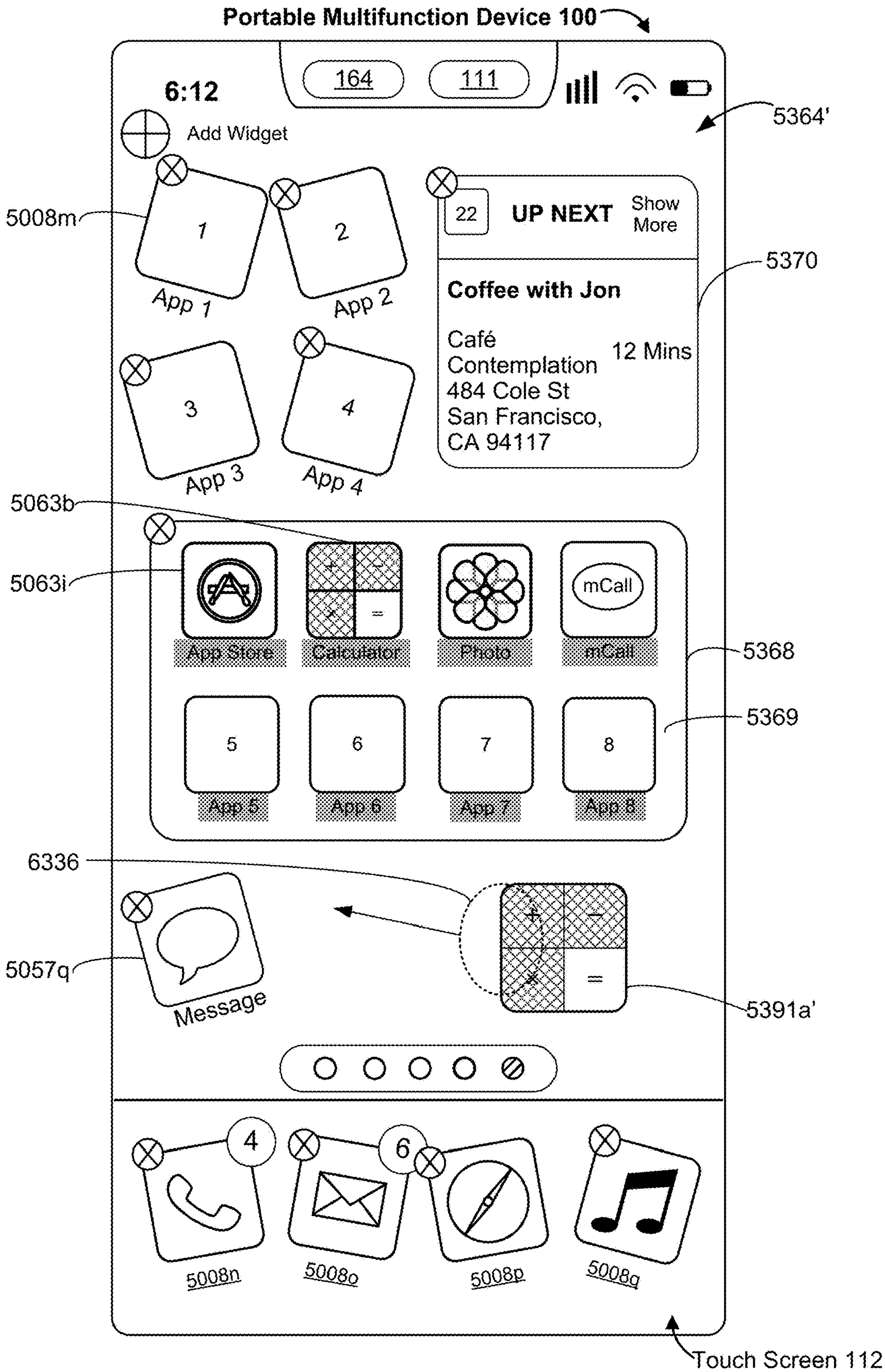
Figure 5G28

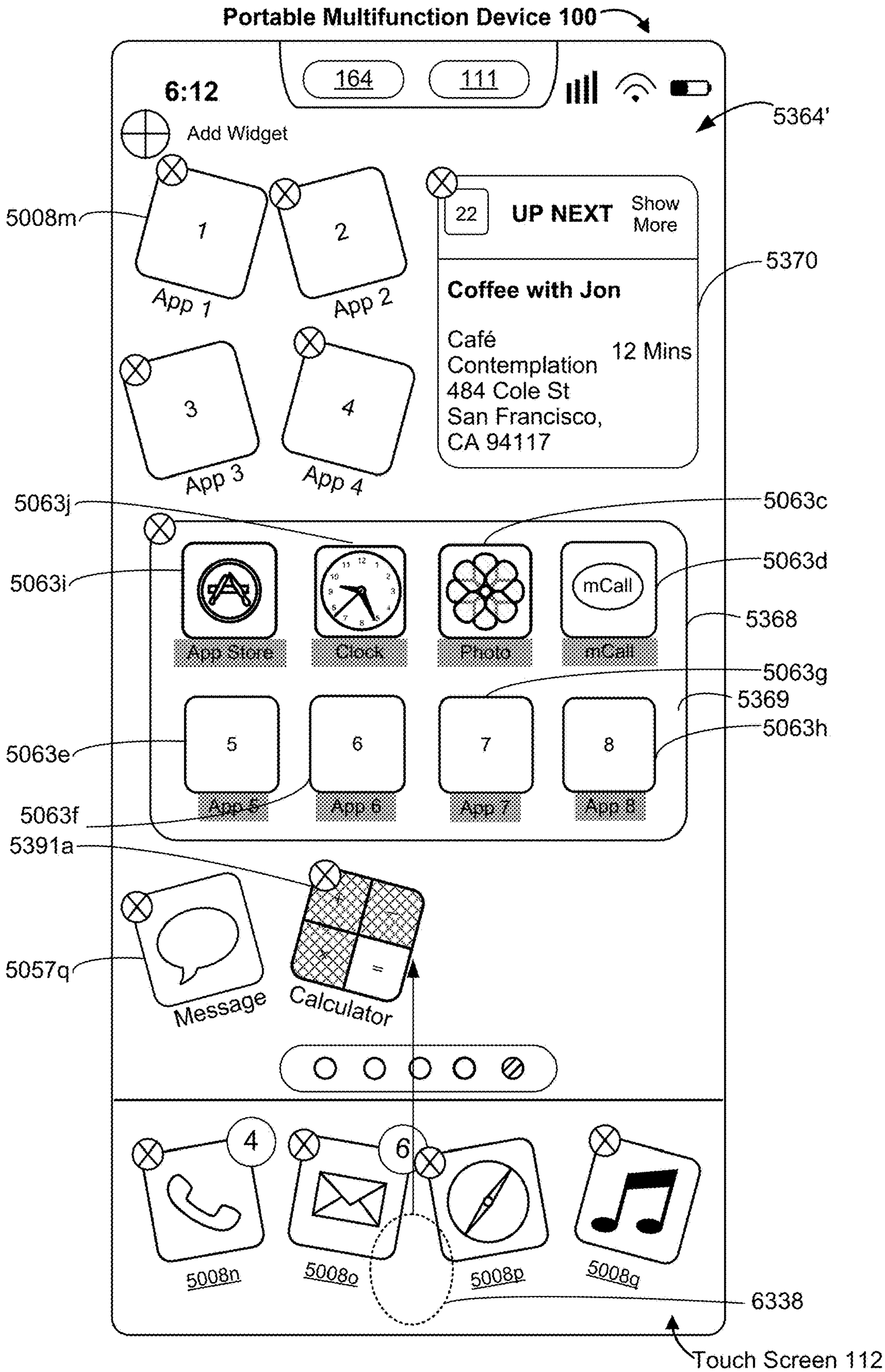
Figure 5G29

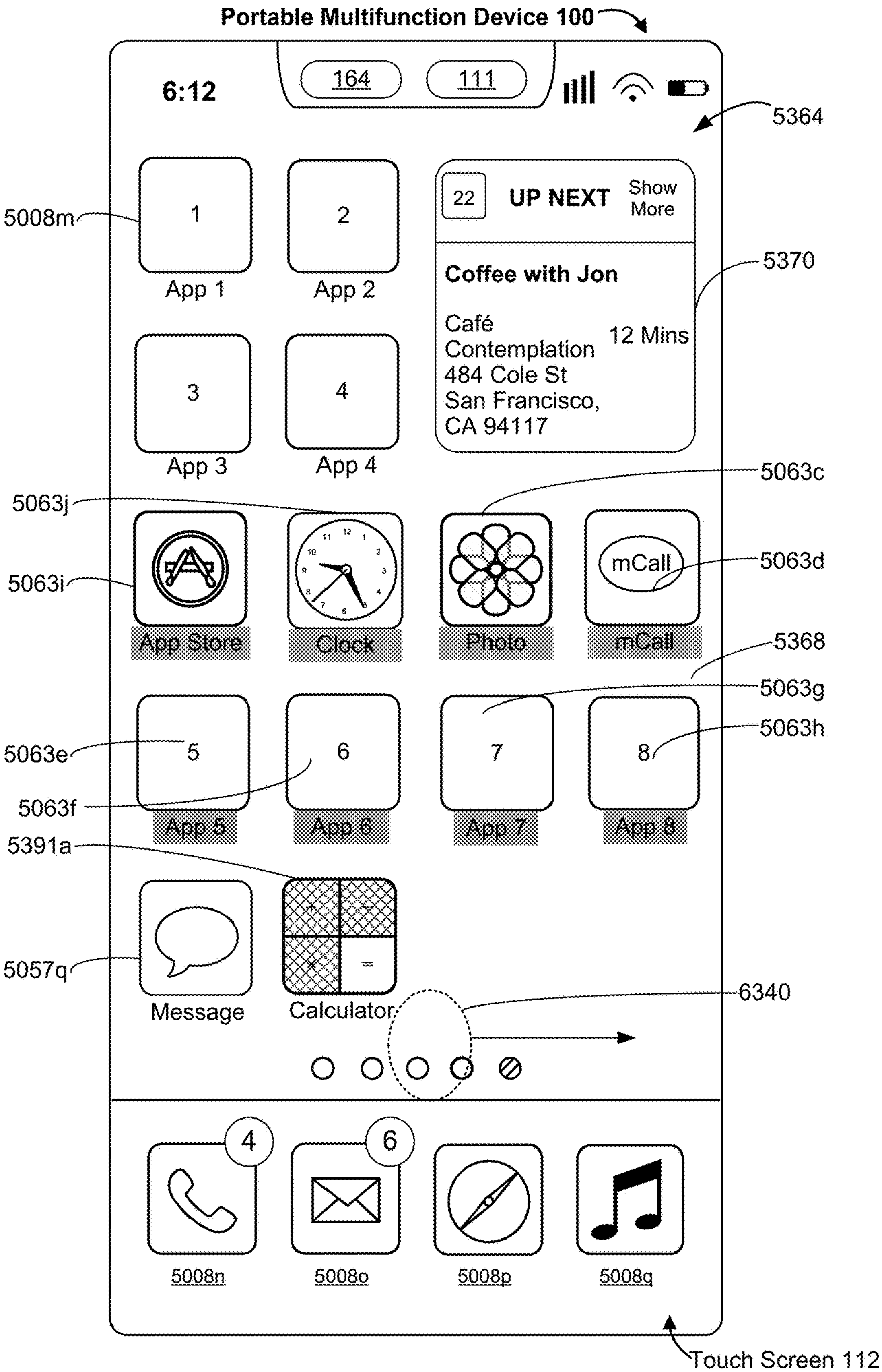
Figure 5G30

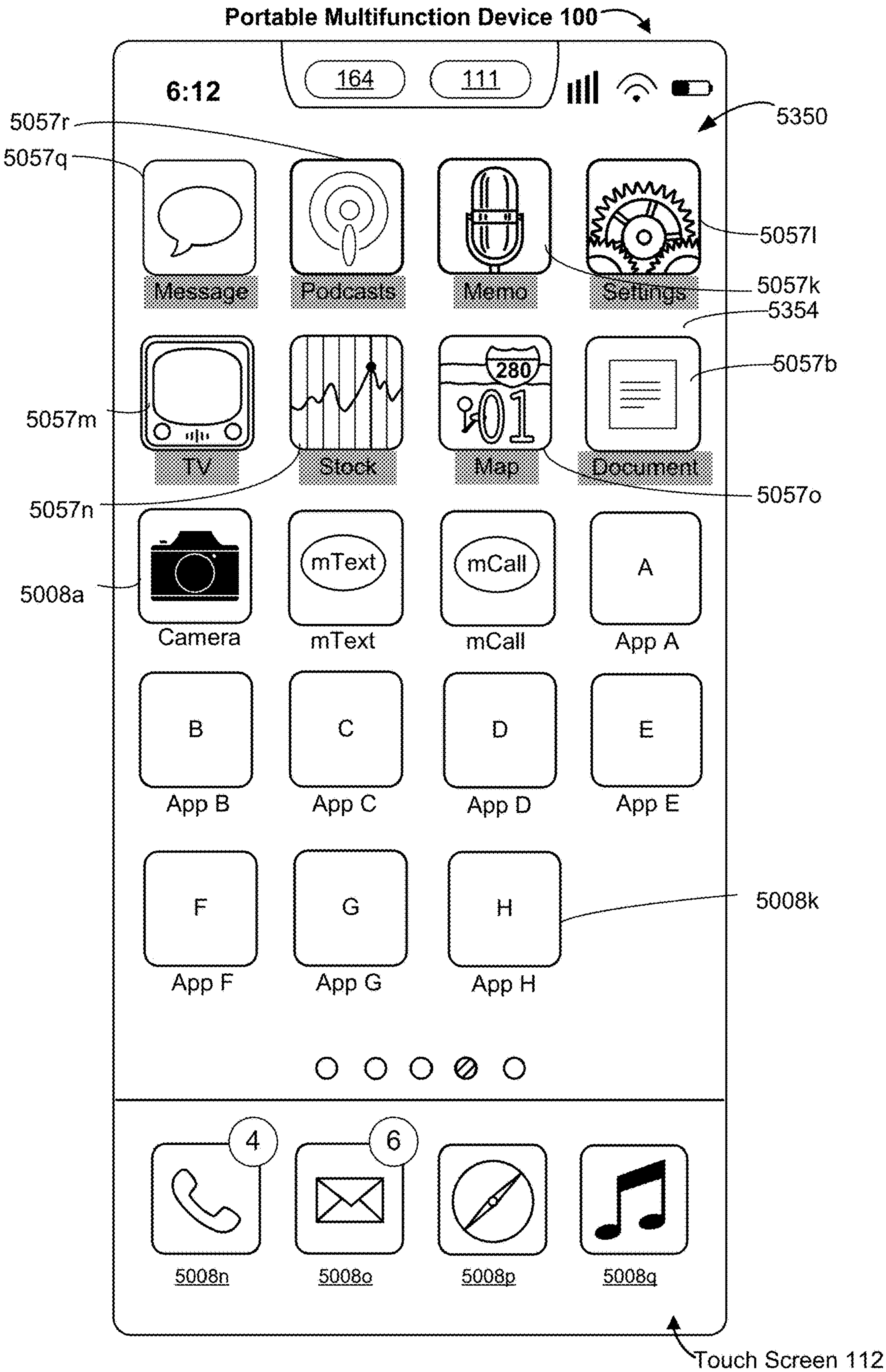
Figure 5G31

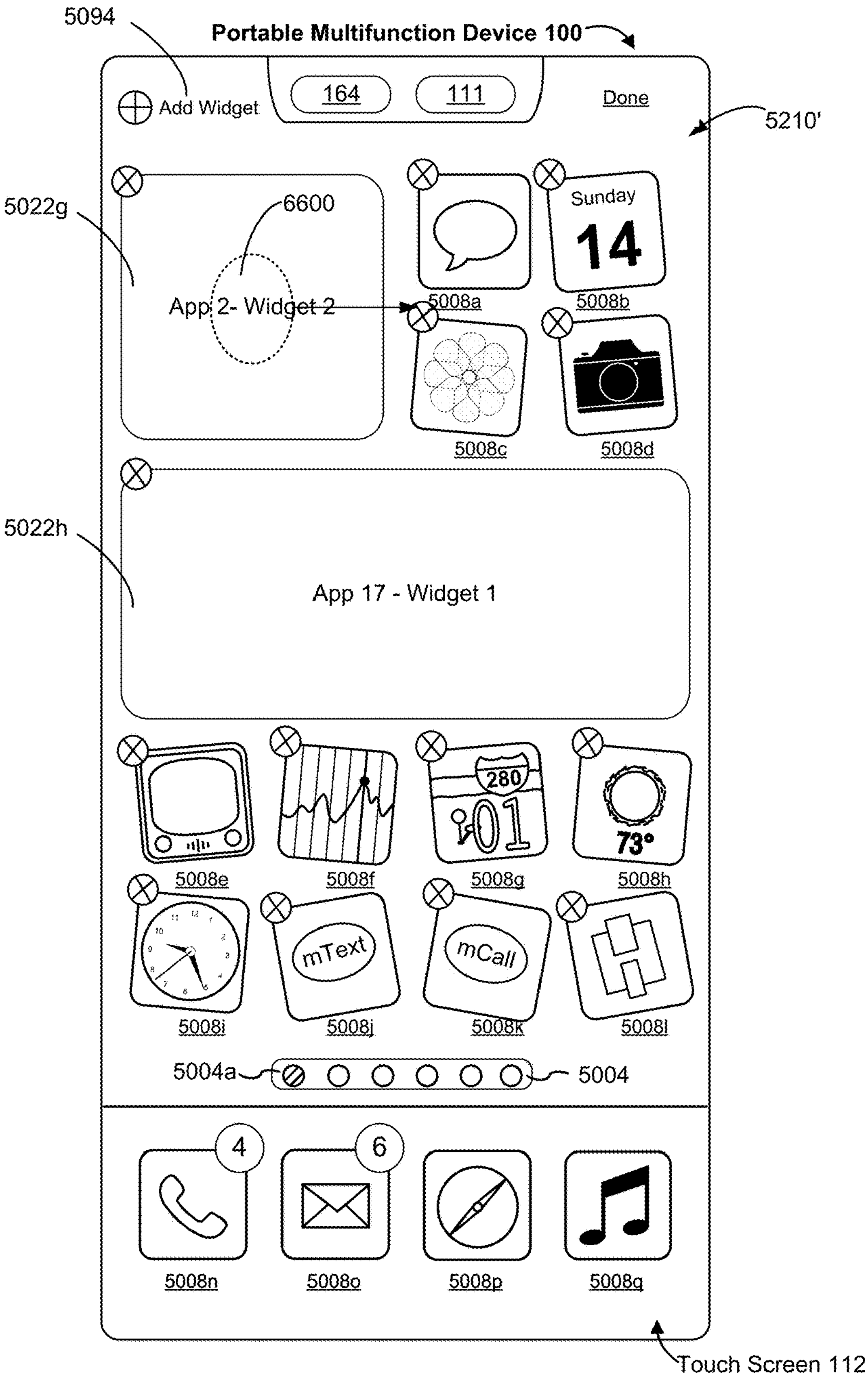
Figure 5H1

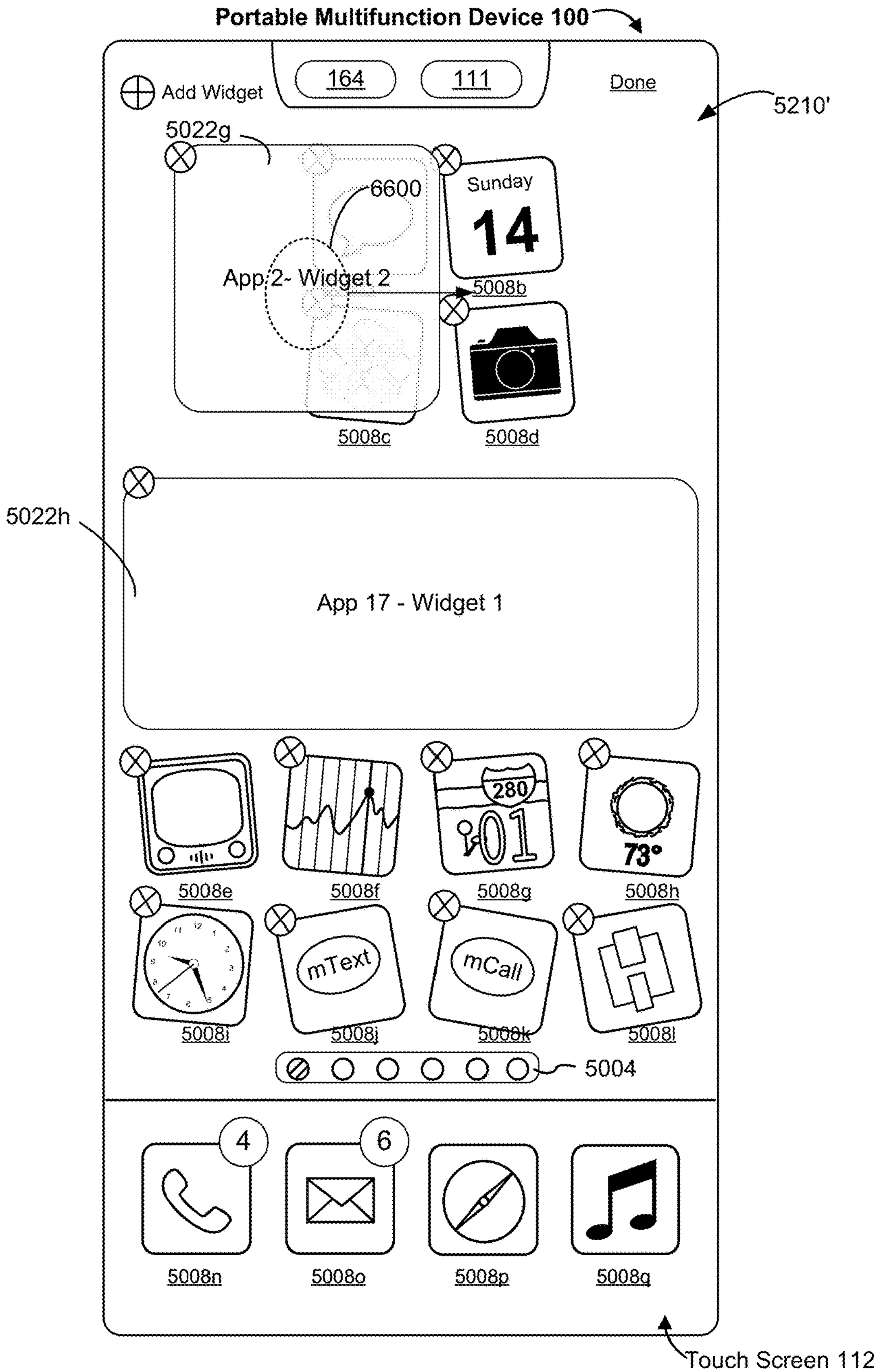
Figure 5H2

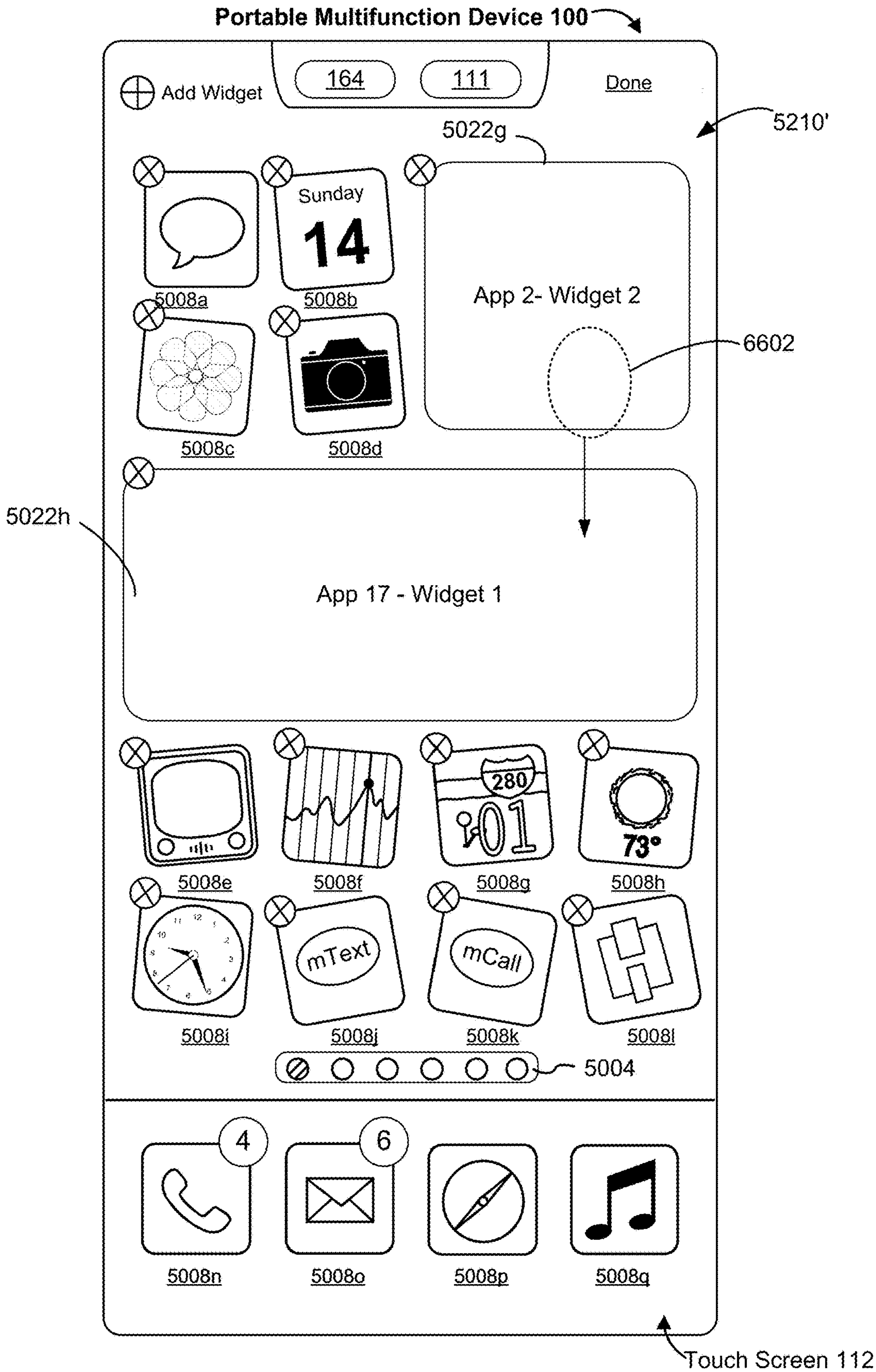
Figure 5H3

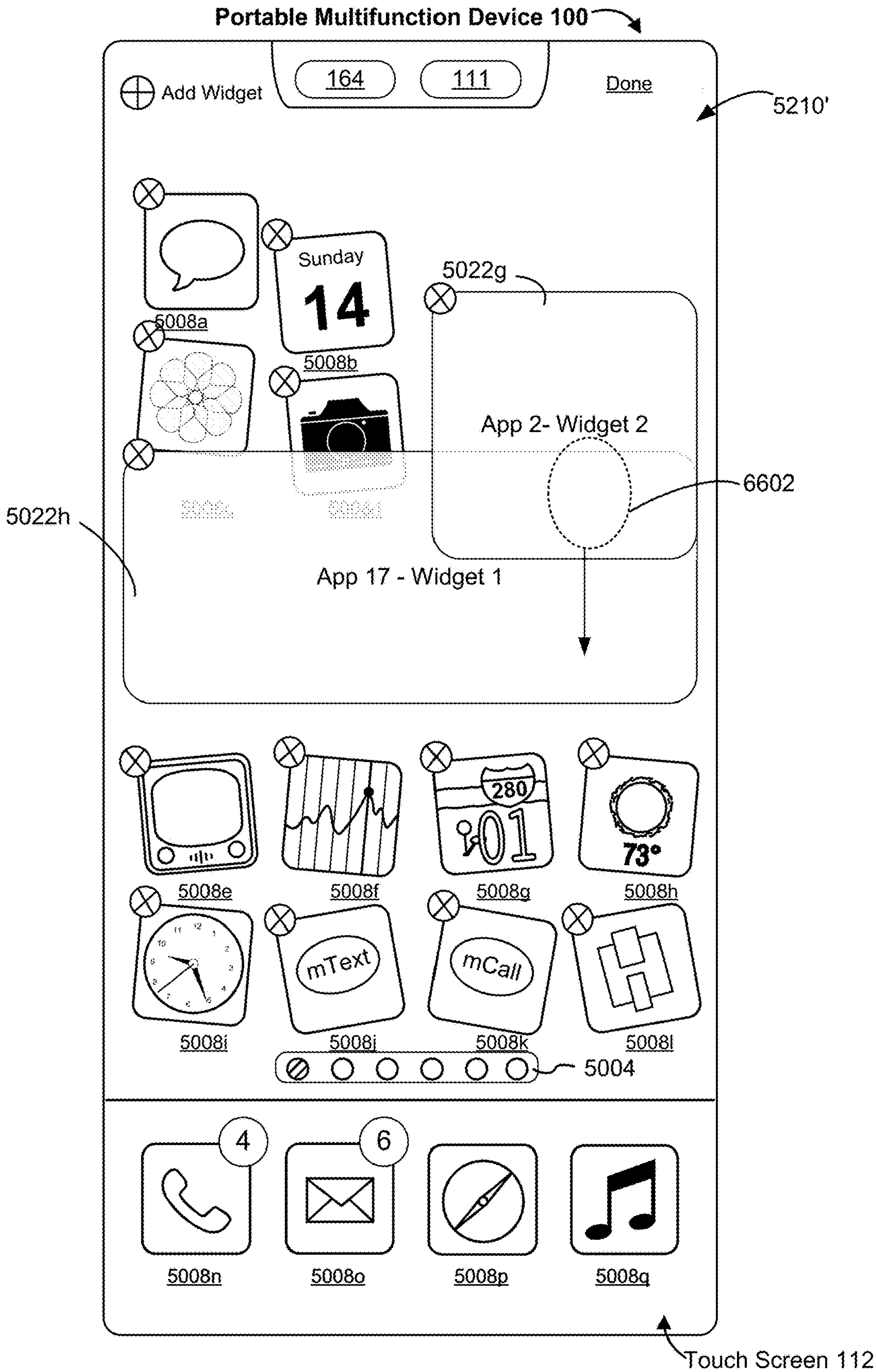
Figure 5H4

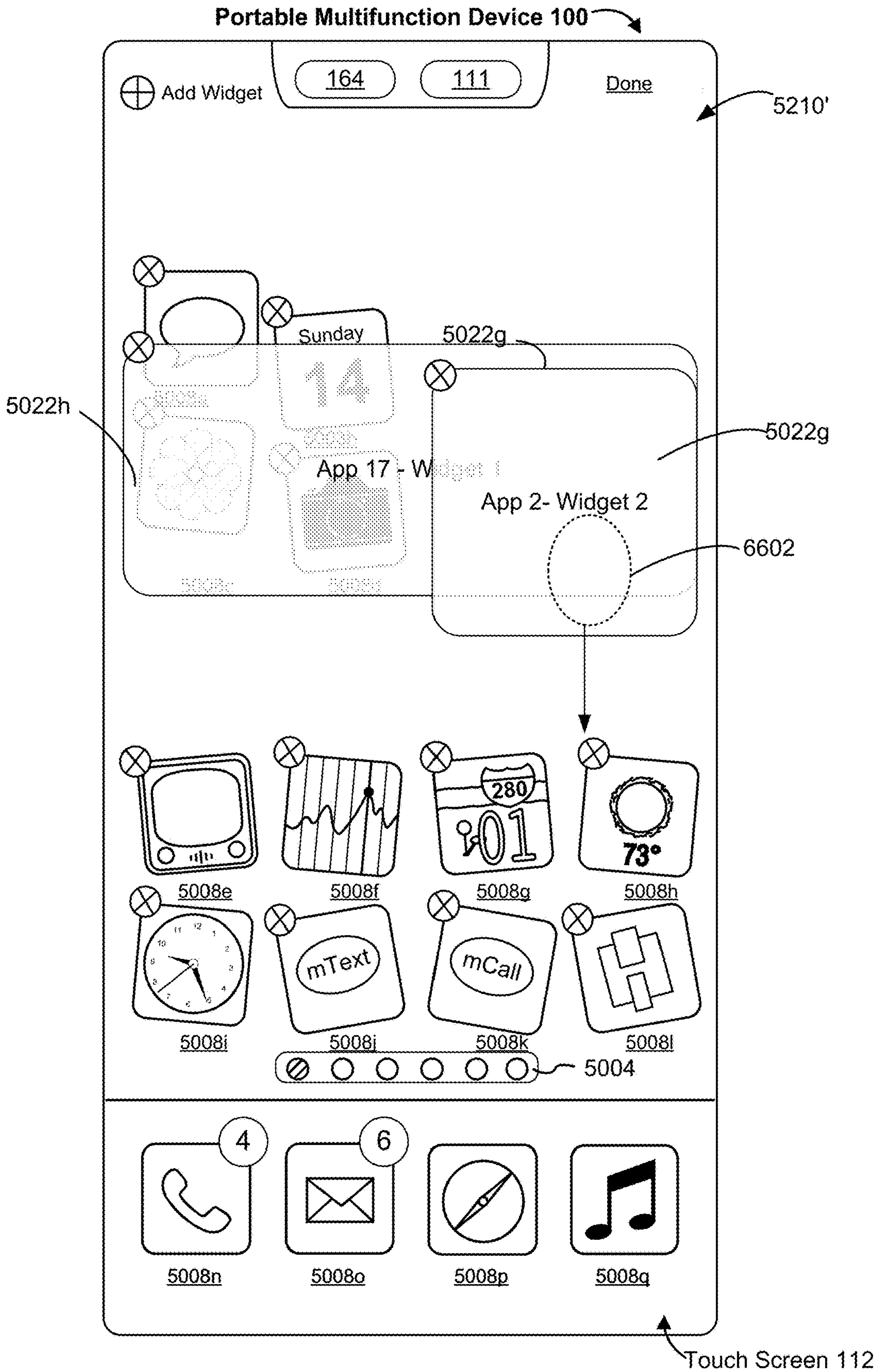
Figure 5H5

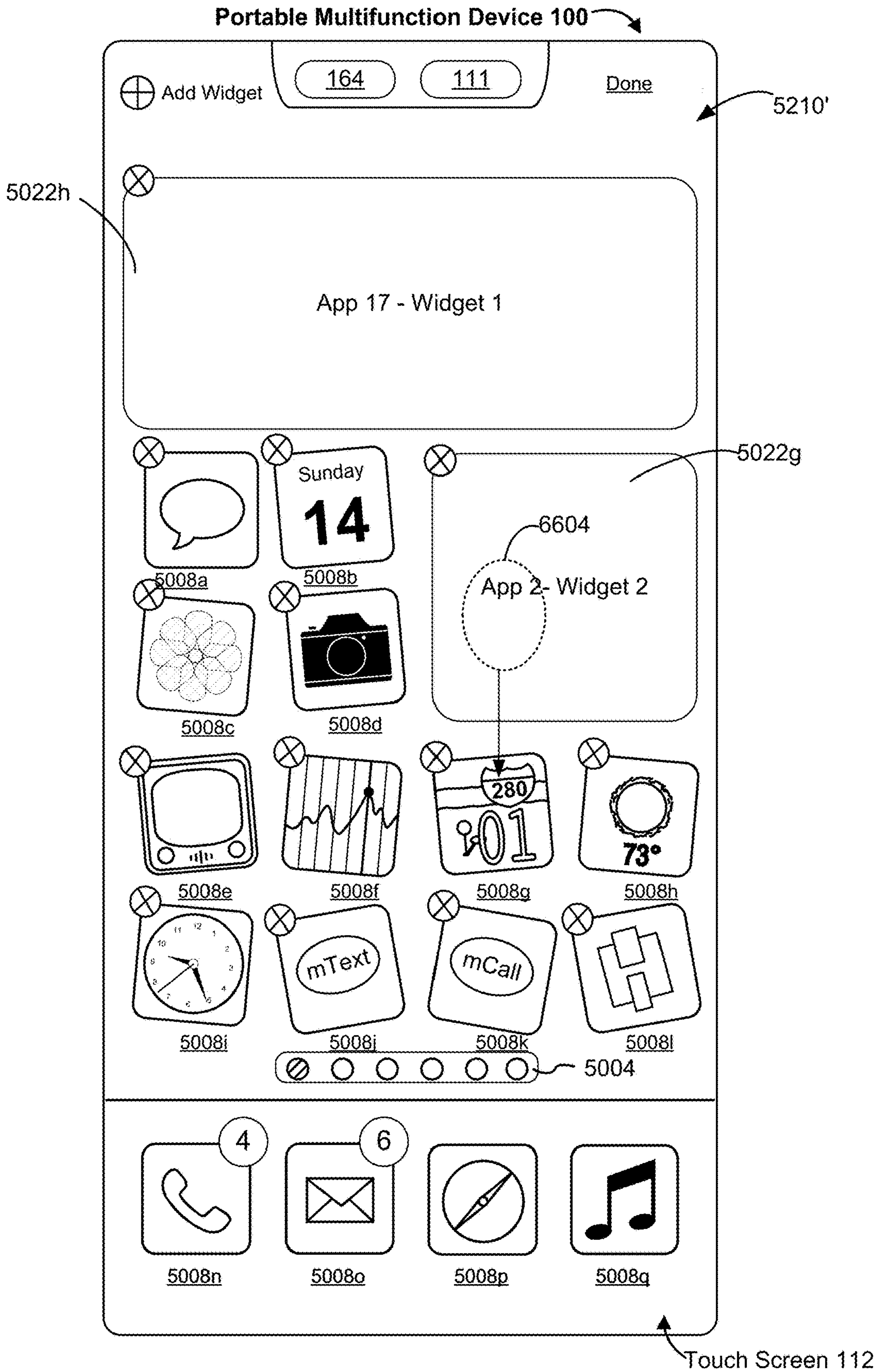
Figure 5H6

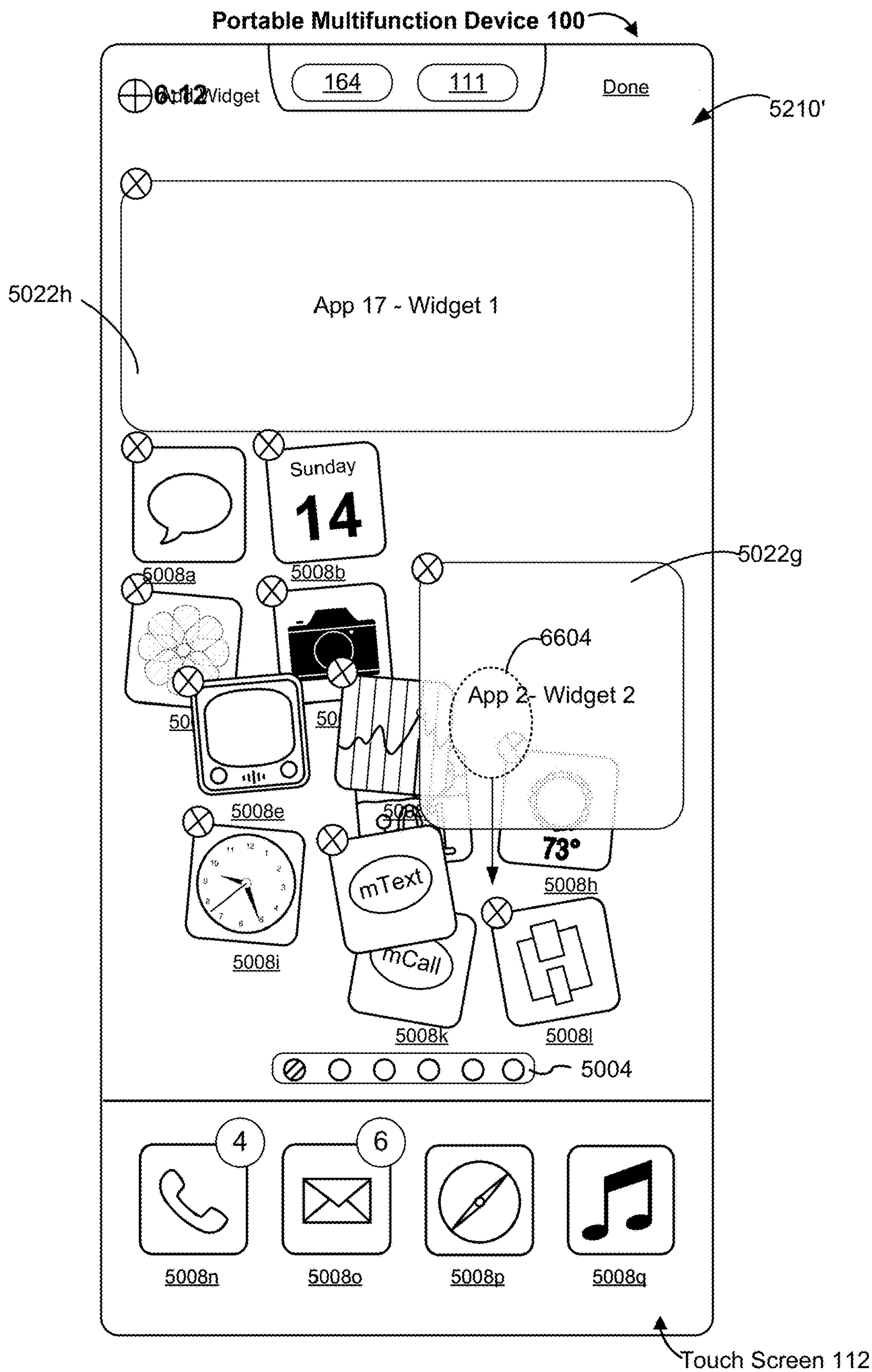
Figure 5H7

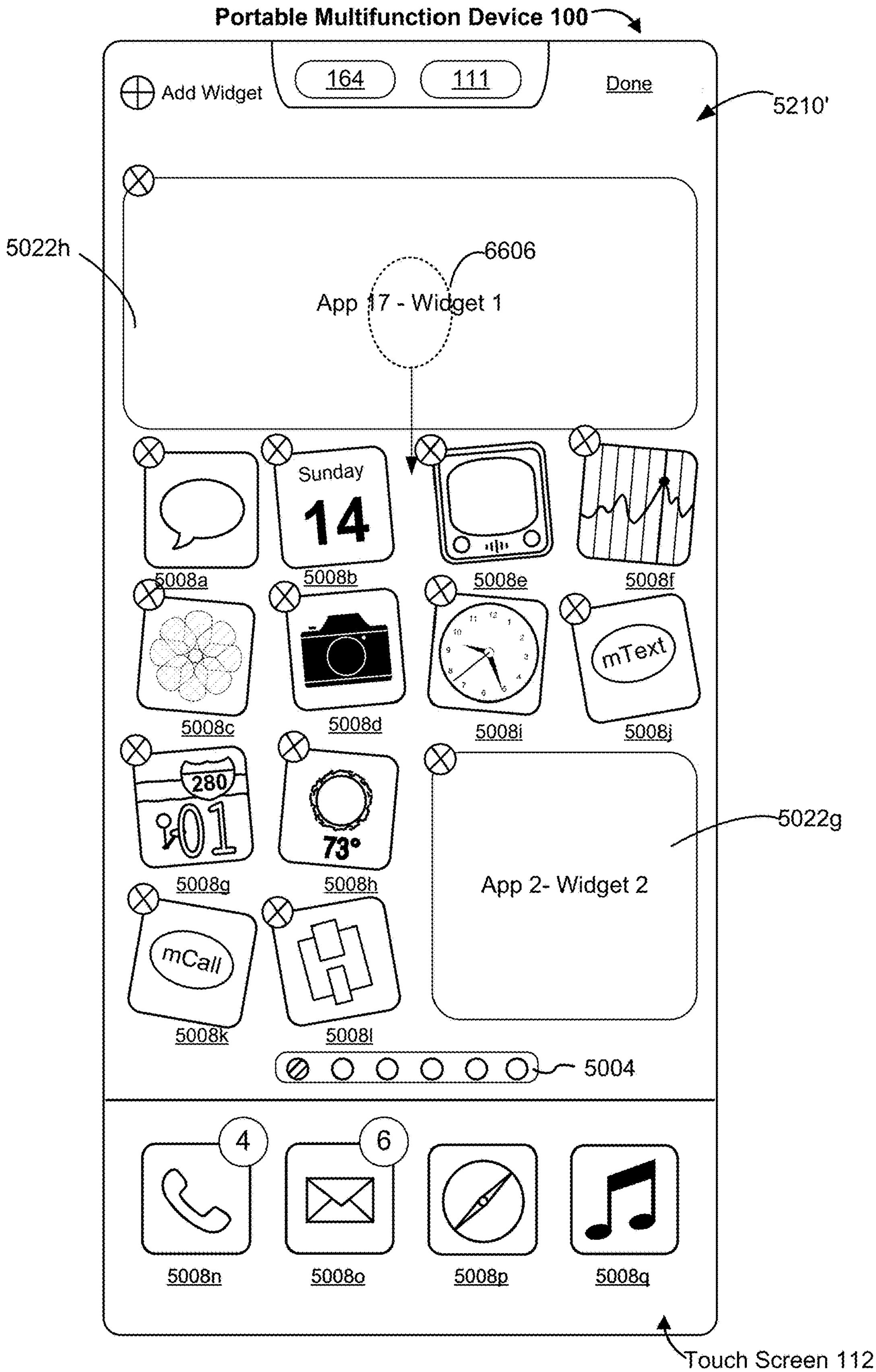
Figure 5H8

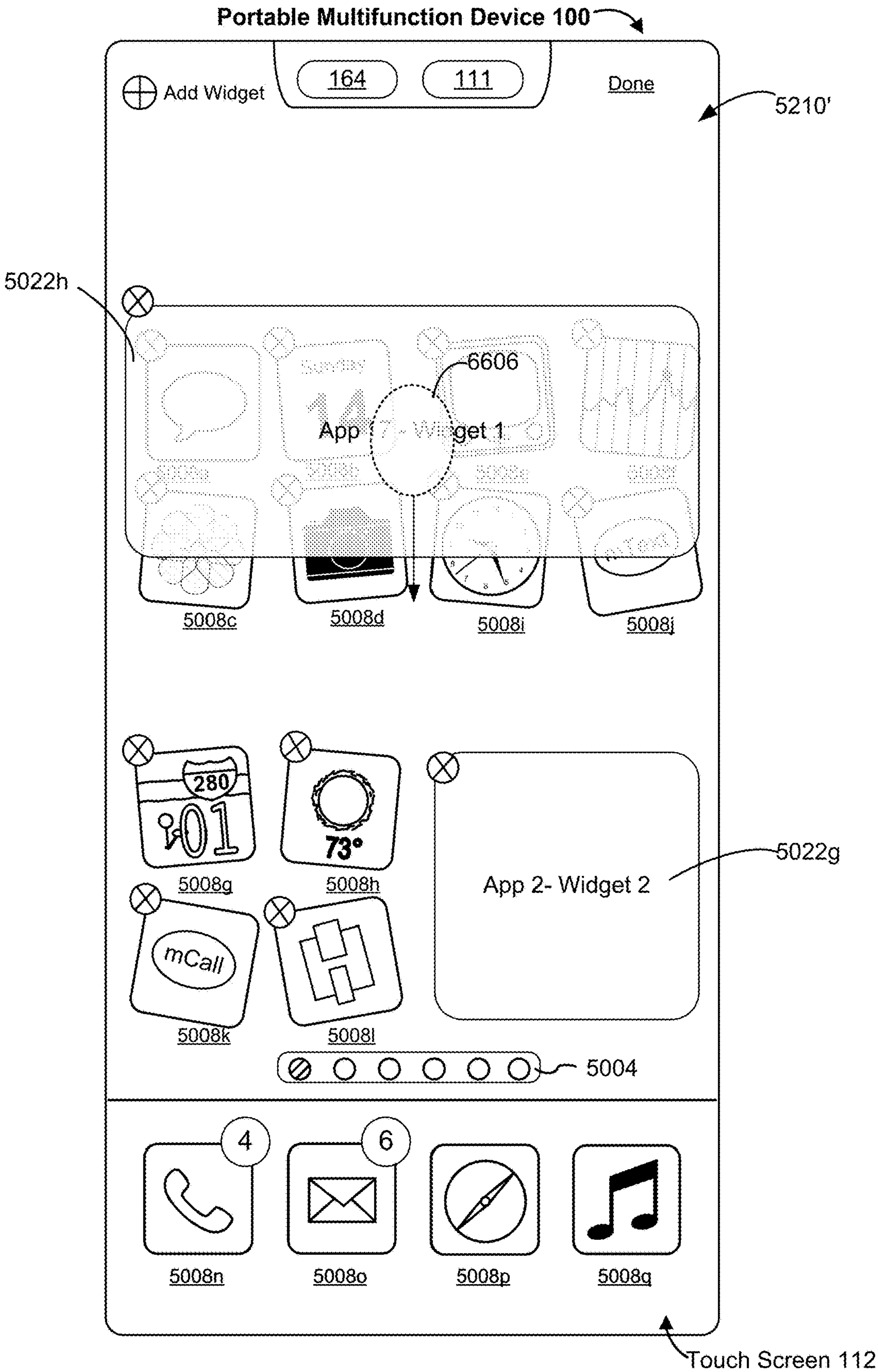
Figure 5H9

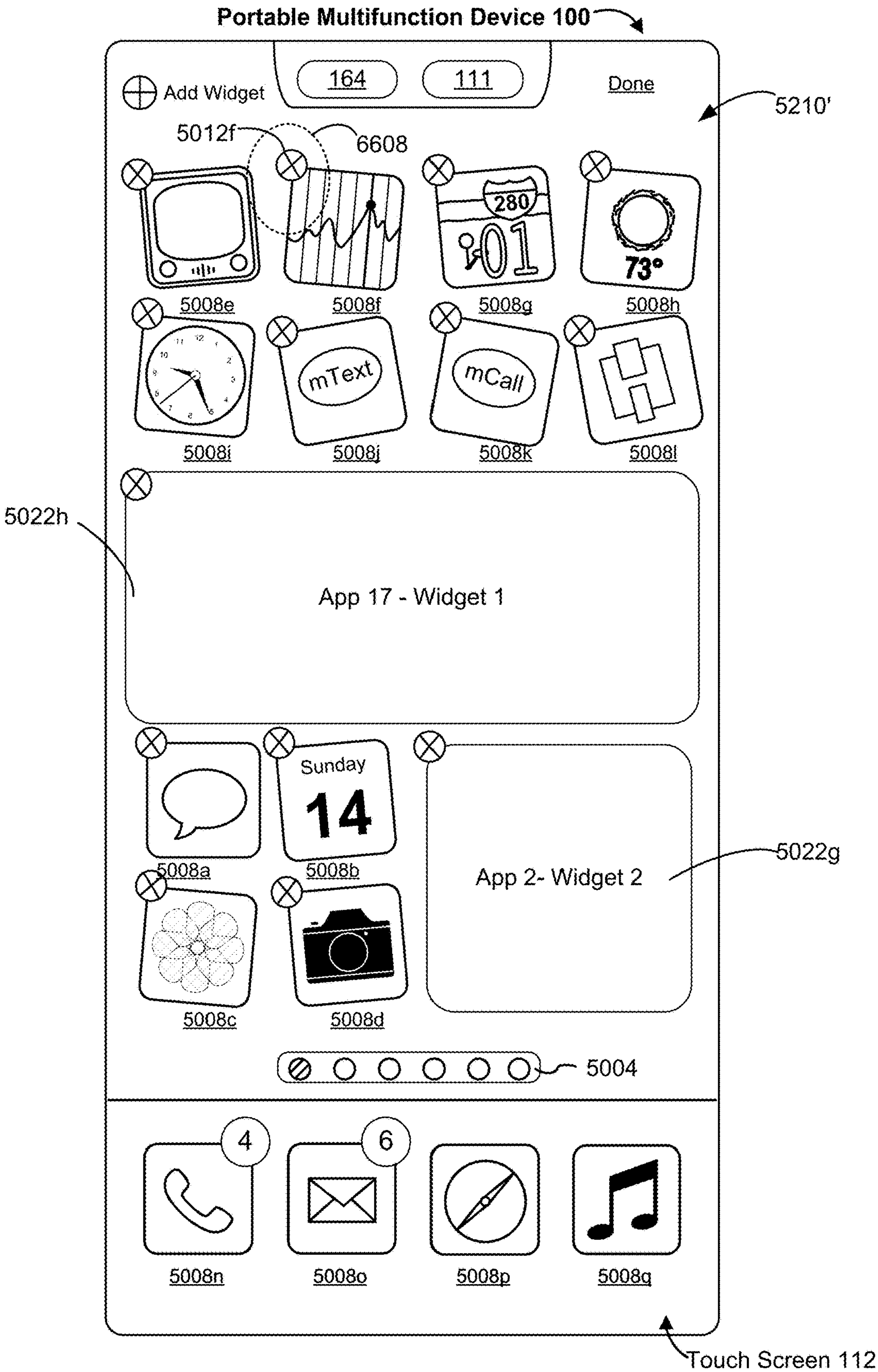
Figure 5H10

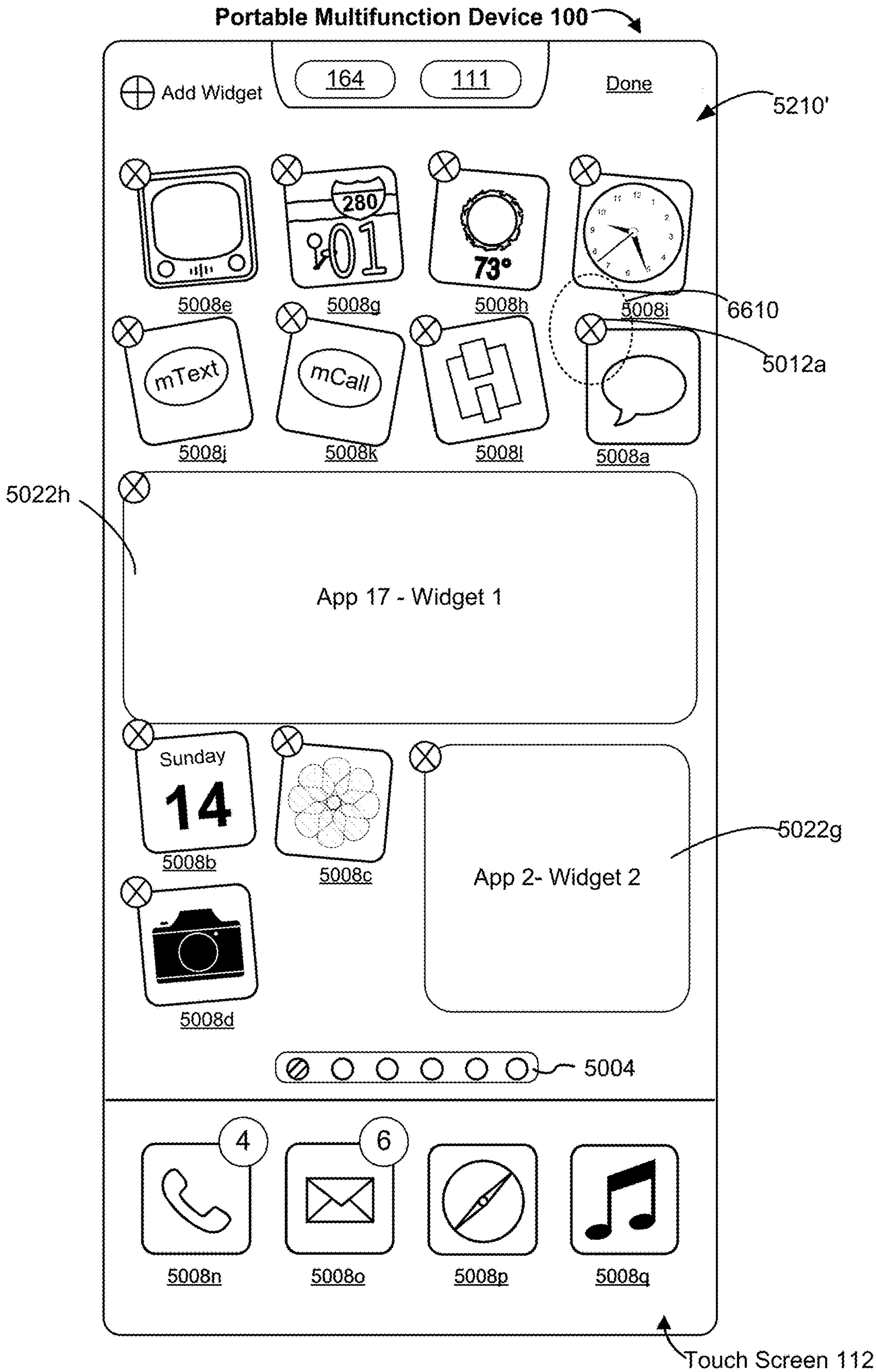
Figure 5H11

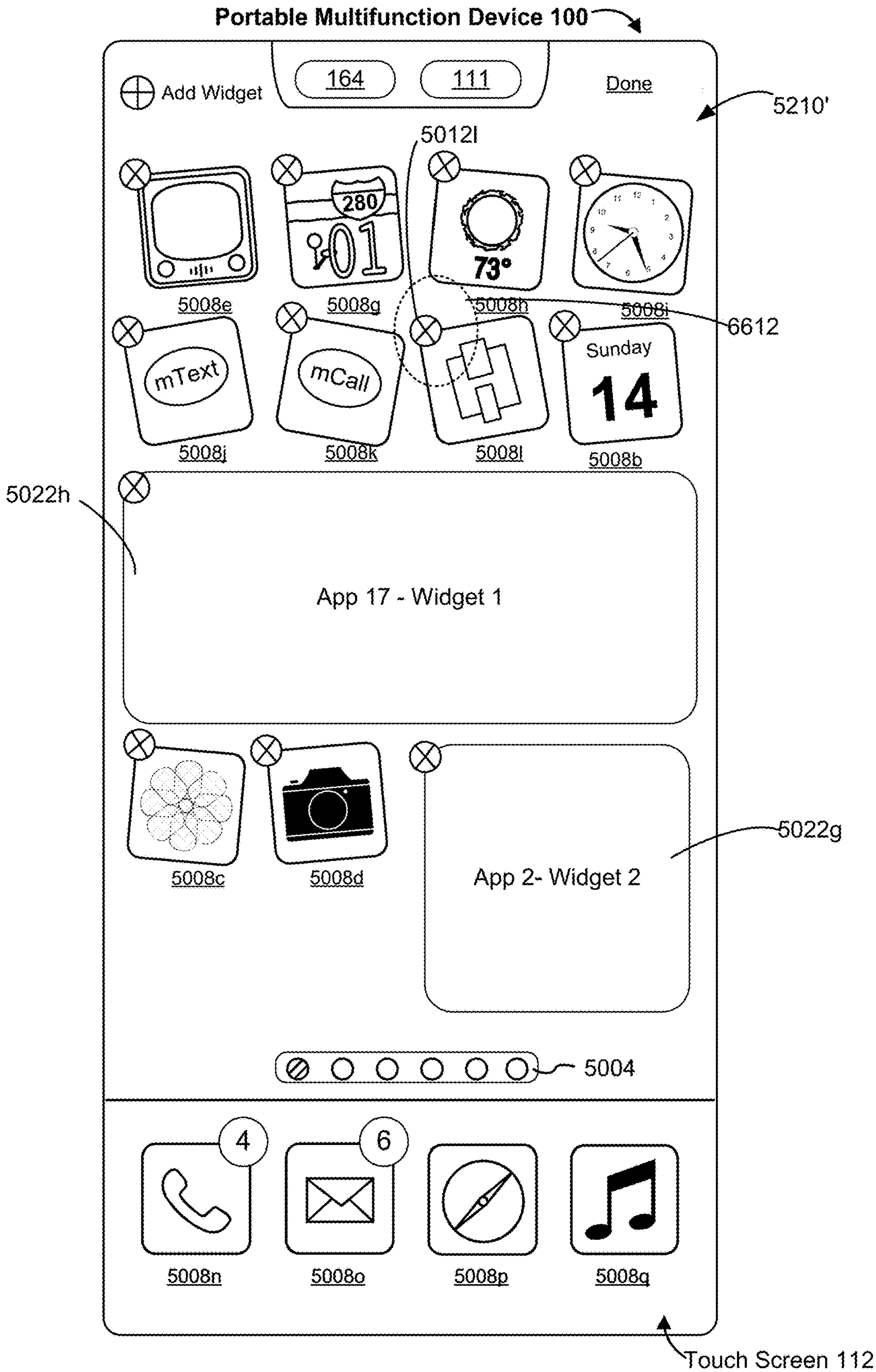
Figure 5H12

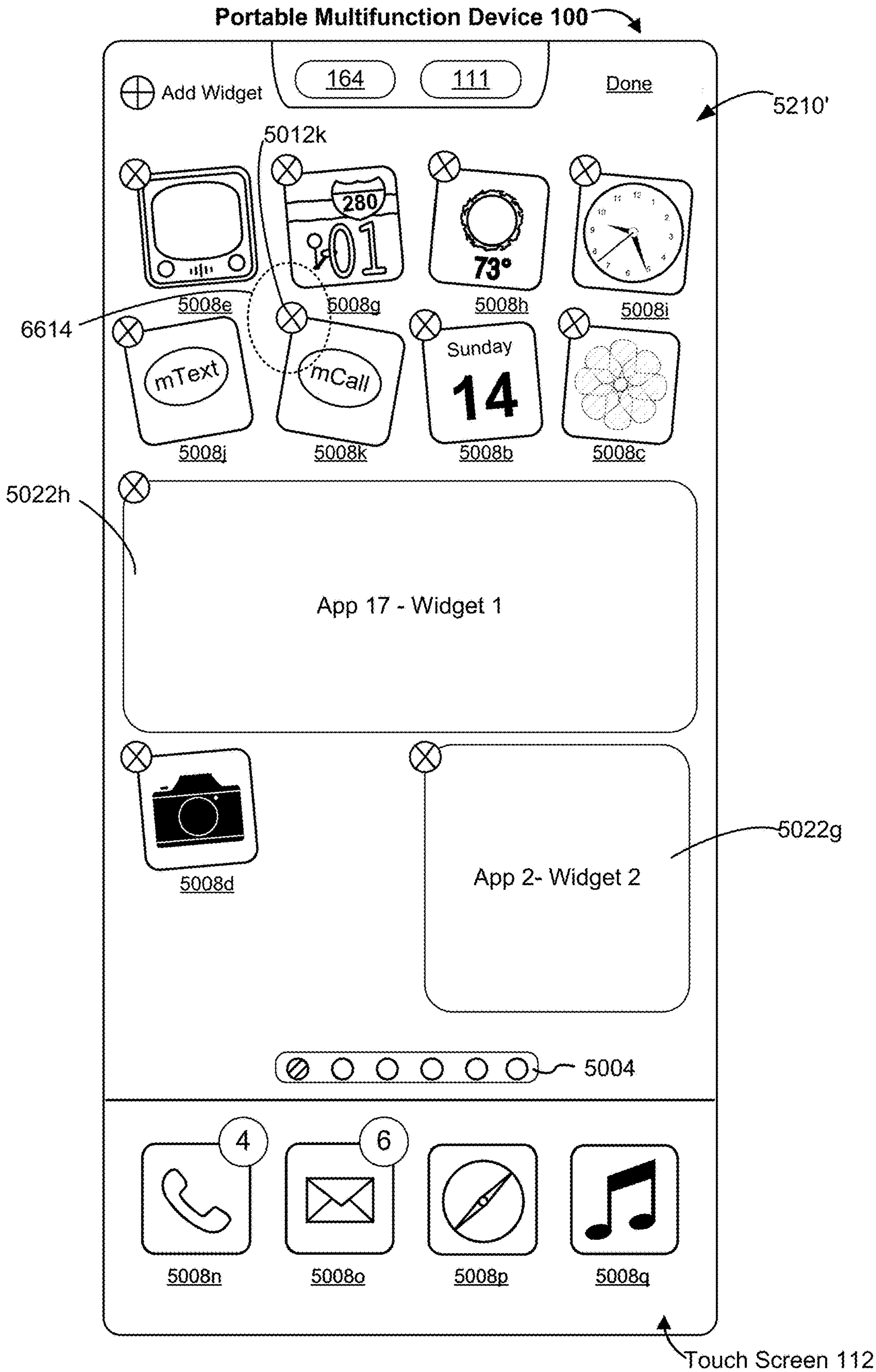
Figure 5H13

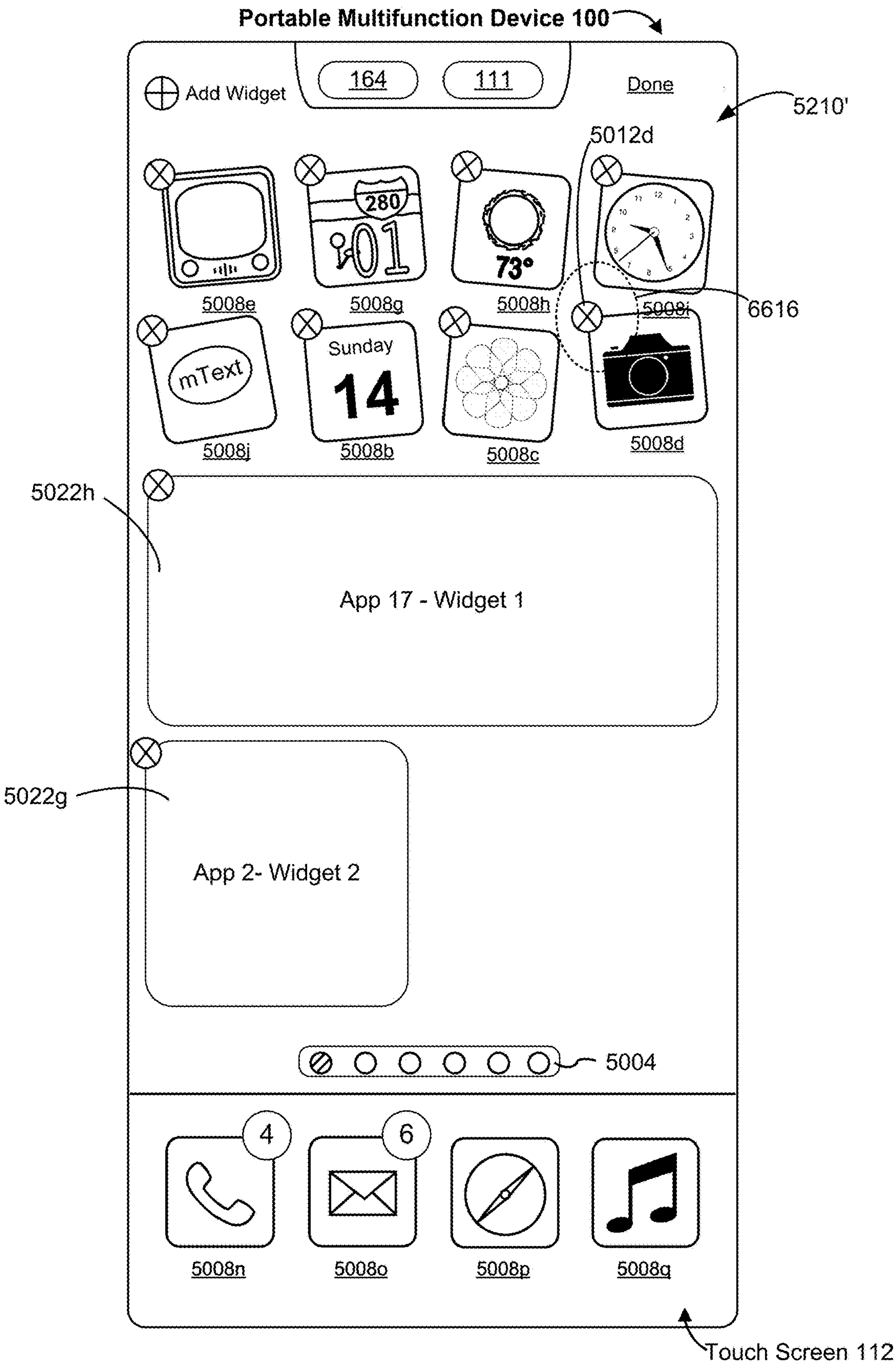
Figure 5H14

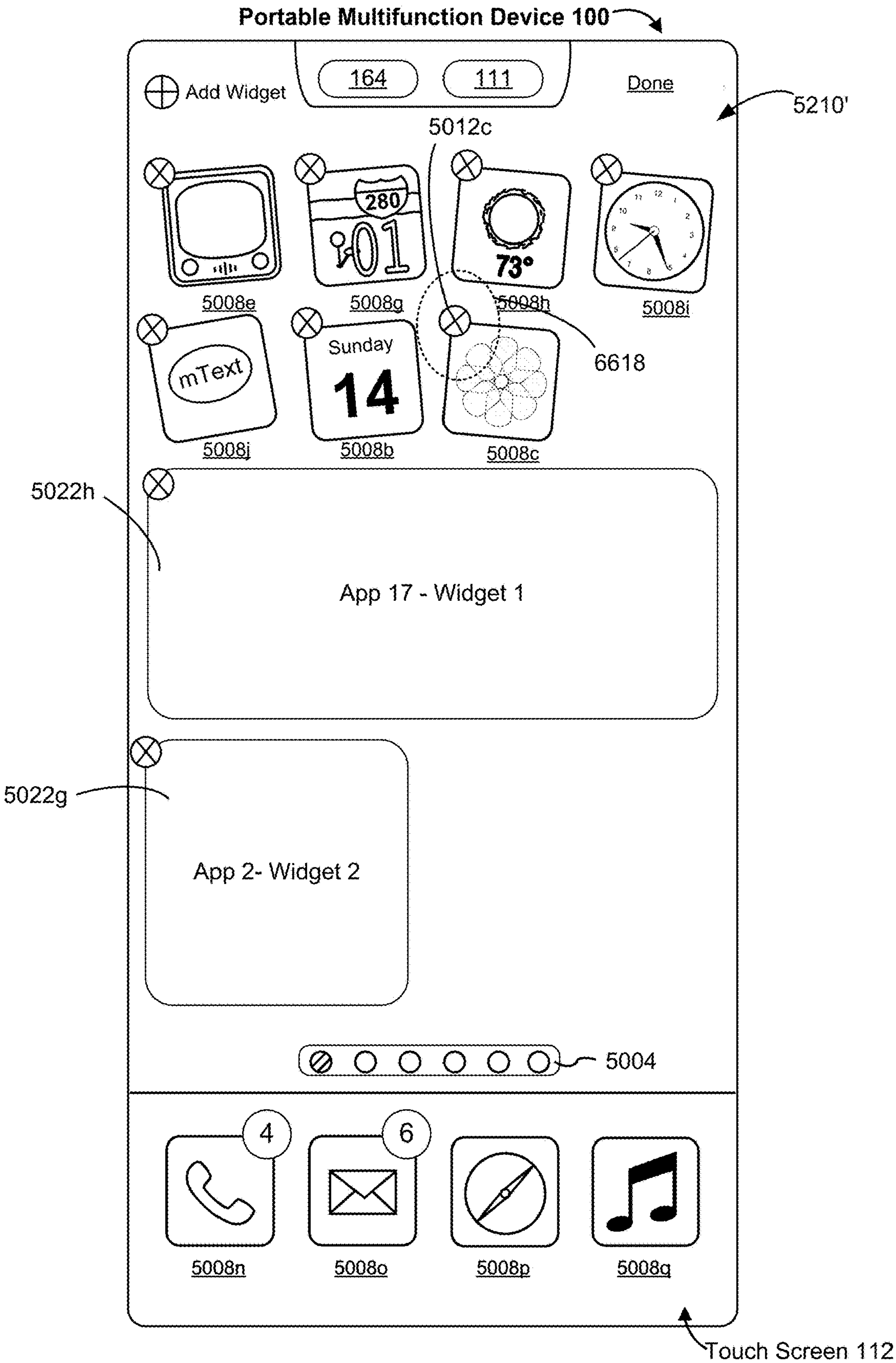
Figure 5H15

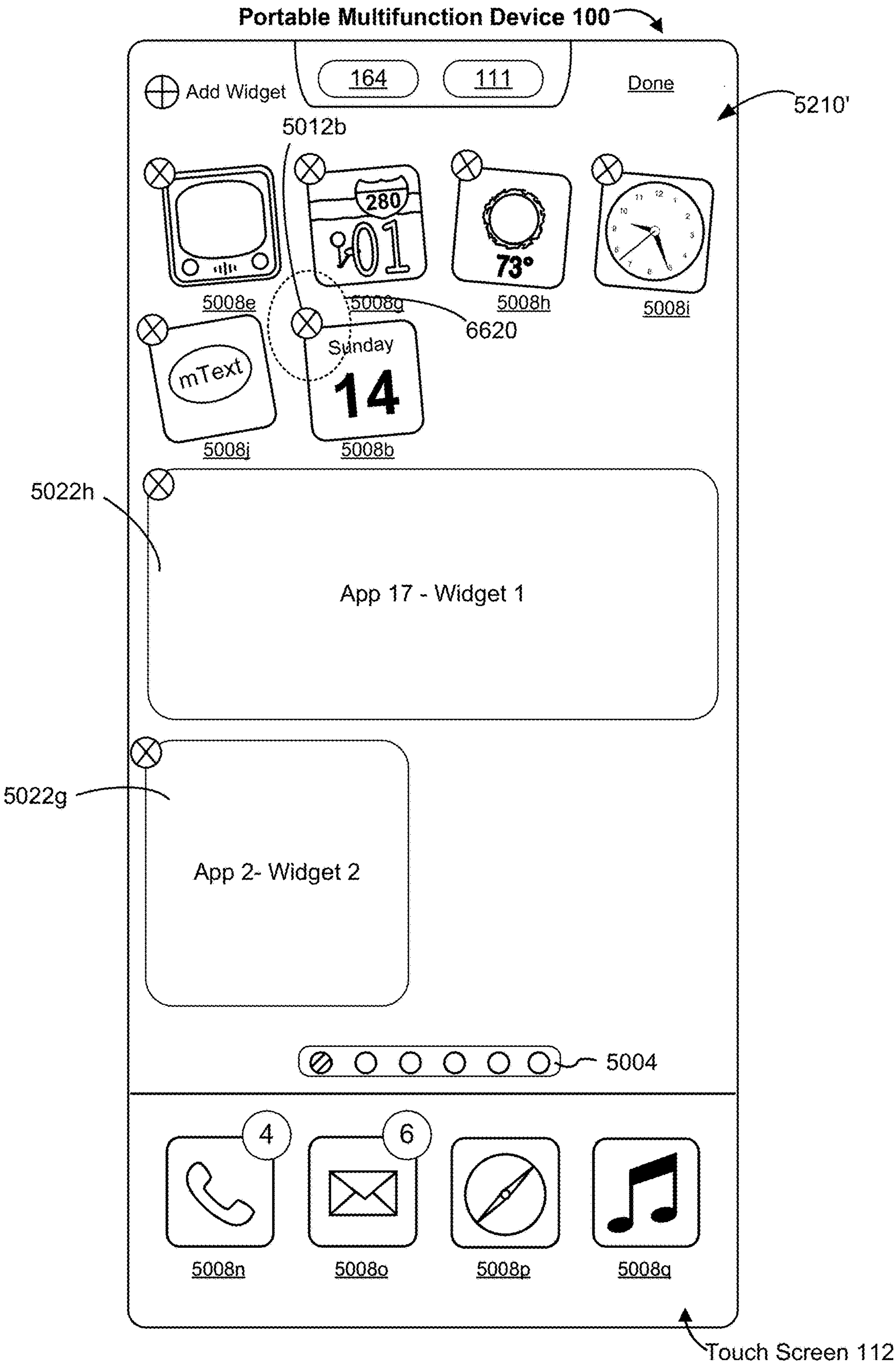
Figure 5H16

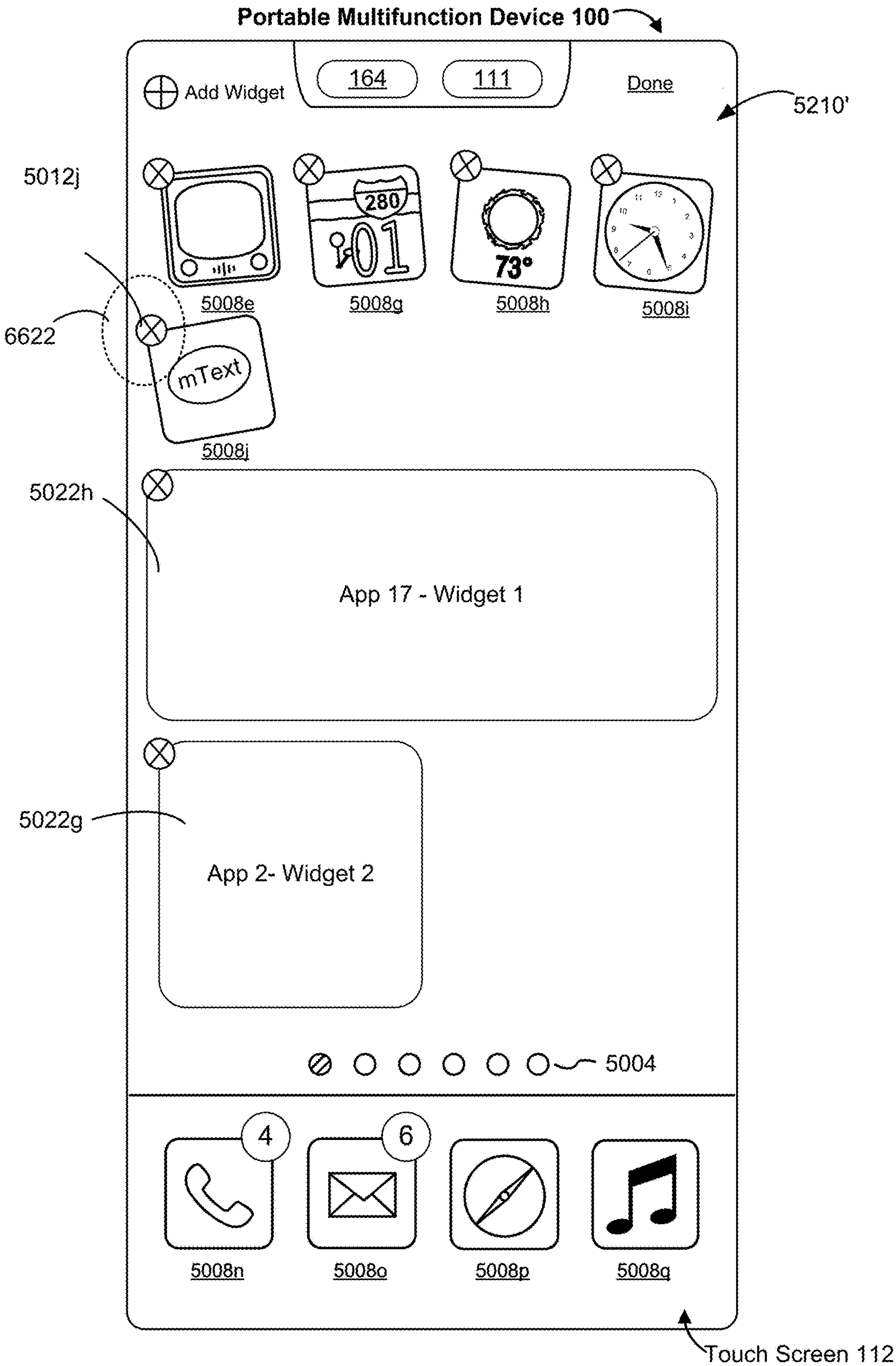
Figure 5H17

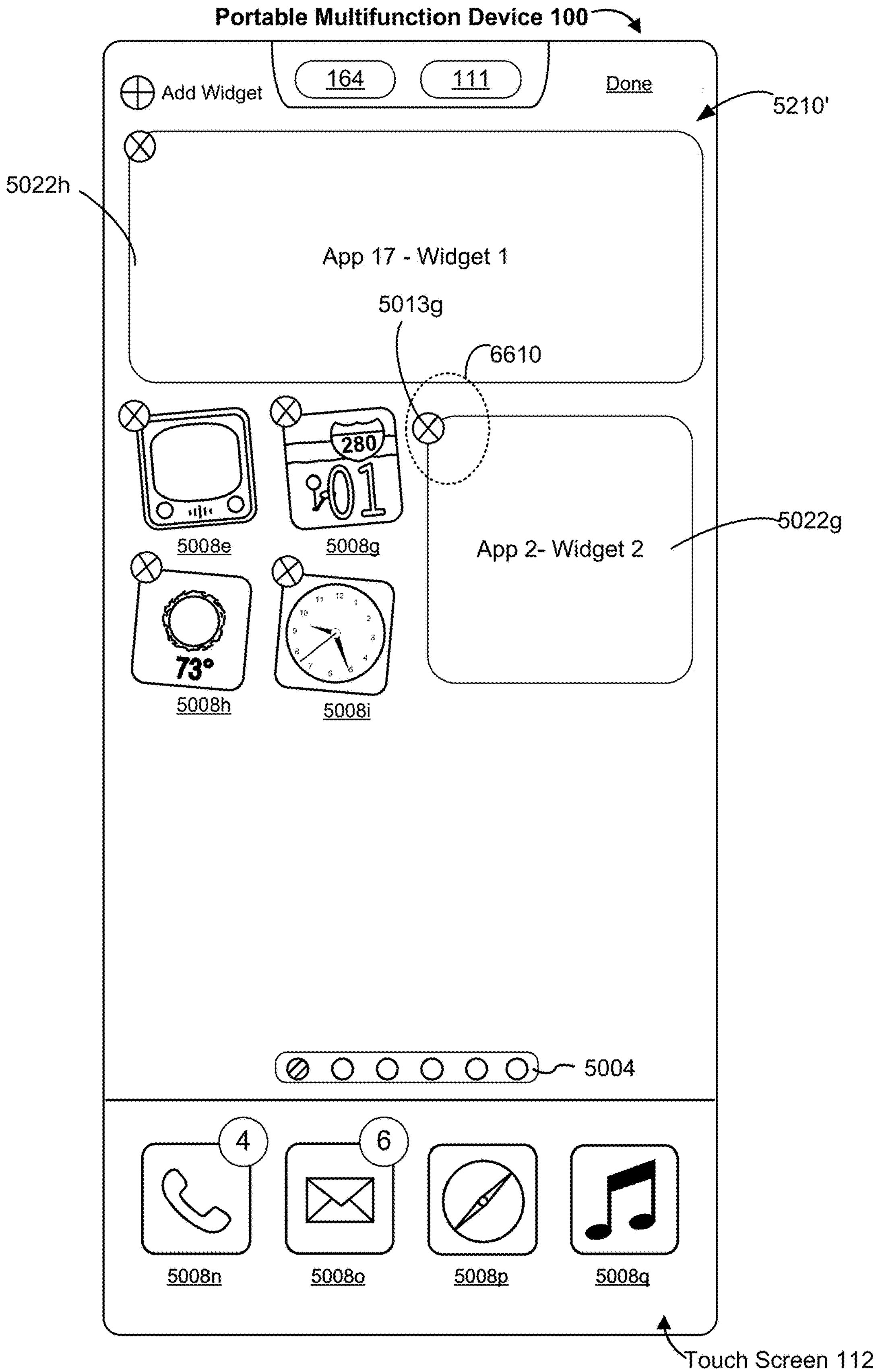
Figure 5H18

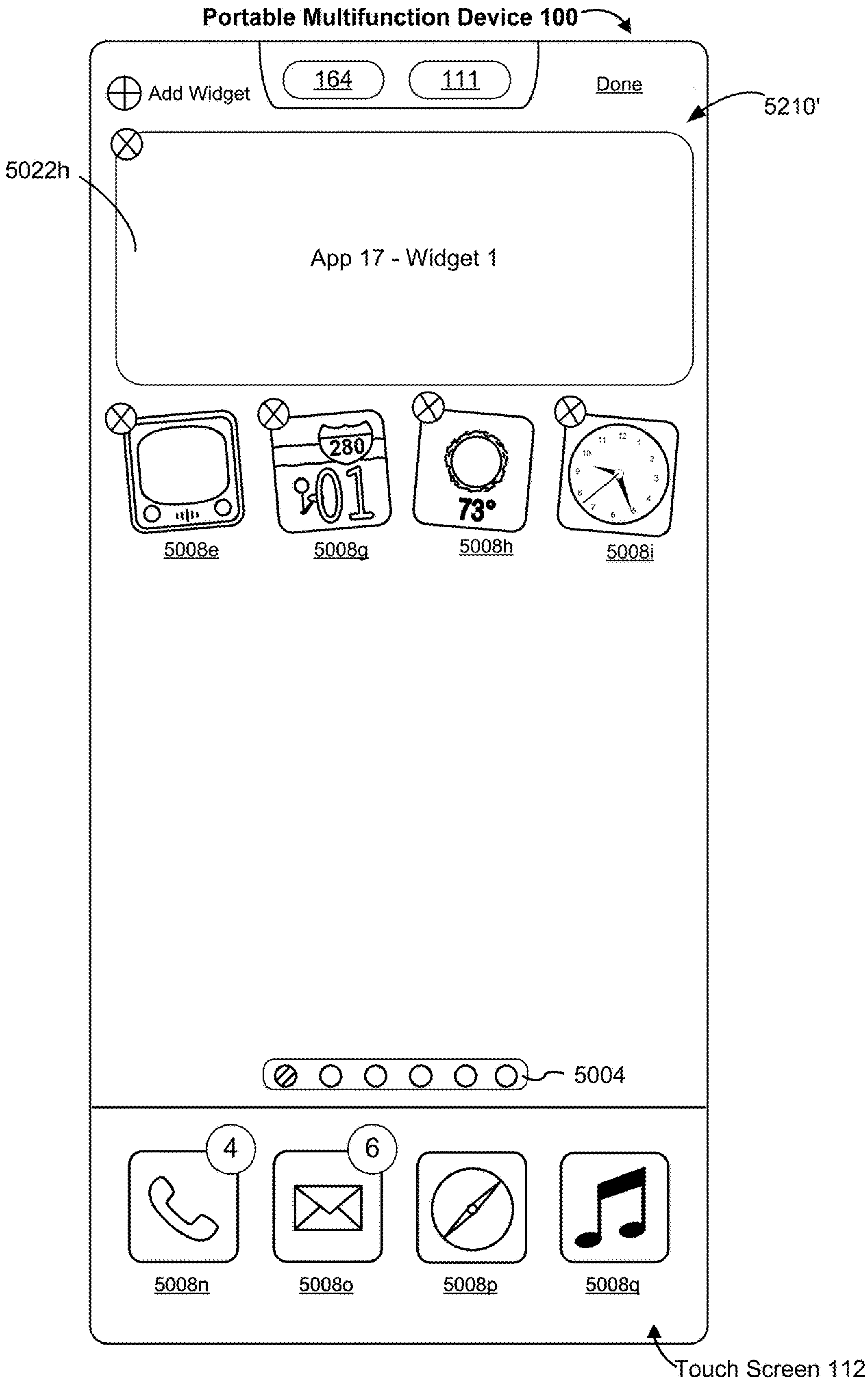
Figure 5H19

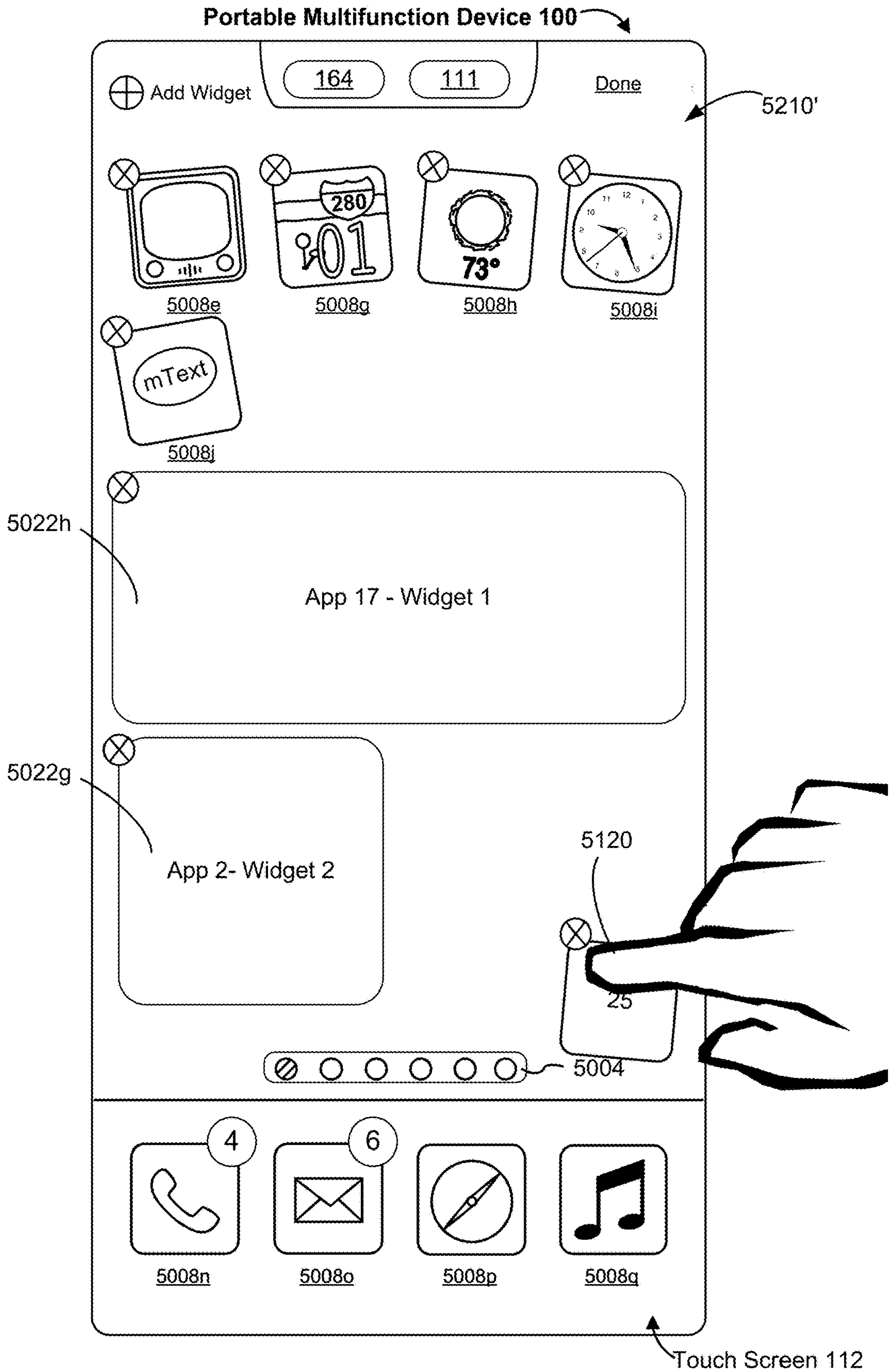
Figure 5H20

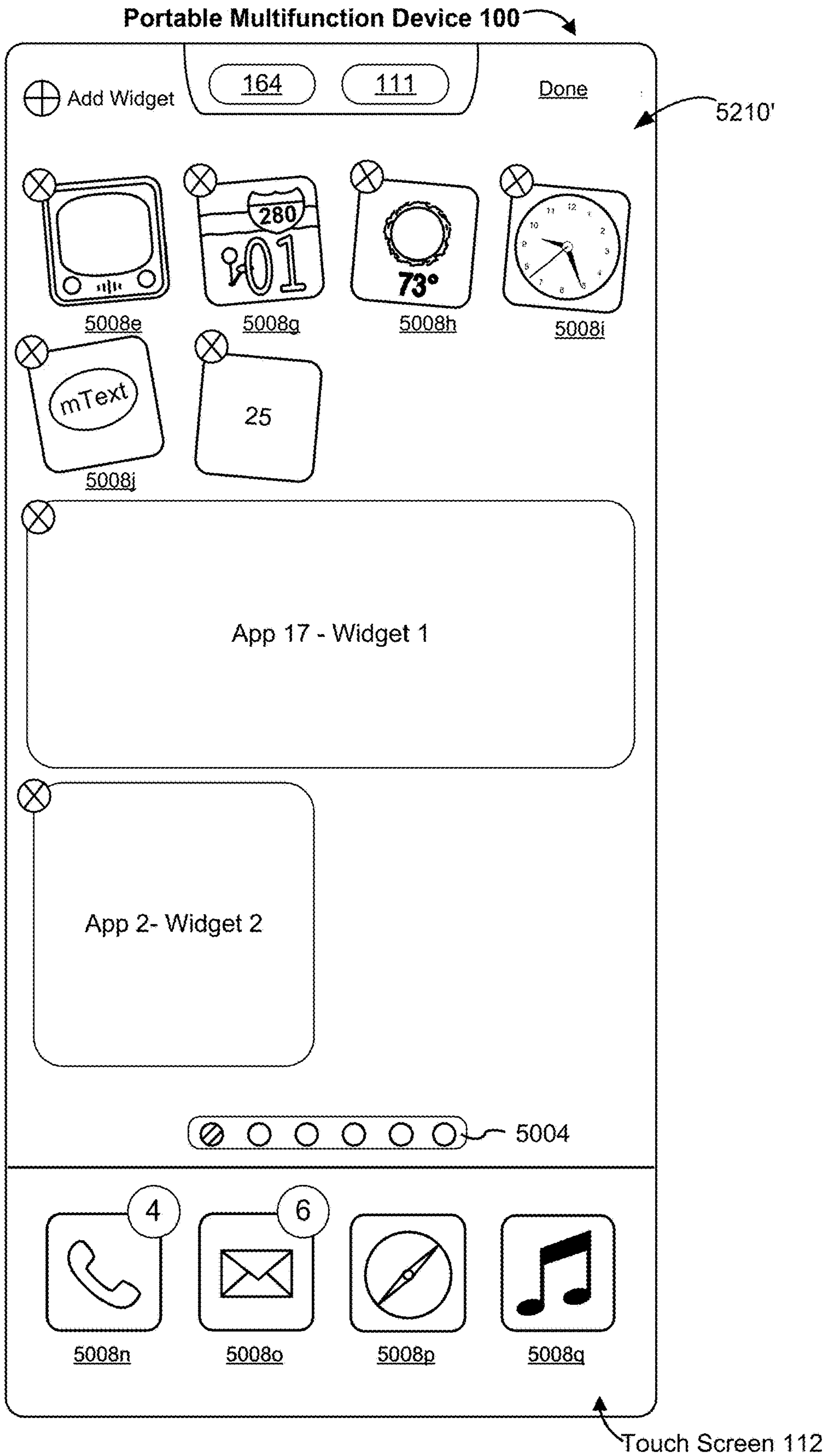
Figure 5H21

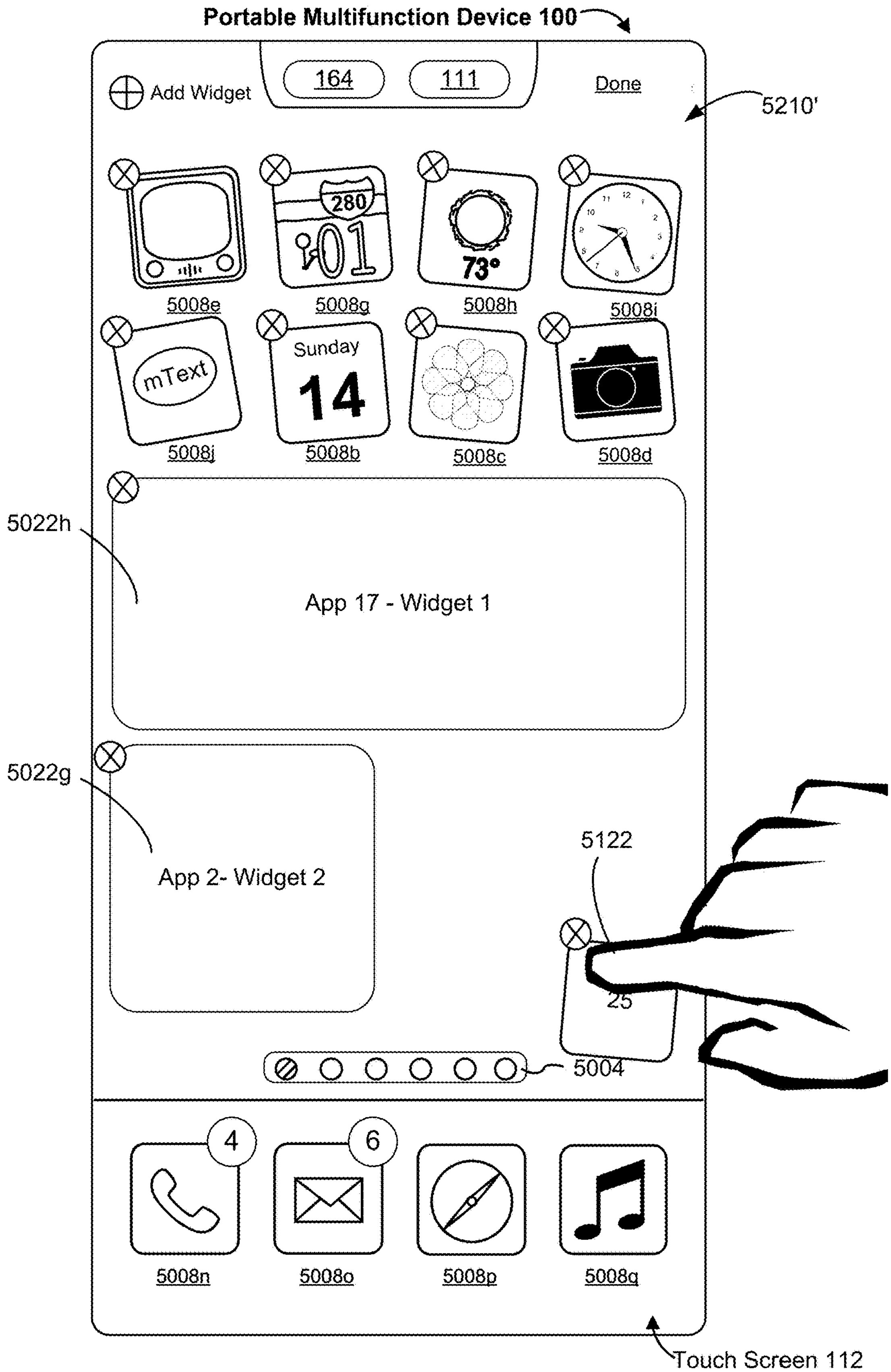
Figure 5H22

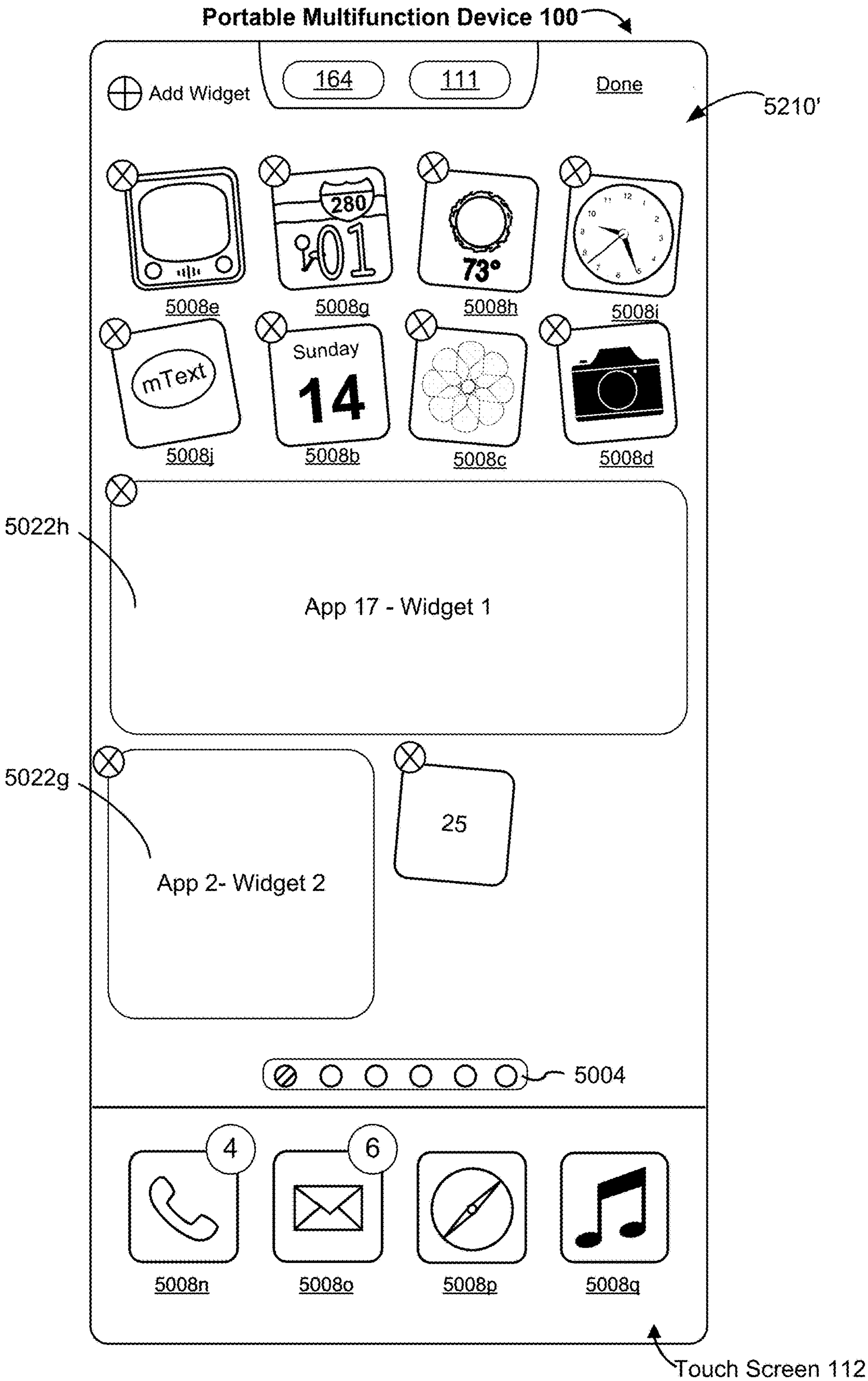
Figure 5H23

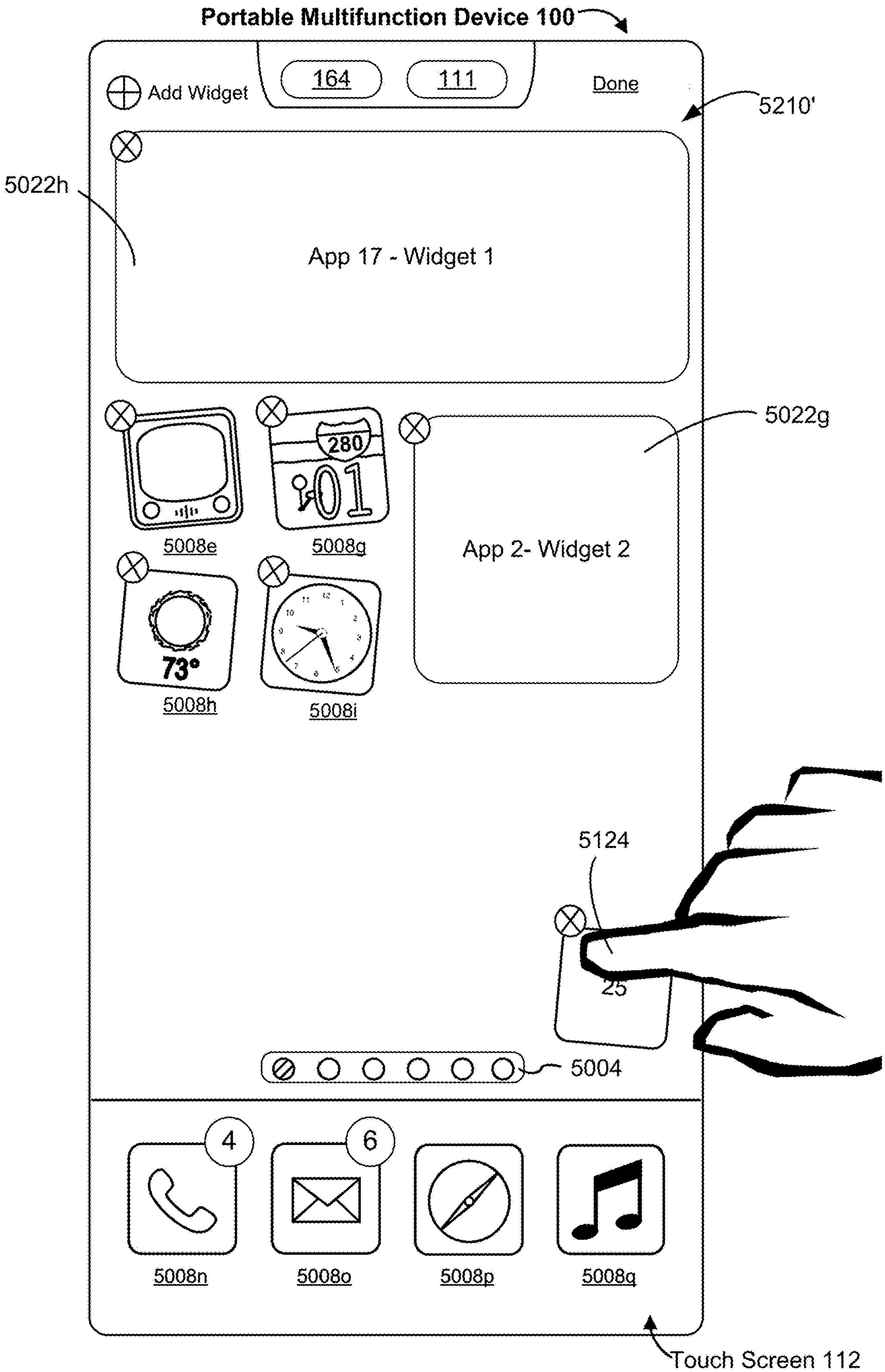
Figure 5H24

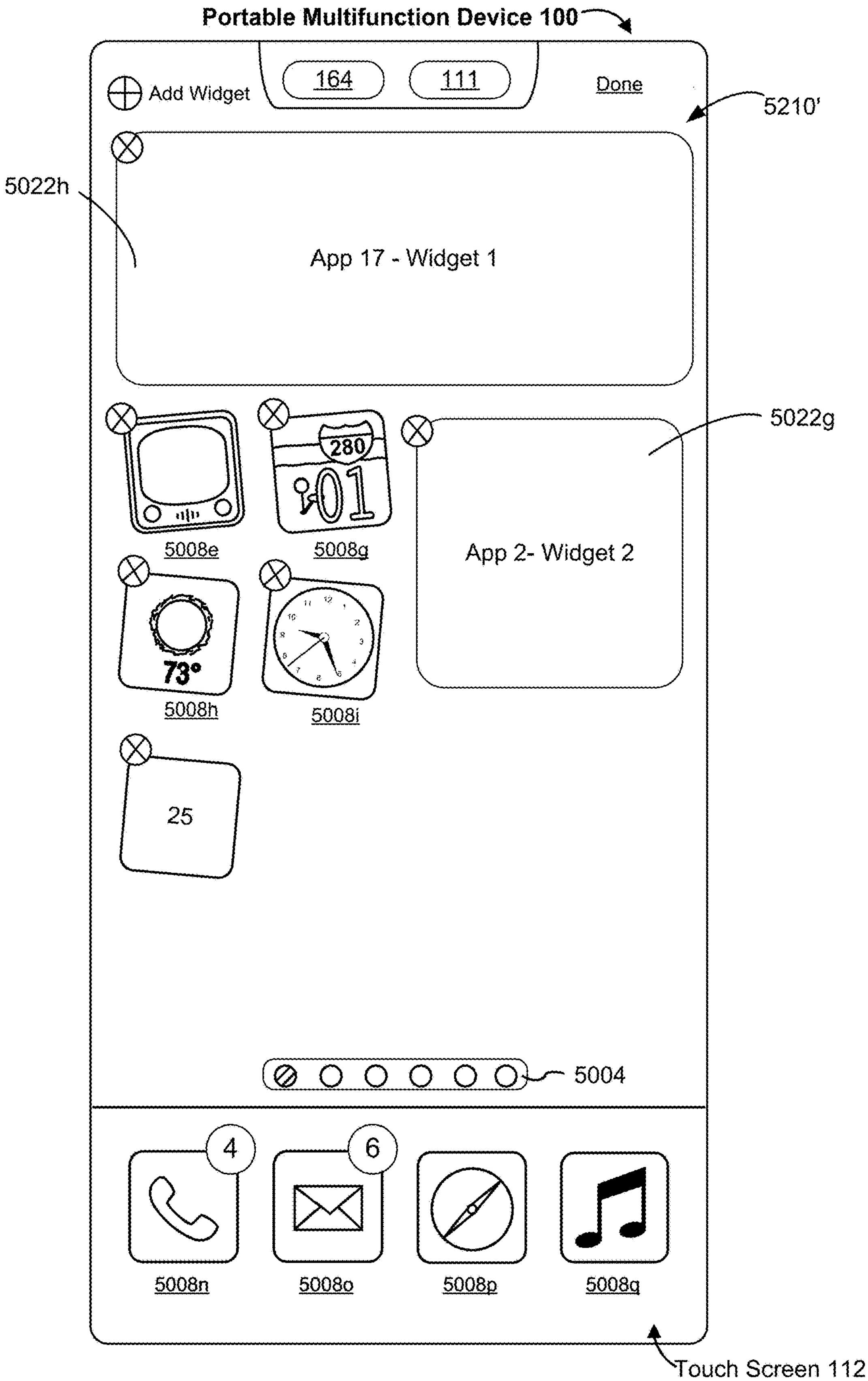
Figure 5H25

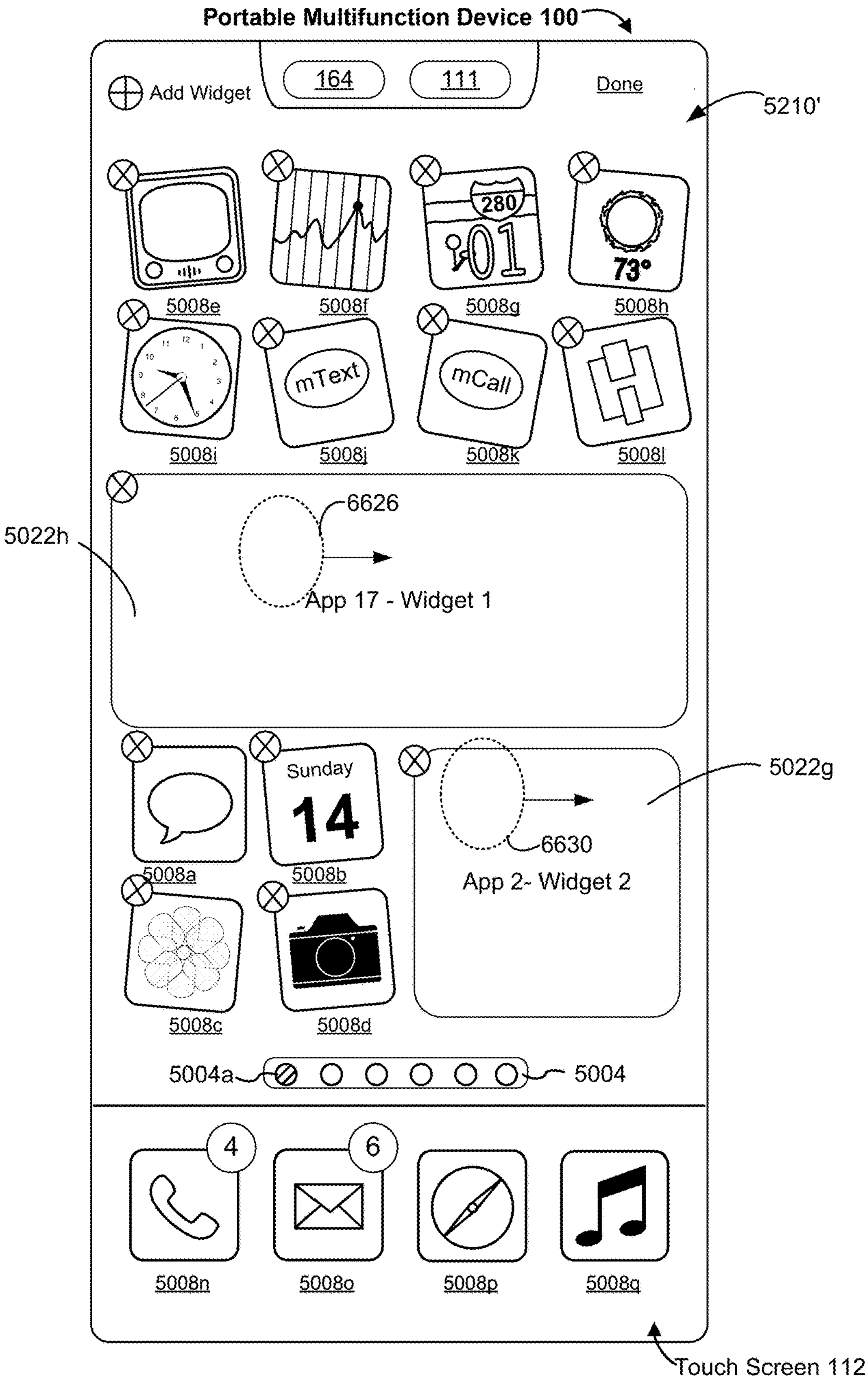
Figure 5H26

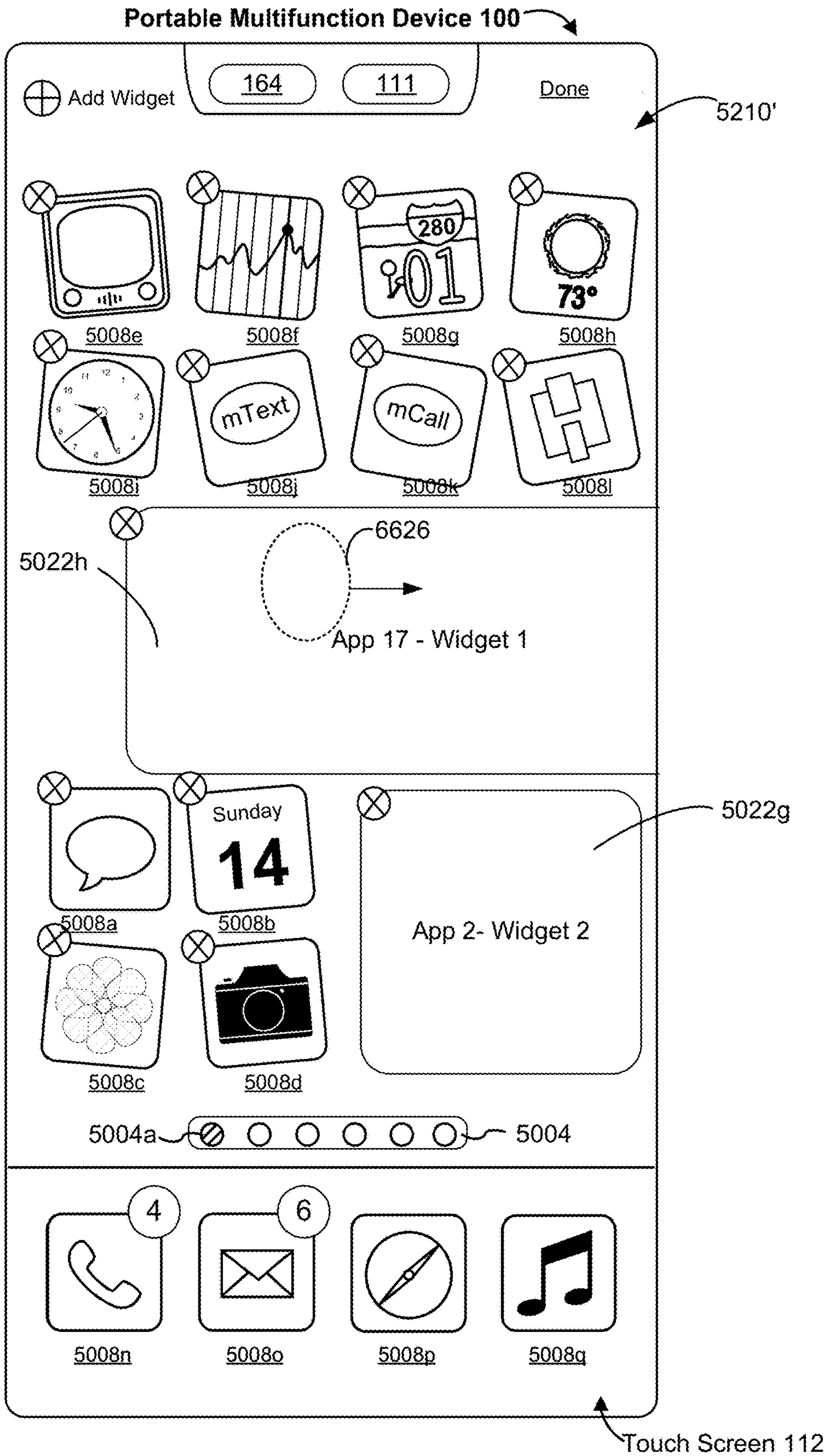
Figure 5H27

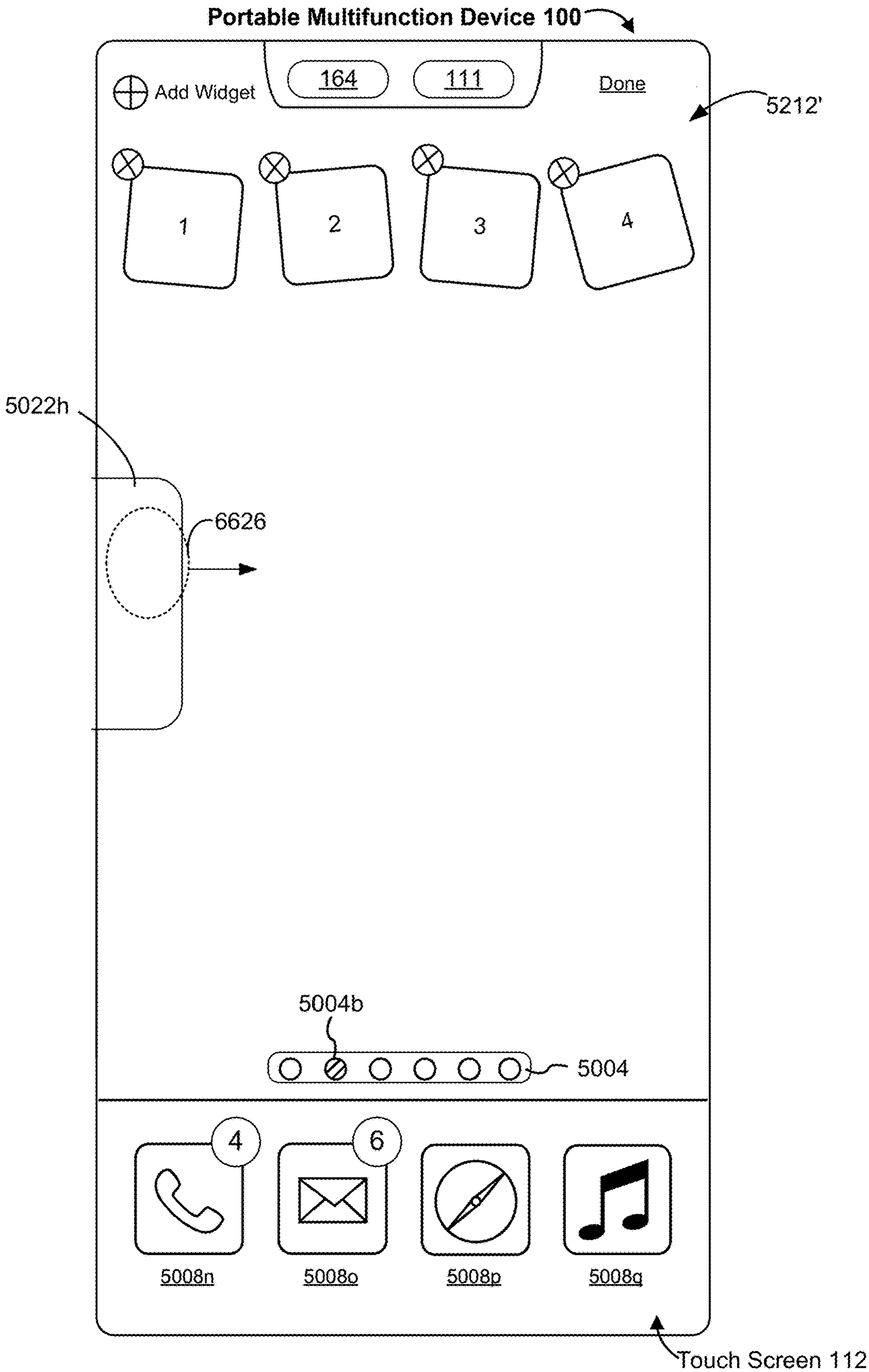
Figure 5H28

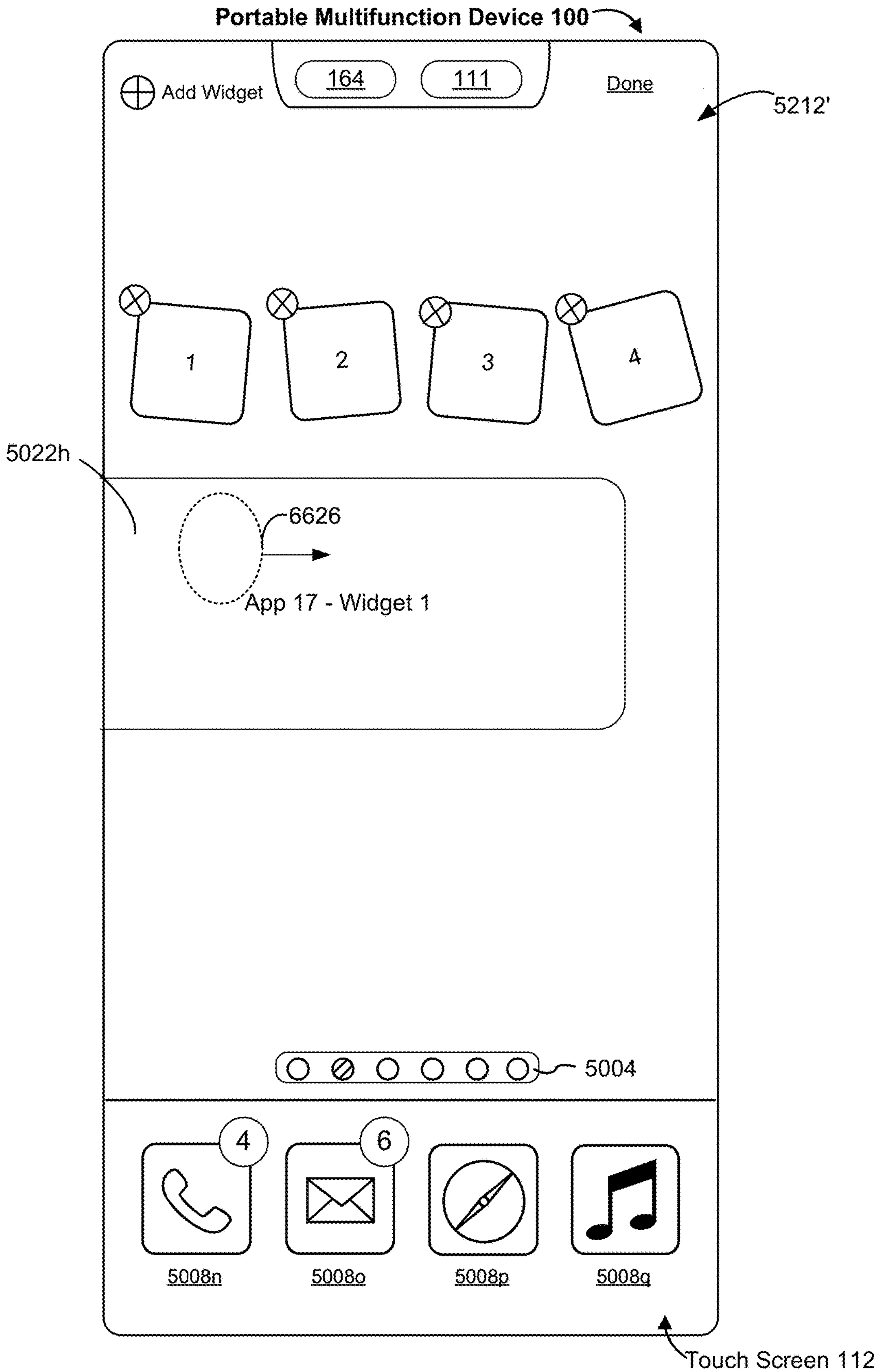
Figure 5H29

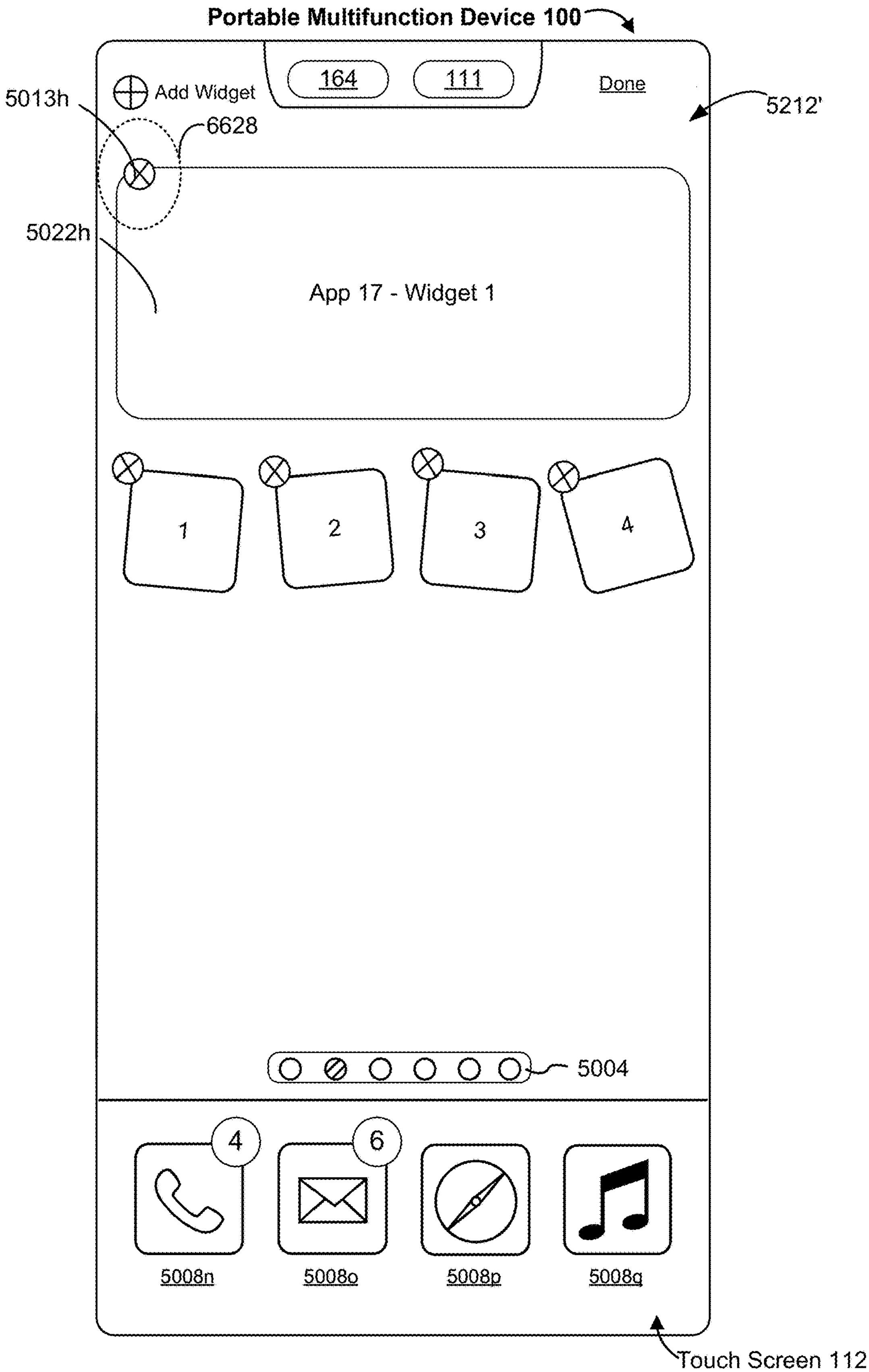
Figure 5H30

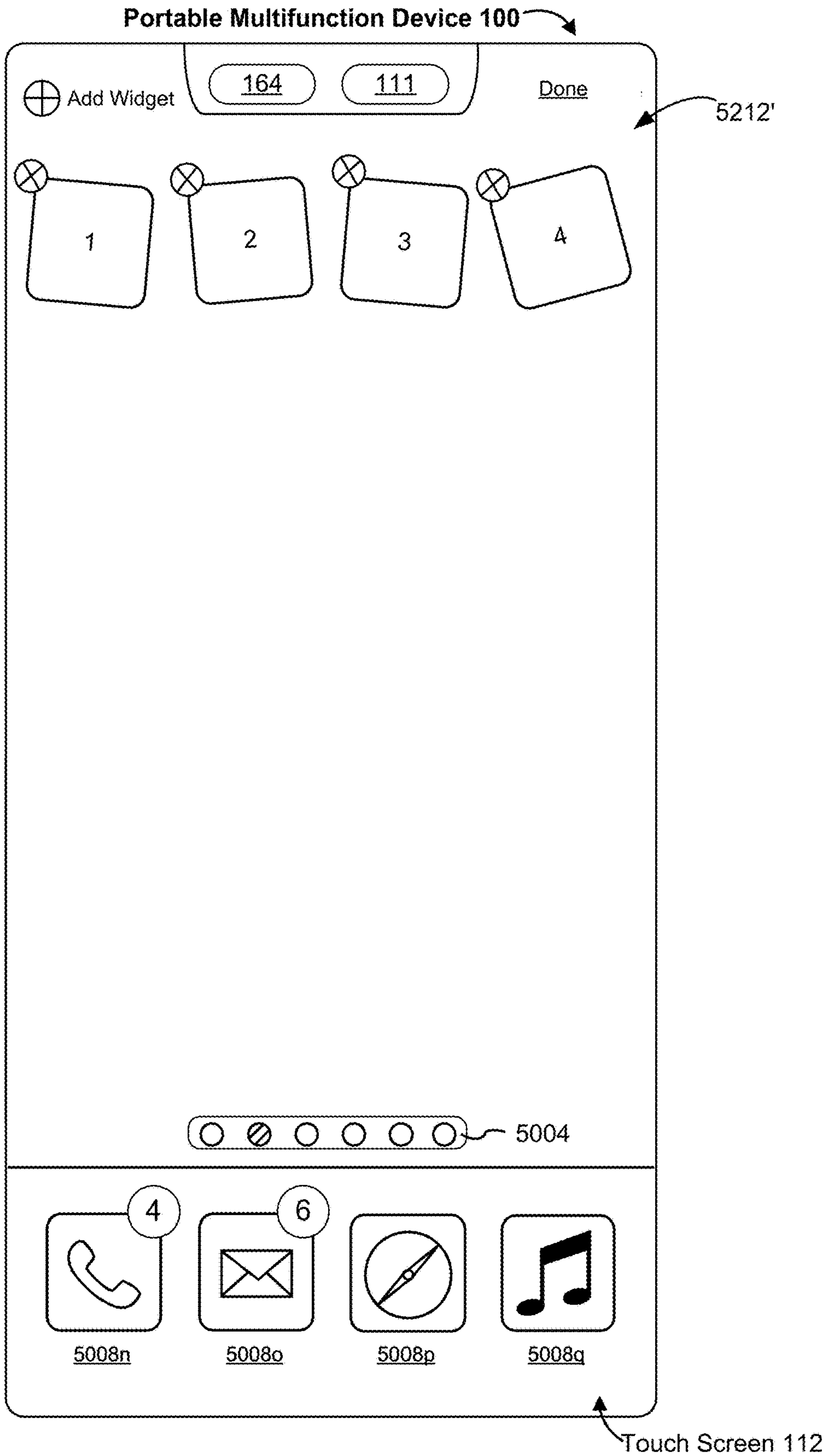
Figure 5H31

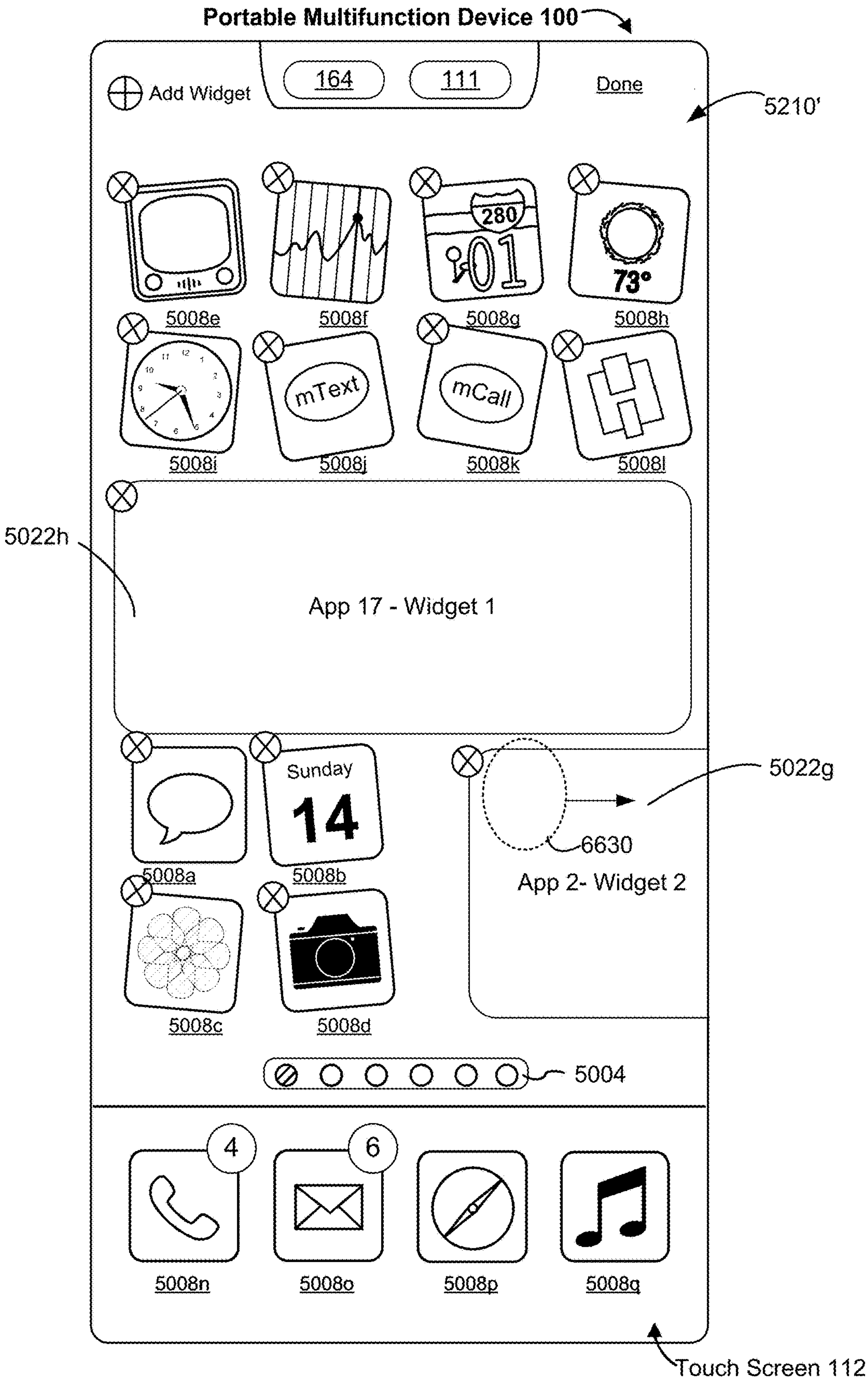
Figure 5H32

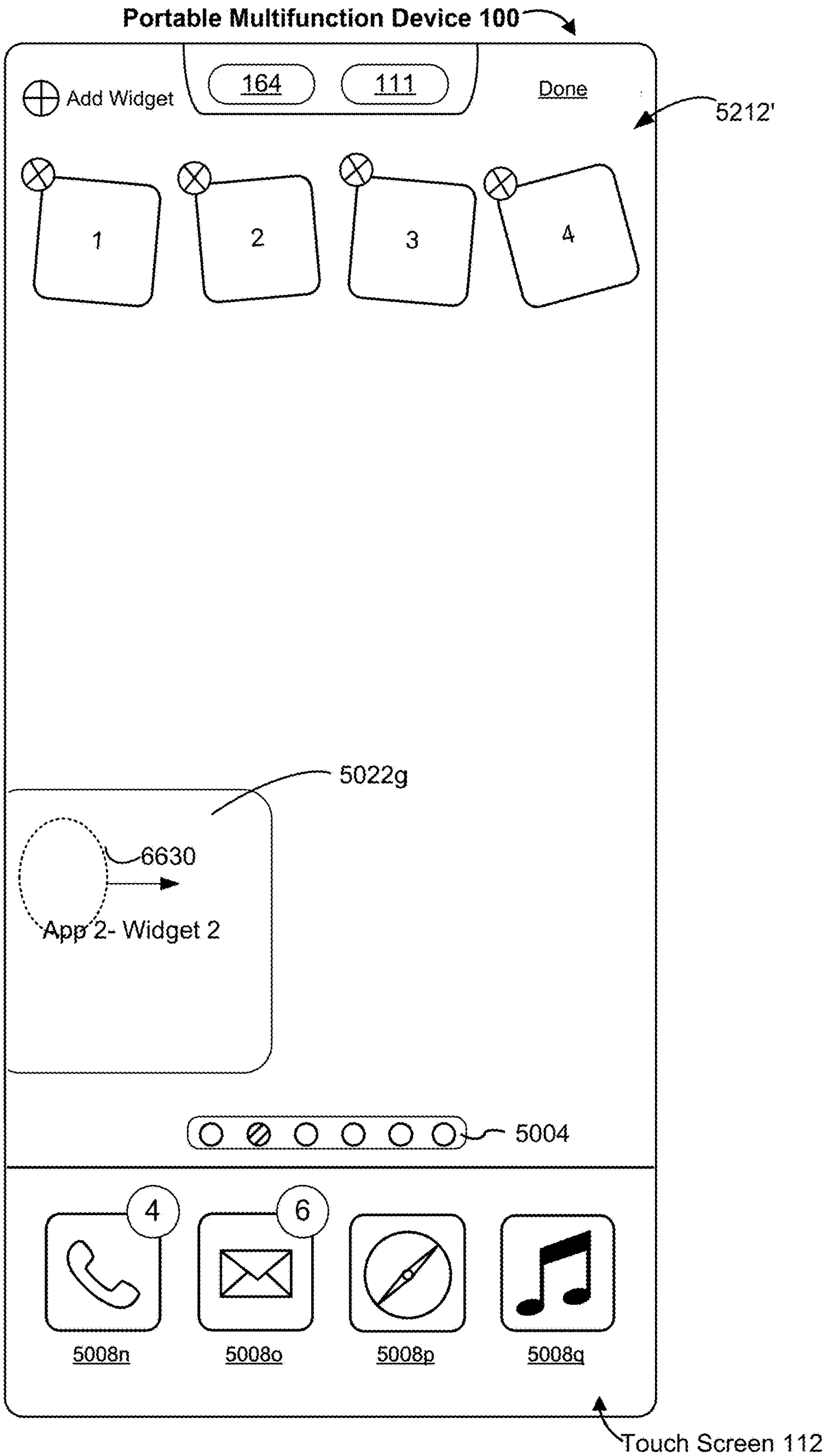
Figure 5H33

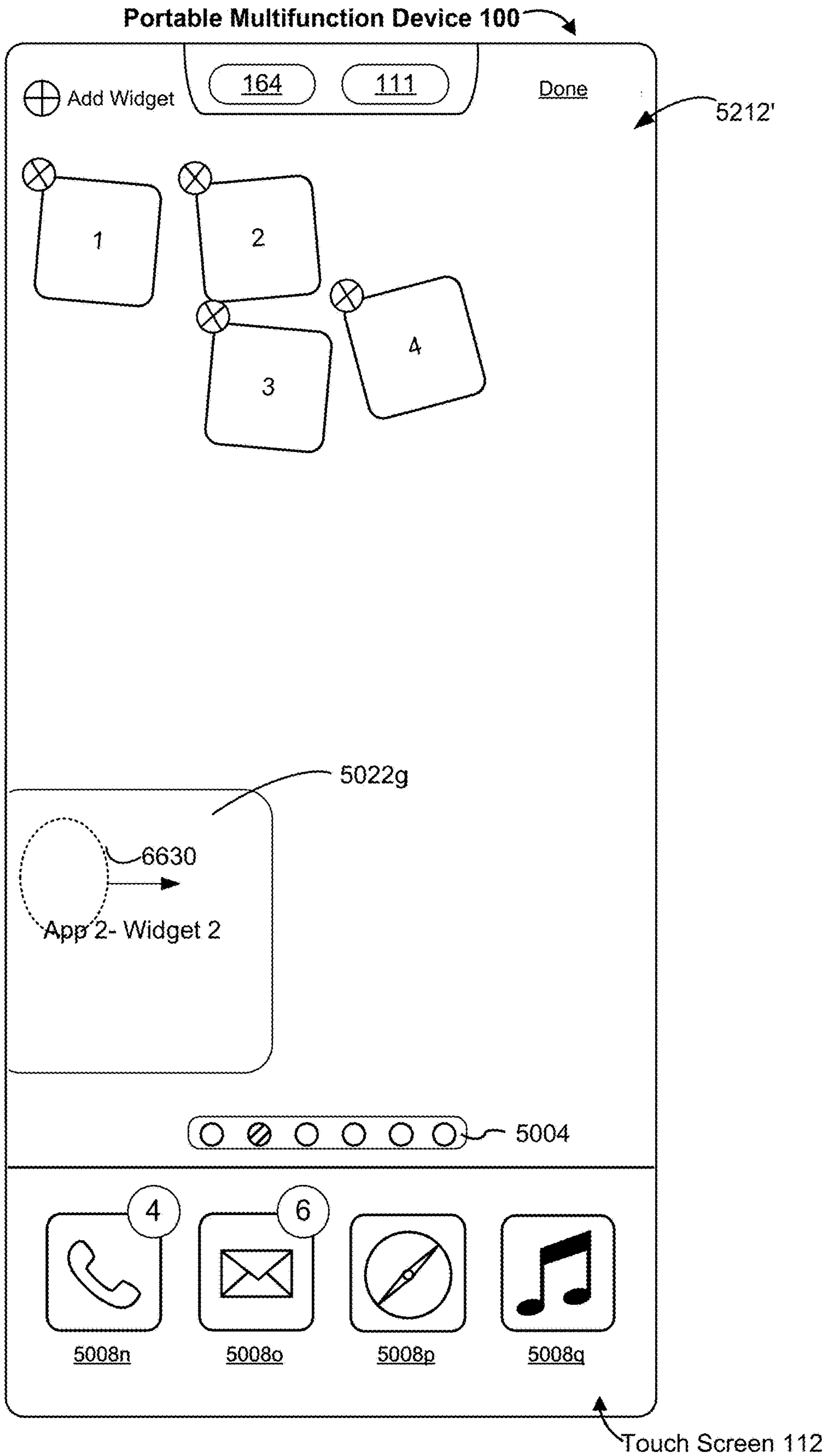
Figure 5H34

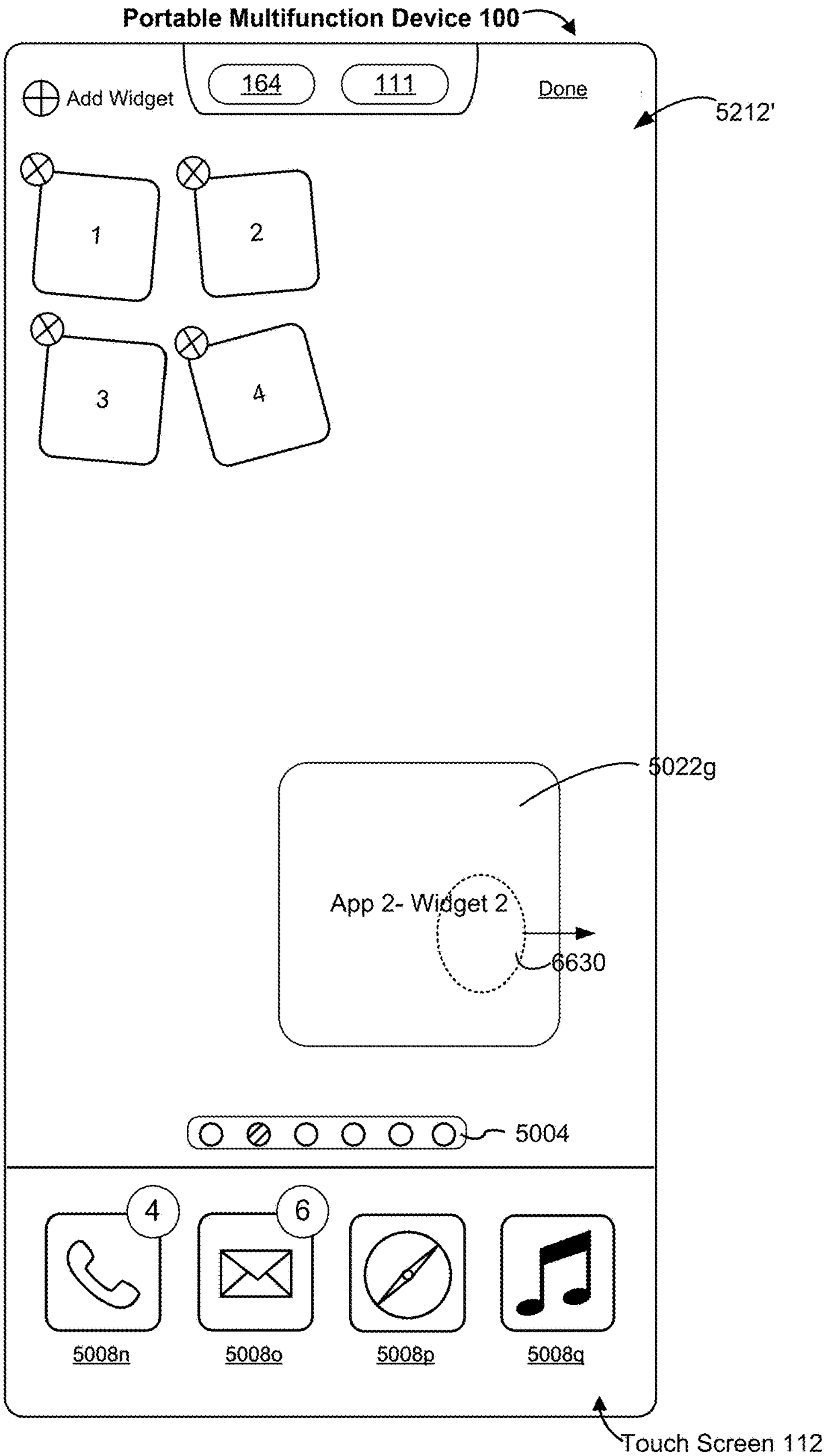
Figure 5H35

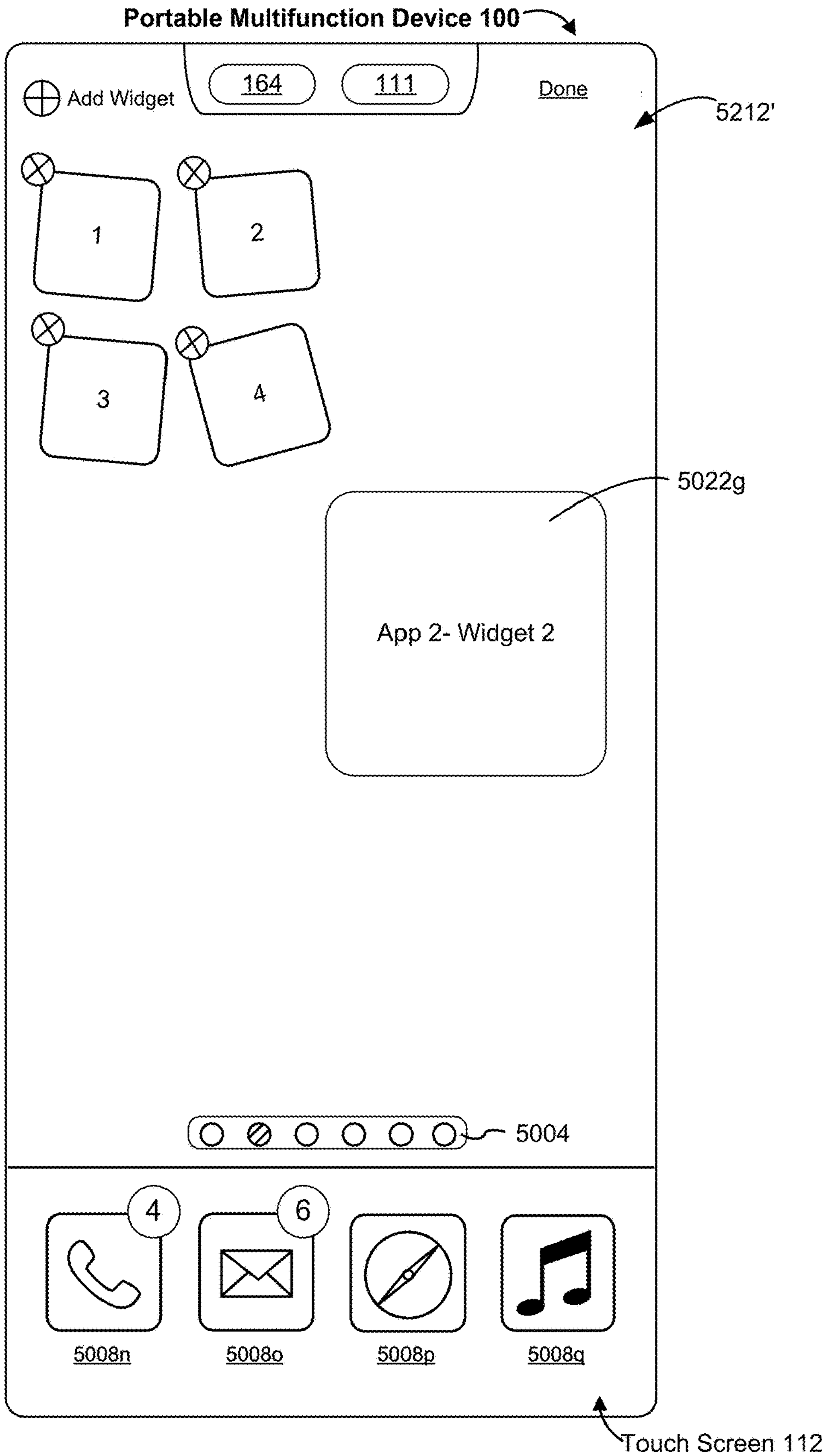
Figure 5H36

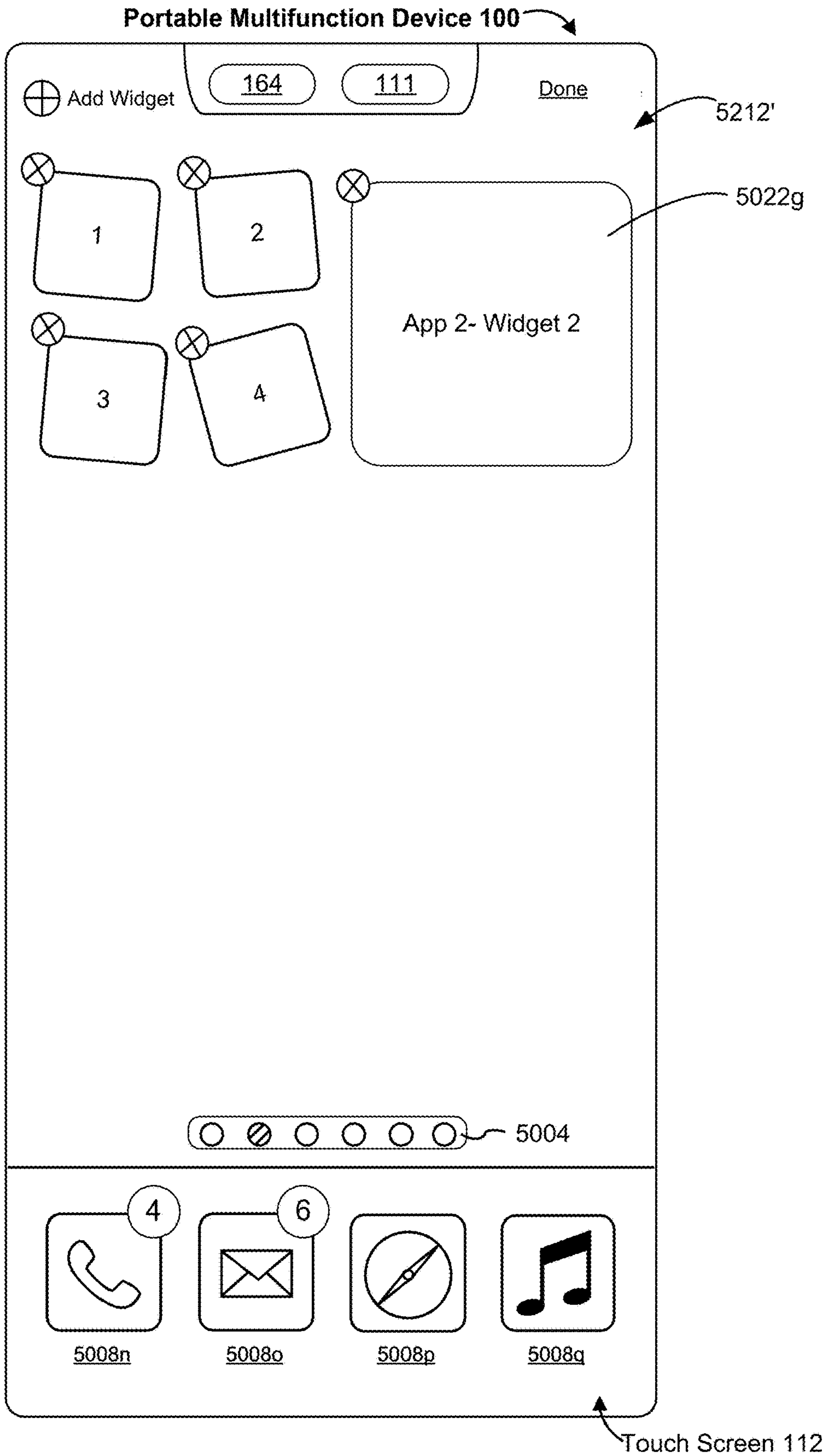
Figure 5H37

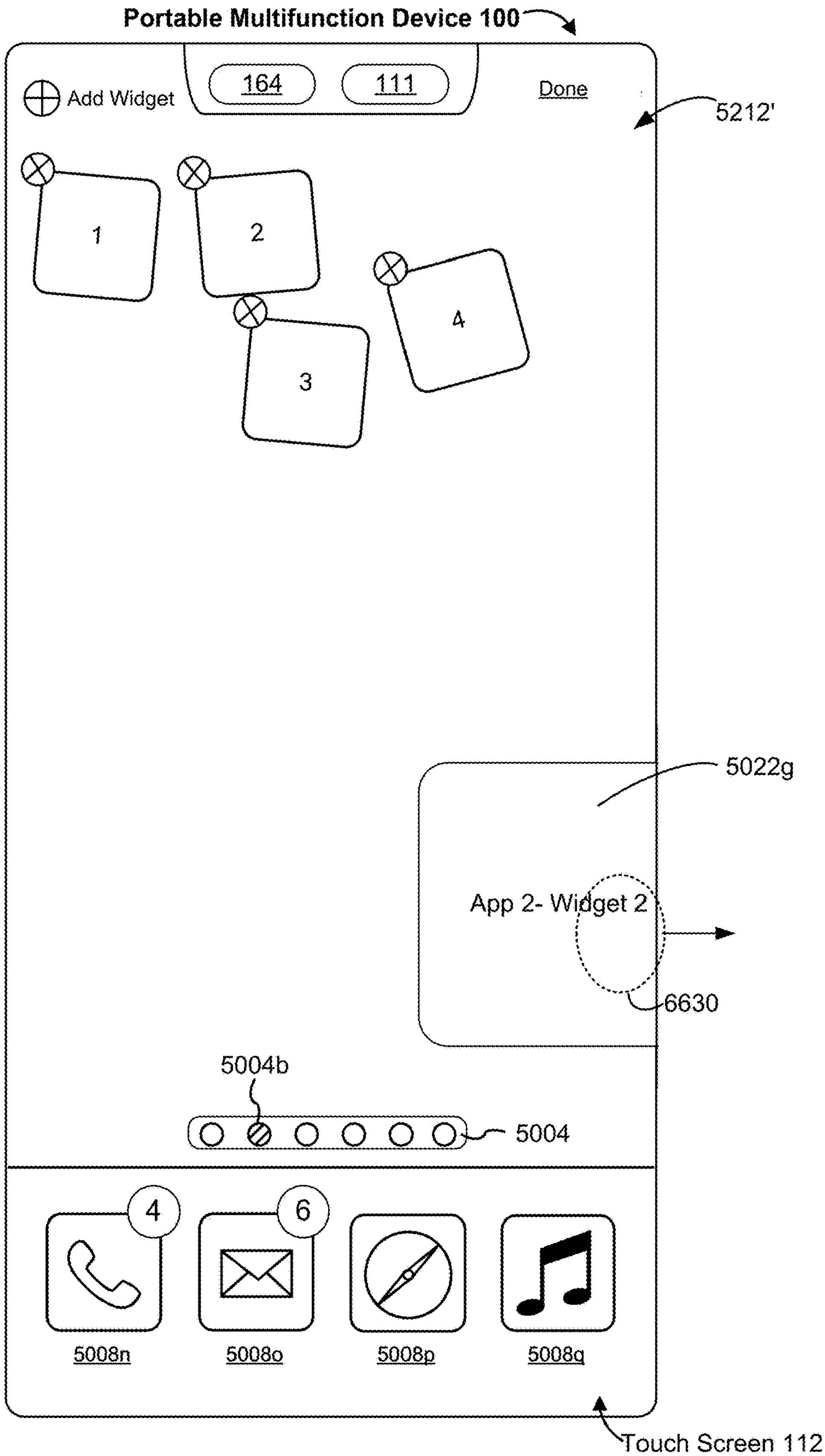
Figure 5H38

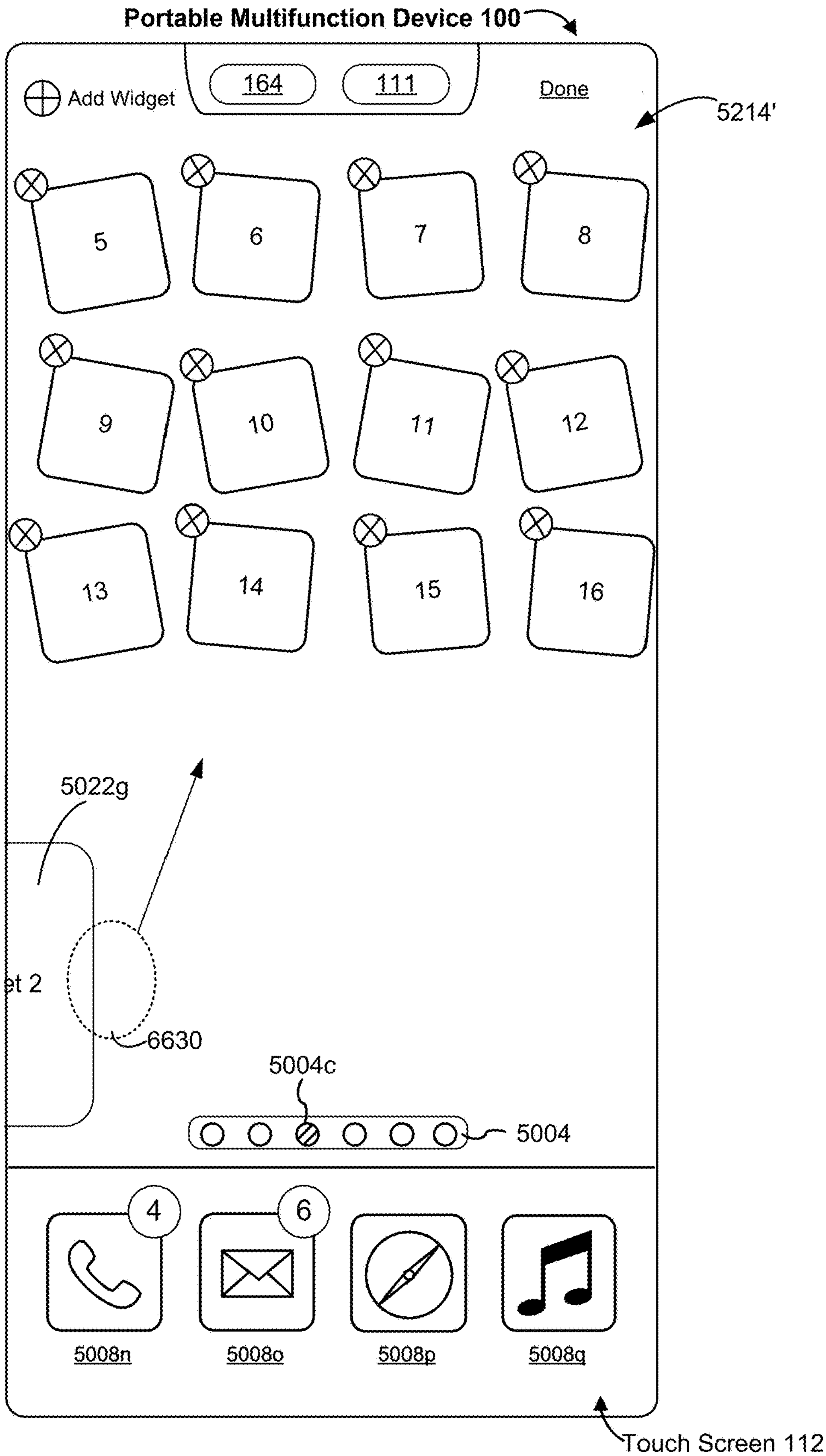
Figure 5H39

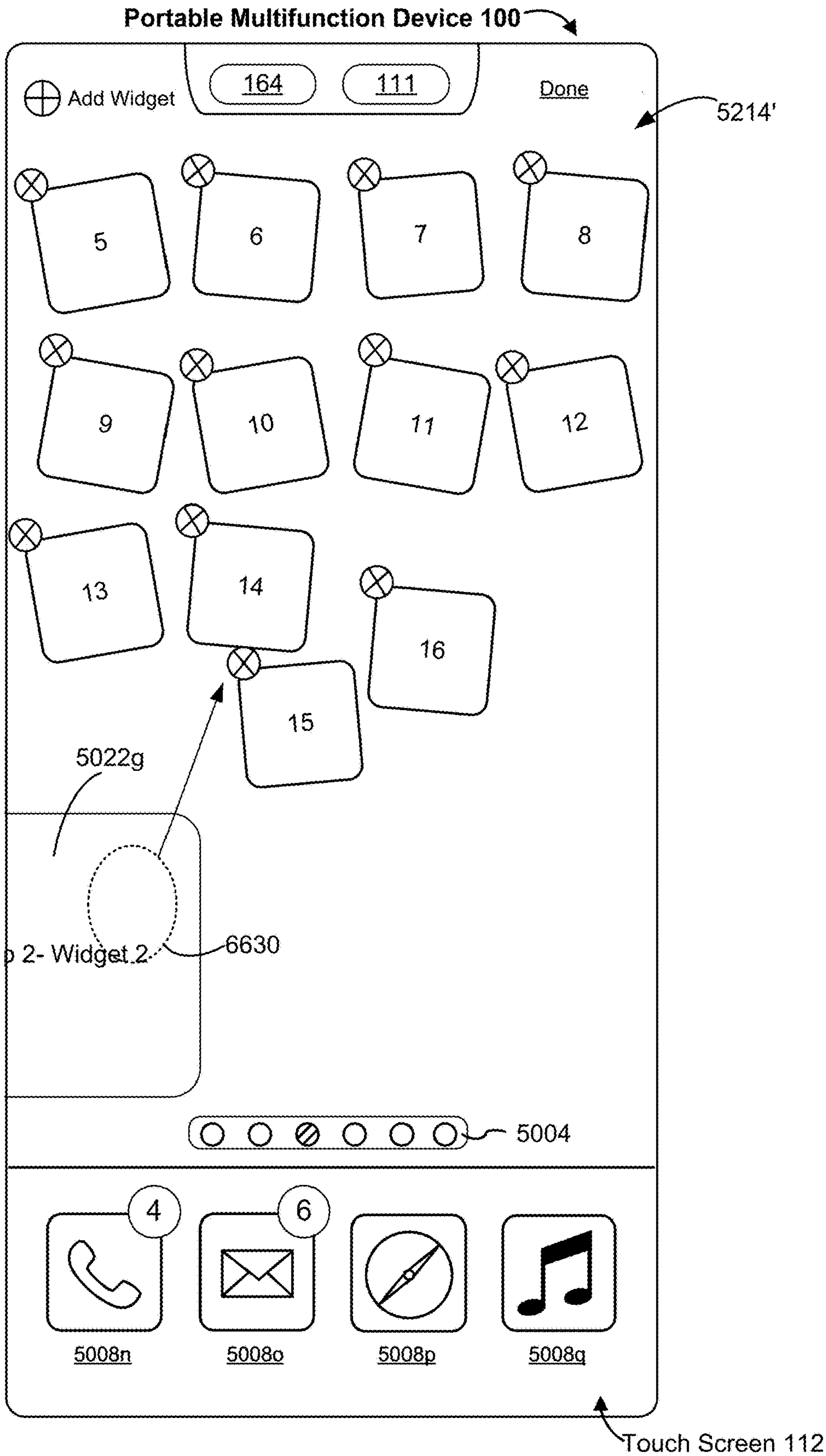
Figure 5H40

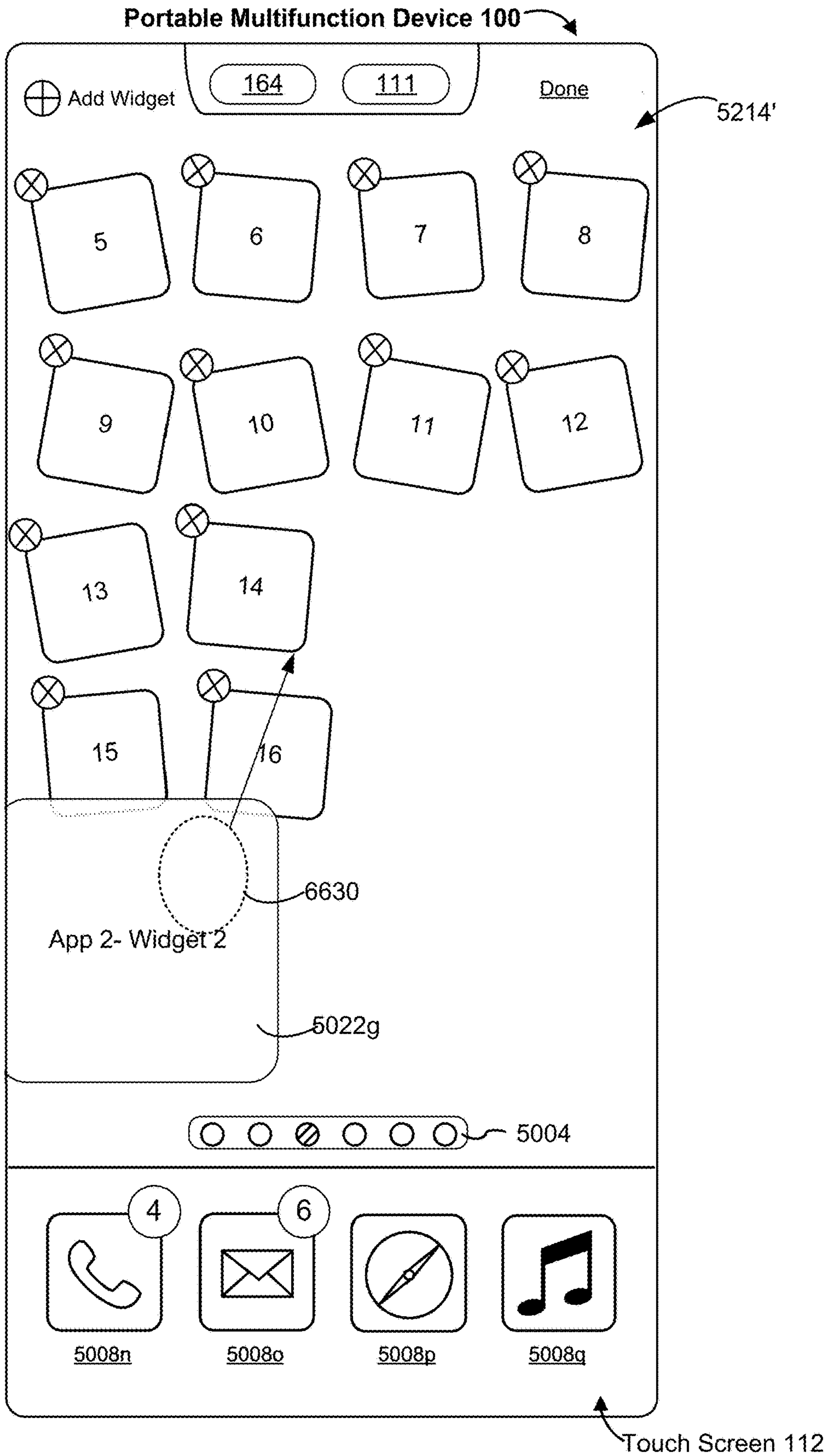
Figure 5H41

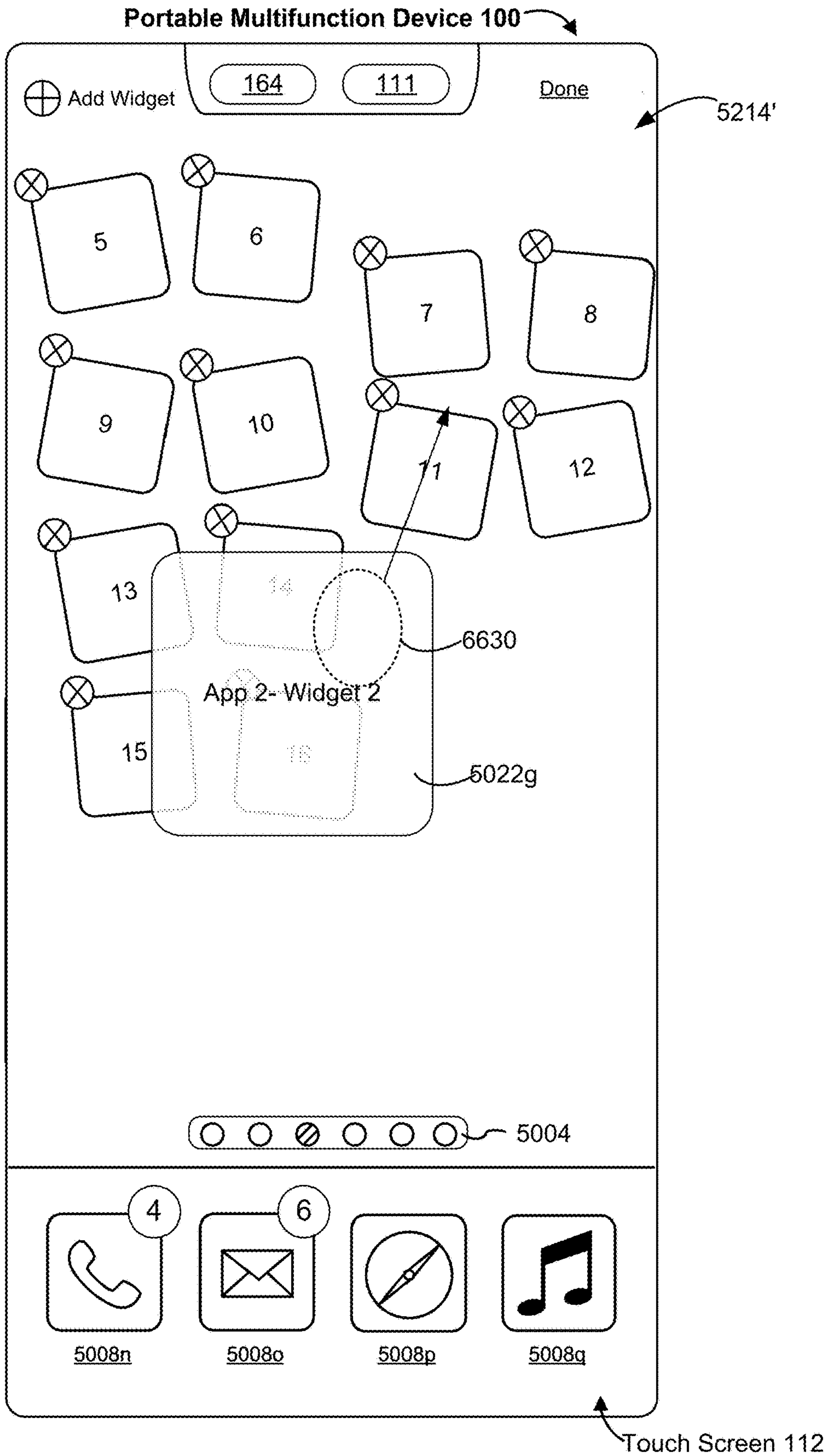
Figure 5H42

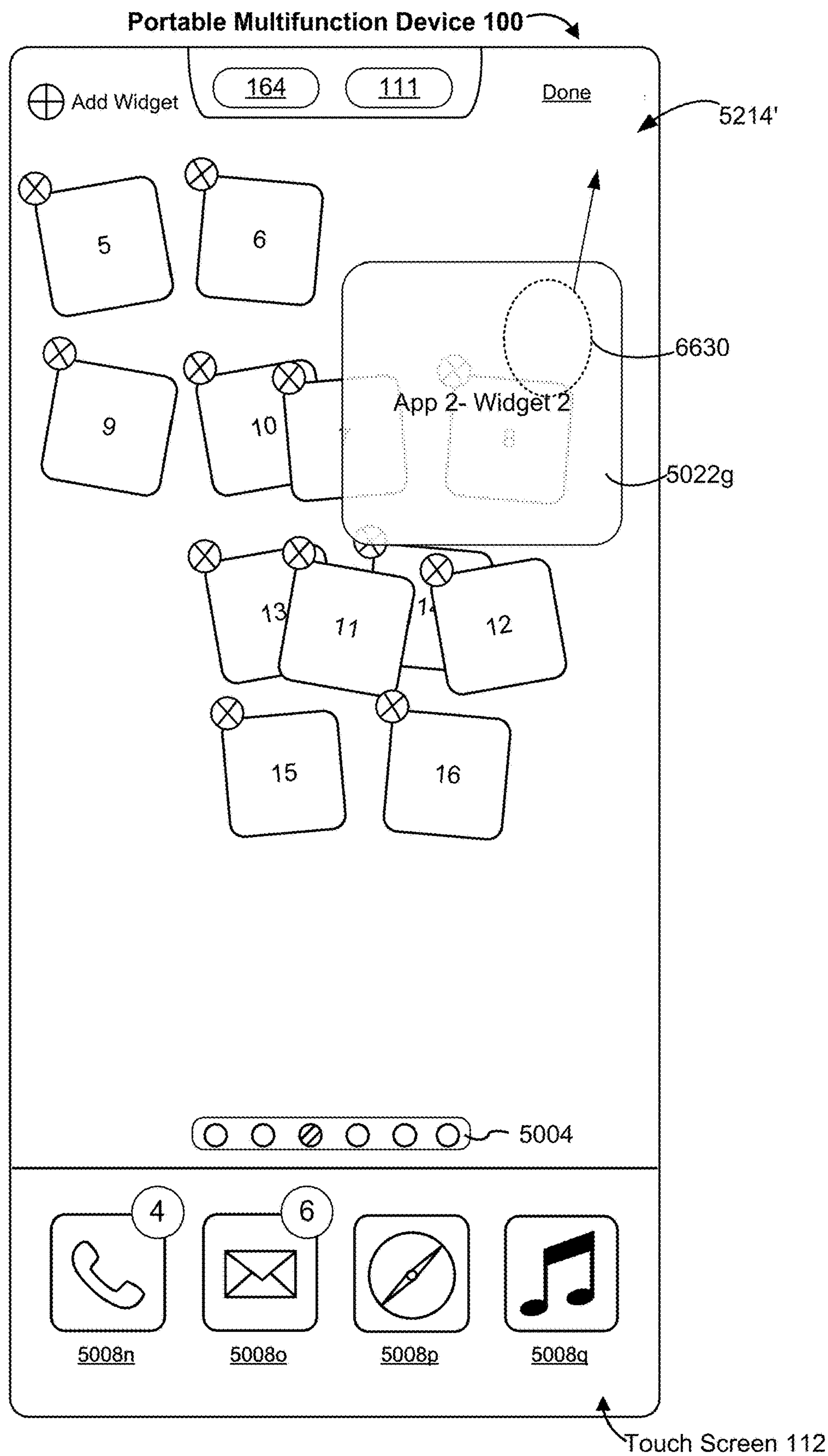
Figure 5H43

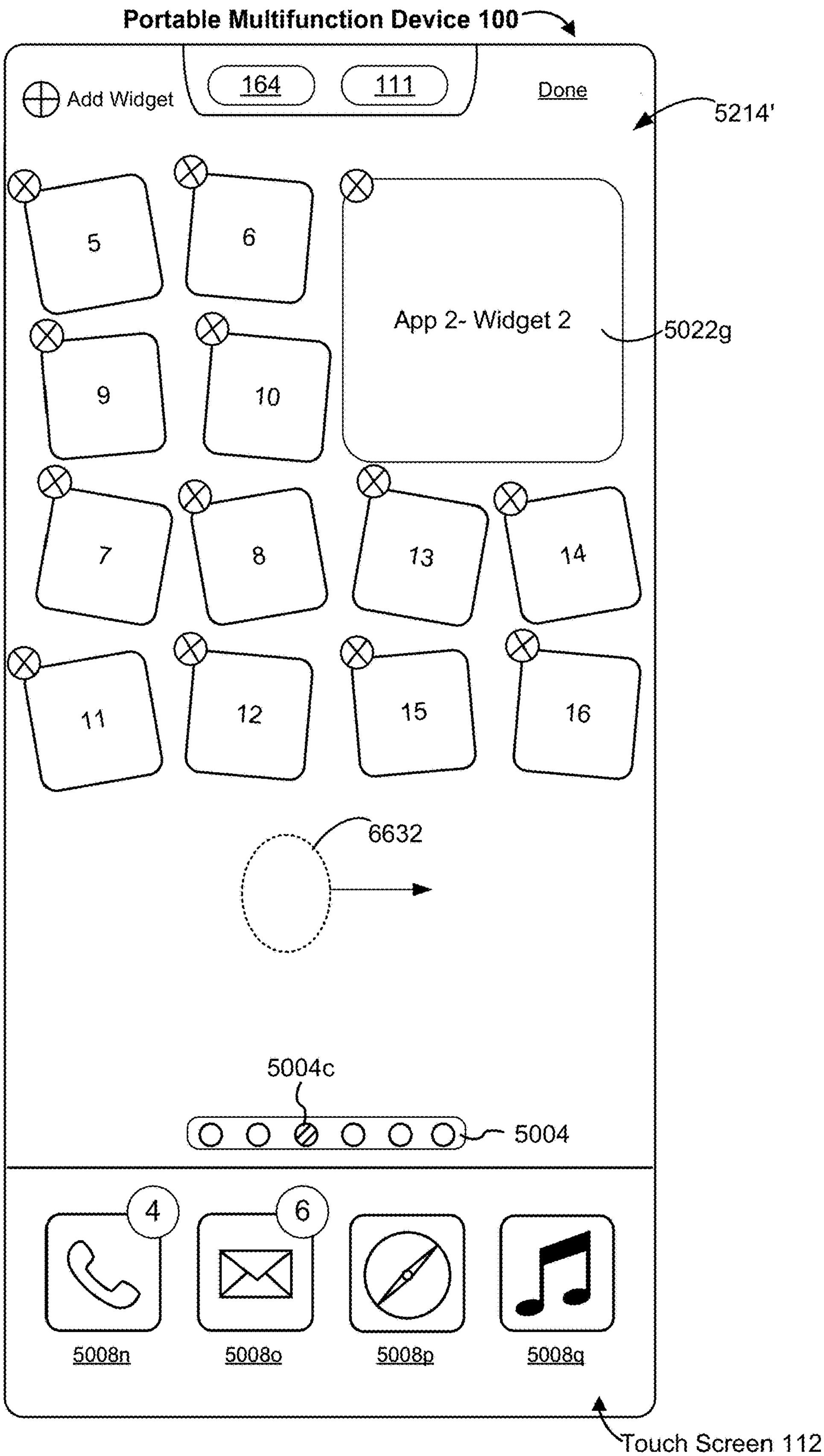
Figure 5H44

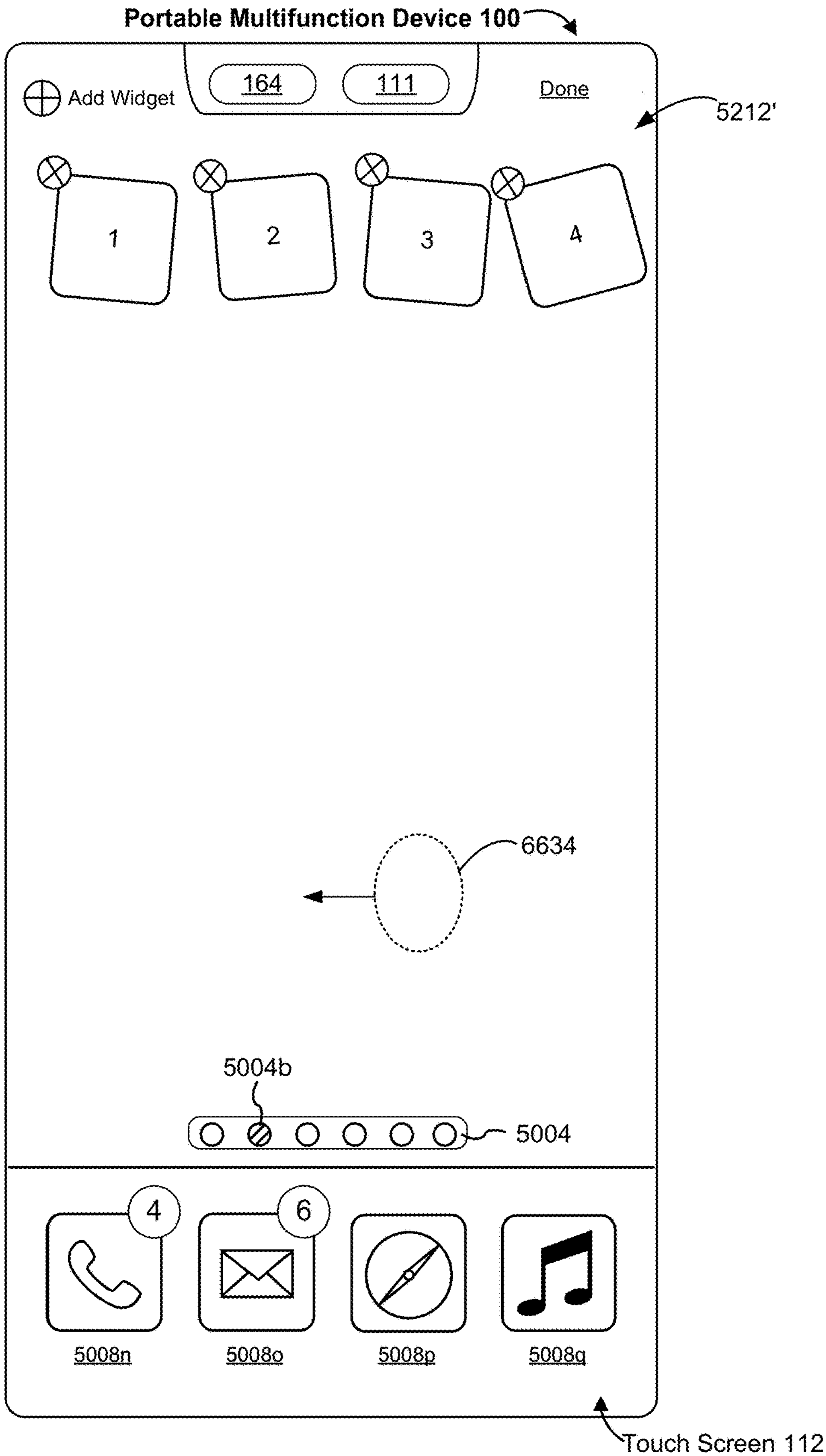
Figure 5H45

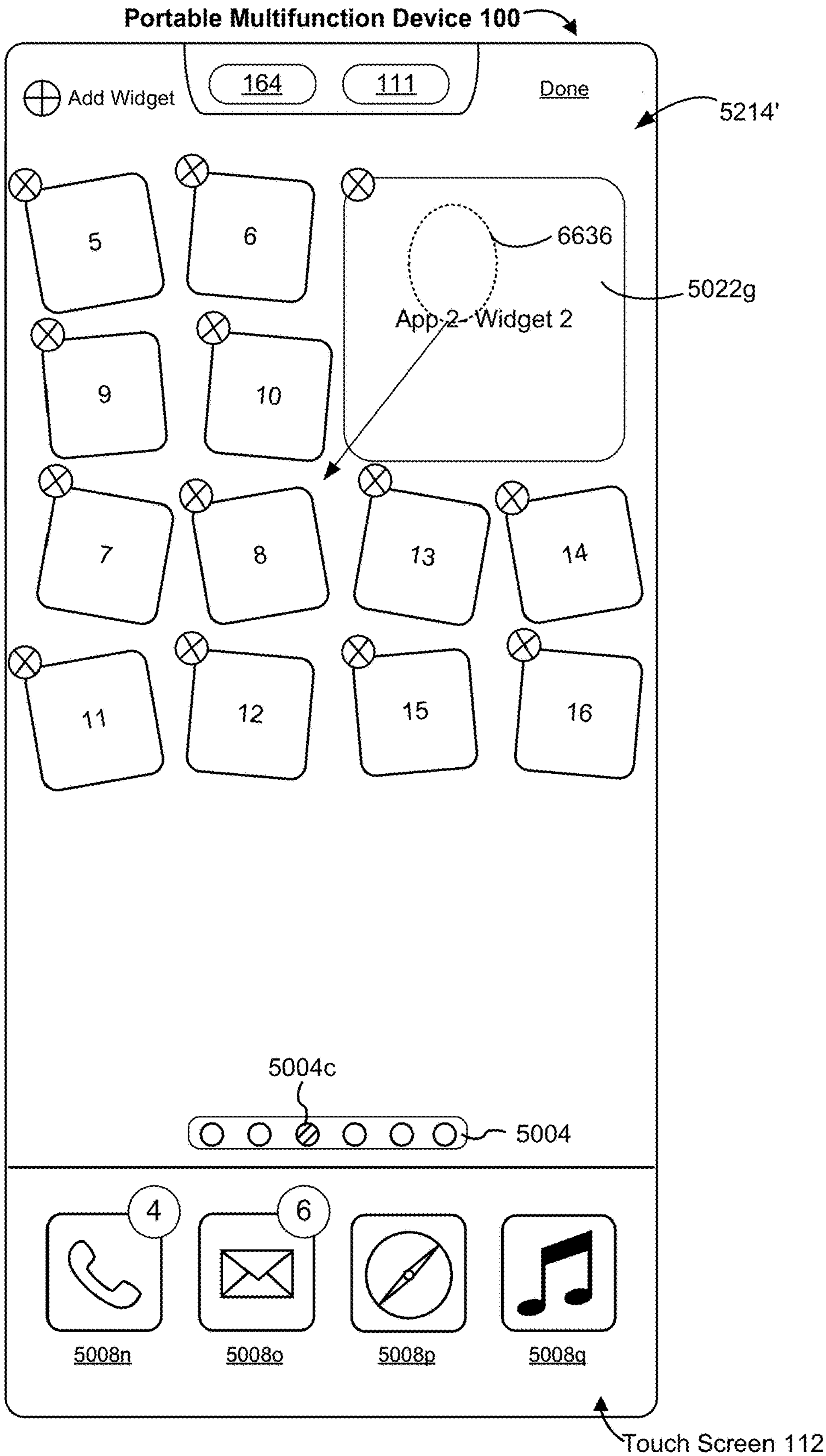
Figure 5H46

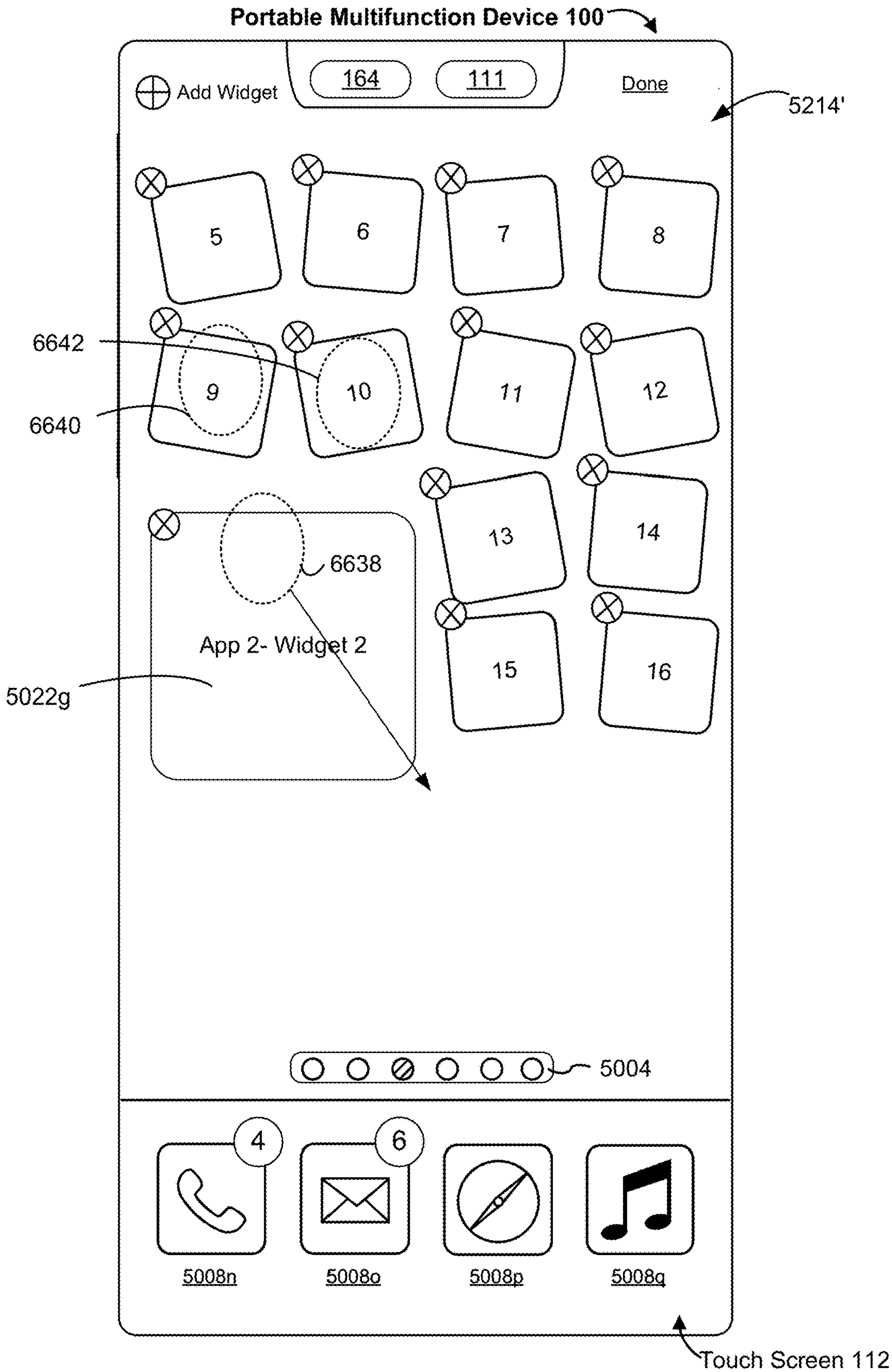
Figure 5H47

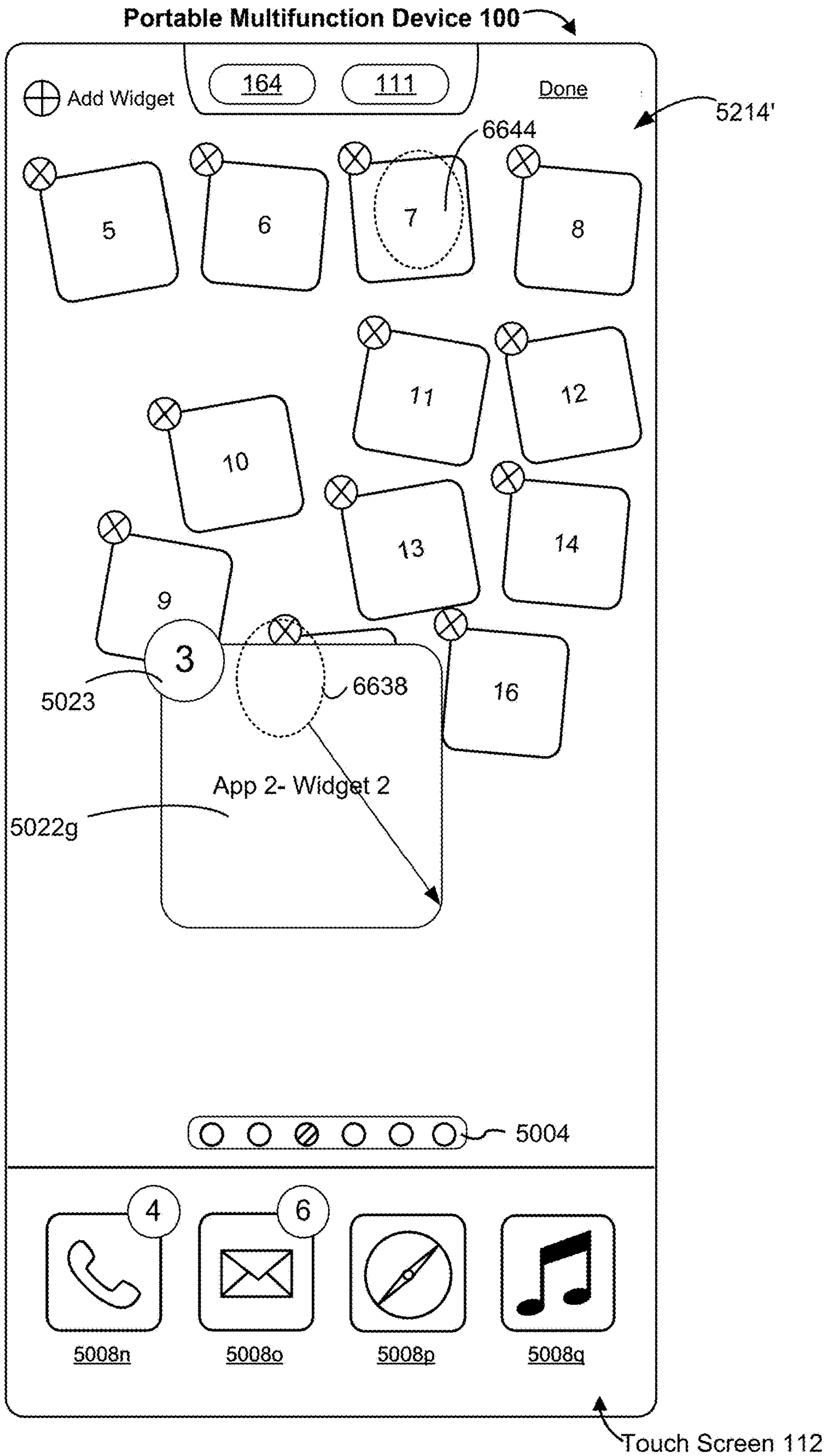
Figure 5H48

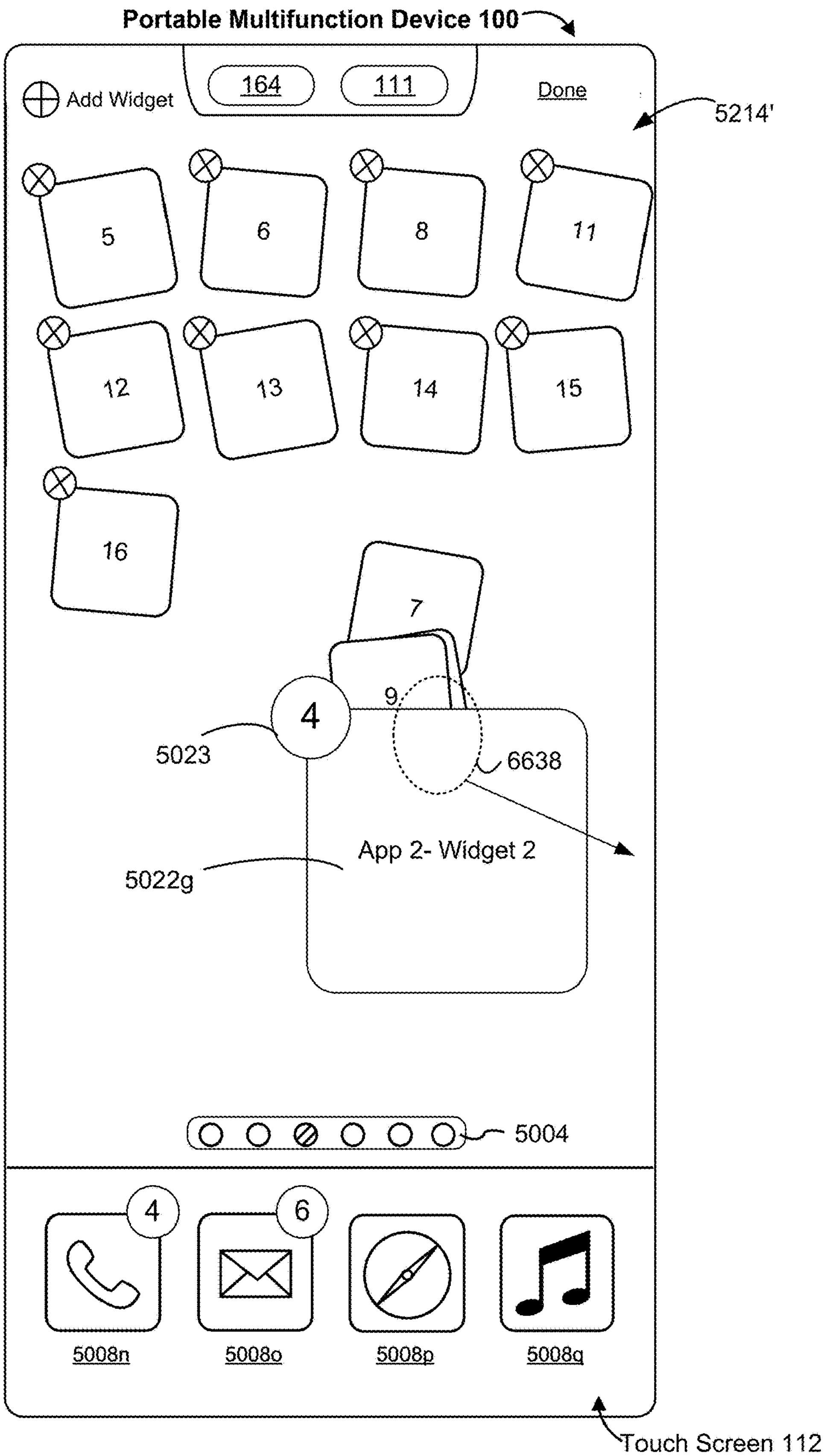
Figure 5H49

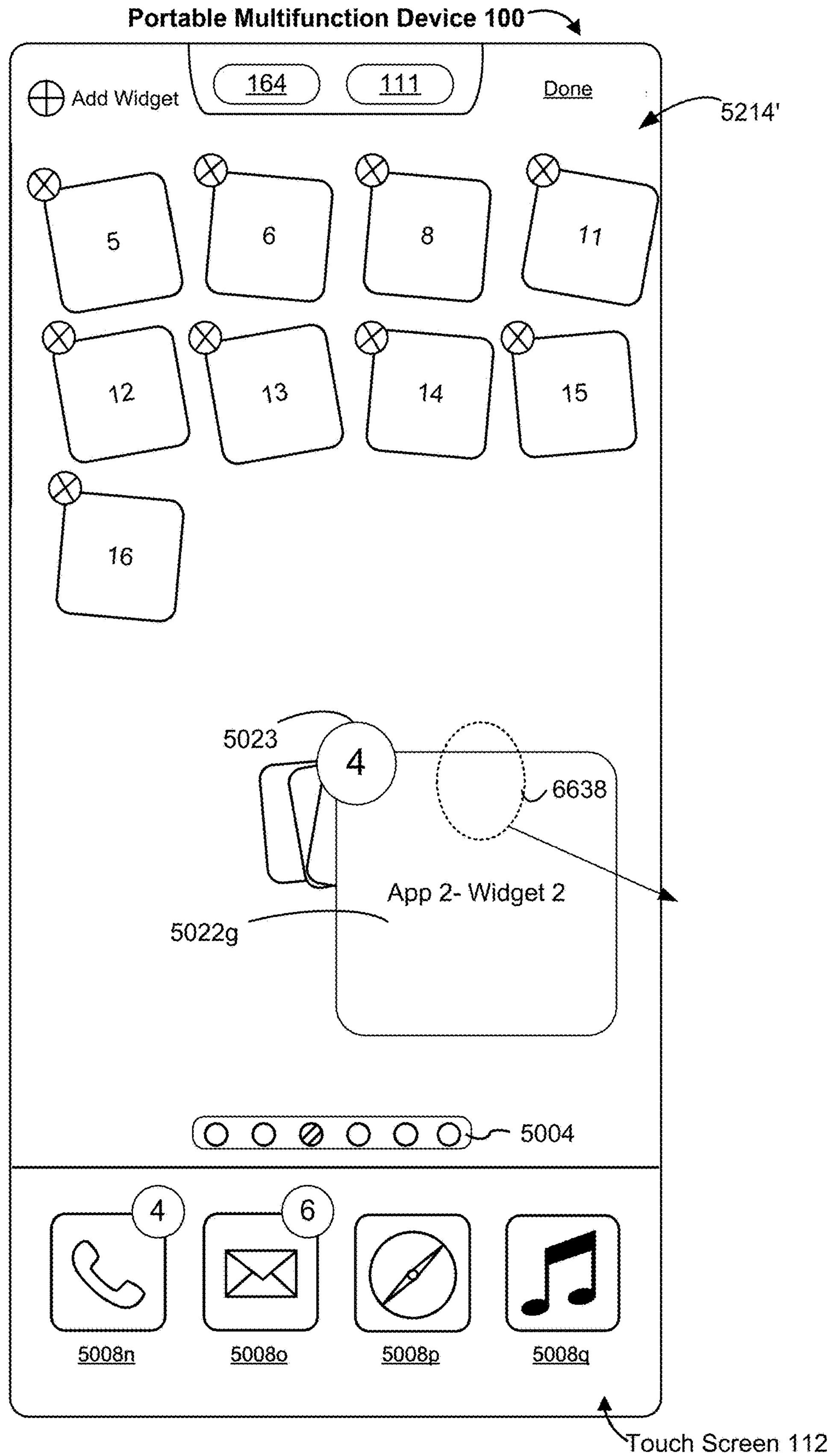
Figure 5H50

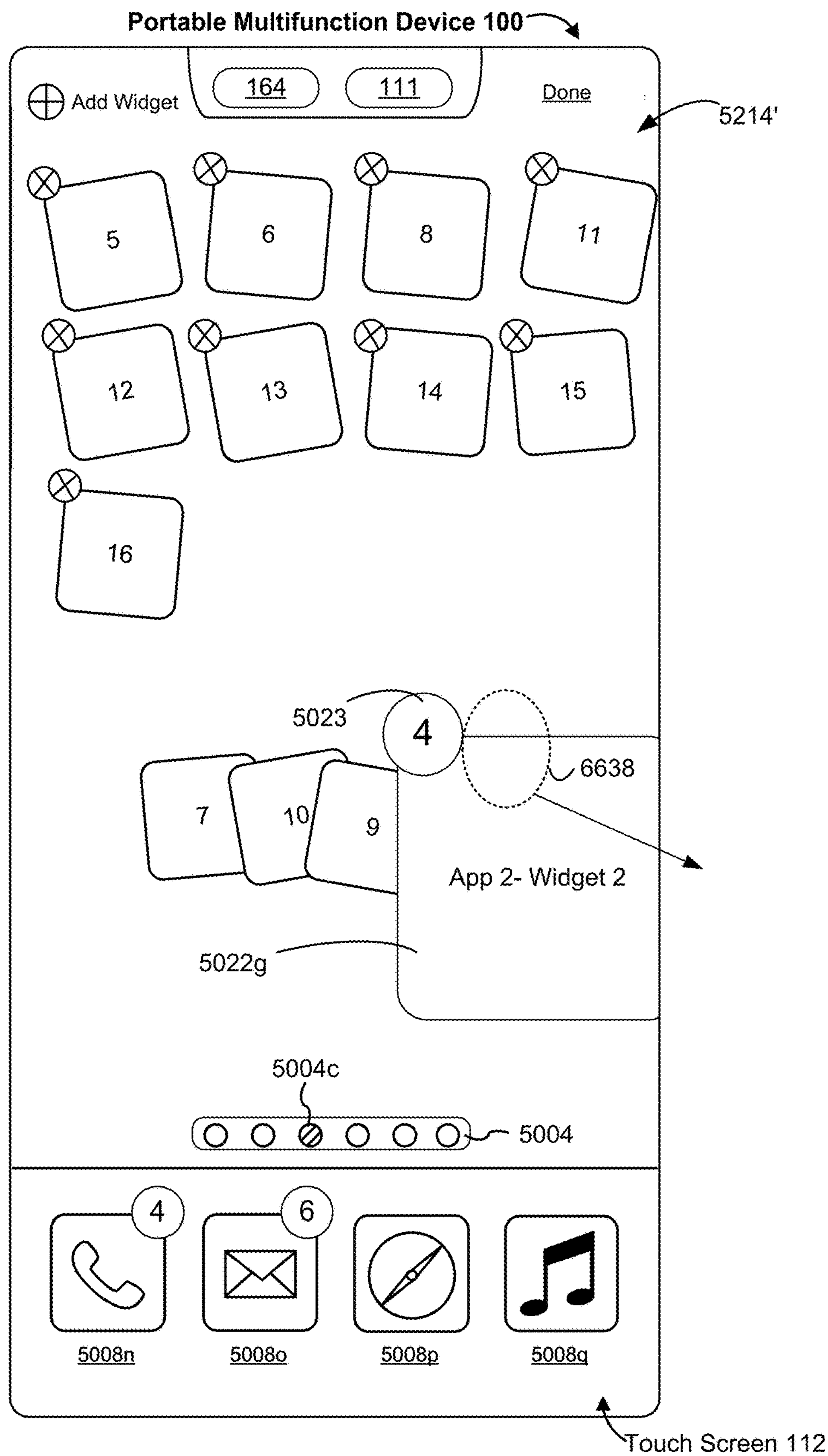
Figure 5H51

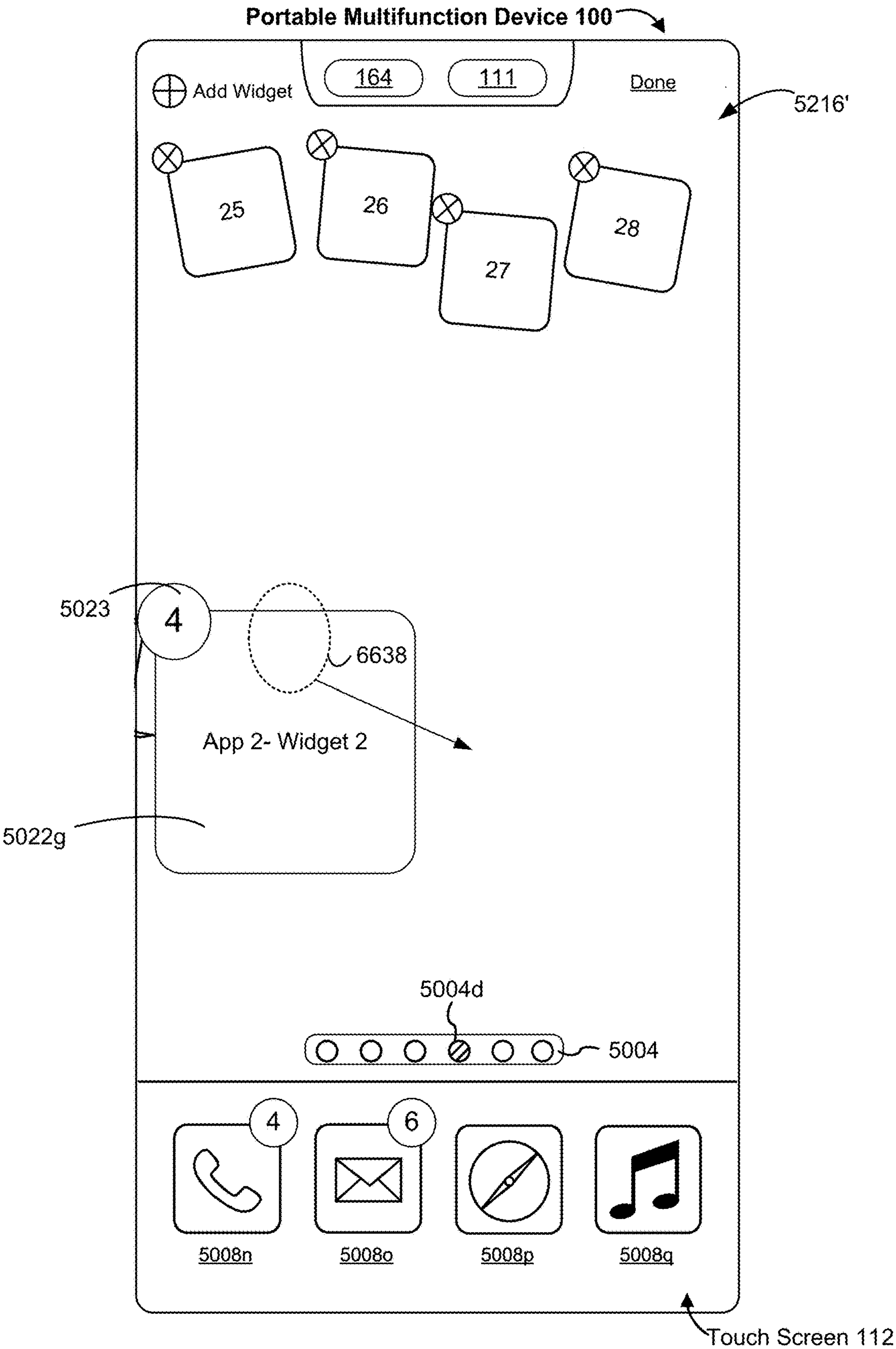
Figure 5H52

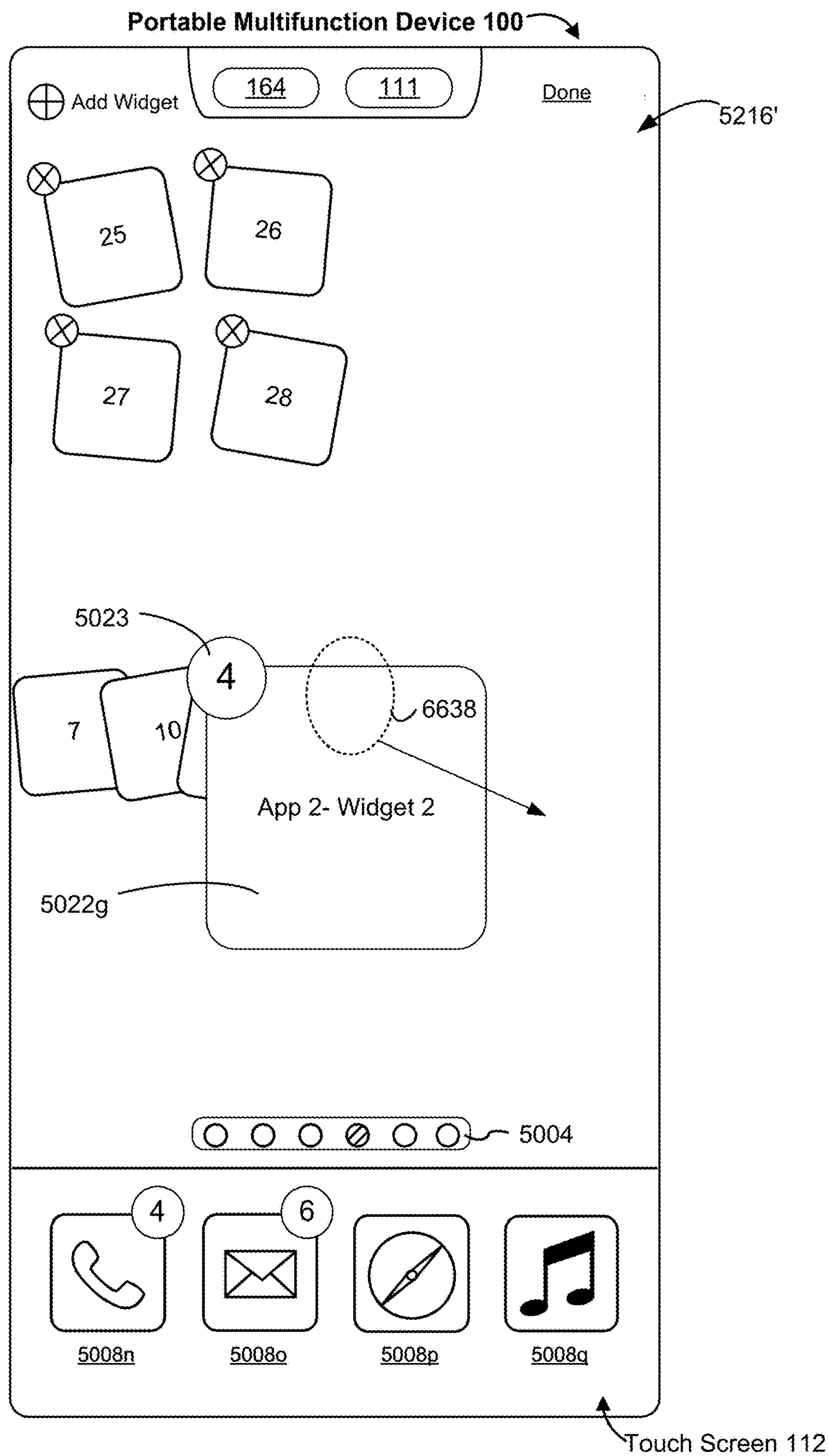
Figure 5H53

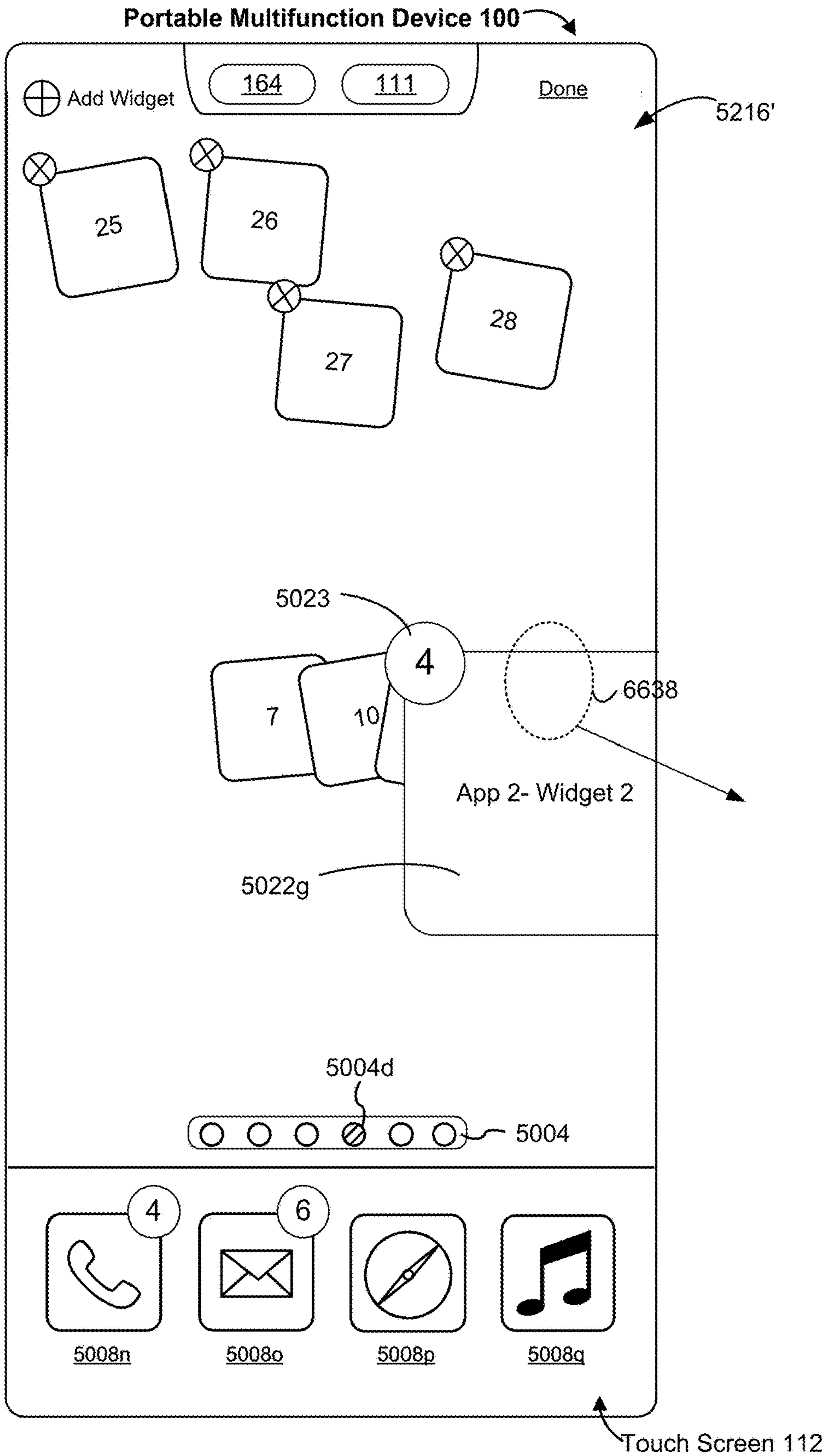
Figure 5H54

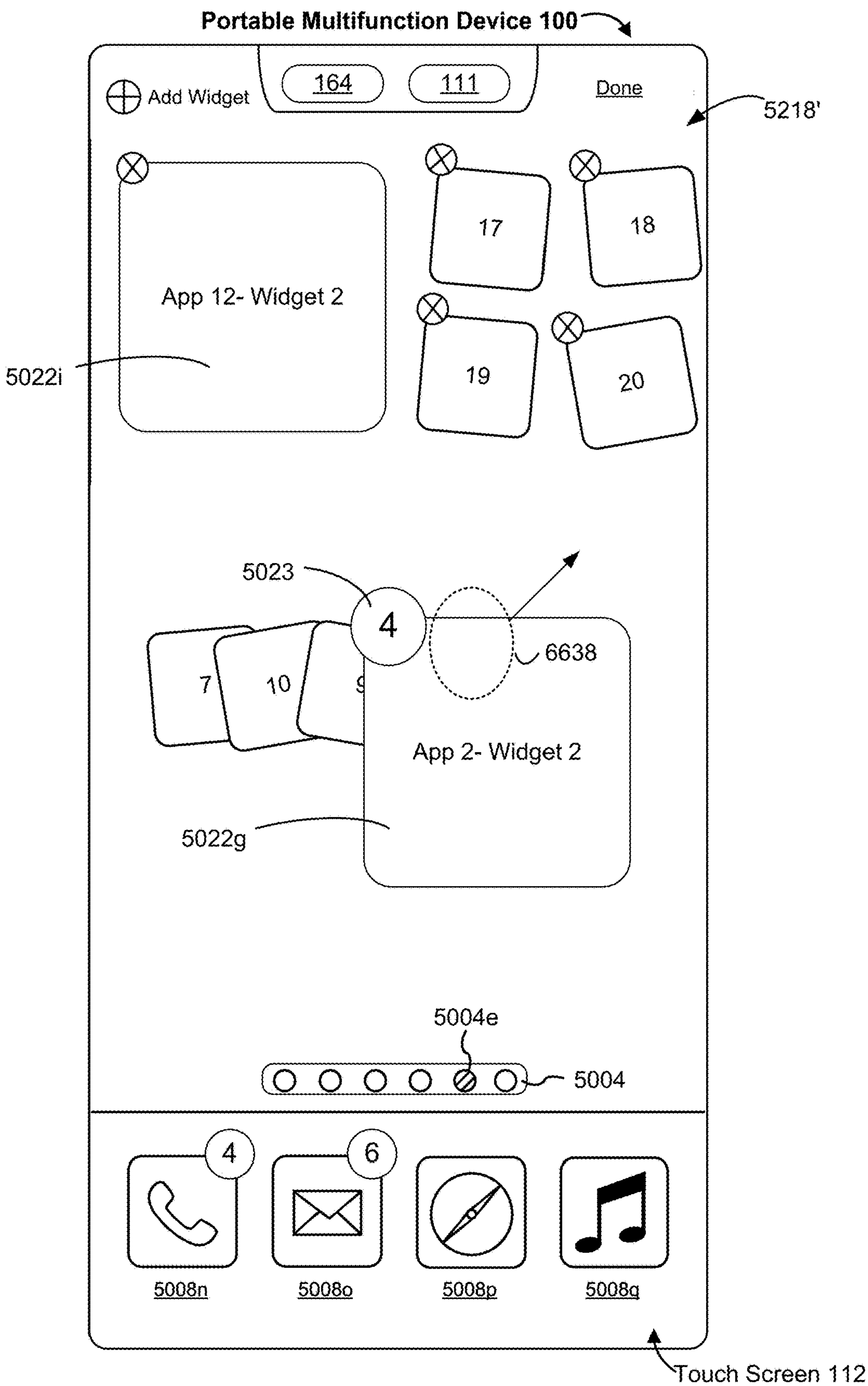
Figure 5H55

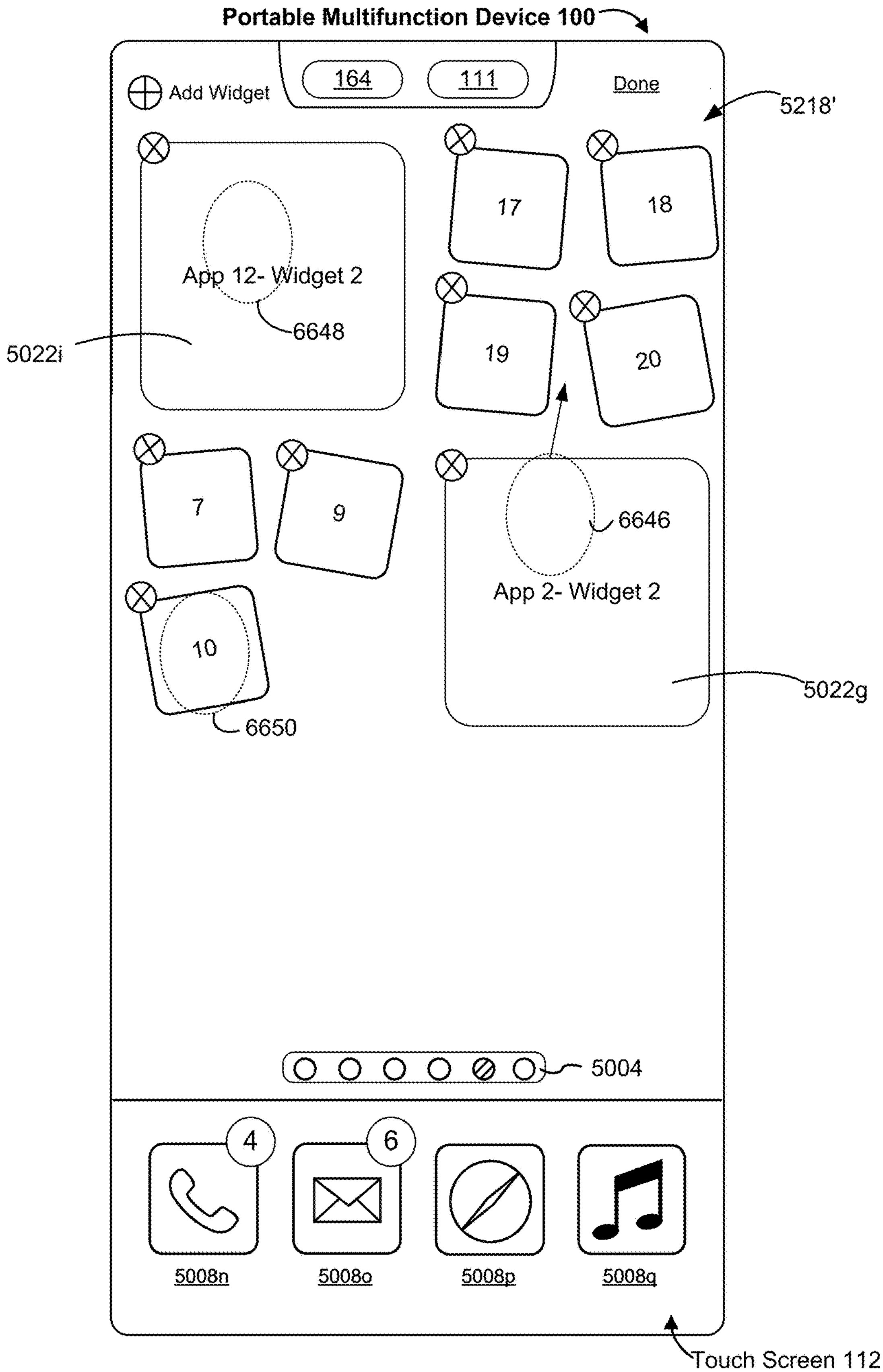
Figure 5H56

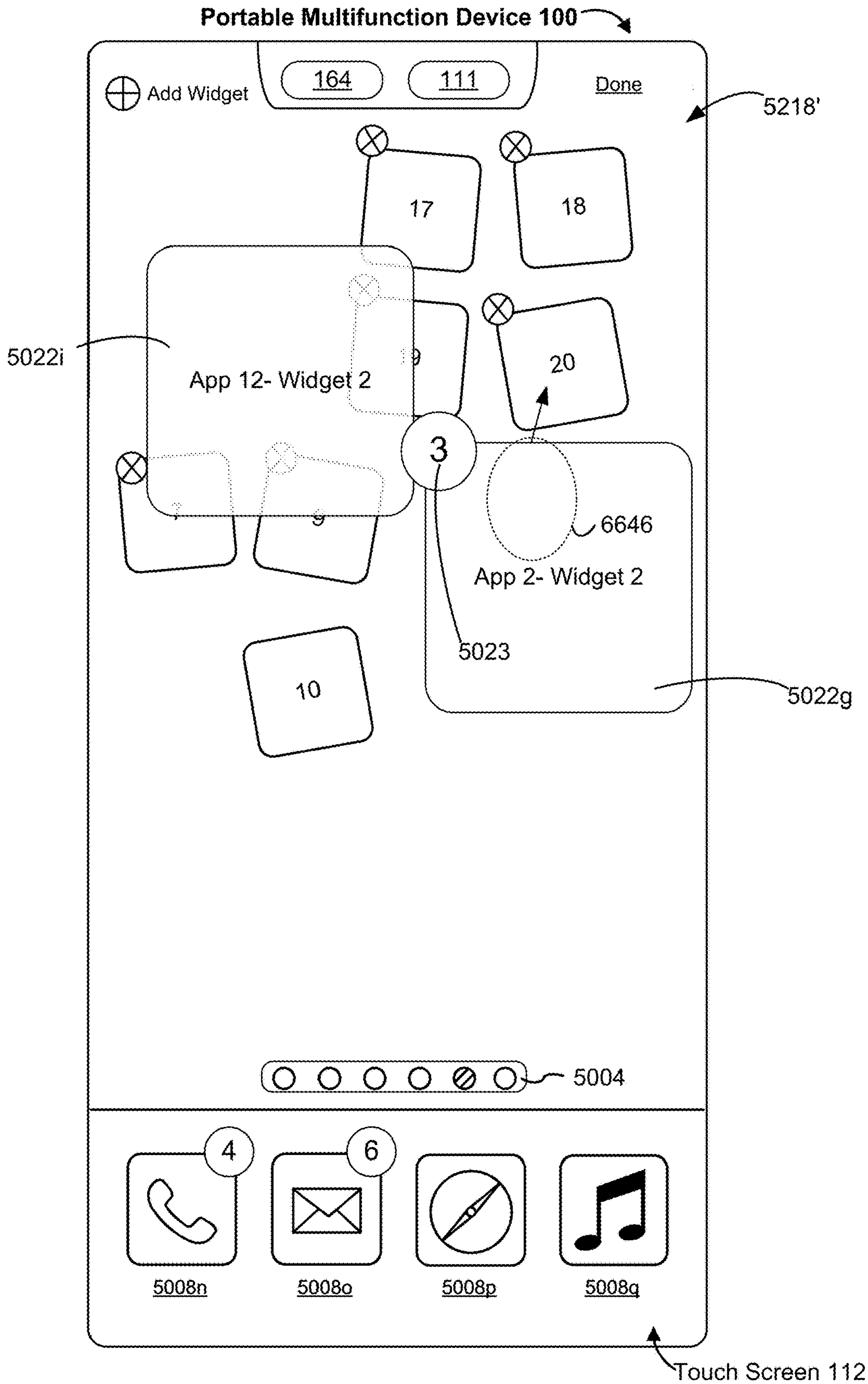
Figure 5H57

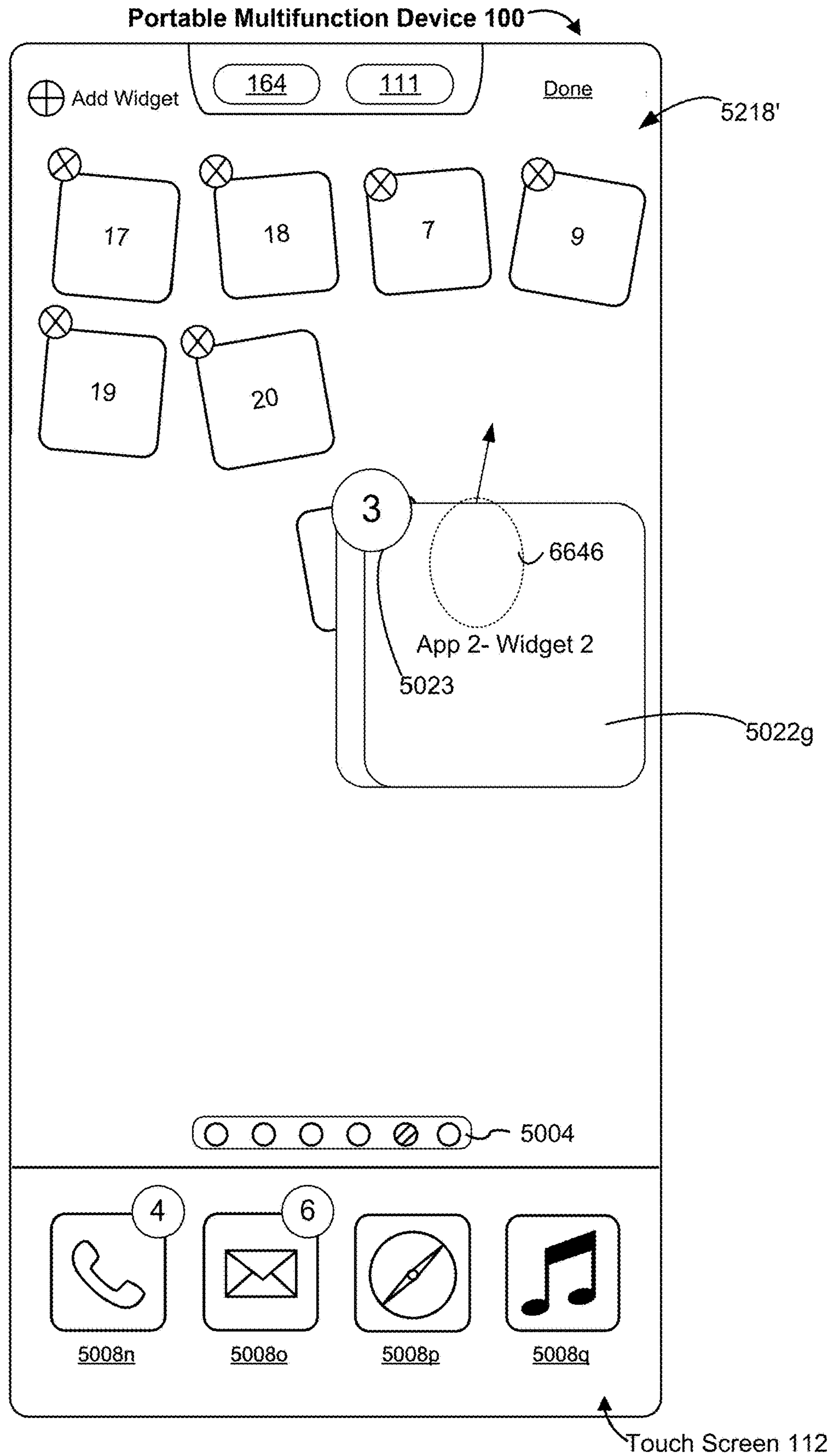
Figure 5H58

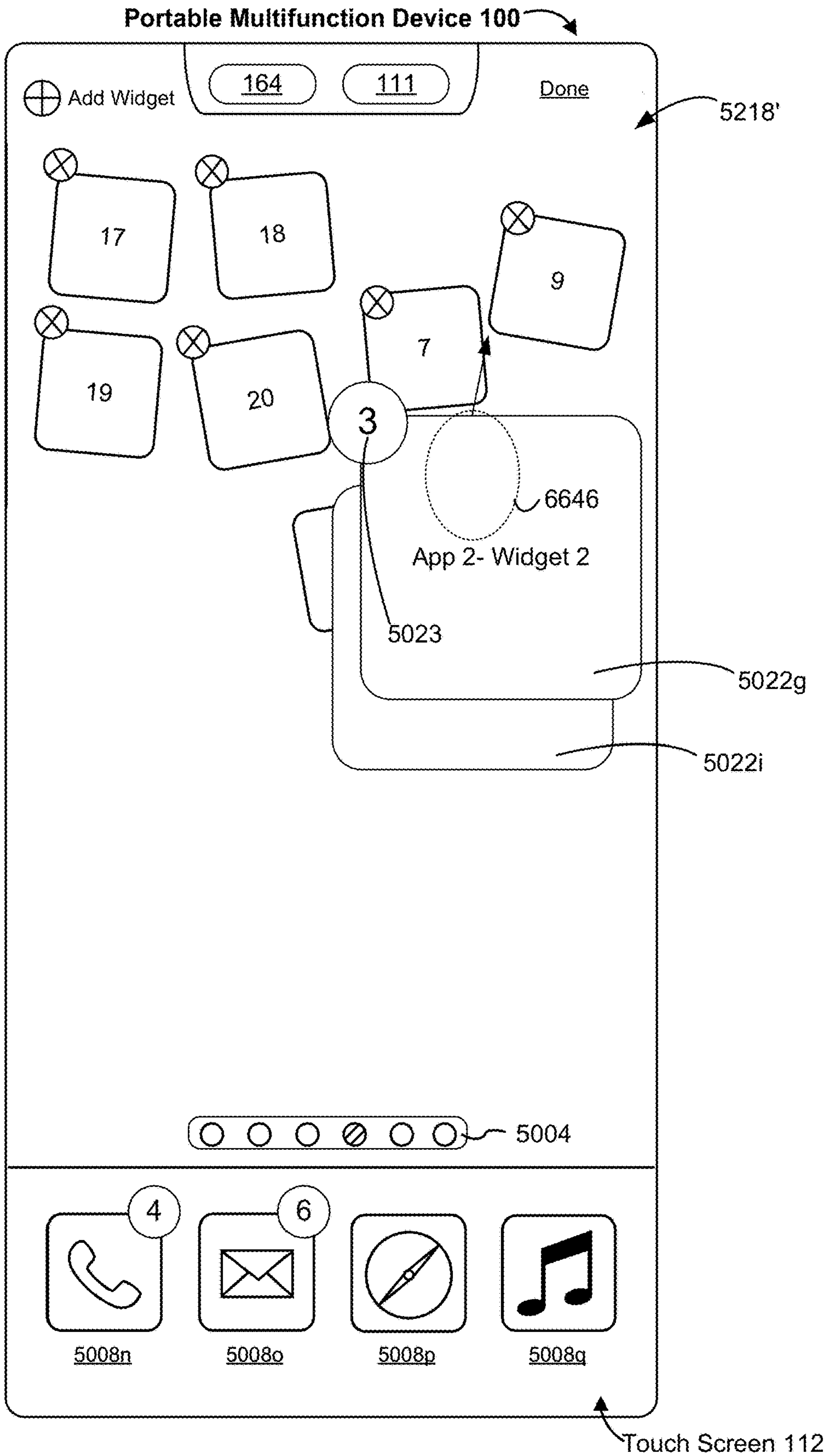
Figure 5H59

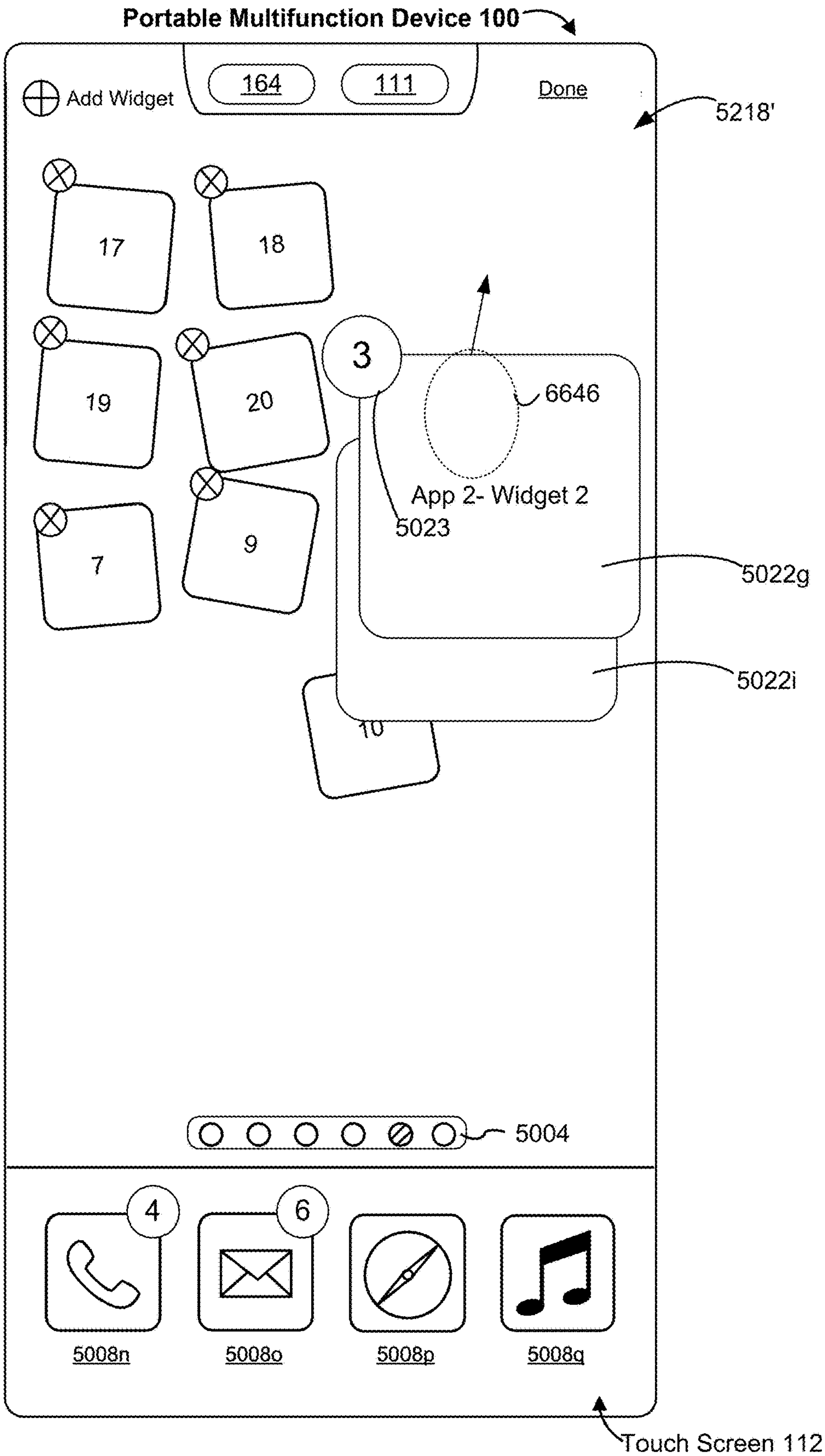
Figure 5H60

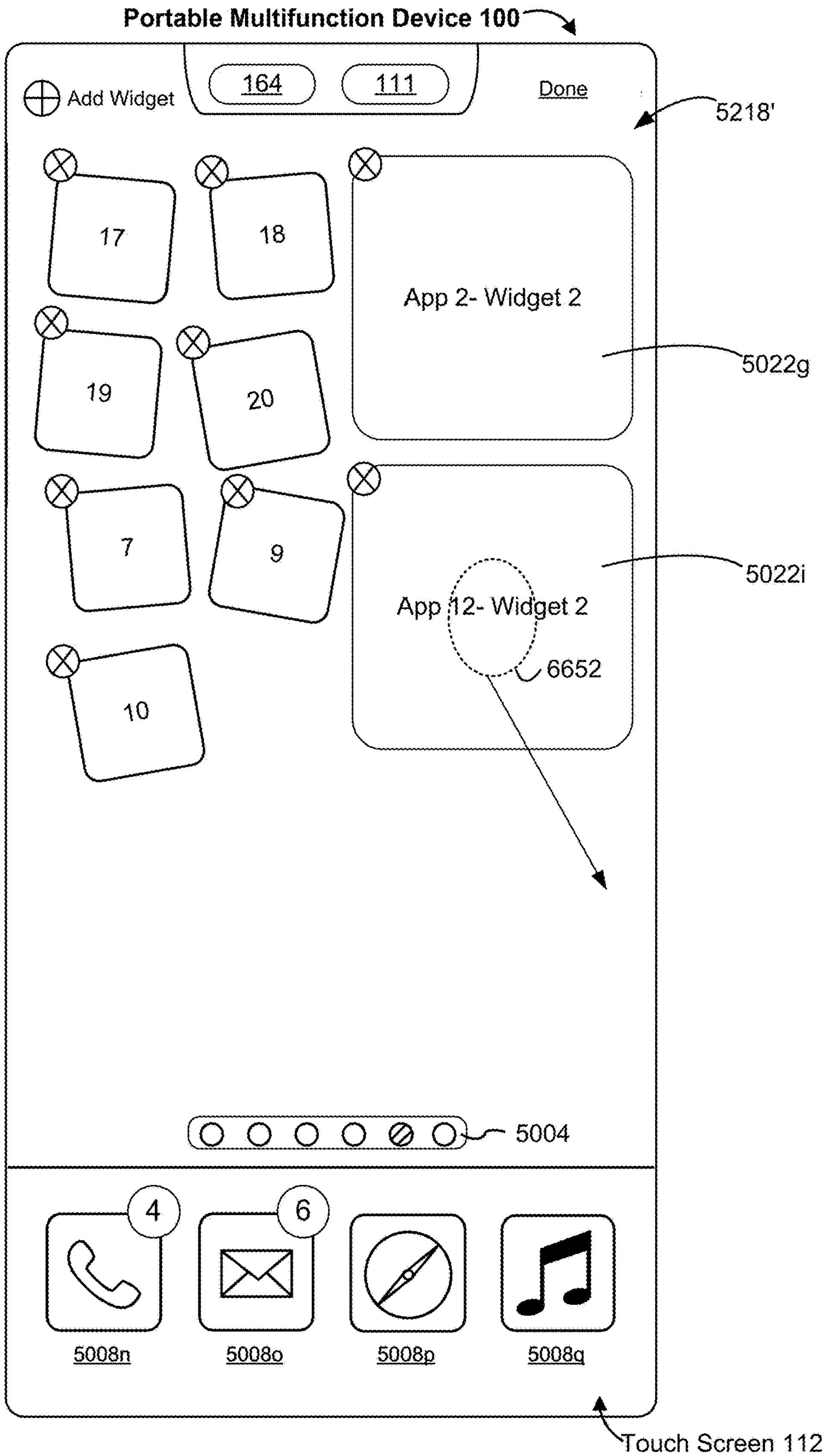
Figure 5H61

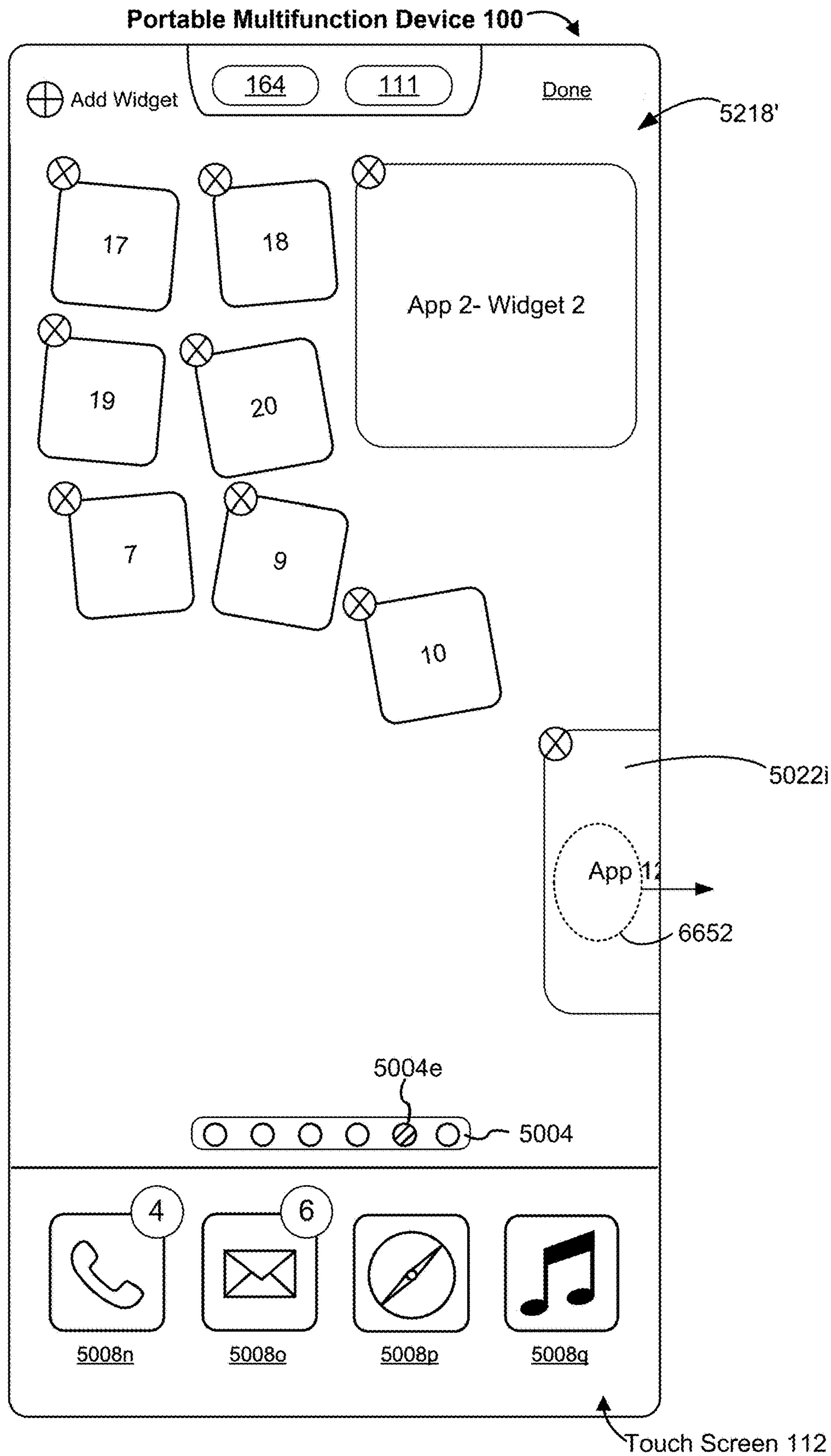
Figure 5H62

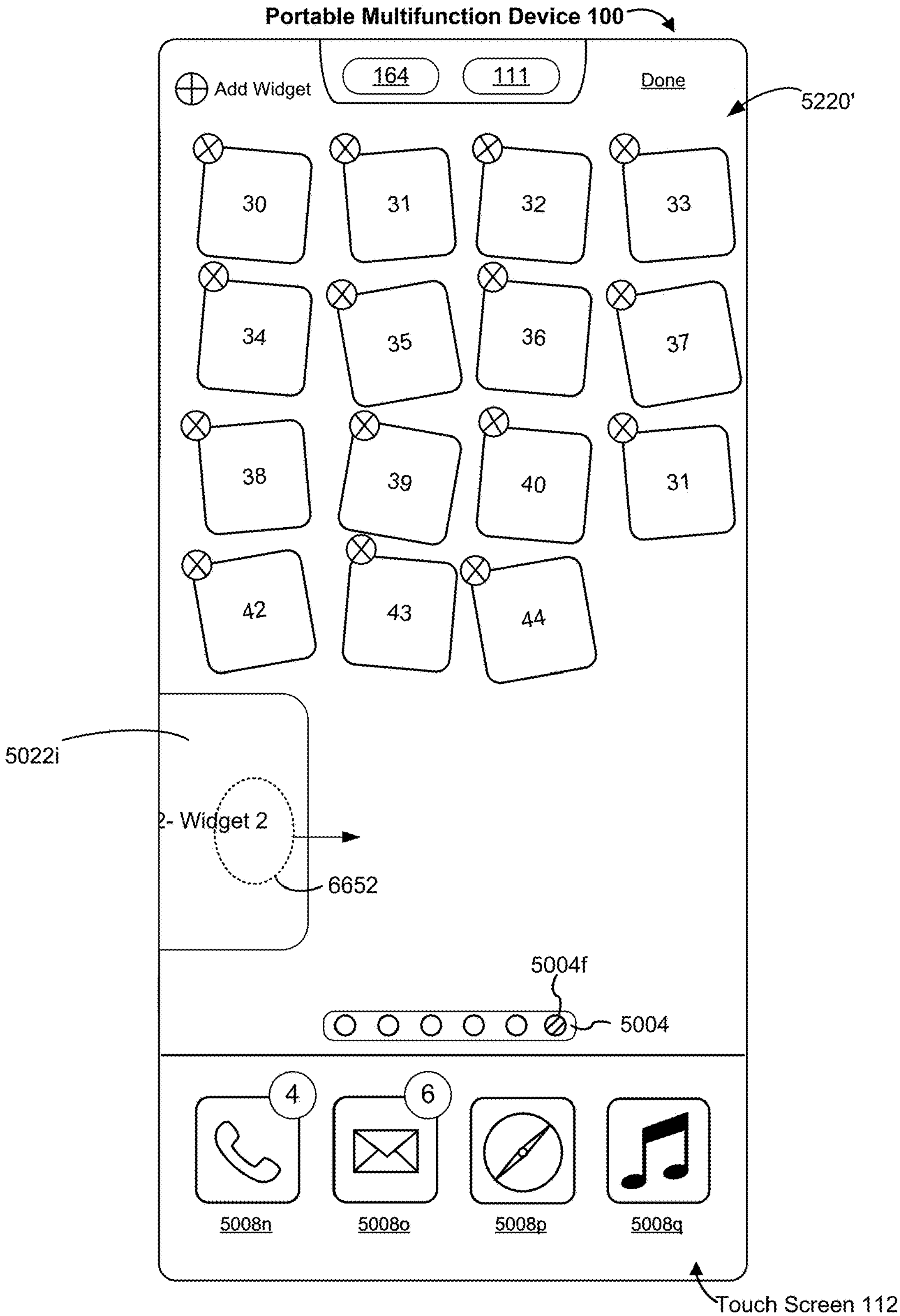
Figure 5H63

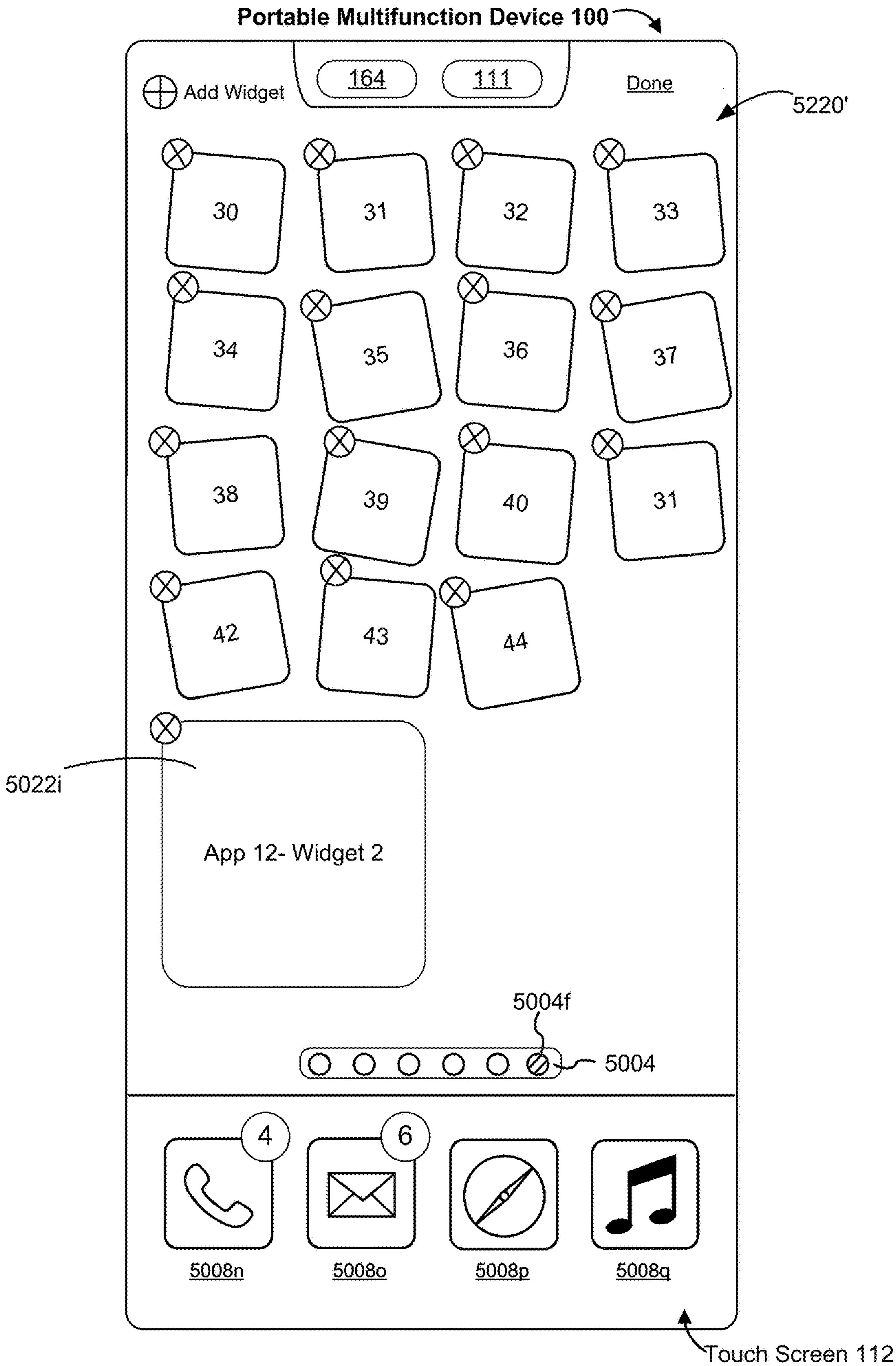
Figure 5H64

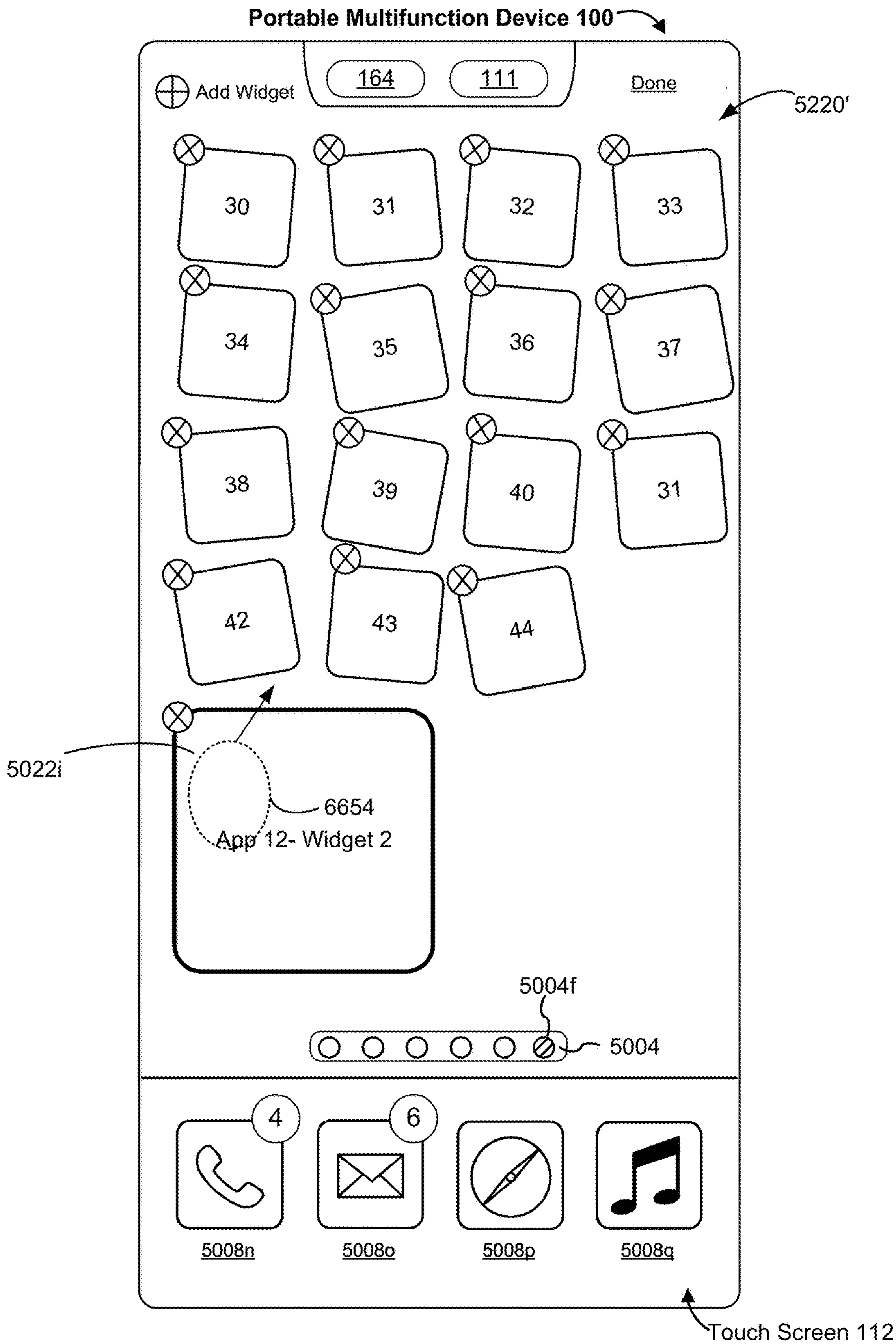
Figure 5H65

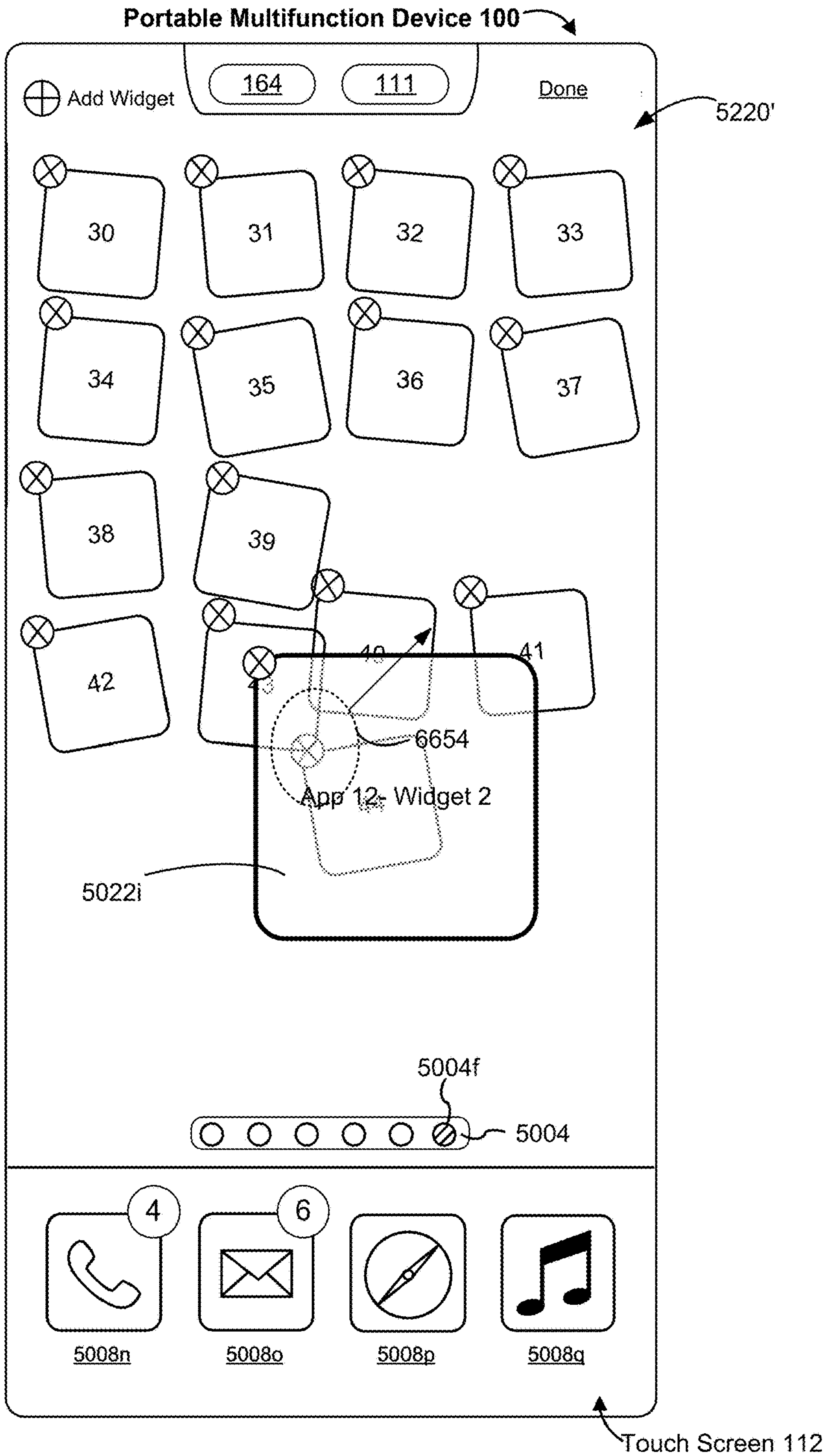
Figure 5H66

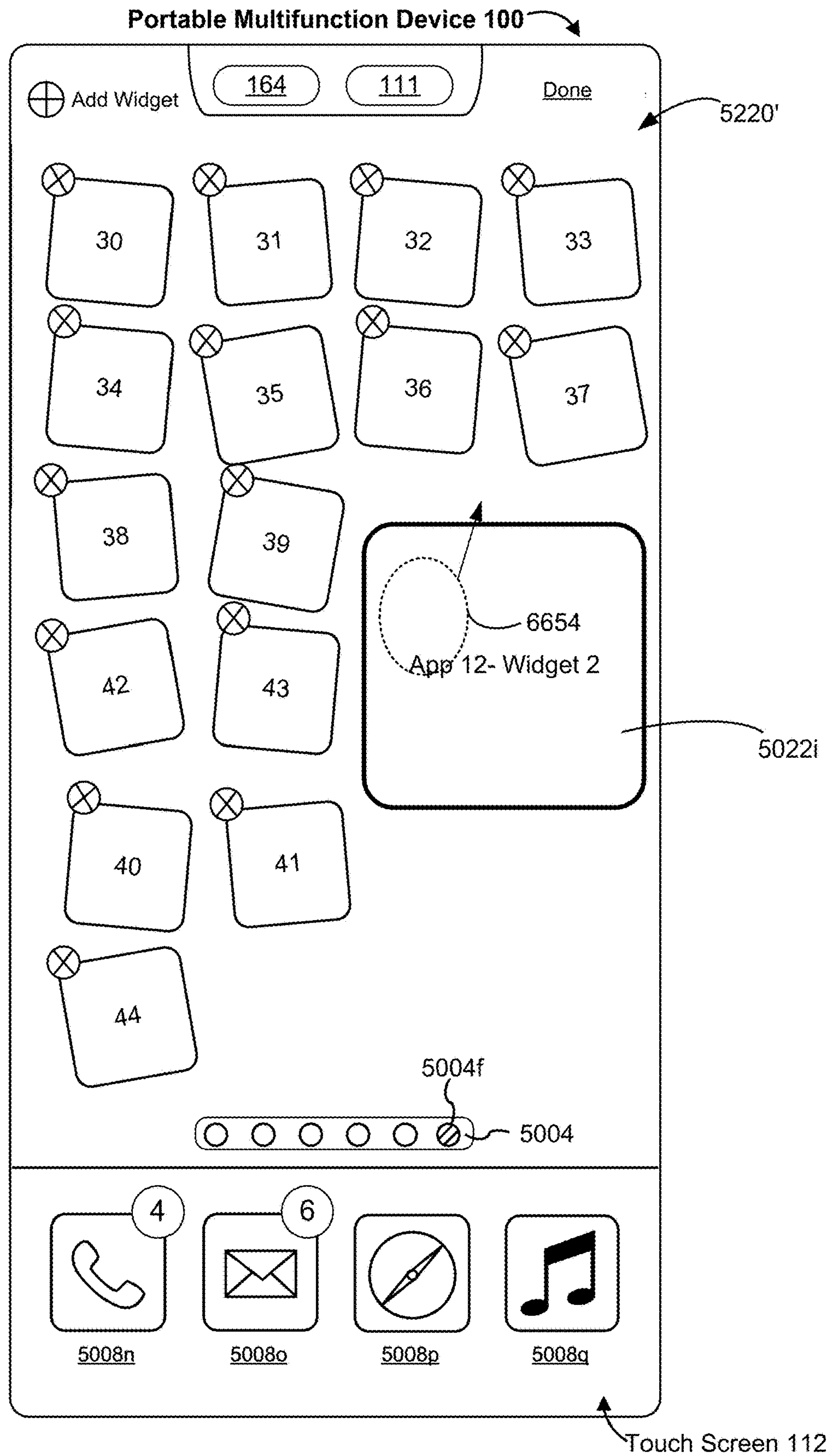
Figure 5H67

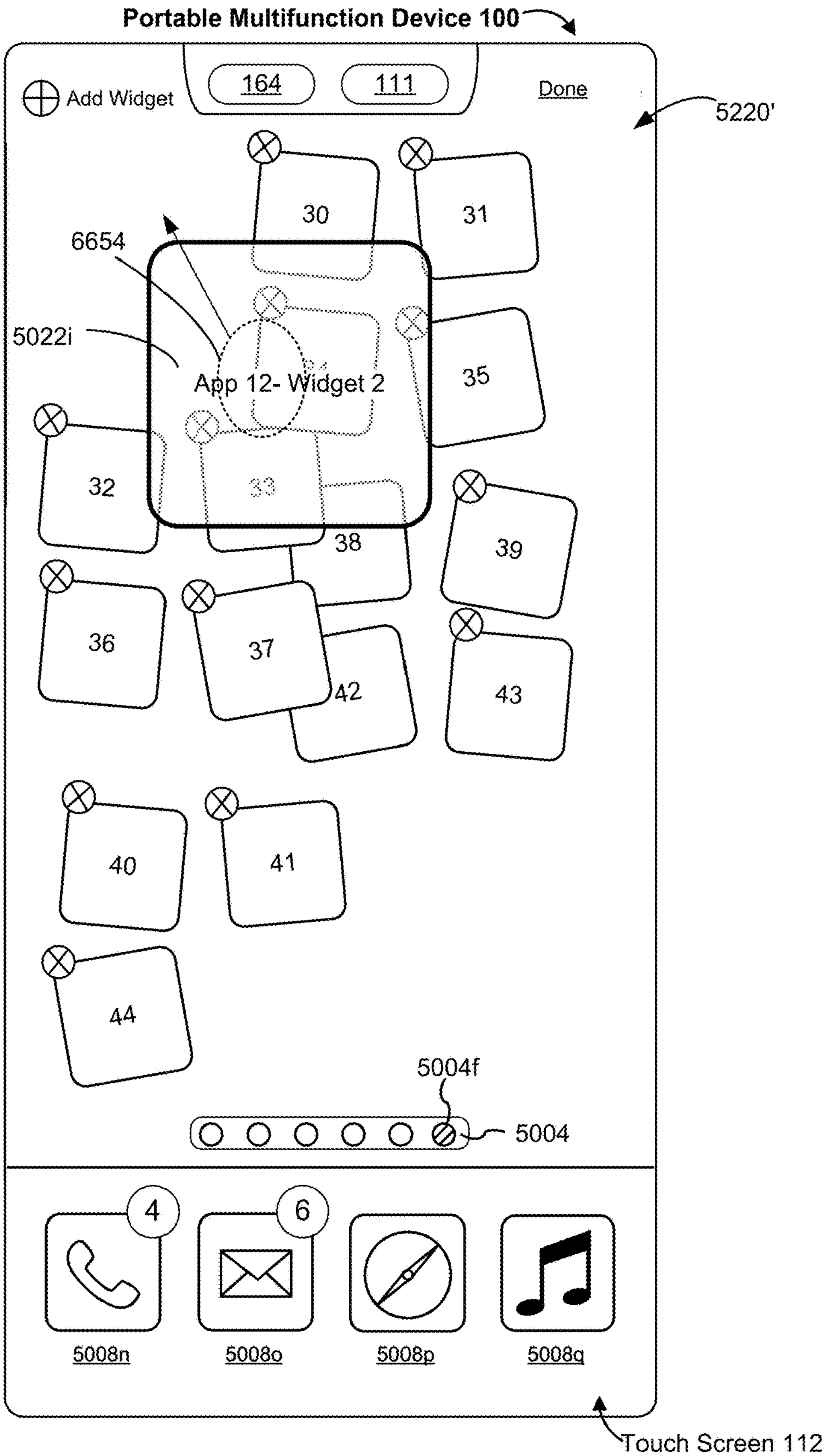
Figure 5H68

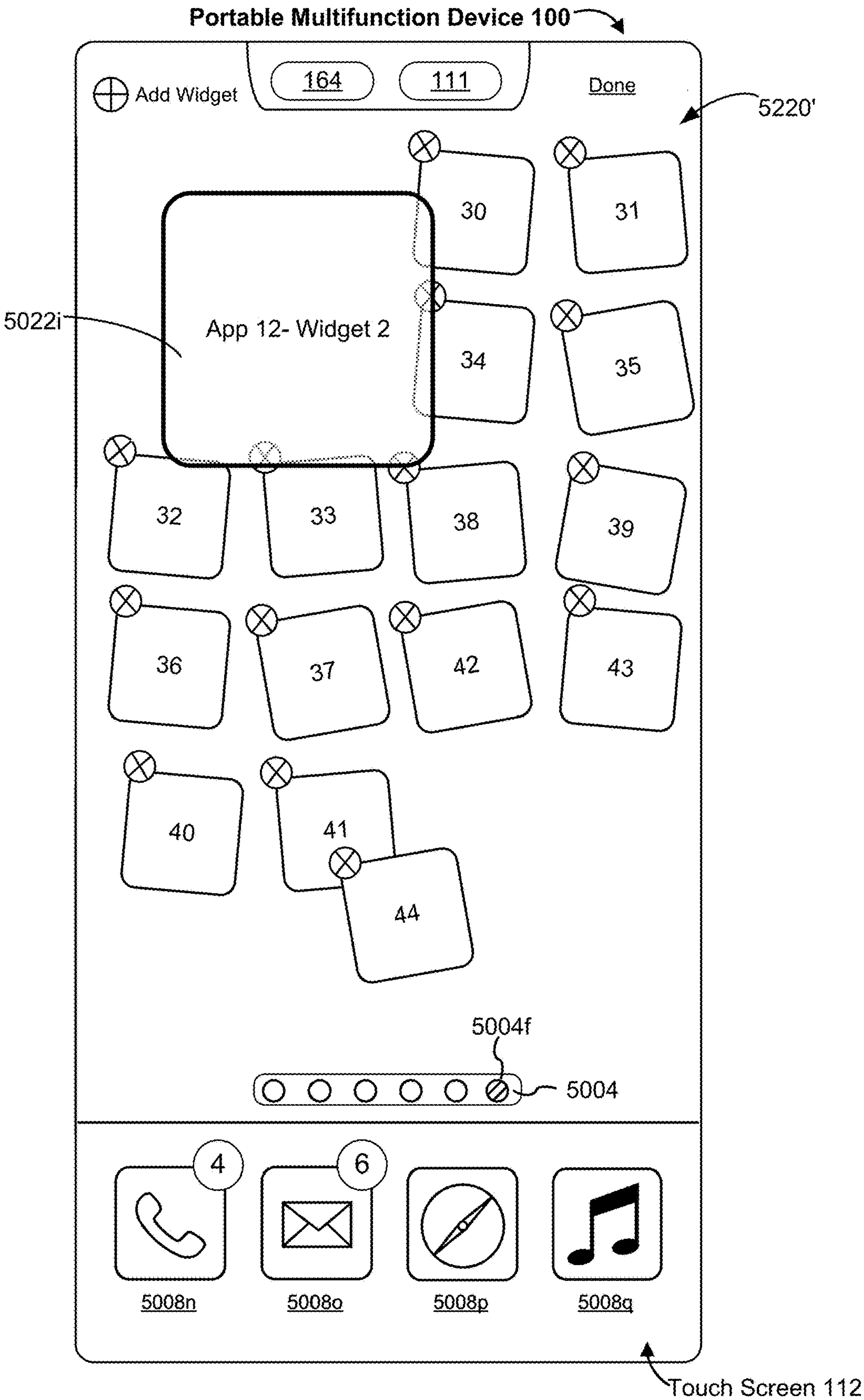
Figure 5H69

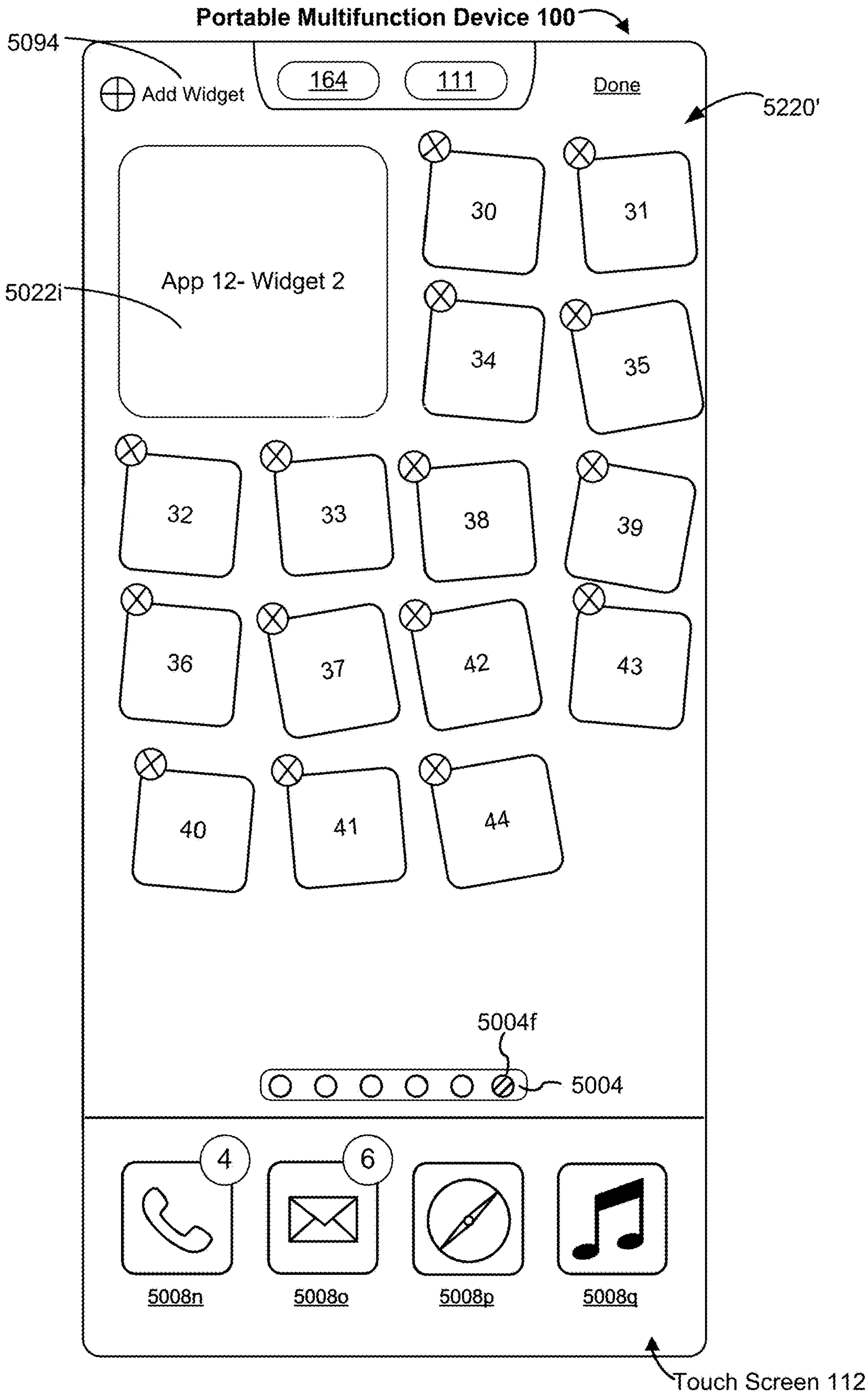
Figure 5H70

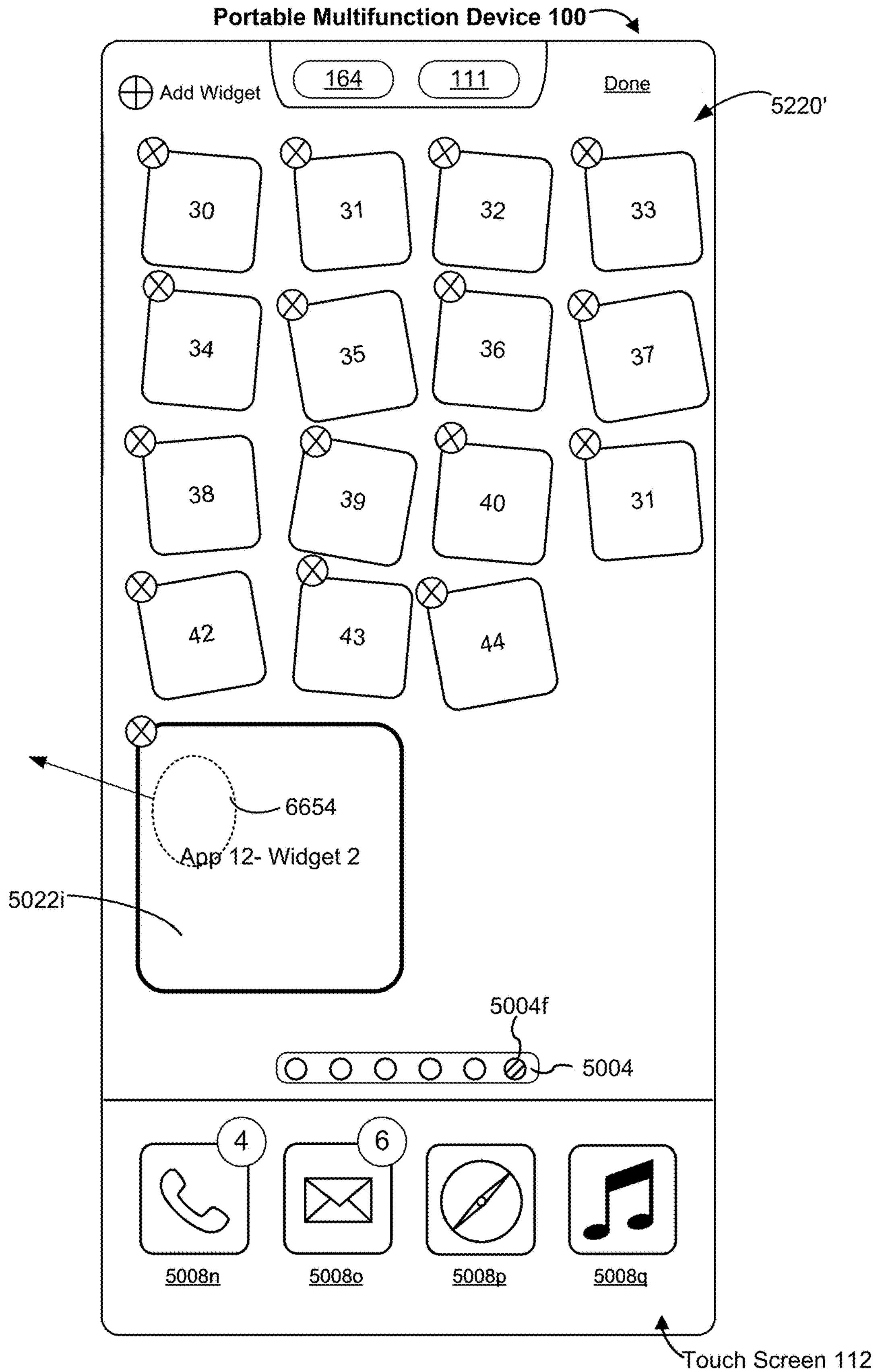
Figure 5H71

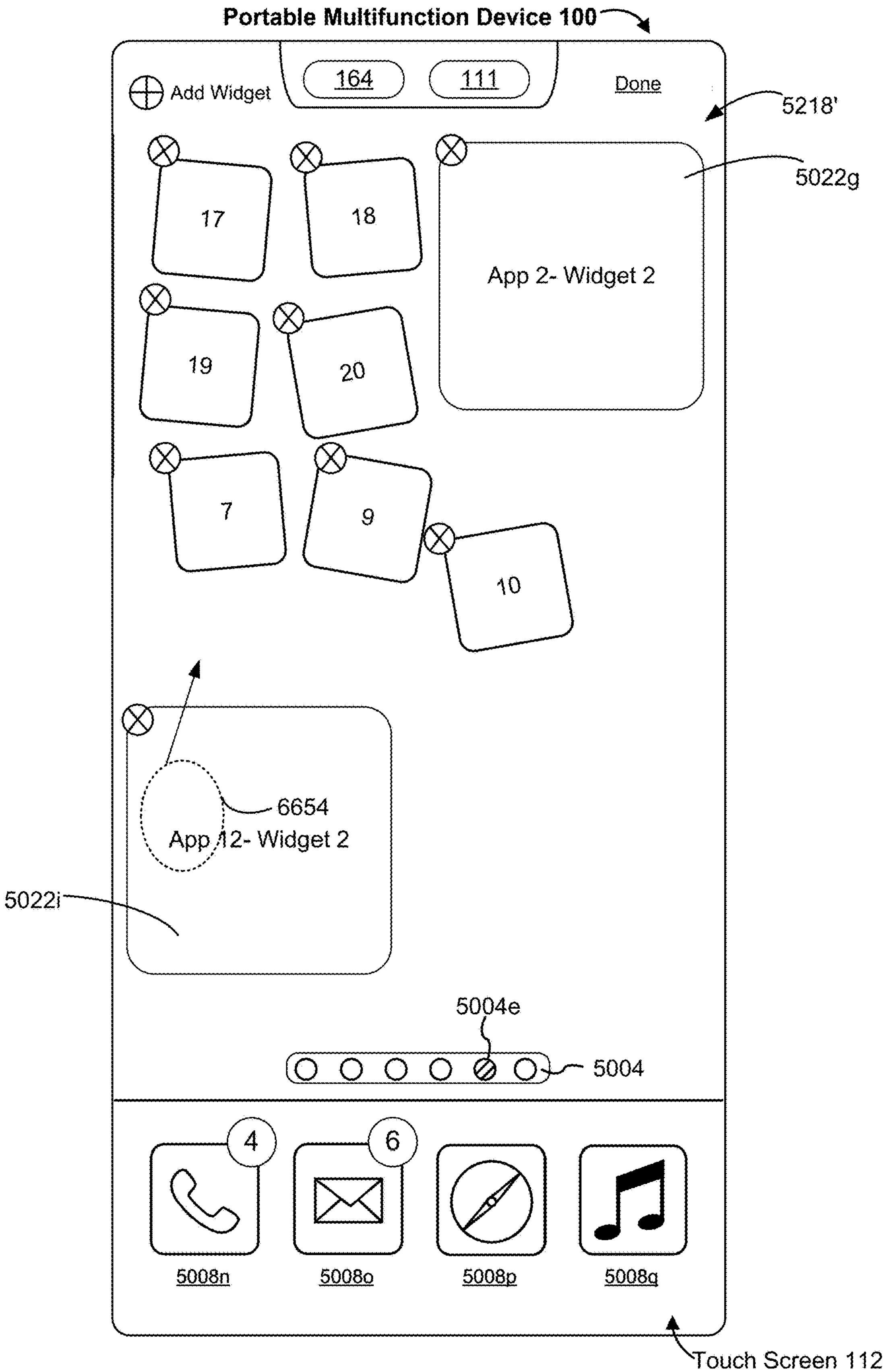
Figure 5H72

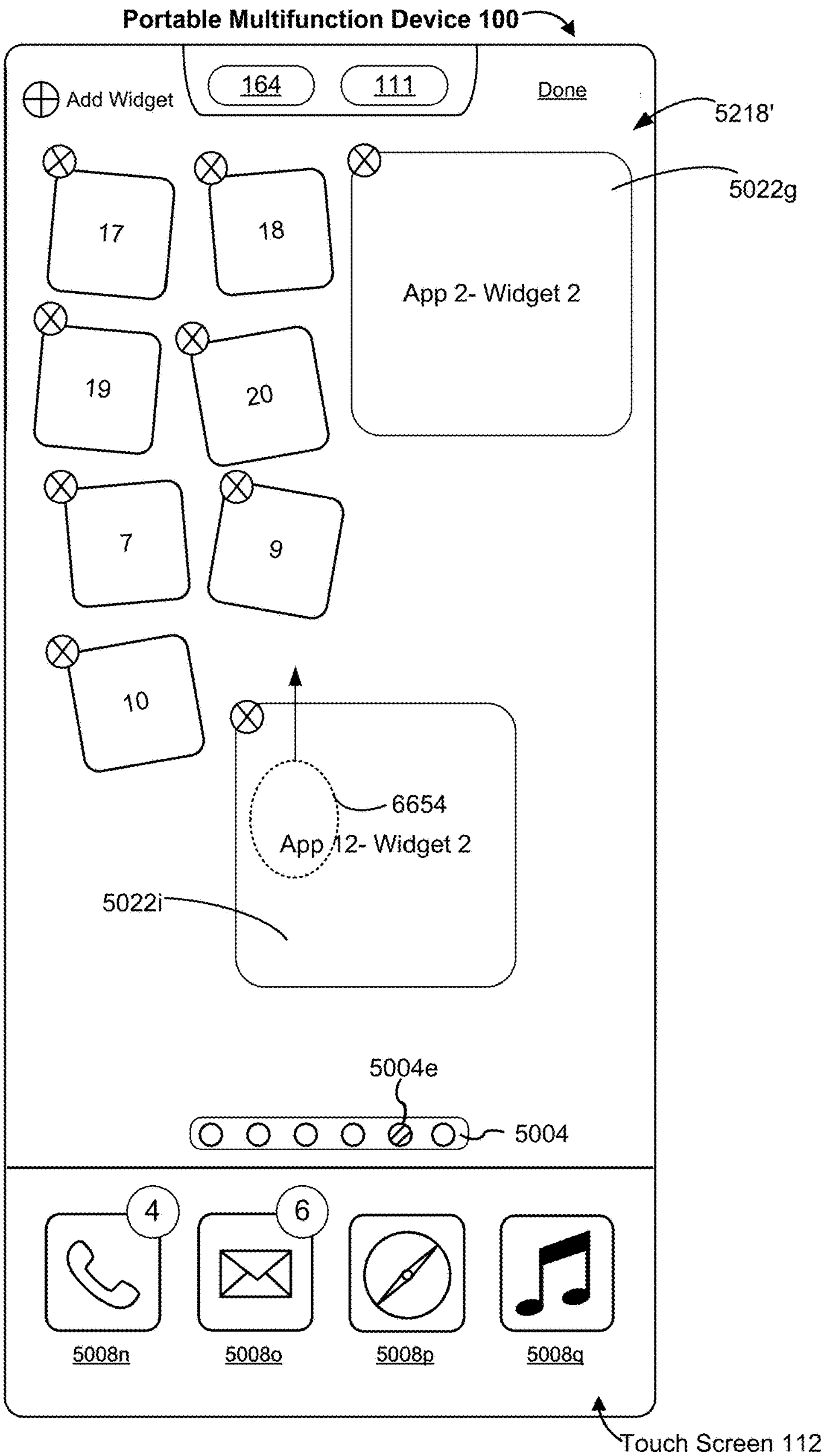
Figure 5H73

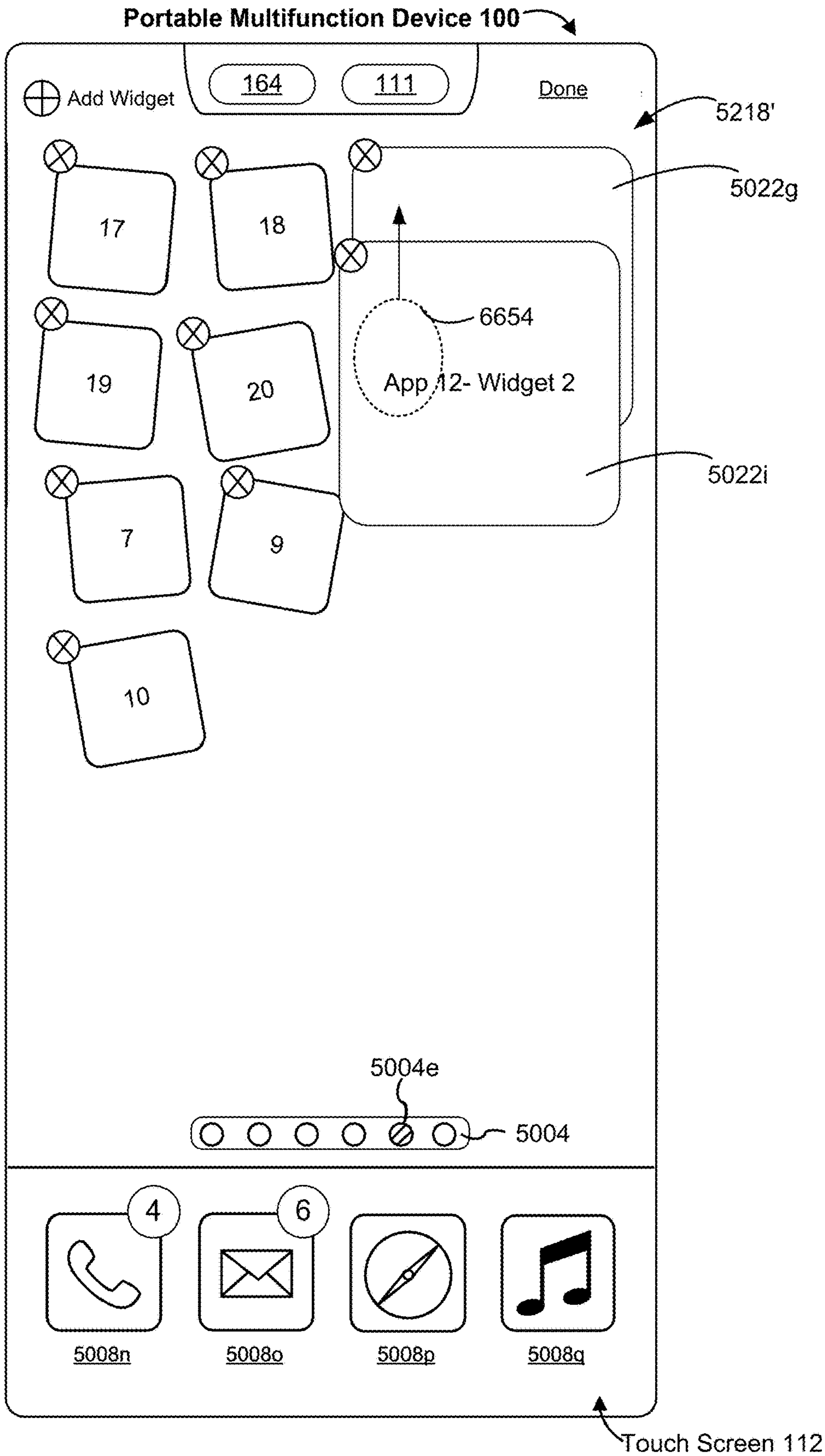
Figure 5H74

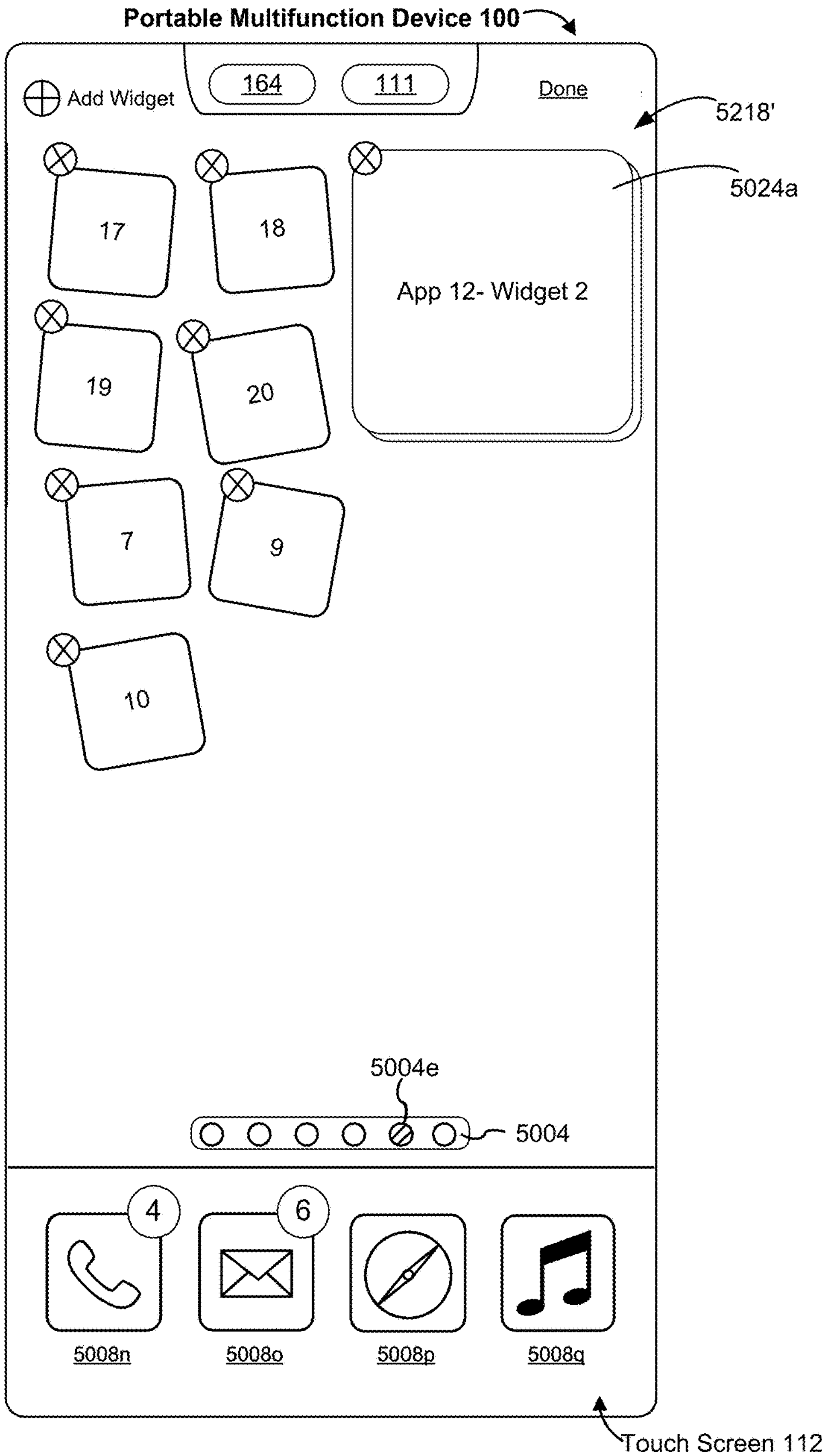
Figure 5H75

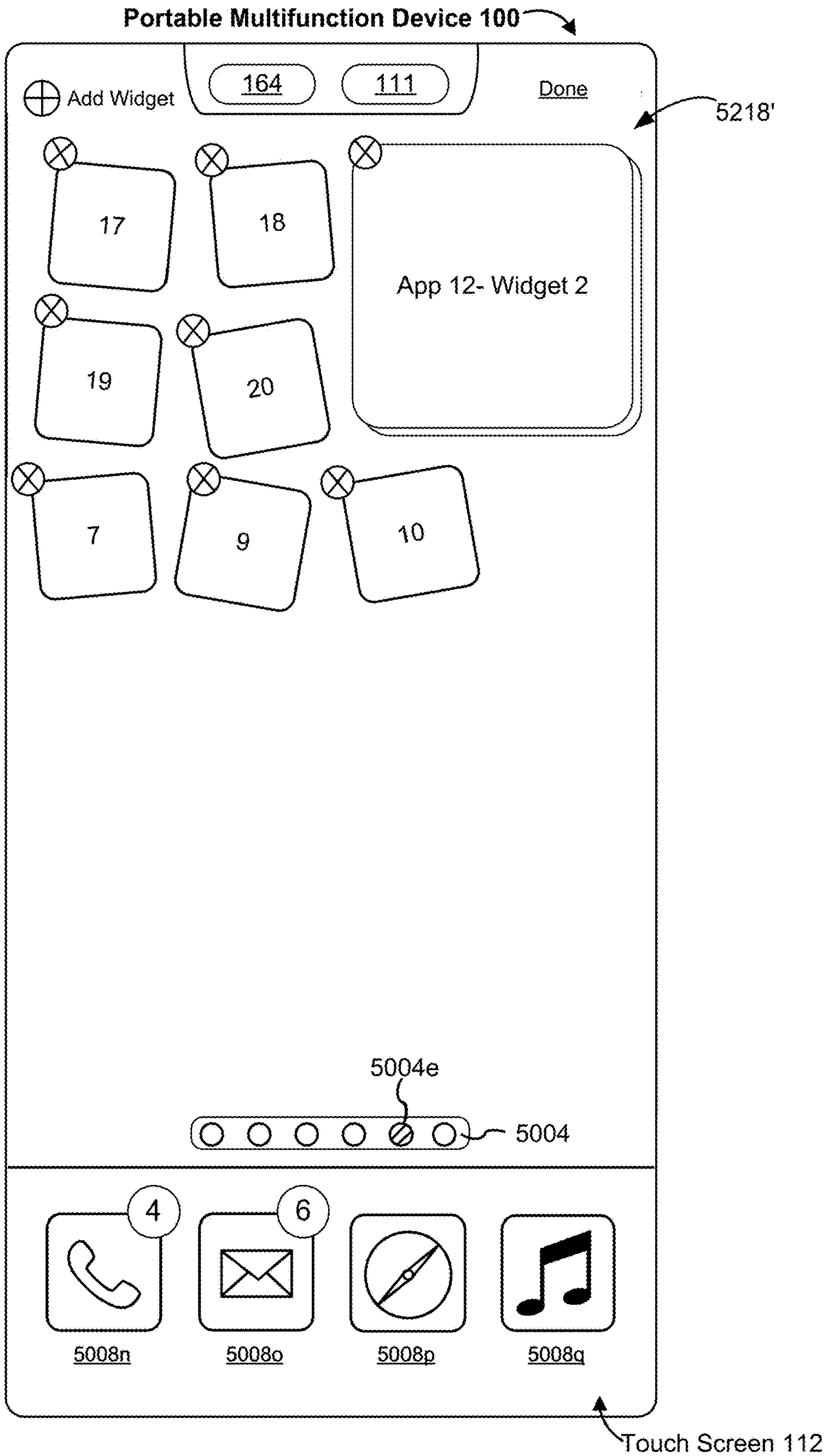
Figure 5H76

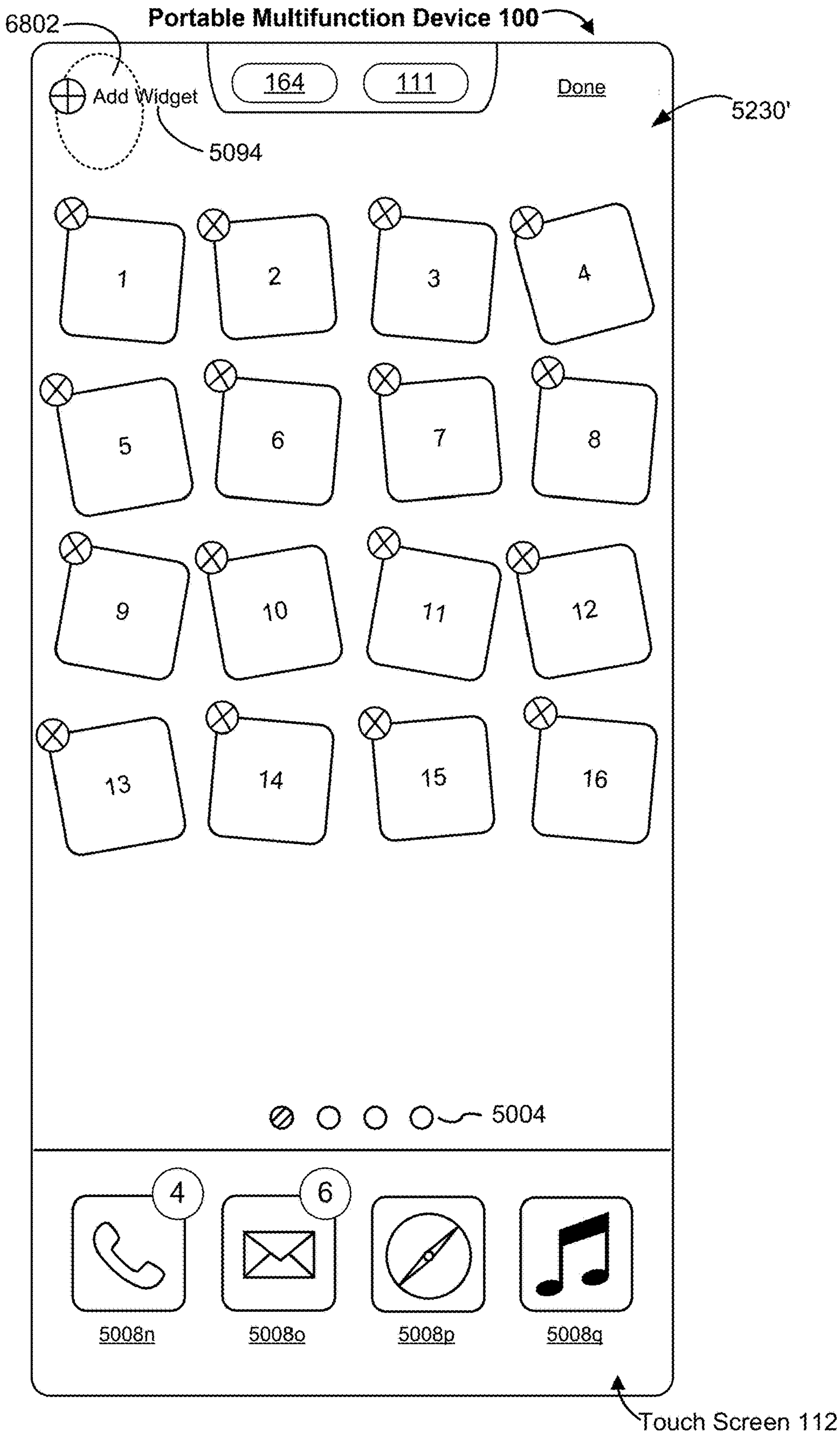
Figure 5I1

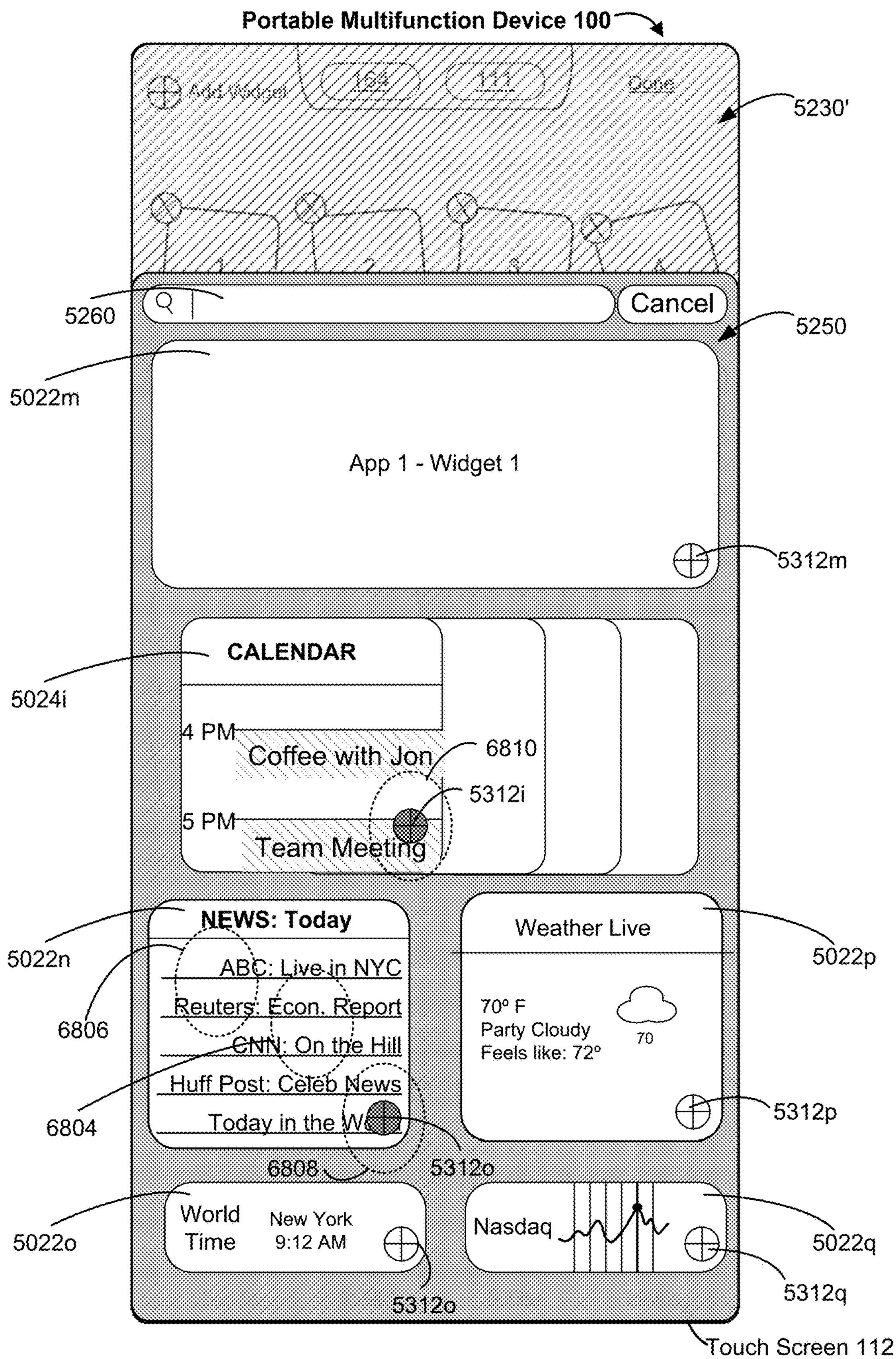
Figure 5I2

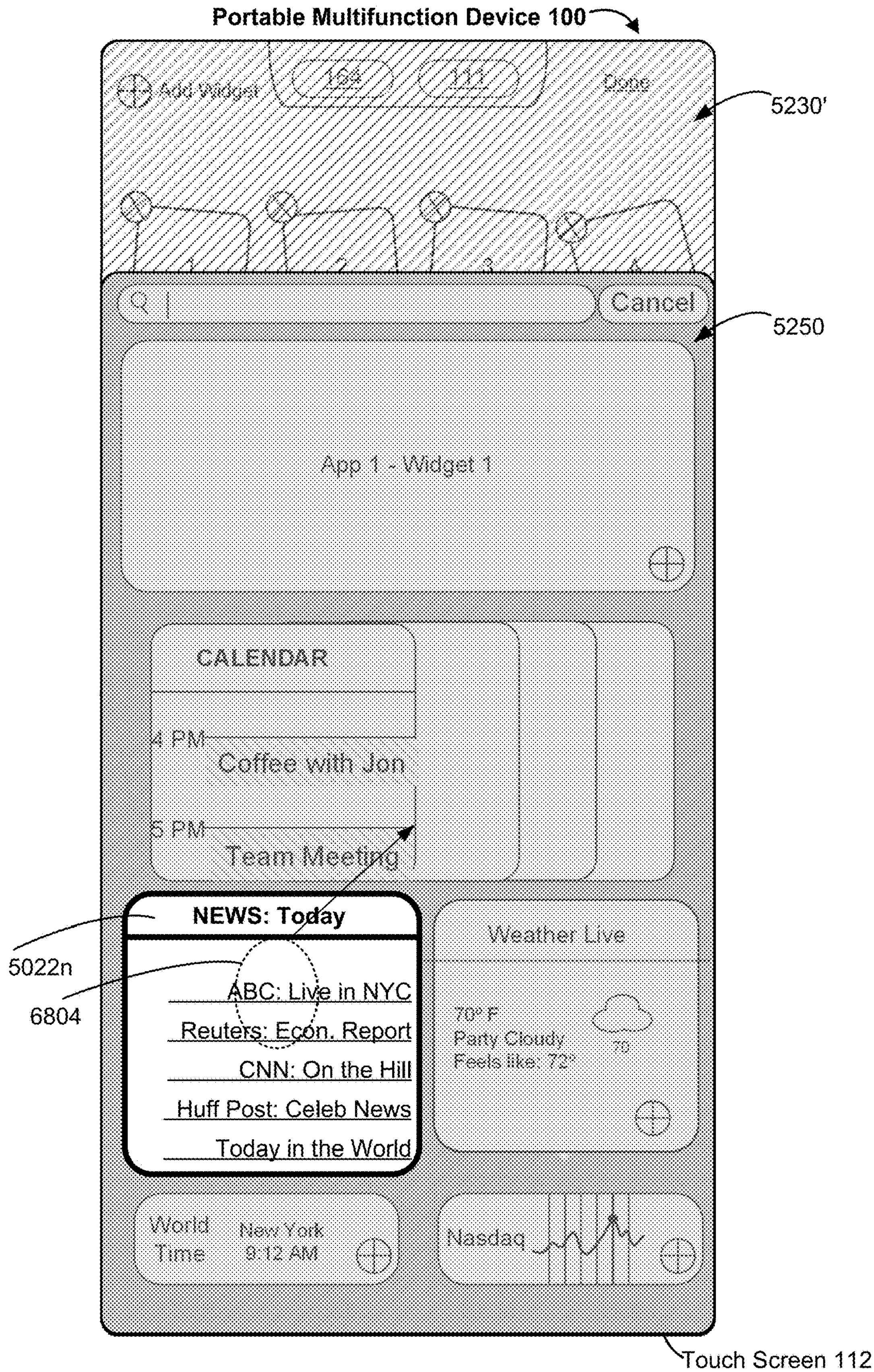
Figure 5I3

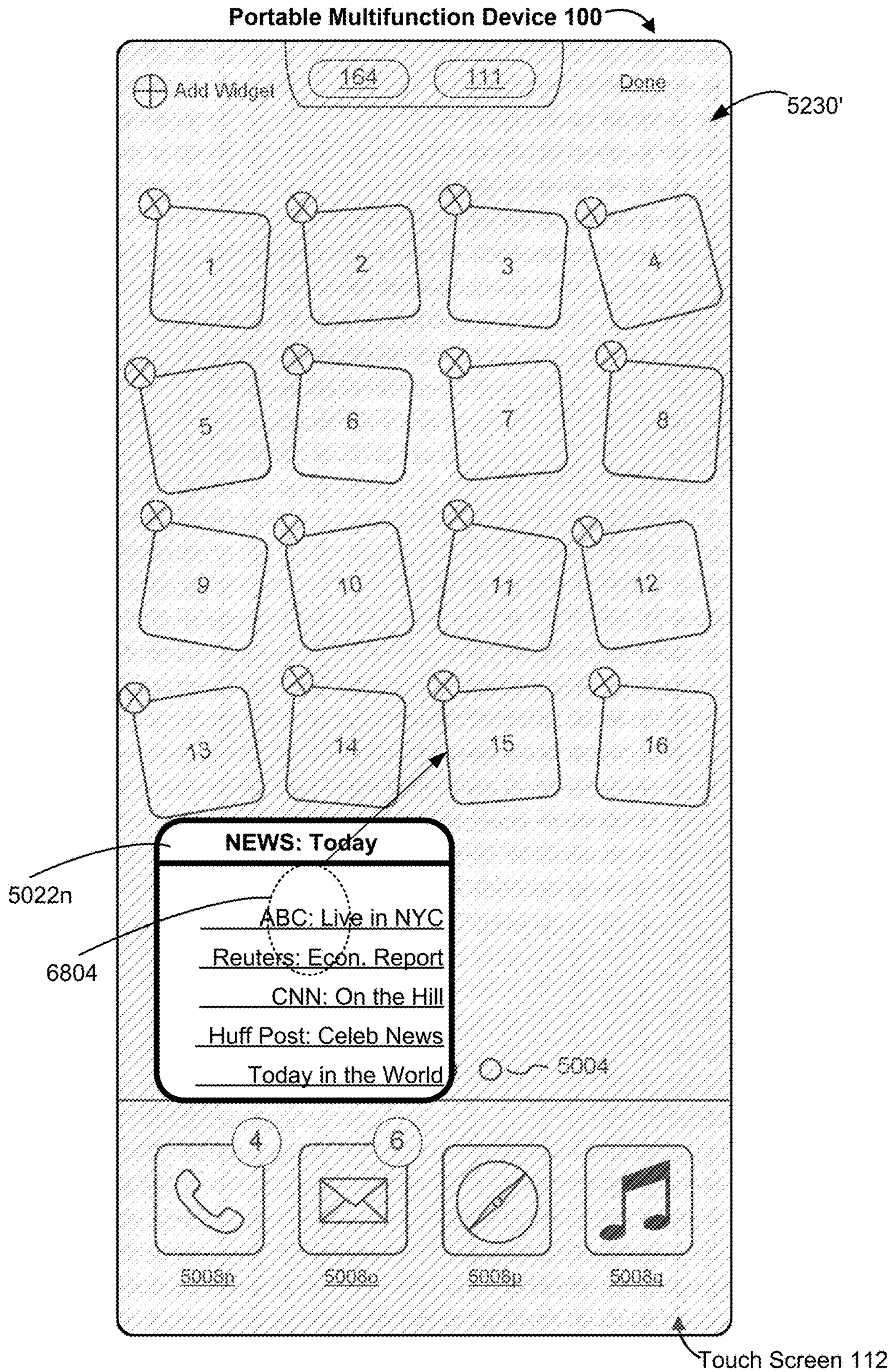
Figure 5I4

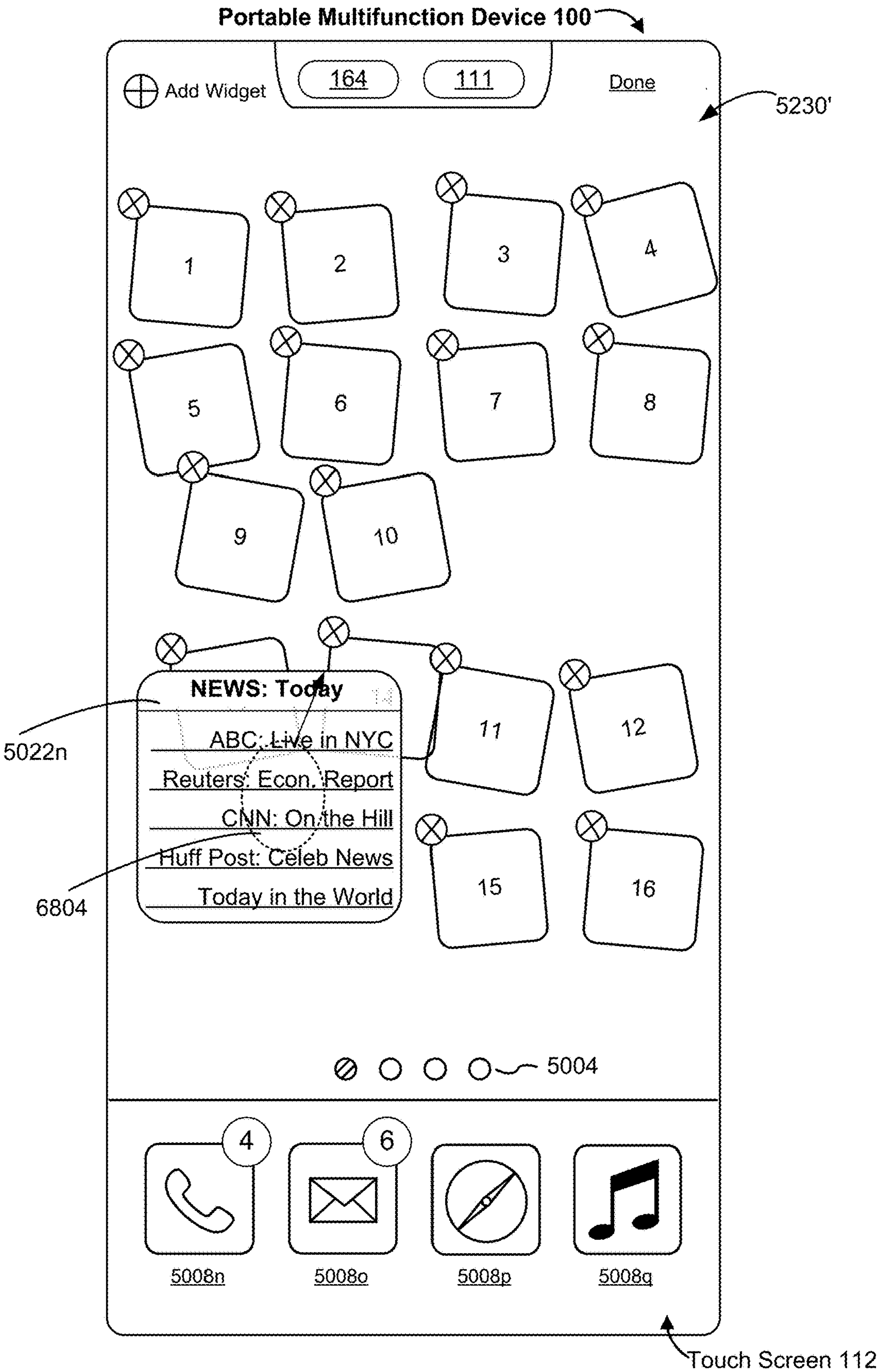
Figure 5I5

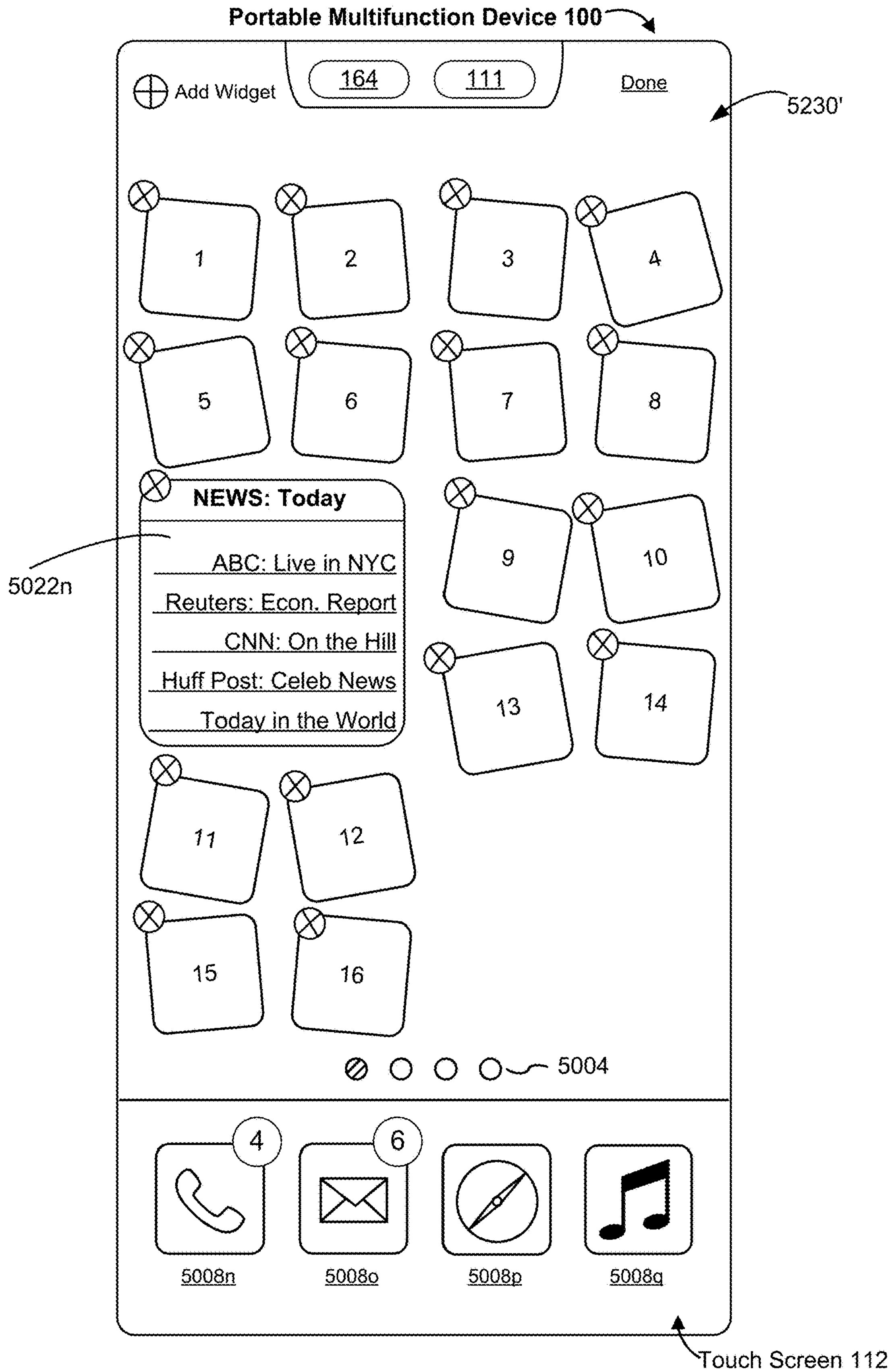
Figure 5I6

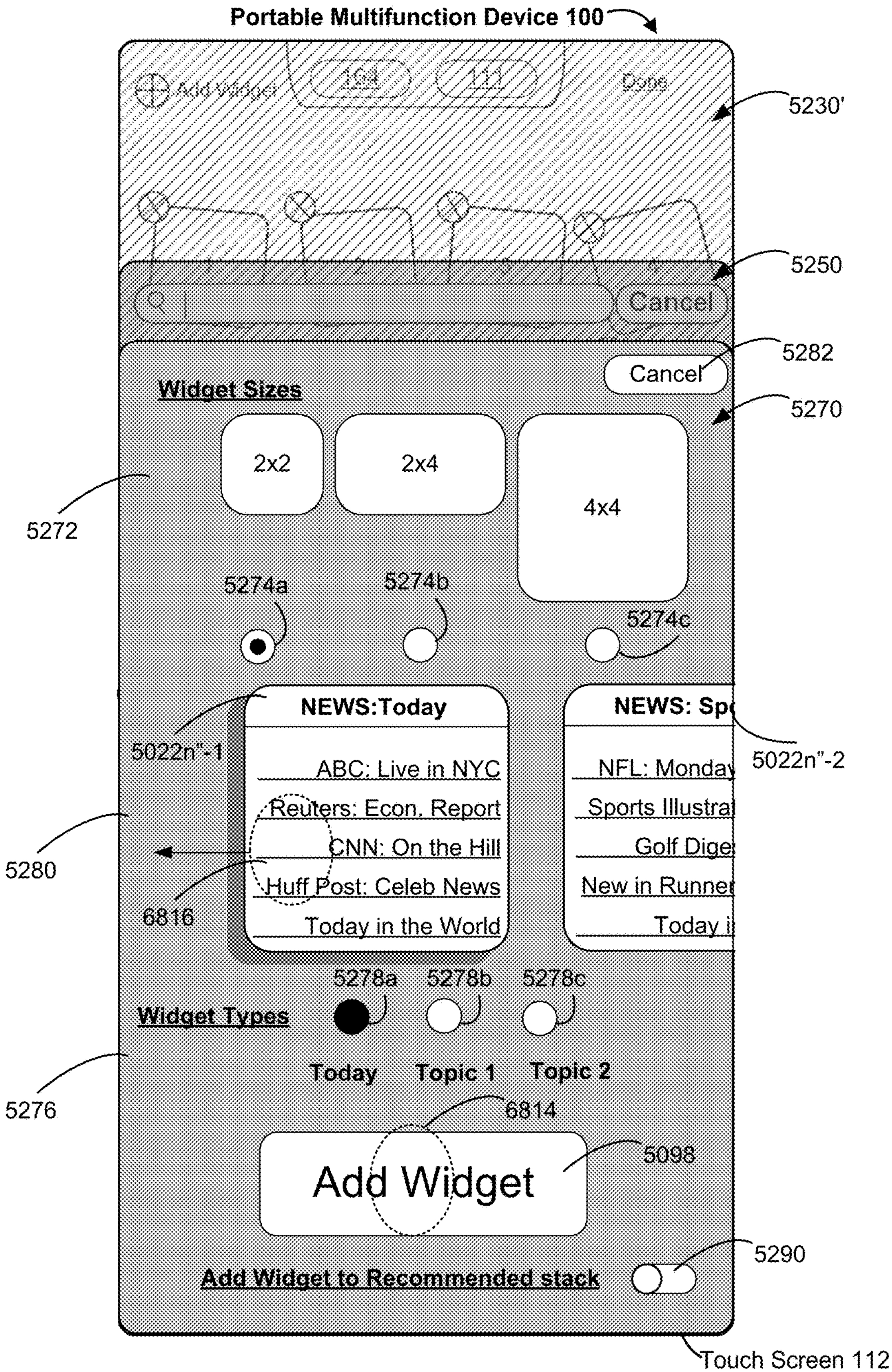
Figure 5I7

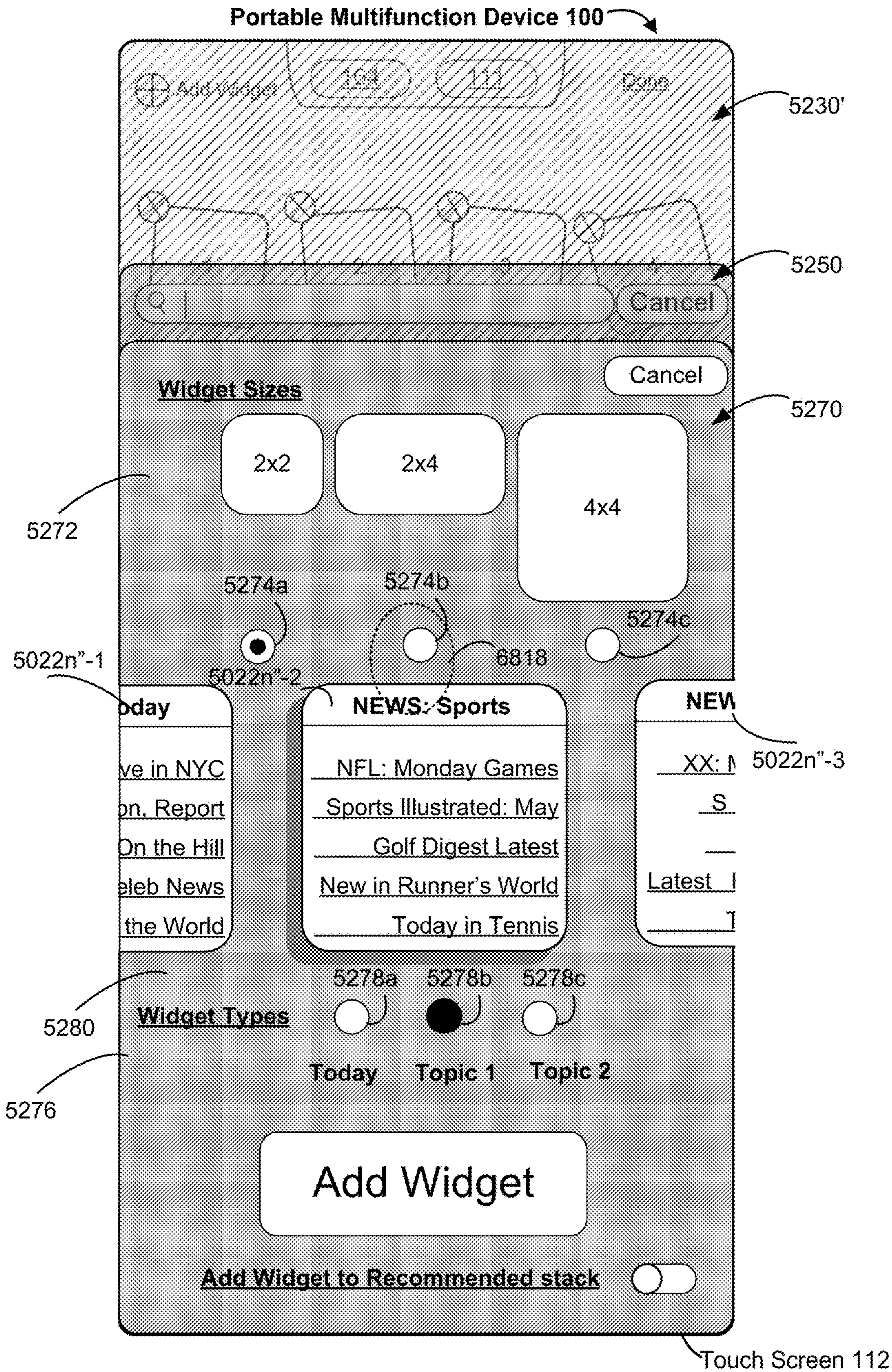
Figure 5I8

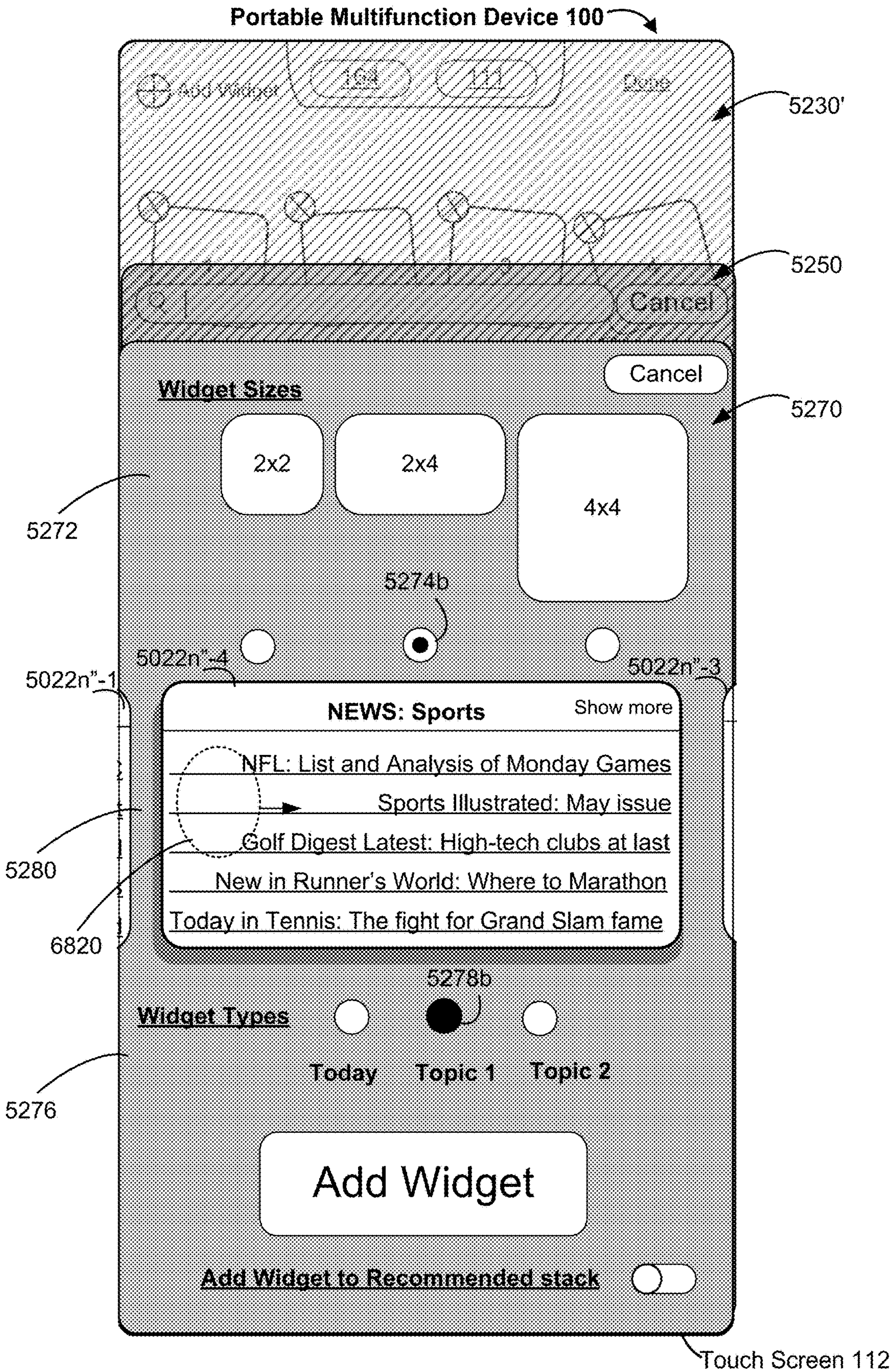
Figure 5I9

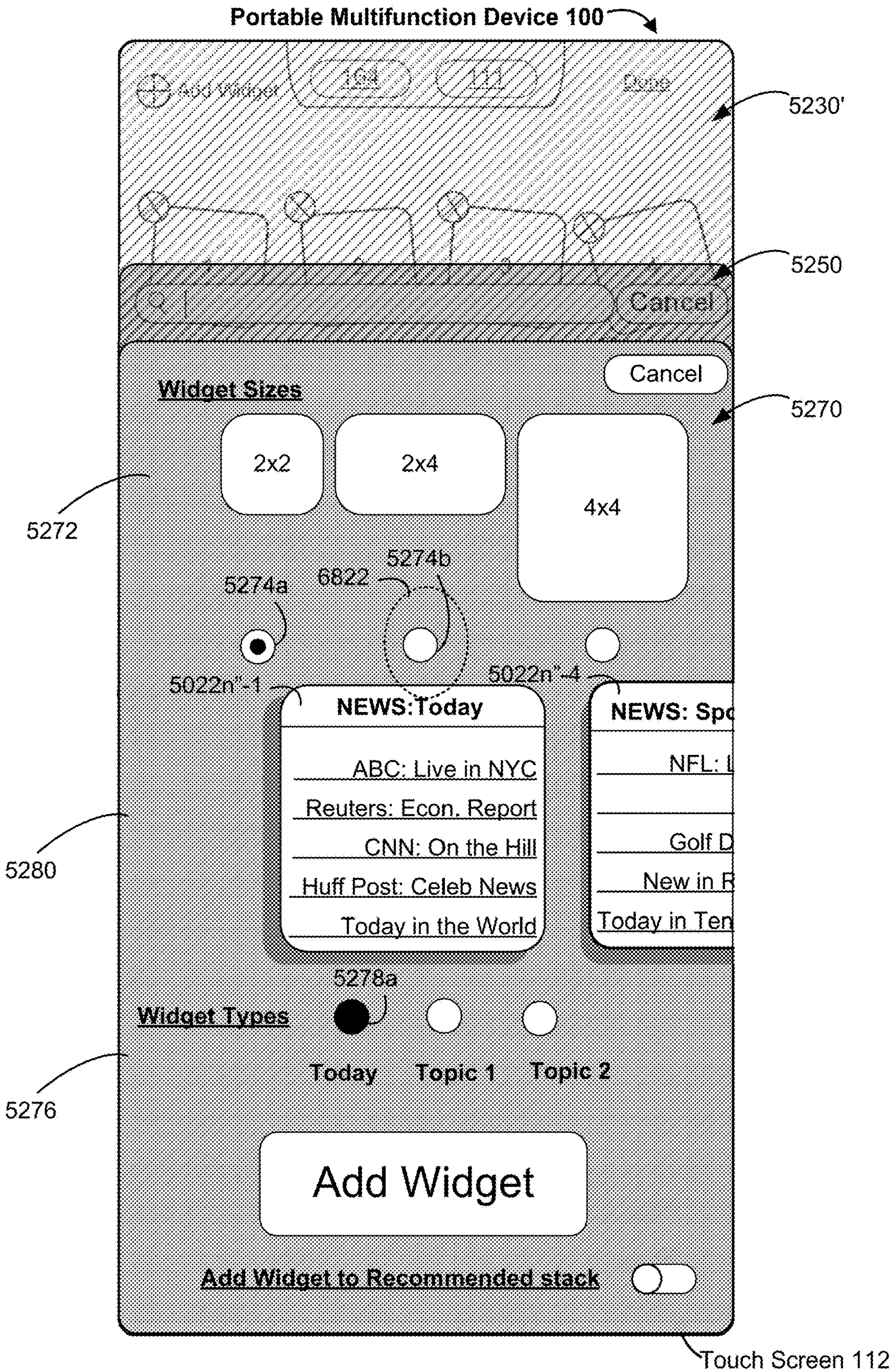
Figure 5I10

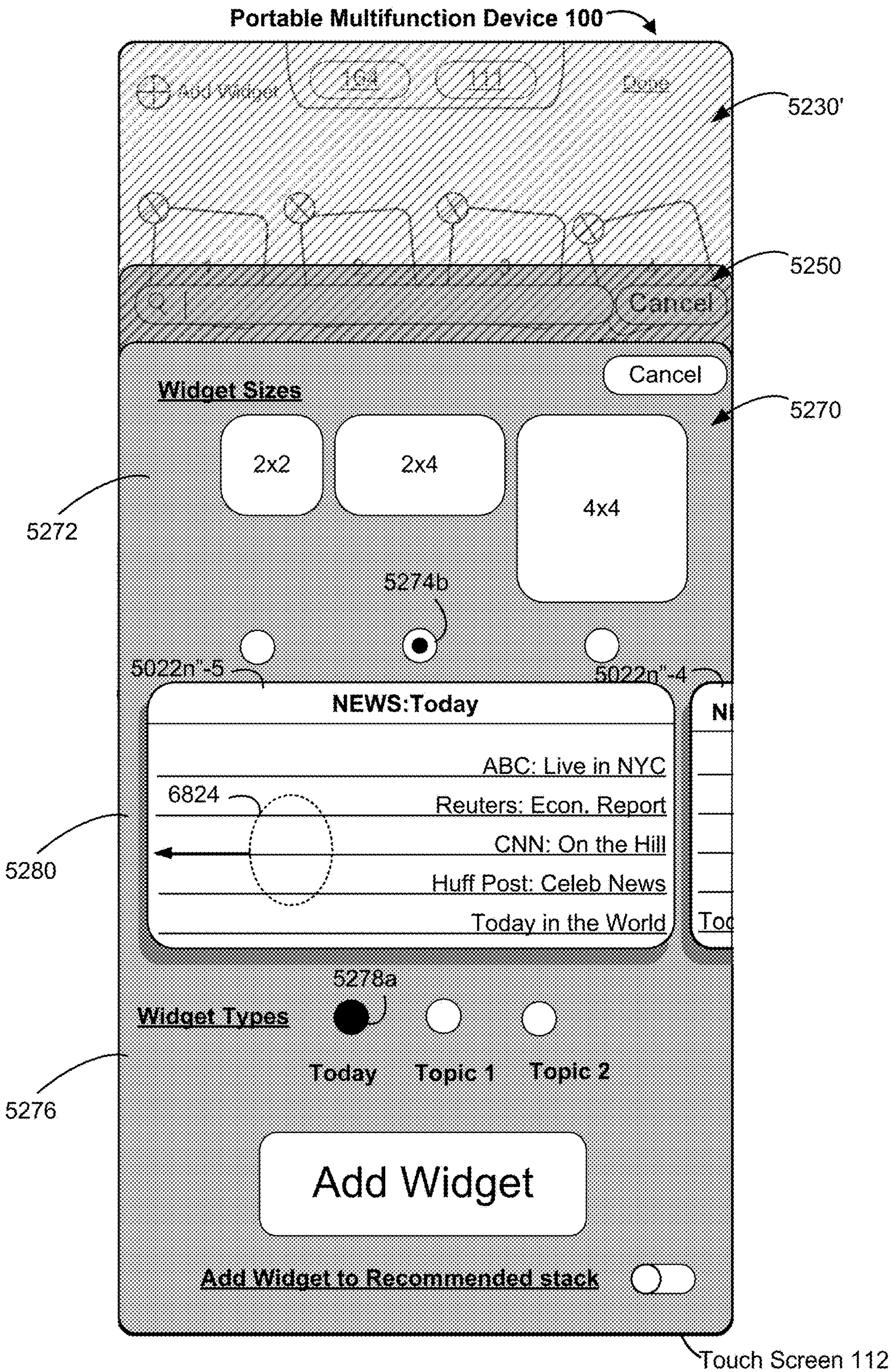
Figure 5I11

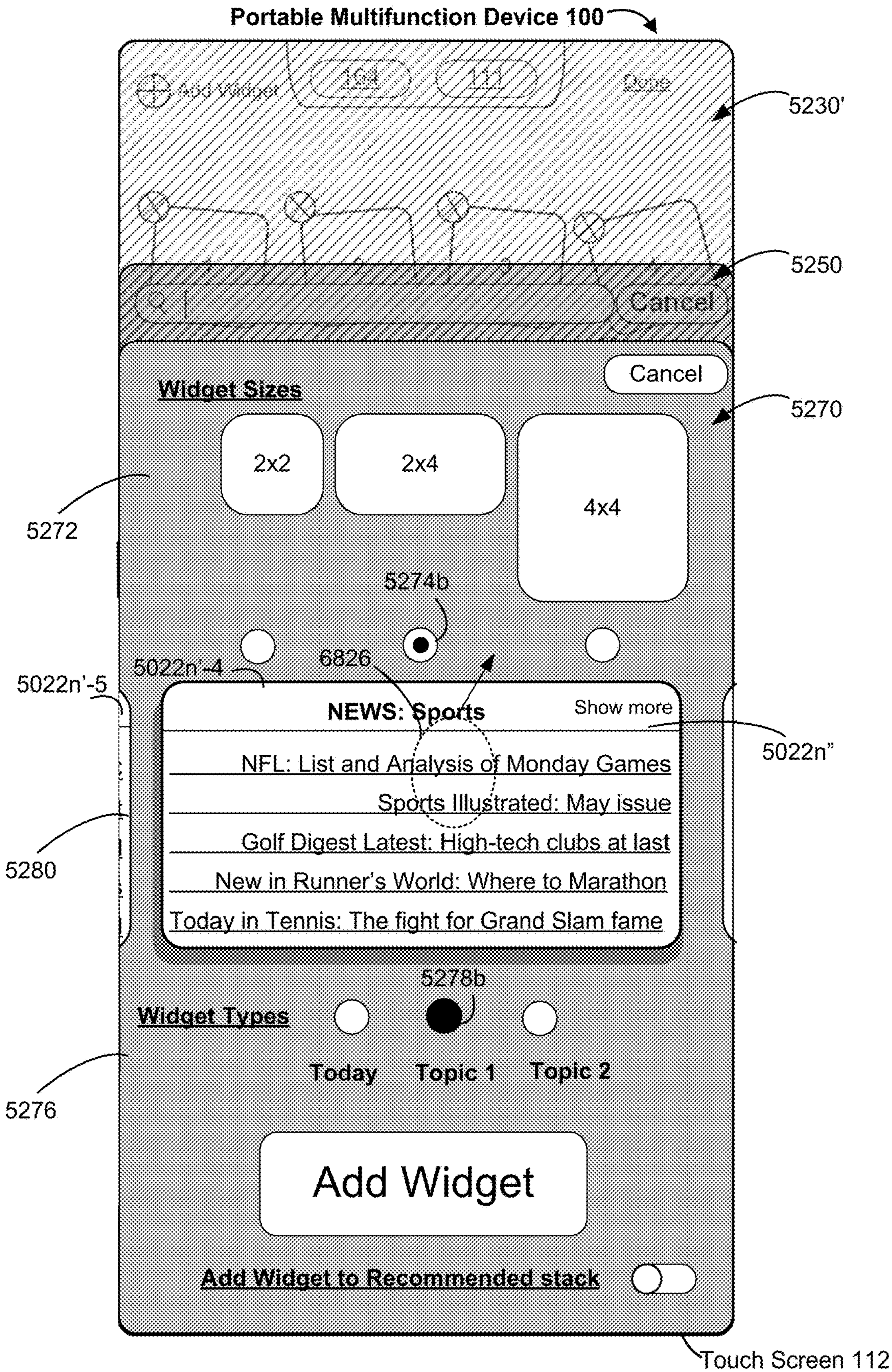
Figure 5I12

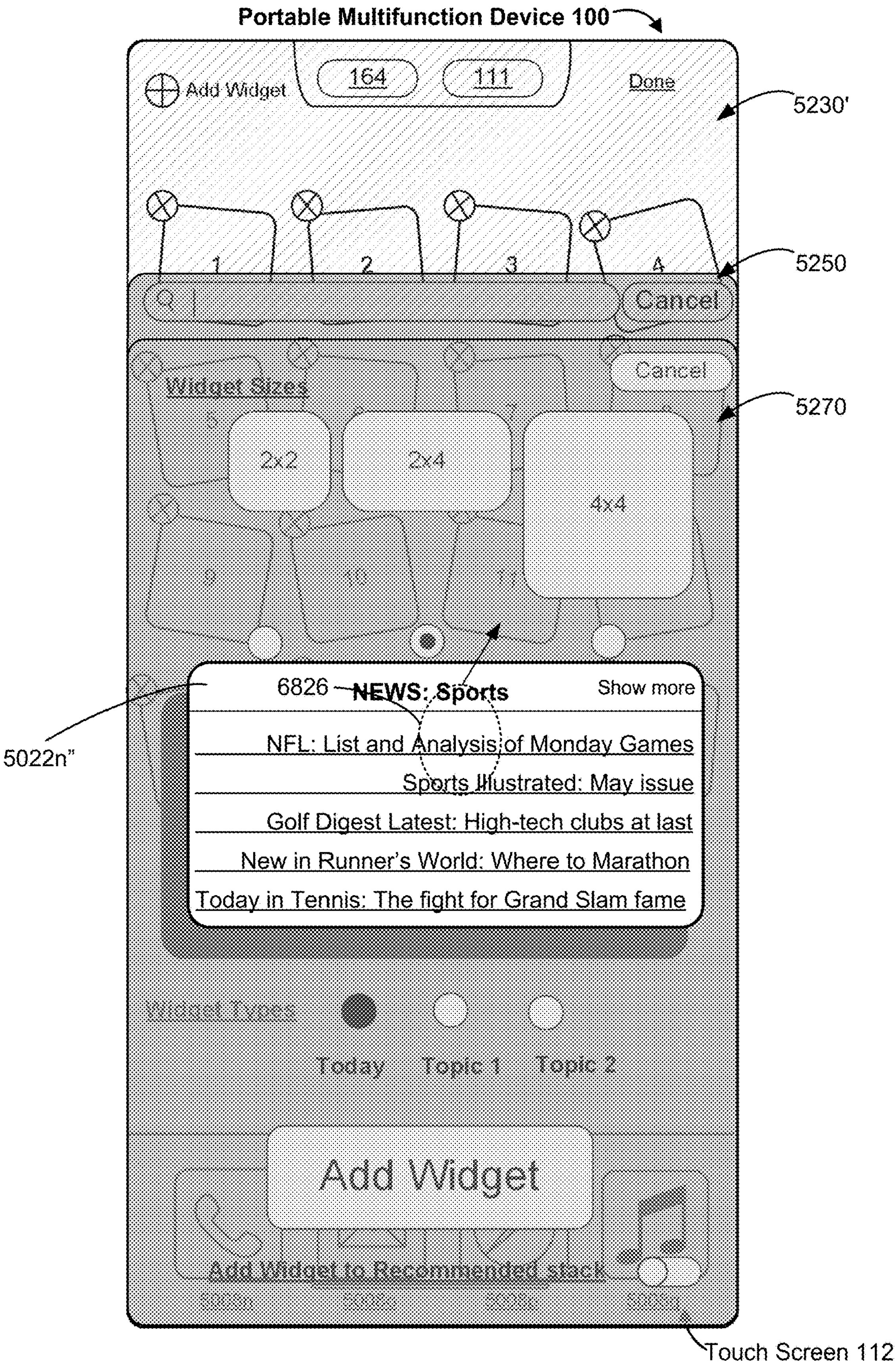
Figure 5I13

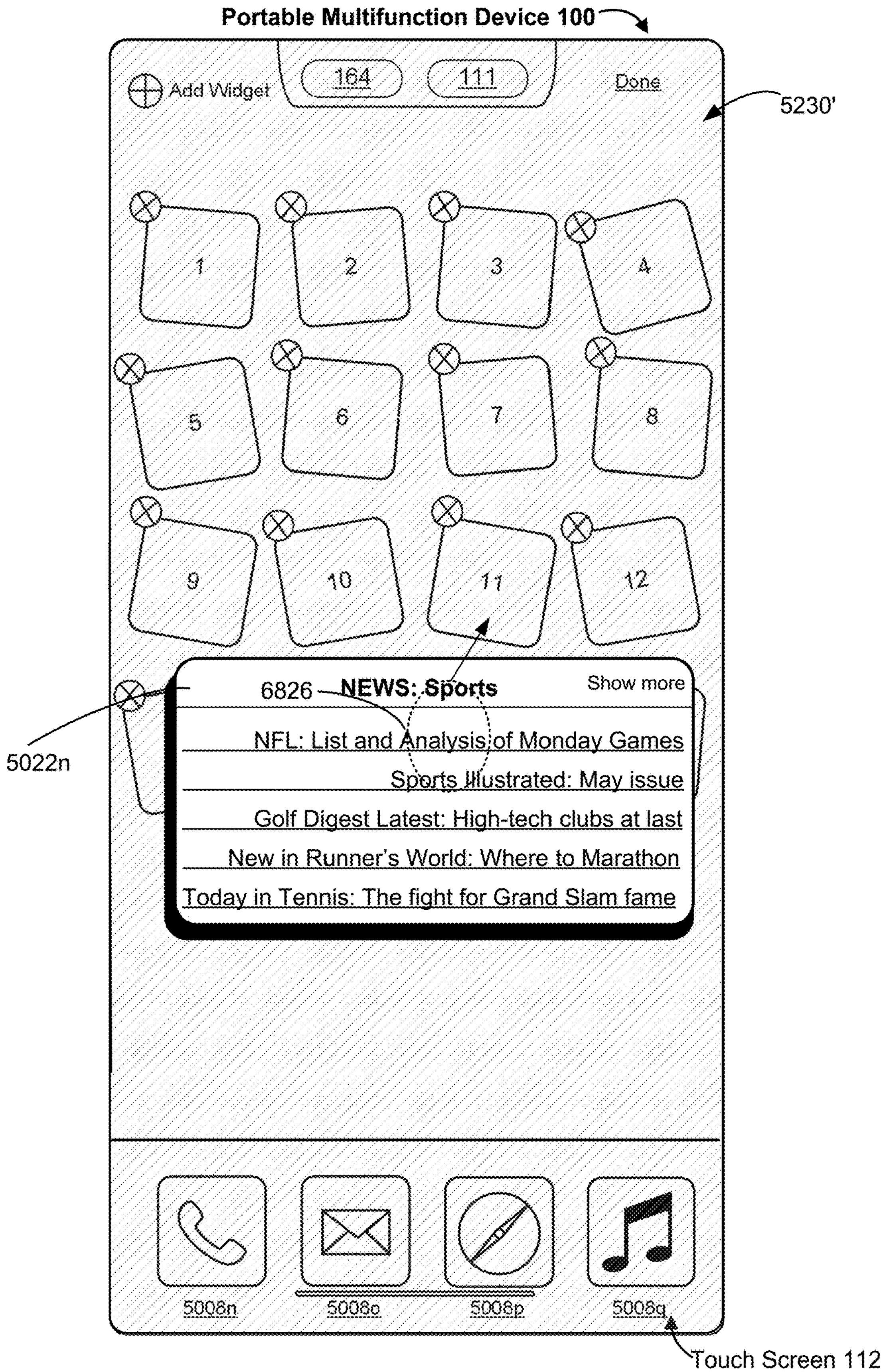
Figure 5I14

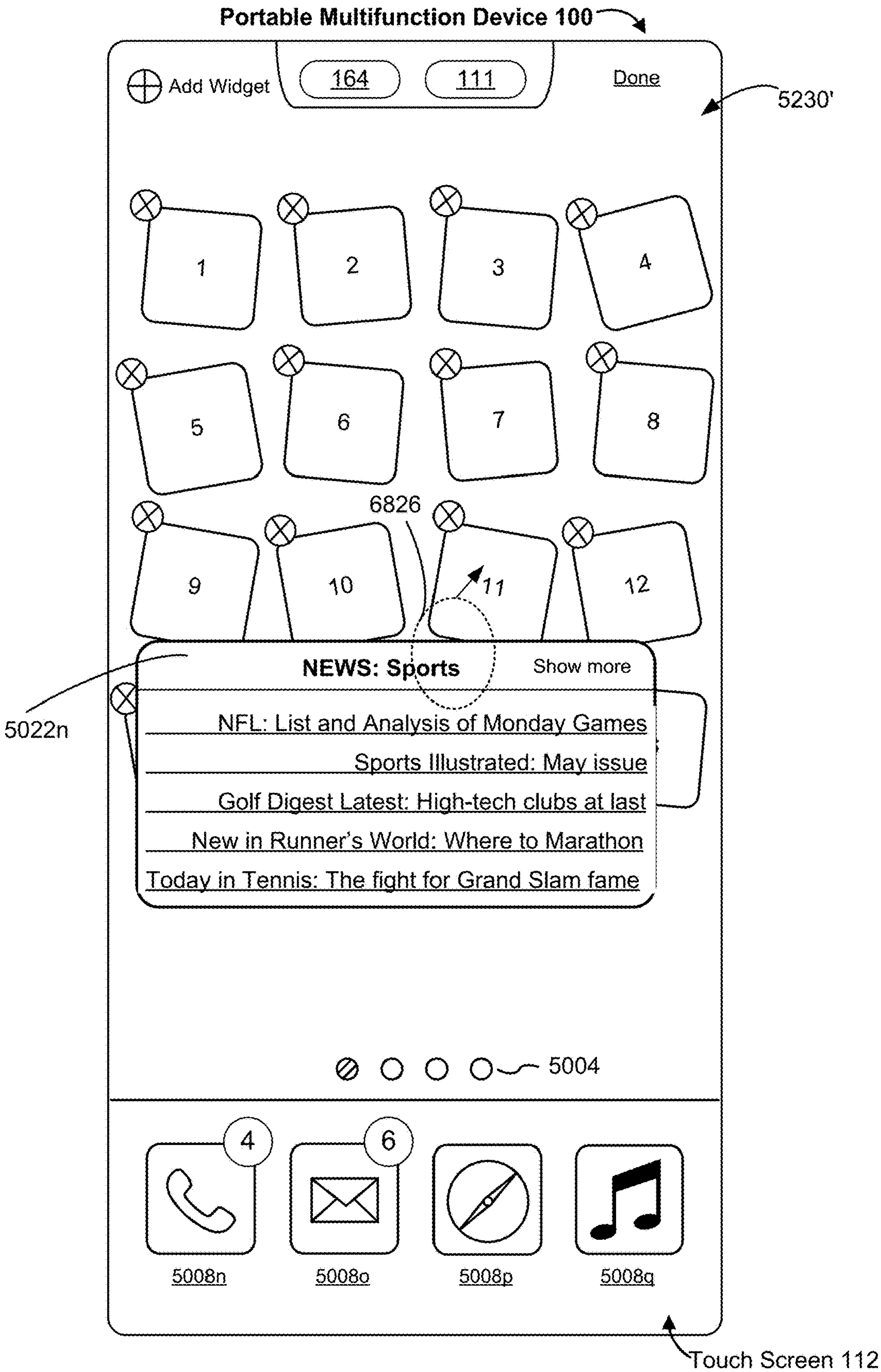
Figure 5I15

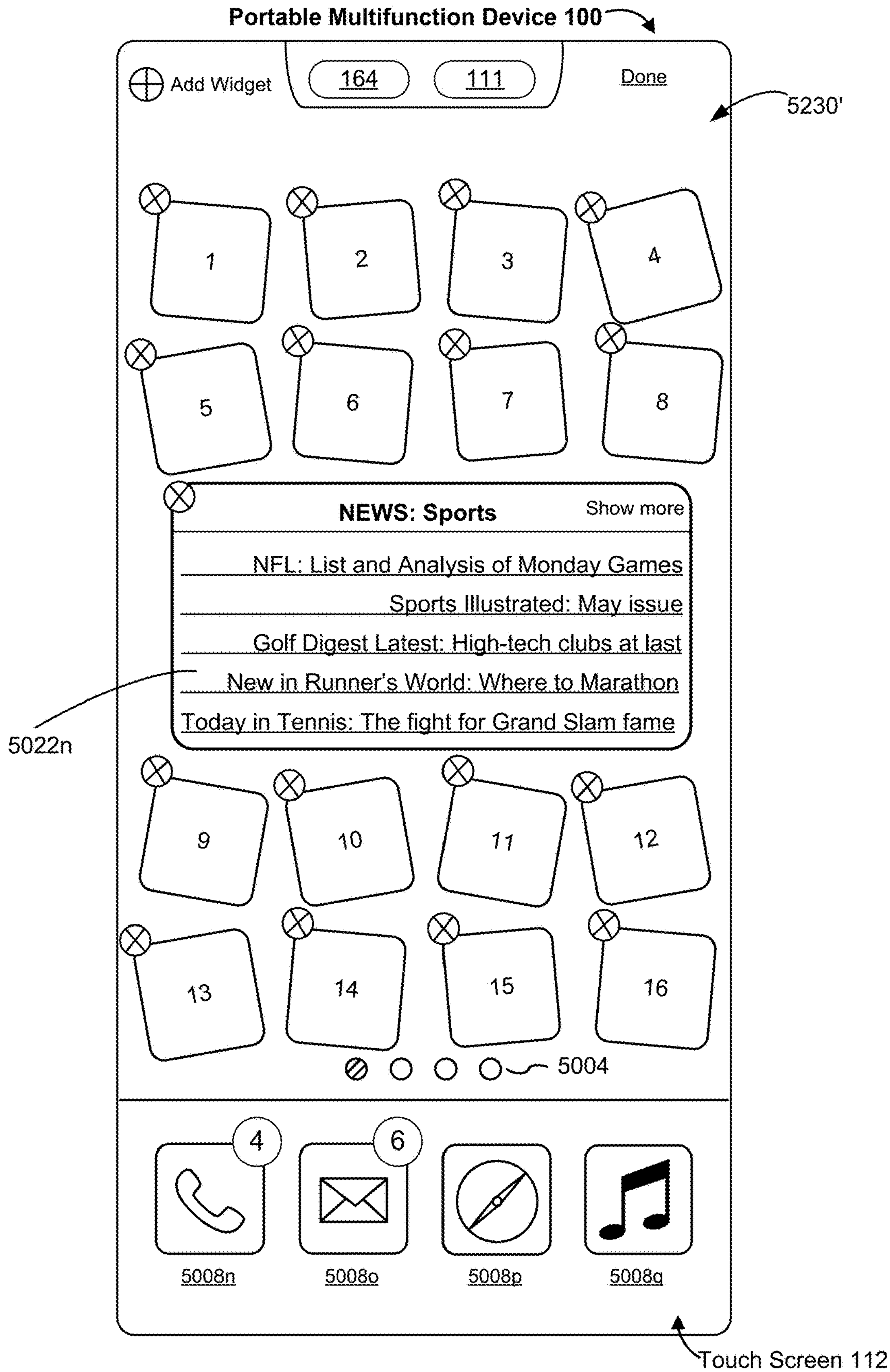
Figure 5I16

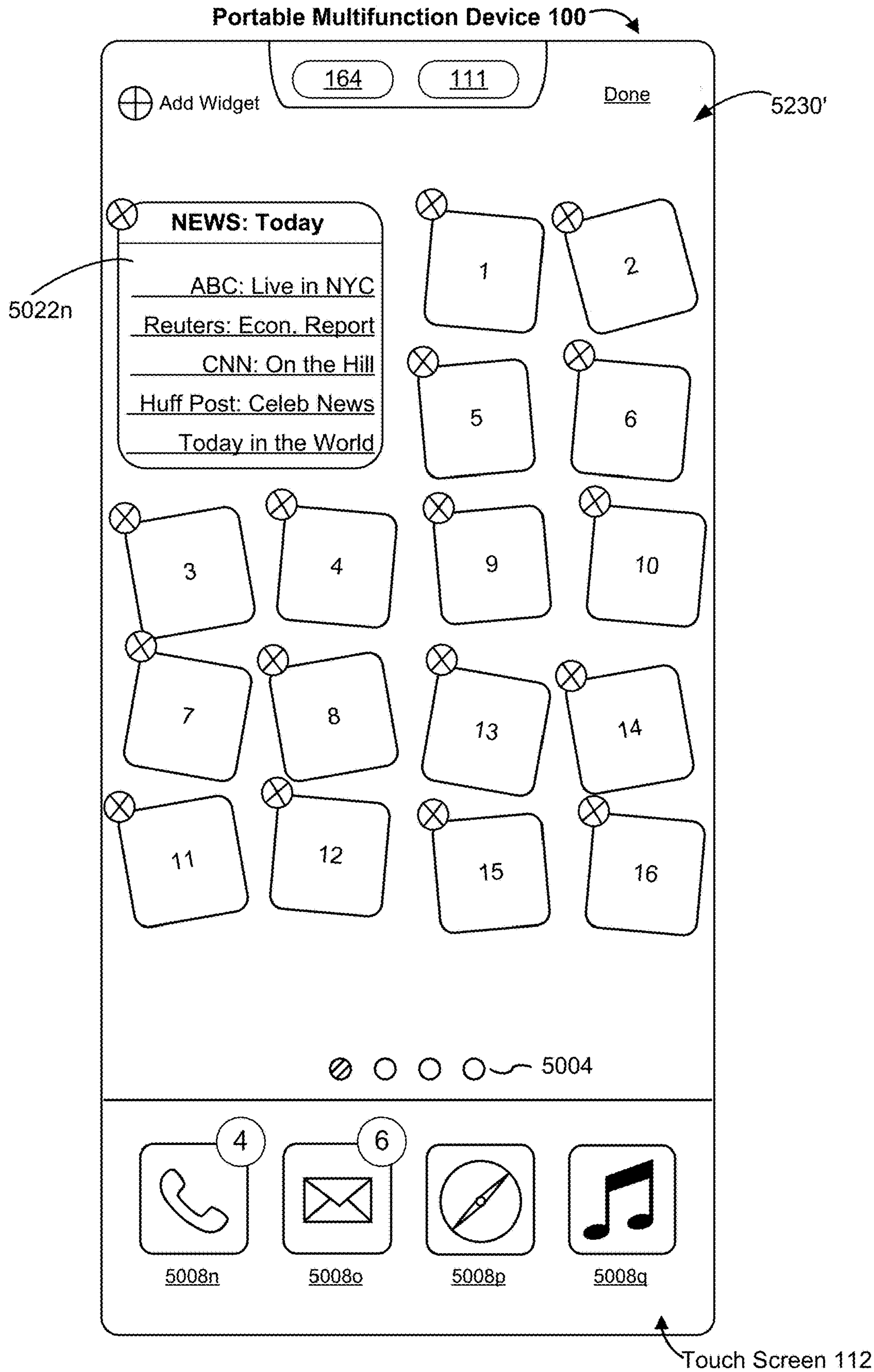
Figure 5I17

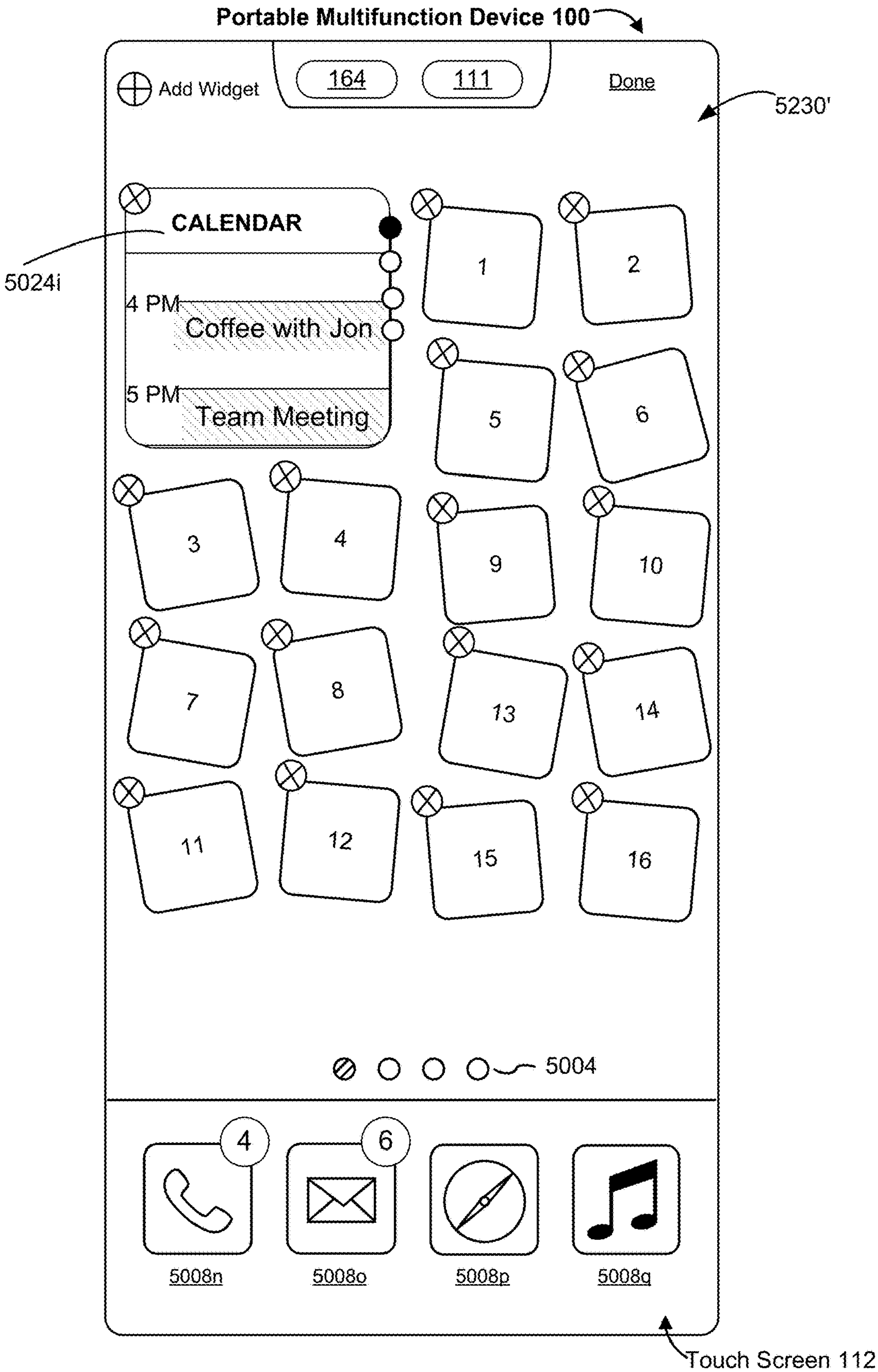
Figure 5I18

Figure 6A:
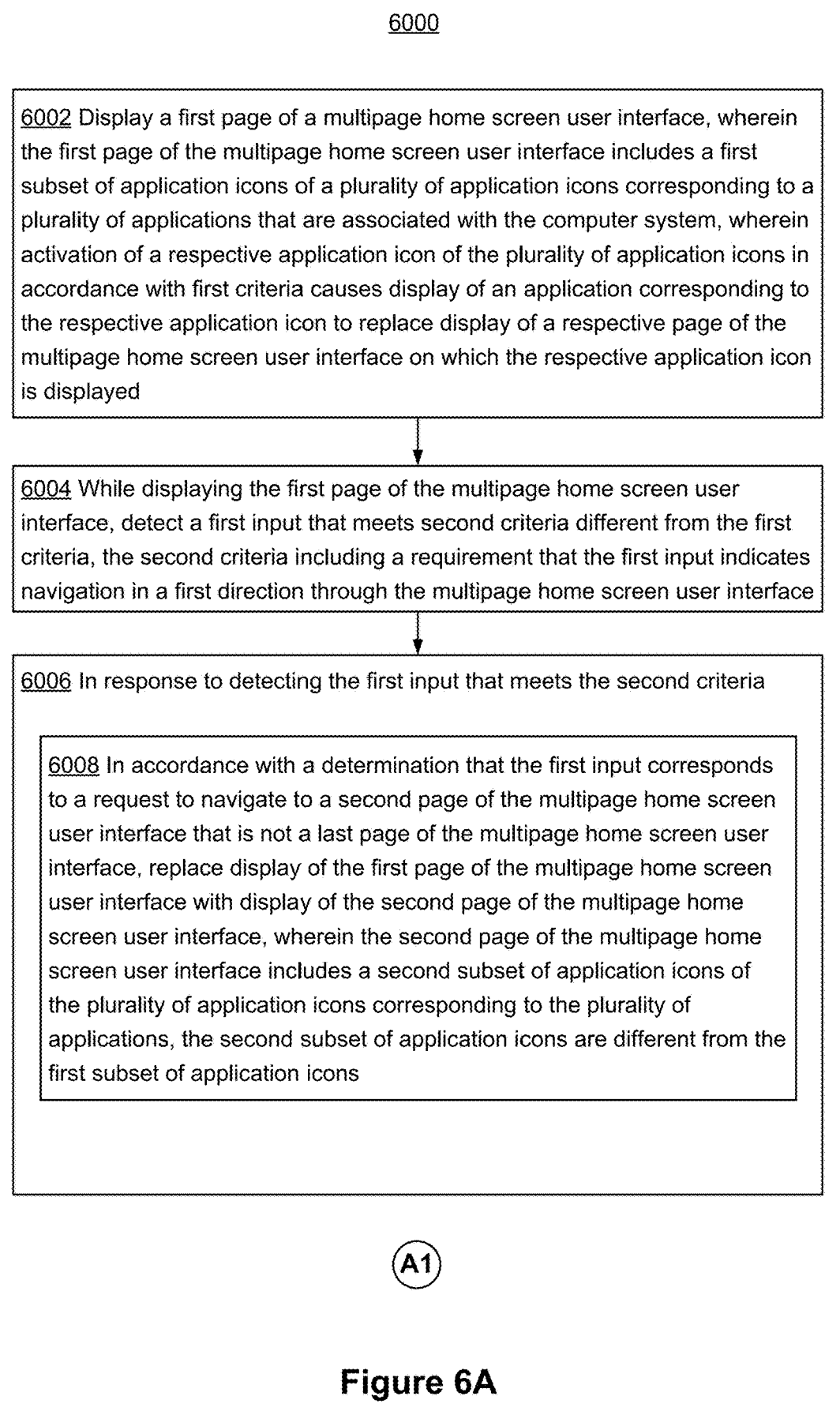

6000

6002 Display a first page of a multipage home screen user interface, wherein the first page of the multipage home screen user interface includes a first subset of application icons of a plurality of application icons corresponding to a plurality of applications that are associated with the computer system, wherein activation of a respective application icon of the plurality of application icons in accordance with first criteria causes display of an application corresponding to the respective application icon to replace display of a respective page of the multipage home screen user interface on which the respective application icon is displayed

↓

6004 While displaying the first page of the multipage home screen user interface, detect a first input that meets second criteria different from the first criteria, the second criteria including a requirement that the first input indicates navigation in a first direction through the multipage home screen user interface

↓

6006 In response to detecting the first input that meets the second criteria

6008 In accordance with a determination that the first input corresponds to a request to navigate to a second page of the multipage home screen user interface that is not a last page of the multipage home screen user interface, replace display of the first page of the multipage home screen user interface with display of the second page of the multipage home screen user interface, wherein the second page of the multipage home screen user interface includes a second subset of application icons of the plurality of application icons corresponding to the plurality of applications, the second subset of application icons are different from the first subset of application icons

Figure 6B:
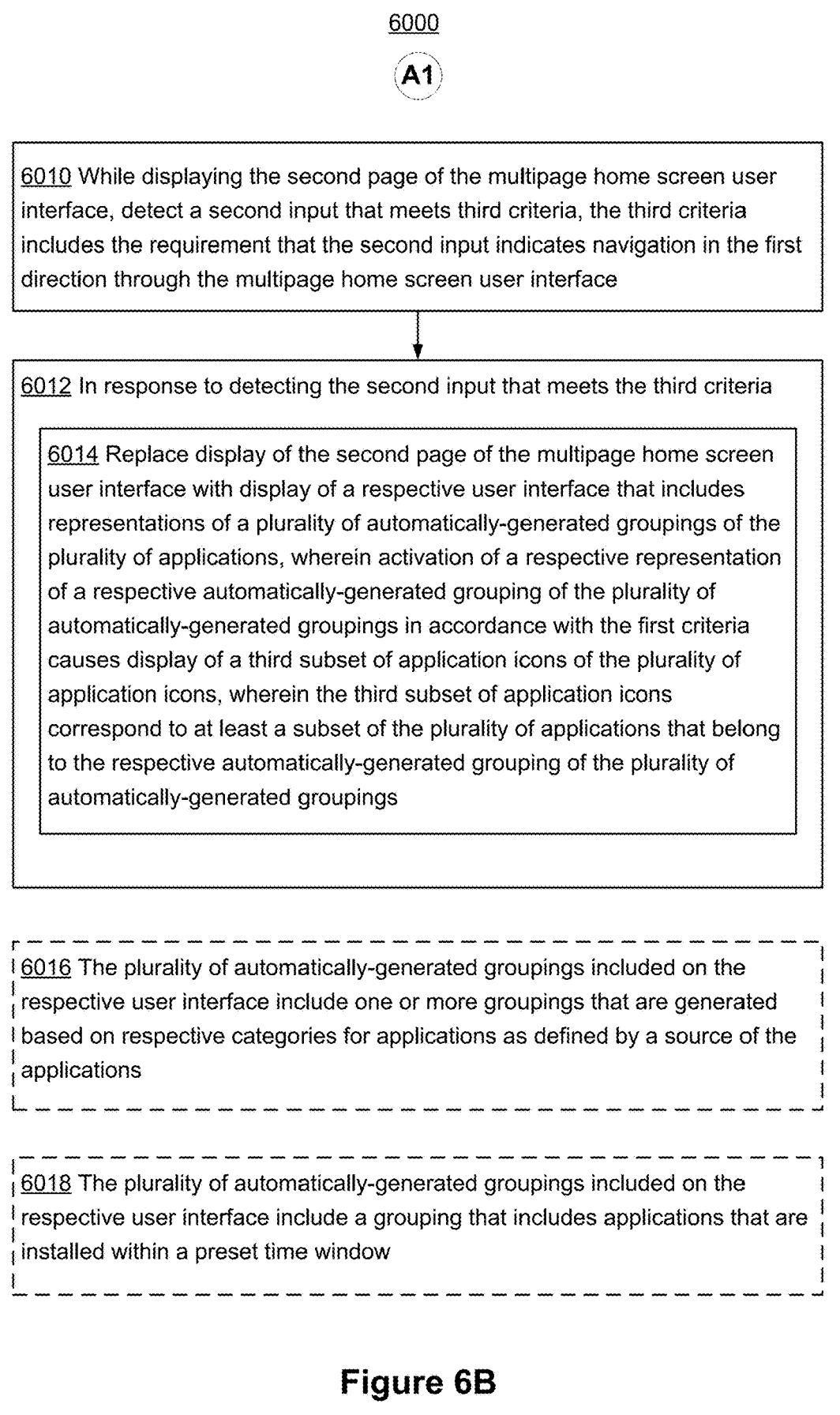

6010 While displaying the second page of the multipage home screen user interface, detect a second input that meets third criteria, the third criteria includes the requirement that the second input indicates navigation in the first direction through the multipage home screen user interface 6012 In response to detecting the second input that meets the third criteria 6014 Replace display of the second page of the multipage home screen user interface with display of a respective user interface that includes representations of a plurality of automatically-generated groupings of the plurality of applications, wherein activation of a respective representation of a respective automatically-generated grouping of the plurality of automatically-generated groupings in accordance with the first criteria causes display of a third subset of application icons of the plurality of application icons, wherein the third subset of application icons correspond to at least a subset of the plurality of applications that belong to the respective automatically-generated grouping of the plurality of automatically-generated groupings 6016 The plurality of automatically-generated groupings included on the respective user interface include one or more groupings that are generated based on respective categories for applications as defined by a source of the applications 6018 The plurality of automatically-generated groupings included on the respective user interface include a grouping that includes applications that are installed within a preset time window

Figure 6C:
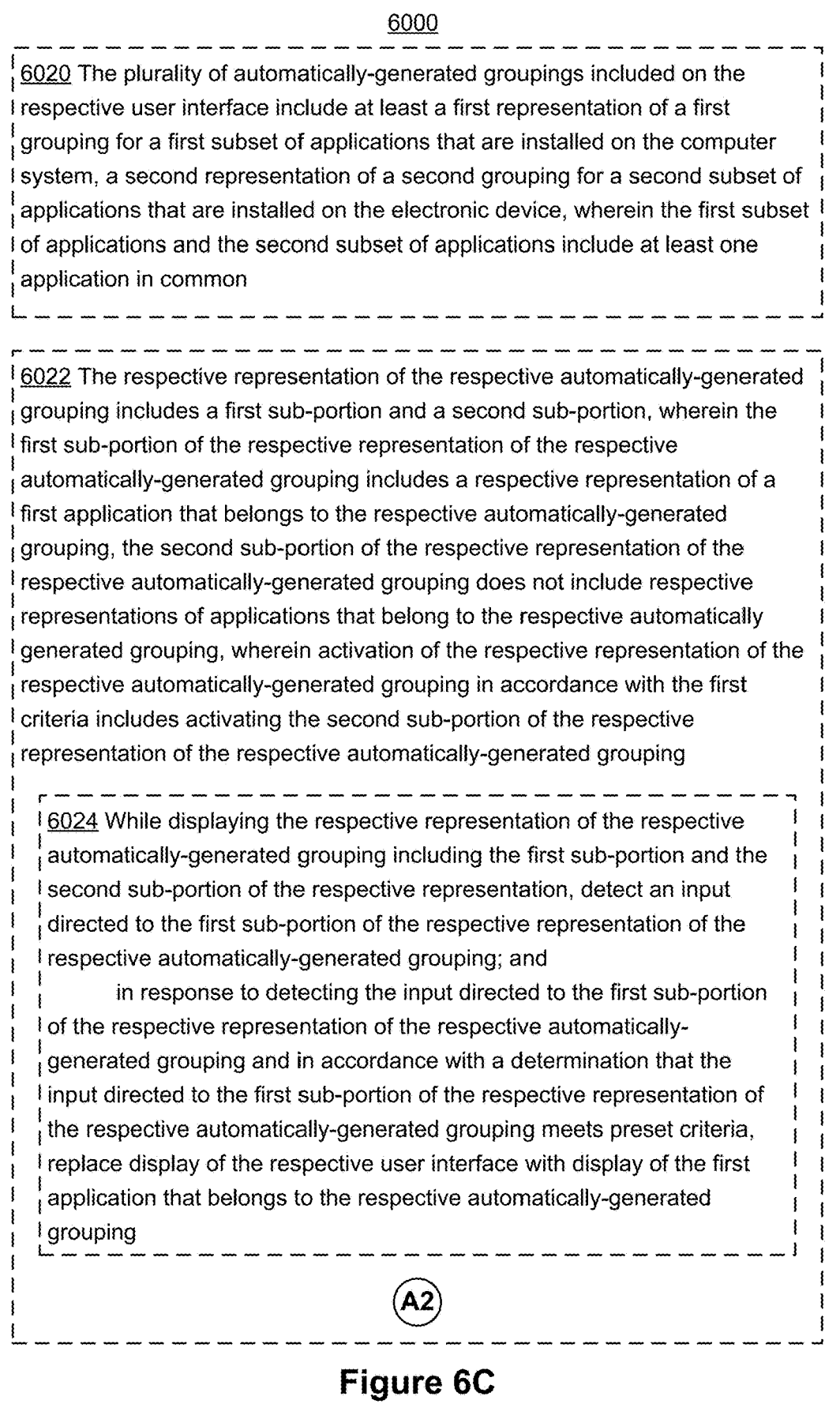

6020 The plurality of automatically-generated groupings included on the respective user interface include at least a first representation of a first grouping for a first subset of applications that are installed on the computer system, a second representation of a second grouping for a second subset of applications that are installed on the electronic device, wherein the first subset of applications and the second subset of applications include at least one application in common 6022 The respective representation of the respective automatically-generated grouping includes a first sub-portion and a second sub-portion, wherein the first sub-portion of the respective representation of the respective automatically-generated grouping includes a respective representation of a first application that belongs to the respective automatically-generated grouping, the second sub-portion of the respective representation of the respective automatically-generated grouping does not include respective representations of applications that belong to the respective automatically generated grouping, wherein activation of the respective representation of the respective automatically-generated grouping in accordance with the first criteria includes activating the second sub-portion of the respective representation of the respective automatically-generated grouping 6024 While displaying the respective representation of the respective automatically-generated grouping including the first sub-portion and the second sub-portion of the respective representation, detect an input directed to the first sub-portion of the respective representation of the respective automatically-generated grouping; and in response to detecting the input directed to the first sub-portion of the respective representation of the respective automatically-generated grouping and in accordance with a determination that the input directed to the first sub-portion of the respective representation of the respective automatically-generated grouping meets preset criteria, replace display of the respective user interface with display of the first application that belongs to the respective automatically-generated grouping

Figure 6D:
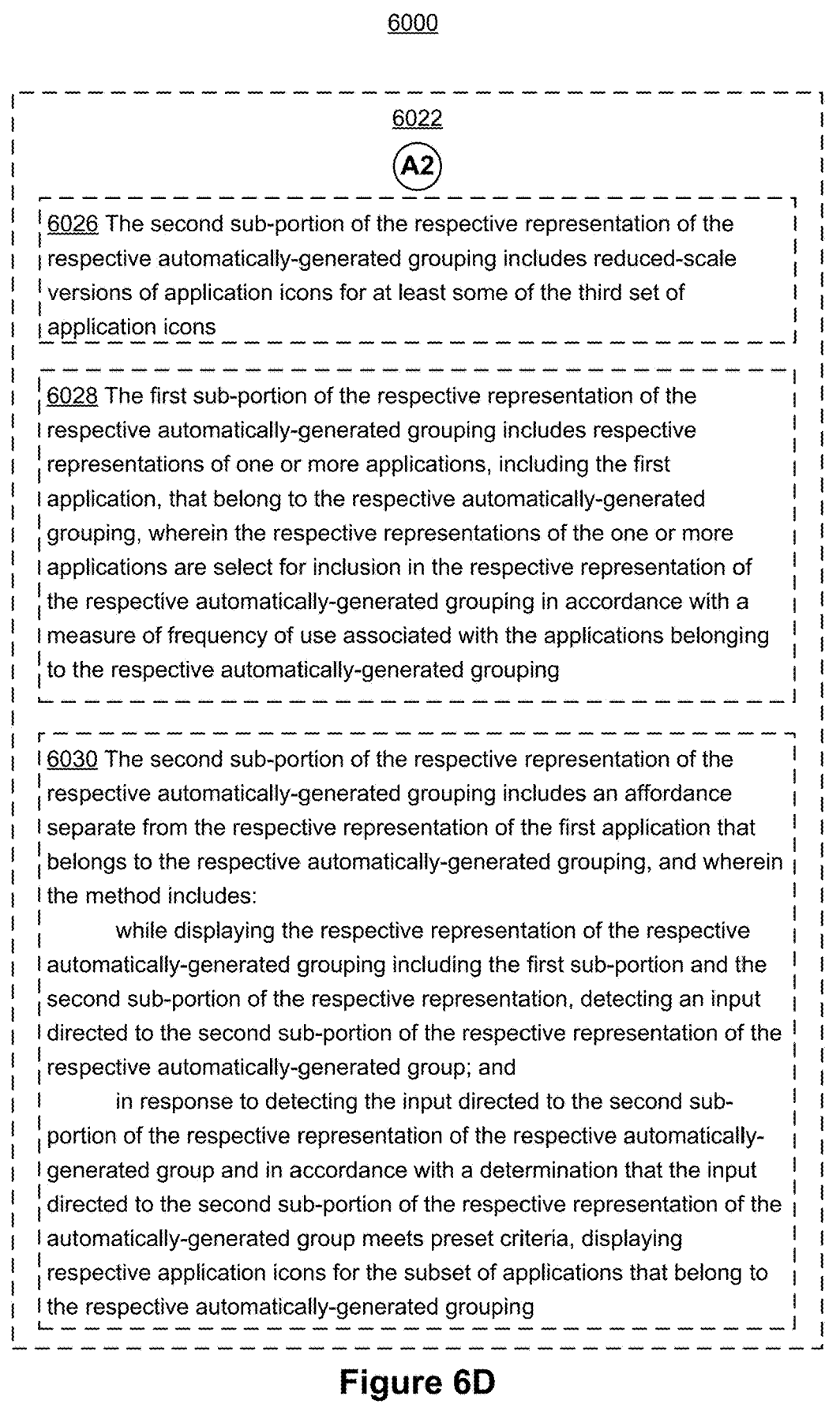

6026 The second sub-portion of the respective representation of the respective automatically-generated grouping includes reduced-scale versions of application icons for at least some of the third set of application icons 6028 The first sub-portion of the respective representation of the respective automatically-generated grouping includes respective representations of one or more applications, including the first application, that belong to the respective automatically-generated grouping, wherein the respective representations of the one or more applications are select for inclusion in the respective representation of the respective automatically-generated grouping in accordance with a measure of frequency of use associated with the applications belonging to the respective automatically-generated grouping 6030 The second sub-portion of the respective representation of the respective automatically-generated grouping includes an affordance separate from the respective representation of the first application that belongs to the respective automatically-generated grouping, and wherein the method includes:

while displaying the respective representation of the respective automatically-generated grouping including the first sub-portion and the second sub-portion of the respective representation, detecting an input directed to the second sub-portion of the respective representation of the respective automatically-generated group; and in response to detecting the input directed to the second sub-portion of the respective representation of the respective automatically-generated group and in accordance with a determination that the input directed to the second sub-portion of the respective representation of the automatically-generated group meets preset criteria, displaying respective application icons for the subset of applications that belong to the respective automatically-generated grouping

Figure 6E:
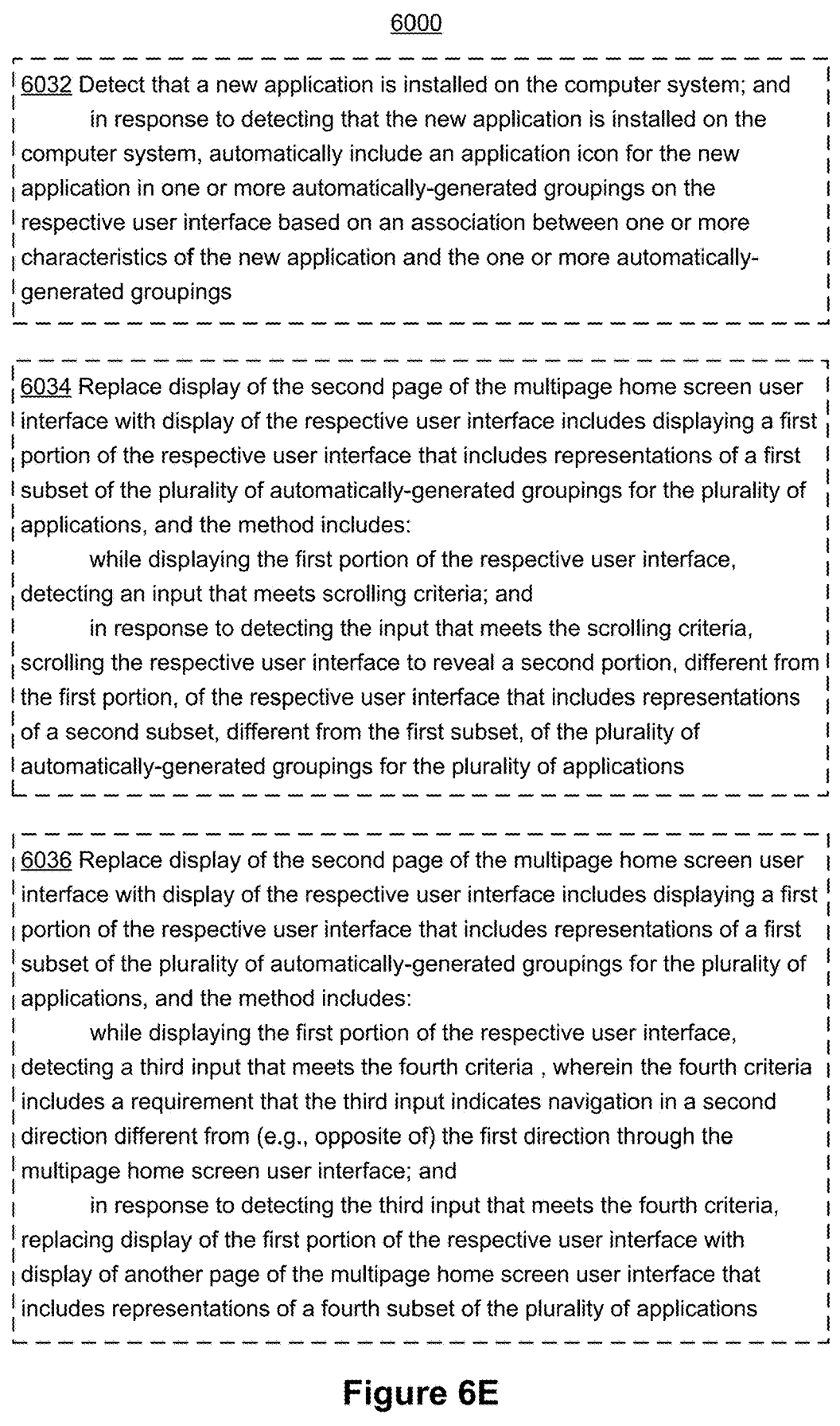

6032 Detect that a new application is installed on the computer system; and in response to detecting that the new application is installed on the computer system, automatically include an application icon for the new application in one or more automatically-generated groupings on the respective user interface based on an association between one or more characteristics of the new application and the one or more automatically-generated groupings 6034 Replace display of the second page of the multipage home screen user interface with display of the respective user interface includes displaying a first portion of the respective user interface that includes representations of a first subset of the plurality of automatically-generated groupings for the plurality of applications, and the method includes:

while displaying the first portion of the respective user interface, detecting an input that meets scrolling criteria; and in response to detecting the input that meets the scrolling criteria, scrolling the respective user interface to reveal a second portion, different from the first portion, of the respective user interface that includes representations of a second subset, different from the first subset, of the plurality of automatically-generated groupings for the plurality of applications 6036 Replace display of the second page of the multipage home screen user interface with display of the respective user interface includes displaying a first portion of the respective user interface that includes representations of a first subset of the plurality of automatically-generated groupings for the plurality of applications, and the method includes:

while displaying the first portion of the respective user interface, detecting a third input that meets the fourth criteria , wherein the fourth criteria includes a requirement that the third input indicates navigation in a second direction different from (e.g., opposite of) the first direction through the multipage home screen user interface; and in response to detecting the third input that meets the fourth criteria, replacing display of the first portion of the respective user interface with display of another page of the multipage home screen user interface that includes representations of a fourth subset of the plurality of applications

Figure 6F:
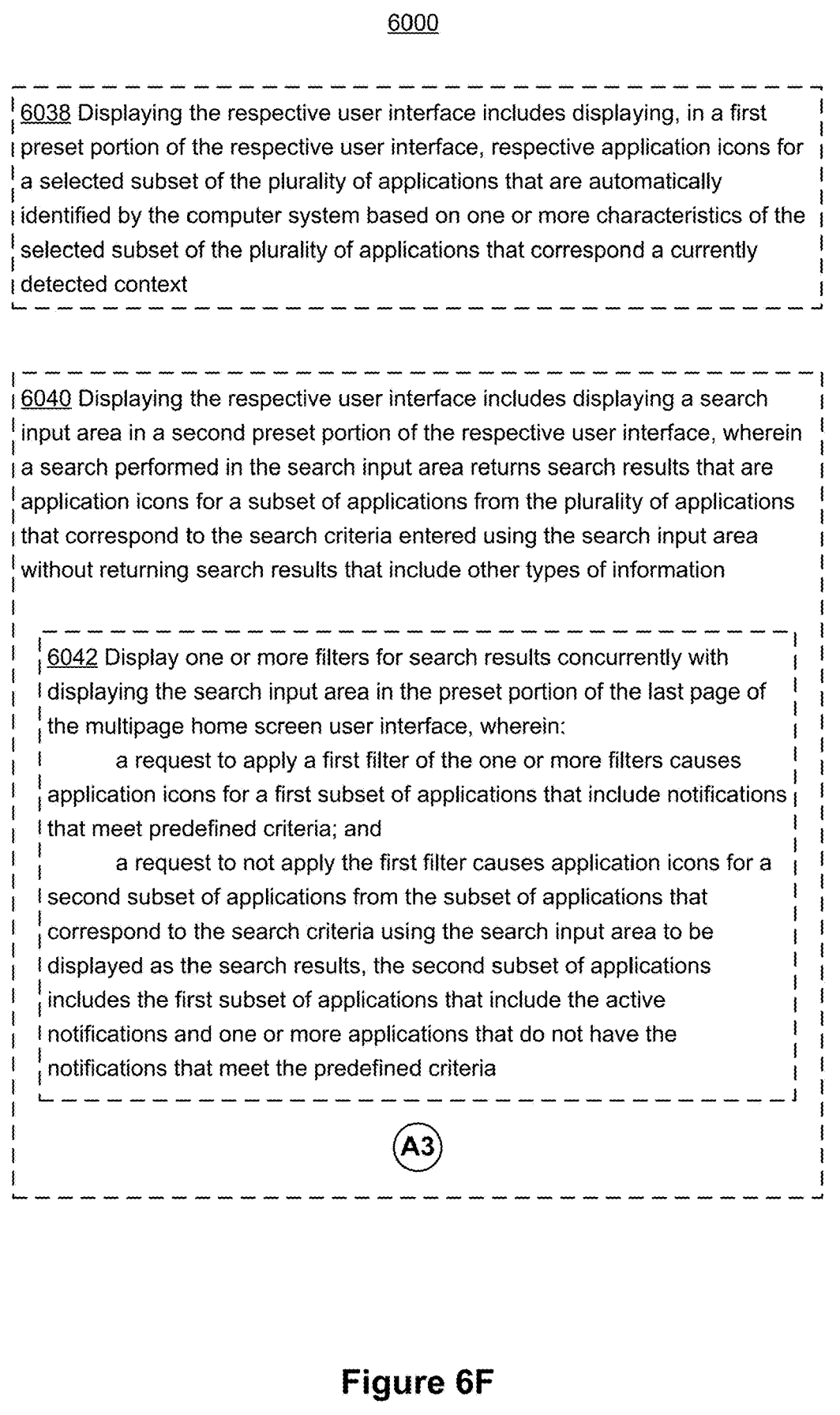

6038 Displaying the respective user interface includes displaying, in a first preset portion of the respective user interface, respective application icons for a selected subset of the plurality of applications that are automatically identified by the computer system based on one or more characteristics of the selected subset of the plurality of applications that correspond a currently detected context 6040 Displaying the respective user interface includes displaying a search input area in a second preset portion of the respective user interface, wherein a search performed in the search input area returns search results that are application icons for a subset of applications from the plurality of applications that correspond to the search criteria entered using the search input area without returning search results that include other types of information 6042 Display one or more filters for search results concurrently with displaying the search input area in the preset portion of the last page of the multipage home screen user interface, wherein:

a request to apply a first filter of the one or more filters causes application icons for a first subset of applications that include notifications that meet predefined criteria; and a request to not apply the first filter causes application icons for a second subset of applications from the subset of applications that correspond to the search criteria using the search input area to be displayed as the search results, the second subset of applications includes the first subset of applications that include the active notifications and one or more applications that do not have the notifications that meet the predefined criteria

Figure 6G:
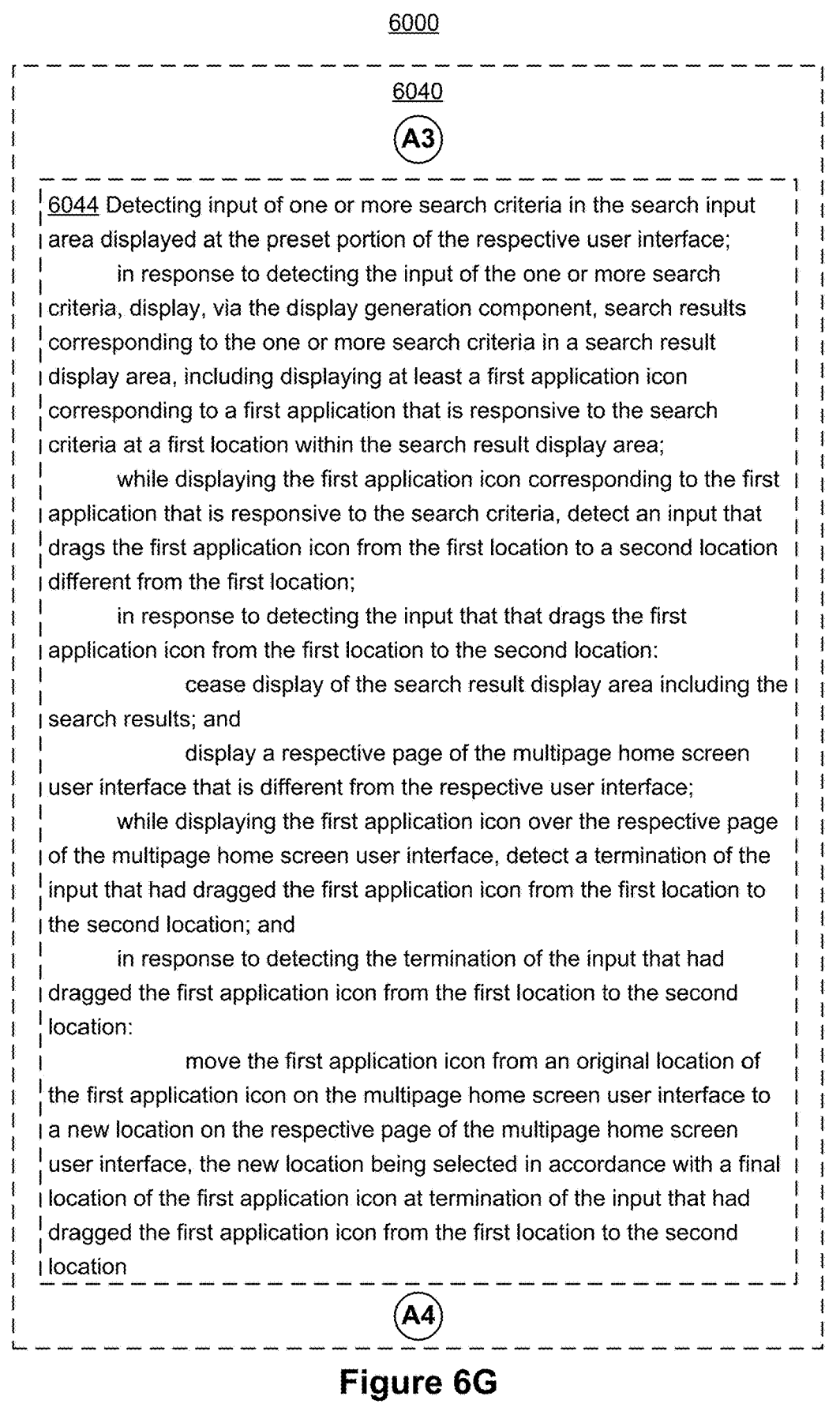

6044 Detecting input of one or more search criteria in the search input area displayed at the preset portion of the respective user interface;

in response to detecting the input of the one or more search criteria, display, via the display generation component, search results corresponding to the one or more search criteria in a search result display area, including displaying at least a first application icon corresponding to a first application that is responsive to the search criteria at a first location within the search result display area;

while displaying the first application icon corresponding to the first application that is responsive to the search criteria, detect an input that drags the first application icon from the first location to a second location different from the first location;

in response to detecting the input that that drags the first application icon from the first location to the second location:

cease display of the search result display area including the search results; and display a respective page of the multipage home screen user interface that is different from the respective user interface;

while displaying the first application icon over the respective page of the multipage home screen user interface, detect a termination of the input that had dragged the first application icon from the first location to the second location; and in response to detecting the termination of the input that had dragged the first application icon from the first location to the second location:

move the first application icon from an original location of the first application icon on the multipage home screen user interface to a new location on the respective page of the multipage home screen user interface, the new location being selected in accordance with a final location of the first application icon at termination of the input that had dragged the first application icon from the first location to the second location (A4)

Figure 6H:
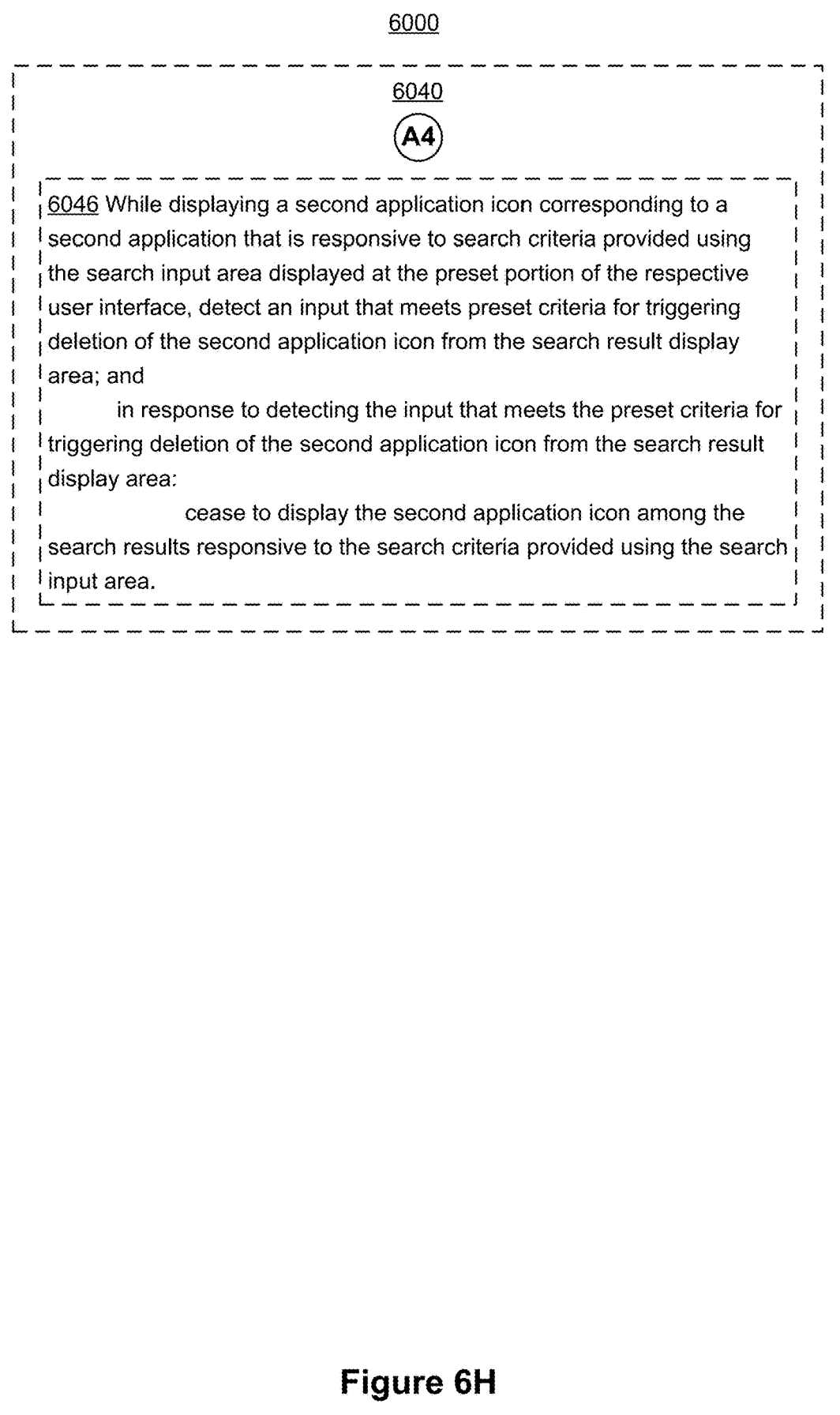

6046 While displaying a second application icon corresponding to a second application that is responsive to search criteria provided using the search input area displayed at the preset portion of the respective user interface, detect an input that meets preset criteria for triggering deletion of the second application icon from the search result display area; and in response to detecting the input that meets the preset criteria for triggering deletion of the second application icon from the search result display area:

cease to display the second application icon among the search results responsive to the search criteria provided using the search input area.

Figure 6I:
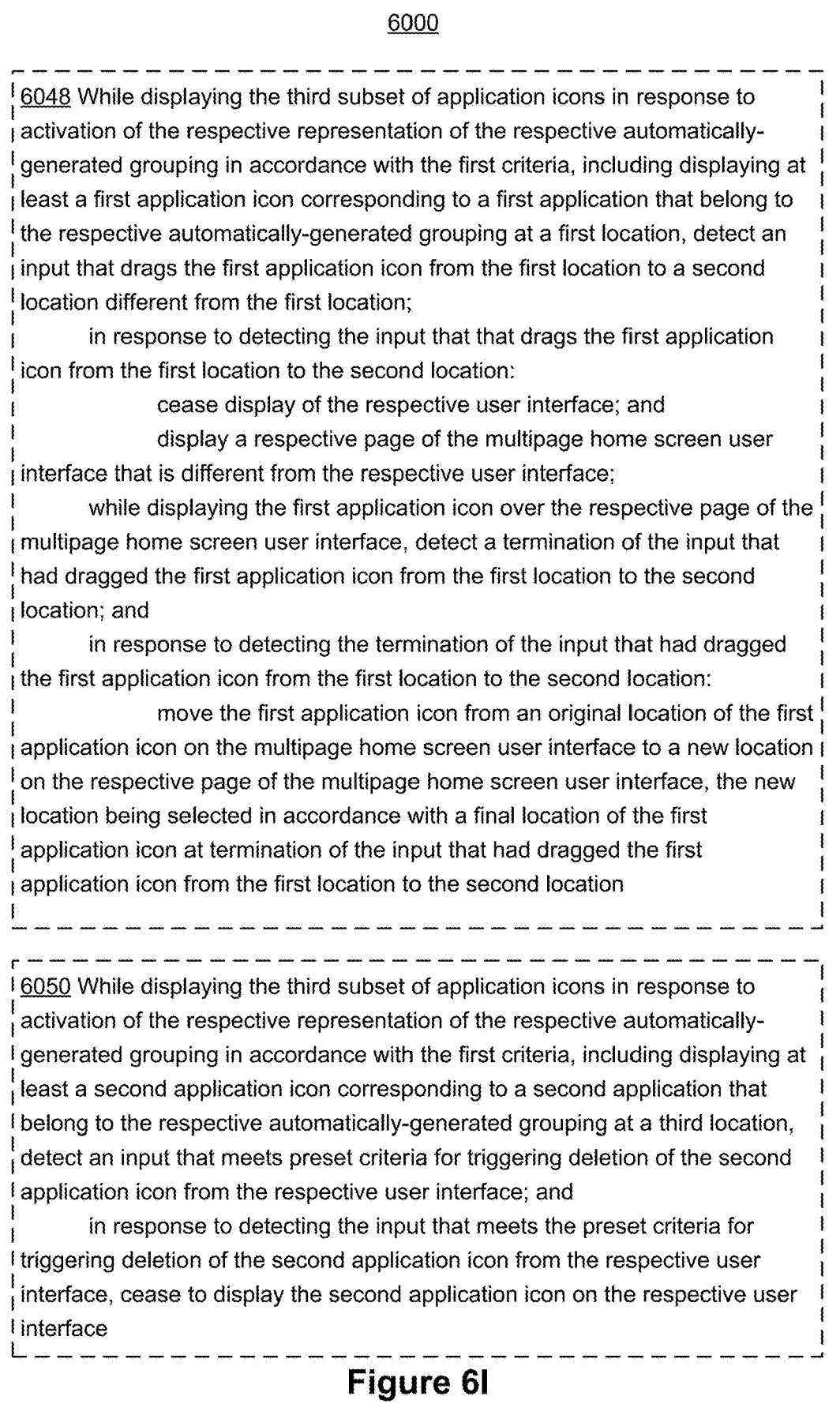

6048 While displaying the third subset of application icons in response to activation of the respective representation of the respective automatically-generated grouping in accordance with the first criteria, including displaying at least a first application icon corresponding to a first application that belong to the respective automatically-generated grouping at a first location, detect an input that drags the first application icon from the first location to a second location different from the first location;

in response to detecting the input that that drags the first application icon from the first location to the second location:

cease display of the respective user interface; and display a respective page of the multipage home screen user interface that is different from the respective user interface;

while displaying the first application icon over the respective page of the multipage home screen user interface, detect a termination of the input that had dragged the first application icon from the first location to the second location; and in response to detecting the termination of the input that had dragged the first application icon from the first location to the second location:

move the first application icon from an original location of the first application icon on the multipage home screen user interface to a new location on the respective page of the multipage home screen user interface, the new location being selected in accordance with a final location of the first application icon at termination of the input that had dragged the first application icon from the first location to the second location 6050 While displaying the third subset of application icons in response to activation of the respective representation of the respective automatically-generated grouping in accordance with the first criteria, including displaying at least a second application icon corresponding to a second application that belong to the respective automatically-generated grouping at a third location, detect an input that meets preset criteria for triggering deletion of the second application icon from the respective user interface; and in response to detecting the input that meets the preset criteria for triggering deletion of the second application icon from the respective user interface, cease to display the second application icon on the respective user interface

Figure 6J:
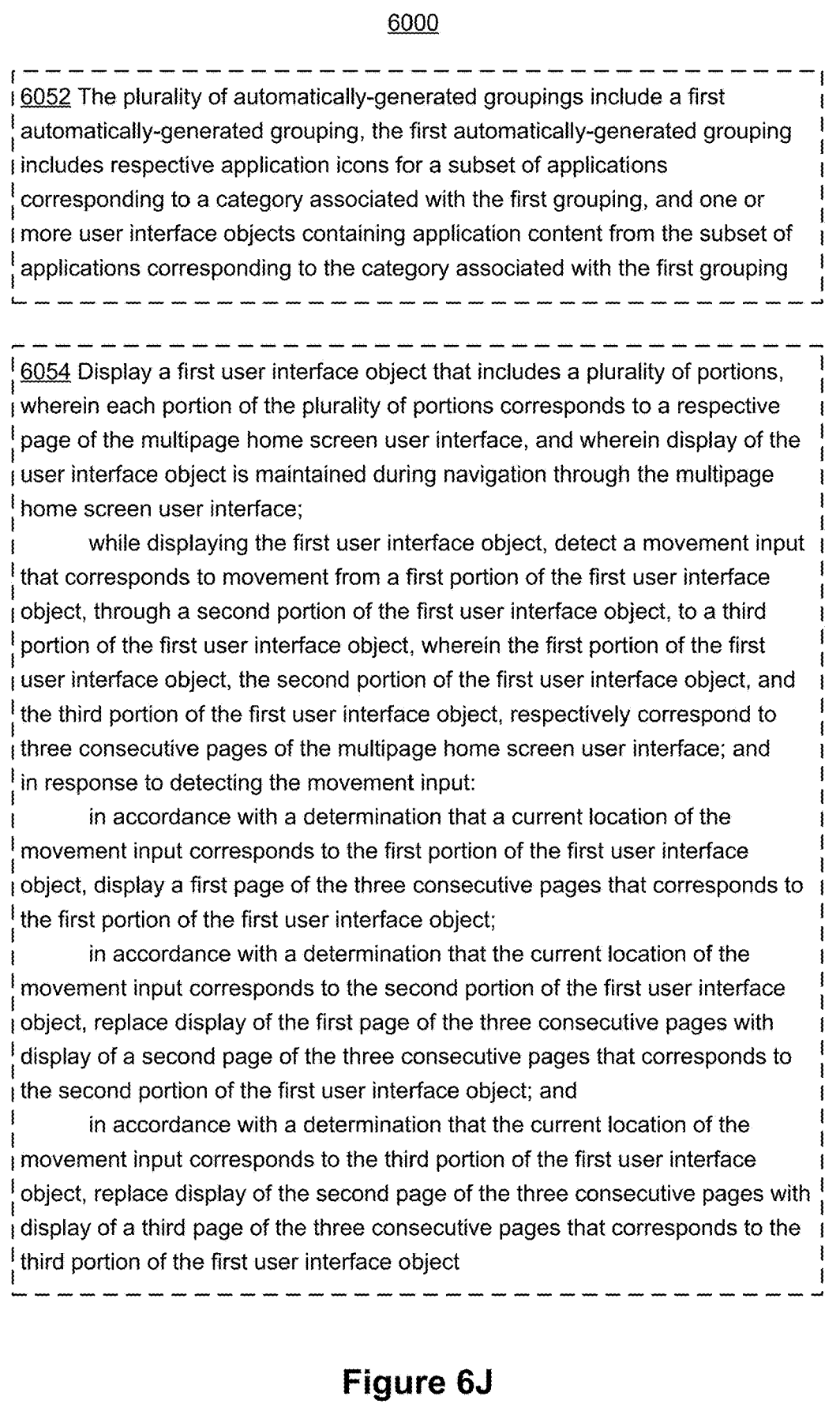

6052 The plurality of automatically-generated groupings include a first automatically-generated grouping, the first automatically-generated grouping includes respective application icons for a subset of applications corresponding to a category associated with the first grouping, and one or more user interface objects containing application content from the subset of applications corresponding to the category associated with the first grouping 6054 Display a first user interface object that includes a plurality of portions, wherein each portion of the plurality of portions corresponds to a respective page of the multipage home screen user interface, and wherein display of the user interface object is maintained during navigation through the multipage home screen user interface;

while displaying the first user interface object, detect a movement input that corresponds to movement from a first portion of the first user interface object, through a second portion of the first user interface object, to a third portion of the first user interface object, wherein the first portion of the first user interface object, the second portion of the first user interface object, and the third portion of the first user interface object, respectively correspond to three consecutive pages of the multipage home screen user interface; and in response to detecting the movement input:

in accordance with a determination that a current location of the movement input corresponds to the first portion of the first user interface object, display a first page of the three consecutive pages that corresponds to the first portion of the first user interface object;

in accordance with a determination that the current location of the movement input corresponds to the second portion of the first user interface object, replace display of the first page of the three consecutive pages with display of a second page of the three consecutive pages that corresponds to the second portion of the first user interface object; and in accordance with a determination that the current location of the movement input corresponds to the third portion of the first user interface object, replace display of the second page of the three consecutive pages with display of a third page of the three consecutive pages that corresponds to the third portion of the first user interface object

Figure 6K:
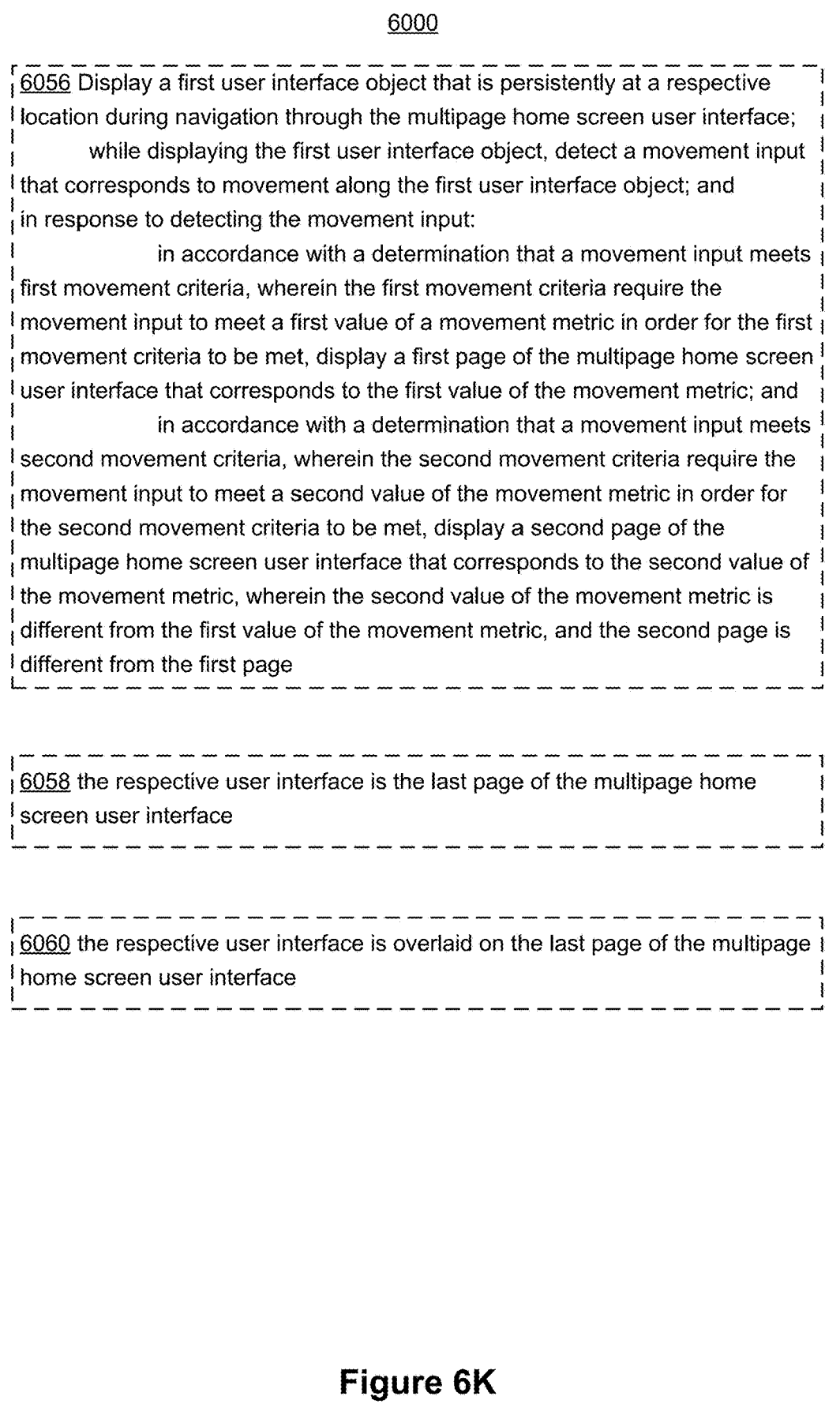

6056 Display a first user interface object that is persistently at a respective location during navigation through the multipage home screen user interface;
while displaying the first user interface object, detect a movement input that corresponds to movement along the first user interface object; and in response to detecting the movement input:
in accordance with a determination that a movement input meets first movement criteria, wherein the first movement criteria require the movement input to meet a first value of a movement metric in order for the first movement criteria to be met, display a first page of the multipage home screen user interface that corresponds to the first value of the movement metric; and
in accordance with a determination that a movement input meets second movement criteria, wherein the second movement criteria require the movement input to meet a second value of the movement metric in order for the second movement criteria to be met, display a second page of the multipage home screen user interface that corresponds to the second value of the movement metric, wherein the second value of the movement metric is different from the first value of the movement metric, and the second page is different from the first page 6058 the respective user interface is the last page of the multipage home screen user interface 6060 the respective user interface is overlaid on the last page of the multipage home screen user interface

Figure 7C:
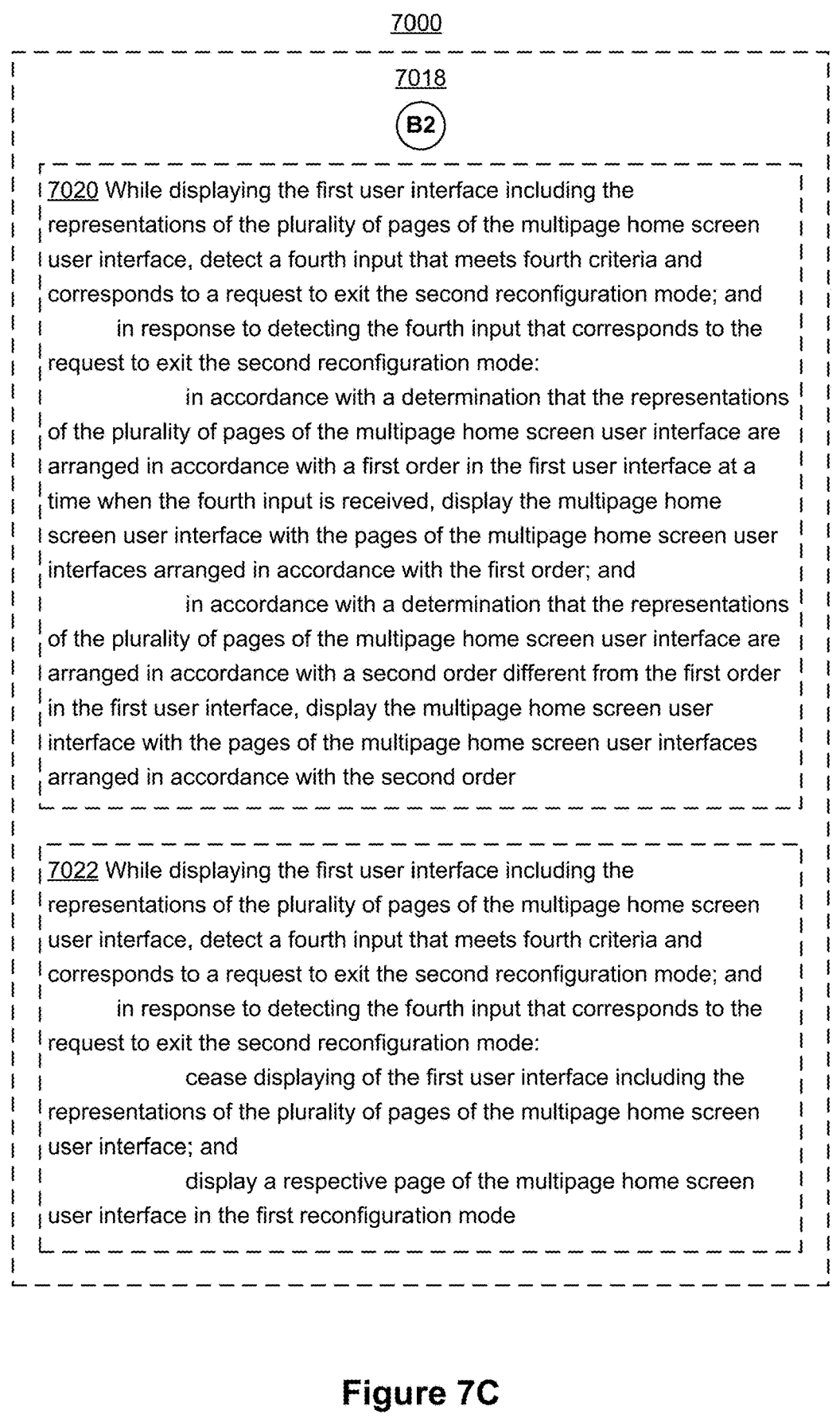

7020 While displaying the first user interface including the representations of the plurality of pages of the multipage home screen user interface, detect a fourth input that meets fourth criteria and corresponds to a request to exit the second reconfiguration mode; and in response to detecting the fourth input that corresponds to the request to exit the second reconfiguration mode:

in accordance with a determination that the representations of the plurality of pages of the multipage home screen user interface are arranged in accordance with a first order in the first user interface at a time when the fourth input is received, display the multipage home screen user interface with the pages of the multipage home screen user interfaces arranged in accordance with the first order; and in accordance with a determination that the representations of the plurality of pages of the multipage home screen user interface are arranged in accordance with a second order different from the first order in the first user interface, display the multipage home screen user interface with the pages of the multipage home screen user interfaces arranged in accordance with the second order 7022 While displaying the first user interface including the representations of the plurality of pages of the multipage home screen user interface, detect a fourth input that meets fourth criteria and corresponds to a request to exit the second reconfiguration mode; and in response to detecting the fourth input that corresponds to the request to exit the second reconfiguration mode:

cease displaying of the first user interface including the representations of the plurality of pages of the multipage home screen user interface; and display a respective page of the multipage home screen user interface in the first reconfiguration mode

Figure 7D:
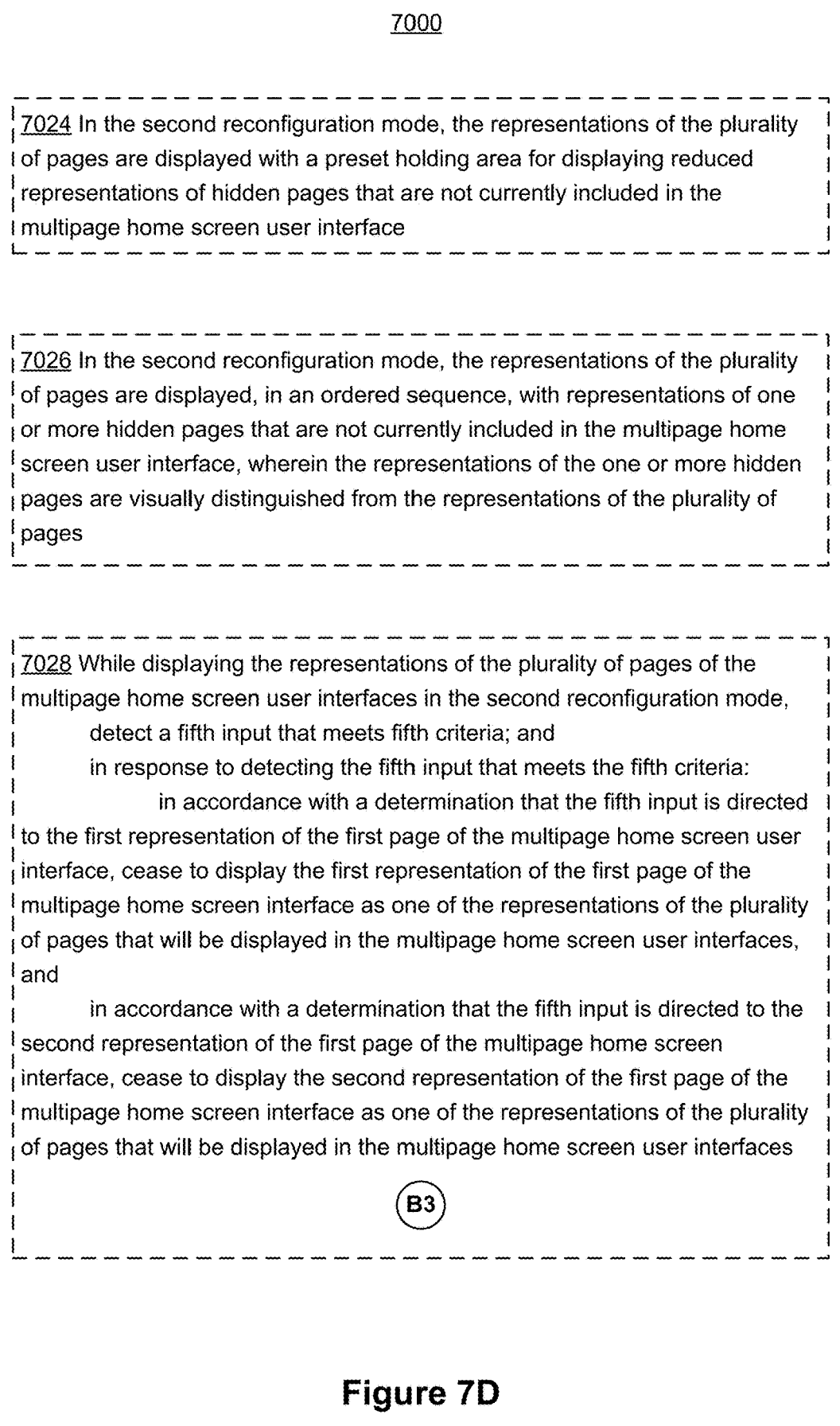

7024 In the second reconfiguration mode, the representations of the plurality of pages are displayed with a preset holding area for displaying reduced representations of hidden pages that are not currently included in the multipage home screen user interface 7026 In the second reconfiguration mode, the representations of the plurality of pages are displayed, in an ordered sequence, with representations of one or more hidden pages that are not currently included in the multipage home screen user interface, wherein the representations of the one or more hidden pages are visually distinguished from the representations of the plurality of pages 7028 While displaying the representations of the plurality of pages of the multipage home screen user interfaces in the second reconfiguration mode, detect a fifth input that meets fifth criteria; and in response to detecting the fifth input that meets the fifth criteria:

in accordance with a determination that the fifth input is directed to the first representation of the first page of the multipage home screen user interface, cease to display the first representation of the first page of the multipage home screen interface as one of the representations of the plurality of pages that will be displayed in the multipage home screen user interfaces, and in accordance with a determination that the fifth input is directed to the second representation of the first page of the multipage home screen interface, cease to display the second representation of the first page of the multipage home screen interface as one of the representations of the plurality of pages that will be displayed in the multipage home screen user interfaces

Figure 7E:
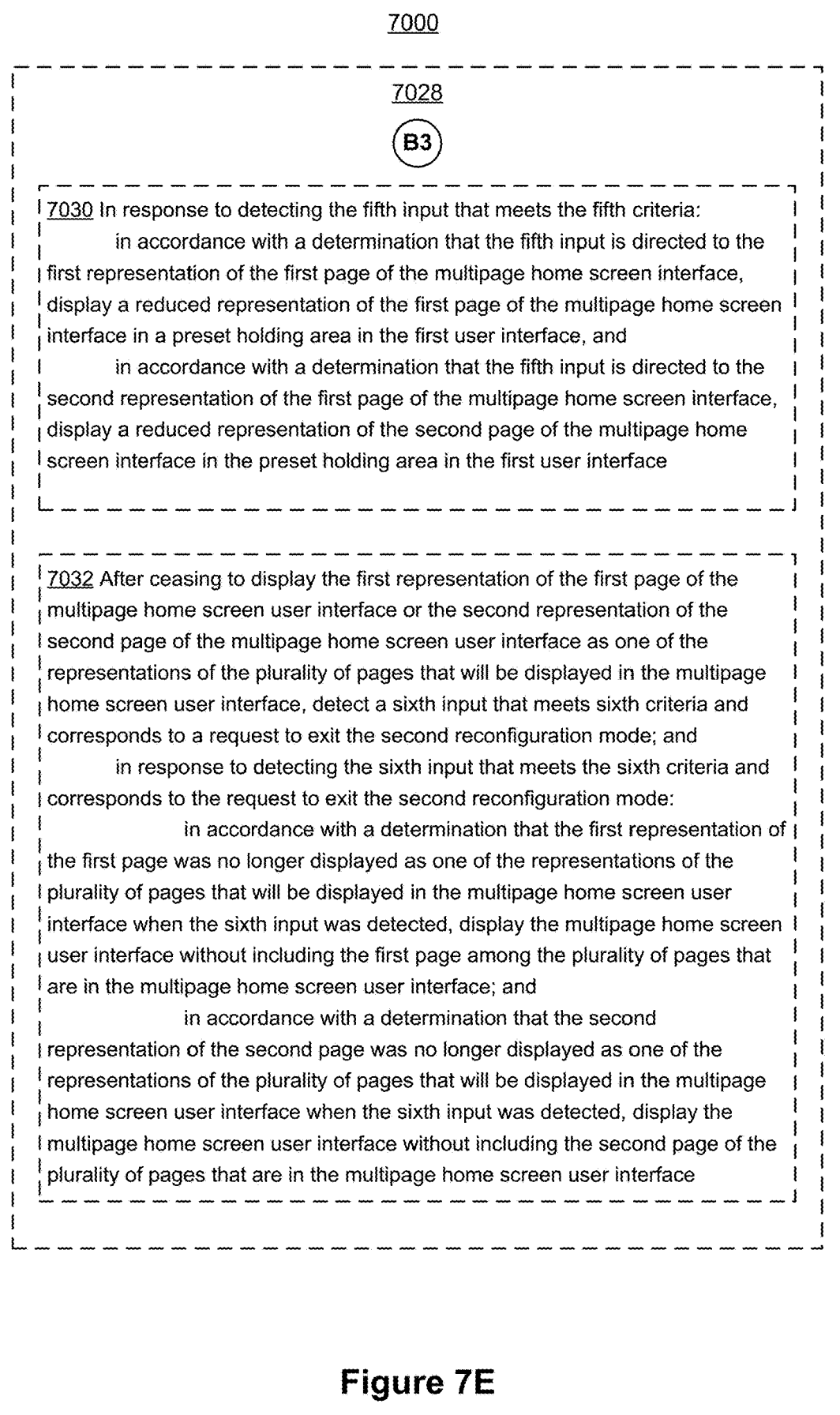

7030 In response to detecting the fifth input that meets the fifth criteria:

in accordance with a determination that the fifth input is directed to the first representation of the first page of the multipage home screen interface, display a reduced representation of the first page of the multipage home screen interface in a preset holding area in the first user interface, and in accordance with a determination that the fifth input is directed to the second representation of the first page of the multipage home screen interface, display a reduced representation of the second page of the multipage home screen interface in the preset holding area in the first user interface 7032 After ceasing to display the first representation of the first page of the multipage home screen user interface or the second representation of the second page of the multipage home screen user interface as one of the representations of the plurality of pages that will be displayed in the multipage home screen user interface, detect a sixth input that meets sixth criteria and corresponds to a request to exit the second reconfiguration mode; and in response to detecting the sixth input that meets the sixth criteria and corresponds to the request to exit the second reconfiguration mode:

in accordance with a determination that the first representation of the first page was no longer displayed as one of the representations of the plurality of pages that will be displayed in the multipage home screen user interface when the sixth input was detected, display the multipage home screen user interface without including the first page among the plurality of pages that are in the multipage home screen user interface; and in accordance with a determination that the second representation of the second page was no longer displayed as one of the representations of the plurality of pages that will be displayed in the multipage home screen user interface when the sixth input was detected, display the multipage home screen user interface without including the second page of the plurality of pages that are in the multipage home screen user interface

Figure 7F:
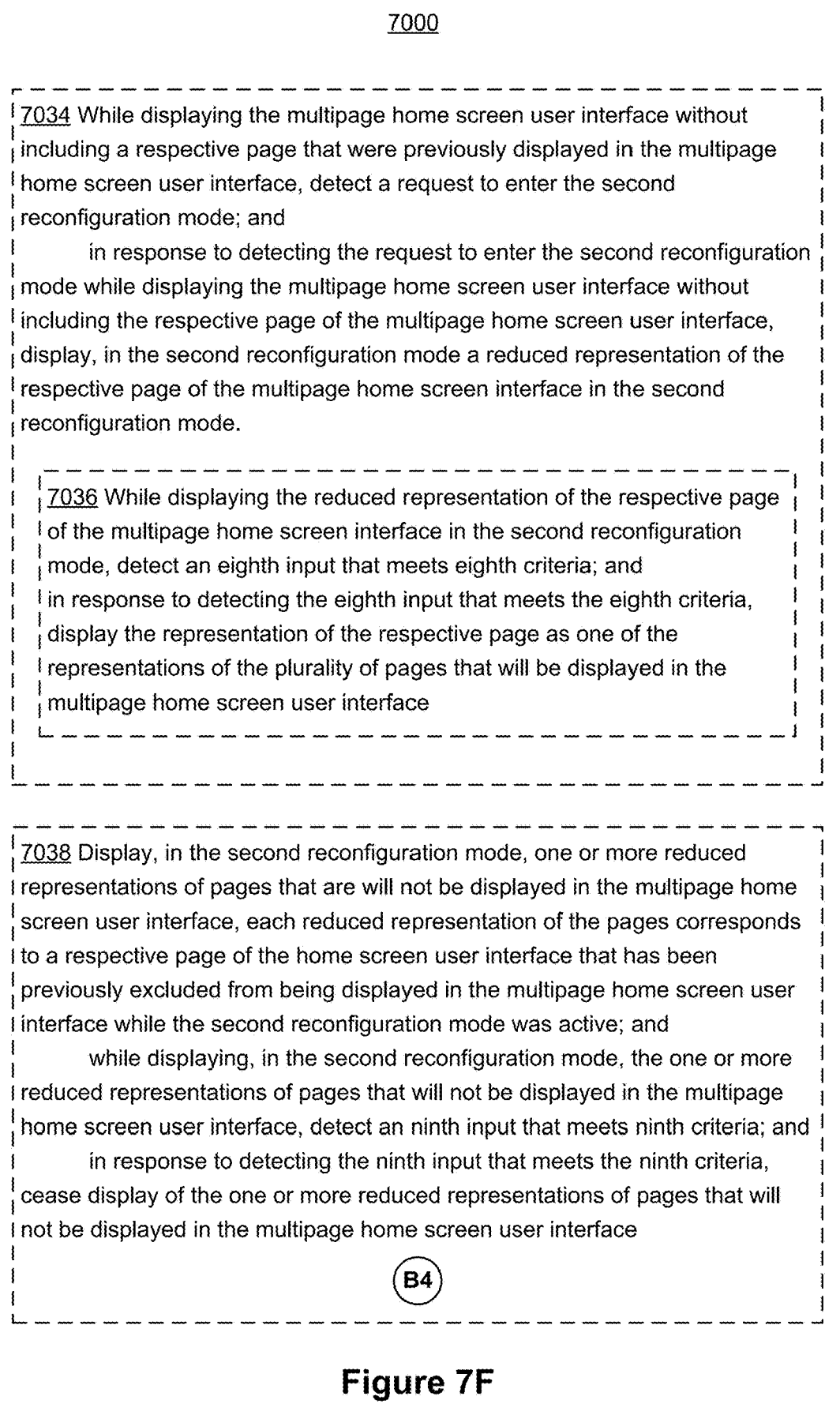

7034 While displaying the multipage home screen user interface without including a respective page that were previously displayed in the multipage home screen user interface, detect a request to enter the second reconfiguration mode; and in response to detecting the request to enter the second reconfiguration mode while displaying the multipage home screen user interface without including the respective page of the multipage home screen user interface, display, in the second reconfiguration mode a reduced representation of the respective page of the multipage home screen interface in the second reconfiguration mode.

7036 While displaying the reduced representation of the respective page of the multipage home screen interface in the second reconfiguration mode, detect an eighth input that meets eighth criteria; and in response to detecting the eighth input that meets the eighth criteria, display the representation of the respective page as one of the representations of the plurality of pages that will be displayed in the multipage home screen user interface 7038 Display, in the second reconfiguration mode, one or more reduced representations of pages that are will not be displayed in the multipage home screen user interface, each reduced representation of the pages corresponds to a respective page of the home screen user interface that has been previously excluded from being displayed in the multipage home screen user interface while the second reconfiguration mode was active; and while displaying, in the second reconfiguration mode, the one or more reduced representations of pages that will not be displayed in the multipage home screen user interface, detect an ninth input that meets ninth criteria; and in response to detecting the ninth input that meets the ninth criteria, cease display of the one or more reduced representations of pages that will not be displayed in the multipage home screen user interface

Figure 7G:
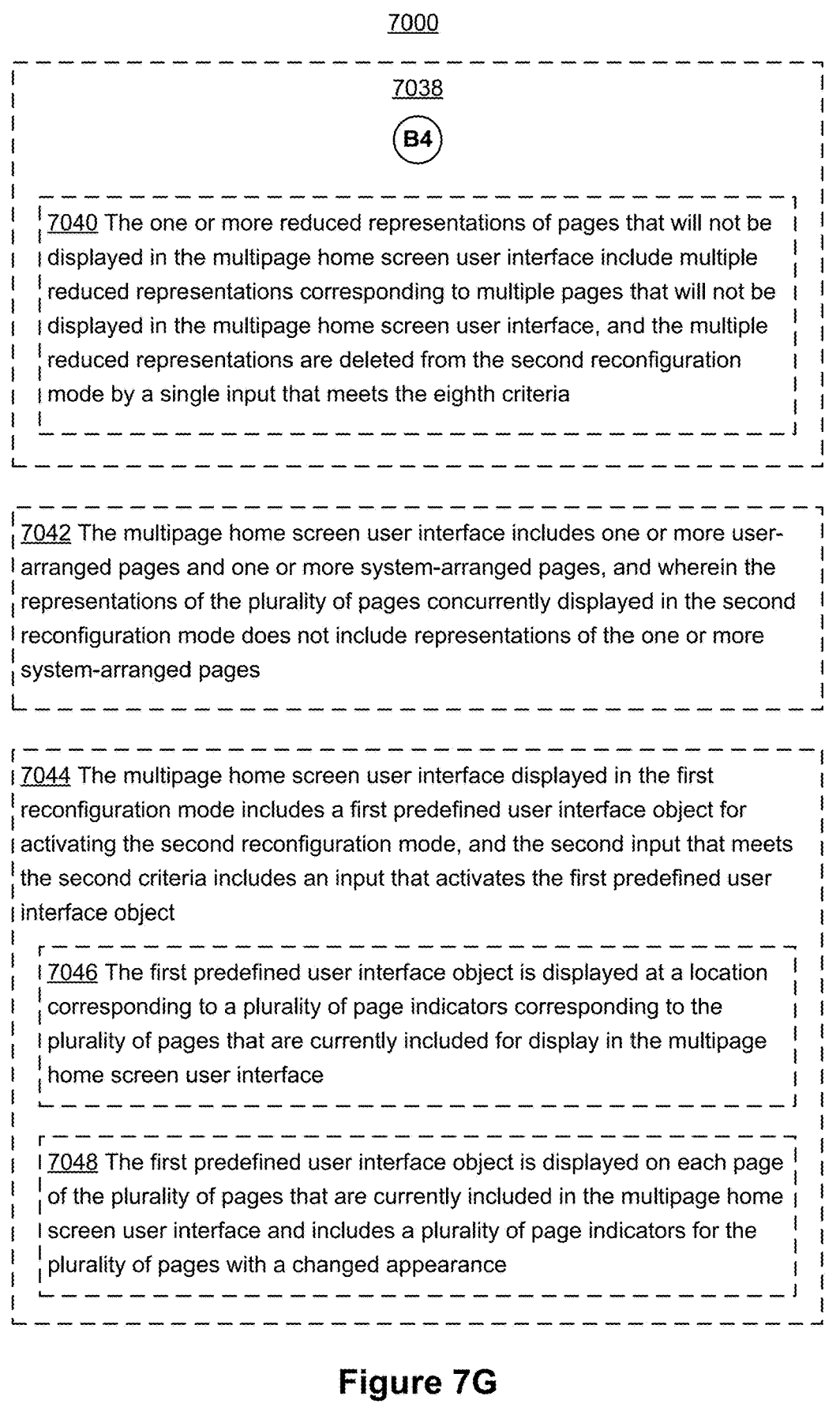

7040 The one or more reduced representations of pages that will not be displayed in the multipage home screen user interface include multiple reduced representations corresponding to multiple pages that will not be displayed in the multipage home screen user interface, and the multiple reduced representations are deleted from the second reconfiguration mode by a single input that meets the eighth criteria 7042 The multipage home screen user interface includes one or more user-arranged pages and one or more system-arranged pages, and wherein the representations of the plurality of pages concurrently displayed in the second reconfiguration mode does not include representations of the one or more system-arranged pages 7044 The multipage home screen user interface displayed in the first reconfiguration mode includes a first predefined user interface object for activating the second reconfiguration mode, and the second input that meets the second criteria includes an input that activates the first predefined user interface object 7046 The first predefined user interface object is displayed at a location corresponding to a plurality of page indicators corresponding to the plurality of pages that are currently included for display in the multipage home screen user interface 7048 The first predefined user interface object is displayed on each page of the plurality of pages that are currently included in the multipage home screen user interface and includes a plurality of page indicators for the plurality of pages with a changed appearance

Figure 7H:
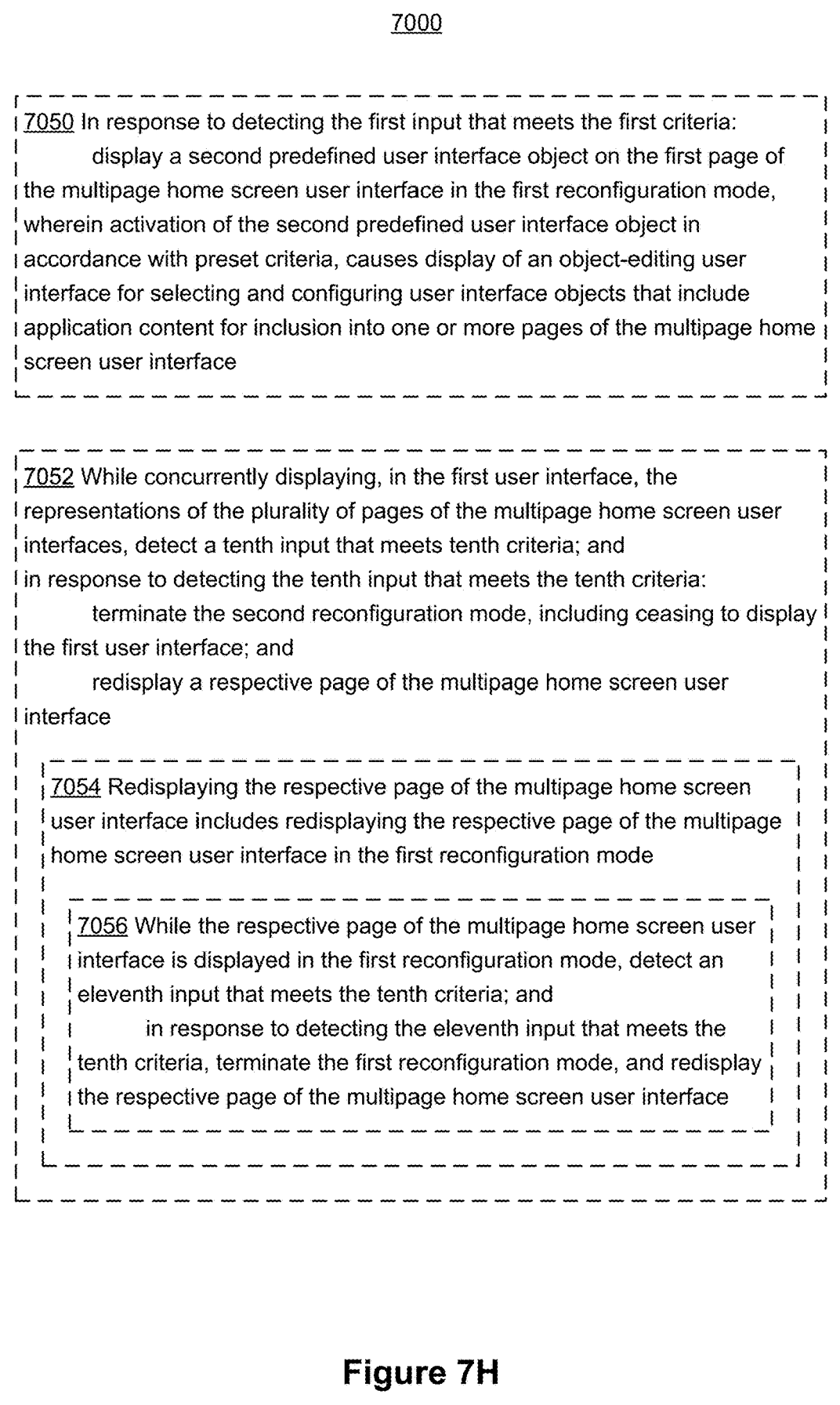

7050 In response to detecting the first input that meets the first criteria:
display a second predefined user interface object on the first page of the multipage home screen user interface in the first reconfiguration mode, wherein activation of the second predefined user interface object in accordance with preset criteria, causes display of an object-editing user interface for selecting and configuring user interface objects that include application content for inclusion into one or more pages of the multipage home screen user interface 7052 While concurrently displaying, in the first user interface, the representations of the plurality of pages of the multipage home screen user interfaces, detect a tenth input that meets tenth criteria; and
in response to detecting the tenth input that meets the tenth criteria:
terminate the second reconfiguration mode, including ceasing to display the first user interface; and
redisplay a respective page of the multipage home screen user interface 7054 Redisplaying the respective page of the multipage home screen user interface includes redisplaying the respective page of the multipage home screen user interface in the first reconfiguration mode 7056 While the respective page of the multipage home screen user interface is displayed in the first reconfiguration mode, detect an eleventh input that meets the tenth criteria; and
in response to detecting the eleventh input that meets the tenth criteria, terminate the first reconfiguration mode, and redisplay the respective page of the multipage home screen user interface

Figure 8A:
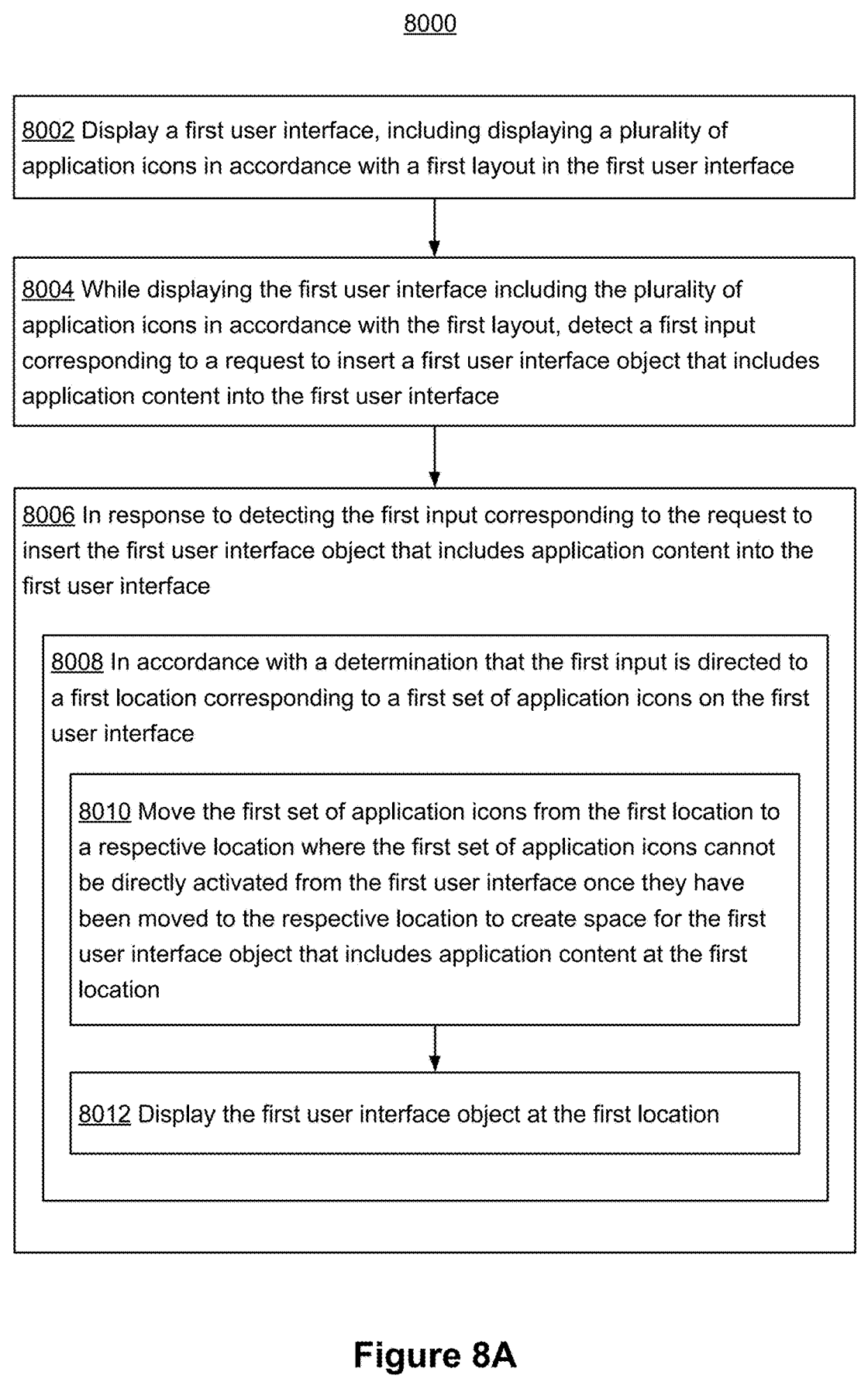

8002 Display a first user interface, including displaying a plurality of application icons in accordance with a first layout in the first user interface

↓

8004 While displaying the first user interface including the plurality of application icons in accordance with the first layout, detect a first input corresponding to a request to insert a first user interface object that includes application content into the first user interface

↓

8006 In response to detecting the first input corresponding to the request to insert the first user interface object that includes application content into the first user interface 8008 In accordance with a determination that the first input is directed to a first location corresponding to a first set of application icons on the first user interface 8010 Move the first set of application icons from the first location to a respective location where the first set of application icons cannot be directly activated from the first user interface once they have been moved to the respective location to create space for the first user interface object that includes application content at the first location

↓

8012 Display the first user interface object at the first location

Figure 8B:
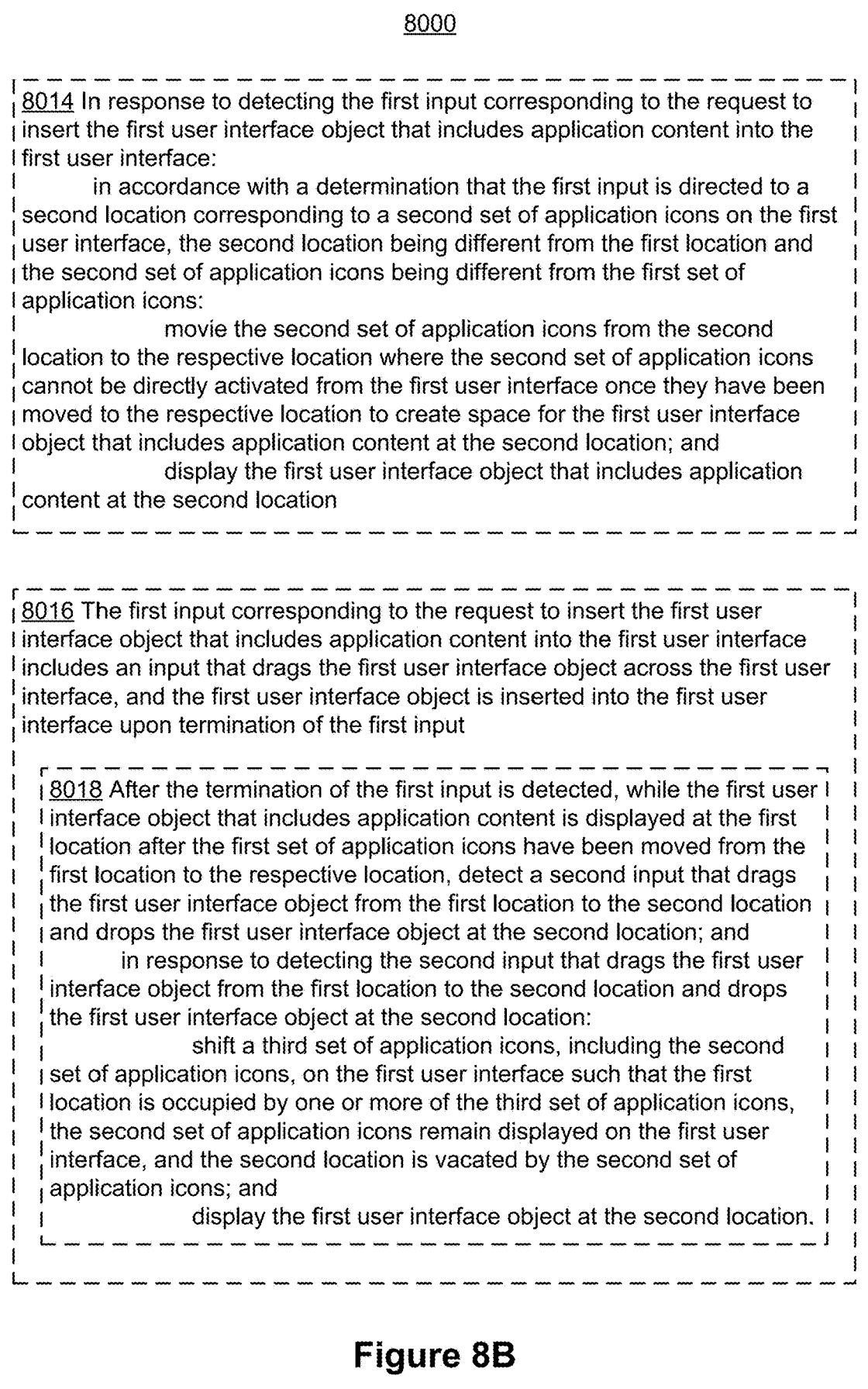

8014 In response to detecting the first input corresponding to the request to insert the first user interface object that includes application content into the first user interface:

in accordance with a determination that the first input is directed to a second location corresponding to a second set of application icons on the first user interface, the second location being different from the first location and the second set of application icons being different from the first set of application icons:

movie the second set of application icons from the second location to the respective location where the second set of application icons cannot be directly activated from the first user interface once they have been moved to the respective location to create space for the first user interface object that includes application content at the second location; and display the first user interface object that includes application content at the second location 8016 The first input corresponding to the request to insert the first user interface object that includes application content into the first user interface includes an input that drags the first user interface object across the first user interface, and the first user interface object is inserted into the first user interface upon termination of the first input 8018 After the termination of the first input is detected, while the first user interface object that includes application content is displayed at the first location after the first set of application icons have been moved from the first location to the respective location, detect a second input that drags the first user interface object from the first location to the second location and drops the first user interface object at the second location; and in response to detecting the second input that drags the first user interface object from the first location to the second location and drops the first user interface object at the second location:

shift a third set of application icons, including the second set of application icons, on the first user interface such that the first location is occupied by one or more of the third set of application icons, the second set of application icons remain displayed on the first user interface, and the second location is vacated by the second set of application icons; and display the first user interface object at the second location.

Figure 8C:
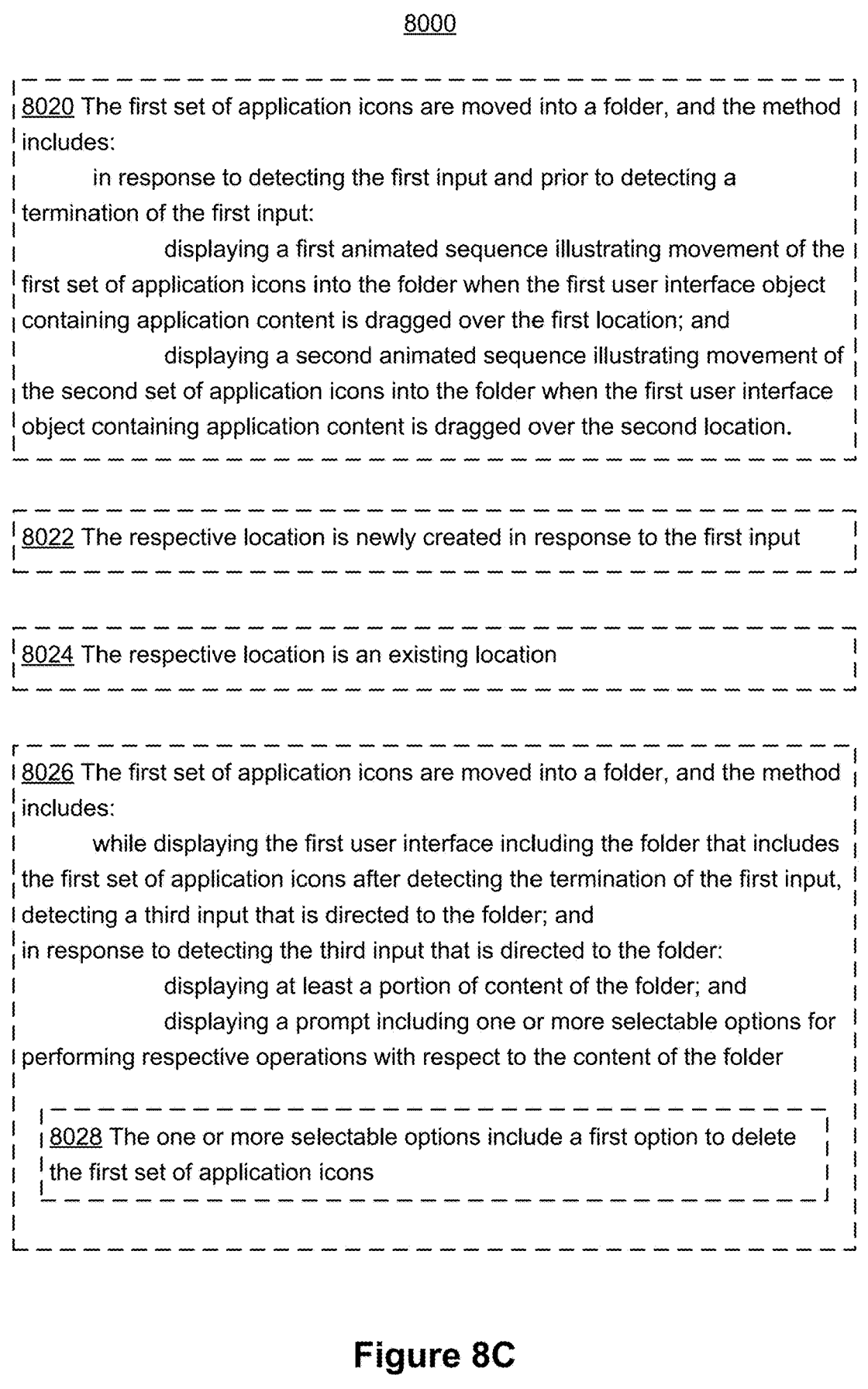

8020 The first set of application icons are moved into a folder, and the method includes:

in response to detecting the first input and prior to detecting a termination of the first input:

displaying a first animated sequence illustrating movement of the first set of application icons into the folder when the first user interface object containing application content is dragged over the first location; and displaying a second animated sequence illustrating movement of the second set of application icons into the folder when the first user interface object containing application content is dragged over the second location.

8022 The respective location is newly created in response to the first input

8024 The respective location is an existing location

8026 The first set of application icons are moved into a folder, and the method includes:

while displaying the first user interface including the folder that includes the first set of application icons after detecting the termination of the first input, detecting a third input that is directed to the folder; and in response to detecting the third input that is directed to the folder:

displaying at least a portion of content of the folder; and displaying a prompt including one or more selectable options for performing respective operations with respect to the content of the folder 8028 The one or more selectable options include a first option to delete the first set of application icons

Figure 8D:
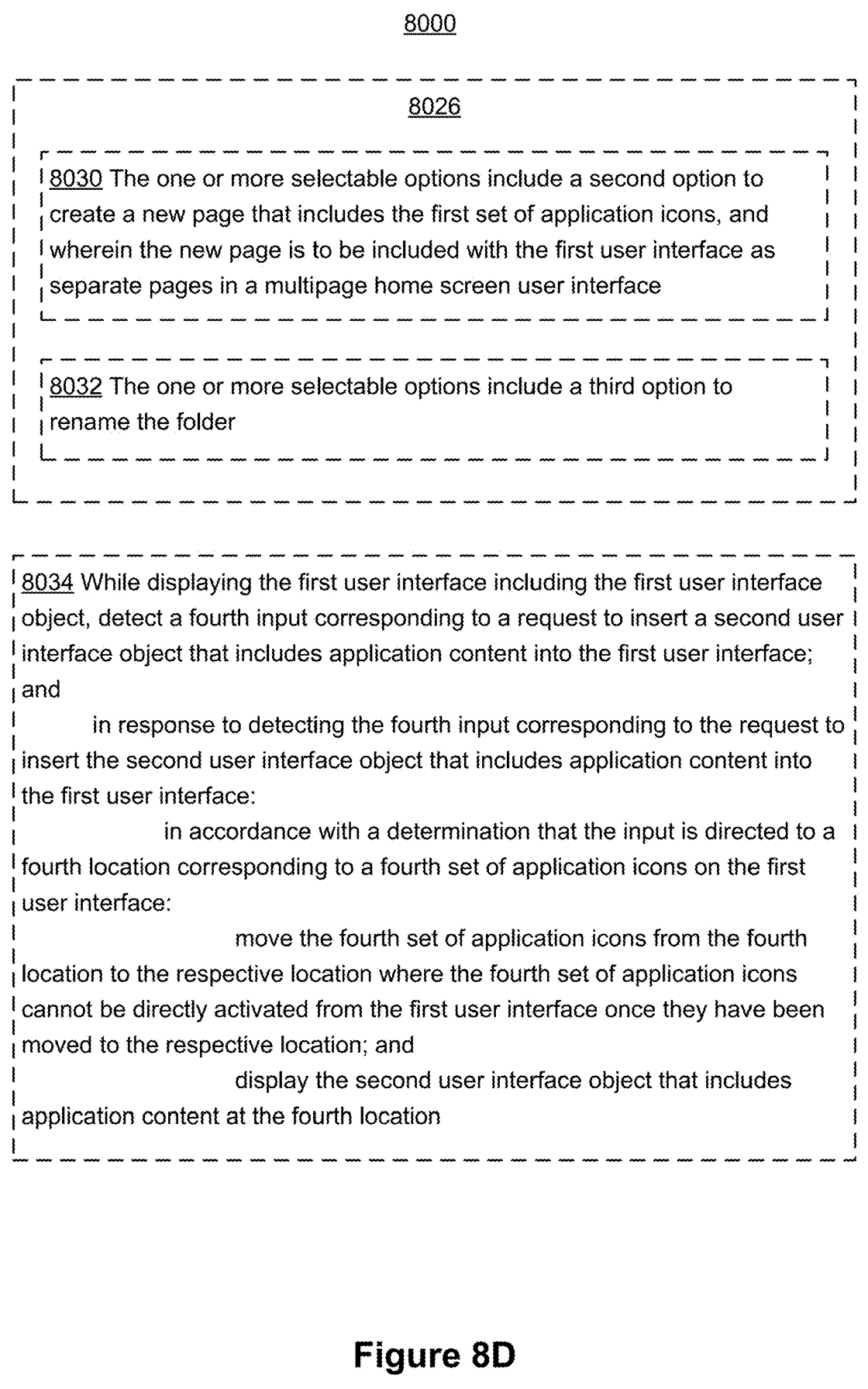

8030 The one or more selectable options include a second option to create a new page that includes the first set of application icons, and wherein the new page is to be included with the first user interface as separate pages in a multipage home screen user interface 8032 The one or more selectable options include a third option to rename the folder 8034 While displaying the first user interface including the first user interface object, detect a fourth input corresponding to a request to insert a second user interface object that includes application content into the first user interface; and in response to detecting the fourth input corresponding to the request to insert the second user interface object that includes application content into the first user interface:

in accordance with a determination that the input is directed to a fourth location corresponding to a fourth set of application icons on the first user interface:

move the fourth set of application icons from the fourth location to the respective location where the fourth set of application icons cannot be directly activated from the first user interface once they have been moved to the respective location; and display the second user interface object that includes application content at the fourth location

Figure 8E:
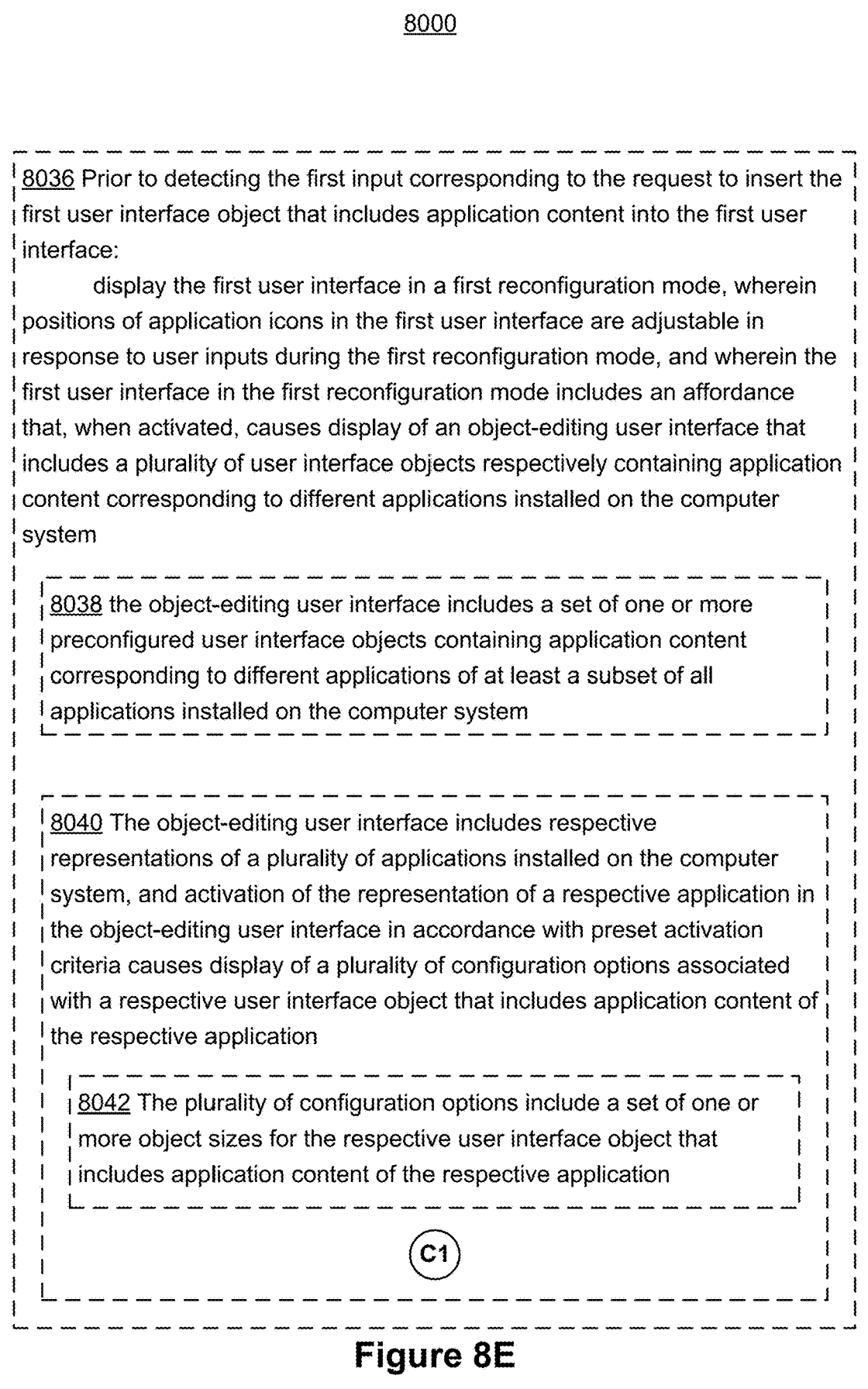

8036 Prior to detecting the first input corresponding to the request to insert the first user interface object that includes application content into the first user interface:

display the first user interface in a first reconfiguration mode, wherein positions of application icons in the first user interface are adjustable in response to user inputs during the first reconfiguration mode, and wherein the first user interface in the first reconfiguration mode includes an affordance that, when activated, causes display of an object-editing user interface that includes a plurality of user interface objects respectively containing application content corresponding to different applications installed on the computer system 8038 the object-editing user interface includes a set of one or more preconfigured user interface objects containing application content corresponding to different applications of at least a subset of all applications installed on the computer system 8040 The object-editing user interface includes respective representations of a plurality of applications installed on the computer system, and activation of the representation of a respective application in the object-editing user interface in accordance with preset activation criteria causes display of a plurality of configuration options associated with a respective user interface object that includes application content of the respective application 8042 The plurality of configuration options include a set of one or more object sizes for the respective user interface object that includes application content of the respective application

Figure 8F:
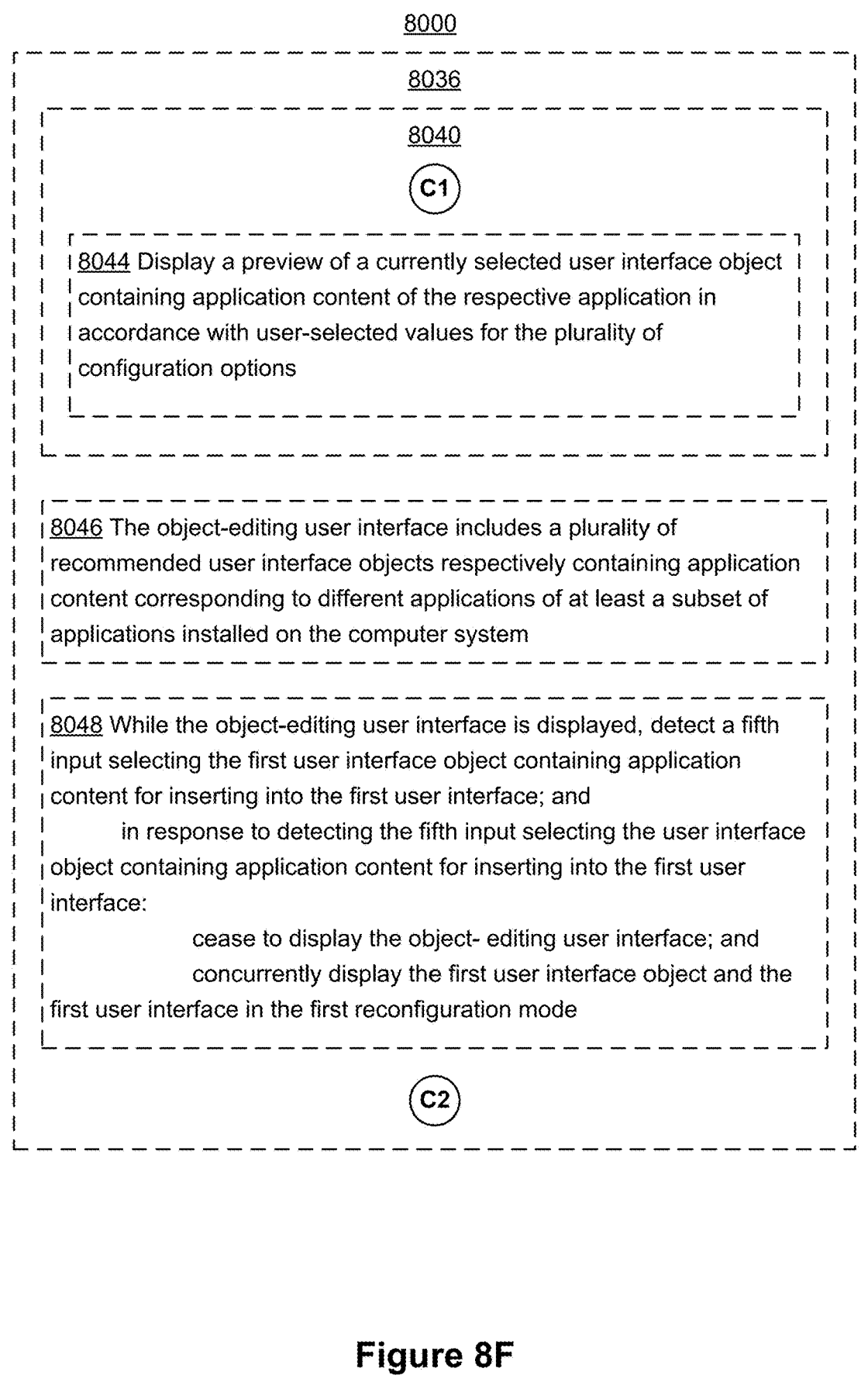

8044 Display a preview of a currently selected user interface object containing application content of the respective application in accordance with user-selected values for the plurality of configuration options 8046 The object-editing user interface includes a plurality of recommended user interface objects respectively containing application content corresponding to different applications of at least a subset of applications installed on the computer system 8048 While the object-editing user interface is displayed, detect a fifth input selecting the first user interface object containing application content for inserting into the first user interface; and in response to detecting the fifth input selecting the user interface object containing application content for inserting into the first user interface:

cease to display the object- editing user interface; and concurrently display the first user interface object and the first user interface in the first reconfiguration mode

Figure 8G:
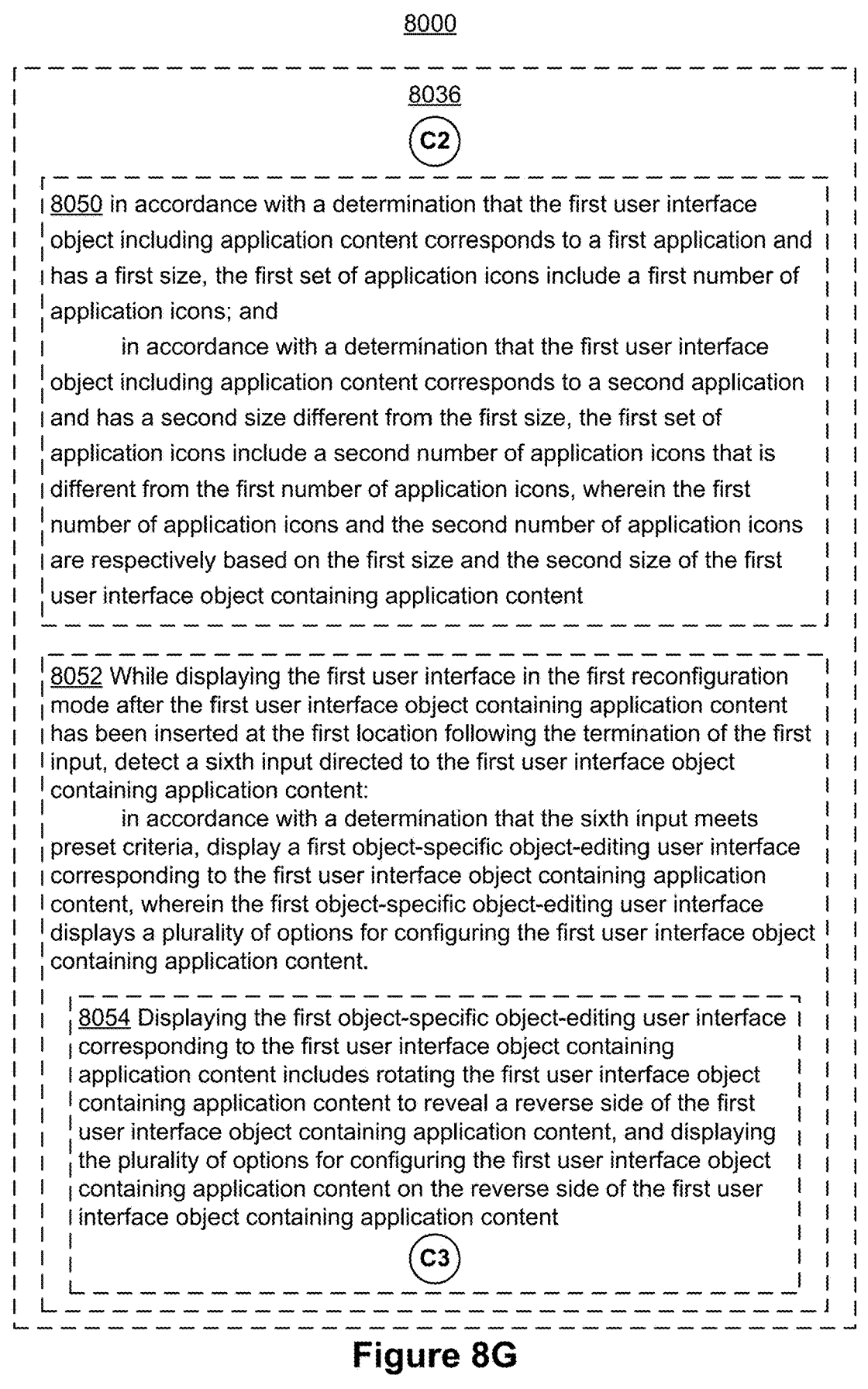

8050 in accordance with a determination that the first user interface object including application content corresponds to a first application and has a first size, the first set of application icons include a first number of application icons; and in accordance with a determination that the first user interface object including application content corresponds to a second application and has a second size different from the first size, the first set of application icons include a second number of application icons that is different from the first number of application icons, wherein the first number of application icons and the second number of application icons are respectively based on the first size and the second size of the first user interface object containing application content 8052 While displaying the first user interface in the first reconfiguration mode after the first user interface object containing application content has been inserted at the first location following the termination of the first input, detect a sixth input directed to the first user interface object containing application content:

in accordance with a determination that the sixth input meets preset criteria, display a first object-specific object-editing user interface corresponding to the first user interface object containing application content, wherein the first object-specific object-editing user interface displays a plurality of options for configuring the first user interface object containing application content.

8054 Displaying the first object-specific object-editing user interface corresponding to the first user interface object containing application content includes rotating the first user interface object containing application content to reveal a reverse side of the first user interface object containing application content, and displaying the plurality of options for configuring the first user interface object containing application content on the reverse side of the first user interface object containing application content

Figure 8H:
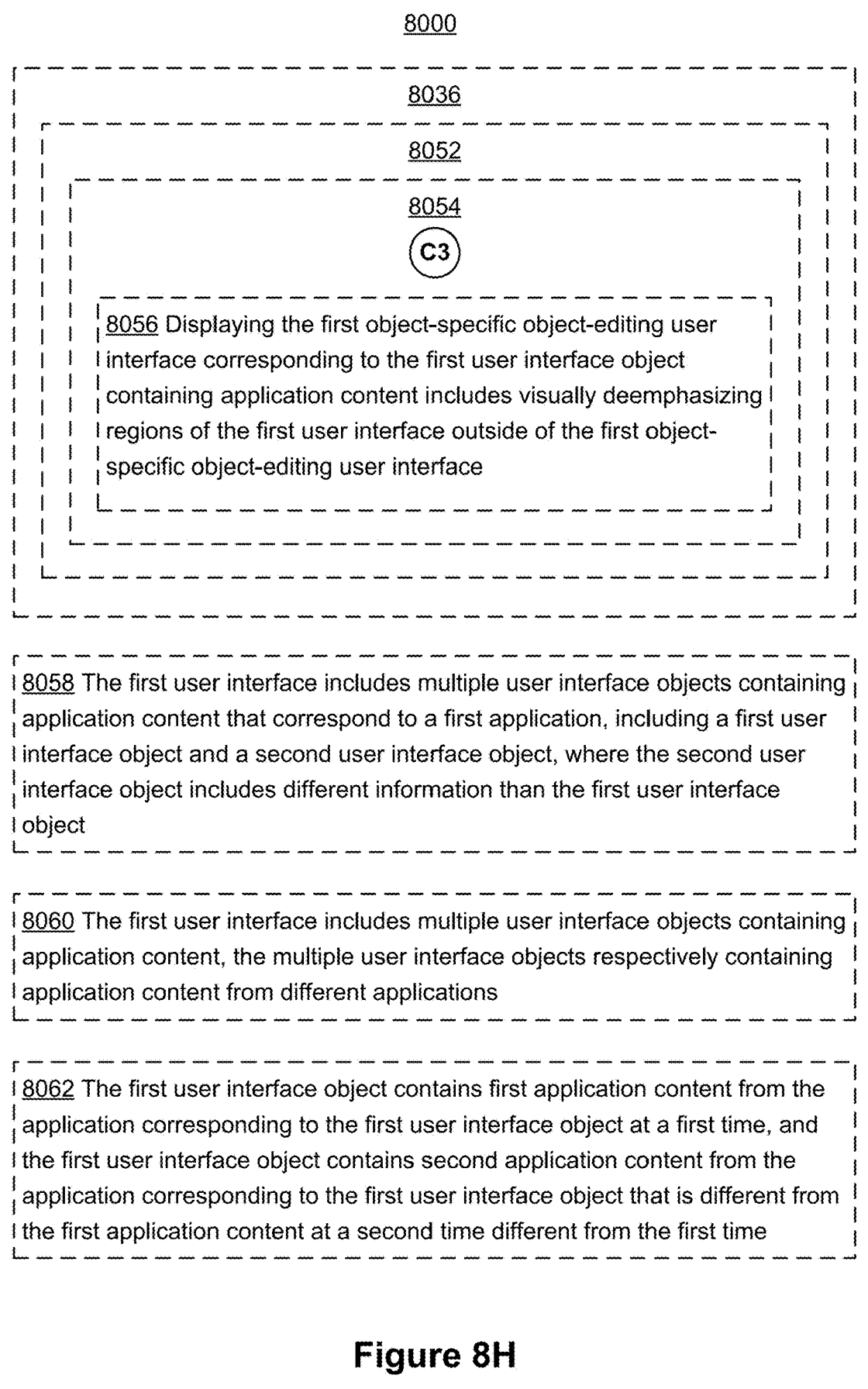

8056 Displaying the first object-specific object-editing user interface corresponding to the first user interface object containing application content includes visually deemphasizing regions of the first user interface outside of the first object-specific object-editing user interface 8058 The first user interface includes multiple user interface objects containing application content that correspond to a first application, including a first user interface object and a second user interface object, where the second user interface object includes different information than the first user interface object 8060 The first user interface includes multiple user interface objects containing application content, the multiple user interface objects respectively containing application content from different applications 8062 The first user interface object contains first application content from the application corresponding to the first user interface object at a first time, and the first user interface object contains second application content from the application corresponding to the first user interface object that is different from the first application content at a second time different from the first time

Figure 8I:
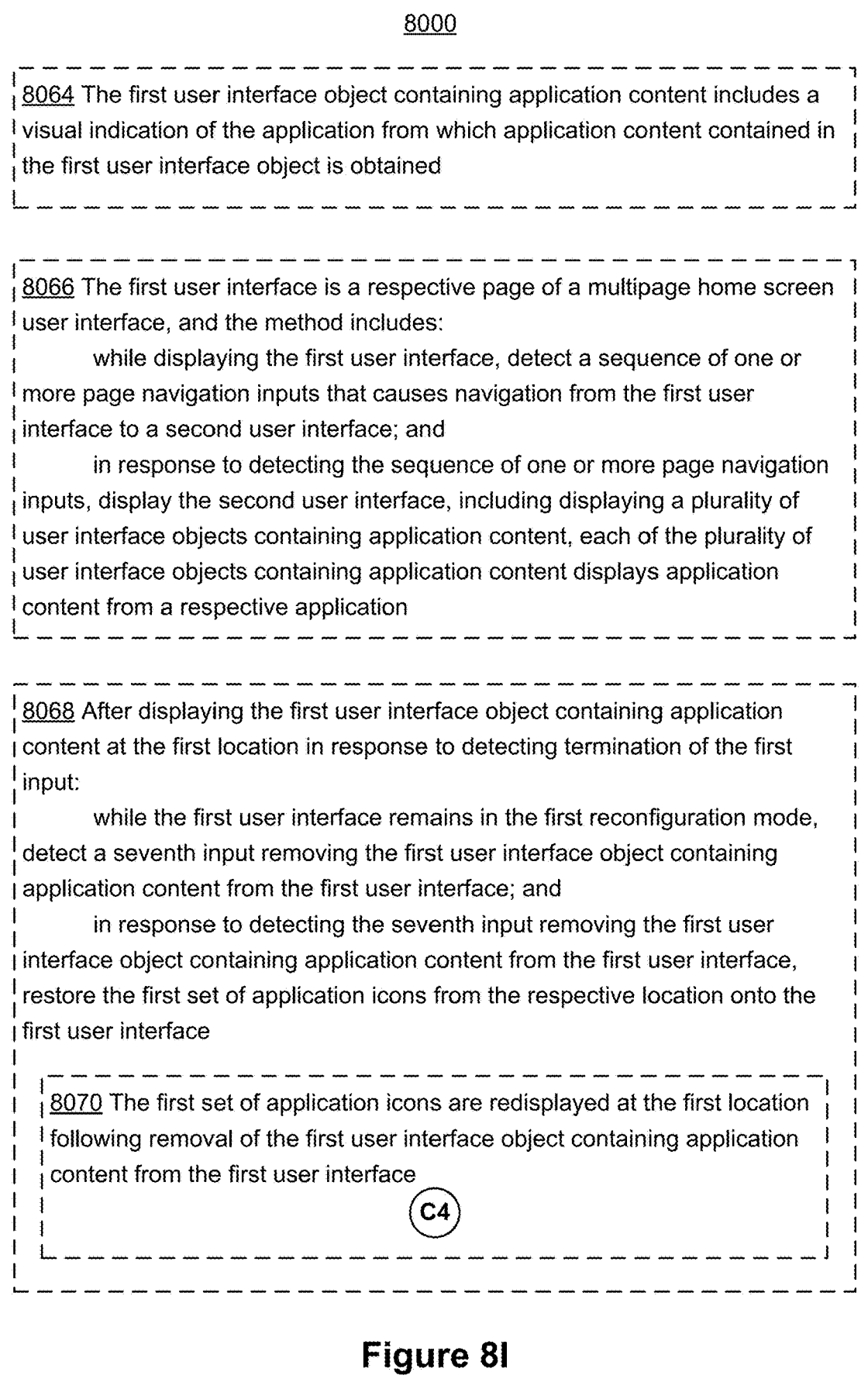

8064 The first user interface object containing application content includes a visual indication of the application from which application content contained in the first user interface object is obtained 8066 The first user interface is a respective page of a multipage home screen user interface, and the method includes:

while displaying the first user interface, detect a sequence of one or more page navigation inputs that causes navigation from the first user interface to a second user interface; and in response to detecting the sequence of one or more page navigation inputs, display the second user interface, including displaying a plurality of user interface objects containing application content, each of the plurality of user interface objects containing application content displays application content from a respective application 8068 After displaying the first user interface object containing application content at the first location in response to detecting termination of the first input:

while the first user interface remains in the first reconfiguration mode, detect a seventh input removing the first user interface object containing application content from the first user interface; and in response to detecting the seventh input removing the first user interface object containing application content from the first user interface, restore the first set of application icons from the respective location onto the first user interface 8070 The first set of application icons are redisplayed at the first location following removal of the first user interface object containing application content from the first user interface

Figure 8J:
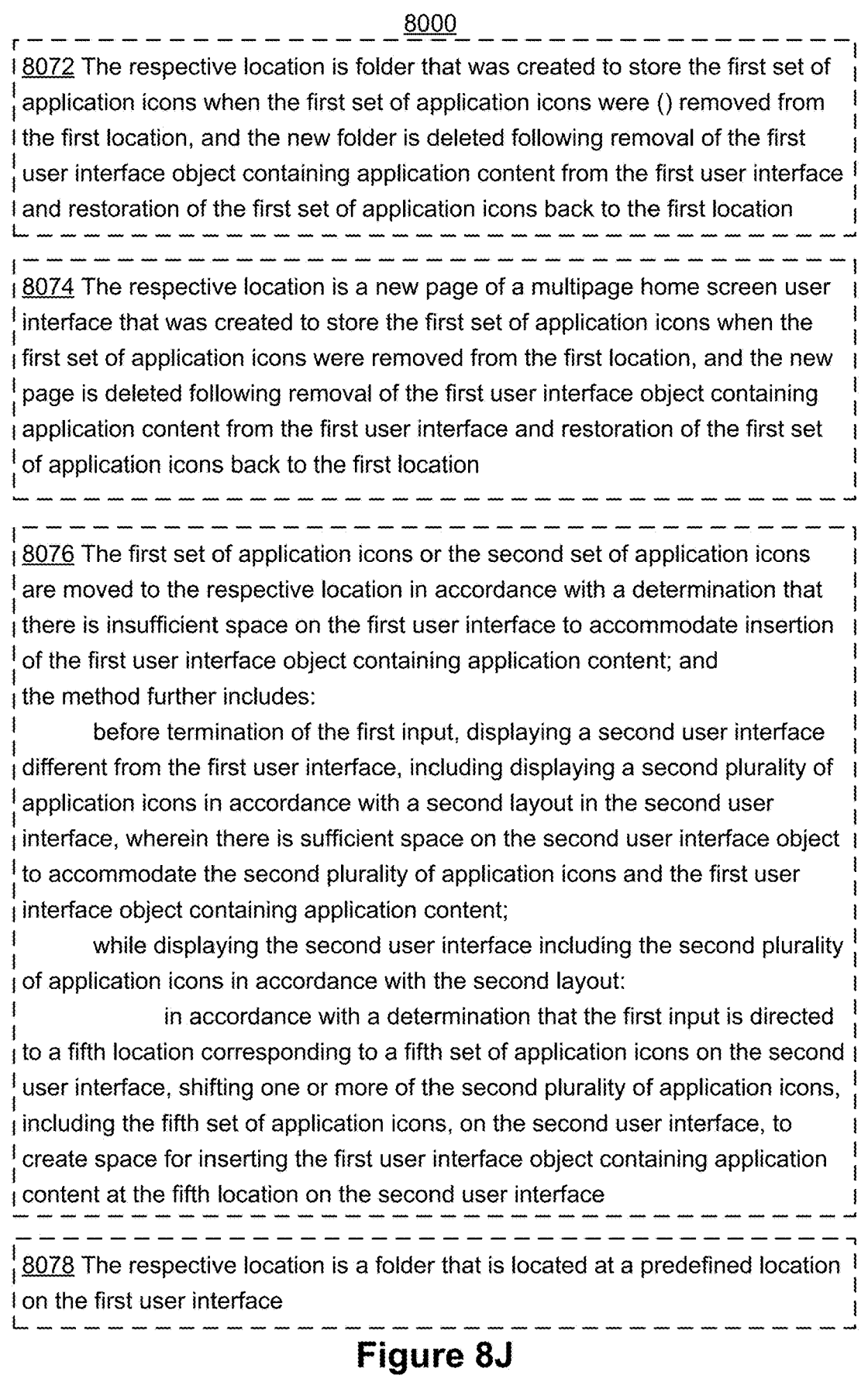

8072 The respective location is folder that was created to store the first set of application icons when the first set of application icons were () removed from the first location, and the new folder is deleted following removal of the first user interface object containing application content from the first user interface and restoration of the first set of application icons back to the first location 8074 The respective location is a new page of a multipage home screen user interface that was created to store the first set of application icons when the first set of application icons were removed from the first location, and the new page is deleted following removal of the first user interface object containing application content from the first user interface and restoration of the first set of application icons back to the first location 8076 The first set of application icons or the second set of application icons are moved to the respective location in accordance with a determination that there is insufficient space on the first user interface to accommodate insertion of the first user interface object containing application content; and
the method further includes:

before termination of the first input, displaying a second user interface different from the first user interface, including displaying a second plurality of application icons in accordance with a second layout in the second user interface, wherein there is sufficient space on the second user interface object to accommodate the second plurality of application icons and the first user interface object containing application content;

while displaying the second user interface including the second plurality of application icons in accordance with the second layout:

in accordance with a determination that the first input is directed to a fifth location corresponding to a fifth set of application icons on the second user interface, shifting one or more of the second plurality of application icons, including the fifth set of application icons, on the second user interface, to create space for inserting the first user interface object containing application content at the fifth location on the second user interface 8078 The respective location is a folder that is located at a predefined location on the first user interface

Figure 8K:
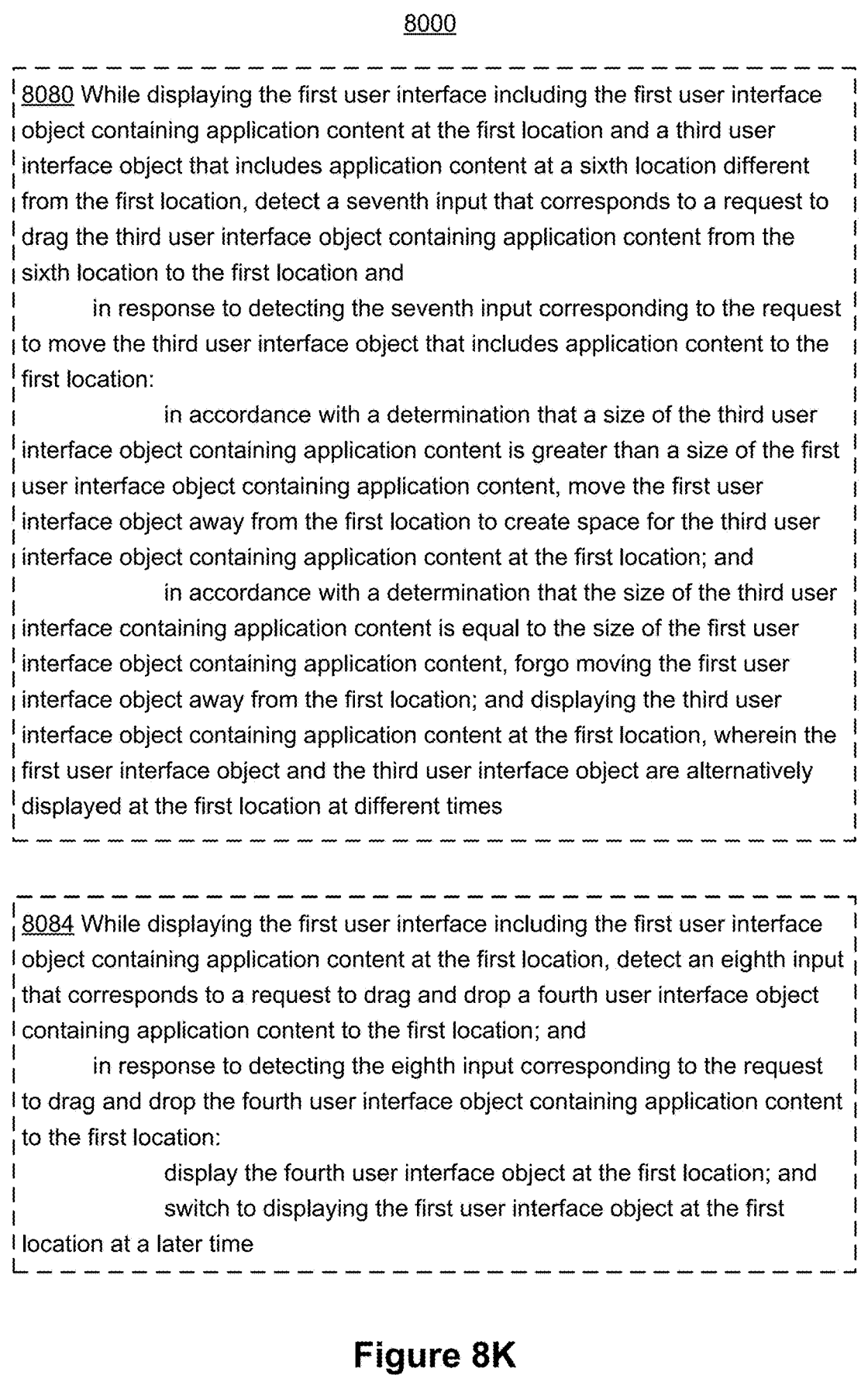

8080 While displaying the first user interface including the first user interface object containing application content at the first location and a third user interface object that includes application content at a sixth location different from the first location, detect a seventh input that corresponds to a request to drag the third user interface object containing application content from the sixth location to the first location and in response to detecting the seventh input corresponding to the request to move the third user interface object that includes application content to the first location:

in accordance with a determination that a size of the third user interface object containing application content is greater than a size of the first user interface object containing application content, move the first user interface object away from the first location to create space for the third user interface object containing application content at the first location; and in accordance with a determination that the size of the third user interface containing application content is equal to the size of the first user interface object containing application content, forgo moving the first user interface object away from the first location; and displaying the third user interface object containing application content at the first location, wherein the first user interface object and the third user interface object are alternatively displayed at the first location at different times 8084 While displaying the first user interface including the first user interface object containing application content at the first location, detect an eighth input that corresponds to a request to drag and drop a fourth user interface object containing application content to the first location; and in response to detecting the eighth input corresponding to the request to drag and drop the fourth user interface object containing application content to the first location:

display the fourth user interface object at the first location; and switch to displaying the first user interface object at the first location at a later time

Figure 8L:
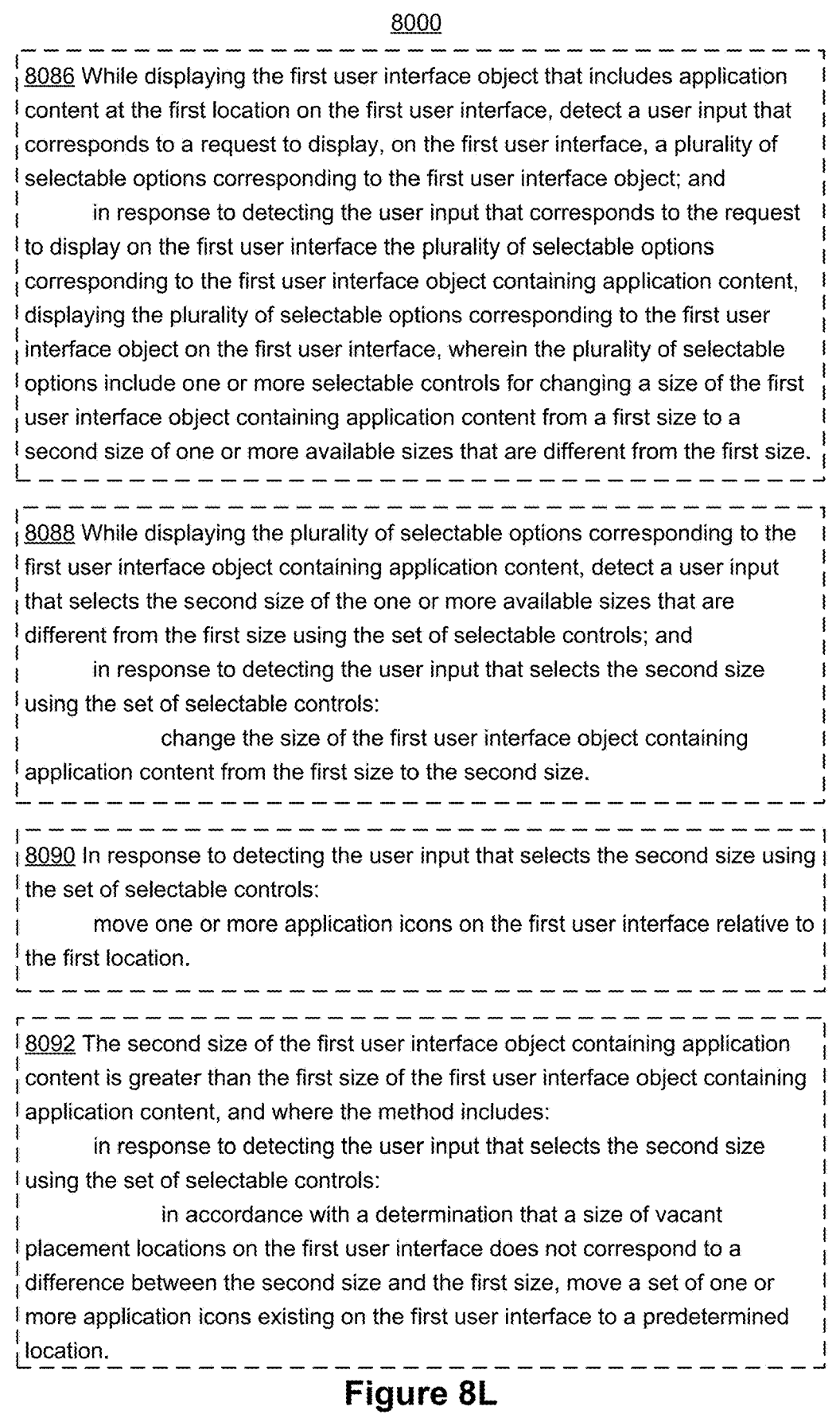

8086 While displaying the first user interface object that includes application content at the first location on the first user interface, detect a user input that corresponds to a request to display, on the first user interface, a plurality of selectable options corresponding to the first user interface object; and in response to detecting the user input that corresponds to the request to display on the first user interface the plurality of selectable options corresponding to the first user interface object containing application content, displaying the plurality of selectable options corresponding to the first user interface object on the first user interface, wherein the plurality of selectable options include one or more selectable controls for changing a size of the first user interface object containing application content from a first size to a second size of one or more available sizes that are different from the first size.

8088 While displaying the plurality of selectable options corresponding to the first user interface object containing application content, detect a user input that selects the second size of the one or more available sizes that are different from the first size using the set of selectable controls; and in response to detecting the user input that selects the second size using the set of selectable controls:

change the size of the first user interface object containing application content from the first size to the second size.

8090 In response to detecting the user input that selects the second size using the set of selectable controls:

move one or more application icons on the first user interface relative to the first location.

8092 The second size of the first user interface object containing application content is greater than the first size of the first user interface object containing application content, and where the method includes:

in response to detecting the user input that selects the second size using the set of selectable controls:

in accordance with a determination that a size of vacant placement locations on the first user interface does not correspond to a difference between the second size and the first size, move a set of one or more application icons existing on the first user interface to a predetermined location.

Figure 8M:
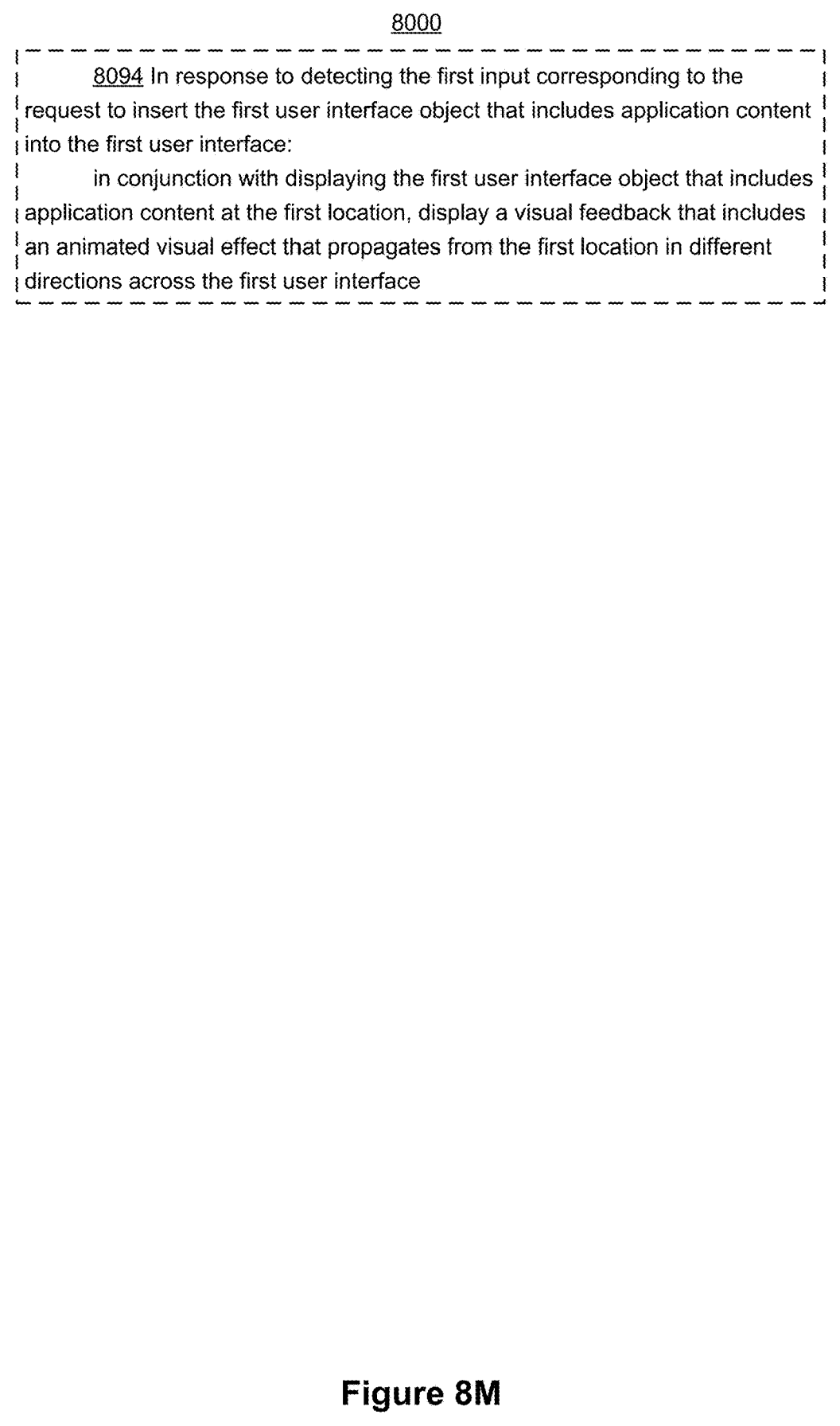

8094 In response to detecting the first input corresponding to the request to insert the first user interface object that includes application content into the first user interface:

in conjunction with displaying the first user interface object that includes application content at the first location, display a visual feedback that includes an animated visual effect that propagates from the first location in different directions across the first user interface

Figure 9A:
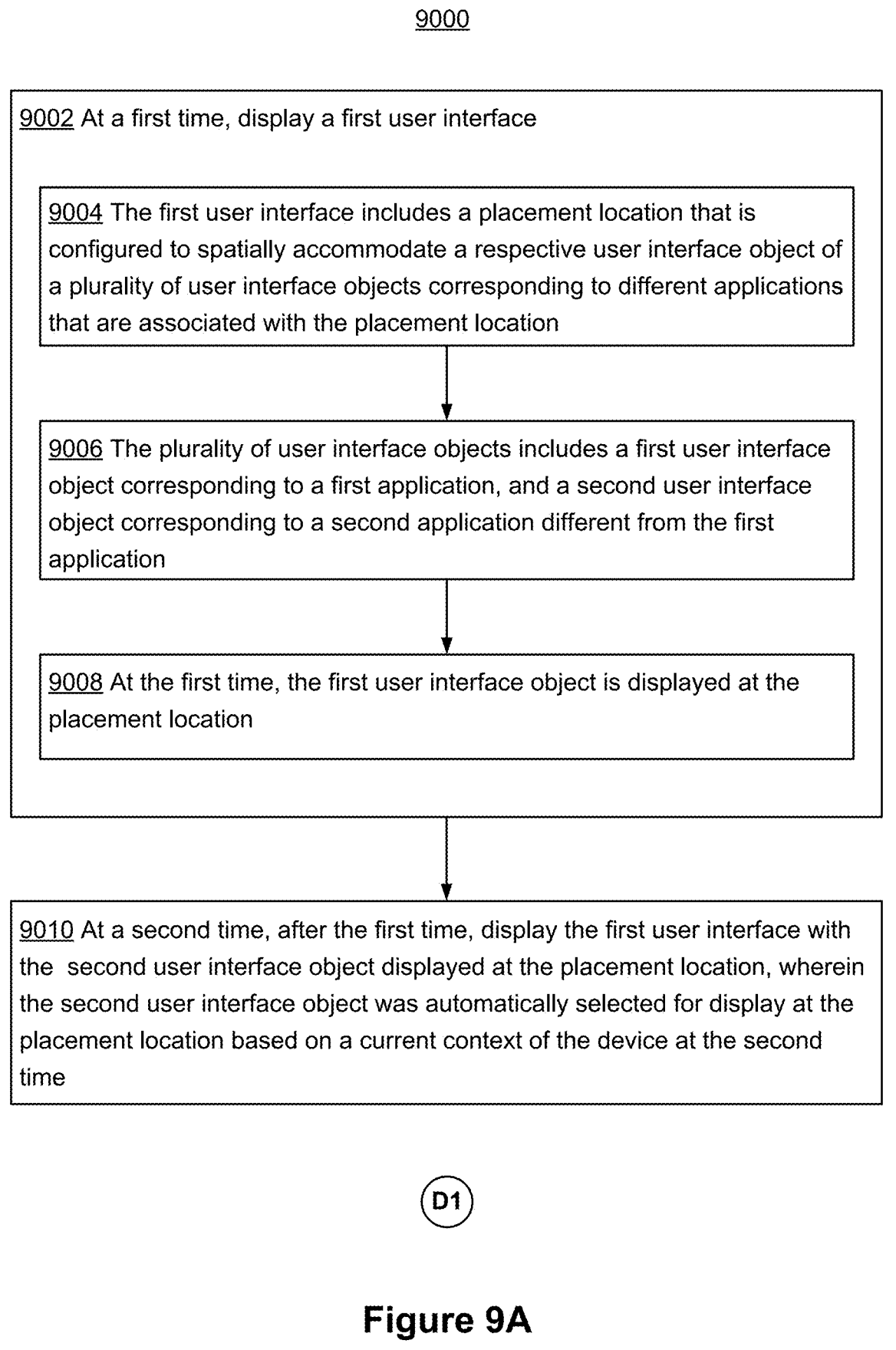

9002 At a first time, display a first user interface

9004 The first user interface includes a placement location that is configured to spatially accommodate a respective user interface object of a plurality of user interface objects corresponding to different applications that are associated with the placement location 9006 The plurality of user interface objects includes a first user interface object corresponding to a first application, and a second user interface object corresponding to a second application different from the first application 9008 At the first time, the first user interface object is displayed at the placement location 9010 At a second time, after the first time, display the first user interface with the second user interface object displayed at the placement location, wherein the second user interface object was automatically selected for display at the placement location based on a current context of the device at the second time

Figure 9B:
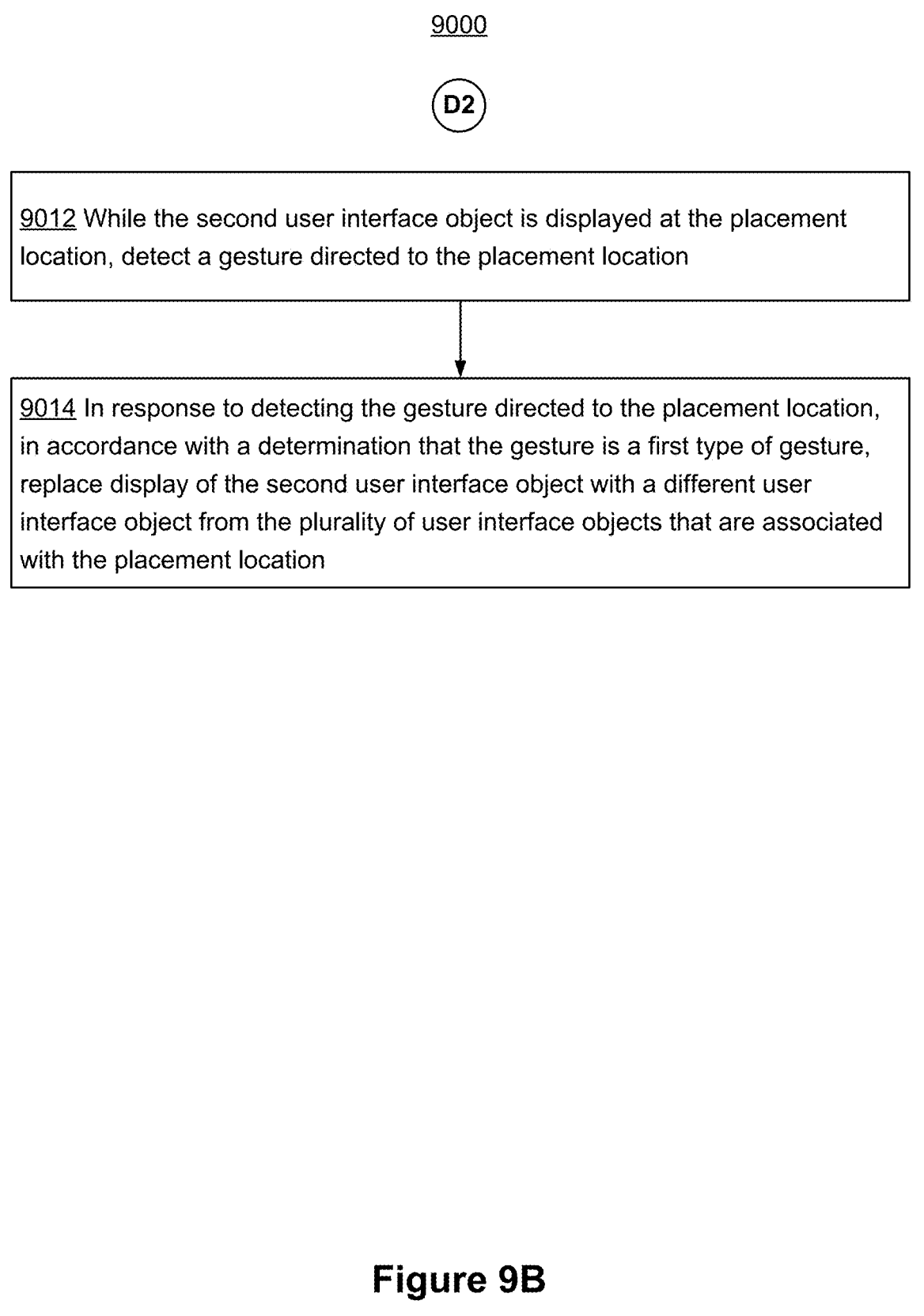

9012 While the second user interface object is displayed at the placement location, detect a gesture directed to the placement location

↓

9014 In response to detecting the gesture directed to the placement location, in accordance with a determination that the gesture is a first type of gesture, replace display of the second user interface object with a different user interface object from the plurality of user interface objects that are associated with the placement location

Figure 9C:
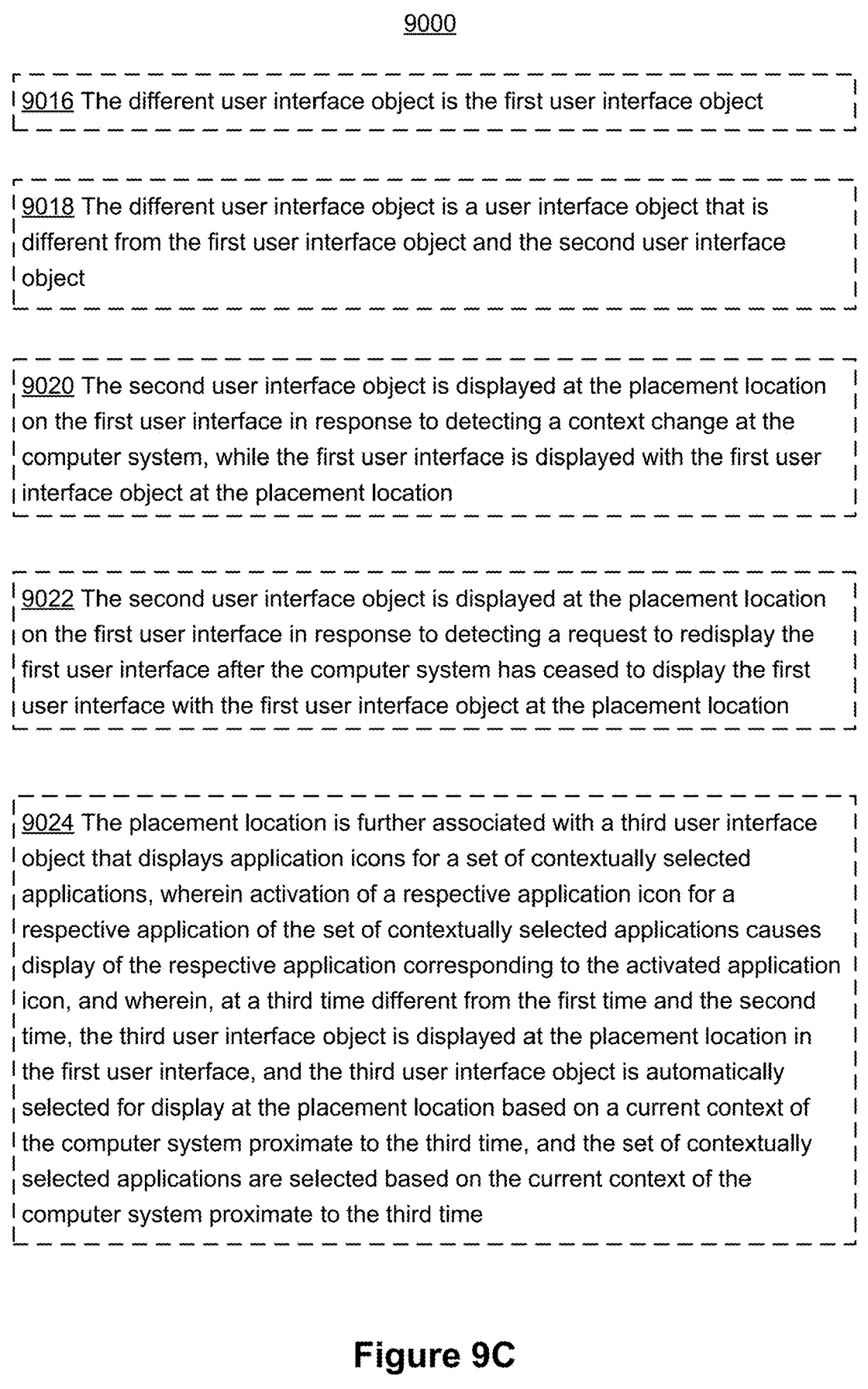

9016 The different user interface object is the first user interface object

9018 The different user interface object is a user interface object that is different from the first user interface object and the second user interface object 9020 The second user interface object is displayed at the placement location on the first user interface in response to detecting a context change at the computer system, while the first user interface is displayed with the first user interface object at the placement location 9022 The second user interface object is displayed at the placement location on the first user interface in response to detecting a request to redisplay the first user interface after the computer system has ceased to display the first user interface with the first user interface object at the placement location 9024 The placement location is further associated with a third user interface object that displays application icons for a set of contextually selected applications, wherein activation of a respective application icon for a respective application of the set of contextually selected applications causes display of the respective application corresponding to the activated application icon, and wherein, at a third time different from the first time and the second time, the third user interface object is displayed at the placement location in the first user interface, and the third user interface object is automatically selected for display at the placement location based on a current context of the computer system proximate to the third time, and the set of contextually selected applications are selected based on the current context of the computer system proximate to the third time

Figure 9D:
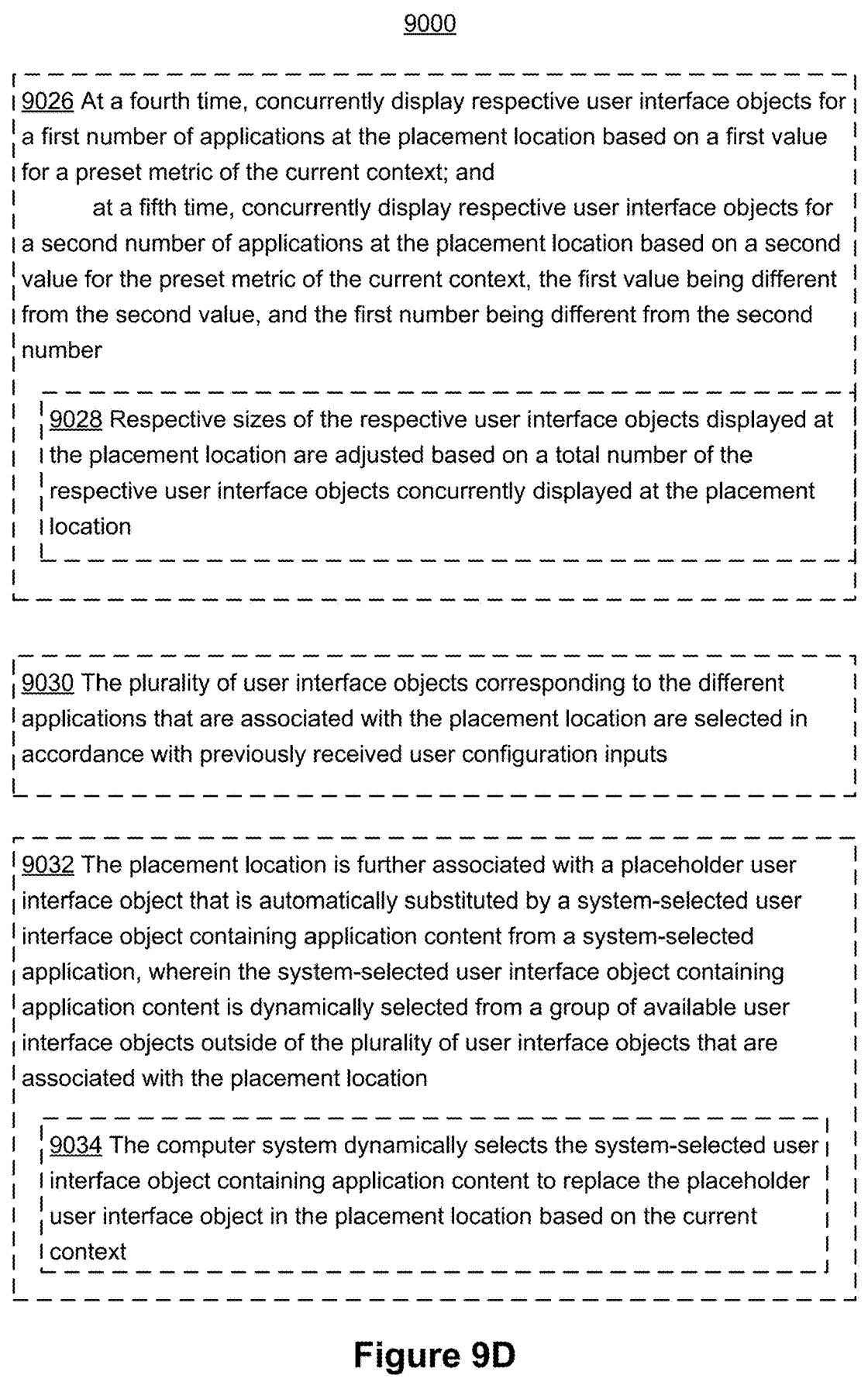

9026 At a fourth time, concurrently display respective user interface objects for a first number of applications at the placement location based on a first value for a preset metric of the current context; and at a fifth time, concurrently display respective user interface objects for a second number of applications at the placement location based on a second value for the preset metric of the current context, the first value being different from the second value, and the first number being different from the second number 9028 Respective sizes of the respective user interface objects displayed at the placement location are adjusted based on a total number of the respective user interface objects concurrently displayed at the placement location 9030 The plurality of user interface objects corresponding to the different applications that are associated with the placement location are selected in accordance with previously received user configuration inputs 9032 The placement location is further associated with a placeholder user interface object that is automatically substituted by a system-selected user interface object containing application content from a system-selected application, wherein the system-selected user interface object containing application content is dynamically selected from a group of available user interface objects outside of the plurality of user interface objects that are associated with the placement location 9034 The computer system dynamically selects the system-selected user interface object containing application content to replace the placeholder user interface object in the placement location based on the current context

Figure 9E:
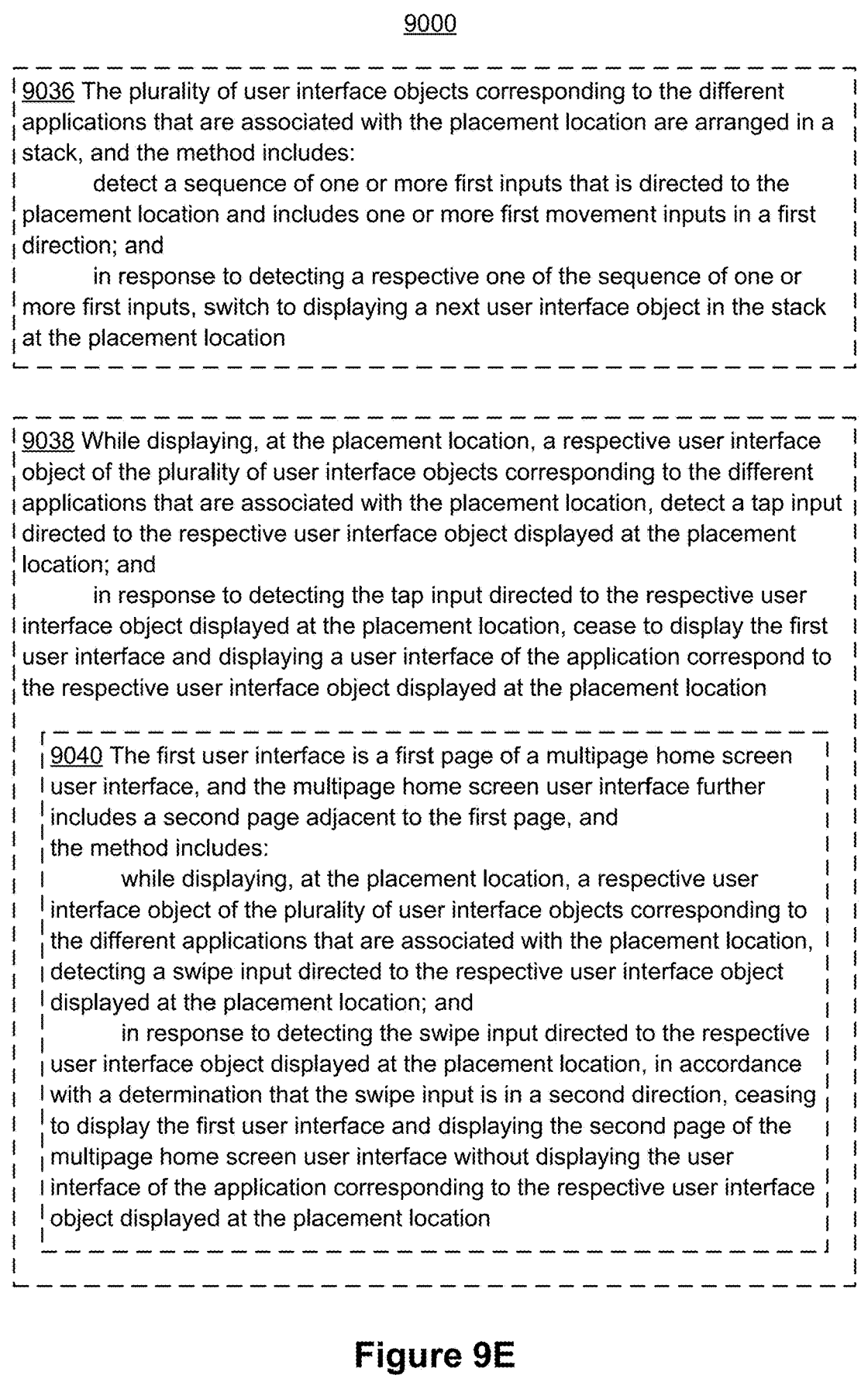

9036 The plurality of user interface objects corresponding to the different applications that are associated with the placement location are arranged in a stack, and the method includes:

detect a sequence of one or more first inputs that is directed to the placement location and includes one or more first movement inputs in a first direction; and in response to detecting a respective one of the sequence of one or more first inputs, switch to displaying a next user interface object in the stack at the placement location 9038 While displaying, at the placement location, a respective user interface object of the plurality of user interface objects corresponding to the different applications that are associated with the placement location, detect a tap input directed to the respective user interface object displayed at the placement location; and in response to detecting the tap input directed to the respective user interface object displayed at the placement location, cease to display the first user interface and displaying a user interface of the application correspond to the respective user interface object displayed at the placement location 9040 The first user interface is a first page of a multipage home screen user interface, and the multipage home screen user interface further includes a second page adjacent to the first page, and the method includes:

while displaying, at the placement location, a respective user interface object of the plurality of user interface objects corresponding to the different applications that are associated with the placement location, detecting a swipe input directed to the respective user interface object displayed at the placement location; and in response to detecting the swipe input directed to the respective user interface object displayed at the placement location, in accordance with a determination that the swipe input is in a second direction, ceasing to display the first user interface and displaying the second page of the multipage home screen user interface without displaying the user interface of the application corresponding to the respective user interface object displayed at the placement location

Figure 9F:
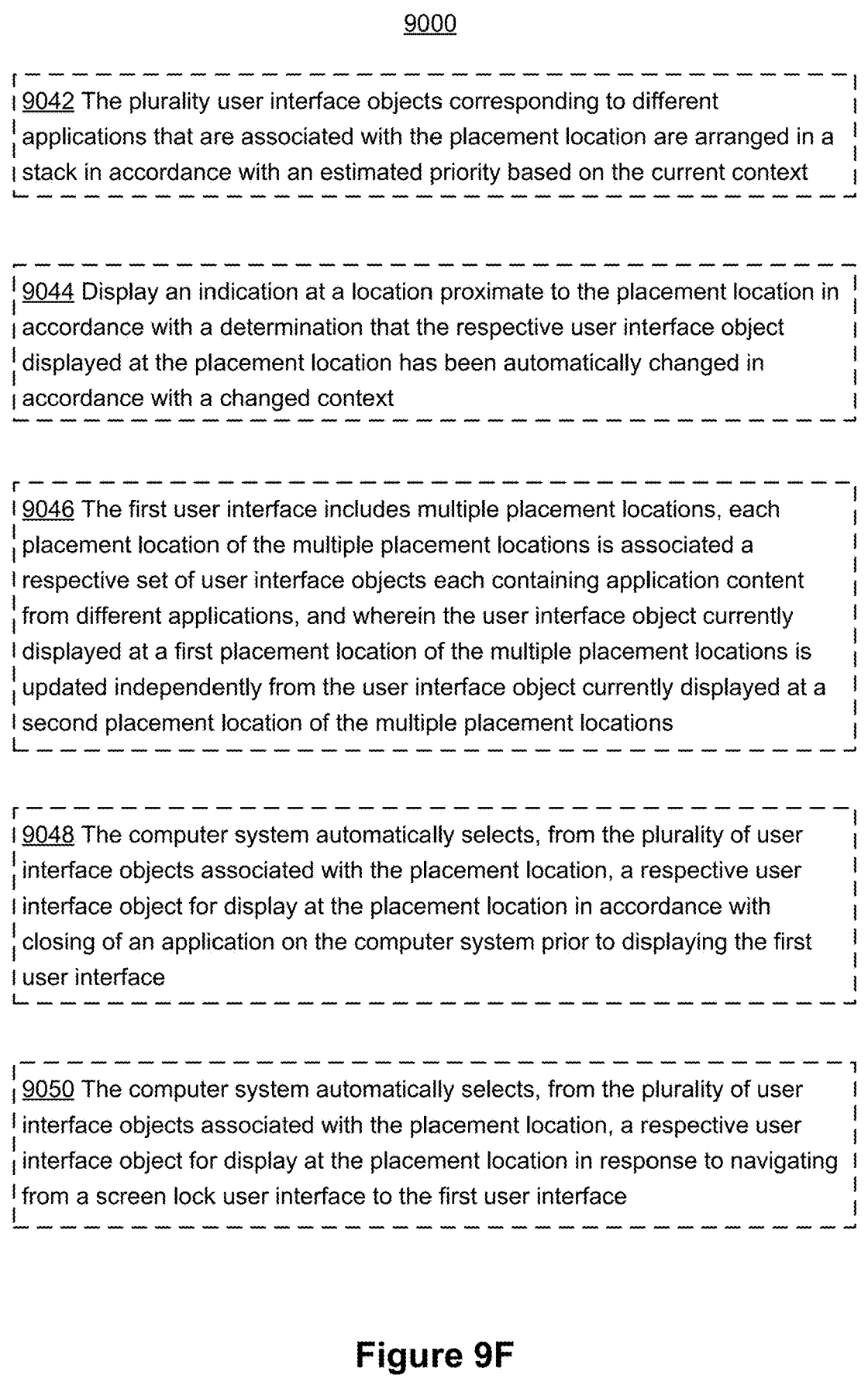

9042 The plurality user interface objects corresponding to different applications that are associated with the placement location are arranged in a stack in accordance with an estimated priority based on the current context 9044 Display an indication at a location proximate to the placement location in accordance with a determination that the respective user interface object displayed at the placement location has been automatically changed in accordance with a changed context 9046 The first user interface includes multiple placement locations, each placement location of the multiple placement locations is associated a respective set of user interface objects each containing application content from different applications, and wherein the user interface object currently displayed at a first placement location of the multiple placement locations is updated independently from the user interface object currently displayed at a second placement location of the multiple placement locations 9048 The computer system automatically selects, from the plurality of user interface objects associated with the placement location, a respective user interface object for display at the placement location in accordance with closing of an application on the computer system prior to displaying the first user interface 9050 The computer system automatically selects, from the plurality of user interface objects associated with the placement location, a respective user interface object for display at the placement location in response to navigating from a screen lock user interface to the first user interface

Figure 9G:
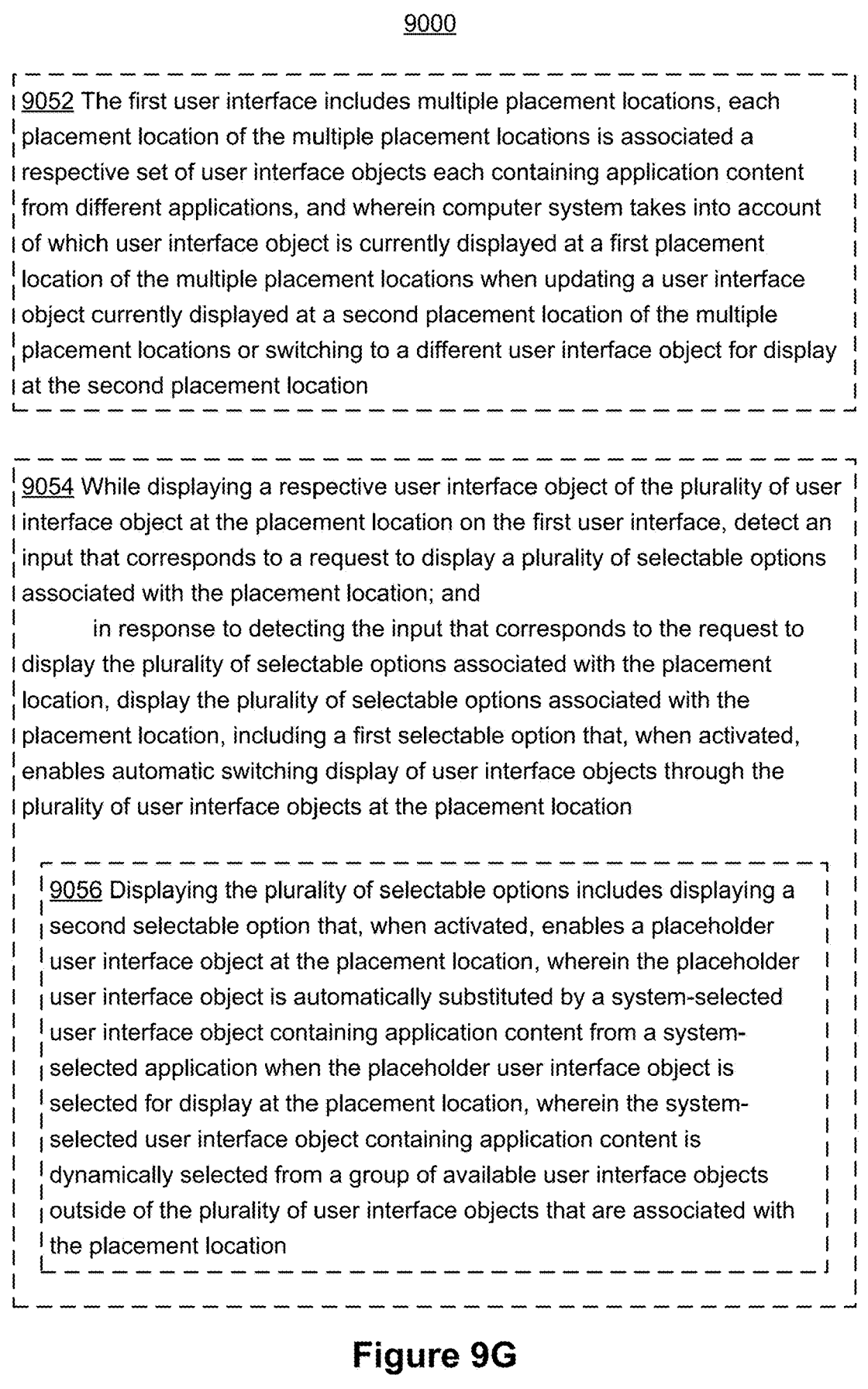

9052 The first user interface includes multiple placement locations, each placement location of the multiple placement locations is associated a respective set of user interface objects each containing application content from different applications, and wherein computer system takes into account of which user interface object is currently displayed at a first placement location of the multiple placement locations when updating a user interface object currently displayed at a second placement location of the multiple placement locations or switching to a different user interface object for display at the second placement location 9054 While displaying a respective user interface object of the plurality of user interface object at the placement location on the first user interface, detect an input that corresponds to a request to display a plurality of selectable options associated with the placement location; and in response to detecting the input that corresponds to the request to display the plurality of selectable options associated with the placement location, display the plurality of selectable options associated with the placement location, including a first selectable option that, when activated, enables automatic switching display of user interface objects through the plurality of user interface objects at the placement location 9056 Displaying the plurality of selectable options includes displaying a second selectable option that, when activated, enables a placeholder user interface object at the placement location, wherein the placeholder user interface object is automatically substituted by a system-selected user interface object containing application content from a system-selected application when the placeholder user interface object is selected for display at the placement location, wherein the system-selected user interface object containing application content is dynamically selected from a group of available user interface objects outside of the plurality of user interface objects that are associated with the placement location

Figure 9H:
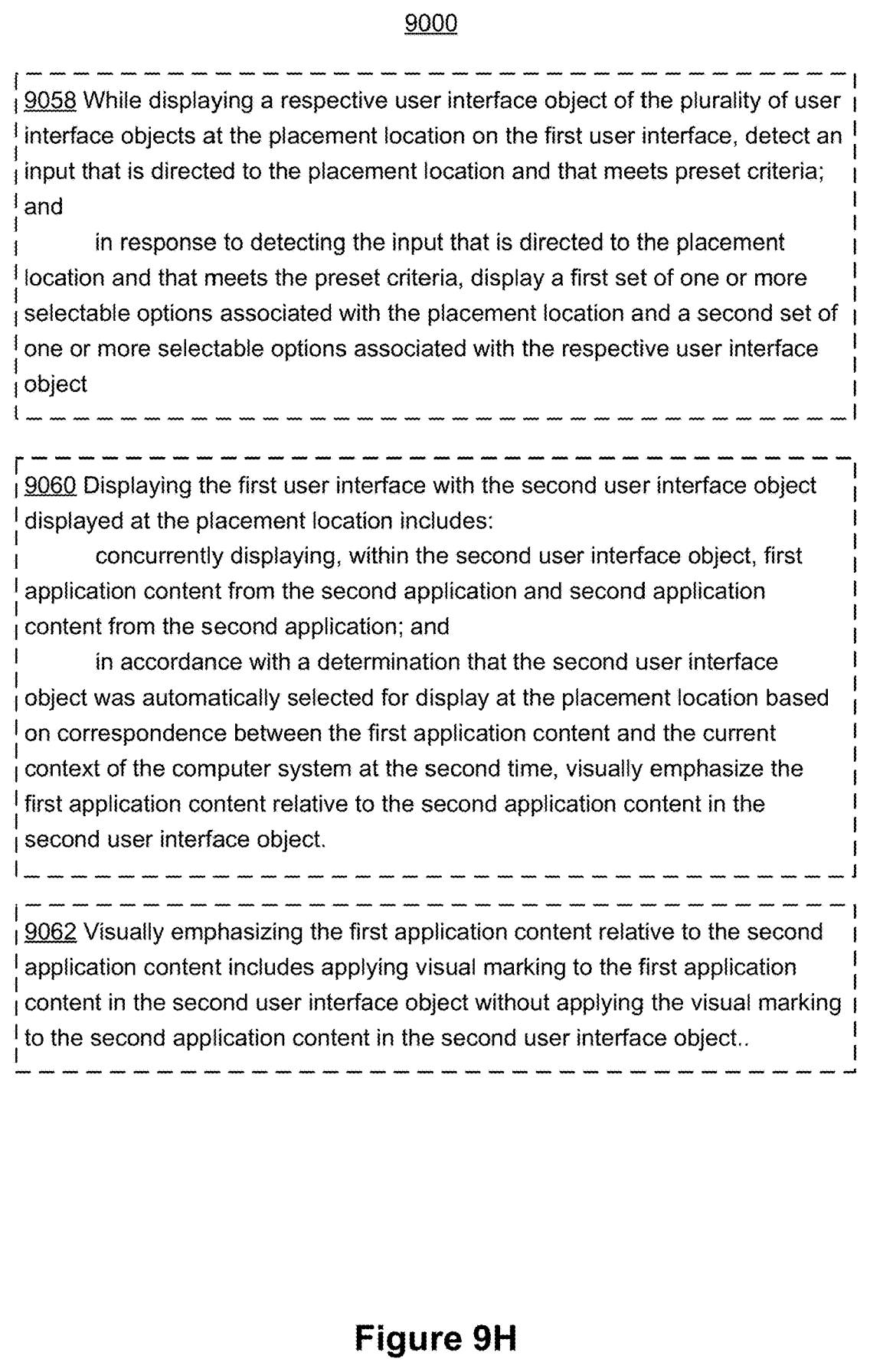

9058 While displaying a respective user interface object of the plurality of user interface objects at the placement location on the first user interface, detect an input that is directed to the placement location and that meets preset criteria; and in response to detecting the input that is directed to the placement location and that meets the preset criteria, display a first set of one or more selectable options associated with the placement location and a second set of one or more selectable options associated with the respective user interface object 9060 Displaying the first user interface with the second user interface object displayed at the placement location includes:

concurrently displaying, within the second user interface object, first application content from the second application and second application content from the second application; and in accordance with a determination that the second user interface object was automatically selected for display at the placement location based on correspondence between the first application content and the current context of the computer system at the second time, visually emphasize the first application content relative to the second application content in the second user interface object.

9062 Visually emphasizing the first application content relative to the second application content includes applying visual marking to the first application content in the second user interface object without applying the visual marking to the second application content in the second user interface object..

Figure 10B:
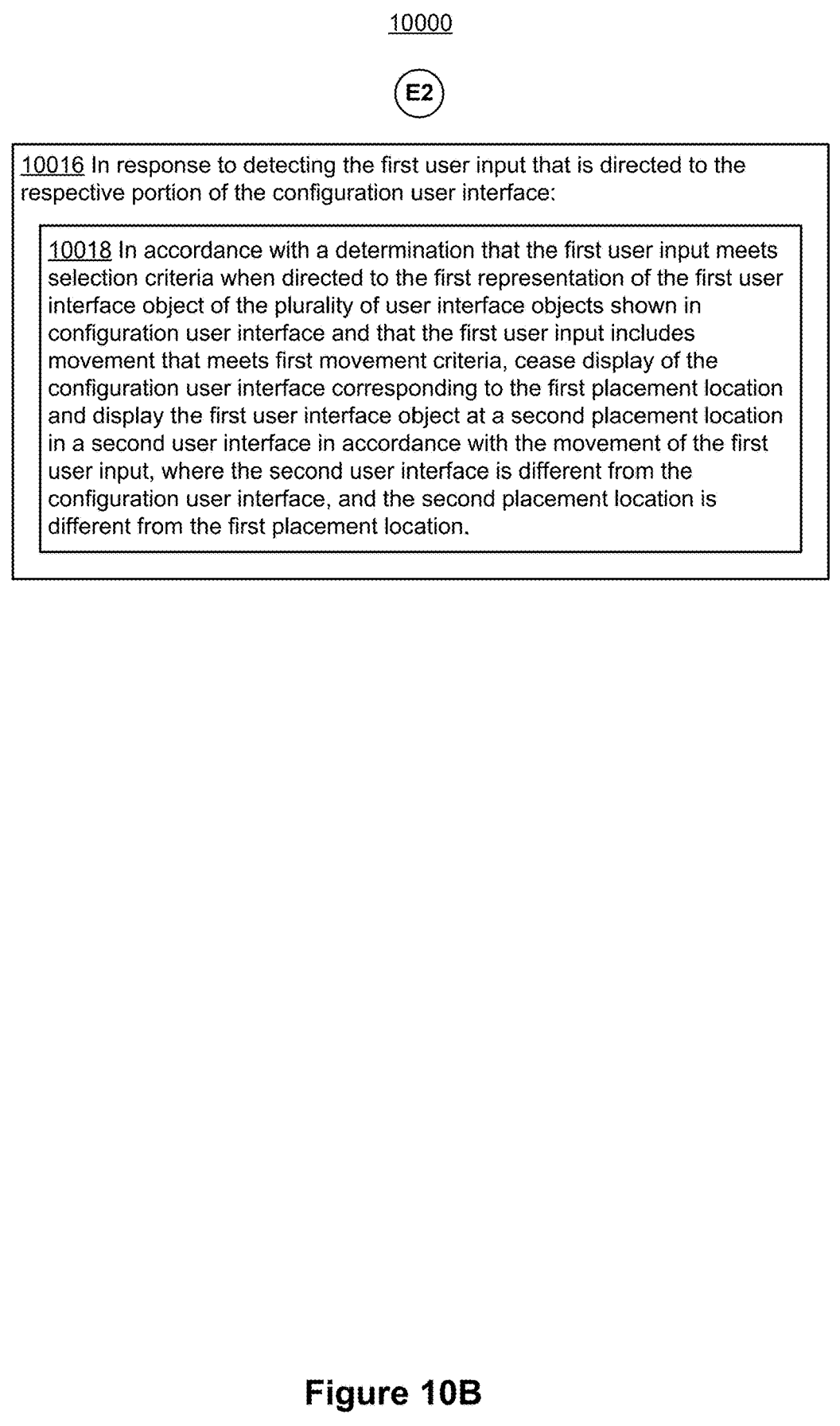

10016 In response to detecting the first user input that is directed to the respective portion of the configuration user interface:

10018 In accordance with a determination that the first user input meets selection criteria when directed to the first representation of the first user interface object of the plurality of user interface objects shown in configuration user interface and that the first user input includes movement that meets first movement criteria, cease display of the configuration user interface corresponding to the first placement location and display the first user interface object at a second placement location in a second user interface in accordance with the movement of the first user input, where the second user interface is different from the configuration user interface, and the second placement location is different from the first placement location.

Figure 10C:
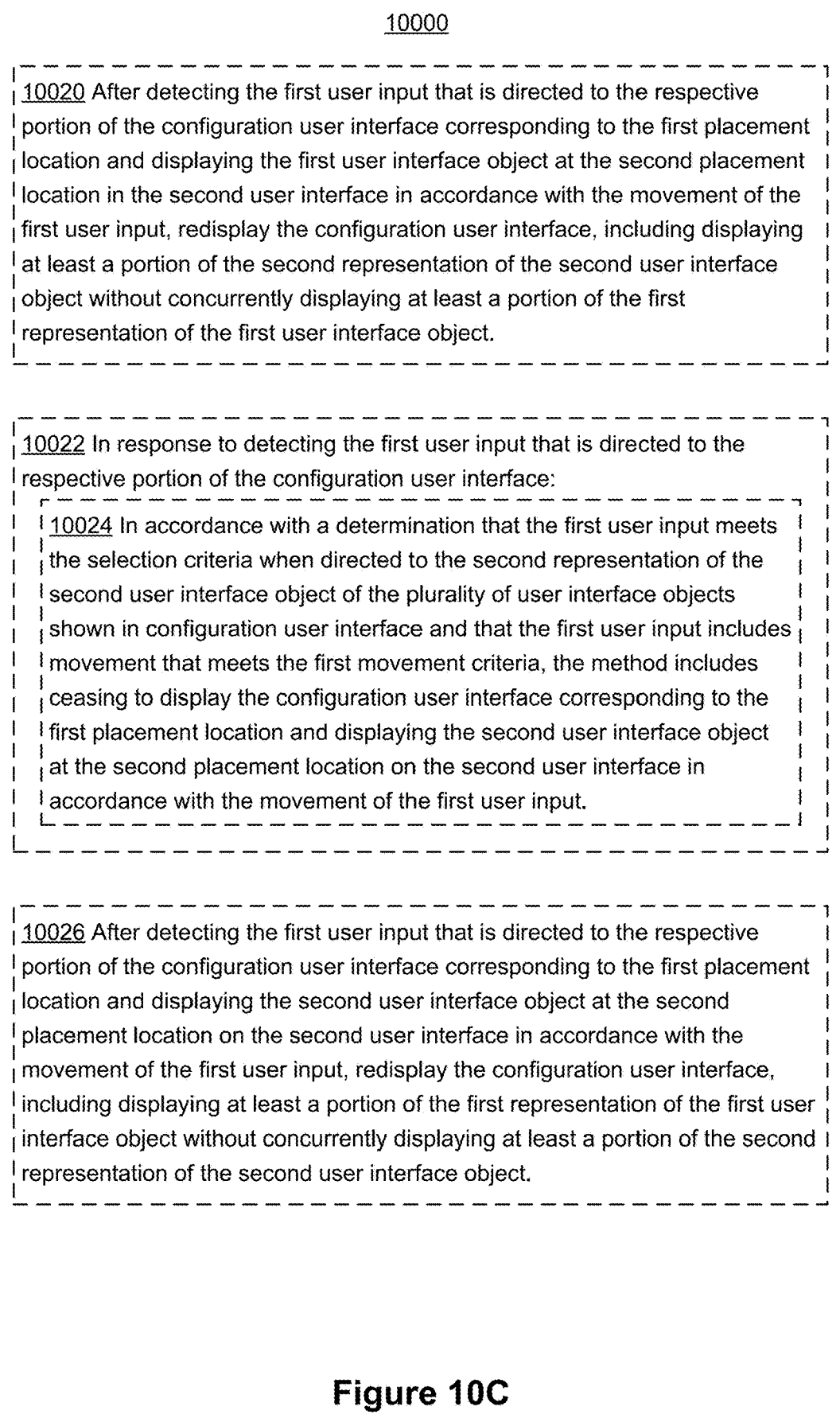

10020 After detecting the first user input that is directed to the respective portion of the configuration user interface corresponding to the first placement location and displaying the first user interface object at the second placement location in the second user interface in accordance with the movement of the first user input, redisplay the configuration user interface, including displaying at least a portion of the second representation of the second user interface object without concurrently displaying at least a portion of the first representation of the first user interface object.

10022 In response to detecting the first user input that is directed to the respective portion of the configuration user interface:

10024 In accordance with a determination that the first user input meets the selection criteria when directed to the second representation of the second user interface object of the plurality of user interface objects shown in configuration user interface and that the first user input includes movement that meets the first movement criteria, the method includes ceasing to display the configuration user interface corresponding to the first placement location and displaying the second user interface object at the second placement location on the second user interface in accordance with the movement of the first user input.

10026 After detecting the first user input that is directed to the respective portion of the configuration user interface corresponding to the first placement location and displaying the second user interface object at the second placement location on the second user interface in accordance with the movement of the first user input, redisplay the configuration user interface, including displaying at least a portion of the first representation of the first user interface object without concurrently displaying at least a portion of the second representation of the second user interface object.

Figure 10D:
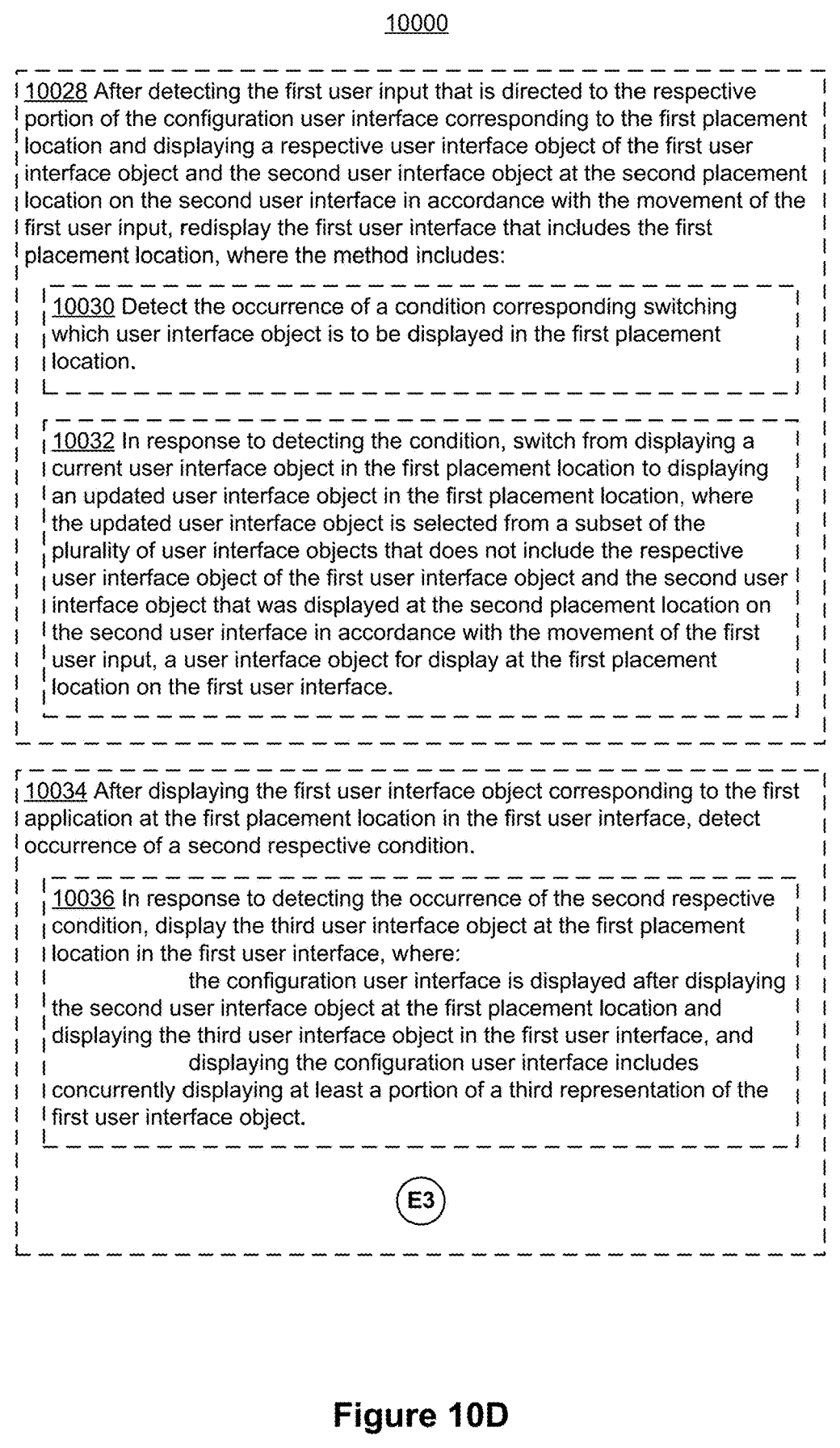

10028 After detecting the first user input that is directed to the respective portion of the configuration user interface corresponding to the first placement location and displaying a respective user interface object of the first user interface object and the second user interface object at the second placement location on the second user interface in accordance with the movement of the first user input, redisplay the first user interface that includes the first placement location, where the method includes:

10030 Detect the occurrence of a condition corresponding switching which user interface object is to be displayed in the first placement location.

10032 In response to detecting the condition, switch from displaying a current user interface object in the first placement location to displaying an updated user interface object in the first placement location, where the updated user interface object is selected from a subset of the plurality of user interface objects that does not include the respective user interface object of the first user interface object and the second user interface object that was displayed at the second placement location on the second user interface in accordance with the movement of the first user input, a user interface object for display at the first placement location on the first user interface.

10034 After displaying the first user interface object corresponding to the first application at the first placement location in the first user interface, detect occurrence of a second respective condition.

10036 In response to detecting the occurrence of the second respective condition, display the third user interface object at the first placement location in the first user interface, where:

the configuration user interface is displayed after displaying the second user interface object at the first placement location and displaying the third user interface object in the first user interface, and displaying the configuration user interface includes concurrently displaying at least a portion of a third representation of the first user interface object.

Figure 10E:
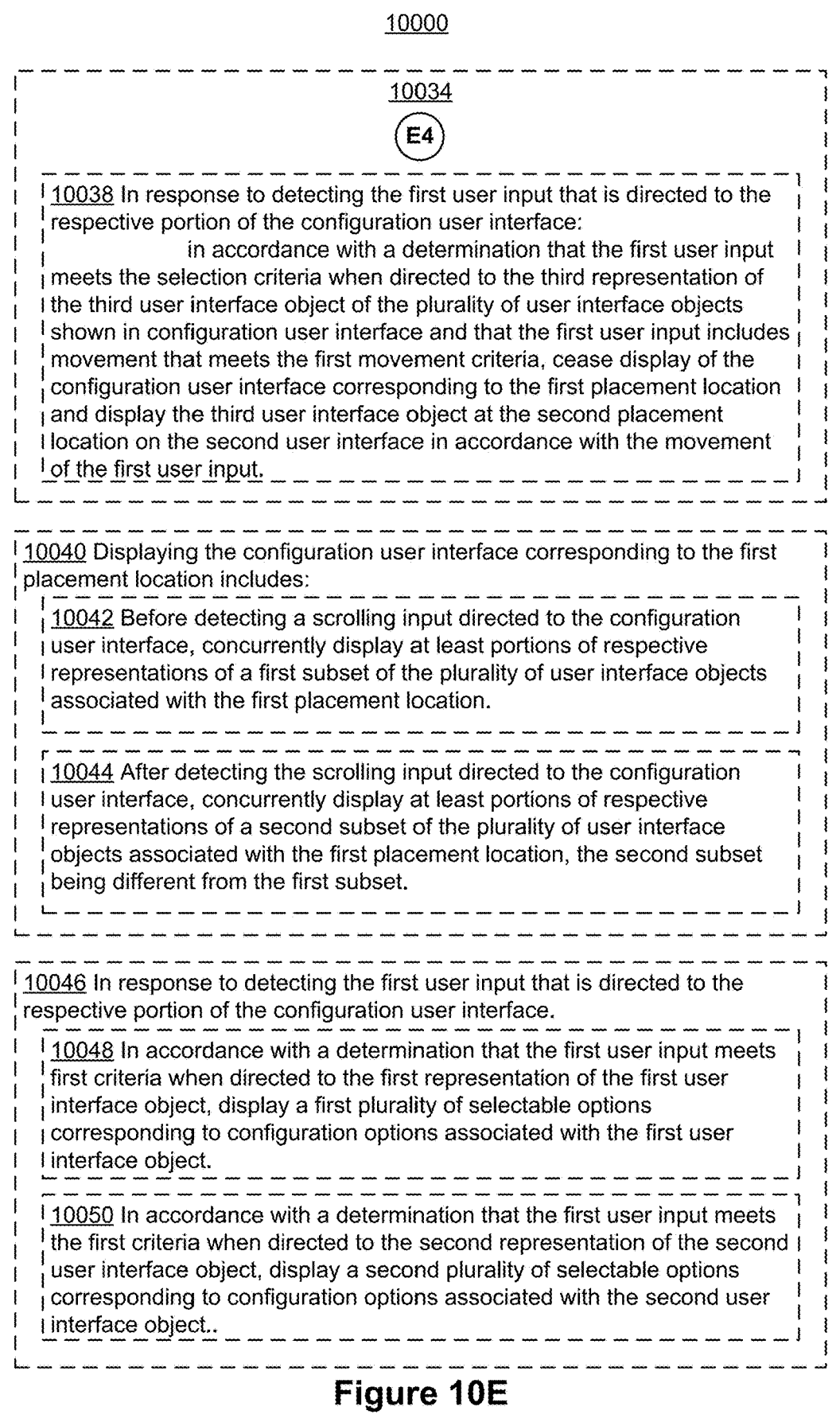

10038 In response to detecting the first user input that is directed to the respective portion of the configuration user interface:
in accordance with a determination that the first user input meets the selection criteria when directed to the third representation of the third user interface object of the plurality of user interface objects shown in configuration user interface and that the first user input includes movement that meets the first movement criteria, cease display of the configuration user interface corresponding to the first placement location and display the third user interface object at the second placement location on the second user interface in accordance with the movement of the first user input.

10040 Displaying the configuration user interface corresponding to the first placement location includes:

10042 Before detecting a scrolling input directed to the configuration user interface, concurrently display at least portions of respective representations of a first subset of the plurality of user interface objects associated with the first placement location.

10044 After detecting the scrolling input directed to the configuration user interface, concurrently display at least portions of respective representations of a second subset of the plurality of user interface objects associated with the first placement location, the second subset being different from the first subset.

10046 In response to detecting the first user input that is directed to the respective portion of the configuration user interface.

10048 In accordance with a determination that the first user input meets first criteria when directed to the first representation of the first user interface object, display a first plurality of selectable options corresponding to configuration options associated with the first user interface object.

10050 In accordance with a determination that the first user input meets the first criteria when directed to the second representation of the second user interface object, display a second plurality of selectable options corresponding to configuration options associated with the second user interface object..

Figure 10F:
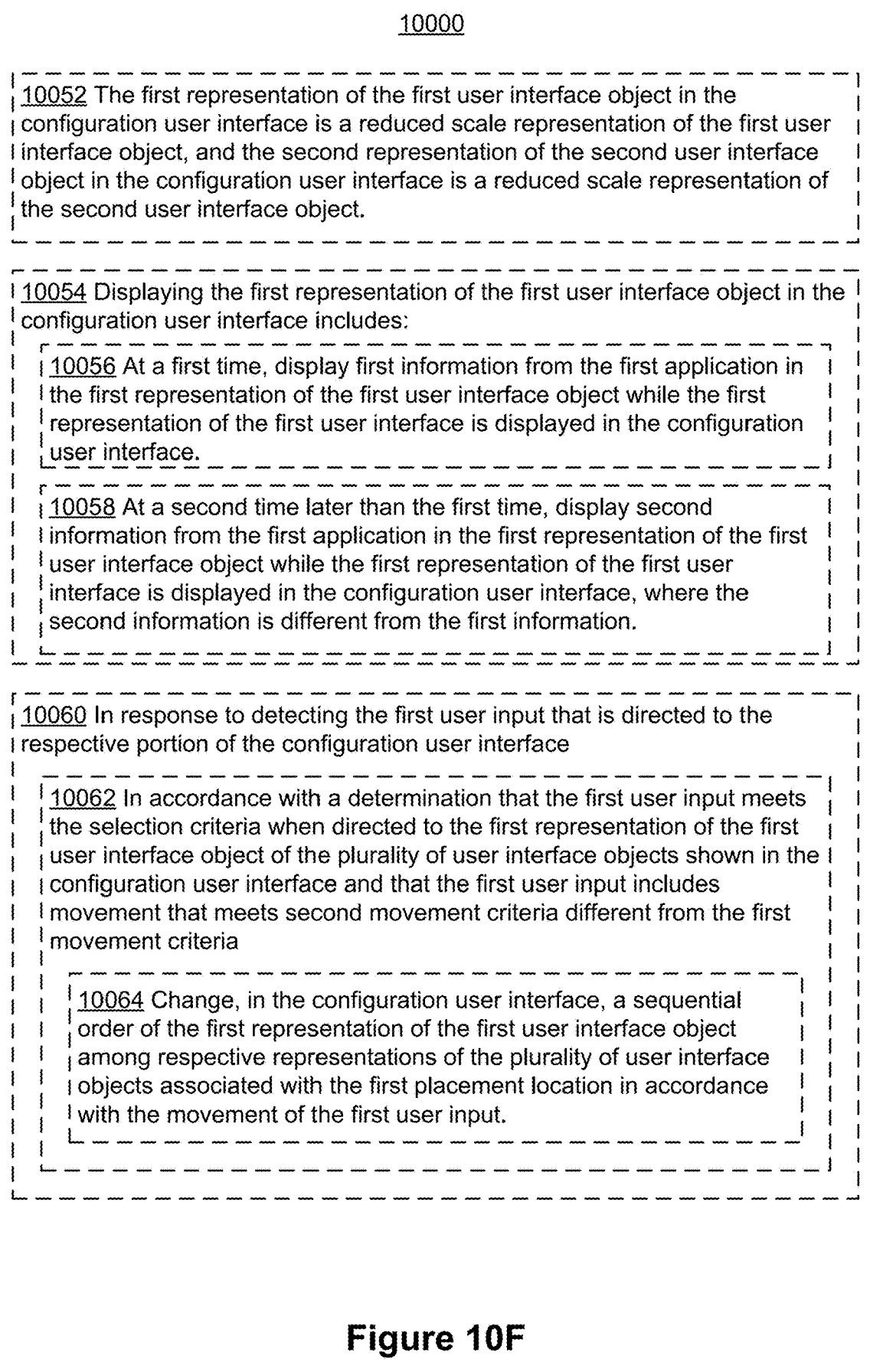

10052 The first representation of the first user interface object in the configuration user interface is a reduced scale representation of the first user interface object, and the second representation of the second user interface object in the configuration user interface is a reduced scale representation of the second user interface object.

10054 Displaying the first representation of the first user interface object in the configuration user interface includes:

10056 At a first time, display first information from the first application in the first representation of the first user interface object while the first representation of the first user interface is displayed in the configuration user interface.

10058 At a second time later than the first time, display second information from the first application in the first representation of the first user interface object while the first representation of the first user interface is displayed in the configuration user interface, where the second information is different from the first information.

10060 In response to detecting the first user input that is directed to the respective portion of the configuration user interface 10062 In accordance with a determination that the first user input meets the selection criteria when directed to the first representation of the first user interface object of the plurality of user interface objects shown in the configuration user interface and that the first user input includes movement that meets second movement criteria different from the first movement criteria 10064 Change, in the configuration user interface, a sequential order of the first representation of the first user interface object among respective representations of the plurality of user interface objects associated with the first placement location in accordance with the movement of the first user input.

Figure 10G:
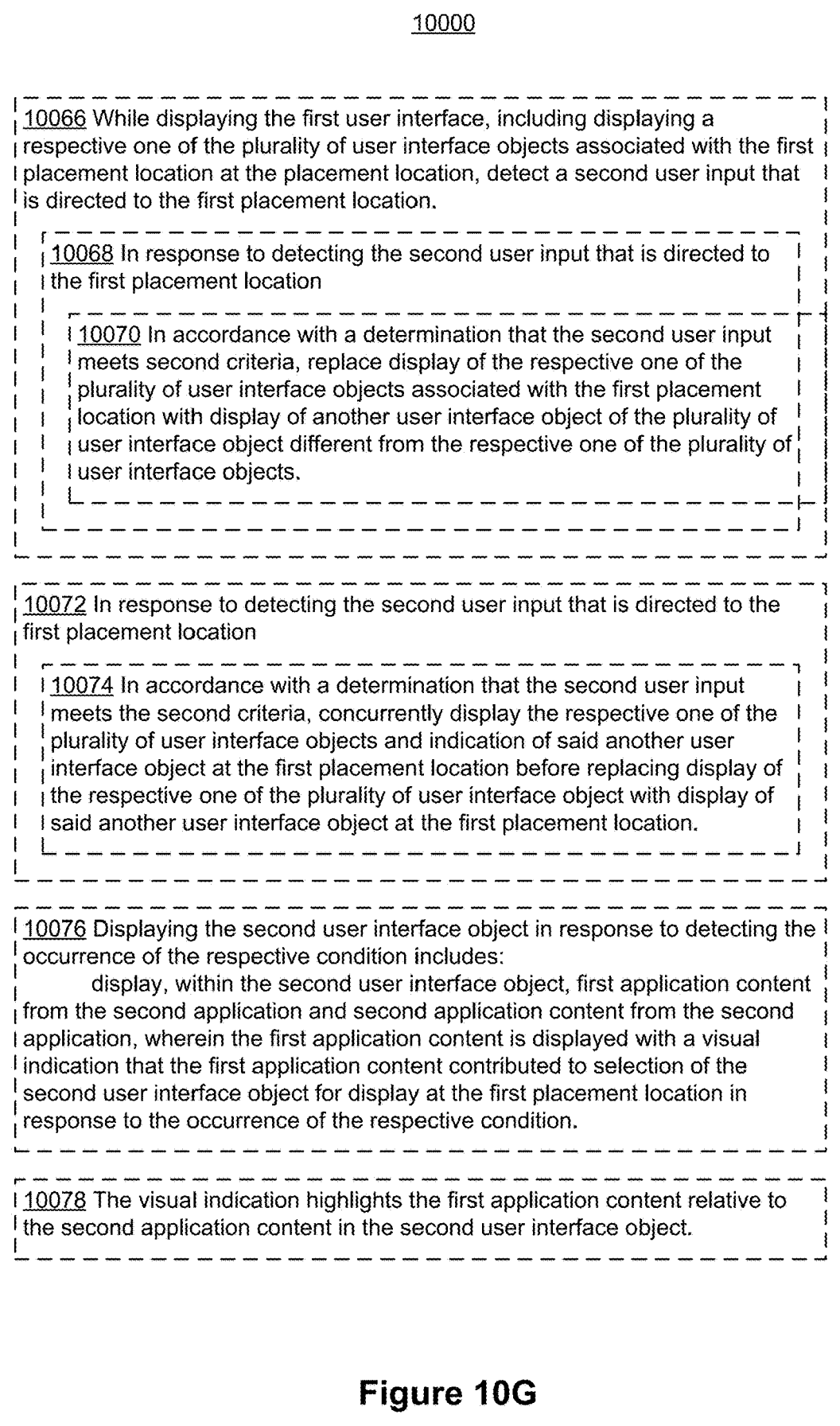

10066 While displaying the first user interface, including displaying a respective one of the plurality of user interface objects associated with the first placement location at the placement location, detect a second user input that is directed to the first placement location.

10068 In response to detecting the second user input that is directed to the first placement location 10070 In accordance with a determination that the second user input meets second criteria, replace display of the respective one of the plurality of user interface objects associated with the first placement location with display of another user interface object of the plurality of user interface object different from the respective one of the plurality of user interface objects.

10072 In response to detecting the second user input that is directed to the first placement location 10074 In accordance with a determination that the second user input meets the second criteria, concurrently display the respective one of the plurality of user interface objects and indication of said another user interface object at the first placement location before replacing display of the respective one of the plurality of user interface object with display of said another user interface object at the first placement location.

10076 Displaying the second user interface object in response to detecting the occurrence of the respective condition includes:

display, within the second user interface object, first application content from the second application and second application content from the second application, wherein the first application content is displayed with a visual indication that the first application content contributed to selection of the second user interface object for display at the first placement location in response to the occurrence of the respective condition.

10078 The visual indication highlights the first application content relative to the second application content in the second user interface object.

Figure 10H:
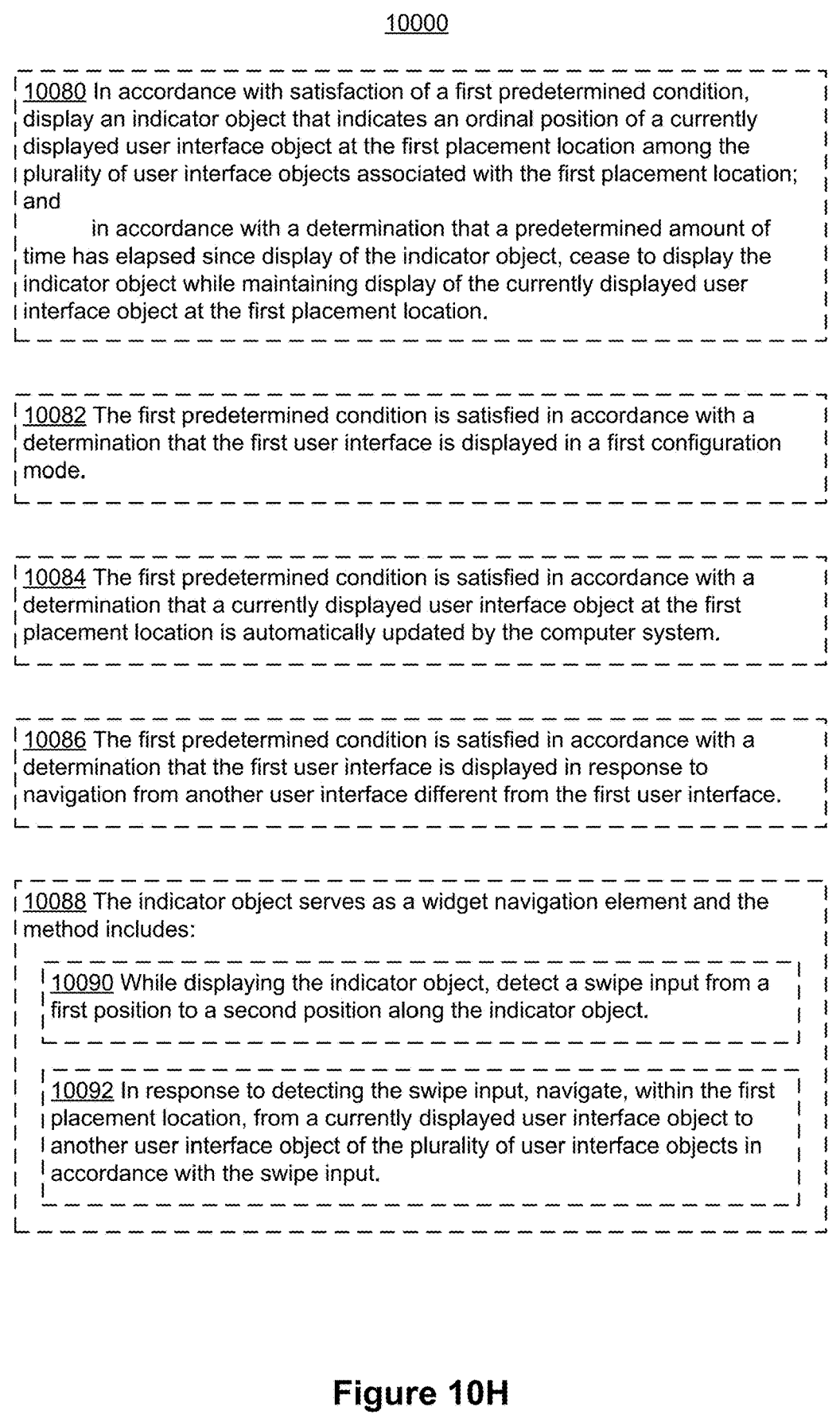

10080 In accordance with satisfaction of a first predetermined condition, display an indicator object that indicates an ordinal position of a currently displayed user interface object at the first placement location among the plurality of user interface objects associated with the first placement location; and in accordance with a determination that a predetermined amount of time has elapsed since display of the indicator object, cease to display the indicator object while maintaining display of the currently displayed user interface object at the first placement location.

10082 The first predetermined condition is satisfied in accordance with a determination that the first user interface is displayed in a first configuration mode.

10084 The first predetermined condition is satisfied in accordance with a determination that a currently displayed user interface object at the first placement location is automatically updated by the computer system.

10086 The first predetermined condition is satisfied in accordance with a determination that the first user interface is displayed in response to navigation from another user interface different from the first user interface.

10088 The indicator object serves as a widget navigation element and the method includes:

10090 While displaying the indicator object, detect a swipe input from a first position to a second position along the indicator object.

10092 In response to detecting the swipe input, navigate, within the first placement location, from a currently displayed user interface object to another user interface object of the plurality of user interface objects in accordance with the swipe input.

Figure 11A:
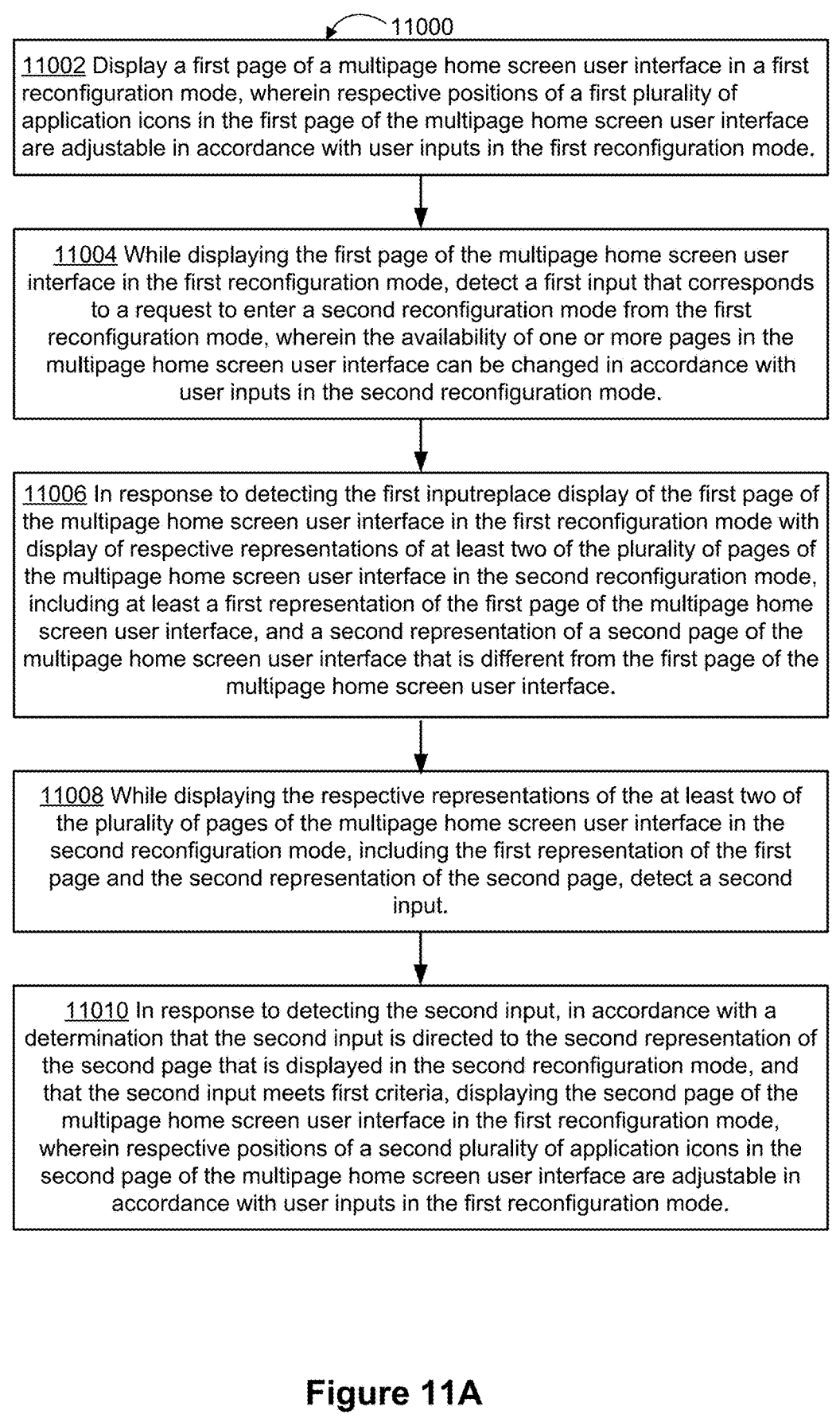

11002 Display a first page of a multipage home screen user interface in a first reconfiguration mode, wherein respective positions of a first plurality of application icons in the first page of the multipage home screen user interface are adjustable in accordance with user inputs in the first reconfiguration mode.

↓

11004 While displaying the first page of the multipage home screen user interface in the first reconfiguration mode, detect a first input that corresponds to a request to enter a second reconfiguration mode from the first reconfiguration mode, wherein the availability of one or more pages in the multipage home screen user interface can be changed in accordance with user inputs in the second reconfiguration mode.

↓

11006 In response to detecting the first inputreplace display of the first page of the multipage home screen user interface in the first reconfiguration mode with display of respective representations of at least two of the plurality of pages of the multipage home screen user interface in the second reconfiguration mode, including at least a first representation of the first page of the multipage home screen user interface, and a second representation of a second page of the multipage home screen user interface that is different from the first page of the multipage home screen user interface.

↓

11008 While displaying the respective representations of the at least two of the plurality of pages of the multipage home screen user interface in the second reconfiguration mode, including the first representation of the first page and the second representation of the second page, detect a second input.

↓

11010 In response to detecting the second input, in accordance with a determination that the second input is directed to the second representation of the second page that is displayed in the second reconfiguration mode, and that the second input meets first criteria, displaying the second page of the multipage home screen user interface in the first reconfiguration mode, wherein respective positions of a second plurality of application icons in the second page of the multipage home screen user interface are adjustable in accordance with user inputs in the first reconfiguration mode.

Figure 11B:
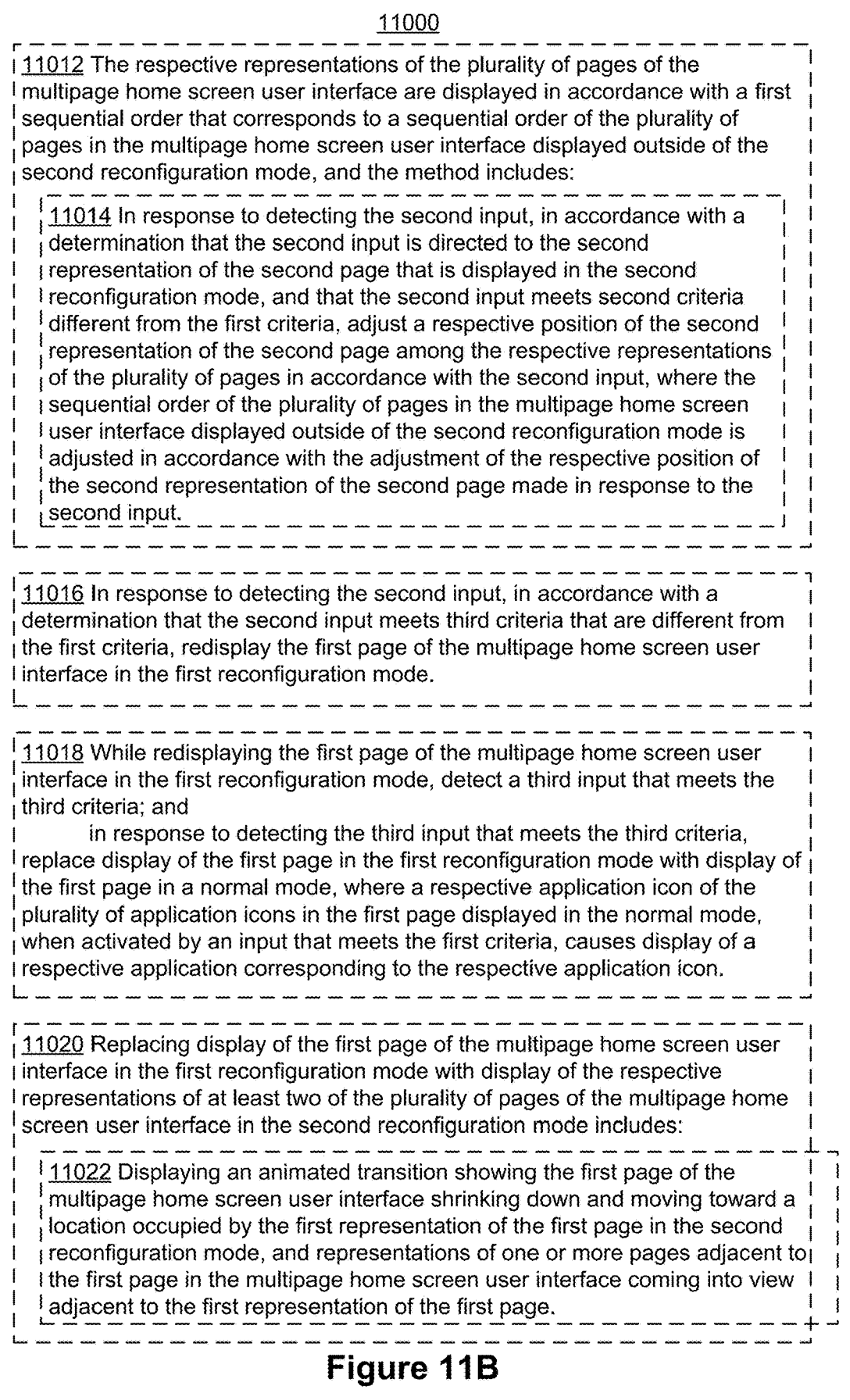

11012 The respective representations of the plurality of pages of the multipage home screen user interface are displayed in accordance with a first sequential order that corresponds to a sequential order of the plurality of pages in the multipage home screen user interface displayed outside of the second reconfiguration mode, and the method includes:

11014 In response to detecting the second input, in accordance with a determination that the second input is directed to the second representation of the second page that is displayed in the second reconfiguration mode, and that the second input meets second criteria different from the first criteria, adjust a respective position of the second representation of the second page among the respective representations of the plurality of pages in accordance with the second input, where the sequential order of the plurality of pages in the multipage home screen user interface displayed outside of the second reconfiguration mode is adjusted in accordance with the adjustment of the respective position of the second representation of the second page made in response to the second input.

11016 In response to detecting the second input, in accordance with a determination that the second input meets third criteria that are different from the first criteria, redisplay the first page of the multipage home screen user interface in the first reconfiguration mode.

11018 While redisplaying the first page of the multipage home screen user interface in the first reconfiguration mode, detect a third input that meets the third criteria; and in response to detecting the third input that meets the third criteria, replace display of the first page in the first reconfiguration mode with display of the first page in a normal mode, where a respective application icon of the plurality of application icons in the first page displayed in the normal mode, when activated by an input that meets the first criteria, causes display of a respective application corresponding to the respective application icon.

11020 Replacing display of the first page of the multipage home screen user interface in the first reconfiguration mode with display of the respective representations of at least two of the plurality of pages of the multipage home screen user interface in the second reconfiguration mode includes:

11022 Displaying an animated transition showing the first page of the multipage home screen user interface shrinking down and moving toward a location occupied by the first representation of the first page in the second reconfiguration mode, and representations of one or more pages adjacent to the first page in the multipage home screen user interface coming into view adjacent to the first representation of the first page.

Figure 11C:
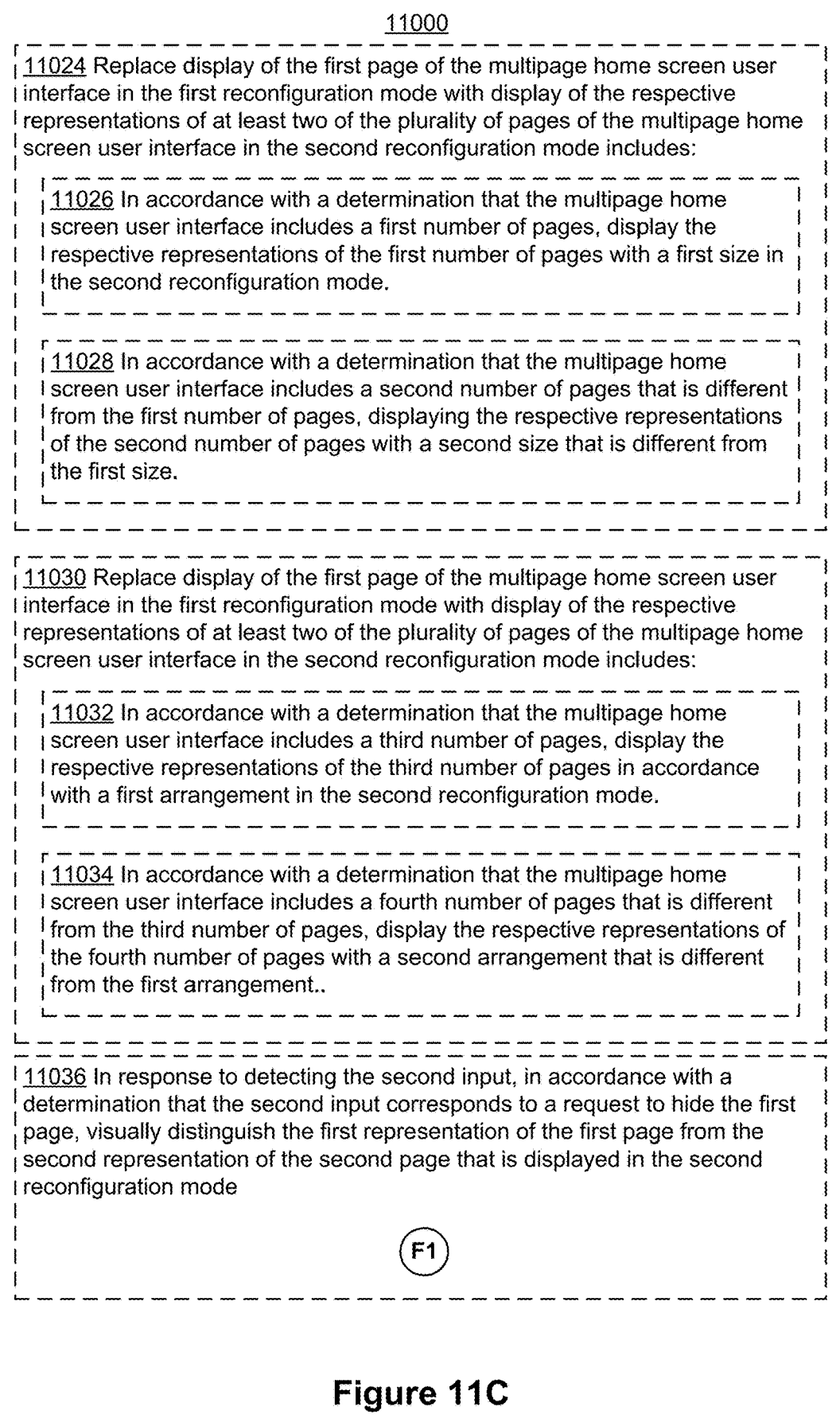

11024 Replace display of the first page of the multipage home screen user interface in the first reconfiguration mode with display of the respective representations of at least two of the plurality of pages of the multipage home screen user interface in the second reconfiguration mode includes:

11026 In accordance with a determination that the multipage home screen user interface includes a first number of pages, display the respective representations of the first number of pages with a first size in the second reconfiguration mode.

11028 In accordance with a determination that the multipage home screen user interface includes a second number of pages that is different from the first number of pages, displaying the respective representations of the second number of pages with a second size that is different from the first size.

11030 Replace display of the first page of the multipage home screen user interface in the first reconfiguration mode with display of the respective representations of at least two of the plurality of pages of the multipage home screen user interface in the second reconfiguration mode includes:

11032 In accordance with a determination that the multipage home screen user interface includes a third number of pages, display the respective representations of the third number of pages in accordance with a first arrangement in the second reconfiguration mode.

11034 In accordance with a determination that the multipage home screen user interface includes a fourth number of pages that is different from the third number of pages, display the respective representations of the fourth number of pages with a second arrangement that is different from the first arrangement..

11036 In response to detecting the second input, in accordance with a determination that the second input corresponds to a request to hide the first page, visually distinguish the first representation of the first page from the second representation of the second page that is displayed in the second reconfiguration mode

Figure 11D:
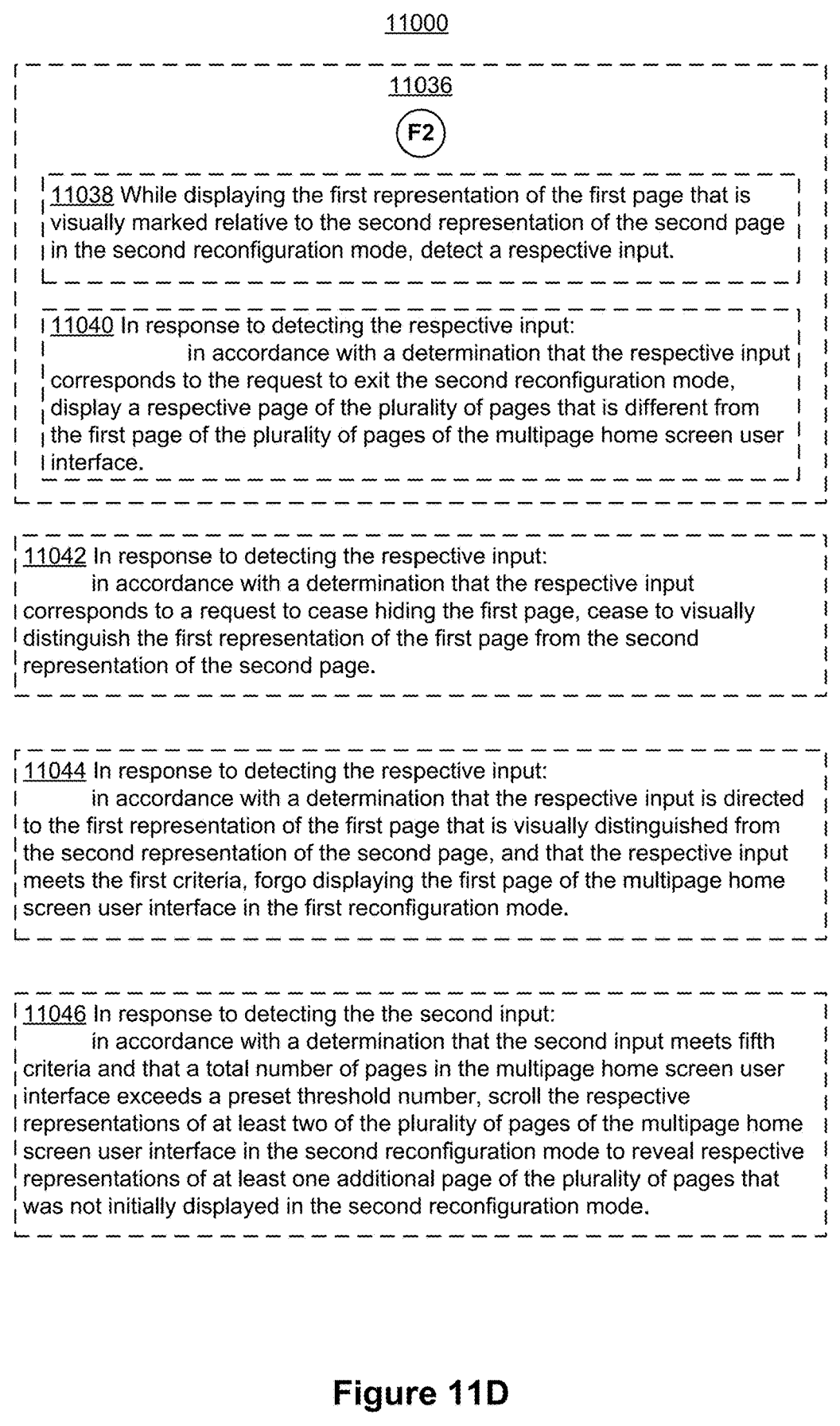

11038 While displaying the first representation of the first page that is visually marked relative to the second representation of the second page in the second reconfiguration mode, detect a respective input.

11040 In response to detecting the respective input:
in accordance with a determination that the respective input corresponds to the request to exit the second reconfiguration mode, display a respective page of the plurality of pages that is different from the first page of the plurality of pages of the multipage home screen user interface.

11042 In response to detecting the respective input:
in accordance with a determination that the respective input corresponds to a request to cease hiding the first page, cease to visually distinguish the first representation of the first page from the second representation of the second page.

11044 In response to detecting the respective input:
in accordance with a determination that the respective input is directed to the first representation of the first page that is visually distinguished from the second representation of the second page, and that the respective input meets the first criteria, forgo displaying the first page of the multipage home screen user interface in the first reconfiguration mode.

11046 In response to detecting the the second input:
in accordance with a determination that the second input meets fifth criteria and that a total number of pages in the multipage home screen user interface exceeds a preset threshold number, scroll the respective representations of at least two of the plurality of pages of the multipage home screen user interface in the second reconfiguration mode to reveal respective representations of at least one additional page of the plurality of pages that was not initially displayed in the second reconfiguration mode.

Figure 12A:
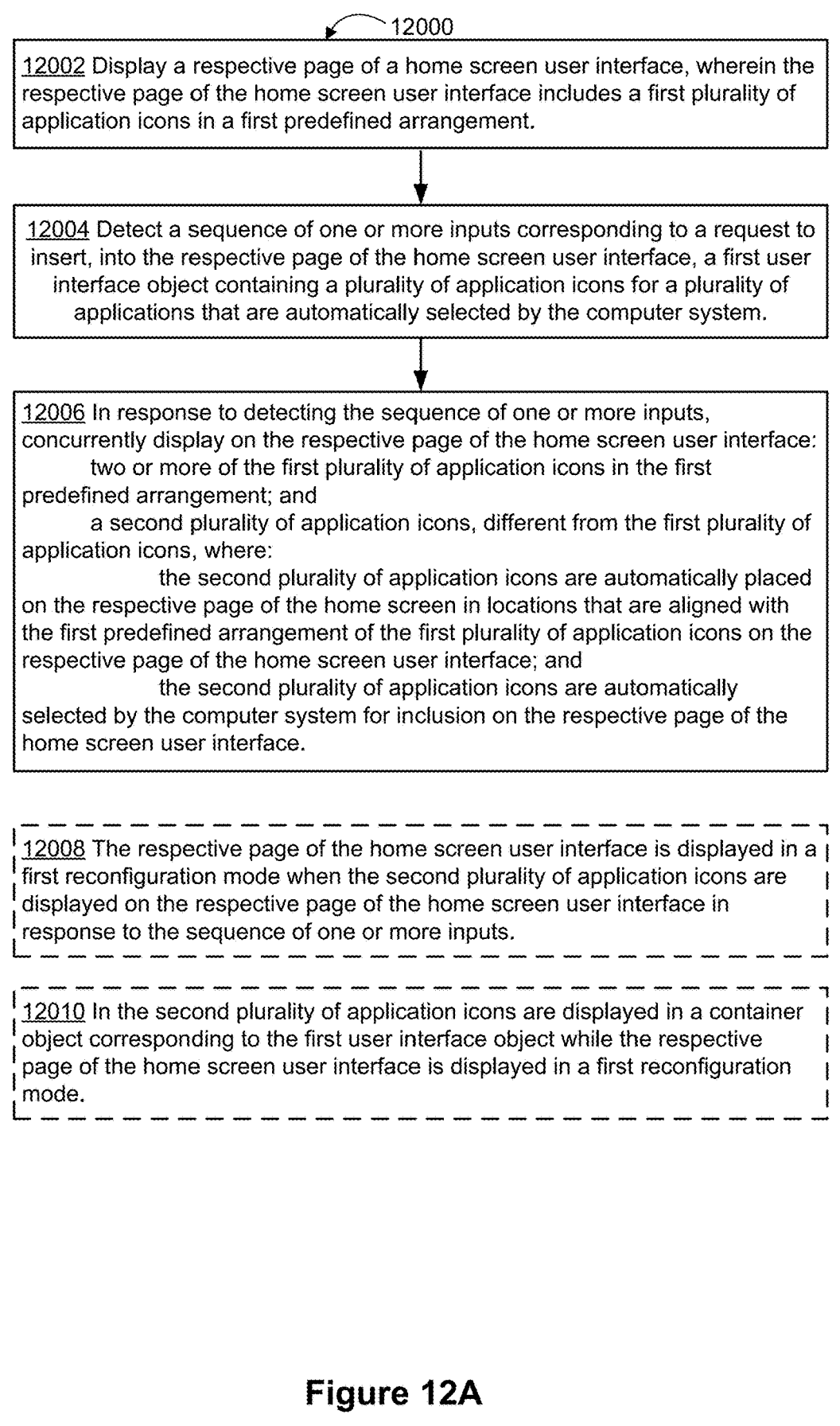

12002 Display a respective page of a home screen user interface, wherein the respective page of the home screen user interface includes a first plurality of application icons in a first predefined arrangement.

↓

12004 Detect a sequence of one or more inputs corresponding to a request to insert, into the respective page of the home screen user interface, a first user interface object containing a plurality of application icons for a plurality of applications that are automatically selected by the computer system.

↓

12006 In response to detecting the sequence of one or more inputs, concurrently display on the respective page of the home screen user interface:

two or more of the first plurality of application icons in the first predefined arrangement; and a second plurality of application icons, different from the first plurality of application icons, where:

the second plurality of application icons are automatically placed on the respective page of the home screen in locations that are aligned with the first predefined arrangement of the first plurality of application icons on the respective page of the home screen user interface; and the second plurality of application icons are automatically selected by the computer system for inclusion on the respective page of the home screen user interface.

12008 The respective page of the home screen user interface is displayed in a first reconfiguration mode when the second plurality of application icons are displayed on the respective page of the home screen user interface in response to the sequence of one or more inputs.

12010 In the second plurality of application icons are displayed in a container object corresponding to the first user interface object while the respective page of the home screen user interface is displayed in a first reconfiguration mode.

Figure 12B:
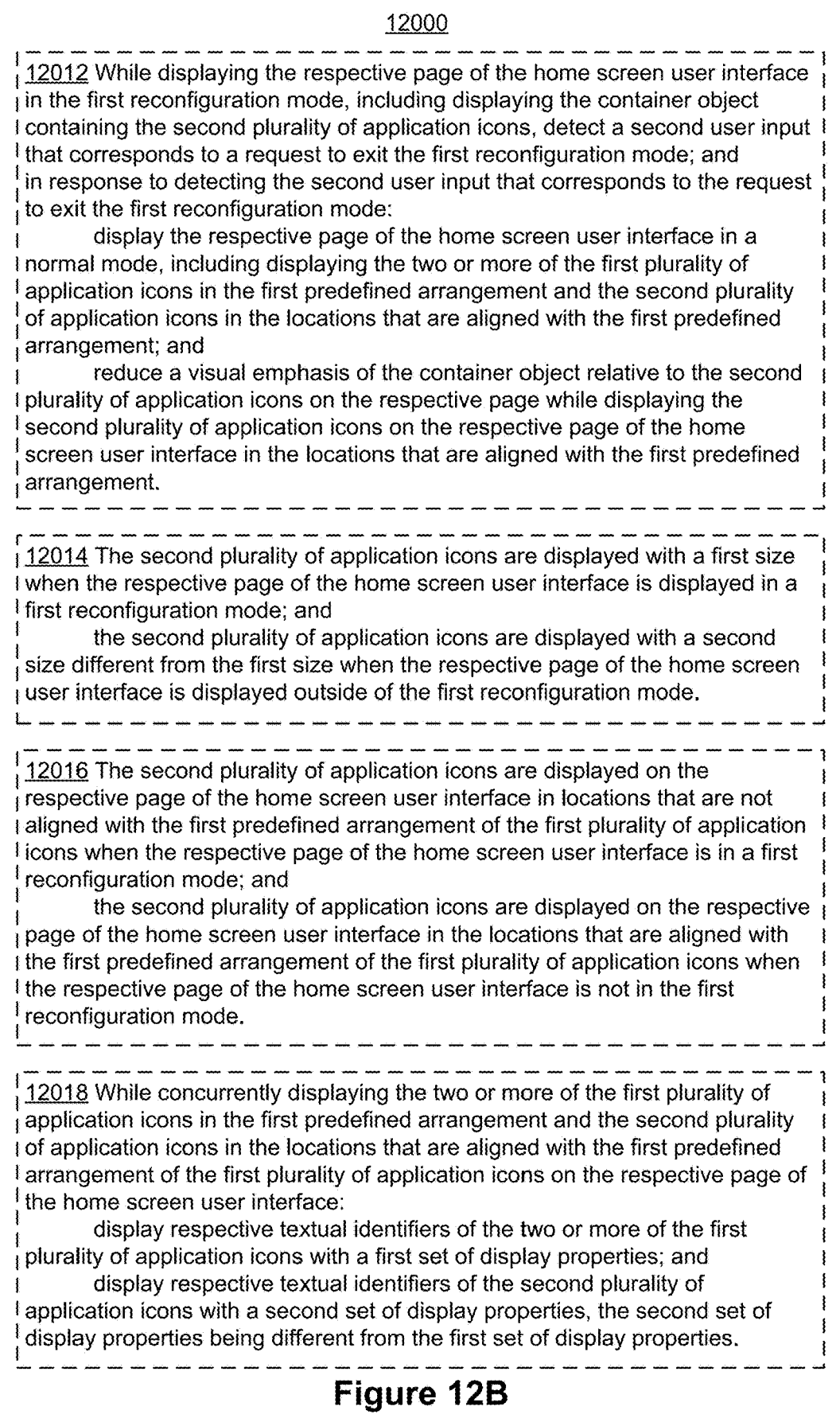

12012 While displaying the respective page of the home screen user interface in the first reconfiguration mode, including displaying the container object containing the second plurality of application icons, detect a second user input that corresponds to a request to exit the first reconfiguration mode; and in response to detecting the second user input that corresponds to the request to exit the first reconfiguration mode:

display the respective page of the home screen user interface in a normal mode, including displaying the two or more of the first plurality of application icons in the first predefined arrangement and the second plurality of application icons in the locations that are aligned with the first predefined arrangement; and reduce a visual emphasis of the container object relative to the second plurality of application icons on the respective page while displaying the second plurality of application icons on the respective page of the home screen user interface in the locations that are aligned with the first predefined arrangement.

12014 The second plurality of application icons are displayed with a first size when the respective page of the home screen user interface is displayed in a first reconfiguration mode; and the second plurality of application icons are displayed with a second size different from the first size when the respective page of the home screen user interface is displayed outside of the first reconfiguration mode.

12016 The second plurality of application icons are displayed on the respective page of the home screen user interface in locations that are not aligned with the first predefined arrangement of the first plurality of application icons when the respective page of the home screen user interface is in a first reconfiguration mode; and the second plurality of application icons are displayed on the respective page of the home screen user interface in the locations that are aligned with the first predefined arrangement of the first plurality of application icons when the respective page of the home screen user interface is not in the first reconfiguration mode.

12018 While concurrently displaying the two or more of the first plurality of application icons in the first predefined arrangement and the second plurality of application icons in the locations that are aligned with the first predefined arrangement of the first plurality of application icons on the respective page of the home screen user interface:

display respective textual identifiers of the two or more of the first plurality of application icons with a first set of display properties; and display respective textual identifiers of the second plurality of application icons with a second set of display properties, the second set of display properties being different from the first set of display properties.

Figure 12C:
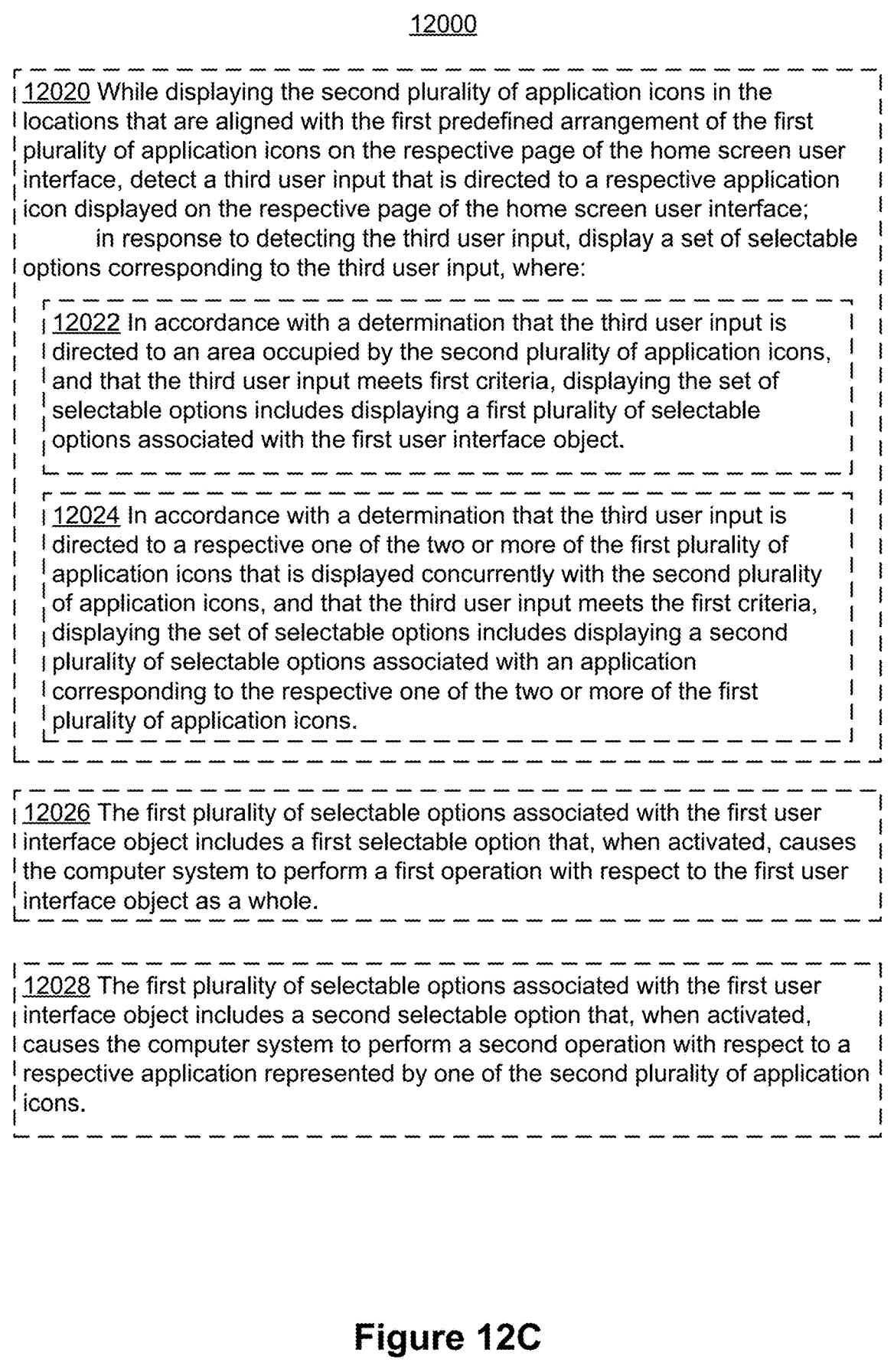

12020 While displaying the second plurality of application icons in the locations that are aligned with the first predefined arrangement of the first plurality of application icons on the respective page of the home screen user interface, detect a third user input that is directed to a respective application icon displayed on the respective page of the home screen user interface;

in response to detecting the third user input, display a set of selectable options corresponding to the third user input, where:

12022 In accordance with a determination that the third user input is directed to an area occupied by the second plurality of application icons, and that the third user input meets first criteria, displaying the set of selectable options includes displaying a first plurality of selectable options associated with the first user interface object.

12024 In accordance with a determination that the third user input is directed to a respective one of the two or more of the first plurality of application icons that is displayed concurrently with the second plurality of application icons, and that the third user input meets the first criteria, displaying the set of selectable options includes displaying a second plurality of selectable options associated with an application corresponding to the respective one of the two or more of the first plurality of application icons.

12026 The first plurality of selectable options associated with the first user interface object includes a first selectable option that, when activated, causes the computer system to perform a first operation with respect to the first user interface object as a whole.

12028 The first plurality of selectable options associated with the first user interface object includes a second selectable option that, when activated, causes the computer system to perform a second operation with respect to a respective application represented by one of the second plurality of application icons.

Figure 12D:
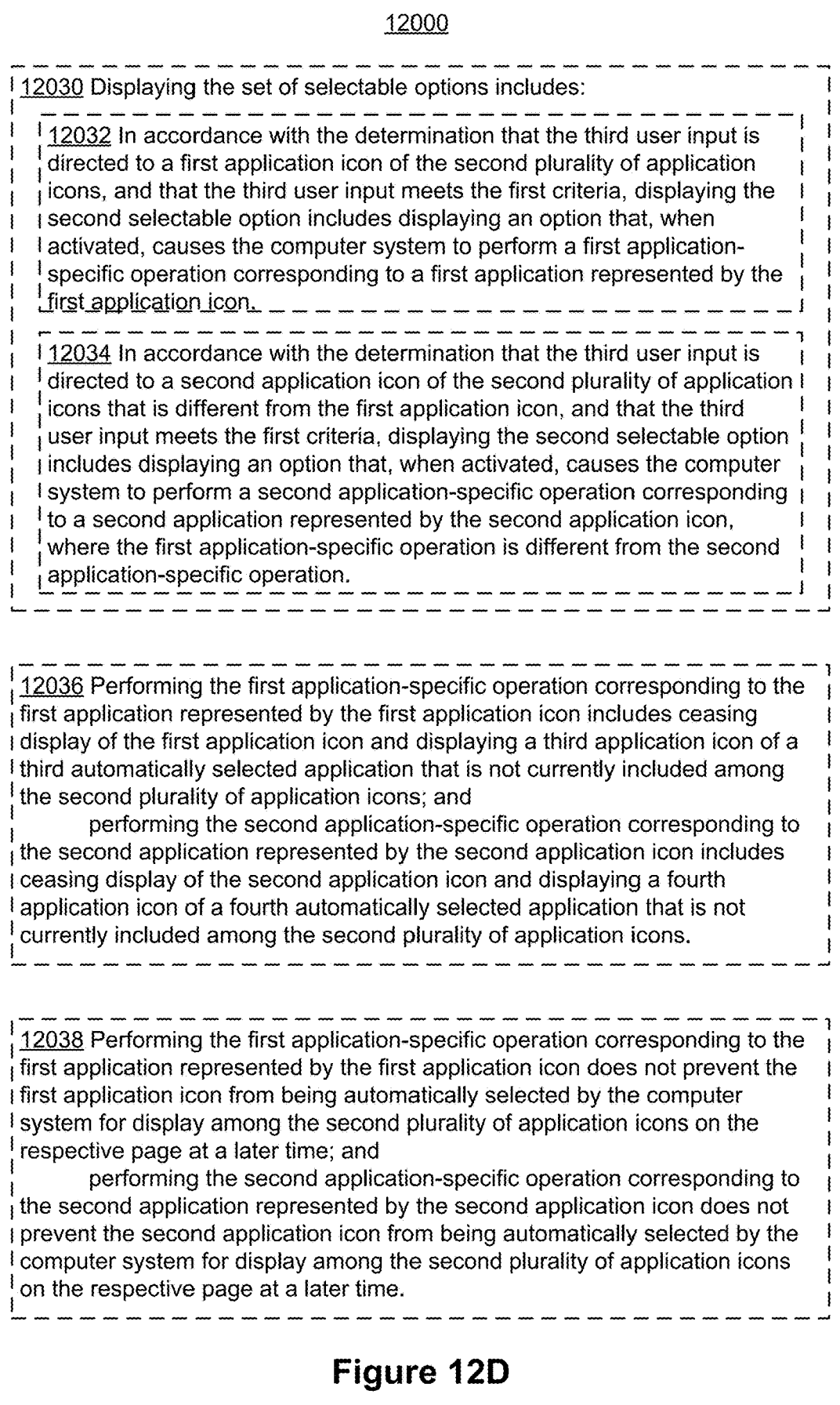

12030 Displaying the set of selectable options includes:

12032 In accordance with the determination that the third user input is directed to a first application icon of the second plurality of application icons, and that the third user input meets the first criteria, displaying the second selectable option includes displaying an option that, when activated, causes the computer system to perform a first application-specific operation corresponding to a first application represented by the first application icon.

12034 In accordance with the determination that the third user input is directed to a second application icon of the second plurality of application icons that is different from the first application icon, and that the third user input meets the first criteria, displaying the second selectable option includes displaying an option that, when activated, causes the computer system to perform a second application-specific operation corresponding to a second application represented by the second application icon, where the first application-specific operation is different from the second application-specific operation.

12036 Performing the first application-specific operation corresponding to the first application represented by the first application icon includes ceasing display of the first application icon and displaying a third application icon of a third automatically selected application that is not currently included among the second plurality of application icons; and performing the second application-specific operation corresponding to the second application represented by the second application icon includes ceasing display of the second application icon and displaying a fourth application icon of a fourth automatically selected application that is not currently included among the second plurality of application icons.

12038 Performing the first application-specific operation corresponding to the first application represented by the first application icon does not prevent the first application icon from being automatically selected by the computer system for display among the second plurality of application icons on the respective page at a later time; and performing the second application-specific operation corresponding to the second application represented by the second application icon does not prevent the second application icon from being automatically selected by the computer system for display among the second plurality of application icons on the respective page at a later time.

Figure 12E:
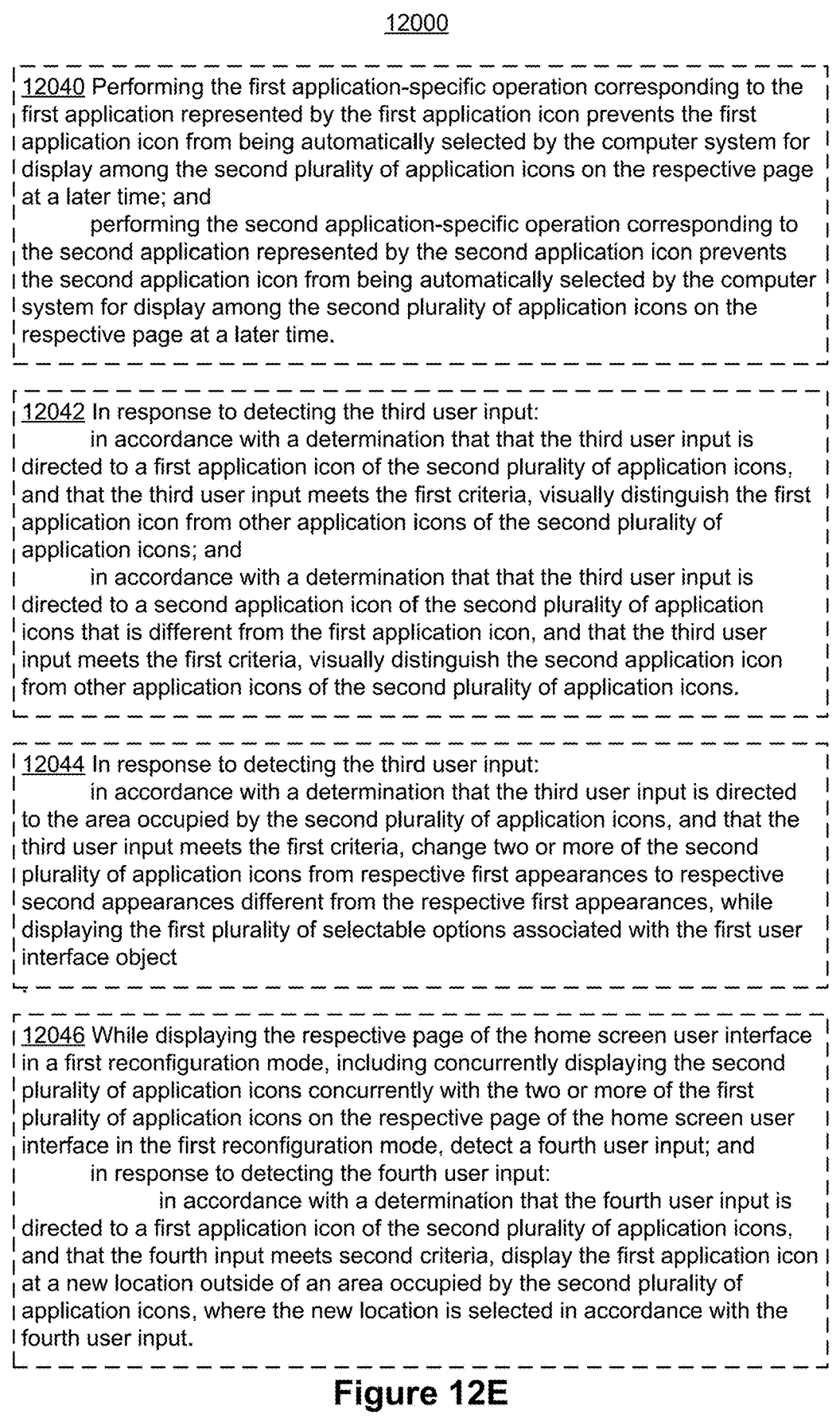

12040 Performing the first application-specific operation corresponding to the first application represented by the first application icon prevents the first application icon from being automatically selected by the computer system for display among the second plurality of application icons on the respective page at a later time; and performing the second application-specific operation corresponding to the second application represented by the second application icon prevents the second application icon from being automatically selected by the computer system for display among the second plurality of application icons on the respective page at a later time.

12042 In response to detecting the third user input:

in accordance with a determination that that the third user input is directed to a first application icon of the second plurality of application icons, and that the third user input meets the first criteria, visually distinguish the first application icon from other application icons of the second plurality of application icons; and in accordance with a determination that that the third user input is directed to a second application icon of the second plurality of application icons that is different from the first application icon, and that the third user input meets the first criteria, visually distinguish the second application icon from other application icons of the second plurality of application icons.

12044 In response to detecting the third user input:

in accordance with a determination that the third user input is directed to the area occupied by the second plurality of application icons, and that the third user input meets the first criteria, change two or more of the second plurality of application icons from respective first appearances to respective second appearances different from the respective first appearances, while displaying the first plurality of selectable options associated with the first user interface object 12046 While displaying the respective page of the home screen user interface in a first reconfiguration mode, including concurrently displaying the second plurality of application icons concurrently with the two or more of the first plurality of application icons on the respective page of the home screen user interface in the first reconfiguration mode, detect a fourth user input; and in response to detecting the fourth user input:

in accordance with a determination that the fourth user input is directed to a first application icon of the second plurality of application icons, and that the fourth input meets second criteria, display the first application icon at a new location outside of an area occupied by the second plurality of application icons, where the new location is selected in accordance with the fourth user input.

Figure 12F:
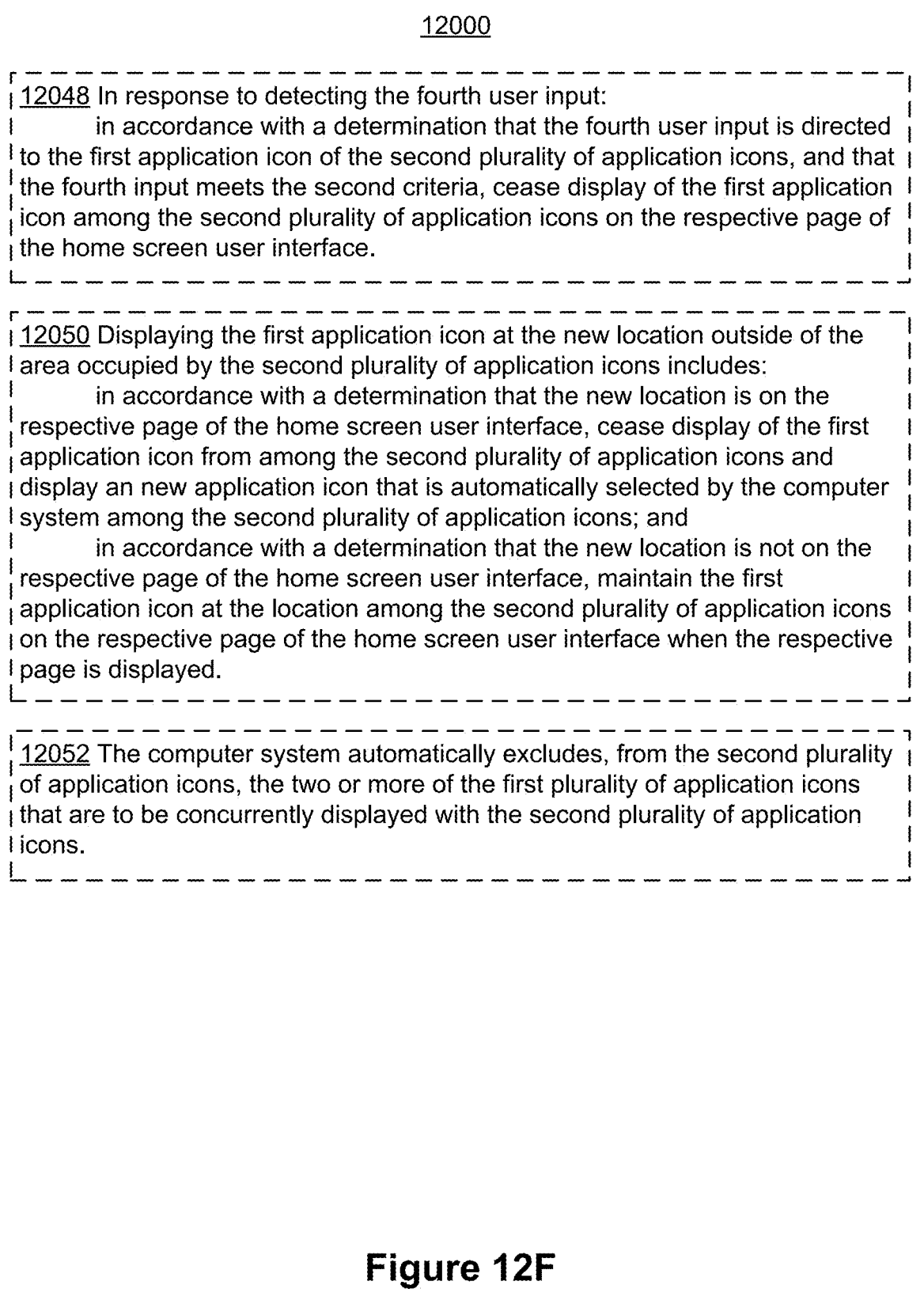

12048 In response to detecting the fourth user input:

in accordance with a determination that the fourth user input is directed to the first application icon of the second plurality of application icons, and that the fourth input meets the second criteria, cease display of the first application icon among the second plurality of application icons on the respective page of the home screen user interface.

12050 Displaying the first application icon at the new location outside of the area occupied by the second plurality of application icons includes:

in accordance with a determination that the new location is on the respective page of the home screen user interface, cease display of the first application icon from among the second plurality of application icons and display an new application icon that is automatically selected by the computer system among the second plurality of application icons; and in accordance with a determination that the new location is not on the respective page of the home screen user interface, maintain the first application icon at the location among the second plurality of application icons on the respective page of the home screen user interface when the respective page is displayed.

12052 The computer system automatically excludes, from the second plurality of application icons, the two or more of the first plurality of application icons that are to be concurrently displayed with the second plurality of application icons.

Figure 13A:
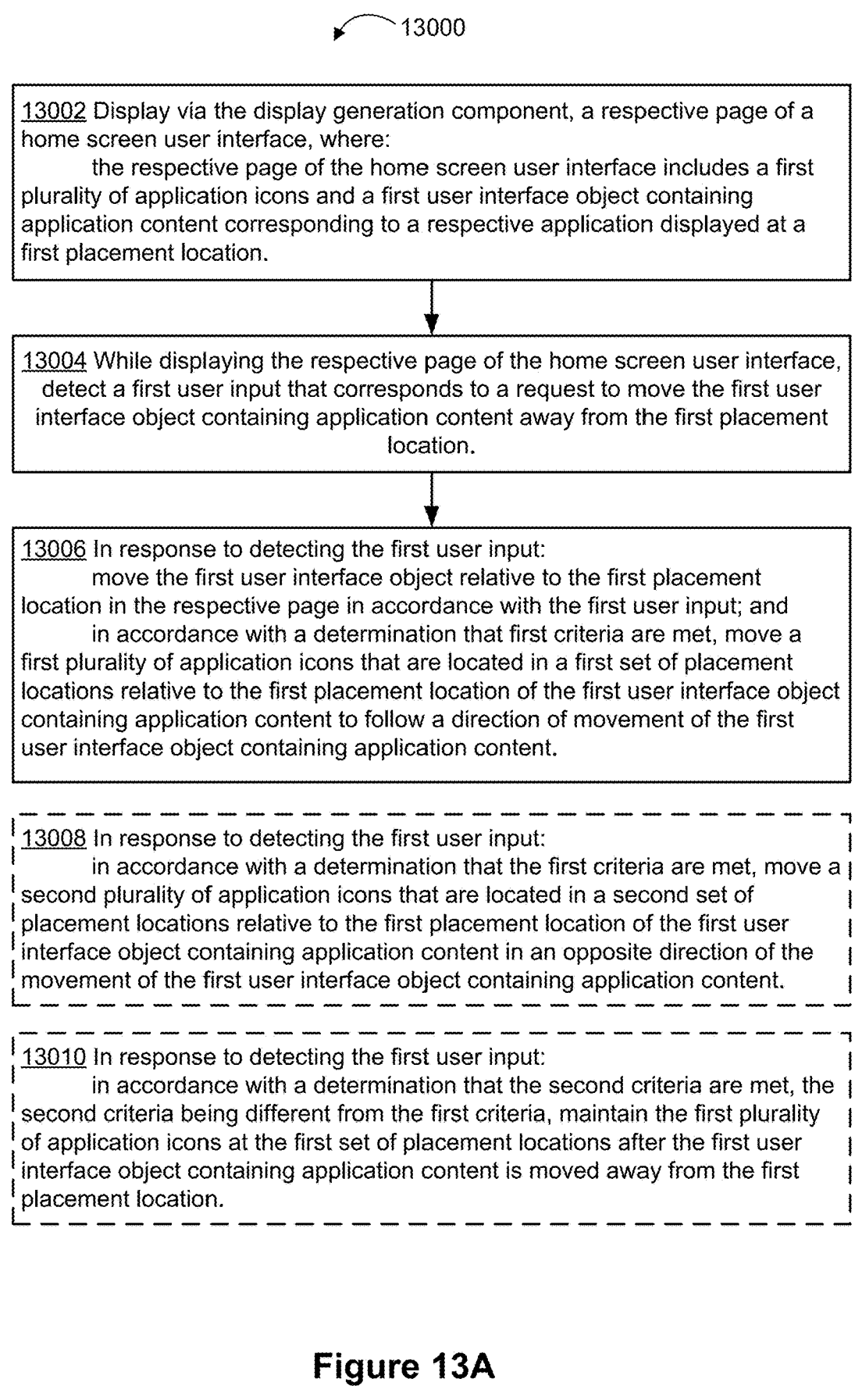

13002 Display via the display generation component, a respective page of a home screen user interface, where:
the respective page of the home screen user interface includes a first plurality of application icons and a first user interface object containing application content corresponding to a respective application displayed at a first placement location.

13004 While displaying the respective page of the home screen user interface, detect a first user input that corresponds to a request to move the first user interface object containing application content away from the first placement location.

13006 In response to detecting the first user input:
move the first user interface object relative to the first placement location in the respective page in accordance with the first user input; and
in accordance with a determination that first criteria are met, move a first plurality of application icons that are located in a first set of placement locations relative to the first placement location of the first user interface object containing application content to follow a direction of movement of the first user interface object containing application content.

13008 In response to detecting the first user input:
in accordance with a determination that the first criteria are met, move a second plurality of application icons that are located in a second set of placement locations relative to the first placement location of the first user interface object containing application content in an opposite direction of the movement of the first user interface object containing application content.

13010 In response to detecting the first user input:
in accordance with a determination that the second criteria are met, the second criteria being different from the first criteria, maintain the first plurality of application icons at the first set of placement locations after the first user interface object containing application content is moved away from the first placement location.

Figure 13B:
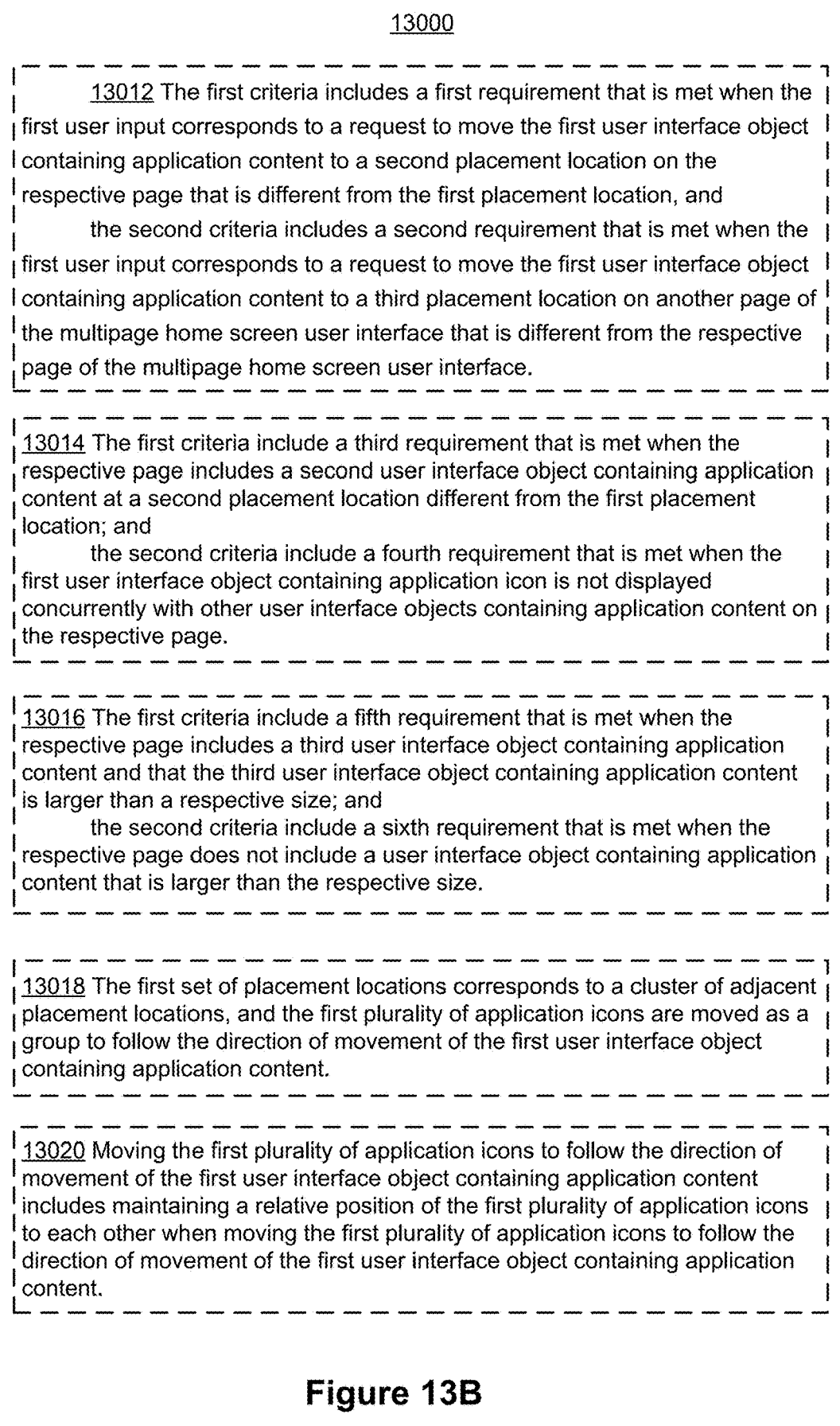

13012 The first criteria includes a first requirement that is met when the first user input corresponds to a request to move the first user interface object containing application content to a second placement location on the respective page that is different from the first placement location, and the second criteria includes a second requirement that is met when the first user input corresponds to a request to move the first user interface object containing application content to a third placement location on another page of the multipage home screen user interface that is different from the respective page of the multipage home screen user interface.

13014 The first criteria include a third requirement that is met when the respective page includes a second user interface object containing application content at a second placement location different from the first placement location; and the second criteria include a fourth requirement that is met when the first user interface object containing application icon is not displayed concurrently with other user interface objects containing application content on the respective page.

13016 The first criteria include a fifth requirement that is met when the respective page includes a third user interface object containing application content and that the third user interface object containing application content is larger than a respective size; and the second criteria include a sixth requirement that is met when the respective page does not include a user interface object containing application content that is larger than the respective size.

13018 The first set of placement locations corresponds to a cluster of adjacent placement locations, and the first plurality of application icons are moved as a group to follow the direction of movement of the first user interface object containing application content.

13020 Moving the first plurality of application icons to follow the direction of movement of the first user interface object containing application content includes maintaining a relative position of the first plurality of application icons to each other when moving the first plurality of application icons to follow the direction of movement of the first user interface object containing application content.

Figure 13C:
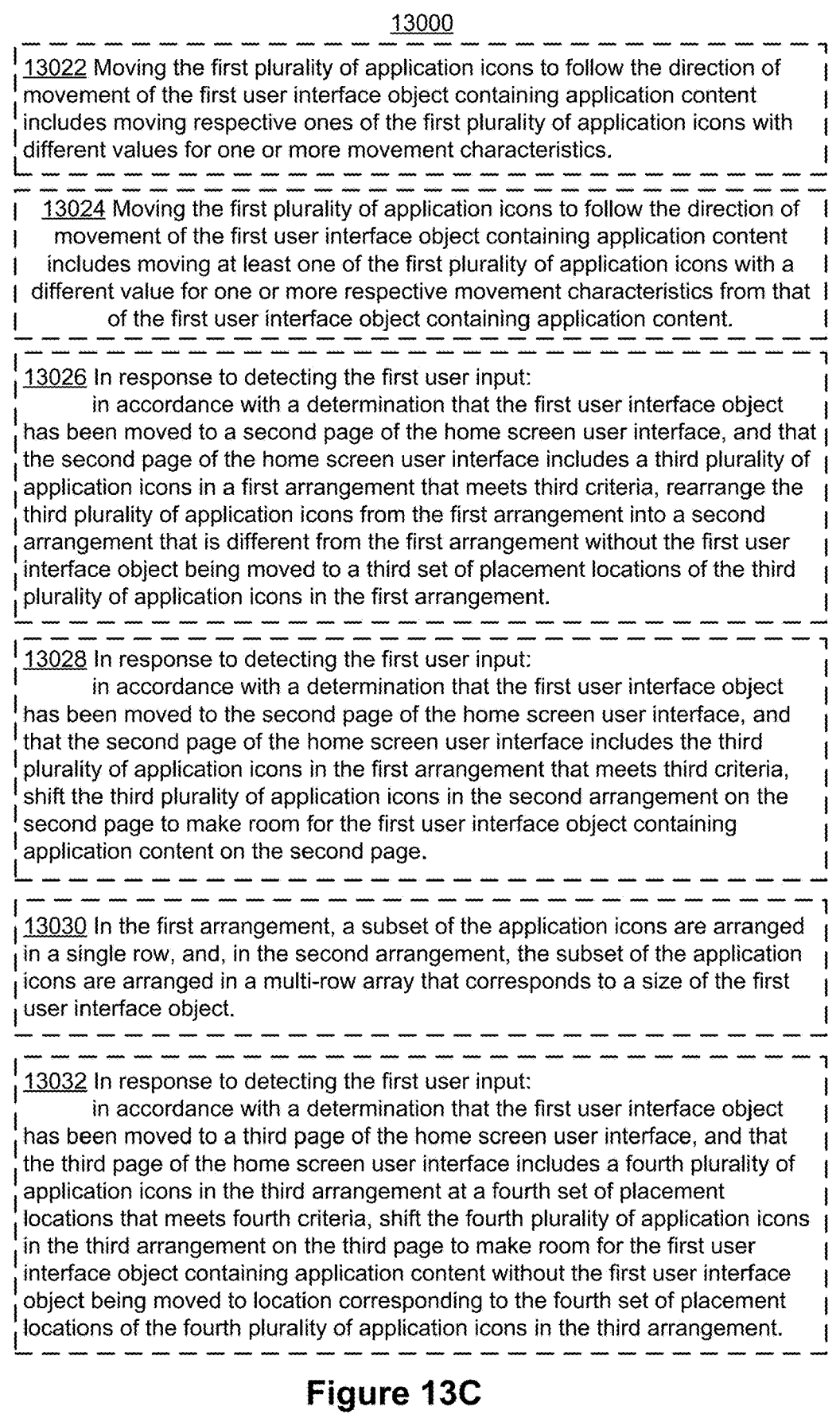

13022 Moving the first plurality of application icons to follow the direction of movement of the first user interface object containing application content includes moving respective ones of the first plurality of application icons with different values for one or more movement characteristics.

13024 Moving the first plurality of application icons to follow the direction of movement of the first user interface object containing application content includes moving at least one of the first plurality of application icons with a different value for one or more respective movement characteristics from that of the first user interface object containing application content.

13026 In response to detecting the first user input:
in accordance with a determination that the first user interface object has been moved to a second page of the home screen user interface, and that the second page of the home screen user interface includes a third plurality of application icons in a first arrangement that meets third criteria, rearrange the third plurality of application icons from the first arrangement into a second arrangement that is different from the first arrangement without the first user interface object being moved to a third set of placement locations of the third plurality of application icons in the first arrangement.

13028 In response to detecting the first user input:
in accordance with a determination that the first user interface object has been moved to the second page of the home screen user interface, and that the second page of the home screen user interface includes the third plurality of application icons in the first arrangement that meets third criteria, shift the third plurality of application icons in the second arrangement on the second page to make room for the first user interface object containing application content on the second page.

13030 In the first arrangement, a subset of the application icons are arranged in a single row, and, in the second arrangement, the subset of the application icons are arranged in a multi-row array that corresponds to a size of the first user interface object.

13032 In response to detecting the first user input:
in accordance with a determination that the first user interface object has been moved to a third page of the home screen user interface, and that the third page of the home screen user interface includes a fourth plurality of application icons in the third arrangement at a fourth set of placement locations that meets fourth criteria, shift the fourth plurality of application icons in the third arrangement on the third page to make room for the first user interface object containing application content without the first user interface object being moved to location corresponding to the fourth set of placement locations of the fourth plurality of application icons in the third arrangement.

Figure 13D:
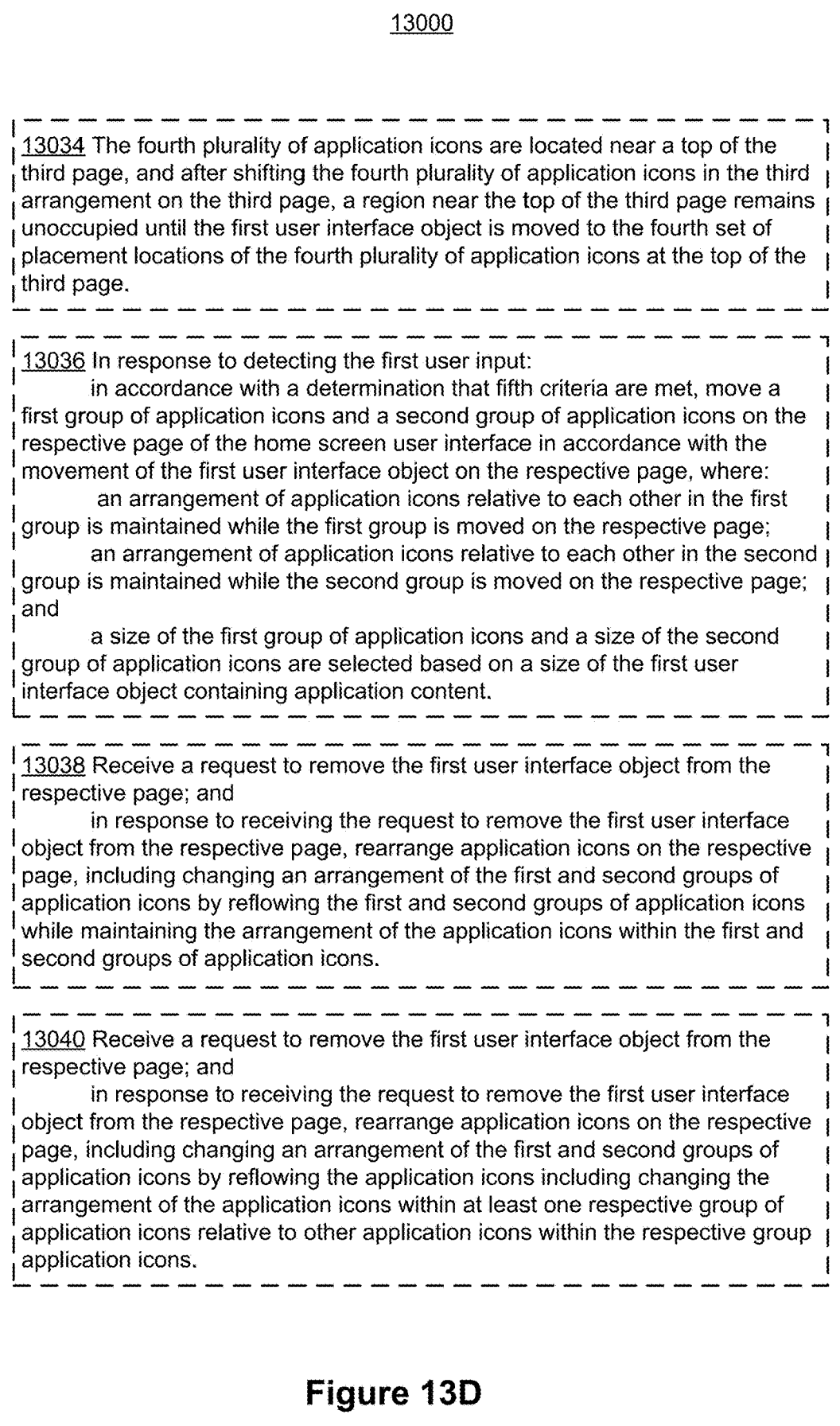

13034 The fourth plurality of application icons are located near a top of the third page, and after shifting the fourth plurality of application icons in the third arrangement on the third page, a region near the top of the third page remains unoccupied until the first user interface object is moved to the fourth set of placement locations of the fourth plurality of application icons at the top of the third page.

13036 In response to detecting the first user input:

in accordance with a determination that fifth criteria are met, move a first group of application icons and a second group of application icons on the respective page of the home screen user interface in accordance with the movement of the first user interface object on the respective page, where:

an arrangement of application icons relative to each other in the first group is maintained while the first group is moved on the respective page;

an arrangement of application icons relative to each other in the second group is maintained while the second group is moved on the respective page; and a size of the first group of application icons and a size of the second group of application icons are selected based on a size of the first user interface object containing application content.

13038 Receive a request to remove the first user interface object from the respective page; and in response to receiving the request to remove the first user interface object from the respective page, rearrange application icons on the respective page, including changing an arrangement of the first and second groups of application icons by reflowing the first and second groups of application icons while maintaining the arrangement of the application icons within the first and second groups of application icons.

13040 Receive a request to remove the first user interface object from the respective page; and in response to receiving the request to remove the first user interface object from the respective page, rearrange application icons on the respective page, including changing an arrangement of the first and second groups of application icons by reflowing the application icons including changing the arrangement of the application icons within at least one respective group of application icons relative to other application icons within the respective group application icons.

Figure 13E:
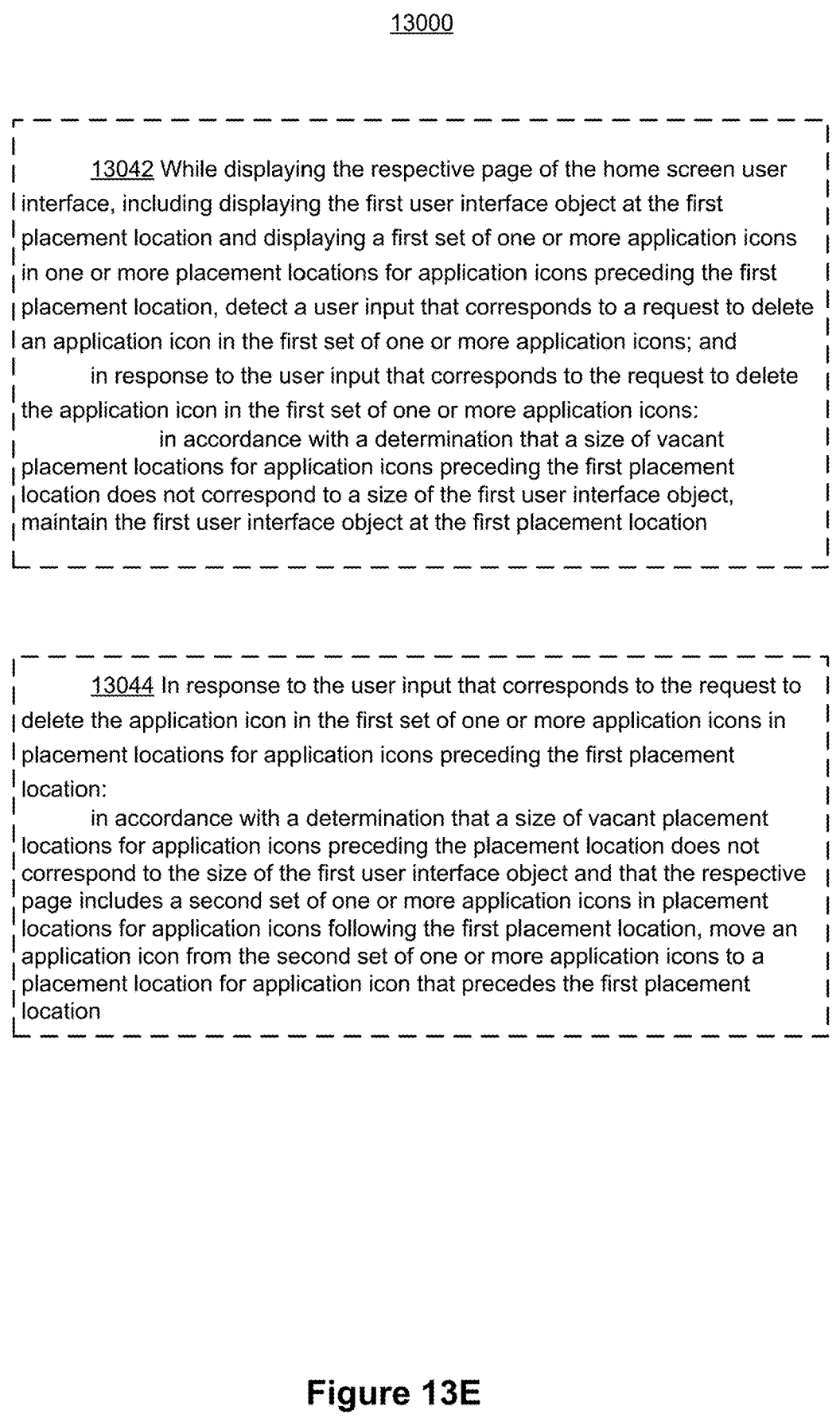

13042 While displaying the respective page of the home screen user interface, including displaying the first user interface object at the first placement location and displaying a first set of one or more application icons in one or more placement locations for application icons preceding the first placement location, detect a user input that corresponds to a request to delete an application icon in the first set of one or more application icons; and in response to the user input that corresponds to the request to delete the application icon in the first set of one or more application icons:

in accordance with a determination that a size of vacant placement locations for application icons preceding the first placement location does not correspond to a size of the first user interface object, maintain the first user interface object at the first placement location 13044 In response to the user input that corresponds to the request to delete the application icon in the first set of one or more application icons in placement locations for application icons preceding the first placement location:

in accordance with a determination that a size of vacant placement locations for application icons preceding the placement location does not correspond to the size of the first user interface object and that the respective page includes a second set of one or more application icons in placement locations for application icons following the first placement location, move an application icon from the second set of one or more application icons to a placement location for application icon that precedes the first placement location

Figure 13F:
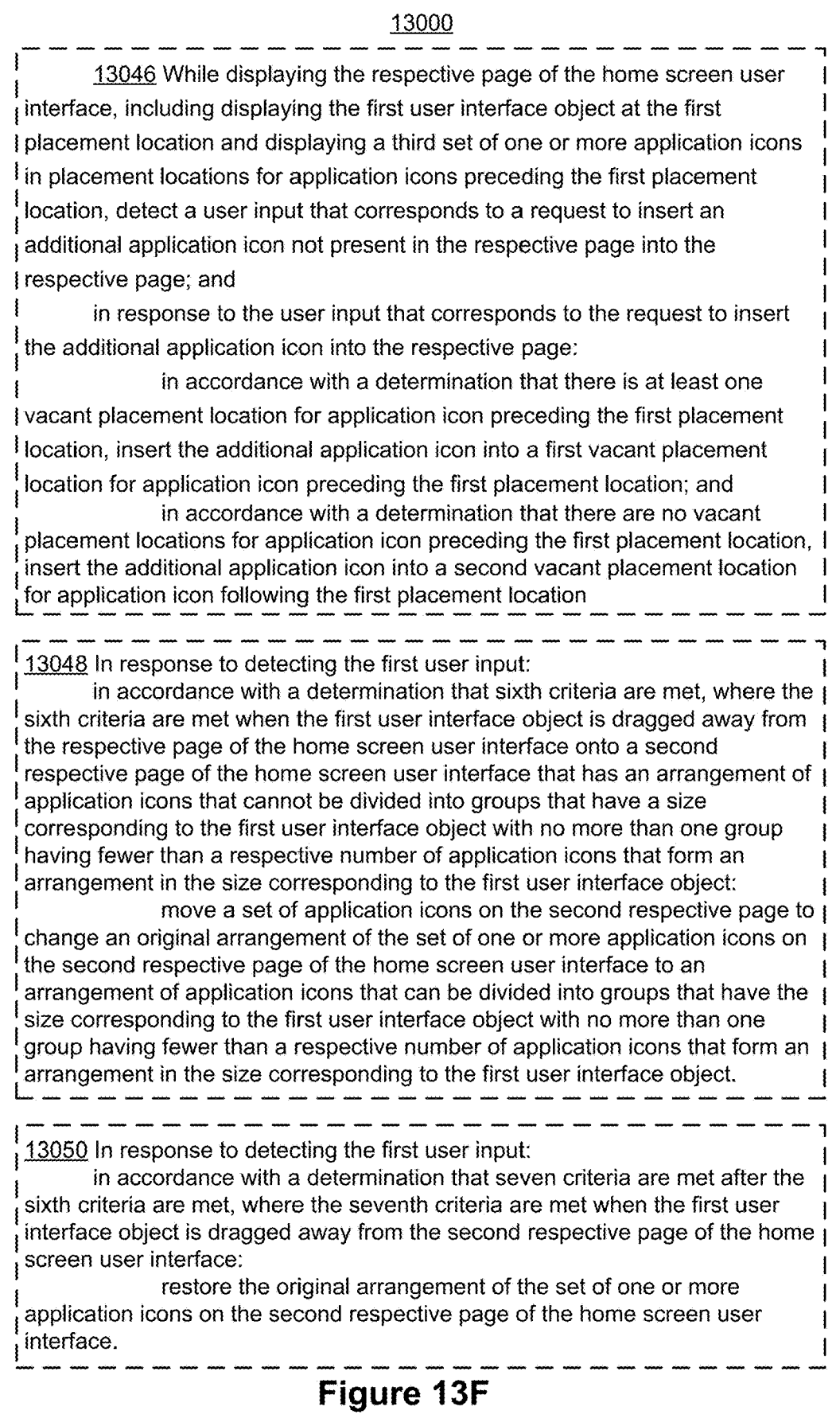

13046 While displaying the respective page of the home screen user interface, including displaying the first user interface object at the first placement location and displaying a third set of one or more application icons in placement locations for application icons preceding the first placement location, detect a user input that corresponds to a request to insert an additional application icon not present in the respective page into the respective page; and in response to the user input that corresponds to the request to insert the additional application icon into the respective page:

in accordance with a determination that there is at least one vacant placement location for application icon preceding the first placement location, insert the additional application icon into a first vacant placement location for application icon preceding the first placement location; and in accordance with a determination that there are no vacant placement locations for application icon preceding the first placement location, insert the additional application icon into a second vacant placement location for application icon following the first placement location 13048 In response to detecting the first user input:

in accordance with a determination that sixth criteria are met, where the sixth criteria are met when the first user interface object is dragged away from the respective page of the home screen user interface onto a second respective page of the home screen user interface that has an arrangement of application icons that cannot be divided into groups that have a size corresponding to the first user interface object with no more than one group having fewer than a respective number of application icons that form an arrangement in the size corresponding to the first user interface object:

move a set of application icons on the second respective page to change an original arrangement of the set of one or more application icons on the second respective page of the home screen user interface to an arrangement of application icons that can be divided into groups that have the size corresponding to the first user interface object with no more than one group having fewer than a respective number of application icons that form an arrangement in the size corresponding to the first user interface object.

13050 In response to detecting the first user input:

in accordance with a determination that seven criteria are met after the sixth criteria are met, where the seventh criteria are met when the first user interface object is dragged away from the second respective page of the home screen user interface:

restore the original arrangement of the set of one or more application icons on the second respective page of the home screen user interface.

Figure 13G:
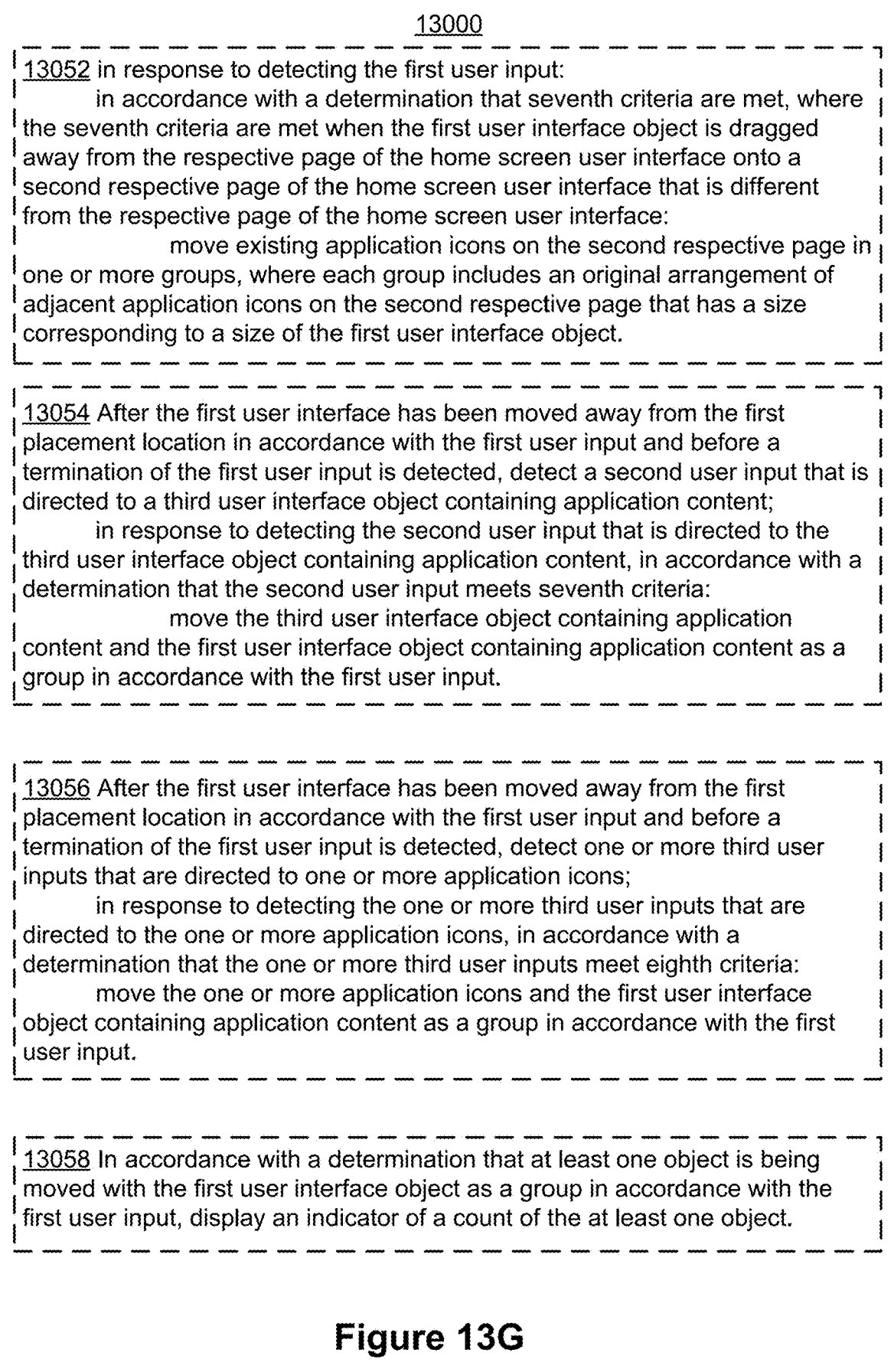

13052 in response to detecting the first user input:

in accordance with a determination that seventh criteria are met, where the seventh criteria are met when the first user interface object is dragged away from the respective page of the home screen user interface onto a second respective page of the home screen user interface that is different from the respective page of the home screen user interface:

move existing application icons on the second respective page in one or more groups, where each group includes an original arrangement of adjacent application icons on the second respective page that has a size corresponding to a size of the first user interface object.

13054 After the first user interface has been moved away from the first placement location in accordance with the first user input and before a termination of the first user input is detected, detect a second user input that is directed to a third user interface object containing application content;

in response to detecting the second user input that is directed to the third user interface object containing application content, in accordance with a determination that the second user input meets seventh criteria:

move the third user interface object containing application content and the first user interface object containing application content as a group in accordance with the first user input.

13056 After the first user interface has been moved away from the first placement location in accordance with the first user input and before a termination of the first user input is detected, detect one or more third user inputs that are directed to one or more application icons;

in response to detecting the one or more third user inputs that are directed to the one or more application icons, in accordance with a determination that the one or more third user inputs meet eighth criteria:

move the one or more application icons and the first user interface object containing application content as a group in accordance with the first user input.

13058 In accordance with a determination that at least one object is being moved with the first user interface object as a group in accordance with the first user input, display an indicator of a count of the at least one object.

Figure 13H:
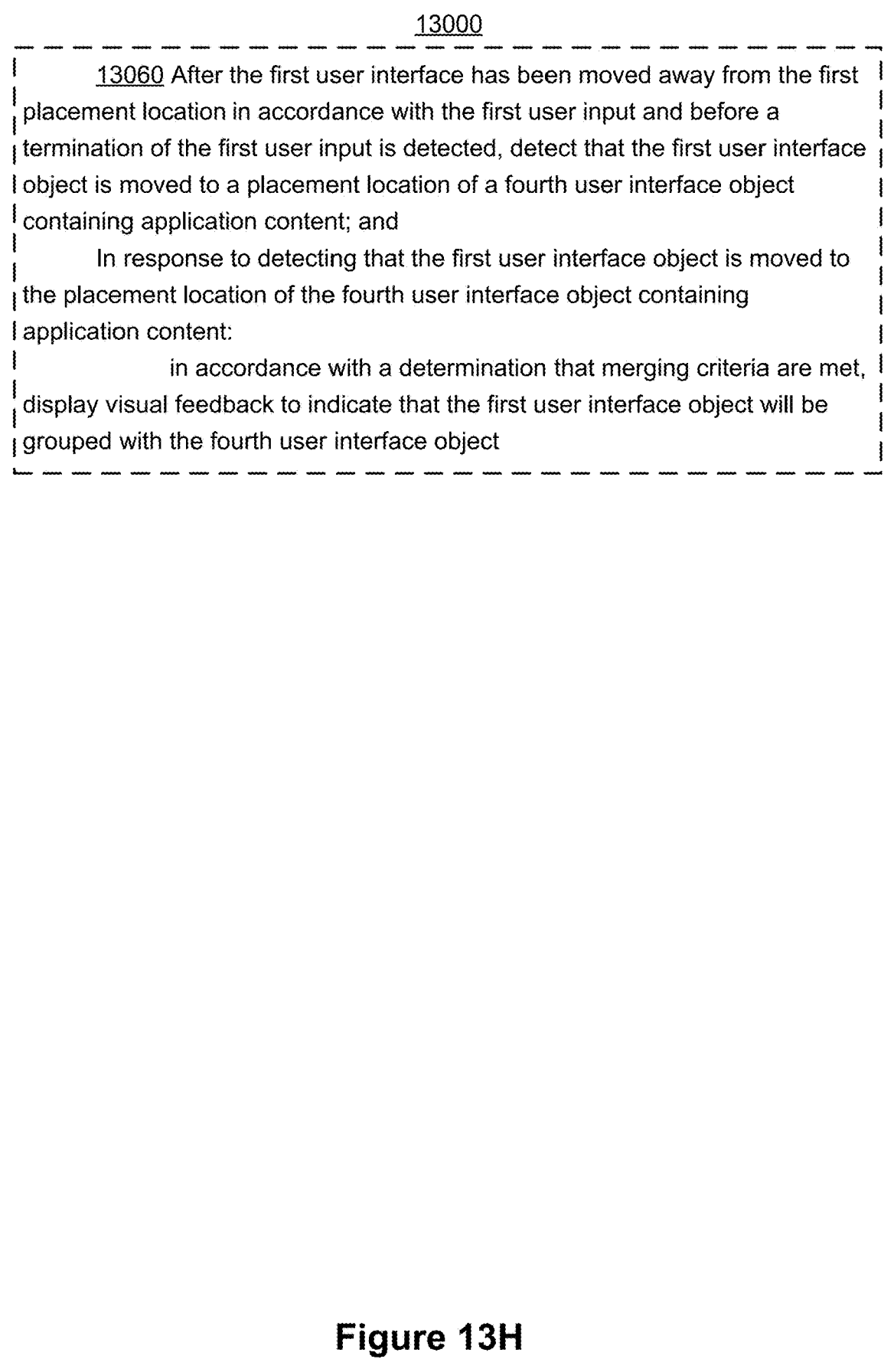

13060 After the first user interface has been moved away from the first placement location in accordance with the first user input and before a termination of the first user input is detected, detect that the first user interface object is moved to a placement location of a fourth user interface object containing application content; and In response to detecting that the first user interface object is moved to the placement location of the fourth user interface object containing application content:

in accordance with a determination that merging criteria are met, display visual feedback to indicate that the first user interface object will be grouped with the fourth user interface object

Figure 14A:
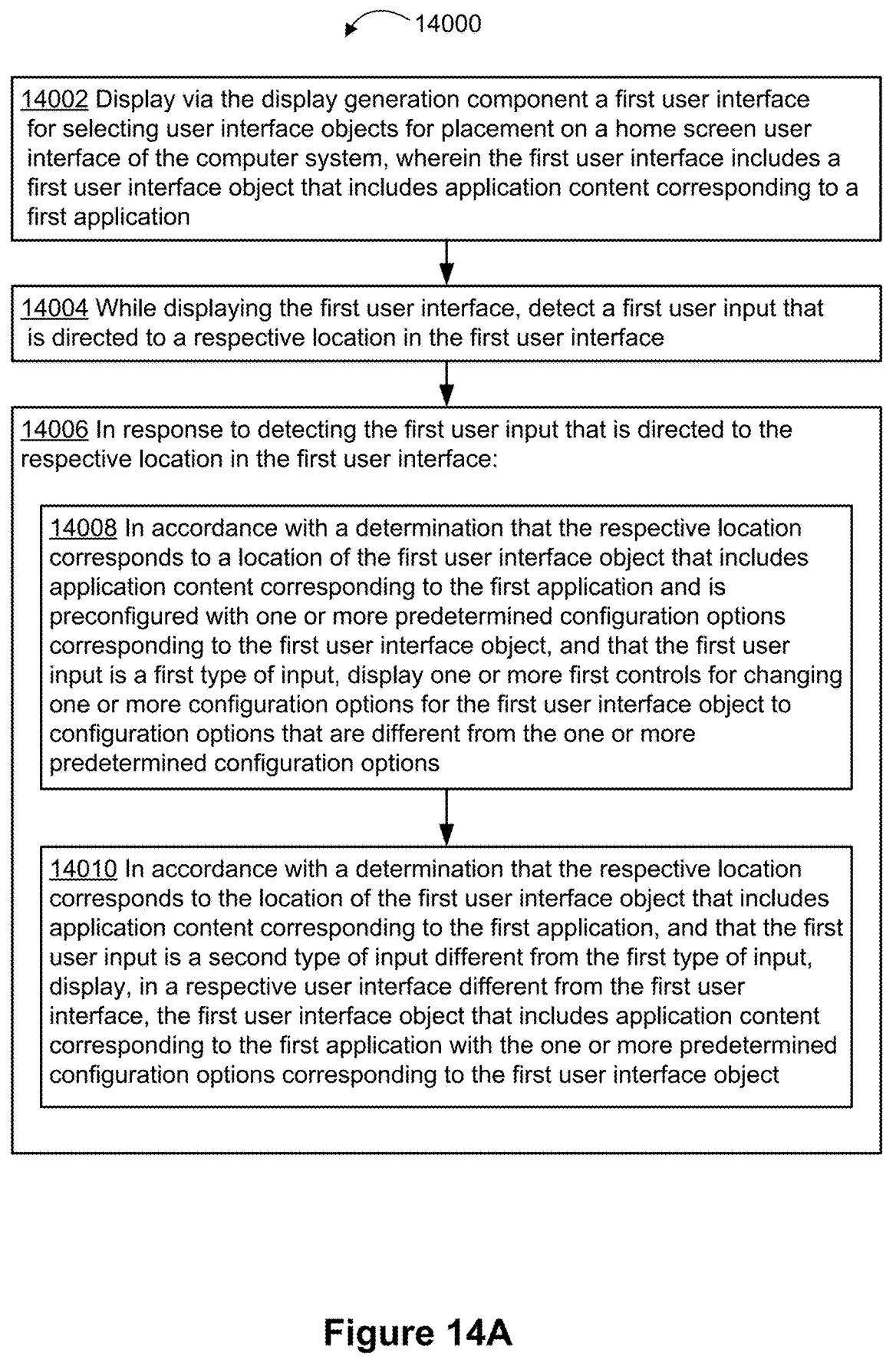

14002 Display via the display generation component a first user interface for selecting user interface objects for placement on a home screen user interface of the computer system, wherein the first user interface includes a first user interface object that includes application content corresponding to a first application

↓

14004 While displaying the first user interface, detect a first user input that is directed to a respective location in the first user interface

↓

14006 In response to detecting the first user input that is directed to the respective location in the first user interface:

14008 In accordance with a determination that the respective location corresponds to a location of the first user interface object that includes application content corresponding to the first application and is preconfigured with one or more predetermined configuration options corresponding to the first user interface object, and that the first user input is a first type of input, display one or more first controls for changing one or more configuration options for the first user interface object to configuration options that are different from the one or more predetermined configuration options

↓

14010 In accordance with a determination that the respective location corresponds to the location of the first user interface object that includes application content corresponding to the first application, and that the first user input is a second type of input different from the first type of input, display, in a respective user interface different from the first user interface, the first user interface object that includes application content corresponding to the first application with the one or more predetermined configuration options corresponding to the first user interface object

Figure 14B:
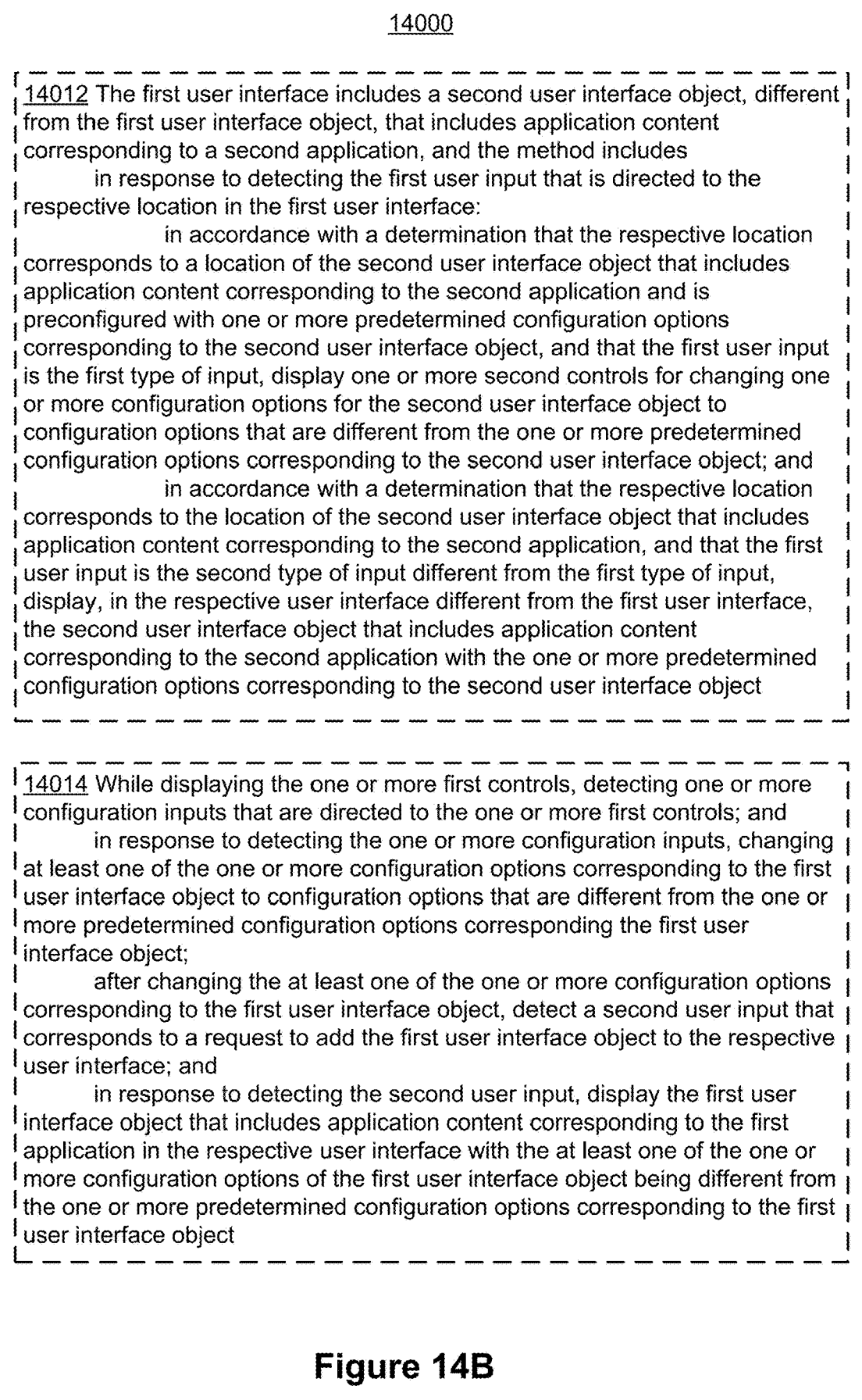

14012 The first user interface includes a second user interface object, different from the first user interface object, that includes application content corresponding to a second application, and the method includes in response to detecting the first user input that is directed to the respective location in the first user interface:

in accordance with a determination that the respective location corresponds to a location of the second user interface object that includes application content corresponding to the second application and is preconfigured with one or more predetermined configuration options corresponding to the second user interface object, and that the first user input is the first type of input, display one or more second controls for changing one or more configuration options for the second user interface object to configuration options that are different from the one or more predetermined configuration options corresponding to the second user interface object; and in accordance with a determination that the respective location corresponds to the location of the second user interface object that includes application content corresponding to the second application, and that the first user input is the second type of input different from the first type of input, display, in the respective user interface different from the first user interface, the second user interface object that includes application content corresponding to the second application with the one or more predetermined configuration options corresponding to the second user interface object 14014 While displaying the one or more first controls, detecting one or more configuration inputs that are directed to the one or more first controls; and in response to detecting the one or more configuration inputs, changing at least one of the one or more configuration options corresponding to the first user interface object to configuration options that are different from the one or more predetermined configuration options corresponding the first user interface object;

after changing the at least one of the one or more configuration options corresponding to the first user interface object, detect a second user input that corresponds to a request to add the first user interface object to the respective user interface; and in response to detecting the second user input, display the first user interface object that includes application content corresponding to the first application in the respective user interface with the at least one of the one or more configuration options of the first user interface object being different from the one or more predetermined configuration options corresponding to the first user interface object

Figure 14C:
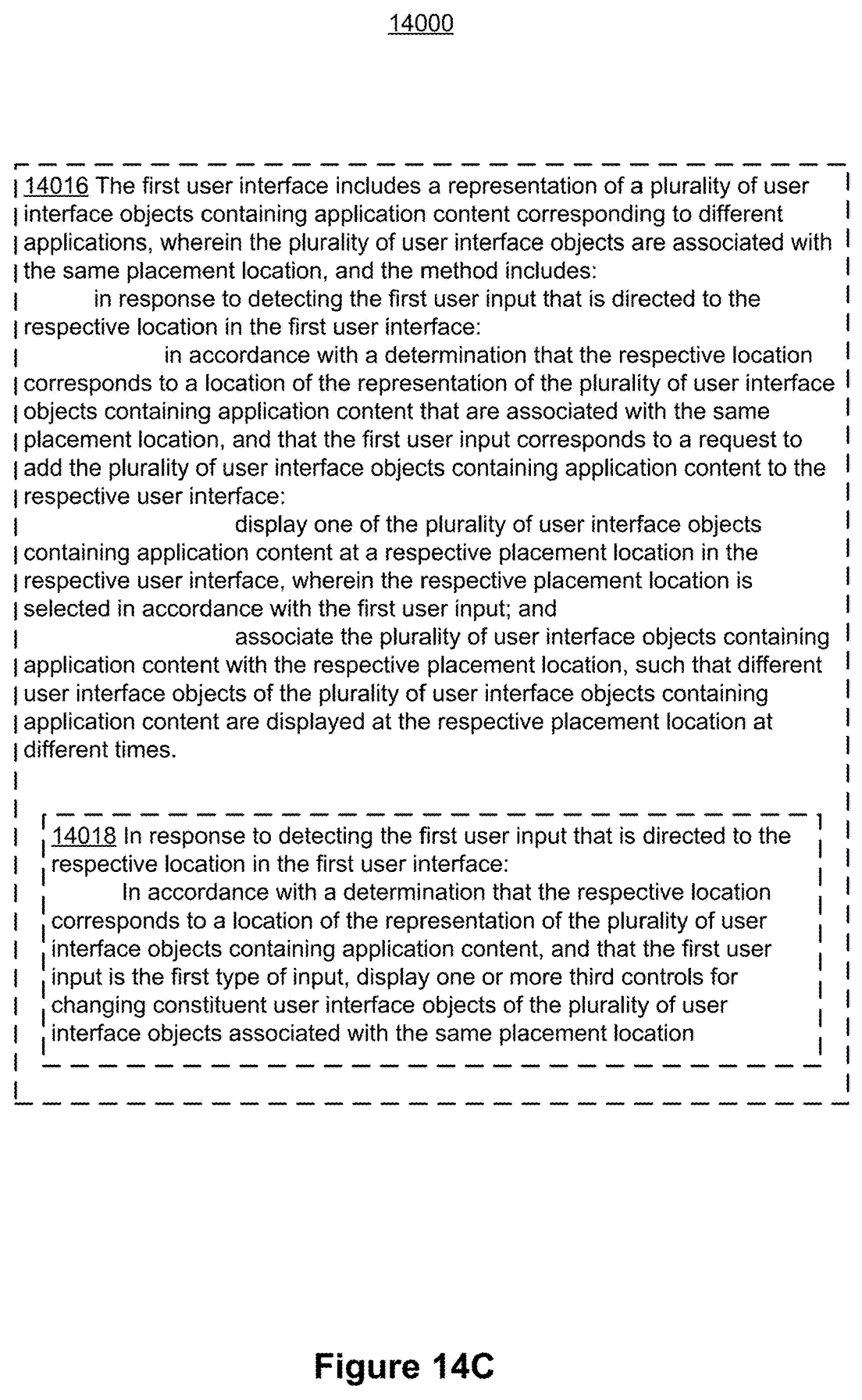

14016 The first user interface includes a representation of a plurality of user interface objects containing application content corresponding to different applications, wherein the plurality of user interface objects are associated with the same placement location, and the method includes:

in response to detecting the first user input that is directed to the respective location in the first user interface:

in accordance with a determination that the respective location corresponds to a location of the representation of the plurality of user interface objects containing application content that are associated with the same placement location, and that the first user input corresponds to a request to add the plurality of user interface objects containing application content to the respective user interface:

display one of the plurality of user interface objects containing application content at a respective placement location in the respective user interface, wherein the respective placement location is selected in accordance with the first user input; and associate the plurality of user interface objects containing application content with the respective placement location, such that different user interface objects of the plurality of user interface objects containing application content are displayed at the respective placement location at different times.

14018 In response to detecting the first user input that is directed to the respective location in the first user interface:

In accordance with a determination that the respective location corresponds to a location of the representation of the plurality of user interface objects containing application content, and that the first user input is the first type of input, display one or more third controls for changing constituent user interface objects of the plurality of user interface objects associated with the same placement location

Figure 14D:
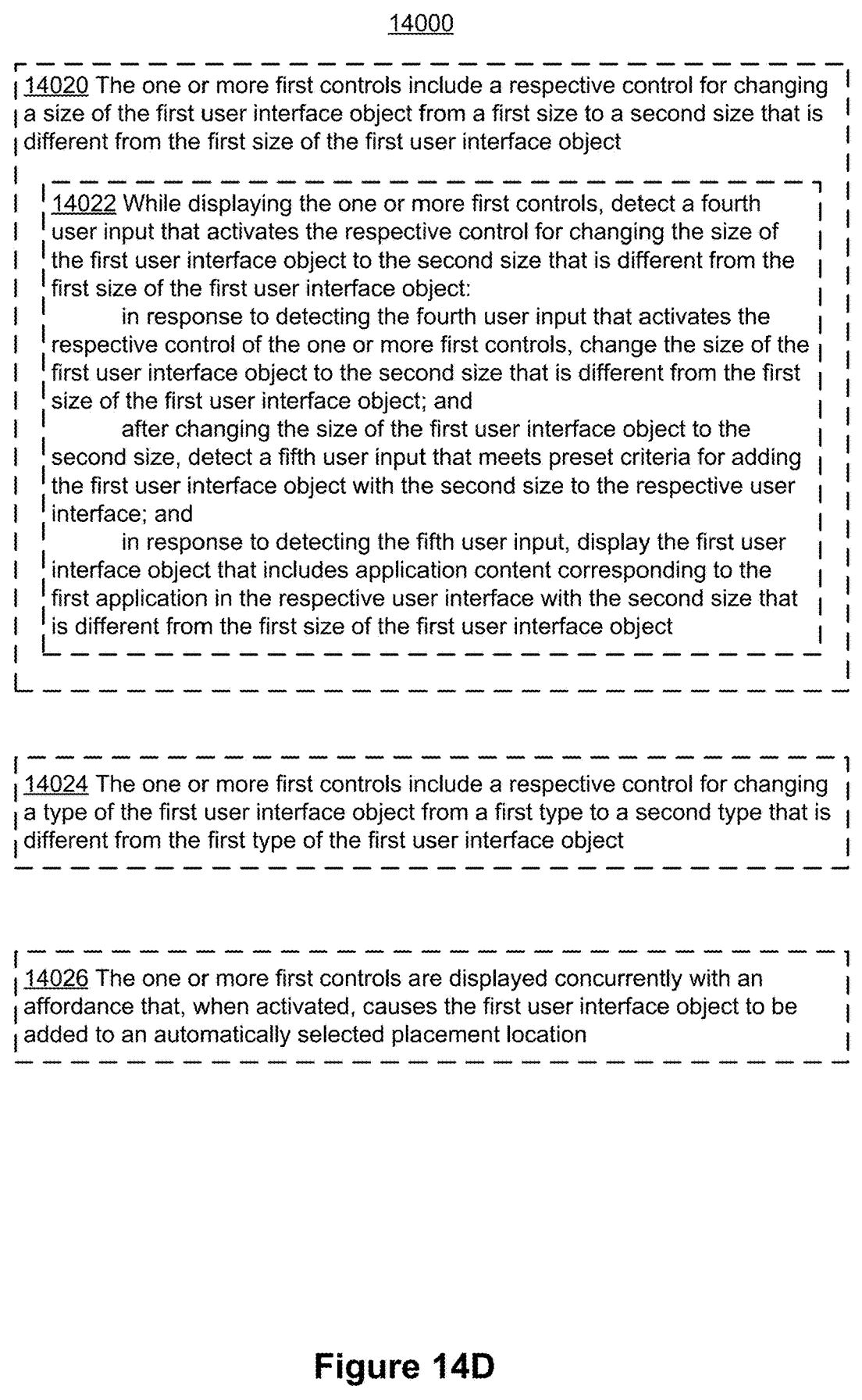

14020 The one or more first controls include a respective control for changing a size of the first user interface object from a first size to a second size that is different from the first size of the first user interface object 14022 While displaying the one or more first controls, detect a fourth user input that activates the respective control for changing the size of the first user interface object to the second size that is different from the first size of the first user interface object:

in response to detecting the fourth user input that activates the respective control of the one or more first controls, change the size of the first user interface object to the second size that is different from the first size of the first user interface object; and after changing the size of the first user interface object to the second size, detect a fifth user input that meets preset criteria for adding the first user interface object with the second size to the respective user interface; and in response to detecting the fifth user input, display the first user interface object that includes application content corresponding to the first application in the respective user interface with the second size that is different from the first size of the first user interface object 14024 The one or more first controls include a respective control for changing a type of the first user interface object from a first type to a second type that is different from the first type of the first user interface object 14026 The one or more first controls are displayed concurrently with an affordance that, when activated, causes the first user interface object to be added to an automatically selected placement location

Figure 14E:
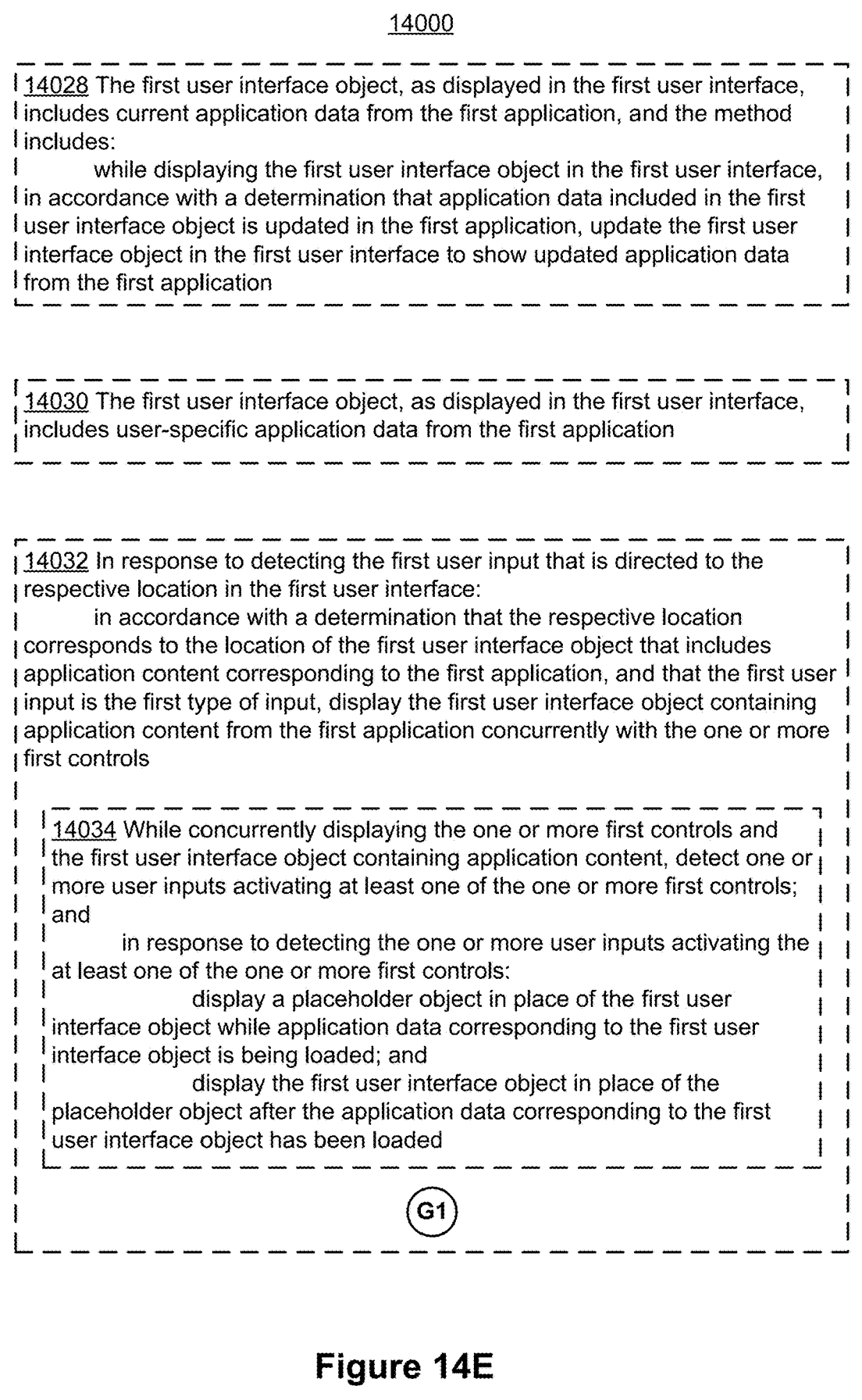

14028 The first user interface object, as displayed in the first user interface, includes current application data from the first application, and the method includes:

while displaying the first user interface object in the first user interface, in accordance with a determination that application data included in the first user interface object is updated in the first application, update the first user interface object in the first user interface to show updated application data from the first application 14030 The first user interface object, as displayed in the first user interface, includes user-specific application data from the first application 14032 In response to detecting the first user input that is directed to the respective location in the first user interface:

in accordance with a determination that the respective location corresponds to the location of the first user interface object that includes application content corresponding to the first application, and that the first user input is the first type of input, display the first user interface object containing application content from the first application concurrently with the one or more first controls 14034 While concurrently displaying the one or more first controls and the first user interface object containing application content, detect one or more user inputs activating at least one of the one or more first controls; and in response to detecting the one or more user inputs activating the at least one of the one or more first controls:

display a placeholder object in place of the first user interface object while application data corresponding to the first user interface object is being loaded; and display the first user interface object in place of the placeholder object after the application data corresponding to the first user interface object has been loaded

Figure 14F:
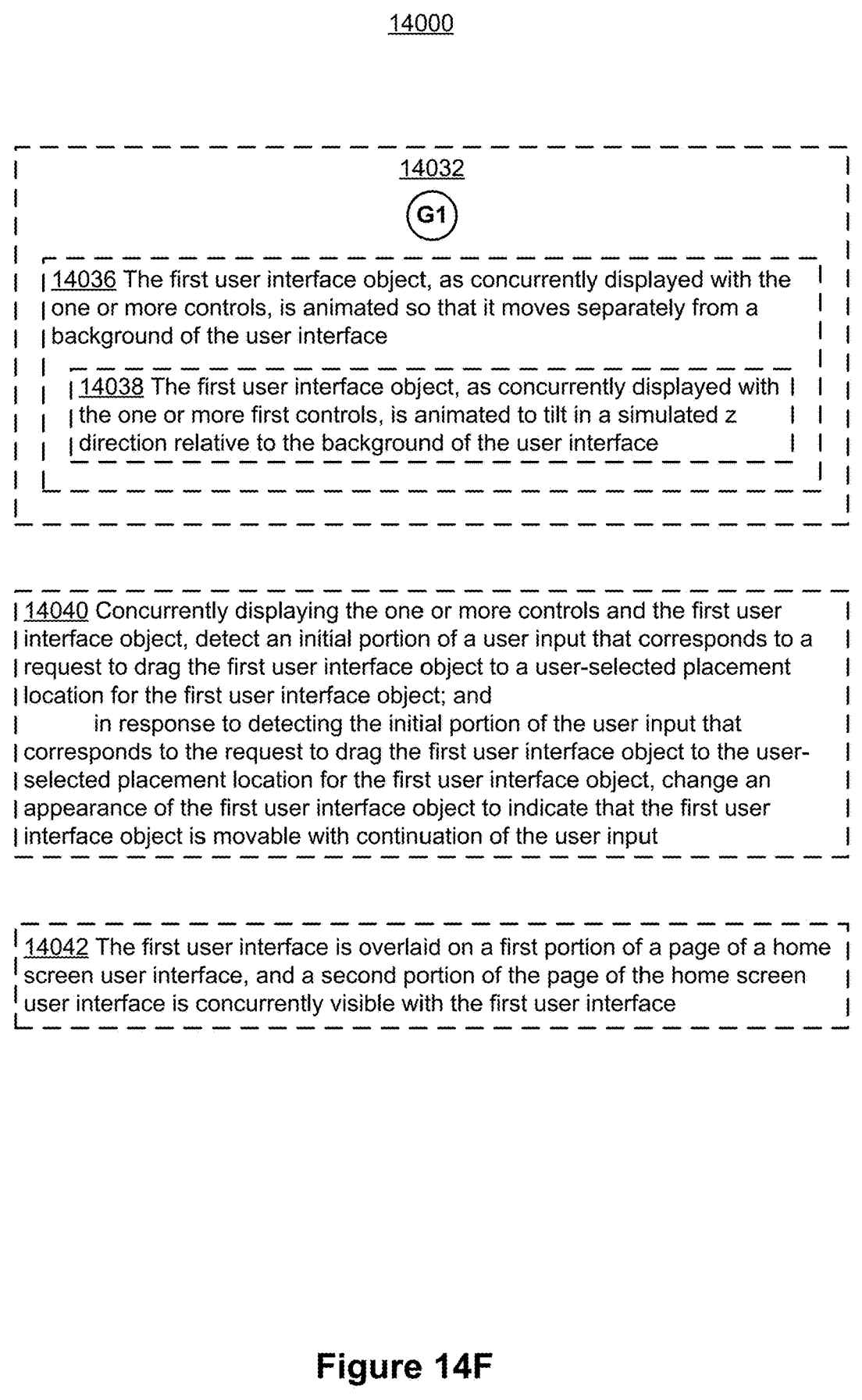

14036 The first user interface object, as concurrently displayed with the one or more controls, is animated so that it moves separately from a background of the user interface 14038 The first user interface object, as concurrently displayed with the one or more first controls, is animated to tilt in a simulated z direction relative to the background of the user interface 14040 Concurrently displaying the one or more controls and the first user interface object, detect an initial portion of a user input that corresponds to a request to drag the first user interface object to a user-selected placement location for the first user interface object; and in response to detecting the initial portion of the user input that corresponds to the request to drag the first user interface object to the user-selected placement location for the first user interface object, change an appearance of the first user interface object to indicate that the first user interface object is movable with continuation of the user input 14042 The first user interface is overlaid on a first portion of a page of a home screen user interface, and a second portion of the page of the home screen user interface is concurrently visible with the first user interface

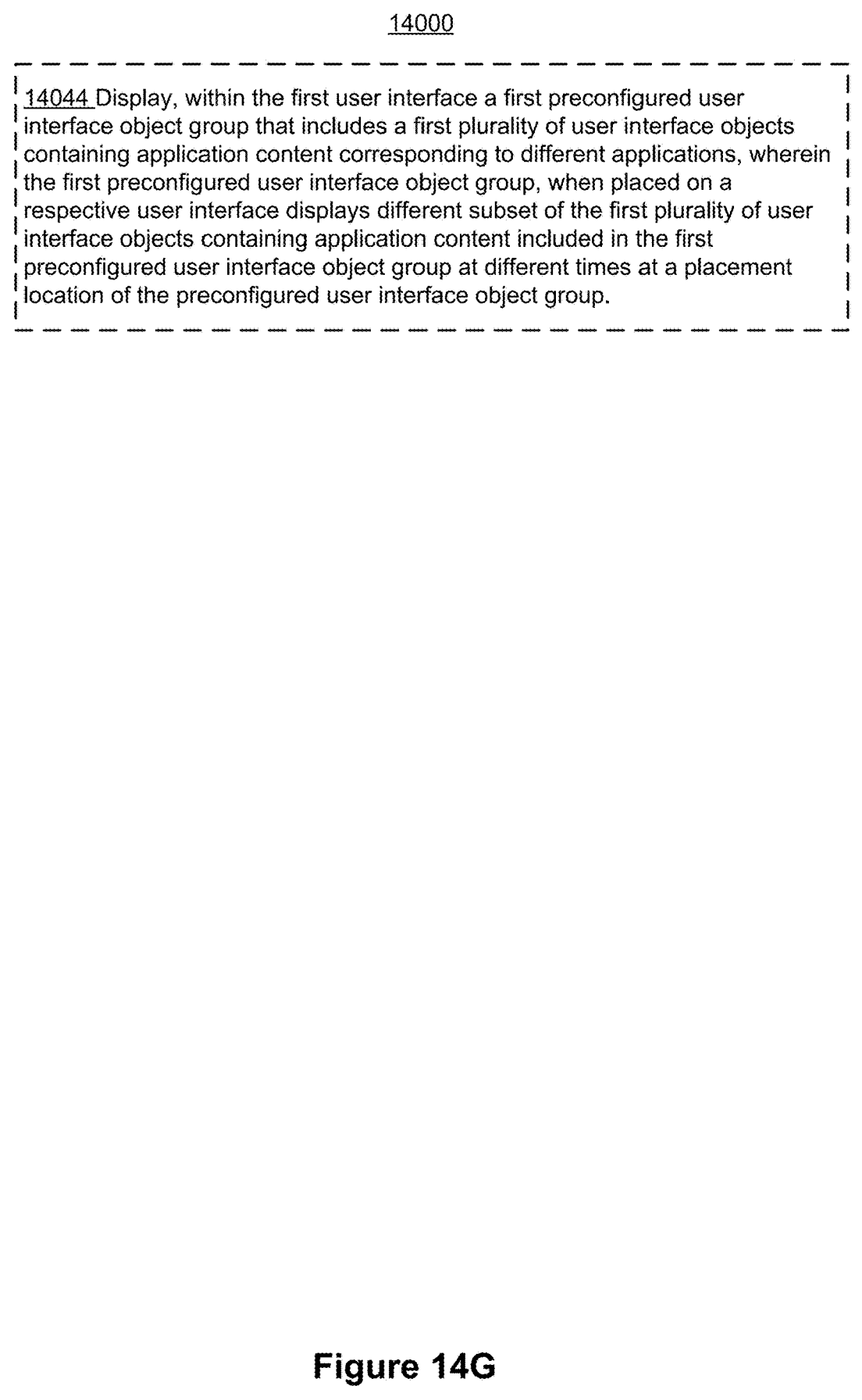

14044 Display, within the first user interface a first preconfigured user interface object group that includes a first plurality of user interface objects containing application content corresponding to different applications, wherein the first preconfigured user interface object group, when placed on a respective user interface displays different subset of the first plurality of user interface objects containing application content included in the first preconfigured user interface object group at different times at a placement location of the preconfigured user interface object group.

Figure 14G

DEVICES, METHODS, AND GRAPHICAL USER INTERFACES FOR INTERACTING WITH USER INTERFACE OBJECTS CORRESPONDING TO APPLICATIONS

RELATED APPLICATIONS

This application claims priority to U.S. Provisional Patent Application No. 63/041,993, filed Jun. 21, 2020, U.S. Provisional Patent Application No. 63/023,237, filed May 11, 2020, U.S. Provisional Patent Application No. 63/008,656, filed Apr. 10, 2020; U.S. Provisional Patent Application No. 62/987,871, filed Mar. 11, 2020; and U.S. Provisional Patent Application No. 62/987,870, filed Mar. 10, 2020; each of which is incorporated by reference in its entirety.

TECHNICAL FIELD

This relates generally to electronic devices with touch-sensitive surfaces, including but not limited to electronic devices with touch-sensitive surfaces for displaying and interacting with user interface objects corresponding to applications.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with improved methods and interfaces displaying and interacting with user interface objects corresponding to different applications. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device including a display generation component and one or more input devices. The method includes, displaying, via the display generation component, a first page of a multipage home screen user interface, wherein the first page of the multipage home screen user interface includes a first subset of application icons of a plurality of application icons corresponding to a plurality of applications that are associated with the computer system, and wherein activation of a respective application icon of the plurality of application icons in accordance with first criteria causes display of an application corresponding to the respective application icon to replace display of a respective page of the multipage home screen user interface on which the respective application icon is displayed. The method further includes, while displaying the first page of the multipage home screen user interface, detecting a first input that meets second criteria different from the first criteria, the second criteria including a requirement that the first input indicates navigation in a first direction through the multipage home screen user interface. The method further includes, in response to detecting the first input that meets the second criteria: in accordance with a determination that the first input corresponds to a request to navigate to a second page of the multipage home screen user interface, replacing display of the first page of the multipage home screen user interface with display of the second page of the multipage home screen user interface, wherein the second page of the multipage home screen user interface includes a second subset of application icons of the plurality of application icons corresponding to the plurality of applications, the second subset of application icons are different from the first subset of application icons. The method further includes, while displaying the second page of the multipage home screen user interface, detecting a second input that meets third criteria the third criteria including the requirement that the second input indicates navigation in the first direction through the multipage home screen user interface; in response to detecting the second input that meets the third criteria: replacing display of the second page of the multipage home screen user interface with display of a respective user interface that includes representations of a plurality of automatically-generated groupings of the plurality of applications, and wherein activation of a respective representation of a respective automatically-generated grouping of the plurality of automatically-generated groupings in accordance with the first criteria causes display of a third subset of application icons of the plurality of application icons, wherein the third subset of application icons correspond to at least a subset of the plurality of applications that belong to the respective automatically-generated grouping of the plurality of automatically-generated groupings.

In accordance with some embodiments, a method is performed at an electronic device including a display generation component and one or more input devices. The method includes, displaying a first page of a multipage home screen user interface, wherein the first page of the multipage home screen user interface includes a first subset of application icons of a plurality of application icons corresponding to a plurality of applications. The method further includes, while displaying the first page of the multipage home screen user interface, detecting a first input that meets first criteria; in response to detecting the first input that meets the first criteria: displaying the first page of the multipage home screen user interface in a first reconfiguration mode associated with the multipage home screen user interface, wherein locations of application icons in the first subset of application icons are adjustable in response to user inputs detected during the first reconfiguration mode. The method further includes, while displaying the first page of the multipage home screen user interface in the first reconfiguration mode, detecting a second input that meets second criteria; and in response to detecting the second input, activating the second reconfiguration mode associated with the multipage home screen user interface, including: concurrently displaying, in a first user interface, representations of a plurality of pages of the multipage home screen user interfaces, including a first representation of the first page of the multipage home screen user interface and a second representation of a second page of the multipage home screen user interface that is different from the first page of the multipage home screen user interface.

In accordance with some embodiments, a method is performed at an electronic device including a display generation component and one or more input devices. The method includes, displaying a first user interface, including displaying a plurality of application icons in accordance with a first layout in the first user interface. The method further includes, while displaying the first user interface including the plurality of application icons in accordance with the first layout, detecting a first input corresponding to a request to insert a first user interface object that includes application content into the first user interface. The method further includes, in response to detecting the first input corresponding to the request to insert the first user interface object that includes application content into the first user interface: in accordance with a determination that the first input is directed to a first location corresponding to a first set of application icons on the first user interface: moving the first set of application icons from the first location to a respective location where the first set of application icons cannot be directly activated from the first user interface once they have been moved to the respective location to create space for the first user interface object that includes application content at the first location; and displaying the first user interface object that includes application content at the first location.

In accordance with some embodiments, a method is performed at an electronic device including a display generation component and one or more input devices. The method includes, at a first time, displaying a first user interface, wherein: the first user interface includes a placement location that is configured to spatially accommodate a respective user interface object of a plurality of user interface objects corresponding to different applications that are associated with the placement location; the plurality of user interface objects includes a first user interface object corresponding to a first application, and a second user interface object corresponding to a second application different from the first application; and at the first time the first user interface object is displayed at the placement location. The method further includes, at a second time, after the first time, displaying the first user interface with the second user interface object displayed at the placement location, wherein the second user interface object was automatically selected for display at the placement location based on a current context of the device at the second time. The method further includes, while the second user interface object is displayed at the placement location, detecting a gesture directed to the placement location. The method further includes, in response to detecting the gesture directed to the placement location, in accordance with a determination that the gesture is a first type of gesture, replacing display of the second user interface object with a different user interface object from the plurality of user interface objects that are associated with the placement location.

In accordance with some embodiments, a method is performed at an electronic device including a display generation component and one or more input devices. The method includes displaying a first user interface that includes a first placement location that is associated with a plurality of user interface objects corresponding to different applications, where the plurality of user interface objects includes a first user interface object that includes information from a first application, a second user interface object that includes information from a second application that is different from the first application, and a third user interface object that includes information from a third application that is different from the first application and the second application. The method further includes, after displaying the first user interface object corresponding to the first application at the first placement location in the first user interface, detecting occurrence of a respective condition. The method further includes, in response to detecting the occurrence of the respective condition, displaying the second user interface object at the first placement location in the first user interface. The method further includes, after displaying the second user interface object at the first placement location in the first user interface, displaying a configuration user interface corresponding to the first placement location, where displaying the configuration user interface includes concurrently displaying at least a portion of a first representation of the first user interface object and at least a portion of a second representation the second user interface object. The method further includes, while displaying the configuration user interface corresponding to the first placement location, detecting a first user input that is directed to a respective portion of the configuration user interface. The method further includes, in response to detecting the first user input that is directed to the respective portion of the configuration user interface, in accordance with a determination that the first user input meets selection criteria when directed to the first representation of the first user interface object of the plurality of user interface objects shown in configuration user interface and that the first user input includes movement that meets first movement criteria, ceasing display of the configuration user interface corresponding to the first placement location and displaying the first user interface object at a second placement location in a second user interface in accordance with the movement of the first user input, where the second user interface is different from the configuration user interface, and the second placement location is different from the first placement location.

In accordance with some embodiments, a method is performed at an electronic device including a display generation component and one or more input devices. The method includes displaying a first page of a multipage home screen user interface in a first reconfiguration mode, where respective positions of a first plurality of application icons in the first page of the multipage home screen user interface are adjustable in accordance with user inputs in the first reconfiguration mode. The method further includes, while displaying the first page of the multipage home screen user interface in the first reconfiguration mode, detecting a first input that corresponds to a request to enter a second reconfiguration mode from the first reconfiguration mode, where the availability of one or more pages in the multipage home screen user interface can be changed in accordance with user inputs in the second reconfiguration mode. The method further includes, in response to detecting the first input, replacing display of the first page of the multipage home screen user interface in the first reconfiguration mode with display of respective representations of at least two of the plurality of pages of the multipage home screen user interface in the second reconfiguration mode, including at least a first representation of the first page of the multipage home screen user interface, and a second representation of a second page of the multipage home screen user interface that is different from the first page of the multipage home screen user interface. The method further includes, while displaying the respective representations of the at least two of the plurality of pages of the multipage home screen user interface in the second reconfiguration mode, including the first representation of the first page and the second representation of the second page, detecting a second input. The method further includes, in response to detecting the second input, in accordance with a determination that the second input is directed to the second representation of the second page that is displayed in the second reconfiguration mode, and that the second input meets first criteria, displaying the second page of the multipage home screen user interface in the first reconfiguration mode, where respective positions of a second plurality of application icons in the second page of the multipage home screen user interface are adjustable in accordance with user inputs in the first reconfiguration mode.

In accordance with some embodiments, a method is performed at an electronic device including a display generation component and one or more input devices. The method includes displaying a respective page of a home screen user interface, where the respective page of the home screen user interface includes a first plurality of application icons in a first predefined arrangement. The method further includes detecting a sequence of one or more inputs corresponding to a request to insert, into the respective page of the home screen user interface, a first user interface object containing a plurality of application icons for a plurality of applications that are automatically selected by the computer system. The method further includes, in response to detecting the sequence of one or more inputs, concurrently displaying on the respective page of the home screen user interface: two or more of the first plurality of application icons in the first predefined arrangement, and a second plurality of application icons, different from the first plurality of application icons, where the second plurality of application icons are automatically placed on the respective page of the home screen in locations that are aligned with the first predefined arrangement of the first plurality of application icons on the respective page of the home screen user interface, and the second plurality of application icons are automatically selected by the computer system for inclusion on the respective page of the home screen user interface.

In accordance with some embodiments, a method is performed at an electronic device including a display generation component and one or more input devices. The method includes displaying, via the display generation component, a respective page of a home screen user interface, where the respective page of the home screen user interface includes a first plurality of application icons and a first user interface object containing application content corresponding to a respective application displayed at a first placement location. The method further includes, while displaying the respective page of the home screen user interface, detecting a first user input that corresponds to a request to move the first user interface object containing application content away from the first placement location. The method further includes, in response to detecting the first user input, moving the first user interface object relative to the first placement location in the respective page in accordance with the first user input, and, in accordance with a determination that first criteria are met, moving a first plurality of application icons that are located in a first set of placement locations relative to the first placement location of the first user interface object containing application content to follow a direction of movement of the first user interface object containing application content.

In accordance with some embodiments, a method is performed at an electronic device including a display generation component and one or more input devices. The method includes displaying, via the display generation component, a first user interface for selecting user interface objects for placement on a home screen user interface of the computer system, where the first user interface includes a first user interface object that includes application content corresponding to a first application. The method further includes, while displaying the first user interface, detecting a first user input that is directed to a respective location in the first user interface. The method further includes, in response to detecting the first user input that is directed to the respective location in the first user interface, in accordance with a determination that the respective location n corresponds to a location of the first user interface object that includes application content corresponding to the first application and is preconfigured with one or more predetermined configuration options corresponding to the first user interface object, and that the first user input is a first type of input, displaying one or more first controls for changing one or more configuration options for the first user interface object to configuration options that are different from the one or more predetermined configuration options. The method further includes, in response to detecting the first user input that is directed to the respective location in the first user interface, in accordance with a determination that the respective location corresponds to the location of the first user interface object that includes application content corresponding to the first application, and that the first user input is a second type of input different from the first type of input, displaying, in a respective user interface different from the first user interface, the first user interface object that includes application content corresponding to the first application with the one or more predetermined configuration options corresponding to the first user interface object.

In accordance with some embodiments, an electronic device includes a display generation component (e.g., a touch-screen, a display, a display of a head mounted device, etc.), a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device with a display generation component (e.g., a touch-screen, a display, a display of a head mounted device, etc.), a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component (e.g., a touch-screen, a display, a display of a head mounted device, etc.), a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display generation component (e.g., a touch-screen, a display, a display of a head mounted device, etc.), a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with display generation components, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for navigating between user interfaces and interacting with control objects thereby increasing the effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A36 illustrate example user interfaces for displaying and interacting with user interface objects corresponding to different applications, in accordance with some embodiments.

FIGS. 5B1-5B19 illustrate example user interfaces for reconfiguring the multipage home screen user interface, in accordance with some embodiments.

FIGS. 5C1-5C73 illustrate example user interfaces for inserting a user interface object containing application content (e.g., mini application objects, widgets, etc.) into a page of a home screen user interface (e.g., a single page or multipage home screen user interface), in accordance with some embodiments.

FIGS. 5D1-5D12 illustrate example user interfaces for selecting for display and updating user interface objects containing application content (e.g., mini application objects, widgets, etc.) that are associated with a placement location in a page of a home screen user interface (e.g., a single page or multipage home screen user interface), in accordance with some embodiments.

FIGS. 5E1-5E32 illustrate example user interfaces for interacting with a plurality of user interface objects containing application content that is associated with a common placement location (e.g., a widget or mini application object stack, etc.) (e.g., on a page of a home screen user interface and in a stack-specific configuration user interface, etc.), in accordance with some embodiments.

FIGS. 5F1-5F30 illustrate example user interfaces for interacting with multiple pages of a home screen user interface (e.g., in an icon reconfiguration mode, in a page editing mode, and when transitioning between the two modes, etc.), in accordance with some embodiments.

FIGS. 5G1-5G31 illustrate example user interfaces for displaying and interacting with a user interface object (e.g., a suggested applications widget, a recommended applications widget, a recent apps widget, etc.) that presents application icons that are automatically selected by a computer system at a user selected location (e.g., a user-selected placement location on a page of a home screen user interface, on a widget screen, etc.), in accordance with some embodiments.

FIGS. 5H1-5H76 illustrate various ways that existing user interface objects corresponding to different applications (e.g., application icons, widgets, etc. of various sizes) on a page of a home screen user interface are moved and/or rearranged during a reconfiguration mode (e.g., in accordance with repositioning, deletion, addition, passing through, removal, etc. of one or more user interface objects corresponding to different applications), in accordance with some embodiments.

FIGS. 5I1-5I18 illustrate user interfaces for configuring user interface objects containing application content (e.g., widgets, mini application objects, etc.) and adding the same to another user interface (e.g., a page of a home screen), in accordance with some embodiments.

FIGS. 6A-6K are flow diagrams illustrating a method of displaying an interacting with user interface objects corresponding to different applications, in accordance with some embodiments.

FIGS. 7A-7H are flow diagrams illustrating a method of reconfiguring the multipage home screen user interface, in accordance with some embodiments.

FIGS. 8A-8M are flow diagrams illustrating a method of inserting a user interface object containing application content (e.g., mini application objects, widgets, etc.) in a page of a home screen user interface, in accordance with some embodiments.

FIGS. 9A-9H are flow diagrams illustrating a method of selection for display and updating user interface objects (e.g., mini application objects, widgets, etc.) that are associated with a placement location in a page of a home screen user interface, in accordance with some embodiments.

FIGS. 10A-10H are flow diagrams illustrating a method of interacting with a plurality of user interface objects containing application content that is associated with a common placement location (e.g., a widget or mini application object stack, etc.) (e.g., on a page of a home screen user interface and in a stack-specific configuration user interface, etc.), in accordance with some embodiments.

FIGS. 11A-11D are flow diagrams illustrating a method for interacting with multiple pages of a home screen user interface (e.g., in an icon reconfiguration mode, in a page editing mode, and when transitioning between the two modes, etc.), in accordance with some embodiments.

FIGS. 12A-12F are flow diagrams illustrating a method for displaying and interacting with a user interface object (e.g., a suggested applications widget, a recommended applications widget, a recent apps widget, etc.) that presents application icons that are automatically selected by a computer system at a user selected location (e.g., a user-selected placement location on a page of a home screen user interface, on a widget screen, etc.), in accordance with some embodiments.

FIGS. 13A-13H are flow diagrams illustrating a method of moving and/or rearranging existing user interface objects corresponding to different applications (e.g., application icons, widgets, etc. of various sizes) on a page of a home screen user interface during a reconfiguration mode (e.g., in accordance with repositioning, deletion, addition, passing through, removal, etc. of one or more user interface objects corresponding to different applications), in accordance with some embodiments.

FIGS. 14A-14G are flow diagrams illustrating a method for configuring user interface objects containing application content (e.g., widgets, mini application objects, etc.) and adding the same to another user interface (e.g., a page of a home screen), in accordance with some embodiments.

DESCRIPTION OF EMBODIMENTS

Figure 1A:
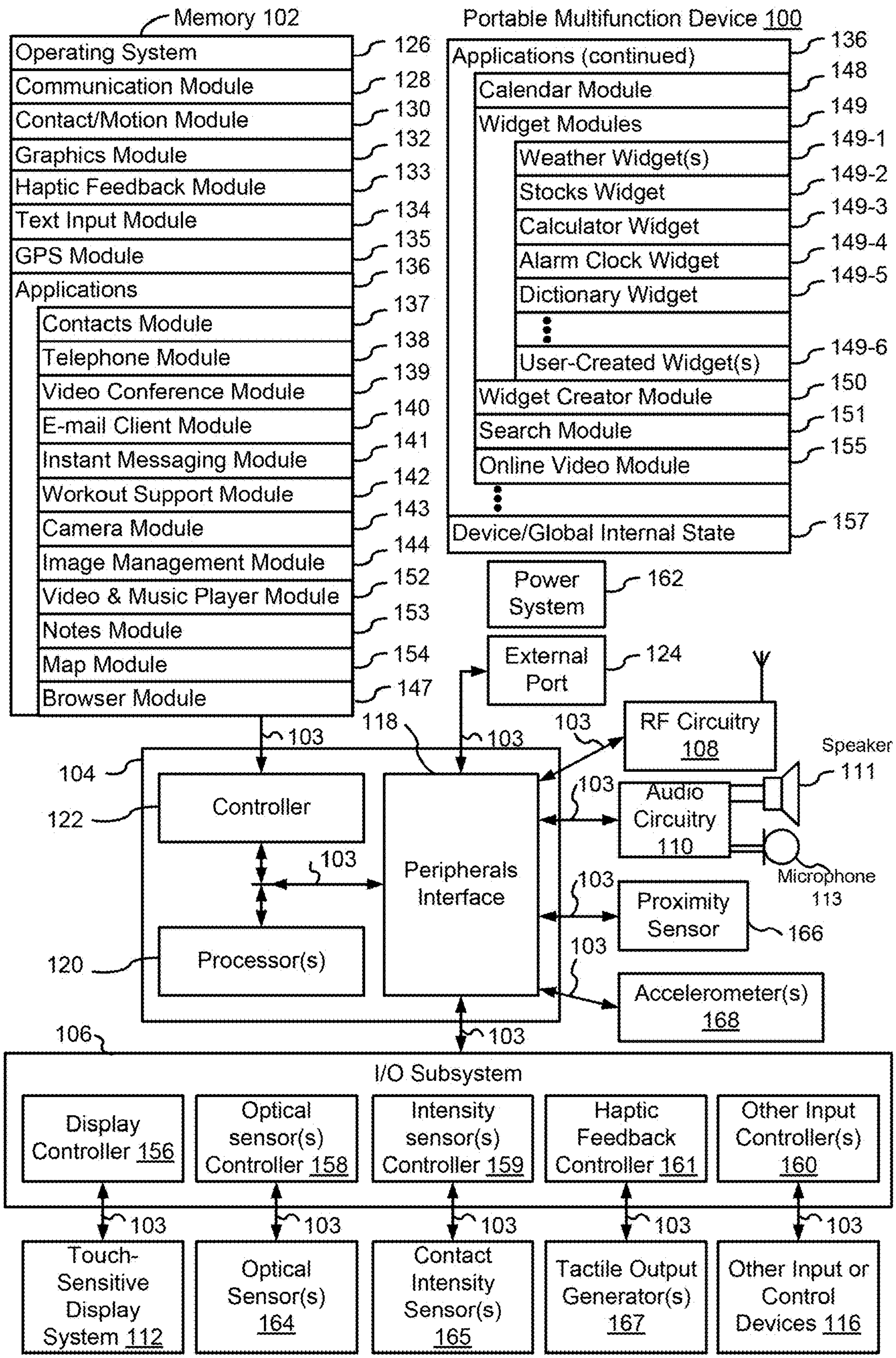
FIG. 1A is a block diagram illustrating a portable multifunction device with a touch-sensitive display in accordance with some embodiments.

Some methods of displaying and interacting with user interface objects corresponding to different applications, in particular, for displaying and interacting with application icons corresponding to different applications, often require multiple separate inputs for the user to manually arrange the application icons into meaningful categories or folders on a user-defined home screen. The user has to look for the correct application icon among many other applications on multiple pages of the home screen user interface in order to locate the application icon for a desired application in order to activate the application icon and launch the desired application. Overtime, it becomes increasing difficult for the user to keep track of the applications installed on the device and increasingly difficult for the user to manually categorized and arrange the application icons on the home screen user interface to allow for efficient and easy access to the application icons.

The embodiments below provide an additional system-arranged page or pages of the home screen user interface that include application icons automatically categorized and arranged in automatically generated groupings. The user can easily navigate to the system-generated page(s) of the home screen and locate the application icon of a desired application based on its characteristics (e.g., app store category, function, when it was installed, etc.) using the same navigation gestures used to navigate between user-arranged pages of the home screen user interface. In some embodiments, recently installed applications, recently accessed applications, and/or contextually relevant applications are automatically identified by the operating system and included in corresponding categories (e.g., recently installed, recently accessed, and/or contextually suggested categories, etc.) in the system-generated page(s) of the home screen user interface. In some embodiments, the system-generated home screen also includes user interface objects including application content, also referred to as mini-application objects or widgets, that provide a limited subset of functions and/or information available from their corresponding applications without requiring the applications to be launched. In some embodiments, the system-arranged page(s) of the multipage home screen user interface provides a search input area that allows the user to input search criteria (e.g., keywords, filters such as apps with recent notifications, apps that are published by a particular publisher, etc.) and returns applications (e.g., installed applications, and/or available applications from the app store, etc.) corresponding to the search criteria as search results. In some embodiments, the search results include application icons that can be directly interacted with, e.g., to launch the corresponding applications, dragged and dropped onto desired positions in the user-arranged pages of the home screen, and/or deleted from the device, without requiring the user having to find the application icons in their current positions on the user-arranged pages of the home screen user interface. In some embodiments, similar capabilities are provided for the application icons shown on the system-arranged home screen as well. In some embodiments, the system-generated groupings are represented on the system-arranged page of the home screen user interface as big folder icons, a respective big folder icon corresponds to a respective grouping and, when activated, displays application icons (or duplicates or links thereof) for multiple (e.g., some or all) of the applications from the user-arranged pages of the home screen user interface that are assigned to the respective grouping represented by the big folder icon. The representation of the system-generated grouping (e.g., the big folder icon) optionally includes miniature versions of application icons that corresponding to at least a subset of the applications included in the grouping (e.g., the applications that have unread notifications or badges, the applications that are recently accessed, etc.) and a folder launch icon. When a respective miniature application icon is activated (e.g., by a tap input, a double tap input, etc.), the computer system launches the corresponding application of the respective miniature application icon. The folder launch icon, when activated (e.g., by a tap input, a double tap input, etc.), displays the folder content, including the application icons corresponding to the applications in the respective grouping. In some embodiments, the application icons and groupings included in system-arranged page of the multipage home screen user interface are not subject to change by user's input, or at least not in the same way that they can be changed (e.g., deleted, moved, etc.) in the user-arranged pages of the home screen user interface. In some embodiments, the system-arranged page is presented as a page of the multipage home screen user interface with a corresponding page indicator icon indicating its ordinal position in a sequence of pages of the multipage home screen user interface. In some embodiments, the system-arranged page is presented as a user interface overlay or a separate user interface (e.g., an application library user interface) that does not have a corresponding page indicator icon among the page indicator icons of the user-arranged pages of the multipage-home screen user interface. In some embodiments, irrespective of its appearance, the system-arranged page of the home screen user interface is accessed and displayed in response to the same type of page navigation inputs that are used to navigate between user-arranged pages of the multipage home screen user interface.

Some methods of configuring pages of a multipage home screen user interface involve a user laboriously moving application icons around on different pages of the home screen or onto a new page of a home screen, and manually deleting all application icons on a page to delete the page. There is also no easy way to arrange the different pages of the multipage home screen as a whole, or restore a page or set of application icons after they have been deleted from the multipage home screen user interface. As disclosed herein, a computer system provides a two-step process for invoking a page editing mode for the multipage home screen user interface, where an icon reconfiguration mode is invoked first on a respective page of the multipage home screen user interface; and while displaying the respective page of the multipage home screen in the icon reconfiguration mode, a user input is optionally detected to activate the page editing mode in which whole pages of the multipage home screen user interface can be hidden, rearranged, and/or removed from inclusion in the multipage home screen user interface upon exit of the page editing mode. In some embodiments, while in the page editing mode, a user input is optionally detected to move a previously hidden page out of a preset holding area of the page editing user interface or marking it as unhidden so that it will be displayed again in the multipage home screen user interface upon exit of the page editing mode. In some embodiments, in the page editing mode, a deletion input is applied to multiple (e.g., all, some, etc.) hidden pages that are stored in the preset holding area. In some embodiments, hidden pages are not deleted so that they are easily restored at a future time. In some embodiments, an affordance for entering the page editing mode from the icon reconfiguration mode is displayed on multiple (e.g., some or all) of the pages (e.g., system-arranged pages, and/or user-arranged pages, etc.) of the multipage home screen user interface in the icon reconfiguration mode, and is optionally displayed at the location of the page navigation element on the different pages of the home screen user interface.

On some computer systems, when a user wishes to insert a widget into a home screen user interface, if the desired drop location is already occupied or if there is not sufficient space on the user interface, the insertion will fail or be prevented. The user would have to manually clear some space on the user interface first, e.g., by deleting and/or moving some application icons from the user interface. In some cases, even if insertion is possible, it causes reflow of existing application icons on the user interface, and sometimes pushing some icons at the bottom of the page onto the next page, which may cause a cascading effect that undesirably change the layout on multipage pages of the home screen user interface. As disclosed herein, a computer system automatically moves the set of application icons and/or widgets that are currently located at a desired placement location selected by the user for the new widget to a preset location (e.g., a new folder on the current page, or a new page of the home screen user interface, etc.) that is created for holding the displayed set of application icons and/or widgets and that does not impact the layout of other portions of the current page or other existing pages of the multipage home screen user interface. In some embodiments, as the new widget is dragged around the page before being inserted into the page, only the set of application icons at the current location of the new widget are sent to the respective location, so that the user gets a preview of the final state of the page, before committing to the change. In some embodiments, when adding a widget to a page of the multipage home screen user interface, a user can select the widget from a widget selection and configuration user interface or drag it from another location or from another page of the home screen user interface, and drop it to a desired placement location on a desired page of the home screen user interface. When there are sufficient space on the page of the home screen user interface, application icons are displaced and shifted on the page to make room for the insertion of the new widget. In some embodiments, a quick action menu associated with a widget includes a size selector showing different available sizes for the widget, and selecting a different size for the widget using the size selection causes resizing of the widget and optionally reflow of other application icons and/or widgets on the same page of the home screen user interface. In some embodiments, in addition to the reflow of other application icons and/or widgets, some application icons and/or widgets on the page are optionally pushed to a predefined location (e.g., an existing or newly created folder, or a new page, etc.). In some embodiments, resizing the widget optionally causes rearrangement of the application icons and/or widgets on the page of the home screen user interface in terms of block-size that corresponds to the new and/or old sizes of the widget (and optionally, sizes and positions of other widgets on the same page).

On some computer system, a widget that is displayed at a placement location is fixed and does not automatically switch to a different widget or widget for a different application. As disclosed herein, a widget stack is implemented such that multiple widgets share the same placement location and are displayed at different times at the same placement location. In some embodiments, a placement location on a page of a home screen user interface optionally is associated with widgets of multiple different applications, where different subsets of the widgets or mini application objects associated with the placement location are displayed at different times. In some instances, the computer system automatically updates (e.g., without user inputs) the selection of widget(s) for display at the placement location at the current time based on current context. In addition, the computer system also updates which widgets or mini application object(s) are displayed at the placement location in response to user inputs (e.g., swipe inputs). In some embodiments, different numbers of widgets are optionally concurrently displayed at a placement location depending on whether the current context is sufficiently clear for recommending a single mini application objects or multiple mini application objects at the placement location. In many ways, widgets on the home screen user interface behavior similarly to an application icon on the home screen. For example, it launches an application, displays a quick action menu, and/or triggers icon reconfiguration mode, etc. in response to the same types of inputs that are required for triggering these functions on an application icon. Widgets on the home screen user interface behavior differently in that it occupies a bigger space, causes displacement of application icons and other existing widgets on the home screen in a manner that is different from an application icon would. Widgets can be stacked at the same placement location and rotated through automatically by the computer system without user input, and provide useful function and information from their corresponding applications without launching the applications. In some embodiments, when the currently displayed widget at a placement location of a widget stack is automatically updated by the computer system, the computer system provides a visual indication as to the information in the newly displayed widget that contributed to the selection of the widget for display at the present moment. In some embodiments, the information that contributed to the automatic selection of the widget for display at the placement location of the widget stack is visually highlighted relative to other information on the widget.

Some methods of browsing through a listing of applications that have available widgets and selecting a widget from the listing to enter into a fixed location in a widget screen are rigid and cumbersome. It is difficult for the user to discover a useful widget and find easy opportunities to add the widget to a desirable location on the pages of the home screen user interface. As disclosed herein, a widget stack that includes multiple widgets that are displayed at the same placement location at different times. A stack-specific configuration user interface includes a representation of multiple (e.g., some or all, each, etc.) widget in the widget stack. In addition to providing configuration options and entry points for additional configuration options for the widgets in the stack, the stack-specific configuration user interface also serves double duty and provides the function of a widget selection and configuration user interface for the widgets in the stack, where one or more of the widgets can be added to a default location or a user-selected location in response to selection of the one or more widgets followed by an input that corresponds to a request for adding the widget to a page of the home screen user interface (e.g., tapping an add widget affordance, dragging the widget(s) from the stack-specific configuration user interface and dropping it onto a desired location in a page of the home screen user interface). In some embodiments, dragging a widget away from the stack-specific configuration user interface removes the widget from the stack (e.g., adding it to another user-selected location, or optionally, without adding it to another location). In some embodiments, the representations of widgets in the stack-specific widget configuration user interface are reordered in response to user inputs which results in reordering of the widgets in the stack. In some embodiments, the representations of widgets in the stack-specific widget configuration user interface are reduced images of the widgets and includes current application data. In some embodiments, the representations visually indicate which information in the widgets will contribute to the automatic selection of the widget as the currently displayed widget at the placement location of the widget stack.

Some methods of providing an entry point into a page editing mode in which a user can manage or delete whole pages of application icons in a home screen user interface do not involve initiating an icon reconfiguration mode first and entering the page editing mode while in the icon reconfiguration mode. Some methods of providing a page editing mode also does not provide an entry point into an icon reconfiguration mode. Essentially, page editing and icon reconfiguration are decoupled from each other in some computer systems, and transition from one mode to the other mode involves multiple user inputs and the process is cumbersome and time-consuming. As disclosed herein, the computer system provides an entry point from the page editing mode into the icon reconfiguration mode, and provides an entry point from the icon reconfiguration mode to the page editing mode. In particular, the computer system optionally enters the page editing mode in response to a user input that is detected while a first page of the home screen user interface is displayed in the icon reconfiguration mode, and exits the page editing mode and displays another page of the home screen user interface displayed in the icon reconfiguration mode in response to an input directed to a representation of said other page. The ability to transition back and forth between the page editing mode and the icon reconfiguration mode in response to single inputs is fast and efficient, and improves usability of the computer system. In some embodiments, the page editing user interface displayed in the page editing mode includes representations of multiple (e.g., all, some, etc.) user-arranged pages of the home screen user interface, and optionally includes both hidden pages and currently available pages in the same sequence according to their original order before some of the pages became hidden. In some embodiments, the orders of pages, including hidden pages, are reordered in the home screen user interface by reordering the representations of the pages, including representations of hidden pages, in the page editing user interface. In some embodiments, the layout and scaling of the representations of pages in a fixed-sized page editing user interface are adjusted based on the number of pages existing in the home screen user interface. In some embodiments, when there are more than a preset number of pages in the home screen user interface, the fixed-sized page editing user interface becomes a single scrollable page or includes multiple pages.

On some computer systems, a small number of user-selected application icons may be included in a widget and placed on a page of a home screen user interface. However, the selection is static and does not change based on the current context. As a result, the usefulness of the widget is limited, and requires a lot of user maintenance time and effort to remain useful overtime. In addition, the widget position and size are not aligned with that of other application icons on the same page, resulting in a disorganized look and causing difficulty in maintaining a preset configuration of the home screen user interface. As disclosed herein, a computer system provides a suggested applications widget that includes application icons for a plurality of applications that are automatically selected by the computer system based on criteria for measuring likely relevance of the applications to a user given the current context. The suggested applications widget is repositionable by a user during an icon reconfiguration mode and can be inserted into a user-specified location on a page of the home screen user interface. When displaying the suggested applications widget, the computer system displays the application icons within the suggested applications widget with sizes and positions matching and aligned with other application icons on the same page, to create a uniform and consistent layout even when the suggested applications widget are displayed at different user-selected placement locations on the page. In some embodiments, the suggested applications widget serves the function of a mini application library and provides convenient opportunities for the user to discover a desired application icon from among the currently displayed application icons in the suggested applications widget and select and drag a currently displayed application icon in the suggested applications widget to another location on the same page or a different page of the home screen user interface to add the application icon at that user-selected location (optionally, triggering icon reconfiguration mode by the selection and drag input, and/or the drop input). In some embodiments, the above-mentioned drag and drop function is only made available when the page is in the icon reconfiguration mode. In some embodiments, the boundary and background of the suggested applications widget is visually deemphasized when the page is displayed in a normal mode and becomes more obvious when the page enters an icon reconfiguration mode. In some embodiments, the suggested applications widget behaves similarly to other application icons and widgets in that, in response to a preset input for triggering display of a quick action menu for a user interface object corresponding to an application, the computer system displays a quick action menu for the suggested applications widget as well. The quick action menu of the suggested applications widget includes widget-specific options for the suggested applications widget, and optionally application-specific options corresponding to an application icon within the suggested applications widget if the location of the input corresponds to that application icon. In some embodiments, the application-specific options for an application includes an option to hide the application in the suggested applications widget (e.g., temporarily, permanently, on the present page, or on other pages as well, etc.). As disclosed herein, with the alignment of between the application icons with the suggested applications widget and other application icons on the same page, it is ensured that, when the suggested applications widgets are displayed at a different user location, and when different sets of application icons are presented within the user-selected location, the page containing suggested applications widget maintains an orderly and organized arrangement, such that it is less likely to cause confusion for the user when locating a desired application icons on the page, and/or it is less likely to cause issues with reflowing the application icons on the page when the configuration of the page is altered by subsequent changes (e.g., addition, deletion, and rearrangement of application icons and widgets on the page in accordance with additional user inputs). This feature enhances the operability of the device (e.g., by allowing users to select the placement location of the automatically selected application icons while maintaining an organized layout on the page of the user-selected location), and makes the user-device interface more efficient (e.g., by reducing user mistakes when operating/interacting with the device), which improves battery life of the device (e.g., by helping the user to use the device more quickly and efficiently).

On some computer systems, application icons on a home screen user interface may be arbitrarily arranged according to user's inputs, or arranged in a fixed grid with a predetermined sequential order. As application icons are inserted into or deleted from a page of a home screen user interface, application icons are reflowed sequentially according to the predetermined sequential order. However, these reflow method does not take into account of the impact of having both application icons and user interface objects containing application content on the same page of the home screen user interface. If arbitrary positioning of objects are allowed, the page may quickly become disorganized and difficult to use when different sized objects (e.g., application icons and widgets) are moved around, added, and/or deleted. Such sequential reflow of objects that are all of the same size is not suitable for a page that includes objects of varying sizes, simply continuation of the same reflowing strategy will cause disorganization as well as erroneous end results in the layout of the pages. As disclosed herein, various rules for providing visual feedback and reflowing application icons and/or user interface objects containing application content (e.g., widgets) on one or more pages of a home screen user interface are introduced for use in various situations when application icons and/or user interface objects containing application content are inserted into, deleted from, and/or moved relative to the one or more pages. In some embodiments, rules are implemented to avoid one or more configurations of the page that are more likely to result in aggregation of alignment issues and/or more likely to contribute to disorganization of the pages and user confusion overtime. In some embodiments, rules are implemented to provide visual feedback (e.g. through automatic organization into blocks, reflowing and moving as blocks, etc.) about how a page will be organized if a user interface object containing application content is inserted into the page before the user input is ended and the user interface object containing application content is actually inserted into the page, and/or before the user input selects any specific placement location for the user interface object containing application content on the page. In some embodiments, rules are implemented to provide visual feedback about a suitable and/or required placement location in a page, as soon as the user interface object containing application content is dragged onto the page, such that the user becomes aware of such recommendation or limitation for the placement location without having to make any unsuccessful attempts to drop the user interface object at unpermitted placement locations. These feature enhance the operability of the device (e.g., by providing suitable visual feedback and guidance to the user when the user provides input to reorganize the pages of the home screen user interface), and makes the user-device interface more efficient (e.g., by reducing user mistakes when operating/interacting with the device), which improves battery life of the device (e.g., by helping the user to use the device more quickly and efficiently).

On some computer systems, a widget can be added into a widget screen user interface from a user interface showing a listing of applications that have available widgets, or from a dedicated application for creating a particular type of customized widget (e.g., an application that creates a home screen widget for weather forecasting, an application that creates a widget for saving bookmarks, etc.). These methods do not provide a preview of multiple preconfigured widgets corresponding to different applications in the same user interface and does not provide easy means to access both the configuration options for modifying a preconfigured widget and inserting the widget as preconfigured to a user-selected location. As disclosed herein, a widget selection and configuration user interface displays a collection of preconfigured widgets from multiple applications. From the widget selection and configuration user interface, widget-specific configuration options for a preconfigured widget and/or widget stack can be accessed and the preconfigured widget and/or widget stack can be directly added to another user interface. As disclosed herein the widget selection and configuration user interface serves the function of a mini library of preconfigured widgets and/or widget stacks, but also allows access to widget-specific configuration options for preconfigured widgets and/or widget stacks. The widget selection and configuration user interface and the widget-specific configuration user interface optionally display the widgets with the currently selected configuration options, and real-time data from the widget(s) corresponding application(s). The widget selection and configuration user interface that serves the combined functions of allowing the user to view preconfigured widgets and providing access to configuration options for the widgets, as well as allowing the user to select and insert/move one or more widgets from the widget selection and configuration user interface or widget-specific configuration user interface to another user-selected location improves enhances the operability of the device (e.g., by making it easier to discover widgets and adding widgets to another location) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

Below, FIGS. 1A-1C, 2, and 3 provide a description of example devices. FIGS. 4A-4B, and 5A1-5A36, 5B1-5B19, 5C1-5C73, 5D1-5D12, 5E1-5E32, 5F1-5F30, 5G1-5G31, 5H1-5H76, and 5I1-5I18 illustrate example user interfaces for displaying and interacting with user interface objects (e.g., application icons, mini-application objects, etc.) corresponding to different applications, example user interfaces for reconfiguring the multipage home screen user interface, example user interfaces for inserting a user interface object containing application content (e.g., mini application objects, widgets, etc.) into a page of a home screen user interface (e.g., a single page or multipage home screen user interface), example user interfaces for selection for display and updating user interface objects containing application content (e.g., mini application objects, widgets, etc.) that are associated with a placement location in a page of a home screen user interface (e.g., a single page or multipage home screen user interface), example user interfaces interacting with a plurality of user interface objects containing application content that is associated with a common placement location (e.g., a widget or mini application object stack, etc.), example user interfaces for interacting with multiple pages of a home screen user interface (e.g., in an icon reconfiguration mode, in a page editing mode, and when transitioning between the two modes, etc.), example user interfaces for displaying and interacting with a user interface object that presents application icons that are automatically selected by a computer system at a user selected location, various ways that existing user interface objects corresponding to different applications (e.g., application icons, widgets, etc. of various sizes) on a page of a home screen user interface are moved and/or rearranged during a reconfiguration mode (e.g., in accordance with repositioning, deletion, addition, passing through, removal, etc. of one or more user interface objects corresponding to different applications), and example user interfaces for configuring user interface objects containing application content (e.g., widgets, mini application objects, etc.) and adding the same to another user interface, in accordance with some embodiments. FIGS. 6A-6K, 7A-7H, 8A-8M, 9A-9H, 10A-10H, 11A-11D, 12A-12F, 13A-13H, and 14A-14G are flow diagrams of methods of displaying and interacting with user interface objects corresponding to different applications, of reconfiguring the multipage home screen user interface, of inserting a user interface object containing application content into a page of a home screen user interface, of selecting for display and updating user interface objects containing application content that are associated with a placement location in a page of a home screen user interface, interacting with a plurality of user interface objects containing application content that is associated with a common placement location, of interacting with multiple pages of a home screen user interface, of displaying and interacting with a user interface object that presents application icons that are automatically selected by a computer system at a user selected location of moving and/or rearranging existing user interface objects corresponding to different applications on a page of a home screen user interface during a reconfiguration mode, and of configuring user interface objects containing application content and adding the same to another user interface, in accordance with some embodiments. The user interfaces in FIGS. 4A-4B and 5A-5A36, 5B1-5B19, 5C1-5C73, 5D1-5D12, 5E1-5E32, 5F1-5F30, 5G1-5G31, 5H1-5H76, and 5I1-5I18 are used to illustrate the processes in FIGS. 6A-6K, 7A-7H, 8A-8M, 9A-9H, 10A-10H, 11A-11D, 12A-12F, 13A-13H, and 14A-14G.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments is, optionally, practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs will, in some circumstances, invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
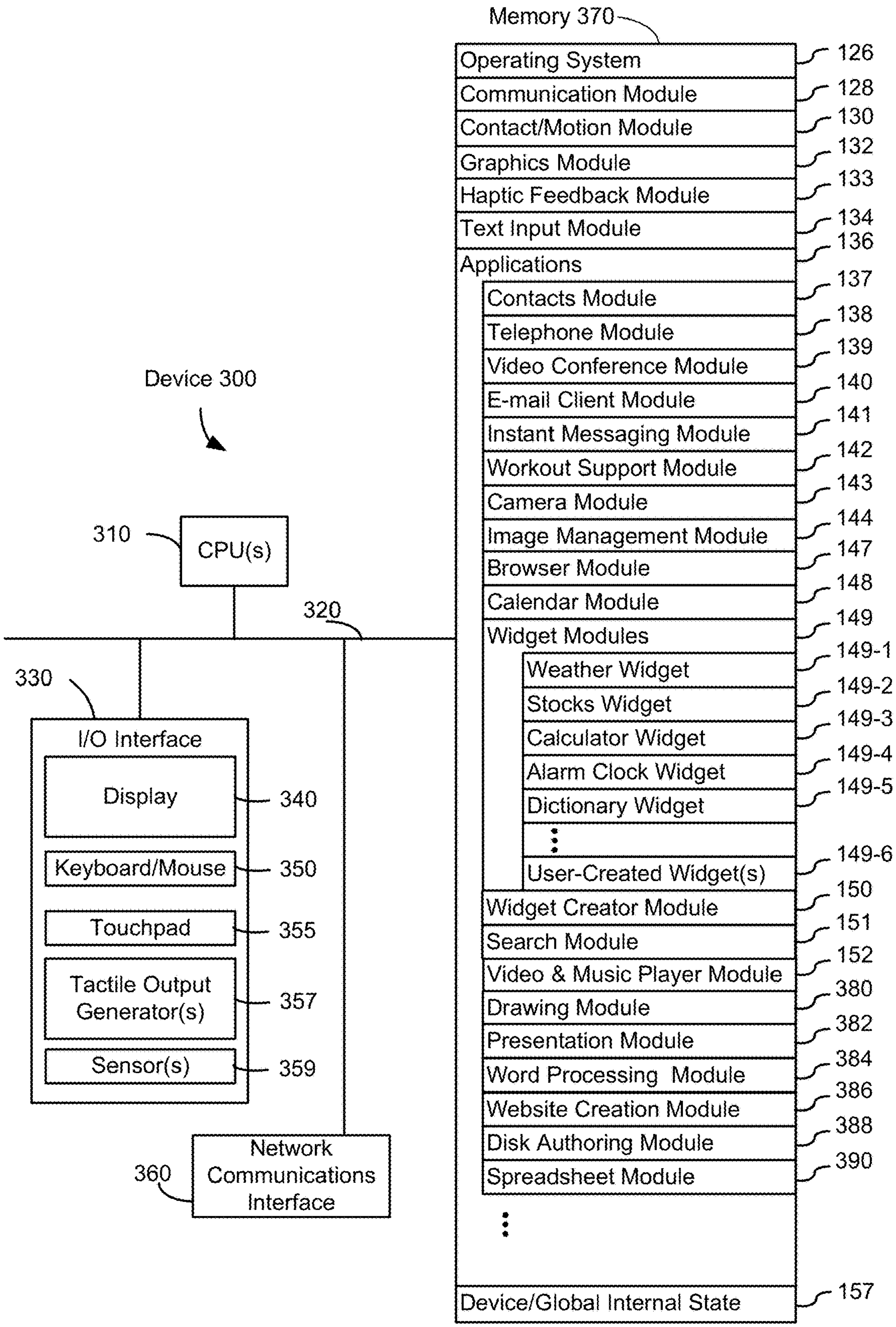
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS)

and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
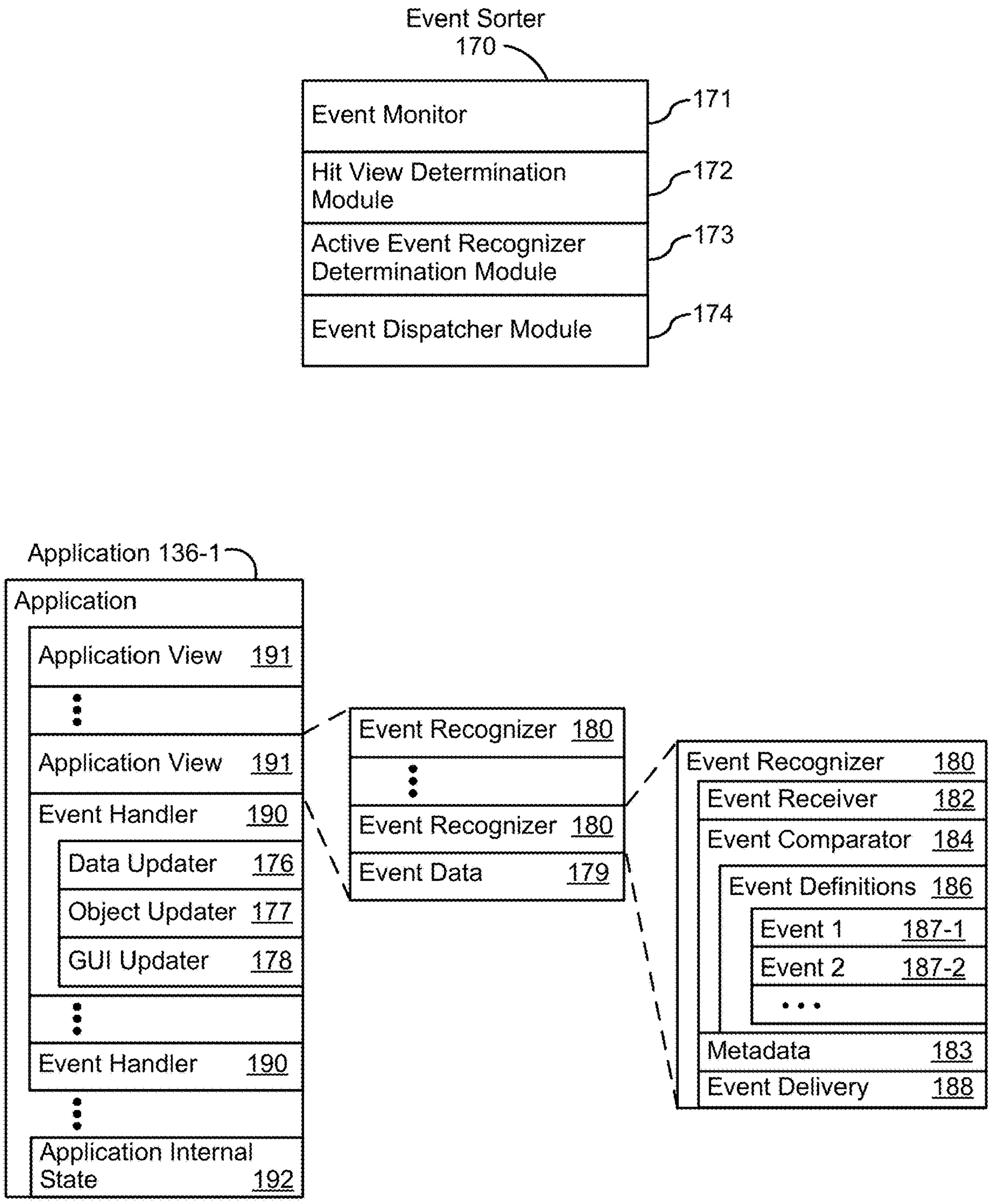
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
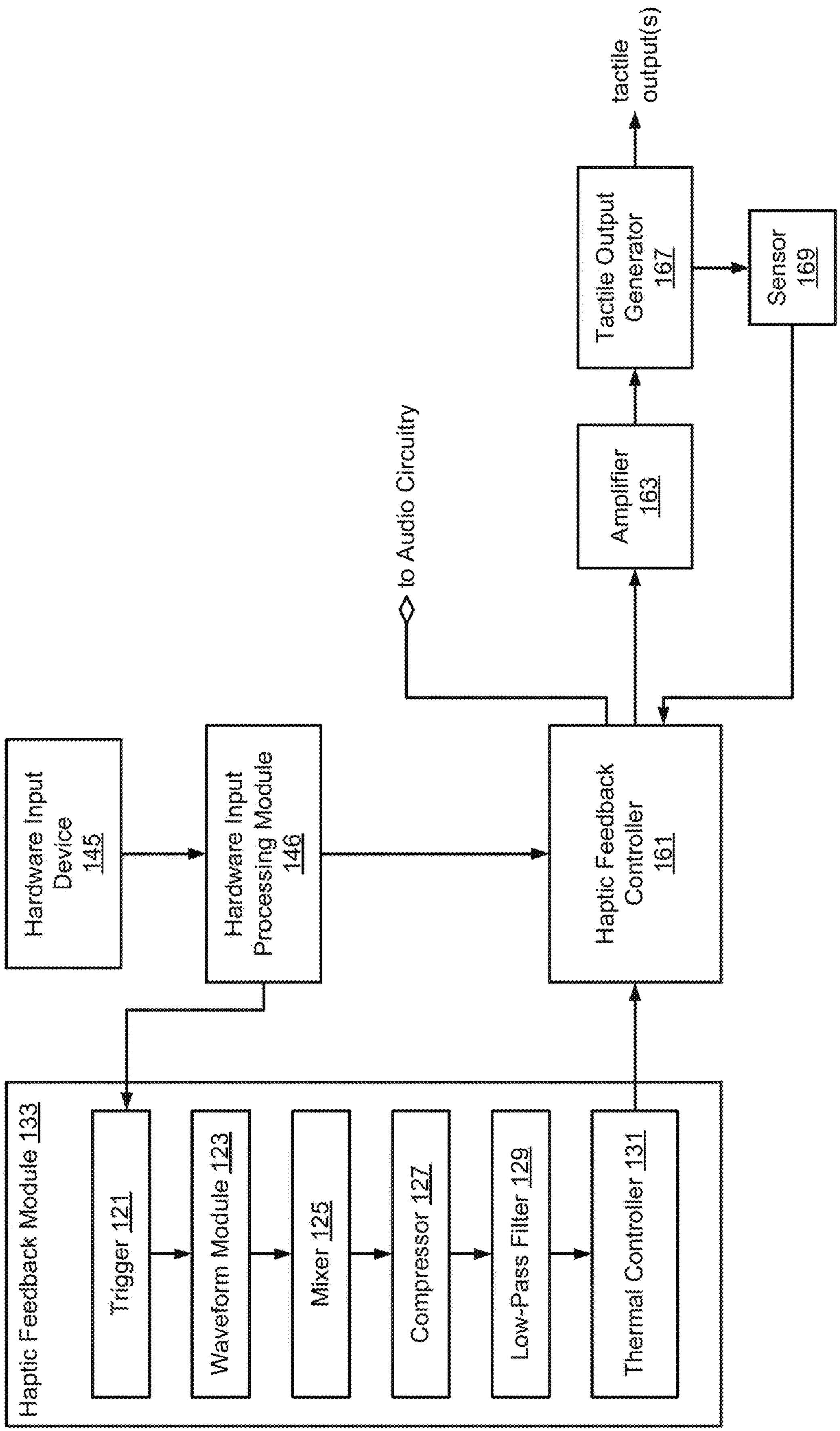
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
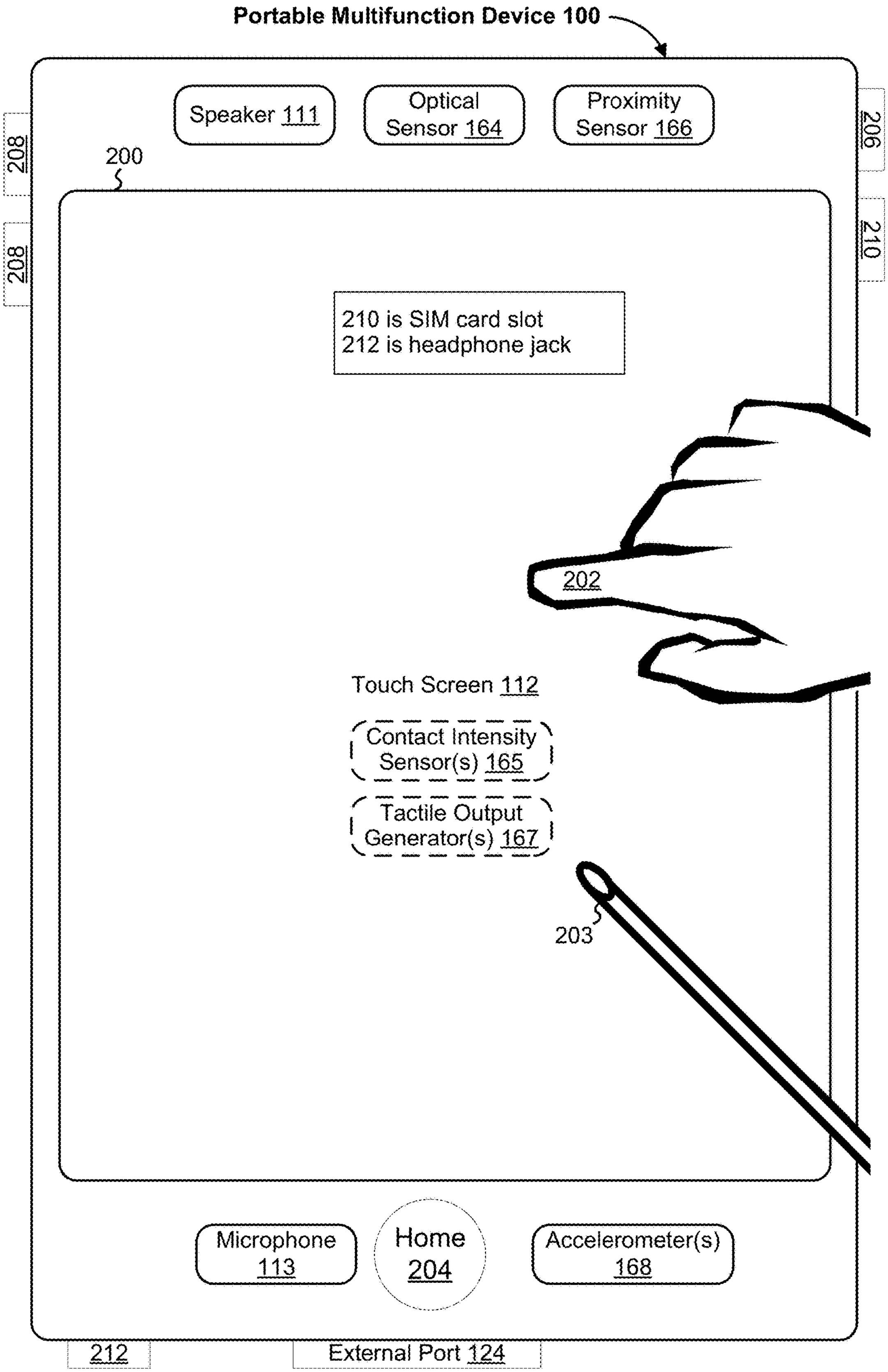
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("U") that are, optionally, implemented on portable multifunction device 100.

Figure 4A:
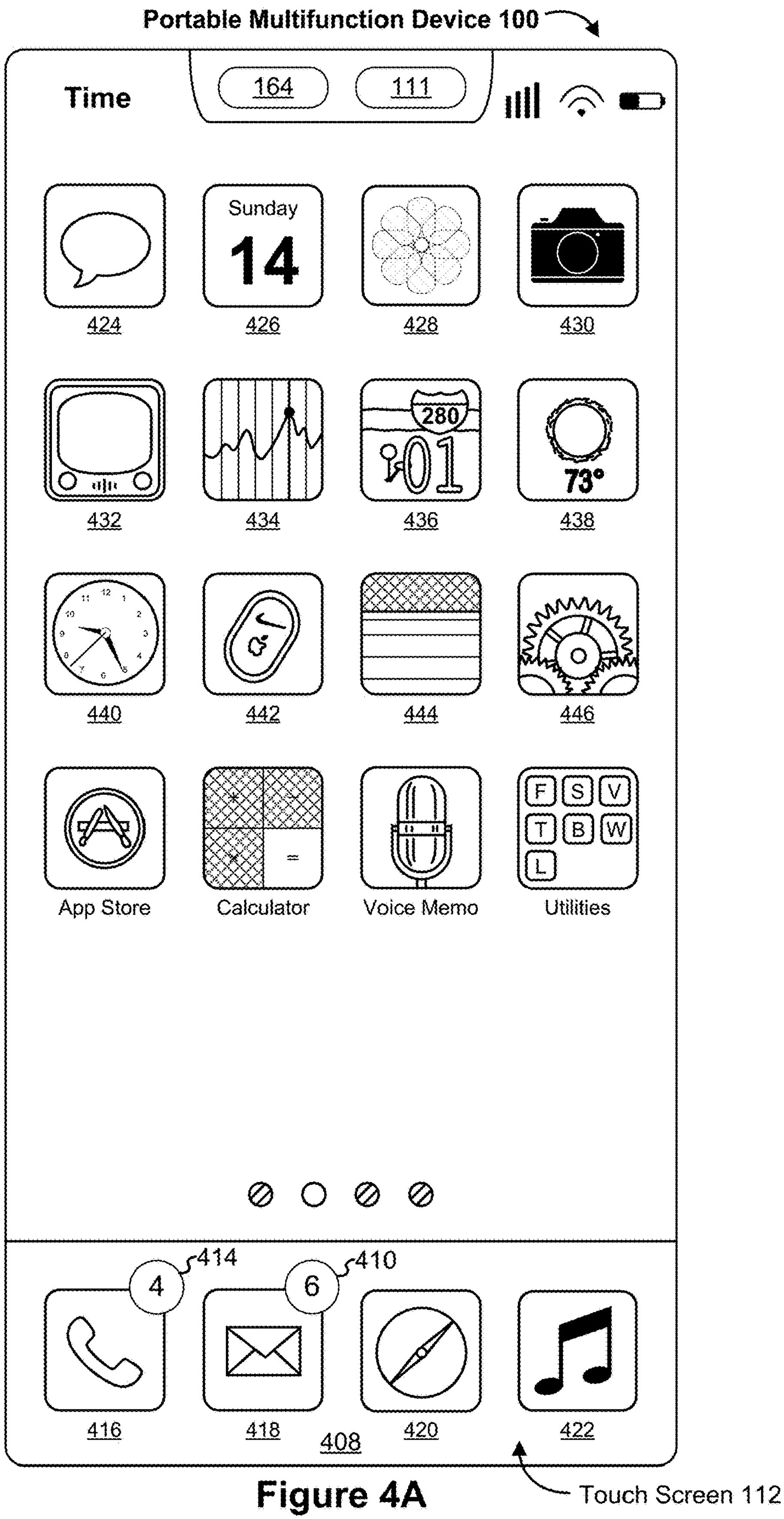
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, labeled "Music;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
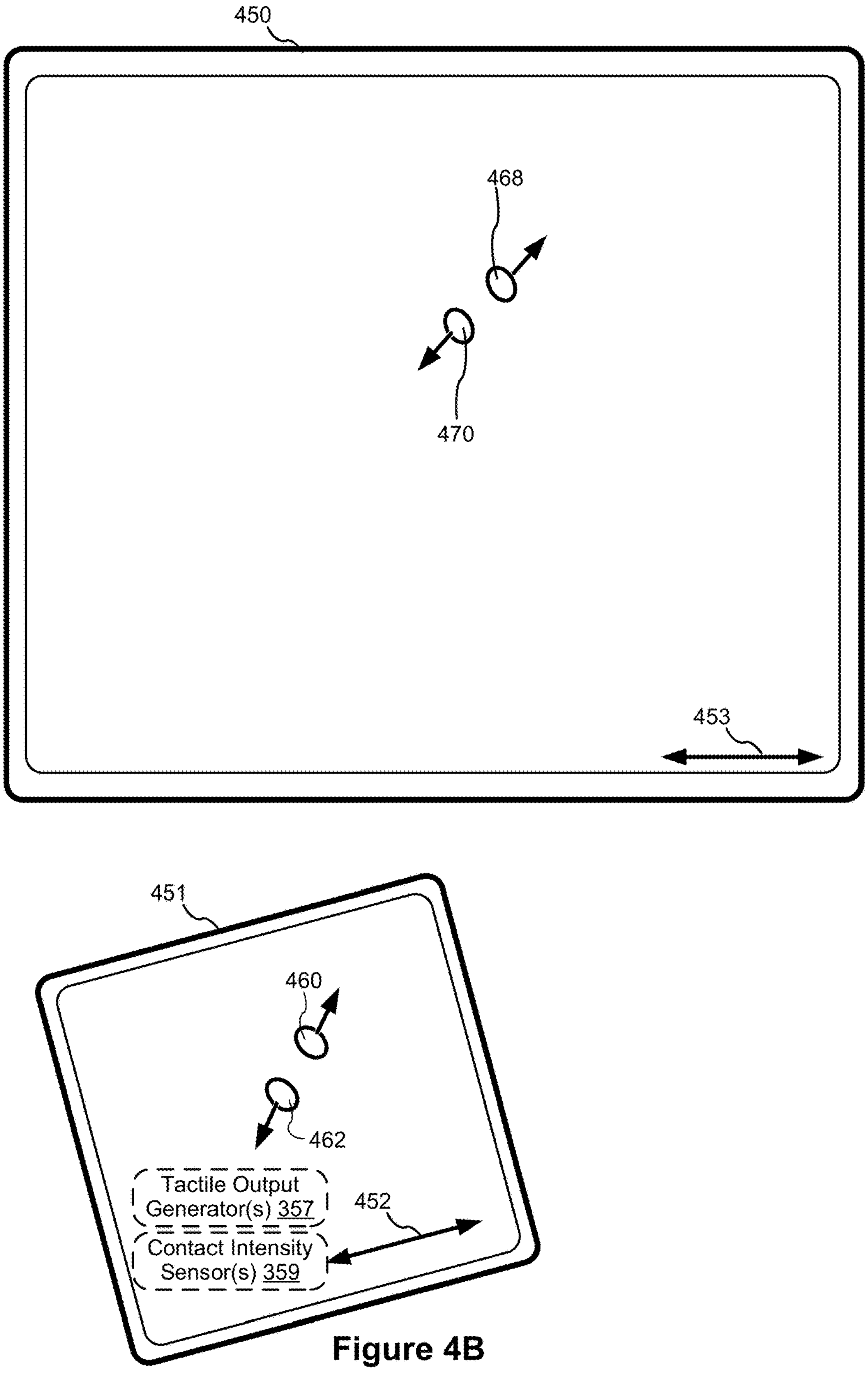
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that will, in some circumstances, otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location (e.g., a drag gesture), at which point the intensity of the contact increases. In this example, the characteristic intensity of the contact at the end location is, in some circumstances, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams (e.g., 5530) that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
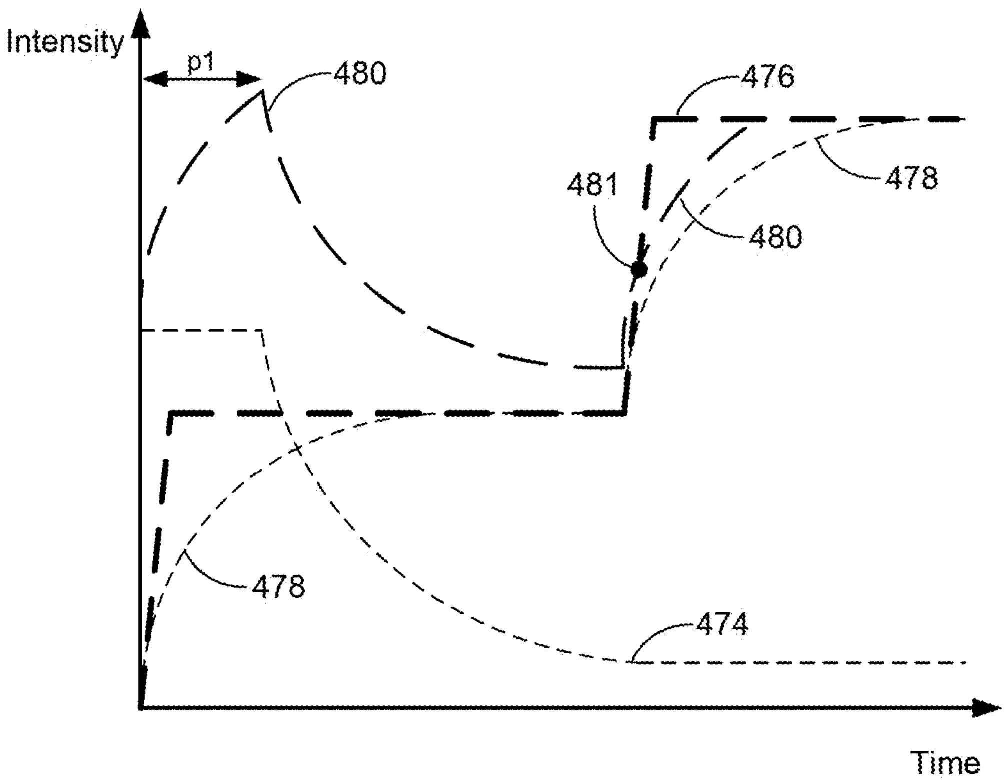
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
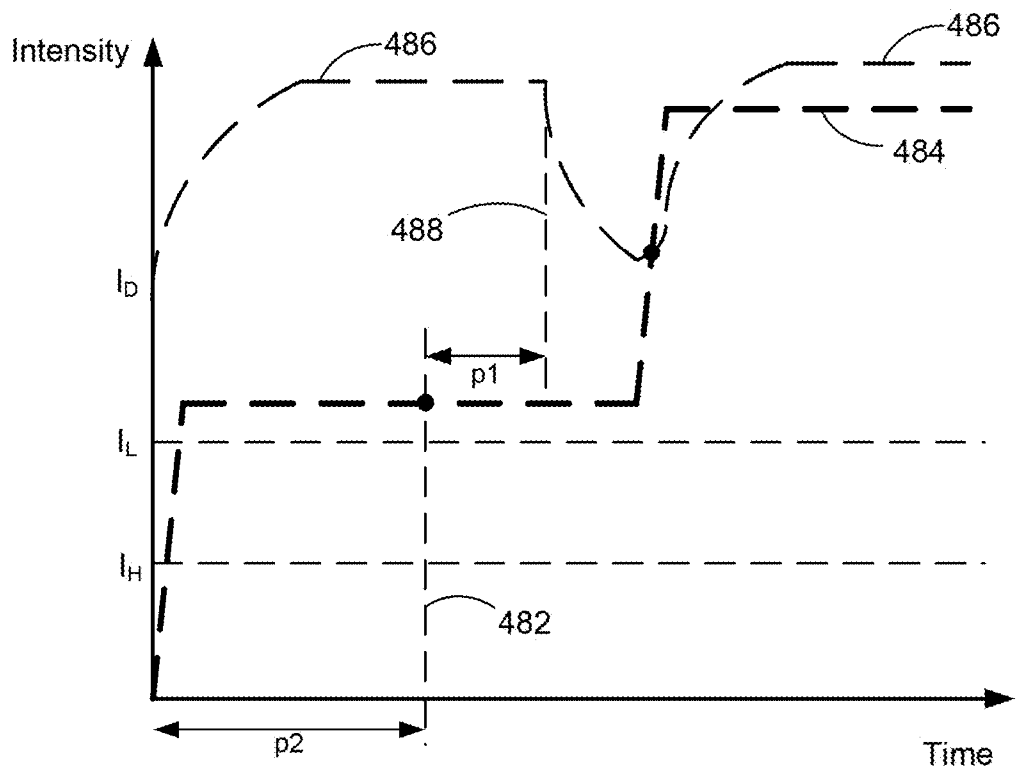

FIG. 4D illustrates another dynamic intensity threshold 486 (e.g., intensity threshold $I_D$). FIG. 4D also illustrates two other intensity thresholds: a first intensity threshold $IT_H$ and a second intensity threshold $I_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $I_L$.

Figure 4E:
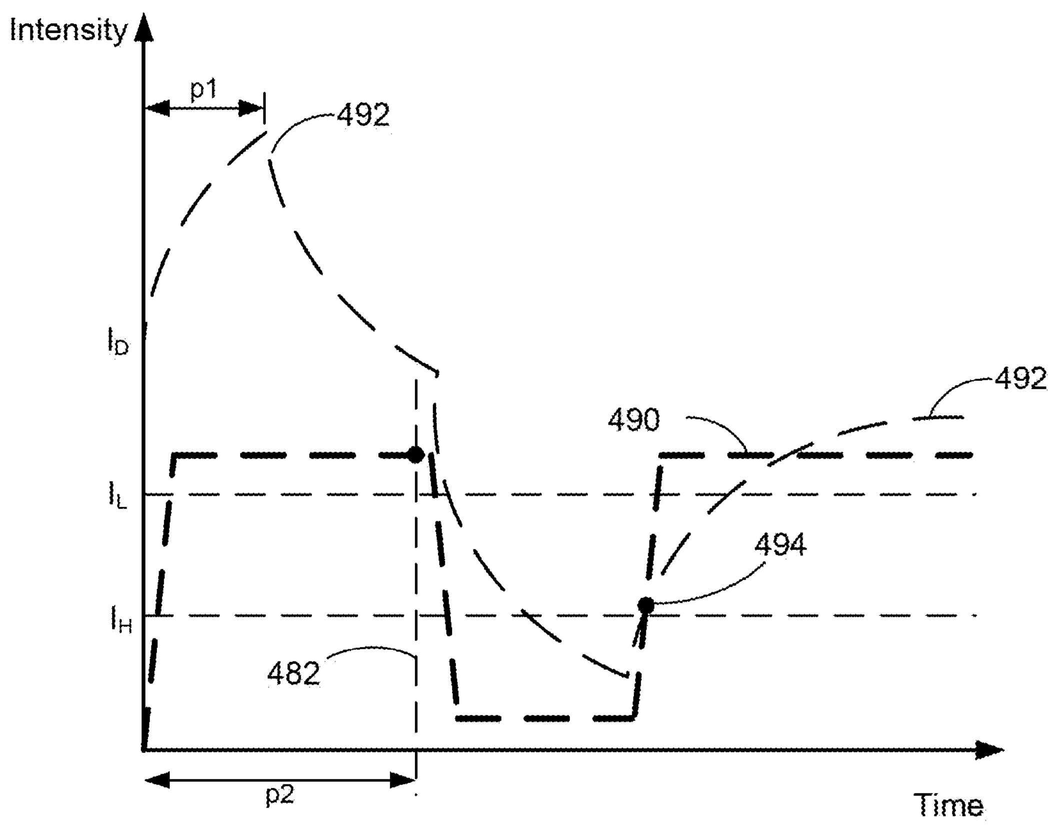
Figure 7A:
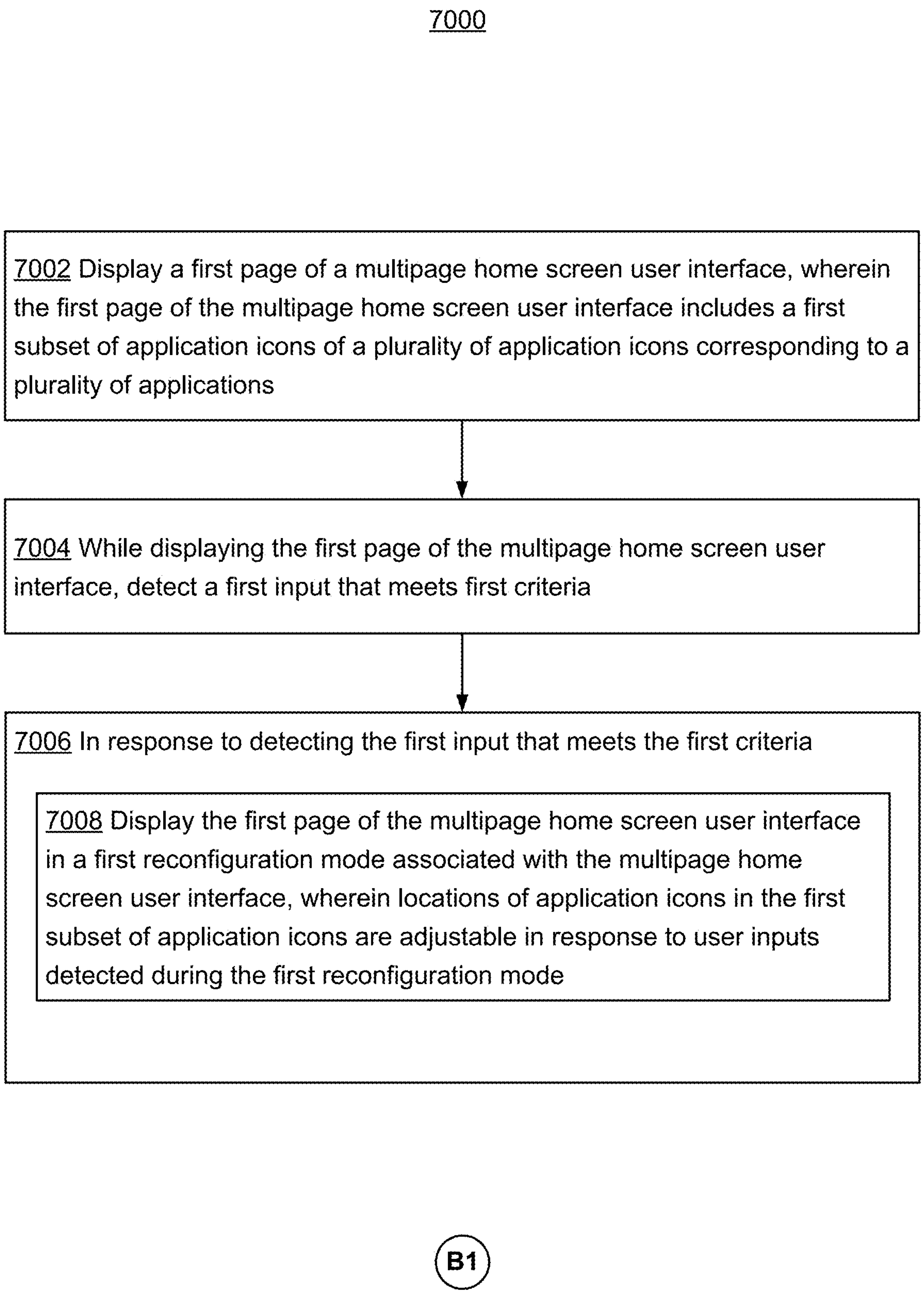
Figure 7B:
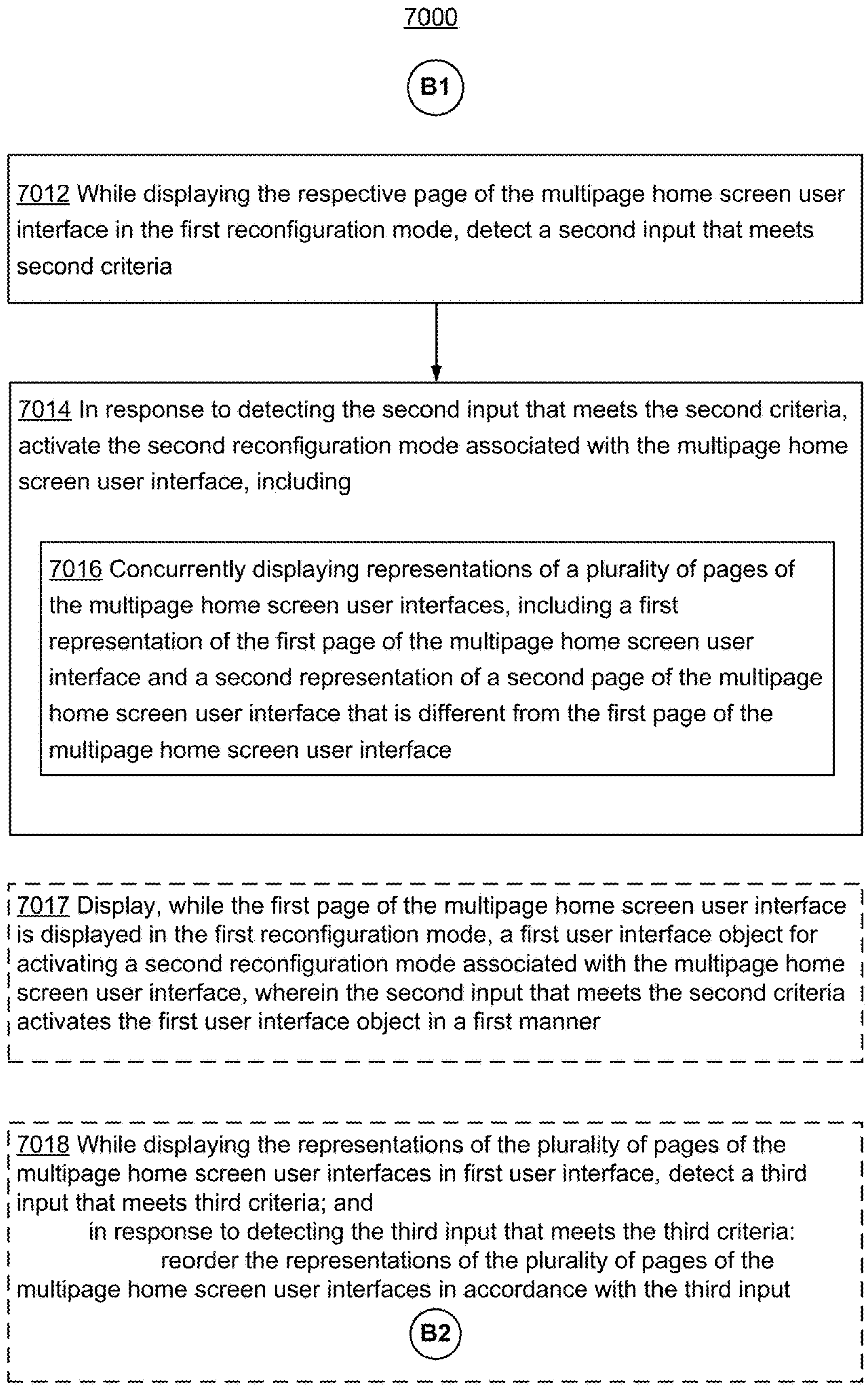
Figure 10A:
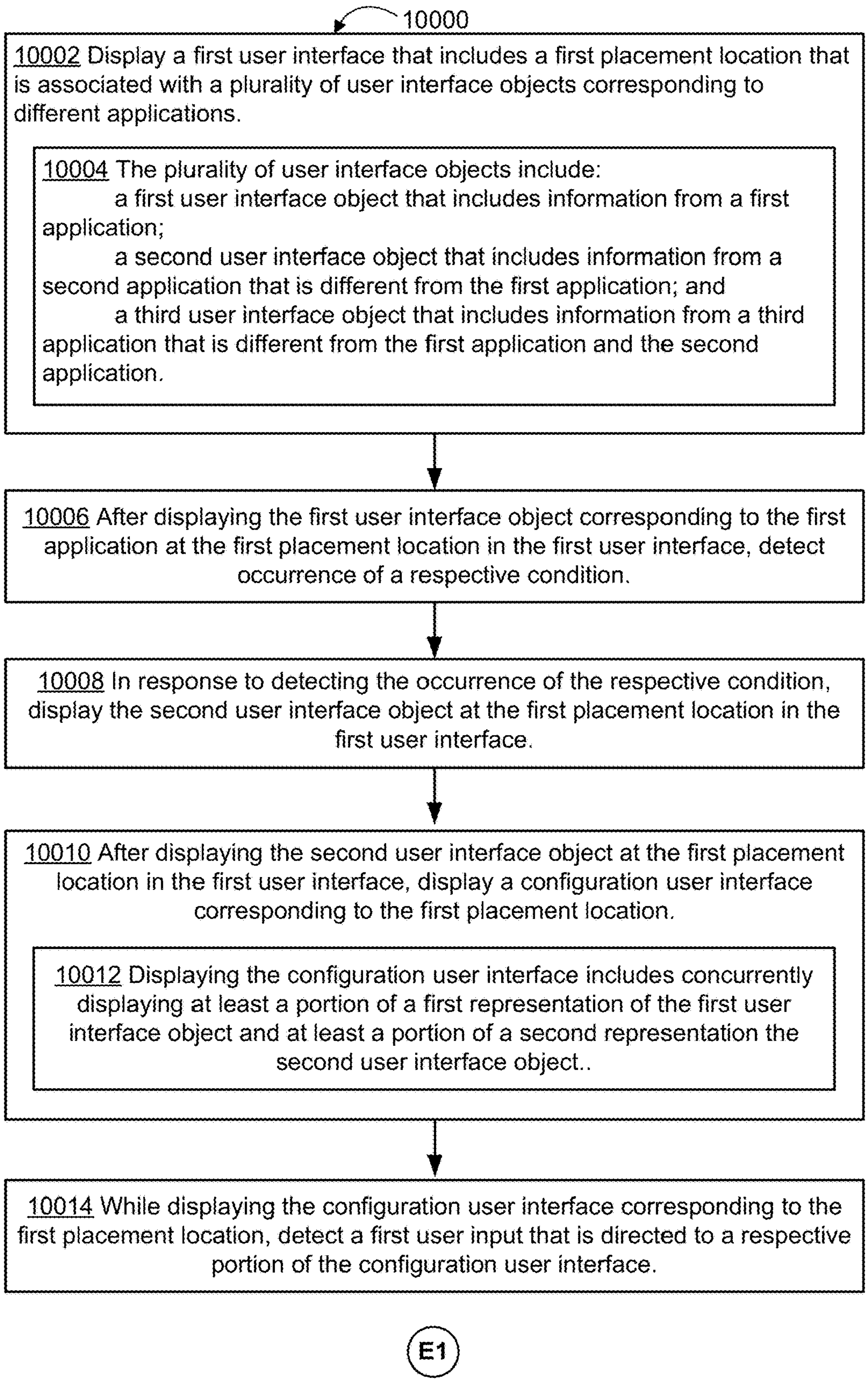

FIG. 4E illustrate yet another dynamic intensity threshold 492 (e.g., intensity threshold $I_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that are, optionally, implemented on an electronic device, such as portable multifunction device 100 or device 300, with a display, a touch-sensitive surface, and (optionally) one or more sensors to detect intensities of contacts with the touch-sensitive surface.

FIGS. 5A1-5A36 illustrate example user interfaces for displaying and interacting with user interface objects corresponding to different applications in accordance with some embodiments. The user interfaces in these figures are used to illustrate the processes described below, including the processes in FIGS. 6A-6K. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device without a home button, and a gesture meeting predefined criteria is used to cause dismissal of a currently displayed user interface and display of the home screen user interface. Although not shown in FIGS. 5A-5A36, in some embodiments, a home button (e.g., a mechanical button, a solid state button, or a virtual button) is included on the device and is used to cause dismissal of a currently displayed user interface and display of the home screen user interface (e.g., displaying a last displayed or a default page of the home screen user interface in response to a single press input).

FIGS. 5A1-5A36 illustrate example user interfaces for displaying and interacting with user interface objects corresponding to different applications on a multipage home screen user interface (e.g., including two or more user-arranged home screens and a system-arranged home screen arranged in a predefined sequence in a first page navigation direction (e.g., from left to right)), in accordance with some embodiments. The user interface objects corresponding to different applications include application icons and optionally user interface objects including application content from respective applications (e.g., widgets, mini application objects, etc.), in accordance with some embodiments. In some embodiments, both the application icons and the user interface objects including application content are configured to launch their corresponding applications when activated by a first type of input (e.g., a tap input at a location of the application icon or user interface object containing application content). In some embodiments, user interface object including application content is updated (e.g., by the operating system or by the applications) according to content and/or instructions provided their corresponding applications, while the applications remain dormant or operating in the background.

FIGS. 5A1-5A4 illustrate examples of navigating between different home screen user interfaces, in accordance with some embodiments.

FIG. 5A1 shows a first user-arranged page 5050 of a multipage home screen user interface (also referred to as "user-arranged home screen 5050). The user-arranged home screen 5050 includes a plurality of application icons (application icons 5008*a*-5008*m*) arranged in a preset layout (e.g., on a 5×4 grid). In some embodiments, the plurality of application icons is user-selected and are placed at respective positions on the user-arranged home screen 5050 in accordance with user inputs. In some embodiments, the user-arranged home screen 5050 includes page navigation element 5004 indicating both the total number of pages in the multipage home screen user interface, the position of the currently displayed page in the sequence of pages of the multipage home screen user interface. For example, as shown in FIG. 5A1, navigation element 5004 includes a sequence of page dots or page indicator icons corresponding to respective pages in the sequence of pages. Page indicator icon 5004*a* is highlighted relative to the other page indicator icons in the page navigation element 5004, indicating that the currently displayed page 5050 of the multipage home screen user interface is the third page of a total five pages of the multipage home screen user interface. In some embodiments, the multipage home screen user interface includes a widget page and a system-arranged page at the beginning and end of the sequence of pages. In some embodiments, the multipage home screen user interface includes the widget page and the system-arranged page as overlays that is displayed over a user-arranged page of the multipage home screen user interface (e.g., over the beginning and end pages of the sequence of user-arranged pages). In this example, the widget page and the system-arranged page are respectively the beginning and end pages of the sequence of pages of the multipage home screen user interface. In FIG. 5A1, at the bottom of the user-arranged page 5050 of the multipage home screen user interface, a plurality of preconfigured application icons (application icons 5008*n*-5008*q*) are displayed in a dock. In some embodiments, the plurality of preconfigured icons in the dock are for most-frequently used applications. In some embodiments, an application icon may be displayed with a badge (e.g., badge 5010*b* for the telephony application, and badge 5010*a* for the calendar application, etc.) that indicates a number of notifications received from a corresponding application of the application icon. In some embodiments, the dock that is shown in the bottom portion of user-arranged page 5050 is shown on other pages of the multipage home screen user interface (e.g., some or all user-arranged pages, all pages except for the widget screen and the system-arranged home screen, etc.) at the same location on the display 112. In some embodiments, the page navigation element 5004 displayed on the user-arranged page 5050 is also shown on other pages of the multipage home screen user interface (e.g., all user-arranged pages, all pages including the widget screen and the system-arranged home screen, etc.) at the same location on the display 112, except different page indicator icons are highlighted to show which page is currently being displayed.

FIGS. 5A1-5A3 shows navigation from the user-arranged page 5050 to another user-arranged page 5052 in a first navigation direction (e.g., a forward direction through the sequence of pages of the multipage home screen user interface) specified by a navigation input (e.g., a leftward swipe gesture on the user-arranged page 5050, a tap input on the page indicator icon 5004*b* for the user-arranged page 5052, etc.). FIG. 5A1 shows a tap input by contact 5500 and a swipe input by contact 5502, that are separate inputs and are not concurrently detected. The tap input by contact 5500 is detected at a location on the touch-screen that corresponds to page indicator icon 5004*b*. In response to the tap input by contact 5500, the device displays a different home screen user interface corresponding to page indicator icon 5004*b*, namely page 5052 shown on FIG. 5A3. In some embodiments, to detect a tap input, the device detects liftoff of contact 5500 within a first threshold amount of time (e.g., the required amount of time for detecting a touch-hold input) of the touch-down of contact 5500, without detecting substantial movement of contact 5500 (e.g., contact is substantially stationary) since touch-down of the contact. The swipe input by contact 5502 is detected after contact 5502 touched down at a location that corresponds to application icon 5008*a*. In some embodiments, the device detects the swipe input by contact 5502 when the device detects substantial movement (e.g., with more than a nominal amount of movement within a nominal threshold amount of time) after the touch-down of contact 5502, before contact 5502 has been maintained substantially stationary for a threshold amount of time (e.g., before a touch-hold input is detected). In some embodiments, a swipe input by contact 5502 does not need to be detected on any particular application icon, and is optionally detected at an unoccupied area of the currently displayed page 5050. In some embodiments, a swipe input that starts from page indicator icon 5004*a* and ends on page indicator icon 5004*b* also causes navigation from page 5050 to page 5052. In some embodiments, if a swipe input is used to specify the navigation direction through the pages of the multipage home screen user interface, the computer system does not require the swipe input to start from an edge of the input. Instead, the computer system detects a swipe input that starts at a respective location on the currently displayed page, and in response to detecting the swipe input: in accordance with a determination that the swipe input is in a first direction, the computer system navigates from the current page to the next page in a first navigation direction through the sequence of pages (e.g., forward direction); and in accordance with a determination that the swipe input is in a second direction, the computer system navigates from the current page the another next page in a second navigation direction through the sequence of pages (e.g., backward direction).

In FIG. 5A2, the user-arranged page 5050 of the multipage home screen user interface, including application icons 5008*a*-5008*m* and other concurrently displayed user interface elements, are shown moving in accordance with the movement of contact 5502 to the left, dragging a previously undisplayed user-arranged page of the home screen onto the display (e.g., the next user-arranged page in the forward direction through the sequence of pages). In some embodiments, the user-arranged page 5050 moves in accordance with tap input 5500 on page indicator icon 5004*b*.

In FIG. 5A3, the next user-arranged page 5052 of the multipage home screen user interface (e.g., previously undisplayed user-arranged home screen 5052) is displayed as a result of the swipe input by contact 5502, replacing the previously-displayed user-arranged page 5050. User-arranged page 5052 of the multipage home screen user interface includes an additional plurality of application icons 5008*r*-5008*w* (e.g., a different set of user-selected application icons from the plurality of application icons on the user-arranged page 5050). In FIG. 5A3, as a result of changing the displayed user-arranged home screen, navigation element 5004 is updated with page indicator icon 5004*a* de-highlighted and page indicator icon 5004*b* highlighted.

FIG. 5A4 follows FIG. 5A3. FIGS. 5A3-5A4 illustrate continued navigation from the user-arranged page 5052 to a system-arranged user interface (e.g., a system-arranged home screen 5054, or another user interface that includes automatically generated application groupings, etc.), in accordance with some embodiments.

Similar to FIG. 5A1, FIG. 5A3 shows a leftward swipe input by contact 5506. The swipe input by contact 5506 is detected after contact 5506 touched down at a respective location in the user-arranged page 5052 of the multipage home screen user interface (e.g., optionally, not at a location of application icon 5008). In some embodiments, the device detects the swipe input by contact 5506 when the device detects substantial movement (e.g., with more than a nominal amount of movement within a nominal threshold amount of time) after the touch-down of contact 5506, before contact 5506 has been maintained substantially stationary for a threshold amount of time (e.g., before a touch-hold input is detected). In response to the swipe input by contact 5506 and in accordance with a determination that the movement of contact 5506 has exceeded a predefined threshold amount of movement (e.g., half of the display width) to complete the page navigation operation, a system-arranged page 5054 of the multipage home screen user interface is displayed as a result of swipe input by contact 5506, replacing the previously-displayed user-arranged home screen 5052, as shown in FIG. 5A4. In some embodiments, the system-arranged page 5054 is part of the sequence of pages of the multipage home screen user interface and is represented by a corresponding page indicator icon (e.g., page indicator icon 5004*c*) in the page navigation element 5004. In some embodiments, a tap input by contact 5504 is detected at a location on the touch-screen that corresponds to page indicator icon 5004*c*. In response to the tap input by contact 5504, the device displays the system-arranged page 5054 (shown in FIG. 5A4) of the multipage home screen user interface corresponding to page indicator icon 5004c. In some embodiments, a swipe input on the page navigation element 5004 from the page indicator icon 5004b to the page indicator icon 5004c the device displays the system-arranged page 5054 shown in FIG. 5A4. In some embodiments, the system-arranged home screen 5054 is replaced by an application library user interface 5054' that overlays the last user-arranged page of the home screen user interface. In some embodiments, another system-arranged user interface that includes similar automatic groupings of application icons is displayed in place of the system-arranged page 5054.

FIG. 5A4 shows the system-arranged home screen 5054 of the multipage home screen user interface, in accordance with some embodiments. The system-arranged home screen 5054 differs from user-arranged home screen 5050 and 5052 in that system-arranged home screen 5054 has a layout (e.g., positions and grouping) for application icons and user interface objects containing application content that is automatically generated without user input, whereas user-arranged home screen 5052 and 5050 have layouts (e.g., positions and grouping) for application icons and user interface objects containing application content that are user-configured. In some embodiments, the device generates the system-arranged home screen 5054 by assigning (e.g., categorizing, clustering, grouping, etc.) application icons that share one or more characteristics under the same automatically generate application grouping. For example, FIG. 5A4 shows that system-arranged home screen 5054 includes an application grouping corresponding to "communication" (e.g., represented by grouping icon 5020a), an application grouping corresponding to "recently added" (e.g., represented by grouping icon 5020b), an application grouping corresponding to "utilities" (e.g., represented by grouping icon 5020c), and an application grouping corresponding to "productivity" (e.g., represented by grouping icon 5020d), etc. In some embodiments, the same application icon may be included in more than one application groupings. For example, application icon 5008o (representing an "email" application) is included in the application groupings corresponding to grouping icons 5020a, 5020b, and 5020c. In some embodiments, the "recently added" application grouping represented by grouping icon 5020b includes applications recently added to device 100 by a user. In some embodiments, the "recently added" application grouping includes applications added by device (e.g., automatically installed).

In some embodiments, search input area 5030 is displayed at the top of system-arranged home screen 5054. The search input area 5030 can be used to search applications and optionally widgets available on the device (e.g., available on the user-arranged pages of the multipage home screen user interface). In some embodiments, the search input area 5030 displayed on the system-arranged home screen automatically applies a filter than only applications and optionally widgets that meet the search criteria received via the search input area will be returned as search results. In some embodiments, the search is performed on applications and optionally widgets that are currently installed on the device (e.g., not including deleted applications and widgets, or applications that are available in the app stores but not installed). In some embodiments, the search is performed on applications and optionally widgets that are installed regardless of whether they are currently available via a visible user-arranged home screen of the home screen user interface (e.g., including applications and optionally widgets that are on hidden pages or previously deleted pages of the multipage home screen user interface, as well as applications and optionally widgets that are on visible pages of the multipage home screen user interface). In some embodiments, a corresponding search input area is available on the beginning page of the multipage home screen user interface which is a widget screen displaying a listing of widgets corresponding to different applications installed on the device. In some embodiments, the search input area available on the widget screen returns search results that include applications and optionally widgets, as well as other types of information, such as content from installed applications (e.g., messages, emails, contacts, logs, game history, webpages, photos, etc.). In some embodiments, a corresponding search input area is optionally made available on multiple (e.g., some, all, each, etc.) of the user-arranged pages of the multipage home screen user interface (e.g., in response to a downward swipe detected on the page (e.g., a downward swipe from the top edge of the user interface, or from any area within the user interface, etc.)). In some embodiments, the search input area on a user-arranged page has the same function as that on the system-arranged page of the multipage home screen user interface. In some embodiments, the search input area on a user-arranged page has the same function as that on the widget screen. Additional features of the search input area are described in FIGS. 5A15-5A20 and accompanying descriptions.

In some embodiments, the system-arranged home screen 5054 optionally includes one or more widgets (e.g., widgets 5022a and 5022b) (e.g., also referred to as user interface objects including application content, or mini application object) (e.g., including widgets that are also available on the user-arranged home screens, and optionally widgets that are automatically selected by the system). Unlike an application icon, a widget is a mini-application object that displays information or provide a function of a corresponding application without requiring the application itself to be displayed. For example, system-arranged home screen 5054 includes widget 5022a for a weather application that displays weather information for a selected city and widget 5022b for a clock application that shows time information around the globe (e.g., time information for multiple locations around the globe). In some embodiments, the system-arranged home screen 5054 includes a recommended applications widget 5055 that displays respective application icons for a plurality of recommended applications that are automatically identified from the applications installed on the device based on the user's individual usage patterns, and optionally, average usage patterns of a large number of users.

FIG. 5A4 shows various contacts and touch inputs that are detected on the system-arranged home screen 5054 in different example scenarios, including a swipe input by contact 5508, respective tap inputs by contacts 5110, 5112, and 5114. In some embodiments, in response to detecting a contact on the touch-screen 112, the device determines the type of the input, the starting location of the input, the movement direction and movement distance of the input (if any), current location and movement characteristics of the input, and/or the termination of the input, etc., and based on the type, location, movement direction, movement distance, termination state, etc., performs a corresponding operation.

FIGS. 5A4-5A6 illustrate an example of navigating the system-arranged home screen 5054 in response to a swipe input, in accordance with some embodiments. For example, in response to the upward swipe input by contact 5508 (e.g., starting on an application icon or on an unoccupied area of the home screen), the system-arranged home screen 5054 or portions thereof are scrolled upward to show previously-undisplayed portions of the system-arranged home screen 5054. For example, in FIG. 5A5, the application groupings represented by grouping icons 5020*a*-5020*d* are moved upwards in accordance with the upward swipe input by contact 5508. Previously undisplayed application grouping corresponding to "entertainment" (e.g., represented by grouping icon 5020*e*) and application grouping corresponding to "system" (e.g., represented by grouping icon 5020*f*) are shown below widget 5022*b* due to the swipe input by contact 5508 moving upward. In some embodiments, there can be an indefinite number of user-arranged home screens and only a single system-arranged home screen in the multipage home screen user interface, and the system-arranged home screen has an indefinite extent in one dimension and is scrollable (e.g., scrollable in the vertical direction), while the user-arranged home screen is a fixed sized page and not scrollable. As shown in FIG. 5A6, as the swipe input by contact 5508 continues moving upward, more user interface elements are revealed on the system-arranged home screen 5054, including application grouping corresponding to "games" (e.g., represented by grouping icon 5020*g*) and application grouping corresponding to "financial" (e.g., represented by grouping icon 5020*h*).

In FIG. 5A4, a respective grouping icon includes a plurality of distinct portions, including a plurality of portions occupied by application icons (or reduced scale versions thereof) for a subset of applications including in the automatically-generated grouping represented by the grouping icon, and optionally a folder launch icon that corresponds to the folder containing the application icons of the applications included in the grouping. In some embodiments, only a limited number of applications (e.g., three) included in the grouping have their application icons shown on the grouping icon. In some embodiments, the folder launch icon includes miniature images of application icons for applications included in the grouping represented by the grouping icon. For example, the grouping icon 5020*a* for the "communication" grouping includes application icons for the telephony application, the email application, and the messaging application that are included in the "communication" grouping. In some embodiments, the "communication" grouping include additional applications that are not represented by their application icons on the grouping icon 5020*a*. In some embodiments, the applications that are represented by their application icons on the grouping icon are automatically selected by the system without user input based on various criteria, such as usage frequency, recency, whether the application requests user attention (e.g., badged, has unread notification, etc.), etc. The folder launch icon 5014*a* on the grouping icon 5020*a* shows miniature images of application icons for seven applications that are currently included in the "communication" grouping. In some embodiments, if there are more than a threshold number of applications (e.g., nine) included in the grouping, only nine miniature images of application icons will be shown on the folder launch icon 5014*a*. In some embodiments, a folder launch icon is not used, and a tap input on an empty area of the grouping icon also causes the content of the grouping to be displayed in a folder window.

FIGS. 5A4 and 5A7-5A9 illustrate examples of navigating from the system-arranged home screen 5054 in response to user tap inputs on the application icons and folder launch icon shown on a grouping icon, in accordance with some embodiments.

FIG. 5A7 following FIG. 5A4 illustrates that, in response to a tap input by contact 5510 at a location on the system-arranged home screen 5054 that corresponds to application icon 5008*a* (or a reduced scale version thereof) shown on the grouping icon 5020*a* (shown in FIG. 5A4), the device 100 launches the application (e.g., message application) corresponding to the application icon 5020*a* and displays application user interface 5056 corresponding to the selected application in FIG. 5A7. In FIG. 5A7, message application also includes virtual keyboard 5042 at the bottom of application user interface 5056. In FIG. 5A7, upon detecting a home gesture or input (e.g., an upward edge swipe input by contact 5516 (e.g., swiping upward from a bottom edge region of the display)), the device returns to displaying the system-arranged home screen 5054 (e.g., as shown in FIG. 5A4) (e.g., exiting message application and dismissing application user interface 5056). Similarly, in FIG. 5A8 following FIG. 5A4, in response to another tap input by contact 5512 that is detected at the location corresponding to application icon 5008*o* inside grouping icon 5020*a* as shown in FIG. 5A4, a different application (e.g., email application) is launched and the device displays application user interface 5058 corresponding to the selected application in FIG. 5A8. In FIG. 5A8, upon detecting an upward edge swipe input by contact 5518, the device returns to displaying the system-arranged home screen 5054.

FIG. 5A9 following FIG. 5A4 illustrates that, in response to another tap input by contact 5514 that is detected at the location corresponding to the folder launch icon 5014*a* on the grouping icon 5020*a*, a folder window 5080, corresponding to grouping 5020*a*, is displayed overlaying a background user interface 5054' (e.g., blurred and darkened system-arranged home screen 5054). The folder window 5080 shows application icons and related widgets (e.g., 'mCall' widget 5022*c* corresponding to phone application) for multiple (e.g., all, some, etc.) applications belonging to the application grouping 5020*a*. In some embodiments, if there are more than a threshold number of applications in the grouping, the folder window initially displays application icons for a subset of the applications, and is scrollable to show application icons for additional applications included in the grouping.

A number of tap inputs by various contacts in different scenarios are shown in FIG. 5A9. In some embodiments, in response to detecting a tap input by contact 5526 at any location in user interface 5054' outside of pop-up window 5080, the device returns to displaying system-arranged home screen 5054 (e.g., FIG. 5A4 or FIG. 5A10). In some embodiments, in response to detecting a tap by contact 5520 at the location corresponding to application icon 5008*o* inside the folder window 5080, the corresponding application (e.g., message application) is launched and the device displays application user interface 5056 corresponding to the selected application (e.g., as shown in FIG. 5A7). In some embodiments, in response to a tap input by contact 5522 that is detected at the location corresponding to application icon 5008*o* inside the folder window 5080, a different application (e.g., email application) is launched and the device displays application user interface 5058 corresponding to the selected application (e.g., as shown in FIG. 5A8). In some embodiments, in response to a tap input by contact 5524 that is detected at the location corresponding to avatar 'Neil' corresponding to a user contact inside 'mCall' widget 5022*c*, device performs a function of the application "mCall" to place a call to user contact 'Neil' using phone application "mCall". In some embodiments, other operations that can be triggered through interactions with an application icon on a user-arranged home screen can also be triggered through the same interaction with the application icon when the application icon is shown on the system-arranged home screen, such as displaying a quick action menu, triggering an icon reconfiguration mode, deleting a corresponding application, moving the application icon to a different location on the user-arranged home screen after icon reconfiguration mode is started, etc.

FIGS. 5A10-5A14 illustrate examples of performing a search in response to user input in the search input area 5030, in accordance with some embodiments.

In FIG. 5A10, a tap input by contact 5528 is detected on the search input area 5030 at the top of the system-arranged home screen 5054. In response to the tap input by contact 5528, system-arranged home screen 5054 transitions to user interface 5054" with search filter selector 5032 displayed below the search input area 5030, and virtual keyboard 5042 appearing at the bottom of user interface 5054", as shown in FIG. 5A11. Search filter selector 5032 (e.g., a toggle option) has an option to show "all" applications or only "badged" applications that meet the search keyword received in the search input area 5030.

In FIG. 5A12, the user typed in a search keyword "ca" in the search input area 5030 with the "badged" filter being enabled. In response to detecting the search input, application icons for applications that match the search keyword "ca" (e.g., phone application (with "missed calls information"), calendar application, and "Cal Today" news application) and that have unread notifications (e.g., having application icons that are badged) as indicated by badges 5010*a-c* are returned and displayed in user interface 5054" in FIG. 5A12. In some embodiments, only application icons (and, optionally widgets) are returned in response to a search input (e.g., search results are user interface objects that may be repositioned in multipage home screen user interface in an icon reconfiguration mode).

In FIG. 5A12, in response to a tap input by contact 5530 to change search condition from "badged" to "all," the search result is updated with application icons for a more comprehensive sets (e.g., all, substantially all, etc.) of applications (e.g., limited to currently installed applications, or applications ever installed on the device (e.g., including the applications on hidden pages of the home screen user interface, and/or previously deleted applications, etc.), etc.) that match the search keyword "ca," regardless of unread notifications, are returned and displayed in user interface 5054" in FIG. 5A13. In some embodiments, widgets for relevant applications (e.g., widget 5022*c* for the mCall application) are displayed as search results as well.

In some embodiments, the application icons and optionally widgets returned in the search results have the same functions as the applications displayed on the user-arranged pages of the home screen user interface. For example, In FIG. 5A13, a contact 5532 is detected at the location that corresponds to application icon 5008*n*. In some embodiments, in accordance with a determination that liftoff of contact 5532 is detected within a first threshold amount of time (e.g., the required amount of time for detecting a touch-hold input), without detecting substantial movement of contact 5532 (e.g., contact is substantially stationary) since touch-down of the contact, the device launches a corresponding telephony application and displays an application user interface of the corresponding telephony application. In some embodiments, in accordance with a determination that liftoff of contact 5532 is detected within a second threshold amount of time (e.g., the required amount of time for detecting a tap and hold input), without detecting substantial movement of contact 5532 (e.g., contact is substantially stationary and has moved less than a threshold amount) since touch-down of the contact, the device starts an icon reconfiguration mode, and displays a deletion affordance for multiple (e.g., some, all, each, etc.) application icons (e.g., delete badges 5012*a-d*). The search result user interface 5054" in the icon reconfiguration mode is labeled as user interface 5060 in FIG. 5A14. In some embodiments, the second threshold amount of time is greater than the first threshold amount of time.

FIG. 5A14 shows both a tap input by contact 5534 and, alternatively, a drag input by contact 5536 at a location of an application icon on the search result user interface 5060 in the icon reconfiguration mode. In response to the tap input by contact 5534 at a location corresponding to deletion affordance for application icon 5008*w* (e.g., delete badge 5012*e*), the device removes application icon 5008*w* from user interface 5060 (e.g., deletes the "calculator" application associated with application icon 5008*w* from the search results and from the device (e.g., from the user-arranged home screens and the system-arranged home screen)), as shown in FIG. 5A19. In some embodiments, in response to the tap input by contact 5540 on the cancel button, the device redisplays the system-arranged home screen 5054. At this point, the device has removed application icon 5008*w* from the original location of the application icon 5008*w* in the user-arranged home screen 5052 and the system-arranged home screen 5054 (as shown in FIG. 5A20). In response to detecting the drag input by contact 5536 after contact 5536 touched down at a location corresponding to application icon 5008*w*, in accordance with a determination that the movement of contact 5536 has reached an edge of the user interface 5060 in the first reconfiguration mode, the device navigates to an adjacent user-arranged home screen 5052 while the application icon 5008*w* is dragged by contact 5036. FIGS. 5A15-5A18 illustrate an example repositioning process for application icon 5008*w* in the first reconfiguration mode, after the application icon 5008*w* is dragged from the search result user interface 5060, in accordance with some embodiments.

In FIG. 5A15, in response to the drag input by contact 5536 shown in FIG. 5A14, home screen user interface 5052' (e.g., the former user-arranged home screen interface where application icon 5008*w* was located, or the adjacent home screen of the system-arranged home screen), including application icons 5008*r*-5008*v* and other concurrently displayed user interface elements, is displayed in the icon reconfiguration mode. Page indicator icon 5004*b* corresponding to page 5052 is highlighted in the page navigation element 5004. As movement of contact 5536 continues to the edge of page 5052' in the icon reconfiguration mode, another page 5050' of the home screen user interface in the icon reconfiguration mode is displayed, as shown in FIG. 5A16. In FIG. 5A16, user-arranged home screen 5050', including application icons 5008*a*-5008*m* and other concurrently displayed user interface elements, is displayed in first reconfiguration mode. In FIG. 5A16, as a result of page navigation, page navigation element 5004 is updated with page indicator icon 5004*b* de-highlighted and page indicator icon 5004*a* highlighted. Application icon 5008*w* is shown moving across user-arranged page 5050' of the home screen user interface in accordance with the movement of contact 5536 to the left.

As shown in FIG. 5A17, the drag input by contact 5536 terminates (e.g., via liftoff) and application icon 5008*w* is dropped into user-arranged home screen 5050' in the first reconfiguration mode. Also shown in FIG. 5A17, upon detecting an upward edge swipe input by contact 5538 (or a tap input in an unoccupied area of the user-arranged page 5050'), the device terminates the first reconfiguration mode and user-arranged home screen 5050 is displayed, as illustrated by FIG. 5A18.

FIG. 5A19-5A20 illustrate an example of exiting first reconfiguration mode, in accordance with some embodiments. In FIG. 5A19, a tap input by contact 5540 is received at the location that corresponds to an option for exiting the search result user interface 5060 in first reconfiguration mode (e.g., the 'cancel' option). In response to a tap input by contact 5540 at 'cancel' the device exits the search result user interface 5060 and returns to the system-arranged home screen 5054 in the normal operation mode, as shown in FIG. 5A20. In some embodiments, the system-arranged home screen 5054 is redisplayed in normal operation mode, irrespective of whether icon reconfiguration mode was triggered before the cancel button is selected, and irrespective of whether an application icon has been deleted from the search result user interface 5060 or 5054".

FIGS. 5A21-5A36 illustrate an example where the widget screen and the system-arranged page of the multipage home screen user interface are not represented as pages in the sequence of pages of the multipage home screen user interface, but are instead user interfaces that are respectively displayed overlaying the beginning page and ending page of the sequence of user-arranged pages of the multipage home screen user interface. In some embodiments, when the system-arranged page is not one of the sequence of pages represented by page indicator icons in the page navigation element 5004, it is also referred to as an application library user interface 5054'.

As shown in FIG. 5A21, the multipage home screen user interface includes four user-arranged pages represented by the four page indicator icons 5004*a*-5004*b* and 5004*d*-5004*e* in the page navigation element 5004. The currently displayed page is user-arranged page 5064 which is the beginning page of the sequence of user-arranged pages in the multipage home screen user interface. In FIGS. 5A21 through FIG. 5A23, in response to a rightward swipe input by contact 5531 (e.g., specifying a navigation direction from the end page to the beginning page through the sequence of pages (e.g., a leftward navigation direction through the pages)), the widget screen user interface 5053 slides over the user-arranged home screen 5064, as user-arranged home screen recedes from the user and becomes darkened and blurred behind the widget screen user interface 5053. In some embodiments, the widget screen user interface 5053 includes a plurality of user-selected widgets 5022 that are optionally sorted according to system-determined relevant metrics (e.g., messages widget 5022*f*, weather widget 5022*a*, map widget 5022*d*, and calendar widget 5022*e*). In some embodiments, various widgets of different sizes, as well as various widgets of different applications are included in the widget screen (e.g., widgets 5022*e* and 5022*f* are 2×2 sized, while widgets 5022*a* and 5022*d* are 2×4 sized). In some embodiments, the widget screen user interface 5053 also includes a recommended applications widgets that displays application icons for a plurality of applications that are automatically selected by the device in accordance with various recommendation criteria (e.g., individual usage patterns, averaged usage patterns across a large number of users, recent usage behavior, long term usage behavior, etc.). In FIGS. 5A24-5A26, in response to a leftward swipe input by contact 5529 (e.g., specifying a navigation direction from the beginning page to the end page through the sequence of pages (e.g., a rightward navigation direction through the pages)), the widget screen user interface 5053 slides away from the user-arranged home screen 5064, and user-arranged home screen 5064 is restored to the foreground of the display (as shown in FIG. 5A26).

FIGS. 5A26-5A32 shows a swipe input by contact 5527 across different portions of the page navigation element 5004 in a rightward navigation direction through the pages of the multipage home screen user interface (e.g., a direction from the beginning page to the end page of the sequence of pages of the multipage home screen user interface). In response to detecting the contact 5527 reaches a respective page indicator icon of the next page in the page navigation direction, the device highlights the respective page indicator icon and displays the corresponding page of the multipage home screen user interface. In some embodiments, in response to detecting that the contact 5527 reaches a respective page indicator icon of the next page in the page navigation direction, the device generates a respective tactile output 5525 (e.g., 5525*a*, 5525*b*, 5525*c*). In some embodiments, the various characteristics of the movement of the contact 5527 (e.g., speed, acceleration, distance, beginning location, liftoff location, etc.) are used to compute various movement metrics that are used to determine the destination page that is displayed after the end of the swipe input is detected. For example, a quick swipe without a deliberately pinpointed liftoff location may cause the device to land on the same page of the home screen user interface as a slow and more deliberate swipe to a specific page indicator icon in the page navigation element, if both inputs meet preset criteria for navigating to that page. In some embodiments, tactile outputs are optionally generated even after the liftoff of the contact has been detected, e.g., in conjunction with display of individual pages of a sequence of pages leading up to the final destination page that is displayed in response to the swipe input.

In FIG. 5A32, a page navigation input by contact 5523 (e.g., a leftward swipe input anywhere on the user-arranged page 5052) is detected on the user-arranged home screen 5052 which is currently the last page in the sequence of pages of the multipage home screen user interface. The page navigation input specifies a rightward navigation direction through the pages when the last user-arranged page of the multipage home screen user interface has been reached. In FIGS. 5A33-5A34, in response to the navigation input by contact 5523, the application library user interface 5054' slides onto the display from the right edge of the display, where the last user-arranged page 5052 recedes from the user and becomes a blurred and/or darkened background for the application library user interface 5054'.

In FIGS. 5A35-5A36, another page navigation input by contact 5521 (e.g., a rightward swipe input anywhere on the application library user interface 5054') is detected on the application library user interface 5054'. The page navigation input specifies a leftward navigation direction through the pages of the multipage home screen user interface. In response to the navigation input by contact 5521, the application library user interface 5054' slides off the display again, and the last user-arranged page 5052 is restored to the foreground of the display.

FIGS. 5B1-5B19 illustrate example user interfaces for reconfiguring and interacting with the multipage home screen user interface, in accordance with some embodiments.

FIGS. 5B1-5B6 illustrate example user interfaces for configuring and interacting with the multipage home screen user interface in a first reconfiguration mode (e.g., icon reconfiguration mode), in accordance with some embodiments. FIG. 5B1 shows a user-arranged page 5050 of the multipage home screen user interface including a plurality of application icons (e.g., application icons 5008*a*-5008*m*) and a plurality of preconfigured application icons (application icons 5008*n*-5008*q*) at the bottom of user-arranged home screen 5050. Page navigation element 5004 is displayed on the user-arranged home screen 5050 with page indicator icon 5004*a* highlighted, indicating that the user-arranged home screen 5050 is the third page in a sequence of five pages of the multipage home screen user interface. In this illustrative example, the widget screen and the system-arranged home screen are not included in the sequence of pages of the multipage home screen user interface, but are displayed as overlays respectively over the beginning and end pages of the sequence of user-arranged pages of the multipage home screen user interface, and therefore are not represented in the page navigation element 5004. In some embodiments, when a system-arranged page of the home screen user interface is not included in the sequence of pages represented by the page indicator icons in the page navigation element, the system-arranged page is also referred to as the application library user interface (e.g., application library user interface 5054'). In some embodiments, whether or not the system-arranged page is represented by a page indicator icon in the page navigation element of the sequence of pages of the multipage home screen user interface, it is accessible by an input that specifies a navigation direction that is the same as a navigation direction through the sequence of pages of the multipage home screen user interface. In some embodiments, a swipe input in another direction (e.g., downward edge swipe on a left corner of a user-arranged home screen) optionally also causes the application library user interface to be displayed overlaying any of the user-arranged home screens. In some embodiments, the example illustrated here is not limited to embodiments where the system-arranged home screen or application library are represented by the page indicator icons as pages of the sequence of pages in the multipage home screen user interface.

In FIG. 5B1, detection of a number of inputs by various contacts in various scenarios are shown, the inputs individually meet the requirement to trigger the first reconfiguration mode, in some embodiments. When a contact is detected, the device evaluates the input against various criteria to determine which operation, if any, should be performed. As shown in FIGS. 5B1-5B2, in response to a touch-hold and drag input by a contact 5542 detected at a location on the touch-screen that corresponds to application icon 5008*a*, the device enters the first reconfiguration mode (e.g., icon reconfiguration mode). In some embodiments, as shown in FIG. 5B3 following FIG. 5B1, a longer touch-hold input without movement by a contact 5541 that is detected on another application icon 5008*k* (or any application icon (e.g., application icon 5008*a*), or widget displayed on the user-arranged home screen 5050) also triggers the first reconfiguration mode. In some embodiments, as shown in FIGS. 5B3 following FIG. 5B1, a touch-hold input by a contact 5543 that is detected on an unoccupied area of the user-arranged home screen 5050 and that meets a shorter time threshold than the touch-hold input detected on the application icon 5008*a* also triggers the first reconfiguration mode. FIGS. 5B2-5B3 illustrate that in response to entering the first reconfiguration mode, the device optionally generates a non-visual output (e.g., tactile output 5092) and provides visual feedback (e.g., animates the application icons in home screen 5050') to indicate that a user interface reconfiguration mode (e.g., the first reconfiguration mode) is activated.

FIGS. 5B4-5B5 illustrate that, in the first reconfiguration mode, the user can drag a target (e.g., selected) application icon to reposition it in the multipage home screen user interface, e.g., by dropping it onto a different location on the currently displayed page, or navigating to a different page and dropping it onto a desired location on the newly displayed page. For example, in FIG. 5B4-5B5, application icon 5008*a* is dragged to a different location by a drag input provided by a contact 5544 (or a continuation of the drag input by contact 5442) in the user-arranged home screen 5050'. Other application icons on the home screen 5050' automatically shift and move into the position vacated by application icon 5008*a*, or make room to accommodate the application icon 5008*a* at the drop location. When a termination of the input is detected (e.g., liftoff of contact 5544 is detected), application icon 5008*a* is inserted into the nearest insertion location in the user-arranged home screen 5050', and home screen 5050' is reconfigured. In some embodiments, in conjunction with a settlement of application icon 5008*a* (and detecting a termination of the input by contact 5544), the device generates a non-visual output (e.g., a tactile output).

In some embodiments, upon entering the first reconfiguration mode, the page navigation element 5004 changes its appearance (e.g., become highlighted or replaced with another affordance in the same location, to indicate that additional home screen reconfiguration (e.g., second reconfiguration mode) is available by tapping the highlighted page navigation element 5004. In some embodiments, user interface object 5094 (e.g., an add widget button) appears in the user-arranged home screen 5050' in the first reconfiguration mode to indicates that one or more widgets can be configured and added to home screen user interface in the first reconfiguration mode. In some embodiments, the page navigation element 5004 with the changed appearance still provides the same navigation function as in the normal operational mode (e.g., outside of the reconfiguration mode), and a swipe input from one page indicator icon to another page indicator icon in the page navigation element 5004 with the changed appearance still causes navigation to the page corresponding to the page indicator icon at the current contact location. However, in some embodiments, the page navigation function based on tap input on the individual page indicator icons are disabled for page navigation element 5004, and a tap input on any portion of the page navigation element 5004 causes transition from the first reconfiguration mode to a second reconfiguration mode (e.g., page editing mode). In some embodiments, the page navigation element 5004 with the changed appearance still function the same way as in the normal operation mode in terms of page navigation (e.g., swiping or tapping to navigate to a different page still work), and the additional function of triggering the transition to the second reconfiguration mode is performed in response to a different type of input (e.g., a touch-hold input by a contact on any portion of the page navigation element 5004, a tap input on a portion of the page navigation element 5004 that is not occupied by a page indicator icon, etc.).

FIGS. 5B6-5B19 illustrate example user interfaces for configuring and interacting with home screens in the second reconfiguration mode, in accordance with some embodiments.

FIGS. 5B6-5B7 illustrate that a tap input by a contact 5548 is detected on the highlighted page navigation element 5004 on the user-arranged home screen 5050' (e.g., while in first reconfiguration mode). In response to the tap input, the device transitions from the first reconfiguration mode into the second reconfiguration mode and displays another home screen reconfiguration user interface (e.g., a page editing user interface 5062) in FIG. 5B7 (e.g., enters second reconfiguration mode). In FIG. 5B7, reduced scale representations (e.g., representation 5064", representation 5066", representation 5050", and representation 5052" (e.g., visible after scrolling)) for multiple (e.g., some, all, each, etc.) user-arranged pages of the multipage home screen user interface (e.g., home screen 5064, home screen 5066, home screen 5050, and home screen 5052) are displayed in an active region of the page editing user interface 5062. In some embodiments, representations of all user-arranged pages are all at least partially visible from the start. In some embodiments, only representations of a subset of all the user-arranged pages are initially visible, and representations of additional user-arranged pages are displayed in response to a scroll input (e.g., a swipe input in a navigation direction through the sequence of pages of the multipage home screen user interface, a tap input on a portion of a navigation element that is closer to one end of the navigation element, etc.). In some embodiments, the order of the representations of the pages are the same as the order of the pages in the multipage home screen user interface. In some embodiments, a representation of the system-arranged home screen (e.g., home screen 5054) is not displayed in page editing user interface 5062. Similarly, a representation of the widget screen is also not displayed in the page editing user interface. In some embodiments, as shown in FIG. 5B7, the representation of a respective user-arranged home screen is displayed with an affordance (e.g., a "close" icon 5104) for removing or hiding the corresponding user-arranged home screen such that the corresponding user-arranged home screen will not be displayed in the multipage home screen user interface when the device exits the second reconfiguration mode and returns to the first reconfiguration mode and subsequently the normal operation mode. In some embodiments, when a tap input is detected on the affordance associated with a page representation, the appearance of the page representation changes (e.g., toggles between a normal visibility state and a reduced visibility state, toggles between an unmarked state and a marked state, etc.) and the status of the page represented by the page representation also change accordingly (e.g., toggles between unhidden state and a hidden or deleted state). In some embodiments, a tap input on a page representation (e.g., in either the normal visibility state or the reduced visibility state, marked state or unmarked state, etc.) causes display of a view of the page for the user to review the application icons on that page. When the view of the page is dismissed, the page editing user interface is redisplayed. This allows the user to review a page before deleting/hiding or restoring a previously deleted/hidden page.

In some embodiments, the page editing user interface 5062 includes a preset holding area 5100 (e.g., concurrently visible with the page representations of the unhidden pages, or in another portion of the page editing user interface that is not concurrently visible with the page representations). The preset holding area 5100 displays previously deleted/hidden user-arranged home screens which is currently empty in FIG. 5B7. In some embodiments, the preset holding area 5100 includes a deletion affordance 5102 that when activated, permanently delete the hidden home screens in the preset holding area. In some embodiments, such a holding area 5100 and/or delete button 5102 are not provided in the page editing user interface. Hidden pages are visually marked as hidden and remain among the sequence of pages of the multipage home screen user interface. A restore affordance is displayed for a respective hidden page, and when the restore affordance is activated, the status of the page changes from hidden/deleted to unhidden, and the restored page will be displayed among other pages of the multipage home screen user interface once the device exits the second reconfiguration mode. In some embodiments, search function provided on the system-arranged home screen returns search results including application icons on the hidden pages of the home screen user interface as well as application icons from pages that are not hidden. In some embodiments, a filter selector for enabling search results that include application icons on the hidden pages are provided in the search input area on the system-arranged home screen.

FIGS. 5B7, 5B8, and 5B11 illustrate five different inputs by various contacts 5550, 5552, 5558, 5560, and 5562, which would cause the multipage home screen user interfaces to be configured differently as illustrated below.

In FIG. 5B7, a drag input by contact 5550 is detected at the location on the touch screen that corresponds to the page representation 5064" for the user-arranged home screen 5064. In accordance with the movement of contact 5550 into the preset holding area 5100 followed by liftoff of contact 5550, the page representation 5064" is dropped into the preset holding area 5100, and the user-arranged home screen 5064 is hidden (e.g., temporarily removed from the sequence of pages of the multipage home screen user interface), such that user-arranged home screen 5064 will not be displayed as part of the multipage home screen user interface once the device exits the second reconfiguration mode. In FIG. 5B8, page representation 5064" of the previously deleted home screen 5064 is displayed in the preset holding area 5100. Another drag input by contact 5552 is detected at the location of the page representation 5066" of user-arranged home screen 5066 and the drag input ends in the preset holding area 5100. As a result, the page representation 5066" is moved to the preset holding area 5100 and the user-arranged home screen 5066 is also hidden so that it will not be displayed in the sequence of pages of the multipage home screen user interface once the device exits the second reconfiguration mode.

In FIG. 5B9, page representations 5064" and 5066" of the previously deleted/hidden home screens 5064 and 5066 are displayed in the preset holding area 5100. In FIG. 5B9, upon detecting a gesture for exiting the second reconfiguration mode (e.g., a upward edge swipe input by contact 5554, a tap input by a contact 5555 in an unoccupied area of the page editing user interface 5062, etc.), the device exits the second reconfiguration mode and returns to displaying the multipage home screen user interface in the first reconfiguration mode, as shown in FIG. 5B10. In some embodiments, the page from which the second reconfiguration mode was entered is redisplayed (e.g., page 5050'). In some embodiments, a page that is newly restored is displayed upon existing the second reconfiguration mode. In some embodiments, the system selects the page that is displayed when exiting the second reconfiguration mode based on multiple factors. In FIG. 5B10, the first reconfiguration mode is still active, in which the user can rearrange application icons or reenter the second reconfiguration mode by selecting the highlighted page navigation element 5004. Since two user-arranged home screens have been deleted/hidden, the number of page indicator icons in the page navigation element 5004 has decreased to represent only those user interfaces remaining (e.g., user-arranged pages 5050 and 5052, represented by page indicator icons 5004*a* and 5004*b*).

In FIG. 5B10, tap input by contact 5556 is detected at a location in the touch screen corresponding to highlighted page indicator 5004. In some embodiments, in accordance with a determination that liftoff of contact 5556 is detected within a second threshold amount of time (e.g., the required amount of time for detecting a deep-press or tap and hold input), without detecting substantial movement of contact 5556 (e.g., contact is substantially stationary) since touch-down of the contact, device reenters second reconfiguration mode, as shown in FIG. 5B11.

FIG. 5B11 shows a number of inputs by various contacts that illustrates different interactions with the page editing user interface 5062, in accordance with some embodiments. In some embodiments, in response to a tap input by contact 5560, which selects delete affordance 5102, page representations 5064" and 5066" of previously hidden/deleted home screens 5064 and 5066 are removed from the preset holding area 5100 and the pages 5064 and 5066 along with the applications represented by application icons on those pages are permanently deleted from the device. As a result, the deleted applications are removed from their assigned groupings on the system-arranged user interface, as well. In some embodiments, the delete affordance 5102 is grayed out when there are no hidden pages in the preset holding area, as illustrated in FIG. 5B12. In some embodiments, pages that are deleted in this manner are not recoverable (e.g., are permanently removed from device 100). In some embodiments, permanent deletion of whole pages is disabled on a device, and a page is only deleted permanently if most or all application icons on that page is manually deleted individually or moved to another page.

In FIG. 5B11 followed by FIG. 5B13, a drag input by contact 5562, which selects the page representation 5064" of user-arranged home screen 5064 in the preset holding area 5100 and moves the page representation 5064" back to the sequence of page representations for pages that are not currently hidden (e.g., page representations 5050" and 5052"). The location of the page representation 5064" is determined based on liftoff location of contact 5562. For example, the page representation 5064" is optionally displayed to the right of the page representation 5052" (as shown in FIG. 5B13), in the middle, or to the left of the page representation 5050". In addition, in FIG. 5B11 followed by FIG. 5B13, a drag input by contact 5558 drags page representation 5050" from the first position in the sequence of page representations to a second position in the sequence of page representations to adjust the position of the corresponding page 5050 in the sequence of pages of the multipage home screen user interface. At the end of the drag input by contact 5558 and the drag input by contact 5562, the sequence of page representations are as shown in FIG. 5B13 (e.g., page representation 5052" followed by page representation 5050", followed by page representation 5064").

FIGS. 5B14 followed by page 5B13 show that an input for exiting the second configuration mode (e.g., an upward edge swipe by contact 5566, a tap input by a contact 5567 in an unoccupied area of the page editing user interface 5062, etc.) is detected, and in response, the device exits the second reconfiguration mode and displays a page of the multipage home screen user interface in the first reconfiguration mode (e.g., user-arranged page 5052' in FIG. 5B14).

FIGS. 5B14-5B16 illustrate navigation through the sequence of the unhidden pages of the multipage home screen user interface in response to a sequence of navigation inputs that specifies a navigation direction through the multipage home screen user interface. As shown in FIG. 5B14, when the device returns to the first reconfiguration mode, there are three unhidden pages in the multipage home screen user interface in the sequence of user-arranged page 5052, user-arranged page 5050, and user-arranged page 5064. The three user-arranged pages have their respective page indicator icons 5004*b*, 5004*a*, and 5004*d* in the highlighted page navigation element 5004 in a sequence in accordance with the order of the pages in the multipage home screen user interface. In response to a sequence of swipe inputs by contacts 5565 and 5567, the device navigates from the user-arranged page 5052' (FIG. 5B14) to the user-arranged page 5050' (FIG. 5B15), and then from the user-arranged page 5050' (FIG. 5B15) to the user-arranged page 5064' (FIG. 5B16).

In FIG. 5B16, upon detecting a input for exiting the first reconfiguration mode (e.g., an upward edge swipe input by contact 5566 or a tap input by contact 5569 on an unoccupied area of the user-arranged page 5064' in the first reconfiguration mode, etc.), the device terminates the first reconfiguration mode and the user-arranged page 5064 is displayed in the normal operation mode.

In some embodiments, after at least one page has been hidden, when the device exits the second reconfiguration mode and returns to the first reconfiguration mode or the normal operation mode, the device displays a warning that after a page of the home screen is hidden, new applications will not be shown on the user-arranged home screens. As shown in FIG. 5B17, after the device enters the normal mode in response to the input for exiting the first reconfiguration mode (e.g., as shown in FIG. 5B16), the device displays the warning 5553 that informs the user of the change. In some embodiments, after at least one page is hidden, new applications will only be shown on the system-arranged home screen, and the user has the option to add the application icon for the new applications to a user-arranged page that is not currently hidden (e.g., by dragging and dropping the application icon from the system-arranged page to the user-arranged page in the first reconfiguration mode).

In FIG. 5B17, a tap input by a contact 5551 is detected at a location in the touch screen corresponding to an affordance to return to the first reconfiguration mode or the normal operation mode. As shown in FIG. 5B18, the user-arranged page 5064 is displayed in normal operation mode after the warning 5553 is dismissed.

In FIG. 5B17, another page navigation input has been detected (e.g., a leftward swipe input by contact 5571) on user-arranged page 5064, and in response, an application library user interface 5054' (e.g., alternative to a system-arranged page 5054 that is represented as one of the sequence of pages of the multipage home screen user interface by the page navigation element 5004) is displayed overlaying a background user interface (e.g., a blurred and darkened version of the user-arranged home screen 5064 as shown in FIG. 5B18). In some embodiments, the application library user interface 5054' has characteristics that are analogous to the system-arranged home screen 5054 and the application library user interface 5054' as described earlier with respect to FIGS. 5A-5A36 and accompanying descriptions. In some embodiments, the groupings of application icons (e.g., application groupings 5020*a*-5020*d*) will be updated to remove any application icons from deleted/hidden pages of the home screen user interface.

FIGS. 5C1-5C73 illustrate example user interfaces for inserting a user interface object containing application content (e.g., mini application objects, widgets, etc.) into a page of a home screen user interface (e.g., a single page or multipage home screen user interface), in accordance with some embodiments.

FIG. 5C1 shows a user-arranged page 5302' in a first reconfiguration mode (e.g., icon reconfiguration mode) of a multipage home screen user interface. The application icons 5008*aa*-5008*ao* on the user-arranged page 5302 (e.g., 5302' in the normal mode) are shown with a jiggling movement to indicate that the placement locations of the application icons can be adjusted in accordance with user input. The user-arranged page 5302' in the first reconfiguration mode shows the page navigation element 5004 in a highlighted state as compared to its appearance on the user-arranged page 5302 in the normal mode (e.g., non-reconfiguration mode). The first page indicator icon 5004*a* is visually distinguished from the other three page indicator icons 5004*b*-500*d* in the page navigation element 5004, to indicate that the user-arranged page 5302 is the first in a sequence of four user-arranged pages of the multipage home screen user interface. An add widget button 5094 is displayed at the top of the page 5302' in the first reconfiguration mode. A tap input by a contact 5568 is detected at the location of the add widget button 5094. In response, the device displays a widget selection and configuration user interface 5304, as shown in FIG. 5C2. The widget selection and configuration user interface 5304 displays, in a recommended widgets area 5038, one or more recommended widgets (widgets 5310*a*, 5310*b*, 5310*c*, etc.) that are configured to occupy different sized placement locations and/or that correspond to different applications. For example, "App 17-Widget 1" is a 2×4 sized widget, while "App 22-Widget 1" and "App 22-Widget 2" are 2×2 sized widgets. Additional widget sizes (e.g., 4×4, 1×4, etc.) are optionally available for selection as well, in some embodiments. In some embodiments, one or more preconfigured widget stacks are also displayed in the recommended widget area 5038. A widget stack includes a plurality of system-selected widgets that are optionally of the same size, that can be placed into a single placement location of that size in a respective user-arranged page of the home screen user interface. In some embodiments, preconfigured widget stacks of different sizes (e.g., 2×2, 2×4, 4×4, etc.) are included in the recommended widget area 5038. In some embodiments, tapping on a preconfigured widget stack causes a stack-specific configuration user interface to be displayed where the user can review the widgets included in the stack and adjust the order of the widgets in the stack, reconfigure some of the widgets in the stack, and/or delete some of the widgets from the stack. In some embodiments, the widget stacks displayed in the recommended widget area 5038 are optionally functional stacks that are automatically switched from time to time (e.g., due to elapsing time, or due to changed context, etc.) while being displayed in the recommended widget area 5038 in the widget selection and configuration user interface 5304. In some embodiments, in response to detecting swipe inputs (e.g., vertical swipe inputs, or horizontal swipe inputs, etc.) on a recommended widget stack shown in the recommended widget area 5038, the computer system scrolls through the widgets in the recommended widget stack for the user to see which widgets are included in the widget stack. In some embodiments, the application content included in the widgets and widget stacks shown in the recommended widget area 5038 are live application content and is updated from time to time in accordance with updates occurring in their respective applications. The size of a placement location and the size of a widget are specified in terms of a grid size of a layout for displaying application icons. In some embodiments, recommended widgets are based on global popularity and individual usage patterns at the device. A respective widget is associated with a widget selection indicator 5312 that indicates the selected/unselected state of the corresponding widget. In FIG. 5C2, the top widget 5310*a* (e.g., the first widget of application 17) has been selected (e.g., by a tap input provided by the user). In some embodiments, the widget selection and configuration user interface 5304 further includes a listing of applications 5316 for which widgets are available for selection and configuration.

In FIGS. 5C2, a tap input by a contact 5570 is detected at a location on the touch screen 112 corresponding to the add button 5318 on the widget selection and configuration user interface 5304 after at least one widget (e.g., widget 5310*a*) has been selected. In response to detecting the tap input by the contact 5570, the widget selection and configuration user interface 5304 ceases to be displayed and the page 5302' in the first reconfiguration mode is redisplayed, as shown in FIG. 5C3. In FIG. 5C3, the selected widget (e.g., widget 5310*a*, relabeled as widget 5322 when shown on the home screen) is automatically inserted at a respective placement location in the redisplayed page 5302' in the first reconfiguration mode (e.g., at the top of the redisplayed page 5302'). In some embodiments, the selected widget is inserted at another location in the currently displayed home screen page (e.g., a user-selected location), if the selected widget was dragged away from its original location in the widget selection and configuration user interface 5304 to the edge of the widget selection and configuration user interface 5304. In some embodiments, the user can drag the widget 5322 to another location after the widget 5322 has been inserted into the home screen page 5302' in the first reconfiguration mode (e.g., repositioned in the same manner as an application icon that is dragged and dropped in the home screen page 5302' or across different pages of the multipage home screen user interface).

As illustrated in FIG. 5C3, and in comparison to the page 5302' shown in FIG. 5C1 prior to the insertion of the widget 5322, there is not sufficient space on the page 5302' to accommodate all the application icons already present on the page 5302' and the widget 5322 in the regular manner (e.g., individually, and/or on the layout grid of the page, etc.). As a result, insertion of the widget 5322 causes the existing application icons on the page 5302' (e.g., icons 5008*aa*-5008*ao*) rightward and downward toward the bottom of the page 5302', and some application icons in the bottom row of the page 5302' cease to be displayed on the page 5302'.

In some embodiments, as shown in FIG. 5C3-5C4, the application icons that do not fit on current user-arranged home screen 5302' (e.g., application icons 5008*am*, 5008*an*, and 5008*ao*) are moved onto an adjacent page of the page 5302' in the multipage home screen user interface (e.g., user-arranged home screen 5324' as shown in FIG. 5C4). In some embodiments, the adjacent page 5324' is a new page that is created by the device to accommodate the displaced application icons from the page 5302'. For example, as indicated by the addition of page indicator icon 5004*e* between page indicator 5004*a* and 5004*b*, a new page corresponding to the page indictor 500*e* has been created and inserted behind the page 5302'. In FIG. 5C3, a leftward swipe input by a contact 5572 is detected on the current user-arranged home screen 5302'. In response to detecting the swipe input by the contact 5572, the newly created user-arranged home screen 5324' containing the overflow application icons 5008*am*-5008*ao* is displayed. The page indicator icon 5004*e* in the page navigation element 5004 is highlighted to indicate that the position of the newly created page 5324' (e.g., page 5324 in the normal mode) is immediately behind the page 5302' from which the application icons 5008*am*-5008*ao* are received.

In FIG. 5C4, a rightward swipe input by a contact 5574 is detected on the newly created user-arranged page 5324'. In response to detecting the swipe input by the contact 5574, the device replaces returns to the previous user-arranged page 5302' including repositioned application icons 5008*aa*-5008*a*1 and the newly inserted widget 5322, as shown in FIG. 5C5.

In FIG. 5C5, a tap input by a contact 5576 is detected on the add widget button 5094 in the page 5302' again. In response to detecting the tap input by the contact 5576, device displays the widget selection and configuration user interface 5304 again, as shown in FIG. 5C6. In FIG. 5C6, the recommended widget area 5308 is updated, and a new widget 5310*d* is displayed to replace the widget 5310*a* that has already been inserted into a home screen page. In this example, the widget 5310*d* has the same size as the widget 5310*a*.

In FIG. 5C5, a contact 5578 is detected on the widget 5310*d*, and in accordance with a determination that selection criteria are met (e.g., the contact 5578 has not moved by more than a threshold amount during a threshold amount of time to meet a touch-hold requirement, or an intensity of the contact 5578 meets a first intensity threshold, etc.), the selection indicator 5312*d* is updated to indicate the selected status of the widget 5310*d* prior to liftoff of the contact 5578. In some embodiments, the widget 5310*d* is shown to be lifted away from its original location on the widget selection and configuration user interface 5304 while the contact 5578 is maintained. While the widget 5310*d* remains selected, movement of the contact 5578 is detected, and in response to detecting the movement of the contact by more than a threshold distance away from the original location of the widget 5310*d*, the widget selection and configuration user interface 5304 ceases to be displayed, and the user-arranged page 5302' in the first reconfiguration mode is redisplayed, as shown in FIG. 5C7.

As shown in FIG. 5C7, when the user-arranged page 5302' is redisplayed, widget 5310*d* (now relabeled as widget 5326 outside of the widget selection and configuration user interface 5304) remains under the contact 5578. As the contact 5578 continues to move on the touch-screen 112, the widget 5326 is dragged around the user-arranged page 5302' according to the movement of the contact 5578, as shown in FIG. 5C8. In FIG. 5C8, the contact 5578 has stopped moving and the widget 5326 is hovering over a set of application icons 5302*a*-5302*h* occupying a placement location that is sufficient to accommodate the widget 5326. After the contact 5578 and the widget 5326 are held at the placement location for at least a threshold amount of time, the set of application icons 5302*a*-5302*h* at the placement location ceases to be displayed on the page 5302' (e.g., moved directly to the newly created page 5324' (e.g., shown in FIGS. 5C4 and 5C13) because there is no room left on the page 5302' to flow the existing application icons to accommodate the widget 5326. In FIG. 5C8, the application icons outside of the placement location are not moved on the page 5302'. In FIG. 5C8, after the set of application icons 5302*a*-5302*h* are moved to the newly created page 5324' (e.g., joining the previously displaced application icons 5008*am*-5008*ao*), the widget 5326 is shown at the placement location to provide a preview to the user of how the page 5302' would look if the widget 5326 is dropped at this current placement location.

In FIGS. 5C9 and 5C11, it is shown that the contact 5578 is maintained and continues to move downward dragging the widget 5326 to a different placement location, currently occupied by a set of application icons 5008*ai*-5008*a*. As shown in FIG. 5C10, the contact 5578 dragging the widget 5326 has paused over the placement location partially occupied by the application icons 5302*i*-53021, and in response to detecting that contact 5578 has remained at the same placement location for at least a threshold amount of time, the application icons 5302*i*-53021 ceases to be displayed at their original locations and are moved to the newly created page 5324'. In addition, the previously displayed application icons 5008*aa*-5008*ad* are returned from the newly created page 5324' to the user-arranged page 5302' after the widget 5326 has vacated that the application icons' original placement locations. In some embodiments, displaced application icons are moved to the same newly created page 5324' across one or more user-arranged home screens during the same reconfiguration session (e.g., without exiting the currently active first reconfiguration mode and returning to the normal non-reconfiguration mode). In some embodiments, one new page is created for multiple sets of application icons displaced from the same existing page due to insertions of multiple widgets. In some embodiments, one new page is created for multiple sets of application icons displayed from multiple existing pages due to insertions of multiple widgets in those multiple existing pages.

FIG. 5C12 shows that, after the liftoff of the contact 5578 at the location shown in FIG. 5C11, the widget is placed at the new placement location at the bottom of the page 5302', along with the widget 5322 at the top of the page 5302' and the restored application icons 5008*aa*-5008*ad*.

In FIG. 5C12, a leftward swipe input by a contact 5580 is detected by the device (e.g., at a location in the touch screen that does not correspond to any widget icons or application icons, or a location that is occupied by a widget or application icon, etc.). In response to the swipe input by the contact 5580 and in accordance with a determination that the movement of contact 5580 has exceeded a predefined threshold amount of movement (e.g., half of the display width) to complete the page navigation operation, the newly created page 5324' of the home screen user interface is displayed again. As shown in FIG. 5C13, user-arranged home screen 5324' now includes a plurality of application icons, that include the application icons 5008*am*-5008*ao* that were previously displaced due to insertion of the widget 5322, and the application icons 5008*ae*-5008*a*1 that were previously displaced due to the insertion of the widget 5326.

In FIG. 5C13, a swipe input by a contact 5582 is detected. In response to the swipe input by the contact 5582 and in accordance with a determination that the movement of contact 5582 has exceeded a predefined threshold amount of movement (e.g., half of the display width) to complete the page navigation operation, the page 5302' is redisplayed, as shown in FIG. 5C14.

In FIG. 5C14, a tap input by a contact 5584 is detected at a location corresponding to a deletion badge 5328 that is associated with widget 5326 in the first reconfiguration mode. In response to detecting the tap input by the contact 5584, the widget 5326 is removed from the page 5302'. In accordance with a determination that the widget 5326 had been inserted into the current placement location during the current session of the first reconfiguration mode, the device restores that application icons that were displaced by the insertion of the widget 5326 back to their original locations on the page 5302'. As shown in FIG. 5C15, after deleting the newly added widget 5326, the plurality of displaced application icons 5508*ae*-5508*a* are restored to their original locations. As a result of the restoration, the page 5324' will include only application icons 5008*am*-5008*ao* again (e.g., in the manner as shown in FIG. 5C4).

FIG. 5C14 also illustrates another scenario, where a tap hold input by a contact 5586 is detected at a location corresponding to the widget 5326. As seen in FIGS. 5C16-5C17, the widget 5326 is lifted off its placement location in the page 5302' by the touch-hold input, and is dragged away from the placement location upwards in accordance with movement of the contact 5586. In FIGS. 5C17-5C18, the widget 5326 is dragged by the contact 5586 over the widget 5322, and dropped on the widget 5322 upon liftoff of the contact 5586 at a location over the widget 5322. In accordance with a determination that widget 5326 and the widget 5322 are of the same size, a widget stack 5328 is created as seen in FIG. 5C18 at the placement location of the widget 5322, with the widget 5326 shown on top. The plurality of application icons **5008*aa*-5008*a*1 that were displaced by the insertion of the widget 5326 in the lower portion of the page 5302' are restored from the page 5324' back to their original placement locations on the page 5302', as shown in FIG. 5C18**.

In some embodiments, as shown in FIG. 5C18, the newly created widget stack 5328 is displayed with widget indicator icons **5330*a* and 5330*b*. The newly added widget 5326 is added to the top of the stack and corresponds to the widget indicator icon 5330*a*, and accordingly, the widget indicator icon 5330*a* is highlighted relative to the widget indicator icon 5330*b* to show the order of the currently displayed widget 5326 in the widget stack (e.g., relative to the currently hidden widget 5322**).

Also in FIG. 5C18, an upward edge swipe input by a contact 5590 that meets the criteria for terminating the first reconfiguration mode, is detected. In response to detecting the upward edge swipe input by the contact 5590, the first reconfiguration mode is terminated and the device returns to the user-arranged home screen 5302 in the normal non-reconfiguration mode, as seen in FIG. 5C19.

FIG. 5C19, an upward swipe input by a contact 5592 is detected at a location that corresponds to the placement location occupied by the widget stack 5328, while the widget 5326 is displayed at the placement location. In response to the upward swipe input by the contact 5592, the device to switch to the next widget in the stack 5328 and displays the widget 5322 at the placement location, as shown in FIG. 5C20. The device also updates the widget indicator icon 5330 to show that the widget indicator icon **5330*b* for the widget 5322 is now highlighted relative to the widget indicator icon 5330*a* for the widget 5326, in FIG. 5C20**).

In FIGS. 5C20-5C22, a touch-hold input by a contact 5594 followed by lift-off without movement of the contact 5594 causes display of a quick action menu 5332 for the widget stack 5328 associated with the placement location at which the touch-hold input is detected. In FIG. 5C20, the contact 5594 is detected at a location corresponding to the currently displayed widget 5322 in the widget stack 5328. In accordance with a determination that the contact 5594 is kept substantially stationary for at least a threshold amount of time (e.g., an amount of time that is shorter than the time required to trigger the first reconfiguration mode using a touch-hold input, and equal to or more than the time required to trigger the first reconfiguration mode using a touch-hold followed by drag input, etc.), the device displays the quick action menu for the widget stack 5328. In some embodiments, liftoff of the contact 5594 is required before the quick action menu 5332 is displayed, and the quick action menu is maintained until dismissed by another tap input outside of the quick action menu, or by selection of a menu option in the quick action menu. In some embodiments, liftoff of the contact 5594 is not required for the display of the quick action menu 5332, and the contact 5594 can move to a menu option in the quick action menu 5332 to select the menu option by liftoff over the menu option.

In some embodiments, as shown in FIG. 5C21, the quick action menu 5332 includes menu options 5334-5344 for performing actions associated with the currently displayed widget 5326 and the widget stack 5328. For example, the quick action menu 5332 includes an option 5334 for sharing the currently displayed widget using one or more sharing means provided by the device, an option 5336 for displaying a widget-specific configuration user interface for configuring the currently displayed widget, an option 5338 for deleting the currently displayed widget from the widget stack, an option for displaying a stack-specific configuration user interface for editing the widget stack, an option 5342 for deleting the entire widget stack including all or substantially all of its widgets, and an option to enter the first reconfiguration mode of the home screen user interface (e.g., where the locations of the widgets in the widget stack can be adjusted, as well as the locations of other application icons and widgets in the home screen user interface).

FIG. 5C22 shows tap inputs respectively performed by two contacts 5596 and 5598 on different options of the quick action menu 5332 (e.g., options 5336 and 5340) in two different example scenarios. In response to the tap input by the contact 5596 on the option 5336 for editing the currently displayed widget, a widget-specific configuration platter 5336' for editing the currently displayed widget 5326 is displayed with widget options 5348 specific to the currently displayed widget 5326 (e.g., size, content update frequency, available application function, whether user input is enabled, etc.), as shown in FIG. 5C23. In the other scenario, in response to the tap input by the contact 5598 on the option 5340 to edit the widget stack 5328, stack-specific options (e.g., option **5356*a* to open the widget options for the widget 5326, option 5356*b* to open the widget options for the widget 5322, option 5358*a* to delete the widget 5326 from the widget stack 5328, option 5358*b* for deleting the widget 5322 from the widget stack 5328, etc.) are displayed along with options that are applicable to widget stacks (e.g., a control 5360, that when activated, enables and/or disables a wildcard widget for the widget stack 5328, a control 5362, that when activated, enables and/or disables automatic widget switching for the placement location of the widget stack 5328, a control 5347 for deleting the whole stack, etc.) in a stack configuration platter 5340'. In some embodiments, a wildcard widget occupies a slot in the widget stack, and servers as placeholder in the widget stack for another widget that is not currently included in the widget stack but may be determined to be relevant to the user based on the current context. In some embodiments, automatic switching allows the device to automatically (e.g., without user input) select from the widgets included in the widget stack (e.g., optionally, including a wildcard widget) a widget to display at the placement location of the widget stack, e.g., in accordance with the current context and/or in accordance with a rotation schedule. FIG. 5C24 shows that the control 5360 and 5362 are activated by contacts 5604 and 5608 respectively to enable the wildcard widget and automatic switching for the widget stack 5328, in this example. In FIGS. 5C23 and 5C24, a done button 5351 is displayed along with the configuration platters 5336' and 5340', respectively. A tap input by contacts 5600 or 5602 on the done button 5351 dismisses the configuration platters 5336' and 5340', respectively, the device redisplays the page 5302 as illustrated in FIG. 5C25. In FIG. 5C25, since the wildcard widget has been enabled for the widget stack 5328, a widget indicator icon 5330*c* is added to the sequence of widget indicator icons 5330. The position of the widget indicator icon 5330***c* in the sequence of widget indicator icons 5330 indicate that it is added at the bottom of the widget stack 5328, in accordance with some embodiments.

In FIG. 5C25, an upward swipe input by a contact 5610 is detected at the placement location occupied by the widget stack 5328 while the widget 5326 is the currently displayed widget, and in response to the swipe input by the contact 5610, the device displays the next widget in the widget stack according to the navigation direction specified by the swipe input, which is the wildcard widget 5366 in this example. As shown in FIG. 5C26, the device automatically selects a widget that is not currently included in the widget stack 5366 (and optionally not in any widget stack that is shown on the same page) and that is determined to be relevant to the user given the current context, and displays the automatically selected widget in place of the wildcard widget 5366. In some embodiments, if multiple widgets are determined to be equally relevant given the current context, multiple widgets may be concurrently displayed in place of the wildcard widget 5366, provided that the overall size and arranged of the multiple widgets will fit the placement location of the widget stack 5328. In FIG. 5C26, the widget indicator icons 5330 are updated such that the widget indicator icon 5330*c* is highlighted relative to the other widget indicator icons 5330*a* and 5330*b* in the sequence of widget indicator icons, and inform the user that the currently displayed widget is the last one in the widget stack. In some embodiments, a wildcard indicator (e.g., a red edge, or glowing appearance) is displayed when the wildcard widget is displayed (e.g., having been filled by an automatically selected widget that is not included in the widget stack) at the placement location, to inform the user that the wildcard widget is being displayed. In some embodiments, the wildcard widget is always inserted at the bottom of the widget stack and represented by the last widget indicator icon in the sequence of widget indicator icons for the widget stack. In some embodiments, the widget indicator icons are persistently displayed next to a respective widget stack. In some embodiments, the widget indicator icons are displayed when the currently displayed widget in the widget stack is updated, e.g., by automatic switching or rotation, and/or by user request.

In FIG. 5C26, a reconfiguration input is detected on the page 5302 (e.g., a touch-hold input by a contact 5614 on an unoccupied area of the page 5302 for a first threshold amount of time t1 with less than a threshold amount of movement, a touch-hold input by a contact 5612 on the placement location occupied by the widget stack 5328 for at least a second threshold amount of time t2 followed by more than a threshold amount of movement of the contact 5612, etc., in some embodiments t1=t2, in some embodiments t1 is greater than t2, in some embodiments t1 is less than t2), and in response to the reconfiguration input, the device enters into the first reconfiguration mode (e.g., icon reconfiguration mode) as shown in FIG. 5C27.

FIGS. 5C27-FIG. 5C32 illustrate an example of adding another 4×4 sized widget to the top of the page 5302 where the 2×4 sized widget stack 5328 already exists. In FIG. 5C27, a tap input by a contact 5616 is detected at a location corresponding to the add widget button 5094. In response to detecting the tap input by the contact 5616, the device displays the widget selection and configuration user interface 5304, as shown in FIG. 5C28. In FIG. 5C28, a new widget 5310*e* has been presented in the recommended widget area, and it has been selected (e.g., as indicated by the selection indicator 5312*e*) by a contact 5618 (e.g., by a touch-hold input, or by an earlier tap input on the widget 5310*e*) and being dragged away from its original location in the widget selection and configuration user interface 5304. In response to detection of the drag input by the contact 5618, the widget selection and configuration user interface 5304 ceases to be displayed, and the page 5302' in the first reconfiguration mode is displayed, as shown in FIG. 5C29. FIGS. 5C29-5C30 illustrate that the widget 5310*e* (now labeled as widget 5368 on the page 5302') is dragged to the placement location occupied by the widget stack and a set of application icons 5008*aa*-5008*ad*, and dropped into that placement location. As a result of dropping the widget 5368, in accordance with a determination that the placement location of the widget stack 5328 is not sufficiently big to accommodate the widget 5368 (or is not of the same size, in some embodiments; or is of a different set of dimensions, in some embodiments, etc.), the widget 5368 is not added to the widget stack 5328 at the placement location. Instead, the widget stack 5328 is moved out of the placement location (e.g., downward, and/or rightward (if it is narrower than the width of the page layout)) it previously occupied, to make room for the widget 5368. As a result, existing application icons 5008*aa*-5008*a*1 are displaced from the current page 5302' and a new page 5370' is optionally created to hold these displaced application icons, as shown in FIG. 5C31.

In FIG. 5C31, the newly created page 5370' includes the set of application icons 5008*aa*-5008*a* that have been displaced from the page 5302' due to the insertion of the widget 5368 and the reflow movement of the widget stack 5328. In some embodiments, if a single widget was occupying the placement location occupied by the widget stack 5328, the single widget is optionally sent to the newly created page 5370' with the application icons 5008*aa*-5008*ad*, while the application icons outside of the space needed to accommodate the widget 5368 5C29-5C30 would not be moved on page 5302'.

FIG. 5C29-5C30 illustrate a sequence of page navigation inputs from the page 5302' toward the end of the sequence of pages of the multipage home screen user interface (e.g., two consecutive leftward swipe inputs by contact 5620 and 5622 anywhere on the currently displayed page, two consecutive tap inputs on the page indicators 5004*f* and 5004*e*, a quick and short swipe input along the page indicator 5004 toward the right, a longer and slower swipe input along the page indicator 5004 toward the right, etc.), causes the device to navigate to page 5370' first, and then to page 5324'. In FIG. 5C31, the page 5370' is a newly created page to accommodate the displaced application icons 5008*aa*-5008*a*, and the new page indicator icon 5004*f* is added behind the page indicator icon 5004*a* and before the page indicator icon 5004*e* and is highlighted relative to the other page indicator icons in the sequence of page indicator icons in the page indicator 5004. In FIG. 5C32, the page 5324' was created in the previous reconfiguration session, different from the current reconfiguration session (e.g., the previous reconfiguration session is ended when the home screen user interface exited the first reconfiguration mode and returned to the normal mode, as shown in FIG. 5C18-5C25), and includes application icons 5008*am*-5008*ao* that were displaced from the page 5302' during the previous reconfiguration session.

FIGS. 5C33-5C46 illustrate an example of adding a widget to a user-arranged page of a multipage home screen user interface and the concurrent reconfiguration of the user-arranged page of the multipage home screen user interface, in accordance with some embodiments. In the example shown in FIGS. 5C33-5C46, application icons that are displaced from a page of the multipage home screen user interface in response to a widget being inserted at a location of the application icons in the page are automatically sent to a folder (e.g., in a new folder created on the page, or a preconfigured folder in a different page), in accordance with some embodiments. This is in contrast to the example shown in FIGS. 5C1-5C32, where displaced application icons and/or widgets are moved to a newly created user-arranged page of the multipage home screen user interface. Other aspects that are described with respect to one example shown in FIGS. 5C1-5C32 and FIGS. 5C33-5C46 are optionally combined with aspects described with respect to the another example shown in FIGS. 5C1-5C32 and FIGS. 5C33-5C46, and are optionally independent of whether the displaced application icons/widgets are placed in a folder or a new page, in accordance with various embodiments.

FIG. 5C33 shows a first user-arranged page 5302' of a multipage home scree user interface. The user-arranged page 5302' includes a plurality of application icons **5008*aa*-5008*as* arranged in accordance with a preset layout (e.g., on a 5×4 grid) in a first reconfiguration mode (e.g., icon reconfiguration mode). In some embodiments, the user-arranged home screen 5302' includes page indicators 5004 indicating both the total number of pages and the position of the currently displayed page in the sequence of pages of the multipage home screen user interface. For example, as shown in FIG. 5C33, page indicator icon 5004*c* is highlighted, indicating that the currently displayed page 5302'** is the fourth page of a total of five pages of the multipage home screen user interface. In some embodiments, multiple pages (e.g., all pages) of the multipage home screen user interface are user-arranged pages (e.g., there is no system-arranged page or widget screen, or a system-arranged page and a widget screen are displayed as overlays rather than pages of the home screen user interface, etc.). In some embodiments, the first page of the multipage home screen user interface is a widget screen, and the last page of the multipage home screen user interface is a system-arranged home screen.

In FIG. 5C33, the user-arranged page 5302' in the first reconfiguration mode includes an add widget button 5094. In FIG. 5C33, a tap input by a contact 5624 is detected at a respective location on the touch screen 112 that corresponds to the add widget button 5094. In response to the tap input by the contact 5624, the device displays a widget selection and configuration user interface 5304, as shown on FIG. 5C34. As shown in FIG. 5C34, the widget selection and configuration user interface 5304 includes a set of recommended widgets 5310 corresponding to different applications and have different preconfigured sizes. In some embodiments, a display size of a widget is equivalent to a display size of a predefined number of application icons (e.g., 2, 4, or 8 application icons arranged in a grid). In some embodiments, widgets optionally include more information and functions of the corresponding applications than that is available in application icons. The widget selection and configuration user interface further includes representations of a plurality of applications 5316 for which widgets are available for configuration. In some embodiments, a respective widget in the plurality of widgets 5310 has a corresponding selection indicator 5312. For example, in FIG. 5C34, a touch-hold input by a contact 5626 is detected at a respective location in the touch screen corresponding to the widget **5310*h*, as a result the widget 5310*h* is selected and the selection indicator 5312*h* associated with the widget 5310*h* indicates the selected state of the widget 5310*h*. FIG. 5C35 shows that after the widget 5310*h* is selected, movement of the contact 5626 is detected. In response to movement of the contact 5626 that drags the widget 5310*h* away from its original location in the widget selection and configuration user interface 5304, the widget selection and configuration user interface 5304 starts to become more darker and translucent and eventually disappears, while the user-arranged page 5302' transitions into view underneath the widget 5310*h* dragged by the contact 5626, as shown in FIG. 5C36**.

In FIGS. 5C36 and 5C37, the widget **5310*h* moves from one location to another location on the user-arranged page 5302' in accordance with the movement of the contact 5626. In FIGS. 5C37-5C39, the movement of the contact 5626 is paused over a first location on the user-arranged page 5302' for at least a threshold amount of time without being terminated. The first location currently accommodates to a set of two application icons (e.g., application icons 5008*ai* and 5008*aj*). In some embodiments, the set of application icons comprises a number of application icons corresponding to the size of widget 5310*h*. In FIGS. 5C38 and 5C39, in accordance with a determination that the user-arranged page 5302' cannot accommodate all of the existing application icons and the new widget 5310*h* in the usual manner (e.g., individually, and/or on a preset layout grid on the page, etc.), the device generates a folder 5390*a* on the page 5302' and moves the set of application icons 5008*ai*-5008*aj* at the first location into the newly created folder 5390*a* to make space for the widget 5310*h* at the first location. In some embodiments, the set of application icons cannot be activated directly from user-arranged home screen 5302' after being moved into the folder 5390*a*. In some embodiments, the folder 5390*a* is created on the currently displayed page of the home scree user interface (e.g., user-arranged page 5302') at a predefined location (e.g., at a respective placement location succeeding all or a predetermined set of remaining application icons in the currently displayed page of the home screen user interface). In some embodiments, an animated transition is displayed showing the creation of the folder on the currently-displayed page and the displaced application icons 5008*ai*-5008*aj* flying from the first location to the folder 5390*a*. The state shown in FIG. 5C39 gives the user a preview of the layout of the user-arranged page 5302' if the liftoff of the contact 5626** were detected at the first location.

In FIGS. 5C39-5C41, movement of the contact 5626 is detected and the widget **5310*h* is moved from the first location to a second location occupied by a set of widgets 5008*o*-5008*p* in accordance with the movement of the contact 5626. In FIGS. 5C40 and 5C41, in accordance with a determination that the contact is maintained over the second location for more than a threshold amount of time without being terminated, the set of application icons 5008*ao* and 5008*ap* at the second location are moved from the second location to the folder 5390*a* to make space for the widget 5310*h*. Concurrent with the movement of the widget 5310*h* to the second location in the page 5302' (e.g., vacating the first location), the set of application icons 5008*ai* and 5008*j* are moved from the folder 5390*a* back to the first location, as shown in FIG. 5C41. In FIG. 5C42, the liftoff of the contact 5626 is detected while the widget 5310*h* was over the second location. In response to liftoff of the contact 5626, the widget 5310*h* is inserted into home screen user interface 5302' at the second location, and the set of application icons 5008*ao*-5008*ap* remains in the folder 5390*a***.

FIGS. 5C43-5C44 illustrate that, after the widget **5310*h* is inserted into the page 5302', repositioning the widget within the page 5302' does not cause additional application icons to be moved to the folder 5390*a*. In FIG. 5C43, an additional drag input by a contact 5636 is detected on the touch screen from the second location to a third location occupied by a set of application icons 5008***ae*-5008*af*. In accordance with a determination that there is sufficient space on the currently displayed page to accommodate all or a predetermined set of the existing application icons and the widget 5310*h* (e.g., individually, and/or on the preset layout grid on the page, etc.), the application icons (e.g., application icons between the third location and the second location, application icons 5008*ae*-5008*ap*, etc.) on the page 5302' are reflowed (shifts rightward and downward sequentially) within the page 5302' to accommodate the widget 5310*h* at the third location. No additional application icons are moved to the folder 5390*a* as a result of the move of the widget 5310*h*. Application icons currently within folder 5390*a* (e.g., application icons 5008*ao*-5008*ap*) remain within the folder 5390*a*.

In FIG. 5C45-5C46, a tap input by a contact 5638 is detected at a respective location corresponding to a deletion affordance 5392 associated with the application icon 5008*as*. In response to the tap input by the contact 5638, the device removes the application icon 5008*as* from the user-arranged page 5302' (e.g., and deletes the application associated with application icon 5008*as* from the device (e.g., from the user-arranged home screens and the system-arranged home screen)), as shown in FIG. 5C46.

In FIG. 5C46, a tap input by a contact 5640 is detected on the add widget button 5094. In response to the tap input by the contact 5640, the device displays the widget selection and configuration user interface 5304, as shown in FIG. 5C47. In FIG. 5C47, a tap input by a contact 5642 is detected at a respective location corresponding to the recommended widget 5310*g*, and after the contact is maintained on the widget 5310*g* for at least a threshold amount of time with less than a threshold amount of movement, the widget 5310*g* is selected as indicated by the selection indicator 5312*g*. In FIG. 5C48, after the widget 5310*g* is selected by contact 5642, movement of the contact 5642 is detected. In accordance with a determination that more than a threshold amount of movement of the contact 5642 has been detected, the widget selection and configuration user interface starts to fade away and eventually ceases to be displayed (as shown in FIGS. 5C48) and the user-arranged page 5302' is displayed with the widget 5310*g* hovering over it, as shown in FIG. 5C49.

In FIGS. 5C49-5C51, the widget 5310*g* is dragged to a fourth location in the page 5302' in accordance with movement of the contact 5642. In FIG. 5C50, the contact 5626 is maintained over the fourth location for at least a threshold amount of time without being terminated. The fourth location currently accommodates a set of application icons 5008*ac*-5008*af* in a 2×2 grid that matches to size of the widget 5310*g*. In FIG. 5C50, in accordance with a determination that drag input by the contact 5646 is maintained over the fourth location for more than a threshold amount of time without being terminated, the set of application icons 5008*ac*-5008*af* and all or a predetermined set of the application icons below the set of application icons 5008*ac*-5008*af* are shifted rightward and downward one by one, until enough space is created for the insertion of the widget 5310*g* at the fourth location. All or a predetermined set of the application icons at the end of the layout (e.g., last icons in the last row) that do not fit within the current page are pushed into the folder 5390*a*. For example, the last three application icons 5008*an*, 5008*aq*, and 5008*ar* on the current page 5302' are moved into the folder 5390*a*, as shown in FIG. 5C51.

FIG. 5C52 shows a number of inputs by various contacts 5644, 5646, 5648, and 5650 that are detected in different scenarios, in accordance with some embodiments. In some embodiments, the device, when detecting an input, uses the location of the input to determine which operation is to be performed in response to the input.

In FIG. 5C52, a tap input by a contact 5646 is detected at a location corresponding to a deletion affordance 5320*g* associated with the widget 5310*g*. In response to detecting the tap input by the contact 5646, the device deletes the widget 5310*g* from the user-arranged page 5302', as shown in FIG. 5C53. In FIG. 5C53, in response to the removal of the widget 5310*g*, the application icons that are shifted on the user-arranged page and the application icons that are moved to the folder 5390*a* due to the insertion of the widget 5310*g* are returned to their original locations on the user-arranged page 5302' (e.g., the state shown in FIG. 5C46 is restored).

FIG. 5C52 also shows a tap-hold input by a contact 5648 (or an upward swipe input by the contact 5648, or a light press input by the contact 5648) at a location corresponding to the widget 5310*g*. The input is distinguished from a tap input on the widget 5310*g* which launches the application corresponding to the widget 5310*g*. In response to the input on the widget 5310*g* by the contact 5648 that is distinguished from a tap input for launching the corresponding application (and distinguished from a touch-hold and drag input for starting the first reconfiguration mode, and distinguished from an extra-long touch and hold input, etc.), the device displays a widget-specific configuration platter 5352 with a plurality of options (e.g., widget options 5394*a*-5394*d*) for the widget 5310*g*, as shown in FIGS. 5C54-5C55. In 5C55, the widget configuration platter 5352 includes a deletion affordance 5346 for deleting the widget 5310*g* from the current page 5302. In some embodiments, in response to detecting a tap input by a contact 5652 on a done button 5351 displayed next to the widget configuration platter 5352, the device dismisses the widget configuration platter 5352 and redisplays the user-arranged home screen 5302' in the first reconfiguration mode, as shown in FIG. 5C55.

Also in FIG. 5C52, a tap input by a contact 5650 is detected at respective location corresponding to the folder 5390*a*. In response to detecting the tap input by the contact 5650, the device opens a pop-up window 5390*a'* corresponding to the folder 5390*a*, displays the plurality of application icons included in the folder (e.g., application icons 5008*an* and 5008*ao*-5008*ar*) in the pop-up window 5390*a'* and provides an option to rename the folder, as shown in FIG. 5C56. In some embodiments, the pop-up window 5390*a'* overlays the user-arranged page 5302'. In some embodiments, the pop-up window 5390*a'* is displayed with an option 5398 for deleting all or predetermined set of application icons in the folder 5390*a* (and deleting the associated applications from the device), and an option 5400 for creating a new user-arranged page of the multipage home screen user interface for accommodating the plurality of application icons present in the folder 5390*a*.

In FIG. 5C52, a tap input by a contact 5644 is detected at a respective location on the touch screen 112 that corresponds to the add widget button 5094. In response to detecting the tap input by the contact 5644, the device displays the widget selection and configuration user interface 5304, as shown in FIG. 5C57. In FIG. 5C57, a tap input by a contact 5654 is detected at a location corresponding to the calendar application 5316*a*. In response to detecting the tap input by the contact 5654, the device displays an application-specific widget configuration user interface 5304', as shown in FIG. 5C58. The application-specific widget configuration user interface 5304' has a size selection portion 5659 that lists a plurality of sizes 5400*a*-5400*c* for a widget corresponding to the currently selected application (e.g., calendar). In some embodiments, the most commonly used sizes are displayed, such as 2×2 sized, 2×4 size, and 4×4 sized. Additional sizes are also available upon selection of a "more sizes" button in the size selection area. In FIG. 5C58, the 2×2 widget size 5400*a* is selected, and as a result, the widget previews (e.g., widget 53101 for the up next widget type, and widget 5310*m* for the today widget) shown in the widget type selection portion 5657 are shown with the 2×2 size. In some embodiments, if a different widget size is selected, the previews of the different types of widgets shown in the widget type selection area will have the different selected size.

In FIG. 5C58, a touch-hold and drag input (or a simple drag input) by a contact 5656 is detected at a location corresponding to the widget 53101 for the up next widget of the calendar application. In response to the drag input by the contact 5656, the device ceases to display the application-specific widget configuration user interface 5304' and displays the user-arranged page 5302' of the multipage home screen user interface underneath the widget 53101, as shown in 5C59. In some embodiments, the widget 53101 is dropped at the location currently occupied by another widget 5310*g* of the same size. In some embodiments, as shown in FIGS. 5C59 and 5C60, in accordance with a determination that the widget 53101 is dropped at the location occupied by another widget of the same size (e.g., by the liftoff of the contact 5656 over the location), the widget 53101 is added on top of the widget 5310*g* to create a widget stack 5396 at the location previously occupied by just the widget 5310*g*. In some embodiments, additional widgets of the same size can be dropped onto the same location, adding additional widgets to the widget stack. Additional aspects of managing the widget stack and updating the currently displayed widget at the placement location of the widget stack are described with respect to FIGS. 5D1-5D12 and 5C18-5C32 and accompanying descriptions.

In FIG. 5C61, two separate inputs are detected in different scenarios. In particular, while the widget stack displaying user-arranged home screen 5302' including a plurality of application icons 5002 and multiple widgets and/or widget stacks, a tap input by contact 5658 is detected at a location corresponding to a widget on top of widget stack 5396 (e.g., at widget 53101). In response to detecting a tap-hold input by a contact 5658 (e.g., distinguished from a tap input for launching the application and a long tap-hold input for triggering the first reconfiguration mode, etc.), the device displays a stack-specific configuration platter 5340" (e.g., analogous to the stack-specific configuration platter 5340' in FIG. 5C24) overlaid on the user-arranged page 5302', as shown in FIG. 5C62. In some embodiments, the stack-specific configuration platter 5340" displays options 5356 for displaying the widget-specific options for the two or more widgets in widget stack 5396 (e.g., similar to the widget options pop-up 5352 in FIG. 5C55). In some embodiments, tap input by contact 5664 is detected on 'wildcard widget' selector (e.g., a toggle option). In some embodiments, in response to detecting tap input by contact 5664, the device turns on a wildcard widget option (e.g., including a system-selected widget in widget stack 5396). In some embodiments, the stack configuration platter 5340" includes a control 5360 for enabling a wildcard widget for the stack and a control 5362 for enabling automatic switching of the currently displayed widget for the widget stack. In some embodiments, in response to detecting tap input by contact 5666, the device turns on automatic switching of widgets within in the widget stack (e.g., a widget in widget stack 5396 is displayed for a predetermined time and then replaced by another widget from widget stack 5396).

In FIG. 5C61, another tap input by a contact 5660 is detected at a respective location corresponding to the add widget button 5094. In response to detecting the tap input by the contact 5660, the device displays the widget selection and configuration user interface 5304, as shown in FIG. 5C63. In FIG. 5C63, for example, the widget 5310*f* is selected, as indicated by highlighted widget selection indicator 5312*f*. In FIG. 5C63, a tap input by a contact 5668 is detected at a location corresponding the 'add' button 5318 while the widget 5310*f* is selected. In response to detecting the tap input by the contact 5668, the device ceases to display the widget selection and configuration user interface 5304, and displays the user-arranged home screen 5302' including widget 5310*f* at a predefined default location (e.g., top of the page, upper left corner of the page, etc.), as shown in FIG. 5C64.

FIGS. 5C64-5C67 illustrate page navigation and page reconfiguration in response to movement and placement of the widget 5310*f* by a drag input by a contact 5670. In FIG. 5C64, the drag input by the contact 5670 is detected at a location corresponding to the widget 5310*f*, and the widget 5310*f* moves in user-arranged home screen 5302' in accordance with the movement of the drag input by the contact 5670. In accordance with a determination that movement of drag input by contact 5670 has exceeded a predefined threshold amount of movement (e.g., half of the display width) in a navigation direction through the multipage home screen user interface, another page 5376' of the home screen user interface is displayed (e.g., user-arranged home screen 5376' is the third page as indicated by highlighted page indicator icon 5004*b*), as shown in FIG. 5C65. As shown in FIG. 5C65, the widget 5310*f* is held over a portion of user-arranged home screen 5376' that corresponds to the location of a respective set of application icons (e.g., application icons 5008*e*-50081). In FIG. 5C66, liftoff of the contact 5670 is detected, while the widget 5310*f* is over the location occupied by the set of application icons 5008*e*-50081. In response to liftoff of the contact 5670, the widget 5310*f* is inserted into the user-arranged page 5376' at the final drop off location. Application icons on the user-arranged page 5376' are shifted rightward and downward one by one toward the last placement location on the page 5376' to make room for the widget 5376' at the drop off location. Application icons 5008*e*-5008*k* are shifted down two rows in user-arranged home screen 5370', and application icons 50081 and 5008*m* are moved to a newly created folder 5390*b* displayed in the lower right corner of user-arranged home screen 5370'), as shown in FIG. 5C67. In FIG. 5C67, an upward edge swipe input by a contact 5670 is detect, and in response, the device exits the first configuration mode and displays the user-arranged page 5376 in the normal non-configuration mode, as shown in FIG. 5C68.

In FIG. 5C68, a leftward swipe input by a contact 5674 is detected on the widget 5310*f*, and in response to the leftward swipe input by the contact 5674, the device navigates to the next page in the sequence of pages of the multipage home screen user interface in the navigation direction (e.g., rightward) specified by the leftward swipe input. As shown in FIG. 5C69, the user-arranged page 5302 is displayed as a result of the swipe input.

In FIG. 5C69, an upward swipe input by a contact 5676 is detected on the widget stack 5396, while the widget 5310*l* is the currently displayed widget in the stack. In response to the upward swipe input by the contact 5676, the widget 5310*g* becomes the currently displayed widget in the widget stack 5396, as shown in FIG. 5C70.

A number of downward swipe inputs by various contacts in different scenarios are shown in FIG. 5C70. In FIG. 5C70, a downward swipe input by a contact 5678 is detected at a location corresponding to the widget stack 5396 while the widget 5310*g* is the currently displayed widget. In some embodiments, in response to downward swipe input by the contact 5678, in accordance with a determination that widget 5310*g* is part of a widget stack, the device replaces the widget 5310*g* with a next widget in the widget stack (e.g., the widget 53101 as shown in FIG. 5C71).

Also in FIG. 5C70, another downward swipe input by a contact 5680 is detected at a location corresponding to application icon 5008*ad* in an example scenario. In some embodiments, in response to the downward swipe input by the contact 5680, the device displays a search user interface 5059, as shown in FIG. 5C73. In some embodiments, search user interface 5059 displays a plurality of suggested application icons (e.g., application icons 5008*a*-5008*d*) and one or more suggested widgets (e.g., widget 5310*n*) before a search input is entered. In FIG. 5C70, another downward swipe input by contact 5682 is detected at a location corresponding to widget 5310*h* in an example scenario. In some embodiments, in accordance with a determination that widget 5310*h* is not part of widget stack, in response to downward swipe by input 5682, the device also displays the search user interface 5059, as shown in FIG. 5C73. In some embodiments, the search user interface 5059 has the same search functions as the search input area 5030 on the system-arranged home screen user interface, and returns search results that include only application icons and optionally widgets. The user can interact with the search results in a manner similar to those described with respect to FIGS. 5A12-5A20 and accompanying descriptions.

In FIG. 5C71, a rightward swipe input by a contact 5684 is detected at a location corresponding to the widget stack 5396 while the widget 53101 is displayed. In some embodiments, in accordance with a determination that the movement of contact 5684 has exceeded a predefined threshold amount of movement (e.g., half of the display width) to complete a page navigation operation, a next page (e.g., user-arranged home screen 5376 as indicated by highlighted page indicator icon 5004*b*) of the home screen user interface in the navigation direction (e.g., leftward) specified by the rightward swipe input is displayed, as shown in FIG. 5C72.

FIG. 5C72 shows downward swipe inputs by contacts 5686 and 5688 respectively detected at locations corresponding to application icon 5008*a* and widget 5310*f*. In some embodiments, in response to detecting either downward swipe input by the contact 5686 or contact 5688, the device displays the search user interface 5059, as shown in FIG. 5C73.

FIGS. 5D1-5D12 illustrate example user interfaces for selecting for display and updating user interface objects containing application content (e.g., mini application objects, widgets, etc.) that are associated with a placement location in a page of a home screen user interface (e.g., a single page or multipage home screen user interface), in accordance with some embodiments.

FIG. 5D1 illustrates an example page of home screen user interface (e.g., page 5404 of a multipage home screen user interface). In some embodiments, the page 5404 is a user-arranged page of a multipage home screen user interface. In some embodiments, the user interactions demonstrated using the example page 5404 is also available on at least a portion of a system-arranged page of a multipage home screen user interface or a single-page home screen user interface that displays both application icons and user interface objects containing application content corresponding to different applications. In some embodiments, the user interactions demonstrated using the example page 5404 is also available on a widget page of a multipage home screen user interface. In some embodiments, the user interactions demonstrated using the example page 5404 is also available on an application library user interface 5054' (FIG. 5A34) or a widget screen user interface 5053 (FIG. 5A23) that overlay a home screen user interface.

As shown in FIG. 5D1, at a first moment in time (e.g., T=6:12 PM), the page 5404 displays a plurality of widgets at respective placement locations assigned to the widgets. The plurality of widgets include a suggested applications widget 5055 that includes application icons of automatically selected applications based on the current context, a second widget 5310*h* of application 1, a second widget 5310*g* of application 2, a weather widget 5406 of the weather application. The page 5404 also includes a few application icons (e.g., application icons 5008*ae* and 5008*af*) at their respective placement locations.

In some embodiment, a placement location on a page of the home screen has a respective size that is configured to accommodate a widget of a corresponding size, or a grid of application icons of the same corresponding size. For example, a 1×1 sized placement location only accommodates a single application icon, and cannot accommodate any widget. A 1×2 sized placement location can accommodate two application icons arranged side by side in a row, or a single 1×2 sized widget. A 2×2 sized placement location can accommodate four application icons arranged side by side in two adjacent rows, and a single 2×2 sized widget or two 1×2 sized widgets arranged in two adjacent rows. A 2×4 sized placement location can accommodate a two rows of four application icons arranged side by side, a single 2×4 sized widget, two 1×4 sized widgets arranged in two adjacent rows, or two 2×2 sized widgets arranged side by side in a single row, etc. A 4×4 sized placement location can accommodate four rows of four application icons arranged side by side, a single 4×4 sized widget, two rows of 2×4 sized widgets, two rows of two 2×2 sized widgets arranged side by side, etc. In some embodiments, a placement location is optionally associated with multiple widgets of the same size. For example, a 2×2 sized placement location is optionally associated with 2 or more 2×2 sized widgets and the widgets are selectively displayed at the placement location at different times. In some embodiments, a placement location is optionally associated with multiple widgets of different sizes, and may display different combinations of widgets that can be accommodated by the size of the placement location. For example, in some embodiments, a 2×4 sized placement location can be associated with two 2×2 sized widgets, two 1×4 sized widgets, and a 2×4 sized widget; and optionally, the set of 2×2 sized widgets, the set of two 1×4 sized widgets, and the single 2×4 sized widgets are respectively displayed at different times at the placement location. In some embodiments, the computer system selects which set of widgets to display based on the current context. As shown in FIG. 5D1, the suggested applications widget 5055 is a 1×4 sized widget, the second widget 5310*h* of application 1 is a 1×2 sized widget, the second widget 5310*g* of application 2 is a 2×2 sized widget, the weather widget is a 2×4 sized widget. The application icons 5008*ae* and 5008*af* arranged side by side in a single row occupies the same sized placement location as the second widget 5310*h*. The application icons 5008*ae* and 5008*af*, and the second widget 5310*h* of application 1 together occupy the same sized placement location as the second widget 5310*g* of application 2. The application icons 5008*ae* and 5008*af*, the second widget 5310*h* of application 1, and the second widget 5310*g* of application 2 together occupy the same sized placement location as the weather widget 5406. In some embodiments, the widgets are displayed in FIG. 5D1 in accordance with respective autorotation schedules that are assigned to respective placement location(s). In some embodiments, the autorotation schedules for the different locations are staggered, so multiple placement locations are not updated at the same time (e.g., not at all, or not more than a preset threshold frequency, etc.).

FIG. 5D2 illustrate that some of the placement locations that are currently displaying the widgets shown in FIG. 5D1 are associated with multiple widgets, while other placement locations are associated with a single widget only. For example, the placement location 5410*a* is associated with the suggested applications widget 5055. The placement location 5410*d* is associated with the second widget 5310*h* of application 1 and the first widget 5310*i* of application 2. The placement location 5410*b* is associated with the second widget 5130*g* of application 2, the up next widget 5412*c* of the calendar application, the UK weather widget 5412*g* of the weather application, the set alarm widget of the alarm application, and a wildcard widget. The placement location 5410*c* is associated a local weather widget 5406 of the weather application, a world clock widget 5414*c* of the clock application, a nearby widget 5414*b* of the maps application, a recommended contacts widget 5414*a* of the messages application, and a wildcard widget. Other placement locations (e.g., placement locations 5008*ae*', 5008*af*, 5008*n*', 5008*o*', 5008*p*' and 5008*q*') on the page 5404 are occupied by application icons (e.g., application icons 5008*ae*, 5008*af*, 5008*n*, 5008*o*, 5008*p*, and 5008*q*). In some embodiments, for a placement location that is associated with multiple widgets from different applications, the user has enabled automatic switching of the widgets based on context as well as manual switching in response to user inputs. In some embodiments, the widgets have a sequential order in the stack of widgets associated with a given placement location, but may be displayed out of sequence based on how relevant they are for the current context. In some embodiments, the context data is only used to select the top widget, and the user can select to display the next widget or previous widget in the sequence by providing a stack navigation gesture in a first or second navigation direction.

FIG. 5D3 illustrates that, at a different time from that shown in FIG. 5D1 (e.g., T=6:15 PM), the set of recommended applications are updated to include a different set of application icons. In accordance with a recent update to the suggested applications widget 5055, the computer system displays an update indicator 5416*b* on the corner of the suggested applications widget 5055. In some embodiments, the update indicator 5416*b* fades away after a preset period of time. At this moment, no update is made to the widget displayed at placement location 5410*d*. As shown in FIG. 5D3, the placement location 5410*b* is updated and the second widget 5310*g* of the Application 2 is replaced by the up next widget 5412*c* of the calendar application, because the computer system determines that the scheduled time for the upcoming event on the calendar is close or within a threshold amount of time (e.g., 15 minutes) of the current time. An update indicator 5416*c* is displayed at the corner of the widget 5412*c* to indicate that an update has occurred for this placement location. In some embodiments, the content of the upcoming event (e.g., people, location, activity, etc.) is used as the data for determining the current context as well as other data, such as the current location, current time, current activities of the user on the computer system, etc. In accordance with the context determined by the data available to the computer system, the computer system updates the widgets displayed at the placement location 5410*c* as well, replacing the local weather widget 5406 with two widgets, the nearby widget 5414*b* of the maps application and the recommended contacts widget 5414*a* of the messages application. In some embodiments, the content of the widgets displayed in the nearby widget 5414*b* and the recommended contacts widget 5414*a* is updated based on the current context as well. For example, the meeting location and meeting time in the upcoming event is used to recommend a driving route in the nearby widget, and the meeting participants are listed in the recommended contacts widget 5414*a*. In some embodiments, two widgets are selected from the set of widgets associated with the placement location 5410*c* because both appear to be sufficiently relevant to the current context, but neither is absolutely dominating over the other for the current context. In some embodiments, the two widgets concurrently displayed in the same placement location are resized (or a suitable sized widget from the same application is selected) to fit within the placement location. In some embodiments, a platter 5412*a* is displayed underneath the two widgets that are selected for concurrent display at the same placement location, and an update indicator 5416*a* is displayed at the corner of the platter 5412*a*.

FIG. 5D4 illustrates that, shortly after the update to the page 5404, a notification 5412*d* for a message arrives at the computer system. The content of the message is regarding a flight that leaves London in an hour, and a request for a phone call to Danny.

FIG. 5D5 following FIG. 5D4 illustrates that, the arrival of the message provides new data to update the current context, and in accordance with the update to the current context, the up next widget 5412*c* is replaced with the UK weather widget 5412*c* showing the current weather in London. In addition, the world clock widget 5414*c* is added to the placement location 5410*c*, and displayed concurrently with a resized recommended contacts widget 5414*a* of the messages application and the nearby widget 5414*b* of the maps application, e.g., because the added data makes the relevance (determined by the computer system) of multiple widgets less clear than a moment before (e.g., calendar event is still coming up in 15 minutes). In addition, the recommended applications widget 5055 is updated to show the application icon of a telephony application to make it more convenient for the user to call Danny as requested in the message. The recommended contacts in the recommended contacts widget 5414*a* is also updated to include an avatar of Danny to make it easier for the user to contact Danny via text message. The world clock widget 5414*c* is updated to show the local time at the user's location as well as the local time in London. Since the placement locations for displaying the recommended applications widget 5055, the UK weather widget 5412*g*, and the world clock widget 5414*c* are updated, update indicators 5416*b*, 5416*a*, and 5416*c* are displayed at their corresponding placement locations.

FIG. 5D6 illustrates that, at a later time (e.g., T=6:25 PM), after the user has locked the screen and has just woken the display of the computer system again, a wake screen user interface 5384 is displayed. An unlocking input by a contact 5692 (e.g., an upward edge swipe input, or another input that dismisses the lock screen or wake screen of a device, etc.) is detected on the wake screen user interface 5384.

FIG. 5D7 shows that, after the computer system is unlocked and the page 5404 is displayed, the placement locations are updated again, in accordance with new context data, such as a new location, a new time, and existing context data that is still relevant. For example, the current location of the user is at the location indicated in the upcoming calendar event, the current time is proximate to the event time of the upcoming calendar event. As a result of this data, the relevance (determined by the computer system) of the calendar widget is reduced because it is clear from the new context data that the user is aware of the calendar event and has arrived at the location of the calendar event on time. As a result of the decreased relevance (determined by the computer system) for the up next widget 5412*c*, and the decreased relevance (determined by the computer system) for the UK weather widget (e.g., due to elapsed time from receipt of the message notification 5412*d*), the computer system determines that an alarm widget may be the most useful for the user at the present time. Accordingly, the computer system displays the alarm widget 5412*e* at the placement location 5410*b* to allow the user to set an alarm for the arrival time of Danny. The alarm widget 5412*e* optionally shows an upcoming alarm (e.g., set at 2:30 AM) (which also increased its relevance (determined by the computer system)) and a suggested alarm based on the arrival time of a flight from London to San Francisco. In the placement location 5410*c*, new context data indicates that the computer system is placed in close proximity to a card reader of a vehicle charging station 5418, and the new context data clearly indicates that a digital wallet widget 5414*c* is most likely to be relevant to the user, and the computer system utilizes the wildcard widget slot associated with the placement location 5410*c* to display the digital wallet widget 5414*c*. In some embodiments, the user selects the relevant card from the digital wallet widget 5414*c* or the digital wallet widget content is automatically updated (e.g., without user input) to show a vehicle charging card of the user. In FIG. 5D7, since the wildcard widget replaced the nearby widget 5414*b* of the maps application at the placement location 5410*c*, the application icon of the maps application is added to the suggested applications widget 5055 to allow easy access to the maps application (e.g., to look up a route to the airport to pick up Danny tomorrow). In addition, since the wildcard widget replaced the recommended contacts widget 5414*a* of the messages application at the placement location 5410*c*, the application icon of the messages application is added to the suggested applications widget 5055 to allow easy access to the messages application (e.g., to message Danny regarding the pickup tomorrow). Due to the updates of the widgets at the placement locations 5410*a*, 5410*b* and 5410*c*, update indicators 5416*b*, 5416*a*, and 5416*c* are displayed at the corner of their respective placement locations.

FIG. 5D8 illustrates that, at a later time (e.g., T=10:00 AM the next day), the page 5404 is displayed while the current location is at the local airport and the current time is close to the arrival time of a flight AFX from London. Based on the new context data (e.g., current location at the airport, current time is near flight arrival time, etc.) and the existing context data that is still relevant (e.g., the message about the arrival of Danny from London, and the request for the call, etc.), the computer system determines that a flight status widget 5412*f* of a flight application is most likely to be useful to the user at the current time, and utilizes the wildcard slot of the placement location 5410*b* to display the flight status widget 5412*f* at the placement location 5410*b*. The content of the flight status widget 5412*f* is updated to show the flight status of a flight arriving from London at 11:35 AM, for example. In addition, the computer system determines that the user may very likely need a ride hailing service to pick up Danny, and utilizes the wildcard slot of the placement location 5410*c* to display a ride hailing widget of a ride hailing application at the placement location 5410*c*. The computer system also determines that the recommended contacts widget 5414*a* of the messages application and the world clock widget 5414*c* of the clock application may also be useful at this time, and display them concurrently with the ride hailing widget 5414*d* within the placement location 5410*c*. The content of the ride hailing widget 5414*d* is updated to show a suggested destination of "home" and the content of the world clock widget 5414*c* is updated to show the current time locally and in London. As shown in FIG. 5D8, the suggested applications are also updated to show the application icons for the maps application, the weather application, the telephony application, and the camera application, which are determined to be relevant to the current context, and do not have a corresponding widget on the same page. In FIG. 5D8, the computer system also switches the widget displayed at placement location 5410*d* from the second widget 5310*h* of application 1 to the first widget 5310*i* of the application 2, e.g., according to an autorotation schedule associated with the placement location 5410*d*. Due to the update made to the placement locations 5410*a*, 5410*b*, 5410*c*, and 5410*d*, the update indicators 5416*a*, 5416*b*, 5416*c*, and 5410*d* are displayed at the corner of their corresponding placement locations.

FIG. 5D8 also shows that an input by a contact 5415 is detected on the avatar of Danny in the recommended contacts widget 5414*a* of the messages application, and in response to the input by the contact 5415, the computer system launches the messages application and displays a messaging user interface 5386 for sending a text message to Danny, as shown in FIG. 5D9. In FIG. 5D9, a text message 5387 is sent by the user to Danny indicating the user's current location, a meeting location for pickup, and a request for Danny to call with a user's phone number. An input (e.g., an upward edge swipe, or another dismissal gesture, etc.) by a contact 5389 is detected to dismiss the messages application after the text message 5387 has been sent.

FIG. 5D10 illustrates that, after the messages application is dismissed, the page 5404 is redisplayed with updates to the placement locations on the page 5404. In particular, the placement location 5410*c* is updated to remove the recommended contact widget 5414*a* because the user has just finished using the messages application and dismissed the messages application. The suggested applications widget 5055 is updated to include the application icon of the messages application so the messages application is still easily accessible to the user. Other application icons in the recommended applications widget 5055 are also updated optionally based on the current context. In the placement location 5410*b*, the flight status widget 5412*f* remains most relevant in light of the current time and location (e.g., at the airport and close to the arrival time of the flight from London) and continues to be displayed in the wildcard slot of the placement location 5410*b*. After the removal of the recommended contacts widget 5414*a* and the world clock widget 5414*c* from the placement location 5410*c*, the computer system determines that the user may wish to preview a route of the drive from the airport to home or look up another stop along the route (e.g., a place for lunch), and accordingly the relevance (determined by the computer system) of the nearby widget 5414*b* is increased and displayed concurrently with the ride hailing widget 5414*d* in the placement location 5410*c*. Due to the updates to the placement locations 5410*a* and 5410*b*, update indicators 5416*a* and 5416*b* are displayed at corresponding placement locations.

In FIG. 5D10, an upward swipe input by a contact 5694 is detected on the flight status widget 5412*f* of the flight application currently displayed at the placement location 5410*b*, and in response to the upward swipe input by the contact 5694, the computer system replaces the currently displayed widget with another widget from the widget stack associated with the placement location 5410*b*. In this example, the next widget in the sequence of widgets in the widget stack (e.g., a cyclic sequence) after the wildcard widget is the second widget 5310*g* of application 2. Accordingly, the computer system replaces display of the flight status widget 5412*f* with the second widget 5310*g* of application 2, as shown in FIG. 5D11. Because the update to the placement location 5410*b* is due to manual input, the update indicator 5416*c* for the placement location is optionally not displayed.

In FIG. 5D11, another upward swipe input by a contact 5695 is detected on widget(s) currently displayed at the placement location 5410*c*, and in response to the upward swipe input by the contact 5695, the computer system replaces the currently displayed widget(s) with another widget from the widget stack associated with the placement location 5410*c*. In this example, the next widget in the sequence of widgets in the widget stack (e.g., a cyclic sequence) after the wildcard widget is the local weather widget 5406. Accordingly, the computer system replaces display of the widget(s) currently displayed at the placement location 5410*c* with the local weather widget 5406, as shown in FIG. 5D12. In some embodiments, if the currently displayed widget at the placement location 5410*c* is not the wildcard widget, or does not contain the wildcard widget, the computer system selects the next widget (e.g., world clock widget) in the stack relative to the currently displayed widget (e.g., local weather widget) in the navigation direction of the input to replace the currently displayed widget at the placement location 5410*c*. Because the update to the placement location 5410*c* is due to manual input, the update indicator 5416*a* for the placement location is optionally not displayed.

FIGS. 5E1-5E32 illustrate example user interfaces (e.g., a page of a home screen user interface and in a stack-specific configuration user interface, etc.) for interacting with a plurality of user interface objects containing application content that are associated with a common placement location (e.g., a widget stack or mini application object stack, etc.), in accordance with some embodiments.

FIGS. 5E1-5E3 illustrate example user interfaces for interacting with widgets and widget stacks in a multipage home screen user interface, in accordance with some embodiments. FIG. 5E1 shows a respective user-arranged page 5202 of a multipage home screen user interface (also referred to as "user-arranged home screen 5202"), including a plurality of application icons (e.g., application icons 5008*a*-5008*k*), and one or more widgets (e.g., widget 5022*j*) and/or widget stacks (e.g., widget stack 5024*b*) arranged in a preset layout (e.g., on a 6×4 grid for application icons, with placement locations for widgets and widget stacks specified in terms of full rows and half rows of the 6×4 grid). A widget stack includes multiple widgets corresponding to different applications and only a subset of the multiple widgets (e.g., one widget, two widgets, etc.) displayed at the placement location of the widget stack at a time. In the widget stack 5024*b*, the currently displayed widget is widget 5022*j* corresponding to an application "App 3". In some embodiments, in a user-arranged page of the home screen user interface (e.g., home screen 5202), the plurality of application icons and the one or more widgets and widget stacks displayed on the page are user-selected and the application icons, widgets, and/or widget stacks are placed at respective positions on the user-arranged page in accordance with user inputs and/or subject to adjustment in accordance with user inputs (e.g., inputs received while the page is displayed in an icon reconfiguration mode). In some embodiments, page navigation element 5004 is displayed on the user-arranged home screen 5202 with page indicator icon 5004*a* highlighted, indicating that the currently displayed page 5202 of the multipage home screen user interface is the first page of a total of four pages of the multipage home screen user interface.

In FIG. 5E1, the device 100 displays the user-arranged home screen 5202 in a normal operation mode (e.g., a normal mode, in some embodiments, provides the ordinary functions of application icons and widgets (e.g., a tap input on an application icon or widget causes display of an application corresponding to the application icon or widget). In the normal operation mode, positions of the application icons and widgets on the user-arranged home screen 5202 (and other pages of the multipage home screen user interface) cannot be adjusted in response to drag and drop inputs directed to the application icons and widgets. As shown in FIG. 5E1, the device 100 detects a swipe input by a contact 6100 in a first direction at a location of the widget stack 5024*b* (e.g., an upward edge swipe on widget stack 5024*b*). In some embodiments, the widget stack 5024*b* is visually distinguished from an individual widget (e.g., widget 5022*j*) upon touch-down or swipe of the contact 6100 at the location of the widget stack 5024*b*. In some embodiments, upon detecting touch-down or movement of the contact 6100, the device 100 reveals edges of one of more widgets included in the widget stack 5024*b* underneath the currently displayed widget (e.g., widget 5022*g*) in the widget stack.

FIGS. 5E2-5E3 illustrate that, in response to detecting the swipe input by the contact 6100 at the location of the widget stack 5024*b* (e.g., as shown in FIG. 5E2) and in accordance with a direction of the swipe input by the contact 6100, the device 100 replaces the currently displayed widget (e.g., widget 5022*g*) with another widget in the stack (e.g., a widget that is next to the currently displayed widget in the stack (e.g., widget 5022*k*), as shown in FIG. 5E3). In some embodiments, widget indicator icons 5330 are displayed adjacent to or at the location of the widget stack 5024*b* when the currently displayed widget of the widget stack 5024*b* is switched (e.g., due to manual switching in response a user input (e.g., the upward swipe input by the contact 6100), and/or due to automatic switching according to a schedule or a changed context, etc.). The widget indicator icons 5330 indicates the number of widgets included in the widget stack and a position of the currently displayed widget relative to other widgets in the widget stack. For example, in FIG. 5E2, widget indicator icon 5330*e* is highlighted, indicating that widget 5022*g* is the second widget in widget stack 5024*b*; and in FIG. 5E3, after widget 5022*g* is replaced with widget 5022*k* in response to the swipe input by the contact 6100, widget indicator icon 5330*f* is highlighted, indicating that widget 5022*k* is the third widget and last widget in the widget stack 5024*b*. In some embodiments, the widget indicator icons are persistently displayed near or at the location of a corresponding widget stack. In some embodiments, the widget indicator icons are displayed whenever the currently displayed widget in its corresponding widget stack is switched (e.g., by automatic switching or rotation, and/or by user request). In some embodiments, the widget indicator icons are only displayed if the currently displayed widget is switched in response to conditional automatic switching implemented by the device 100 (e.g., based on time and/or changed context) without explicit user request.

FIGS. 5E3-5E9 illustrate an example process for adding a widget to a widget stack in the respective page 5202 of the multipage home screen user interface, in accordance with some embodiments. FIGS. 5E3-5E9 also illustrates movement of a widget stack and application icons on the respective page of the multipage home screen user in response to removal of a widget from its original placement location on the respective page of the multipage home screen user interface, in accordance with some embodiments.

In FIG. 5E3, the user-arranged page 5202 of the multipage home screen user interface includes a plurality of application icons (e.g., application icons 5008*a*-5008*h*) arranged in two full rows with four application icons each, followed by a 2×2 sized widget 5022*j* and a 2×2 sized widget stack 5024*b* arranged side by side. Below the 2×2 sized widget 5022*j* and the 2×2 sized widget stack 5024*b* is a single partial row with three application icons (e.g., application icons 5008*i*-5008*k*). The device 100 detects touch-down of a contact 6102 at a location of widget 5022*j* on the touch-screen 112. In response to detecting the contact 6102 and in accordance with a determination that selection criteria are met (e.g., the contact 6102 has not moved by more than a threshold amount during a threshold amount of time to meet a touch-hold requirement, or an intensity of the contact 6102 meets a first intensity threshold above the contact detection intensity threshold, etc.), the device selects the widget 5022*j* and displays visual feedback (e.g., widget 5022*j* is shown as highlighted, enlarged, reduced in size, and/or lifted up, etc.) indicating the selected state of the widget 5022*j*. FIG. 5E4 following FIG. 5E3 illustrates that, after the selection criteria are met, the device detects movement of the contact 6102, and in response to the movement of the contact 6102, the device 100 enters a first reconfiguration mode (e.g., an icon reconfiguration mode) in which user interface objects corresponding to different applications (e.g., application icons, widgets, widget stacks, etc.) on the home screen user interface can be added, deleted, and/or repositioned in accordance with user inputs. In FIG. 5E4, the user-arranged page 5202 (also referred to as home screen 5202) is displayed in the first reconfiguration mode, and is relabeled as user-arranged page 5202' (also referred to as home screen 5202').

In some embodiments, in response to detecting a input that corresponds to a request to enter the first reconfiguration mode (e.g., a touch-hold input on an application icon or widget that meets a first time threshold, a touch-hold input on an unoccupied area on a page of a home screen user interface that meets a second time threshold, a touch-hold input that meets a third time threshold followed by a drag input on an application icon or widget, a light press input followed by a drag input on an application icon or widget, etc.), the device enters into the first reconfiguration mode and generates a non-visual output (e.g., tactile output 5092) and/or visual feedback (e.g., animates the application icons in home screen 5202') to indicate that the first reconfiguration mode (e.g., the icon reconfiguration mode) is activated. In some embodiments, after the device 100 enters the first reconfiguration mode, the widget stack 5024*b* is displayed with a visual indication (e.g., the edges of one or more lower widgets in the stack 5024*b* are visible, as shown in FIG. 5E4) that multiple widgets are present in the stack, even while the stack is not touched or currently selected. In FIG. 5E4, the device 100 highlights the page navigation element 5004 on the user-arranged page 5202' when the page is displayed in the first reconfiguration mode.

In the first reconfiguration mode, a user interface object corresponding to an application (e.g., an application icon, widget, or widget stack) can be dragged and repositioned in the multipage home screen user interface (e.g., by dropping it onto a placement location for the user interface object. When a user interface object corresponding to an application (e.g., an application, a widget, a widget stack, etc.) is dragged across the display by a contact, the device 100 determines an intent of the user based on one or more characteristics of the drag input (e.g., speed, direction, acceleration, location, etc.), and provides corresponding visual feedback on the user-arranged page. For example, when a user interface object corresponding to an application is quickly dragged across the display, passing through an area occupied by other user interface objects corresponding to different applications (e.g., application icons, widgets, widget stacks, etc.) without substantial pause or slowing down, the device 100 recognize that the user's intent is to pass the area without dropping the dragged object. As a result, the device 100 maintains the user interface objects located in this area at their placement location, and does not provide any visual indication that prompts the user to drop the dragged object when the dragged object moves past this area. In contrast, when the dragged object is hovered near or a placement location of another user interface object on the user-arranged page, the device 100 determines the user's intent based on the types and/or sizes of the dragged object and the object at the placement location, and optionally, the location of the hover relative to the placement location, in addition to the one or more characteristics of the drag input prior to the hover input.

For example, in FIG. 5E4, while the widget 5022*j* remains selected, the device 100 detects movement of the contact 6102 toward the widget stack 5024*b*. In response to detecting the movement of the contact 6102 by more than a threshold distance from a touch-down location of the contact 6102, the device 100 moves the widget 5022*j* from its original placement location on the left of the widget stack 5024*b* in accordance with the movement of the contact 6102. In some embodiments, an existing widget stack can be a drop off location for a dragged widget if a size of the widget stack corresponds to (e.g., is equal to, is larger than, etc.) a size of the dragged widget. As shown in FIGS. 5E5-5E6, the widget stack 5024*b* does not move out of its current placement location when the dragged widget 5022*j* is moved to and hovered over the placement location of the widget stack 5024*b*. In accordance with a determination that liftoff of the contact 6102 is detected while the widget 5022*j* is over the placement location of the widget stack 5024*b* (e.g., overlapping by at least a threshold amount with the widget stack 5024*b* displayed at the placement location), the widget 5022*j* is dropped onto the widget stack 5024*b* and becomes the currently displayed widget in the widget stack 5024*b*. In some embodiments, a widget dropped onto a widget stack becomes the last widget in the widget stack, and consequently, the widget 5022*j* becomes the fourth and last widget in the widget stack 5024*b* (e.g., as indicated by the highlighting of widget indicator icon 5330*g* in FIG. 5E7) upon being dropped onto the widget stack 5024*b*. In some embodiments, a widget dropped onto a widget stack becomes the first widget in the widget stack. In some embodiments, a widget dropped onto a widget stack is inserted before the widget that was the currently displayed widget of the stack at the time of the drop. In some embodiments, the device creates a widget stack when one widget is dragged and dropped onto another widget of the same size, and the resulting widget stack includes both widgets.

In some embodiments, the device 100 uses a hover input (e.g., the contact of a drag input having less than a threshold amount of movement at a respective location during a threshold amount of time) and/or a hover location to disambiguate between an intent to insert a dragged widget to an existing widget stack and an intent to move the dragged widget to the placement location of the existing widget stack without adding the dragged widget to the widget stack. For example, if the contact of a drag input is kept substantially stationary over and slows down significantly near a peripheral portion of a placement location that is occupied by another widget or widget stack for at least the threshold amount of time, a hover input is detected and an intent to move the dragged widget to the placement location is recognized by the device 100; and as a result, the widget or widget stack moves out of the placement location to make room for the dragged widget to be dropped at the placement location without creating a stack and without being added to an existing widget stack. If the contact is kept substantially stationary over a central portion of the placement location that is occupied by another widget or widget stack for at least the threshold amount of time, a hover input is detected over the widget stack and an intent to insert the dragged widget into the existing widget stack at the placement location is recognized by the device 100; and as a result, the widget or widget stack stays in the placement location and is optionally enlarged or moves in the z-direction toward the dragged object (e.g., as shown in FIG. 5E6) to prompt the user that the dragged widget can be dropped into the existing widget stack or be merged with the existing widget at the placement location into a new stack. In some embodiments, other ways of disambiguating the intent to move a widget to a placement location occupied by another widget or widget stack and the intent to add the widget to another widget or widget stack are possible. For example, hovering over a widget stack or widget causes the widget stack or widget to move out of its placement location to allow a dragged widget to be dropped at the vacated placement location; and dropping a dragged widget over a widget stack or widget without hovering over its placement location first causes the dragged widget to be added to the widget stack or merged with the existing widget at the placement location. In some embodiments, when an application icon is dropped onto another application icon, a folder is created including both application icons; when a widget is dropped onto another widget or widget stack, the dropped widget is merged with the underlying widget to form a new widget stack, or added to the existing widget.

In some embodiments, when a widget (e.g., widget 5022*j*) is dragged on a user-arranged page of a home screen user interface in response to user input, the device 100 provides visual feedback regarding how application icons and/or widgets will be repositioned as a result of the movement and/or repositioning of the dragged widget, before the widget is dropped. For example, as shown in FIGS. 5E5 and 5E6, application icons on the home screen 5202' are automatically grouped into 2×2 blocks in accordance with the size of the dragged widget 5022*j*. In particular, as shown in FIGS. 5E5 and 5E6, the application icons 5008*i*-5008*k* are automatically organized from a single row into a 2×2 block, without the widget 5022*j* ever being dragged to the area occupied by the application icons 5008*i*-5008*j*. The organization of the single row of application icons into the 2×2 block provides a visual indication to the user about how the application icons will be reflowed on the current page of the home screen user interface in response to repositioning of the dragged widget on the current page of the home screen user interface. As shown in FIG. 5E7, after the dragged widget 5022*j* is dropped onto the widget stack 5024*b* and becomes part of the widget stack 5024*b*, the updated widget stack 5024*b* moves from its original placement location toward the placement location vacated by the widget 5022*j*, while the 2×2 block of application icons 5008*i*-5008*k* moves toward the placement location vacated by the updated widget stack 5024*b*. In FIG. 5E8, the updated widget stack 5024*b* is reflowed within the page 5202' to the original placement location of the widget 5022*j*, and application icons 5008*i*-5008*k* are reflowed as a 2×2 block to occupy the previous placement location of widget stack 5024*b*. Additional details of how application icons and/or widgets are moved and repositioned in the pages of a home screen user interface in response to movement of widgets are described, for example, with regards to FIG. 5H1-5H76 and accompanying descriptions.

In FIG. 5E8, a user input that corresponds to a request to exit the first reconfiguration mode (e.g., a tap input by a contact 6104 detected at a location corresponding to a "done" button shown in page 5202', an upward edge swipe detected near the bottom edge of the display, etc.) is detected. In response to detecting the input that corresponds to the request to exit the first reconfiguration mode, the device 100 displays the user-arranged page 5202 in the normal mode. As shown in FIG. 5E9, the page 5202 now includes the widget stack 5024*b* and the 2×2 block of application icons 5008*i*-5008*k* arranged side by side. The widget stack 5024*b* includes four widgets.

Also as shown in FIG. 5E9, in some embodiments, widget stack 5024*b* has automatic switching of widgets enabled. With passage of time, widget 50221 replaces widget 5022*i* as the currently displayed widget of the widget stack 5024*b* at the new placement location of the widget stack 5024*b*. The widget 50221 is the first widget in the widget stack 5024*b*, as indicated by the highlighting of widget indicator icon 5330*d*. In FIG. 5E9, a user input that corresponds to a request to enter the first reconfiguration mode (e.g. a touch-hold input by a contact 6106 on an unoccupied area of the user-arranged page 5202, a touch-hold input on an application icon or the widget stack 5024*b*, etc.) is detected. In response to the user input that corresponds to the request to enter the first reconfiguration mode, the device 100 reenters the first reconfiguration mode, as shown in FIG. 5E10.

FIGS. 5E10-5E20 illustrate interactions with an example stack-specific configuration user interface, in accordance with some embodiments.

In FIG. 5E10, a user input that corresponds to a request to display a stack-specific configuration user interface for the widget stack 5024*b* (e.g., a tap input by a contact 6108 on the widget stack 5024*b* while the user-arranged page is in the first reconfiguration mode) is detected. In response to the user input that corresponds to the request to display the stack-specific configuration user interface for the widget stack 5024*b*, the device 100 displays a stack-specific configuration user interface 5026 for the widget stack 5024*b*, as shown in FIG. 5E11. In some embodiments, a touch-hold input by a contact that is detected at a location corresponding to the widget stack 5024*b* triggers display of a quick action menu that includes an option (e.g., "configure widget stack"), that when selected by a tap input, causes display of the stack-specific configuration user interface 5026 as well. In some embodiments, the stack-specific configuration user interface 5026 is displayed as an overlay above a deemphasized (e.g., blurred, darkened, etc.) page of the home screen user interface from which the stack-specific configuration user interface 5026 was invoked, and dismissal of the stack-specific configuration user interface 5026 (e.g., in response to activation of closing affordance 5025 associated with the stack-specific configuration user interface 5026, in response to selecting and dragging a widget from within the stack-specific configuration user interface 5026 to a peripheral region of the stack-specific configuration user interface 5026, tapping on a "Done" button associated with the stack-specific configuration user interface 5026, etc.) restores the deemphasized page of the home screen user interface to a normal appearance state.

FIG. 5E11 shows a number of inputs by various contacts and illustrates different interactions with the stack-specific configuration user interface 5026, in accordance with some embodiments. The stack-specific configuration user interface 5026 concurrently displays representations of the at least two widgets present in a corresponding widget stack (e.g., widget stack 5024*b*). In some embodiments, widget representations shown in the stack-specific configuration user interface 5026 are reduced scale images of the widgets in the widget stack. In some embodiments, the widget representations are functioning widgets that include live application content from their corresponding applications. In some embodiments, widget representations are ordered within the stack-specific configuration user interface in accordance with the ordinal position of their corresponding widgets within the stack (e.g., the top widget in a widget stack will be displayed as the first widget representation in the stack-specific configuration user interface, the bottom widget in the widget stack will be displayed as the last widget representation in the stack-specific configuration user interface, etc.). In some embodiments, the stack-specific configuration user interface 5026 has an adjustable size in at least one dimension (e.g., vertically) and/or is scrollable in that dimension to display additional widget representations that do not fit within the display area of the stack-specific configuration user interface. In some embodiments, a respective widget representation has a corresponding deletion affordance (e.g., deletion affordance 5027 for widget representation 50221' corresponding to widget 50221). In some embodiments, one or more controls for adjusting one or more widget stack configuration options (e.g., "widget suggestion" and/or "smart switching", etc.) are displayed in the stack-specific configuration user interface 5026. In some embodiments, a "widget suggestion" control (e.g., a toggle control 5360, a radio button, etc.), when activated, changes the enabled and/or disabled state of a function that includes in the widget stack a wildcard widget or placeholder widget that is replaced by a system-selected widget at the time of display in the widget stack 5024*b*. Additional details of how a wildcard widget is updated and displayed in a widget stack are described with regards to FIGS. 5C22-5C25 and FIGS. 5D1-5D12 and accompanying descriptions, for example. In some embodiments, a "smart switching" control (e.g., a toggle control 5362, a radio button, etc.), when activated, changes the enabled and/or disabled state of a function that automatically, without direct user input, selects from the widgets in the widget stack as the currently displayed widget of the widget stack (e.g., as shown in FIGS. 5E8-5E9 where widget 50221 replaces widget 5022*j* after the predetermined time has elapsed and/or when the current context has changed, etc.). In the state shown in FIG. 5E11, the "widget suggestion" control shows that the "wildcard widget" function is in a disabled state, and the "smart switching" control shows that the "smart switching" function is in an enabled state.

In some embodiments, contacts 6114, 6116, and 6118 in FIG. 5E11 are detected at a location corresponding to a widget representation (e.g., the representation 50221' of the widget 50221) in the stack-specific configuration user interface 5026. In some embodiments, the contacts 6114, 6116, and 6118 represent inputs that are detected at the same location on the same widget representation 50221' at different times. In some embodiments, contacts 6114, 6116, and 6118 are a same contact that, upon meeting different criteria, cause the device to perform different actions with regards to widget 50221. In FIG. 5E11, contacts 6112 and 6110 are also detected at various locations within the stack-specific configuration user interface. In some embodiments, the device 100 detects a contact, and depending on one or more characteristics of the contact (e.g., location (e.g., initial, current, path history, etc.), duration, movement direction, movement pattern (e.g., path, pause, hover, etc.), intensity, input progression relative to various gesture recognition criteria, etc.) as evaluated against various sets of criteria corresponding to different operations, the device performs the operation for which the corresponding criteria are met by the contact. The contacts shown in FIG. 5E11 represent inputs that meet respective sets of criteria for different operations provided by the stack-specific configuration user interface, in accordance with some embodiments.

FIGS. 5E11-5E13 illustrate an example of navigating the stack-specific configuration user interface 5026 in response to a scrolling input (e.g., a swipe input by the contact 6110 in a first scrolling direction (e.g., upward, downward, etc.)), in accordance with some embodiments. In FIG. 5E11, an upward swipe input by the contact 6110 is detected in the stack-specific configuration user interface 5026 (e.g., beginning in an unoccupied area of the stack-specific configuration user interface 5026 or beginning from a widget representation (e.g., widget representation 5022*g*') that is partially displayed in the stack-specific configuration user interface 5026, etc.). In some embodiments, in response to detecting the upward swipe input by the contact 6110, the stack-specific configuration user interface 5026 is scrolled upwards to show previously un-displayed widget representations (e.g., widget representation 5022*k*'). For example, in FIG. 5E12, in accordance with movement of the contact 6110, the representation 50221' of widget 50221 is scrolled partially out of the display area of the stack-specific configuration user interface 5026, the representation 5022*g*' of widget 5022*g* is displayed in full in the central region of the display area (e.g., widget 5022*g* becomes the currently displayed widget of the widget stack as indicated by the highlighting of widget indicator icon 5330*e* (e.g., widget 5022*g* will be displayed at the placement location of the widget stack if the stack-specific configuration user interface 5026 is displayed at this moment)), and the representation 5022*k*' of widget 5022*k* is scrolled partially into the display area. In some embodiments, as shown in FIG. 5E13, even after liftoff of the contact 6110 (e.g., after termination of the swipe input), the scrolling optionally continues for a finite amount of time or distance (e.g., as a result of simulated momentum), where the representation 5022*g*' of widget 5022*g* scrolls partially out of the display area, the representation 5022*k*' of widget 5022*k* becomes fully displayed in the central region of the display area (e.g., widget **5022*k* becomes the currently displayed widget of the widget stack as indicated by the highlighting of widget indicator icon 5330*f*), and the representation 5022*j*' of widget 5022*j* scrolled partially into the display area. The stack-specific configuration user interface 5026** may be scrolled upward or downward, in accordance with either an upward or a downward swipe respectively, in accordance with some embodiments.

FIG. 5E11 followed by FIG. 5E14 illustrate deletion of a widget from a widget stack, in accordance with some embodiments. As shown in FIG. 5E11, a tap input by the contact 6112 is detected on the deletion affordance 5027 associated with the widget 50221. In response to detecting the tap input by the contact 6112, the device 100 deletes the widget 50221 from the widget stack **5024*b*. As shown in the stack-specific configuration user interface 5026 in FIG. 5E14, the widget representation 50221' of the widget 50221 is no longer displayed in the sequence of widget representations for the widgets in the widget stack 5024*b*. The number of widget indicator icons 5330 is updated to reflect that there are only three widgets remaining in the widget stack 5024*b* after the deletion of widget 50221. In addition, widget indicator icon 5330*e* corresponding to the widget 5022*g* is highlighted, indicating that the widget 5022*g* is now the currently displayed widget in the widget stack 5024*b* as well as the first widget in the widget stack 5024*b***.

FIG. 5E15 following FIG. 5E11 illustrate accessing a widget-specific configuration user interface for a selected widget in the widget stack from the stack-specific configuration user interface, in accordance with some embodiments. As shown in FIG. 5E11, a tap input by the contact 6114 is detected on the representation 50221' of the widget 5022'. In response to detecting the tap input by the contact 6114 on the representation 50221' of the widget 50221, the device 100 displays a widget-specific configuration user interface 5352 with a plurality of selectable configuration options (e.g., widget options **5394*a*-5394*c* (e.g., size, content update frequency, available application function, whether user input is enabled, etc.)) for the tapped widget 50221. In some embodiments, the widget-specific configuration user interface 5352 is displayed overlaid on a deemphasized user-arranged page 5202' or a deemphasized stack-specific configuration user interface 5026. In some embodiments, the widget-specific configuration user interface 5352 includes a deletion affordance 5346 for deleting the widget 50221 from the widget stack 5024*b*. Tap inputs (e.g., inputs by contacts 6124 or 6126) detected at locations corresponding to different widget configuration options (e.g., widget option 1, widget option 2, widget option 3, etc.)) cause the device 100 to update the appearance and/or functions of the widget 50221. In some embodiments, as shown in FIG. 5E15, a preview 50221" of the widget 50221 is displayed in the widget-specific configuration user interface 5352 in accordance with the currently selected configuration options for the widget 50221. In some embodiments, the widget preview includes live application content (e.g., application content that is automatically updated in real-time or periodically) from the application corresponding to the widget 50221. In FIG. 5E15, a done button 5351 is displayed on along with the configuration options 5394 and the preview 50221". A tap input by a contact on the done button 5351 would cause the device 100 to dismiss the widget-specific configuration user interface 5352 and restore display of the stack-specific configuration user interface 5026. In some embodiments, the widget-specific configuration user interface 5352 can be accessed from a quick action menu (e.g., by tapping a "edit widget" option in the quick action menu) associated with the widget 50221 if the widget 50221 is displayed on a user-arranged page of the home screen user interface. In some embodiments, dismissing the widget-specific configuration user interface causes the user-arranged page to be redisplayed. In some embodiments, as shown in FIG. 5E15, the widget preview 50221" shown in the widget-specific configuration user interface 5352 can be selected and dragged onto a user-selected placement location on a user-selected page of the home screen user interface. For example, in FIG. 5E15, upon detected touch-hold input by a contact 6120 on the preview 50221", the preview moves slightly to indicate that it can be dragged away from the widget-specific configuration user interface. In response to detecting a drag input by the contact 6120 after the touch-hold input threshold was met by the contact 6120 at the location corresponding to the preview 50221", the widget preview 50221" is dragged relative to the widget-specific configuration user interface 5352 in accordance with the movement of the contact 6120. In some embodiments, in accordance with a determination that the widget preview 50221" is dragged to a peripheral portion of the widget-specific configuration user interface 5352, the device 100 ceases to display the widget-specific configuration user interface 5352 and displays the underlying user-arranged page 5202'. The widget preview 50221" becomes widget 50221 when being dragged by the contact 6120 across the user-arranged page 5202'. Dragging and dropping the widget 50221 into the user-arranged home screen 5202' is shown in FIGS. 5E21-5E23 following FIG. 5E15. In some embodiments, the widget-specific configuration user interface also includes an "add widget" button 5098 which, when activated, inserts the widget 50221 in the configuration as shown in the preview 50221" directly to a preset location (e.g., the first placement location on the last-displayed page of the home screen user interface, the first available placement location in the home screen user interface, etc.). FIG. 5E15, a tap input by the contact 6122 is detected on the add widget button 5098. In response to the tap input by the contact 6122, the device adds the widget 50221 to the user-arranged home screen 5202' at a predetermined location (e.g., as shown in FIG. 5E25 following FIG. 5E15). In some embodiments, the widget 50221 is removed from the widget stack 5024*b* after it is added to the user-arranged home screen 5202'. In some embodiments, the widget 50221 is not removed from the widget stack 5024*b* if it is added to a page of the home screen (e.g., the same page on which the widget stack 5024*b* is displayed, a different page from the page on which the widget stack 5024*b* is displayed, etc.) via activation of the add widget button 5098 on the widget-specific configuration user interface. In some embodiments, the widget 50221 is not removed from the widget stack 5024*b*** if it is dragged away from the widget-specific configuration user interface and dropped onto a page of the home screen user interface.

FIG. 5E16 following FIG. 5E11 illustrates selection of a widget representation in the stack-specific configuration user interface 5026 in response to a touch-hold input, in accordance with some embodiments. As shown in FIG. 5E16, after touch-down of the contact (e.g., the contact 6114 or contact 6118, respectively) on the widget representation 50221' for the widget 50221, in accordance with a determination that the contact has been kept substantially stationary for at least a threshold amount of time, the device selects the widget representation 50221' (e.g., as indicated by the highlighted boundary of the widget representation 50221'). In some embodiments, the selected widget representation is lifted up from its original location toward the contact (e.g., the contact 6114 or contact 6118, respectively).

FIGS. 5E16-5E19 following FIG. 5E11 illustrate an example process for reordering the widgets in a widget stack using the stack-specific configuration user interface of the widget stack. In FIG. 5E17, after the widget representation 50221' is selected by the touch-hold input by the contact 6114, the device detects movement of the contact 6114 in a first direction (e.g., a downward direction, a rightward direction, a direction going from the top toward the bottom of the stack, an upward direction, etc.) through the sequence of widget representations for widgets in the widget stack 5024*b*. In response to the movement of the contact 6114, as shown in FIGS. 5E17-5E18, the widget representation 50221' is dragged downward past the widget representation 5022*g*' for the widget 5022*g*. As shown in FIGS. 5E18-5E19, lift-off of the contact 6114 is detected when the widget representation 50221' is dragged to a location between the widget representation 5022*g*' and the widget representation 5022*k*' for the widget 5022*k*. In response to detecting lift-off of the contact 6114, the widget representation 50221' is repositioned in between the widget representation 5022*g*' and the widget representation 5022*k*'. As a result, the order of the widgets in the widget stack 5024*b* is adjusted accordingly (e.g., the widget 5022*g* is the top widget in the stack, and the widget 50221 is now the second widget in the stack and, optionally, the currently displayed widget of the widget stack as well (e.g., widget indicator icon 5330*d* is highlighted)). In some embodiments, the representation 50221' of the widget 50221 is semi-transparent or translucent while it is being dragged within the widget stack 5024*b*. In some embodiments, the widget representation 50221' remains opaque during the drag input by the contact 5116.

Returning to FIG. 5E16, after a touch-hold threshold is met by the contact 6118 (e.g., the contact 6118 is held substantially stationary for at least a threshold amount of time) on the widget representation 50221' and the widget representation 50221' becomes selected, the device 100 detects movement of the contact 6118 in a second direction relative to the stack-specific configuration user interface. FIGS. 5E20-5E23 following FIGS. 5E16 and 5E11 illustrate an example process for dragging a widget (e.g., by its widget representation) from the stack-specific configuration user interface and dropping the widget on a user-arranged page of a home screen user interface to insert the widget into the user-arranged page of the home screen user interface. This feature of the stack-specific configuration user interface allows the stack-specific configuration user interface to serves as a mini widget library from which the user can review and configure a plurality of widgets corresponding to different applications and insert a selected one of the plurality of widgets into a user-selected page and/or a user-selected location on the user-selected page, which improves the discoverability and utilization of the widgets.

As shown in FIG. 5E20, in accordance with movement of the contact 6118 toward the periphery (e.g., an edge) of the stack-specific configuration user interface 5026, the widget representation 50221' is lifted off the stack-specific configuration user interface 5026 and taken out of the sequence of widget representations of the widgets in the widget stack 5024*b*. FIG. 5E20 illustrates an intermediate state in which, as the widget representation 50221' is moved toward the peripheral region of the stack-specific configuration user interface 5026, the stack-specific configuration user interface 5026 gradually fades (e.g., is deemphasized visually by dimming and/or becoming more translucent). In some embodiments, in accordance with a determination that the contact 6118 is hovered in the peripheral region of the stack-specific configuration user interface 5026 (or near the edge of the display) for at least a threshold amount of time, the device 100 ceases to display the stack-specific configuration user interface 5026 and the previously deemphasized user-arranged page 5202' is restored (e.g., becomes brighter, more color saturated, more clear, etc.), as shown in FIG. 5E21.

FIGS. 5E21 and 5E22 follow FIG. 5E20 and illustrate intermediate states showing the representation 50221' of the widget 50221 being dragged within the user-arranged page 5202' in the first reconfiguration mode in accordance with movement of contact 6118. As the representation of the widget representation 50221' is moved in the user-arranged page 5202', in accordance with a determination that the widget representation 50221' is approaching a potential placement location that is currently occupied by existing application icons, widget, or widget stack, etc. with a slowing movement speed or hovers at or near the potential placement location, the device 100 automatically moves the application icons, widget, or widget stack currently occupying the potential placement location out of the potential placement location in anticipating that the user's intent is to drop the widget representation 50221' at the potential placement location. For example, as shown in FIGS. 5E21-5E22, when the widget representation 50221' is dragged over to the placement location at the top right corner of the page 5202', application icons 5008*c*, 5008*d*, 5008*g*, and 5008*h* are grouped into a 2×2 block and are reflowed with fixed ordinal positions in that block to vacate the placement location for the widget representation 50221'. In some embodiments, as the 2×2 block formed by the application icons 5008*c*, 5008*d*, 5008*g*, and 5008*k* is reflowed to the next placement location for the 2×2 block in the page 5202', the widget stack 5024*b* is pushed to the right into the next placement location for the widget stack 5024*b* in the page 5202'. Similarly, the 2×2 block formed by application icons 5008*i*, 5008*j*, and 5008*k* is pushed to the next placement location for the 2×2 block in the page 5202'. In FIG. 5E23, in response to detecting lift-off of the contact 6118 while the contact 6118 is over the placement location at the top right corner of the page 5202', the device 100 inserts the widget 50221 into the placement location at the top right corner of the page 5202' application icons, and displays the 2×2 block of application icons formed by application icons 5008*c*, 5008*d*, 5008*g*, and 5008*h* side by side with the widget stack 5024*b* in the two rows below the widget 50221. In some embodiments, after the insertion of the widget 50221, the 2×2 block formed by the application icons 5008*i*-5008*k* are resolved back into a single row as the last row of application icons on the page 5202'.

In some embodiments, in response to lift-off of the contact 6118 and in conjunction with insertion of the widget 50221 in the placement location at the top right corner of the page 5202', the device 100 displays an animation that propagates some visual effect (e.g., simulated wave motion, propagating light waves, etc.) across the page 5202' in direction radiating away from the placement location of the widget 50221. In some embodiments, such animation is not displayed when an existing widget is moved from one placement location to another placement location on the same page. In some embodiments, such animation is not displayed when an existing widget is moved from one placement location to another placement location on the same page or on different pages. In some embodiments, such animation is only displayed when a widget is dragged and dropped onto a page of the home screen user interface from a widget-specific configuration user interface (e.g., widget-specific configuration user interface 5304' in FIG. 5C58, widget-specific configuration user interface 5352 in FIG. 5E15, widget-specific configuration user interface 5270 in FIG. 5I7, etc.), a stack-specific configuration user interface (e.g., stack-specific configuration user interface 5026 in FIG. 5E11), a widget selection and configuration user interface (e.g., widget selection and configuration user interface 5304 in FIG. 5C2, widget selection and configuration user interface 5250 in FIG. 5I2, etc.), etc. which are not a page of the home screen user interface or the system-arranged home screen (e.g., system-arranged home screen 5404 in FIG. 5A4 or 5404' in FIG. 5A34).

FIGS. 5E23-5E32 illustrate examples of movement of widgets and widget stacks within and between respective pages of the multipage home screen user interface, in accordance with some embodiments.

In FIG. 5E23, following FIG. 5E22, widget 50221 has been placed at a placement location in the page 5202' (and optionally removed from widget stack 5024*b*). In FIG. 5E23, a drag input by a contact 6132 is detected at a location corresponding to the widget 50221 in page 5202'. In some embodiments, in accordance with movement of the contact 6132, the widget 50221 is dragged within the user-arranged page 5202' from the placement location in the upper right corner of the page 5202' to the placement location in the upper left corner of the page 5202', as shown in FIGS. 5E24-5E25. In FIG. 5E24, the widget 50221 optionally moves across the page 5202' on a display layer above the 2×2 block formed by application icons 5008*a*, 5008*b*, 5008*e*, and 5008*f*. When the 2×2 block formed by the application icons 5008*a*, 5008*b*, 5008*e*, and 5008*f* moves as a group to the right side of the display, the ordinal positions of the application icons within the 2×2 block remain unchanged. In some such embodiments, the widget 50221 becomes semi-transparent or translucent during the drag input to reveal the locations of any application icons moving underneath the display layer of the dragged widget 5022. In some embodiments, when an existing widget is dragged from one location to another location in a user-arranged page, the last single row of application icons at the bottom of the page remains in a single row, and does not move into a block unless the widget is dragged near the single row.

In FIG. 5E25, a drag input by a contact 6134 is detected at a location corresponding to the placement location of the widget 50221 in the upper left corner of the page 5202'. In some embodiments, the contact 6134 is either a new contact that is detected after termination of contact 6132 or a continuation of contact 6132. As shown in FIGS. 5E26-5E27, as the widget 50221 is dragged across the page 5202' to the right edge of the display, in accordance with a determination that page switching criteria are met (e.g., the contact 6134 has hovered near the edge of the display for at least a threshold amount of time, or movement of contact 6134 has exceeded a predefined threshold amount of movement (e.g., half of the display width), or a page navigation input by another contact is detected, etc.), the widget 50221 is dragged into an adjacent page 5204' of the multipage home screen user interface, as shown in FIGS. 5E28-5E29 (e.g., the device navigates to an adjacent user-arranged home screen 5204' while widget 50221 is dragged by contact 6134). Also shown in FIG. 5E28, as the widget 50221 is dragged away from the page 5202', the application icons reflow as 2×2 blocks to fill the newly vacated space. In some embodiments, as shown in FIG. 5E29, navigation element 5004 is updated to indicate that page 5204' corresponds to a second page of the multipage home screen user interface (e.g., page indicator icon 5004*a* is de-highlighted and page indicator icon 5004*b* is highlighted).

In FIG. 5E30, following FIG. 5E29, lift-off of the contact 6134 is detected while the widget 50221 is dragged over the user-arranged page 5204', e.g., while the widget 50221' is near the placement location in the upper left corner of the page 5204'. In response to detecting the lift-off of the contact 6134, the widget 50221 is placed in the placement location in the upper left corner of the page 5204', while existing application icons 5008*r*-5008*us* on the page 5204' are reflow as a 2×2 block formed by application icons 5008*r*, 5008*s*, 5008*v*, and 5008*w*, and a partial row formed by application icons 5008*t* and 5008*u*. In FIG. 5E30, a user input corresponding to a request to exist the first reconfiguration mode is detected (e.g., a tap input by a contact 6136 is detected at a location corresponding to a done button shown in page 5204' in the first reconfiguration mode, an upward edge swipe input is detected near the bottom edge of the display, a tap input is detected in an unoccupied area on the page 5204', etc.). In response to detecting the input that corresponds to the request to exit the first reconfiguration mode, the device 100 terminates the first reconfiguration mode and displays the user-arranged home screen 5204 in the normal mode, as shown in FIG. 5E31.

In FIG. 5E31, a page navigation input (e.g., a rightward swipe input by a contact 6138, a tap or swipe on the page indicator icon 5004, etc.) is detected while the page 5204 is displayed. In response to the page navigation input, the device 100 displays the page 5202 of the home screen user interface, as shown in FIG. 5E32. FIG. 5E31, shows that the widget 50221 has been removed from the stack 5024*b*, and the last row of application icons 5008*i*-5008*k* is arranged into a 2×2 block and placed in the next placement location after the widget stack 5024*b*. In some embodiments, if the widget 50221 is dragged to another page (e.g., page 5204), a copy of the widget 50221 remains in the widget stack.

In some embodiments, the process shown in FIGS. 5E27-5E30 can continue directly from the state shown in FIG. 5E22, and the contact 6134 shown in FIGS. 5E27-5E29 is the same contact as the contact 6118 shown in FIG. 5E27. In other words, a widget can be dragged from a widget stack and dropped into a page that is different from the page in which the widget stack is displayed. In some embodiments, if the widget is dropped into a page from the widget selection and configuration user interface, a widget-specific configuration user interface, or a stack-specific configuration user interface, rather than moved from another page, the device displays an animated transition showing a visual effect being propagated from the placement location of the widget across the page (e.g., propagating from the upper left corner of the page 5204' in multiple directions across the page 5204').

FIGS. 5F1-5F30 illustrate example user interfaces for interacting with multiple user-arranged pages of a home screen user interface (e.g., in an icon reconfiguration mode, in a page editing mode, and when transitioning between the two modes, etc.), in accordance with some embodiments.

FIG. 5F1 illustrates a first user-arranged home screen 5302 of a multipage home screen user interface currently displayed in a normal mode. When a user-arranged home screen is displayed in the normal mode, the placement locations of the user interface objects on the home screen cannot be directly modified (e.g., the user cannot reorganize and/or delete the application icons or widgets on the home screen in the normal mode). A user interface object on the home screen in the normal mode performs its normal function, e.g., launching a corresponding application, when activated by an input that meets first criteria (e.g., a tap input by a contact on the user interface object, an in-air tap input detected in conjunction with a gaze input directed to the user interface object, etc.). In this example, the multipage home screen user interface includes four user-arranged pages or home screens (e.g., including the first user-arranged home screen 5302), as indicated by the four page indicator icons 5004 (e.g., page indicator icons 5004_a_-5004_d_) in the page navigation element 5004. A respective page indicator icon corresponds to a respective user-arranged home screen, with the page indicator icon corresponding to the currently displayed user-arranged home screen being highlighted (e.g., page indicator icon 5004_a_ corresponding to the first user-arranged home screen 5302 is highlighted). In FIG. 5F1, the computer system (e.g., portable multifunction device 100) detects a tap-and-hold input by a contact 6200 at a location corresponding to an application icon 5008_a_ on the first user-arranged home screen 5302. After the contact 6200 has been held at the location corresponding to the application icon 5008_a_ for a threshold amount of time, the contact 6200 then moves with more than a threshold amount of distance from its initial location.

FIG. 5F2 illustrates that, in response to the movement of the contact 6200 with more than the threshold amount of distance from its initial location in FIG. 5F1, the multipage home screen user interface enters a first reconfiguration mode (e.g., icon reconfiguration mode). The computer system displays the first user-arranged home screen 5302 in the first reconfiguration mode (now labeled as 5302'), where location of application icons on the first user-arranged home screen 5302 can be adjusted by dragging and dropping the corresponding application icons. In some embodiments, an add widget button 5094 is displayed on the user-arranged home screen 5302 (and other user-arranged home screens when the multipage home screen user interface is in the first reconfiguration mode). Activation of the add widget button 5094 causes a widget selection and configuration user interface to be displayed, and new widgets can be selected from the widget selection and configuration user interface and placed on the first user-arranged home screen 5302. In conjunction with displaying the first user-arranged home screen 5302 in the first reconfiguration mode, the computer system highlights the page navigation element 5004 to indicate that additional functionality has become available when the highlighted page navigation element 5004 is activated by an input that meets preset criteria (e.g., by a tap input, by a tap-hold input, etc.). In some embodiments, when the page navigation element 5004 is not highlighted and the home screen user interface is in the normal mode, interaction with the page navigation element in accordance with different preset criteria (e.g., swiping through the sequence of page indicator icons in directions corresponding to the navigation directions through the pages of the home screen user interface, tapping on individual page indicators, etc.) causes navigation through the pages of the multipage home screen user interface. In some embodiments, when the page navigation element is highlighted in the first reconfiguration mode, a tap input on the page navigation element no longer causes navigation to a page corresponding to the tapped page indicator icon, and instead, it causes the computer system to transition from displaying the home screen user interface in the first reconfiguration mode to displaying the home screen user interface in a second reconfiguration mode in which whole pages of the home screen user interface can be reorganized, hidden, and/or deleted. In some embodiments, the computer system disambiguate a request for navigating to another page and a request to enter the second reconfiguration mode using different sets of criteria. For example, a stationary touch input on the page navigation element that meets a preset tap-hold time threshold triggers the transition into the second configuration mode, irrespective which page indicator icon within the page navigation element is touched; while a stationary touch input on the page navigation element that does not meet the preset tap-hold time threshold triggers navigation to the page that corresponds to the page indicator icon that is touched. In some embodiments, instead of a time threshold, a light press intensity above the nominal contact detection intensity threshold is used to disambiguate between the request for navigating to another page (e.g., intensity required to be below intensity threshold before termination of the input) and the request to enter the second reconfiguration mode (e.g., intensity required to be exceed the intensity threshold prior to termination of the input). In some embodiments, swiping on the page navigation element in either the highlighted state or the normal state causes navigation between pages of the home screen user interface. In some embodiments, the page navigation element is replaced with newly displayed affordance (e.g., a button, a link, etc.) that when activated (e.g., by a tap input, a tap-hold input) causes navigation to the second configuration mode, and page navigation is accomplished by swiping on the currently displayed page of the home screen user interface outside of the area occupied by the newly displayed affordance. In some embodiments, the newly displayed affordance for triggering display of the second reconfiguration mode is concurrently displayed with the page navigation element on the currently displayed page of the home screen user interface when the home screen user interface is in the first reconfiguration mode. In this example, as shown in FIG. 5F1, the contact 6200 moved by more than a threshold amount to trigger the first reconfiguration mode, but is the drag input by the contact 6200 is terminated before the application icon 5008_a_ reaches another placement location on the user-arranged page 5302'; and as a result, application icon 5008_a_ remains at its original placement location and the home screen user interface remains in the first reconfiguration mode.

FIG. 5F3 illustrates that, while the user-arranged page 5302' is displayed in the first reconfiguration mode, the computer system detects a tap input by a contact 6202 at a location corresponding to the highlighted page navigation element 5004 on the first user-arranged home screen 5302' displayed in the first reconfiguration mode.

FIGS. 5F4-5F6 illustrate that, in response to detecting the tap input by the contact 6202 at the location corresponding to the highlighted page navigation element 5004 in FIG. 5F3, the computer system displays an animated transition from the first user-arranged home screen 5302' in the first reconfiguration mode to a page editing user interface 5305 corresponding to the second reconfiguration mode (e.g., home screen reconfiguration mode). During the animated transition, the first user-arranged home screen 5302' that was displayed reduces in size and moves toward a position in a preset layout on the display that corresponds to the ordinal position of the page 5302 in the multipage home screen user interface (e.g., given that the page 5302 is the first page in the sequence of pages of the home screen user interface, the page 5302' shrinks and moves toward the first ordinal position in a final 2×2 grid on the display (e.g., the upper left corner slot in the layout)). It appears as if the currently displayed page 5302' is zooming out from the current display, and representations of additional user-arranged home screens (e.g., representations 5306", 5308", and 5309"

of the other pages 5306, 5308, and 5309 of the home screen user interface) gradually come into view and are displayed with the representation 5302" of the first user-arranged home screen 5302 according to a predefined layout (e.g., a 2×2 grid) in the page editing user interface 5305. In some embodiments, the predefined layout for the representations of the pages in the multipage home screen user interface is determined based on the number of user-arranged home screens in the multipage home screen user interface (e.g., including both pages that are accessible by navigating through the multipage home screen user interface, and pages that are hidden and not accessible by navigation through the pages of multipage home screen user interface), as will discussed below in more detail with reference to FIGS. 5F26-5F30.

FIG. 5F6 shows the page editing user interface 5305 corresponding to the second reconfiguration mode of the multipage home screen user interface, displayed in response to the tap input by the contact 6202 in FIG. 5F3. The page editing user interface 5305 displays representations of user-arranged home screen from the multipage home screen user interface (e.g., representation 5302" of the first user-arranged home screen 5302', representation 5306" of the second user-arranged home screen 5306', representation 5308" of the third user-arranged home screen 5308', and representation 5309" of the fourth user-arranged home screen 5309') in accordance with a preset layout, and the a sequential order of the positions of the representations of the user-arranged pages in the preset layout (e.g., left to right, and up to down) corresponds to the sequential order of the user-arranged pages in the multipage home screen user interface. In some embodiments, the representations of the user-arranged home screens in the page editing user interface 5305 are reduced-scale images of the corresponding user-arranged home screens. In some embodiments, the application dock (e.g., a container object including a fixed set of application icons and/or a set of system-selected application icons that is present on multiple user-arranged pages or every user-arranged page at the same location) is removed from the respective representations of the user-arranged home screens, and only the user-arranged application icons (e.g., reduced-scale application icons 5008*a*-5008*m* in FIG. 5F1) are displayed on the representations of the user-arranged home screens. In some embodiments, Respective selection affordances (selection affordance 5312*a*-5312*d* (e.g., a toggle, a checkbox, a hide/unhide button, etc.)) are displayed on or adjacent to corresponding representations of user-arranged home screens. A selection affordance changes its appearance state, when activated, to indicate whether the corresponding user-arranged home screen is currently included in the set of pages that are accessible in the multipage home screen user interface by navigating through the pages of the multipage home screen user interface outside of the second reconfiguration mode. For example, in FIG. 5F6, since the selection affordances for home screens 5302, 5306, 5308, and 5309 are in the selected state, the four user-arranged user home screens 5302, 5306, 5308, and 5309 are accessible in the multipage home screen user interface outside of the second reconfiguration mode.

FIG. 5F6 further illustrates that the computer system detects a tap input by a contact 6204 at a location corresponding to the selection affordance 5312*d* associated with the representation 5309" of the fourth user-arranged home screen 5309' on the page editing user interface 5305.

FIG. 5F7 illustrates that in response to detecting the tap input by the contact 6204, the representation 5309" of the fourth user-arranged home screen 5309' becomes visually de-emphasized (e.g., darkened, blurred, becoming more translucent, etc.) relative to other representations of user-arranged home screens on the page editing user interface 5305, and the selection affordance 5312*d* becomes unchecked to indicate the unselected state of the selection affordance. Correspondingly, access to the user-arranged home screen 5309' in the multipage home screen user interface becomes disabled outside of the second reconfiguration mode. Next, the computer system detects three distinct inputs in separate scenarios, by respective contact 6206, 6208, and 6210. The input by the contact 6210 is an upward edge swipe from the bottom edge of the touch screen 112, the input by the contact 6206 is a tap input on the representation 5306" of the second user-arranged home screen 5306' (e.g., a page that is not hidden, and is accessible in the home screen user interface outside of the second reconfiguration mode), and the input by the contact 6208 is a tap input on the representation 5309" of the fourth user-arranged home screen 5309' (e.g., a page is hidden, and not accessible in the home screen user interface outside of the second reconfiguration mode).

FIG. 5F8 follows FIG. 5F7 and illustrates that, in response to the tap input by the contact 6208 on the representation 5309" of the fourth user-arranged home screen 5309' that is currently in the hidden state (e.g., not accessible in the home screen user interface outside of the second reconfiguration mode), the computer system maintains display of the page editing user interface 5305 and does not navigate to the fourth user-arranged home screen 5309 corresponding to the representation of the fourth user-arranged home screen 5309'. In some embodiments, the computer system maintains display of the page editing user interface 5305 in accordance with a determination that the tap input by the contact 6208 is on a representation of a home screen that is in the unselected or hidden state (e.g., with its associated selection affordance in the unselected state). In some embodiments, in response to the tap input on a representation of a home screen that is in the unselected or hidden state, the computer system displays an enlarged version of the representation to show the application icons on the home screen that is in the unselected or hidden state, but does not exit the second reconfiguration mode (e.g., the page editing user interface 5305 is optionally displayed underneath the enlarged version of the representation of the hidden page).

FIG. 5F9 follows FIG. 5F8, and illustrates that the computer system detects a tap input by a contact 6212 at a location corresponding to the selection affordance 5312*a* associated with the representation 5302" of the first user-arranged home screen 5302' on the page editing user interface 5305.

FIG. 5F10 illustrates that, in response to detecting the tap input by the contact 6212 in FIG. 5F9, the representation 5302" of the first user-arranged home screen 5302' on the page editing user interface 5305 becomes hidden and visually de-emphasized (e.g., blurred, darkened, becoming more translucent, etc.) relative to other unhidden representations of user-arranged home screens, and the selection affordance 5312*a* associated with the representation 5302" of the first user-arrange home screen 5302' is changed to the unselected state (e.g., becomes unchecked). Consequently, the user-arranged home screen 5302' becomes hidden and is no longer accessible in the home screen user interface outside of the second reconfiguration mode. FIG. 5F10 shows that the page editing user interface 5305 now displays two representations of user-arranged home screens in the hidden states (e.g., representations 5302" and 5309" of user-arranged home screens 5302' and 5309').

FIG. 5F11 follows FIG. 5F7 and illustrates that, in response to the tap input by the contact 6206 at the location corresponding to the representation of the second user-arranged home screen 5306' in FIG. 5F7, which is not in the unselected or hidden state in the page editing user interface 5305, the computer system ceases to display the page editing user interface 5305 (e.g., exits the second reconfiguration mode of the home screen user interface) and displays the second user-arranged home screen 5306 corresponding to the representation 5306" of the second user-arranged home screen 5306' in the first reconfiguration mode. In some embodiments, the computer system ceases display of the page editing user interface 5305 and reenters the first reconfiguration mode of the home screen user interface in accordance with a determination that the tap input by the contact 6206 is on a representation of a home screen that is in the selected or unhidden state (e.g., with its associated selection affordance in the selected state). As shown in FIG. 5F11, the highlighted page navigation element 5004 in the user-arranged home screen 5306' includes only three page indicator icons (e.g., page indicator icons 5004*a*, 5004*b*, and 5004*c* corresponding to the first user-arranged home screen 5302, the second user-arranged home screen 5306, and the third user-arranged home screen 5308, respectively), as the fourth user-arranged home screen 5309 is temporarily hidden and not accessible in the multipage home screen user interface outside of the second reconfiguration mode. The page indicator icon 5004*b* is highlighted as the corresponding user-arranged home screen—the second user-arranged home screen 5306'—is the currently displayed page of the multipage home screen user interface. In FIG. 5F11, the computer system further detects two distinct swipe inputs by a contact 6214 (e.g., a rightward swipe) and a contact 6216 (e.g., a leftward swipe), respectively, in two separate scenarios.

FIG. 5F12 follows FIG. 5F11 and illustrates that, in response to the rightward swipe input by the contact 6214, the computer system ceases to display the second user-arranged home screen 5306' and displays the first user-arranged home screen 5302', in the first reconfiguration mode. The highlighted page navigation element 5004 updates to show that the page indicator icon 5004*a* corresponding to the first user-arranged home screen 5302 is highlighted. The computer system further detects another rightward swipe input by a contact 6218 on the first user-arranged home screen 5302'.

FIG. 5F13 illustrates that in response to the rightward swipe input by the contact 6218 on the first user-arranged home screen 5302', the computer system displays a widget screen 5053 (e.g., a user interface that is also displayed when swiping rightward from a wake screen user interface or lock screen user interface). The widget screen 5053 includes a collection of widgets, such as a suggested applications widget 5055, and various widgets corresponding to different applications (e.g., a map widget 5316*b* corresponding to a map application, a weather widget 5316*c* corresponding to a weather application, a message widget 5316*d* corresponding to a message application, and a calendar widget 5316*e* corresponding to a calendar application, etc.). In some embodiments, the widget screen 5353 is displayed in a reconfiguration mode with respective deletion affordances 5318 (e.g., deletion affordances 5318*a*-5318*d*) being associated with corresponding widgets of a set of widgets that are selected for inclusion in the widget screen 5353 by a user. In some embodiments, the widgets displayed on the widget screen 5353 are ordered in accordance with a measure of relevance as determined by the computer system based on the current context (e.g., location, time, user interactions, etc.) and usage patterns (e.g., individual's usage pattern, average usage pattern across a large number of users, etc.). In some embodiments, the widget screen 5353 includes a search input field 5320 for inputting search criteria for searching for application content, application icons, and/or widgets on the computer system and, optionally, on a remote network. In some embodiments, the widget screen 5353 is displayed as an overlay on top of a de-emphasized first-available user-arranged home screen of the multipage home screen user interface (e.g., as an overlay on top of the de-emphasized first user-arranged home screen 5302' if the first user-arranged home screen 5302 is no hidden and is the first unhidden page of the multipage home screen user interface). In some embodiments, the computer system displays the widget screen 5353 as a page (e.g., preceding the first-available user-arranged home screen) of the multipage home screen user interface. In some embodiments, when the home screen user interface is displayed in the normal mode, the widget screen is also displayed in the normal mode, and the deletion affordance 5318 ceases to be displayed when the widget screen is displayed in the normal mode. In some embodiments, the widgets in the widget screen 5353 can be dragged away from the widget screen 5353 (e.g., in response to a drag input detected while the widget screen is in the configuration mode, or in response to a touch-hold and drag input detected while the widget screen is in the normal mode, etc.) and dropped onto a user-selected placement location on one of the user-arranged home screens of the multipage home screen user interface. In some embodiments, a widget can be added to the widget screen 5353 in response to a widget being dragged from another user interface that displays widgets (e.g., a widget selection and configuration user interface, a widget-specific configuration user interface, a stack-specific configuration user interface, a user-arranged home screen, a system-arranged home screen, a system-arranged application library user interface, etc.) and dropped onto the widget screen 5353.

FIG. 5F14 follows FIG. 5F11, and illustrates that in response to the leftward swipe input by the contact 6216, the computer system ceases to display the second user-arranged home screen 5306' and displays the third user-arranged home screen 5308' of the multipage home screen user interface in the first reconfiguration mode. The computer system further detects a leftward swipe input by a contact 6220 on the third user-arranged home screen 5308' in the first reconfiguration mode.

FIG. 5F15 follows FIG. 5F14, and illustrates that in response to the leftward swipe input by the contact 6220, the computer system displays an application library user interface 5054' overlaying the last-available user-arranged home screen (e.g., third user-arranged home screen 5308') of the multipage home screen user interface. In some embodiments, instead of the application library user interface 5054', the computer system displays a system-arranged home screen 5054 of the multipage home screen user interface. In some embodiments, when the system-arranged home screen 5054 or the application library user interface 5054' is displayed while the home screen user interface is in the first reconfiguration mode, application icons and/or widgets present on the system-arranged home screen 5054 and the application library user interface 5054' can be dragged from the system-arranged home screen or the application library user interface to a user-selected placement location on one of the user-arranged pages or on the widget screen. In some embodiments, when an application icon is dragged from the system-arranged home screen or application library user interface 5054', it is repositioned from its original location on a user-arranged home screen to a new user-selected location on a user-arranged home screen (e.g., only one copy of an application icon for a given application is permitted on the user-arranged pages of the home screen user interface), but maintains its position(s) in the system-arranged home screen or application library user interface. In some embodiments, dragging an application icon or widget after a touch-hold input on the application icon or widget in the system-arranged home screen or the application library user interface causes the home screen user interface to transition from the normal mode into the first reconfiguration mode. In some embodiments, the application library user interface (or the system-arranged home screen) is not shown in the page editing user interface 5305. Additional descriptions of the system-arranged home screen and the application library user interface are provided, for example, with respect to FIGS. 5A1-5A36 and accompanying descriptions.

FIG. 5F16 follows FIG. 5F7, and illustrates that in response to the upward edge swipe input by the contact 6210, the computer system ceases to display the page editing user interface 5305 and displays the user-arranged home screen 5302' that was displayed immediately before the second reconfiguration mode is entered. The computer system displays the user-arranged home screen 5302' in the first reconfiguration mode. In this example, the computer system displays the first user-arranged home screen 5302' because the first user-arranged home screen 5302' was displayed immediately before the page editing user interface 5305 was displayed (e.g., due to the tap input by the contact 6202 on the page navigation element 5004 on the first user-arranged home screen 5302' in FIG. 5F3). The page navigation element 5004 is updated to show only three page indicator icons 5004*a*-5004*c*, corresponding to the first user-arranged home screen 5302', the second user-arranged home screen 5306', and the third user-arranged home screen 5308', respectively. The page indicator icon 5004*d* is not shown as the corresponding user-arranged home screen (e.g., the fourth user-arranged home screen 5309') is in the unselected or hidden state in the page editing user interface 5305. FIG. 5F16 further illustrates that the computer system detects a tap input by a contact 6222 at a location corresponding to the page navigation element 5004 on the first user-arranged home screen 5302'. In some embodiments, when exiting the second reconfiguration mode, the computer system only transitions from the second reconfiguration mode into the first reconfiguration mode rather than directly into the normal mode. In some embodiments, when exiting the second reconfiguration mode, the computer system directly enters into the normal mode, and skips the first reconfiguration mode, only when certain preset conditions are met (e.g., two consecutive upward edge swipes are detected with less than a threshold amount of time in between, a tap on a done button displayed in the page editing user interface, etc.).

FIG. 5F17 follows FIG. 5F16, and illustrates that in response to the tap input by the contact 6222, the computer system ceases to display the first user-arranged home screen 5302 and displays the page editing user interface 5305 (e.g., transitioning from the first reconfiguration mode back into the second reconfiguration mode). On the page editing user interface 5305, the representation 5309" of the fourth user-arranged home screen 5309' is still visually de-emphasized relative to the other representations of user-arranged home screens (e.g., indicating the unselected or hidden state of the fourth user-arranged home screen 5309'). The associated selection affordance 5312*d* is also in the unselected state. The computer system then detects a tap input by a contact 6224 at a location corresponding to the selection affordance 5312*d* associated with the representation 5309" of the fourth user-arranged home screen 5309'.

FIG. 5F18 illustrates that, in response to the tap input by the contact 6224 in FIG. 5F17, the selection affordance 5312*d* becomes selected and the representation 5309" of the fourth user-arranged home screen 5309' is no longer visually de-emphasized. As a result, the fourth user-arranged home screen 5309' is now available to be viewed in the multipage home screen user interface outside of the second reconfiguration mode. FIG. 5F18 also illustrates that the computer system detects a tap-and-hold input by a contact 6226 on the representation of the first user-arranged home screen 5302', and a subsequent drag input by moving the contact 6226. In response to detecting the tap-and-hold input, the computer system selects the representation 5302" of the first user-arranged home screen 5302' for repositioning within the sequence of representations of the pages in the home screen user interface (e.g., including pages that are currently in the unselected or hidden state). The representation 5302" of the first user-arranged home screen 5302' can then be dragged in accordance with the subsequent movement of the contact 6226, to different locations on the page editing user interface 5305 with respect to other representations of user-arranged home screens.

FIGS. 5F19 to FIG. 5F20 illustrate that the drag input by the contact 6226 moves the representation 5302" of the first user-arranged home screen 5302' to a location corresponding to the representation 5306" of the second user-arranged home screen 5306'. As a result, the representations of the user-arranged home screens on the page editing user interface 5305 become reordered, with the representation 5302" of the first user-arranged home screen 5302' and the representation 5306" of the second user-arranged home screen 5306' switching places. After the user lifts off the contact 6226, the corresponding first user-arranged home screen 5302 and the second user-arranged home screen 5306 switch places in the multipage home screen user interface (e.g., the first user-arranged home screen 5302 now becomes the second page in the multipage home screen user interface and the second user-arranged home screen 5306 becomes the first page of the multipage home screen user interface). In FIG. 5F20, the computer system further detects a tap input by a contact 6228 on the representation 5309" of the fourth user-arranged home screen 5309' in the page editing user interface 5305, where the representation 5309" has already been changed to a selected or unhidden state by the earlier tap input by the contact 6224 (FIG. 5F17).

FIG. 5F21 illustrates that, in response to the tap input by the contact 6226 in FIG. 5F20, the computer system ceases to display the page editing user interface 5305 and displays the fourth user-arranged home screen 5309' in the first reconfiguration mode (e.g., in contrast to the scenario shown in FIGS. 5F7-5F8). The fourth user-arranged home screen 5309' includes the page navigation element 5004 with four page indicator icons, as the tap input by the contact 6224 in FIG. 5F17 has previously re-selected the selection affordance 5312*d* associated with the representation 5309" of the fourth user-arranged home screen 5309' in the page editing user interface 5305. As a result, the fourth user-arranged home screen 5309 becomes unhidden and can be navigated to in the multipage home screen user interface outside of the second reconfiguration mode. In FIG. 5F21, the computer system further detects an upward edge swipe input by a contact 6230 near the bottom edge of the display 112 while the fourth user-arranged home screen 5309' is displayed in the first reconfiguration mode.

FIG. 5F22 illustrates that, in response to the upward edge swipe input by the contact 6230 in FIG. 5F21, the computer system causes the fourth user-arranged home screen 5309' to exit the first reconfiguration mode and be displayed in the normal mode (e.g., the home screen user interface as a whole also transitions out of the second reconfiguration mode and enters the first reconfiguration mode). The computer system further detects a rightward swipe input by a contact 6232 on the fourth user-arranged home screen 5309 (e.g., no longer labeled as 5309', when shown in the normal mode).

FIGS. 5F23 to FIGS. 5F25 illustrates that, in response to the rightward swipe input by the contact 6232 in FIG. 5F22 and subsequent rightward swipe inputs by contacts 6234 and 6236, the computer system navigates through different user-arranged home screens in the multipage home screen user interface in a navigation direction corresponding to the swipe direction of the swipe inputs (e.g., from the rightmost page in the multipage home screen user interface to the leftmost page in the multipage home screen user interface). In particular, after displaying the user-arranged home screen 5309, the computer system sequentially displays the user-arranged home screen 5308, the user-arranged home screen 5302, and the user-arranged home screen 5306, in accordance with the order as represented by the representations 5309", 5308", 5302" and 5306" in the page editing user interface 5305 before the computer system the second reconfiguration mode is ended. The user-arranged home screen 5306 is now the first page in the multipage home screen user interface because the operations illustrated in FIG. 5F18 to 5F20 have reordered the user-arranged home screens in the multipage home screen user interface.

FIGS. 5F26 to 5F30 illustrate various grid configurations for displaying the representations of user-arranged home screens on the page editing user interface 5305, in accordance with some embodiments.

In some embodiments, when the number of user-arranged home screens (e.g., including user-arranged home screens that have been hidden and user-arranged home screens that are available outside of the second reconfiguration mode) is fewer than or equal to a first preset number (e.g., four), the computer system displays the representations of the user-arranged home screens in a first preset grid (e.g., a 2×2 grid). For example, the representations of the user-arranged home screens would fill the 2×2 grid from the top row to the bottom row, and within a given row from the left column to the right column. For example, in FIG. 5F26, there exist three user-arranged home screens including a hidden user-arranged home screen. As a result, the page editing user interface 5305 displays two rows with the first row having two representations 5311*a*-5311*b* of user-arranged home screens and the bottom row having one representation 5311*c* of user-arranged home screen.

In some embodiments, when the number of user-arranged home screens (e.g., including user-arranged home screens that have been hidden and user-arranged home screens that are available outside of the second reconfiguration mode) is greater than a first preset number (e.g., four) and fewer than or equal to a second preset number (e.g., nine), the computer system displays the representations of the user-arranged home screen in a second grid (e.g., a 3×3 grid) on a single page (e.g., a page that is fully displayed and not scrollable). The representations of the user-arranged home screens fill the 3×3 grid from the top row to the bottom row, and within a given row from the left column to the right column. For example, in FIG. 5F27, there exist five representations 5311*d*-5311*h* of user-arranged home screens including two representations 5311*f* and 5311*h* of user-arranged home screen in the hidden or unselected state to indicate that their corresponding pages are not accessible in the home screen user interface outside of the second reconfiguration mode. As a result, the page editing user interface 5305 displays a top row with three representations of user-arranged home screen, a middle row with two representations of user-arranged home screens, and an empty bottom row. The pages that correspond to the representations 5311*d*, 5311*e*, and 5311*g* that are in the selected or unhidden state are accessible in this order as shown in the page editing user interface 5305, in the multipage home screen user interface outside of the second reconfiguration mode. In FIG. 5F28, there exist seven representations 5311*i*-5311*o* of user-arranged home screens. As a result, the page editing user interface 5305 displays a top row with three representations 5311*i*-5311*k* of user-arranged home screens, a middle row with three representations 5311*l*-5311*n* of user-arranged home screens, and a bottom row with one representation 5311*o* of user-arranged home screen. Three representations 5311*k*, 5311*m*, and 5311*n* of user-arranged home screen are in the hidden or unselected state to indicate that their corresponding pages are not accessible in the home screen user interface outside of the second reconfiguration mode. The pages that correspond to the representations 5311*i*, 5311*j*, 5311*l*, and 5311*o* that are in the selected or unhidden state are accessible in this order as shown in the page editing user interface 5305, in the multipage home screen user interface outside of the second reconfiguration mode.

In some embodiments, when the number of user-arranged home screens (e.g., including user-arranged home screens that have been hidden and user-arranged home screens that are available outside of the second reconfiguration mode) is greater than the second preset number (e.g., nine), the computer system displays the representations of the user-arranged home screens across multiple pages that are respectively organized in the second preset grid (e.g., a 3×3 grid) or on a page that is fixed in one dimension and expandable in a second scrollable dimension. In some embodiments, a home screen user interface that has more than the second preset number of pages is represented in the page editing user interface 5305 with the representations of pages arranged in a scrollable page that has a fixed first dimension (e.g., three columns in a respective row) and an expandable and scrollable second dimension (e.g., in multiples of three rows, or freely expandable one row at a time, based on the number of pages in the home screen user interface). The expandable and scrollable page can be scrolled one row at a time or multiple rows at a time based on the speed and/or distance of the scroll input. In some embodiments, the page editing user interface 5305 is scrolled page by page, with respective pages having a fixed number of rows (e.g., three rows). In some embodiments, to indicate the existence of neighboring pages, a respective page in the page editing user interface 5305 is displayed concurrently with a portion of its adjacent page(s). For example, in FIG. 5F29, on the first page of the page editing user interface 5305, a top portion of the first three representations 5311*y*-5311*aa* of user-arranged home screens on the second page of the page editing user interface 5305 is shown below the bottom portion of the first page of the page editing user interface 5305. In FIG. 5F30, the second page of the page editing user interface 5305 is displayed with the last three representations 5311*v*-5311*x* of user-arranged home screens on the first page of the page editing user interface above the top portion of the second page of the page editing user interface 5305. As shown in FIG. 5F29, when the page editing user interface 5305 is initially displayed, the second preset number of representations 5311$p$-5311$x$ are fully visible in three rows (e.g., in a first page of the page editing user interface), and a fourth row of representations 5311$y$-5311$aa$ are partially visible below the top three rows. In response to an upward swipe input by a contact 6238 on the page editing user interface 5305, the computer system scrolls to a next page of three full rows with representations 5311$y$-5311$ab$ partially filling up the three full rows, and with the representations 5311$v$-5311$x$ in the bottom row of the previous page partially visible at the top of the display, as shown in FIG. 5F30.

FIGS. 5G1-5G31 illustrate example user interfaces for displaying and interacting with a user interface object (e.g., a suggested applications widget, a recommended applications widget, a recent apps widget, etc.) that presents application icons that are automatically selected by a computer system at a user selected location (e.g., a user-selected placement location on a page of a home screen user interface, on a widget screen, etc.), in accordance with some embodiments.

FIG. 5G1 illustrates a user-arranged home screen 5350' (e.g., a fourth user-arranged home screen 5350 in a sequence of five user-arranged home screens) of a multipage home screen user interface in a first reconfiguration mode (e.g., icon reconfiguration mode). The user-arranged home screen 5350' in the first reconfiguration mode includes a highlighted page navigation element 5004 with five page indicator icons corresponding to five user-arranged home screens in the multipage home screen user interface. The user-arranged home screen 5350' displays the add widget button 5094. The computer system further detects a tap input by a contact 6300 at a location corresponding to the add widget button 5094 on the user-arranged home screen 5350' in the first reconfiguration mode. The user-arranged home screen 5350' includes user-arranged application icons 5008$a$-5008$k$ in multiple rows.

FIG. 5G2 illustrates that, in response to detecting the tap input by the contact 6300 in FIG. 5G1, the computer system ceases to display the user-arranged home screen 5350' and displays a widget selection and configuration user interface 5304. The widget selection and configuration user interface 5304 includes a plurality of preconfigured widgets of various sizes that can be selected and added to a user-arranged home screen of the multipage home screen user interface without further configuration. In some embodiments, the computer system automatically select the preconfigured widgets for display in the widget selection and configuration user interface 5304 based on preset criteria (e.g., criteria based on usage frequency, usage pattern, etc. of an individual user, or a large number of users, etc.) and optionally based on the current context (e.g., location, time, recent user interactions, etc.). For example, the widget selection and configuration user interface 5304 includes a suggested applications widget 5354 of a 2×4 size, two widgets (e.g., widgets 5355$a$ and 5355$b$ of a 2×2 size) corresponding to an application 22, and a listing of applications that have corresponding widgets (e.g., a calendar application, a news application, etc.). Respective selection affordances are displayed for the preconfigured widgets in the widget selection and configuration user interface 5403 (e.g., selection affordance 5312$a$ for the suggested applications widget 5354, selection affordances 5312$b$ for widget 5310$b$, selection affordance 5312$c$ for widget 5310$c$, etc.). A tap input on the selection affordance of a preconfigured widget changes the selection state of the corresponding preconfigured widget. The widget selection and configuration user interface 5304 as shown in FIG. 5G2 shows that the suggested applications widget 5354 has been selected, as the corresponding selection affordance 5312$a$ is in a selected state. The computer system further detects a tap input by a contact 6302 at a location on the widget selection and configuration user interface 5304 corresponding to an add button 5359.

In some embodiments, the suggested applications widget 5354 includes two rows of application icons for automatically suggested applications with four application icons per row. In some embodiments, a different number of rows of application icons are optionally included in the suggested applications widget. As illustrated in FIG. 5G2, the suggested applications widget 5354 includes application icons 5057$a$-5057$h$ corresponding to eight different applications (e.g., a Files application, a Document application, a Pages application, a Game application, a Shortcut application, a Home application, a Wallet application, and a News application). Some or all of the application icons 5057$a$-5057$h$ in the suggested applications widget 5354 are automatically selected by the computer system without user input explicitly selecting those application icons. The set of application icons selected for inclusion in the suggested applications widget 5354 are automatically changed from time to time, e.g., in response to changing context (e.g., location, time, recent user interactions, etc.). After the suggested applications widget 5354 is selected (e.g., as indicated by the selection affordance 5312$a$ being in a selected state), a tap input by a contact 6302 is detected on the add button 5359 in FIG. 5G2. In some embodiments, the content shown in the preconfigured widgets in the widget selection and configuration user interface 5304 are automatically updated while the widget selection and configuration user interface 5304 is displayed. For example, the set of suggested applications shown in the suggested applications widget are automatically changed without user input due to changing context without user input, while the suggested applications widget 5354 is shown in the widget selection and configuration user interface 5304. In some embodiments, the application content shown in the preconfigured widgets 5310$b$ and 5310$c$ is automatically updated in accordance with changes in the application 22, while the preconfigured widgets 5310$b$ and 5310$c$ are displayed in the widget selection and configuration user interface 5304.

FIG. 5G3 illustrates that, in response to the tap input by the contact 6302 selecting the add button 5359 in FIG. 5G2, the computer system inserts the selected suggested applications widget 5354 into a predefined location of the user-arranged home screen 5350' (e.g., the home screen that was displayed immediately before displaying the widget selection and configuration user interface 5304) in the first reconfiguration mode. In some embodiments, the default location for placing the suggested applications widget 5354 is the top of the last-displayed user-arranged home screen. As a result, the suggested applications widget 5354 occupies the first two rows of the user-arranged home scree 5350' and all (or a predetermined set of) previously displayed user-arranged application icons on the page 5350' are moved down two rows. In some embodiments, if there is not sufficient space on the page 5350' to accommodate (e.g., individually, and/or on a predefined layout grid on the page, etc.) all or a predetermined set of the existing application icons on the page 5350' and the suggested applications widget 5354, the computer system creates a new page and/or new folder to accommodate the overflowed application icons. In some embodiments, the overflowed application icons are pushed to the existing next page of the home screen user interface.

In some embodiments, when the user-arranged home screen 5350' is in the first reconfiguration mode, the suggested applications widget 5354 is displayed with a platter 5361 as a background, and the various suggested application icons 5057 are displayed on top of the platter 5361. Respective suggested application icons 5057 are associated with respective text labels to indicate the names of their corresponding applications. In some embodiments, when the user-arranged home screen 5350' is in the first reconfiguration mode, the suggested application icons in the suggested applications widget 5354 are of a different size (e.g., smaller, larger, etc.) compared to the user-arranged application icons (e.g., application icons 5008*a*-5008*g*) displayed directly on the user-arranged home screen 5350' in the first reconfiguration mode. In some embodiments, in the first reconfiguration mode, the user-arranged application icons are animated on the page 5350', while the system-suggested application icons 5057 in the suggested applications widget 5354 are not animated. In the first reconfiguration mode, the system-suggested application icons 5057 in the suggested applications widget 5354 are not aligned with the user-arranged application icons 5008 on the page 5350'.

In some embodiments, the application icons 5057 in the suggested applications widget 5354 are displayed with a set of distinct display properties compared to that of the user-arranged application icons on the home screen 5350' in the first reconfiguration mode. For example, the platter 5361, the suggested application icons 5057, and the text labels of the suggested application icons 5057 in the suggested applications widget 5354 are displayed using translucent materials. As a result, the background of the user-arranged home screen 5350' is partially visible through the platter 5361, the suggested application icons 5057, and the text labels of the suggested application icons 5057 in the suggested applications widget 5354. In some embodiments, when the user-arranged home screen 5350' is in the first reconfiguration mode, the text labels associated with the suggested application icons 5057 are not displayed.

In some embodiments, when the user-arranged home screen 5350' is in the first reconfiguration mode, a user can re-arrange the user-arranged home screen 5350' by dragging the suggested applications widget 5354 to other locations on the user-arranged home screen 5350, such as re-positioning the suggested applications widget 5354 to occupy the third and fourth rows of the user-arranged home screen 5350'. In some embodiments, the computer system maintains a number of predefined locations to which the suggested applications widget 5354 cannot be placed, such as occupying the second and the third row of a home screen. In some embodiments, when the page 5350' is in the first reconfiguration mode, the suggested applications widget 5354 can be deleted by tapping on its associated deletion affordance.

In FIG. 5G3, the computer system further detects an input that corresponds to a request to exit the first reconfiguration mode and enter the normal mode of the home screen user interface (e.g., the input is an upward edge swipe input from the bottom of the user-arranged home screen 5350' using a contact 6304, a tap input in an unoccupied area of the home screen 5350', etc.).

FIG. 5G4 illustrates that, in response to detecting the input that corresponds to a request to exit the first reconfiguration mode and enter the normal mode of the home screen user interface (e.g., the upward edge swipe input from the bottom of the user-arranged home screen 5350' using the contact 6304, a tap input in an occupied area of the home screen 5350', etc.) in FIG. 5G3, the computer system displays the user-arranged home screen 5350 in the normal mode. In some embodiments, the suggested applications widget 5354 in the normal mode has a different appearance from that in the first reconfiguration mode. In some embodiments, the suggested application icons 5057 in the suggested applications widget are displayed with a second of display properties that make them blend in with and have a similar look-and-feel to the user-arranged application icons 5008 on the same home screen. For example, in the normal mode, the computer system ceases to display (or makes more translucent) the platter 5361 of the suggested applications widget 5354, and the suggested application icons 5057 of the suggested applications widget 5354 are placed directly (or appears to be directly placed) on the user-arranged home screen 5350. Furthermore, the size of the suggested application icons 5057 in the suggested applications widget 5354 is adjusted in the normal mode relative to their size in the first reconfiguration mode, to be similar or identical to the size of user-arranged application icons. In addition, the suggested application icons 5057 are also displayed at predefined locations of a grid layout that is used to display the user-arranged application icons 5008 on the user-arranged home screen 5350, such that the system-suggested application icons 5057 in the suggested applications widget 5354 are aligned with (e.g., on the same grid lines as, and/or having the same size as, etc.) the user-arranged application icons 5008 on the same page. For example, the "Files" and "Shortcut" suggested application icons 5057*a* and 5057*e* are on the same column as the "Camera," "App B," and "App F" user-arranged application icons 5008*a*, 5008*e*, and 5008*i*. The row gap between the first row of suggested application icons 5057 and the second row of suggested application icons 5057 is the same as the row gap between rows of user-arranged application icons 5008, in some embodiments. As a result, the suggested application icons 5057 are displayed in alignment with the user-arranged application icons 5008, and have a similar look-and-feel to the user-arranged application icons 5008 on the same page.

In some embodiments, when displayed in the normal mode, the text labels associated with the suggested application icons 5050 have a different set of display properties compared to that of the text labels associated with the user-arranged application icons 5008 on the same page. The set of display properties are not related to the textual content of the text labels, but rather their appearance unrelated to the textual content of the text labels. For example, the text labels associated with the suggested application icons 5057 are more translucent, has a shimmering visual effect, or has a predefined tint, etc. as a whole, as compared to the text labels associated with user-arranged application icons 5008, subtly indicating to the user which part of the home screen includes the suggested applications widget 5354.

In FIG. 5G4, the computer system further detects a user input that corresponds to a request to lock the device or display a wake screen user interface, etc. (e.g., a downward edge swipe input from the top of the fourth user-arranged home screen 5350 by a contact 6306, or another predefined type of input, etc.).

FIG. 5G5 illustrates that, in response to the user input that corresponds to a request to lock the device or display a coversheet user interface, etc. (e.g., the downward edge swipe input from the top of the fourth user-arranged home screen 5350 by a contact 6306, or another predefined type of input, etc.), the computer system displays a lock screen or wake screen user interface 5384. After some time has elapsed (e.g., from 6:05 AM to 6:10 AM), the computer system detects an input that corresponds to a request to redisplay the home screen user interface (e.g., an upward edge swipe input by a contact 6308 from the bottom of the lock screen or wake screen user interface 5384, another predefined type of input, etc.).

FIG. 5G6 illustrates that, in response to the input that corresponds to a request to redisplay the home screen user interface (e.g., the upward edge swipe input by the contact 6308 from the bottom of the lock screen or wake screen user interface 5362, another predefined type of input, etc.), the computer system redisplays the user-arranged home screen 5350. The computer system automatically updates the selection of suggested application icons 5057 included in the suggested applications widget 5354, e.g., in response to a change in context (e.g., change in time, location, recent user interactions, etc.). The suggested applications widget 5354, after the update, includes a different set of suggested application icons 5057*i*-5057*n* for a different set of suggested applications (e.g., including a clock application, a fitness application, a memo application, a settings application, a TV application, a stock application, a map application, and a weather application). In some embodiments, the update of the suggested application icons 5057 in the suggested applications widget is based on individual user usage patterns, average user usage patterns across a number of users, and/or the current context (e.g., current time, user location, upcoming events, recent user interactions, etc.). In this example, multiple (e.g., all, some, etc.) suggested application icons 5057 have been changed compared to those in FIG. 5G4. In some embodiments, fewer than all or none of the suggested application icons 5057 may be changed at a given time. In FIG. 5G6, the computer system further detects a page navigation input (e.g., a leftward swipe input by a contact 6310, or another predefined type of input, etc.).

FIG. 5G7 illustrates that, in response to the page navigation input (e.g., the leftward swipe input by a contact 6310, or another predefined type of input, etc.), the computer system displays an adjacent user-arranged home screen 5364 of the multipage home screen user interface (e.g., to the right of the user-arranged home screen 5350). The user-arranged home screen 5364 includes a plurality of user-arranged application icons 5008*m*-5008*p* for different applications (e.g., App 1, App 2, App 3, and App 4), a widget stack currently displaying a maps widget 5367, and another suggested applications widget 5368. Similar to the suggested applications widget 5354 on the user-arranged home screen 5350, the suggested applications widget 5368 includes two rows of application icons 5063*a*-5063*h* for eight system-suggested applications (e.g., a calendar application, a calculator application, a photo application, a keynote application, App 5, App 6, App 7, and App 8). The suggested application icons 5063*a*-5063*h* in the suggested applications widget 5368 are displayed aligned with the user-arranged application icons 5008*m*-5008*p* and the map widget 5367.

FIG. 5G8 illustrates that the computer system ceases to display the map widget 5367 and displays a calendar widget 5370 as the currently displayed widget of the widget stack due a change in context (e.g., due to an elapse of time, a change in location of the user, etc.) without user input requesting the update. In some embodiments, the map widget 5367 and the calendar widget 5370 switched manually (e.g., the user can manually switch the widget displayed at the widget stack using a swipe input on the currently displayed widget in the stack). In some embodiments, in response to changes of application icons and/or widgets displayed on the home screen, the computer system also updates the selection of suggested application icons 5063 included in the suggested applications widget 5368 to avoid showing duplicated application icons on the same user-arranged home screen. For example, in response to the computer system displaying the calendar widget 5370 on the user-arranged home screen 5364, the calendar application icon 5063*a* in the suggested applications widget 5368 is replaced by another application icon 5063*i* for an application that is not currently represented on the home screen (e.g., application icon for an App Store application, etc.). As a result, the suggested applications widget 5368 no longer includes a duplicate application icon compared to the user-arranged application icons and widgets (e.g., the calendar widget 5370) displayed on the user-arranged home screen 5364. In FIG. 5G8, the computer system further detects another navigation input (e.g., a rightward swipe input by a contact 6312 on the user-arranged home screen 5364) to navigate back to the user-arranged home screen 5350.

FIGS. 5G9 to 5G10 illustrate that, in response to the rightward swipe input by the contact 6312 on the user-arranged home screen 5364 in FIG. 5G8, the computer system returns to displaying the user-arranged home screen 5350 with the suggested applications widget 5354. The computer system then detects receipt of a notification (e.g., message notification 5061 overlaying the user-arranged home screen 5350), and a tap input by a contact 6314 selecting the notification (e.g., the message notification 5061).

FIG. 5G11 illustrates that, in response to the tap input by the contact 6314, the computer system displays a message application user interface 5372 for the user to view the received message. The computer system further detects an upward edge swipe input by a contact 6316 to dismiss the currently displayed user interface 5372 and returns to the home screen user interface.

FIG. 5G12 illustrates that, in response to the upward edge swipe input by the contact 6316, the computer system returns to displaying the user-arranged home screen 5350. The suggested applications widget 5354 is updated to replace the clock application icon 5057*i* with a message application icon 5057*q*, as a result of the message application being recently open. In FIG. 5G12, the computer system further detects an input that meets the criteria for displaying a contextual menu corresponding to the user interface object on the home screen user interface (e.g., the input is a tap-and-hold input by a contact 6318 at a location inside the suggested applications widget 5354, a light press input at a location inside the suggested applications widget 5354, etc.). In some embodiments, the computer system provides different responses and performs different operations depending on the location of the input (e.g., the location of the contact 6318), as will be discussed in more detail with reference to FIGS. 5G13-5G18. In FIG. 5G12, the contact 6318 is detected at a location corresponding to the message application icon 5057*q* that is currently displayed within the suggested applications widget 5354.

FIG. 5G13 illustrates that, in response to detecting the input that meets the criteria for displaying a contextual menu corresponding to the user interface object on the home screen user interface (e.g., detecting the tap-and-hold input by the contact 6318 exceeding a predefined intensity and/or time threshold), the computer system displays a first contextual menu (e.g., a first quick action menu 5374) associated with the messages application and the suggested applications widget in the user-arranged home screen 5350. While the first quick action menu 5374 is displayed, the area of the user-arranged home screen 5350 outside of the suggested applications widget 5354 and the first quick action menu 5374 is visually de-emphasized (e.g., blurred, darkened, etc.) relative to the suggested applications widget 5354 and the first quick action menu 5374. In some embodiments, the suggested applications widget 5354 is updated to have a different visual appearance compared to that when displayed in the normal mode (e.g., in FIG. 5G12). For example, the sizes of the suggested applications widget 5354 and the included suggested application icons 5057 are reduced such that the suggested application icons 5057 are no longer aligned with the user-arranged application icons 5008 on the user-arranged home screen 5350. The suggested application icons 5057 are displayed in the platter 5361 that is overlaying the visually de-emphasized user-arranged home screen 5350. In some embodiments, the other suggested application icons 5057*j*-5057*p* in the suggested applications widget 5354 are visually deemphasized (e.g., dimmed, darkened, made more translucent, etc.) relative to the message application icon 5057*q*. For example, the message application icon 5057*q* has a different size (e.g., larger, smaller, etc.) compared to the other suggested application icons 5057*j*-5057*p* and the other suggested application icons are blending more with the platter 5361 while the message application icon 5057*q* is visually highlighted relative to the platter 5361.

In some embodiments, the first quick action menu 5374 includes a plurality of widget-specific selectable options and application-specific (e.g., message-specific) selectable options. In some embodiments, the widget-specific options include at least: a "Share Widget" option, that when selected (e.g., by a tap input), causes display of a sharing user interface to share the suggested applications widget 5354 with other users; an "Edit Widget" option, that when selected (e.g., by a tap input), causes display of widget-specific configuration options for the suggested applications widget 5354 (e.g., display of a widget-specific configuration user interface or platter for changing the size, update frequency, etc. of the suggested applications widget); and a "Delete Widget" option, that when selected (e.g., by a tap input), causes the suggested applications widget 5354 to be removed for the home screen 5350.

In some embodiments, in accordance with a determination that the user interface object that is located at the location of the input (e.g., the location of the contact 6318) is the messages application icon 5057*p* for the messages application, the computer system displays the application-specific options corresponding to the messages application (e.g., including options to be performed with respect to the message application, or within the messages application, etc.), including for example: a "Compose New Message" option, that when selected, causes display of an application user interface for composing a message without launching the message application; a "Hide Message App" option for temporarily ceasing to display the message application icon 5057*q* within the suggested applications widget 5354 (e.g., the message application icon may be added back to the suggested applications widget 5354 in a later time); and a "Never Show Message App Here" option for permanently ceasing to display the message application icon within the suggested applications widget 5354. In contrast to the "Hide Message App" option, when the "Never Show Message App here" option is selected (e.g., by a tap input), the message application will no longer be added to the suggested applications widget 5354 (until the user input is detected that directly revert this setting (e.g., using the widget-specific configuration user interface of the suggested applications widget)).

In some embodiments, the quick action menu 5374 also includes an "Edit home Screen" option, that when selected (e.g., by a tap input) causes display of the home screen user interface (e.g., the user-arranged home screen 5350) in the first reconfiguration mode.

In some embodiments, multiple copies of the suggested applications widgets are permitted to exist on the same home screen or on different pages of the home screen user interface. In such case, the operations (either widget-specific or app-specific) performed with respect to one copy of the suggested applications widget does not apply to another copy of the suggested applications widget. For example, the user can choose to never show a message application icon in a first suggested applications widget, but still allows the message application icon to be shown in a second suggested applications widget on the same home screen, or a different home screen.

In FIG. 5G13, the computer system further detects a tap input by a contact 6320 at the "Hide Message App" option of the first quick action menu 5374. FIG. 5G14 illustrates that, in response to the tap input by the contact 6320 selecting the "Hide Message App" option, the computer system ceases to display the first quick action menu 5374 and displays the user-arranged home screen 5350 in the normal mode. The suggested applications widget 5354 is updated to replace the message application icon 5057*q* with a different application icon, game application icon 5057*d*.

FIG. 5G15 follows FIG. 5G12 and illustrates that, instead of detecting the tap-and-hold input by the contact 6318 on the message application icon 5057*q* as shown in FIG. 5G12, the computer system detects an input that meets the criteria for displaying a contextual menu corresponding to the user interface object on the home screen user interface (e.g., a tap-and-hold input by a contact 6322 at a location inside the suggested applications widget 5354 corresponding to the fitness application icon 5057*j*).

FIG. 5G16 illustrates that, in response to the input that meets the criteria for displaying a contextual menu corresponding to the user interface object on the home screen user interface (e.g., the tap-and-hold input by the contact 6322 exceeding a predefined pressure and/or time threshold and placed on the fitness application icon 5057*j*), the computer system displays a second contextual menu (e.g., a second quick action menu 5376) on the user-arranged home screen 5350. The manner of displaying is similar to that described with respect to the display of the first context menu in FIG. 5G13, except that the currently selected application icon 5057*j* is emphasized rather than the previously selected application icon 5057*q*. In FIG. 5G16, the widget-specific options on the second quick action menu 5376 are identical to those in the first quick action menu 5374, but the application-specific options are different, as the second quick action menu 5376 includes fitness application specific options. In some embodiments, the application-specific options for the fitness application includes: a "Start New Workout" option, when selected (e.g., by a tap input) causes the fitness application to be displayed; a "Hide Fitness App" option, when selected (e.g., by a tap input), temporarily hides the fitness application icon 5057*j* from the suggested applications widget 5354; and a "Never Show Fitness App Here" option, when selected, permanently removing the fitness application icon 5057*j* from the suggested applications widget 5354.

As shown in FIG. 5G16, the computer system further detects a tap input by a contact 6324 on the second quick action menu 5376 at a location corresponding to the "Never Show Fitness App Here" option. FIG. 5G17 illustrates that, in response to detecting the tap input by the contact 6324, the computer system displays the user-arranged home screen 5350 in the normal mode, and the fitness application icon 5057*j* is replaced by an another system-suggested application icon 5057*r* (e.g., podcast application icon) in the suggested applications widget 5354. The fitness application icon 5057*j* will no longer be included in the application suggested widget 5354, as the "Never Show Fitness App Here" option was selected in FIG. 5G16.

As shown in FIG. 5G16, the computer system further detects an input that meets the criteria for displaying a contextual menu corresponding to the user interface object on the home screen user interface (e.g., a tap-and-hold input by a contact 6324 at a location inside the suggested applications widget 5354 that does not correspond to any application icons 5057 in the suggested applications widget 5354).

FIG. 5G18 illustrates that, in response to detecting the input that meets the criteria for displaying a contextual menu corresponding to the user interface object on the home screen user interface (e.g., the tap-and-hold input by the contact 6326), the computer system displays a third contextual menu (e.g., a third quick action menu 5378). The home screen background is visually de-emphasized relative to the platter 5361 and the quick action menu 5378. The third quick action menu 5378 is different from the first quick action menu 5374 or the second quick action menu 5376 as the third quick action menu 5378 includes only widget-specific options. The third quick action menu 5378 does not include any application-specific options as the tap-and-hold input by the contact 6234 in FIG. 5G15 is not placed on any application icons in the suggested applications widget 5354. The suggested applications widget 5354 does not become visually de-emphasized and the application icons (e.g., all application icons, a predetermined set of application icons, etc.) within the suggested applications widget 5354 share the same visual appearance (e.g., displayed on top of the platter 5361). The computer system further detects a tap input by a contact 6326 on the "Edit Home Screen" option in the third quick action menu 5378.

FIG. 5G19 illustrates that, in response to the tap input by the contact 6326, the computer system displays the user-arranged home screen 5350' in the first reconfiguration mode. The computer system further detects an input that corresponds to a request to select and move the application icon 5057*q* relative to the platter 5361 (e.g., a tap-and-hold input by a contact 6328 at the location of the application icon 5057*q* to select the application icon 5057*q*, and a subsequent drag input by movement of the contact 6328 to move the application icon 5057*q* relative to the platter 5361; or a drag input by the contact 6328 that starts from the location of the application icon 5057*q*, etc.).

FIG. 5G20 illustrates that the message application icon 5057*q* is being dragged outside of the suggested applications widget 5354 according to the movement of the contact 6328. Upon a lift-off of the contact 6328 while the messages application icon 5057*q* is in an area outside of the suggested applications widget 5354, the message application icon 5057*q* is released onto the user-arranged home screen 5350 (e.g., inserted into a first available placement location at the bottom of the user-arranged home screen 5350 (e.g., right after the user-arranged application icon 5008*k*)), as shown in FIG. 5G21. In some embodiments, a system-suggested application icon 5057*s* for a reminders application is displayed in the suggested applications widget 5354 to replace the message application icon 5057*q*. In some embodiments, the newly suggested application icon 5057*s* is placed at the position vacated by the dragged application icon 5057*q*. In some embodiments, the newly suggested application icon 5057*s* is placed at another position within the suggested applications widget 5354 while other existing application icons within the suggested applications widget 5354 reflow within the suggested applications widget 5354. In some embodiments, more than one application icons 5057 can be "flocked" and dragged away from the suggested applications widget together as a group (e.g., by tapping on other application icons within the suggested applications widget 5354 while one of the application icons within the suggested applications widget 5354 has already been dragged away but not yet released into the page yet). In some embodiments, the computer system does not suggest any user-arranged application icons that are already being displayed on the home screen to be included in the suggested applications widget 5354 to avoid having duplicated application icons on the same page. In some embodiments, the text labels of the suggested application icons on the platter 5361 of the suggested applications widget 5354 are not displayed when the user-arranged home screen 5350 is in the first reconfiguration mode. In some embodiments, dragging and dropping one or more application icons from within the suggested applications widget 5454 to the user-arranged home screen 5350' may cause some existing user-arranged application icons 5008 on the user-arranged home screen to overflow into a preset location (e.g., folder on the same page, or a new page, etc.). In some embodiments, once a system-suggested application icon is dragged outside of the suggested applications widget and dropped onto the user-arranged page 5350', the application icon becomes a user-arranged application icon and takes on the appearance characteristics of user-arranged application icons (e.g., not translucent, having textual labels, etc.). As shown in FIG. 5G21, the computer system further detects a request to exit the first reconfiguration mode and return to the normal mode (e.g., detecting an upward edge swipe input by a contact 6330, or a tap input on an unoccupied area of the home screen, tapping on a done button, etc.).

FIG. 5G22 illustrates that, in response to the request to exist the first reconfiguration mode and return to the normal mode (e.g., in response to the upward edge swipe in FIG. 5G21), the computer system re-displays the user-arranged home screen 5350 in the normal mode, with the message application icon 5057*q*' displayed as a user-arranged application icon on the user-arranged home screen 5350, and the reminders application icon 5057*s* displayed in the suggested applications widget 5354 as a new system-suggested application icon. The platter 5361 of the suggested applications widget 5354 ceases to be displayed, and the system-suggested application icons 5057 currently within in the suggested applications widget 5354 and the user-arranged application icons 5008*a*-5008*k* and application icon 5057*q* become aligned in the normal mode.

FIGS. 5G23-5G24 follow FIG. 5G19, and illustrate that, instead of dropping the message application icon 5057*q* on to the user-arranged home screen 5350', the message application icons 5057*q* is dragged away from the user-arranged home screen 5350' and dropped to a location on the adjacent user-arranged home screen 5364' in the first reconfiguration mode (as shown in FIG. 5G24). In FIG. 5G24, the existing suggested applications widget 5368 is displayed with a platter 5369, and the system-suggested application icons 5063*i* and 5063*b*-5063*h* within the suggested applications widget 5368 are displayed with appearance characteristics similar to the system-suggested application icons within the suggested applications widget 5354 in the first reconfiguration mode as described with respect to FIG. 5G3. In FIG.

5G24, the application icons 5063*i* and 5063*b*-5063*h* are not aligned with the user-arranged application icons 5008*m*-5008*p* and 5057*q*.

In FIG. 5G24, the computer system further detects two distinct inputs in two separate scenarios—an input that corresponds to a request to exit the first reconfiguration mode (e.g., an upward edge swipe input by a contact 6332) and an input that corresponds to a request to navigate to the system-arranged home screen or the application library user interface (e.g., a leftward swipe input by a contact 6334, given that the currently displayed page is the last user-arranged home screen in the home screen user interface).

FIG. 5G25 illustrates that in response to the input that corresponds to a request to exit the first reconfiguration mode (e.g., the upward edge swipe input by the contact 6332 in FIG. 5G24), the computer system displays the user-arranged home screen 5364 in the normal mode. The message application icon 5057*q* is displayed as a last application icon on the user-arranged home screen 5364 with an appearance that corresponds to the appearance of other user-arranged application icons. In the normal mode, the existing suggested applications widget 5368 on the user-arranged page 5364 is displayed without the platter 5369, and has appearance characteristics as that of the suggested applications widget 5354 as described with respect to FIG. 5G4. In the normal mode, the system-suggested application icons 5063*i* and 5063*b*-5063*h* within the suggested applications widget 5368 are aligned with the user-arranged application icons 5008*m*-5008*p* and 5057*q* on the same page.

FIG. 5G26 follows FIG. 5G24 and illustrates that, in response to the input that corresponds to a request to navigate to the system-arranged home screen or the application library user interface (e.g., the leftward swipe input by the contact 6334 on the last user-arranged home screen 5364'), the computer system displays a system-generated application library user interface 5054'. The application library user interface 5054' includes a suggested applications widget 5055, and a plurality of representations for various system-generated groupings of application icons (e.g., grouping representations 5020*a*-5020*d*, etc.), and a plurality of widgets (e.g., widgets 5022*a*-5022*b*, etc.). In this example, the grouping representation 5020*d* includes an application icon 5391*a* and an application icon 5391*b*, among two other application icons for the applications included in the grouping corresponding to the grouping representation 5020*d*. As shown in FIG. 5G26, the computer system further detects a selection input (e.g., a tap-and-hold input by a contact 6336) directed to the application icon 5391*a*, and in response to the selection input, the computer system selects the application icon 5391*a*. In FIG. 5G27, the computer system detects a drag input (e.g., movement of the contact 6336) after the selection input, and in response to the drag input, the computer system moves a copy of the application icon 5391*a* in accordance with the drag input (e.g., away from the grouping representation 5020*d*). In some embodiments, the application library user interface 5054' is not editable by user input, and the application icon 5391*a* remains within the grouping representation 5020*d* when a copy thereof is dragged away by the contact 6336. In some embodiments, as the application icon 5391*a'* is dragged across the display 112, the computer system gradually cease to display the application library user interface 5054' (e.g., fade out or slide away) to reveal a user-arranged user interface for inserting the application icon (e.g., the last displayed user-arranged page, or the page on which the application icon is currently residing, etc.). In some embodiments, the computer system starts to cease to display the application library user interface 5054' (e.g., fade out, slide out, etc. the application library user interface 5054') when the user drags the application icon 5391*a'* to the edge of the display (e.g., left edge of the display, the edge on the side of the display that corresponds to the reverse navigation direction through the home screen user interface, etc.) and hovers there for at least a threshold amount of time, and then navigates to the last user-arranged page of the home screen user interface. In some embodiments, while the application icon 5391*a'* is held by the contact 6336 over the application library user interface 5054', the computer system detects a page navigation input (e.g., a rightward swipe on the touch-screen 112, a swipe input in the reverse navigation direction through the home screen user interface, etc.), and in response, the computer system navigates from the application library user interface 5054' to the adjacent or last user-arranged page of the home screen user interface. In some embodiments, the above steps to cause page navigation can be repeated with additional inputs or continue to hold the application icon near the edge of the display to navigate through the pages of the home screen user interface, until a desired user-arranged page of the home screen user interface is displayed, while the application icon 5391*a'* is held over it by the contact 6336. In this example, the application icon 5391*a'* is held by the contact 6336, when the computer system navigates to the user-arranged page 5364'. In some embodiments, the system-arranged page 5054 of the home screen user interface provide similar functionality as those described above with respect to the application library user interface 5054'.

FIGS. 5G28-5G29 illustrates that the copy 5391*a'* of the application icon 5391*a* has been dragged onto the user-arranged page 5364' in the first reconfiguration mode, and dropped onto (e.g., due to the lift-off of the contact 6336) the user-arranged home screen 5364' in the first reconfiguration mode. When the copy 5391*a'* of the application icon 5391*a* is dropped onto the user-arranged home screen 5364', the suggested applications widget 5368 is updated to replace a system-suggested application icon 5063*b* within the suggested application widget 5368 with another system-suggested application icon 5063*j* (e.g., for the clock application), in accordance with a determination that the copy 5391*a'* of application icon 5391*a* and the application icon 5063*b* both correspond to the same application (e.g., the calculator application), to avoid displaying duplicate application icons on the same home screen. In FIG. 5G30, the computer system then detects an input that corresponds to a request to exit the first reconfiguration mode and return to the normal mode (e.g., an upward edge swipe input by a contact 6338 on the user-arranged home screen 5364).

FIG. 5G30 illustrates that in response to the input that corresponds to the request to return to the normal mode (e.g., the upward edge swipe input by the contact 6338), the computer system displays the user-arranged home screen 5364 in the normal mode. The calculator application icon 5391*a* is now displayed on the user-arranged home screen 5364 as a user-arranged application icon, the suggested applications widget 5368 will no longer display the calculator application icon 5063*b*. In FIG. 5G30, the computer system then detects a rightward swipe input by a contact 6340 on the fifth user-arranged home screen 5364.

FIG. 5G31 illustrates that, in response to the rightward swipe input by the contact 6340, the computer system displays the user-arranged home screen 5350 including the suggested applications widget 5354. Comparing to the suggested applications widget 5354 illustrated in FIG. 5G17, the suggested weather application icon 5057*p* in the suggested applications widget 5354 is replaced with a suggested document application icon 5057*b* as a result of automatic updating based on a change in context.

FIGS. 5H1-5H76 illustrate various ways that existing user interface objects corresponding to different applications (e.g., application icons, widgets, etc. of various sizes) on a page of a home screen user interface are moved and/or rearranged during a reconfiguration mode (e.g., in accordance with repositioning, deletion, addition, passing through, removal, etc. of one or more user interface objects corresponding to different applications), in accordance with some embodiments.

FIGS. 5H1-5H8 illustrate the movement of a 2×2 widget within a respective page 5210' of a multipage home screen user interface, in accordance with some embodiments.

FIG. 5H1 illustrates a respective user-arranged page 5210' of a multipage home screen user interface (also referred to as "user-arranged home screen 5210'," "home screen 5210'," or "page 5210'") currently displayed in a first reconfiguration mode (e.g., an icon reconfiguration mode, where placement locations of application icons and widgets on the user-arranged page 5210' can be adjusted by dragging and dropping the application icons and widgets). In some embodiments, a page navigation element 5004 on the respective user-arranged page 5210' is highlighted when the page 5210' is in the first reconfiguration mode, indicating that it now serves as an affordance for entering a second reconfiguration mode (e.g., page reconfiguration mode) from the first reconfiguration mode (e.g., icon reconfiguration mode), e.g., in addition to serving as the page navigation element. The page indicator icon 5004*a* is highlighted relative to the other page indicator icons in the page navigation element 5004, indicating that the currently displayed page 5210' of the multipage home screen user interface is the first page of a sequence of six pages of the multipage home screen user interface. In some embodiments, the page 5210' includes a plurality of application icons 5008*a*-50081 arranged in a grid view. In some embodiments, as shown in this example, the page 5210' further includes one or more widgets 5022 of various sizes (e.g., a 2×2 widget 5022*g* "App2-Widget 2" and a 2×4 widget 5022*h* "App 17-Widget 1", etc.) that are aligned with the application icons in the grid view. In some embodiments, multiple application icons (e.g., some, all, or each, etc. application icons) and multiple widgets (e.g., some, all, or each, etc., widget) have a corresponding delete badges for removing the respective application icon or widget from the respective page of the multipage home screen user interface. In some embodiments, a user interface object (e.g., an "add widget" button 5094) is displayed in the user-arranged page 5210' in the first reconfiguration mode, where the user interface object, when selected (e.g., by a tap input), causes display of a widget selection and/or configuration user interface through which one or more widgets can be configured and added to the home screen user interface in the first reconfiguration mode.

The movement of various application icons 5008 and widgets 5022 is described below. In some embodiments, the application icons present in a respective page of the multipage home screen user interface are organized into sets or blocks, where the number of application icons included in any respective set is predetermined based on the size(s) of widget(s) present in (e.g., existing, being inserted, and/or being dragged over, etc.) the respective page. For reference, a single application icon occupies a single unit of space in the respective page (e.g., a single placement location for application icon, a single grid location in a layout grid of the page, etc.)), and the sizes of a widget or widget stack is specified in terms the number of rows and columns that the widget or widget stack would occupy when placed into the layout grid of the page. For example, a 2×2 widget occupies a placement location that has a height of two rows and a width of two columns in the layout grid of the page, while an application icon occupies a placement location that has a height of one row and a width of one column in the layout grid of the page. In some embodiments, application icons move in blocks based on the respective size of widget(s) being moved within a respective page. For example, when a 2×2 widget (e.g., a widget that occupies a 2×2 block of available spaces in the respective page) is moved in the respective page, application icons are reflowed in 2×2 sized blocks (e.g., relative ordinal positions of the application icons within the 2×2 block are fixed while the application icons are moved as a group). Similarly, in some embodiments, when a 2×4 widget (e.g., a widget that occupies a block of 2×4 available spaces in the respective page) is moved in the respective page, application icons are reflown in 2×4 sized blocks. In some embodiments, application icons that are organized into blocks still function as individual user interface objects (e.g., application icons are individually selectable despite the presence or movement of widgets in a respective page of the multipage home screen user interface). For example, while a 2×2 widget is being dragged by a contact, in response to a tap input at the location of an individual application icon, the computer system moves (e.g., "flocks") the selected application icon to the dragged widget so they are dragged together as a group. In another example, while widgets and widget stacks are present in a page, individual application icons can still be moved individually to be reposition on the respective page.

While displaying the respective page 5210' of the multipage home screen user interface in FIG. 5H1, the computer system detects a drag input by a contact 6600 at a placement location on the user-arranged page 5210' corresponding to the widget 5022*g* (e.g., movement of the contact 6600 starts at the location of the widget 5022*g* and moves toward the right of the display). As shown in FIG. 5H2, widget 5022*g* moves within the respective page of the multipage home screen interface in accordance with the movement of contact 6200.

FIG. 5H2 illustrates an animated transition showing the widget 5022*g* moving from the left side of the home screen 5210 to the right side of the home screen 5210. In some embodiments, as the widget 5022*g* is dragged toward the right side of the page 5210' in accordance with movement of contact 6600, a 2×2 block of application icons 5008*a*-5008*d* moves to the left to vacate space for the widget 5022*g* on the right side of the home screen (e.g., the computer system determines an intended placement location for the widget 5022*g* based on the location and speed of the contact, and moves the application icons at a possible intended placement location to make room for the widget 5022*g*). In some embodiments, as shown in FIG. 5H2, the widget 5022*g* moves on a layer above the application icons 5008*a*-5008*d* (e.g., the widget 5002*g* is at least partially transparent or translucent and the application icons 5008*a*-5008*d* are visible underneath the widget 5022*g*). In some embodiments, as shown in FIG. 5H2, as the application icons 5008*a*-5008*d* move together as a set or block, the individual application icons are loosely coupled together with slight differences in movement between one another while maintaining their ordinal positions in the block. In some embodiments, the number of application icons that are grouped into a set corresponds to the size of the widget being moved in the respective page of the multipage home screen user interface.

In some embodiments, for example, when a 2×2 widget such as widget 5022*g* is being dragged, up to four application icons (e.g., at least one application icon, at least two application icons, at least three application icons, or four application icons) are moved as a 2×2 sized block. In some embodiments, at most one block of less than four application icons is permitted on a page when a 2×2 widget is present or moving on the page (e.g., other blocks of application icons on the page are full 2×2 blocks). Similarly, in some embodiments, when a 2×4 widget such as widget 5022*h* is being moved, up to 8 application icons (e.g., at least one application icon, at least two application icons, at least three application icons, at least four application icons, at least five application icons, at least six application icons, at least seven application icons, or eight application icons) move as a 2×4 block. In some embodiments, at most one block of less than eight application icons is permitted on a page when a 2×4 widget is present or moving on the page (e.g., other blocks of application icons on the page are full 2×4 blocks).

FIG. 5H3 illustrates that the widget 5022*g* and the set of application icons 5008*a*-5008*d* have exchanged placement locations on the page 5210'. Also in FIG. 5H3, a drag input by a contact 6602 (e.g., either a new contact that is detected after termination of contact 6600 or a continuation of contact 6600) is detected at a location corresponding to the placement location of the widget 5022*g*. As shown in FIGS. 5H3-5H6, the widget 5022*g* moves downward in accordance with the movement of the contact 6602 within the respective page 5210' of the multipage home screen user interface. FIGS. 5H4 and 5H5 illustrate the animated transition showing widgets and the application icons moving within the page 5210' in response to the movement of the contact 6602.

In FIG. 5H4, the widget 5022*g* is dragged downward (e.g., along a vertical axis of touch screen 112) in accordance with the downward movement of the contact 6602. At the same time, the 2×2 block of application icons 5008*a*-5008*d* is also moving downwards, following the movement of the widget 5022*g*. In some embodiments, the individual movement of application icons 5008*a*-5008*d* within the 2×2 block are loosely coupled to the movement of the widget 5022*g*. For example, in some embodiments, application icons that are closer in the page to the widget 5022*g* (e.g., application icons 5008*b* and 5008*d*) track the movement of widget 5022*g* more closely than application icons that are farther from widget 5022*g* (e.g., application icons 5008*a* and 5008*c*). In some embodiments, application icons in the 2×2 block adjacent to the widget 5022*g* in the same rows follow the movement of widget 5022*g* (e.g., application icons 5008*a*-5008*d* would move in concert coupled to the movement of widget 5022*g*, e.g., up and/or down the same page). Concurrent with the downward movement of the widget 5022*g* and the 2×2 block of application icons 5008*a*-5008*d*, the 2×4 widget 5022*h* moves upwards within the page 5210' (e.g., to vacate space for the widget 5022*g* and the 2×2 block of applications in the same rows as the widget 5022*g*). The downward movement of the widget 5022*g* and application icons 5008*a*-5008*d*, and the corresponding upward movement of the widget 5022*h*, continue in FIG. 5H5 (e.g., FIG. 5H5 illustrates an intermediate state of movement of the various user interface objects). In both FIGS. 5E4 and 5E5, the widget 5022*g* is shown moving on a display layer above that of the widget 5022*h*, and application icons 5008*a*-5008*d* are shown moving on a display layer below that of the widget 5022*h* (e.g., there are multiple layers for moving user interface objects in the page 5210'). In some embodiments, the widget 5022*g* appears translucent or transparent so that concurrently moving application icons or widgets (e.g., on lower layers) is visible on the display. In some embodiments, the widget 5022*g* is not translucent while being moved (e.g., the widget 5022*g* is opaque). In some embodiments, the widget 5022*h* is also translucent or transparent (e.g., revealing the location of the application icons 5008*a*-5008*d* during movement). In some embodiments, the widget 5022*g* moves on a layer below the widget 5022*h*. In some embodiments, the 2×2 block of application icons 5008*a*-5008*d* moves on a layer above the widget 5022*h*. In some embodiments, any application icons or widgets moving on a top layer are transparent or translucent. Application icons 5008*e*-50081 in the page 5210' remain in place (e.g., these application icons do not reflow as a result of the movements of widget 5022*g*, widget 5022*h*, and application icons 5008*a*-5008*d*) in the rows above the placement locations of 5008*e*-5008*d*. In some embodiments, when a widget is directly dragged or moving as a result of being pushed out by the dragged widget, the content of the widget is blurred so that the display remains relatively simply and not overly cluttered or distracting.

FIG. 5H6 illustrates the result of movement of the widget 5022*g* in the page 5210' in accordance with the downward movement of the contact 6602. The widget 5022*h* exchanged placement locations with the widget 5022*g* and the 2×2 block of application icons 5008*a*-5008*d*, even though the 2×2 block of application icons 5008*a*-5008*d* are not explicitly selected or touched by the contact 6604 or any other input. The computer system automatically organizes the application icons into a 2×2 block and moved them in concert with the movement of the widget 5022*g* in accordance with preset rules for arranging application icons and/or widgets on the same layout grid. In FIG. 5H6, a drag input by a contact 6604 (e.g., either a new contact that is detected after termination of contact 6602 or a continuation of contact 6602) is detected at a placement location on the user-arranged page 5210' corresponding to the widget 5022*g*.

As shown in FIG. 5H7, the widget 5022*g* moves further downward in the page 5210' in accordance with the downward movement of the contact 6604. In contrast with the movement displayed in FIGS. 5H4 and 5H5, in FIG. 5H7, the neighboring 2×2 block of application icons 5008-5008*d* does not follow the movement of widget 5022*g* within page 5210' this time. Since the 2×4 widget 5022*h* moved to the top of page 5210' as a result of the earlier movement of the contact 6602 and the widget 5022*g*, the widget 5022*h* no longer serves to impede the downward movement of widget 5022*g* by itself within the page 5210' (e.g., the widget 5022*g* is able to move alone as a single 2×2 block without being accompanied by the 2×2 block in the same rows as itself, as long as the movement is below the 2×4 widget 5022*h* in the page 5210'). In FIG. 5H7, multiple 2×2 blocks of application icons are reflowed to fill vacated spaces in the page 5210' as the widget 5022*g* is dragged in the region below the 2×4 widget 5022*h*. For example, the 2×2 block of application icons 5008*e*-5008*f* and 5008*i*-5008*j* is reflowed to fill the space vacated by the widget 5022*g* in response to movement of the contact 6604. In addition, 2×2 block of application icons 5008*g*-5008*h* and 5008*k*-50081 is reflow to the left to fill the space vacated by the reflow of the 2×2 block of application icons 5008*e*-5008*f* and 5008*i*-5008*j*. In some embodiments, the widget 5022*g* appears as translucent or transparent during movement (e.g., to reveal the locations of application icons moving on lower layers). In some embodiments, the widget 5022*g* is not translucent or transparent (e.g., widget 5022*g* is opaque and/or blurred) so as not to visually confuse a user with multiple layers of overlapping user interface objects moving simultaneously. In some embodiments, any application icon(s) or widget(s) being moved directly by user input move on a top layer (e.g., the widget 5022*g* in FIGS. 5H4, 5H5, and/or 5H7). As shown in FIG. 5H7, in some embodiments, different blocks of application icons move in different layers (e.g., the block of application icons 5008*e*-5008*f* and 5008*i*-5008*j* moves on a layer above the block of application icons 5008*g*-5008*h* and 5008*k*-50081). In some embodiments, as shown in FIG. 5H7, application icons moving on a layer above other application icons are opaque (e.g., application icons 5008*e*-5008*f* and 5008*i*-5008*h* are not translucent or transparent, thereby obscuring application icons 5008*g*-5008*h* and 5008*k*-50081). As shown in FIG. 5H8, the drag input by the contact 6604 is terminated, the widget 5022*g* now occupies a placement location in the lower right corner of the page 5210', the 2×2 block of application icons 5008*g*-5008*h* and 5008*k*-50081 is reflowed to the left side of the widget 5022*g*, and the 2×2 block of application icons 5008*e*-5008*hf* and 5008*i*-5008*j* is reflowed to fill the space vacated by the widget 5022*g*.

FIGS. 5H8-5H10 collectively illustrate the movement of a 2×4 widget (e.g., widget 5022*h*) within a respective page of a multipage home screen user interface (e.g., page 5210'), in accordance with some embodiments.

In FIG. 5H8, a drag input by a contact 6606 is detected at a placement location corresponding to the 2×4 widget 5022*h*. In some embodiments, movement of a 2×4 widget within a respective page causes application icons to be organized into 2×4 blocks and results in the movement of one or more 2×4 blocks of application icons in the respective page. In accordance with downward movement of the contact 6606, the widget 5022*h* moves downward in the page 5210', as shown in FIG. 5H9. Concurrent with the movement of the widget 5022*h*, application icons 5008*a*-5008*j* move as a 2×4 block upwards to fill the space vacated by the widget 5022*h*. As shown in FIG. 5H9, the widget 5022*h* moves in a layer above application icons 5008*a*-5008*j*. In some embodiments, the widget 5022*h* is translucent or transparent, thereby revealing the current locations of the application icons 5008*a*-5008*j* as they move on a layer below the widget 5022*h*. As described above with regards to the widget 5022*g*, in some embodiments, the widget 5022*h* is opaque and optionally blurred, thereby obscuring the current locations of application icons 5008*a*-5008*j* as they move on a layer below the widget 5022*h*. Upon termination of the drag input by contact 6606 (e.g., in response to detecting lift-off of the contact 6606 while the widget 5022*h* is over the third and fourth rows of the layout grip in the page 5210', upon cessation of the movement of the contact for more than a threshold amount of time, etc.), the widget 5022*h* is moved to a new placement location as shown in FIG. 5H10, and the 2×4 block of application icons 5008*a*-5008*j* is reflowed upwards to fill the vacated space at the top of the page 5210'.

FIGS. 5H10-5H19 illustrate the removal of application icons from a respective page of a multipage home screen user interface that includes one or more widgets. In some embodiments, as placement locations are vacated by the deletion of individual application icons one by one, other application icons located in placement locations that come after the vacated placement locations have priority to fill those vacated placement locations, relative to widgets. While application icons move individually to fill the vacated spaces, widgets on the page may reflow to fill placement locations vacated by the reflowed application icons. In some embodiments, when there is a 2×4 widget present on the page, the computer system does not permit the 2×4 widget to be placed in a placement location that starts from an odd numbered row, because this would cause offset of widgets that are placed side-by-side by half of the widget height and difficulty in maintaining a consistent look of the user-arranged page over time.

In FIG. 5H10, a tap input by a contact 6608 is detected at a location corresponding to a delete badge (e.g., also called "deletion affordance) 5012*f* corresponding to application icon 5008*f*. In response to detecting the tap input by the contact 6608, the computer system deletes the application icon 5008*f* (e.g., removes the application icon 5008*f* from the page 5210'). As shown in FIG. 5H11, as a result of the removal of the application icon 5008*f* from the page 5210', the remaining application icons 5008*g*-50081, and 5008*a*-5008*d* reflow on an individual basis (e.g., not in blocks) to fill the newly vacated spaces (e.g., application icon 5008*a* moves from below the 2×4 sized widget 5022*h* into the last placement location for application icons in the 2×4 block above the widget 5022*h*). In some embodiments, when the remaining application icons 5008*e*, 5008*g*-50081, and 5008*a*-5008*d* were organized into blocks, no reflow would occur between blocks, until enough application icons from the 2×4 block for the smaller block to merge with the larger block into a single 2×4 block.

In FIGS. 5H11-5H19, additional application icons are removed one by one from the home screen 5210', e.g., in response to receiving additional tap inputs on delete badges of those application icons. In FIG. 5H11-5H17, remaining application icons on the page 5210' are reflowed on an individual basis (e.g., skipping over the intervening 2×4 widget 5022*h*) as a subset of the application icons in the top 2×4 block are removed one by one. In FIGS. 5H18 and 5H19, remaining application icons on the page 5210' are reflowed in blocks (e.g., the number of remaining application icons requires the organization of application icons into blocks to facilitate the efficient usage of space in the respective page), when the number of application icons remaining above the 2×4 widget falls to a single row.

In FIG. 5H11 a tap input by a contact 6610 is detected at a location corresponding to delete badge 5012*a* corresponding to the application icon 5008*a*. In response to detecting the tap input by the contact 6610, the computer system deletes the application icon 5008*a* (e.g., removes the application icon 5008*a* from the page 5210'). As shown in FIG. 5H12, as a result of the removal of the application icon 5008*a* from the page 5210', the remaining application icons 5008*b*-5008*d* reflow to fill the newly vacated space (e.g., application icon 5008*b* moves from below the 2×4 widget 5022*h* into the 2×4 block of application icons above the widget 5022*h*, while the widgets 5022*h* and 5022 remain at their respective locations on the page).

In FIG. 5H12, another tap input by a contact 6612 is detected at a location corresponding to the delete badge 50121 corresponding to the application icon 50081. In response to detecting the tap input by the contact 6612, the computer system deletes the application icon 50081 (e.g., removes the application icon 50081 from the page 5210'). As shown in FIG. 5H13, as a result of the removal of the application icon 50081 from the page 5210', the remaining application icons 5008*b*-5008*d* reflow to fill the newly vacated space (e.g., application icon 5008*c* moves from below 2×4 sized widget 5022*h* into the 2×4 block of application icons above the widget 5022*h*).

In FIG. 5H13, another tap input by a contact 6614 is detected at a location corresponding to delete badge 5012*k* corresponding to application icon 5008*k*. In response to detecting tap input by the contact 6614, the computer system deletes the application icon 5008*k* (e.g., removes the application icon 5008*k* from the page 5210'). As shown in FIG. 5H14, as a result of the removal of the application icon 5008*k* from page 5210', the remaining application icons 5008*b*-5008*d* reflow to fill the newly vacated space (e.g., application icon 5008*d* moves from below the 2×4 sized widget 5022*h* into the 2×4 block of application icons above the widget 5022*h*). With the reflow of the application icon 5008*d* up to above the widget 5022*h*, the 2×2 sized placement location below the widget 5022*h* that had been occupied by the application icon 5008*d* is vacated, and the widget 5022*g* reflows to fill the newly unoccupied placement location below the widget 5022*h*.

In FIG. 5H14, another tap input by a contact 6612 is detected at a location corresponding to the delete badge 5012*d* corresponding to the application icon 5008*d*. In response to detecting the tap input by the contact 6616, the computer system deletes the application icon 5008*d* (e.g., removes the application icon 5008*d* from the page 5210'). As shown in FIG. 5H15, as a result of the removal of the application icon 5008*d* from page 5210', no application icon on the page 5210' moved because the deleted application icon 5008*d* is the last application icon on the page 5210'.

In FIG. 5H15, another tap input by a contact 6618 is detected at a location corresponding to the delete badge 5012*c* corresponding to the application icon 5008*c*. In response to detecting the tap input by the contact 6618, the computer system deletes the application icon 5008*c* (e.g., removes the application icon 5008*c* from the page 5210'). As shown in FIG. 5H16, as a result of the removal of the application icon 5008*c* from page 5210', no application icon on the page 5210' moved because the deleted application icon 5008*c* is the last application icon on the page 5210'.

In FIG. 5H16, another tap input by a contact 6620 is detected at a location corresponding to the delete badge 5012*b* corresponding to the application icon 5008*b*. In response to detecting the tap input by the contact 6620, the computer system deletes the application icon 5008*b* (e.g., removes the application icon 5008*b* from the page 5210'). As shown in FIG. 5H17, as a result of the removal of the application icon 5008*b* from page 5210', no application icon on the page 5210' moved because the deleted application icon 5008*c* is the last application icon on the page 5210'.

In FIG. 5H17, another tap input by a contact 6622 is detected at a location corresponding to the delete badge 5012*j* corresponding to the application icon 5008*j*. In response to detecting the tap input by the contact 6622, the computer system deletes the application icon 5008*j* (e.g., removes the application icon 5008*j* from the page 5210'). As shown in FIG. 5H18, as a result of the removal of the application icon 5008*j* from the page 5210', only four application icons remain above the 2×4 widget the in page 5210'. In accordance with a determination that only a single row of application icons remains above the 2×4 widget, the computer system moves the single row of application icons 5008*e* and 5008*g*-5008*i* downward (e.g., to switch places with the widget 5022*h*). In some embodiments, in accordance with a determination that there is a 2×2 widget on the page (e.g., below the 2×4 widget), the computer system organizes the remaining single row of application icons into a 2×2 block and inserted in a 2×2 placement location preceding the placement location of the 2×2 widget 5022*g*. In some embodiments, as shown in FIG. 5H18, the newly formed 2×2 block of application icons 5008*e* and 5008*g*-5008*i* reflows, and pushes the widget 5022*g* to the right—e.g., following the convention of a left-to-right and top-to-bottom sequential order). In some embodiments, application icons 5008*e* and 5008*g*-5008*i* are organized into a 2×2 block in the top left corner of page 5210', and the 2×2 widget 5022*g* moves upwards to the placement location adjacent to the 2×2 block of application icons 5008*e* and 5008*g*-5008*i*, while the 2×4 widget 5022*h* remains in place.

In FIG. 5H18, another tap input by a contact 6624 is detected at a location corresponding to the delete badge 5013*g* corresponding to the widget 5022*g*. In response to detecting the tap input by the contact 6624, the computer system deletes the 2×2 widget 5022*g* (e.g., removes the widget 5022*g* from the page 5210'). As shown in FIG. 5H19, as a result of the removal of the 2×2 widget 5022*g* from the page 5210', the application icons 5008*e* and 5008*g*-5008*j* reflow to fill the remaining space immediately below the 2×4 widget 5022*h*. In some embodiments, as shown in FIG. 5H19, as a result of removing widget 5022*g* from the page 5210', the application icons 5008*e* and 5008*g*-5008*i* resolve into a single row (e.g., application icons 5008*e* and 5008*g*-5008*i* reflow from the 2×2 grid in FIG. 5H18 into a single row in FIG. 5H19, where application icons 5008*h* and 5008*i* move up to the same row as that occupied by application icons 5008*e* and 5008*g*).

FIGS. 5H20-5H25 illustrate the addition of a new application icon to a respective page of a multipage home screen user interface in different configurations, where the respective page includes one or more widgets and one or more application icons. In these examples, a new application icon is added to respective page of the multipage home screen user interface at a first available placement location for application icons (e.g., one unit sized placement location). FIGS. 5H20-5H25 provide a contrast to the application icon and widget reflow that occurs as a result of the deletion of application icons and widget that is described above with respect to FIGS. 5H11-5H19.

As shown in FIG. 5H20, the page 5210' includes a plurality of application icons 5008*e* and 5008*g*-5008*j* and widgets 5022*g* and 5022*h*, where the plurality of application icons are located in a 2×4 block above the 2×4 widget 5022*h*. In FIG. 5H20, a user input 5120 adds an application icon 25 to the page 5210' (e.g., the computer system detects an input that drops the application icon 25 into the page 5210'). In some embodiments, the user input 5120 is optionally an input that dragged the application icon 25 from a different page of the multipage home screen user interface or an application library user interface to the page 5210'. When the application icon 25 is released into the page 5210' without the user explicitly specifying the insertion location of the application icon 25, the computer system automatically identifies the first available (e.g., presently empty) placement location for application icons in the page 5210' and inserts the application icon 25 there (e.g., application icon 25 is inserted into the 2×4 block above the widget 5022*h* right after the application icon 5008*j*), e.g., without reflowing any application icons or widgets on the page, as shown in FIG. 5H21.

As shown in FIG. 5H22, the page 5210' includes a plurality of application icons 5008*b*-5008*e* and 5008*g*-5008*j*, and widgets 5022*g* and 5022*h*, where the plurality of application icons are located in a 2×4 block above the 2×4 widget 5022*h*. In FIG. 5H22, a user input 5122 adds the application icon 25 to the page 5210' without explicitly specifying an insertion location for the application icon 25. When the application icon 25 is released into the page 5210' without the user explicitly specifying the insertion location of the application icon 25, the computer system automatically identifies the first available (e.g., presently empty) placement location for application icons in the page 5210' and inserts the application icon 25 there (e.g., application icon 25 is inserted into a 2×2 block below the widget 5022*h* right after the widget 5022*g*), e.g., without reflowing any application icons or widgets on the page, as shown in FIG. 5H23.

As shown in FIG. 5H24, the page 5210' includes a plurality of application icons 5008*e* and 5008*g*-5008*i*, and widgets 5022*g* and 5022*h* (e.g., in the same layout as shown in FIG. 5H18), where the plurality of application icons are located in a 2×2 block below the 2×4 widget 5022*h*, adjacent to the 2×2 widget 5022*g*. In FIG. 5H24, a user input 5120 adds the application icon 25 to page 5210' without explicitly specifying an insertion location for the application icon 25. When the application icon 25 is released into the page 5210' without the user explicitly specifying the insertion location of the application icon 25, the computer system automatically identifies the first available (e.g., presently empty) placement location for application icons in the page 5210' and inserts the application icon 25 there (e.g., application icon 25 is inserted into the 2×2 block or single row right after the widget 5022*g*), e.g., without reflowing any application icons or widgets on the page, as shown in FIG. 5H25.

FIGS. 5H26-5H31 illustrate movement of a 2×4 widget from a respective page of a multipage home screen user interface to a different page of the multipage home screen user interface, in accordance with some embodiments.

In FIG. 5H26 (which is in the same configuration at FIG. 5H10) a drag input by a contact 6626 is detected at a location corresponding to the placement location of the widget 5022*h* (e.g., a 2×4 widget). In accordance with a determination that the movement of the contact 6626 has reached an edge of the user interface 5210' in the first reconfiguration mode or in response to another navigation input detected while the widget 5022*h* is held by the drag input by the contact 6626, the computer system displays an another user-arranged page 5212' while the widget 5022*h* is dragged by the contact 6626. FIGS. 5H27, 5H28, and 5H29 show example intermediate states of the widget 5022*h* moving from being held over the page 5210' to being held over the page 5212'. In FIG. 5H28, as a result of changing the displayed user-arranged home screen, the page navigation element 5004 is updated with the page indicator icon 5004*a* de-highlighted and page indicator icon 5004*b* highlighted.

In FIG. 5H29, when the widget 5022*h* is displayed over the user-arranged page 5212' which includes a single row of application icons 1-4, the single row of application icons 1-4 begin to move downwards, vacating space in anticipation of the user placing the widget 5022*h* in the page 5212' (e.g., in anticipation of the drag input by the contact 6626 being terminated while the widget 5022*h* is hovering over the page 5212'). It is notable that, in neither FIG. 5H29 nor 5H30, the computer system has not detected an explicit user input that is indicative of the user's intent to place the widget 5022*h* at the top of the page 5212' or any other insertion locations on the page (e.g., the contact 6626 is not near the top of the display, or any other potential insertion locations for the widget). The single row of application icons 1-4 would move by the same amount (e.g., two rows down) irrespective of where the widget 5022*h* is held over the page 5212' (e.g., bottom of the page, top of the page, middle of the page, etc.). In some embodiments, if, instead of just four application icons, page 5212' included between five to eight application icons, then the application icons would form a 2×4 block, and none of the block of application icons would move downward when the widget 5022*h* is held over the page at any location below the 2×4 block. The 2×4 block of application icons would only move downward, if the user explicitly drags the 2×4 widget over the placement locations of the application icons to trigger the computer system to move the entire 2×4 block out of the top rows to make room for the 2×4 widget 5022*h*. The dragging and placement of widgets in placement locations that are determined in accordance with placement location rules of the computer system contrasts with the dragging and placement of individual application icons (e.g., as described above with regards to FIGS. 5H20-5H25). When a desired insertion location is not explicitly specified, an individual application icon is inserted at a location that the first available insertion location without requiring any reflow of application icons on the page; in contrast, the 2×4 widget is inserted at a placement location that is created by reflow of application icons on the page in accordance with preset placement rules for the page and/or the widget(s) on the page.

In FIG. 5H30, after the widget 5022*h* is dropped onto the page 5212' (e.g., the computer system detects a termination of the input that had dragged the widget 5022*h* from the page 5210' to the page 5212'; and in response to detecting the termination of the input while the contact 6626 is away from the top of the page 5210'), the widget 5022*h* is inserted into the top placement location vacated by the reflow of the single row of application icons 1-4.

Also in FIG. 5H30, a tap input by a contact 6628 is subsequently detected at a location corresponding to the deletion affordance 5013*h* corresponding to the widget 5022*h*. In response to detecting the tap input by the contact 6628, the computer system removes the widget 5022*h* from the page 5212' (e.g., the widget 5022*h* is deleted from the page 5212'). As shown in FIG. 5H31, the removal of the widget 5022*h* results in the movement of application icons 1-4 back to the top of page 5212'.

FIGS. 5H32-5H45 continues from FIG. 5H26, and illustrate movement of a 2×2 widget from a respective page of a multipage home screen user interface to other pages of the multipage home screen user interface.

In FIG. 5H26, a drag input by a contact 6630 is detected at a location corresponding to the placement location of the widget 5022*g*. FIG. 5H32-5H35 show intermediate stages of the pages as the widget 5022*g* is moved from being displayed over the page 5210' to being displayed over the page 5212'. For example, the computer system navigates from the page 5210' to the page 5212' while the widget 5022*g* is held by the contact 6630, when the contact 6630 is moved and held near an edge of the display, or when another navigation input is detected while the widget 5022*g* is held by the contact 6630. In FIGS. 5H33-5H34, when the widget 5022*g* is displayed over the page 5212' in accordance with the drag input by the contact 6630, the application icons 1-4 on the page 5212' are automatically organized into a 2×2 block to create a potential placement location for the 2×2 widget 5022*g* on the right side of the 2×2 block. In FIG. 5H35-5H37, in accordance with a determination that a termination of the drag input by the contact 6630 (e.g., liftoff of the contact, cessation of the movement of the contact for more than a threshold amount of time, etc.) has been detected while the widget 5022*g* is held over the page 5212' (e.g., irrespective the location of the contact 6630 or the widget 5022*g* when the termination of the drag input occurred, as long as the widget was not held over the 2×2 block of application icons 1-4 in the top left corner of the page 5212'), the widget 5022*g* is released and flies to the first available placement location (e.g., the top right corner of the page 5212', which space was vacated by application icons 1-4 after they are organized into a 2×2 block), as shown in FIG. 5H36. FIG. 5H37 shows the widget 5022*g* settling into the page 5212' in the 2×2 sized placement location that is created by the organization of application icons 1-4 into a 2×2 block. This is in contrast to how an individual application icon is inserted into a page (e.g., no reflow of application icons), and how a 2×4 widget is inserted into a page (e.g., a single row automatically moves to create a placement location above the single row), when the input does not explicitly specifies an insertion location for the dropped application icon or widget. Here, the 2×2 widget is inserted into a placement location that is after the 2×2 block after the single row of application icon is automatically organized into a 2×2 block.

FIG. 5H38 continues from FIG. 5H35, where the drag input by the contact 6630 continues without dropping the widget 5022*g* into the page 5212'. In FIGS. 5H38-5H39, the computer system transitions from displaying the widget 5022*g* over the page 5212' (FIG. 5H38) to displaying the widget 5022*g* over another page 5214' of the multipage home screen user interface (FIG. 5H39). In some embodiments, the computer system navigates to the page 5214' in response to the contact 6630 being held near the edge of the display while holding the widget 5022*g*, or in response to another navigation input that is detected while the widget 5022*g* is held by the contact 6630. FIG. 5H38 illustrates that, as the widget 5022*g* is dragged away from the page 5212', the application icons 1-4 resolve from being in a 2×2 block back into being a single row. In addition, in FIG. 5H39, as a result of changing the displayed user-arranged home screen, the page navigation element 5004 is updated with page indicator icon 5004*b* de-highlighted and page indicator icon 5004*c* highlighted.

In FIGS. 5H39-5H41, as the widget 5022*g* is dragged on the page 5214' of the multipage home screen user interface, and while the widget 5022*g* is outside of the area occupied by any existing application icons 5-16 on the page 5214', the computer system automatically organizes the application icons on the page 5214 into 2×2 blocks and the last odd numbered row of application icons (e.g., application icons 13-16) is organized into a 2×2 block to create a potential placement location for the widget 5022*g*. In FIG. 5H41, the widget 5022*g* is dragged upwards in accordance with movement of the contact 6630. As the widget 5022*g* moves upwards into the areas occupied by application icons, the application icons are reflowed as 2×2 blocks to make space for the widget 5022*g* at the current location of the widget 5022*g*. For example, as shown in FIGS. 5H42-5H44, when the widget 5022 is dragged toward the upper right corner of the page 5214' and hovers over near that location, the computer system determines that a desired insertion of the widget 5022*g* is in the upper right corner occupied by the 2×2 block of application icons 7-8 and 11-12; and accordingly, the computer system moves the 2×2 block of application icons 7-8 and 11-12 out of their placement locations and reflow them to the next 2×2 placement location on the page, pushing other 2×2 blocks of application icons further right and/or down on the page. As shown in FIG. 5H43, the different blocks of application icons simultaneously on the page 5214' below a layer occupied by the widget 5022*g*. The block of application icons 7-8 and 11-12 reflows diagonally (e.g., into the respective next adjacent potential placement location) to vacate space for the widget 5022*g*. Concurrently, another block of application icons 13-14 and 15-16 reflows horizontally (e.g., into the respective next adjacent potential placement location) to vacate space for the block of application icons 7-8 and 11-12. When the termination of the drag input (e.g., the liftoff of the contact, the cessation of movement of the contact for more than a threshold amount of time, etc.) is detected while the widget is held over or near the upper right corner of the page 5214'(e.g., liftoff of the contact 6630 is detected while over or near the upper right corner of the page 5214'), the widget 5214' is inserted into the placement location vacated by the 2×2 block of application icons 7-8 and 11-12, and the two 2×2 blocks of application icons (e.g., a block formed by application icons 2-8 and 11-12, and another block formed by application icons 13-16) are arranged side by side on the page below the widget 5022*g*.

In FIG. 5H44, a page navigation input is detected (e.g., a rightward swipe input a contact 6632, a swipe on the page navigation element 5004, etc.) on the user-arranged page 5214'. In response to the page navigation input, the computer system replaces display of the user-arranged page 5214' with display of the user-arranged page 5212', where the application icons 1-4 that were previously organized into a 2×2 block has resolved into a single row after the widget 5022*g* was moved away from the page 5212', as shown in FIG. 5H45.

In FIG. 5H45, another page navigation input is detected (e.g., a leftward swipe input by a contact 6634 is detected on the user-arranged page 5212', or a leftward swipe on the page navigation element 5004, etc.). In response to detecting the page navigation input, the computer system returns to the previously-displayed user-arranged page 5214' as shown in FIG. 5H46.

FIGS. 5H46-5H60 illustrate movement of a 2×4 widget together with one or more user interface objects corresponding to different applications (e.g., application icons and/or additional widgets) from a respective page of a multipage home screen user interface to additional pages of the multipage home screen user interface, in accordance with some embodiments.

In FIG. 5H46, a drag input by a contact 6636 is detected at a location corresponding to the placement location of the widget 5022*g*. In accordance with the movement of the contact 6636, the widget 5022*g* is moved over another placement location on the page 5214' (e.g., the user drags widget 5022*g* to the potential placement location previously occupied by the block of application icons 7-8 and 11-12). Concurrent with the movement of the contact 6636 and the widget 5022*g*, the block of application icons 7-8 and 11-12 reflow to occupy the newly-vacated placement location in the top right corner of the page 5214', where the reflow of the application icons 7-8 and 11-12 occurs in a manner substantially similar to the reflow described with regards to FIGS. 5H42-5H44 above.

In FIG. 5H47, while the drag input by the contact 6638 is detected at a location corresponding to placement location of widget 5022*g*, where the contact 6638 is either a new contact that is detected after the termination of the contact 6636 or a continuation of the contact 6636. While the drag input by the contact 6638 is continuously maintained and the widget 5022*g* is held by the contact over the page 5214', the computer system further detects tap inputs by the contacts 6640 and 6642, where the contact 6640 is detected at a location corresponding to the application icon 9 and the contact 6642 is detected at a location corresponding to the application icon 10. In response to detecting tap inputs by the contacts 6640 and 6642 while the drag input by the contact 6638 is maintained, the application icons 9-10 move toward the widget 5022*g* and cluster under the widget 5022*g*, as shown in FIG. 5H48. In accordance with at least one application icon being moved to the widget 5022*g*, a flocking indicator 5023 is displayed next to the widget 5022*g* to show the number of objects that is being concurrently dragged by the contact 6638 with the widget 5022*g*. In some embodiments, a respective flocking indicator indicates a total number of user interface objects (e.g., application icons or widgets) present in a respective group of user interface objects that are being dragged by the contact 6638. For example, indicator icon 5024 indicates that there are a total of three user interface objects in the flock of the widget 5022*g*, application icon 9, and application icon 10. In some embodiments, the respective flocking indicator indicates the total number of objects that are dragged by the contact 6638 in addition to the widget 5022*g*. In the example above, the indicator icon 5024 would show a number 2 for the application icon 9 and the application icon 10.

In FIG. 5H48, while the drag input by the contact 6638 is maintained, another tap input by the contact 6644 is detected at a location corresponding to the application icon 7. In response to detecting the tap input by the contact 6644, the application icon 7 flies to join the flock of the widget 5022*g*, application icon 9, and application icon 10, as shown in FIG. 5H49. In accordance with application icon 7 joining the flock, flocking indicator 5023 is updated to indicate that there are now four user interface objects in the flock. Also shown in FIG. 5H49, the remaining application icons not flocking with widget 5022*g* individually reflow to occupy the space vacated by application icons 7, 9, and 10.

FIG. 5H50-5H52 illustrate intermediate states showing the widget 5022*g* and the flocked application icons 7, 9, and 10 being dragged together to another user-arranged page of the multipage home screen user interface. During the movement of the contact 6638, the individual objects in the flock are loosely coupled, and may have slightly different speed and/or direction relative to one another while moving together in accordance with the movement of the contact. For example, a larger object (e.g., another widget) may lag farther behind from the top widget that is dragged than a smaller object (e.g., an application icon); and optionally, an object that joined the flock earlier may follow more the top widget more closely than other objects that joined the flock later.

FIGS. 5H52-5H54 illustrate intermediate states as the widget 5022*g* and flocked application icons 7, 9, and 10 are dragged through the user-arranged page 5216' without being dropped into the page 5216'. Similarly to the reflow observed with regards to FIGS. 5H33-5H35, the plurality of application icons 25-28 are automatically organized into a 2×2 block to vacate a potential placement location for the widget 5022*g* in FIGS. 5H52-5H53, as the widget 5022*g* is dragged across the area that is not occupied by any application icons (e.g., similar to that shown in FIG. 5H33). In accordance with a determination that a page navigation input is detected (e.g., detecting the movement of the contact 6638 halting at an edge of the page 5216', or detecting a leftward swipe by another contact on the page 5216' or the page navigation element 5004 while the contact 6638 is maintained, etc.), the computer system navigates to another user-arranged page 5218', as shown in FIG. 5H55. FIG. 5H54 illustrates that, as widget 5022*g* and the flocked application icons are dragged away from the page 5216', the application icons 25-28 resolve back into a single row.

In FIG. 5H55, the page 5218' includes a 2×2 widget 5022*i* and a 2×2 block of application icons 17-20 arranged side by side. Upon termination of the drag input by the contact 6638 (e.g., liftoff of the contact, cessation of movement of the contact for more than a threshold amount of time, etc.) while the contact is away from the existing widget and application icons on the page 5218' (e.g., the drag input does not explicitly specifies an insertion location of the dragged objects), the widget 5022*g* is moved to a new placement location as shown in FIG. 5H56, and application icons 7, 9, and 10 are organized into a block and added to the first available placement location (e.g., the 2×2 block adjacent to widget 5022*g*). In some embodiments, the 2×2 block of application icons 7-10 is placed after the widget 5022*g* in the page 5218'.

Also in FIG. 5H56, a new drag input by a contact 6646 is detected at a location corresponding to the placement location of the widget 5022*g* in the page 5218'. While the drag input by the contact 6646 is maintained, an additional tap input by a contact 6648 is detected at a location corresponding to the placement location of the widget 5022*i* and another tap input by a contact 6650 is detected at location corresponding to the application icon 10. In response to detecting the tap inputs by the contacts 6648 and 6650, the application icon 10 and the widget 5022*i* move toward the widget 5022*g* and join the widget 5022*g* to be dragged by the contact 6646 as a group, as shown in FIGS. 5H57-5H58. The flocking indicator 5023 appears next to the widget 5022*g* to indicate that there are three user interface objects in the group (e.g., the widgets 5022*g* and 5022*i*, and the application icon 10). Concurrently, application icons 17, 18, 7, 9, 19, and 20 reflow to occupy the vacated space, where application icons 17-20 are organized into a 2×2 block.

In FIG. 5H58, in accordance with movement of the contact 6646, the widgets 5022*g* and 5022*i* and the application icon 10 are dragged to a placement location indicated by the user (e.g., the top right corner of the page 5218'); concurrently, application icons 7 and 9 (e.g., as a partially filled 2×2 block) reflow to vacate space for the widget 5022*g*, as shown in the intermediate states in FIGS. 5H59-5H60. If, instead of dragging widget 5022*g* to the top right corner of page 5078, the user had simply terminated the drag input by lifting off the contact 6646 while the contact and the flock is entirely in the area below the area occupied by the application icons 17-20 and 7-8 (e.g., in the state shown in FIG. 5H58), the first available placement location for the widget 5022*g* would have been below the 2×2 block of application icons 17-20 and the widget 5022*g* would be inserted there, with the application icon 10 filling in the space below application icon 7 and the widget 5022*i* filling in the space to the right of the widget 5022*g*. In some embodiments, if, instead of dragging widget 5022*g* to the top right corner of page 5078, the user had simply terminated the drag input by lifting off the contact 6646 while the contact and the flock is entirely in the area below the area occupied by the application icons 17-20 and 7-8 (e.g., in the state shown in FIG. 5H58), the icons and widgets (e.g., all, a predetermined set of the icons and widgets, etc.) would fly back to where they were (e.g., in the state shown in FIG. 5H56).

As shown in FIG. 5H61, upon termination of contact 6648 while the contact has dragged the widgets 5022*g* and 5022*i* and the application icon 10 to the upper right corner of the page 5218', the widget 5022*g* is placed in the placement location in the upper right corner of the page 5218' as indicated by the user. In addition, the application icon 10 is placed into the first empty slot in the 2×2 block comprising the application icons 7 and 9, and the widget 5022*i* is added to the first available placement location to the right of the 2×2 block that now includes the application icons 7-10, as shown in FIG. 5H61.

FIGS. 5H61-5H76 illustrate movement of a 2×4 widget from a respective page of a multipage home screen user interface to adjacent pages of the multipage home screen user interface, in accordance with some embodiments.

In FIG. 5H61, a drag input by a contact 6652 is detected at a location corresponding to the widget 5022*i*. While the widget 5022*i* is being held by the contact 6652, the computer system detects a page navigation input (e.g., the contact 6652 is held near the side edge of the page 5218' for at least a threshold amount of time, a swipe input by another contact is detected on the page 5218', a swipe input by another contact is detected on the page navigation element 5004, etc.). In response to detecting the page navigation input, the computer system navigates to another user-arranged page 5220', as shown in FIGS. 5H62-5H63. As a result of changing the displayed user-arranged home screen, navigation element 5004 is updated with page indicator icon 5004*e* de-highlighted and page indicator icon 5004*f* highlighted; and the computer system switches from displaying the widget 5022*i* over the page 5218' to displaying the widget 5022*i* over the page 5220' while the widget 5022*i* is being dragged by the contact 6652. In FIG. 5H62, it is shown that, as the widget 5022*i* is moving away from the page 5218', the application icons 7, 9, and 10 in the 2×2 block are resolving into a single row. As shown in FIG. 5H63, the page 5220' includes a plurality of application icons 30-44. FIG. 5H63 illustrates that, as widget 5022*i* is dragged onto the page 5220' (e.g., due to movement of the contact 6652 and/or due to shifting of the pages on the display, etc.), the plurality of application icons 30-44 do not reflow (e.g., as the application icons on the page 5220' are already in 2×2 blocks (e.g., application icons 30-31 and 34-35 form a respective 2×2 block, application icons 32-33 and 36-37 form an additional respective 2×2 block, etc.), and that there is leftover odd numbered row at the end of the layout).

As shown in FIG. 5H64, upon termination of the contact 6652 when the contact 6652 is over an unoccupied area of the page 5220' below the existing application icons on the page 5220', the widget 5022*i* is placed in the first available placement location right below all or a predetermined set of the application icons on the page 5020.

In FIG. 5H65, a drag input by a contact 6654 (e.g., the contact 6654 can be a new contact detected after the liftoff of the contact 6652 or a continuation of the contact 6652 in FIG. 5H63) is detected at a location corresponding to the placement location of widget 5022*i*. In some embodiments, upon selection of the widget 5022*i* (e.g., from a tap input, a tap and hold input, a drag input, etc.), the widget 5022*i* becomes visually distinguished (e.g., the widget 5022*i* has s darkened boarder, and is blurred, etc.).

In FIG. 5H66, the widget 5022*i* is dragged upwards in accordance with movement of the contact 6654, and the 2×2 block of application icons 40-41 and 44 are reflowed (e.g., are moved to the bottom of the page 5220' to vacate space for the widget 5022*i*, as shown in FIG. 5H67).

In FIG. 5H68, in accordance with the movement of the contact 6654 towards the upper left corner of the page 5220', additional blocks of application icons (e.g., the 2×2 block of application icons 30-31 and 34-35, etc.) are reflowed to vacate space for the widget 5022*i*. In some embodiments, as described above, the widget 5022*i* moves on a layer above the plurality of application icons. In some embodiments, the widget 5022*i* is translucent or transparent to provide visibility of the locations of any application icons moving beneath the widget 5022*i*. In some embodiments, respective 2×2 blocks of application icons occupy different layers (e.g., the 2×2 block of application icons 30-31 and 34-35 moves on a first respective layer, the 2×2 block of application icons 32-33 and 36-37 moves on a second respective layer, etc.).

In FIG. 5H69, the drag input by the contact 6654 has terminated (e.g., liftoff of the contact 6654 is detected while the contact 6654 and the widget 5022*i* is near the upper left corner of the page 5220'). In response to detecting the termination of the drag input by the contact 6654 (e.g., liftoff of the contact, cessation of the movement of the contact for more than a threshold amount of time, etc.), the widget 5022*i* is snapped to the closest available placement location (e.g., the placement location vacated by the 2×2 block of application icons 30-31 and 34-35), as shown in FIG. 5H70. In addition, as there is no longer a moving widget in FIG. 5H70, the blocks of the application icons are dissolved. This is evinced by the application icon 44 moving to join application icons 40 and 41 on a single row (e.g., their 2×2 block was dissolved). In some embodiments, the placement location occupied by widget 5022*i* in FIG. 5H70 is the default insertion location for the 'add widget' affordance 5094. Therefore, the same configuration of application icons and a widget in FIG. 5H70 can also be arrived at by selecting the 'add widget' affordance 5094 (e.g., while a widget selection and configuration user interface or while in a widget-specific configuration user interface was displayed). As shown in FIG. 5H70, when widget 5022*i* is not selected, there are no visible distinguishing markers of widget 5022*i* (e.g., no darkened boarder, and no blurring, etc.).

In FIG. 5H71, the page 5220' is shown in the same state as that shown in FIG. 5H65. In FIG. 5H71, if the drag input by the contact 6654 does not move toward the upper right corner of the page (e.g., in the scenario shown in FIGS. 5H65-5H70), and the compute system detects a page navigation input while the contact 6654 is in the unoccupied area of the page 5220' below the existing application icons on the page 5220' (e.g., the contact 6654 simply moves towards an edge of the user interface 5220' or a swipe input by another contact is detected on the page 5220' or on the page navigation element 5004, etc.), the computer system navigates to the user-arranged page 5218' while the widget 5022*i* is dragged or held stationary by the contact 6654. As shown in FIGS. 5H71-5H72, the computer system switches from displaying the widget 5022*i* over the page 5220' to displaying the widget 5022*i* over the page 5218' (e.g., the page as shown in FIG. 5H62).

As shown in FIG. 5H72, the application icons on the page 5218' organize into blocks upon the entrance of the widget 5022*i* onto the page 5218'. In FIGS. 5H72-5H74, the widget 5022*i* is dragged by the contact 6654 over the widget 5022*g*, and dropped onto the widget 5022*g* upon liftoff of the contact 6654 at a location over the widget 5022*g*. In accordance with a determination that widget 5022*g* and the widget 5022*i* are of the same size (e.g., are both 2×2 widgets), a widget stack 5024*a* is created as seen in FIG. 5H75 at the placement location of the widget 5022*g*, with the widget 5022*i* is shown on top.

In FIG. 5H76, upon termination of contact 6654 and formation of widget stack 5024*a*, application icons 7, 9, and 10 resolve into a single row (e.g., are no longer organized in a 2×2 block since there are no longer moving widgets in the page 5218').

In some embodiments, when a widget (e.g., widget 5022*i*, or widget 5022*g*) is being moved together with other application icons and/or other widgets of a different size (e.g., in a "flock"), when the widget is dropped onto another widget of the same size, no widget stack is created and individual widgets and application icons in the flock are respectively inserted into available placement locations in the page. In some embodiments, a widget can also be dropped onto an existing widget stack and be merged into the existing widget stack if they are of the same size (or in some embodiments, of a smaller size than (e.g., half the size, quarter of the size, etc. of) the widget stack).

In some embodiments, the existing widget remains in place for a longer period of time when a widget of the same size is dragged onto the page to make it more convenient to drop the dragged widget onto the existing widget to form a stack. In some embodiments, a dragged widget needs to be held over an existing widget for at least a threshold amount of time for the existing widget to move out of the way to vacate room for the dragged widget. In some embodiments, if a dragged widget is moved past an existing application icon or widgets quickly without hovering over them, the existing application icon or widget remains in their placement locations. If termination of a drag input is detected while the dragged widget is over an application icon (or a block of application icons) are remaining in their place, the application icon (or block of application icons) are pushed out of their placement locations and reflowed on the page to make room for the dragged widget, in accordance with some embodiments. If termination of a drag input (e.g., liftoff of the contact, cessation of movement of the contact for more than a threshold amount of time, etc.) is detected while the dragged widget is over an application icon (or a block of application icons) are remaining in their place, the widget is added to a first available placement location elsewhere on the page, in accordance with some embodiments. In some embodiments, if termination of a drag input is detected while the dragged widget is over an existing widget or widget stack of the same size while the existing widget or widget stack are remaining in their place, the dragged widget is added to the existing widget to create a new stack, or the dragged widget is merged into the existing widget stack at the same location. In some embodiments, when the dragged object is an application icon, the application icon would not displace an existing widget or widget stack when the application icon is dropped over the existing widget or widget stack and the application icon will be inserted at a first available placement location for application icons elsewhere on the page. In some embodiments, when the dragged object is an application icon, the application icon will be placed in a folder with an existing application icon when the dragged application icon is dropped onto the existing application icon after hovering over the existing application icon (e.g., a folder platter will be displayed after the hover threshold is met by the drag input).

FIGS. 5I1-5I18 illustrate user interfaces for configuring user interface objects containing application content (e.g., widgets, mini application objects, etc.) and adding the same to another user interface (e.g., a page of a home screen), in accordance with some embodiments.

FIG. 5I1 illustrates a respective user-arranged page 5230' of a multipage home screen user interface in a first reconfiguration mode (e.g., icon reconfiguration mode), including a plurality of user-selected application icons 1-16 arranged in a predefined grid (e.g., a 4×6 grid, or a grid of other grid size, etc.) and a plurality of preconfigured application icons (application icons **5008*n*-5008*q*) in a dock that appears on every user-arranged page of the multipage home screen user interface. In FIG. 5I1, an "add widget" button 5094 is displayed on the user-arranged home screen 5230' in the first reconfiguration mode. A tap input by a contact 6802 is detected at a location corresponding to the 'add widget' button 5094 in the user-arranged page 5230'. In response to detecting the tap input by the contact 6802, the device displays a widget selection and configuration user interface 5250, as shown in FIG. 5I2**.

In FIG. 5I2, the widget selection and configuration user interface 5250 is displayed overlaid on deemphasized user-arranged page 5230' of the multipage home screen user interface (e.g., where page 5230' is blurred or darkened or otherwise deemphasized). In some embodiments, the top of the widget selection and configuration user interface is offset from the top of the display, revealing the top portion of the visually deemphasized page 5230' underneath. In some embodiments, the widget selection and configuration user interface provides a search input field 5260 which accepts search criteria and returns search results including preconfigured widgets that are relevant to the search criteria and/or applications that have widgets that are relevant to the search criteria. In some embodiments, the widget selection and configuration user interface 5250 includes a plurality of preconfigured and/or recommended widgets 5022 (e.g., **5022*m*, 5022*h*, 5022*p*, 5022o, 5022*q*, etc.) and/or widget stacks 5024 (e.g., 5024*i*, etc.) that can be directly added to another user interface (e.g., a user-arranged home screen, a widget screen user interface, etc.) in accordance with user request (e.g., by dragging the widget/widget stack from the widget selection and configuration user interface 5250 and dropping it onto another user interface, or by selecting a widget/widget stack in the widget selection and configuration user interface using a selection affordance associated with the widget/widget stack and tapping an add button in the widget selection and configuration user interface, or by tapping a selection affordance associated with a desired widget/widget stack in the widget selection and configuration user interface, etc.). In some embodiments, the preconfigured and/or recommended widgets and/or widget stacks are of various sizes, and correspond to different applications. In the example embodiment shown in FIG. 5I2, one or more preconfigured widgets and/or widget stacks are associated with respective widget selection affordances 5312 that indicate the selected/unselected states of corresponding widgets or widget stacks and can be used to add the respective widgets or widget stacks to a user-arranged page of the multipage home screen user interface (e.g., as shown in FIGS. 5I17 and 5I18). In some embodiments, widgets in a respective widget stack are of the same size. In some embodiments, widget selection affordances permit the selection of multiple widgets and/or widget stacks at one time, which are then inserted into default locations in a respective page of the multipage home screen user interface upon selection of an add widget affordance displayed on the widget selection and configuration user interface. In some embodiments, the preconfigured and/or recommended widgets and widget stacks shown in the widget selection and configuration user interface 5250 include live application content from their corresponding applications, and are updated in real-time while they are displayed in the widget selection and configuration user interface 5250 in accordance with updates in their corresponding applications. For example, a news widget will display news content that is updated from time to time while the news widget is displayed in the widget selection and configuration user interface in accordance with the updates to news content in the corresponding news application. Similarly, a calendar widget will display different upcoming events with elapse of time while the calendar widget is displayed in the widget selection and configuration user interface 5250 in accordance with the events listed at different times in the calendar application. In another example, a weather widget will display updated weather information based on the current time and current location while the weather widget is displayed in the widget selection and configuration user interface in accordance with changing weather and changing location and time. In some embodiments, the widget selection and configuration user interface 5250 displays a recommended widget stack (e.g., widget stack 5024*i*) that includes system-selected widgets corresponding to different applications. In some embodiments, automatic switching is enabled for the recommended widget stack and the currently displayed widget of the widget stack is updated from time to time in accordance with changing context (e.g., changed location, changed time, receipt of notification, etc.) while the recommended widget stack is displayed in the widget selection and configuration user interface 5250. In some embodiments, in response to manual switching inputs (e.g., swipe inputs, other widget navigation inputs, etc.), the computer system switches the currently displayed widgets in the recommended widget stack. In some embodiments, a wildcard widget is enabled for the recommended widget stack, and a wildcard widget is selected as the currently displayed widget for the widget stack while the recommended widget stack is still displayed in the widget selection and configuration user interface. In some embodiments, a tap input on a recommended widget in the widget selection and configuration user interface causes display of widget-specific configuration options for modifying the configurations of the recommended widget. In some embodiments, a tap input on a recommended widget stack in the widget selection and configuration user interface causes display of stack-specific configuration options for reviewing the constituent widgets of the stack and modifying the configurations of the recommended widget stack. In some embodiments, preconfigured widget stacks of different sizes (e.g., 2×2, 2×4, 4×4, etc.) are included in the widget selection and configuration user interface 5250. In some embodiments, tapping on a preconfigured widget stack causes a stack-specific configuration user interface to be displayed where the user can review the widgets included in the stack and adjust the order of the widgets in the stack, reconfigure some of the widgets in the stack, and/or delete some of the widgets from the stack. In some embodiments, the widget stacks displayed in the recommended widget area 5038 are optionally functional stacks that are automatically switched from time to time (e.g., due to elapsing time, or due to changed context, etc.) while being displayed in the widget selection and configuration user interface 5250**. In some embodiments, in response to detecting swipe inputs (e.g., vertical swipe inputs, or horizontal swipe inputs, etc.) on a recommended widget stack shown in the widget selection and configuration user interface, the computer system scrolls through the widgets in the recommended widget stack for the user to see which widgets are included in the widget stack.

FIG. 512 shows various contacts and touch inputs that are detected on the user-arranged home screen 5230' in different example scenarios, including respective tap inputs by contacts 6804, 6806, 6808, and 6810. In some embodiments, in response to detecting a contact on the touch-screen 112, the device determines the type of the input, the starting location of the input, the movement direction and movement distance of the input (if any), current location and movement characteristics of the input, and/or the termination of the input, etc.; and based on the type, location, movement direction, movement distance, termination state, etc. of the input, performs a corresponding operation. In some embodiments, the device distinguishes between tap and tap-hold inputs by determining whether an input is held in place substantially stationary for at least a preset threshold amount of time.

FIGS. 5I2-5I6 collectively illustrate the addition of a widget from widget selection and configuration user interface to a respective page of multipage home screen user interface, in accordance with some embodiments.

In FIG. 512, a tap-hold input by the contact 6804 is detected at a location corresponding to the location of widget **5022*n* in the widget selection and configuration user interface 5250. In some embodiments, after tap-hold threshold is met by the contact 6804 (e.g., contact 6804 is held substantially stationary for at least a threshold amount of time), the widget 5022*n* is visually distinguished (e.g., where the outline of widget is highlighted, appear to be lifted off the background of the widget selection and configuration user interface 5250, and/or expanded in size, etc.), as shown in FIG. 53**.

In some embodiments, as shown in FIG. 513, a drag input by the contact 6804 is detected after the widget **5022*n* is selected by the touch-hold input by the contact 6804. In response to detecting the drag input by the contact 6804, widget 5022*n* is lifted off of the widget selection and configuration user interface 5250 and dragged away from its original location in the widget selection and configuration user interface in accordance with the movement of the contact 6812. FIGS. 5I3-5I5 show intermediate states after selection of the widget 5022*n*, as the widget 5022*n* is dragged into a user-selected user interface (e.g., the user-arranged page 5230', any other user-arranged home screens, a widget screen, etc.). As shown in FIG. 5113, as the widget 5022*n* is dragged relative to the widget selection and configuration user interface 5250, the computer system gradually fades out (e.g., blur, darkened, making it more translucent, etc.) the widget selection and configuration user interface 5250, and gradually reveals (e.g., making it brighter, less blurred, more clear, etc.) the home screen 5230' underneath the widget selection and configuration user interface 5250. In some embodiments, as the widget 5022*n* is dragged relative to the widget selection and configuration user interface 5250, the widget selection and configuration user interface 5250 slides away revealing the underlying home screen 5230' or the widget selection and configuration user interface 5250 slides away dragging the home screen 5230' onto the display, etc. As the drag input by the contact 6804 continues, the device ceases displaying the widget selection and configuration user interface 5250 and redisplays the user-arranged page 5230' of the multipage home screen user interface, as shown in FIGS. 5114 and 515. In FIG. 5115, as the widget 5022*n* is displayed over the user-arranged page 5230' and continues to be dragged by the contact 6804, the application icons 1-16 present in the page 5230' reflow to vacate space for the widget 5022*n*. For example, in accordance with the size of the widget 5022*n* (e.g., a 2×2 size), the computer system organizes the application icons on the page 5230' into 2×2 blocks and reflow them as such 2×2 blocks (e.g., application icons 9-10 and 13-14 are organized into a 2×2 block and move to the right, while application icons 11-12 and 15-16 are organized into another 2×2 block and reflow to a row below. More details of how application icons are moved on the page are described, for example, with respect to FIGS. 5H1-5H76. FIG. 516 shows the results of termination of the drag input (e.g., lift-off of the contact 6804 while the widget 5022*n* is hovered over the left side of the display in the second and third row of the layout grid for application icons, etc.), where the widget 5022*n* is inserted at a placement location in the user-arranged page 5230' corresponding to the location of the lift-off of the contact 6804, and the 2×2 blocks of application icons 9-10 and 13-14 and also application icons 11-12 and 15-16 are reflowed to positions following the placement location of the widget 5022*n* on the user-arranged page 5230'. In some embodiments, in response to detecting the termination of the drag input (e.g., the lift-off of the contact 6804, cessation of movement of the contact for more than a threshold amount of time (e.g., a threshold longer than the hover time threshold), etc.), the computer system displays an animated visual effect showing movement (e.g., ripples or wave motions of the application icons) or visual changes (e.g., shimmering light, or color, etc.) propagating in different directions (e.g., in all directions, in multiple directions, etc.) from the insertion location of the widget 5022*n*** across the display to application icons located around the insertion location. In some embodiments, this visual effect provides an alert to the user that the widget is inserted into the page, and its location of insertion. In some embodiments, such visual effect is not provided if the widget is already in the page, and is merely moved from one location to another location in the page.

FIGS. 5I7-5I12 following FIG. 5I2 collectively illustrate configuration of a widget in widget-specific configuration user interface, in accordance with some embodiments.

Returning to FIG. 5I2, a tap input by the contact 6806 is detected at a location corresponding to the location of preconfigured widget **5022*n* in the widget selection and configuration user interface 5250. In response to detecting the tap input by the contact 6806, the computer system displays a widget-specific configuration user interface 5270 for the preconfigured widget 5022*n*, as shown in FIG. 5I7. The widget-specific configuration user interface 5270 for the preconfigured widget 5022*n* provides configuration options for the widget 5022*n* to modify the existing or preconfigured widget configurations of the widget 5022*n* as shown in the widget selection and configuration user interface 5250. In some embodiments, the widget-specific configuration user interface 5270 for the widget 5022*n* displays a preview 5022*n*" of the widget 5022*n* with its current configurations in a widget preview region 5280 within the widget-specific configuration user interface 5270. In some embodiments, widget-specific configuration user interface 5270 overlays a portion of the visually deemphasized widget selection and configuration user interface 5250. In some embodiments, the previously displayed page 5320' of the multipage home screen user interface is also visible (e.g., underneath the deemphasized widget selection and configuration user interface 5250 which overlays a portion of the page 5302'). In some embodiments, page 5320' is deemphasized to a greater extent than when overlaid by just the widget selection and configuration user interface 5250 (e.g., as shown in FIG. 5I2). In some embodiments, tapping on the exposed portion of the deemphasized page 5320' causes dismissal of the widget-specific configuration user interface 5270 and the widget selection and configuration user interface 5250 and redisplay of the page 5320' (e.g., in the first reconfiguration mode, or the normal mode). In some embodiments, tapping on the exposed portion of the deemphasized the widget selection and configuration user interface 5250 causes dismissal of the widget-specific configuration user interface 5270 and redisplay of the widget selection and configuration user interface 5250 (e.g., still overlaying the deemphasized user-arranged page 5320'**).

In some embodiments, as shown in FIG. 5I7, the widget-specific configuration user interface 5270 for a respective widget (e.g., widget **5022*n*) includes different options for configuring the respective widget. For example, widget-specific configuration user interface 5270 includes a size selector region (e.g., region 5272 "Widget sizes" with selectable controls corresponding to different sizes (e.g., 2×2, 2×4, 4×4, etc.) for the respective widget (e.g., radio buttons 5274*a*, 5274*b*, and 5274*c* correspond to three different widget sizes, or other controls that correspond to different sizes, etc.). In some embodiments, selection of one of the selectable controls 5274 changes the size of the widget (e.g., the widget 5022*n*) as reflected in the changed size of the preview 5022*n* in the widget preview region 5280. In some embodiments, different widget types are associated with different widget previews (e.g., showing different application content, and/or provide different application functions, etc.). In some embodiments, the widget-specific configuration user interface 5270 includes a widget type selection region 5276 (e.g., "Widget types" with selectable controls corresponding to different widget types (e.g., radio buttons 5278*a*, 5278*b*, and 5278*c*, respectively corresponding to different news topics, or other types of controls and or controls corresponding to other different types, etc.). In some embodiments, available widget types are application-specific. For example, for the "News" application in FIG. 5I7, available widget types are "Today," "Topic 1" (e.g., "Sports"), and "Topic 2**". In another example, for the "Calendar" application, available widget types are "Today," "Up Next," and "Reminders". In some embodiments, content in widget previews are live (e.g., the widget preview is updated if any update to the corresponding application is available while the widget preview is displayed in the widget-specific configuration user interface).

In some embodiments, the widget-specific configuration user interface 5270 includes a control for enabling or disabling the currently presented widget (e.g., widget preview **5022*n*" "News: Today") to be included in the system-generated recommended widget stack (e.g., widget stack 5024*i* in FIG. 5I2) (e.g., a toggle option 5290 "Add widget to Recommended stack", or other types of controls (e.g., checkbox, radio button, etc.), etc.) in the system-recommended widget stack 5024*i* (e.g., as shown in FIG. 5I2). In some embodiments, the device adds widget preview 5022*n*" to the widget stack 5024*i* (e.g., when control 5290 is enabled) upon exiting the widget-specific configuration user interface 5270 (e.g., upon detection of a tap input on the cancel button 5282 or outside of the widget-specific configuration user interface, etc.). In some embodiments, the control 5290 is only made available when the widget preview 5022*n*" is of a same size (e.g., 2×2) as the size of widgets in the system-generated widget stack 5024*i* (e.g., 2×2). In some embodiments, when control 5290 is enabled, only the widget size option corresponding to the size of widgets in the widget stack 5024*i* (e.g., 2×2) is available (e.g., widget size option radio button 5274*a*). In some embodiments, when control 5290 is enabled, the computer system automatically select the size of the widget 5022*n* for inclusion in the widget stack 5024*i* based on the size of the widget stack 5024*i*, independent of the widget size that is selected for the preview 5022" shown in the widget-specific configuration user interface 5270**.

In some embodiments, the widget **5022*n* with the configuration shown in the widget preview area 5280 can be added directly to a respective page of the multipage home screen user interface. For example, in FIG. 5I7 tap input by a contact 6814 is detected at a location corresponding to an add widget button 5098 in the widget-specific configuration user interface 5270. In response to detecting the tap input by the contact 6814, the computer system adds the widget 5022*n* (e.g., in its current configuration as shown by the preview 5022*n*") to the user-arranged page 5320' at a default location (e.g., top of the page, first available position at the end of the page, etc.), as shown in FIG. 5117 (e.g., widget 5022*n* is inserted into the first placement location in the user-arranged page 5203'**).

In some embodiments, in FIG. 517, a swipe input by a contact 6816 is detected at a location corresponding to the location of widget preview **5022*n*"-1 (e.g., 2×2-sized "News: Today" widget preview) in the widget preview region 5280. In response to detecting the swipe input by the contact 6816, the computer system switches to display the preview of another available widget type (e.g., widget preview 5022*n*"-2 (e.g., "News: Sports" widget of a 2×2 size)), as shown in FIG. 518 and as indicated by the highlighting of widget type indicator 5278*b* (e.g., "Topic 1"). In some embodiments, at least a portion of other available widget previews (e.g., widget preview 5022*n*"-1, and widget preview 5022*n*"-3) corresponding to other sizes and/or types is visible adjacent to the currently selected widget preview (e.g., widget preview 5022*n*"-2) displayed in the central region of the widget display region 5280**.

In FIG. 518, a tap input by a contact 6818 is detected at a location corresponding to the radio button **5274*b* (e.g., for widget size 2×4) in the widget size region 5272. In response to detecting the tap input by the contact 6818, the computer system updates the size for widget preview 5022' according to the selected size control (e.g., to 2×4), as shown in FIG. 519 and as indicated by the highlighting of radio button 5274*b* in widget size region 5272. In some embodiments, the widget preview 5022*n*" is updated for the currently selected size (e.g., while maintaining the same widget type), e.g., shown as widget preview 5022*n*"-4 shown in the central region of the widget preview region 5280. In some embodiments, options for widget size and widget type are coupled (e.g., different widget type options are available based on which widget size is selected). In some embodiments, changing widget type (e.g., using the type selectors 5276) changes which widget size options are available (e.g., only previews of widgets of some sizes are available for display by swiping through the preview display region 5280 or tapping on the size selectors 5272). In some embodiments, changing widget size (e.g., using the size selector 5272) changes which widget type options are available (e.g., only previews of widgets of some types are available for display by swiping through the preview display region 5280 or tapping on the type selectors 5276**).

In FIG. 519, a swipe input by a contact 6820 is detected at a location corresponding to the widget preview **5022*n*"-4 (e.g., 2×4-sized "News: Sports" widget preview). FIGS. 5110 and 5111 illustrate alternative responses to the swipe input by the contact 6820. For example, in some embodiments, in FIG. 519, in response to detecting the swipe input by the contact 6820, the computer system returns to display the widget preview 5022*n*"-1 (e.g., the 2×2 "News: Today" (e.g., type "Today") preview), as shown in FIG. 5110 (e.g., widget type and widget size are changed in concert). In some embodiments, in FIG. 519, in response to detecting the swipe input by the contact 6820, the computer system switches to display an updated widget preview 5022*n*"-5 (e.g., updated from 2×4-sized version of the "Today" widget type to a 2×4-sized version of the "Topic 1" widget type), as shown in FIG. 5111 (e.g., the widget size selector remains active for the newly displayed widget type). In some embodiments, the widget preview configuration in FIG. 5111 can also be reached from FIG. 5I10. For example, in FIG. 5I10, a tap input by a contact 6822 is detected at the location of a radio button 5274*b* in the widget size region 5272. In response to detecting the tap input by contact 6822 at radio button 5274*b*, widget type for widget preview 5022*n*" remains the same, while widget size is updated to 2×4, as shown in FIG. 5111**.

In some embodiments, widget previews for multiple (e.g., all, a preset number of, etc.) available combinations of widget sizes and widget types for widgets of an application are accessible in the widget preview region 5280 by scrolling through the widget previews using one or more swipe inputs. For example, for the three widget sizes and three widget types of the news application, in accordance with a determination that three widget sizes are available for the "Today" widget type, two widget sizes are available for the "Topic 1" widget, and one widget size are available for the "Topic 2" widget, the computer system generates six previews, including three previews for the "Today" type with three different sizes, two previews for the "Topic 1" type with the two different permitted sizes, and one preview for the "Topic 2" type with the one permitted size, and in response to swipe inputs in a scroll direction of the widget preview region 5280, the computer system scrolls through the six different previews one by one, and displays them one by one in the central region of the widget preview display region 5280. In some embodiments, the size selector and/or type selector can be used as filters to group the six different previews and/or sort them based on the selected size and/or type, so that the desired types and/or sizes are more easily located in the widget preview display region 5280 by the user.

FIGS. 5I12-5I16 collectively illustrate the addition of a widget from widget-specific configuration user interface into a respective page of the multipage home screen user interface, in accordance with some embodiments. FIG. 5111 precedes FIG. 5112, and illustrates that a leftward swipe input by a contact 6824 is detected in the widget preview display region 5280. In response to detecting the leftward swipe input by the contact 6824 in the widget preview display region 5280, the computer system displays the preview **5022*n*"-4 (e.g., a 2×4 widget of the "Topic 1" type) in the central region of the widget preview display region 5280, as shown in FIG. 5112**.

In FIG. 5112, a tap-hold input by a contact 6826 is detected at a location corresponding to the location of widget preview **5022*n*"-4 in the widget preview display region 5280. In response to detecting the tap-hold input by the contact 6826, the widget preview 5022*n*"-4 becomes selected (e.g., is lifted out of widget-specific configuration user interface 5270, and becomes movable in accordance with the movement of the contact 6826). In response to movement of the contact 6826 after the widget preview 5022*n*"-4 is selected by the contact 6826, the widget preview 5022"-4 is moved relative to the widget-preview 5022*n*"-4 in accordance with the movement of the contact 6826 and the widget-specific configuration user interface 5270 is visually deemphasized, as shown in FIG. 5113. As movement of the contact 6826 continues, the device ceases to display the widget-specific configuration user interface 5270, as shown in FIG. 5114, where the underlying user-arranged page 5230' of the multipage home screen user interface is gradually restored from the deemphasized appearance. In FIG. 5114, the widget representation 5022*n*"-4 (e.g., relabeled as widget 5022*n* after leaving the widget-specific configuration user interface 5270) hovers over the user-arranged page 5230' under the contact 6826**.

In FIG. 5115, where the user-arranged page 5230' has become fully restored, in accordance with movement of the contact 6826, the widget **5022*n* is moved upwards in the user-arranged page 5230' and application icons 9-16 are reflown (e.g., moved downwards in a 2×4 block) to make space for the widget 5022***n*'. Upon termination of the drag input by the contact 6826 (e.g., upon liftoff of the contact 6826 while the widget 5022*n* is hovered over the third and fourth row of the layout grid of the application icons on the page 5230', or cessation of movement of the contact for more than a threshold amount of time (e.g., a threshold longer than the hover time threshold), etc.), the widget 5022*n* is placed at a placement location in the user-arranged page 5320', as shown in FIG. 516.

FIGS. 5117 and 5118 separately illustrates the addition of widgets or widget stacks to a respective page of the multipage home screen user interface using the widget selection and configuration user interface 5250 or the widget-specific configuration user interface 5270, in accordance with some embodiments.

In some embodiments, the configuration of page 5230' shown in FIG. 5117 can also be achieved directly from an input detected in the widget selection and configuration user interface 5250 as shown in FIG. 512. For example, in FIG. 512, a tap input by the contact 6808 is detected at a location corresponding to widget selection affordance 5312*n* corresponding to the widget 5022*n*. In response to detecting the tap input by the contact 6808, the computer system adds the widget 5022*n* directly to the page 5230' at a default location (e.g., an upper left corner in the layout grid of the page), as shown in FIG. 5117. In some embodiments, the widget selection affordances 5312 are replaced with selection affordances that do not directly add the corresponding widgets upon selection. Instead, one or more widgets can be selected in the widget selection and configuration user interface using their corresponding selection affordances, and the widget selection and configuration user interface includes a separate add button that, when activated by a tap input, causes the currently selected widgets to be added to default positions in a respective page. In some embodiments, adding multiple widgets to the same page at the same time may cause existing application icons to overflow to a preset location (e.g., a new folder on the page, a new page or next page adjacent to the page to which the widgets are added). In some embodiments, deletion of an added widget causes some or all of the overflowed application icons and/or widgets (e.g., application icons and/or widgets that were moved off the page when additional application icons or widgets were placed on the page) to flow back to the original page (e.g., as long as they have not been repositioned manually since being overflowed to the respective location, or as long the widget is deleted in the same reconfiguration session in which the widget was added to the page, etc.).

In some embodiments, widget stacks can also be automatically added to a respective page of the multipage home screen user interface. Returning to FIG. 512, a tap or tap-hold input by a contact 6810 is detected at a location corresponding to the widget selection affordance 5312*i* corresponding to the system-generated widget stack 5024*i*. In response to detecting the tap or tap-hold input by the contact 6810, the device adds the widget stack 5024*i* to the default location (e.g., upper left corner) in the user-arranged page 5230', as shown in FIG. 5118. In some embodiments, the widget selection affordances 5312 are replaced with selection affordances that do not directly add the corresponding widgets or widget stacks upon selection. Instead, one or more widgets and/or widget stacks can be selected in the widget selection and configuration user interface using their corresponding selection affordances, and the widget selection and configuration user interface includes a separate add button that, when activated by a tap input, causes the currently selected widgets and/or widget stack to be added to default positions in a respective page. In some embodiments, adding multiple widgets and widget stacks to the same page at the same time may cause existing application icons, widgets, and/or widget stacks to overflow to a preset location (e.g., a new folder on the page, a new page or next page adjacent to the page to which the widgets are added). In some embodiments, deletion of an added widget or widget stack causes some or all of the overflowed application icons, widgets, and/or widget stacks to flow back to the original page (e.g., as long as they have not been repositioned manually since being overflowed to the respective location, or as long the widget is deleted in the same reconfiguration session in which the widget was added to the page, etc.).

FIGS. 6A-6K are flow diagrams illustrating a method 6000 of displaying an interacting with user interface objects corresponding to different applications, in accordance with some embodiments. The method 6000 is performed at computer system (e.g., device 300, FIG. 3, or portable multifunction device 100, FIG. 1A) with a display generation component (e.g., a touch-screen 112) and one or more input devices (e.g., a touch-sensitive surface). In some embodiments, the computer system includes one or more sensors to detect intensity of contacts with the touch-sensitive surface. In some embodiments, the touch-sensitive surface and the display generation component are integrated into a touch-sensitive display. In some embodiments, the display is a touch-screen display and the touch-sensitive surface is on or integrated with the display. In some embodiments, the display is separate from the touch-sensitive surface. Some operations in method 6000 are, optionally, combined and/or the order of some operations is, optionally, changed.

Method 6000 relates to providing access to a system user interface that includes representations of different automatically-generated groupings of applications that are accessible on different user-arranged pages of a multipage home screen user interface, where activation of the representation of a respective automatically-generated grouping of applications on the system user interface causes display of the application icons for the applications included in the grouping. In particular, the computer system allows the user to access the system user interface in a manner that is consistent with the manner that the user can navigate through the different user-arranged pages of the multipage home screen user interface. For example, in some embodiments, the system user interface including the representations of the automatically-generated groupings is accessed by an input that specifies the same navigation direction as other inputs for navigating through the pages of the multipage home screen user interface, using the same gesture type (e.g., a swipe input), and/or on the same portions (e.g., main portion, as opposed to an edge) of the currently displayed page (e.g., the last user-arranged page, or the second to last user-arranged page if the system user interface is included as a page of the multipage home screen user interface as well) of the multipage home screen user interface). By allowing the user to access the system user interface that includes representations of the automatically-generated groupings of applications in the manner described herein (e.g., using the same gesture direction, same gesture type, and/or same gesture responsive region used to navigate through the user-arrange pages of the multipage home screen user interface) enhances the operability of the device (e.g., by reducing the number of gestures that the user has to remember and master, and providing additional function without cluttering the user interface with additional controls, etc.) and makes the user-device interface more efficient (e.g., by helping the user to achieve an intended outcome with required inputs faster and more easily, and reducing user mistakes when operating/interacting with the device), which improves battery life of the device (e.g., by helping the user to use the device more quickly and efficiently).

Method 6000 is performed at a computer system (e.g., a computer, an electronic device, a handheld electronic device, a portable electronic device, a tablet device, a mobile phone, a wearable device, etc.) in communication with a display generation component (e.g., a touch-sensitive display, a display, a projector, a head mounted display (HTD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component. In the method 6000, the device displays (6002) (e.g., on substantially the entirety of the display screen, in a main display region of the display screen, etc.), via the display generation component, a first page of a multipage home screen user interface (e.g., a first user-arranged home screen, not necessarily the beginning page of a sequence of multiple (e.g., all, a predetermined set, etc.) of the pages of the home screen user interface). The first page of the multipage home screen user interface includes a first subset of application icons (e.g., at least partially selected and organized manually by user) of a plurality of application icons corresponding to a plurality of applications that are associated with (e.g., installed on and/or approved for installation on) the computer system (e.g., applications that can be launched from and/or executed on the computer system (e.g., applications installed on the computer system, applications authorized for use on the computer system, etc.)). Activation of a respective application icon of the plurality of application icons in accordance with first criteria (e.g., application launching criteria) (e.g., criteria for detecting a tap input, a double tap input, or other input for launching an application using its application icon) causes display of an application corresponding to the respective application icon to replace display of a respective page (e.g., any page, a user-arranged page, or a system-arranged page on which the respective application icon is displayed and from which the corresponding application is activated) of the multipage home screen user interface on which the respective application icon is displayed. In some embodiments, the first page of the multipage home screen user interface further includes one or more user interface objects that contains application content from respective ones of different applications. A user interface object that contains application content from a respective application is sometimes referred to as a "widget" or "mini application object." In some embodiments, the application content that is contained in a user interface object containing application content is user configurable and includes a specific type of informational content, and/or a specific application function without requiring the user to open the corresponding application. The user interface object containing application content from a respective application is different from an application window which displays the user interface of an open application. In response to a tap input directed to the user interface object containing application content, the computer system opens the corresponding application. In some embodiments, a limited set of application functions is provided in the user interface object containing application content, such as text input function or selection function, etc., and the input received through the user interface object containing application content is provided to the corresponding application so the application is updated according to the input without requiring the user to actually open the application. In some embodiments, the user interface object containing application content has a size that is comparable to the size of an application icon, and is placed in a placement location that accommodates a small integer number of application icons (e.g., 1 application icon, 2 application icons in a row or a column, 4 application icons in a row, 2×2 application icons, etc.). In some embodiments, the application content included in the user interface object containing application content is dynamically updated by the computer system when the same application content is updated in the corresponding application, even when the application is not currently open on the display generation component. While displaying the first page of the multipage home screen user interface, the computer system detects (6004) a first input that meets second criteria (e.g., page navigation criteria) (e.g., criteria for detecting a swipe input (e.g., horizontal, vertical, upward, rightward, etc.) on the currently displayed page of the multipage home screen user interface, a tap input on a page switching affordance (e.g., the page dots), a swipe gesture from a first portion of a page navigation element (e.g., a first page dot) corresponding to one page to a second portion of the page navigation element (e.g., a second page dot) corresponding to another page, followed by liftoff of the swipe gesture, etc.) different from the first criteria (e.g., criteria for detecting a tap input, criteria for launching an application using its application icon, etc.), the second criteria including a requirement that the first input indicates navigation in a first direction (e.g., a direction from a first end (e.g., the first page) of a sequence of pages to a second end (e.g., the last page) of the sequence of pages, or the reverse direction) through the multipage home screen user interface (e.g., navigation to the right in response to a right to left swipe or a tap on a right side of the display or scrubbing along a navigation element to the right or a tap on a right side of the navigation element, navigation downward in response to a downward swipe, a tap on a lower end of the display, or scrubbing along a navigation element in the downward direction, etc.). In some embodiments, the movement direction of the input is mapped to the navigation direction through the sequence of pages, and not necessarily exactly aligned (e.g., parallel to) with the visual direction of the navigation. For example, a slanted swipe in the downward and right direction can optionally be mapped to navigation to the next page in the sequence of pages, irrespective of how the user interface is oriented on the display. In response to detecting the first input that meets the second criteria (6006): in accordance with a determination that the first input corresponds to a request to navigate to a second page of the multipage home screen user interface (e.g., the next or previous page of the sequence of pages of the home screen user interface in accordance with the direction of navigation specified by the first input) (e.g., further in accordance with a determination that the second page is not the last page (e.g., the system-arranged page is the last page), or in some embodiments, further in accordance with a determination that the first page is not the last page (e.g., the second page is the last page and a user-arranged page (e.g., the system-arranged page is an overlay over the second page)) of the multipage home screen user interface) (e.g., the first input is a swipe input (e.g., on the page or along a page navigation element) to navigate forward or backward to another user-arranged home screen, tapping on a page indicator for another user-arranged home screen, etc.) (e.g., the second page is not the end of sequence of pages in the first direction), the computer system replaces (6008) display of the first page of the multipage home screen user interface with display of the second page of the multipage home screen user interface (e.g., a second user-arranged home screen), wherein the second page of the multipage home screen user interface includes a second subset of application icons (e.g., at least partially selected and organized manually by the user) of the plurality of application icons corresponding to the plurality of applications, the second subset of application icons are different from the first subset of application icons (e.g., the first subset and the second subset include non-overlapping sets of application icons, the first subset and the second subset respectively include some unique application icons not present in the other subset, and optionally some duplicates of application icons present in the other subset). In some embodiments, in response to detecting the first input that meets the second criteria, in accordance with a determination that the first input corresponds to a request to navigate to the last page of the multipage home screen user interface (e.g., tapping on the page indicator for the last page of the home screen to directly jump to the last page (e.g., the respective page indicators of multiple (e.g., all, a predetermined set of, etc.) pages are displayed on multiple pages or every page of the multipage home screen)), the device replaces display of the first page with the last page of the multipage home screen user interface (e.g., the final page of the sequence of pages of the home screen user interface in the first direction (e.g., the final page is either the final user-arranged page in some embodiments, or the final page is the system-arranged page in some embodiments)). While displaying the second page of the multipage home screen user interface (e.g., resulted from the first input), the computer system detects (6010) a second input that meets third criteria (e.g., same as the second criteria, page navigation criteria, or different from the second criteria), the third criteria including the requirement that the second input indicates navigation in the first direction through the multipage home screen user interface (and optionally, a requirement that the currently displayed page is the last page of the multipage home screen user interface (e.g., the system-arranged page is displayed as a layer overlaying the last page), or a requirement that the currently displayed page is the second to last page of the multipage home screen user interface (e.g., the system-arranged page is displayed as the last page of the multipage home screen user interface), etc.). In response to detecting the second input that meets the third criteria (6012) (e.g., in accordance with a determination that the second input corresponds to a request to navigate from the second to last page of the multipage home screen user interface to the last page of the multipage home screen user interface (e.g., the last page is the system-arranged page) (e.g., a swipe input to navigate beyond the last user-arranged home screen, tapping on a page indicator for the system-arranged home screen, etc.)) (e.g., in accordance with a determination that the second input corresponds to a request to navigate beyond the last page of the multipage home screen user interface (e.g., the last page is the last user-arranged page in a sequence of user-arranged pages) to cause a system-arranged page to be displayed overlaying the last page of the multipage home screen user interface (e.g., the system-arranged page is not directly accessible using the page indicators))), the computer system replaces (6014) display of the second page of the multipage home screen user interface with display of a respective user interface (e.g., an app library or the last page of the multipage home screen user interface (e.g., the system-arranged home screen) that includes representations of a plurality of automatically-generated groupings of (e.g., folder icons with the names of the groupings (e.g., groupings based on app store categories, functions of applications, usage patterns of applications, etc.") the plurality of applications, and wherein activation of a respective representation of a respective automatically-generated grouping of the plurality of automatically-generated groupings in accordance with the first criteria (e.g., criteria for detecting a tap input, a double tap input, or other input for launching an application using its application icon) causes display of a third subset of application icons of the plurality of application icons (e.g., the third subset of application icons are different from the first subset of application icons and the second subset of applications icons). The third subset of application icons correspond to at least a subset of the plurality of applications that belong to (e.g., automatically selected by the computer system for inclusion in) the respective automatically-generated grouping of the plurality of automatically-generated groupings (e.g., the computer system automatically assigns the applications to their respective grouping based on various characteristics of the applications (e.g., tags, names, app store categories, etc.)). These features are illustrated, for example, in FIGS. 5A1-5A4, where a sequence of navigation inputs are used to navigate through one or more user-arranged pages of a multipage home screen user interface and to a system-arranged page 5054 of the multipage home screen user interface, and in FIGS. 5A26-5A34, where a sequence of navigation inputs are used to navigate through one or more user-arranged pages of a multipage home screen user interface, and an addition navigation input causes display of an application library user interface 5054'. The system-arranged page 5054 and the application library user interface 5054' include automatically generated groupings of applications, and a grouping representation for a respective grouping (e.g., grouping representation 5020), when activated, opens a folder displaying the application icons for the applications included in the respective grouping.

In some embodiments, the plurality of automatically-generated groupings included on the respective user interface (e.g., the last page of the multipage home screen user interface or the overlay that is displayed overlaying the last page of the multipage home screen user interface) include (6016) one or more groupings that are generated based on respective categories for applications (e.g., productivity, gaming, lifestyle, social networking, communications, etc.) as defined by a source of the applications (e.g., a publisher of applications, an app store, an application download portal, etc.). In some embodiments, when an application is downloaded from a source of the applications, its category used at the source of the application is used as the basis to assign it to an existing automatically generated grouping included on the system-arranged home screen, or used as a basis to create a new grouping and include the application in the new grouping. In some embodiments, a respective grouping is represented as a folder icon on the system-arranged home screen with a folder label attached to the folder, and the folder label includes text specifying the name of the category used by the source of the applications. In some embodiments, the folder icon includes reduced scale images of application icons for at least a subset of applications included in the folder. Automatically generating one or more groupings based on respective categories for applications as defined by the source of the application performs an operation (e.g., automatically grouping applications without user input) when a set of conditions has been met (e.g., determining the respective categories of the application based on the application source) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the plurality of automatically-generated groupings included on the respective user interface include (6018) a grouping (e.g., a "Recent" folder) that includes applications that are installed within a preset time window (e.g., installed within the past week, or past 30 days, etc.). In some embodiments, folder icon for the automatically-generated grouping for the recently installed applications includes reduced scale images of application icons for a few most-recently installed applications. The newly installed applications also have application icons on the user-arranged home screens and optionally in other automatically generated groupings on the system-arranged home screen (e.g., groupings selected based on the application categories of the newly installed applications, or user specified tags, etc.). In some embodiments, the automatically-generated grouping for the recently installed applications are automatically updated when a new application is installed on the computer system. Including applications that are installed within a preset time window in an automatically-generated grouping performs an operation (e.g., generating a grouping) when a set of conditions has been met (e.g., determining that the applications are installed within a preset time window) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4 and 5A34, where a grouping for recently added applications is presented on the system-arranged home screen 5054 and the application library user interface 5054'.

In some embodiments, the plurality of automatically-generated groupings included on the respective user interface include (6020) at least a first representation of a first grouping for a first subset of applications that are installed on the computer system, a second representation of a second grouping for a second subset of applications that are installed on the computer system, wherein the first subset of applications and the second subset of applications include at least one application in common (e.g., the application icon for the at least one application is included in both the folder for the first grouping and the folder for the second grouping). For example, the application icon for a text messaging application is optionally included in the folder for a first grouping for communication-related applications, and the folder for a second grouping for social-networking applications, and the folder for a third grouping for recently installed applications, etc. The text messaging application is automatically included in the first grouping based on its app store category (e.g., communications), and in the second grouping based on its functions or user-specified tags, and in the third grouping based on its installation time. Automatically including an application icon in both the first and the second groupings performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4 and 5A34, for example, where an application icon for the mail application is included in multiple groupings 5020*a*, 5020*b*, and 5020*c*.

In some embodiments, the respective representation of the respective automatically-generated grouping (e.g., the folder icon for a respective grouping that is displayed on the system-arranged home screen, or another type of grouping representation such as a platter, etc.) includes (6022) a first sub-portion and a second sub-portion (e.g., the first sub-portion includes areas occupied by application icons, and the second sub-portion includes areas not occupied by application icons; or the first sub-portion includes areas occupied by application icons, and the second sub-portion includes area occupied by a folder launch icon, etc.), wherein the first sub-portion of the respective representation of the respective automatically-generated grouping includes a respective representation of a first application that belongs to the respective automatically-generated grouping, the second sub-portion of the respective representation of the respective automatically-generated grouping does not include respective representations of applications that belong to the respective automatically generated grouping, wherein activation of the respective representation of the respective automatically-generated grouping in accordance with the first criteria includes activating the second sub-portion of the respective representation of the respective automatically-generated grouping (e.g., without activating the first sub-portion of the respective representation of the respective automatically-generated grouping). In some embodiments, activating the first sub-portion of the respective representation of the respective automatically-generated grouping without activating the second sub-portion of the respective representation of the respective automatically-generated grouping causes display of the first application that belongs to the respective automatically-generated grouping. In some embodiments, the second sub-portion is a folder launch icon that includes an indicator that shows the aggregated number of alerts and/or notifications from the applications included in the respective automatically-generated grouping. Including both the first sub-portion and the second sub-portion in the respective automatically-generated grouping provides improved visual feedback to the user (e.g., allowing the user to see both the applications in the first sub-portion and additional information (e.g., aggregated number of alerts and/or notifications) from the applications included in the respective automatically-generated groupings from an automatically-generated grouping). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5A4, 5A9, and 5A34, for example, where a grouping representation 5020*a* includes application icons for the applications included in the communication grouping, and a folder launch icon 5014*a* for opening the folder corresponding to the grouping.

In some embodiments, while displaying the respective representation of the respective automatically-generated grouping including the first sub-portion and the second sub-portion of the respective representation (e.g., while displaying the folder icon for the respective automatically-generated grouping), the computer system detects (6024) an input directed to the first sub-portion of the respective representation of the respective automatically-generated grouping (e.g., detecting a tap input on the first sub-portion of the folder icon for the communications grouping that shows a reduced scale application icon for the messages application; detecting a gaze input on the first sub-portion of the folder icon for the communications grouping that shows a reduced scale application icon for the messages application with an in air tap input, etc.). In response to detecting the input directed to the first sub-portion of the respective representation of the respective automatically-generated grouping and in accordance with a determination that the input directed to the first sub-portion of the respective representation of the respective automatically-generated grouping meets preset criteria (e.g., icon activation criteria, criteria for detecting a tap input, criteria for detecting an activation input, etc.), the computer system replaces display of the respective user interface with display of the first application that belongs to the respective automatically-generated grouping. For example, the system-arranged home screen includes a folder icon for a grouping of communication-related applications, and the folder icon includes reduced scale application icons for one or more applications that belong to the grouping, and a tap input on a mini-sized application icon for a first application included in the grouping opens the first application, and a tap input on a mini-sized application icon for a second application included in the grouping opens the second application. Optionally, a tap input in an unoccupied area on the folder icon opens the folder and displays the content of the grouping, such as application icons for multiple (e.g., all, a predetermined set of, etc.) applications included in the grouping. In some embodiments, a folder launch icon is included among the mini-sized application icon on the folder icon, and a tap input on the folder launch icon opens the folder and displays the content of the grouping. Replacing the display of the respective user interface with the display of the first application that belongs to the respective automatically-generated grouping, in response to detecting the input directed to the first sub-portion of the respective representation of the respective automatically-generated grouping and in accordance with the determination that the input directed to the first sub-portion of the respective representation of the respective automatically-generated grouping meets preset criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4, 5A7, 5A8, and 5A34, where a grouping representation 5020*a* includes application icons for the applications included in the communication grouping, the application icons (e.g., the application icons for the mail application, and the messages application) can be used to launch the corresponding applications (e.g., in response to tap inputs by contacts 5512 and 5510, respectively, on the application icons shown in the grouping representation 5020*a*).

In some embodiments, the second sub-portion of the respective representation of the respective automatically-generated grouping includes (6026) reduced-scale versions of application icons for at least some of the third set of application icons (e.g., the reduced scale versions of application icons are displayed on a folder launch icon for the respective grouping). In some embodiments, the second sub-portion of the representation of a respective grouping includes a folder icon, and the folder icon includes miniature versions of the application icons for at least a subset of the applications included in the respective grouping. Including reduced-scale versions of application icons for at least some of the third set of application icons in the second sub-portion of the respective representation of the respective automatically-generated grouping provides improved visual feedback to the user (e.g., allowing the user to view a larger number of application launch icons in the second sub-portion of the respective representation of the respective automatically-generated grouping). Providing improved visual feedback enhances the operability of the device and makes the user-device interface more efficient, which, additionally, reduces power usage and improves battery life of the device by enabling the user to use the device more quickly and efficiently. This is illustrated in FIG. 5A4, for example, where the folder launch icon 5014*a* within the grouping representation 5020*a* includes miniature application icons corresponding to the applications included in the "Communication" grouping represented by the grouping representation 5020*a*.

In some embodiments, the first sub-portion of the respective representation of the respective automatically-generated grouping includes (6028) respective representations of one or more applications, including the first application, that belong to the respective automatically-generated grouping, wherein the respective representations of the one or more applications are select for inclusion in the respective representation of the respective automatically-generated grouping in accordance with a measure of frequency of use associated with the applications belonging to the respective automatically-generated grouping (e.g., the frequency of use data includes optionally frequency of use by a respective user of the computer system, and/or frequency of use across a large number of users (e.g., users of similar demographic as the user of the computer system, or users of various characteristics)). In some embodiments, if the folder icon for the communications grouping has three placement locations for application icons (e.g., reserving one placement location for the folder launch icon), and the communications grouping has four applications, only three of those four applications will have their respective application icons represented on the large folder icon, and the computer system selects the three applications based on the frequency of use for the four applications included in the communications grouping, and the top three applications will be represented on the folder icon of the communications grouping. Selecting the respective representation of the respective automatically-generated grouping for inclusion in the respective representation of the respective automatically-generated grouping, in accordance with the measure of frequency of use associated with the applications, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. This is illustrated in FIG. 5A4, for example, where the three application icons within the grouping representation 5020*a* are optionally for applications that are frequently used among applications in the "Communication" grouping (e.g., most frequently used or based on other frequency information).

In some embodiments, the second sub-portion of the respective representation of the respective automatically-generated grouping includes (6030) an affordance (e.g., a graphical icon, a button, a folder launch icon, etc.) (e.g., an affordance that has the same size as the mini application icons shown on the folder icon) separate from the respective representation of the first application that belongs to the respective automatically-generated grouping (e.g., separate from the mini application icons for one or more applications that are selectively represented on the folder icon for the respective automatically-generated grouping). In the method 6000, while displaying the respective representation of the respective automatically-generated grouping including the first sub-portion and the second sub-portion of the respective representation, the computer system detects an input directed to the second sub-portion of the respective representation of the respective automatically-generated group. In response to detecting the input directed to the second sub-portion of the respective representation of the respective automatically-generated group and in accordance with a determination that the input directed to the second sub-portion of the respective representation of the automatically-generated group meets preset criteria (e.g., icon activation criteria, criteria for detecting a tap input, criteria for detecting an activation input, criteria for activating the mini application icons on the folder icon for the grouping, etc.), the computer system displays respective application icons for the subset of applications that belong to the respective automatically-generated grouping. In some embodiments, a folder launch icon is included among the mini-sized application icon on the folder icon, and a tap input on the folder launch icon opens the folder and displays the content of the grouping represented by the folder icon. In some embodiments, a graphic of the affordance includes miniature versions of at least some of the subset of applications that belong to the respective automatically-generated grouping. In some embodiments, if there are more than a threshold number of applications included in the respective grouping, only the threshold number of applications are represented on the graphic of the affordance. Displaying the respective application icons for the subset of applications that belong to the respective automatically-generated grouping, in response to detecting the input directed to the second sub-portion of the respective representation of the respective automatically-generated group and in accordance with the determination that the input directed to the second sub-portion of the respective representation of the automatically-generated group meets preset criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4, 5A9, and 5A34, where a grouping representation 5020*a* includes application icons for the applications included in the communication grouping, and a folder launch icon 5014*a* for opening the folder corresponding to the grouping. A tap input by a contact 5514 on the folder launch icon 5014*a* included in the grouping representation 5020*a* in FIG. 5A4 causes display of a folder 5080 that includes application icons for six applications automatically selected for inclusion in the "Communication" grouping, as shown in FIG. 5A9.

In some embodiments, the computer system detects (6032) that a new application is installed on the computer system (e.g., installed and having its application icon added to one of the user-arranged home screen user interface at a user-specified location or an available default location). In response to detecting that the new application is installed on the computer system, the computer system automatically includes an application icon for the new application in one or more automatically-generated groupings on the respective user interface based on an association between one or more characteristics of the new application and the one or more automatically-generated groupings. In some embodiments, the one or more automatically-generated groupings include at least one grouping that is automatically generated after the installation of the new application and includes only the newly installed application. In some embodiments, the one or more automatically-generated groupings include at least one grouping that is automatically generated before the installation of the new application and that already includes one or more existing applications other than the newly installed application. In some embodiments, the application icon for the newly installed application is also added to the grouping for recently installed applications. Automatically including an application icon for the new application in one or more automatically-generated groupings, in response to detecting that the new application is installed on the computer system, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the computer system replaces (6034) display of the second page of the multipage home screen user interface with display of the respective user interface (e.g., the system-arranged home screen, an application library user interface, etc.) includes displaying a first portion of the respective user interface that includes representations of a first subset of the plurality of automatically-generated groupings for the plurality of applications (e.g., the system-arranged home screen or the application library user interface has an adjustable size in at least one dimension (e.g., vertically, or horizontally)) and is scrollable in that dimension, while user-arranged home screens have fixed dimensions that are fully displayed and are not scrollable). In the method 6000, while displaying the first portion of the respective user interface, the computer system detects an input that meets scrolling criteria (e.g., including movement of a contact on the touch-sensitive surface in a direction that corresponds to the dimension that has adjustable size based on the number of groupings that need to be accommodated in the respective user interface that includes the representations of the automatically-generated groupings). In response to detecting the input that meets the scrolling criteria, the computer system scrolls the respective user interface to reveal a second portion, different from the first portion, of the respective user interface that includes representations of a second subset, different from the first subset, of the plurality of automatically-generated groupings for the plurality of applications. In some embodiments, in response to an input that meets the criteria for switching between different pages of the multipage home screen user interface, irrespective of which portion of the respective user interface (e.g., the system-arranged home screen or application library user interface, etc.) is currently displayed at the time of the input, the computer-system navigates to a corresponding user-arranged home screen. Scrolling the respective user interface to reveal the second portion, in response to detecting that the input meets the scrolling criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4-5A6, for example, where an upward swipe by a contact 5508 scrolls a respective system-arranged user interface (e.g., the system-arranged home screen 5054, the application library user interface, etc.) in the vertical direction to reveal additional automatically-generated groupings included in the respective user interface (e.g., the system-arranged home screen 5054, the application library user interface, etc.).

In some embodiments, the computer system replaces 6036 display of the second page of the multipage home screen user interface with display of the respective user interface includes displaying a first portion of the respective user interface that includes representations of a first subset of the plurality of automatically-generated groupings for the plurality of applications. In the method 6000, while displaying the first portion (or any other portion different from the initially displayed portion) of the respective user interface, the computer system detects a third input (e.g., a leftward horizontal swipe, a tap on a page indicator of a user-arranged home screen, etc.) that meets the fourth criteria (e.g., page navigation criteria) (e.g., criteria for detecting a swipe input (e.g., horizontal, vertical, upward, rightward, etc.) on the currently displayed page of the multipage home screen user interface, a tap input on a page switching affordance (e.g., the page dots), etc.). The fourth criteria includes a requirement that the third input indicates navigation in a second direction different from (e.g., opposite of) the first direction through the multipage home screen user interface. In response to detecting the third input that meets the fourth criteria, the computer system replaces display of the first portion (or any other portion different from the initially displayed portion) of the respective user interface with display of another page of the multipage home screen user interface that includes representations of a fourth subset of the plurality of applications (e.g., one of the user-arranged home screens that is selected in accordance with the third input that meets the second criteria). Replacing the display of the first portion of the respective user interface with display of another page of the multipage home screen user interface, in response to detecting the third input that meets the fourth criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A35-5A36, for example, where a rightward swipe causes navigation from the application library user interface 5054' back to the last user-arranged page 5052 of the home screen user interface.

In some embodiments, displaying the respective user interface includes (6038) displaying, in a first preset portion of the respective user interface (e.g., the top row, the upper left corner, etc.), respective application icons for a selected subset of the plurality of applications that are automatically identified (e.g., without requiring user input) by the computer system based on one or more characteristics of the selected subset of the plurality of applications that correspond a currently detected context (e.g., one or more contextual conditions existing at the current time at the computer system (e.g., current time, location, recent user inputs, recently used applications, recent notifications, etc.)). For example, in some embodiments, the selected subset of the plurality applications that are automatically identified (e.g., without requiring user input or request for such identification) from multiple (e.g., all, a predetermined set of, etc.) the applications installed on the computer system based on the current context includes at least one recently used application (e.g., last used application), at least one frequently used application, at least one application that is frequently used together with a last used application, at least one application that has pending requests for user input, at least one application that has new notifications, at least one application that has upcoming events (e.g., calendar application with scheduled events that are coming up), and/or at least one application that has relevant information for the current location (e.g., a map application when the computer system is at a new location that is not frequently visited by the user), etc. Displaying, in the first preset portion of the respective user interface, respective application icons for the selected subset of the plurality of applications that are automatically identified based on the one or more characteristics of the selected subset of the plurality of applications that correspond to the currently detected context, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A4 and 5A34, where the top of the system-arranged page 5054 and the application library user interface 5054' include a suggested applications widget 5055 which includes application icons for a set of applications that are automatically-selected by the computer system based on the current context.

In some embodiments, displaying the respective user interface includes (6040) displaying a search input area in a second preset portion of the respective user interface (e.g., the search input area is optionally displayed above the first row of the representations for the plurality of automatically-generated groupings, and optionally is initially hidden and only revealed after a short downward swipe on the last page of the multipage home screen user interface), where a search performed in the search input area returns search results that are application icons for a subset of applications from the plurality of applications that correspond to the search criteria (e.g., keyword, app name, tag, category, grouping name, etc.) entered using the search input area without returning search results that include other types of information (e.g., search results of types that are returned when searches are performed in other contexts on the device such as calendar events, messages, webpages, music, map locations, photos, news stories, settings, podcasts, notes, contact information, etc.). In some embodiments, the search results optionally also include user-configured mini application objects or widgets that are included on the user-arranged homes screens, in addition to the application icons for applications that are installed on the computer-system. In some embodiments, in response to detecting an activation input (e.g., a tap input, a gaze input detected concurrently with an in-air tap input, etc.) directed to a respective application icon included in the search results, the computer system launches the application corresponding to the respective application icon (e.g., replacing the last page of the multipage home screen user interface with a user interface of the application). In some embodiments, in response to detecting an enhanced activation input (e.g., a touch-hold input, a press input, etc.) directed to the respective application icon included in the search results, the computer system displays a quick action menu of the application corresponding to the respective application icon without launching the application, and a subsequent activation input directed to a menu option in the quick action menu causes performance of a function in the application. In some embodiments, the application icons that are displayed among the search results support all or most functions of a regular application icon displayed on the user-arranged home screen with the same required inputs as the regular application icon displayed on the user-arranged home screen. In some embodiments, the application icon displayed among the search results is a link or shortcut of a corresponding application icon included in one of the user-arranged home screen, and actions (e.g., move, deletion, etc.) performed with respect to the application icon displayed among the search results are applied to the same application icon included in one of the user-arranged home screen. In some embodiments, the search results only include application icons, and do not include other content (e.g., webpages, messages, contacts, content from applications, etc.) that is not application icons. In some embodiments, user-configured mini application objects or widgets are treated like application icons and are included in the search results as an exception of the content that is not application icons. In one example, if the user has configured a first mini application object for a weather application that includes weather forecast for a first location, and a second mini application object for the weather application that includes weather forecast for a second location, and a third mini application object for a calendar application. In response to a search for "weather" using the search input area, the computer system returns the application icon for the weather application, the first mini application object, the second mini application object, but not the application icon for the calendar application or the third mini application object. In some embodiments, a mini application user interface that is arranged left of the multipage home screen user interface (e.g., swipe leftward from the first page of the user-arranged home screen to navigate to the mini application user interface), and a similar search input area displayed in the mini application user interface returns search results that include application icons as well as content on the computer system that are not application icons (e.g., messages, emails, webpages, contacts, etc.). In some embodiments, the same mini application user interface is also included left of the wake screen user interface, and is displayed in response to a leftward swipe from the wake screen user interface. Returning search results that are application icons for the subset of applications from the plurality of applications that correspond to the search criteria entered using the search input area, without returning search results that include other types of information, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A11-5A13, for example, where a search input area 5030 is included in a top portion of the system-arranged user interface 5054, and a search input "ca" provided in the search input area 5030 causes the computer system to return search results including application icons for applications that correspond to the search input. Other types of search results or content, such as web content, text messages, documents, etc. that are relevant to the search input are optionally not returned when the search is performed using the search input area 5030 included in the system-arranged user interface 5054, e.g., in contrast to the same search performed using a search input area included in the widget screen or on a user-arranged page, for example.

In some embodiments, the computer system displays (6042) one or more filters for search results (e.g., toggle selector, selection radio buttons, etc.) concurrently with displaying the search input area in the preset portion of the last page of the multipage home screen user interface. A request to apply a first filter (e.g., a filter for applications with unread notifications, a filter for applications that are archived for not having been used for a long time, a filter for applications that require updating, etc.) of the one or more filters causes application icons for a first subset of applications that include notifications that meet predefined criteria (e.g., notifications that give rise to an indicator (e.g., a numbered badge on the application icon of the corresponding application, or floating banner on a currently displayed user interface, etc.)). A request to not apply the first filter causes application icons for a second subset of applications from the subset of applications that correspond to the search criteria using the search input area to be displayed as the search results, the second subset of applications includes the first subset of applications that include the active notifications and one or more applications that do not have the notifications that meet the predefined criteria (e.g., no notifications at all, or no notifications that give rise to an indicator (e.g., a numbered badge on the application icon of the corresponding application, or floating banner on a currently displayed user interface, etc.)). For example, in some embodiments, a filter for applications with unread notifications is displayed with the search input area, and selection of the filter when submitting the search criteria causes the computer system to return only application icons for applications that meet the search criteria input in the search input area and have unread notifications and not application icons for applications that meet the search criteria but do not have unread notifications. In some embodiments, a filter for applications that have certain types of notifications that give rise to visual indicators (e.g., badge on application icon, or banner over user interface), and selection of the filter when submitting the search criteria causes the computer system to return only application icons for applications that meet the search criteria and have notifications that give rise to the visual indicators, but do not include applications that do not have any notifications or have notifications that do not give rise to the required visual indicators. Displaying application icons for the second subset of applications that correspond to the search criteria, wherein the second subset of applications include the first subset of applications that include the active notifications and the one or more application that do not have the notifications that meet the predefined criteria, in response to the request to not apply the first filter, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A11-5A13, for example, where a search filter selector 5032 displayed below the search input area 5030, and search results can be filtered using the search filter selector 5032 to show a more comprehensive set of (e.g., all, substantially all, etc.) relevant applications or only relevant applications that have certain types of alerts or badges associated with them (e.g., badged due to unread notifications, alerts, etc.).

In some embodiments, the computer system detects (6044) input of one or more search criteria in the search input area displayed at the preset portion of the respective user interface (e.g., detecting textual input or voice input specifying the search criteria when the search input area has input focus, followed by a confirmation input submitting the search criteria). In response to detecting the input of the one or more search criteria, the computer system displays, via the display generation component, search results corresponding to the one or more search criteria in a search result display area, including displaying at least a first application icon corresponding to a first application that is responsive to the search criteria at a first location within the search result display area. While displaying the first application icon corresponding to the first application that is responsive to the search criteria, the computer system detects an input that drags the first application icon from the first location to a second location different from the first location (e.g., the second location is an edge of the respective user interface, or the search result interface). In response to detecting the input that that drags the first application icon from the first location to the second location: the computer system ceases display of the search result display area including the search results; and the computer system displays a respective page of the multipage home screen user interface (e.g., one of the user-arranged home screen user interface that is selected based on the location and duration of the drag input) that is different from the respective user interface. While displaying the first application icon over the respective page of the multipage home screen user interface, the computer system detects a termination of the input that had dragged the first application icon from the first location to the second location. In response to detecting the termination of the input that had dragged the first application icon from the first location to the second location: the computer system moves the first application icon from an original location of the first application icon on the multipage home screen user interface (e.g., an original location on one of the user-arranged home screen, as opposed on the system-arranged home screen) to a new location on the respective page of the multipage home screen user interface, the new location being selected in accordance with a final location of the first application icon at termination of the input that had dragged the first application icon from the first location to the second location. In some embodiments, the user will have difficulty locating an application icon for an installed application on the many pages of the user-arranged home screen user interface. In such a scenario, the user can perform a search for the application using the search input area on the system-arranged home screen, and directly drag and drop the application icon from the search result display area to a new desired location on one of the user-arranged home screens. This adjustment of location on the user-arranged home screens do not alter the placement location of the application icon on the system-arranged home screen. In some embodiments, dragging an application icon (e.g., touch-hold on the application icon until the application icon is selected and then move to drag the application icon) causes the user-arranged home screen user interface to enter a first reconfiguration mode (e.g., icon reconfiguration mode), where locations of application icons on the currently displayed page or a predetermined set of (e.g., all, some, etc.) user-arranged pages of the home screen user interface can be adjusted by dragging and dropping the application icons. The computer system also enters into a second reconfiguration mode (e.g., a page editing mode) that is triggered after a preset affordance (e.g., highlighted page indicators) is activated on the home screen while the computer system is in the first reconfiguration mode. Moving the first application icon from the original location of the first application icon on the multipage home screen user interface (e.g., an original location on one of the user-arranged home screen, as opposed on the system-arranged home screen) to the new location on the respective page of the multipage home screen user interface, in response to detecting the termination of the input that had dragged the first application icon from the first location to the second location, reduces the number of inputs needed to perform an operation (e.g., adding the first application icon to a new location on the home screen user interface). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5A14 and 5A19, for example, where application icon 5008*w* is dragged from among the search results for a search input in the search input area 5030 (FIGS. 5A14-5A16), and dropped onto a user-arranged home screen 5050' upon termination of the drag input (e.g., liftoff of the contact, cessation of movement of the contact for more than a threshold amount of time, etc.) over the user-arranged home screen 5050' (FIG. 5A17); and as such, the application icon 5008*w* is moved from its original location in the home screen user interface to the new placement location in the user-arranged home screen 5050' (FIG. 5A18), and optionally deleted from the search result area (FIG. 5A19).

In some embodiments, while displaying a second application icon corresponding to a second application that is responsive to search criteria provided using the search input area displayed at the preset portion of the respective user interface, the computer system detects (6046) an input that meets preset criteria for triggering deletion of the second application icon from the search result display area (e.g., a touch-hold input on the second application icon followed by activation of a deletion affordance associated with the second application icon, a swipe input on the second application icon to show an option to delete the second application icon followed by activation of the option). In response to detecting the input that meets the preset criteria for triggering deletion of the second application icon from the search result display area: the computer system ceases to display the second application icon among the search results responsive to the search criteria provided using the search input area. In some embodiments, the computer system removes the second application icon from an original location of the second application icon in the multipage home screen user interface (e.g., removing the second application icon from one of the user-arranged home screen user interface, and removing the second application icon from the folders for one or more groupings on the system-arranged home screen user interface that included the second application) in response to deletion of the application icon from the search result display area. In some embodiments, the computer system removes the second application from the computer system, marks the second application for deletion from computer system, and/or hide the second application icon on the user-arranged home screen and the system-arranged home screen, in response to deletion of the second application icon from the search result display area. In some embodiments, the user will have difficulty locating an application icon for an installed application on the many pages of the user-arranged home screen user interface. In such a scenario, the user can perform a search for the application using the search input area on the system-arranged home screen, and directly delete the application by deleting its application icon from the search result display area. Ceasing to display the second application icon among the search results, in response to detecting the input that meets the preset criteria for triggering deletion of the second application icon, reduces the number of inputs needed to perform an operation (e.g., removing the second application icon from the search result display area). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5A14, 5A19 and 5A20, for example, where application icon 5008*w* is deleted from the search result area in response to a tap input by a contact 5534 on the deletion affordance 5012*e* associated with the application icon 5008*w* (FIG. 5A14), and as a result, the application icon 5008*w* is deleted from the home screen user interface, e.g., ceasing to be displayed in the search result area (FIG. 5A19) and ceasing to be displayed in the system-arranged home screen 5054 (FIG. 5A20).

In some embodiments, while displaying the third subset of application icons in response to activation of the respective representation of the respective automatically-generated grouping in accordance with the first criteria, including displaying at least a first application icon corresponding to a first application that belong to the respective automatically-generated grouping at a first location, the computer system detects (6048) an input that drags the first application icon from the first location to a second location different from the first location (e.g., the second location is an edge of the respective user interface, or the search result interface). In response to detecting the input that that drags the first application icon from the first location to the second location: the computer system ceases display of the respective user interface; and the computer system displays a respective page of the multipage home screen user interface (e.g., one of the user-arranged home screen user interface that is selected based on the location and duration of the drag input) that is different from the respective user interface. While displaying the first application icon over the respective page of the multipage home screen user interface, the computer system detects a termination of the input that had dragged the first application icon from the first location to the second location. In response to detecting the termination of the input that had dragged the first application icon from the first location to the second location: the computer system moves the first application icon from an original location of the first application icon on the multipage home screen user interface (e.g., an original location on one of the user-arranged home screen, as opposed on the system-arranged home screen) to a new location on the respective page of the multipage home screen user interface, the new location being selected in accordance with a final location of the first application icon at termination of the input that had dragged the first application icon from the first location to the second location. In some embodiments, the user will have difficulty locating an application icon for an installed application on the many pages of the user-arranged home screen user interface. In such a scenario, the user can locate the grouping of the application and find the application icon on the system-arranged home screen, and directly drag and drop the application icon from the system-arranged home screen to a new desired location on one of the user-arranged home screens. This adjustment of location on the user-arranged home screens do not alter the placement location of the application icon on the system-arranged home screen. In some embodiments, dragging an application icon (e.g., touch-hold on the application icon until the application icon is selected and then move to drag the application icon) causes the user-arranged home screen user interface to enter a first reconfiguration mode (e.g., icon reconfiguration mode), where locations of application icons on the currently displayed page or a predetermined set of (e.g., all, some, etc.) user-arranged pages of the home screen user interface can be adjusted by dragging and dropping the application icons. The computer system also enters into a second reconfiguration mode (e.g., a page editing mode) that is triggered after a preset affordance (e.g., highlighted page indicators) is activated on the home screen while the computer system is in the first reconfiguration mode. Moving the first application icon from an original location of the first application icon on the multipage home screen user interface to the new location on the respective page of the multipage home screen user interface, in response to detecting the termination of the input that had dragged the first application icon from the first location to the second location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A14-5A18, for example, where application icon 5008*w* is repositioned on the home screen user interface by being dragging from the search result area 5060 of the system-arranged home screen and dropped into a new placement location in a user-arrange page 5050 of the home screen user interface. These features are also illustrated in FIGS. 5G26-5G30, for example, where an application icon 5008*w* is repositioned on the home screen user interface by being dragged from within a grouping representation (e.g., for the "Productivity" grouping) in the application library user interface 5054' to a new placement location on a user-arranged page 5364 of the home screen user interface.

In some embodiments, while displaying the third subset of application icons in response to activation of the respective representation of the respective automatically-generated grouping in accordance with the first criteria, including displaying at least a second application icon corresponding to a second application that belong to the respective automatically-generated grouping at a third location, the computer system detects (6050) an input that meets preset criteria for triggering deletion of the second application icon from the respective user interface (e.g., a touch-hold input on the second application icon followed by activation of a deletion affordance associated with the first application icon, a swipe input on the second application icon to show an option to delete the second application icon followed by activation of the option). In response to detecting the input that meets the preset criteria for triggering deletion of the second application icon from the respective user interface: the computer system ceases to display the second application icon on the respective user interface (e.g., including ceasing to display the second application icon in other groupings that previously included the second application). In some embodiments, the computer system removes the second application icon from an original location of the second application icon in the multipage home screen user interface (e.g., removing the second application icon from one of the user-arranged home screen user interface, and removing the second application icon from the folders for one or more groupings on the system-arranged home screen user interface that included the second application) in response to deletion of the application icon from one of the groupings on the respective user interface. In some embodiments, the computer system removes the second application from the computer system, marks the second application for deletion from computer system, and/or hide the second application icon on the user-arranged home screen and the system-arranged home screen, in response to deletion of the second application icon from the respective user interface. In some embodiments, the user will have difficulty locating an application icon for an installed application on the many pages of the user-arranged home screen user interface. In such a scenario, the user can locate the grouping of the application and find the application icon on the system-arranged home screen, and directly delete the application from the device by deleting its application icon from the system-arranged home screen. Ceasing to display the second application icon on the respective user interface, in response to detecting the input that meets the preset criteria for triggering deletion of the second application icon from the respective user interface, reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5A14 and 5A19, for example, where application icon 5008*w* is deleted from the search result area of the system-arranged home screen 5054 in response to a tap input on a deletion affordance 5012*e* associated with the application icon 5008*w* (FIG. 5A14), and as a result, the application icon 5008*w* is removed from the home screen user interface and ceases to be displayed in the search results (FIG. 5A19) and the system-arranged home screen (FIG. 5A20). These features are available in the context illustrated in FIGS. 5G26-5G30, for example, where a reconfiguration mode can be triggered on the application library user interface 5054' in response to a tap-hold input followed by a drag input on an application icon (e.g., application icon 5008*w*), and applications can be deleted from the home screen user interface by tapping on the deletion affordances of their corresponding application icons in the application library user interface 5054', without accessing the application icons at their respective locations in the user-arranged pages of the home screen user interface. After the deletion of the application icons performed within the application library user interface 5054', the deleted application icons will no longer be displayed in the user-arranged pages of the home screen user interface.

In some embodiments, the plurality of automatically-generated groupings include (6052) a first automatically-generated grouping, the first automatically-generated grouping includes respective application icons for a subset of applications corresponding to a category associated with the first grouping, and one or more user interface objects containing application content (e.g., mini-application objects, widgets, etc.) from the subset of applications corresponding to the category associated with the first grouping. For example, in some embodiments, the folder icon for a grouping of applications is implemented as a mini application object for the grouping, and shows notifications and/or information (e.g., availability of updates, new levels for games, new features for download, etc.) extracted from the applications included in the grouping. Including the one or more user interface objects containing application content in the first automatically-generated grouping provides improved visual feedback to the user (e.g., allowing the user to view content from respective applications). Providing improved visual feedback enhances the operability of the device and makes the user-device interface more efficient, which, additionally, reduces power usage and improves battery life of the device by enabling the user to use the device more quickly and efficiently.

In some embodiments, the computer system displays (6054) a first user interface object (e.g., a page navigation element) that includes a plurality of portions (e.g., a plurality of page indicators arranged in a row or column, or circle, etc.), wherein a respective portion of the plurality of portions corresponds to a respective page of the multipage home screen user interface, and wherein display of the user interface object is maintained during navigation through the multipage home screen user interface (e.g., the page indicator that corresponds to the currently displayed page is highlighted relative to the page indicators for other pages). While displaying the first user interface object, the computer system detects a movement input (e.g., a swipe input by a contact on a touch-sensitive surface, an in-air swipe input while a gaze input is detected on the first user interface object, etc.) that corresponds to movement from a first portion of the first user interface object, through a second portion of the first user interface object, to a third portion of the first user interface object, wherein the first portion of the first user interface object, the second portion of the first user interface object, and the third portion of the first user interface object, respectively correspond to three consecutive pages of the multipage home screen user interface. In response to detecting the movement input: in accordance with a determination that a current location of the movement input corresponds to the first portion of the first user interface object, the computer system displays a first page of the three consecutive pages that corresponds to the first portion of the first user interface object; in accordance with a determination that the current location of the movement input corresponds to the second portion of the first user interface object, the computer system replaces display of the first page of the three consecutive pages with display of a second page of the three consecutive pages that corresponds to the second portion of the first user interface object; and in accordance with a determination that the current location of the movement input corresponds to the third portion of the first user interface object, the computer system replaces display of the second page of the three consecutive pages with display of a third page of the three consecutive pages that corresponds to the third portion of the first user interface object. In some embodiments, the computer system generates an output (e.g., audio output, tactile output, etc.) in response to the swipe input reaching a respective portion of the navigation element that corresponds to a next page through the multipage home screen user interface in the direction of the navigation as specified by the direction of the swipe input. Displaying a different page of the three consecutive pages that corresponds to a respective portion of the first user interface object, depending on the current location of the movement, reduces the number of inputs needed to perform an operation (e.g., displaying a different page). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5A26-5A32, for example, wherein a swipe input by a contact 5527 moves along a page navigation element 5004 that includes page indicator icons for multiple (e.g., some, all, each, etc.) pages of the multipage home screen user interface arranged in a direction that corresponds to a navigation direction through the pages of the multipage home screen user interface; and as the contact moves through the page indicator icons one by one, the computer system navigates through the pages of the multipage home screen user interface one by one in accordance with the movement of the contact 5527.

In some embodiments, the computer system displays (6056) a first user interface object (e.g., a page navigation element (e.g., a slider, a series of page indicator icons, a wheel, a virtual spring, etc.)) that is persistently at a respective location during navigation through the multipage home screen user interface. While displaying the first user interface object, the computer system detects a movement input (e.g., a swipe input by a contact on a touch-sensitive surface, an in-air swipe input while a gaze input is detected on the first user interface object, etc.) that corresponds to movement along the first user interface object. In response to detecting the movement input: in accordance with a determination that a movement input meets first movement criteria, wherein the first movement criteria require the movement input to meet a first value of a movement metric (e.g., first speed, and/or first amount of movement, etc. instead of or in addition to the termination location of the input) in order for the first movement criteria to be met, the computer system displays a first page of the multipage home screen user interface that corresponds to the first value of the movement metric; and in accordance with a determination that a movement input meets second movement criteria, wherein the second movement criteria require the movement input to meet a second value of the movement metric (e.g., second speed, and/or second amount of movement, etc. instead of or in addition to the termination location of the input) in order for the second movement criteria to be met, the computer system displays a second page of the multipage home screen user interface that corresponds to the second value of the movement metric, wherein the second value of the movement metric is different from the first value of the movement metric, and the second page is different from the first page. For example, in some embodiments, a quick and short swipe input on the page navigation element causes the computer system to navigate further through the multipage home screen user interface, e.g., as much as a slow and long swipe input on the page navigation element that started at the same position as the quick and short swipe input. Displaying a respective page of the multipage home screen user interface, depending on whether the movement input meets respective movement criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A26-5A32, for example, wherein a swipe input by a contact 5527 moves along a page navigation element 5004 that includes page indicator icons for multiple pages (e.g., some, all, each, etc.) pages of the multipage home screen user interface arranged in a direction that corresponds to a navigation direction through the pages of the multipage home screen user interface; and as the contact moves along the page navigation element 5004, the computer system determines which page of the multipage home screen user interface to display in accordance with a movement distance of the contact 5527 and optionally a movement speed of the contact 5527.

In some embodiments, the respective user interface is (6058) the last page of the multipage home screen user interface. For example, in some embodiments, the last page of the multipage home screen user interface has a corresponding page indicator in the sequence of page indicators in the page navigation element. In some embodiments, a widget screen is the first page of the multipage home screen user interface and also has a corresponding page indicator in the sequence of page indicators in the page navigation element. Placing the respective user interface as the last page of the multipage home screen user interface performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. This is illustrated in FIGS. 5A-5A4, for example, where the respective user interface is a system-arranged page 5054 of a multipage home screen user interface and the system-arranged page 5054 is the last page in a sequence of pages of the multipage home screen user interface and has a corresponding page indicator icon along the page indicator icons shown in the page navigation element 5004.

In some embodiments, the respective user interface is (6060) overlaid on the last page of the multipage home screen user interface (e.g., the second page is the last page of the multipage home screen user interface, and the second page is blurred and darkened and optionally pushed backward away from the user when the system-arranged user interface is displayed on top). In some embodiments, the system-arranged user interface is not represented by a corresponding page indicator in the sequence of page indicators in the page navigation element. In some embodiments, a widget screen is overlaid on the first user-arranged home screen of the multipage home screen user interface when a rightward swipe is detected on the first user-arranged home screen, and the widget screen also does not have a corresponding page indicator in the sequence of page indicators in the page navigation element. Overlaying the respective user interface on the last page of the multipage home screen user interface performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A26-5A34, for example, where the respective user interface is a system-generated application library user interface 5054' and it has a semi-transparent or translucent background that partially reveals the last user-arranged page 5052 of the home screen user interface underneath the system-generated application library user interface 5054'.

It should be understood that the particular order in which the operations in FIGS. 6A-6K have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 7000, 8000, 9000, 10000, 11000, 12000, 13000, and 14000) are also applicable in an analogous manner to method 6000 described above with respect to FIGS. 6A-6K. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and/or configuration user interfaces, directional conditions, control panels, controls, position thresholds, directional conditions, navigation criteria, movement parameters, thresholds, determinations, focus selectors, and/or animations described above with reference to method 6000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and/or configuration user interfaces, directional conditions, control panels, controls, position thresholds, directional conditions, navigation criteria, movement parameters, thresholds, determinations, focus selectors, and/or animations described herein with reference to other methods described herein (e.g., methods 7000, 8000, 9000, 10000, 11000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6K are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7H are flow diagrams illustrating a method 7000 of reconfiguring the multipage home screen user interface, in accordance with some embodiments.

Method 7000 relates to providing access to a page editing user interface that displays representations of user-arranged pages of a multipage home screen user interface in a manner that allows a user to rearrange, hide, delete, and/or restore selected ones of the user-arranged pages of the multipage home screen user interface. As the number of applications increases on a device, the number of pages that provide access to the applications also increase, so it is important to provide an efficient and easy way to not only arrange the application icons on the pages of the multipage home screen user interface, but also arrange the pages themselves. As described herein, the page editing user interface (e.g., the second reconfiguration mode) is displayed in response to an input that is detected while the device is in the icon editing mode (e.g., the first reconfiguration mode). In some embodiments, the affordance that triggers entry into the second reconfiguration mode from the first reconfiguration mode is displayed at the same location as the page indicators (or page navigation element) that is maintained across the multiple pages of the multipage home screen user interface. Providing access to the second reconfiguration mode while the first reconfiguration mode is active reduces accidental trigger of the second reconfiguration mode from the normal operation mode, and avoid unnecessarily cluttering up the user interface in the normal operation mode with controls related to the second reconfiguration mode. In addition, using the location for the page indicators as the location for the affordance for triggering the second reconfiguration mode uses the screen area more efficiently without unnecessarily reduce the function provided by the user interface. Providing access to the page editing user interface in the manner described herein enhances the operability of the device (e.g., by reducing user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

The method 7000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component. In the method 7000, the computer system displays (7002) (e.g., on substantially the entirety of the display screen, in a main display region of the display screen, etc.) a first page of a multipage home screen user interface (e.g., any of the user-arranged home screens, a system-arranged home screen, etc.) (e.g., in a normal/non-reconfiguration mode of operation), wherein the first page of the multipage home screen user interface includes a first subset of application icons (e.g., selected and organized manually by user, or selected and organized by the device, or both) of a plurality of application icons corresponding to a plurality of applications (e.g., applications that can be launched from and/or executed on the electronic device (e.g., applications installed on the electronic device, applications authorized for use on the electronic device, etc.)). While displaying the first page of the multipage home screen user interface, the computer system detects (7004) a first input that meets first criteria (e.g., icon reconfiguration criteria) (e.g., criteria for detecting a long press input on the currently displayed page of the multipage home screen user interface, a tap input on a page reconfiguration affordance (e.g., an "arrange" button), etc.). In some embodiments, the first input that meets first criteria include one of multiple types of inputs that meet different sets of criteria, including a touch-hold input on an application icon that is substantially stationary for at least a first threshold amount of time T1 before liftoff or movement, a touch-hold input on an application icon that is substantially stationary for at least a second threshold amount of time T2<T1 followed by movement of the contact by more than a first threshold amount of movement, a touch-hold input on an unoccupied area of the home screen that is substantially stationary for a third threshold amount of time T3<T1, (e.g., in some embodiments, T3=T2; and in some embodiments, T3<T2), and/or a touch-hold input or light press input on an application icon for a fourth threshold amount of time T4>T2 (in some embodiments, T4<T1) to trigger display of a quick action menu followed by movement of the contact to a menu option for triggering the first reconfiguration mode and liftoff of the contact from that menu option, etc. In some embodiments, T1>T2>T4>T3. In some embodiments, the home screen include widgets in addition to application icons, and touch input on an area occupied by a widget can trigger the first reconfiguration mode in the same manner as a touch input on an area occupied by an application icon. In some embodiments, the icon reconfiguration mode is optionally triggered when an application icon in a search result display area is dragged to the edge of a respective user interface that is a system-arranged application library or system-arranged page of the multipage home screen user interface. In response to detecting the first input that meets the first criteria (7006): the computer system displays (7008) the first page of the multipage home screen user interface in a first reconfiguration mode associated with the multipage home screen user interface, wherein locations of application icons in the first subset of application icons are adjustable in response to user inputs detected during the first reconfiguration mode (e.g., the application icons displayed on the respective page of the multipage home screen user interface can be dragged and moved to other locations on the same page or dragged and dropped to a different page of the multipage home screen user interface during the first reconfiguration mode). In some embodiments, the same inputs used to drag and drop application icons between different locations on the same user-arranged home screen or across different user-arranged home screens during the first reconfiguration mode do not cause repositioning of the application icons when the first reconfiguration mode is not active. For example, the same touch and move input by a contact that caused repositioning of an application icon during the first reconfiguration mode optionally causes navigation from the currently displayed page of the multipage home screen user interface to a different page of the multipage home screen user interface, or no operation at all, when the first reconfiguration mode is not active at the time of the input. While displaying the first page of the multipage home screen user interface in the first reconfiguration mode (and displaying the first user interface object for activating the second reconfiguration mode (e.g., the page editing mode) associated with the multipage home screen user interface), the computer system detects (7012) a second input that meets second criteria (e.g., criteria for detecting a tap input, a press input, etc. for activating the first user interface object for activating the second reconfiguration mode, or other criteria for detecting a special gesture for activating the second reconfiguration mode from the first reconfiguration mode (e.g., display of or interaction with the first user interface object are not required to trigger the second reconfiguration mode in some embodiments)). In response to detecting the second input, the computer system activates (7014) the second reconfiguration mode (e.g., a page configuration mode in which pages can be marked as visible/not visible, rearranged in order, and/or deleted) associated with the multipage home screen user interface, including (7016): concurrently displaying, in a first user interface (e.g., a system-generated page editing user interface (e.g., a page editing user interface 5062 in FIG. 5B7, or a page editing user interface 5305 in FIG. 5F6, etc.), an overlay on the currently displayed home screen, etc.), representations of a plurality of pages of the multipage home screen user interfaces, including a first representation of the first page of the multipage home screen user interface and a second representation of a second page of the multipage home screen user interface that is different from the first page of the multipage home screen user interface. For example, in some embodiments, the display generation component replaces display of the first page of the multipage home screen user interface with display of a page editing user interface, where the page editing user interface includes representations of a predetermined set of (e.g., all, some, etc.) the user-arranged home screens, and optionally the system-arranged home screen. In some embodiments, the representations of the user-arranged home screens are reduced scale screenshots of the user-arranged home screens. In some embodiments, a predetermined set (e.g., all, some, etc.) of the representations of the user-arranged home screens are visible on the page editing user interface at the same time (e.g., arranged in a grid). In some embodiments, only a subset of the predetermined set (e.g., all, some, etc.) of the representations of the user-arranged home screens are visible in the page editing user interface at a time, and the user can scroll the representations to see other representations that are not initially visible. In some embodiments, the representations of the user-arranged home screens are stacked and offset slightly from each other, and a touch input directed to the visible portion of a respective representation causes the whole representation to be displayed above the stack of representations. These features are illustrated in FIGS. 5B1-5B7, for example, where the page editing mode is entered through an input detected during the icon reconfiguration mode. These features are illustrated in FIGS. 5B1-5B7, for example, where a multipage home screen user interface enters a first reconfiguration mode (FIG. 5B2) in response to a touch-hold and drag input by a contact 5542 (FIG. 5B1) on an application icon 5008*a* shown in a first user-arranged page 5050 of the multipage home screen user interface. In response to activation of the first reconfiguration mode from the first user-arranged page 5050, the first user-arranged page 5050 is displayed in the first reconfiguration mode and positions of application icons can be adjusted in response to user inputs (e.g., as shown in FIGS. 5B4-5B5). A user input activates a second reconfiguration mode (e.g., a tap input by a contact 5548 on a highlighted page navigation element 5004 that is displayed at the same location on some or all of the user-arranged pages of the multipage home screen user interface) is detected while the first user-arranged page 5050 is displayed in the first reconfiguration mode (FIG. 5B6), and in response, the computer system enters the second reconfiguration mode of the multipage home screen user interface, and displays a page editing user interface 5062 including respective representations 5064", 5066", 5050" of the user-arranged pages 5064, 5066, and 5050.

In some embodiments, the computer system displays (7017), while the first page of the multipage home screen user interface is displayed in the first reconfiguration mode, a first user interface object (e.g., a page editing affordance (e.g., the page indicators with a modified appearance, or a new affordance, etc.)) for activating a second reconfiguration mode (e.g., the page editing mode) associated with the multipage home screen user interface, wherein the second input that meets the second criteria activates the first user interface object in a first manner (e.g., tapping on the first user interface object, touch and hold on the first user interface object, etc.). In some embodiments, the first user interface object includes multiple portions respectively corresponding to different pages (e.g., all pages, some pages, each page, etc.) of the multipage home screen user interface, and an input directed a respective portion of the multiple portions of the first user interface object (e.g., an input is directed to the respective portion when the contact is touching the portion (e.g., a tap, or a swipe)) in the non-reconfiguration mode, or the first reconfiguration mode causes navigation to the page that corresponds to the respective portion of the multiple portions of the first user interface object. In some embodiments, a swipe input on the first user interface object causes navigation through the multipage home screen user interface, and a speed and/or duration of the swipe input, along with the distance and/or starting and ending locations of the swipe input are used to determine which page of the multipage home screen user interface is displayed in response to the swipe input. In some embodiments, in response to an input detected on the first user interface object, the computer system: in accordance with a determination that the input is a first type of input (e.g., swipe, tap on a page indicator icon, etc.), performs a navigation operation through the multipage home screen user interface; and in accordance with a determination that the input is a second type of input (e.g., a tap input (e.g., tap to navigate is disabled) anywhere on the first user interface object, a tap input on an area not occupied by a page indicator icon, a touch and hold input, a press input, etc.), activates the second configuration mode (e.g., when the first configuration mode is activated, and/or when the first configuration is not activated). In some embodiments, the first user interface object has a different appearance but the same location while in the first reconfiguration mode and while not in the first reconfiguration mode. Activating the first user interface object for the second reconfiguration mode in the first manner, in response to determining that the second input meets the second criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B6-5B7, for example, where a user interface object (e.g., a highlighted page navigation element 5004) is provided at the same location on multiple (e.g., some, all, each, etc.) pages of the user-arranged pages of the multipage home screen user interface, and a tap input on the user interface object that is detected while the first user-arranged page 5050 is displayed in the first reconfiguration mode (FIG. 5B6) causes the computer system to enter the second reconfiguration mode of the multipage home screen user interface (FIG. 5B7).

In some embodiments, while displaying the representations of the plurality of pages of the multipage home screen user interfaces in first user interface (e.g., the page editing user interface), the computer system detects (7018) a third input that meets third criteria (e.g., criteria for moving the representations relative to each other in a first portion of the page editing user interface, criteria for detecting a drag input (e.g., a horizontal drag input, a drag and drop input that start and ends at different positions in the same first portion (e.g., upper portion showing the representations of currently included home screens, as opposed to lower portion showing the representations of the hidden pages of the home screens) of the page editing user interface, etc.) directed to a respective representation of a home screen, etc.). In response to detecting the third input that meets the third criteria: the computer system reorders the representations of the plurality of pages of the multipage home screen user interfaces in accordance with the third input (e.g., moving a first representation for a first user-arranged home screen from a position preceding that of a second representation for a second user-arranged home screen to a position succeeding that of the second representation for the second user-arranged home screen, or moving a third representation for a third user-arranged home screen from a position succeeding that of the second representation for the second user-arranged home screen to a position preceding that of the second representation for the second user-arranged home screen, etc.). Recording the representation of the plurality of pages of the multipage home screen user interface, in response to detecting that the third input meets the third criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B16, for example, where the order of the user-arranged page 5050 and 5052 is changed (as shown in FIGS. 5B14-5B15) in response to a user input (e.g., a drag input by a contact 5558 on the representation 5050") that rearranged the order of the representations 5050" and 50502" for the user-arranged pages 5050 and 5052 within the page editing user interface 5062 (as shown in FIG. 5B13 following FIG. 5B11). This is also illustrated in FIGS. 5F18-5F25, for example, where the order of the user-arranged page 5302 and 5306 is changed (as shown in FIGS. 5F24-5F25) in response to a user input (e.g., a drag input by a contact 6226 on the representation 5302") that rearranged the order of the representations 5302" and 5306" for the user-arranged pages 5302 and 5306 within the page editing user interface 5305 (as shown in FIG. 5F18 following FIG. 5F20).

In some embodiments, while displaying the first user interface including the representations of the plurality of pages of the multipage home screen user interface, the computer system detects (7020) a fourth input that meets fourth criteria and corresponds to a request to exit the second reconfiguration mode (e.g., the fourth input is a upward swipe directed to the page editing user interface (e.g., started from the bottom of the upper portion of the page editing user interface, started from the bottom of the whole page editing user interface, etc.) as opposed to a particular selected representation of a page shown in the page editing user interface, the fourth input is a tap input on a done button shown in the page editing user interface, etc.). In response to detecting the fourth input that corresponds to the request to exit the second reconfiguration mode: in accordance with a determination that the representations of the plurality of pages of the multipage home screen user interface are arranged in accordance with a first order in the first user interface at a time when the fourth input is received, the computer system displays the multipage home screen user interface with the pages of the multipage home screen user interfaces arranged in accordance with the first order (e.g., the pages of the multipage home screen user interface are displayed one by one in accordance with the first order in response to a sequence of page navigation inputs navigating the pages in a first direction (e.g., from left to right)); and in accordance with a determination that the representations of the plurality of pages of the multipage home screen user interface are arranged in accordance with a second order different from the first order in the first user interface, the computer system displays the multipage home screen user interface with the pages of the multipage home screen user interfaces arranged in accordance with the second order (e.g., the pages of the multipage home screen user interface are displayed one by one in accordance with the second order in response to a sequence of page navigation inputs navigating the pages in the first direction (e.g., from left to right)). In some embodiments, one function provided by the page editing user interface is the ability to reorder the multiple user-arranged home screens in the multipage home screen user interface before the last page of the multipage home screen user interface. In some embodiments, the page editing user interface does not include a representation of the system-arranged home screen, and the system-arranged home screen is always displayed in the multipage home screen user interface as the last page. In some embodiments, having the system-arranged home screen is displayed at a fixed ordinal position (e.g., the beginning page, the last page, a user-configured ordinal position, a system-configured ordinal position, etc.) among a predetermined set (e.g., all, some, etc.) of the pages of the multipage home screen user interface. Displaying the multipage home screen user interface arranged in accordance with a respective order, depending on the order in which the representations of the plurality of pages of the multipage home screen user interface are arranged when exiting the second reconfiguration mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B16, for example, where the order of the user-arranged page 5050 and 5052 is changed (as shown in FIGS. 5B14-5B15) in response to a user input (e.g., a drag input by a contact 5558 on the representation 5050") that rearranged the order of the representations 5050" and 50502" for the user-arranged pages 5050 and 5052 within the page editing user interface 5062 (as shown in FIG. 5B13 following FIG. 5B11). This is also illustrated in FIGS. 5F18-5F25, for example, where the order of the user-arranged page 5302 and 5306 is changed (as shown in FIGS. 5F24-5F25) in response to a user input (e.g., a drag input by a contact 6226 on the representation 5302") that rearranged the order of the representations 5302" and 5306" for the user-arranged pages 5302 and 5306 within the page editing user interface 5305 (as shown in FIG. 5F18 following FIG. 5F20).

In some embodiments, while displaying the first user interface including the representations of the plurality of pages of the multipage home screen user interface, the computer system detects (7022) a fourth input that meets fourth criteria and corresponds to a request to exit the second reconfiguration mode (e.g., the fourth input is a upward swipe directed to the page editing user interface (e.g., started from the bottom of the upper portion of the page editing user interface, started from the bottom of the whole page editing user interface, etc.) as opposed to a particular selected representation of a page shown in the page editing user interface, the fourth input is a tap input on a done button shown in the page editing user interface, etc.). In response to detecting the fourth input that corresponds to the request to exit the second reconfiguration mode: the computer system ceases displaying of the first user interface including the representations of the plurality of pages of the multipage home screen user interface; and the computer system displays a respective page of the multipage home screen user interface (e.g., the page is a new page added to the multipage home screen from among the hidden pages, the page that is moved during the second reconfiguration mode, the page that was displayed prior to entering the second reconfiguration mode, the beginning page of the multipage home screen user interface, etc.) in the first reconfiguration mode. In some embodiments, while displaying the respective page in the first reconfiguration mode, the computer system detects a drag input on a respective application icon on the respective page, and dropping it onto a different page that succeeds the respective page in accordance with a new order of the pages that was specified during the second reconfiguration mode. Displaying the respective page of the multipage home screen user interface in the first reconfiguration mode and ceasing displaying of the first user interface, in response to detecting the fourth input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B13 and FIGS. 5B14-5B16, for example, where upon exiting the second reconfiguration mode in response to an input that corresponds to a request for exiting the second reconfiguration mode (e.g., a tap input by a contact 5567 on an unoccupied area of the page editing user interface, an upward edge swipe input by a contact 5566, etc.), the computer system redisplays the multipage home screen user interface in the first reconfiguration mode (e.g., displaying user-arranged page 5052' in the first reconfiguration mode). This is also illustrated in FIGS. 5F7 followed by FIG. 5F11, where a tap input by a contact 6206 on a representation 5306" of a user-arranged page 5306 that is not currently hidden, or an upward edge swipe by a contact 6210 causes the computer system to transition from the second reconfiguration mode back into the first reconfiguration mode, and displays the user-arranged page 5306 in the first reconfiguration mode.

In some embodiments, in the second reconfiguration mode, the representations of the plurality of pages are (7024) displayed with (e.g., on the same page editing user interface, concurrently displayed, etc.) a preset holding area for displaying reduced representations of hidden pages that are not currently included in the multipage home screen user interface. In some embodiments, the preset holding area are displayed concurrently with the first portion of the page editing user interface in the first user interface (e.g., the page editing user interface). In some embodiments, the first user interface includes a primary page for the representations of the plurality of pages currently included in the multipage home screen user interface, and a secondary page for the representations of zero or more pages that were included in the multipage home screen user interface in the past, and are not currently included in the multipage home screen user interface. In some embodiments, the secondary page of the page editing user interface is displayed in response to a preset input detected on the primary page of the page editing user interface (e.g., a tap input detected on a graphical image or affordance corresponding to the secondary page of the page editing user interface). Displaying reduced representations of hidden pages that are not currently included in the multipage home screen user interface in the second configuration mode in the preset holding area reduces the number of inputs needed to perform an operation (e.g., viewing and accessing previously hidden pages). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5B11, for example, where representations of pages that are currently hidden (e.g., representations 5064" and 5066" for the hidden pages 5064 and 5066) are displayed in a preset holding area 5100 that is separate from the representations of pages that are not currently hidden (e.g., representations 5050" and 5052").

In some embodiments, in the second reconfiguration mode, the representations of the plurality of pages are (7026) displayed, in an ordered sequence, with (e.g., on the same page editing user interface, concurrently displayed, etc.) representations of one or more hidden pages that are not currently included in the multipage home screen user interface, wherein the representations of the one or more hidden pages are visually distinguished from the representations of the plurality of pages (e.g., the representations of the one or more hidden pages are displayed with a first visual characteristic that distinguish the representations of the one or more hidden pages from the representations of the plurality of pages) (e.g., representations of the hidden pages are displayed with a reduced visual prominence (e.g., shrunken, dimmed, more translucent, etc.) as compared to the representations of pages that will be displayed in the multipage home screen user interface). In some embodiments, the representations of pages that are currently included in the multipage home screen user interface and not hidden are displayed with a deletion affordance, and when the deletion affordance is activated, the corresponding page is hidden, and the representation of the hidden page no longer has the deletion affordance, but instead has a restore affordance. Activation of the restore affordance un-hides the corresponding page so it will be displayed in the multipage home screen user interface again once the device exits the second reconfiguration mode. In some embodiments, selection of a representation of a page in the second reconfiguration mode causes display of the page in the second reconfiguration mode so the user can inspect the page before deciding whether to restore the page or continue to keep it as a hidden page. In some embodiments, the hidden pages are displayed among the unhidden pages in a sequence, and can be reordered relative to the unhidden pages in the second reconfiguration mode. Displaying the one or more hidden pages in a visually distinguishing manner from the representations of the plurality of pages provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5F10, for example, where the representations of pages that are currently hidden (e.g., representations 5302" and 5310" for the hidden pages 5302 and 5310) are displayed in the same sequence as the representations of pages that are not currently hidden (e.g., representations 5306" and 5308").

In some embodiments, while displaying the representations of the plurality of pages of the multipage home screen user interfaces in the second reconfiguration mode (e.g., while displaying the page editing user interface), the computer system detects (7028) a fifth input that meets fifth criteria (e.g., criteria for detecting a sequence of one or more inputs for selecting a representation of a user-arranged home screen and marking it as hidden, or moving it into the preset holding area on the page editing user interface, etc.). In response to detecting the fifth input that meets the fifth criteria: in accordance with a determination that the fifth input is directed to the first representation of the first page of the multipage home screen interface, the computer system ceases to display the first representation of the first page of the multipage home screen interface as one of the representations of the plurality of pages that will be displayed in the multipage home screen user interfaces (e.g., when in the normal/non-reconfiguration mode of operation) (e.g., changing appearance of the first representation relative to the other representations, removing the first representation from the area that displays the other representations, marking the first representation as hidden while not marking the other representations, etc.). In accordance with a determination that the fifth input is directed to the second representation of the first page of the multipage home screen interface, the computer system ceases to display the second representation of the first page of the multipage home screen interface as one of the representations of the plurality of pages that will be displayed in the multipage home screen user interfaces (e.g., changing appearance of the second representation relative to the other representations, removing the second representation from the area that displays the other representations, marking the second representation as hidden while not marking the other representations, etc.). In some embodiments, the representations of the pages selected by the inputs meeting the fifth criteria are grayed out in the page editing user interface, rather than moved to a preset holding area for hidden pages. Ceasing to display the respective representation of the page of the multipage home screen user interface, in response to detecting the fifth input that meets the fifth criteria directed to the respective representation of the page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B16, for example, where the user-arranged page 5066 becomes hidden and not accessible when navigating through the pages in the multipage home screen user interface (FIGS. 5B14-5B16) as a result of a user input detected within the page editing user interface 5062 that correspond to requests to hide the page (e.g., drag input by contact 5552 that drags the representation 5066" into the preset holding area 5100 in the page editing user interface 5062). These features are also illustrated in FIGS. 5F6-5F13, for example, where the user-arranged pages 5310 and 5302 become hidden and not accessible when navigating through the pages in the multipage home screen user interface (FIGS. 5F11-5F13) as a result of user inputs detected within the page editing user interface 5305 that correspond to requests to hide those pages (e.g., tap inputs by contacts 6204 and 6212 on the hide/unhide affordances 5312*d* and 5312*a* associated with representations 5310" and 5302" for the pages 5310 and 5302).

In some embodiments, in response to detecting the fifth input that meets the fifth criteria (7030): in accordance with a determination that the fifth input is directed to the first representation of the first page of the multipage home screen interface, the computer system displays a reduced representation of the first page of the multipage home screen interface in a preset holding area in the first user interface (e.g., the lower portion of the page editing user interface), and in accordance with a determination that the fifth input is directed to the second representation of the first page of the multipage home screen interface, the computer system displays a reduced representation of the second page of the multipage home screen interface in the preset holding area in the first user interface (e.g., the lower portion of the page editing user interface). Displaying the respective reduced representation of the page of the multipage home screen interface in the preset holding area in the first user interface, in response to detecting the fifth input that meets the fifth criteria directed to the respective representation of the page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B16, for example, where the pages 5064 and 5066 become hidden in response to user inputs that drag the representations 5064" and 5066" into the preset holding area 5100 in the page editing user interface that is separate from the representations of pages that are not hidden (e.g., representations 5050" and 5052").

In some embodiments, after ceasing to display the first representation of the first page of the multipage home screen user interface or the second representation of the second page of the multipage home screen user interface as one of the representations of the plurality of pages that will be displayed in the multipage home screen user interface (e.g., while displaying a reduced representation of a respective page (e.g., a reduced representation of the first page, or the reduced representation of the second page) of the multipage home screen user interface in the preset holding area), the computer system detects (7032) a sixth input that meets sixth criteria and corresponds to a request to exit the second reconfiguration mode (e.g., criteria for detecting an upward swipe gesture on the touch-screen while the page editing user interface is displayed, a tap input on a "done" button shown in the page editing user interface, etc.). In response to detecting the sixth input that meets the sixth criteria and corresponds to the request to exit the second reconfiguration mode: in accordance with a determination that the first representation of the first page was no longer displayed as one of the representations of the plurality of pages that will be displayed in the multipage home screen user interface when the sixth input was detected (e.g., that the respective page of the multipage home screen user interface that has its reduced representation in the preset holding area is the first page of the plurality of pages of the multipage home screen user interface, when the sixth input was detected), the computer system displays the multipage home screen user interface without including the first page among the plurality of pages that are in the multipage home screen user interface (e.g., the first page is not displayed when the user browses through the sequence of pages of the multipage home screen user interface using inputs that meet page navigation criteria); and in accordance with a determination that the second representation of the second page was no longer displayed as one of the representations of the plurality of pages that will be displayed in the multipage home screen user interface when the sixth input was detected (e.g., the respective page of the multipage home screen user interface that has its reduced representation in the preset holding area is the second page of the plurality of pages of the multipage home screen user interface, when the sixth input was detected), the computer system displays the multipage home screen user interface without including the second page of the plurality of pages that are in the multipage home screen user interface (e.g., the second page is not displayed when the user browses through the pages of the multipage home screen user interface using inputs that meet page navigation criteria). Displaying the multipage home screen user interface without including a respective page, in accordance with the determination that the respective page was no longer displayed as one of the representations of the plurality of pages that will be displayed in the multipage home screen user interface when the sixth input was detected, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B16, for example, where the user-arranged page 5066 becomes hidden and not accessible when navigating through the pages in the multipage home screen user interface (FIGS. 5B14-5B16) as a result of a user input detected within the page editing user interface 5062 that correspond to requests to hide the page (e.g., drag input by contact 5552 that drags the representation 5066" into the preset holding area 5100 in the page editing user interface 5062). These features are also illustrated in FIGS. 5F6-5F13, for example, where the user-arranged pages 5310 and 5302 become hidden and not accessible when navigating through the pages in the multipage home screen user interface (FIGS. 5F11-5F13) as a result of user inputs detected within the page editing user interface 5305 that correspond to requests to hide those pages (e.g., tap inputs by contacts 6204 and 6212 on the hide/unhide affordances 5312*d* and 5312*a* associated with representations 5310" and 5302" for the pages 5310 and 5302).

In some embodiments, while displaying (e.g., in the first reconfiguration mode, or some other mode that allows direct activation of the second reconfiguration mode, etc.) the multipage home screen user interface without including a respective page (e.g., the first page or the second page) that were previously displayed in the multipage home screen user interface (e.g., the respective page that was removed from the plurality of pages of the multipage home screen user interface in the page editing user interface earlier) (e.g., the respective page that had a corresponding reduced representation in the preset holding area right before the second reconfiguration mode was exited), the computer system detects (7034) a request to enter the second reconfiguration mode (e.g., the selection of the highlighted page indicators shown in the first reconfiguration mode). In response to detecting the request to enter the second reconfiguration mode while displaying the multipage home screen user interface without including the respective page of the multipage home screen user interface, the computer system displays, in the second reconfiguration mode (e.g., concurrently with the representations of a set of pages that are currently included in the multipage home screen user interface) a reduced representation of the respective page of the multipage home screen interface in the second reconfiguration mode (e.g., in a preset holding area or dimmed out or otherwise visually distinguished from reduced representations of other pages in the multipage home screen interface that are currently active) (e.g., the preset holding area optionally includes reduced representations of multiple pages of the multipage home screen user interface that were previously removed from the multipage home screen user interface during the second reconfiguration mode). Displaying the reduced representation of the respective page of the multipage home screen interface in the second configuration mode, in response to detecting the request to enter the second reconfiguration mode while displaying the multipage home screen user interface without including the respective page of the multipage home screen user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B9-5B11, for example, where after the computer system exits the second reconfiguration mode with one or more pages hidden during the second reconfiguration mode (FIG. 5B10-5B9), when the computer system reenters the second reconfiguration mode, the representations of the hidden pages (e.g., representations 5064" and 5066") remain displayed in the page editing user interface 5062 with a visual indication that they are hidden (e.g., in the preset holding area 5100 in FIG. 5B11). This is also illustrated in FIG. 5F7 followed by FIGS. 5F11-5F17, for example, where the computer system exits the second reconfiguration mode in response to a tap input by a contact 6206 on the representation 5306" that is not currently hidden or an upward edge swipe input by a contact 6210 (FIG. 5F7); and after optionally navigating through the pages of the home screen user interface (e.g., skipping the hidden page 5306) (FIGS. 5F11-5F15), the computer system reenters the second reconfiguration mode (FIG. 5F17) in response to a tap input by a contact 6222 on the page navigation element 5004 shown on page 5302' in the first reconfiguration mode (FIG. 5F16), where the page editing user interface 5305 for the second reconfiguration mode still shows the representation 5310" as hidden (e.g., same as the state shown in FIG. 5F7).

In some embodiments, while displaying the reduced representation of the respective page of the multipage home screen user interface in the second reconfiguration mode (e.g., in a preset holding area or dimmed out or otherwise visually distinguished from reduced representations of other pages in the multipage home screen interface that are currently active), the computer system detects (7036) an eighth input that meets eighth criteria (e.g., criteria for dragging the reduced representation of the respective page (e.g., the first page or the second page, or another previously hidden page, etc.), or tapping a restore button associated with the respective page). In response to detecting the eighth input that meets the eighth criteria: the computer system displays the representation of the respective page as one of the representations of the plurality of pages that will be displayed in the multipage home screen user interface (e.g., the eighth input is a drag and drop input that moves the respective page from the hidden page area of the page editing user interface to a location among the representations of the set of pages that are currently included in the multipage home screen user interface, or an input that restores the appearance of the reduced scale representation of the page such that it is no longer visually distinguished from other pages that will be displayed in the multipage home screen user interface). In some embodiments, once the respective page is moved back to the area showing the representations of the set of pages that are currently included in the multipage home screen user interface or restored in appearance, the respective page will be displayed in the multipage home screen user interface and accessible by a page navigation input after the device has exited the second reconfiguration mode. Displaying the representation of the respective page as one of the representations of the plurality of pages that will be displayed in the multipage home screen user interface, in response to detecting the eight input that meets the eight criteria while displaying the reduced representation of the respective page of the multipage home screen interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated, for example, in FIGS. 5B11 followed by FIG. 5B13, where a previously hidden page (e.g., page 5064) of the multipage home screen user interface can be restored by dragging the representation of the previously hidden page (e.g., representation 5064") from the preset holding area 5100 to a position among the sequence of representations of pages that are not currently hidden (e.g., representations 5050" and 5052") in the page editing user interface 5062. This is also illustrated in FIGS. 5F17-5F18, for example, where the dimmed representation 5310" of the hidden page 5310 is restored to the same undimmed appearance as the representations 5302", 5306" and 5308" for pages that are not currently hidden, in response to a tap input on the hide/unhide affordance 5312*d* associated with the representation 5310", and as a result, the page 5310 becomes unhidden and accessible again when navigating through the sequence of pages of the multipage home screen user interface.

In some embodiments, the computer system displays (7038), in the second reconfiguration mode, one or more reduced representations of pages that are will not be displayed in the multipage home screen user interface (e.g., the representations of the hidden pages are displayed in a preset holding area (e.g., the preset holding area is a designated area that is concurrently displayed in the page editing user interface with the representations of the pages that are currently included in the multipage home screen user interface) or visually marked to distinguish them from other pages that will be displayed in the multipage home screen user interface outside of the second reconfiguration mode), respective reduced representations of the pages correspond respective pages of the home screen user interface that have been previously excluded from being displayed in the multipage home screen user interface while the second reconfiguration mode was active (e.g., the pages were optionally removed from the multipage home screen user interface or marked as hidden during a single page editing session, or multiple separate page editing sessions). While displaying, in the second reconfiguration mode (e.g., in the preset holding area or marked as hidden), the one or more reduced representations of pages that will not be displayed in the multipage home screen user interface, the computer system detects a ninth input that meets ninth criteria (e.g., detecting activation of a deletion affordance associated with the preset holding area, detecting a predefined deletion gesture directed to the preset holding area, etc.). In response to detecting the ninth input that meets the ninth criteria, the computer system ceases display of the one or more reduced representations of pages that will not be displayed in the multipage home screen user interface (e.g., while maintain display of representations of other pages that will be displayed in the multipage home screen user interface in the second reconfiguration mode). In some embodiments, after deleting the reduced representations of the hidden pages that are not currently included in the multipage home screen user interface from the preset holding area in response to the eighth input, the pages are permanently deleted, and cannot be restored to the multipage home screen user interface by simply moving them back to the area showing the representations of the pages that are currently included in the multipage home screen user interface. Ceasing the display of the one or more reduced representations of the pages that will not be displayed in the multipage home screen user interface, in response to detecting the ninth input that meets the ninth criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5B11-5B12, for example, wherein representations 5064" and 5066" of hidden pages 5064 and 5066 are deleted from the preset holding area 5100 of the page editing user interface 5062 in response to a tap input by a contact 5560 on a deletion affordance 5102 of the preset holding area 5100. After the representations 5064" and 5066" are deleted from the preset holding area 5100, the pages 5064 and 5066 are permanently deleted from the home screen user interface.

In some embodiments, the one or more reduced representations of pages that will not be displayed in the multipage home screen user interface include (7040) multiple reduced representations corresponding to multiple pages that will not be displayed in the multipage home screen user interface, and the multiple reduced representations are deleted from the second reconfiguration mode (e.g., deleted form preset holding area) by a single input that meets the eighth criteria. For example, in some embodiments, the preset holding area for the hidden pages contain reduced representations of pages that were removed from the multipage home screen user interface in several different page editing sessions, and multiple (e.g., all, some, etc.) of the hidden pages are optionally deleted at the same time in response to a single input, such as selecting a deletion affordance displayed in the page editing user interface (e.g., in the preset holding area). In some embodiments, the hidden pages are automatically deleted individually or in batches based on the time that they have been held in the preset holding area (e.g., deleted after 30 days, a week, etc.). In some embodiments, the hidden pages in the preset holding area can be individually added back to the set of pages currently included in the multipage home screen user interface in a separate page editing session from the session in which the pages became hidden. In some embodiments, the page editing user interface does not provide a deletion affordance that delete some or all hidden pages at once. In some embodiments, a page can only be deleted, if the user has deleted all or substantially all application icons and widgets from the page or moved them all or substantially all to other pages. Deleting the multiple reduced representations from the second configuration mode by a single input that meets the eight criteria performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in Figure FIGS. 5B11-5B12, for example, wherein representations 5064" and 5066" of hidden pages 5064 and 5066 are deleted from the preset holding area 5100 of the page editing user interface 5062 in response to a single tap input by a contact 5560 on a deletion affordance 5102 of the preset holding area 5100. After the representations 5064" and 5066" are deleted from the preset holding area 5100, the pages 5064 and 5066 are permanently deleted from the home screen user interface.

In some embodiments, the multipage home screen user interface includes (7042) one or more user-arranged pages and one or more system-arranged pages, and wherein the representations of the plurality of pages concurrently displayed in the second reconfiguration mode does not include representations of the one or more system-arranged pages. In some embodiments, features of the system-arranged pages of the multipage home screen are as those described with respect to FIGS. 5A-5A36 and accompanying descriptions. For example, in some embodiments, the system-arranged pages of the home screen user interface includes representations for different groupings of application icons that are also shown on the user-arranged pages of the home screen user interface, and the system-arranged pages have fixed positions relative to the user-arranged pages, and cannot be deleted or moved around using the page editing user interface. Removing the display of the representations of the one or more system-arranged pages when displaying the representations of the plurality of pages concurrently displayed in the second reconfiguration mode performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5B11, for example, where the page editing user interface 5062 does not include a representation of the system-generated application library user interface 5054' (shown in FIG. 5B19) among the representations of the pages of the multipage home screen user interface. These features are also illustrated in FIG. 5F6, where the page editing user interface 5305 does not include a representation of the system-generated application library user interface 5054' (shown in FIG. 5F15) among the representations of the pages of the multipage home screen user interface.

In some embodiments, multipage home screen user interface displayed in the first reconfiguration mode includes (7044) a first predefined user interface object for activating the second reconfiguration mode, and the second input that meets the second criteria includes an input that activates the first predefined user interface object. In some embodiments, the first predefined user interface object is displayed in response to the activation of the first reconfiguration mode. Including the first predefined user interface object for activating the second reconfiguration mode reduces the number of inputs needed to perform an operation (e.g., entering into page reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5B2, for example, wherein the first predefined user interface object for activating the second reconfiguration mode is the highlighted page navigation element 5004, and the input that activates the first predefined user interface object is a tap input on the highlighted page navigation element 5004. These features are also illustrated in FIG. 5F3, for example, where the first predefined user interface object for activating the second reconfiguration mode is the highlighted page navigation element 5004, and the input that activates the first predefined user interface object is a tap input on the highlighted page navigation element 5004.

In some embodiments, the first predefined user interface object is (7046) displayed at a location corresponding to a plurality of page indicators corresponding to the plurality of pages that are currently included for display in the multipage home screen user interface. For example, in some embodiments, the page indicators that are used to select a destination page for a page navigate input (e.g., a tap input on a page indicator of the destination page) are no longer displayed or responsive in the usual manner once the first reconfiguration mode is activated, and the predefined user interface object for triggering the second reconfiguration mode is displayed at the location of the page indicators. In some embodiments, the predefined user interface object is optionally displayed at other available positions on the currently displayed page of the multipage home screen user interface once the first reconfiguration mode is activated. Displaying the first predefined user interface object at the location corresponding to the plurality of page indicators reduces the number of inputs needed to perform an operation (e.g., entering into page reconfiguration mode by directing an input toward the plurality of page indicators). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5B2, for example, where the first predefined user interface object for activating the second reconfiguration mode is the highlighted page navigation element 5004 that includes the page indicator icons corresponding to the sequence of pages in the multipage home screen user interface. These features are also illustrated in FIG. 5F3, for example, where the first predefined user interface object for activating the second reconfiguration mode is the highlighted page navigation element 5004 that includes the page indicator icons corresponding to the sequence of pages in the multipage home screen user interface.

In some embodiments, the first predefined user interface object is (7048) displayed on multiple pages (e.g., all pages, some pages, each page, user-arranged pages, etc.) of the plurality of pages that are currently included in the multipage home screen user interface and includes a plurality of page indicators for the plurality of pages with a changed appearance. For example, the individual page indicators are enclosed in a single user interface object and highlighted. The single user interface object is activated by an input directed to the single user interface object (e.g., a tap input on the user interface object, a gaze input directed to the user interface object followed by an in air tap input, etc.). In some embodiments, the page indicators still function as a navigation element in the first reconfiguration mode with the changed appearance, as they do in the non-reconfiguration mode. For example, a tap input on a respective page indicator causes navigation to the corresponding page of the multipage home screen user interface. In some embodiments, a swipe input across multiple page indicators along the first predefined user interface object causes navigation through a sequence of pages corresponding to the page indicators that are passed by the swipe input. Changing the appearance of the plurality of page indicators for the plurality of page provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIG. 5B2, for example, where the first predefined user interface object for activating the second reconfiguration mode is the highlighted page navigation element 5004 that includes the page indicator icons corresponding to the sequence of pages in the multipage home screen user interface. These features are also illustrated in FIG. 5F3, for example, where the first predefined user interface object for activating the second reconfiguration mode is the highlighted page navigation element 5004 that includes the page indicator icons corresponding to the sequence of pages in the multipage home screen user interface.

In some embodiments, in response to detecting the first input that meets the first criteria (e.g., a touch-hold input on an application icon, a touch-hold and drag input on an application icon, a press input on an application icon, a predefined reconfiguration gesture, a touch-hold input on an unoccupied area on the home screen, etc.) (7050): the computer system displays a second predefined user interface object (e.g., an "add" button, a link to an object editing user interface, etc.) on the first page of the multipage home screen user interface in the first reconfiguration mode, wherein activation of the second predefined user interface object in accordance with preset criteria (e.g., criteria for detecting a tap input, a press input, etc.), causes display of an object-editing user interface for selecting and configuring user interface objects that include application content for inclusion into one or more pages of the multipage home screen user interface. In some embodiments, the user interface object that include application content are also referred to as mini application objects or widgets in this specification. More features and descriptions of the user interface object that includes application content are provided with respect to FIGS. 5C1-5C73 and 5D1-5D12 and accompanying descriptions. In some embodiments, the second predefined user interface object is displayed irrespective of which user-arranged page of the multipage home screen user interface is currently displayed when the first reconfiguration mode is activated. Displaying the second predefined user interface object, wherein the activation of the second predefined user interface object causes the display of the object-editing user interface for selecting and configuring user interface objects that include application content, reduces the number of inputs needed to perform an operation (e.g., editing application content for inclusion into the one or more pages of the multipage home screen user interface). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5B2 and FIGS. 5C1-5C2, for example, wherein the add widget button 5094 is displayed on the user-arranged page in the first configuration mode, and activation of the add widget button 5094 (e.g., by a tap input by the contact 5568 in FIG. 5C1) causes display of the widget selection and configuration user interface 5304 for selecting and configuring widgets for inclusion into one or more pages of the home screen user interface.

In some embodiments, while concurrently displaying, in the first user interface (e.g., the page editing user interface), the representations of the plurality of pages of the multipage home screen user interfaces, the computer system detects (7052) a tenth input that meets tenth criteria (e.g., an upward swipe gesture that starts from the bottom portion of the touch-screen, a tap input on a “done” button, a tap on an empty area of the page editing user interface, etc.). In response to detecting the tenth input that meets the tenth criteria: the computer system terminates the second reconfiguration mode, including ceasing to display the first user interface; and the computer system redisplays a respective page of the multipage home screen user interface (e.g., the respective page is a restored hidden page, the page from which the second reconfiguration mode was started, the beginning page of the multipage home screen user interface, a page corresponding to a currently selected representation in the first user interface, the system-arranged page, etc.). Terminating the second reconfiguration mode and redisplaying the respective page of the multipage home screen user interface, in response to detecting the tenth input that meets the tenth criteria, reduces the number of inputs needed to perform an operation (e.g., leaving the second reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5B9-5B10, for example, where a tap input by the contact 5555 on an unoccupied area of the page editing user interface 5062 or an upward edge swipe input by the contact 5554 causes the computer system to exit the second reconfiguration mode, and redisplay a page (e.g., user-arranged page 5050') of the home screen user interface in the first reconfiguration mode.

In some embodiments, redisplaying the respective page of the multipage home screen user interface includes (7054) redisplaying the respective page of the multipage home screen user interface in the first reconfiguration mode. In some embodiments, the redisplaying includes displaying the respective page in a normal mode (e.g., application icons are functional with positions that are not adjustable in response to user inputs), rather than the first reconfiguration mode. Terminating the second reconfiguration mode and redisplaying the respective page of the multipage home screen user interface in the first reconfiguration mode, in response to detecting the tenth input that meets the tenth criteria, reduces the number of inputs needed to perform an operation (e.g., leaving the second reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5B9-5B10, for example, where a tap input by the contact 5555 on an unoccupied area of the page editing user interface 5062 or an upward edge swipe input by the contact 5554 causes the computer system to exit the second reconfiguration mode, and redisplay a page (e.g., user-arranged page 5050') of the home screen user interface in the first reconfiguration mode.

In some embodiments, while the respective page of the multipage home screen user interface is displayed in the first reconfiguration mode, the computer system detects (7056) an eleventh input that meets the tenth criteria (e.g. an upward swipe gesture that starts from the bottom portion of the touch-screen, a tap input on a “done” button, a tap on an empty area of the page editing user interface, etc.). In response to detecting the eleventh input that meets the tenth criteria, the computer system terminates the first reconfiguration mode, and redisplays the respective page of the multipage home screen user interface (e.g., in a normal mode of operation). Terminating the first reconfiguration mode and redisplaying the respective page of the multipage home screen user interface, in response to detecting the eleventh input that meets the eleventh criteria, reduces the number of inputs needed to perform an operation (e.g., leaving the first reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5B13-5B18, for example, after the computer system exits the second reconfiguration mode, and redisplay a page (e.g., user-arranged page 5050') of the home screen user interface in the first reconfiguration mode (FIGS. 5B13-5B14), and after optionally navigating to another page in the first reconfiguration mode (FIGS. 5B15-5B16), the computer system exits the first reconfiguration mode, and displays the current page of the home screen user interface in the normal mode in response to a tap input by the contact 5569 on an unoccupied area of the currently displayed page 5064' or an upward edge swipe input by the contact 5566. If no navigation to another page in the first reconfiguration mode had occurred, the computer system would display the page 5050' in the normal mode in response to the same type(s) of user input.

It should be understood that the particular order in which the operations in FIGS. 7A-7H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 8000, 9000, 10000, 11000, 12000, 13000, and 14000) are also applicable in an analogous manner to method 7000 described above with respect to FIGS. 7A-7H. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and/or configuration user interfaces, directional conditions, control panels, controls, position thresholds, directional conditions, navigation criteria, movement parameters, thresholds, determinations, focus selectors, and/or animations described above with reference to method 7000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and/or configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 8000, 9000, 10000, 11000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7H are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8M are flow diagrams illustrating a method 8000 of inserting a user interface object containing application content (e.g., mini application objects, widgets, etc.) in a page of a home screen user interface, in accordance with some embodiments.

Method 8000 relates to accommodating displaced application icons and/or widgets that do not fit within the current page of a multipage home screen user interface when inserting a new widget into the page. As described herein, different sets of application icons and optionally widgets are moved to the same preset respective when a new widget is dragged around to different placement locations on the current page. In some embodiments, the respective location is a new folder that is created on the current page. The user can later inspect the folder and be prompted about the actions that should be taken with respect to the displayed application icons. In some embodiments, the respective location is a newly created page in the multipage home screen user interface. In either case, it is not necessarily the case that the application icons and widgets located at the bottom of the page are always displaced and moved onto a next existing page, but rather the user provided with some control over which set of application icons and/or widgets should be displaced and moved to the folder or new page. Providing a way to consistently accommodate displaced application icons and/or widgets when inserting a new widget on a page of the multipage home screen user interface and allowing the user control over which set of application icons and widgets are moved to a predictable preset respective enhances the operability of the device (e.g., by reducing user mistakes when operating the device) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

The method 8000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component. In the method 8000, the computer system displays (8002) a first user interface (e.g., a respective page of a multipage home screen user interface, or other user interfaces on which application icons are displayed with regular layout configurations (e.g., arranged in rows and columns)), including displaying a plurality of application icons in accordance with a first layout in the first user interface. While displaying the first user interface including the plurality of application icons in accordance with the first layout, the computer system detects (8004) a first input (e.g., a drag input (e.g., a touch hold followed by movement by a contact, a selection input followed a movement input, etc.) that drags a selected user interface object that contains application content across the first user interface to identify a placement location for the selected user interface object, where the selected user interface will be inserted at the placement location upon termination of the drag input (e.g., upon dropping the user interface object)) corresponding to a request to insert a first user interface object that includes application content (e.g., an application widget, mini application object, or application preview that is, in some embodiments larger than an application icon or larger than a predetermined number of application icons such as two, four, or eight application icons and, optionally, includes more information about a state of the corresponding application that is contained in an application icon) into the first user interface (e.g., the widget or mini application object occupies a larger display area than an application icon in the first user interface (e.g., twice or three times the height, and/or twice or three times the width, etc.)). In response to detecting the first input corresponding to the request to insert the first user interface object that includes application content into the first user interface (e.g., in response to the drag input moving the first user interface object across the first user interface, and optionally dropping the first user interface object into a placement location upon termination of the drag input (e.g., liftoff of the contact, cessation of movement of the contact for more than a threshold amount of time (e.g., a time threshold greater than the hover time threshold), etc.)) (8006): in accordance with a determination that the first input is directed to a first location (e.g., the drag input is maintained over the first location for at least a threshold amount of time without being terminated, or the drag input terminates while the first user interface object is over the first location, etc.) corresponding to a first set of application icons (e.g., two or more application icons displayed at the first placement location that can accommodate the user interface object that includes application content) on the first user interface (8008): the computer system moves (8010) the first set of application icons from the first location to a respective location where the first set of application icons cannot be directly activated from the first user interface once they have been moved to the respective location (e.g., into a newly created folder or newly created page of a multi-page home screen user interface or into a preexisting folder or a preexisting page of the multi-page home screen user interface that was created (e.g., in the same reconfiguration session, or another reconfiguration session) for holding other displaced application icons) to create space for the first user interface object that includes application content at the first location. In some embodiments, one or more user interface objects that include application content that were displayed among the application icons on the first user interface are also moved to the respective location (e.g., newly created folder or page). In some embodiments, the respective location is accessible from the first user interface via a single input (e.g., a swipe on the first user interface causes the device to navigate to a page of the multi-page home screen where the application icons and/or user interface objects that include application content that were removed from the first user interface or a tap on a folder causes the device to navigate to a folder view that includes application icons and/or user interface objects that were removed from the first user interface). In response to detecting the first input corresponding to the request to insert the first user interface object that includes application content into the first user interface (e.g., in response to the drag input moving the first user interface object across the first user interface, and optionally dropping the first user interface object into a placement location upon termination of the drag input (e.g., liftoff of the contact, cessation of the movement of the contact for more than a threshold amount of time, etc.)) (8006): in accordance with a determination that the first input is directed to a first location (e.g., the drag input is maintained over the first location for at least a threshold amount of time without being terminated, or the drag input terminates while the first user interface object is over the first location, etc.) corresponding to a first set of application icons (e.g., two or more application icons displayed at the first placement location that can accommodate the user interface object that includes application content) on the first user interface (8008): the computer system displays (8012) the first user interface object that includes application content at the first location (e.g., allowing the user to see the first user interface object at the first location before termination of the first input). Moving the first set of application icons from the first location to a respective location where the first set of application icons and displaying the first use interface object, in accordance with a determination that the first input is directed to the first location corresponding to the first set of application icons, performs an operation when a set of conditions has been met without requiring further user input. Performing an operation (e.g., reorganizing the set of application icons) when a set of conditions has been met (e.g., the first input is directed to the first location) without requiring further user input controls enhances the operability of the device, which, additionally, reduces power usage and improves battery life of the device by enabling the user to use the device more quickly and efficiently. These features are illustrated in FIGS. 5C1-5C13, where displaced application icons (e.g., application icons 5008*ae*-5008*a*1) from the insertion location of the widget 5326 are moved onto a new page 5324' where the displaced application icons cannot be directly activated from the first user interface (e.g., page 5302' in FIG. 5C12) once they have been moved to the new page 5324', for example. These features are also illustrated in FIGS. 5C33-5C44, for example, where displaced application icons from insertion locations (e.g., application icons 5008*ai* and 5008*aj*, or application icons 5008*ao* and 5008*ap* in home screen 5302' in the first reconfiguration mode) of the widget 5310*h* are moved to a new folder (e.g., folder 5390*a*) on the same page, where the displaced application icons cannot be directly activated from the first user interface (e.g., page 5302' in FIGS. 5C39 and 5C42) once they have been moved to the folder 5390*a*, for example.

In some embodiments, in response to detecting the first input corresponding to the request to insert the first user interface object that includes application content into the first user interface (8014): in accordance with a determination that the first input is directed to a second location (e.g., the drag input is maintained over the second location for at least a threshold amount of time without being terminated, or the drag input terminates while the first user interface object is over the second location, etc.) corresponding to a second set of application icons (e.g., two or more application icons displayed at the second placement location that can accommodate the user interface object that includes application content) on the first user interface, the second location being different from the first location and the second set of application icons being different from the first set of application icons: the computer system moves the second set of application icons from the second location to the respective location where the second set of application icons cannot be directly activated from the first user interface once they have been moved to the respective location (e.g., into the newly created folder or newly created page of the multipage home screen user interface or into a preexisting folder or a preexisting page of the multipage home screen user interface that was created (e.g., in the same reconfiguration session, or another reconfiguration session) for holding other displayed application icons) to create space for the first user interface object that includes application content at the second location, and the computer system displays the first user interface object that includes application content at the second location (e.g., allowing the user to see the first user interface object at the second location before termination of the first input). Displaying the first user interface object that includes the application content at the second location and moving the second set of application icons from the second location to the respective location, in accordance with the determination that the first input is directed to the second location, performs an operation (e.g., displaying the first user interface object at the second location before the termination of the first input) when a set of conditions has been met (e.g., the first input is directed to the second location and the input is not terminated) without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the first input corresponding to the request to insert the first user interface object that includes application content into the first user interface includes (8016) an input that drags the first user interface object across the first user interface, and the first user interface object is inserted into the first user interface upon termination of the first input. For example, as the first user interface object that includes application content is dragged across different portion of the first user interface, different sets of application icons are displaced to make room for the first user interface object, and different sets of displayed application icons (and/or other widgets) are moved to the same respective location, such as a folder displayed in the lower right corner of the first user interface or a new page of the multi-page home screen. Respective sets of application icons (e.g., some, all, each of the sets of application icons that were placed into the respective location, etc.) are restored to their respective original locations, if the first user interface object is not dropped at their respective original locations. Only the set of application icons that are located at the final drop off location of the first user interface objects remain at the respective (e.g., in the folder or new page of the multipage home screen user interface) at the end of the drag and drop input (e.g., in addition to zero or more other icons that were placed at the respective (e.g., in the folder or new page of the multipage home screen user interface during insertion of other user interface objects containing application content into the first user interface). In some embodiments, the application icons and any existing user interface objects containing application content on the first user interface flow rightward and downward to make room for the first user interface object, if there is still room to accommodate (e.g., individually and/or on the preset layout grid of the page, etc.) all or a preset set of the application icons (and any existing user interface objects that contain application content) and the first user interface object without moving any application icon to the respective (e.g., into the folder on the first user interface or a new page of the multipage home screen user interface). In some embodiments, the first user interface object can only be dropped into certain preset placement locations on the first user interface (e.g., placement locations that start at the first column and/or that end at the last column of the layout, etc.), and only the application icons occupying a portion of the same placement location are displaced together as a set to the respective (e.g., into the folder on the first user interface or onto the new page of the multipage home screen user interface). Inserting the first user interface object into the first user interface, in response to the termination of the first input, performs an operation when a set of conditions has been met (e.g., a drop gesture by the first input) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C6-5C12, for example, where the widget 5326 is inserted into the page 5302' (FIG. 5C12) after the widget 5326 is dragged away from the widget selection and configuration user interface 5304 (FIGS. 5C6-5C7) and dragged across the page 5302' by the contact 5578 (FIGS. 5C7-5C11) and in response to detecting liftoff of the contact 5578 (FIG. 5C11-5C12). These features are also illustrated in FIGS. 5C33-5C44, for example, where the widget 5310*h* is inserted into the page 5302' (FIG. 5C42) after the widget 5310*h* is dragged away from the widget selection and configuration user interface 5304 (FIGS. 5C35-5C36) and dragged across the page 5302' by the contact 5578 (FIGS. 5C36-5C41) and in response to detecting liftoff of the contact 5578 (FIG. 5C41-5C42).

In some embodiments, after the termination of the first input is detected, while the first user interface object that includes application content is displayed at the first location after the first set of application icons have been moved from the first location to the respective location (e.g., into the folder or the new page of the multipage home screen user interface), the computer system detects (8018) a second input that drags the first user interface object from the first location to the second location and drops the first user interface object at the second location (e.g., at this time, there is enough room on the first user interface object to accommodate all or a preset set of the application icons that are currently on the first user interface, optionally the new folder (if the new folder was created on the first user interface to accommodate the displaced application icons), and the first user interface object that contains application content). In response to detecting the second input that drags the first user interface object from the first location to the second location and drops the first user interface object at the second location: the computer system shifts a third set of application icons, including the second set of application icons (and optionally one or more other application icons not in the second set of application icons (e.g., one or more application icons adjacent to the second set of application icons)), on the first user interface such that the first location is occupied by one or more of the third set of application icons, the second set of application icons remain displayed on the first user interface, and the second location is vacated by the second set of application icons; and the computer system displays the first user interface object at the second location. For example, in some embodiments, once the first user interface object that includes application content is already inserted into the first user interface, it does not cause additional application icons to be placed at the respective location (e.g., placed into the folder or onto the new page) when the first user interface object is dragged around the first user interface and dropped into new locations on the first user interface. Displaying the first user interface object at the second location, after shifting the third set of application icons, in response to the second input, performs an operation (e.g., repositioning the application icons after the first user interface object has been replaced) when a set of conditions has been met (e.g., the first user interface object has been replaced) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C16-5C17, for example, where if the widget 5326 is dropped into a placement location immediately below the widget 5322, the application icons 5008*aa*-5008*ad* are reflowed to below the widget 5326, and no application icons are pushed to the next page. These features are also illustrated in FIGS. 5C43-5C44, for example, where after the widget 5310*h* has been inserted into the placement location above the new folder 5390*a* and the widget 5310*h* is dragged again by a new contact 5636 to a new placement location on the page 5302' (e.g., the placement location on the left side of the second row), the application icons 5008*ae*-5008*af*, in some embodiments, are reflowed to the right side of the second row, while the rest of the application icons 5008*ag*-5008*an* reflow sequentially to fill the space vacated by the widget 5310*h* (e.g., while the folder continues to hold the previously overflowed application icons 5008*ao* and 5008*ap*, and no other application icons on the page are reflowed to the folder 5390*a*).

In some embodiments, the first set of application icons are (8020) moved into a folder (e.g., a newly created folder on the first user interface). In the method 8000, in response to detecting the first input and prior to detecting a termination of the first input: the computer system displays a first animated sequence illustrating movement of the first set of application icons into the folder when the first user interface object containing application content is dragged over the first location (e.g., after the first user interface object hovers over the first location for at least a threshold amount of time with less than a threshold amount of movement). The computer system displays a second animated sequence illustrating movement of the second set of application icons into the folder (and optionally, the first set of application icons moving out of the folder and back to the first location) when the first user interface object containing application content is dragged over the second location (e.g., after the first user interface object hovers over the second location for at least a threshold amount of time with less than a threshold amount of movement). Displaying the second animated sequence illustrating the movement of the second set of the application icons into the folder, when the first user interface object containing the application content is dragged over the second location, and in response to detecting the first input, provides improved visual feedback to the user (e.g., animation of the application icons). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5C37-5C42, where the computer system displays an animation showing the displaced application icons 5008*ai* and 5008*aj* flying out of the placement location near the hover location of the widget 5310*h*, creation of a new folder 5390, and the displaced application icons 5008*ai* and 5008*aj* flying into the newly created folder 5390.

In some embodiments, the respective location (e.g., the folder on the first user interface, or a page of the multipage home screen user interface) is (8022) newly created in response to the first input. In some embodiments, the computer system displays an animated sequence showing the creation of a new folder for the displayed application icons in response to the first input. Displaying the first user interface object at the second location, in response to the second input, after the first set of application icons have been moved from the first location to a newly added location, when the performs an operation (e.g., repositioning the application icons after the first user interface object has been replaced) when a set of conditions has been met (e.g., the first user interface object has been replaced) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C2-5C4, for example, where the application icons 5008*am*-5008*ao* that are displaced by the insertion of the widget 5322 is placed onto a new page 5324' that is created in response to the tap input by the contact 5570 on the "add" button 5318 in the widget selection and configuration user interface 5304. These features are illustrated in FIGS. 5C38-5C39, for example, where the application icons 5008*ai*-5008*aj* that are displayed by the insertion or hovering of widget 5310*h* are placed into a folder 5390*a* that is newly created in response to the drag (and optionally hover) input by the contact 5626.

In some embodiments, the respective location (e.g., the folder on the first user interface, or the page of the multipage home screen user interface) is (8024) an existing location (e.g., an existing folder on the first user interface or an existing page that has been created for displayed application icons, etc.). For example, in some embodiments, once a folder or page of the multipage home screen user interface is created to accommodate displaced application icons (or optionally, other user interface objects containing application content) due to insertion of a respective user interface object containing application content, it persists on the page or in the multipage home screen user interface, and is used to accommodate additional displaced application icons when additional user interface objects containing application content are inserted into the fully occupied page. Displaying the first user interface object at the second location, in response to the second input, after the first set of application icons have been moved from the first location to an existing location, when the performs an operation (e.g., repositioning the application icons after the first user interface object has been replaced) when a set of conditions has been met (e.g., the first user interface object has been replaced) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C6-5C13, for example, where the application icons 5008*am*-5008*ai* that are displaced by the insertion of the widget 5326 is placed onto an existing page 5324' that was already created in response to the tap input by the contact 5570 on the "add" button 5318 in the widget selection and configuration user interface 5304. These features are also illustrated in FIGS. 5C33-5C51, for example, where the application icons 5008*ag*-5008*af* that are displayed by the insertion or hovering of widget 5310*g* are placed into the folder 5390*a* (FIG. 5C51) that was already created in response to the drag (and optionally hover) input by the contact 5626 (FIG. 5C38-5C39).

In some embodiments, the first set of application icons are (8026) moved into a folder (e.g., a newly created folder on the first user interface). In the method 8000, while displaying the first user interface including the folder that includes the first set of application icons after detecting the termination of the first input, the computer system detects a third input that is directed to the folder (e.g., detecting a tap input by a contact at a location corresponding to the folder, detecting a gaze input directed to the folder in conjunction with an in-air tap input, etc.). In response to detecting the third input that is directed to the folder: the computer system displays at least a portion of content of the folder (e.g., including displaying the first set of application icons in a folder window corresponding to the folder); and the computer system displays a prompt including one or more selectable options for performing respective operations with respect to the content of the folder (e.g., options for moving the application icons and user interface objects containing application content into a new page of the multipage home screen, renaming the folder, and/or deleting the application icons and user interface objects containing application content, etc.). Displaying the prompt for performing respective operations with respect to the content of the folder, in response to detecting the third input that is directed to the folder, provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are also illustrated in FIG. 5C56 following FIG. 5C52, for example, where a tap input by the contact 5650 on the folder 5390*a* (FIG. 5C52) cause the folder to be opened (FIG. 5C56) with options to rename the folder, to delete some or all application icons in the folder (option 5398), and to create a new page for the application icons in the folder (option 5400).

In some embodiments, the one or more selectable options include (8028) a first option to delete the first set of application icons. Including the first option to delete the first set of application icons in the one or more selectable options reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are also illustrated in FIG. 5C56 following FIG. 5C52, for example, where a tap input by the contact 5650 on the folder 5390*a* (FIG. 5C52) cause the folder to be opened (FIG. 5C56) with options to rename the folder, to delete some or all application icons in the folder (option 5398), and to create a new page for the application icons in the folder (option 5400).

In some embodiments, the one or more selectable options include (8030) a second option to create a new page that includes the first set of application icons, wherein the new page is to be included with the first user interface as separate pages in a multipage home screen user interface. Including the second to create a new page that includes the first set of application icons in the one or more selectable options reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are also illustrated in FIG. 5C56 following FIG. 5C52, for example, where a tap input by the contact 5650 on the folder 5390*a* (FIG. 5C52) cause the folder to be opened (FIG. 5C56) with options to rename the folder, to delete some or all application icons in the folder (option 5398), and to create a new page for the application icons in the folder (option 5400).

In some embodiments, the one or more selectable options include (8032) a third option to rename the folder. Including the third option to rename the folder in the one or more selectable options reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are also illustrated in FIG. 5C56 following FIG. 5C52, for example, where a tap input by the contact 5650 on the folder 5390*a* (FIG. 5C52) cause the folder to be opened (FIG. 5C56) with options to rename the folder, to delete some or all application icons in the folder (option 5398), and to create a new page for the application icons in the folder (option 5400).

In some embodiments, while displaying the first user interface including the first user interface object (and optionally the folder containing the first set of application icons displaced by the first user interface object) (e.g., during the same user interface reconfiguration session), the computer system detects (8034) a fourth input (e.g., a second drag input that drags the second user interface object containing application content across the first user interface) corresponding to a request to insert a second user interface object that includes application content (e.g., a second widget or mini application object) into the first user interface. In response to detecting the fourth input corresponding to the request to insert the second user interface object that includes application content into the first user interface: in accordance with a determination that the input is directed to a fourth location corresponding to a fourth set of application icons on the first user interface: the computer system moves the fourth set of application icons from the fourth location to the respective location where the fourth set of application icons cannot be directly activated from the first user interface once they have been moved to the respective location; and the computer system displays the second user interface object that includes application content at the fourth location. Displaying the second user interface object that includes application content at the fourth location and moving the fourth set of application icons from the fourth location to the respective location, in accordance with the determination that the input is directed to the fourth location corresponding to the fourth set of application icons, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C1-5C13, for example, where the application icons 5008*am*-5008*ai* that are displaced by the insertion of the widget 5326 is placed onto an existing page 5324' that was already created in response to the tap input by the contact 5570 on the "add" button 5318 in the widget selection and configuration user interface 5304 which cause insertion of the widget 5322 into the page 5302' and put displaced application icons 5008*am*-5008*ao* in the page 5324'. These features are also illustrated in FIGS. 5C33-5C51, for example. These features are also illustrated in FIGS. 5C33-5C51, for example, where the application icons 5008*ag*-5008*af* that are displayed by the insertion or hovering of widget 5310*g* are placed into the folder 5390*a* (FIG. 5C51) that also included previously displaced application icons 5008*ao*-5008*ap* by the insertion of the widget 5310*h* into the page 5302' (FIG. 5C42).

In some embodiments, prior to detecting the first input corresponding to the request to insert the first user interface object that includes application content into the first user interface (8036): the computer system displays the first user interface in a first reconfiguration mode (e.g., an icon reconfiguration mode), wherein positions of application icons in the first user interface are adjustable in response to user inputs during the first reconfiguration mode, and wherein the first user interface in the first reconfiguration mode includes an affordance (e.g., an "add" button, a link to a widget selection and configuration user interface, etc.) that, when activated, causes display of an object-editing user interface (e.g., a widget selection and configuration interface) that includes a plurality of user interface objects respectively containing application content corresponding to different applications installed on the computer system. Causing the display of the object-editing user interface, in response to the activation of the affordance of the first user interface in the first reconfiguration mode, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are also illustrated in FIGS. 5C57-5C58 following FIG. 5C52, for example, where a tap input by the contact 5644 on the add widget button 5094 (FIG. 5C52) shown in the page 5302' in the first reconfiguration mode causes display of the widget selection and configuration user interface 5304 (FIG. 5C57), and the widget selection and configuration user interface 5304 includes a listing of applications that have corresponding widgets (e.g., a calendar application with upcoming event widget, up next widget, schedule widget, etc.).

In some embodiments, the object-editing user interface includes (8038) a set of one or more preconfigured user interface objects containing application content corresponding to different applications of at least a subset of all applications installed on the computer system. In some embodiments, the object-editing user interface has a first portion that displays the listing of applications and a second portion that displays preconfigured widgets for a number of frequent used applications or preinstalled applications. Including the set of one or more preconfigured user interface objects containing application content corresponding to different applications of at least the subset of all application installed on the computer system reduces the number of inputs needed to perform an operation (e.g., viewing different applications). Reducing the number of inputs needed to perform an operation enhances the operability of the device, and makes the user-device interface more efficient, which, additionally, reduces power usage and improves battery life of the device by enabling the user to use the device more quickly and efficiently. These features are also illustrated in FIG. 5C57, for example, wherein the widget selection and configuration user interface 5304 includes one or more preconfigured widgets (e.g., widget 5310*f* corresponding to application "App 1", widget 5310*k* corresponding to application "App 3", etc.).

In some embodiments, the object-editing user interface includes (8040) respective representations of a plurality of applications installed on the computer system, and activation of the representation of a respective application in the object-editing user interface in accordance with preset activation criteria (e.g., a tap input on the respective representation of the respective application) causes display of a plurality of configuration options (e.g., size, selected application functions, update trigger, update frequency, etc.) associated with a respective user interface object that includes application content of the respective application (e.g., weather application, calendar application, messaging application, etc.). Causing the display of the plurality of configuration options associated with the respective user interface object, in response to activation of the representation of the respective application in the object-editing user interface, reduces the number of inputs needed to perform an operation (e.g., viewing different configuration options for a user interface object). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5C57-5C58, for example, where the widget selection and configuration user interface 5304 includes a listing of applications with widgets, and a tap input by the contact 5654 on the representation 5316*a* of the calendar application causes the computer system to display an application-specific widget selection and/or configuration user interface 5304' for the calendar application which includes configuration options for one or more widgets corresponding to the calendar application.

In some embodiments, the plurality of configuration options include (8042) a set of one or more object sizes for the respective user interface object that includes application content of the respective application. In some embodiments, a size selector is presented when a respective application is selected from a listing of applications that have associated widgets, and the size selector lists available sizes for widgets of the selected application. The available size is optionally given in units based on application icon size (e.g., how many rows or columns of application icons can be placed into the placement location of the widget (e.g., 2×4, 1×3, 1×4, 2×2, 2×4, 4×4, etc.)). Causing the display of the plurality of configuration options, including different object size options, associated with the respective user interface object, in response to activation of the representation of the respective application in the object-editing user interface, reduces the number of inputs needed to perform an operation (e.g., viewing different configuration options for an user interface object). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5C57-5C58, for example, where a size selector with selectable options corresponding to different sizes of the calendar widget (e.g., up next widget 53101) is included in the application-specific widget selection and/or configuration user interface 5304' for the calendar application.

In some embodiments, the computer system displays (8044) a preview of a currently selected user interface object containing application content of the respective application in accordance with user-selected values for the plurality of configuration options. In some embodiments, a plurality of previews of user interface objects containing application content are displayed at different sizes. In some embodiments, when a size option is selected, a first preview of the user interface object at a first size is replaced with a second preview of the user interface objet at a second size that is different from the first size, where the second size corresponds to the selected size option. Displaying the preview of the currently-selected user interface object, in accordance with the user-selected values for the plurality of configuration options, provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5C57-5C58, for example, where a preview of the calendar widget (e.g., up next widget 53101, today widget 5310*m*, etc.) with the currently selected configurations (e.g., size, type, etc.) is displayed in the application-specific widget configuration user interface 5304' for the calendar application.

In some embodiments, the object-editing user interface includes (8046) a plurality of recommended user interface objects respectively containing application content corresponding to different applications of at least a subset of applications installed on the computer system. For example, in some embodiments, the object-editing user interface includes at the top a small set of recommended widgets that are selected based on the user's usage pattern for applications by the user and/or usage patterns for applications aggregated across multiple users, optionally followed by a listing of applications that leads a configuration user interface for configuring widgets for that application, and optionally followed by a listing of preconfigured user interface objects for different applications. Including the plurality of recommended user interface objects corresponding to different applications in the object-editing user interface reduces the number of inputs needed to perform an operation (e.g., viewing different application content options). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5C33-5C34, for example, where the widget selection and configuration user interface 5304 (FIG. 5C34) that is displayed in response to the tap input on the add widget button 5094 (FIG. 5C33) includes a plurality of recommended widgets (e.g., widgets 5310*f*, 5310*h*, 5310*i*, 5310*j*, etc.) that are preconfigured and automatically selected by the computer system.

In some embodiments, while the object-editing user interface is displayed, the computer system detects (8048) a fifth input selecting the first user interface object containing application content for inserting into the first user interface. In response to detecting the fifth input selecting the user interface object containing application content for inserting into the first user interface: the computer system ceases to display the object-editing user interface; and the computer system concurrently displays the first user interface object and the first user interface in the first reconfiguration mode. For example, in some embodiments, after the object-editing user interface is dismissed by the selection of the first user interface object, the first user interface object containing application content is displayed hovering over a portion of the first user interface, waiting to be picked up by a drag input provided by the user to move the first user interface object to a desired placement location on the first user interface or, alternatively, the first user interface object is placed at a default location such as an upper right corner or an upper left corner of the first user interface and can be repositioned with a drag input directed to the first user interface object. In some embodiments, the fifth input includes a selection input followed by a drag input that moves the user interface object containing application content from its location on the object-editing user interface, and in response to the drag input that meets preset criteria (e.g., moved to the side of the display, or by more than a threshold amount from the original location of the user interface object containing application content), the computer system ceases to display the object-editing user interface and displays the first user interface underneath the first user interface object before termination of the drag input (e.g., liftoff of the contact, cessation of the movement of the contact for more than a threshold amount of time, etc.). In some embodiments, the drag input positions the first user interface object and drops the first user interface object onto the first user interface at a desired location. In some embodiments, if the drag input does not meet the preset criteria before termination, the dragged user interface object is dropped back to its original location in the object-editing user interface. Concurrently displaying the first user interface object and the first user interface in the first reconfiguration mode and ceasing to display the object-editing user interface, in response to detecting the fifth input selecting the user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C2-5C3, for example, where a tap input by the contact 5570 detected on the add button 5318 in the widget selection and configuration user interface 5304 causes dismissal of the widget selection and configuration user interface 5304 and concurrent display of a currently selected widget 5310*a* in the widget selection and configuration user interface 5304 to be concurrently displayed with a page of the home screen user interface (e.g., inserted into a default location in the page 5302'). These features are illustrated in FIGS. 5C6-5C7, for example, where a touch-hold input by the contact 5578 selects the widget 5310*d* in the widget selection and configuration user interface 5304, and movement of the contact 5578 after the selection of the widget 5310*d* causes dismissal of the widget selection and configuration user interface 5304 and concurrent display of the selected widget 5310*d* with a page of the home screen user interface (e.g., the page 5302').

In some embodiments, in accordance with a determination that the first user interface object including application content corresponds to a first application and has a first size, the first set of application icons include (8050) a first number of application icons. In accordance with a determination that the first user interface object including application content corresponds to a second application (e.g., different from the first application) and has a second size different from the first size, the first set of application icons include a second number of application icons that is different from the first number of application icons, wherein the first number of application icons and the second number of application icons are respectively based on the first size and the second size of the first user interface object containing application content. Including different sets of application icons in the first set of application icons, depending on the size of the respective user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C34-5C51, for example, where when a widget 5310*h* of 1×2 size is dragged from the widget selection and configuration user interface 5304 and dropped into the page 5302' of the home screen user interface, two application icons are moved into the folder 5390*a* (FIGS. 5C34-5C39); and when a widget 5310*g* of 2×2 size is dragged from the widget selection and configuration user interface 5304 and dropped into the page 5302', four application icons are moved into the folder 5390*a* (FIGS. 5C47-4C51).

In some embodiments, while displaying the first user interface in the first reconfiguration mode after the first user interface object containing application content has been inserted at the first location following the termination of the first input, the computer system detects (8052) a sixth input directed to the first user interface object containing application content (e.g., detecting a tap input directed to the first user interface object, while the first user interface is in the first reconfiguration mode). In response to detecting the sixth input directed to the first user interface object containing application content: in accordance with a determination that the sixth input meets preset criteria (e.g., criteria for detecting a tap input, e.g., the input is a substantially stationary touch input with less than a threshold duration at a location of the first user interface object containing application content), the computer system displays a first object-specific object-editing user interface corresponding to the first user interface object containing application content, wherein the first object-specific object-editing user interface displays a plurality of options for configuring the first user interface object containing application content. Displaying a first object-specific object-editing user interface corresponding to the first user interface object containing application content, in accordance with a determination that the sixth input meets preset criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5C55 following FIG. 5C52, for example, where after the widget 5310*g* is inserted into the page 5302' in the first reconfiguration mode, a tap input by the contact 5648 on the widget 5310*g* (FIG. 5C52) causes display of the widget configuration platter 5352 which includes configuration options 5394*a*-5394*d* for configuring the widget 5310*g*.

In some embodiments, displaying the first object-specific object-editing user interface corresponding to the first user interface object containing application content includes (8054) rotating the first user interface object containing application content to reveal a reverse side of the first user interface object containing application content, and displaying the plurality of options for configuring the first user interface object containing application content on the reverse side of the first user interface object containing application content. Displaying the plurality of options for configuring the first user interface object in response to rotating the first user interface object to reveal the reverse side, reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5C52 followed by FIGS. 5C53-5C55, for example, where after the widget 5310*g* is inserted into the page 5302' in the first reconfiguration mode, a tap input by the contact 5648 on the widget 5310*g* (FIG. 5C52) causes rotation of the widget 5310*g* (FIG. 5C54) to reveal the widget configuration platter 5352 which includes configuration options 5394*a*-5394*d* for configuring the widget 5310*g* (FIG. 5C55).

In some embodiments, displaying the first object-specific object-editing user interface corresponding to the first user interface object containing application content includes (8056) visually deemphasizing (e.g., darkening, blurring, otherwise obfuscating, etc.) regions of the first user interface outside of the first object-specific object-editing user interface (e.g., outside of the reverse side of the first user interface object containing application content relative to the reverse side of the first user interface object containing application content). Visually deemphasizing regions of the first user interface outside the first object-specific object-editing user interface provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIG. 5C55, for example, where when the widget configuration platter 5352 is displayed, the underlying page 5302 is blurred and darkened relative to the widget configuration platter 5352.

In some embodiments, the first user interface includes (8058) multiple user interface objects containing application content that correspond to a first application, including a first user interface object and a second user interface object, where the second user interface object includes different information than the first user interface object. For example, in some embodiments, the first user interface optionally includes a first widget from the weather application and a second widget from the weather application, respective widgets displaying weather forecast of different cities. In another example, the first user interface optionally includes a first widget from the calendar application that displays the next calendar event, and a second widget from the calendar application that displays all or a preset set of events for the day. The specific function or application content provided in a respective widget is optionally configured by the user prior to insertion of the widget into the first user interface. Displaying different information from user interface objects corresponding to the same application provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIG. 5D2, for example, where widgets from the same application (e.g., App 2) are included in the same page 5408.

In some embodiments, the first user interface includes (8060) multiple user interface objects containing application content, the multiple user interface objects respectively containing application content from different applications. Including multiple user interface objects in the first user interface reduces the number of inputs needed to perform an operation (e.g., selecting and adding different user interface objects containing application content). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5C11, where widgets from different applications (e.g., App 17 and App 19) are included in the same page 5302'. These features are illustrated in FIG. 5D2, for example, where widgets from different applications (e.g., App 1 and App 2) are included in the same page 5408.

In some embodiments, the first user interface object contains (8062) first application content from the application corresponding to the first user interface object at a first time, and the first user interface object contains second application content from the application corresponding to the first user interface object that is different from the first application content at a second time different from the first time (e.g., the first user interface object containing application content is updated dynamically over time in the first user interface without requiring proactive user input). For example, in some embodiments, a first widget of the weather application automatically update the weather forecast information for a selected city shown in the first widget whenever the weather forecast is updated in the weather application. A second widget of the calendar application is automatically updated to show the next calendar event when time elapse. The weather widget and the calendar widget are optionally updated independent of each other at different points in time based on the different triggers for updated in their respective applications. Changing the application content, based on whether the time is the first time or the second time, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D1-5D12, for example, where application content included in the widget 5412*c* (e.g., calendar widget) is updated in real time to show the next calendar event (e.g., different calendar events for different current time) as time elapses.

In some embodiments, the first user interface object containing application content includes (8064) a visual indication of the application from which application content contained in the first user interface object is obtained. For example, the widget or mini application object for a particular application includes a thumbnail image of the application icon and the title of the application, in addition to content from the application. Including a visual indication of the application from which application content contained in the first user interface object is obtained in the first user interface object provides improved visual feedback to the user. Providing improved visual feedback enhances the operability of the device and makes the user-device interface more efficient, which, additionally, reduces power usage and improves battery life of the device by enabling the user to use the device more quickly and efficiently. This is illustrated in FIG. 5C60, for example, where a widget 53101 that is added t to a page 5302' includes an indication (e.g., application name, mini application icon, etc.) that indicates that the widget 53101 is a widget of the calendar application.

In some embodiments, the first user interface is (8066) a respective page of a multipage home screen user interface. In the method 8000, while displaying the first user interface, the computer system detects a sequence of one or more page navigation inputs (e.g., swipe inputs) that causes navigation from the first user interface to a second user interface (e.g., a widget user interface that is displayed adjacent to device screen lock user interface (e.g., a lock screen, a wake screen, a coversheet screen, etc.)). In response to detecting the sequence of one or more page navigation inputs, the computer system displays the second user interface, including displaying a plurality of user interface objects containing application content, the plurality of user interface objects containing application content respectively display application content from respective applications (e.g., each user interface object displays application content from a corresponding application, different user interface objects display application content from different applications, etc.). In some embodiments, the second user interface is scrollable in a second direction that is perpendicular to the first direction of page navigation, while the pages of the user-arranged home screen user interface are not scrollable in the second direction. In some embodiments, the second user interface includes user interface objects containing application content that are automatically selected by the computer system and does not include individually configurable (e.g., with user-adjustable positions) application icons. Displaying the second user interface, including displaying a plurality of user interface objects containing application content, in response to detecting the sequence of one or more page navigation inputs, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5A21-5A23, where the computer system navigates from the first page 5064 of the home screen user interface to a widget screen user interface 5053 that includes a plurality of widgets corresponding to different applications in response to a navigation input (e.g., rightward swipe input by the contact 5531 on the page 5064 of the home screen user interface.

In some embodiments, after displaying the first user interface object containing application content at the first location in response to detecting termination of the first input (8068): while the first user interface remains in the first reconfiguration mode, the computer system detects a seventh input removing (e.g., deleting or moving to a different page of the multipage home screen user interface) the first user interface object containing application content from the first user interface. In response to detecting the seventh input removing the first user interface object containing application content from the first user interface, the computer system restores the first set of application icons from the respective location onto the first user interface (e.g., to the first location, or to another location at which the first user interface object containing application content was placed when the seventh input was detected). Restoring the first set of application icons from the respective location onto the first user interface, in response to detecting the seventh input removing the first user interface object containing application content from the first user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. This is illustrated in FIGS. 5C6-5C15, for example, where after the widget 5326 is added to the page 5302' and causing displaced application icons 5008*ae*-5008*a*1 to be placed on the page 5324' (e.g., created to hold overflow application icons) (FIGS. 5C6-5C13), deletion of the widget 5326 (e.g., by the tap input on the deletion affordance 5327 in FIG. 5C14) causes the displaced application icons 5008*ae*-5008*a*1 to be restored from the page 5324' to their original locations on page 5302' (FIG. 5C15).

In some embodiments, the first set of application icons are (8070) redisplayed at the first location following removal (e.g., deletion or move to a different page) of the first user interface object containing application content from the first user interface. In some embodiments, if the first user interface object has been moved around the first user interface after insertion at the first location, when the first user interface object is removed from the first user interface, one or more other application icons that are currently on the first user interface are also moved back to their original locations on the first user interface. Restoring the first set of application icons from the respective location onto the first user interface at the first location, in response to detecting the seventh input removing the first user interface object containing application content from the first user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. This is illustrated in FIGS. 5C6-5C15, for example, where after the widget 5326 is added to the page 5302' and causing displaced application icons 5008*ae*-5008*a*1 to be placed on the page 5324' (e.g., created to hold overflow application icons) (FIGS. 5C6-5C13), deletion of the widget 5326 (e.g., by the tap input on the deletion affordance 5327 in FIG. 5C14) causes the displaced application icons 5008*ae*-5008*a*1 to be restored from the page 5324' to their original locations on page 5302' (FIG. 5C15).

In some embodiments, the respective location is folder that was created to store the first set of application icons when the first set of application icons were (8072) removed from the first location, and the new folder is deleted following removal of the first user interface object containing application content from the first user interface and restoration of the first set of application icons back to the first location (e.g., presuming that the folder was created to accommodate the first set of application icons and containing no other application icons). Restoring the first set of application icons from the respective location onto the first user interface, and deleting the new folder, in response to detecting the seventh input removing the first user interface object containing application content from the first user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the respective location is (8074) a new page of a multipage home screen user interface that was created to store the first set of application icons when the first set of application icons were removed from the first location, and the new page is deleted following removal of the first user interface object containing application content from the first user interface and restoration of the first set of application icons back to the first location (e.g., presuming that the new page was created to accommodate the first set of application icons and containing no other application icons). Restoring the first set of application icons from the respective location onto the first user interface, and deleting the new folder and the new page, in response to detecting the seventh input removing the first user interface object containing application content from the first user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the first set of application icons or the second set of application icons are (8076) moved to the respective location in accordance with a determination that there is insufficient space on the first user interface to accommodate insertion of the first user interface object containing application content. In the method 8000, before termination of the first input, the computer system displays (e.g., in response to the drag input reaching an edge of the first user interface before the first user interface object is dropped, in response to a tap input on a page indicator of the second user interface while the first user interface is being dragged by the first input) a second user interface different from the first user interface, including displaying a second plurality of application icons in accordance with a second layout in the second user interface, wherein there is sufficient space on the second user interface object to accommodate the second plurality of application icons and the first user interface object containing application content. While displaying the second user interface including the second plurality of application icons in accordance with the second layout: in accordance with a determination that the first input is directed to a fifth location corresponding to a fifth set of application icons on the second user interface: the computer system shifts one or more of the second plurality of application icons, including the fifth set of application icons, on the second user interface, to create space for inserting the first user interface object containing application content at the fifth location on the second user interface (e.g., maintaining display of the one or more of the second plurality of application icons on the second user interface, without moving them into any folder on the second user interface).

In some embodiments, none of the second plurality of application icons is moved into a folder or new page as a result of the shifting. In some embodiments, one or more of the second plurality of application icons are moved into a folder or new page as a result of the shifting. Shifting one or more of the second plurality of application icons to create space for inserting the first user interface object, in accordance with the determination that the first input is directed to the fifth location and while displaying the second user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the respective location is (8078) a folder that is located at a predefined location (e.g., bottom right corner, top left corner, etc.) on the first user interface (e.g., as shown in FIG. 5C39, the folder 5390*a* is in the lower right corner of the page 5302', the last placement location for folders on the page 5302'). Moving the first set of application icons from the first location to a respective location where the folder is located and displaying the first use interface object, in accordance with a determination that the first input is directed to the first location corresponding to the first set of application icons, performs an operation when a set of conditions has been met without requiring further user input. Performing an operation (e.g., reorganizing the set of application icons) when a set of conditions has been met (e.g., the first input is directed to the first location) without requiring further user input controls enhances the operability of the device, which, additionally, reduces power usage and improves battery life of the device by enabling the user to use the device more quickly and efficiently.

In some embodiments, while displaying the first user interface including the first user interface object containing application content at the first location and a third user interface object that includes application content at a sixth location different from the first location (e.g., the third user interface object containing application content were added at a different time before or after the first user interface object containing application content was added to the first user interface), the computer system detects (8080) a seventh input that corresponds to a request to drag the third user interface object containing application content from the sixth location to the first location. In response to detecting the seventh input corresponding to the request to move the third user interface object that includes application content to the first location: in accordance with a determination that a size of the third user interface object containing application content is greater than a size of the first user interface object containing application content, the computer system moves the first user interface object away from the first location (e.g., into a folder, onto a new page, or to another location on the first user interface, etc.) to create space for the third user interface object containing application content at the first location; and in accordance with a determination that the size of the third user interface containing application content is equal to (or smaller) the size of the first user interface object containing application content, the computer system forgoes moving the first user interface object away from the first location; and displaying the third user interface object containing application content at the first location (e.g., on top of the first user interface object in a widget stack), wherein the first user interface object and the third user interface object are alternatively displayed at the first location at different times (e.g., automatically switched according to changing context, or according to a schedule, etc.). In some embodiments, to create a widget stack that includes more than one widget, a widget can be dragged from the object-editing user interface onto a page of the multipage screen user interface (e.g., once a preview of the widget is selected and dragged from its original location on the object-editing user interface, the object editing user interface disappears and reveals a page of the multipage home screen user interface, and continued dragging of the preview of the widget to the side of the page causes navigation to an adjacent page of the multipage home screen user interface, etc.), and dropped onto a placement location that is already occupied by another widget or stack of widget to create a stack or add to the stack. In some embodiments, the widget options for a single widget or stack of widget (e.g., displayed on the back of the widget or stack in response to a tap-hold and lift-off of the contact) includes an option to enable a wildcard widget for the placement location, and selection of that option causes a wildcard widget to be added to the placement location to create a stake or add to the existing stack. Moving or forgoing moving the first user interface object away from the first location, depending on whether the size of the third user interface object is greater than a size of the first user interface object, in response to detecting the seventh input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C16-5C19, for example, where the 2×4 widget 5326 is dragged by the contact 5588 to a location over another 2×4 widget 5322 on the page 5302', and dropped onto the 2×4 widget 5322; and the computer system creates a widget stack 5328 at the location of the widget 5322 that includes both the widget 5326 and the widget 5322, and the two widgets can be switched in response to swipe inputs by the contact 5592. In some embodiments, if the size of the widgets 5326 and 5322 did not match, they will not be merged into the same widget stack.

In some embodiments, while displaying the first user interface including the first user interface object containing application content at the first location, the computer system detect (8084) an eighth input that corresponds to a request to drag and drop a fourth user interface object containing application content (on the same page of the multipage home screen user interface as the first user interface object containing application content or on a different page of the multipage home screen user interface) to the first location. In response to detecting the eighth input corresponding to the request to drag and drop the fourth user interface object containing application content to the first location: the computer system displays the fourth user interface object at the first location; and the computer system switches to displaying the first user interface object at the first location at a later time (e.g., automatically switched (e.g., without user input, and according to changing context, or according to a schedule, etc.), or in response to a user's request (e.g., a swipe input, a gaze input, etc.)). Displaying the fourth user interface object at the first location and switching to displaying the first user interface object at the first location at the later time, in response to detecting the eight input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C16-5C19, for example, where the 2×4 widget 5326 is dragged by the contact 5588 to a location over another 2×4 widget 5322 on the page 5302', and dropped onto the 2×4 widget 5322; and the computer system creates a widget stack 5328 at the location of the widget 5322 that includes both the widget 5326 and the widget 5322, and the two widgets can be switched in response to swipe inputs by the contact 5592. In some embodiments, if automatic switching is enabled for the widget stack 5328, the computer system also automatically switches between displaying the widget 5322 and 5328 at the placement location of the widget stack 5328.

In some embodiments, while displaying the first user interface object that includes application content at the first location on the first user interface, the computer system detects (8086) a user input that corresponds to a request to display, on the first user interface, a plurality of selectable options corresponding to the first user interface object (e.g., a user input that meets the criteria for displaying a quick action menu associated with the first user interface object containing application content, and wherein a user input that meets the same criteria that is detected on an application icon causes display of a quick action menu associated with the application icon; the user input is a touch-hold input, a touch-hold input followed by lift-off, a light press input, etc. directed to the first user interface object). In response to detecting the user input that corresponds to the request to display on the first user interface the plurality of selectable options corresponding to the first user interface object containing application content, the computer system displays the plurality of selectable options corresponding to the first user interface object on the first user interface (e.g., concurrently with and next to the first user interface object, with the rest of the first user interface object visually deemphasized relative to the first user interface object and the plurality of selectable options), wherein the plurality of selectable options include one or more selectable controls for changing a size of the first user interface object containing application content from a first size (e.g., a current or preconfigured size) to a second size of one or more available sizes that are different from the first size. For example, in some embodiments, the quick action menu of a widget includes a size selector option among other widget-specific actions (e.g., options for activating a first application function of an application corresponding to the widget, launching the application corresponding to the widget, sharing the widget, etc.), and the size selector option includes one or more selectable controls (e.g., one or more alternative sizes that are different from the currently displayed size of the widget), that when selected, change the current size of the widget to a different size corresponding to the selected control. Displaying the plurality of selectable options corresponding to the first user interface object on the first user interface, in response to detecting the user input that corresponds to the request to display on the first user interface the plurality of selectable options corresponding to the first user interface object containing application content reduces the number of inputs needed to perform an operation (e.g., resizing the first user interface object). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, while displaying the plurality of selectable options corresponding to the first user interface object containing application content, the computer system detects (8088) a user input that selects the second size of the one or more available sizes that are different from the first size using the set of selectable controls. In response to detecting the user input that selects the second size using the set of selectable controls, the computer system changes the size of the first user interface object containing application content from the first size to the second size. Changing the size of the first user interface object containing application content from the first size to the second size, in response to detecting the user input that selects the second size using the set of selectable controls, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in response to detecting the user input that selects the second size using the set of selectable controls, the computer system moves (8090) one or more application icons on the first user interface relative to the first location (and optionally, moving the first user interface object and/or one or more other user interface object containing application content on the first user interface from their original placement locations, as a result of the resizing of the first user interface object containing application content). For example, in some embodiments, when the widget is resized to a larger size (e.g., from a 2×2 size to 2×4 size, from a 2×4 to a 4×4 size, etc.), a block of application icons adjacent to the widget (e.g., a 2×2 block of application icons on the left or right of the 2×2 widget, a 2×4 block of application icons above or below the 2×4 widget) are reflowed as a block to another location to make room for the widget on the user interface. In some embodiments, the resized widget expands at its original location which causes reflow of application icons and/or widgets to create room for the expanded widget. In some embodiments, the expanded widget itself is moved to a different location on the page which causes reflow of application icons and/or widgets to fill the location vacated by the expanded widget. Moving one or more application icons on the first user interface relative to the first location, in response to detecting the user input that selects the second size using the set of selectable controls, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the second size of the first user interface object containing application content is (8092) greater than the first size of the first user interface object containing application content. In response to detecting the user input that selects the second size using the set of selectable controls: in accordance with a determination that a size of vacant placement locations on the first user interface does not correspond to a difference between the second size and the first size (e.g., individual vacant placement locations are smaller than the second size of the first user interface object containing application content; an aggregate size of the vacant placement locations is smaller than the expansion of the first user interface object containing application content, as is or after reflowing and reorganization of the application icons and/or user interface objects containing application content on the first user interface, etc.), the computer system moves a set of one or more application icons (and optionally one or more user interface objects containing application content) existing on the first user interface to a predetermined location (e.g., a newly created page, a predetermined folder (e.g., existing or newly created) on the first user interface, the respective location that holds other overflowed application icons and widgets when the first user interface object was initially inserted into the page, etc.). Some aspects of how application icons and/or widgets can be overflowed into a predetermined location in response to expansion of an existing user interface object containing application on a page of the home screen user interface are analogous to that described with respect to insertion of one or more application icons or user interface object(s) containing application content (e.g., by dragging and dropping a single application icon, a single user interface object containing application content, a single widget stack, dragging and dropping a group of application icon(s), user interface objects containing application content, and/or widget stacks, by using an "add widget" button, an "add widget stack" affordance, etc. in a widget selection or configuration user interface, etc.) into a page that does not have sufficient amount of space to accommodate all or a preset set of existing application icons and user interface objects containing application content on the page and the newly inserted application icon(s) and user interface object(s) containing application content, and are not repeatedly described herein the interest of brevity. More details of how overflow application icons and/or widgets are moved to a predetermined location are described with respect to FIGS. 5C1-5C73 and FIGS. 7A-7H and accompanying descriptions. Moving a set of one or more application icons existing on the first user interface to a predetermined location, in response to detecting the user input that selects the second size using the set of selectable controls and in accordance with a determination that a size of vacant placement locations on the first user interface does not correspond to a difference between the second size and the first size performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, in response to detecting the first input corresponding to the request to insert the first user interface object that includes application content into the first user interface: in conjunction with displaying the first user interface object that includes application content at the first location, the computer system displays (8094) a visual feedback that includes an animated visual effect (e.g., motions of objects, shimmering visual effect, etc.) that propagates from the first location in different directions across the first user interface (e.g., application icons move on the first user interface as if under the influence of an invisible waves or rippling effect that originated from the first location, application icons change shape, color, etc., as if being illuminated by a propagating light wave that originated from the first location, etc.). In some embodiments, depending on the position of the insertion location of the first user interface object that includes application content on the first user interface, the starting location of the propagating visual effect are different, and consequently, the visual effect is applied to different application icons on the first user interface in different temporal orders depending on the relative positions of the application icons and the first location. In some embodiments, the visual effect is only applied a user interface object containing application content is dragged into the user interface and dropped on the user interface, and the visual effect is not applied if the user interface object containing application content is already residing in the user interface (e.g., already existing before the start of the reconfiguration mode, or having been dropped into the page earlier during the reconfiguration mode of the home screen user interface, etc.). In some embodiments, the visual effect is also not applied, if the user interface object containing application content is added to a default position on the user interface using an "add widget" button, rather than dragged and dropped onto the page. In some embodiments, it is not required that the insertion of the user interface object containing application content to push out any existing application icons into a preset location where the application icons are not directly accessible (e.g., a folder or another page, etc.) in order for the above-mentioned visual effect to be applied. Displaying visual feedback in conjunction with performing an operation in response to a user input enhances the operability of the computer system and improves efficiency of human-machine interactions using the computer system (e.g., by informing the user the changed state of the computer system and also informing the effect of the user's input, thereby reducing user mistakes). These features are illustrated in FIGS. 5C48-5C52, for example, where the animated visual effect will be shown to propagate from the drop location of the widget 5310*g* in the upper right corner of the display 112 in different directions across the user-arranged page 5302', e.g., reaching the application icons 5008*aa* and 5008*ad* earlier than application icons 5008*ag* and 5008*ah* which are located farther away from the widget 5310*g* than the application icons 5008*aa* and 5008*ad*. If the widget 5310*g* were to be dropped into the location on the right of the widget 5310*h*, then the animated visual effect would start from that location, and propagate to the application icons 5008*ag* and 5008*ah* before it reaches the application icons 5008*aa* and 5008*ad* because the new drop location is closer to the application icons 5008*ag* and 5008*ah* than to the application icons 5008*aa* and 5008*ad*. In some embodiments, if the widget 5310*g* were added to the page 5302' in response to a tap input on the "add button" in the widget selection and configuration user interface 5304 in FIG. 5C47, no animated visual effect will be displayed either.

It should be understood that the particular order in which the operations in FIGS. 8A-8M have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 9000, 10000, 11000, 12000, 13000, and 14000) are also applicable in an analogous manner to method 8000 described above with respect to FIGS. 8A-8M. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 8000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 9000, 10000, 11000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8M are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9H are flow diagrams illustrating a method 9000 of selection for display and updating user interface objects (e.g., mini application objects, widgets, etc.) that are associated with a placement location in a page of a home screen user interface, in accordance with some embodiments.

Method 9000 relates to allowing updating which widget from a plurality of widgets associated with a placement location is displayed at the placement location at a given time automatically without user input (e.g., based on context) and also at a different time in response to user input. Providing widgets for different applications at the same placement location improves the utilization efficiency of screen space without increasing visual clutter. Providing access to different widgets based on changing context as well as manual input in the manner described herein enhances the operability of the device (e.g., by automatically performing an operation when condition is met) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

Method 9000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component. In the method 9000, at a first time, the computer system displays (9002) a first user interface (e.g., any page of a multipage home screen user interface, a single home screen user interface, a system-arranged home screen, etc.), wherein: the first user interface includes (9004) a placement location (e.g., a slot or snap position for displaying a respective user interface object that contains application content, where the slot or snap position is also configured to display two or more application icons (e.g., two, four, or six adjacent application icons in a row, in a column; four adjacent application icons in two rows and two columns, etc.) if the placement location is not displaying a user interface object containing application content) that is configured to spatially accommodate a respective user interface object of a plurality of user interface objects (e.g., user interface objects containing application content (e.g., widgets, mini application objects, etc.)) corresponding to different applications (e.g., including two or more of a messaging application, a calendar application, a weather application, a social networking application, and a teleconference application, etc.) that are associated with the placement location (e.g., assigned to be displayed at the placement location). The plurality of user interface objects includes (9006) a first user interface object corresponding to a first application (e.g., the first user interface object is a widget for the messages application, or the calendar application, etc.), and a second user interface object corresponding to a second application (e.g., the second user interface object is a widget for the weather application, or the social networking application, etc.) different from the first application. At the first time, the first user interface object is (9008) displayed at the placement location (e.g., the first user interface object is selectively displayed at the placement location by the computer system in response to an event or situation that occurred near the first time that makes the first application or the first user interface object more likely to be of interest to the user or relevant to the current context). At a second time, after the first time, the computer system displays (9010) the first user interface (e.g., while the first user interface is continuously displayed since the first time, or when the first user interface is redisplayed (e.g., in response to user inputs that corresponds to a request to redisplay the first user interface), after display of the first user interface with the first user interface object was replaced with other user interfaces (e.g., due to interaction with the computer system by the user) or after the display generated component entered into a low power mode (e.g., due to inactivity or turning off the screen by activation of a power button, etc.) and re-entered into the normal power mode (e.g., in response to movement of the display generation component, a tap input on the display, etc.)) with the second user interface object displayed at the placement location, wherein the second user interface object was automatically selected for display at the placement location (e.g., without user input explicitly selecting the second user interface object for display at the placement location) based on a current context (e.g., location, time of day, scheduled calendar events, weather conditions, user interaction with applications on the device, etc.) of the device at the second time. While the second user interface object (e.g., the second user interface object containing application content from the second application) is displayed at the placement location (e.g., after replacing the first user interface object containing application content from the first application), the computer system detects (9012) a gesture directed to the placement location (e.g., a swipe input on a touch-screen, a gaze input directed to the placement location detected in conjunction with an in air swipe input, etc.). In response to detecting the gesture directed to the placement location, in accordance with a determination that the gesture is a first type of gesture (e.g., the first type of gesture is different from a second type of gesture (e.g., a tap input on the touch screen at a location of the user interface object, or a gaze input directed to the user interface object that is detected in conjunction with an in air tap input, etc.) that activates the currently displayed user interface object and causes performance of a function within the user interface object (e.g., expands the user interface object to display more application content from the corresponding application) or launching of the application corresponding to the user interface object), the computer system replaces (9014) display of the second user interface object with a different user interface object from the plurality of user interface objects that are associated with the placement location. For example, in some embodiments, a placement location for displaying user interface objects containing application content is time-shared (e.g., displayed individually one by one according to a rotation rule and/or context-based criteria) among multiple user interface object containing application content for multiple different applications. It is important to note that the multiple user interface object containing application content for different applications are not the same as a single user interface object containing different application content from the same application, and that rotates the different application content from the same application in the same displacement location. In some embodiments, the multiple user interface objects containing application content are dynamically selected by the computer system in accordance with various criteria (e.g., frequency of usage, recency of usage, events or context cues, etc.), and only a subset (e.g., one or more, less than all) of all the selected user interface objects containing application content are selectively displayed at a given time by the computer system based on the current context. In addition to automatically presenting, at the placement location and in accordance with the current context and preset rules, different sets of one or more suitable user interface objects containing application content from the preconfigured set of user interface object containing application content that have been assigned to the placement location, the computer system also respond to user inputs that browse through the preconfigured set of user interface object containing application content to view one or more of the user interface objects containing application content that are of interest to the user at the current time. In some embodiments, a user interface object containing application content (e.g., also referred to as widgets or mini application objects herein) from a respective application is an interactive object that is associated with the respective application, and provides a subset of the content and/or functions of the respective application. In some embodiments, the user interface object containing application content from the respective application exists and functions without requiring the corresponding application to be running or active. In some embodiments, the user interface object containing application content from a respective application is operated by the operating system and is configured to retrieve content of the corresponding application without requiring the corresponding application to be running or active. In some embodiments, a user interface object containing application content from a respective application behaves in a similar manner as the application icon for the respective application in that the same type of user input is used to launch the respective application from the user interface object containing application content and from the application icon for the respective application. In some embodiments, a user interface object containing application content from a respective application does not receive inputs from the user to cause changes in the user interface object. In some embodiments, the user interface object containing application content from a respective application provides an input entry mechanism to the user, receives user input through the input entry mechanisms, and passes the user input to the respective application, where the input optionally triggers a change in the respective application or causes performance of an operation in the application without requiring the application to be launched to the foreground or displayed. In some embodiments, a user interface object provides a function that allows a user to provide input to one of several applications that are associated with the user interface object. For example, a widget for a shortcuts application presents application content from multiple applications, including a selected subsets of functions from those multiple applications, and when a user input is detected to activate one of the subset of functions from one of the multiple applications, the user interface object optionally presents an input field to receive textual or selection inputs, and forward the textual or selection inputs to said one of the multiple applications, such that a corresponding function is performed in that application without requiring the application itself to be displayed (e.g., the function may be sending an email with the received textual input to a specified recipient, or selecting a mode of transportation for a calendar event, etc.). In some embodiments, the request for user input pops up from the user interface object, selectable options are presented in the user interface object, or an input field is presented with an input means (e.g., a virtual keyboard, a drawing board, etc.) in the user interface object (e.g., whenever the update received from the application by the user interface object indicates that user input is required for the application). These features are illustrated in FIGS. 5D1-5D3 and 5D10-5D11, for example, where the placement location 5410*b* is associated with multiple widgets (e.g., as shown in FIG. 5D2); and the computer system automatically (e.g., without further user intervention or without an explicit user input directed to the placement location that is associated with multiple widgets) switches the currently displayed widget at the placement location (e.g., from displaying widget 5310g (FIG. 5D1) to displaying widget 5410b (FIG. 5D3)) in accordance with changing context (e.g., changing time proximity to the next calendar event)), and later switches the currently displayed widget at the placement location (e.g., from displaying widget 5412f (FIG. 5D10) to displaying 5310g (FIG. 5D11)) in response to a swipe input by a contact 5694 directed to the placement location 5410b (FIG. 5D10).

In some embodiments, the different user interface object is (9016) the first user interface object. For example, the computer system automatically switches between the first user interface object and the second user interface object for display at the placement location based on the current context or based a preset time-share schedule, and the computer system also allows the user to manually switch between the first user interface object and the second user interface object at any time by providing a required input of the first type. Automatically switching between the first user interface object and the second user interface object for display at the placement location, based on the current time, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the different user interface object is (9018) a user interface object that is different from the first user interface object and the second user interface object. For example, in some embodiments, the different user interface object corresponds to a third application that is different from the first application and the second application, or optionally, the different user interface object is a placeholder user interface object that is replaced by a system-selected user interface containing application content of a system-selected application at the time that the placeholder user interface object is called up to be displayed at the placement location. In some embodiments, depending on the direction of the user input (e.g., swipe left versus swipe right, swipe up versus swipe down, swipe clockwise versus swipe counterclockwise, etc.) that computer system redisplays the first user interface object, or displays a third user interface object that is different from the first user interface object and the second user interface object. Automatically switching between the different user interface object and the first/second user interface object for display at the placement location, based on the current time, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the second user interface object is (9020) displayed at the placement location on the first user interface in response to detecting a context change (e.g., new user interaction is detected, new location is detected, new notification is received, etc.) at the computer system, while the first user interface is displayed with the first user interface object at the placement location (e.g., the first user interface is displayed with the first user interface object at the placement location from the first time to the second time). Switching from the first user interface to the second user interface at the placement location in response to detecting the context change performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D1-5D3, for example, where the placement location 5410b is associated with multiple widgets (e.g., as shown in FIG. 5D2); and the computer system automatically switches the currently displayed widget at the placement location (e.g., from displaying widget 5310g (FIG. 5D1) to displaying widget 5412c (FIG. 5D3)) in accordance with changing context (e.g., changing time proximity to the next calendar event)).

In some embodiments, the second user interface object is (9022) displayed at the placement location on the first user interface in response to detecting a request to redisplay the first user interface after the computer system has ceased to display the first user interface with the first user interface object at the placement location (e.g., in response to navigating back to the first user interface from another user interface, in response to turning on the display generation component or waking the display generation component from a low power state, etc.). Displaying the second user interface object at the placement location in response to detecting the request to redisplay the first user interface, after the first user interface object was ceased to be displayed at the placement location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D5-5D7, for example, where widget 5412c was displayed at the placement location 5410b on page 5404 before the computer system is locked (FIG. 5D5); after the computer system was locked the page 5404 ceases to be displayed, a request to redisplay the page 5404 is detected (e.g., device is unlocked by an upward widget swipe by the contact 5692 (FIG. 5D6)); and in response to the request to redisplay the page 5404, the computer system redisplays the page 5404 and automatically (e.g., without further user intervention or without an explicit user input directed to the placement location that is associated with multiple widgets) switches the widget in the placement location 5410b from widget 5412c to 5412e.

In some embodiments, the placement location is (9024) further associated with a third user interface object that displays application icons for a set of contextually selected applications (e.g., the third user interface object is automatically displayed the placement location by the computer system or in response to a user's swipe input directed to the placement location, replacing another user interface object containing application content from a corresponding application that was displayed at the placement location), wherein activation of a respective application icon for a respective application of the set of contextually selected applications causes display of the respective application corresponding to the activated application icon, and wherein, at a third time (e.g., a time proximate to a new event occurring at the computer system or a new input from the user) different from the first time and the second time, the third user interface object is displayed at the placement location in the first user interface (e.g., replacing a currently displayed user interface object from the plurality of user interface objects associated with the placement location), and the third user interface object is automatically selected (e.g., without user input) for display at the placement location based on a current context of the computer system proximate to the third time, and the set of contextually selected applications are selected based on the current context of the computer system proximate to the third time. In some embodiments, the number of application icons included in the third user interface object is greater if the current context is less clear, and fewer if the current context is clearer. In some embodiments, the third user interface object that displays application icons for a set of contextually selected applications is subject to previously received user authorization, and is disabled in accordance with withdrawal of the user authorization. Including the third user interface object that displays application icons for the set of contextually selected applications at the placement location performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D1-5D3, for example, where recommended applications widget 5055 is updated to provide application icons of automatically selected applications that are likely to be relevant to the user. In some embodiments, the recommended applications widgets can be placed in the same widget stack as other widgets of the same size and share the same placement location (e.g., become the currently displayed widget at the placement location in response to automatic switching by the computer system or manual switching by the user).

In some embodiments, at a fourth time, the computer system concurrently displays (9026) respective user interface objects for a first number of applications (e.g., respective widgets for different applications from the first number of applications (e.g., one, two, etc.)) at the placement location (e.g., replacing a first subset of one or more user interface objects containing application content from different applications that were concurrently displayed at the placement location immediately prior to the fourth time) based on a first value for a preset metric of the current context (e.g., a first confidence value of the determined context, a first total number of user interface objects that meet the criteria for being selected given the current context, etc.). At a fifth time, the computer system concurrently displays respective user interface objects for a second number of applications (e.g., respective widgets for different applications from the second number of applications (e.g., three, four, etc.)) at the placement location (e.g., replacing a second subset of one or more user interface objects containing application content from different applications that were concurrently displayed at the placement location immediately prior to the fifth time) based on a second value for the preset metric of the current context (e.g., a second confidence value of the determined context, a second total number of user interface objects that meet the criteria for being selected given the current context, etc.), the first value being different from the second value, and the first number being different from the second number. For example, in some embodiments, four widgets for four different applications are selected for display at the placement location, and a value of a relevance metric calculated based on various signals (e.g., current time, current location, recent application access, received notification, recent messaging history, recent call history, recent communication history, usage pattern for the current user, usage pattern by a large number of users, etc.) for three of the widgets are comparable, while the value of the relevance metric for the fourth widget is significantly higher, the fourth widget is selected by the computer system for display at the placement location. At a later time, different values of the various signals are detected and cause change in the values of the relevance metric for the four applications. If the values of relevance metric for two of the applications are comparable and significantly higher than the values of relevance metric for the other two of the applications, the widgets of the former two applications are selected by the computer system for concurrent display at the placement location (e.g., replacing the widget for the fourth application displayed earlier at the placement location). In some embodiments, the computer system resize the widgets based on how many widgets are being displayed concurrently at the placement location. In some embodiments, this feature is only implemented for larger placement locations, such as a placement location of 4×4 size which can accommodate a single 4×4 widget, two 2×4 widgets, four 1×4 widgets, four 2×2 widgets, two 4×2 widgets, etc.; or a placement location of 2×4 size which can accommodate a single 2×4 widget, two 1×4 widgets, two 2×2 widgets, etc. As described herein, a size of a widget and a size of a placement location is specified in accordance with a grid size in a layout of application icons on the home screen user interface, inside a folder containing application icons, in a listing of search results containing application icons, etc. A 2×2 sized widget occupies roughly the area of a 2×2 grid of application icons. A 2×2 sized placement location accommodates a 2×2 sized widget and a 2×2 grid of application icons. A 2×4 sized widget occupies roughly the area of a 2×4 grid of application icons. A 2×4 sized placement location accommodates a 2×4 sized widget and a 2×4 grid of application icons. Displaying different numbers of applications at the placement location based on the current time and the value of the current context performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D3-5D7, for example, where the same placement location displays different numbers of widgets depending on how clear the context is (e.g., two widgets are displayed at the placement location 5410*c* before receipt of the notification 5412*d*; and three widgets are concurrently displayed at the placement location 5410*c* after receipt of the notification 5412*d* which makes relative relevance of multiple widgets less clear).

In some embodiments, respective sizes of the respective user interface objects displayed at the placement location are (9028) adjusted based on a total number of the respective user interface objects concurrently displayed at the placement location. For example, in some embodiments, when there are four widgets concurrently displayed at the placement location because the context is less clear, the four widgets are displayed with a small size (e.g., simply reduced in scale, or simplified versions of the widgets are displayed), and when there are two widgets concurrently displayed at the placement location because the context is more clear, the two widgets are displayed with a larger size (e.g., simply increased in scale, or more extended versions of the widgets are displayed). In some embodiments, the user interface object containing application content for a respective application can have multiple displayable versions, some are simple and small, and offer a more limited set of functions from the application than another version that is larger, more complex, and offering a more extended set of functions from the application. Changing the respective sizes of the respective user interface objects at the placement location, based on the total number of the respective user interface objects concurrently displayed, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D3-5D7, for example, where the same placement location displays different numbers of widgets depending on how clear the context is and the different numbers of concurrently displayed widgets causes resizing of some of the widgets (e.g., when two widgets are displayed at the placement location 5410*c* before receipt of the notification 5412*d*, the size of the widget 5414*a* is larger; and when three widgets are concurrently displayed at the placement location 5410*c* after receipt of the notification 5412*d*, the size of the widget 5414*a* is smaller).

In some embodiments, the plurality of user interface objects corresponding to the different applications that are associated with the placement location are (9030) selected in accordance with previously received user configuration inputs (e.g., user inputs that selects the widgets or mini application object for the placement location, or add the widgets or mini application objects one by one to the placement location (e.g., user inputs dragging and dropping multiple widgets or mini application object to the same placement location)). Providing widgets for different applications at the same placement location, as previously-selected by the user, based on the current context, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently.

In some embodiments, the placement location is (9032) further associated with a placeholder user interface object that is automatically substituted (e.g., without user input) by a system-selected user interface object containing application content from a system-selected application, wherein the system-selected user interface object containing application content is dynamically selected from a group of available user interface objects outside of the plurality of user interface objects that are associated with the placement location. For example, if the plurality of user interface objects that are associated with the placement location are selected by the user and have known corresponding applications, and the user also enabled a wildcard widget for the placement location, the wildcard widget is not associated with any particular application at the time that the wildcard widget is associated with the placement location. Later, when the computer system determines based on the current context that a widget that is not currently associated with the placement location is likely to be relevant to the user, the computer system displays the widget in place of the wildcard widget (e.g., by the widget itself, or concurrently with one or more other widgets associated with the placement location). Dynamically selecting the user interface object from the group of available user interface objects outside the plurality of user interface objects that are associated with the placement location performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D2-5D7, for example, where sometimes user-selected widgets are displayed and sometimes a wildcard widget is displayed at the same placement location. More specifically, in FIG. 5D2, it is shown that the widget stack at the placement location 5410*c* has the wildcard widget enabled. In FIG. 5D7, when the computer system is near a charging station, the computer system automatically switches the currently displayed widget to the wildcard widget and substitutes the wildcard widget with a widget 5414*c* for a charging application for display at the placement location 5410*c*, where the widget 5414*c* is not among the plurality of widgets that are already associated with the placement location 5410*c*.

In some embodiments, the computer system dynamically selects (e.g., automatically, without user input) (9034) the system-selected user interface object containing application content (e.g., the widget that is actually displayed) to replace the placeholder user interface object (e.g., the wildcard widget) in the placement location based on the current context. For example, in some embodiments, at a third time, the computer system automatically without user input selects and displays a third widget containing application content from a third application that is not already associated with the placement location in accordance with a determination that a value of the relevance metric for the third widget as determined based on the current context is above a threshold value and above the relevance (determined by the computer system) value for other widgets already associated with the placement location; and at a fourth time different from the third time, the computer system automatically without user input selects and displays a fourth widget containing application content from a fourth application that is not already associated with the placement location in accordance with a determination that the value of the relevance metric for the fourth widget as determined based on the current context is above the threshold value and above the relevance value for other widgets already associated with the placement location. Dynamically selecting the system-selected user interface object to replace the placeholder user interface object performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5D8, for example, where the wildcard widget at placement location 5410*b* is substituted by a flight status widget 5412*f* and displays context-specific content (e.g., current flight status information corresponding to the current context (e.g., location near the airport, and earlier message regarding flight from London, etc.)) within the flight status widget 5412*f*.

In some embodiments, the plurality of user interface objects corresponding to the different applications that are associated with the placement location are (9036) arranged in a stack (e.g., a linear stack, a cyclic stack, a virtual carousel, etc.). In the method 9000, the computer system detects a sequence of one or more first inputs that is directed to the placement location (e.g., a swipe input on the touch screen at the placement location) and includes one or more first movement inputs in a first direction (e.g., a direction that is perpendicular to a page navigation direction through a plurality of pages of a multipage home screen user interface (e.g., the page navigation direction is a horizontal direction, the first direction is an upward direction)). In response to detecting a respective one of the sequence of one or more first inputs, the compute system switches to displaying a next user interface object in the stack at the placement location. For example, in some embodiments, the widgets in the stack are manually switchable at the placement location in response to swipe inputs (or other equivalent inputs for scrolling through content or objects displayed in a window, list, or stack) in a first direction while maintaining the display of application icons on the first user interface (e.g., up or down, left or right, clockwise or counter-clockwise etc.). In some embodiments, only a single user interface object from the plurality of user interface objects associated with the placement location is displayed at a given time, and the plurality of user interface objects rotate through the placement location one by one in response to user's swipe inputs directed to the placement location. In some embodiments, the computer system detects a sequence of one or more second inputs that is directed to the placement location and includes one or more second movement inputs in a second direction different from the first direction (e.g., the second direction is the page navigation direction and the first direction is perpendicular to the page navigation direction). In response to detecting the sequence of one or more second inputs, the computer system switches to displaying a next page in the multipage home screen interface in the second direction. In some embodiments, the computer system detects an input that is directed to the placement location and includes a movement input in a third direction that is opposite the first direction (e.g., the first direction is an upward direction, and the third direction is a downward direction), the computer system displays a search input area for searching application icons and/or widgets, and optionally other content, on the computer system. In some embodiments, one or more movement inputs on other portions of the first user interface also cause navigation to another page of the multipage home screen user interface or display of the search input area depending on the directions of the movement inputs. Switching to display a next user interface object in the stack at the placement location in response to detecting the respective one of the sequence of one or more first inputs reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5D1-5D12, for example, where the widget stacks at placement locations 5410*d*, 5410*b*, and 5410*c* respectively include a corresponding stack of widgets.

In some embodiments, while displaying, at the placement location, a respective user interface object (e.g., the first user interface object containing application content from the first application, the second user interface object containing application content from the second application, etc.) of the plurality of user interface objects corresponding to the different applications that are associated with the placement location, the computer system detects (9038) a tap input directed to the respective user interface object displayed at the placement location (or other equivalent inputs that are used to launch applications from their application icons). In response to detecting the tap input directed to the respective user interface object displayed at the placement location, the computer system ceases (9038) to display the first user interface and displaying a user interface of the application correspond to the respective user interface object displayed at the placement location. For example, in some embodiments, in response to the tap input directed to the placement location, in accordance with a determination that the first user interface object containing application content from the first application is displayed at the placement location at the time of the tap input, the computer system replaces display of the first user interface with display of a user interface of the first application; and in accordance with a determination that the second user interface object containing application content from the second application is displayed at the placement location at the time of the tap input, the computer system replaces display of the first user interface with display of a user interface of the second application. Ceasing to display the first user interface object and displaying the user interface of the application corresponding to the respective user interface object at the placement location, in response to detecting the tap input, reduces the number of inputs needed to perform an operation (e.g., opening the respective application). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5D8-5D9, for example, where a tap input by a contact 5415 on the widget 5414*a* (FIG. 5D8) causes display of the corresponding application of the widget 5414*a* (e.g., the messages application) in FIG. 5D9.

In some embodiments, the first user interface is (9040) a first page of a multipage home screen user interface, and the multipage home screen user interface further includes a second page adjacent to the first page. In the method 9000, while displaying, at the placement location, a respective user interface object of the plurality of user interface objects corresponding to the different applications that are associated with the placement location, the computer system detects a swipe input directed to the respective user interface object displayed at the placement location. In response to detecting the swipe input directed to the respective user interface object displayed at the placement location, in accordance with a determination that the swipe input is in a second direction (e.g., different from the first direction that is used to switch between different ones of the plurality of user interface objects associated with the placement location), the computer system ceases to display the first user interface and displaying the second page of the multipage home screen user interface without displaying the user interface of the application corresponding to the respective user interface object displayed at the placement location. For example, in some embodiments, when an input directed to the placement location is detected, the computer system determines whether to launch the application corresponding to the currently displayed user interface object containing application content, switch to displaying another user interface object containing application content for a different application at the placement location, or navigate to a different page of the currently displayed multipage user interface, based on the type of the input that is detected (e.g., tap versus swipe) and direction (e.g., vertical swipes vs. horizontal swipes, etc.). Ceasing to display the first user interface and displaying the second page of the multipage home screen user interface, in response to detecting the swipe input directed to the respective user interface object displayed at the placement location, reduces the number of inputs needed to perform an operation (e.g., a narrower example). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5C68-5C69, and 5C71-5C72, for example, where horizontal swipe inputs by the contacts 5674 and 5684 respectively cause navigation from the currently displayed page of the home screen user interface to an adjacent page of the home screen user interface in accordance with a direction of the swipe inputs.

In some embodiments, the plurality user interface objects corresponding to different applications that are associated with the placement location are (9042) arranged in a stack in accordance with an estimated priority based on the current context. For example, in response to a request to display the first user interface, the computer system ranks the user interface objects associated with the placement location in accordance with their relevance (determined by the computer system) to the current context, and displays the top ranked user interface object in the stack first at the placement location, and then in response to a swipe input in a first direction that is directed to the placement location while the top ranked user interface object is displayed at the placement location, the computer-system displays the second-ranked user interface object in the stack at the placement location; and then, in response to another swipe input in the first direction that is directed to the placement location while the second-ranked user interface object is displayed at the placement location, the computer system displays the third-ranked user interface object in the stack at the placement location. At different times when a request for displaying the first user interface is received or while the first user interface is displayed, the context may change, and the computer system re-ranks the user interface objects in the stack based on the context change, and changes the order by which the user interface are displayed at the placement location accordingly. In some embodiments, the dynamic ordering of the user interface objects in the stack at the placement location is enabled or disabled in a settings user interface in accordance with user input. In some embodiments, if the user has disabled the dynamic ordering of the user interface objects in the stack, the order of the user interface objects are fixed and are optionally based on the temporal order that the user interface objects were added to the placement location. In some embodiments, the user interface objects in the stack has a fixed ordering that is based on a preset rule, such as based on the alphabetical order of their associated applications, based on the time that they were added to or associated with the placement location, based on recency of the updates made to their application content, or based on an order selected by a user of the device, etc. In some embodiments, the preset rule does not take into account of the changes in the current context. Arranging the different applications in the stack according to the estimated priority based on the current context reduces the number of inputs needed to perform an operation (e.g., opening a user desired application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the computer system displays (9044) an indication at a location proximate to the placement location in accordance with a determination that the respective user interface object displayed at the placement location has been automatically changed in accordance with a changed context. In some embodiments, a plurality of widget indicators are displayed on the edge of the widget that visually indicate which widget in a widget stack is the currently displayed widget (e.g., the widget indicators have a fixed sequential order that corresponds to the order of the widgets in the stack, and the widget indicator for the currently displayed widget is visually distinguished relative to the widget indicators other widgets in the stack). In some embodiments, an animated change in color, hue, border, a badge, etc. is displayed briefly every time that the computer system automatically switches to displaying a different widget in the stack (e.g., based on a rotation schedule and/or based on changing context). In some embodiments, the name of the widget that is currently displayed at a placement location is shown proximate to the placement location (e.g., displayed above or below the widget). Displaying the indication at the location proximate to the placement location in accordance with a determination that the respective user interface object displayed at the placement location has been automatically changed in accordance with a changed context provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5D3-5D7, for example, where the update indicator 5416 indicate that the currently displayed widget at a corresponding placement location (e.g., placement locations 5410*b*, 5410*c*, etc.) in the page 5404 has been updated automatically by the computer system.

In some embodiments, the first user interface includes (9046) multiple placement locations, a respective placement location of the multiple placement locations is associated a respective set of user interface objects that respectively contain application content from different applications (e.g., each user interface object contains application content from a corresponding application, different user interface object contain application content from different applications, etc.), and wherein the user interface object currently displayed at a first placement location of the multiple placement locations is updated (e.g., automatically without user input, based on a rotation schedule for the placement locations and/or changing context) independently from the user interface object currently displayed at a second placement location of the multiple placement locations. Updating the user interface object currently displayed at the first placement location independently from the user interface object currently displayed at the second placement location performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D7-5D8, where the currently displayed widgets in the widget stacks at placement locations 5410*d*, 5410*b*, and 5410*c* are automatically switched independently of one another.

In some embodiments, the computer system automatically (e.g., without user inputs) selects (9048), from the plurality of user interface objects associated with the placement location, a respective user interface object for display at the placement location in accordance with closing of an application on the computer system prior to displaying the first user interface (e.g., a page of the home screen user interface). Automatically selecting the respective user interface object for display at the placement location, in accordance with the closing of an application, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D8-5D10, for example, where the currently displayed widget(s) in the widget stack at placement location 5410*c* is automatically updated (e.g., the widget 5414*a* for the messages application shown in FIG. 5D8 ceases to be displayed at the placement location 5410*c* in FIG. 5D10) after the messages application is closed (FIG. 5D9).

In some embodiments, the computer system automatically selects (e.g., without user input) (9050), from the plurality of user interface objects associated with the placement location, a respective user interface object for display at the placement location in response to navigating from a screen lock user interface (e.g., wake screen or lock screen) to the first user interface (e.g., a page of the home screen). Automatically selecting the respective user interface object for display at the placement location, in response to the navigation from the screen lock user interface to the first user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D6-5D7, for example, where the currently displayed widgets at the placement locations 5410*b* and 5410*c* are respectively updated (FIG. 5D6) after the device is unlocked (FIG. 5D7).

In some embodiments, the first user interface includes (9052) multiple placement locations, a respective placement location of the multiple placement locations is associated a respective set of user interface objects respectively containing application content from different applications (e.g., each placement location is associated with a respective set of user interface objects, different user interface objects in the respective set contain application content from different applications, etc.), and wherein computer system takes into account of which user interface object is currently displayed at a first placement location of the multiple placement locations when updating a user interface object currently displayed at a second placement location of the multiple placement locations or switching to a different user interface object for display at the second placement location. For example, if the computer system switches from displaying a weather widget for a first city to displaying a calendar widget showing upcoming events at the second placement location, the computer system automatically (e.g., without user inputs) adds more weight to the option for displaying another weather widget at the first location. But if the weather widget remains displayed at the second placement location, the computer system optionally reduces the weight for the option for displaying a weather widget at the first location. In some embodiments, the computer system automatically prevents displaying widgets from the same application at the same time at different placement locations on the same page, even if the relevance values of the widgets for the application are highest for both placement locations. Takes into account of which user interface object is currently displayed at a first placement location when updating a user interface object currently displayed at a second placement location performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5D3-5D12, for example, where even though the widget stacks at placement location 5410*b* and 5410*c* both include the weather widgets, the weather widget is not displayed at both placement locations at the same time, even if the weather widget is determined to be relevant to the current context.

In some embodiments, while displaying a respective user interface object of the plurality of user interface objects at the placement location on the first user interface, the computer system detects (9054) an input that corresponds to a request to display a plurality of selectable options associated with the placement location (e.g., a touch-hold input by a contact at the placement location followed by a movement of the contact, a touch-hold input on the placement location followed by lift-off of the contact, etc.). In response to detecting the input that corresponds to the request to display the plurality of selectable options associated with the placement location, the computer system displays the plurality of selectable options associated with the placement location, including a first selectable option (e.g., a toggle switch, a check box, a radio button, a drop down menu, etc.) that, when activated, enables automatic switching display of user interface objects through the plurality of user interface objects at the placement location. In some embodiments, the computer system detects an input that activates the first selectable option (e.g., a toggle, a check box, etc.) to switch from enabling automatically switching to disabling automatic switching, and the computer system ceases to automatically selecting (e.g., without user inputs, based on context and/or rotation schedule, etc.) the user interface object from the plurality of user interface objects for display at the placement location. Displaying the first selectable option that, when activated, enables automatic switching display of user interface objects at the placement location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C24 and 5C62, for example, where the plurality of selectable options associated with a placement location of a widget stack are displayed in a stack configuration platter 5340' or 5340" which includes a control (e.g., a toggle 5362) that, when activated, changes the enabled/disabled state for the automatic switching of the currently displayed widget at the placement location.

In some embodiments, displaying the plurality of selectable options includes (9056) displaying a second selectable option (e.g., a toggle switch, a check box, a radio button, a drop down menu, etc.) that, when activated, enables a placeholder user interface object at the placement location (e.g., toggles from a disabled state to an enabled state), wherein the placeholder user interface object is automatically substituted (e.g., without user input) by a system-selected user interface object containing application content from a system-selected application when the placeholder user interface object is selected (e.g., automatically without user input, or by user request) for display at the placement location, wherein the system-selected user interface object containing application content is dynamically selected from a group of available user interface objects outside of the plurality of user interface objects that are associated with the placement location. In some embodiments, the plurality of selectable options include respective selectable options for displaying object-specific options for the first user interface object and object-specific options for the second user interface object. Automatically substituting a system-selected user interface object for the placeholder interface object performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C24 and 5C62, for example, where the plurality of selectable options associated with a placement location of a widget stack are displayed in a stack configuration platter 5340' or 5340" which includes a control (e.g., a toggle 5360) that, when activated, changes the enabled/disabled state for the wildcard widget at the placement location.

In some embodiments, while displaying a respective user interface object of the plurality of user interface objects at the placement location on the first user interface, the computer system detects (9058) an input that is directed to the placement location and that meets preset criteria (e.g., a touch-hold input by a contact at the placement location for at least a threshold amount of time with less than a threshold amount of movement of the contact, optionally, followed by liftoff of the contact, etc.). In response to detecting the input that is directed to the placement location and that meets the preset criteria, the computer system displays (e.g., in a quick action menu concurrently displayed with the respective user interface object on the first user interface), a first set of one or more selectable options associated with the placement location and a second set of one or more selectable options associated with the respective user interface object. In some embodiments, the first set of one or more options associated with the placement location includes one or more of an option to delete the entire widget stack from the placement location, an option to display an editing user interface for the widget stack, etc. In some embodiments, the second set of one or more options associated with the respective user interface object that is currently displayed at the placement location includes one or more of an option to delete the respective user interface object from the plurality of user interface objects associated with the placement location, an option to display an object-specific editing user interface for editing the respective user interface object, etc. In some embodiments, the plurality of selectable options also includes an option that, when activated, causes the home screen user interface to enter into a reconfiguration mode where layout of application icons and user interface objects containing application content on the different pages of the home screen user interface can be adjusted according to user inputs (e.g., drag inputs). In some embodiments, the computer system detects an input that is directed to a placement location that is associated with a single user interface object containing application content or a single application icon and that meets the preset criteria, and the computer system displays a respective plurality of selectable options associated with the single user interface object or single application icon concurrently with the single user interface object containing application content or single application icon. In some embodiments, the plurality of selectable options includes an option to delete the single user interface object or single application icon. In some embodiments, the plurality of selectable options include an option to trigger a reconfiguration mode for the home screen user interface. In some embodiments, there is a maximum number of widgets that is allowed for a respective placement location. Displaying the first set of one or more selectable options associated with the placement location and the second set of one or more selectable options associated with the respective user interface object, in response to detecting the input that is directed to the placement location and that meets the preset criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5C21-5C24, for example, where in response to a tap-hold input by a contact 5594 on a widget stack 5328, the computer system displays a quick action menu 5332 corresponding to the placement location of the widget stack 5328, where the quick action menu 5332 includes stack-specific options (e.g., edit stack option 5340, delete stack option 5342, etc.) and widget-specific options (e.g., share widget option 5334, edit widget option 5336, delete widget option 5338, etc.).

In some embodiments, displaying the first user interface with the second user interface object displayed at the placement location includes (9060): concurrently displaying, within the second user interface object, first application content from the second application and second application content from the second application; and in accordance with a determination that the second user interface object was automatically selected for display at the placement location based on correspondence between the first application content and the current context of the computer system at the second time, visually emphasizing (e.g., highlighting, circling with a line, etc.) the first application content relative to the second application content in the second user interface object (e.g., visually emphasizing the first content without visually emphasizing the second application content). In some embodiments, in accordance with a determination that the second user interface object was automatically selected for display at the placement location based on correspondence between the second application content and the current context of the computer system at the second time, the computer system visually emphasizes (e.g., highlighting, circling with a line, etc.) the second application content relative to the first application content in the second user interface object (e.g., visually emphasizing the second application content without visually emphasizing the first application content). Visually emphasizing the first application content relative to the second application content in the second user interface object, in accordance with a determination that the second user interface object was automatically selected for display at the placement location based on correspondence between the first application content and the current context of the computer system at the second time, provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, visually emphasizing the first application content relative to the second application content includes (9062) applying visual marking (e.g., callout, circle, underlying, drawing mark, highlighting, etc.) to the first application content in the second user interface object without applying the visual marking to the second application content in the second user interface object. In some embodiments, visually emphasizing the second application content relative to the second application content includes applying a visual marking (e.g., callout, circle, underlying, drawing mark, highlighting, etc.) to the second application content in the second user interface object without applying the visual marking to the first application content in the second user interface object. In some embodiments this is the same visual marking that would be applied to the first application content if the first application content were to be the reason for displaying the second user interface object. Applying visual marking (e.g., callout, circle, underlying, drawing mark, highlighting, etc.) to the first application content in the second user interface object without applying the visual marking to the second application content in the second user interface object provides improved visual feedback to the user. Providing improved visual feedback enhances the operability of the device and makes the user-device interface more efficient, which, additionally, reduces power usage and improves battery life of the device by enabling the user to use the device more quickly and efficiently.

It should be understood that the particular order in which the operations in FIGS. 9A-9H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 10000, 11000, 12000, 13000, and 14000) are also applicable in an analogous manner to method 9000 described above with respect to FIGS. 9A-9H. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 9000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 10000, 11000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9H are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 10A-10H are flow diagrams illustrating a method 10000 of interacting with a plurality of user interface objects containing application content that is associated with a common placement location (e.g., a widget or mini application object stack, etc.) (e.g., on a page of a home screen user interface and in a stack-specific configuration user interface, etc.), in accordance with some embodiments.

The method 10000 relates to providing a configuration user interface for a widget stack. Widgets stacks that includes multiple widgets that are associated with the same placement location on a page of a home screen user interface or widget screen, and that can be automatically switched and/or manually switched so that different ones of the widgets in the stack are displayed at the placement location at a time. Allowing widget stacks to be included on a widget screen and/or a home screen user interface allows more widgets to be made available to the user in a finite amount of display area; and allowing automatic switching between widgets at the same placement location based on the current context allows easy access to the more relevant widgets in the stack without requiring additional user inputs. A configuration user interface for a widget stack is displayed in response to an input directed to the placement location of the widget stack (e.g., irrespective of which widget from the stack is currently displayed at the placement location) on a user interface (e.g., a page of a home screen user interface in the icon reconfiguration mode). As disclosed herein the configuration user interface displays representations of the widgets in the stack, and allows the user to view the widgets in the stack, and optionally configures the order of the widgets in the stack and/or other aspects of the widget stack (e.g., enabling wildcard widget, turning on/off automatic switching, deleting one or more widgets from the stack, adding the widget stack to another default location, selecting additional widgets for inclusion in the stack, etc.). In addition, the configuration user interface also serves the function of a mini widget selection user interface from which, a user can view the multiple widgets in the widget stack, and drag and dropping it from the configuration user interface to another user interface. The configuration user interface that serves the combined functions of allowing the user to view the widgets in a stack and receiving configuration inputs for the widget stack, as well as allowing the user to select and insert/move one or more widgets from the stack to another user-selected location improves enhances the operability of the device (e.g., by making it easier to discover widgets and adding widgets to another location) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

The method 10000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component.

In the method 10000, the computer system displays (10002) a first user interface (e.g., a user-arranged page of a multipage home screen user interface, a single page home screen user interface, a widget screen, etc.) that includes a first placement location that is associated with a plurality of user interface objects corresponding to different applications (e.g., a plurality of user interface objects containing application content corresponding to different applications, a plurality of widgets corresponding to different applications, a plurality of mini application objects corresponding to different applications, etc.) (e.g., the plurality of widgets include a set of two or more user-selected widgets and optionally a wildcard widget that is automatically replaced by a system-selected widget not among the set of user-selected widgets based on a match between the system-selected widget and the current context). The plurality of user interface objects include (10004): a first user interface object (e.g., a first widget) that includes information (e.g., first application content, first application icon image, a first subset of application functions, etc.) from a first application (e.g., an instant messaging application, an email application, etc.), a second user interface object (e.g., a second widget) that includes information (e.g., second application content, second application icon image, a second subset of application functions, etc.) from a second application (e.g., a calendar application, a maps application, a weather application, a news application, etc.) that is different from the first application, and a third user interface object (e.g., a third widget) that includes information from a third application (e.g., one of the set of user-selected widgets for the first placement location, optionally, a widget that is automatically selected by the computer system based on the current context that replaces a wildcard widget associated with the first placement location, etc.) that is different from the first application and the second application. After displaying (e.g., while continuing to display, while displaying another user interface (e.g., another application, a lock screen, a wake screen, etc.) after navigating away from, etc.) the first user interface object corresponding to the first application at the first placement location in the first user interface (e.g., while the first user interface object is identified by the computer system as the currently displayed widget at the first placement location), the computer system detects (10006) occurrence of a respective condition (e.g., detecting a user input that meets preset widget switching criteria, an automatic switching condition, etc.) or detecting that automatic application switching is triggered according to a preset schedule, according to navigation to the first user interface from another user interface (e.g., another page of the home screen user interface, an application user interface, a wake screen or lock screen, etc.), according to a change in location of the computer system, according to spatial proximity to another device, according to temporal proximity to a scheduled event, etc.). In response to detecting the occurrence of the respective condition, the computer system displays (10008) the second user interface object (and ceasing displaying of the first user interface object at the first placement location, e.g., while maintaining display of other user interface objects (e.g., other widgets, and application icons) on the first user interface) at the first placement location in the first user interface (e.g., automatically, without user inputs, replacing display of the first user interface object with display of the second user interface object at the first placement location (e.g., the computer system replaces the first user interface object with the second user interface object as the currently displayed user interface object, and displays the second user interface object at the first placement location when displaying the first user interface), or in response to an explicit switching input, such as a swipe gesture, etc.). After displaying the second user interface object at the first placement location in the first user interface (e.g., while displaying the second user interface object or the third user interface object at the first placement location in the first user interface, optionally in accordance with a determination that first criteria are met (e.g., a tap input is detected at a first placement location that is associated with a plurality of user interface objects corresponding to different applications, while the first user interface containing the first placement location is in a first reconfiguration mode (e.g., icon reconfiguration mode))), the computer system displays (10010) a configuration user interface corresponding to the first placement location (e.g., a stack-specific configuration user interface). In some embodiments, displaying the configuration user interface includes (10012) concurrently displaying at least a portion of a first representation of the first user interface object (e.g., representation of the first user interface object is displayed in the configuration user interface even when the configuration user interface is triggered at a time when the second user interface object or third user interface is displayed at the first placement location) and at least a portion of a second representation the second user interface object. While displaying the configuration user interface corresponding to the first placement location, the computer system detects (10014) a first user input that is directed to a respective portion of the configuration user interface. In response to detecting the first user input that is directed to the respective portion of the configuration user interface (10016): in accordance with a determination that the first user input meets selection criteria when directed to the first representation of the first user interface object of the plurality of user interface objects shown in configuration user interface and that the first user input includes movement that meets first movement criteria (e.g., the first movement criteria require that, after the selection criteria are met, the movement of the first user input reaches a peripheral region of the configuration user interface and remains in the peripheral region of the configuration user interface for a threshold amount of time, or that the movement is in a first direction (e.g., a direction that is different from or transverse to the scrolling direction of the configuration user interface), etc., in order for the first movement criteria to be met), the computer system ceases (10018) display of the configuration user interface corresponding to the first placement location and displaying the first user interface object at a second placement location in a second user interface (e.g., the second user interface in the first reconfiguration mode (e.g., icon reconfiguration mode)) in accordance with the movement of the first user input (e.g., the second placement location is selected in accordance with a termination location of the first user input, and one or more movement characteristics of the first user input, etc.), wherein the second user interface is different from the configuration user interface, and the second placement location is different from the first placement location (e.g., the first and second placement locations are two different placement locations in the same user interface, two placement locations at the same position but in different user interfaces, two placement locations at different positions in two different user interfaces, etc.). In some embodiments, the configuration user interface includes an option for enabling and disabling the wildcard widget for the first placement location. These features are illustrated for example in FIGS. 5E2, 5E3, 5E11, 5E16, and 5E20-5E23. A respective user-arranged home screen user interface 5202 includes widget stack 5024*b*, which has multiple widgets as indicated by widget indicators 5330, where widget 5022*g* is displayed on top of the widget stack (FIG. 5E2). In response to user input meeting preset switching criteria (e.g., swipe input by contact 6100), the device displays widget 5022*k* on top of the widget stack (FIG. 5E3). Subsequently, a stack-specific configuration user interface 5026 corresponding to widget stack 5024*b* that includes concurrently displaying portions of at least two widgets in the widget stack is displayed overlaid on home screen 5202' (FIG. 5E11). In response to detecting drag input by contact 6130 on a representation of widget 50221 in the stack-specific configuration user interface 5026, where contact 6130 moves to a periphery of the stack-specific configuration user interface 5026: widget 50221 is removed from stack 5024 and is placed in home screen user interface 5202' (FIGS. 5E16 and 5E20-5E23).

In some embodiments, after detecting the first user input that is directed to the respective portion of the configuration user interface corresponding to the first placement location and displaying the first user interface object at the second placement location in the second user interface in accordance with the movement of the first user input (e.g., while displaying the first user interface in the first reconfiguration mode, and in accordance with a determination that the first criteria are met again (e.g., a tap input is detected at the first placement location)), the computer system redisplays (10020) the configuration user interface, including displaying at least a portion of the second representation of the second user interface object without concurrently displaying at least a portion of the first representation of the first user interface object. In some embodiments, the second representation of the second user interface object is concurrently displayed with at least a portion of a third representation of the third user interface object. In some embodiments, the first user interface object is no longer associated with the first placement location after the first user interface object is dragged away from the configuration user interface corresponding to the first placement location and dropping into the second placement location different from the first placement location. In some embodiments, when redisplaying the configuration user interface corresponding to the first placement location, in accordance with a determination that the second user interface is the same as the first user interface, the computer system displays the configuration user interface without including the first representation of the first user interface object among respective representations of other user interface objects associated with the first placement location; and in accordance with a determination that the second user interface is different from the first user interface, the computer system displays the configuration user interface including the first representation of the first user interface object among the respective representations of other user interface objects associated with the first placement location. For example, in some embodiments, when a widget is dragged from the stack and dropped onto the same page, the widget is removed from the stack and associated with a different placement location on the same page; and when the widget is dragging from the stack and dropped onto a different page, the widget remains in the stack and is also added to the different page. In some embodiments, after the first user interface object is no longer associated with the first placement location, the computer system does not display the first user interface object at the first placement location. In some embodiments, after the first user interface object is no longer associated with the first placement location, the computer system does not display the first user interface object at the first placement location, unless the first user interface object is selected to replace the wildcard widget associated with the first placement location. Redisplaying the configuration user interface including displaying at least a portion of the second representation of the second user interface object without concurrently displaying at least a portion of the first representation of the first user interface object, after detecting the first user input that is directed to the respective portion of the configuration user interface corresponding to the first placement location and displaying the first user interface object at the second placement location in the second user interface in accordance with the movement of the first user input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E16, and 5E20-5E23 for example, where after widget 50221 is removed from widget stack 5024 and placed in a respective home screen interface, widget 50221 is no longer present in widget stack 5024 (e.g., as indicated by the number of widget indicators before and after widget 50221 is present in the home screen user interface).

In some embodiments, in response to detecting the first user input that is directed to the respective portion of the configuration user interface (10022): in accordance with a determination that the first user input meets the selection criteria when directed to the second representation of the second user interface object of the plurality of user interface objects shown in configuration user interface and that the first user input includes (10024) movement that meets the first movement criteria (e.g., the first movement criteria require that, after the selection criteria are met, the movement reaches a peripheral region of the configuration user interface and remains in the peripheral region of the configuration user interface for a threshold amount of time, or that the movement is in a first direction (e.g., a direction that is different from or transverse to the scrolling direction of the configuration user interface), etc., in order for the first movement criteria to be met), the computer system ceases to display the configuration user interface corresponding to the first placement location and displaying the second user interface object at the second placement location on the second user interface (e.g., the second user interface in the first reconfiguration mode (e.g., icon reconfiguration mode)) in accordance with the movement of the first user input (e.g., the second placement location is selected in accordance with a termination location of the first user input) (e.g., two different placement locations on the same user interface, two placement locations at the same position but different user interfaces, two placement locations at different positions on two different user interfaces, etc.). Ceasing to display the configuration user interface corresponding to the first placement location and displaying the second user interface object at the second placement location on the second user interface, in accordance with a determination that the first user input meets the selection criteria when directed to the second representation of the second user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated for example in FIGS. 5E16, and 5E20-5E23. In stack-specific configuration user interface 5026 corresponding to widget stack 5024*b*, if drag input is directed to a representation of a second widget in the stack-specific configuration user interface 5026, where the drag input meets selection and movement criteria, then the second widget would be removed from stack 5024 and be placed in home screen user interface 5202'.

In some embodiments, after detecting the first user input that is directed to the respective portion of the configuration user interface corresponding to the first placement location and displaying the second user interface object at the second placement location on the second user interface in accordance with the movement of the first user input (e.g., while displaying the first user interface in the first reconfiguration mode, and in accordance with a determination that the first criteria are met again (e.g., a tap input is detected at the first placement location)), the computer system redisplays (10026) the configuration user interface, including displaying at least a portion of the first representation of the first user interface object without concurrently displaying at least a portion of the second representation of the second user interface object. In some embodiments, the first representation of the first user interface object is concurrently displayed with at least a portion of the third representation of the third user interface object. In some embodiments, the second user interface object is no longer associated with the first placement location after the second user interface object is dragged away from the configuration user interface corresponding to the first placement location and dropping into the second placement location different from the first placement location. In some embodiments, when redisplaying the configuration user interface corresponding to the first placement location, in accordance with a determination that the second user interface is the same as the first user interface, the computer system displays the configuration user interface without including the second representation of the second user interface object among respective representations of other user interface objects associated with the first placement location; and in accordance with a determination that the second user interface is different from the first user interface, the computer system displays the configuration user interface including the second representation of the second user interface object among the respective representations of other user interface objects associated with the first placement location. For example, in some embodiments, when a widget is dragged from the stack and dropped onto the same page, the widget is removed from the stack and associated with a different placement location on the same page; and when the widget is dragging from the stack and dropped onto a different page, the widget remains in the stack and is also added to the different page. In some embodiments, when a widget is dragged from the stack and dropped onto another placement location, the widget is removed from the stack irrespective of whether the widget is dropped onto the same page or onto a different page, In some embodiments, after the second user interface object is no longer associated with the first placement location, the computer system does not display the second user interface object at the first placement location. In some embodiments, after the second user interface object is no longer associated with the first placement location, the computer system does not display the second user interface object at the first placement location, unless the second user interface object is selected to replace the wildcard widget associated with the first placement location. Redisplaying the configuration user interface including at least a portion of the first representation of the first user interface object without concurrently displaying at least a portion of the second representation of the second user interface object, after detecting the first user input that is directed to the respective portion of the configuration user interface corresponding to the first placement location and displaying the second user interface object at the second placement location on the second user interface in accordance with the movement of the first user input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E16, and 5E20-5E23 for example, where any widget that is removed from widget stack 5024 and placed in a respective home screen interface, may no longer be present in the widget stack 5024.

In some embodiments, after detecting the first user input that is directed to the respective portion of the configuration user interface corresponding to the first placement location and displaying a respective user interface object of the first user interface object and the second user interface object at the second placement location on the second user interface in accordance with the movement of the first user input, the computer system redisplays (10028) the first user interface (e.g., a user-arranged page of a multipage home screen user interface, a single page home screen user interface, a widget screen, etc.) that includes the first placement location. The computer system detects (10030) the occurrence of a condition corresponding switching which user interface object is to be displayed in the first placement location (e.g., a swipe input directed to the first placement location or a change in a context of the device, etc.) (e.g., an occurrence of another event that meets the respective condition). In response to detecting the condition, the computer system switches (10032) from displaying a current user interface object in the first placement location to displaying an updated user interface object in the first placement location, wherein the updated user interface object is selected from a subset of the plurality of user interface objects that does not include the respective user interface object of the first user interface object and the second user interface object that was displayed at the second placement location on the second user interface in accordance with the movement of the first user input, a user interface object for display at the first placement location on the first user interface. In some embodiments, when a widget is dragged from the stack and dropped onto another placement location, the widget is removed from the stack irrespective of whether the widget is dropped onto the same page or onto a different page, In some embodiments, after the widget is no longer associated with the first placement location, the computer system does not display the widget at the first placement location. In some embodiments, after the dragged widget is no longer associated with the first placement location, the computer system does not display the dragged widget at the first placement location (e.g., in response to user input that navigates through the stack at the first placement location, or in response to automatic switching, etc.). Switching from displaying a current user interface object in the first placement location to displaying an updated user interface object in the first placement location, in response to detecting the occurrence of a condition corresponding switching which user interface object is to be displayed in the first placement location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E16, and 5E20-5E23 for example, where any widget that is removed from widget stack 5024 and placed in a respective home screen interface, may no longer be present in the widget stack 5024.

In some embodiments, after displaying (e.g., while continuing to display, while displaying another user interface (e.g., another application, a lock screen, a wake screen, etc.) after navigating away from, etc.) the first user interface object corresponding to the first application at the first placement location in the first user interface (e.g., while the first user interface object is identified by the computer system as the currently displayed widget at the first placement location), the computer system detects (10034) occurrence of a second respective condition (e.g., detecting a user input that meets preset widget switching criteria (e.g., a swipe input in a predetermined direction, etc.), an automatic switching condition, etc.) or detecting that automatic application switching is triggered according to a preset schedule, according to navigation to the first user interface from another user interface (e.g., another page of the home screen user interface, an application user interface, a wake screen or lock screen, etc.), according to a change in location of the computer system, according to spatial proximity to another device, according to temporal proximity to a scheduled event, etc.). In response to detecting the occurrence of the second respective condition, the computer system displays (10036) the third user interface object (and ceasing displaying of the first or second user interface object at the first placement location, e.g., while maintaining display of other user interface objects (e.g., other widgets, and application icons) on the first user interface) at the first placement location in the first user interface (e.g., automatically, without user inputs, replacing display of the first or second user interface object with display of the third user interface object at the first placement location (e.g., the computer system replaces the first or second user interface object with the third user interface object as the currently displayed user interface object, and displays the third user interface object at the first placement location when displaying the first user interface)). The configuration user interface is displayed after displaying the second user interface object at the first placement location and displaying the third user interface object in the first user interface (e.g., while displaying the second user interface object or the third user interface object at the first placement location in the first user interface, optionally in accordance with a determination that first criteria are met (e.g., a tap input is detected at a first placement location that is associated with a plurality of user interface objects corresponding to different applications, while the first user interface containing the first placement location is in a first reconfiguration mode (e.g., icon reconfiguration mode))), and displaying the configuration user interface includes concurrently displaying at least a portion of a third representation of the first user interface object. In response to detecting the first user input that is directed to the respective portion of the configuration user interface (10038): in accordance with a determination that the first user input meets the selection criteria when directed to the third representation of the third user interface object of the plurality of user interface objects shown in configuration user interface and that the first user input includes movement that meets the first movement criteria (e.g., the first movement criteria require that, after the selection criteria are met, the movement reaches a peripheral region of the configuration user interface and remains in the peripheral region of the configuration user interface for a threshold amount of time, or that the movement is in a first direction (e.g., a direction that is different from or transverse to the scrolling direction of the configuration user interface), etc., in order for the first movement criteria to be met) (e.g., the third representation of the third user interface object is displayed after a scrolling input directed to the configuration user interface is detected), the computer system ceases display of the configuration user interface corresponding to the first placement location and displaying the third user interface object at the second placement location on the second user interface (e.g., the second user interface in the first reconfiguration mode (e.g., icon reconfiguration mode)) in accordance with the movement of the first user input (e.g., the second placement location is selected in accordance with a termination location of the first user input, and/or one or more movement characteristics of the movement, etc.) (e.g., two different placement locations on the same user interface, two placement locations at the same position but different user interfaces, two placement locations at different positions on two different user interfaces, etc.). In some embodiments, after detecting the first user input that is directed to the respective portion of the configuration user interface corresponding to the first placement location and displaying the third user interface object at the second placement location on the second user interface in accordance with the movement of the first user input (e.g., while displaying the first user interface in the first reconfiguration mode, and in accordance with a determination that the first criteria are met again (e.g., a tap input is detected at the first placement location)), the computer system redisplays the configuration user interface, including displaying at least a portion of the first representation of the first user interface object and the second representation of the second user interface object without displaying at least a portion of the third representation of the third user interface object. In some embodiments, the third user interface object is no longer associated with the first placement location after the third user interface object is dragged away from the configuration user interface corresponding to the first placement location and dropping into the second placement location different from the first placement location. In some embodiments, after the third user interface object is no longer associated with the first placement location, the computer system does not display the third user interface object at the first placement location. In some embodiments, after the third user interface object is no longer associated with the first placement location, the computer system does not display the third user interface object at the first placement location, unless the third user interface object is selected to replace the wildcard widget associated with the first placement location. Ceasing display of the configuration user interface corresponding to the first placement location and displaying the third user interface object at the second placement location on the second user interface in accordance with the movement of the first user input, in accordance with a determination that the first user input meets the selection criteria when directed to the third representation of the third user interface object of the plurality of user interface objects shown in configuration user interface and that the first user input includes movement that meets the first movement criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated for example in FIGS. 5E8-5E9, 5E11, 5E16, and 5E20-5E23. The top widget on widget stack 5024*b* may be replaced by another widget (e.g., a third widget) within the widget stack based upon passage of time (e.g., after a certain amount of time, the top widget will be automatically switched) (FIGS. 5E8-5E9). Subsequently, a stack-specific configuration user interface 5026 corresponding to widget stack 5024*b* that includes concurrently displaying portions of at least two widgets in the widget stack may be displayed overlaid on home screen 5202' (FIG. 5E11). In response to detecting drag input meeting selection and movement criteria on a representation of the third widget in the stack-specific configuration user interface 5026, the third widget may be removed from stack 5024 and is placed in home screen user interface 5202' (FIGS. 5E16 and 5E20-5E23).

In some embodiments, displaying the configuration user interface corresponding to the first placement location includes (10040): before detecting a scrolling input directed to the configuration user interface (e.g., upon initial display of the configuration user interface in response to the tap input at the first placement location detected when the first user interface is in the first reconfiguration mode), concurrently displaying (10042) at least portions of respective representations of a first subset of the plurality of user interface objects associated with the first placement location; and after detecting the scrolling input directed to the configuration user interface, concurrently displaying (10044) at least portions of respective representations of a second subset of the plurality of user interface objects associated with the first placement location, the second subset being different from the first subset. For example, in some embodiments, the configuration user interface displays a scrollable list of representations of the plurality of user interface objects (e.g., widgets in the stack) associated with the first placement location, and only two or three of the user interface objects are concurrently visible in the configuration user interface at a time. In some embodiments, representations of only one or two of the plurality of user interface objects are fully visible in the configuration user interface at a time. Concurrently displaying at least portions of respective representations of a second subset of the plurality of user interface objects associated with the first placement location, performs an operation when a set of conditions has been met without requiring further user input, after detecting the scrolling input directed to the configuration user interface. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E11-5E13, where at least portions of multiple widgets are displayed in stacks-specific configuration user interface 5026. Prior to scrolling, portions of the representations of widgets 50221 and 5022*g* are displayed (FIG. 5E11). As the list of widgets in widget stack 5024*b* is scrolled, different portions of widget representations are displayed (FIGS. 5E12-5E13).

In some embodiments, in response to detecting the first user input that is directed to the respective portion of the configuration user interface (10046): in accordance with a determination that the first user input meets first criteria (e.g., criteria for detecting a tap input, criteria for detecting a touch-hold input, etc.) when directed to the first representation of the first user interface object, the computer system displays (10048) a first plurality of selectable options corresponding to configuration options (e.g., size, type, etc.) associated with the first user interface object. In accordance with a determination that the first user input meets the first criteria (e.g., criteria for detecting a tap input, criteria for detecting a touch-hold input, etc.) when directed to the second representation of the second user interface object, the computer system displays (10050) a second plurality of selectable options corresponding to configuration options (e.g., size, type, etc.) associated with the second user interface object. In some embodiments, in response to detecting the first user input, in accordance with a determination that the first user input meets the first criteria when directed to the third representation of the third user interface object, the computer system displays a third plurality of selectable options corresponding to configuration options associated with the third user interface object. For example, in some embodiments, a tap input on a representation of a widget in the list of widgets associated with the first placement location that is displayed in the stack-specific configuration user interface causes display of a set of widget-specific configuration options for the tapped widget. Displaying the first plurality of selectable options corresponding to configuration options associated with the first user interface object or the second plurality of selectable options corresponding to configuration options associated with the second user interface object, depending on whether is directed to the first representation of the first user interface object or the second representation of the second user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E11 and 5E15 for example, where widget-specific configuration platter 5352 is shown. A tap input by contact 6114 is detected at a location corresponding to widget 50221 in stack-specific configuration user interface 5026 (FIG. 5E11). In response to detecting the tap input by contact 6114, widget-specific configuration platter 5352 is displayed, including multiple widget configuration options 5394 and a widget preview 50221" (FIG. 5E15).

In some embodiments, the first representation of the first user interface object in the configuration user interface is (10052) a reduced scale representation of the first user interface object, and the second representation of the second user interface object in the configuration user interface is a reduced scale representation of the second user interface object. In some embodiments, the third representation of the third user interface object in the configuration user interface is a reduced scale representation of the third user interface object. In some embodiments, the reduced scale representation for a respective user interface object is a visual replica of the respective user interface object with a reduced size relative to the respective user interface object displayed on the first user interface in a normal mode (e.g., not an icon reconfiguration mode). Having the first representation of the first user interface object in the configuration user interface being a reduced scale representation of the first user interface object, and the second representation of the second user interface object in the configuration user interface being a reduced scale representation of the second user interface object, provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIG. 5E15 for example, where widget preview 50221" displayed in the widget-specific configuration platter 5352 is at least somewhat smaller than widget 50221 as shown in a respective user-arranged home screen user interface.

In some embodiments, displaying the first representation of the first user interface object in the configuration user interface includes (10054): at a first time, displaying (10056) first information from the first application in the first representation of the first user interface object while the first representation of the first user interface is displayed in the configuration user interface; and at a second time later than the first time (e.g., after the reconfiguration user interface is redisplayed after the computer system displayed another user interface (e.g., the second user interface, a lock screen user interface, etc.), or while the reconfiguration user interface is continuing to be displayed since the first time, etc.), displaying (10058) second information from the first application in the first representation of the first user interface object while the first representation of the first user interface is displayed in the configuration user interface, wherein the second information is different from the first information. For example, in some embodiments, in accordance with a determination that the application content that is configured to be displayed in the first user interface object has been updated by the computer system (e.g., due to interaction with the first application, or events that occurred in the computer system, etc.), the computer system updates the first representation of the first user interface object to display the updated application content while the first representation of the first user interface object is displayed in the configuration user interface associated with the first placement location. Displaying either the first information or the second information from the first application in the first representation of the first user interface object, depending on the current time, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E11-5E12 for example, where widget representations in the stack-specific configuration user interface 5026 includes current application data.

In some embodiments, in response to detecting the first user input that is directed to the respective portion of the configuration user interface (10060): in accordance with a determination that the first user input meets the selection criteria when directed to the first representation of the first user interface object of the plurality of user interface objects shown in the configuration user interface and that the first user input includes movement that meets second movement criteria different from the first movement criteria (e.g., the second movement criteria require that, after the selection criteria are met, the movement does not reach a peripheral region of the configuration user interface (e.g., does not meet the first movement criteria), or that the movement is in a second direction (e.g., a direction along the scrolling direction of the configuration user interface), etc., in order for the second movement criteria to be met) (10062): the computer system changes (10064), in the configuration user interface, a sequential order of the first representation of the first user interface object among respective representations of the plurality of user interface objects associated with the first placement location (e.g., moving the first representation of the first user interface object from a first side of the second representation of the second user interface object to a second side of the second representation of the second user interface in the configuration user interface (e.g., changing the sequential order of the representations of the plurality of user interface objects in the configuration user interface)) in accordance with the movement of the first user input. In some embodiments, changing the order of the representations of the user interface objects in the configuration user interface affects the order by which the widgets are presented in accordance with schedule, and/or which widget is displayed next in response to a swipe input directed to the first placement location. In some embodiments, the computer system, in response to detecting the first user input that is directed to the respective portion of the configuration user interface, in accordance with a determination that the first user input does not meet the selection criteria when directed to the first representation of the first user interface object of the plurality of user interface objects shown in the configuration user interface and that the first user input includes movement that meets the second movement criteria different from the first movement criteria, scrolling the configuration user interface (e.g., without changing the sequential order of the first representation of the first user interface object among the respective representations of the plurality of user interface objects associated with the first placement location) in accordance with the movement of the first user input. For example, in some embodiments, a touch-hold input followed by a drag input that is directed to a representation of a widget causes the representation of the widget to be dislodged from its original position in the configuration user interface. The representation of the widget will be either dragged to another page that is displayed in response to the movement of the input into and held in a peripheral region of the configuration user interface or be repositioned in the sequence of representations of widgets within the configuration user interface in accordance with movement of the first user input in a scrolling direction of the configuration user interface. In contrast, a touch and drag input that is directed to the representation of the widget will not cause display of another user interface repositioning of the representation of the widget within the configuration user interface, instead, the configuration user interface is scrolled in accordance with the movement of first user input if the movement is in the scroll direction of the configuration user interface. Changing, in the configuration user interface, a sequential order of the first representation of the first user interface object among respective representations of the plurality of user interface objects associated with the first placement location in accordance with the movement of the first user input in response to detecting the first user input that is directed to the respective portion of the configuration user interface and in accordance with a determination that the first user input meets the selection criteria when directed to the first representation of the first user interface object, reduces the number of inputs needed to perform an operation (e.g., a narrower example). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5E16-519 for example, where widgets in a widget stack are reordered in stack-specific configuration user interface 5026. In response to detecting drag input by contact 6128 on widget 50221 (which is visually distinguished), widget 50221 is dragged downwards past the representation of widget 5022*g* in the stack-specific configuration user interface 5026 (FIGS. 5E16-5E18). After contact 6128 is terminated, the ordering of widgets within the widget stack is reordered in accordance with the insertion of widget 50221 between widgets 5022*g* and widget 5022*k*, where the widget indicators 5330 indicate the updated widget ordering (FIG. 5E19).

In some embodiments, while displaying the first user interface (e.g., while not in the first reconfiguration mode (e.g., icon reconfiguration mode)), including displaying a respective one of the plurality of user interface objects associated with the first placement location at the placement location (e.g., displaying the first user interface object, the second user interface object, the third user interface object, etc.), the computer system detects (10066) a second user input that is directed to the first placement location. In response to detecting the second user input that is directed to the first placement location (10068): in accordance with a determination that the second user input meets second criteria (e.g., criteria for detecting a swipe input (e.g., a swipe input in a preset direction (e.g., horizontal direction, vertical direction, etc.))) (and optionally, a determination that the first user interface is not in the first reconfiguration mode (e.g., the first user interface is in a normal mode where the user interface object displayed at the first placement location is automatically switched in accordance with automatic switching criteria being met)), the computer system replaces (10070) display of the respective one of the plurality of user interface objects associated with the first placement location with display of another user interface object of the plurality of user interface object different from the respective one of the plurality of user interface objects (e.g., the next widget in the stack in accordance with a sequential order of the representations of the widgets shown in the reconfiguration user interface in the direction of the swipe input). Replacing display of the respective one of the plurality of user interface objects associated with the first placement location with display of another user interface object of the plurality of user interface object different from the respective one of the plurality of user interface objects, in accordance with a determination that the second user input meets second criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E11-513 for example, where widget scrolling is performed in stack-specific configuration user interface 5026. While widgets in widget stack 5024*b* are displayed in stack-specific configuration user interface 5026, swipe input by contact 6110 is detected on a widget 5022*g* within widget stack 5024*b* (FIG. 5E11). In response to movement of swipe input by contact 6110 (e.g., vertical movement), the widgets in widget stack 5024*b* are scrolled (FIGS. 5E12-5E13), where the top widget (e.g., the widget displayed on top of widgets stack 5024*b* in a respective user-arranged home screen user interface) is indicated by widget indicators 5330.

In some embodiments, in response to detecting the second user input that is directed to the first placement location (e.g., while displaying the first user interface outside of the first reconfiguration mode) (10072): in accordance with a determination that the second user input meets the second criteria (e.g., criteria for detecting a swipe input (e.g., a swipe input in a preset direction (e.g., horizontal direction, vertical direction, etc.))) (and optionally, a determination that the first user interface is not in the first reconfiguration mode (e.g., the first user interface is in a normal mode where the user interface object displayed at the first placement location is automatically switched in accordance with automatic switching criteria being met)), the computer system concurrently displays (10074) the respective one of the plurality of user interface objects and indication of said another user interface object at the first placement location before replacing display of the respective one of the plurality of user interface object with display of said another user interface object at the first placement location. For example, in some embodiments, upon detecting a start of the second user input (e.g., touch down of a contact on the first placement location, a gaze input directed to the first placement location, etc.), the size of the respective one of the plurality of user interface objects that is currently displayed at the first placement location is reduced (e.g., the currently displayed widget appears to be pushed backward away from the user and reduced in size), and portions of other user interface objects adjacent to the currently displayed user interface objects in the stack are displayed (e.g., edges of other widgets immediately before and/or after the currently displayed widget in the widget stack are displayed with the currently displayed widget). In response to continuation of the second user input (e.g., detecting movement of the contact, detecting a swipe gesture performed by a hand of the user, etc.), an adjacent user interface object of the currently displayed user interface object at the first placement location is displayed in its regular size. Concurrently displaying the respective one of the plurality of user interface objects and indication of said another user interface object at the first placement location before replacing display of the respective one of the plurality of user interface object with display of said another user interface object at the first placement location provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5E12-513 for example, where widget scrolling is performed in stack-specific configuration user interface 5026. As widgets are scrolled in accordance with movement of contact 6110, multiple widgets are displayed in the stack-specific configuration user interface 5026.

In some embodiments, displaying the second user interface object in response to detecting the occurrence of the respective condition includes (10076): displaying, within the second user interface object, first application content from the second application and second application content from the second application, wherein the first application content is displayed with a visual indication that the first application content contributed to selection of the second user interface object for display at the first placement location in response to the occurrence of the respective condition (e.g., the first application content is marked or highlighted to indicate why the second application is selected by the computer system for display at the first placement location in response to the occurrence of the respective condition). In some embodiments, displaying the second user interface object in response to detecting the occurrence of the respective condition includes: in accordance with a determination that the respective condition is a first condition, displaying, within the second user interface object, first application content and second application content, wherein the first application content is visually highlighted relative to the second application content to indicate the first application content made a larger contribution to the selection of the second user interface object for display at the first placement location relative to the second application content in response to the occurrence of the first condition; and in accordance with a determination that the respective condition is a second condition different from the first condition, displaying, within the second user interface object, the first application content and the second application content, wherein the second application content is visually highlighted relative to the first application content to indicate the second application content made a larger contribution to the selection of the second user interface object for display at the first placement location relative to the first application content in response to the occurrence of the second condition. Displaying the first application content with a visual indication that the first application content contributed to selection of the second user interface object for display at the first placement location in response to the occurrence of the respective condition provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5E8-5E9 for example, where after a respective widget on top of a respective widget stack is automatically switched, a visual indication of how the application corresponding to the respective widget contributed to the switching is displayed.

In some embodiments, the visual indication (e.g., a call out or visual marking) highlights (10078) the first application content relative to the second application content in the second user interface object. Highlighting, with the visual indication, the first application content relative to the second application content in the second user interface object provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5E8-5E9 for example, where, for a respective widget that is automatically switched to the top of a widget stack, a visual indication of how the application corresponding to the respective widget highlights specific application content for the respective widget.

In some embodiments, in accordance with satisfaction of a first predetermined condition, the computer system displays (10080) an indicator object that indicates an ordinal position of a currently displayed user interface object at the first placement location among the plurality of user interface objects associated with the first placement location. In accordance with a determination that a predetermined amount of time has elapsed since display of the indicator object, the computer system ceases to display the indicator object while maintaining display of the currently displayed user interface object at the first placement location. For example, in some embodiments, the indicator object includes respective widget indicator icons corresponding to the plurality of user interface objects associated with the first placement location in an order that corresponds to the order of the user interface objects in the stack, and the respective widget indicator icon corresponding to the currently displayed user interface object at the first placement location is visually highlighted relative to the widget indicator icons corresponding to other user interface objects in the stack. After a period of time, the respective widget indicator icons of the plurality of user interface objects cease to be displayed if the first predetermined conditions is not met again by anew event. Displaying the indicator object in accordance with satisfaction of a first predetermined condition, and ceasing to display the indicator object in accordance with a determination that a predetermined amount of time has elapsed, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E1-5E2 for example, where widget indicators for a widget stack can be displayed. Swipe input by contact 6100 is detected along an edge of widget stack 5024*b* (FIG. 5E1). In response to the swipe input, widget indicators 5330 for widget stack 5024*b* are displayed, indicating both the number of widgets within widget stack 5024*b* and also the relative position of the widgets within the widget stack (FIG. 5E2). Over time, while user-arranged home screen user interface 5202 is in normal mode, the widget indicators will fade.

In some embodiments, the first predetermined condition is satisfied (10082) in accordance with a determination that the first user interface is displayed in a first configuration mode (e.g., icon reconfiguration mode). In some embodiments, the indicator object is displayed concurrently with the second user interface object when the second user interface object is the currently displayed user interface object at the first placement location and the first user interface enters into the first reconfiguration mode in response to a user input that triggers the first configuration mode. Displaying the indicator object in accordance with a determination that the first user interface is displayed in a first configuration mode performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5E8 for example, where widget indicators 5330 are displayed while user-arranged home screen user interface 5202' is in a first configuration mode.

In some embodiments, the first predetermined condition is satisfied (10084) in accordance with a determination that a currently displayed user interface object at the first placement location is automatically updated by the computer system (e.g., in accordance with satisfaction of the automatic switching criteria by the occurrence of the respective condition). In some embodiments, the indicator object is displayed upon replacement of the currently displayed widget at the first placement location with another widget in the widget stack associated with the first placement location, and ceases to be displayed after a preset amount of time after the update of the widget at the first placement location. Displaying the indicator object in accordance with a determination that a currently displayed user interface object at the first placement location is automatically updated by the computer system performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5E9 for example, where widget indicators 5330 are displayed after widget 50221 has automatically been switched to the top widget in widget stack 5024*b*, even though user-arranged home screen user interface 5202 is in a normal mode.

In some embodiments, the first predetermined condition are satisfied (10086) in accordance with a determination that the first user interface is displayed in response to navigation from another user interface (e.g., another page of the home screen user interface, an application user interface, a lock screen user interface, a wake screen user interface, etc.) different from the first user interface. Displaying the indicator object in accordance with a determination that that the first user interface is displayed in response to navigation from another user interface different from the first user interface performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5E31-5E32 for example, where switching from home screen user interface 5204 to adjacent home screen user interface 5202, in response to swipe input by 6138, causes display of widget indicators 5330 for widget stack 5024*b*.

In some embodiments, the indicator object serves (10088) as a widget navigation element. While displaying the indicator object, the computer system detects (10090) a swipe input from a first position to a second position along the indicator object. In response to detecting the swipe input, the computer system navigates (10092), within the first placement location, from a currently displayed user interface object to another user interface object of the plurality of user interface objects in accordance with the swipe input (e.g., in accordance with one or more movement characteristics (e.g., start and end locations, speed, duration, etc.) of the swipe input). Navigating, within the first placement location, from a currently displayed user interface object to another user interface object of the plurality of user interface objects in accordance with the swipe input, in response to detecting the swipe input reduces the number of inputs needed to perform an operation (e.g., a narrower example). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5E2-5E3 for example, where widgets within a widget stack can be switched in response to user input. Widget stack 5024*b* includes 3 widgets, as indicated by widget indicators 5330 (FIG. 5E2). Swipe input by contact 6100 is detected along widget indicators 5330; and in response to the swipe input, the top widget 5022*g* in widget stack 5024*b* is replaced with widget 5022*k* from the widget stack 5024*b* (FIGS. 5E2-5E3).

It should be understood that the particular order in which the operations in FIGS. 10A-10H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 11000, 12000, 13000, and 14000) are also applicable in an analogous manner to method 10000 described above with respect to FIGS. 10A-10H. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 10000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 9000, 11000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10H are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 11A-11D are flow diagrams illustrating a method 11000 for interacting with multiple pages of a home screen user interface (e.g., in an icon reconfiguration mode, in a page editing mode, and when transitioning between the two modes, etc.), in accordance with some embodiments.

The method 11000 relates to providing a page editing mode in which whole pages of a home screen user interface can be managed (e.g., hidden, unhidden, reordered, etc.). As disclosed herein, the computer system allows easy transitions between an icon reconfiguration mode in which positions and/or availability of application icons can be adjusted in accordance with user input and a page editing mode in which positions and/or availability of pages of a home screen user interface can be adjusted in accordance with user inputs. Specifically, the computer transitions from displaying a first home screen page in the icon reconfiguration mode to displaying a page editing user interface in response to an input detected while displaying the first home screen page, and transitions from displaying the page editing user interface to displaying a second home screen page in the icon reconfiguration mode in response to an input detected while displaying the page editing user interface. Allowing direct transitioning back and forth between the icon reconfiguration mode and the page editing mode, and allowing user selection of the destination page from within the page editing mode when transitioning from the page editing mode to the icon reconfiguration mode enhance the operability of the device (e.g., by making it easier to reviewing the pages and application icons on the page, and adjusting application icon positions as well as whole pages in a less restricted and non-linear manner) and make the user-device interface more efficient (e.g., by helping the user to achieve an intended outcome with required inputs and reducing user mistakes when operating/interacting with the device), which improves battery life of the device (e.g., by helping the user to use the device more quickly and efficiently).

The method 11000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component.

In the method 11000, the computer system displays (11002) a first page of a multipage home screen user interface in a first reconfiguration mode (e.g., icon reconfiguration mode), wherein respective positions of a first plurality of application icons in the first page of the multipage home screen user interface are adjustable in accordance with user inputs in the first reconfiguration mode (e.g., application icons can be repositioned in the first page in response to drag inputs directed to the application icons, while the first page is in the first reconfiguration mode). In some embodiments, the computer system displays the first page of the multipage home screen user interface in the first reconfiguration mode in response to a user input that corresponds to a request to enter the first reconfiguration mode (e.g., a tap-hold input on an application icon, a tap-hold followed by a drag on an application icon, a tap-hold input on an unoccupied area of the first page, etc.) while the first page is displayed in the normal mode (e.g., a mode in which a tap input on an application icon launches the corresponding application, and positions of the application icons on the page are not adjustable, etc.). In some embodiments, the computer system displays the first page of the multipage home screen user interface in response to a navigation input (e.g., a swipe input on a page navigation element, a swipe input on an application icon, a widget, or an unoccupied area of a currently displayed page, etc.) that is detected while another page of the multipage home screen user interface is displayed in the first reconfiguration mode. In some embodiments, the computer system displays the first page of the multipage home screen user interface in response to a user input that corresponds to a request to enter the first reconfiguration mode from the second reconfiguration mode, where the user input (e.g., a tap input by a contact, an in-air tap input or a micro-tap input detected in conjunction with a gaze input) is directed to a representation of the first page while the user interface of the second reconfiguration mode is displayed. While displaying the first page of the multipage home screen user interface in the first reconfiguration mode, the computer system detects (11004) a first input (e.g., a tap input on the highlighted page navigation element that is displayed in the first page in the first reconfiguration mode) that corresponds to a request to enter a second reconfiguration mode (e.g., page editing mode) from the first reconfiguration mode (e.g., the icon reconfiguration mode), wherein the availability of one or more pages in the multipage home screen user interface (e.g., whether a page is displayed when the computer system navigates through the sequence of pages of the multipage home screen user interface in response to user inputs while the multipage home screen user interface is in the first reconfiguration mode or the normal mode) can be changed in accordance with user inputs in the second reconfiguration mode (e.g., by deleting or hiding/un-hiding one or more of the pages of the multipage home screen user interface in a page editing user interface that displays representations of the pages of the multipage home screen user interface). In some embodiments, relative positions of the available pages are adjustable in accordance with user inputs in the second reconfiguration mode (e.g., by rearranging the order of the representations of the pages of the multipage home screen user interface in a sequence of the representations of the pages in the page editing user interface). In response to detecting the first input, the computer system replaces (11006) display of the first page of the multipage home screen user interface in the first reconfiguration mode with display of respective representations of at least two of the plurality of pages of the multipage home screen user interface in the second reconfiguration mode (e.g., replacing display of the first page in the first reconfiguration mode with display of the page editing user interface), including at least a first representation of the first page of the multipage home screen user interface, and a second representation of a second page of the multipage home screen user interface that is different from the first page of the multipage home screen user interface. In some embodiments, the page editing user interface includes respective representations of user-arranged pages that are presently available in the multipage home screen user interface and pages that were previously available but are now deleted or hidden and not presently available in the multipage home screen user interface. In some embodiments, representations of deleted or hidden pages are displayed among the representations of pages that are presently available in the multipage home screen user interface in the same sequence and are visually distinguished from the representations of pages that are presently available. In some embodiments, representations of deleted or hidden pages are displayed in a separate area (e.g., concurrently displayed with, or not concurrently displayed with) from the representations of pages that are presentable available in the multipage home screen user interface. While displaying the respective representations of the at least two of the plurality of pages of the multipage home screen user interface in the second reconfiguration mode, including the first representation of the first page and the second representation of the second page, the computer system detects (11008) a second input (e.g., a user input that is directed to a respective representation of a respective page of the plurality of pages (e.g., the first representation of the first page, the second representation of the second page, etc.) (e.g., a contact or gaze input is detected at a location of the respective representation of the respective page in the page editing user interface), a user input that is directed to a portion of the page editing user interface that is unoccupied or that is occupied by a user interface control, etc.). In response to detecting the second input, in accordance with a determination that the second input is directed to the second representation of the second page that is displayed in the second reconfiguration mode, and that the second input meets first criteria (e.g., criteria for detecting a tap input, a long tap, etc.), the computer system displays (11010) the second page of the multipage home screen user interface in the first reconfiguration mode, wherein respective positions of a second plurality of application icons in the second page of the multipage home screen user interface are adjustable in accordance with user inputs in the first reconfiguration mode (e.g., application icons can be repositioned in the second page in response to drag inputs directed to the application icons, while the second page is in the first reconfiguration mode). These features are illustrated in FIGS. 5F1-5F6, for example, where a first user-arranged home screen 5302' in the first reconfiguration mode (FIG. 5F2) is replaced with a page editing user interface 5305 (FIG. 5F6), in response to a tap user input by a contact 6202 directed to a highlighted page navigation element 5004 (FIG. 5F3). Subsequently, another tap input by a contact 6206 on a representation 5306" of the second user-arranged home screen 5306 on the page editing user interface 5305 (FIG. 5F7) causes the computer system to display the corresponding user-arranged home screen 5306' in the first reconfiguration mode (FIG. 5F11).

In some embodiments, the respective representations of the plurality of pages of the multipage home screen user interface are (11012) displayed in accordance with a first sequential order that corresponds to a sequential order of the plurality of pages in the multipage home screen user interface displayed outside of the second reconfiguration mode (e.g., in the first reconfiguration mode and the normal mode, etc.). In response to detecting the second input, in accordance with a determination that the second input is directed to the second representation of the second page that is displayed in the second reconfiguration mode, and that the second input meets second criteria (e.g., criteria for detecting a touch-hold and drag input, criteria for detecting a selection input (e.g., a tap-hold input or a gaze input) followed by a drag input (e.g., a swipe input by a contact, an in air swipe input, etc.) in a first direction along the sequence of representations, etc.) different from the first criteria, the computer system adjusts (11014) a respective position of the second representation of the second page among the respective representations of the plurality of pages in accordance with the second input (e.g., moving the second representation from one side of the first representation to another side of the first representation), wherein the sequential order of the plurality of pages in the multipage home screen user interface displayed outside of the second reconfiguration mode is adjusted in accordance with the adjustment of the respective position of the second representation of the second page made in response to the second input. In some embodiments, after the respective position of the second representation of the second page has been adjusted in accordance with the second input, the computer system detects a user input that corresponds to a request to exit the second reconfiguration mode (e.g., to enter the first reconfiguration mode or the normal mode), and in response to the user input, the computer system displays a page of the multipage home screen user interface (e.g., the first page, the second page, a third page, etc.) outside of the second reconfiguration mode (e.g., in the first reconfiguration mode or the normal mode). While displaying the page of the multipage home screen user interface outside of the second reconfiguration mode, the computer system detects a sequence of one or more navigation inputs for navigating through the pages available in the multipage home screen user interface, and the computer system displays the second page before displaying the first page in accordance with a determination that the second representation of the second page precedes the first representation of the first page in the page editing user interface after the second user input; and the computer system displays the second page after displaying the first page in accordance with a determination that the second representation of the second page succeeds the first representation of the first page in the page editing user interface after the second user input. Adjusting the sequential order of the plurality of pages in the multipage home screen user interface, based on the adjusted position of the representations of the pages of the multipage home screen user interface, in response to detecting an input that meets criteria, reduces the number of inputs needed to perform an operation (e.g., adjusting the relative position of pages in the multipage home screen user interface). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5F18-5F20, for example, where a tap-and-hold input by a contact 6226 (FIG. 5F18) selects the representation 5302" of the first user-arranged home screen 5302 (FIG. 5F18), and subsequently drags the representation 5302" of the first user-arranged home screen 5302 to switch place with the representation 5306" of the second user-arranged home screen 5306 (FIGS. 5F18-5F20). After the lift-off of the contact 6226, the corresponding first user-arranged home screen 5302 and the second user-arranged home screen 5306 switch places in the multipage home screen user interface, as illustrated in FIGS. 5F24-5F25.

In some embodiments, in response to detecting the second input, in accordance with a determination that the second input meets third criteria (e.g., criteria for detecting a swipe input in a second direction (e.g., upward direction, downward direction, etc.) that is different from or transverse to the direction along (e.g., left to right, right to left, etc.) the sequence of representations of the pages (e.g., in an unoccupied area of the page editing user interface, anywhere on the page editing user interface, or from the bottom edge of the page editing user interface, etc.), criteria for detecting a tap input on an exit affordance of the page editing user interface, criteria for detecting a tap input on the first representation of the first page, etc.) that are different from the first criteria (and different from the second criteria), the computer system redisplays (11016) the first page of the multipage home screen user interface in the first reconfiguration mode. Redisplaying the first page of the multipage home screen user interface in response to detecting an input satisfying certain criteria reduces the number of inputs needed to perform an operation (e.g., a returning to a specific home screen). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5F7 and 5F16, for example, where the page editing user interface 5305 (FIG. 5F7) is replaced with the first user-arranged home screen 5302' in the first reconfiguration mode (FIG. 5F16), in response to an upward edge swipe input by a contact 6210 (FIG. 5F7).

In some embodiments, while redisplaying the first page of the multipage home screen user interface in the first reconfiguration mode, the computer system detects (11018) a third input that meets the third criteria (e.g., criteria for detecting a swipe input in the second direction (e.g., upward direction, downward direction, etc.) that is different from or transverse to the direction along (e.g., left to right, right to left, etc.) the sequence of representations of the pages in the page editing user interface (e.g., in an unoccupied area of the first page, anywhere on the first page, or from the bottom edge of the first page, etc.), criteria for detecting a tap input on an exit affordance of the first page (e.g., same exit affordance shown on the page editing user interface), etc.). In response to detecting the third input that meets the third criteria, the computer system replaces display of the first page in the first reconfiguration mode with display of the first page in a normal mode (e.g., in the normal mode, a swipe input or tap input on the page navigation element causes navigation to another page of the multipage home screen user interface in the normal mode), wherein a respective application icon of the plurality of application icons in the first page displayed in the normal mode, when activated by an input that meets the first criteria (e.g., criteria for detecting a tap input, etc.), causes display of a respective application corresponding to the respective application icon. For example, in some embodiments, an upward swipe input directed to the page editing user interface causes the computer system to navigate from the page editing user interface to the first page of the multipage home screen user interface in the first reconfiguration mode, and another upward swipe input directed to the first page of the multipage home screen user interface in the first reconfiguration mode causes the computer system to exit the first reconfiguration mode and display the first page of the multipage home screen user interface in the normal mode. Replacing the display of the first page in the first reconfiguration mode with display of the first page in the normal mode, in response to detecting an input that meets certain criteria, reduces the number of inputs needed to perform an operation (e.g., exiting an edit mode user interface). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5F21-5F22, for example, where the fourth user-arranged home screen 5309' in the first reconfiguration mode (FIG. 5F21) is displayed in the normal mode (e.g., the fourth user-arranged home screen 5309 in FIG. 5F22) in response to an upward edge swipe input by a contact 6230 (FIG. 5F21).

In some embodiments, replacing display of the first page of the multipage home screen user interface in the first reconfiguration mode with display of the respective representations of at least two of the plurality of pages of the multipage home screen user interface in the second reconfiguration mode (e.g., replacing display of the first page in the first reconfiguration mode with display of the page editing user interface) includes (11020): displaying (11022) an animated transition showing the first page of the multipage home screen user interface shrinking down and moving toward a location occupied by the first representation of the first page in the second reconfiguration mode, and representations of one or more pages adjacent to the first page in the multipage home screen user interface coming into view adjacent to the first representation of the first page (e.g., and moving toward corresponding locations in the second reconfiguration mode). For example, in some embodiments, the first page appears to recede from the display away from the user, and as the view of the first page gets smaller, other pages adjacent to the first page in the sequence of pages in the multipage home screen user interface are pulled into view on the display. In the final state, the representations of the pages are arranged on the page editing view in a grid of a corresponding size (e.g., 1×2, 1×3, 2×2, 2×3, 3×3, etc.) or scrollable grid of a fixed maximum size (e.g., 3×3). Displaying an animated transition showing the first page of the multipage home screen user interface shrinking down and moving toward a location occupied by the first representation of the first page in the second reconfiguration mode, when replacing display of the first page of the multipage home screen user interface in the first reconfiguration mode with display of the respective representations of at least two of the plurality of pages of the multipage home screen user interface in the second reconfiguration mode, provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5F3-5F6, for example, where a zoom-out animation (FIGS. 5F4-5F5) when transitioning from the first user-arranged home screen 5302' in the first reconfiguration mode (FIG. 5F3) to the page editing user interface 5305 (FIG. 5F6) is shown.

In some embodiments, replacing display of the first page of the multipage home screen user interface in the first reconfiguration mode with display of the respective representations of at least two of the plurality of pages of the multipage home screen user interface in the second reconfiguration mode (e.g., replacing display of the first page in the first reconfiguration mode with display of the page editing user interface) includes (11024): in accordance with a determination that the multipage home screen user interface includes a first number of pages, displaying (11026) the respective representations of the first number of pages with a first size in the second reconfiguration mode; and in accordance with a determination that the multipage home screen user interface includes a second number of pages that is different from the first number of pages, displaying (11028) the respective representations of the second number of pages with a second size that is different from the first size. For example, in some embodiments, if there are two user-arranged pages in the multipage home screen user interface, the representations of the two pages are displayed side by side in the page editing user interface, and the width of the page editing user interface is divided equally between the representations of the two user-arranged pages; if there are three user arranged pages in the multipage home screen user interface, the representations of the three pages are displayed side by side in a row in the page editing user interface and the width of the page editing user interface is divided equally between the representations of the three user-arranged pages; and if there are four user-arranged pages in the multipage home screen user interface, the representations of the four pages are displayed in a two-by-two grid that occupies the page editing user interface, where the size of the representations of the pages are smaller than that shown when there are two pages or three pages in the multipage home screen user interface. Displaying the respective representations of the number of pages with a first or a second size, depending on whether the number of pages is a first number of a second number, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F26-5F30, for example, where depending on the number of the representations of user-arranged home screens on the page editing user interface 5305, the computer system select different predefined grid for displaying the representations of the user-arranged home screens, which in turn causes the representations of the user-arranged home screens to have different sizes (e.g., the representations of the user-arranged home screens in FIG. 5F29 are smaller than those in FIG. 5F26).

In some embodiments, replacing display of the first page of the multipage home screen user interface in the first reconfiguration mode with display of the respective representations of at least two of the plurality of pages of the multipage home screen user interface in the second reconfiguration mode (e.g., replacing display of the first page in the first reconfiguration mode with display of the page editing user interface) includes (11030): in accordance with a determination that the multipage home screen user interface includes a third number of pages, displaying (11032) the respective representations of the third number of pages in accordance with a first arrangement (e.g., in a single row, in two rows, etc.) in the second reconfiguration mode; and in accordance with a determination that the multipage home screen user interface includes a fourth number of pages that is different from the third number of pages, displaying (11034) the respective representations of the fourth number of pages with a second arrangement that is different from the first arrangement. For example, in some embodiments, if there are less than three user-arranged pages in the multipage home screen user interface, the representations of the pages are displayed side by side in a single row in the page editing user interface; if there are four to six user arranged pages in the multipage home screen user interface, the representations of the three pages are displayed side by side in a two by three grid in the page editing user interface; and if there are seven to nine user-arranged pages in the multipage home screen user interface, the representations of the seven to nine pages are displayed in a three-by-three grid that occupies the page editing user interface. Displaying the respective representations of the number of pages with a first or a second arrangement, depending on whether the number of pages is a third number or a fourth number, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F26-5F30, for example, where depending on the number of the representations of user-arranged home screens on the page editing user interface 5305, the computer system selects different predefined grid for displaying the representations of the user-arranged home screens (e.g., a 3×3 grid in FIG. 5F29 and a 2×2 grid in FIG. 5F26).

In some embodiments, in response to detecting the second input, in accordance with a determination that the second input corresponds to a request to hide the first page (e.g., a tap-hold input on the first representation of the first page (e.g., distinguished from a tap input on the first representation which causes navigation to the first page in the first reconfiguration mode) or a tap input an icon (e.g., show/hide affordance, a checkbox, etc.) associated with the first representation of the first page, etc.), the computer system visually distinguishes (11036) the first representation of the first page from the second representation of the second page that is displayed in the second reconfiguration mode. While displaying the first representation of the first page that is visually marked relative to the second representation of the second page in the second reconfiguration mode, the computer system detects (11038) a respective input (e.g., detecting an input that corresponds to a request to exit the second reconfiguration mode (e.g., detecting a user input that meets the third criteria for exiting the second reconfiguration mode to reenter the first reconfiguration mode), detecting an input that is directed to the first representation and that meets the fourth criteria, etc.). In response to detecting the respective input (11040): in accordance with a determination that the respective input corresponds to the request to exit the second reconfiguration mode, the computer system displays (e.g., in the first reconfiguration mode) a respective page of the plurality of pages that is different from the first page of the plurality of pages of the multipage home screen user interface. In some embodiments, after exiting the second reconfiguration mode, in response to one or more navigation inputs to navigate through the pages of the multipage home screen user interface outside of the second reconfiguration mode, the computer system skips the display of the first page of the multipage home screen user interface in accordance with a determination that the first representation of the first page is visually marked as deleted or hidden in the second reconfiguration mode. In some embodiments, after displaying the respective page of the plurality of pages that is different from the first page of the plurality of pages of the multipage home screen user interface (e.g., in the first reconfiguration mode), the computer system detects another input that corresponds to a request to return to the second reconfiguration mode. In response to the input that corresponds to the request to return to the second reconfiguration mode, the computer system redisplays the page editing user interface including the respective representations of at least two of the plurality of pages of the multipage home screen user interface, where the first representation of the first page of the multipage home screen user interface remains visually marked relative to the second representation of the second page of the multipage home screen user interface to indicate that the first page is still hidden. In some embodiments, the computer system detects another input that corresponds to a request to cease hiding the first page (e.g., another tap-hold on the first representation of the first page, another tap on the icon (e.g., show/hide affordance, a checkbox, etc.) associated with the first representation of the first page, or a tap on the first representation of the first page (e.g., this does not cause navigation to the first page in the first reconfiguration mode, if the first page is currently hidden), etc.), and in response to the input, the computer system ceases to visually marking the first representation of the first page from the second representation of the second page. If the computer system detects an input that is directed to the first representation that meets the first criteria, the computer system navigates to the first page in the first reconfiguration mode (e.g., the first page becomes available for display in the multipage home screen interface again when the user navigates through the multipage home screen user interface in the normal mode or the first reconfiguration mode). Visually marking the first representation of the first page relative to the second representation of the second page that is displayed in the second reconfiguration mode, in response to detecting the second input, in accordance with a determination that the second input corresponds to a request to hide the first page, and subsequently displaying the respective page of the plurality of pages that is different from the first page of the plurality of pages of the multipage home screen user interface in response to an exit request, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F6-5F7, and 5F11-5F14, for example, where a tap input by the contact 6204 (FIG. 5F6) unselects the representation 5309" of the fourth user-arranged home screen 5309 (FIG. 5F6), and the subsequent tap input by the contact 6206 on the representation 5306" of the second user-arranged home screen 5306 (FIG. 5F7) causes the computer system to display the second user-arranged home screen 5306' in the first reconfiguration mode (FIG. 5F11). Since the representation 5309" of the fourth user-arranged home screen 5309 was unselected (FIG. 5F7), the corresponding fourth user-arranged home screen 5309' is not shown in the multipage home screen user interface (e.g., swipe inputs starting from the second user-arranged home screen 5306' does not cause the computer system to show the fourth user-arranged home screen 5309', as shown in FIGS. 5F11-5F14).

In some embodiments, in response to detecting the respective input (11042): in accordance with a determination that the respective input corresponds to a request to cease hiding the first page (e.g., another tap-hold on the first representation of the first page, another tap on the icon (e.g., show/hide affordance, a checkbox, etc.) associated with the first representation of the first page, or a tap on the first representation of the first page (e.g., this does not cause navigation to the first page in the first reconfiguration mode, if the first page is currently hidden), etc.), the computer system ceases to visually distinguish the first representation of the first page from the second representation of the second page. In some embodiments, after exiting the second reconfiguration mode, in response to one or more navigation inputs to navigate through the pages of the multipage home screen user interface outside of the second reconfiguration mode, the computer system does not skip the display of the first page of the multipage home screen user interface in accordance with a determination that the first representation of the first page is no longer visually marked as deleted or hidden in the second reconfiguration mode. In some embodiments, respective deletion affordances are displayed with the representations of multiple pages (e.g., some, all, or each, etc. page(s)) of the multipage home screen user interface, and the deletion affordance transforms into a restore affordance once a page is hidden or deleted in response to a tap input on the deletion affordance. An a tap input on the restore affordance restores the page to make it available again the multipage home screen user interface outside of the second reconfiguration mode, and transforms the restore affordance back into the deletion affordance. In some embodiments, the show/hide affordance is a checkbox, a toggle, or other types of controls. Ceasing to visually marking the first representation of the first page relative to the second representation of the second page, in response to detecting the respective input that corresponds to a request to cease hiding the first page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F16-5F17, and 5F20-5F21, where a tap input by a contact 6224 (FIG. 5F17) reselects the representation 5309" of the fourth user-arranged home screen 5309. As a result, the fourth user-arranged home screen 5309' in the first reconfiguration mode can be reached again in the multipage home screen user interface outside of the second reconfiguration mode (FIGS. 5F20-5F21).

In some embodiments, in response to detecting the respective input (11044): in accordance with a determination that the respective input is directed to the first representation of the first page that is visually distinguished from the second representation of the second page, and that the respective input meets the first criteria (e.g., criteria for detecting a tap input, a long tap, etc.), the computer system forgoes displaying the first page of the multipage home screen user interface in the first reconfiguration mode. In some embodiments, once a page is marked as deleted or hidden in the second reconfiguration mode, a tap input on the representation of the page (e.g., visually marked to distinguish from other pages that are still available in the multipage home screen user interface outside of the second reconfiguration mode) does not cause display of the page in the first reconfiguration mode (e.g., the tap input is ignored). In some embodiments, a tap input on the representation of a page that is deleted or hidden in the page editing user interface causes display of a user interface that lists the application icons on the page, but does not allow repositioning of the application icons or exiting from the user interface to the normal mode. In some embodiments, a tap input on the representation of the page that is deleted or hidden in the page editing user interface causes the page to become undeleted or unhidden (e.g., tapping on the show/hide affordance or the representation of the hidden page have the same effect of ceasing to hide the page). Forgoing displaying the first page of the multipage home screen user interface in the first reconfiguration mode, in response to detecting the respective input that is directed to the first representation of the first page that is visually marked relative to other pages and meeting the first criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F7-5F8, for example, where a tap input by a contact 6208 (FIG. 5F7) on the unselected representation 5309" of the fourth user-arranged home screen 5309 does not cause the computer system to display the corresponding fourth user-arranged home screen 5309' in the first reconfiguration mode (FIG. 5F8).

In some embodiments, in response to detecting the second input (11046): in accordance with a determination that the second input meets fifth criteria (e.g., criteria for detecting a swipe input in a direction that is different from or transverse to the direction along the sequence of representations of the pages (e.g., left to right, right to left)) and that a total number of pages in the multipage home screen user interface exceeds a preset threshold number (e.g., 9, 12, 16, etc.), the computer system scrolls the respective representations of at least two of the plurality of pages of the multipage home screen user interface in the second reconfiguration mode to reveal respective representations of at least one additional page of the plurality of pages that was not initially displayed in the second reconfiguration mode. In some embodiments, in response to detecting the second input: in accordance with a determination that the second input meets the fifth criteria (e.g., criteria for detecting a swipe input in a direction that is different from or transverse to the direction along the sequence of representations of the pages (e.g., left to right, right to left)) and that the total number of pages in the multipage home screen user interface does not exceed the preset threshold number (e.g., 9, 12, 16, etc.), the computer system maintains display of the currently displayed representations, which is also all or a predetermined set of the representations of the pages in the multipage home screen user interface. Scrolling the respective representations of at least two of the plurality of pages of the multipage home screen user interface in the second reconfiguration mode to reveal respective representations of at least one additional page of the plurality of pages that was not initially displayed in the second reconfiguration mode, in accordance with a determination that the second input meets certain criteria and that a total number of pages in the multipage home screen user interface exceeds a preset threshold number, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5F29-5F30, where the first page of the page editing user interface 5305 shows nine full representations of user-arranged home screen (e.g., representations 5311*p*-5311*x*) and a top portion of the next three representations of user-arranged home screens (e.g., representations 5311*y*-5311*aa* near the bottom of the page editing user interface 5305) (FIG. 5F29). When the second page of the page editing user interface 5305 (FIG. 5F30), displayed in response to the upward swipe input by the contact 6238 (FIG. 5F29), includes a portion of the last three representations of user-arranged home screens (e.g., representations 5311*v*-5311*x*) from the first page of the page editing user interface 5305 near the top of the second page (FIG. 5F30).

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, 12000, 13000, and 14000) are also applicable in an analogous manner to method 11000 described above with respect to FIGS. 11A-11D. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 11000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 9000, 10000, 12000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 11A-11D are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12F are flow diagrams illustrating a method 12000 for displaying and interacting with a user interface object (e.g., a suggested applications widget, a recommended applications widget, a recent apps widget, etc.) that presents application icons that are automatically selected by a computer system at a user selected location (e.g., a user-selected placement location on a page of a home screen user interface, on a widget screen, etc.), in accordance with some embodiments.

The method 12000 relates to providing a suggested applications widget that includes automatically selected application icons on a page of a home screen user interface. When a suggested applications widget is placed at a user selected location on a page of a home screen user interface and includes automatically selected application icons, it is advantageous to display the application icons within the suggested applications widget in a manner that does not disrupt the organization and visual consistency of the page that also includes other application icons displayed in accordance with a predefined arrangement. As disclosed herein, the automatically selected application icons of the suggested applications widget are displayed at a user-selected location on a page of a home screen user interface aligned with the predefined arrangement of other application icons on the page. In accordance with such a policy, it is ensured that, when the suggested applications widgets are displayed at a different user location, and when different sets of application icons are presented within the user-selected location, the page containing suggested application widget maintains an orderly and organized arrangement, such that it is less likely to cause confusion for the user when locating a desired application icons on the page, and/or it is less likely to cause issues with reflowing the application icons on the page when the configuration of the page is altered by subsequent changes (e.g., addition, deletion, and rearrangement of application icons and widgets on the page in accordance with additional user inputs). This feature enhances the operability of the device (e.g., by allowing users to select the placement location of the automatically selected application icons while maintaining an organized layout on the page of the user-selected location), and makes the user-device interface more efficient (e.g., by reducing user mistakes when operating/interacting with the device), which improves battery life of the device (e.g., by helping the user to use the device more quickly and efficiently).

The method 12000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component. In the method 12000, the computer system displays (12002) a respective page of a home screen user interface (e.g., a user-arranged page of a multipage home screen user, a single page home screen user interface, etc.), wherein the respective page of the home screen user interface includes a first plurality of application icons in a first predefined arrangement (e.g., in a 4×3 grid, a 5×4 grid, etc.). (Optionally, after or while displaying the respective page of the home screen user interface (e.g., while the home screen user interface is in a first reconfiguration mode)), the computer system detects (12004) a sequence of one or more inputs corresponding to a request to insert, into the respective page of the home screen user interface, a first user interface object containing a plurality of application icons for a plurality of applications that are automatically selected by the computer system (e.g., the first user interface object is a suggested applications widget). In response to detecting the sequence of one or more inputs (e.g., in response to detecting the an input selecting a location for placement of the first user interface object containing the plurality of application icons or after detecting the input selecting a location for placement of the first user interface object containing the plurality of application icons and another user input that corresponds to a request to exit the first reconfiguration mode, etc.), the computer system concurrently displays (12006) on the respective page of the home screen user interface (e.g., in the first reconfiguration mode and/or in a normal mode): two or more of the first plurality of application icons in the first predefined arrangement (e.g., displaying all or a predetermined set of the first plurality of application icons in the first predefined arrangement if there is room on the page to accommodate the first user interface object and all or a predetermined set of existing application icons on the page; displaying a subset of the first plurality of application icons in the first predefined arrangement if there is not enough room on the page to accommodate the first user interface object and all or the predetermined set of the existing application icons on the page, etc.); and a second plurality of application icons, different from the first plurality of application icons. The second plurality of application icons are automatically placed on the respective page of the home screen in locations that are aligned with (e.g., placed on the grid locations of the same grid as the existing application icons, placed at grid locations that are slightly offset from the grid of the application icons, etc.) the first predefined arrangement of the first plurality of application icons on the respective page of the home screen user interface. The second plurality of application icons are automatically selected by the computer system for inclusion on the respective page of the home screen user interface (e.g., the application icons within the suggested applications widget are displayed at the icon placement locations within the area that currently accommodates the suggested applications widget) (e.g., the icon placement locations that now accommodates the application icons within the suggested applications widget used to accommodate some of the first plurality of application icons that have been shifted away by the insertion of the suggested applications widget). These features are illustrated in FIGS. 5G1-5G4, for example, where a sequence of inputs (e.g., a tap input by a contact 6300 in FIG. 5G1 to activate "Add Widget" button, an input to select a suggested applications widget 5354, and a tap input by a contact 6302 to add the selected suggested applications widget 5354 in FIG. 5G2) adds a second plurality of application icons in the suggested applications widget 5354 to the fourth user-arranged home screen 5350 (FIGS. 5G4). The application icons in the suggested applications widget 5354 are aligned with the other application icons existing (e.g., Camera App, mText App, mCall App, etc.) on the fourth user-arranged home screen 5350 (FIG. 5G4). Furthermore, the application icons in the suggested applications widget 5354 are automatically selected and updated by the computer system based on the current context such as elapse of time (FIGS. 5G4-5G6), a change of application content (e.g., widget) on a home screen (FIGS. 5G7-5G8), recently used application (FIGS. 5G10-5G12), etc.

In some embodiments, the respective page of the home screen user interface is (12008) displayed in a first reconfiguration mode (e.g., an icon reconfiguration mode in which locations of the first user interface object and the existing application icons on the respective page are adjustable in accordance with user inputs) when the second plurality of application icons are displayed on the respective page of the home screen user interface in response to the sequence of one or more inputs. Displaying the respective page of the home screen user interface in the first reconfiguration mode in response to the sequence of the one or more inputs displaying the second plurality of application icons on the respective page reduces the number of inputs needed to perform an operation (e.g., viewing the second plurality of application icons in the first reconfiguration mode). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5G3, for example, where when the suggested applications widget 5354 was being inserted on a home screen, the fourth user-arranged home screen 5350' is in the first reconfiguration mode.

In some embodiments, the second plurality of application icons are (12010) displayed in a container object corresponding to the first user interface object (e.g., the container object is a platter that separates the second plurality of application icons from other existing icons on the respective page of the home screen user interface) while the respective page of the home screen user interface is displayed in a first reconfiguration mode (e.g., an icon reconfiguration mode in which locations of the first user interface object and the existing application icons on the respective page are adjustable in accordance with user inputs). Displaying the second plurality of application icons in the container object corresponding to the first user interface object while the respective page of the home screen user interface is displayed in the first reconfiguration mode provides improved visual feedback to the user (e.g., distinguishing the system-selected user application icons from the user-arranged application icons). Providing improved visual feedback enhances the operability of the device and makes the user-device interface more efficient, which, additionally, reduces power usage and improves battery life of the device by enabling the user to use the device more quickly and efficiently. These features are illustrated in FIG. 5G3, for example, where when the suggested applications widget 5354 was first inserted to the fourth user-arranged home screen 5350, the application icons are displaced on a platter 5361 and the fourth user-arranged home screen 5350 is displayed in the first reconfiguration mode.

In some embodiments, while displaying the respective page of the home screen user interface in the first reconfiguration mode, including displaying the container object containing the second plurality of application icons, the computer system detects (12012) a second user input that corresponds to a request to exit the first reconfiguration mode (e.g., a request to enter the normal mode from the first reconfiguration mode). In response to detecting the second user input that corresponds to the request to exit the first reconfiguration mode: the computer system displays the respective page of the home screen user interface in a normal mode (e.g., in the normal mode, activation of an application icon using a tap input causes display of the corresponding application), including displaying the two or more of the first plurality of application icons in the first predefined arrangement and the second plurality of application icons in the locations that are aligned with the first predefined arrangement; and the computer system reduces a visual emphasis of the container object relative to the second plurality of application icons on the respective page while displaying the second plurality of application icons on the respective page of the home screen user interface in the locations that are aligned with the first predefined arrangement. For example, in some embodiments, when the suggested applications widget is dragged around the home screen user interface (e.g., from another location or another page, or from the widget selection user interface) and after it is dropped into the respective page of the home screen user interface from a widget selection user interface, the widget is shown as a container object with respective application icons for a set of system-selected applications contained therein. The position of the suggested application widget and the positions of the existing application icons on the respective page are adjustable during the first reconfiguration mode; and while in the first reconfiguration mode, the container object is displayed with normal visibility, and the second plurality of application icons are visually separated from the individual application icons on the respective page by the container object. In some embodiments, the container object ceases to be displayed or becomes translucent or blends with the background of the page of the home screen user interface, and the second plurality of application icons for the set of system-selected applications contained therein appear to be displayed at respective positions that are aligned with the first predefined arrangement of the existing application icons on the page (e.g., the second plurality of application icons are placed on the same grid as the existing application icons on the page). Reducing the visual emphasis of the container object relative to the second plurality of application icons on the respective page, in response to detecting the user input that corresponds to the request to exit the first reconfiguration mode, provides improved visual feedback to the user (e.g., allowing the user to confirm that the home screen is displayed in the normal mode in response to the user input and displaying the home screen in a visually-consistent manner). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5G3-5G4, for example, where the plurality of application icons in the suggested applications widget 5354 were first displayed with a platter 5361 on the fourth user-arranged home screen 5350' which was in the first reconfiguration mode (FIG. 5G3). The computer system then detects an upward edge swipe input by a contact 6304 (FIG. 5G3), in response, the fourth user-arranged home screen 5350' exits the first reconfiguration mode and is displayed in the normal mode (the fourth user-arranged home screen 5350 in FIG. 5G4), where the application icons in the suggested applications widget 5354 are displayed in alignment with the existing application icons (e.g., application icons 5008*a* and 5008*h*) on the home screen 5350, and the platter 5361 is no longer shown.

In some embodiments, the second plurality of application icons are (12014) displayed with a first size when the respective page of the home screen user interface is displayed in a first reconfiguration mode (e.g., an icon reconfiguration mode in which locations of the first user interface object and the existing application icons on the respective page are adjustable in accordance with user inputs). The second plurality of application icons are displayed with a second size different from (e.g., larger than, smaller than, etc.) the first size when the respective page of the home screen user interface is displayed outside of the first reconfiguration mode (e.g., in the normal mode (e.g., in the normal mode, activation of an application icon using a tap input causes display of the corresponding application)). In some embodiments, the first size is smaller than the size of the first plurality of application icons in the respective page, and the second size is the same as the size of the first plurality of application icons in the respective page. Displaying the second plurality of application icons with a first or a second size, depending on whether the respective page of the home screen is displayed in the first reconfiguration mode or not, provides improved visual feedback to the user (e.g., indicating the current mode in which the home screen is being displayed). Providing improved visual feedback enhances the operability of the device and makes the user-device interface more efficient, which, additionally, reduces power usage and improves battery life of the device by enabling the user to use the device more quickly and efficiently. These features are illustrated in FIG. 5G3, for example, where the suggested applications widget 5354 is displayed on the fourth user-arranged home screen 5350' in the first reconfiguration mode, and the size of the application icons in the suggested applications widget 5354 is smaller than the size of the user-arranged application icons (e.g., application icons 5008*h* or 5008*k*) on the fourth user-arranged home screen 5350'.

In some embodiments, the second plurality of application icons are (12016) displayed on the respective page of the home screen user interface in locations that are not aligned with the first predefined arrangement of the first plurality of application icons when the respective page of the home screen user interface is in a first reconfiguration mode (e.g., an icon reconfiguration mode in which locations of the first user interface object and the existing application icons on the respective page are adjustable in accordance with user inputs). The second plurality of application icons are displayed on the respective page of the home screen user interface in the locations that are aligned with the first predefined arrangement of the first plurality of application icons when the respective page of the home screen user interface is not in the first reconfiguration mode (e.g., in the normal mode (e.g., in the normal mode, activation of an application icon using a tap input causes display of the corresponding application)). Aligning or forgoing aligning the second plurality of application icons on the respective page of the home screen user interface with the first predefined arrangement of the first plurality of application icons, depending on whether the respective page of the home screen user interface is in the first reconfiguration mode, provides improved visual feedback to the user (e.g., allowing the user to determine whether the respective page of the home screen user interface is in the first reconfiguration mode or not). Providing improved visual feedback enhances the operability of the device and makes the user-device interface more efficient, which, additionally, reduces power usage and improves battery life of the device by enabling the user to use the device more quickly and efficiently. These features are illustrated in FIG. 5G3, for example, where the suggested applications widget 5354 is displayed on the fourth user-arranged home screen 5350' in the first reconfiguration mode, and the application icons in the suggested applications widget 5354 are not aligned with the user-arranged application icons (e.g., application icons 5008*h* or 5008*k*) on the fourth user-arranged home screen 5350'.

In some embodiments, while concurrently displaying the two or more of the first plurality of application icons in the first predefined arrangement and the second plurality of application icons in the locations that are aligned with the first predefined arrangement of the first plurality of application icons on the respective page of the home screen user interface (12018): the computer system displays respective textual identifiers of the two or more of the first plurality of application icons with a first set of display properties (e.g., first values of transparency, opacity, color, luminance, and/or saturation, without a first indicator, highlight, animated effect, etc.); and the computer system displays respective textual identifiers of the second plurality of application icons with a second set of display properties (e.g., second values of transparency, opacity, color, luminance, and/or saturation, with the first indicator, highlight, animated effect, etc.), the second set of display properties being different from the first set of display properties. In some embodiments, the respective textual identifiers of the application icons include the application names of the applications corresponding to the application icons, and the textual identifiers of the application icons of the system-suggested applications in the suggested applications widget are displayed with more translucency (e.g., blending more with the background of the respective page), less saturated colors, with a shimmering visual effect, and so on, as compared to the textual identifiers of individual application icons that are already existing on the page (e.g., previously placed on the page by the user). In some embodiments, the first set of display properties and the second set of display properties do not include the actual textual content of the textual identifiers (e.g., the appearance of the textual identifiers for the application icons within the suggested applications widget are different relative to the appearance of the textual identifiers of the application icons outside of the suggested application widgets, in addition to the differences in the text within the textual identifiers). Displaying the respective textual identifiers of the second plurality of application icons with a set of display properties that is different from the set of display properties for the respective textual identifiers of the first plurality of application icons, provides improved visual feedback to the user (e.g., allowing the user to distinguish the system-selected application icons from the user-arranged application icons). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5G4, and also in 5G6-5G7, for example, where the text labels associated with the application icons in the suggested applications widget 5354 (e.g., application icon 5057*a*-5057*h*) are visually distinct from the text labels associated with the user-arranged application icons (e.g., application icons 5008*a* or 5008*h*) on the home screen.

In some embodiments, while displaying the second plurality of application icons in the locations that are aligned with the first predefined arrangement of the first plurality of application icons on the respective page of the home screen user interface (e.g., while displaying the respective page outside of the first reconfiguration mode, in the normal mode, etc.), the computer system detects (12020) a third user input that is directed to a respective application icon displayed on the respective page of the home screen user interface. In response to detecting the third user input, the computer system displays a set of selectable options corresponding to the third user input, wherein: in accordance with a determination that the third user input is directed to an area occupied by the second plurality of application icons (e.g., that is directed to a first application icon of the second plurality of application icons, a second application icon of the second plurality of application icons, an area between the first application icon and the second application icon, etc.), and that the third user input meets first criteria (e.g., criteria for detecting a touch-hold input by a contact, criteria for detecting an input that, when detected on an application icon, corresponds to a request for displaying a contextual menu associated with an application corresponding to the application icon, and that, when detected on a widget of an application, corresponds to a request for displaying a contextual menu associated with the widget, etc.), displaying the set of selectable options includes (12022) displaying a first plurality of selectable options (e.g., in a contextual menu) associated with the first user interface object (e.g., options for triggering configuration and/or deletion of the first user interface object, as opposed to the selectable options associated with an application corresponding to a respective one of the second plurality of application icons); and in accordance with a determination that the third user input is directed to a respective one of the two or more of the first plurality of application icons that is displayed concurrently with the second plurality of application icons, and that the third user input meets the first criteria, displaying the set of selectable options includes (12024) displaying a second plurality of selectable options (e.g., in a contextual menu) associated with an application corresponding to the respective one of the two or more of the first plurality of application icons (e.g., options for triggering one or more application function of the application). Displaying a first plurality of selectable options associated with the first user interface element, or a second plurality of selectable options associated with an application corresponding to the respective one of the two or more of the first plurality of application icons, depending on the location of the user input, performs an operation when a set of conditions has been met (e.g., whether the user input is directed to the user interface object or the first plurality of application icons) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G12-5G13, for example, where a tap-and-hold input by a contact 6318 on the application icon 5057*q* of the suggested applications widget 5354 (FIG. 5G12) causes the computer system to display a set of selectable options (e.g., first quick action menu 5374) associated with the suggested applications widget 5354 and the application icon 5057*q* (FIG. 5G13). These features are similarly illustrated in FIGS. 5G15-5G16 and 5G17-5G18.

In some embodiments, the first plurality of selectable options (e.g., in a contextual menu) associated with the first user interface object includes a first selectable option that, when activated, causes (12026) the computer system to perform a first operation (e.g., display a widget-specific configuration user interface for the first user interface object, delete the first user interface object as a whole, displaying a plurality of selectable sizes for the first user interface object, etc.) with respect to the first user interface object as a whole (e.g., irrespective of which applications that the second plurality of application icons correspond to). Including, in the first plurality of selectable options, a selectable option that when activated causes a first operation with respect to the first user interface object as a whole, reduces the number of inputs needed to perform an operation (e.g., configuring the user interface object as a whole). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5G12-5G13, for example, where the first quick action menu 5374 includes widget-specific options (e.g., share widget, edit widget, delete widget, edit home screen) (FIG. 5G13). These options are similarly illustrated in the second quick action menu 5376 in FIG. 5G16, and the third quick action menu 5378 in FIG. 5G18.

In some embodiments, the first plurality of selectable options (e.g., in a contextual menu) associated with the first user interface object includes (12028) a second selectable option that, when activated, causes the computer system to perform a second operation (e.g., display a widget-specific configuration user interface for the first user interface object, delete the first user interface object as a whole, displaying a plurality of selectable sizes for the first user interface object, etc.) with respect to a respective application represented by one of the second plurality of application icons (e.g., the respective application represented by the application icon that is displayed at the location of the third user input). In some embodiments, the second selectable option, when activated, causes the computer system to perform an application-specific operation associated with the first application (e.g., launching the application, not automatically selecting the first application for inclusion in the first user interface object in the future, and/or replacing display the first application icon with another application icon that is not currently included among the second plurality of application icons, etc.)). Including, in the first plurality of selectable options, a selectable option that when activated causes a second operation with respect to a respective application represented by one of the second plurality of application icons, reduces the number of inputs needed to perform an operation (e.g., launching/configuring a specific application represented within user interface object). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5G12-5G13, for example, where the first quick action menu 5374 includes selectable options specific to the message application icon 5057*q* (e.g., compose new message, hide message app, never show message app here). These features are similarly illustrated in FIG. 5G15, where the second quick action menu 5376 includes selectable options specific to the fitness application icon 5057*j*.

In some embodiments, displaying the set of selectable options includes (12030): in accordance with the determination that the third user input is directed to a first application icon of the second plurality of application icons, and that the third user input meets the first criteria, displaying (12032) the second selectable option includes an option that, when activated, causes the computer system to perform a first application-specific operation corresponding to a first application represented by the first application icon; and in accordance with the determination that the third user input is directed to a second application icon of the second plurality of application icons that is different from the first application icon, and that the third user input meets the first criteria, displaying (12034) the second selectable option includes an option that, when activated, causes the computer system to perform a second application-specific operation corresponding to a second application represented by the second application icon, wherein the first application-specific operation (e.g., sending a message, adding a new calendar event, etc.) is different from the second application-specific operation (e.g., drafting a new email, opening an inbox, etc.). Including in the selectable options an option that when activated, causes the computer system to perform an operation specific to either the first application or the second application, depending on whether the user input is directed to the first application icon or the second application icon, performs an operation when a set of conditions has been met (e.g., the location of the user input) without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G12-5G13, and 5G15-5G16, for example, where the tap-and-hold input by the contact 6318 directed to the message application icon 5057*q* (FIG. 5G12) causes the first quick action menu to be displayed with message-specific options (FIG. 5G13), and the tap-and-hold input by the contact 6322 directed to the fitness application icon 5057*j* (FIG. 5G15) causes the second quick action menu 5376 to be displayed with fitness-specific options (FIG. 5G16).

In some embodiments, performing the first application-specific operation (e.g., options for "hide this application", or "never show this application here", etc.) corresponding to the first application represented by the first application icon includes (12036) ceasing to display of the first application icon and displaying a third application icon of a third automatically selected application that is not currently included among the second plurality of application icons (e.g., replacing display of the first application icon with display of the third application icon at the same location in the suggested application widget, or adding the third application icon at another location within the suggested applications widget, and reflow other application icons within the suggested applications widget to fill the space vacated by the first application icon, etc.). Performing the second application-specific operation (e.g., options for "hide this application", or "never show this application here", etc.) corresponding to the second application represented by the second application icon includes ceasing to display of the second application icon and displaying a fourth application icon of a fourth automatically selected application that is not currently included among the second plurality of application icons (e.g., replacing display of the first application icon with display of the third application icon at the same location in the suggested application widget, or adding the third application icon at another location within the suggested applications widget, and reflow other application icons within the suggested applications widget to fill the space vacated by the first application icon, etc.). In some embodiments, the newly displayed application icon is displayed at the location of the application icon that is temporarily hidden. Ceasing to display the first or the second application icon and displaying a different automatically selected application icon in the user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G13-5G14, for example, where a tap input by a contact 6320 on the "Hide Message App" option of the first quick action menu 5374 (FIG. 5G13) causes the message application icon 5057*q* being hidden from the first quick action menu 5374, and the game application icon 5057*d* is displayed in the suggested applications widget 5354.

In some embodiments, performing the first application-specific operation (e.g., options for "hide this application", or "never show this application here", etc.) corresponding to the first application represented by the first application icon does not (12038) prevent the first application icon from being automatically selected by the computer system for display among the second plurality of application icons on the respective page at a later time. Performing the second application-specific operation (e.g., options for "hide this application", or "never show this application here", etc.) corresponding to the second application represented by the second application icon does not prevent the second application icon from being automatically selected by the computer system for display among the second plurality of application icons on the respective page at a later time. Allowing the computer system to automatically select the first or the second application icon for display among the second plurality of application icons on the respective page at a later time, performs an operation (e.g., re-including in the user interface object the first or the second application icon) when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5G14-5G15, for example, where after the message application icon 5057*d* has been temporarily hidden (FIG. 5G14), it re-appears at a later time (FIG. 5G15).

In some embodiments, performing the first application-specific operation (e.g., options for "hide this application", or "never show this application here", etc.) corresponding to the first application represented by the first application icon prevents (12040) the first application icon from being automatically selected by the computer system for display among the second plurality of application icons on the respective page at a later time. Performing the second application-specific operation (e.g., options for "hide this application", or "never show this application here", etc.) corresponding to the second application represented by the second application icon prevents the second application icon from being automatically selected by the computer system for display among the second plurality of application icons on the respective page at a later time. Preventing the first or the second application icon from being automatically selected by the computer system for display among the second plurality of application icons on the respective page at a later time, performs an operation (e.g., forgoing the display of the first or the second application icon) when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G15-5G17, for example, where a tap input by a contact 6322 (FIG. 5G16) selects the "Never Show Fitness App Here) option, and in response, the fitness application icon 5057*j* is permanently removed from the suggested applications widget 5354 (FIG. 5G17).

In some embodiments, in response to detecting the third user input (12042): in accordance with a determination that that the third user input is directed to a first application icon of the second plurality of application icons, and that the third user input meets the first criteria, the computer system visually distinguishes the first application icon from other application icons of the second plurality of application icons (e.g., enlarging, shrinking, highlighting, lifting up, etc. the first application icon relative to other application icons of the second plurality of application icons (e.g., including the second application icon)). In accordance with a determination that that the third user input is directed to a second application icon of the second plurality of application icons that is different from the first application icon, and that the third user input meets the first criteria, the computer system visually distinguishes the second application icon from other application icons of the second plurality of application icons (e.g., enlarging, shrinking, highlighting, lifting up, etc. the second application icon relative to other application icons of the second plurality of application icons (e.g., including the first application icon)). Visually distinguishing the first or the second application icon from the other application icons of the second plurality of application icons, depending on whether the user input is directed to the first or the second application icon, provides improved visual feedback to the user (e.g., allowing the user to determine which of the application icon are the application-specific selection options directed to). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5G12-5G13 and 5G15-5G16, for example, where when the tap-and-hold input by the contact 6318 is directed to the message application icon 5057*q* (FIG. 5G12), the message application icon 5057*q* is visually emphasized relative to the other application icons on the platter 5361 (FIG. 5G13), and when the tap-and-hold input by the contact 6322 is directed to the fitness application icon 5057*j* (FIG. 5G15), the fitness application icon 5057*j* is visually emphasized relative to the other application icons on the platter 5361 (FIG. 5G16).

In some embodiments, in response to detecting the third user input (12044): in accordance with a determination that the third user input is directed to the area occupied by the second plurality of application icons (e.g., that is directed to a first application icon of the second plurality of application icons, a second application icon of the second plurality of application icons, an area between the first application icon and the second application icon, etc.), and that the third user input meets the first criteria (e.g., criteria for detecting a touch-hold input by a contact, criteria for detecting an input that, when detected on an application icon, corresponds to a request for displaying a contextual menu associated with an application corresponding to the application icon, and that, when detected on a widget of an application, corresponds to a request for displaying a contextual menu associated with the widget, etc.), the computer system changes two or more (e.g., less than all, or all) of the second plurality of application icons from respective first appearances to respective second appearances different from the respective first appearances, while displaying the first plurality of selectable options (e.g., in a contextual menu, in a control panel, etc.) associated with the first user interface object. Changing the two or more of the plurality of application icons from respective first appearance to respective second appearance, in accordance with the determination that the user input is directed to the area occupied by the second plurality of application icons and meeting certain criteria, provides improved visual feedback to the user (e.g., changing multiple application icons in appearance to indicate that whole widget is being edited). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5G12-5G13, for example, where a tap-and-hold input by a contact 6318 on the suggested applications widget 5354 directed to the message application icon 5057*q* (FIG. 5G12) causes the other application icons in the suggested applications widget 5354 to be visually de-emphasized (FIG. 5G13). These features are similarly illustrated in FIGS. 5G15-5G18.

In some embodiments, while displaying the respective page of the home screen user interface in a first reconfiguration mode (e.g., icon reconfiguration mode), including concurrently displaying the second plurality of application icons concurrently with the two or more of the first plurality of application icons on the respective page of the home screen user interface in the first reconfiguration mode, the computer system detects (12046) a fourth user input. In response to detecting the fourth user input: in accordance with a determination that the fourth user input is directed to a first application icon of the second plurality of application icons, and that the fourth input meets second criteria (e.g., criteria for detecting a drag and drop input after the first application icon is selected by the fourth user input), the computer system displays the first application icon at a new location outside of an area occupied by the second plurality of application icons, wherein the new location is selected in accordance with the fourth user input. Displaying the first application icon at the new location outside the area occupied by the second plurality of application icons, in response to detecting the user input and determining that the user input is directed to the first application icon, provides additional control options without cluttering the user interface with additional displayed controls (e.g., control options for moving the first application icons). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5G19-5G21, for example, where a tap-and-hold input by a contact 6328 selects the message application icon 5057*q* (FIG. 5G19) and the contact 6328 subsequently moves (the message application icon 5057*q* moves with the contact 6328) to place the message application icon 5057*q* onto the fourth user-arranged home screen 5350' (FIG. 5G20-5G21). These features are similarly illustrated in FIGS. 5G23-5G24, where the message application icon 5057*q* is dropped onto a fifth user-arranged home screen 5364'.

In some embodiments, in response to detecting the fourth user input (12048): in accordance with a determination that the fourth user input is directed to the first application icon of the second plurality of application icons, and that the fourth input meets the second criteria, the computer system ceases display of the first application icon among the second plurality of application icons on the respective page of the home screen user interface (e.g., replacing display of the first application icon among the second plurality of application icons with another application icon that is automatically selected by the computer system and that is not currently one the second plurality of application icons, or selecting a new group of application icons for display as the second plurality of application icons, wherein the new group of application icons do not include the first application icon, etc.). In some embodiments, displaying the first application icon at the new location outside of the area occupied by the second plurality of application icons includes changing the appearance of the textual label of the first application icon from that having the second set of display properties (e.g., display properties that are different from those of the first plurality of application icons outside of the suggested applications widget and that are the same as those of the second plurality of application icons within the suggested applications widget) to that having the first set of display properties (e.g., display properties that are the same as those of the first plurality of application icons outside of the suggested applications widget). Ceasing display of the first application icon among the second plurality of application icons on the respective page of the home screen user interface, in response to detecting the user input and in accordance with a determination that the user input is directed to the first application icon of the second plurality of application icons, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5G22, for example, where after the message application icon 5057*q* is dragged from the suggested applications widget 5354 and is dropped onto the fourth user-arranged home screen 5350, a reminders application icon 5057*s* is displayed in the suggested applications widget 5354 to replace the message application icon 5057*q*.

In some embodiments, displaying the first application icon at the new location outside of the area occupied by the second plurality of application icons includes (12050): in accordance with a determination that the new location is on the respective page of the home screen user interface, ceasing display of the first application icon from among the second plurality of application icons and displaying an new application icon that is automatically selected by the computer system among the second plurality of application icons (e.g., replacing the first application icon at a location of the first application icon among the second plurality of application icons with another application icon that is automatically selected by the computer system and that is not currently one the second plurality of application icons, or replacing the second plurality of application icons with a new group of application icons that does not include the first application icon, etc.); and in accordance with a determination that the new location is not on the respective page of the home screen user interface, maintaining the first application icon at the location among the second plurality of application icons on the respective page of the home screen user interface when the respective page is displayed. Ceasing display of the first application icon from among the second plurality of application icons and displaying an new application icon that is automatically selected by the computer system among the second plurality of application icons in accordance with a determination that the new location is on the respective page of the home screen user interface, and maintaining the first application icon at the location among the second plurality of application icons on the respective page of the home screen user interface when the respective page is displayed in accordance with a determination that the new location is not on the respective page of the home screen user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G22, 5G25, and 5G31, for example, where after the message application icon 5057*q* is dropped onto the fourth user-arranged home screen 5350 (FIG. 5G22) and displayed in normal mode, a reminders application icon 5057*s* is displayed in the suggested applications widget 5354 to replace the message application icon 5057*q*. When the message application icon 5057*q* is dropped onto the fifth user-arranged home screen 5364 (FIG. 5G25), the message application icon 5057*q* is still displayed in the suggested applications widget 5354 on the fourth user-arranged home screen 5350 (FIG. 5G31).

In some embodiments, the computer system automatically excludes (12052), from the second plurality of application icons, the two or more of the first plurality of application icons that are to be concurrently displayed with the second plurality of application icons (e.g., application icons on an application dock or a home screen page that is occupied by the app icon suggestion widget are excluded from being automatically selected for inclusion in the app icon suggestion widget). In some embodiments, the exclusion is applied whenever an application icon is added or removed from the user interface (e.g., the home screen page or application dock) where the second plurality of application icons are displayed (e.g., so that the second plurality of app icons is automatically updated in response to placement of an application icon on the home screen page or application dock where the second plurality of application icons are displayed). In some embodiments, the exclusion is applied whenever the home screen is updated after an application icon is added or removed from the user interface (e.g., the home screen page or application dock) where the second plurality of application icons are displayed (e.g., so that the second plurality of app icons is automatically updated in response to redisplay of the home screen page after ceasing to display the home screen page whether due to navigation between home screen pages or opening an application and returning to the home screen page on which the second plurality of application icons are displayed or locking the device and unlocking the device and requesting display of the home screen page on which the second plurality of application icons are displayed). Automatically excludes, from the second plurality of application icons, the two or more of the first plurality of application icons that are to be concurrently displayed with the second plurality of application icons, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5G26-5G31, for example, where after the calculator application icon 5391*a* is dragged and dropped onto the fifth first user-arranged home screen 5364' (FIGS. 5G26-5G28), the calculator application icon 5063*b* in the suggested application widget 5368 is automatically replaced by another application icon (e.g., a clock application icon 5063*j*) (FIGS. 5G29-5G30).

It should be understood that the particular order in which the operations in FIGS. 12A-12F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, 11000, 13000, and 14000) are also applicable in an analogous manner to method 12000 described above with respect to FIGS. 12A-12F. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 12000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 9000, 10000, 11000, 13000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 12A-12F are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 13A-13H are flow diagrams illustrating a method 13000 of moving and/or rearranging existing user interface objects corresponding to different applications (e.g., application icons, widgets, etc. of various sizes) on a page of a home screen user interface during a reconfiguration mode (e.g., in accordance with repositioning, deletion, addition, passing through, removal, etc. of one or more user interface objects corresponding to different applications), in accordance with some embodiments.

This method 13000 relates to various rules for providing visual feedback and reflowing application icons and/or user interface objects containing application content (e.g., widgets) on one or more pages of a home screen user interface when application icons and/or user interface objects containing application content are inserted into, deleted from, and/or moved relative to the one or more pages. In some embodiments, rules are implemented to avoid one or more configurations of the page that are more likely to result in aggregation of alignment issues and/or more likely to contribute to disorganization of the pages and user confusion overtime. In some embodiments, rules are implemented to provide visual feedback (e.g. through automatic organization into blocks, reflowing and moving as blocks, etc.) about how a page will be organized if a user interface object containing application content is inserted into the page before the user input is ended and the user interface object containing application content is actually inserted into the page, and/or before the user input selects any specific placement location for the user interface object containing application content on the page. In some embodiments, rules are implemented to provide visual feedback about a suitable and/or required placement location in a page, as soon as the user interface object containing application content is dragged onto the page, such that the user becomes aware of such recommendation or limitation for the placement location without having to make any unsuccessful attempts to drop the user interface object at unpermitted placement locations. These feature enhance the operability of the device (e.g., by providing suitable visual feedback and guidance to the user when the user provides input to reorganize the pages of the home screen user interface), and makes the user-device interface more efficient (e.g., by reducing user mistakes when operating/interacting with the device), which improves battery life of the device (e.g., by helping the user to use the device more quickly and efficiently).

The method 13000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component.

In the method 13000, the computer system displays (13002), via the display generation component, a respective page of a home screen user interface (e.g., a user-arranged page of a multipage home screen user interface, a single page home screen user interface, etc.). The respective page of the home screen user interface includes a first plurality of application icons and a first user interface object containing application content corresponding to a respective application displayed at a first placement location (e.g., a first widget corresponding to a first application at a first widget placement location, a suggested applications widget, etc.). In some embodiments, the first plurality of application icons and the first user interface object are displayed in accordance with a layout that includes icon placement locations for application icons and includes widget placement locations for user interface objects containing application content. In some embodiments, a widget placement location occupies roughly the same area occupied by a sub-grid of icon placement locations (e.g., a 1×4 sub-grid, a 2×2 sub-grid, a 2×4 sub-grid, etc. on a full 5×4 grid or 6×4 grid, etc.). In some embodiments, a widget placement location is placed above, below, or next to a sub-grid of icon placement locations. For example, a 2×2 widget placement location can be placed adjacent to a 2×2 sub-grid of icon placement locations, a 1×4 widget placement location can be placed above a sub-grid of 1×4 icon placement locations, a 2×4 widget can be placed above or below a 2×2 widget placement location and a 2×2 sub-grid of icon placement locations arranged side by side, etc. In some embodiments, depending on the size and/or position of one widget placement location on a page, the arrangement of icon placement locations and other widget placement locations on the same page may be constrained differently in accordance with various preset rules. While displaying the respective page of the home screen user interface (e.g., the respective page is displayed in a first reconfiguration mode in which positions of application icons and widgets can be adjusted in accordance with user inputs, the respective page is displayed in a normal mode in which a tap input on an application icon or widget launches the corresponding application of the application icon or widget, etc.) (e.g., including the first plurality of application icons in a first subset of the icon placement locations and the first user interface object containing application content in a first widget placement location on the respective page), the computer system detects (13004) a first user input that corresponds to a request to move the first user interface object containing application content away from the first placement location (e.g., a drag input that is started from the first placement location (e.g., if the respective page is displayed in the first reconfiguration mode already), a touch-hold input directed to the first placement location followed by a drag input (e.g., if the respective page is not already displayed in the first reconfiguration mode, and the touch-hold and drag input triggers the first reconfiguration mode and the movement of the first user interface object containing application content), etc.). In response to detecting the first user input (13006): the computer system moves the first user interface object relative to the first placement location in the respective page in accordance with the first user input; and in accordance with a determination that first criteria are met (e.g., the first user interface object is moved within the respective page and not moved to a different page, the first user interface object is displayed side by side with a sub-grid of application icons, and/or the first user interface object is displayed on the same page with another user interface object that has a larger size (e.g., a combined size of the first user interface object and the sub-grid of application icons that are side-by-side to the first user interface object), etc.), the computer system moves a first plurality of application icons that are located in a first set of placement locations (e.g., a sub-grid of app icon placement locations (e.g., a 2×2 sub-grid, a 1×4 sub-grid, a 2×4 sub-grid, etc.) side-by-side with, adjacent to, in an adjacent row from, in an adjacent column from, etc. the first placement location) relative to the first placement location of the first user interface object containing application content to follow a direction of movement of the first user interface object containing application content. For example, in some embodiments, when a 2×2 sized widget is dragged from its placement location downward, a set of application icons located in a 2×2 sub-grid side-by-side with the 2×2 sized widget moves downward with the widget, even though the set of application icons have not been selected by the user prior or after the movement of the 2×2 sized widget to be moved together with the widget. The movement of the set of application icons is a result of the computer system following preset rules of arranging the placement locations of widgets and application icons on the respective page of a given full grid size (e.g., 5×4, 6×4, etc.), as opposed to user's intentional selection of the application icons. This automatic-following behavior does not continue when the first user interface object is dragged to a different page. In some embodiments, a "flocking behavior", different from the above automatic-following behavior, is implemented to show additional selected application icons (e.g., selected by respective tap inputs on the application icons while the widget is held by a drag input in the first reconfiguration mode) moving to follow an earlier selected and dragged widget, and the collection of application icons and widgets are optionally dropped to respective placement locations on a different page as a group upon termination of the drag input (e.g., liftoff of the contact, cessation of the movement of the contact for more than a threshold amount of time, etc.). In some embodiments, the first criteria includes a first plurality of distinct requirements, and if any of the plurality of requirements are met, the first criteria are considered to be met. In some embodiments, the first criteria includes a second plurality of requirements different from the first plurality of requirements, and the first criteria are met if all or a predetermined set of the second plurality of requirements are met, and the first criteria are not met if less than all or the predetermined set of the second plurality of requirements are met and none of the first plurality of requirements are met. These features are illustrated in FIGS. 5H3-5H6 for example, where a first user-arranged home screen 5210' that includes a plurality of application icons 5008 and one or more widgets 5022 organized in a grid is displayed. In response to detecting drag input by contact 6602 (FIG. 5H3) directed to widget 5022*g*, widget 5022*g* is moved downwards in the respective user-arranged home screen 5210' in accordance with the movement of contact 6602. Concurrent with movement of widget 5022*g* within the first user-arranged home screen 5210', application icons 5008*a*-5008*d* are moved in a 2×2 sub-grid following movement of widget 5022*g* (FIGS. 5H4-5H6).

In some embodiments, in response to detecting the first user input (13008): in accordance with a determination that the first criteria are met (e.g., the first user interface object is moved within the respective page and not moved to a different page, the first user interface object is displayed side by side with a sub-grid of application icons, and/or there is another user interface object containing application content on the same page that is larger than the first user interface object, etc.), the computer system moves a second plurality of application icons that are located in a second set of placement locations (e.g., a sub-grid of icon placement locations (e.g., a 2×4 sub-grid, a 1×4 sub-grid, etc.)) relative to the first placement location of the first user interface object containing application content in an opposite direction of the movement of the first user interface object containing application content. For example, in some embodiments, when a 2×2 widget that is placed side by side with a 2×2 sub-grid of application icons in the respective page is dragged downward away from its original placement location, the 2×2 sub-grid of application icons follow the movement of the 2×2 widget in a downward direction, while one or more rows of application icons below the 2×2 widget and the 2×2 sub-grid of application icons move upward to fill the area vacated by the 2×2 widget and the 2×2 sub-grid of application icons (e.g., provided that the page includes a 2×4 widget as well). Moving a second plurality of application icons that are located in a second set of placement locations relative to the first placement location of the first user interface object containing application content in an opposite direction of the movement of the first user interface object containing application content, in response to detecting the first user input and in accordance with a determination that the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H6-5H8 for example, where a respective user-arranged home screen 5210' that includes a plurality of application icons 5008 and one or more widgets 5022 organized in a grid. In response to detecting drag input by contact 6604 (FIG. 5H6) directed to widget 5022*g*, widget 5022*g* is moved downwards in the respective user-arranged home screen 5210' in accordance with the movement of contact 6604. Concurrent with movement of widget 5022*g* within the respective user-arranged home screen 5210', application icons are organized into sub-grids that are the same size as widget 5022*g* (e.g., 2×2 sub-grids) and are moved to make space for widget 5022*g* in the full-sized grid of the respective user-arranged home screen 5210' (FIGS. 5H7-5H8).

In some embodiments, in response to detecting the first user input (13010): in accordance with a determination that the second criteria are met (e.g., the first user interface object is moved from the respective page to a different page, the first user interface object is displayed side by side with a sub-grid of application icons, and/or there is another user interface object containing application content on etc.), the second criteria being different from the first criteria, the compute system maintains the first plurality of application icons at the first set of placement locations after the first user interface object containing application content is moved away from the first placement location. In some embodiments, in response to detecting the first user input, the computer system moves a third plurality of application icons that are located in a third set of placement locations (e.g., a sub-grid of icon placement locations (e.g., a 2×2 sub-grid, a 1×4 sub-grid, etc.)) relative to (e.g., above, immediately above, below, immediately below, adjacent to, in an adjacent row from, in an adjacent column from, etc.) the first placement location of the first user interface object containing application content to the first placement location (e.g., into a fourth set of icon placement locations corresponding to the first placement location for the widget). For example, in some embodiments, when a 2×2 widget that is placed side by side with a 2×2 sub-grid of application icons in the respective page is dragged from its original placement location to a different page, the 2×2 sub-grid of application icons does not follow the 2×2 widget to the different page, but remain their original locations, while a row of application icons below (or immediately below) the 2×2 widget and the 2×2 sub-grid of application icons move upward to fill the area vacated by the 2×2 widget. Maintaining the first plurality of application icons at the first set of placement locations after the first user interface object containing application content is moved away from the first placement location, or moving in response to detecting the first user input: in accordance with a determination that the second criteria are met performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5H32 for example, where drag input by contact 6630 directed to widget 5022*g* is detected in first user-arranged home screen 5210'. As widget 5022*g* is moved out of the first user-arranged home screen 5210', application icons 5008*a*-5008*d* remain behind.

In some embodiments, the first criteria includes (13012) a first requirement that is met when the first user input corresponds to a request to move the first user interface object containing application content to a second placement location on the respective page that is different from the first placement location (e.g., the first user input is a drag and drop input that ended while the respective page of the multipage home screen user interface is displayed). The second criteria includes a second requirement that is met when the first user input corresponds to a request to move the first user interface object containing application content to a third placement location on another page of the multipage home screen user interface that is different from the respective page of the multipage home screen user interface. (e.g., the first user input is a drag and drop input that ended while a different page of the multipage home screen user interface is displayed). In some embodiments, the first plurality of application icons at the first set of placement locations follow the direction of the movement of the first user interface object containing application content while the respective page of the multipage home screen user interface is displayed and the first user interface object is dragged over different potential placement locations on the respective page; and once the computer system navigates to a different page (e.g., the drag input hovers over the edge of the display for a threshold amount of time, or the drag input does not hover over any potential placement location on the respective page before reaching the edge of the display, etc.), the first plurality of application icons do not follow the first user interface object to the different page, the respective page is reconfigured by the computer system in the background, and the first user interface moves on the different page in accordance with the movement of the first user input (e.g., causing application icons to shift and reflow on the different page). In some embodiments, while the first user interface object is moved around the respective page, the sub-grid of application icons that were in the same rows as the first user interface object follows the first user interface object on the respective page, while other sub-grids of application icons that were not in the same rows as the first user interface object reflow on the respective page in response to the current location of the first user interface object. This continues until the first user interface object is dragged to another page of the home screen user interface. Once the first user interface object is dragged away from the respective page, the sub-grid of application icons that were previously in the same rows as the first user interface object return to their original placement locations on the respective page, and other application icons and optionally widgets on the respective page reflow on the respective page to fill the space vacated by the first user interface object. In some embodiments, the reflow is performed on the basis of blocks that is of the same size as the first user interface object. In some embodiments, the reflow is on the basis of individual application icons. Maintaining the first plurality of application icons at the first set of placement locations or moving a second plurality of application icons that are located in a second set of placement locations relative to the first placement location of the first user interface object containing application content in an opposite direction of the movement of the first user interface object containing application content, depending on whether the second or the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H32-5H37 for example. Drag input by contact 6630 directed to widget 5022*g* is detected in first user-arranged home screen 5210' (FIG. 5H32). In accordance with movement of contact 6630, widget 5022*g* is moved out of the first user-arranged home screen 5210' into the second user-arranged home screen 5212' (FIGS. 5H33-5H35), Widget 5022*g* is placed at a respective placement location upon termination of contact 6630 (FIGS. 5H36-5H37). Despite movement of widget 5022*g*, application icons 5008*a*-5008*d* remain in the first user-arranged home screen 5210'.

In some embodiments, the first criteria include (13014) a third requirement that is met when the respective page includes a second user interface object containing application content at a second placement location different from the first placement location, and the second criteria include a fourth requirement that is met when the first user interface object containing application icon is not displayed concurrently with other user interface objects containing application content on the respective page (e.g., the first user interface object is the only user interface object containing application content (e.g., the only widget) on the respective page). For example, in some embodiments, when a 2×2 widget that is placed side by side with a 2×2 sub-grid of application icons in the respective page is dragged away from its original placement location on the respective page, if there is another widget (e.g., a 1×4 widget, a 2×4 widget, a widget that is larger than the 2×2 widget, etc.) on the same respective page, the 2×2 sub-grid of application icons will follow the 2×2 widget as the 2×2 widget moves around the respective page; but the 2×2 sub-grid of application icons will remain their original locations and not follow the 2×2 widget as the 2×2 widget moves around the respective page if there isn't another widget (e.g., a 1×4 widget, a 2×4 widget, a widget that is larger than the 2×2 widget, etc.) on the respective page. After the end of the input, if there is another widget on the respective page, the 2×2 sub-grid of application icons will still be by side by side with the 2×2 widget (e.g., in a different row). Maintaining the first plurality of application icons at the first set of placement locations or moving a second plurality of application icons that are located in a second set of placement locations relative to the first placement location of the first user interface object containing application content in an opposite direction of the movement of the first user interface object containing application content, depending on whether the second or the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H41-5H44 for example, where widget 5022*g* moves in a respective user-arranged home screen user interface independent from application icons. After widget 5022*g* has been brought into home screen user interface 5214', the application icons 5-16 have been organized into sub-grids the same size as widget 5022*g* (FIG. 5H41). As widget 5022*g* is moved within home screen user interface 5214' in accordance with movement of contact 6630, the sub-grids of application icons are rearranged to make space for widget 5022*g* but do not follow the movement of widget 5022*g* (FIGS. 5H42-5H44).

In some embodiments, the first criteria include (13016) a fifth requirement that is met when the respective page includes a third user interface object containing application content and that the third user interface object containing application content is larger than a respective size (e.g., larger than the first user interface object containing application content); and the second criteria include a sixth requirement that is met when the respective page does not include a user interface object containing application content that is larger than the respective size (e.g., the first user interface object containing application icon is the largest or only user interface object containing application content on the respective page). For example, in some embodiments, when a 2×2 widget that is placed side by side with a 2×2 sub-grid of application icons in the respective page is dragged away from its original placement location on the respective page, if there is another widget that is larger than the 2×2 widget (e.g., a 2×4 widget, a 4×4 widget, etc.) on the same respective page, the 2×2 sub-grid of application icons will follow the 2×2 widget as the 2×2 widget moves around the respective page; but the 2×2 sub-grid of application icons will remain their original locations and not follow the 2×2 widget as the 2×2 widget moves around the respective page if there isn't another widget larger than the 2×2 widget on the respective page. After the end of the input, if there is another widget that is larger than the 2×2 widget on the respective page, the 2×2 sub-grid of application icons will still be by side by side with the 2×2 widget (e.g., in a different row). Maintaining the first plurality of application icons at the first set of placement locations or moving a second plurality of application icons that are located in a second set of placement locations relative to the first placement location of the first user interface object containing application content in an opposite direction of the movement of the first user interface object containing application content, depending on whether the second or the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H3-5H6 for example, where 2×2-sized widget 5022*g* moves within user-arranged home screen 5210' in accordance with drag input by contact 6602 along with application icons 5008*a*-5008*d*. Drag input by contact 6602 is detected on widget 5022*g* (FIG. 5H3). Widget 5022*g* is moved downwards in user-arranged home screen 5210' in accordance with movement of contact 6602, but the presence of 2×4-sized widget 5022*h* requires the movement of widget 5022*g* in a 2×4-sized array (e.g., to make space to exchange placement locations with widget 5022*h*). Thus, application icons 5008*a*-5008*d* are arranged in a 2×2 array, and as widget 5022*g* is dragged downward by contact 6602 past 2×4 widget 5022*h*, the array of application icons move together tracking the movement of widget 5022*g* (FIGS. 5H4-5H5). After termination of contact 6602, the 2×4 array of widget 5022*g* and application icons 5008*a*-5008*d* have exchanged places with 2×4 widget 5022*h* (FIG. 5H6).

In some embodiments, the first set of placement locations corresponds (13018) to a cluster of adjacent placement locations (e.g., a sub-grid in a full grid of icon placement locations in the respective page), and the first plurality of application icons are moved as a group to follow the direction of movement of the first user interface object containing application content. Moving the first plurality of application icons to follow the direction of movement of the first user interface object containing application content, when the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H1-5H3 for example, where widget 5022*g* moves within user-arranged home screen 5210' in accordance with drag input by contact 6600 and exchanges places with application icons 5008*a*-5008*d*. Application icons 5008*a*-5008*d* are arranged in a 2×2 array, and as widget 5022*g* is dragged right by contact 6600 the array of application icons move rightward together (FIG. 5H2). After termination of contact 6600, widget 5022*g* is placed in the location previously occupied by application icons 5008*a*-5008*d* (FIG. 5H3).

In some embodiments, moving the first plurality of application icons to follow the direction of movement of the first user interface object containing application content includes (13020) maintaining a relative position of the first plurality of application icons to each other when moving the first plurality of application icons to follow the direction of movement of the first user interface object containing application content. Maintaining a relative position of the first plurality of application icons to each other when moving the first plurality of application icons to follow the direction of movement of the first user interface object containing application content performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H2-5H3 for example, where application icons 5008*a*-5008*d* follow the movement of widget 5022*g* within user-arranged home screen 5210' in accordance with drag input by contact 6600. As widget 5022*g* and application icons 5008*a*-5008*d* exchange place, the ordering of the application icons is maintained (e.g., application icons 5008*a*-5008*d* are not rearranged with respect to each other) (FIGS. 5H2-5H3).

In some embodiments, moving the first plurality of application icons to follow the direction of movement of the first user interface object containing application content includes (13022) moving respective ones of the first plurality of application icons with different values for one or more movement characteristics (e.g., speed, acceleration, direction, etc.) (e.g., adjacent application icons in the first plurality of application icons move at different speeds or with different accelerations while following the movement of the widget). Moving the respective ones of the first plurality of application icons to follow the direction of movement of the first user interface object containing application content with different values for one or more movement characteristics, in response to detecting the first user input and in accordance with a determination that the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H3-5H5 for example, where application icons follow the movement of widget 5022*g*. Application icons 5008*a*-5008*d* follow the movement of widget 5022*g* as the widget is moved downwards in user-arranged home screen 5210' in accordance with movement of contact 6602 (FIG. 5H3). As application icons 5008*b* and 5008*d* are located closer to widget 5022*g* in the user-arranged home screen user interface 5210', these application icons follow the movement of widget 5022*g* more closely than application icons 5008*a* and 5008*c* (FIG. 5H4-5H5).

In some embodiments, moving the first plurality of application icons to follow the direction of movement of the first user interface object containing application content includes (13024) moving at least one of the first plurality of application icons with a different value for one or more respective movement characteristics (e.g., speed, acceleration, direction, etc.) from that of the first user interface object containing application content. Moving at least one of the first plurality of application icons with a different value for one or more respective movement characteristics, in response to detecting the first user input and in accordance with a determination that the first criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H43-5H5 for example, where application icons follow the movement of widget 5022*g*. Application icons 5008*a*-5008*d* follow the movement of widget 5022*g* as the widget is moved downwards in user-arranged home screen 5210' in accordance with movement of contact 6602 (FIG. 5H3). As application icons 5008*b* and 5008*d* are located closer to widget 5022*g* in the user-arranged home screen user interface 5210', these application icons follow the movement of widget 5022*g* more closely than application icons 5008*a* and 5008*c* (FIG. 5H4-5H5).

In some embodiments, in response to detecting the first user input (13026): in accordance with a determination that the first user interface object has been moved (or is in the process of being moved, as in the widget is still being dragged) to a second page of the home screen user interface, and that the second page of the home screen user interface includes a third plurality of application icons in a first arrangement that meets third criteria (e.g., the first arrangement of application icons is in a single row of grid locations, the first arrangement of application icons occupy a sub-grid that is half the height and twice the width of the size of the first user interface object containing application content, etc.), the computer system rearranges the third plurality of application icons from the first arrangement into a second arrangement that is different from the first arrangement without the first user interface object being moved to a third set of placement locations of the third plurality of application icons in the first arrangement. For example, in some embodiments, as soon as the first user interface object containing application content appears on the second page of the home screen user interface, overlaying an unoccupied area of the second page of the home screen user interface, the computer system automatically rearranges the third plurality of application icons from the first arrangement (e.g., a single row, 1×4 sub-grid, 1×6 sub-grid, etc.) to the second arrangement (e.g., into a 2×2 sub-grid, a 2×3 sub-grid, etc.) in accordance with a size (e.g., 2×2, 2×3, etc.) of the first user interface object containing application content. Rearranging the third plurality of application icons from the first arrangement into a second arrangement that is different from the first arrangement without the first user interface object being moved to a third set of placement locations of the third plurality of application icons in the first arrangement, in response to detecting the first user input and in accordance with a determination that the first user interface object has been moved to a second page of the home screen user interface including a third plurality of application icons in a first arrangement that meets third criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H33-5H35 for example, where application icons reflow to form a 2×2 sub-grid to make space for a 2×2 widget. Application icons 1-4 are initially arranged in a single row as widget 5022*g* is moved into user-arranged home screen 5212' in accordance with movement of contact 6630 (FIG. 5H33). As widget 5022*g* is a 2×2 widget, application icons 1-4 rearrange into a 2×2 array (FIGS. 5H34-5H35).

In some embodiments, in response to detecting the first user input (13028): in accordance with a determination that the first user interface object has been moved (or is in the process of being moved, as in the widget is still being dragged) to the second page of the home screen user interface, and that the second page of the home screen user interface includes the third plurality of application icons in the first arrangement that meets third criteria (e.g., the first arrangement of application icons is in a single row of grid locations, the first arrangement of application icons occupy a sub-grid that is half the height and twice the width of the size of the first user interface object containing application content, etc.), the computer system shifts the third plurality of application icons in the second arrangement on the second page to make room for the first user interface object containing application content on the second page (e.g., in response to movement of the first user interface object to a fourth set of placement locations of the third plurality of application icons in the second arrangement). For example, in some embodiments, as soon as the first user interface object containing application content appears on the second page of the home screen user interface, overlaying an unoccupied area of the second page of the home screen user interface, the computer system automatically rearranges the third plurality of application icons from the first arrangement (e.g., a single row, 1×4 sub-grid, 1×6 sub-grid, etc.) to the second arrangement (e.g., into a 2×2 sub-grid, a 2×3 sub-grid, etc.) in accordance with a size (e.g., 2×2, 2×3, etc.) of the first user interface object containing application content. After that, when the first user interface object is hovered at a position in front of or over the third plurality of application icons in the second arrangement, the third plurality of application icons in the second arrangement move out of the way (e.g., shift rightward) as a group to make room for the first user interface object. Shifting the third plurality of application icons in the second arrangement on the second page to make room for the first user interface object containing application content on the second page, in response to detecting the first user input and in accordance with a determination that the first user interface object has been moved to the second page of the home screen user interface including the third plurality of application icons in the first arrangement that meets third criteria, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H39-5H44 for example, where application icons reflow to form 2×2 sub-grids to accommodate widget 5022*g*. Application icons 5-16 are initially arranged in a 3×4 grid as widget 5022*g* is moved into user-arranged home screen 5212' in accordance with movement of contact 6630 (FIG. 5H39). As widget 5022*g* is a 2×2 widget, the application icons rearrange into 2×2 sub-grids (FIGS. 5H40-5H41). Widget 5022*g* moves within user-arranged home screen 5214' in accordance with movement of contact 6630, and the sub-grids of application icons reflow to make space for the widget (FIGS. 5H42-5H44).

In some embodiments, in the first arrangement, a subset of the application icons are (13030) arranged in a single row, and, in the second arrangement, the subset of the application icons are arranged in a multi-row array that corresponds to a size of the first user interface object. For example, in some embodiments, a row of application icons (e.g., three or four application icons in a single row) on a page are automatically arranged into a 2×2 sub-grid, when a 2×2 widget is dragged onto the page (e.g., without the 2×2 widget being dragged over to the locations of the row of application icons). Arranging the subset of the application icons in a single row or multi-row array, depending on whether they are in the first arrangement or the second arrangement, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H33-5H35 for example, where application icons reflow to form a 2×2 sub-grid. Application icons 1-4 are initially arranged in a single row as widget 5022*g* is moved into user-arranged home screen 5212' in accordance with movement of contact 6630 (FIG. 5H33). As widget 5022*g* is a 2×2 widget, application icons 1-4 rearrange into a 2×2 array (FIGS. 5H34-5H35).

In some embodiments, in response to detecting the first user input (13032): in accordance with a determination that the first user interface object has been moved to a third page of the home screen user interface, and that the third page of the home screen user interface includes a fourth plurality of application icons in the third arrangement at a fourth set of placement locations that meets fourth criteria (e.g., the third arrangement of application icons is in a single row of grid locations, the first arrangement of application icons occupy a sub-grid that is half the height of the first user interface object containing application content, etc.), shifting the fourth plurality of application icons in the third arrangement on the third page to make room for the first user interface object containing application content without the first user interface object being moved to location corresponding to the fourth set of placement locations of the fourth plurality of application icons in the third arrangement (and, optionally, without rearranging the fourth plurality of application icons relative to each other). For example, in some embodiments, when a 2×4 or 4×4 widget is moved to a page that includes a single row of application icons or an odd number of rows of application icons, a whole row of application icons (e.g., the top row, the bottom row, etc.) shifts downward automatically to make room for the 2×4 or 4×4 widget above the whole row of application icons, as soon as the 2×4 or 4×4 widget is moved to the page, before the first user interface object is dragged over to the original location of the row of application icons that are moved. Shifting the fourth plurality of application icons in the third arrangement on the third page to make room for the first user interface object, in response to detecting the first user input and in accordance with a determination that the first user interface object has been moved to a third page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H27-5H29 for example, where a first user-arranged home screen 5210', including a plurality of application icons 5008 and one or more widgets 5022 organized in a grid and a second user-arranged home screen 5212' including a single row of application icons (e.g., between one and four application icons) is displayed. In response to detecting drag input by contact 6626 (FIG. 5H27) directed to widget 5022*h*, widget 5022*h* is moved from the first user-arranged home screen 5210' into the second user-arranged home screen 5212' (FIG. 5H28). Concurrent with the entrance of widget 5022*h* (e.g., a 2×4 sized widget) into the second user arranged home screen 5212', the single row of application icons 1-4 moves downwards to make space for widget 5022*h* (FIG. 5H29).

In some embodiments, the fourth plurality of application icons are (13034) located near a top of the third page, and after shifting the fourth plurality of application icons in the third arrangement on the third page, a region near the top of the third page remains unoccupied until the first user interface object is moved to the fourth set of placement locations of the fourth plurality of application icons at the top of the third page. For example, when a 2×4 or 4×4 widget is moved to a page that includes a single row of application icons or an odd number of rows of application icons, a whole top row or rows of application icons (e.g., the top one row, the top two rows, etc.) shift downward automatically to make room for the 2×4 or 4×4 widget above the whole row(s) of application icons, as soon as the 2×4 or 4×4 widget is moved to the page, before the first user interface object is dragged over to the original location of the row(s) of application icons that are moved. Making the region near the top of the third page unoccupied until the first user interface object is moved to the fourth set of placement locations of the fourth plurality of application icons at the top of the third page provides improved visual feedback to the user. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5H29-5H30 for example. As widget 5022*h* is moved into the second user-arranged home screen, the single row of application icons 1-4 are automatically moved downwards to vacate a potential placement location for widget 5022*h* (FIG. 5H29). When contact 6626 ends, widget 5022*h* is automatically placed at the top of the grid of the second user-arranged home screen 5212' (FIG. 5H30).

In some embodiments, in response to detecting the first user input (13036): in accordance with a determination that fifth criteria are met (e.g., there are consecutive application icons on the respective page that occupy a sub-grid that is at least as wide as, and/or as tall as the first user interface object that is being dragged), the computer system moves a first group of application icons and a second group of application icons on the respective page of the home screen user interface in accordance with the movement of the first user interface object on the respective page, wherein: an arrangement of application icons relative to each other in the first group is maintained while the first group is moved on the respective page; an arrangement of application icons relative to each other in the second group is maintained while the second group is moved on the respective page; and a size of the first group of application icons and a size of the second group of application icons are selected based on a size of the first user interface object containing application content. For example, in some embodiments, when a 2×2 widget is dragged out of its placement location on the respective page, the application icons on the respective page are grouped into 2×2 blocks, and at least some of the 2×2 blocks of application icons are moved as individual groups (e.g., reflowed, following the dragged widget, etc.) on the respective page in accordance with the movement of the dragged widget and in some embodiments, when a 2×4 widget is dragged out of its placement location on the respective page, the application icons on the respective page are grouped into 2×4 blocks, and at least some of the 2×4 blocks of application icons are moved as individual groups (e.g., reflowed, following the dragged widget, etc.) on the respective page in accordance with the movement of the dragged widget. Moving the first group and the second group, selecting a size of the first group of application icons and a size of the second group of application icons based on a size of the first user interface object containing application content and maintaining the arrangement of application icons relative to each other in the first and the second group while the first and the second group are moved on the respective page, in response to detecting the first user input and in accordance with a determination that the fifth criteria are met, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H6-5H8 for example, where a respective user-arranged home screen 5210' that includes a plurality of application icons 5008 and one or more widgets 5022 organized in a grid. In response to detecting drag input by contact 6604 (FIG. 5H6) directed to widget 5022*g*, widget 5022*g* is moved downwards in the respective user-arranged home screen 5210' in accordance with the movement of contact 6604. Concurrent with movement of widget 5022*g* within the respective user-arranged home screen 5210', application icons are organized into sub-grids that are the same size as widget 5022*g* (e.g., 2×2 sub-grids) and are moved to make space for widget 5022*g* in the full-sized grid of the respective user-arranged home screen 5210' (FIGS. 5H7-5H8). For example, a first sub-grid of application icons 5008*g*-5008*h* and 5008*k*-50081 move in unison and a second sub-grid of application icons 5008*e*-5008*f* and 5008*i*-5008*j* move in unison.

In some embodiments, the computer system receives (13038) a request to remove the first user interface object from the respective page (e.g., the first user interface object is dragged to another page in response to a user input). In response to receiving the request to remove the first user interface object from the respective page, the computer system rearranges application icons on the respective page, including changing an arrangement of the first and second groups of application icons by reflowing the first and second groups of application icons while maintaining the arrangement of the application icons within the first and second groups of application icons (e.g., sequential order of the application icons in a respective group remain unchanged before and after the first user interface object is moved out of the respective page). For example, in some embodiments, when a 2×2 widget is dragged out of its placement location on the respective page, the application icons on the respective page are grouped into 2×2 blocks, and at least some of the 2×2 blocks of application icons are moved as individual groups (e.g., reflowed, following the dragged widget, etc.) on the respective page in accordance with the movement of the dragged widget; and when the 2×2 widget is dragged to another page, application icons below and/or to the right of the original placement location of the 2×2 widget that remain on the respective page reflow in 2×2 blocks to fill the 2×2 slot vacated by the 2×2 widgets. Changing an arrangement of the first and second groups of application icons by reflowing the first and second groups of application icons while maintaining the arrangement of the application icons within the first and second groups of application icons, in response to receiving the request to remove the first user interface object from the respective page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H50-5H51 for example, where widget 5022*g* is dragged from user-arranged home screen 5214' in accordance with movement of contact 6638. Application icons 5-6, 8, and 11-16 are organized into 2×2 sub-grids (FIG. 5H50). As widget 5022*g* leaves user-arranged home screen 5214', application icons 5-6, 8, and 11-16 remain in 2×2 sub-grids (FIG. 5H51).

In some embodiments, the computer system receives (13040) a request to remove the first user interface object from the respective page (e.g., the first user interface object is dragged to another page in response to a user input). In response to receiving the request to remove the first user interface object from the respective page, the computer system rearranges application icons on the respective page, including changing an arrangement of the first and second groups of application icons by reflowing the application icons including changing the arrangement of the application icons within at least one respective group of application icons relative to other application icons within the respective group application icons (e.g., application icons are no longer treated as belonging to a respective group after the first user interface object is moved out of the respective page). For example, in some embodiments, when a 2×2 widget is dragged out of its placement location on the respective page, the application icons on the respective page are grouped into 2×2 blocks, and at least some of the 2×2 blocks of application icons are moved as individual groups (e.g., reflowed, following the dragged widget, etc.) on the respective page in accordance with the movement of the dragged widget; and when the 2×2 widget is dragged to another page, application icons below and/or to the right of the original placement location of the 2×2 widget that remain on the respective page reflow as one by one individual application icons to fill the 2×2 slot vacated by the 2×2 widgets. Changing an arrangement of the first and second groups of application icons by reflowing the application icons including changing the arrangement of the application icons within at least one respective group of application icons relative to other application icons within the respective group application icons, in response to receiving the request to remove the first user interface object from the respective page, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H18-5H19 for example. In the first user-arranged home screen 5022*g*, including a sub-block of application icons 5008*e*, 5008*g*, and 5008*h*-5008*i* and at least one 2×2 widget such as widget 5022*g*, a request to remove widget 5022*g* from the first user-arranged home screen 5210' is received by contact 6610 (FIG. 5H18). In response to removing widget 5022*g* from the first user-arranged home screen 5210', the application icons 5008*e*, 5008*g*, and 5008*h*-5008*i* are reflowed individually out of the 2×2 sub-grid to form a single row (FIG. 5H19).

In some embodiments, while displaying the respective page of the home screen user interface, including displaying the first user interface object at the first placement location and displaying a first set of one or more application icons in one or more placement locations for application icons (immediately) preceding the first placement location (and, optionally, a second set of one or more application icons in one or more placement locations for application icons succeeding the first placement location), the computer system detects (13042) a user input that corresponds to a request to delete an application icon in the first set of one or more application icons. In response to the user input that corresponds to the request to delete the application icon in the first set of one or more application icons: in accordance with a determination that a size (e.g., an aggregated size after reflowing, or a block size without reflowing, etc.) of vacant placement locations for application icons preceding the first placement location (e.g., in a predetermined order of application icons and widgets for the home screen page) does not correspond to a size of the first user interface object (e.g., aggregated size of vacant placement locations after reflowing, or a vacant block size without reflowing, etc. is smaller than the size of the first user interface object), the computer system maintains the first user interface object at the first placement location. For example, in some embodiments, when the respective page of the home screen user interface includes a full row of four application icons followed by a full or partially filled row of application icons (e.g., 1 to 4 application icons), followed by a 2×4 widget in the third and fourth rows, deletion of an application icon from the top two rows does not cause the 2×4 widget to move up, because there isn't sufficient room to accommodate the 2×4 widget in the top two rows. In some embodiments, in response to the user input that corresponds to the request to delete the application icon in the first set of one or more application icons: in accordance with a determination that the size (e.g., an aggregated size after reflowing, or a block size without reflowing, etc.) of vacant placement locations for application icons preceding the first placement location (e.g., in the predetermined order of application icons and widgets for the home screen page) correspond to the size of the first user interface object (e.g., aggregated size of vacant placement locations after reflowing, or a vacant block size without reflowing, etc. is equal to or is greater than the size of the first user interface object), the computer system moves the first user interface object to another placement location different from the first placement location (e.g., without the application icons and/or widgets on the page being reflowed and/or reorganized, with at least some application icons and/or widgets on the page being reflowed and/or reorganized, etc.). Maintaining the first user interface object at the first placement location, in response to the user input that corresponds to the request to delete the application icon in the first set of one or more application icons and in accordance with a determination that a size of vacant placement locations for application icons preceding the first placement location does not correspond to a size of the first user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H15-5H16 for example, where application icon 5008*c* is deleted from the user-arranged home screen 5210'. Tap input by contact 6618 is detected on the deletion affordance 5012*c* associated with application icon 5008*c* (FIG. 5H15). This deletion request causes the device to remove application icon 5008*c* from the home screen; however, there are no application icons 5008 that can be reflow to fill the vacated space, and widget 5022*g* remains in place as there is no space for the 2×2 widget to reflow (FIG. 5H16).

In some embodiments, in response to the user input that corresponds to the request to delete the application icon in the first set of one or more application icons in placement locations for application icons preceding the first placement location (13044): in accordance with a determination that a size of vacant placement locations for application icons preceding the placement location (e.g., after reflowing and regrouping into blocks) does not correspond to the size of the first user interface object (e.g., aggregated size of vacant placement locations after reflowing, or a vacant block size without reflowing, etc. is smaller than the size of the first user interface object) and that the respective page includes a second set of one or more application icons in placement locations for application icons (immediately) following the first placement location (e.g., in a predetermined order of application icons and widgets for the home screen page), the computer system moves an application icon from the second set of one or more application icons to a placement location for application icon that precedes the first placement location (e.g., in a predetermined order of application icons and widgets for the home screen page) (e.g., while the first user interface object remains at the first placement location). For example, in some embodiments, when the respective page of the home screen user interface includes a full row of four application icons followed by a full or partially filled row of application icons (e.g., 1 to 4 application icons), followed by a 2×4 widget in the third and fourth rows, deletion of an application icon from the top two rows does not cause the 2×4 widget to move up, because there isn't sufficient room to accommodate the 2×4 widget in the top two rows; and instead, an application icon that is below the 2×4 widget is moved up directly to a vacated placement location above the 2×4 widget. In some embodiments, when the respective page of the home screen user interface includes a full row of four application icons followed by a full or partially filled row of application icons (e.g., 3 to 4 application icons), followed by a 2×2 widget in the third and fourth rows, deletion of an application icon from the top two rows does not cause the 2×2 widget to move up, because there isn't sufficient room to accommodate the 2×2 widget in the top two rows even after reflowing and grouping of the application icons remaining in the top two rows. In some embodiments, an application icon that is immediately below or immediately to the right of the 2×2 widget is moved up directly to a vacated placement location in the top two rows. In some embodiments, in response to the user input that corresponds to the request to delete the application icon in the first set of one or more application icons in placement locations for application icons preceding the first placement location: in accordance with a determination that the size of vacant placement locations for application icons preceding the placement location (e.g., after reflowing and regrouping into blocks) corresponds to the size of the first user interface object (e.g., aggregated size of vacant placement locations after reflowing, or a vacant block size without reflowing, etc. is equal to or greater than the size of the first user interface object) and that the respective page includes a second set of one or more application icons in placement locations for application icons (immediately) following the first placement location (e.g., in a predetermined order of application icons and widgets for the home screen page), the computer system moves the first user interface object to another placement location different from the first placement location (e.g., without the application icons and/or widgets on the page being reflowed and/or reorganized, with at least some application icons and/or widgets on the page being reflowed and/or reorganized, etc.). Moving an application icon from the second set of one or more application icons to a placement location for application icon that precedes the first placement location, in response to the user input that corresponds to the request to delete the application icon and in accordance with a determination that a size of vacant placement locations for application icons preceding the placement location does not correspond to the size of the first user interface object and that the respective page includes a second set of one or more application icons in placement locations for application icons following the first placement location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H11-5H12 for example, where application icon 5008*a* is deleted from the user-arranged home screen 5210'. Tap input by contact 6610 is detected on the deletion affordance 5012*a* associated with application icon 5008*a* (FIG. 5H11). This deletion request causes the device to remove application icon 5008*a* from the home screen, which permits reflow of individual application icons 5008*b*-5008*d* from below the 2×4 widget 5022*h* to fill the vacated space while widget 5022*g* remains in place (FIG. 5H12).

In some embodiments, while displaying the respective page of the home screen user interface, including displaying the first user interface object at the first placement location and displaying a third set of one or more application icons in placement locations for application icons preceding the first placement location (e.g., in a predetermined order of application icons and widgets for the home screen page), the computer system detects (13046) a user input that corresponds to a request to insert an additional application icon not present in the respective page into the respective page (e.g., wherein the request selects a placement location for the additional application icon by dropping the additional icon while the additional application icon is over the placement location, or wherein the request does not select a placement location for the additional application icon in the respective page by dropping the application icon while the additional application icon is over an unoccupied area of the respective page, etc.). In response to the user input that corresponds to the request to insert the additional application icon into the respective page: in accordance with a determination that there is at least one vacant placement location for application icon preceding the first placement location (e.g., in a predetermined order of application icons and widgets for the home screen page), the computer system inserts the additional application icon into a first vacant placement location for application icon preceding the first placement location. In accordance with a determination that there are no vacant placement locations for application icon preceding the first placement location (e.g., in a predetermined order of application icons and widgets for the home screen page), the computer system inserts the additional application icon into a second vacant placement location for application icon following the first placement location (e.g., in the predetermined order of application icons and widgets for the home screen page). For example, in some embodiments, when the respective page includes application icons in the top two rows and a 2×4 widget below the top two rows, when an additional application icon is dropped onto the page, the application icon will be inserted into the first available placement location for application icon in the page, irrespective of whether the available placement location for application icon precedes or succeeds the 2×4 widget. In some embodiments, in response to a request to insert the additional application icon not present in the respective page into the respective page, in accordance with a determination that the input ended over an unoccupied area following the first placement location for the widget on the respective page, in accordance with a determination that there is at least one vacant placement location for application icon preceding the first placement location (e.g., in a predetermined order of application icons and widgets for the home screen page), the computer inserts the additional application icon into a first vacant placement location for application icon preceding the first placement location (e.g., insertion location is different from the drop location of the application icon); and in accordance with a determination that there are no vacant placement locations for application icon preceding the first placement location (e.g., in a predetermined order of application icons and widgets for the home screen page), the computer system inserts the additional application icon into a second vacant placement location for application icon following the first placement location (e.g., in the predetermined order of application icons and widgets for the home screen page) (e.g., the drop location is the same as the insertion location if the drop location is the first available placement location for application icon following the first placement location of the widget, or the drop location is not the same as the insertion location if the drop location is not the first available placement location for application icon following the first placement location of the widget). Inserting the additional application icon into a first vacant placement location for application icon preceding the first placement location or inserting the additional application icon into a second vacant placement location for application icon following the first placement location, depending on whether there is at least one vacant placement location for application icon preceding the first placement location, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H20-5H21 for example, where application icon 25 is added to the user-arranged home screen 5210'. User input 5120 brings application icon 25 into user-arranged home screen 5210' (FIG. 5H20). Upon release of application icon 25, it is placed above the 2×4 widget **5022*h* to fill the empty space in the 2×4 sub-grid of application icons 5008*e* and 5008*g*-5008*j* (FIG. 5H21**).

In some embodiments, in response to detecting the first user input (13048): in accordance with a determination that sixth criteria are met, wherein the sixth criteria are met when the first user interface object is dragged away from the respective page of the home screen user interface onto a second respective page of the home screen user interface that has an arrangement of application icons that cannot be divided into groups that have a size corresponding to the first user interface object with no more than one group having fewer than a respective number of application icons that form an arrangement in the size corresponding to the first user interface object: the computer system moves a set of application icons on the second respective page to change an original arrangement of the set of one or more application icons on the second respective page of the home screen user interface to an arrangement of application icons that can be divided into groups that have the size corresponding to the first user interface object with no more than one group having fewer than a respective number of application icons that form an arrangement in the size corresponding to the first user interface object. In some embodiments, the set of one or more application icons on the second respective page are organized into the arrangement with the size corresponding to the size of the first user interface object before the first user interface object is moved to a location of the set of one or more application icons and before the first user interface object is dropped into the second respective page. In other words, the computer system organizes the application icons in the second respective page in anticipation of the need to reflow the application icons to accommodate the dragged widget when the widget is dragged around the second respective page and when the widget is dropped onto the second respective page. For example, when a 2×2 sized widget is dragged onto a page, the application icons on the page are grouped into 2×2 blocks, such that there are no blocks with fewer than four application icons on the page, or only one block with fewer than four application icons. As another example, when a 2×4 sized widget is dragged onto a page, the application icons on the page are grouped into 2×4 blocks, such that there are no blocks with fewer than four application icons on the page, or only one block with fewer than eight application icons. Moving a set of application icons on the second respective page to change an original arrangement of the set of one or more application icons on the second respective page of the home screen user interface to an arrangement of application icons that can be divided into groups that have the size corresponding to the first user interface object, in response to detecting the first user input and in accordance with a determination that the first user interface object is dragged away from the respective page of the home screen user interface onto a second respective page of the home screen user interface that has an arrangement of application icons that cannot be divided into groups that have a size corresponding to the first user interface object, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H32-5H36 for example, where widget **5022*g* is moved from a respective user-arranged home screen to another user-arranged home screen. Widget 5022*g* is moved from user-arranged home screen 5210' into user-arranged home screen 5212' in accordance with drag input by contact 6630 (FIGS. 5H32-5H33). As 2×2-sized widget 5022*g* enters user-arranged home screen 5212', the single row of application icons application icons in the home screen organize into a 2×2 sub-grid (FIGS. 5H34-5H35). The application icon rearrangement makes space for widget 5022*g* to be placed in the respective home screen upon termination of contact 6630 (FIGS. 5H36-5H37**).

In some embodiments, in response to detecting the first user input (13050): in accordance with a determination that seven criteria are met after the sixth criteria are met, wherein the seventh criteria are met when the first user interface object is dragged away from the second respective page of the home screen user interface (or inserted into a placement location without displacing an existing user interface object occupying the placement location): the computer system restores the original arrangement of the set of one or more application icons on the second respective page of the home screen user interface (e.g., in response to the first user interface object being dragged away from the respective page, and/or in response to a request to navigate from another page back to the respective page of the home screen user interface after the first user interface object having been dragged away from the respective page, etc.). For example, in some embodiments, a single row of application icons existing on the second respective page are organized into a 2×2 block as soon as a 2×2 widget is dragged onto the second respective page, before the 2×2 widget is dropped over the single row of application icons and before the 2×2 widget is dropped onto the page. In some embodiments, after the 2×2 widget is dragged away from the second respective page, the 2×2 block formed by the single row of application icons are restored to the single row again. In some embodiments, if the 2×2 widget is dropped onto an existing 2×2 widget in the second respective page to create a widget stack, the 2×2 block formed by the single row of application icons are restored into the single row again as well. Restoring the original arrangement of the set of one or more application icons on the second respective page of the home screen user interface, in response to the first user input and in accordance with a determination that the first user interface object is dragged away from the second respective page of the home screen user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H35 and 5H38 for example, where widget 5022*g* is moved from a respective user-arranged home screen to another user-arranged home screen. In user-arranged home screen 5212', application icons 1-4 are arranged into a 2×2 sub-grid (e.g., to accommodate 2×2-sized widget 5022*g*) (FIG. 5H35). As widget 5022*g* is dragged from user-arranged home-screen into user-arranged home screen 5214' in accordance with drag input by contact 6630, application icons 1-4 reform a single row (FIG. 5H38).

In some embodiments, in response to detecting the first user input (13052): in accordance with a determination that seventh criteria are met, wherein the seventh criteria are met when the first user interface object is dragged away from the respective page of the home screen user interface onto a second respective page of the home screen user interface that is different from the respective page of the home screen user interface: the computer system moves existing application icons on the second respective page in one or more groups, where a respective group (e.g., each group, each of some groups, etc.) includes an original arrangement of adjacent application icons on the second respective page that has a size corresponding to a size of the first user interface object. For example, in some embodiments, the second respective page includes two or more rows of application icons, and the existing arrangement of the application icons on the second respective page is divided into blocks that have the same size as the widget that is being dragged onto the second respective page, and moved around the second respective page as individual blocks in response to the movement of the dragged widget to locations occupied by one or more of the blocks. In a more specific example, if the second respective page includes two rows of application icons (e.g., two full rows, or a full row and a partially filled row), when a 2×2 widget is dragged onto the second respective page to a location occupied by the two rows, the two rows of application icons are divided into two groups of 2×2 size (e.g., one block include four application icons in a 2×2 grid, another block include the remaining application icons in a 2×2 block with some empty slots). The two 2×2 groups of application icons are shifted or reflowed on the second respective page in accordance with the current location of the 2×2 widget on the second respective page. Moving existing application icons on the second respective page in one or more groups, where a respective group (e.g., each group, each of some groups, etc.) includes an original arrangement of adjacent application icons on the second respective page that has a size corresponding to a size of the first user interface object, in response to the first user interface and in accordance with a determination that the first user interface object is dragged away from the respective page of the home screen user interface onto a second respective page of the home screen user interface that is different from the respective page of the home screen user interface, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5H38-5H44 for example, where widget 5022*g* is moved from a respective user-arranged home screen to another user-arranged home screen. Widget 5022*g* is moved from user-arranged home screen 5212' into user-arranged home screen 5214' in accordance with drag input by contact 6630 (FIGS. 5H38-5H39). As 2×2-sized widget 5022*g* enters user-arranged home screen 5214', application icons in the home screen organize into 2×2 sub-grids (FIGS. 5H40-5H41). As widget 5022*g* moves within user-arranged home screen 5214' in accordance with contact 6630, the application icon sub-grids move to make space for the widget (FIGS. 5H42-5H44).

In some embodiments, after the first user interface object has been moved away from the first placement location (e.g., still over the respective page, or onto a different page) in accordance with the first user input and before a termination of the first user input is detected, the computer system detects (13054) a second user input that is directed to a third user interface object containing application content. In response to detecting the second user input that is directed to the third user interface object containing application content, in accordance with a determination that the second user input meets seventh criteria (e.g., criteria for detecting a tap input on a widget or otherwise selecting the widget, etc.): the computer system moves the third user interface object containing application content and the first user interface object containing application content as a group in accordance with the first user input (e.g., after or in conjunction with moving the third user interface object containing application content to a current location of the first user interface object containing application content). In some embodiments, upon termination of the first user input, the first user interface object and the third user interface object are dropped onto the currently displayed page together (e.g., into adjacent placement locations) at the time of the termination of the first user input, irrespective of the relative spatial locations of the first user interface object and the third user interface object before the first user input was detected (e.g., on the respective page, or on different pages).

Moving the third user interface object containing application content and the first user interface object containing application content as a group in accordance with the first user input, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5H56-5H60 for example, where multiple widgets flock together. Widget 5022*g* is moved in accordance with drag input by contact 6646. While contact 6646 is maintained on widget 5022*g*, additional contacts are detected on application icon 10 and widget 5022*i* (FIG. 5H56). In accordance with movement of contact 6646, widget 5022*g* and application icon 10 and widget 5022*i* flock together (FIGS. 5H57-5H60).

In some embodiments, after the first user interface object has been moved away from the first placement location (e.g., still over the respective page, or onto a different page) in accordance with the first user input and before a termination of the first user input is detected, the computer system detects (13056) one or more third user inputs that are directed to one or more application icons (e.g., application icons on the respective page, or on one or more different pages of the home screen user interface). In response to detecting the one or more third user inputs that are directed to the one or more application icons, in accordance with a determination that the one or more third user inputs meet eighth criteria (e.g., criteria for detecting a tap input on an application icon or otherwise selecting the application icon): the computer system moves the one or more application icons and the first user interface object containing application content as a group in accordance with the first user input (e.g., after moving the one or more application icons to a current location of the first user interface object containing application content). In some embodiments, upon termination of the first user input, the first user interface object and the one or more application icons are dropped onto the currently displayed page together (e.g., into adjacent placement locations) at the time of the termination of the first user input, irrespective of the relative spatial locations of the first user interface object and the one or more application icons before the first user input was detected (e.g., on the respective page, or on different pages). Moving the one or more application icons and the first user interface object containing application content as a group in accordance with the first user input, in response to detecting the one or more third user inputs that are directed to the one or more application icons and in accordance with a determination that the one or more third user inputs meet certain criteria, performs an operation when a set of conditions has been met without requiring further user input, Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5H47-5H51 for example, where a plurality of application icons flock with widget 5022*g* as widget 5022*g* is moved. Widget 5022*g* is moved in accordance with drag input by contact 6638. While contact 6638 is maintained on widget 5022*g*, additional contacts are detected on individual application icons 9, 10, and 7 (FIGS. 5H47-5H48), causing application icons 7, 9, and 10 to flock with widget 5022*g*. In accordance with movement of contact 6638, widget 5022*g* and application icons 9, 10, and 7 move together (FIGS. 5H48-5H51).

In some embodiments, in accordance with a determination that at least one object is being moved with the first user interface object as a group in accordance with the first user input, the computer system displays (13058) an indicator of a count of the at least one object (e.g., showing a count of the number of widgets and application icons that are being moved with the first selected widget as a group in accordance with the first user input, as a result of having been selected by user inputs during the first user input). In some embodiments, the indicator displays a count of the objects that has been moved to the current location of the first user interface object. In some embodiments, the indicator displays a total count of objects that are being moved together as a group, including the first user interface object. In some embodiments, the count includes a count of the multiple widgets being moved. In some embodiments, the count includes a count of one or more application icons and one or more widgets. In some embodiments, when a widget stack that includes a plurality of user interface objects containing application content (e.g., widgets) associated with the same placement location is being moved with the first user interface object as a group, the count is incremented by the number of plurality of user interface objects containing application content (e.g., widgets) in the widget stack. Displaying an indicator of a count of the at least one object provides improved visual feedback to the user and in accordance with a determination that at least one object is being moved with the first user interface object as a group in accordance with the first user input. Providing improved visual feedback enhances the operability of the device and makes the user-device interface more efficient, which, additionally, reduces power usage and improves battery life of the device by enabling the user to use the device more quickly and efficiently. These features are illustrated in FIGS. 5H48-5H49 for example, where the number of widgets and application icons flocking together is indicated. For example, when application icons 9 and 10 are flocking with widget 5022*g*, indicator icon 5024 indicates that there are 3 user interface objects in the flock (FIG. 5H48). When application icon 7 flocks with widget 5022*g* and application icons 9 and 10, indicator icon 5024 indicates that there are 4 user interface objects in the flock (FIG. 5H49).

In some embodiments, after the first user interface has been moved away from the first placement location (e.g., still over the respective page, or onto a different page) in accordance with the first user input and before a termination of the first user input is detected, the computer system detects (13060) that the first user interface object is moved to a placement location of a fourth user interface object containing application content. In response to detecting that the first user interface object is moved to the placement location of the fourth user interface object containing application content: in accordance with a determination that merging criteria are met (e.g., the first user interface object hovers over the fourth user interface object while the fourth user interface object has not moved out of its original placement location yet), the computer system displays visual feedback to indicate that the first user interface object will be grouped with the fourth user interface object (e.g., changing an appearance of the fourth user interface object (e.g., enlarging the fourth user interface object, lifting the fourth user interface object toward the first user interface object, etc.) as a feedback to indicate that the first user interface object will be merged with the fourth user interface object to create a user interface object group (e.g., a widget stack) if dropped over the fourth user interface object). In some embodiments, in response to detecting that the first user interface object is moved to the placement location of the fourth user interface object containing application content: in accordance with a determination that displacing criteria are met (e.g., the first user interface object hovers over a peripheral region of or outside the fourth user interface object), the computer system moves the fourth user interface object out of its current placement location (e.g., to make room for the insertion of the first user interface object). In some embodiments, the computer system detects termination of the input that drags the first user interface object to the placement location of the fourth user interface object containing application content, in accordance with a determination that the merging criteria are met, the computer system creates a user interface object group (e.g., a widget stack) including both the first user interface object and the fourth user interface object; and in accordance with a determination that the displacing criteria are met, the computer system displays the first user interface object at the placement location of the fourth user interface object and displays the fourth user interface object at a different placement location (e.g., an adjacent placement location, a placement location on a different page, etc.). In some embodiments, if the first user interface object is being dragged with other user interface objects containing application content, and that the dragged user interface objects are of the same size, they can be dropped onto an existing user interface object containing application content or existing user interface object group of the same size to create a user interface object group (e.g., widget stack) that includes all or a predetermined set of the dragged user interface objects containing application content and the existing user interface object(s) containing application content at the drop location (e.g., creating a new widget stack or merged into the existing widget stack). In some embodiments, if the dragged user interface object containing application content is being dragged with at least one application icon, then when the dragged user interface object containing application content is dropped onto an existing user interface object containing application content or an existing user interface object group (e.g., an existing widget stack), the dropped user interface object is not merged into the existing user interface object(s) containing application content at the drop location (e.g., it may displace the existing user interface object(s) containing application content or be inserted in an adjacent location, etc.). Performing an operation when a set of conditions has been met without requiring further user input controls (e.g., forming the widget stack without individually selecting individual widgets to insert into a stack) enhances the operability of the device, which, additionally, reduces power usage and improves battery life of the device by enabling the user to use the device more quickly and efficiently. These features are illustrated in FIGS. 5H72-5H75 for example, where a widget 5022*i* is dragged over another widget 5022*g* in the user-arranged page 5218', and dropped onto the widget 5022*g*, and as a result, the widget 5022*g* and the widget 5022*i* merge into a widget stack comprising both widgets at the placement location of the widget 5022*g*.

It should be understood that the particular order in which the operations in FIGS. 13A-13H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, 11000, 12000, and 14000) are also applicable in an analogous manner to method 13000 described above with respect to FIGS. 13A-13H. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 13000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 9000, 10000, 11000, 12000, and 14000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 13A-13H are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 14A-14G are flow diagrams illustrating a method for configuring user interface objects containing application content (e.g., widgets, mini application objects, etc.) and adding the same to another user interface (e.g., a page of a home screen), in accordance with some embodiments.

This method 14000 relates to providing a widget selection user interface in which a preconfigured widget and/or widget stack can be configured and from which the preconfigured widget and/or widget stack can be added to another user interface. As disclosed herein the widget selection user interface serves the function of a mini library of preconfigured widgets and/or widget stacks, but also allows access to widget-specific configuration options for preconfigured widgets and/or widget stacks. The widget selection user interface and the widget-specific configuration user interface optionally display the widgets with the currently selected configuration options, and real-time data from the widget(s) corresponding application(s). The widget selection user interface that serves the combined functions of allowing the user to view preconfigured widgets and providing access to configuration options for the widgets, as well as allowing the user to select and insert/move one or more widgets from the widget selection user interface or widget-specific configuration user interface to another user-selected location improves enhances the operability of the device (e.g., by making it easier to discover widgets and adding widgets to another location) and makes the user-device interface more efficient (e.g., by helping the user to achieve an intended outcome with required inputs and reducing user mistakes when operating/interacting with the device), which improves battery life of the device (e.g., by helping the user to use the device more quickly and efficiently).

The method 140000 is performed at a computer system (e.g., a computer, an electronic device, a handheld electronic device, a portable electronic device, a tablet device, a mobile phone, etc.) in communication with a display generation component (e.g., a touch-sensitive display, a display, a projector, a head mounted display (HMD), etc.). In some embodiments, the computer system includes one or more processors and memory that are enclosed in the same housing, while the display generation component is enclosed in a different housing from the computer system. In some embodiments, the computer system including one or more processors and memory is enclosed in the same housing as the display generation component. In some embodiments, the computer system is in communication with one or more input devices (e.g., touch sensitive surfaces, touch-screen display, cameras, joysticks, motion detectors, etc.). In some embodiments, at least some of the one or more input devices are integrated with the display generation component (e.g., a touch-sensitive surface is integrated with a display in a touch-screen display, a camera is integrated with a display in a head-mounted display, etc.). In some embodiments, at least some of the input devices are enclosed in the same housing as the computer system, and optionally, the display generation component.

In the method 14000, the computer system displays (14002), via the display generation component, a first user interface (e.g., a widget configuration user interface that includes a plurality of preconfigured widgets for user selection) for selecting user interface objects for placement on a home screen user interface of the computer system (e.g., preconfigured widgets for different applications), wherein the first user interface includes a first user interface object that includes application content corresponding to a first application (e.g., a first widget for a first application). While displaying the first user interface, the computer system detects (14004) a first user input that is directed to a respective location in the first user interface. In response to detecting the first user input that is directed to the respective location in the first user interface (14006): in accordance with a determination that the respective location corresponds to a location of the first user interface object that includes application content corresponding to the first application (e.g., the first widget) and is preconfigured with one or more predetermined configuration options corresponding to the first user interface object (e.g., a first widget size, and a first widget type, etc.), and that the first user input is a first type of input (e.g., a tap input, etc.), the computer system displays (14008) (e.g., in a widget-specific configuration user interface for the first widget) one or more first controls for changing one or more configuration options for the first user interface object to configuration options that are different from the one or more predetermined configuration options (e.g., without placing the first user interface object on a respective user interface (e.g., home screen, widget screen, etc.) of the computer system). In some embodiments, to detect the first type of input, the computer system detects a contact on a touch-sensitive surface and detects lift-off of the contact within a threshold amount of time of the initial detection the contact. In some embodiments, the first type of input is an in-air tap input that is detected in conjunction with a gaze input and that includes a quick downward movement of an index finger that last less than a threshold amount of time. In some embodiments, the first type of input is a tap input on a surface that is detected using a camera. In response to detecting the first user input that is directed to the respective location in the first user interface (14006): in accordance with a determination that the respective location corresponds to the location of the first user interface object that includes application content corresponding to the first application, and that the first user input is a second type of input different from the first type of input (e.g., a select and drag input, etc.), the computer system displays (14010), in a respective user interface (e.g., a page of a home screen user interface, a widget screen, etc.) different from the first user interface (e.g., a widget selection user interface), the first user interface object that includes application content corresponding to the first application with the one or more predetermined configuration options corresponding to the first user interface object. In some embodiments, to detect the second type of input, the computer system detects a contact on a touch-sensitive surface and detects movement of the contact after the contact has been kept substantially stationary for at least a threshold amount of time since the initial detection the contact. In some embodiments, the second type of input is an in-air flick input that includes a quick flick movement of an index finger that is detected in conjunction with a gaze input. In some embodiments, the second type of input is a touch-hold input followed by a drag input on a surface that are detected using a camera. In some embodiments, the first user interface (e.g., the widget selection user interface) is displayed in response to activation of the “add widget” button on a page of a home screen user interface already in the first configuration mode, and dragging a widget shown on the first user interface causes display of the page of the home screen user interface in the first reconfiguration mode again. These features are illustrated in FIG. 5I2-5I7 for example, where a widget configuration user interface 5250 (FIG. 5I2) that includes a plurality of user interface objects (e.g., widgets 5022 and widget stacks 5024) is displayed. In response to detecting a first user input by a contact 6806 directed to a first widget **5022*n* (FIG. 5I2), a widget-specific configuration user interface 5270 including one or more configurations options (e.g., widget size options 5274 and widget types 5278) is overlaid on the widget configuration user interface 5250 (FIG. 5I7). In response to detecting a second user input by contact 6804 directed to widget 5022*n* (FIG. 5I2), the widget configuration user interface 5250 is replaced by a respective user-arranged home screen 5230' in the first reconfiguration mode and widget 5022*n* is displayed in the respective user-arranged home screen 5230' (FIG. 5I3-5I6**).

In some embodiments, the first user interface includes (14012) a second user interface object, different from the first user interface object, that includes application content corresponding to a second application. In response to detecting the first user input that is directed to the respective location in the first user interface: in accordance with a determination that the respective location corresponds to a location of the second user interface object that includes application content corresponding to the second application (e.g., a second widget) and is preconfigured with one or more predetermined configuration options corresponding to the second user interface object (e.g., a second widget size, and a second widget type, etc.), and that the first user input is the first type of input (e.g., a tap input, etc.), the computer system displays (e.g., in a widget-specific configuration user interface for the second widget) one or more second controls for changing one or more configuration options for the second user interface object to configuration options that are different from the one or more predetermined configuration options corresponding to the second user interface object (e.g., without placing the second user interface object on the respective user interface of the computer system). In accordance with a determination that the respective location corresponds to the location of the second user interface object that includes application content corresponding to the second application, and that the first user input is the second type of input different from the first type of input (e.g., a select and drag input, etc.), the computer system displays, in the respective user interface different from the first user interface, the second user interface object that includes application content corresponding to the second application with the one or more predetermined configuration options corresponding to the second user interface object. Displaying, in the respective user interface different from the first user interface, the second user interface object that includes application content corresponding to the second application with the one or more predetermined configuration options corresponding to the second user interface object, in accordance with a determination that the first user input is the second type of input different from the first type of input and the respective location corresponds to the location of the second user interface object that includes application content corresponding to the second application, reduces the number of inputs needed to perform an operation (e.g., by making it easier to discover widgets and adding widgets to another location). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5I2-5I7 for example, where a widget configuration user interface 5250 (FIG. 5I2) that includes a plurality of user interface objects (e.g., widgets 5022 and widget stacks 5024) is displayed. In response to detecting a first user input by a contact 6806 directed to a second user interface object 5022 (FIG. 5I2), a widget-specific configuration user interface 5270 including one or more configurations options (e.g., widget size options 5274 and widget types 5278) is overlaid on the widget configuration user interface 5250 (FIG. 5I7). In response to detecting a second user input by contact 6804 directed to the second user interface object 5022 (FIG. 5I2), the widget configuration user interface 5250 is replaced by a respective user-arranged home screen 5230' in the first reconfiguration mode and the second user interface object 5022 is displayed in the respective user-arranged home screen 5230' (FIG. 5I3-5I6).

In some embodiments, while displaying (e.g., in a widget-specific configuration user interface for the first widget) the one or more first controls, the computer system detects (14014) one or more configuration inputs that are directed to the one or more first controls. In response to detecting the one or more configuration inputs, the computer system changes at least one of the one or more configuration options corresponding to the first user interface object to configuration options that are different from the one or more predetermined configuration options corresponding the first user interface object. After changing the at least one of the one or more configuration options corresponding to the first user interface object, the computer system detects a second user input that corresponds to a request to add the first user interface object to the respective user interface (e.g., the second input selects and drags the first widget, or taps an "add" affordance that is displayed concurrently with the first widget in the widget-specific configuration user interface of the first widget, etc.). In response to detecting the second user input, the computer system displays the first user interface object that includes application content corresponding to the first application in the respective user interface with the at least one of the one or more configuration options of the first user interface object being different from the one or more predetermined configuration options corresponding to the first user interface object. Changing at least one of the one or more configuration options corresponding to the first user interface object and displaying the first user interface object with the at least one of the one or more configuration options of the first user interface object reduces the number of inputs needed to perform an operation (e.g., changing the configuration options of the first user interface object and displaying the first user interface object in the respective user interface). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5I11-5I16 for example, where, while displaying the widget-specific configuration user interface 5270 (FIG. 5I11) specific to widget **5022*n*, one or more configuration inputs are detected. In response to detecting a first configuration input by contact 6824, changing the type 5278 of widget 5022*n* (FIG. 5I12). Subsequently, a second user input by contact 6826 directed to the reconfigured widget 5022*n* (FIG. 5112) is detected. In response to movement of the second user input by contact 6804, the widget-specific configuration user interface 5270 is replaced by the respective user-arranged home screen 5230' in the first reconfiguration mode and widget 5022*n* is placed in the respective user-arranged home screen 5230' (FIGS. 5I13-5I16**).

In some embodiments, the first user interface includes (14016) a representation of a plurality of user interface objects containing application content corresponding to different applications, wherein the plurality of user interface objects are associated with the same placement location (e.g., a preconfigured widget stack including multiple widgets corresponding different applications, having a first size, and a first set of predetermined stack configuration options, etc.). In response to detecting the first user input that is directed to the respective location in the first user interface: in accordance with a determination that the respective location corresponds to a location of the representation of the plurality of user interface objects containing application content that are associated with the same placement location, and that the first user input corresponds to a request to add the plurality of user interface objects containing application content to the respective user interface (e.g., the first user input taps on the representation of the widget stack, selects and drags the representation of the widget stack, or taps an "add" affordance that is displayed concurrently with the representation of the widget stack, etc.): the computer system displays one of the plurality of user interface objects containing application content at a respective placement location in the respective user interface (e.g., a page of a home screen user interface, a widget screen, etc.), wherein the respective placement location is selected in accordance with the first user input. For example, in some embodiments, the respective placement location is a default location on a default page (e.g., the last displayed page of the home screen, a first page of the home screen, etc.) if the first user input is an input that taps the "add button" on the widget selection user interface; and the respective placement location is a user-selected location on a user-selected page when the first user input is a drag and drop input that started on the preconfigured widget stack in the widget selection user interface and ended over a placement location that already included other widgets or application icons; and the respective placement location is a first available placement location on a page selected by the user when the first user input is a drag and drop input that started on the preconfigured widget stack in the widget selection user interface and ended on an empty area of a user-selected page. In response to detecting the first user input that is directed to the respective location in the first user interface: in accordance with a determination that the respective location corresponds to a location of the representation of the plurality of user interface objects containing application content that are associated with the same placement location, and that the first user input corresponds to a request to add the plurality of user interface objects containing application content to the respective user interface (e.g., the first user input taps on the representation of the widget stack, selects and drags the representation of the widget stack, or taps an "add" affordance that is displayed concurrently with the representation of the widget stack, etc.): the computer system associates the plurality of user interface objects containing application content with the respective placement location, such that different user interface objects of the plurality of user interface objects containing application content are displayed at the respective placement location at different times (e.g., in response to manual switching inputs (e.g., upward swipes, downward swipes, etc. directed to the respective placement location), and/or events that indicate that automatic switching criteria have been met, etc.). Additional details regarding the display and configuration of, and user interactions with the plurality of user interface objects containing application content that are associated with the same placement location are described with respect to FIGS. 5D1-5D12, 5E1-5E32, 9A-9D, and 10A-10H and are not repeated herein the interest of brevity. Displaying one of the plurality of user interface objects containing application content at a respective placement location in the respective user interface and associating the plurality of user interface objects containing application content with the respective placement location, in response to detecting the first user input and in accordance with a determination that the respective location corresponds to a location of the representation of the plurality of user interface objects containing application content that are associated with the same placement location, reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5I2 and 5I18 for example. Initially, widget stack 5024*i* is displayed in the widget selection user interface 5250, with corresponding widget selection indicator 5312*i* (FIG. 5I2). Tap input by contact 6810 causes the device to place widget stack 5024*i* at the default placement location in user-arranged home screen interface 5230' (FIG. 5I18).

In some embodiments, in response to detecting the first user input that is directed to the respective location in the first user interface (14018): in accordance with a determination that the respective location corresponds to a location of the representation of the plurality of user interface objects containing application content, and that the first user input is the first type of input (e.g., a tap input, etc.), the computer system displays (e.g., in a stack-specific configuration user interface for the widget stack) one or more third controls for changing constituent user interface objects of the plurality of user interface objects associated with the same placement location. In some embodiments, when a tap input is detected at a location of the preconfigured widget stack in the widget selection user interface, the computer system displays configuration options corresponding to the preconfigured widget stack, where the configuration options include one or more selectable options for selecting one or more additional widgets for inclusion in the preconfigured widget stack, and one or more selectable options for removing one or more existing widgets from the preconfigured widget stack. In some embodiments, when a tap input is detected at a location of a preconfigured widget in the widget selection user interface, the computer system displays configuration options corresponding to the preconfigured widget that is tapped, where the configuration options include a selectable option for including the preconfigured widget in the preconfigured widget stack, or deleting the preconfigured widget from the preconfigured widget stack if the preconfigured widget is already part of the preconfigured widget stack. Displaying one or more third controls for changing constituent user interface objects of the plurality of user interface objects associated with the same placement location, in response to detecting the first user input and in accordance with a determination that the respective location corresponds to a location of the representation of the plurality of user interface objects containing application content, performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIGS. 5I2 and 5I7 for example, where a configuration option "Add widget to recommended stack" is included in the widget-specific configuration user interface 5270. Toggling control 5290 (FIG. 5I7) would add widget 5022*n* to the recommended widget stack 5024*i* (FIG. 5I2).

In some embodiments, the one or more first controls includes (14020) a respective control for changing a size of the first user interface object from a first (e.g., current or preconfigured/automatically selected) size to a second size that is different from the first size of the first user interface object. In some embodiments, the widget-specific configuration user interface of a preconfigured widget includes a size selector that provides one or more additional selectable sizes that are different from the preconfigured size of the preconfigured widget shown in the widget selection user interface. Including a respective control for changing a size of the first user interface object from a first size to a second size that is different from the first size of the first user interface object in the one or more first controls reduces the number of inputs needed to perform an operation (e.g., a narrower example). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 517 for example, where widget size options 5274*a*, 5274*b*, and 5274*c* permit changing the size of widget 5022*n*.

In some embodiments, while displaying the one or more first controls, the computer system detects (14022) a fourth user input that activates the respective control for changing the size of the first user interface object to the second size that is different from the first size of the first user interface object. In response to detecting the fourth user input that activates the respective control of the one or more first controls, the computer system changes the size of the first user interface object to the second size that is different from the first size of the first user interface object. After changing the size of the first user interface object to the second size, the computer system detects a fifth user input that meets preset criteria for adding the first user interface object with the second size to the respective user interface (e.g., the third input selects and drags the first widget, or taps an "add" affordance that is displayed concurrently with the first widget in the widget-specific configuration user interface of the first widget, etc.). In response to detecting the fifth user input, the computer system displays the first user interface object that includes application content corresponding to the first application in the respective user interface with the second size that is different from the first size of the first user interface object. Including a respective control for changing the size of the first user interface object reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5I10-5I16 for example. While the widget-specific configuration user interface 5270 is displayed, tap input by contact 6822 is detected directed to widget size radio control 5274*b* (FIG. 5I10). In response to detecting tap input by contact 6822, the size of widget 5022*n* is changed (FIG. 511). After changing the size of widget 5022*n*, another input (e.g., drag input) by contact 6826 is detected directed to widget 5022*n* (FIG. 5I12). In accordance with movement of contact 6826, dragging widget 5022*n* out of widget-specific configuration user interface 5270, widget 5022*n* is placed in the respective user-arranged home screen 5230' (FIGS. 5I12-5I16).

In some embodiments, the one or more first controls include (14024) a respective control for changing a type of the first user interface object from a first (e.g., current or preconfigured/automatically selected) type to a second type that is different from the first type of the first user interface object. In some embodiments, the widget-specific configuration user interface of a widget includes a type selector that provides one or more additional selectable types that are different from the preconfigured type of the widget shown in the widget selection user interface. In some embodiments, different types of the widget include different types of application content (e.g., selected news topics vs. latest news, up-next event, events of the day, etc.) from the corresponding application of the widget. In some embodiments, different types of widgets include different application functions from the application of the widget. Including in the one or more first controls a respective control for changing a type of the first user interface object from a first type to a second type that is different from the first type of the first user interface object reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 517 for example, where selection of widget type options 5278*a*, 5278*b*, and 5278*c* permit changing the type of widget 5022*n*.

In some embodiments, the one or more first controls are (14026) displayed concurrently with an affordance that, when activated, causes the first user interface object to be added to an automatically selected placement location (e.g., a first available placement location in a currently selected page of a home screen user interface (e.g., the last display page of the home screen user interface, a first page of the home screen user interface, etc.)). Including an affordance that, when activated, causes the first user interface object to be added to an automatically selected placement location, reduces the number of inputs needed to perform an operation. Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 512, 517, and 5117 for example. While displaying widget 5022*n* in the widget selection user interface 5250, tap input by contact 6808 on widget selection indicator 5312*o* (FIG. 512) adds widget 5022*n* to the default placement location in the user-arranged home screen user interface 5230' (FIG. 5I17). Similarly, while displaying widget 5022*n* in the widget-specific configuration user interface 5270, tap input by contact 6814 on "Add widget" button 5098 (FIG. 517) adds widget 5022*n* to the default placement location in the user-arranged home screen user interface 5230' (FIG. 5I17).

In some embodiments, the first user interface object, as displayed in the first user interface, includes (14028) current application data (e.g., news, weather, calendar events, device location, etc.) from the first application. While displaying the first user interface object in the first user interface, in accordance with a determination that application data included in the first user interface object is updated in the first application, the computer system updates the first user interface object in the first user interface to show updated application data from the first application (e.g., without navigating away from the first user interface). Updating the first user interface object in the first user interface to show updated application data from the first application while displaying the first user interface object, in accordance with a determination that application data included in the first user interface object is updated in the first application performs an operation when a set of conditions has been met without requiring further user input. Performing an operation when a set of conditions has been met without requiring further user input controls enhances the operability of the device, which, additionally, reduces power usage and improves battery life of the device by enabling the user to use the device more quickly and efficiently. These features are illustrated in FIG. 5I2 for example, where the news widget 5022*n* includes current news application data.

In some embodiments, the first user interface object, as displayed in the first user interface, includes (14030) user-specific application data from the first application (e.g., pictures, contacts, calendar events, messages, reminders, etc. associated with a user of the computer system). Including user-specific application data from the first application in the first user interface object reduces the number of inputs needed to perform an operation (e.g., manually causing the computer system to the display user-specific application data). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIG. 5I2 for example, where the calendar widget in widget stack 5024*i* includes user-specific calendar events and the weather widget 5022*p* includes user-specific live weather information.

In some embodiments, in response to detecting the first user input that is directed to the respective location in the first user interface (14032): in accordance with a determination that the respective location corresponds to the location of the first user interface object that includes application content corresponding to the first application (e.g., the first widget) (e.g., the first user interface object is preconfigured with the one or more predetermined configuration options corresponding to the first user interface object (e.g., a first widget size, and a first widget type, etc.)), and that the first user input is the first type of input (e.g., a tap input, etc.), the computer system displays (e.g., in a widget-specific configuration user interface for the first widget) the first user interface object containing application content from the first application concurrently with the one or more first controls. Displaying the first user interface object containing application content from the first application concurrently with the one or more first controls, in response to the first user input and in accordance with a determination that the respective location corresponds to the location of the first user interface object that includes application content corresponding to the first application, reduces the number of inputs needed to perform an operation (e.g., activating controls for the first user interface object). Reducing the number of inputs needed to perform an operation enhances the operability of the device, and makes the user-device interface more efficient, which, additionally, reduces power usage and improves battery life of the device by enabling the user to use the device more quickly and efficiently. These features are illustrated in FIGS. 5I2 and 5I7 for example, where in response to tap input by contact 6806 on widget 5022*n* (FIG. 5I2), a preview of the first widget 5022*n* is displayed in the widget-specific configuration user interface 5270 (FIG. 5I7).

In some embodiments, while concurrently displaying the one or more first controls and the first user interface object containing application content, the computer system detects (14034) one or more user inputs activating at least one of the one or more first controls. In response to detecting the one or more user inputs activating the at least one of the one or more first controls: the computer system displays a placeholder object in place of the first user interface object while application data corresponding to the first user interface object is being loaded; and the computer system displays the first user interface object in place of the placeholder object after the application data corresponding to the first user interface object has been loaded. For example, when the widget size and/or widget type of the first user interface object is changed by the controls in the widget-specific configuration user interface, the placeholder object having the selected widget size and/or type is displayed in place of the first user interface object while the new application data corresponding to the selected widget size/or type is loading, and the first user interface object is displayed with the selected widget size/or type once the new application data has finished loading into the first user interface object. Displaying a placeholder object in place of the first user interface object while application data corresponding to the first user interface object is being loaded, in response to detecting the one or more user inputs activating the at least one of the one or more first controls, provides improved visual feedback to the user (e.g., indicating where the first user interface object would be placed). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5I7-5I8 for example, wherein widget 5022*n* is displayed in the widget-specific configuration user interface 5270. A drag input by contact 6816 is detected directed to the displayed preview of widget 5022*n* (FIG. 5I7). In response to the drag input by contact 6816, the widget type 5278 of widget 5022*n* is changed (FIG. 5I8). While current data for the new widget type is loading, a placeholder for widget 5022*n* is displayed.

In some embodiments, the first user interface object, as concurrently displayed with the one or more controls, is (14036) animated so that it moves (e.g., back and forth or up and down in a simulated z direction relative to the user interface) separately from a background of the user interface. Moving the first user interface object separately from a background of the user interface provides improved visual feedback to the user (e.g., visually emphasizing the user interface object on the user interface). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5I7-5I8 for example, where the first widget 5022*n* can be scrolled (e.g., in response to drag input by contact 6816) separately from the background of the widget-specific configuration user interface 5270.

In some embodiments, the first user interface object, as concurrently displayed with the one or more first controls, is (14038) animated to tilt in a simulated z direction relative to the background of the user interface. Tilting the first user interface object in a simulated z direction relative to the background of the user interface provides improved visual feedback to the user (e.g., visually emphasizing the user interface object on the user interface). Providing improved visual feedback enhances the operability of the device and makes the user-device interface more efficient, which, additionally, reduces power usage and improves battery life of the device by enabling the user to use the device more quickly and efficiently. These features are illustrated in FIG. 5I7 for example, where the first widget 5022*n* is visually distinguished within the widget-specific configuration user interface 5270 and appears to have a shadow.

In some embodiments, while concurrently displaying the one or more controls and the first user interface object, the computer system detects (14040) an initial portion of a user input that corresponds to a request to drag the first user interface object to a user-selected placement location for the first user interface object. In response to detecting the initial portion of the user input that corresponds to the request to drag the first user interface object to the user-selected placement location for the first user interface object, the computer system changes an appearance of the first user interface object (e.g., enlarging the first user interface object, lifting the first user interface object off the original display layer, by displaying an increase in size of the first user interface object, increasing a visual intensity of a simulated shadow of the first user interface object, etc.) to indicate that the first user interface object is movable with continuation of the user input. Changing an appearance of the first user interface object to indicate that the first user interface object is movable with continuation of the user input, in response to detecting the initial portion of the user input that corresponds to the request to drag the first user interface object to the user-selected placement location for the first user interface object, provides improved visual feedback to the user (e.g., to indicate that the user interface object can be dragged onto the home screen). Providing improved visual feedback enhances the operability of the device and makes the user-device interface more efficient, which, additionally, reduces power usage and improves battery life of the device by enabling the user to use the device more quickly and efficiently. These features are illustrated in FIGS. 5I2-5I3 for example, where upon drag input by contact 6804 directed to the first widget **5022*n* (FIG. 5I2), the first widget 5022*n* is visually distinguished (e.g., enlarged and outlined) (FIG. 5I3**).

In some embodiments, the first user interface (e.g., the platter that supports the user interface elements of the widget selection user interface, the platter and some or all of the user interface elements of the widget selection user interface, etc.) is (14042) overlaid on a first portion of a page of a home screen user interface, and a second portion of the page of the home screen user interface is concurrently visible with the first user interface (e.g., the platter that supports the user interface elements of the widget selection user interface, the platter and the user interface elements of the widget selection user interface, etc.). Overlaying the first user interface on a first portion of a page of a home screen user interface and Making the second portion of the page of the home screen user interface concurrently visible with the first user interface provides improved visual feedback to the user (e.g., allowing the user to view both the first user interface and the home screen user interface concurrently). Providing improved visual feedback enhances the operability of the device and makes the user-device interface more efficient, which, additionally, reduces power usage and improves battery life of the device by enabling the user to use the device more quickly and efficiently. These features are illustrated in FIG. 5I7 for example, where the widget-specific configuration user interface 5270 is displayed overlaid on the user-arranged home screen 5230', leaving a portion of the user-arranged home screen visible.

In some embodiments, the computer system displays (14044), within the first user interface (e.g., a widget configuration user interface that includes a plurality of preconfigured widgets for user selection) a first preconfigured user interface object group (e.g., a first preconfigured widget stack that includes a first collection of system-selected widgets, a recommended widget stack, a smart widget stack, etc.) that includes a first plurality of user interface objects containing application content corresponding to different applications, wherein the first preconfigured user interface object group, when placed on a respective user interface (e.g., a home screen user interface, or a widget screen user interface, etc.) displays (e.g., in response to manual switching inputs or automatic switching condition being met by changed context, etc.) different subset of the first plurality of user interface objects containing application content included in the first preconfigured user interface object group at different times at a placement location of the preconfigured user interface object group. In some embodiments, the first user interface includes multiple preconfigured user interface object groups (e.g., preconfigured widget stacks) that have different sizes (e.g., a respective user interface object group (e.g., each user interface object group, each of multiple user interface object groups, etc.) includes a respective collection of system-selected widgets of a different size (e.g., 2×2, 2×4, 4×4, etc.)). In some embodiments, a size selector is included for the first preconfigured user interface object group, and the size selector includes selectable options corresponding to different sizes for the first preconfigured user interface object group. When a selectable option corresponding to a different size of the first preconfigured user interface object group is selected, the first preconfigured user interface object group is changed to a different size corresponding to the newly selected size. In some embodiments, when a selectable option for a different size is selected, the computer system displays a new preconfigured user interface object group with the newly selected size in the widget selection and configuration user interface. In some embodiments, while the first preconfigured user interface object group is displayed in the first user interface (e.g., a widget configuration user interface that includes a plurality of preconfigured widgets for user selection), the computer system detects a user input that is directed to the first preconfigured user interface object group, and that the user input (e.g., an upward swipe input, a vertical swipe input, etc.) corresponds to a request to switch the currently displayed user interface object containing application content in the first preconfigured user interface object group. In response to detecting the input that corresponds a request to switch the currently displayed user interface object containing application content in the first preconfigured user interface object, switching from displaying a first user interface object containing application content from the first plurality of user interface object containing application content to a second user interface object containing application content from the first plurality of user interface object containing application content, the second user interface object containing application content being different from the first user interface object containing application content. In some embodiments, while the first preconfigured user interface object group is displayed within the first user interface (e.g., a widget configuration user interface that includes a plurality of preconfigured widgets for user selection): at a first time, the computer system displays, in the first preconfigured user interface object group, a third user interface object containing application content from the first plurality of user interface objects containing application content; and at a second time, the computer system switches from displaying the third user interface object containing application content to displaying a fourth user interface object containing application content from the first plurality of user interface object containing application content in the first preconfigured user interface object group. In some embodiments, after the preconfigured first user interface object group is selected by a user input (e.g., a tap on the selection affordance of the preconfigured first user interface object group, or a tap-hold input on the first user interface object group, etc.), the computer system inserts the first user interface object group into a respective placement location on another user interface (e.g., a user-arranged page of a home screen user interface, a widget screen user interface, etc.) in response to a user input that corresponds to a request to add the first preconfigured user interface object group into said other user interface (e.g., the input is a tap input that selects an add button in the widget selection and configuration user interface, the input is a drag and drop input that drags the first preconfigured user interface object away from the widget selection and configuration user interface and drops it into said other user interface, etc.). Displaying a preconfigured user interface object group in a widget selection and configuration user interface for the user to select and insert another user interface improves the operation efficiency of the human-machine interface and enhances the operability of the computer system (e.g., by reducing the number of user inputs needed to accomplish an intended outcome). These features are illustrated for example, in FIG. 52, where a preconfigured widget stack 5024*i* is displayed in the widget selection and configuration user interface 5250, where it can be selected and inserted into a user-arranged page of a home screen via the selection affordance 5312*i* or by dragging and dropping input by a contact. Making preconfigured widget stacks available for selection and insertion into another user interface enhances the operability of the computer system be reducing the number of user inputs required to accomplish a desired outcome, and making the human-machine user interface more efficient. These features are illustrated, for example, in FIG. 512, where a preconfigured widget stack 5024*i* is displayed in a widget selection and configuration user interface 5250 and allows the user to directly insert the widget stack into another user interface using a single input (e.g., a tap input on an add button, or drag and drop input, etc.).

It should be understood that the particular order in which the operations in FIGS. 14A-14G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 6000, 7000, 8000, 9000, 10000, 11000, 12000, and 13000) are also applicable in an analogous manner to method 14000 described above with respect to FIGS. 14A-14G. For example, the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described above with reference to method 14000 optionally have one or more of the characteristics of the contacts, gestures, user interface objects, home screens, home screen user interfaces, application icons, widgets, user interface objects containing application content, page navigation elements, folders, user-arranged pages, system-arranged pages, groupings, application libraries, widget selection and configuration user interfaces, directional conditions, control panels, controls, position thresholds, directional conditions, navigation criteria, movement parameters, thresholds, determinations, focus selectors, and/or animations described herein with reference to other methods described herein (e.g., methods 6000, 7000, 8000, 9000, 10000, 11000, 12000, and 13000). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 14A-14G are, optionally, implemented by components depicted in FIGS. 1A-1B. For example, detection operation and drag operation are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, including:

at a computer system in communication with a display generation component:

displaying a first page of a multipage home screen user interface in a normal mode, wherein respective positions of a first plurality of application icons in the first page of the multipage home screen user interface are not adjustable in accordance with user inputs in the normal mode;

while displaying the first page of the multipage home screen user interface in the normal mode, detecting a respective input that corresponds to a request to transition from the normal mode to a first reconfiguration mode;

in response to detecting the respective input that corresponds to the request to transition from the normal mode to the first reconfiguration mode, displaying the first page of the multipage home screen user interface in the first reconfiguration mode, including displaying a first visual indication in the first page of the multipage home screen user interface to indicate that the first page is displayed in the first reconfiguration mode, wherein the multipage home screen user interface has a plurality of pages, and the respective positions of the first plurality of application icons in the first page of the multipage home screen user interface are adjustable in accordance with user inputs in the first reconfiguration mode;

while displaying the first page of the multipage home screen user interface in the first reconfiguration mode, including displaying the first visual indication in the first page of the multipage home screen user interface to indicate that the first page remains in the first reconfiguration mode, detecting a first input that corresponds to a request to enter a second reconfiguration mode from the first reconfiguration mode, wherein the availability of one or more pages in the multipage home screen user interface can be changed in accordance with user inputs in the second reconfiguration mode;

in response to detecting the first input, replacing display of the first page of the multipage home screen user interface in the first reconfiguration mode with display of respective representations of at least two of the plurality of pages of the multipage home screen user interface in the second reconfiguration mode, including at least a first representation of the first page of the multipage home screen user interface, and a second representation of a second page of the multipage home screen user interface that is different from the first page of the multipage home screen user interface;

while displaying the respective representations of the at least two of the plurality of pages of the multipage home screen user interface in the second reconfiguration mode, including the first representation of the first page and the second representation of the second page, detecting a second input; and in response to detecting the second input, in accordance with a determination that the second input is directed to the second representation of the second page that is displayed in the second reconfiguration mode, and that the second input meets first criteria, displaying the second page of the multipage home screen user interface in the first reconfiguration mode, including displaying the first visual indication in the second page of the multipage home screen user interface to indicate that the second page is displayed in the first reconfiguration mode, wherein respective positions of a second plurality of application icons in the second page of the multipage home screen user interface are adjustable in accordance with user inputs in the first reconfiguration mode.

2. The method of claim 1, wherein respective representations of the plurality of pages of the multipage home screen user interface are displayed in accordance with a first sequential order that corresponds to a sequential order of the plurality of pages in the multipage home screen user interface displayed outside of the second reconfiguration mode, and the method includes:

in response to detecting the second input, in accordance with a determination that the second input is directed to the second representation of the second page that is displayed in the second reconfiguration mode, and that the second input meets second criteria different from the first criteria, adjusting a respective position of the second representation of the second page among the respective representations of the plurality of pages in accordance with the second input, wherein the sequential order of the plurality of pages in the multipage home screen user interface displayed outside of the second reconfiguration mode is adjusted in accordance with the adjustment of the respective position of the second representation of the second page made in response to the second input.

3. The method of claim 1, including:

in response to detecting the second input, in accordance with a determination that the second input meets third criteria that are different from the first criteria, redisplaying the first page of the multipage home screen user interface in the first reconfiguration mode.

4. The method of claim 3, including:

while redisplaying the first page of the multipage home screen user interface in the first reconfiguration mode, detecting a third input that meets the third criteria; and in response to detecting the third input that meets the third criteria, replacing display of the first page in the first reconfiguration mode with display of the first page in the normal mode, wherein a respective application icon of the first plurality of application icons in the first page displayed in the normal mode, when activated by an input that meets the first criteria, causes display of a respective application corresponding to the respective application icon.

5. The method of claim 1, wherein replacing display of the first page of the multipage home screen user interface in the first reconfiguration mode with display of the respective representations of at least two of the plurality of pages of the multipage home screen user interface in the second reconfiguration mode includes:

displaying an animated transition showing the first page of the multipage home screen user interface shrinking down and moving toward a location occupied by the first representation of the first page in the second reconfiguration mode, and representations of one or more pages adjacent to the first page in the multipage home screen user interface coming into view adjacent to the first representation of the first page.

6. The method of claim 1, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a first number of pages, displaying respective representations of the first number of pages with a first size in the second reconfiguration mode; and in accordance with a determination that the multipage home screen user interface includes a second number of pages that is different from the first number of pages, displaying respective representations of the second number of pages with a second size that is different from the first size.

7. The method of claim 1, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a third number of pages, displaying respective representations of the third number of pages in accordance with a first arrangement in the second reconfiguration mode; and in accordance with a determination that the multipage home screen user interface includes a fourth number of pages that is different from the third number of pages, displaying the respective representations of the fourth number of pages with a second arrangement that is different from the first arrangement.

8. The method of claim 1, including:

in response to detecting the second input, in accordance with a determination that the second input corresponds to a request to hide the first page, visually distinguishing the first representation of the first page from the second representation of the second page that is displayed in the second reconfiguration mode;

while displaying the first representation of the first page that is visually marked relative to the second representation of the second page in the second reconfiguration mode, detecting a respective input; and in response to detecting the respective input:

in accordance with a determination that the respective input corresponds to the request to exit the second reconfiguration mode, displaying a respective page of the plurality of pages that is different from the first page of the plurality of pages of the multipage home screen user interface.

9. The method of claim 8, including:

in response to detecting the respective input:

in accordance with a determination that the respective input corresponds to a request to cease hiding the first page, ceasing to visually distinguish the first representation of the first page from the second representation of the second page.

10. The method of claim 8, including:

in response to detecting the respective input:

in accordance with a determination that the respective input is directed to the first representation of the first page that is visually distinguished from the second representation of the second page, and that the respective input meets the first criteria, forgoing displaying the first page of the multipage home screen user interface in the first reconfiguration mode.

11. The method of claim 1, including:

in response to detecting the second input:

in accordance with a determination that the second input meets fifth criteria and that a total number of pages in the multipage home screen user interface exceeds a preset threshold number, scrolling the respective representations of at least two of the plurality of pages of the multipage home screen user interface in the second reconfiguration mode to reveal respective representations of at least one additional page of the plurality of pages that was not initially displayed in the second reconfiguration mode.

12. An electronic device, comprising:

a display;

an input element;

one or more processors; and memory storing one or more programs, wherein the one or more programs are configured to be executed by the one or more processors, the one or more programs including instructions for:

displaying a first page of a multipage home screen user interface in a normal mode, wherein respective positions of a first plurality of application icons in the first page of the multipage home screen user interface are not adjustable in accordance with user inputs in the normal mode;

while displaying the first page of the multipage home screen user interface in the normal mode, detecting a respective input that corresponds to a request to transition from the normal mode to a first reconfiguration mode;

in response to detecting the respective input that corresponds to the request to transition from the normal mode to the first reconfiguration mode, displaying the first page of the multipage home screen user interface in the first reconfiguration mode, including displaying a first visual indication in the first page of the multipage home screen user interface to indicate that the first page is displayed in the first reconfiguration mode, wherein the multipage home screen user interface has a plurality of pages, and the respective positions of the first plurality of application icons in the first page of the multipage home screen user interface are adjustable in accordance with user inputs in the first reconfiguration mode;

while displaying the first page of the multipage home screen user interface in the first reconfiguration mode, including displaying the first visual indication in the first page of the multipage home screen user interface to indicate that the first page remains in the first reconfiguration mode, detecting a first input that corresponds to a request to enter a second reconfiguration mode from the first reconfiguration mode, wherein the availability of one or more pages in the multipage home screen user interface can be changed in accordance with user inputs in the second reconfiguration mode;

in response to detecting the first input, replacing display of the first page of the multipage home screen user interface in the first reconfiguration mode with display of respective representations of at least two of the plurality of pages of the multipage home screen user interface in the second reconfiguration mode, including at least a first representation of the first page of the multipage home screen user interface, and a second representation of a second page of the multipage home screen user interface that is different from the first page of the multipage home screen user interface;

while displaying the respective representations of the at least two of the plurality of pages of the multipage home screen user interface in the second reconfiguration mode, including the first representation of the first page and the second representation of the second page, detecting a second input; and in response to detecting the second input, in accordance with a determination that the second input is directed to the second representation of the second page that is displayed in the second reconfiguration mode, and that the second input meets first criteria, displaying the second page of the multipage home screen user interface in the first reconfiguration mode, including displaying the first visual indication in the second page of the multipage home screen user interface to indicate that the second page is displayed in the first reconfiguration mode, wherein respective positions of a second plurality of application icons in the second page of the multipage home screen user interface are adjustable in accordance with user inputs in the first reconfiguration mode.

13. The electronic device of claim 12, wherein respective representations of the plurality of pages of the multipage home screen user interface are displayed in accordance with a first sequential order that corresponds to a sequential order of the plurality of pages in the multipage home screen user interface displayed outside of the second reconfiguration mode, and the one or more programs include instructions for:

in response to detecting the second input, in accordance with a determination that the second input is directed to the second representation of the second page that is displayed in the second reconfiguration mode, and that the second input meets second criteria different from the first criteria, adjusting a respective position of the second representation of the second page among the respective representations of the plurality of pages in accordance with the second input, wherein the sequential order of the plurality of pages in the multipage home screen user interface displayed outside of the second reconfiguration mode is adjusted in accordance with the adjustment of the respective position of the second representation of the second page made in response to the second input.

14. The electronic device of claim 12, wherein the one or more programs further include instructions for:

in response to detecting the second input, in accordance with a determination that the second input meets third criteria that are different from the first criteria, redisplaying the first page of the multipage home screen user interface in the first reconfiguration mode.

15. The electronic device of claim 14, wherein the one or more programs further include instructions for:

while redisplaying the first page of the multipage home screen user interface in the first reconfiguration mode, detecting a third input that meets the third criteria; and in response to detecting the third input that meets the third criteria, replacing display of the first page in the first reconfiguration mode with display of the first page in the normal mode, wherein a respective application icon of the first plurality of application icons in the first page displayed in the normal mode, when activated by an input that meets the first criteria, causes display of a respective application corresponding to the respective application icon.

16. The electronic device of claim 12, wherein replacing display of the first page of the multipage home screen user interface in the first reconfiguration mode with display of the respective representations of at least two of the plurality of pages of the multipage home screen user interface in the second reconfiguration mode includes:

displaying an animated transition showing the first page of the multipage home screen user interface shrinking down and moving toward a location occupied by the first representation of the first page in the second reconfiguration mode, and representations of one or more pages adjacent to the first page in the multipage home screen user interface coming into view adjacent to the first representation of the first page.

17. The electronic device of claim 12, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a first number of pages, displaying respective representations of the first number of pages with a first size in the second reconfiguration mode; and in accordance with a determination that the multipage home screen user interface includes a second number of pages that is different from the first number of pages, displaying respective representations of the second number of pages with a second size that is different from the first size.

18. The electronic device of claim 12, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a third number of pages, displaying respective representations of the third number of pages in accordance with a first arrangement in the second reconfiguration mode; and in accordance with a determination that the multipage home screen user interface includes a fourth number of pages that is different from the third number of pages, displaying the respective representations of the fourth number of pages with a second arrangement that is different from the first arrangement.

19. The electronic device of claim 12, wherein the one or more programs include instructions for:

in response to detecting the second input, in accordance with a determination that the second input corresponds to a request to hide the first page, visually distinguishing the first representation of the first page from the second representation of the second page that is displayed in the second reconfiguration mode;

while displaying the first representation of the first page that is visually marked relative to the second representation of the second page in the second reconfiguration mode, detecting a respective input; and in response to detecting the respective input:

in accordance with a determination that the respective input corresponds to the request to exit the second reconfiguration mode, displaying a respective page of the plurality of pages that is different from the first page of the plurality of pages of the multipage home screen user interface.

20. A non-transitory computer readable storage medium storing one or more programs, the one or more programs comprising instructions, which, when executed by an electronic device with a display and an input element, cause the electronic device to:

display a first page of a multipage home screen user interface in a normal mode, wherein respective positions of a first plurality of application icons in the first page of the multipage home screen user interface are not adjustable in accordance with user inputs in the normal mode;

while displaying the first page of the multipage home screen user interface in the normal mode, detect a respective input that corresponds to a request to transition from the normal mode to a first reconfiguration mode;

in response to detecting the respective input that corresponds to the request to transition from the normal mode to the first reconfiguration mode, display the first page of the multipage home screen user interface in the first reconfiguration mode, including displaying a first visual indication in the first page of the multipage home screen user interface to indicate that the first page is displayed in the first reconfiguration mode, wherein the multipage home screen user interface has a plurality of pages, and the respective positions of the first plurality of application icons in the first page of the multipage home screen user interface are adjustable in accordance with user inputs in the first reconfiguration mode;

while displaying the first page of the multipage home screen user interface in the first reconfiguration mode, including displaying the first visual indication in the first page of the multipage home screen user interface to indicate that the first page remains in the first reconfiguration mode, detect a first input that corresponds to a request to enter a second reconfiguration mode from the first reconfiguration mode, wherein the availability of one or more pages in the multipage home screen user interface can be changed in accordance with user inputs in the second reconfiguration mode;

in response to detecting the first input, replace display of the first page of the multipage home screen user interface in the first reconfiguration mode with display of respective representations of at least two of the plurality of pages of the multipage home screen user interface in the second reconfiguration mode, including at least a first representation of the first page of the multipage home screen user interface, and a second representation of a second page of the multipage home screen user interface that is different from the first page of the multipage home screen user interface;

while displaying the respective representations of the at least two of the plurality of pages of the multipage home screen user interface in the second reconfiguration mode, including the first representation of the first page and the second representation of the second page, detect a second input; and in response to detecting the second input, in accordance with a determination that the second input is directed to the second representation of the second page that is displayed in the second reconfiguration mode, and that the second input meets first criteria, display the second page of the multipage home screen user interface in the first reconfiguration mode, including displaying the first visual indication in the second page of the multipage home screen user interface to indicate that the second page is displayed in the first reconfiguration mode wherein respective positions of a second plurality of application icons in the second page of the multipage home screen user interface are adjustable in accordance with user inputs in the first reconfiguration mode.

21. The electronic device of claim 19, wherein the one or more programs include instructions for:

in response to detecting the respective input:

in accordance with a determination that the respective input corresponds to a request to cease hiding the first page, ceasing to visually distinguish the first representation of the first page from the second representation of the second page.

22. The electronic device of claim 19, wherein the one or more programs include instructions for:

in response to detecting the respective input:

in accordance with a determination that the respective input is directed to the first representation of the first page that is visually distinguished from the second representation of the second page, and that the respective input meets the first criteria, forgoing displaying the first page of the multipage home screen user interface in the first reconfiguration mode.

23. The electronic device of claim 12, wherein the one or more programs include instructions for:

in response to detecting the second input:

in accordance with a determination that the second input meets fifth criteria and that a total number of pages in the multipage home screen user interface exceeds a preset threshold number, scrolling the respective representations of at least two of the plurality of pages of the multipage home screen user interface in the second reconfiguration mode to reveal respective representations of at least one additional page of the plurality of pages that was not initially displayed in the second reconfiguration mode.

24. The non-transitory computer readable storage medium of claim 20, wherein respective representations of the plurality of pages of the multipage home screen user interface are displayed in accordance with a first sequential order that corresponds to a sequential order of the plurality of pages in the multipage home screen user interface displayed outside of the second reconfiguration mode, and wherein the one or more programs include instructions, which, when executed by the computer system, cause the computer system to:

in response to detecting the second input, in accordance with a determination that the second input is directed to the second representation of the second page that is displayed in the second reconfiguration mode, and that the second input meets second criteria different from the first criteria, adjust a respective position of the second representation of the second page among the respective representations of the plurality of pages in accordance with the second input, wherein the sequential order of the plurality of pages in the multipage home screen user interface displayed outside of the second reconfiguration mode is adjusted in accordance with the adjustment of the respective position of the second representation of the second page made in response to the second input.

25. The non-transitory computer readable storage medium of claim 20, wherein the one or more programs include instructions, which, when executed by the computer system, cause the computer system to:

in response to detecting the second input, in accordance with a determination that the second input meets third criteria that are different from the first criteria, redisplay the first page of the multipage home screen user interface in the first reconfiguration mode.

26. The non-transitory computer readable storage medium of claim 25, wherein the one or more programs include instructions, which, when executed by the computer system, cause the computer system to:

while redisplaying the first page of the multipage home screen user interface in the first reconfiguration mode, detect a third input that meets the third criteria; and in response to detecting the third input that meets the third criteria, replace display of the first page in the first reconfiguration mode with display of the first page in the normal mode, wherein a respective application icon of the first plurality of application icons in the first page displayed in the normal mode, when activated by an input that meets the first criteria, causes display of a respective application corresponding to the respective application icon.

27. The non-transitory computer readable storage medium of claim 20, wherein replacing display of the first page of the multipage home screen user interface in the first reconfiguration mode with display of the respective representations of at least two of the plurality of pages of the multipage home screen user interface in the second reconfiguration mode includes:

displaying an animated transition showing the first page of the multipage home screen user interface shrinking down and moving toward a location occupied by the first representation of the first page in the second reconfiguration mode, and representations of one or more pages adjacent to the first page in the multipage home screen user interface coming into view adjacent to the first representation of the first page.

28. The non-transitory computer readable storage medium of claim 20, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a first number of pages, displaying respective representations of the first number of pages with a first size in the second reconfiguration mode; and in accordance with a determination that the multipage home screen user interface includes a second number of pages that is different from the first number of pages, displaying respective representations of the second number of pages with a second size that is different from the first size.

29. The non-transitory computer readable storage medium of claim 20, wherein replacing display of the first page of the multipage home screen user interface in the first reconfiguration mode with display of the respective representations of at least two of the plurality of pages of the multipage home screen user interface in the second reconfiguration mode includes:

in accordance with a determination that the multipage home screen user interface includes a third number of pages, displaying respective representations of the third number of pages in accordance with a first arrangement in the second reconfiguration mode; and in accordance with a determination that the multipage home screen user interface includes a fourth number of pages that is different from the third number of pages, displaying the respective representations of the fourth number of pages with a second arrangement that is different from the first arrangement.

30. The non-transitory computer readable storage medium of claim 20, wherein the one or more programs include instructions, which, when executed by the computer system, cause the computer system to:

in response to detecting the second input, in accordance with a determination that the second input corresponds to a request to hide the first page, visually distinguish the first representation of the first page from the second representation of the second page that is displayed in the second reconfiguration mode;

while displaying the first representation of the first page that is visually marked relative to the second representation of the second page in the second reconfiguration mode, detect a respective input; and in response to detecting the respective input:

in accordance with a determination that the respective input corresponds to the request to exit the second reconfiguration mode, display a respective page of the plurality of pages that is different from the first page of the plurality of pages of the multipage home screen user interface.

31. The non-transitory computer readable storage medium of claim 30, wherein the one or more programs include instructions, which, when executed by the computer system, cause the computer system to:

in response to detecting the respective input: 'in accordance with a determination that the respective input corresponds to a request to cease hiding the first page, cease to visually distinguish the first representation of the first page from the second representation of the second page.

32. The non-transitory computer readable storage medium of claim 30, wherein the one or more programs include instructions, which, when executed by the computer system, cause the computer system to:

in response to detecting the respective input:

in accordance with a determination that the respective input is directed to the first representation of the first page that is visually distinguished from the second representation of the second page, and that the respective input meets the first criteria, forgo displaying the first page of the multipage home screen user interface in the first reconfiguration mode.

33. The non-transitory computer readable storage medium of claim 20, wherein the one or more programs include instructions, which, when executed by the computer system, cause the computer system to:

in response to detecting the second input:

in accordance with a determination that the second input meets fifth criteria and that a total number of pages in the multipage home screen user interface exceeds a preset threshold number, scroll the respective representations of at least two of the plurality of pages of the multipage home screen user interface in the second reconfiguration mode to reveal respective representations of at least one additional page of the plurality of pages that was not initially displayed in the second reconfiguration mode.

* * * * *

UNITED STATES PATENT AND TRADEMARK OFFICE

CERTIFICATE OF CORRECTION

PATENT NO. : 11,137,904 B1
APPLICATION NO. : 17/027416
DATED : October 5, 2021
INVENTOR(S) : Tyler et al.

It is certified that error appears in the above-identified patent and that said Letters Patent is hereby corrected as shown below:

In the Specification

Column 70, Line 51, please delete “deletion badge 5328” and insert --deletion badge 5327--.

Column 297, Line 53, please delete “home screen 5022g” and insert --home screen 5210’--.

In the Claims

In Claim 20, Column 328, Lines 59-60, please delete “an electronic device” and insert --a computer system--.

In Claim 20, Column 328, Line 61, please delete “electronic device” and insert --computer system--.

Signed and Sealed this
Twenty-second Day of April, 2025

Coke Morgan Stewart
*Acting Director of the United States Patent and Trademark Office*